United States Patent [19]

Bailey

[11] Patent Number: 4,910,663

[45] Date of Patent: Mar. 20, 1990

[54] SYSTEM FOR MEASURING PROGRAM EXECUTION BY REPLACING AN EXECUTABLE INSTRUCTION WITH INTERRUPT CAUSING INSTRUCTION

[75] Inventor: Bruce W. Bailey, Cupertino, Calif.

[73] Assignee: Tandem Computers Incorporated, Cupertino, Calif.

[21] Appl. No.: 72,811

[22] Filed: Jul. 10, 1987

[51] Int. Cl.⁴ .......................... G06F 9/00; G06F 9/24; G06F 9/26

[52] U.S. Cl. .................................... 364/200; 364/221; 364/221.7; 364/261.3; 364/262.4; 364/246.2; 364/244; 364/244.6

[58] Field of Search ... 364/200 MS File, 900 MS File, 364/300, 200, 900; 371/19

[56] References Cited

U.S. PATENT DOCUMENTS

| | | | |
|---|---|---|---|
| 3,509,541 | 4/1970 | Gordon | 364/200 |
| 3,551,659 | 12/1970 | Forsyth | 371/19 |
| 3,707,725 | 12/1972 | Dellheim | 364/200 |
| 4,080,650 | 3/1978 | Beckett | 364/200 |
| 4,205,370 | 5/1980 | Hirtle | 364/200 |
| 4,231,106 | 10/1980 | Heap et al. | 364/200 |
| 4,462,077 | 7/1984 | York | 364/200 |
| 4,511,961 | 4/1985 | Penton | 364/200 |
| 4,571,677 | 2/1986 | Hirayama et al. | 364/200 |
| 4,601,008 | 7/1986 | Kato | 364/900 |
| 4,635,193 | 1/1987 | Moyer et al. | 364/200 |

FOREIGN PATENT DOCUMENTS

| | | |
|---|---|---|
| 0087064 | 8/1983 | European Pat. Off. . |
| 57-50058 | 3/1982 | Japan . |

OTHER PUBLICATIONS

H. W. Flanagan, "Program Monitoring Technique", IBM Tech. Disclosure Bulletin, vol. 13, No. 8, Jan. 1971, pp. 2399–2401.

R. E. Birney, "Trace", IBM Technical Disclosure Bulletin, vol. 20, No. 7, Dec. 1977, pp. 2561–2562.

N. J. King, "System Program Debugging", IBM Technical Disclosure Bulletin, vol. 13, No. 7, Dec. 1970, pp. 1822–1824.

H. W. Flanagan, "Program Debugging System", IBM Technical Disclosure Bulletin, vol. 16, No. 7, Dec. 1973, pp. 2322–2329.

E. Miller; "Some Statistics from the Software Testing Service"; *ACM SIGSOFT Software Engineering Notes;* vol. 1, No. 1, Jan. 1979; pp. 8–11.

R. W. Erickson, H. Nguyen, E. Miller, J. Irwin, D. Casey, L. Ling; "User's Manual for TCAT/C (PC Version)"; Publication 1984 by Software Research Associates.

Software Research Associates, Data Sheet for TCAT.

M. D. Weiser, J. D. Gannon, P. R. McMullin; "Comparison of Structural Test Coverage Metrics"; *IEEE Software;* Mar. 1985.

The Analytics Sciences Corporation; "Trailblazer Sales Literature".

Softool Corporation; "Softool Programming Environment"; Mar. 1984.

William R. DeHaan; "Option B; Instrumentation Facility for IFTRAN and V-IFTRAN"; *The Software Workshop;* 1980.

M. A. Holthouse, C. W. Lybrook; "Improving Software Testing in Large Data Processing Organizations"; *AFIPS Conference Proceedings,* vol. 50; 1981.

*Primary Examiner*—Archie E. Williams, Jr.

*Assistant Examiner*—Emily Y. Chan

*Attorney, Agent, or Firm*—Townsend and Townsend

[57] ABSTRACT

A computer program measures the execution of machine code instructions in an executing program. A copy of the measured program is made and selected machine instructions are replaced by interrupt-causing breakpoint instructions. As each breakpoint instruction is executed, the breakpoint is replaced by the actual instruction, and a bit map is updated to indicate execution of the measured instruction. Execution resumes with the actual instruction.

17 Claims, 9 Drawing Sheets

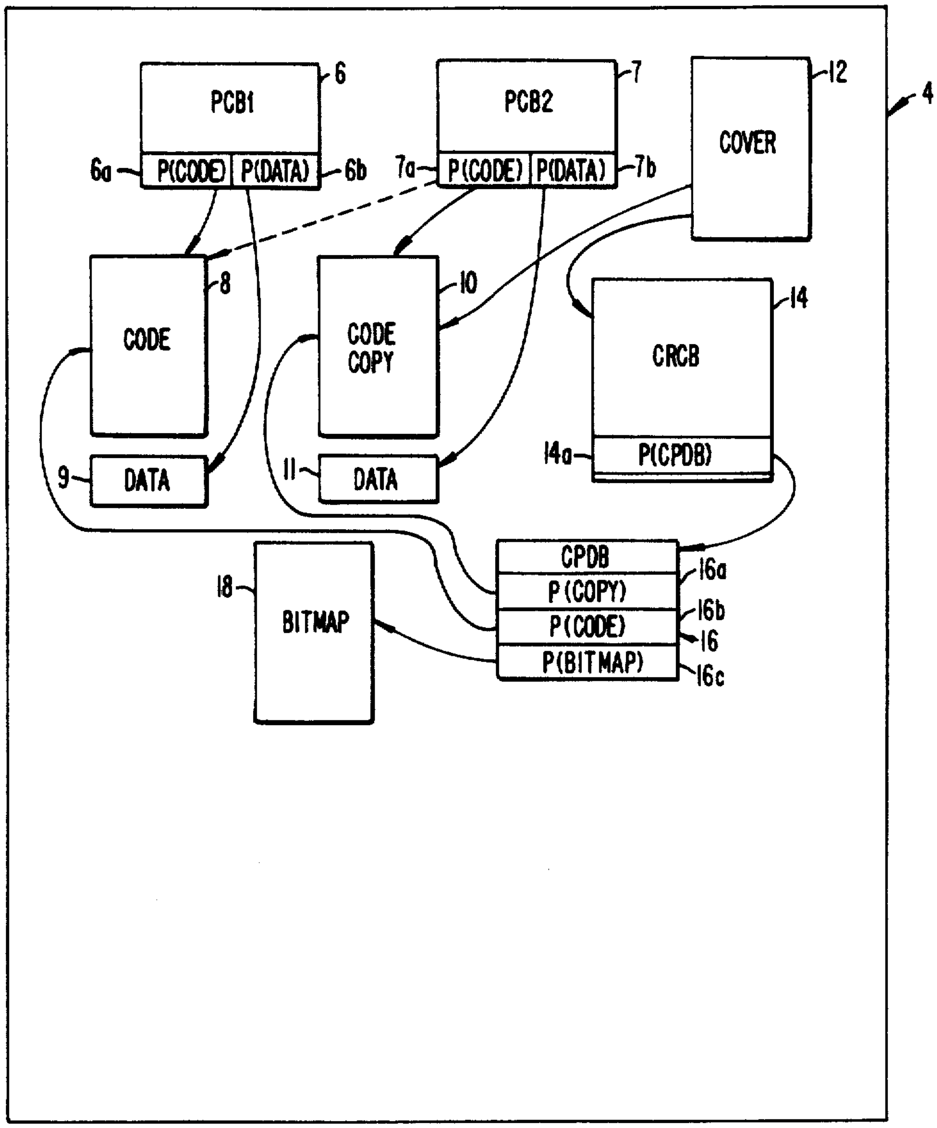
FIG._1.

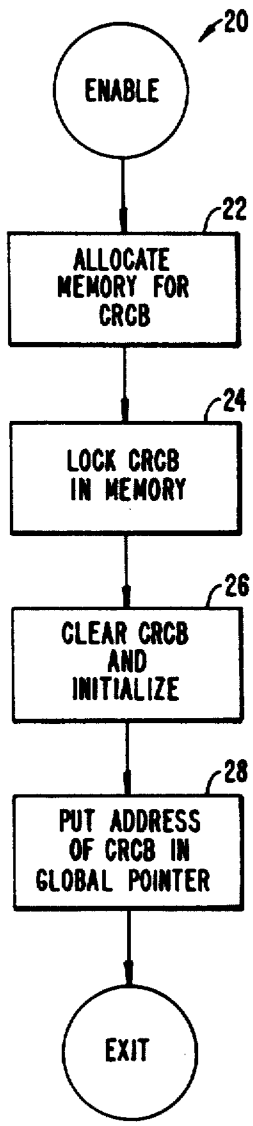
FIG._2.
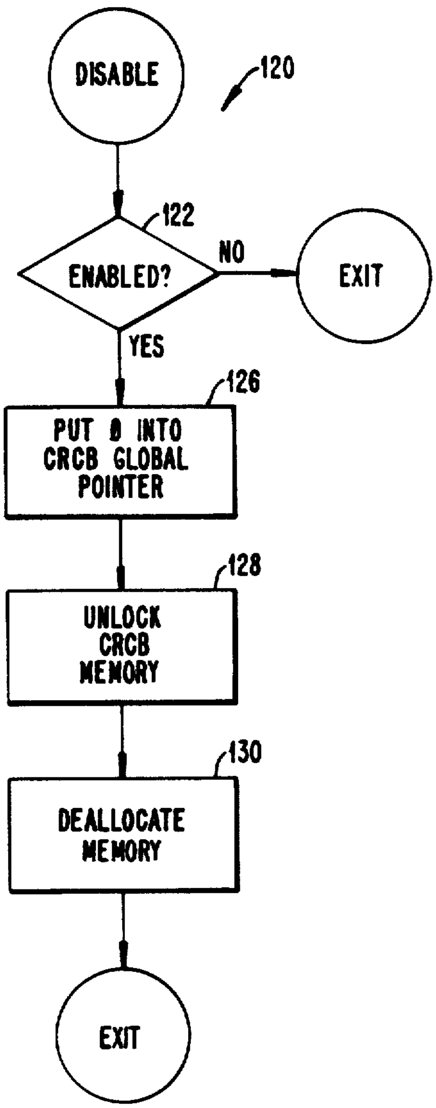
FIG._7.

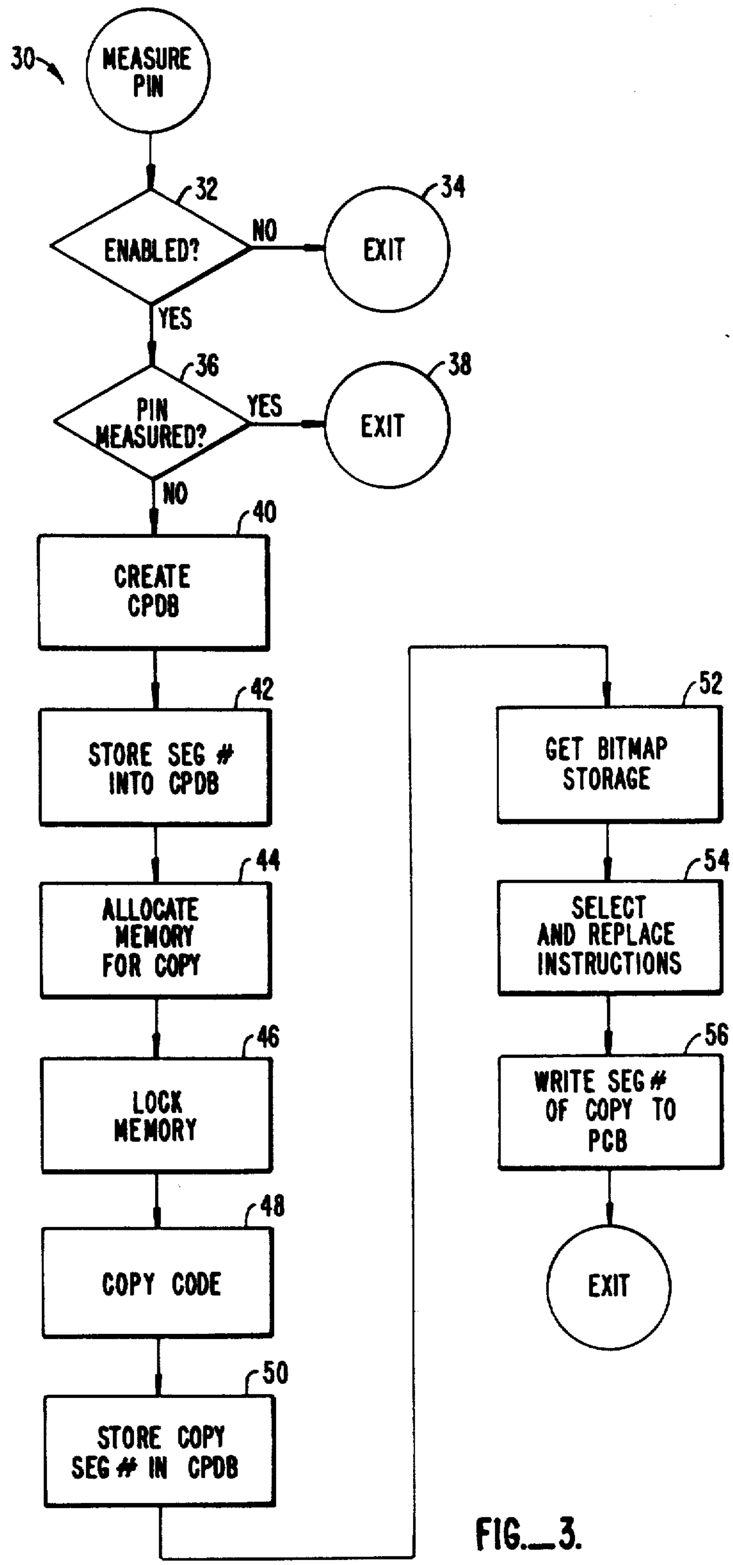
FIG._3.

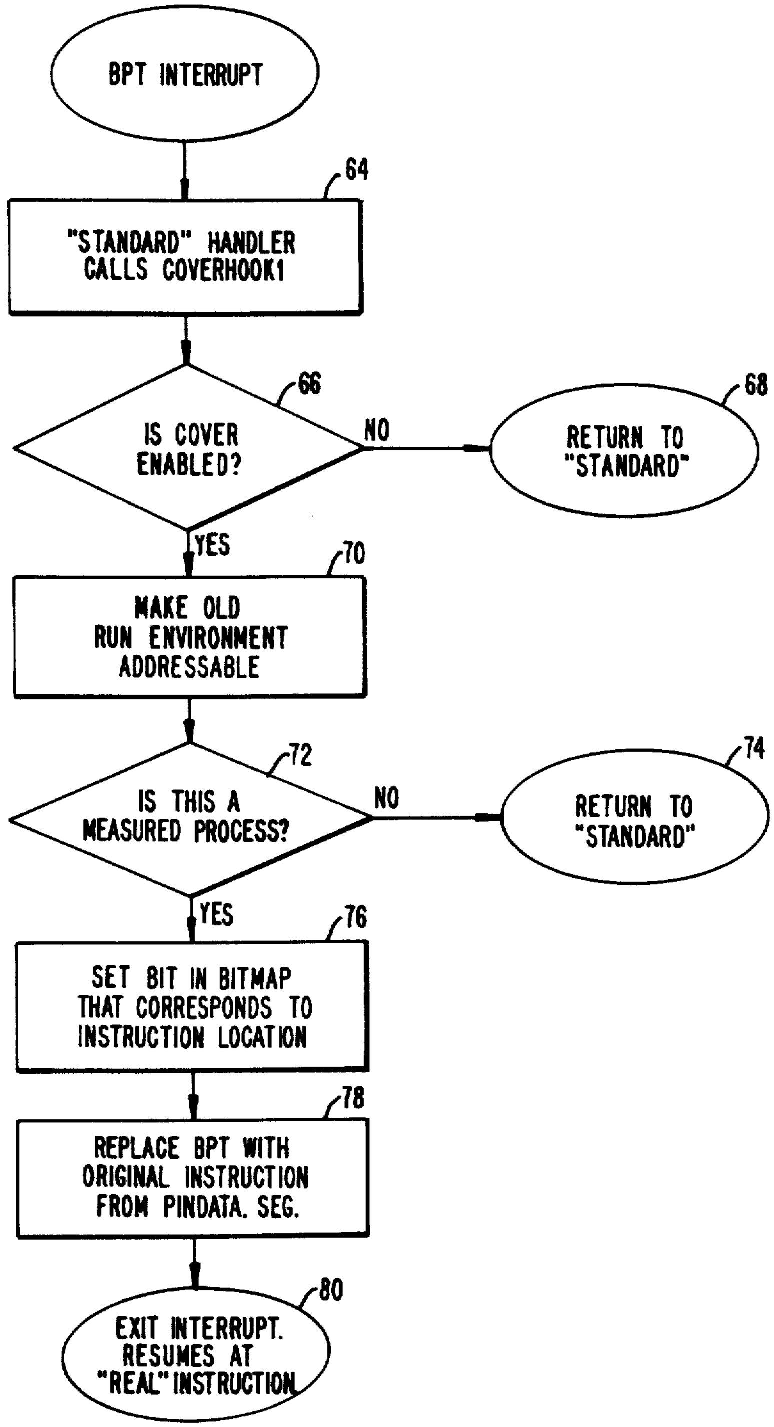
FIG._4.

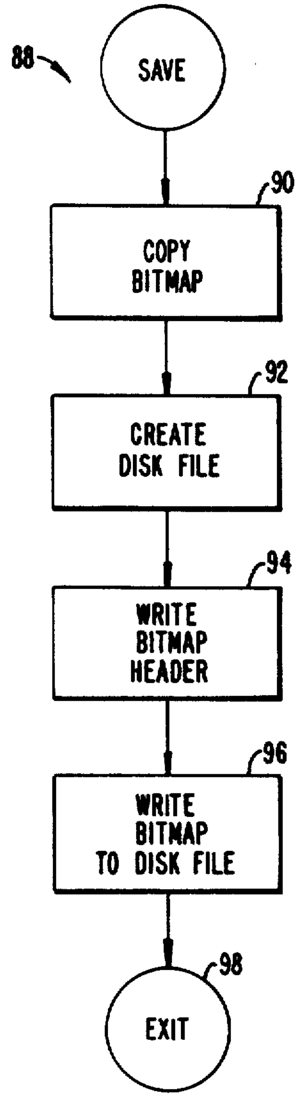
FIG._5.
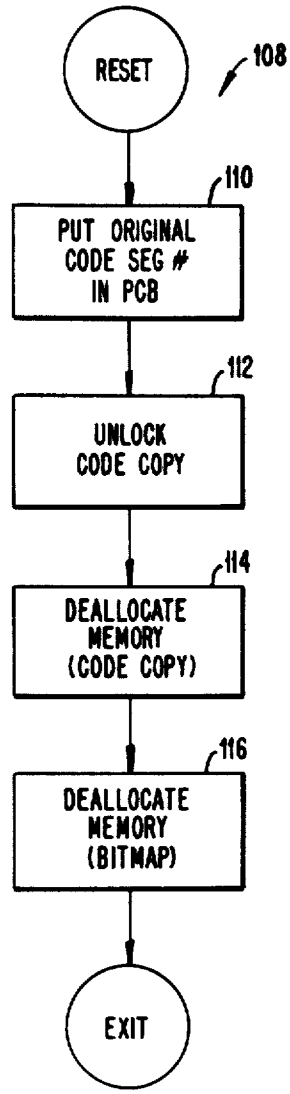
FIG._6.

```
PAGE 1      $OVER.DEMO.SAMP [1]

TAL - T9250B40 - (15SEP86)
DATE - TIME: 04FEB87 - 08:56:54

 000000   INT PROC ABS( ARG ); !FUNCTION DEFINITION
 000000   INT          ARG;
 000000   BEGIN
 000000   IF ARG > 0 THEN
*000003     RETURN ARG
 000003   ELSE
 000006     RETURN -ARG;
 000011   END;
 000000
 000000   PROC MAINSTREET MAIN;
 000000   BEGIN
 000000   INT             I,J;
 000000
 000000   CALL INITIALIZER; !EXTERNAL SYSTEM PROCEDURE
 000006   I: = 0;
 000010
 000010   WHILE I DO
*000012     I:= 0;                 !NEVER EXECUTED
 000015
*000015   IF  I THEN J: = -J;      !SECOND STATEMENT NOT
 000022
 000022   J:= ABS(I);              !FUNCTION CALL
 000026
 000026   I:=2; J:=3;              !BOTH STATEMENTS EXECUTED
 000032
+000032   CALL STOP; J:=0;         !SECOND STATEMENT NOT
 000041
*000041   END;                     !IMPLICIT CALL STOP
```

FIG._8.

```
EXECUTION REPORT. STATEMENTS MARKED "*" WERE NOT EXECUTED.
BITMAP IS FROM $SYSTEM.BWBDEMO.ZZCOAMP
PROGRAM FILE IS $SYSTEM.BWBDEMO.AMP DATED 4 FEB 1987, 8:56:54

SPACEID 00 WORD OFFSET 000004 IS BASE OF ABS.
  ENTRY POINT AT WORD OFFSET 000000 IS ABS
PROCEDURE HEADER AT LINE 6. IN $OVER.BWBDEMO.SAMP
SOURCE FILE TIMESTAMP WAS 4 FEB 1987, 8:56:30.
  WORD OFFSET 000000 IS LINE  9. IN $OVER.BWBDEMO.SAMP
 *WORD OFFSET 000003 IS LINE 10. IN $OVER.BWBDEMO.SAMP
  WORD OFFSET 000006 IS LINE 12. IN $OVER.BWBDEMO.SAMP
OF 3 STATEMENTS, 1 (33.3%) WERE NOT EXECUTED.

SPACEID 00 WORD OFFSET 000015 IS BASE OF MAINSTREET.
  ENTRY POINT AT WORD OFFSET 000000 IS MAINSTREET
PROCEDURE HEADER AT LINE 15. IN $OVER.BWBDEMO.SAMP
SOURCE FILE TIMESTAMP WAS 4 FEB 1987, 8:56:30.
  WORD OFFSET 000000 IS LINE 15. IN $OVER.BWBDEMO.SAMP
  WORD OFFSET 000001 IS LINE 19. IN $OVER.BWBDEMO.SAMP
  WORD OFFSET 000006 IS LINE 20. IN $OVER.BWBDEMO.SAMP
  WORD OFFSET 000010 IS LINE 22. IN $OVER.BWBDEMO.SAMP
 *WORD OFFSET 000012 IS LINE 23. IN $OVER.BWBDEMO.SAMP
  WORD OFFSET 000015 IS LINE 25. IN $OVER.BWBDEMO.SAMP
 *WORD OFFSET 000017 IS LINE 25. IN $OVER.BWBDEMO.SAMP
  WORD OFFSET 000022 IS LINE 27. IN $OVER.BWBDEMO.SAMP
  WORD OFFSET 000026 IS LINE 29. IN $OVER.BWBDEMO.SAMP
  WORD OFFSET 000030 IS LINE 29. IN $OVER.BWBDEMO.SAMP
  WORD OFFSET 000032 IS LINE 31. IN $OVER.BWBDEMO.SAMP
 *WORD OFFSET 000037 IS LINE 31. IN $OVER.BWBDEMO.SAMP
 *WORD OFFSET 000041 IS LINE 33. IN $OVER.BWBDEMO.SAMP
OF 13 STATEMENTS, 4 (30.8%) WERE NOT EXECUTED.

OF 16 STATEMENTS, 5 (31.3%) WERE NOT EXECUTED.
```

FIG._9.

BITMAP IS FROM $A.BWB.ZZC00006
PROGRAM FILE IS $A.BWB.BRANDY DATED 26 JAN 1987, 15:47:38

| PROCEDURE NAME | SOURCE FILE | LINE NUMBER | OFFSET | STTMNTS |
|---|---|---|---|---|
| CREATE^BACKUP | SBRANDY | 696. | 000000 | 55 |
| SET^RUN^TIME^OPTIONS | SBRANDY | 572. | 000253 | 54 |
| DOSHOW^MENU | SBRANDY | 1369. | 000000 | 54 |
| ANALYZE^CHECK^STATUS | SBRANDY | 749. | 000000 | 26 |
| ANALYZE^SYSTEM^MES | SBRANDY | 794. | 000000 | 23 |
| SET^RUN^TIME^OPTIONS | SBRANDY | 547. | 000001 | 18 |
| CHECKRECEIVE | SBRANDY | 832. | 000000 | 15 |
| OPEN^BACKUPS^FILES | SBRANDY | 672. | 000022 | 11 |
| CHECK^VERSION | SBRANDY | 656. | 000021 | 9 |
| GET^TOKEN | SBRANDY | 464. | 000027 | 6 |
| OPEN^PRIMARYS^FILES | SBRANDY | 636. | 000025 | 6 |
| EXECUTE | SBRANDY | 1443. | 000071 | 6 |
| BRANDY | SBRANDY | 1469. | 000033 | 5 |
| GOTO^ | SBRANDY | 1033. | 000055 | 4 |
| GOTO^ | SBRANDY | 1051. | 000125 | 3 |
| XCAL^ | SBRANDY | 1179. | 000105 | 3 |
| OUTPUT^ | SBRANDY | 345. | 000024 | 2 |
| IF^ | SBRANDY | 1201. | 000042 | 2 |
| BRANDY | SBRANDY | 1485. | 000124 | 2 |

FIG._10.

PROGRAM FILE IS $A.BWB.BRANDY DATED 26 JAN 1987, 15:47:38
MEASUREMENT OF $A.BWB.BRANDY WHICH COMPRISES 771 STATEMENTS

| SEQUENCE | FILENAME | % COVERAGE | % CUMULATIVE |
|---|---|---|---|
| 1 | ZZC00006 | 57.1% | 57.1% |
| 2 | ZZC00004 | 25.3% | 64.3% |
| 3 | ZZC00002 | 55.3% | 69.9% |
| 4 | ZZC00005 | 53.7% | 71.6% |
| 5 | ZZC00003 | 56.5% | 71.7% |
| 6 | ZZC00001 | 49.8% | 71.7% |

FIG._11.

```
PROC ORDER( BIGK, BIGN, X);
   INTEGER BIGK, BIGN;                    --ARRAY DIMENSIONS.
   BIT ARRAY X(BIGK, BIGN);               --TEST MEASUREMENT RESULTS.
   BIT ARRAY V(BIGN);  --CUMULATIVE MEASUREMENT RESULT
-- TEMPORARY VARIABLES
   INTEGER SUMJ, SUMK, SUMMAX, j, k, MAX;
   BIT ARRAY SWAP( BIGN);

-- THE NOTATION "*" AS AN ARRAY SUBSCRIPT MEANS "ALL ELEMENTS
-- ALONG THAT COORDINATE TAKEN ONE AT A TIME."

-- THE FUNCTION "LOR" IS THE BOOLEAN INCLUSIVE OR.

-- THE FUNCTION "ADDELEMENTS" COMPUTES THE SUM OF THE ELEMENTS
-- OF ITS VECTOR ARGUMENT.

V(*): =0;

FOR k: =1 TO BIGK-1 DO
   BEGIN
   SUMMAX: =SUMK: =ADDELEMENTS( V(*) LOR X(k,*));
   MAX: = k+1;
   --FIND THE TEST CASE WHICH HELPS THE MOST.
   FOR j: =MAX TO BIGK DO
      BEGIN
      SUMJ: =ADDELEMENTS (V(*) LOR X(j,*));
         BEGIN
         --ESTABLISH A NEW BOUND
         SUMMAX: = SUMJ;
         END;
      END; --j
   IF SUMMAX > SUMK THEN
      BEGIN
      --SWAP X(k, *) WITH X(MAX, *)
      SWAP(*): =X(k,*);
      X(k,*): =X(MAX,*);
      X(MAX,*): =SWAP(*);
      END;
   V(*): =X(k,*) LOR V(*);
   END; --k
```

FIG._12.

SYSTEM FOR MEASURING PROGRAM EXECUTION BY REPLACING AN EXECUTABLE INSTRUCTION WITH INTERRUPT CAUSING INSTRUCTION

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

This invention relates to computer software testing tools, and more particularly, it relates to a method and apparatus for determining which program statements have been executed.

An important aspect of software quality assurance is the comprehensiveness of the testing. Without the assistance of special tools, it is difficult, if not impossible, to accurately determine "coverage", i.e., which program instructions are executed when test cases are run. It is therefore difficult to know which test cases to run or when to stop test case development.

In the prior art, there are two principal types of tools for measuring the coverage of test cases. The first type are tools that use pre-processors to modify source code before it is compiled. Procedure calls are inserted at the beginning of program blocks for keeping track of whether a block has been executed. There are several drawbacks to this approach. These tools are language-specific; that is, the preprocessors must be tailored to the syntax of the source language. The size of the object code is changed by the procedure calls, which can change the execution characteristics of the program. Programs must be pre-processed and recompiled for measurement, and then restored or recompiled for production use or product release. The use of preprocessors not only requires an extra step, it also makes these tools impractical for measuring operating system code and time-critical programs.

The second type of coverage measurement tool in the prior art uses sampling techniques to periodically read the program counter and accumulate statistics on how much time is spent in predetermined memory address ranges. Histograms are developed which can be matched up with the programs load map. These tools are useful for evaluating program performance, but, because they use sampling, they cannot be used to determine which instructions have *not* been executed.

What is needed is a true coverage measurement tool that does not require source code preprocessing, can be used on any type of program, and does not require modification of existing programs or test suites.

SUMMARY OF THE INVENTION

This invention provides a coverage measurement tool that measures which instructions have been executed and which instructions have not been executed, while overcoming the disadvantages inherent in the prior art. No pre-processing or sampling is used. The tool is easy to use, and measurements can be performed in the tester's normal test environment. The measurement is performed using the same executable object code version of the program that will be released after testing. Different programs, or multiple tests of the same program, can be measured at the same time. The output of the measurement can be mapped directly into high-level language source statements. The size of the object code is not changed. The measurement tool does not noticeably degrade execution performance of the tested program.

According to the invention, machine-level instructions are selected for measurement and each of those instructions is replaced by a measurement instruction. Preferably, the measurement instruction is an interrupt-causing instruction. The program containing the measurement instructions is then executed. When a measurement instruction is executed, the measured (replaced) instruction is identified and a value is stored to indicate that the measured instruction has been executed. Then the measured instruction is restored by replacing the measurement instruction with the original instruction, and execution resumes with the restored instruction. The effect on execution performance (as measured by elapsed time) is minimal, because the replacement is performed only once for each selected instruction, even if the selected instruction is executed many times.

In one embodiment of the invention, the first instruction of each block of executable object code compiled from a source language statement is selected for measurement. This provides statement level coverage measurement. Each selected instruction is replaced by a breakpoint instruction, which causes non-maskable interrupts. To accommodate multiple users of the measured program, the measurement is run on a duplicate copy of the program. The results of the measurement are stored in a bitmap which can be used to generate a variety of useful outputs, such as a marked-up copy of the source code indicating which source-language statements have or have not been executed. These outputs can significantly increase the efficiency and effectiveness of the quality assurance effort.

BRIEF DESCRIPTION OF THE DRAWINGS

FIG. 1 is a block diagram of a computer memory apparatus for the preferred embodiment.

FIG. 2 is a flow chart illustrating the operation of the ENABLE function.

FIG. 3 is a flow chart illustrating the operation of the MEASURE function.

FIG. 4 is a flow chart illustrating the operation of the program in response to a breakpoint interrupt.

FIG. 5 is a flow chart illustrating the operation of the SAVE function.

FIG. 6 is a flow chart illustrating the operation of the RESET function.

FIG. 7 is a flow chart illustrating the operation of the DISABLE function.

FIG. 8 is an example of a MARKUP report.

FIG. 9 is an example of the DISPLAY output.

FIG. 10 is an example of the SORT output.

FIG. 11 is an example of the ORDER output.

FIG. 12 is a pseudo-code representation of the algorithm used to generate the ORDER report.

DETAILED DESCRIPTION OF THE PREFERRED EMBODIMENT

In the preferred embodiment the method of the invention is practiced by a computer program written in the "TAL" language and executed on a "Tandem"

"NonStop" computer under the control of the "GUARDIAN 90" operating system. ("Tandem", "TAL", "NonStop", and "GUARDIAN 90" are trademarks of Tandem Computers, Inc., of Cupertino Calif. Reference manuals for the "TAL" language and the "GUARDIAN 90" operating system, and the "NonStop" System Description Manual are available from Tandem Computers, Inc.) The following detailed description, with reference to the drawings, will enable those of ordinary skill in the art to make and use the invention.

Cover is a set of program modules, some of which are in the COVER command interpreter (COVERCOM), some in the monitor (CVRMON) and some in the operating system (in the breakpoint interrupt handler). The source code for the copyrighted program (referred to generally as "COVER") is provided herewith as Appendix A. In the description that follows, references to pages in the appendix will be provided along with references to flow chart blocks. These references to the source code appendix are in the form "(A-nnn)", where nnn is a page number in the Appendix A. The source code will provide a complete disclosure of the preferred embodiment. However, one of ordinary skill in the relevant art will be able to practice the invention without reference to the source code listing, from the description and charts herein.

The preferred embodiment measures statement coverage. Statement coverage is a measure of which source code statements were (and were not) executed. Other types of coverage (such as code coverage, which is a measure of the execution of machine instructions) are within the scope of the invention, because the actual measurement is performed on selected machine instructions in the object code.

Referring to FIG. 1, a simplified block diagram illustrates the logical organization of a computer memory apparatus 4 for implementing the preferred embodiment of the invention. Two Process Control Blocks (PCBs) 6,7 are shown. In this computer system, there are up to 256 active PCBs, each controlling a process, or task. A process is a running invocation of a program associated with a single user. A single program can execute multiple processes for multiple users. PCB1 6 contains a pointer 6*a* pointing to program code segment 8 and a pointer 6*b* pointing to data area 9. PCB2 7 contains a pointer 7*a* which initially (before a COVER measurement is started) points (dotted arrow) to code segment 8, and a pointer 7*b* pointing to data area 11. When the COVER program 12 is enabled, it establishes Cover Routine Control Block (CRCB) 14. When COVER initiates a measurement on a particular process (PIN), it establishes a Cover PIN Data Block (CPDB) 16 for that process, and writes the CPDB address into one of the 256 P(CPDB) 14*a* in the CRCB. COVER then makes a copy 10 of code segment 8, and saves a pointer P(CODE) 16*b* to code segment 8 and a pointer P(COPY) 16*a* to copy 10 into CPDB 16. COVER inserts measurement-causing instructions at selected locations in code copy 10, establishes a bitmap 18 for storing results of the measurement, and stores a pointer to copy 10 in pointer 7*a* of PCB2 7. A pointer P(BITMAP) 16*c* to bitmap 18 is stored in CPDB 16. The system will execute Copy 10.

COVER must be enabled by the system operator for a particular cpu (central processing unit) before users can invoke the measurement facility on that cpu. (This embodiment is implemented on a system having multiple cpu's.) The system operator issues the ENABLE command to allow measurements on a particular CPU. Referring to FIG. 2, flow chart 20 illustrates the operation of COVER in response to the ENABLE command (A-663-4). At block 22 (A-123), memory is allocated for a Cover Routine Control Block (CRCB). The format of the CRCB data structure is shown in Table I (A-296-7). At block 24 (A-123), the CRCB memory space is locked to make it memory resident and to allow absolute addressing. The CRCB is initialized at block 26 (A-123). The CRCB is cleared (to zeroes and then the verifier ("CovR" in this embodiment) and other header fields are set. At block 28 (A-123), the address of the CRCB is stored in a fixed predetermined location in memory (global pointer). The address of the global pointer is known to the operating system, including the breakpoint interrupt handler. COVER is now enabled, and users may perform measurements.

TABLE I

| | |
|---|---|
| VERIFIER "CovR" | |
| VERSION | |
| XCVRN | PIN |
| PrivEnabled | |
| MemoryRatio | |
| TraceBuffer | |
| Files to Measure [0:127] | |
| Control by PIN [0:255] | |

The measurement is performed as follows. The program "COVERCOM" is run to invoke the COVER command interpreter. To start a measurement of a process, the command "MEASURE" is issued with a process identification number ("PIN") identifying the process to be measured. Referring to FIG. 3, a flow chart 30 illustrates the operation of COVER in response to the MEASURE command (A-541). At block 32 (A-543), a test is made to determine whether COVER is enabled. The address in the global pointer predetermined location in memory is read. If the address is non-zero, then COVER is enabled. If COVER is not enabled, then no measurement can be performed and the program exits (block 34) and informs the user with an error message.

If COVER is enabled, then at block 36 (A-543-4), a test is made to determine whether there is a measurement in progress on the specified process. (Only one measurement is allowed at a time on a process). As seen in Table I, there is an array of 256 ControlByPin fields (one for each possible process on a cpu) in the CRCB. Each field contains a pointer to a Cover PIN Data Block, if that process is being measured. If a process is not being measured, then the field corresponding to that PIN is zero. Thus, if the entry for the requested process is non-zero, then, at block 38, the COVER program exits and informs the user with an error message. If the entry for the requested process is zero, then COVER initiates a measurement.

At block 40, a Cover Pin Data Block (CPDB) is established for the requested process and the address is written into the CRCB ControlByPin entry for this process. (Alternatively, the Cover Pin Data Blocks may be established when COVER is enabled; in that case, the state field is used to indicate whether a measurement is in progress for a PIN). Table II (A-296) shows the format of a CPDB. At block 42, (A-125) the segment number for the program code is read from the code.seg field in the PCB for this process and written into the CPDB at field UC.SEG. (The segment number is equivalent to the starting address of the code because programs start on memory segment boundaries. The program counter measures the offset into a segment.) At block 44, (A-126, A-686) a block of memory is allocated for a copy of the program code. At block 46 (A-687), the memory is block "locked" to ensure that it will remain adressable at all times for the duration of the measurement.

TABLE II

State
Eversaved
Save Vol
UC. Seg
UC. CopySeg
UC. Name
UC. Timestamp
UC. SpaceCount
UC. Space Size
UC. Bitmap Ptr.

At block 48 (A-686), the program code is copied into the allocated memory block. At block 50 (A-687), the segment number for this memory block is written into the CPDB at location UC.CopySeg. At block 52 (A-116-7), memory is obtained (and locked down) for a "bitmap". The bitmap is used to store the results of the measurement of the process. Each bit in the bitmap corresponds to a word (2-bytes, the length of an instruction) in the object code. The bitmap is initialized to zeroes and its address is stored in the CPDB at field UC.Bitmap.Ptr.

The machine instructions to be measured are now selected. Programs that are compiled on Tandem compilers with the "'Inspect' symbols" option contain a list of "statement starters" pointing to the first machine code instruction of each compiled source language statement. ("Inspect" is a trademark of Tandem Computers Inc.) For the statement coverage of this embodiment, these statement starting machine instructions are selected as the set of instructions to be measured. In other embodiments, other means may be used to select the measured instructions. For example, all of the code instructions may be selected (code coverage), so long as instructions can be distinguished from data in the object file.

At block 54 (A-157-9), the statement starters are read and measurement instructions are written in place of the statement-starting machine code instructions. In this embodiment, Breakpoint instructions are used as the measurement instructions. Breakpoint instructions are used in this computer system to cause interrupts and turn control over to the corresponding interrupt handler in the operating system. In other embodiments, other measurement instructions may be used, such as an SVC (Supervisor call) or an instruction with an invalid opcode. Subroutine calls may also be used, but it is preferable to use non-maskable interrupt-causing instructions to perform the measurement from within the operating system.

At block 56 (A-128), the segment number of the code copy (UC.CopySeg) is written into the PCB for this process, at the code.seg field. This field in the PCB stores the segment number for the program used to execute the process, and is the same field from which the original code segment number was copied to UC.-seg. UC.seg thus stores the address of the "original" code, and the PCB has the address of the code copy. This causes the system to use the code copy, with the breakpoints, to execute this process. Other processes may use the unmodified original code while the measurement takes place on the copy.

As the code copy executes, whenever a selected instruction would be executed a breakpoint instruction is executed first. This causes a breakpoint interrupt.

Referring to FIG. 4, a flow chart 62 shows the effect of the breakpoint interrupt. At block 64 (A-84), the breakpoint interrupt handler calls the COVER procedure. At block 66 (A-86), a test is made to determine whether COVER is enabled. This is done by reading the global pointer where the CRCB address is stored and determining whether the address is non-zero. If COVER is not enabled, the called program returns (block 68) to the "standard" interrupt handler. If COVER is enabled, then, at block 70 (A-86), the interrupted run environment is made addressable. Then, at block 72 (A-86), a test is made to determine whether the interrupted process is a measured process. The PIN of the interrupted PCB is read from a global memory location and used to index into the CRCB to determine whether there is a non-zero address pointer to a CPDB for this PIN. If the pointer for this PIN is zero, then this process is not being measured and, at block 74, control is returned to the standard interrupt handler. If the pointer for this PIN is non-zero, then the STATE field in the CPDB is checked. This field indicates whether the measurement is actually running. (While the program is being copied and breakpoints are being inserted, the state field is used to indicate this interim state).

If the process is being measured, then, at block 76 (A-86), the appropriate bit in the bitmap is set to indicate that the instruction has been executed. The bit corresponding to the interrupted (measured) instruction is found as follows: The interrupted instruction is identified by reading the program counter in the program environment register to get the offset (in words) into the segment for the breakpoint instruction that caused the interrupt; this word offset is used as a bit offset from the bitmap starting address stored (at UC.BitmapPtr) in the CPDB. The bit at that offset is set to one to indicate execution of the corresponding measured instruction.

After setting the bit in the bitmap, the breakpoint instruction in the code copy is replaced with the actual instruction to be executed (block 78, A-87). The offset from the program counter is concatenated to the segment number is the UC.Seg field in the CPDB. A low order 0 is added on (to indicate 0 byte offset into the instruction) to arrive at the 32 bit address of the instruction. The address of the instruction in the code copy is obtained in the same manner, using the UC.copy.seg field in the CPDB and the offset from the program counter. The measured instruction from the original program is copied into the executing code copy, replacing the breakpoint instruction. At block 80 (A-88), control is passed back to the program for execution of the actual instruction.

In this embodiment, the breakpoint instruction is also used for debugging. Therefore, before replacing the breakpoint instruction with the actual instruction, a test is made to determine whether a debug break point has been set. If the debugger has set a breakpoint, then COVER will find a breakpoint in the original code. A breakpoint table stores the instruction replaced by a debug breakpoint. COVER will use the instruction in the breakpoint table to replace the breakpoint in the copy. Control returns to the interrupt handler instead of to the program. The interrupt handler will execute the debug routine for this breakpoint. (It will be understood that this routine is necessary only because this embodiment uses the same breakpoint instruction that is used by the debugger. In other embodiments, a unique interrupt-causing instruction can be used, or concurrent debugging can be prohibited.)

The user can issue the SAVE command at any point to save the bitmap data. Referring to FIG. 5, flow chart 88 illustrates the operation of COVER in response to the SAVE command. At block 90 (A-12), the bitmap for the specified PIN is copied to another location in memory. At block 92 (A-23), a disk file is created for saving the bitmap. Then at block 94 (A-23) a header is written in the bitmap file, with the measured program's name, its time stamp, etc. using the data in the CPDB for the measured process. Then at block 96 (A-23) the bitmap is written to this disk file. The "eversaved" field in the CPDB is updated to indicate that the bitmap has been saved. Also, when a process terminates, if that process has been measured, the system monitor will save the bit map data.

The RESET command can be issued by the user or by the operating system after a save operation. Referring to FIG. 6, a flowchart 108 illustrates the operation of the program in response to the RESET command. At block 110 (A-670-1), the original code segment number is copied from the CPDB field UC.SEG. into the PCB, causing the original code to be executed instead of the copy. At block 112 (A-130, A-698), the code copy memory space is unlocked. At block 114 (A-130, A-689), the memory space is freed (deallocated), and at the block 116 (A-130, A-140) the bitmap space is freed. The measurement is thus terminated.

Referring to FIG. 7, the DISABLE command is illustrated. The DISABLE command performs the opposite functions of the ENABLE command. At block 122 (A-660), the program tests to determine whether COVER is enabled, and if not it exits. At block 126 (A-122), zeroes are written to the global pointer containing the address of the CRCB. At block 128 (A-122), the CRCB memory is unlocked. At block 130 (A-122), the CRCB memory space is freed (deallocated).

The bitmap is used to generate various useful outputs.

One useful output report ("MARKUP") (A-505-618) generated in the preferred embodiment is a marked source code listing such as the one shown in FIG. 8. Statements that were not executed are marked with an asterisk (*). If more than one statement occurs on the same line, a plus (+) indicates that a statement has been executed but some other statement has not executed. This report is generated using the same symbols table in the object file which was used to insert the breakpoint instructions. The symbols table indicates the offsets into the object code at which compiled source statements start. These same offsets (in bits instead of words) are used to index into the bitmap to test whether a statement-starting instruction has been executed.

The "DISPLAY" command displays a listing of all statements' source file line numbers in the measured program. All unexecuted statements are marked with an asterisk. For each procedure and for the total program, statistics are included indicating the number of statements and the percentage of those not executed. An example is shown in FIG. 9.

Another useful report ("SORT") (A-641-52) is shown in FIG. 10. This report reports all sequences of over n unexecuted contiguous statements, where n is specified by the user/requestor. The statement starters are read and compared to the bitmap. Unexecuted, contiguous statements are tallied until an executed statement is found, and a new tally is started. The tallys are then sorted.

The "ORDER" report (A-555-75) is shown in FIG. 11. Given an existing set of K test cases, it is useful to order the test cases so that the test with the highest coverage is run first. After this test, the next test case is selected so that it adds the most to the total coverage., etc. This will expose the program to the broadest testing in the shortest time.

First the bit maps are compressed to include only the bits corresponding to source code statement starters. If the program has N statements, the compressed bit maps for the K test cases form a bit matrix X(K,N). Referring to FIG. 12, a pseudo-code version of the algorithm for ordering the test cases is given. First, the test case J giving the most coverage is identified. Then each of the remaining bit maps is OR'ed (inclusive or) with the bit map for each of the $K-1$ remaining test cases, to find the combination giving the highest coverage. The combined bit map for these two cases is then or'ed with each of the $K-2$ remaining cases, etc.

Other boolean operations, such as AND, XOR, can also be performed on specified bit maps on request. The OR and exclusive or (XOR) can be used on bitmaps A and B to indicate the incremental increase provided by test cases. The function (A or B) XOR A determines what test B covers that test A does not cover. The AND operation indicates which statements were tested by all test cases.

In summary, a novel technique has been described for measuring the execution of a computer program. As will be apparent to those skilled in the art, the above-described embodiment can be modified without departing from the scope of the invention. It will be understood, therefore, that the invention is defined not by the above description, but by the appened claims.

APPENDIX A
Source Code for COVER

```
TAL - T9250B40 - (15SEP86)                        Source language: TAL - Target machine: Tandem NonStop II System
Date - Time :  29APR87 - 13:43:08               Default options: On (LIST,CODE,MAP,WARN,LMAP) - Off (ICODE,INNERLIST)

                        ? ERRORFILE ebitmap,USEGLOBALS gglobal,SEARCH oglobal,NOCODE,SYMBOLS,NOGMAP,NOLMAP,NOFIXUP
UseGlobals file:  $OVER.T9618C00.GGLOBAL  29APR87 - 13:17:01
Search file:  $OVER.T9618C00.OGLOBAL  29APR87 - 13:17:20
    2.   000000 0  0   NAME     COVERCOM^BITMAP;
    3.   000000 0  0   ?NOLIST
   34.   000000 0  0   ?BEGINCOMPILATION
   35.   000000 0  0   ?SOURCE copytal                 !Copyright notice
Source file:  [1]  $VIOLET.TOOLSC00.COPYTAL  22APR87 - 16:33:11
    1.   000000 0  0   ! +-----------------------------------------------------------------------+
    2.   000000 0  0   ! |                                                                       |
    3.   000000 0  0   ! |   Copyright (C) 1987 by TANDEM COMPUTERS INCORPORATED                 |
    4.   000000 0  0   ! |                                                                       |
    5.   000000 0  0   ! |   Protected as an unpublished work.                                   |
    6.   000000 0  0   ! |                                                                       |
    7.   000000 0  0   ! |   The computer program listings and specifications herein are         |
    8.   000000 0  0   ! |   the property of TANDEM COMPUTERS INCORPORATED and shall not be      |
    9.   000000 0  0   ! |   reproduced, copied, or used, in whole or in part, for any           |
   10.   000000 0  0   ! |   reason without the written permission of TANDEM COMPUTERS           |
   11.   000000 0  0   ! |   INCORPORATED.                                                       |
   12.   000000 0  0   ! |                                                                       |
   13.   000000 0  0   ! |   The following are trademarks or service marks of TANDEM             |
   14.   000000 0  0   ! |   COMPUTERS INCORPORATED:                                             |
   15.   000000 0  0   ! |                                                                       |
   16.   000000 0  0   ! |   GAX            BINDER         CROSSREF       DDL                    |
   17.   000000 0  0   ! |   ENABLE         ENCOMPASS      ENCORE         ENFORM                 |
   18.   000000 0  0   ! |   ENSCRIBE       ENVOY          ENVOYACP/XF    EXCHANGE               |
   19.   000000 0  0   ! |   EXPAND         FASTSORT       FAXLINK        FOX                    |
   20.   000000 0  0   ! |   FOXII          GUARDIAN       GUARDIAN 90    GUARDIAN 90XF          |
   21.   000000 0  0   ! |   INSIGHT        INSPECT        LASER-LX       LXN                    |
   22.   000000 0  0   ! |   MEASURE        MULTILAN       NetBatch       NonStop                |
   23.   000000 0  0   ! |   NonStop 1+     NonStop CLX    NonStop EXT    NonStop EXT10          |
   24.   000000 0  0   ! |   NonStop EXT25  NonStop II     NonStop SQL    NonStop TXP            |
   25.   000000 0  0   ! |   NonStop VLX    PATHMAKER      PC LINK        PCFORMAT               |
   26.   000000 0  0   ! |   PERUSE         PS MAIL        PS TEXT EDIT   PS TEXT FORMAT         |
   27.   000000 0  0   ! |   RDF            SAFE           SAFEGUARD      SAFE-T-NET             |
   28.   000000 0  0   ! |   T-TEXT         TACL           TAL            Tandem                 |
   29.   000000 0  0   ! |   TGAL           THL            TIL            TMF                    |
   30.   000000 0  0   ! |   TRANSFER       VIEWPOINT      WORDLINK       XLB                    |
   31.   000000 0  0   ! |   XRAY                                                                |
   32.   000000 0  0   ! |                                                                       |
   33.   000000 0  0   ! +-----------------------------------------------------------------------+
   34.   000000 0  0   ! |   HYPERchannel is a trademark of Network Systems Corporation.         |
   35.   000000 0  0   ! |                                                                       |
   36.   000000 0  0   ! |   IBM is a registered trademark of International Business Machines    |
   37.   000000 0  0   ! |   Corporation.                                                        |
   38.   000000 0  0   ! |                                                                       |
   39.   000000 0  0   ! |   Textpack4, Textpack6, IBM Displaywriter, DisplayWrite 2,            |
   40.   000000 0  0   ! |   DisplayWrite 3, Displaywriter communication software, and CICS      |
   41.   000000 0  0   ! |   are trademarks of International Business Machines Corporation.      |
   42.   000000 0  0   ! |                                                                       |
   43.   000000 0  0   ! |   INFOSAT is a trademark in which both Tandem and American            |
   44.   000000 0  0   ! |   Satellite have rights.                                              |
   45.   000000 0  0   ! |                                                                       |
```

```
  46.    000000 0  0   ! |   LATTICE is a registered trademark of Lattice, Inc.                 |
  47.    000000 0  0   ! |                                                                      |
  48.    000000 0  0   ! |   MultiMate is a trademark of Ashton-Tate, Inc.                      |
  49.    000000 0  0   ! |                                                                      |
  50.    000000 0  0   ! |   UNIX is a trademark of AT&T.                                       |
  51.    000000 0  0   ! |                                                                      |
  52.    000000 0  0   ! |   Wang OIS workstation, Wang VS workstation, Wang OIS telecommu-     |
  53.    000000 0  0   ! |   nication software, and Wang VS telecommunication software are      |
  54.    000000 0  0   ! |   trademarks of Wang, Inc.                                           |
  55.    000000 0  0   ! +----------------------------------------------------------------------+
  56.    000000 0  0   ! |   TANDEM COMPUTERS INCORPORATED -- PROPRIETARY AND CONFIDENTIAL      |
  57.    000000 0  0   ! +----------------------------------------------------------------------+
  36.    000000 0  0   ?NOLIST, source extdecs  ( close
  51.    000000 0  0   ?NOLIST, source pfprint
  53.    000000 0  0   ?NOLIST, source pgp
  55.    000000 0  0   ?NOLIST, source pscan
  57.    000000 0  0   ?NOLIST, source psiolib
  59.    000000 0  0   ?NOLIST, source preadobj
  61.    000000 0  0   ?NOLIST, source putil1   ( CRCB^Exists )
  63.    000000 0  0   ?NOLIST, source pcover
  65.    000000 0  0   ?NOLIST, source pupper( checksecurity )
  67.    000000 0  0   ?SETTOG 15                           !For FORWARDs
  68.    000000 0  0   ?NOLIST, source pbitmap
  70.    000000 0  0   ?RESETTOG 15
  71.    000000 0  0   ?LIST
  72.    000000 0  0   ?SOURCE sversion( version^bitmap )
Source file:  [1]  $OVER.T9618C00.SVERSION  29APR87 - 09:45:32
  12.    000000 0  0   ?SECTION VERSION^BITMAP
  13.    000000 0  0   PROC T9618C00^15JUL87^BITMAP^29APR7;
  14.    000000 1  0   BEGIN END;
  73.    000000 0  0   ?SOURCE sbitmap
Source file:  [1]  $OVER.T9618C00.SBITMAP  29APR87 - 13:16:20
   2.    000000 0  0   ! This will perform a boolean operation (AND, OR, or XOR) on two bitmaps.
   3.    000000 0  0   proc Boolean^Bitmaps( ProgramOnly, LibraryOnly, G16, Oper );
   4.    000000 1  0   int         ProgramOnly;              !flag - TRUE if only Program data s/b ORed
   5.    000000 1  0   int         LibraryOnly;              !flag - TRUE if only Library data s/b ORed
   6.    000000 1  0   int         G16;                      !flag - TRUE if Program has >16 segments
   7.    000000 1  0   int         Oper;                     !Operation: 0-AND, 1-OR, 2-XOR
   8.    000000 1  0   begin
   9.    000000 1  1   string .ext A( CoverDiscImageTemplate ) := %2000000d;
  10.    000000 1  1   string .ext B( CoverDiscImageTemplate )
  11.    000000 1  1            := @A + CoverDiscHeaderSize + 2d * SizeOfCoverBitmapSegment;
  12.    000000 1  1
  13.    000000 1  1   int    .ext BitmapA;                  !16 * [0:4095]
  14.    000000 1  1   int    .ext BitmapB;                  !16 * [0:4095]
  15.    000000 1  1   string .ext PinSpace( CoverPinDataCodespaceTemplate );
  16.    000000 1  1
  17.    000000 1  1   subproc NowAND;
  18.    000000 2  1   begin
  19.    000000 2  2   int space;
  20.    000000 2  2   use i, BitSizeM1;
  21.    000001 2  2   for space := 0 to PinSpace.SpaceCount - 1 do
  22.    000003 2  2      begin
  23.    000003 2  3      BitSizeM1 := $int( ($udbl(PinSpace.SpaceSize[space]) + 15d) '>>' 4) '-' 1;
  24.    000016 2  3      for i := 0 to BitSizeM1 do
  25.    000021 2  3         BitmapB[ i ] := BitmapB[ i ] LAND BitmapA[ i ];
  26.    000031 2  3      @BitmapA := @BitmapA + SizeOfCoverSpaceBitmap; !Up to next space's bitmap
```

```
 27.  000036 2  3     @BitmapB := @BitmapB + SizeOfCoverSpaceBitmap; !Up to next space's bitmap
 28.  000043 2  3     end;
 29.  000053 2  2  drop i, BitSizeM1;
 30.  000053 2  2  end; !subproc NowAND

SPACE                      Variable      INT             Direct          S-000
 32.  000055 1  1  subproc NowOR;
 33.  000055 2  1  begin
 34.  000055 2  2  int space;
 35.  000055 2  2  use i, BitSizeM1;
 36.  000056 2  2  for space := 0 to PinSpace.SpaceCount - 1 do
 37.  000060 2  2     begin
 38.  000060 2  3     BitSizeM1 := $int( ($udbl(PinSpace.SpaceSize[space]) + 15d) '>>' 4) '-' 1;
 39.  000073 2  3     for i := 0 to BitSizeM1 do
 40.  000076 2  3        BitmapB[ i ] := BitmapB[ i ] LOR BitmapA[ i ];
 41.  000106 2  3     @BitmapA := @BitmapA + SizeOfCoverSpaceBitmap; !Up to next space's bitmap
 42.  000113 2  3     @BitmapB := @BitmapB + SizeOfCoverSpaceBitmap; !Up to next space's bitmap
 43.  000120 2  3     end;
 44.  000130 2  2  drop i, BitSizeM1;
 45.  000130 2  2  end; !subproc NowOR

SPACE                      Variable      INT             Direct          S-000
 47.  000132 1  1  subproc NowXOR;
 48.  000132 2  1  begin
 49.  000132 2  2  int space;
 50.  000132 2  2  use i, BitSizeM1;
 51.  000133 2  2  for space := 0 to PinSpace.SpaceCount - 1 do
 52.  000135 2  2     begin
 53.  000135 2  3     BitSizeM1 := $int( ($udbl(PinSpace.SpaceSize[space]) + 15d) '>>' 4) '-' 1;
 54.  000150 2  3     for i := 0 to BitSizeM1 do
 55.  000153 2  3        BitmapB[ i ] := BitmapB[ i ] XOR BitmapA[ i ];
 56.  000163 2  3     @BitmapA := @BitmapA + SizeOfCoverSpaceBitmap; !Up to next space's bitmap
 57.  000170 2  3     @BitmapB := @BitmapB + SizeOfCoverSpaceBitmap; !Up to next space's bitmap
 58.  000175 2  3     end;
 59.  000205 2  2  drop i, BitSizeM1;
 60.  000205 2  2  end; !subproc NowXOR

SPACE                      Variable      INT             Direct          S-000
 62.  000207 1  1  if A.UC.SpaceCount AND NOT LibraryOnly then
 63.  000230 1  1     begin
 64.  000230 1  2     B.UCEverBooleaned := TRUE;
 65.  000233 1  2     @BitmapA := @A + CoverDiscHeaderSize;
 66.  000240 1  2     @BitmapB := @B + CoverDiscHeaderSize;
 67.  000245 1  2     @PinSpace := @A.UC;
 68.  000252 1  2     case Oper of
 69.  000254 1  2        begin
 70.  000254 1  3        call NowAND;
 71.  000257 1 CE1       call NowOR;
 72.  000262 1 CE2       call NowXOR;
 73.  000264 1 CE3       end;
 74.  000270 1  2     end;
 75.  000270 1  1  if A.UI.SpaceCount AND (G16 OR NOT ProgramOnly) then
 76.  000277 1  1     begin
 77.  000277 1  2     B.UIEverBooleaned := TRUE;
 78.  000302 1  2     @BitmapA := @A + CoverDiscHeaderSize + SizeOfCoverBitmapSegment;
 79.  000312 1  2     @BitmapB := @B + CoverDiscHeaderSize + SizeOfCoverBitmapSegment;
```

```
000322 1  2       @PinSpace := @A.UL;
000327 1  2       case Oper of
000331 1  2          begin
000331 1  3          call NowAND;
000333 1 CE1         call NowOR;
000335 1 CE2         call NowXOR;
000340 1 CE3         end;
000344 1  2       end;
000344 1  1
000344 1  1    end; !proc Boolean^Bitmaps

A                           Variable,232   STRUCT-S      EXT Pointer    L+001
B                           Variable,232   STRUCT-S      EXT Pointer    L+003
BITMAPA                     Variable       INT           EXT Pointer    L+005
BITMAPB                     Variable       INT           EXT Pointer    L+007
G16                         Variable       INT           Direct         L-004
LIBRARYONLY                 Variable       INT           Direct         L-005
NOWAND                      Subproc                      %000000
NOWOR                       Subproc                      %000055
NOWXOR                      Subproc                      %000132
OPER                        Variable       INT           Direct         L-003
PINSPACE                    Variable,110   STRUCT-S      EXT Pointer    L+011
PROGRAMONLY                 Variable       INT           Direct         L-006

000000 0  0    PROC !prv! Boolean^Command( Oper );
000000 1  0    int          Oper;                   !Operation: 0-AND, 1-OR, 2-XOR
000000 1  0    begin
000000 1  1    string       Params = 'P' := ["FILE PIN INTO PROGRAMONLV LIBRARYONLY",0];
000023 1  1    string .ext crcbA( CoverDiscImageTemplate ) := %2000000d;
000023 1  1    string .ext crcbB( CoverDiscImageTemplate )
000023 1  1              := @crcbA + CoverDiscHeaderSize + 2d * SizeOfCoverBitmapSegment;
000023 1  1    int          UsePin := FALSE;        !flag - use memory image
000023 1  1    int          UseFile := FALSE;       !flag - use disc image
000023 1  1    int          Into := FALSE;          !flag - INTO file specified
000023 1  1    int          ProgramOnly := FALSE;   !flag
000023 1  1    int          LibraryOnly := FALSE;   !flag
000023 1  1    int          G16A := FALSE;          !flag - FROM file is >16 seg program
000023 1  1    int          G16B := FALSE;          !flag - INTO file is >16 seg program
000023 1  1    int          pin := -1;
000023 1  1    int          error;
000023 1  1    int          FnameA[0:11];
000023 1  1    int          FnameB[0:11];
000023 1  1    int          TempNameA[0:11];
000023 1  1    int          TempNameB[0:11];
000023 1  1
000023 1  1    while nextchar(0) do
000052 1  1       case scanidt( charadr, @Params ) of
000064 1  1          begin
000064 1  2          !FILE! begin
000064 1 CE0            if UseFile then call debug^err; !Specified twice
000072 1  3             if NOT scanfname( charadr, FnameA, defaults.word ) then
000102 1  3                call finger^err( @NoFile );
000112 1  3                UseFile := TRUE;        !Read CRCB from the file
000114 1  3                if UsePin then call debug^err( @BothPandF );
000126 1  3             end;
000131 1 CE1         !PIN ! begin
000131 1  3             if UsePin then call debug^err; !Specified twice
```

```
000137 1  3            if scanint( charadr, pin, , 0, 255 ) then
000151 1  3               call finger^err(,@NoPin );
000161 1  3               UsePin := TRUE;         !Read CRCB from memory
000163 1  3               if UseFile then call debug^err( @BothPandF );
000175 1  3            end;
000200 1 CE2        !INTO! begin
000200 1  3            if Into then call debug^err; !Specified twice
000206 1  3            if NOT scanfname( charadr, FnameB, defaults.word ) then
000216 1  3               call finger^err( @NoFile );
000226 1  3            Into := TRUE;
000230 1  3            end;
000232 1 CE3     !PROGRAMONLY! begin
000232 1  3            if ProgramOnly OR LibraryOnly then call debug^err;
000242 1  3            ProgramOnly := TRUE;
000244 1  3            end;
000245 1 CE4     !LIBRARYONLY! begin
000245 1  3            if ProgramOnly OR LibraryOnly then call debug^err;
000260 1  3            LibraryOnly := TRUE;
000262 1  3            end;
000263 1 CE5        otherwise call debug^err;
000267 1  2         end;
000307 1  1   eol;
000320 1  1
000320 1  1   if NOT UsePin and NOT UseFile then call debug^err( @Neither );
000334 1  1   if NOT Into then call debug^err( @MissingINTO );
000346 1  1
000346 1  1   ! Read 1st file into extended memory
000346 1  1   if UsePin then
000350 1  1      begin                                        !From memory
000350 1  2      if NOT CheckSecurity( pin ) then return;
000357 1  2
000357 1  2      if NOT MoveBitmapToMem( pin ) then
000363 1  2         begin call fprint( @NoMeasRun, pin ); return; end;
000400 1  2      end
000400 1  1   else
000401 1  1      call ReadBitmapFile( FnameA, crcbA ); !From a file
000410 1  1
000410 1  1   call fileinfo( ,error, FnameB );   !See whether FnameB exists
000422 1  1   if error = FENOTFOUND then
000425 1  1      begin                           !We'll have to create the INTO file
000425 1  2      if WriteBitmapToFile( FnameB, crcbA ) then call fprint( @OK );
000444 1  2      return;
000446 1  2      end
000446 1  1   else
000447 1  1      call ReadBitmapFile( FnameB, crcbB );
000456 1  1
000456 1  1   ! Test for reasonableness
000456 1  1   if LibraryOnly then
000460 1  1      begin
000460 1  2      if (NOT crcbA.UL.SpaceCount) OR (NOT crcbB.UL.SpaceCount) then
000466 1  2         call debug^err( @NothingToMerge );
000476 1  2      end
000476 1  1   else
000500 1  1      begin
000500 1  2      if crcbA.UL.SpaceCount <> crcbB.UL.SpaceCount then
000506 1  2         call debug^err( @DifferentObjectSizes );
000516 1  2      if crcbA.UC.SpaceCount then
```

```
000521 1  2          begin
000521 1  3          TempNameA ':=' crcbA.UC.Name for 12 words; !Save for compare and print
000532 1  3          TempNameB ':=' crcbB.UC.Name for 12 words;
000543 1  3          if fnamecompare( TempNameA, TempNameB ) then
000550 1  3             begin
000550 1  4             call fprint( @DifferentProgs, @TempNameA, @TempNameB );
000564 1  4             return;
000567 1  4             end;
000567 1  3          if crcbA.UC.Timestamp <> crcbB.UC.Timestamp for 3 words then
000602 1  3             begin
000602 1  4             call fprint( @DifferentTimestamps, @TempNameA, @TempNameB );
000616 1  4             return;
000620 1  4             end;
000620 1  3          end;
000620 1  2       end;
000620 1  1    if ProgramOnly then
000622 1  1       begin
000622 1  2       if (NOT crcbA.UC.SpaceCount) OR (NOT crcbB.UC.SpaceCount) then
000630 1  2          call debug^err( @NothingToMerge );
000640 1  2       end
000640 1  1    else
000642 1  1       begin
000642 1  2       if crcbA.UC.SpaceCount <> crcbB.UC.SpaceCount then
000650 1  2          call debug^err( @DifferentObjectSizes );
000660 1  2       if crcbA.UL.SpaceCount then
000663 1  2          begin
000663 1  3          TempNameA ':=' crcbA.UL.Name for 12 words; !Save for compare and print
000674 1  3          TempNameB ':=' crcbB.UL.Name for 12 words;
000705 1  3          if fnamecompare( TempNameA, TempNameB ) then
000712 1  3             begin
000712 1  4             call fprint( @DifferentProgs, @TempNameA, @TempNameB );
000726 1  4             return;
000731 1  4             end;
000731 1  3          if crcbA.UL.Timestamp <> crcbB.UL.Timestamp for 3 words then
000744 1  3             begin
000744 1  4             call fprint( @DifferentTimestamps, @TempNameA, @TempNameB );
000760 1  4             return;
000762 1  4             end;
000762 1  3          end;
000762 1  2       end;
000762 1  1
000762 1  1    if crcbA.UC.Name = crcbA.UL.Name for 12 words then G16A := TRUE;
000777 1  1    if crcbB.UC.Name = crcbB.UL.Name for 12 words then G16B := TRUE;
001014 1  1    if G16A <> G16B then call debug^err( @DifferentObjectSizes );
001030 1  1
001030 1  1    if (G16A OR G16B) AND LibraryOnly then call debug^err( @NoLibWithG16 );
001046 1  1    if LibraryOnly AND (NOT crcbA.UL.SpaceCount OR NOT crcbB.UL.SpaceCount) then
001056 1  1       call debug^err( @NoLib );
001066 1  1    if ProgramOnly AND (NOT crcbA.UC.SpaceCount OR NOT crcbB.UC.SpaceCount) then
001076 1  1       call debug^err( @NoProg );
001106 1  1
001106 1  1    ! Looks reasonable, so let's do it!
001106 1  1    call Boolean^Bitmaps( ProgramOnly, LibraryOnly, G16A, Oper );
001114 1  1
001114 1  1    if WriteBitmapToFile( FnameB, crcbB ) then call fprint( @OK );
001133 1  1
001133 1  1    end; !proc Boolean^Command
```

```
CRCBA                          Variable,232   STRUCT-S    EXT Pointer   L+001
CRCBB                          Variable,232   STRUCT-S    EXT Pointer   L+003
ERROR                          Variable       INT         Direct        L+015
FNAMEA                         Variable       INT         Direct        L+016
FNAMEB                         Variable       INT         Direct        L+032
G16A                           Variable       INT         Direct        L+012
G16B                           Variable       INT         Direct        L+013
INTO                           Variable       INT         Direct        L+007
LIBRARYONLY                    Variable       INT         Direct        L+011
OPER                           Variable       INT         Direct        L-003
PARAMS                         Variable       STRING      Direct        P+000
PIN                            Variable       INT         Direct        L+014
PROGRAMONLY                    Variable       INT         Direct        L+010
TEMPNAMEA                      Variable       INT         Direct        L+046
TEMPNAMEB                      Variable       INT         Direct        L+062
USEFILE                        Variable       INT         Direct        L+006
USEPIN                         Variable       INT         Direct        L+005
000000 0 0  proc ComputeBitmapSizes( PinData,
000000 1 0                           ExtentSize,
000000 1 0                           FileSize,
000000 1 0                           SizeOfFirstSegment );
000000 1 0  string .ext PinData( CoverDiscImageTemplate);
000000 1 0  int         .ExtentSize;             !Number of pages of file.
000000 1 0  int(32)     .FileSize;               !Number of bytes in File.
000000 1 0  int(32)     .SizeOfFirstSegment;
000000 1 0  begin
000000 1 1  int(32)      SizeOfSecondSegment;
000000 1 1  int          i;
000000 1 1
000000 1 1  i := PinData.UC.SpaceCount;
000007 1 1  if i then
000011 1 1     SizeOfFirstSegment := SizeOfCoverSpaceBitmap * $udbl( i )
000011 1 1  else
000020 1 1     SizeOfFirstSegment := 0d;
000022 1 1
000022 1 1  i := PinData.UL.SpaceCount;
000030 1 1  if i then
000032 1 1     SizeOfSecondSegment := SizeOfCoverSpaceBitmap * $udbl( i )
000032 1 1  else
000041 1 1     SizeOfSecondSegment := 0d;
000043 1 1
000043 1 1  FileSize := CoverDiscHeaderSize + SizeOfFirstSegment + SizeOfSecondSegment;
000052 1 1
000052 1 1  ExtentSize := FileSize '/' 2048;   !It'll all go on one extent.
000057 1 1
000057 1 1  end; !proc ComputeBitmapSizes

EXTENTSIZE                     Variable       INT         Indirect      L-005
FILESIZE                       Variable       INT (32)    Indirect      L-004
I                              Variable       INT         Direct        L+003
PINDATA                        Variable,232   STRUCT-S    EXT Pointer   L-007
SIZEOFFIRSTSEGMENT             Variable       INT (32)    Indirect      L-003
SIZEOFSECONDSEGMENT            Variable       INT (32)    Direct        L+001
```

```
000000 0  0   ! Returns TRUE if successful
000000 0  0   !         FALSE if invalid pin or no measurement on pin.
000000 0  0   int !prv! proc MoveBitmapToMem( pin ) callable;
000000 1  0   int          pin;
000000 1  0   begin
000000 1  1   int     .sg bpth( bpttablehead ) := bpbase '-' wlen( bpth );
000000 1  1   string .ext crcb( CoverRoutineControlBlock );
000000 1  1   string .ext DiscImage( CoverDiscImageTemplate ) := %2000000d;
000000 1  1   string .ext PinData( CoverPinDataTemplate );
000000 1  1   string .ext BitmapTo;              !Pointer for moving
000000 1  1   int          error;
000000 1  1
000000 1  1
000000 1  1   subproc MoveBitmap( PinSpace );
000000 2  1   string .ext PinSpace( CoverPinDataCodespaceTemplate );
000000 2  1   begin
000000 2  2   string .ext BitmapFrom;
000000 2  2   int(32)      BC;
000000 2  2   int          i;
000000 2  2
000000 2  2   if NOT PinSpace.SpaceCount then return; !Nothing to do
000011 2  2
000011 2  2   @BitmapFrom := @PinSpace.BitmapPtr;
000017 2  2   for i := 0 to PinSpace.SpaceCount - 1 do
000021 2  2      begin
000021 2  3      BC := ($udbl(PinSpace.SpaceSize[ i ]) + 7d) '>>' 3;
000036 2  3      BitmapTo ':=' BitmapFrom for $int(BC) bytes;
000043 2  3      @BitmapFrom := @BitmapFrom + SizeOfCoverSpaceBitmap;
000050 2  3      @BitmapTo := @BitmapTo + SizeOfCoverSpaceBitmap;
000055 2  3      end;
000070 2  2
000070 2  2   end; !subproc MoveBitmap

BC                          Variable       INT (32)      Direct         S-002
BITMAPFROM                  Variable       STRING        EXT Pointer    S-004
I                           Variable       INT           Direct         S-000
PINSPACE                    Variable,110   STRUCT-S      EXT Pointer    S-007

000072 1  1
000072 1  1
000072 1  1   if pin '>=' pcbtable.hdne then return FALSE; !Pin does not exist
000112 1  1
000112 1  1   call setstop( 2 );                 !Make us unstopable
000116 1  1
000116 1  1   @crcb := CRCB^Exists;              !May do PSEM
000120 1  1
000120 1  1   if @crcb = 0d then
000124 1  1      begin
000124 1  2      call setstop( 0 );
000130 1  2      return FALSE;                   !COVER not running, so no data available
000132 1  2      end;
000132 1  1
000132 1  1   @PinData := ControlByPinAddress( pin );
000144 1  1   if PinData.state = CoverMeasureReset then
000150 1  1      begin
000150 1  2      vsem( bpth.CoverCrcbSem );
000157 1  2      call setstop( 0 );
```

```
000163 1  2     return FALSE;                       !No data available from this pin.
000165 1  2     end;
000165 1  1
000165 1  1  ! Now move all of the data from memory to disc image.  It's OK to move all
000165 1  1  ! this data even while a measurement is running, as long as the semaphore is
000165 1  1  ! held, so no addresses will be released and no pointers to them will change.
000165 1  1  DiscImage.Verifier := CoverVerifier;
000173 1  1  DiscImage.Version := CoverDiscLatestVersion;
000176 1  1  DiscImage.UCEverBooleaned := FALSE;
000201 1  1  DiscImage.ULEverBooleaned := FALSE;
000204 1  1  DiscImage.UC ':=' PinData.UC for $len( DiscImage.UC ) bytes;
000216 1  1  DiscImage.UL ':=' PinData.UL for $len( DiscImage.UL ) bytes;
000230 1  1  @BitmapTo := @DiscImage.UC.BitmapPtr := @DiscImage + CoverDiscHeaderSize;
000243 1  1  call MoveBitmap( PinData.UC );      !Move any UC bitmap data
000251 1  1  @DiscImage.UL.BitmapPtr := @BitmapTo;
000257 1  1  call MoveBitmap( PinData.UL );      !Move any UL bitmap data
000265 1  1
000265 1  1  PinData.EverSaved := TRUE;
000270 1  1
000270 1  1  vsem( bpth.CoverCrcbSem );
000277 1  1  call setstop( 0 );
000303 1  1
000303 1  1  return TRUE;                        !All's well
000306 1  1
000306 1  1  end; !proc MoveBitmapToMem

BITMAPTO                     Variable        STRING          EXT Pointer    L+010
BPTH                         Variable,114    STRUCT-I        SG Pointer     L+001
CRCB                         Variable,14020  STRUCT-S        EXT Pointer    L+002
DISCIMAGE                    Variable,232    STRUCT-S        EXT Pointer    L+004
ERROR                        Variable        INT             Direct         L+012
MOVEBITMAP                   Subproc                         %000000
PIN                          Variable        INT             Direct         L-003
PINDATA                      Variable,244    STRUCT-S        EXT Pointer    L+006

000000 0  0  int !prv! proc PositReadx( fn, posit, input, length );
000000 1  0  int          fn;
000000 1  0  int(32)      posit;
000000 1  0  string .ext  input;
000000 1  0  int          length;
000000 1  0  begin
000000 1  1  int          error;
000000 1  1
000000 1  1  call position( fn, posit );
000005 1  1  if = then
000006 1  1     begin
000006 1  2     length := ((length '+' 2047) '>>' 11) '<<' 11; !Ensure 2KB multiple.
000014 1  2     call readx( fn, input, length );
000025 1  2     if = then return FEOK;           !All's well
000030 1  2     end;
000030 1  1
000030 1  1  ! Some error occured.
000030 1  1  call fileinfo( fn, error );
000041 1  1  call close( fn );
000046 1  1  return error;
000050 1  1
000050 1  1  end; !proc PositReadx
```

```
ERROR                    Variable        INT             Direct          L+001
FN                       Variable        INT             Direct          L-010
INPUT                    Variable        STRING          EXT Pointer     L-005
LENGTH                   Variable        INT             Direct          L-003
POSIT                    Variable        INT (32)        Direct          L-007

000000 0  0   ! Reads a set of measurement data from a file into memory.  It
000000 0  0   ! performs a few checks to make sure we're looking at valid
000000 0  0   ! measurement data.
000000 0  0   ! *** We assume that "Where" is supplied and it's on a page boundary. ***
000000 0  0   ! Return via GOTO^MAINLOOP if error.
000000 0  0   proc !prv! ReadBitmapFile( FileName, Where, HeaderOnly ) EXTENSIBLE;
000000 1  0   int         .FileName;
000000 1  0   string .ext Where( CoverDiscImageTemplate );
000000 1  0   int          HeaderOnly;        '     !TRUE if only bitmap header is to be read.
000000 1  0   begin
000000 1  1   int(32)      eof;
000000 1  1   int          filecode;
000000 1  1   int          filetype;
000000 1  1   int          error;
000000 1  1   int          OldSegid;
000000 1  1   int          FileNum;
000000 1  1   int          ExtentSize;
000000 1  1   int(32)      FileSize;
000000 1  1   int(32)      SizeOfFirstSegment;
000000 1  1
000000 1  1   int subproc MoveBitmap( PinSpace, WhereFrom );
000000 2  1   string .ext PinSpace( CoverPinDataCodespaceTemplate );
000000 2  1   int(32)      WhereFrom;              !RBA in file
000000 2  1   begin
000000 2  2   string .ext BitmapTo;
000000 2  2   int(32)      BitmapFrom;
000000 2  2   int          BC;
000000 2  2   int          i;
000000 2  2
000000 2  2   if NOT PinSpace.SpaceCount then return FEOK; !Nothing to do
000012 2  2
000012 2  2   for i := 0 to PinSpace.SpaceCount - 1 do
000014 2  2      begin
000014 2  3      BitmapFrom := WhereFrom + $udbl(i) * SizeOfCoverSpaceBitmap;
000024 2  3      @BitmapTo := BitmapFrom + @Where;
000030 2  3      BC := $int( ($udbl(PinSpace.SpaceSize[ i ]) + 7d) '>>' 3 );
000046 2  3      ! Each bitmap may be up to 8KB.
000046 2  3      if (error := PositReadx( FileNum, BitmapFrom, BitmapTo, BC )) then
000060 2  3         return error;
000063 2  3      end;
000076 2  2
000076 2  2   return FEOK;
000101 2  2
000101 2  2   end; !subproc MoveBitmap

BC                       Variable        INT             Direct          S-001
BITMAPFROM               Variable        INT (32)        Direct          S-003
BITMAPTO                 Variable        STRING          EXT Pointer     S-005
I                        Variable        INT             Direct          S-000
PINSPACE                 Variable,110    STRUCT-S        EXT Pointer     S-012
WHEREFROM                Variable        INT (32)        Direct          S-010
```

```
000101 1  1   if NOT $param( FileName ) OR
000104 1  1      NOT $param( Where ) then GOTO^MAINLOOP; !ERROR in calling
000131 1  1
000131 1  1   if CantTouch( Where, CoverDiscHeaderSize ) then GOTO^MAINLOOP;
000156 1  1
000156 1  1   ! Verify that this is really measurement data.
000156 1  1   call fileinfo( ,error, FileName,... eof,.. filecode .........., filetype );
000201 1  1   if error then
000203 1  1      begin
000203 1  2      call fprint(@ErrorOnF,error,@Filename);
000217 1  2      GOTO^MAINLOOP;
000236 1  2      end;
000236 1  1   if eof <= $udbl($len(Where)) OR
000236 1  1      filecode <> CoverBitmapFilecode OR
000236 1  1      filetype <> 0 then
000253 1  1      begin
000253 1  2      call fprint( @NotBitmap, @FileName );
000266 1  2      GOTO^MAINLOOP;
000305 1  2      end;
000305 1  1
000305 1  1   call open( FileName, FileNum, %22060 !unstruct,read,protected!, 0 );
000317 1  1   if <> then
000320 1  1      begin
000320 1  2      call fileinfo( -1, error );
000331 1  2      call fprint(@ErrorOnF,error,@Filename);
000345 1  2      GOTO^MAINLOOP;
000364 1  2      end;
000364 1  1
000364 1  1   ! Read bitmap data header.
000364 1  1   call readx( FileNum, Where, $len(Where) );
000375 1  1   if <> then
000376 1  1      begin
000376 1  2      call fileinfo( FileNum, error );
000413 1  2      call close( FileNum );
000420 1  2      call fprint(@ErrorOnF,error,@Filename);
000434 1  2      GOTO^MAINLOOP;
000453 1  2      end;
000453 1  1
000453 1  1   ! Do a few more checks to make sure it's COVER data.
000453 1  1   if Where.verifier <> CoverVerifier OR
000453 1  1      Where.version <> CoverDiscLatestVersion then
000472 1  1      begin
000472 1  2      call close( FileNum );
000477 1  2      call fprint( @NotBitmap, @FileName );
000512 1  2      GOTO^MAINLOOP;
000531 1  2      end;
000531 1  1
000531 1  1   ! Check to see whether only the header is to be read.
000531 1  1   if $param( HeaderOnly ) AND HeaderOnly then
000536 1  1      begin
000536 1  2      call close( FileNum );
000543 1  2      return;
000546 1  2      end;
000546 1  1
000546 1  1   if CantTouch( Where, CoverDiscHeaderSize + 2d * SizeOfCoverBitmapSegment ) then
000554 1  1      begin
000554 1  2      call close( FileNum );
```

```
000561 1  2      GOTO^MAINLOOP;
000600 1  2      end;
000600 1  1
000600 1  1   call setmode( FileNum, 141, 1);    !Allow large transfers
000607 1  1   if <> then
000610 1  1      begin
000610 1  2      call fileinfo( FileNum, error );
000621 1  2      call fprint(@ErrorOnF,error,@Filename);
000635 1  2      GOTO^MAINLOOP;
000654 1  2      end;
000654 1  1
000654 1  1   call ComputeBitmapSizes( Where, ExtentSize, FileSize, SizeOfFirstSegment );
000662 1  1
000662 1  1   ! Now read bitmap data.
000662 1  1   if (error := MoveBitmap( Where.UC, CoverDiscHeaderSize )) then
000674 1  1      begin
000674 1  2      call fprint(@ErrorOnF,error,@Filename);
000710 1  2      GOTO^MAINLOOP;
000727 1  2      end;
000727 1  1   if (error := MoveBitmap( Where.UL,
000727 1  1                           CoverDiscHeaderSize + SizeOfFirstSegment )) then
000743 1  1      begin
000743 1  2      call fprint(@ErrorOnF,error,@Filename);
000757 1  2      GOTO^MAINLOOP;
000776 1  2      end;
000776 1  1
000776 1  1   call close( FileNum );
001003 1  1
001003 1  1   END; !proc ReadBitmapFile

EOF                          Variable       INT (32)     Direct       L+001
ERROR                        Variable       INT          Direct       L+005
EXTENTSIZE                   Variable       INT          Direct       L+010
FILECODE                     Variable       INT          Direct       L+003
FILENAME                     Variable       INT          Indirect     L-010
FILENUM                      Variable       INT          Direct       L+007
FILESIZE                     Variable       INT (32)     Direct       L+011
FILETYPE                     Variable       INT          Direct       L+004
HEADERONLY                   Variable       INT          Direct       L-005
MOVEBITMAP                   Subproc        INT          %000000
OLDSEGID                     Variable       INT          Direct       L+006
SIZEOFFIRSTSEGMENT           Variable       INT (32)     Direct       L+013
WHERE                        Variable,232   STRUCT-S     EXT Pointer  L-007

000000 0  0   ! Dumps measurement data to a file.
000000 0  0   proc !prv! Save^Command;
000000 1  0   BEGIN
000000 1  1   string       Params = 'P' := ["PIN TO",0];
000004 1  1   string .ext IO := %2000000d;
000004 1  1   int          pin := -1;
000004 1  1   int          filename[0:11];
000004 1  1   int          FilenameSupplied := FALSE;
000004 1  1   int          error;
000004 1  1
000004 1  1   while nextchar(0) do
000021 1  1      case scanidt( charadr, @Params ) of
000033 1  1      begin
```

```
000033 1  2       !PIN! begin
000033 1 CE0            if pin <> -1 then call debug^err; !Specified twice
000042 1  3             if scanint( charadr, pin, , 0, 255 ) then
000054 1  3                call finger^err( @NoPin );
000064 1  3             end;
000066 1 CE1      !TO ! begin
000066 1  3             if FilenameSupplied then call debug^err; !Specified twice
000074 1  3             if scanfname ( charadr, filename, defaults.word ) then
000104 1  3                FilenameSupplied := TRUE
000104 1  3             else call finger^err( @NoFile );
000117 1  3             end;
000121 1 CE2      OTHERWISE call debug^err;
000125 1  2       end;
000141 1  1    eol;
000152 1  1
000152 1  1    if pin = -1 then call debug^err( @NoPin );
000165 1  1    if FilenameSupplied = FALSE then call debug^err( @NoFile );
000200 1  1    call fileinfo( ,error ,filename ); !See whether file already exists
000212 1  1    if = then begin call fprint( @ErrorOnF, 10, @filename ); return; end;
000233 1  1
000233 1  1    if NOT CheckSecurity( pin ) then return;
000240 1  1
000240 1  1    if NOT MoveBitmapToMem( pin ) then
000244 1  1       begin call fprint( @NoMeasRun, pin ); return; end;
000261 1  1
000261 1  1    if WriteBitmapToFile( filename, IO ) then call fprint( @OK );
000300 1  1
000300 1  1    END; !proc Save^Command

ERROR                        Variable     INT        Direct        L+021
FILENAME                     Variable     INT        Direct        L+004
FILENAMESUPPLIED             Variable     INT        Direct        L+020
IO                           Variable     STRING     EXT Pointer   L+001
PARAMS                       Variable     STRING     Direct        P+000
PIN                          Variable     INT        Direct        L+003

000000 0  0    ! Return TRUE if the bit in the CRCB's bitmap at the given spaceid and word
000000 0  0    ! offset is ON.
000000 0  0    ! It is the caller's responsibility to ensure that the correct version of a
000000 0  0    ! COVER disc image is in the current extended (relative) segment.
000000 0  0    int !prv! proc TestForHit( SpaceID, offset );
000000 1  0    int          SpaceID;              !In ENV format
000000 1  0    int          offset;
000000 1  0    begin
000000 1  1    string .ext DiscImage( CoverDiscImageTemplate ) := %2000000d;
000000 1  1    int     .ext Bitmap;                 !16 * [0:4095]
000000 1  1
000000 1  1    if SpaceID.envls then
000007 1  1       @Bitmap := @DiscImage.UL.BitmapPtr
000007 1  1    else
000016 1  1       @Bitmap := @DiscImage.UC.BitmapPtr;
000024 1  1
000024 1  1    @Bitmap := @Bitmap
000024 1  1             + $udbl( SpaceID.envspaceid ) + SizeOfCoverSpaceBitmap;
000035 1  1
000035 1  1    return testbit( offset, Bitmap );
000051 1  1
000051 1  1    end; !proc TestForHit
```

```
BITMAP                      Variable        INT          EXT Pointer   L+003
DISCIMAGE                   Variable,232    STRUCT-S     EXT Pointer   L+001
OFFSET                      Variable        INT          Direct        L-003
SPACEID                     Variable        INT          Direct        L-004

000000 0  0   ! Prints the name(s) and binder timestamp(s) of the object file(s) named
000000 0  0   ! in a bitmap file.
000000 0  0   proc !prv! Whence^Command;
000000 1  0   begin
000000 1  1   string       Params = 'P' := ["FILE",0];
000003 1  1   string       TellProg = 'P' :=
000003 1  1                ["Program file is 'F* dated '22!",0];
000023 1  1   string       TellLib = 'P' :=
000023 1  1                ["Library File is 'F* dated '22!",0];
000043 1  1   string .ext DiscImage( CoverDiscImageTemplate ) := %2000000d;
000043 1  1   int          BitmapFile[0:11];
000043 1  1   int          error;
000043 1  1   int          filename[0:11];
000043 1  1   int          timestamp[0:2];
000043 1  1   string       ws[0:22];                !For formatting output
000043 1  1   if scanidt( charadr, @Params ) = -1 then call debug^err;
000066 1  1   if NOT scanfname( charadr, BitmapFile, defaults.word ) then
000076 1  1      call finger^err( @NoFile );
000106 1  1   eol;
000117 1  1
000117 1  1   ! Read the bitmap header into memory.
000117 1  1   call ReadBitmapFile( BitmapFile, DiscImage, TRUE ); !Read bitmap header
000126 1  1
000126 1  1   if DiscImage.UC.SpaceCount then
000131 1  1      begin
000131 1  2      timestamp ':=' DiscImage.UC.Timestamp for 3 words;
000142 1  2      call mtimestampcollapse( ws, timestamp );
000151 1  2      filename ':=' DiscImage.UC.Name for 12 words;
000162 1  2      call FprintPoof( @TellProg, @filename, @ws );
000175 1  2      end;
000175 1  1   if DiscImage.UL.SpaceCount AND      !Check for PROGRAM > 16 segments.
000175 1  1      DiscImage.UL.Name <> DiscImage.UC.Name for 12 words then
000213 1  1      begin
000213 1  2      timestamp ':=' DiscImage.UL.Timestamp for 3 words;
000224 1  2      call mtimestampcollapse( ws, timestamp );
000233 1  2      filename ':=' DiscImage.UL.Name for 12 words;
000244 1  2      call FprintPoof( @TellLib, @filename, @ws );
000261 1  2      end;
000261 1  1
000261 1  1   end; !proc Whence^Command

BITMAPFILE                  Variable        INT          Direct        L+003
DISCIMAGE                   Variable,232    STRUCT-S     EXT Pointer   L+001
ERROR                       Variable        INT          Direct        L+017
FILENAME                    Variable        INT          Direct        L+020
PARAMS                      Variable        STRING       Direct        P+000
TELLLIB                     Variable        STRING       Direct        P+000
TELLPROG                    Variable        STRING       Direct        P+000
TIMESTAMP                   Variable        INT          Direct        L+034
WS                          Variable        STRING       Direct        L+037
```

```
000000 0  0   ! Creates a bitmap file if it doesn't already exist.  Then writes all
000000 0  0   ! the bitmap data to it.  Returns with the file closed.
000000 0  0   ! Returns TRUE if successful, else prints error message and returns FALSE.
000000 0  0   int !prv! proc WriteBitmapToFile( filename, Output );
000000 1  0   int          .filename;               !Name of file to write to
000000 1  0   string .ext Output( CoverDiscImageTemplate );
000000 1  0   begin
000000 1  1   int          fn := -1;
000000 1  1   int          error;
000000 1  1   int(32)      eof;
000000 1  1   int          filecode;
000000 1  1   int          filetype;
000000 1  1   int          ExtentSize;
000000 1  1   int(32)      FileSize;
000000 1  1   int(32)      SizeOfFirstSegment;
000000 1  1   label        nope;                    !Go here when we can't write
000000 1  1
000000 1  1
000000 1  1   ! Write data to bitmap file.
000000 1  1   int subproc WriteBuffer( PositionAddr, From, length );
000000 2  1   int(32)      PositionAddr;            !File position to write to
000000 2  1   string .ext From;                     !Relative address of data to write
000000 2  1   int          length;                  !Length in bytes
000000 2  1   begin
000000 2  2
000000 2  2   call position( fn, PositionAddr );
000005 2  2   if = then
000006 2  2      begin
000006 2  3      length := ((length '+' 2047) '>>' 11) '<<' 11; !Ensure 2KB multiple.
000014 2  3      call writex( fn, From, length );
000026 2  3      if = then return FEOK;          !All's well
000031 2  3      end;
000031 2  2
000031 2  2   call fileinfo( fn, error );
000042 2  2   return error;
000044 2  2
000044 2  2   end; !subproc WriteBuffer

FROM                          Variable     STRING        EXT Pointer    S-003
LENGTH                        Variable     INT           Direct         S-001
POSITIONADDR                  Variable     INT (32)      Direct         S-005

000044 1  1   ! Assumes each bitmap starts on a 4KW boundary and that From is an
000044 1  1   ! even multiple of 4K bytes.
000044 1  1   int subproc MoveBitmap( PinSpace, PositionAddr );
000044 2  1   string .ext PinSpace( CoverPinDataCodespaceTemplate );
000044 2  1   int(32)      PositionAddr;            !RBA in file
000044 2  1   begin
000044 2  2   string .ext BitmapFrom;
000044 2  2   int(32)      BitmapTo;                !RBA in file
000044 2  2   int          BC;
000044 2  2   int          i;
000044 2  2
000044 2  2   if NOT PinSpace.SpaceCount then return FEOK; !Nothing to do
000056 2  2
000056 2  2   for i := 0 to PinSpace.SpaceCount - 1 do
000060 2  2      begin
```

```
000060 2  3      @BitmapFrom := PositionAddr + $udbl(i) * SizeOfCoverSpaceBitmap + @Output;
000072 2  3      BitmapTo := PositionAddr + $udbl(i) * SizeOfCoverSpaceBitmap;
000102 2  3      BC := $int( ($udbl(PinSpace.SpaceSize[ i ]) + 7d) '>>' 3 );
000120 2  3      ! Each bitmap may be up to 8KB.
000120 2  3      if (error := WriteBuffer( BitmapTo, BitmapFrom, BC )) then return error;
000133 2  3      end;
000146 2  2
000146 2  2   return FEOK;
000151 2  2
000151 2  2   end; !subproc MoveBitmap

BC                     Variable        INT            Direct         S-001
BITMAPFROM             Variable        STRING         EXT Pointer    S-005
BITMAPTO               Variable        INT (32)       Direct         S-003
I                      Variable        INT            Direct         S-000
PINSPACE               Variable,110    STRUCT-S       EXT Pointer    S-012
POSITICNADDR           Variable        INT (32)       Direct         S-010

000151 1  1   call ComputeBitmapSizes( Output, ExtentSize, FileSize,
000154 1  1                            SizeOfFirstSegment );
000162 1  1
000162 1  1   call create( filename, ExtentSize, CoverBitmapFilecode );
000174 1  1   if <> then
000175 1  1      begin
000175 1  2      call fileinfo( -1, error );
000206 1  2      if error <> FEDUP then goto nope;
000212 1  2      ! The file already exists; is it a bitmap file?
000212 1  2      call fileinfo( ,error, filename,,,,eof,,,filecode,,,,,,,,,,,filetype );
000235 1  2      if error then goto nope;
000240 1  2      if eof < FileSize OR
000240 1  2         filecode <> CoverBitmapFilecode OR
000240 1  2         filetype <> 0 then
000254 1  2         begin
000254 1  3         error := FEDUP;
000256 1  3         goto nope;                 !Not a bitmap file, so return FEDUP.
000257 1  3         end;
000257 1  2      end;
000257 1  1
000257 1  1   call open( filename, fn, %24020 !unstruc,write,exclusive!, 0 );
000271 1  1   if <> then begin call fileinfo( -1, error ); goto nope; end;
000304 1  1
000304 1  1   ! Write header
000304 1  1   call writex( fn, Output, $len(Output) );
000315 1  1   if <> then
000316 1  1      begin
000316 1  2      call fileinfo( fn, error );
000327 1  2      goto nope;
000330 1  2      end;
000330 1  1
000330 1  1   call setmode( fn, 141, 1);          !Allow large transfers
000337 1  1   if <> then begin call fileinfo( fn, error ); goto nope; end;
000352 1  1   ! For extra speed, put EOF at end.
000352 1  1   call position( fn, FileSize );
000356 1  1   if <> then begin call fileinfo( fn, error ); goto nope; end;
000371 1  1   call control( fn, 2 );              !Write EOF way out there.
000400 1  1   if <> then begin call fileinfo( fn, error ); goto nope; end;
000415 1  1
000415 1  1   ! Write OC bitmap data
```

```
000415 1   1    if (error := MoveBitmap( Output.UC, CoverDiscHeaderSize )) then
000427 1   1       goto nope;
000431 1   1    ! Write UL bitmap data
000431 1   1    if (error := MoveBitmap( Output.UL,
000431 1   1                             CoverDiscHeaderSize + SizeOfFirstSegment )) then
000445 1   1       goto nope;
000446 1   1
000446 1   1    call close( fn );
000453 1   1    return TRUE;                        !All's well
000455 1   1
000455 1   1    nope:
000455 1   1    if fn <> -1 then call close( fn );
000465 1   1    call fprint( @ErrorOnF, error, @filename );
000501 1   1    return FALSE;                       !Bitmap didn't get written
000504 1   1
000504 1   1    end; !proc WriteBitmapToFile

EOF                        Variable        INT (32)     Direct        L+003
ERROR                      Variable        INT          Direct        L+002
EXTENTSIZE                 Variable        INT          Direct        L+007
FILECODE                   Variable        INT          Direct        L+005
FILENAME                   Variable        INT          Indirect      L-005
FILESIZE                   Variable        INT (32)     Direct        L+010
FILETYPE                   Variable        INT          Direct        L+006
FN                         Variable        INT          Direct        L+001
MOVEBITMAP                 Subproc         INT          %000044
NOPE                       Label                        %000455
OUTPUT                     Variable,232    STRUCT-S     EXT Pointer   L-004
SIZEOFFIRSTSEGMENT         Variable        INT (32)     Direct        L+012
WRITEBUFFER                Subproc         INT          %000000
BINDER - OBJECT FILE BINDER - T9621C00 - (09SEP86)   SYSTEM \PRUNE
Object file name is $OVER.T9618C00.obitmap
Object file timestamp is 29APR87 13:43:08
Number of Binder errors = 0
Number of Binder warnings = 0
Primary data = 143 words
Secondary data = 4152 words
Code area size = 4 pages
Resident code size = 0 pages
Data area size = 6 pages
Extended data area size = 0 pages
Top of stack = 4295 words
Number of code segments = 1 segment


The object file will only run on a TNS/II
Errorfile file name is $OVER.T9618C00.EBITMAP
Number of compiler errors = 0
Number of compiler warnings = 0
Maximum symbol table space used was - 18/344 bytes
Number of source lines = 4066
Compile cpu time = 00:00:08
Total Elapsed time = 00:01:04
```

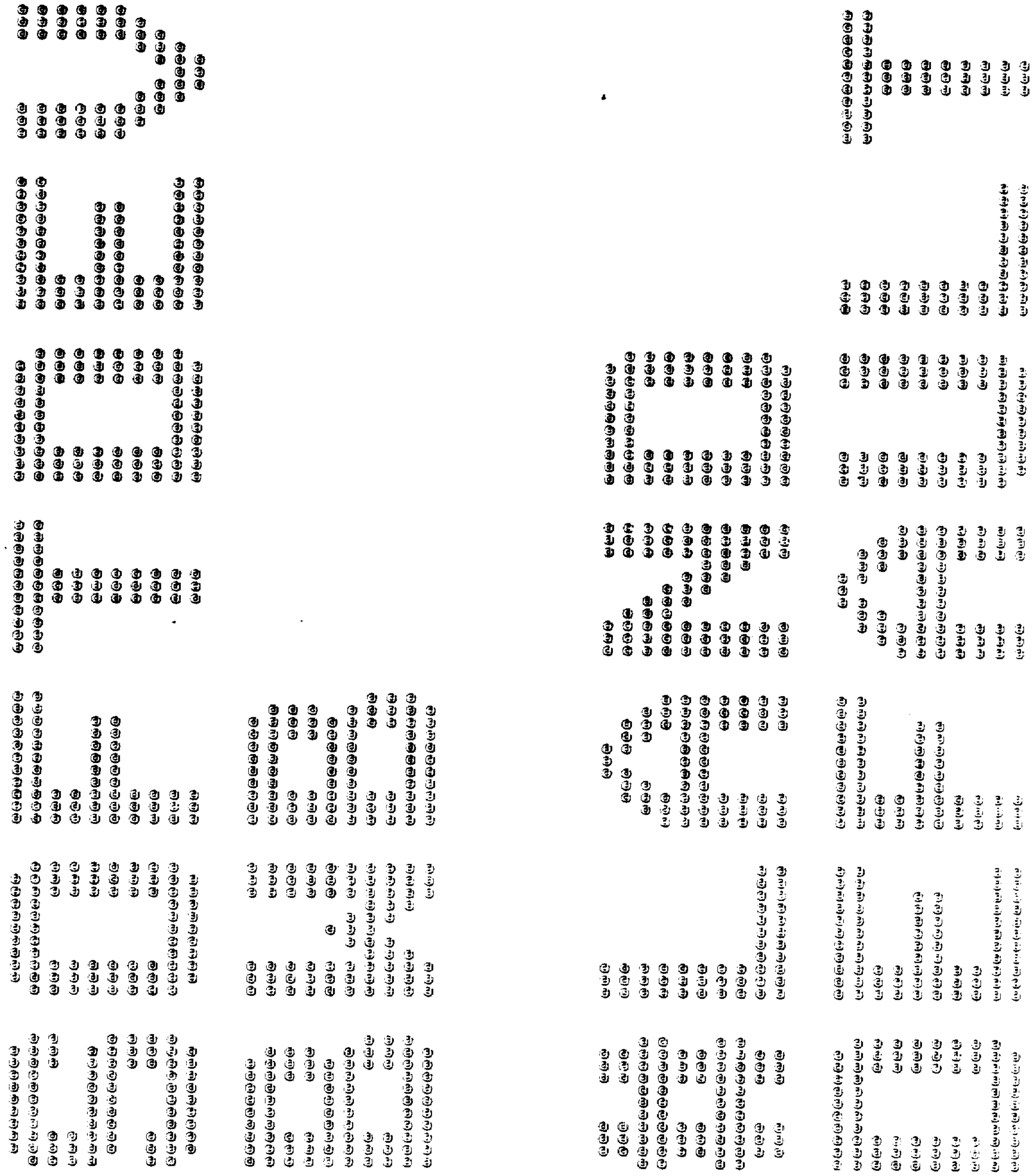

```
TAL - T9250B40 - (15SEP86)                              Source language: TAL - Target machine: Tandem NonStop II Syste
Date - Time :   23APR87 - 09:18:38                  Default options: On (LIST,CODE,MAP,WARN,LMAP) - Off (ICODE,INNERLIST

                    ? ERRORFILE ecover,USEGLOBALS gglobal,SEARCH oglobal,NOCODE,SYMBOLS,NOGMAP,NOLMAP,NOFIXUP
UseGlobals file:  $OVER.T9618C00.GGLOBAL  02APR87 - 16:53:52
Search file:  $OVER.T9618C00.OGLOBAL  02APR87 - 16:55:07
    2.    000000 0  0   NAME     COVERCOM^COVER;
    3.    000000 0  0   ?NOLIST
   34.    000000 0  0   ?BEGINCOMPILATION
   35.    000000 0  0   ?SOURCE copytal                       !Copyright notice
Source file:  [1]  $VIOLET.TOOLSC00.COPYTAL  22APR87 - '16:33:11
    1.    000000 0  0   ! +------------------------------------------------------------------+
    2.    000000 0  0   ! |                                                                  |
    3.    000000 0  0   ! |  Copyright (C) 1987 by TANDEM COMPUTERS INCORPORATED              |
    4.    000000 0  0   ! |                                                                  |
    5.    000000 0  0   ! |  Protected as an unpublished work.                               |
    6.    000000 0  0   ! |                                                                  |
    7.    000000 0  0   ! |  The computer program listings and specifications herein are     |
    8.    000000 0  0   ! |  the property of TANDEM COMPUTERS INCORPORATED and shall not be  |
    9.    000000 0  0   ! |  reproduced, copied, or used, in whole or in part, for any       |
   10.    000000 0  0   ! |  reason without the written permission of TANDEM COMPUTERS       |
   11.    000000 0  0   ! |  INCORPORATED.                                                   |
   12.    000000 0  0   ! |                                                                  |
   13.    000000 0  0   ! |  The following are trademarks or service marks of TANDEM        |
   14.    000000 0  0   ! |  COMPUTERS INCORPORATED:                                         |
   15.    000000 0  0   ! |                                                                  |
   16.    000000 0  0   ! |  6AX           BINDER          CROSSREF        DDL               |
   17.    000000 0  0   ! |  ENABLE        ENCOMPASS       ENCORE          ENFORM            |
   18.    000000 0  0   ! |  ENSCRIBE      ENVOY           ENVOYACP/XF     EXCHANGE          |
   19.    000000 0  0   ! |  EXPAND        FASTSORT        FAXLINK         FOX               |
   20.    000000 0  0   ! |  FOXII         GUARDIAN        GUARDIAN 90     GUARDIAN 90XF     |
   21.    000000 0  0   ! |  INSIGHT       INSPECT         LASER-LX        LXN               |
   22.    000000 0  0   ! |  MEASURE       MULTILAN        NetBatch        NonStop           |
   23.    000000 0  0   ! |  NonStop 1+    NonStop CLX     NonStop EXT     NonStop EXT10     |
   24.    000000 0  0   ! |  NonStop EXT25 NonStop II      NonStop SQL     NonStop TXP       |
   25.    000000 0  0   ! |  NonStop VLX   PATHMAKER       PC LINK         PCFORMAT          |
   26.    000000 0  0   ! |  PERUSE        PS MAIL         PS TEXT EDIT    PS TEXT FORMAT    |
   27.    000000 0  0   ! |  RDF           SAFE            SAFEGUARD       SAFE-T-NET        |
   28.    000000 0  0   ! |  T-TEXT        TACL            TAL             Tandem            |
   29.    000000 0  0   ! |  TGAL          THL             TIL             TMF               |
   30.    000000 0  0   ! |  TRANSFER      VIEWPOINT       WORDLINK        XL8               |
   31.    000000 0  0   ! |  XRAY                                                            |
   32.    000000 0  0   ! |                                                                  |
   33.    000000 0  0   ! +------------------------------------------------------------------+
   34.    000000 0  0   ! |  HYPERchannel is a trademark of Network Systems Corporation.     |
   35.    000000 0  0   ! |                                                                  |
   36.    000000 0  0   ! |  IBM is a registered trademark of International Business Machines |
   37.    000000 0  0   ! |  Corporation.                                                    |
   38.    000000 0  0   ! |                                                                  |
   39.    000000 0  0   ! |  Textpack4, Textpack6, IBM Displaywriter, DisplayWrite 2,        |
   40.    000000 0  0   ! |  DisplayWrite 3, Displaywriter communication software, and CICS  |
   41.    000000 0  0   ! |  are trademarks of International Business Machines Corporation.  |
   42.    000000 0  0   ! |                                                                  |
   43.    000000 0  0   ! |  INFOSAT is a trademark in which both Tandem and American        |
   44.    000000 0  0   ! |  Satellite have rights.                                          |
   45.    000000 0  0   ! |                                                                  |
```

```
   46.    000000 0  0    ! |  LATTICE is a registered trademark of Lattice, Inc.                        |
   47.    000000 0  0    ! |                                                                            |
   48.    000000 0  0    ! |  MultiMate is a trademark of Ashton-Tate, Inc.                             |
   49.    000000 0  0    ! |                                                                            |
   50.    000000 0  0    ! |  UNIX is a trademark of AT&T.                                              |
   51.    000000 0  0    ! |                                                                            |
   52.    000000 0  0    ! |  Wang OIS workstation, Wang VS workstation, Wang OIS telecommu-            |
   53.    000000 0  0    ! |  nication software, and Wang VS telecommunication software are            |
   54.    000000 0  0    ! |  trademarks of Wang, Inc.                                                  |
   55.    000000 0  0    ! +----------------------------------------------------------------------------+
   56.    000000 0  0    ! |  TANDEM COMPUTERS INCORPORATED -- PROPRIETARY AND CONFIDENTIAL             |
   57.    000000 0  0    ! +----------------------------------------------------------------------------+
   36.    000000 0  0    ?NOLIST, source extdecs  (
   59.    000000 0  0    ?NOLIST, source putil( xbounds )
   61.    000000 0  0    ?NOLIST, source pfprint
   63.    000000 0  0    ?NOLIST, source pgp
   65.    000000 0  0    ?NOLIST, source pscan
   67.    000000 0  0    ?NOLIST, source psiolib
   69.    000000 0  0    ?NOLIST, source pver      ( versionerror )
   71.    000000 0  0    ?NOLIST, source pbitmap
   73.    000000 0  0    ?NOLIST, source phelp
   75.    000000 0  0    ?NOLIST, source porder
   77.    000000 0  0    ?NOLIST, source plisting
   79.    000000 0  0    ?NOLIST, source pobject
   81.    000000 0  0    ?NOLIST, source psort
   83.    000000 0  0    ?NOLIST, source pupper
   85.    000000 0  0    ?SETTOG 15                                   !For FORWARDs
   86.    000000 0  0    ?NOLIST, source pcover
   88.    000000 0  0    ?RESETTOG 15
   89.    000000 0  0    ?LIST
   90.    000000 0  0    ?SOURCE sversion( version^cover )
Source file:  [1]  $OVER.T9618C00.SVERSION  23APR87 - 09:05:49
   15.    000000 0  0    ?SECTION VERSION^COVER
   16.    000000 0  0    PROC T9618C00^15JUL87^COVER^23APR7;
   17.    000000 1  0    BEGIN END;
   91.    000000 0  0    ?SOURCE scover
Source file:  [1]  $OVER.T9618C00.SCOVER  23APR87 - 09:07:26
    2.    000000 0  0    int !prv! proc CantTouch( Address, Length );
    3.    000000 1  0    string .ext Address;
    4.    000000 1  0    int(32)      Length;
    5.    000000 1  0    begin
    6.    000000 1  1    string       InsBacking = 'P' :=
    7.    000000 1  1                 ["Insufficient backing storage.",0];
    8.    000017 1  1
    9.    000017 1  1    if xbounds( Address, Length, 0 ) then
   10.    000025 1  1       begin
   11.    000025 1  2       call fprint( @InsBacking );       !Print error msg.
   12.    000036 1  2       return TRUE;                      !Failure
   13.    000040 1  2       end;
   14.    000040 1  1
   15.    000040 1  1    return FALSE;                        !OK to use (no errors).
   16.    000042 1  1
   17.    000042 1  1    end; !proc CantTouch

ADDRESS                      Variable     STRING       EXT Pointer    L-006
INSBACKING                   Variable     STRING       Direct         P+000
LENGTH                       Variable     INT (32)     Direct         L-004
```

```
000000 0  0    ! Report an error by passing the faddr to fprint and goto^mainloop.
000000 0  0    ! Possibly finger where the error starts.
000000 0  0    ?IF 12       !For FPU only
000000 0  0    ?IFNOT 12
000000 0  0    proc !prv! finger^err( faddr^, fingeraddr ) variable;
000000 0  0    int          faddr^;       ! how to finger
000000 0  0    int          fingeraddr;   ! what to finger
000000 0  0    EXTERNAL;
000000 0  0    ?ENDIF 12
000000 0  0    proc !prv! debug^err( faddr^, fingeraddr ) variable;
000000 1  0    int          faddr^;       ! how to finger
000000 1  0    int          fingeraddr;   ! what to finger
000000 1  0    begin
000000 1  1    entry        finger^err;
000000 1  1
000000 1  1    int          faddr := ( if $param ( faddr^ ) then faddr^ else @SyntaxErr );
000000 1  1    int          raise^the^finger := 1;
000000 1  1
000000 1  1    raise^the^finger := faddr = @SyntaxErr;
000033 1  1
000033 1  1    finger^err:
000035 1  1
000035 1  1    if raise^the^finger then
000037 1  1      begin
000037 1  2      ptrin ':=' " " & ptrin for ( @char '-' @ptrin + prmptcnt - 1 ) &
000037 1  2                  "^" -> @char;
000064 1  2      call print ( inbuf, @char '-' @ptrin );
000073 1  2      end;
000073 1  1
000073 1  1    call fprint ( faddr );
000102 1  1    char := 0;
000104 1  1
000104 1  1    GOTO^MAINLOOP;
000123 1  1
000123 1  1    end; !proc debug^err

FADDR                         Variable       INT          Direct        L+001
FADDR^                        Variable       INT          Direct        L-005
FINGERADDR                    Variable       INT          Direct        L-004
FINGER^ERR                    Entry                       %000034
RAISE^THE^FINGER              Variable       INT          Direct        L+002

000000 0  0    proc debugcode;
000000 1  0    begin
000000 1  1    string       Params = 'P' := ["DEBUG",0];
000003 1  1    if nextchar(0) then
000010 1  1       case scanidt( charadr, @Params ) of
000022 1  1       begin
000022 1  2       !DEBUG!
000022 1  2          begin
000022 1 CE0         eol;
000033 1  3          call debug;
000034 1  3          end;
000035 1 CE1      OTHERWISE call debug^err;
000041 1  2       end
000053 1  1    else
000054 1  1       call debug^err;
```

```
 70.    000060 1  1   end; !proc debugcode
PARAMS                        Variable      STRING        Direct        P+000
 72.    000000 0  0   int proc fixit;
 73.    000000 1  0   begin
 74.    000000 1  1   int          .temp [ 0:66 ];
 75.    000000 1  1   int           error;
 76.    000000 1  1   int           tempcnt;
 77.    000000 1  1   string       .ptrtemp := @temp '<<' 1;
 78.    000000 1  1   int           read^trim;
 79.    000000 1  1
 80.    000000 1  1   ptrin ':=' ptrsave for ( incnt := savecnt );
 81.    000014 1  1   do
 82.    000014 1  1     begin
 83.    000014 1  2     ptrout ':=' prompt for prmptcnt & ptrin for incnt;
 84.    000024 1  2     if write^file ( outfile, outbuf, prmptcnt + incnt ) then return 0;
 85.    000040 1  2     ptrtemp  :=  ".";
 86.    000042 1  2     if prmptcnt then ptrtemp [ 1 ] ':=' ptrtemp for prmptcnt-1;
 87.    000051 1  2     error := read^file ( infile, temp, tempcnt, prmptcnt );
 88.    000063 1  2     if error or tempcnt = 2 and temp = "//" then return 0;
 89.    000077 1  2     call fixstring ( temp, tempcnt, inbuf, incnt );
 90.    000112 1  2     end
 91.    000112 1  1   until not tempcnt;
 92.    000114 1  1
 93.    000114 1  1   return 1;
 94.    000116 1  1
 95.    000116 1  1   end; !proc fixit
ERROR                         Variable      INT           Direct        L+002
PTRTEMP                       Variable      STRING        Indirect      L+004
READ^TRIM                     Variable      INT           Direct        L+00
TEMP                          Variable      INT           Indirect      L+
TEMPCNT                       Variable      INT           Direct

 97.    000000 0  0   proc !prv! FprintPoof( fadr, p0, p1, p2, p3, p4, p5, p6, p7, p8, p9
 98.    000000 1  0                         ,p10, p11, p12, p13, p14 ) variable;
 99.    000000 1  0   int          fadr;
100.    000000 1  0   int          p0, p1, p2, p3, p4, p5, p6, p7, p8, p9, p10, p11, p12, p13, p14;
101.    000000 1  0   begin
102.    000000 1  1   int          error;
103.    000000 1  1   int          mask = 'L' '-' 3;
104.    000000 1  1
105.    000000 1  1   ! Duplicate our parameters for 'fprint
106.    000000 1  1   stack fadr; code  (push %700);
107.    000003 1  1   stack p0;   code  (push %700);
108.    000005 1  1   stack p1;   code  (push %700);
109.    000007 1  1   stack p2;   code  (push %700);
110.    000011 1  1   stack p3;   code  (push %700);
111.    000013 1  1   stack p4;   code  (push %700);
112.    000015 1  1   stack p5;   code  (push %700);
113.    000017 1  1   stack p6;   code  (push %700);
114.    000021 1  1   stack p7;   code  (push %700);
115.    000023 1  1   stack p8;   code  (push %700);
116.    000025 1  1   stack p9;   code  (push %700);
117.    000027 1  1   stack p10;  code  (push %700);
118.    000031 1  1   stack p11;  code  (push %700);
```

```
  119.    000033 1  1   stack p12;  code  (push %700);
  120.    000035 1  1   stack p13;  code  (push %700);
  121.    000037 1  1   stack p14;  code  (push %700);
  122.    000041 1  1   stack mask; code  (push %700);
  123.    000043 1  1   stack @fprint; code(scmp; dpcl);    !call fprint
  124.    000047 1  1   ?RP = 1
  125.    000047 1  1   store error;                         !save result
  126.    000050 1  1   ?RP = 7
  127.    000050 1  1
  128.    000050 1  1   if error then GOTO^MAINLOOP;
  129.    000071 1  1   end; !FprintPoof

ERROR                          Variable     INT          Direct        L+001
FADR                           Variable     INT          Direct        L-023
MASK                           Variable     INT          Direct        L-003
P0                             Variable     INT          Direct        L-022
P1                             Variable     INT          Direct        L-021
P10                            Variable     INT          Direct        L-010
P11                            Variable     INT          Direct        L-007
P12                            Variable     INT          Direct        L-006
P13                            Variable     INT          Direct        L-005
P14                            Variable     INT          Direct        L-004
P2                             Variable     INT          Direct        L-020
P3                             Variable     INT          Direct        L-017
P4                             Variable     INT          Direct        L-016
P5                             Variable     INT          Direct        L-015
P6                             Variable     INT          Direct        L-014
P7                             Variable     INT          Direct        L-013
P8                             Variable     INT          Direct        L-012
P9                             Variable     INT          Direct        L-011

  131.    000000 0  0   proc initialize;
  132.    000000 1  0   begin
  133.    000000 1  1   ?SOURCE sversion( MY^VERSION )
 Source file:  [19] $OVER.T9618C00.SVERSION  23APR87 - 09:05:49
    5.    000000 1  1   ?SECTION MY^VERSION
    6.    000000 1  1   DEFINE       MY^VERSION = (((
    7.    000000 1  1                "C"                   !<<<<< This is the real version id
    8.    000000 1  1                +("K"-"A"))'<<'8)'+'  !This is a correction factor for Rosewood
    9.    000000 1  1                00                    !<<<<< Don't forget
   10.    000000 1  1                )#;
   11.    000000 1  1
  134.    000000 1  1   literal      SegmentId  = 999;     !This is the only relative extended segment
  135.    000000 1  1   literal      ExtentSize  = 8;      !8 pages = 8 * 2048 = 16384 bytes
  136.    000000 1  1   literal      MaxExtents  = 978;    !All that will fit into a file label
  137.    000000 1  1   literal      PinAndFlags  = %44000; !Unshared, extensible
  138.    000000 1  1   string .ext ExtendedSegment := %2000000d;
  139.    000000 1  1   int          FileName[0:11];
  140.    000000 1  1   int          error;
  141.    000000 1  1   int(32)      SegmentSize := (ExtentSize * 2048) '*' MaxExtents;
  142.    000000 1  1
  143.    000000 1  1   call numout(prompt[1], mypid.<0:7>, 10, 2); !processor
  144.    000025 1  1   call numout(prompt[4], mypid.<8:15>, 10, 3); !pin
  145.    000040 1  1   call startup;
  146.    000041 1  1   call ENV^info;                        !Print out some environmental information
  147.    000042 1  1
  148.    000042 1  1   if VERSIONERROR( MY^VERSION ) then call fprintabort( @NotSupported );
```

```
000063 1  1
000063 1  1   if ptrin then
000065 1  1      begin
000065 1  2      fc := true;
000067 1  2      scan ptrin until 0 -> incnt;
000073 1  2      incnt := incnt '-' @ptrin;
000077 1  2      if ptrin[incnt-1] <> ";" then    !If he didn't end command line with ";"
000104 1  2         Param^Commands^Only := TRUE; !then just execute the commands supplied.
000106 1  2      end;
000106 1  1
000106 1  1   ! Create a temporary file to be used as a swap file.
000106 1  1   call processinfo( mypid,,, ,,, ,,, ,,, ,, FileName ); !Get our swap volume
000123 1  1   FileName[4] ':=' "  " & FileName[4] for 7 words;
000134 1  1   call create( FileName, ExtentSize,,,,,,,,, MaxExtents );
000150 1  1   if <> then
000151 1  1      begin
000151 1  2      call fileinfo( -1, error );
000162 1  2      call fprintabort( @UnableAlloc, error );
000175 1  2      end;
000175 1  1
000175 1  1   ! Allocate an extensible extended segment.
000175 1  1   error := allocatesegment( SegmentId, SegmentSize, FileName, PinAndFlags );
000206 1  1   if error then call fprintabort( @UnableAlloc, error );
000223 1  1
000223 1  1   call usesegment( SegmentId );      !Establish addressability to extended seg.
000232 1  1
000232 1  1   ! Make sure there's enough room for us to manipulate at least 1 bitmap.
000232 1  1   if CantTouch( ExtendedSegment,
000232 1  1                 CoverDiscHeaderSize + 2d * SizeOfCoverBitmapSegment ) then
000240 1  1     call abend;
000245 1  1
000245 1  1   end; !proc initialize

ERROR                       Variable     INT           Direct         L+017
EXTENDEDSEGMENT             Variable     STRING        EXT Pointer    L+001
EXTENTSIZE                  Literal      INT           %000010
FILENAME                    Variable     INT           Direct         L+003
MAXEXTENTS                  Literal      INT           %001722
MY^VERSION                  Define                     ((( "C" +("K"-"A"))'<<'8)'+' 00 )
PINANDFLAGS                 Literal      INT           %044000
SEGMENTID                   Literal      INT           %001747
SEGMENTSIZE                 Variable     INT (32)      Direct         L+020

000000 0  0   ! Deblank char and advance it over the next x non-blank chars
000000 0  0   int !prv! proc nextchar( x, nextcharadr ) variable;
000000 1  0   int          x;            ! number of non-blank chars to advance over
000000 1  0   int          .nextcharadr; ! where to save new @char
000000 1  0
000000 1  0   begin
000000 1  1   int          i := 0;
000000 1  1
000000 1  1   if not $param ( x ) then x := 1;
000007 1  1   scan char while " " -> @char;
000013 1  1
000013 1  1   while ( i := i + 1 ) <= x do
000021 1  1     if char and char <> ";" then scan char [ 1 ] while " " -> @char;
000034 1  1
```

```
196.      000034 1   1    if $param ( nextcharadr ) then nextcharadr := @char;
197.      000041 1   1    return ( if char = ";" or char = 0 then 0 else char );
198.      000053 1   1
199.      000053 1   1    end; !proc nextchar

I                                  Variable      INT          Direct        L+001
NEXTCHARADR                        Variable      INT          Indirect      L-004
X                                  Variable      INT          Direct        L-005
201.      000000 0   0    ! Displays or sets the pagesize
202.      000000 0   0    proc Pagesize^Command;
203.      000000 1   0    begin
204.      000000 1   1    string      pgsize = 'P' := ["Current pagesize is &* lines/page.",0];
205.      000022 1   1    string      nopg   = 'P' := ["Paging is currently disabled.",0];
206.      000041 1   1    int         i;
207.      000041 1   1
208.      000041 1   1    if nextchar(0) then
209.      000047 1   1      begin
210.      000047 1   2      if scanint( charadr, i, , 0, 88 ) then call finger^err( @NotNum );
211.      000071 1   2      EOL;
212.      000102 1   2      if i = 0 then
213.      000105 1   2        paging := false
214.      000105 1   2      else
215.      000111 1   2        begin
216.      000111 1   3        paging := true;
217.      000113 1   3        linesperpage := i;
218.      000115 1   3        end;
219.      000115 1   2      end
220.      000115 1   1    else
221.      000116 1   1      call fprint ( if paging then @pgsize else @nopg, linesperpage );
222.      000136 1   1
223.      000136 1   1    end; !proc Pagesize^Command

I                                  Variable      INT          Direct        L+001
NOPG                               Variable      STRING       Direct        P+000
PGSIZE                             Variable      STRING       Direct        P+000
225.      000000 0   0    ! PAUSE will cause us to delay for a specified time.
226.      000000 0   0    proc PAUSE^Command;
227.      000000 1   0    begin
228.      000000 1   1    string      TimeUnits = 'P' :=
229.      000000 1   1                [3,"MINUTES "
230.      000001 1   1                ,3,"SECONDS "
231.      000005 1   1                ,0];
232.      000012 1   1
233.      000012 1   1    int         Time, error;
234.      000012 1   1    int(32)     Time32 := 0d;
235.      000012 1   1
236.      000012 1   1    if nextchar(0) then
237.      000022 1   1       begin
238.      000022 1   2       if scanint( charadr, Time,, 0, 600 ) then call finger^err( @NotNum );
239.      000045 1   2       case scanidta( charadr, @TimeUnits ) of
240.      000060 1   2       begin
241.      000060 1   3       Time32 := Time  '*' 6000;         !MIN
242.      000066 1 CE1       Time32 := Time '*'  100;          !SEC
243.      000073 1 CE2          OTHERWISE begin
244.      000073 1   4                    Time32 := Time '*' 100;    !SEC
245.      000077 1   4                    call fprint( @AssumeSeconds );
246.      000111 1   4                    end;
```

```
000111 1  3      end;
000125 1  2      end
000125 1  1   else
000126 1  1      call fprint( @NotNum );
000140 1  1
000140 1  1   eol;
000151 1  1   call delay( Time32 );
000154 1  1
000154 1  1   end; !proc Pause^Command

ERROR                      Variable     INT          Direct      L+002
TIME                       Variable     INT          Direct      L+001
TIME32                     Variable     INT (32)     Direct      L+003
TIMEUNI`S                  Variable     STRING       Direct      P+000

000000 0  0   proc cover main;
000000 1  0   begin
000000 1  1
000000 1  1   int subproc fc^cmd;
000000 2  1   begin
000000 2  2
000000 2  2   if ( char land %337 ) = "F" and ( char [ 1 ] land %337 ) = "C" then
000011 2  2     begin
000011 2  3     if not interactive then call finger^err ( @NotInteractive );
000025 2  3     call nextchar ( 2 );
000033 2  3     EOL;
000044 2  3     fc := fixit;
000046 2  3     return true;
000051 2  3     end
000051 2  2   else
000052 2  2     return false;
000054 2  2   end; ! subproc fc^cmd
000054 1  1
000054 1  1
000054 1  1   ! read startup message and open files
000054 1  1   set^mainloop ( mainloop );
000070 1  1   call initialize;
000071 1  1
000071 1  1   ! main command interpreter loop
000071 1  1   while true do
000071 1  1     begin
000071 1  2   mainloop:
000071 1  2     if savechar then
000073 1  2       begin
000073 1  3       @char := savechar;
000075 1  3       savechar := 0;
000077 1  3       end;
000077 1  2     if char = ";" and not fc then
000104 1  2       begin
000104 1  3       while char = ";" or char = " " do @char := @char '+' 1;
000117 1  3       if char and not fc^cmd then goto got^something;
000124 1  3       end;
000124 1  2
000124 1  2     do
000124 1  2       begin
000124 1  3       if not fc then
000126 1  3         begin
```

```
000126 1  4         if Param^Commands^Only then call terminate;
000131 1  4         ptrin ':=' prompt for prmptcnt;
000136 1  4         if read^file ( infile, inbuf, incnt, prmptcnt) then call terminate;
000151 1  4         end
000151 1  3       else
000152 1  3         fc := false;
000154 1  3       ptrin [ incnt ] := 0;
000157 1  3       @char := @ptrin;
000161 1  3       while char = " " or char = ";" do @char := @char '+' 1;
000173 1  3       end
000173 1  2     until char and not fc^cmd;
000177 1  2
000177 1  2     ptrsave ':=' ptrin for ( savecnt := incnt );
000204 1  2     call shiftstring( ptrin, incnt, 0); ! upshift key words
000211 1  2
000211 1  2   got^something:
000211 1  2     lines := 0;                          ! Each command is considered to start
000213 1  2     page := 1;                           ! a new page.
000215 1  2
000215 1  2     case scanidta ( charadr, @commands ) of
000231 1  2       begin
000231 1  3       ! AND                          !  call Boolean^Command(0!AND!);
000235 1 CE1      ! BADSS               !  call BADSS^Command;
000237 1 CE2      ! COMMENT             !  char := savechar := 0;
000243 1 CE3      ! DEBUGCODE           !  call debugcode;
000245 1 CE4      ! DISABLE             !  call DISABLE^Command;
000247 1 CE5      ! Display             !  call Display^Command;
000251 1 CE6      ! ENABLE              !  call ENABLE^Command;
000253 1 CE7      ! ENV                 !  call ENV^Command;
000255 1 CE8      ! Exit                !  begin;EOL;call terminate;end;
000270 1 CE9      ! FC                  !  ;
000270 1 CE10     ! Help                !  call Help^Command;
000272 1 CE11     ! List                !  call List^Command;
000274 1 CE12     ! MARKup              !  call Markup^Command;
000276 1 CE13     ! Measure             !  call Measure^Command;
000300 1 CE14     ! OR                  !  call Boolean^Command(1!OR!);
000304 1 CE15     ! ORDER               !  call Order^Command;
000306 1 CE16     ! PageSize            !  call Pagesize^Command;
000310 1 CE17     ! PAUSE               !  call Pause^Command;
000312 1 CE18     ! REset               !  call Reset^Command;
000314 1 CE19     ! Save                !  call Save^Command;
000316 1 CE20     ! SORT                !  call Sort^Command;
000320 1 CE21     ! WHENCE              !  call Whence^Command;
000322 1 CE22     ! XOR                 !  call Boolean^Command(2!XOR!);
000326 1 CE23       otherwise              call debug^err;
000332 1  3       end;
000372 1  2
000372 1  2     end;
000374 1  1
000374 1  1   end;  !proc cover

FC^CMD                       Subproc       INT          %000000
GOT^SOMETHING                Label                      %000211
MAINLOOP                     Label                      %000071
```

```
BINDER - OBJECT FILE BINDER - T9621C00 - (09SEP86)    SYSTEM \PRUNE
Object file name is $OVER.T9618C00.ocover
Object file timestamp is 23APR87 09:18:38
Number of Binder errors = 0
Number of Binder warnings = 0
Primary data = 143 words
Secondary data = 4152 words
Code area size = 3 pages
Resident code size = 0 pages
Data area size = 6 pages
Extended data area size = 0 pages
Top of stack = 4295 words
Number of code segments  = 1 segment


The object file will run on a TNS/II, but may not run on a TNS
Errorfile file name is $OVER.T9618C00.ECOVER
Number of compiler errors =  0
Number of compiler warnings =  0
Maximum symbol table space used was = 189540 bytes
Number of source lines = 3958
Compile cpu time = 00:00:06
Total Elapsed time = 00:00:42
```

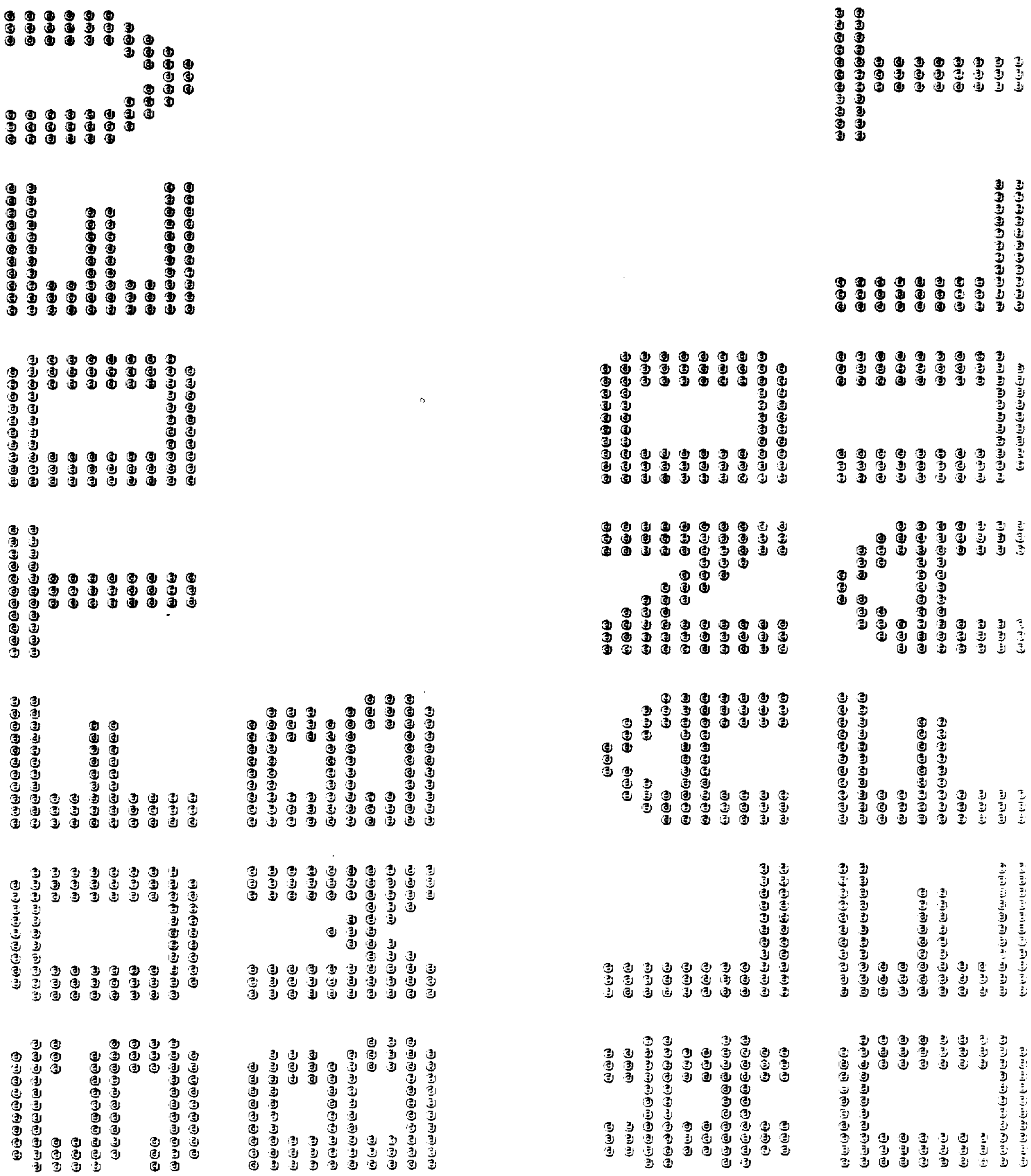

```
BINDER - OBJECT FILE BINDER - T9621C00 - (09SEP86)    SYSTEM \PRUNE
@comment  This file will bind COVERCOM.
@
@add * from obitmap   ,delete
@add * from ocover    ,delete
@add * from ohelp     ,delete
@add * from olisting  ,delete
@add * from oobject   ,delete
@add * from osort     ,delete
@add * from oupper    ,delete
@add * from oorder    ,delete
@
@comment  Include GLOBAL data initialization.
@add * from oglobal   ,delete
@
@comment  Until Mitch Butler's version is included with the supported Spooler.
@add code spoolstart from spoollib
@
@comment  Include what's needed from the utility modules.
@select search ofprint
@select search ogp
@select search oscan
@select search osiolib
@select search oreadobj
@select search outil1
@
@comment  Print load maps in ALPHA and LOC order.
@select list (alpha on, loc on, xref on)
@
@build covercom !
```

ENTRY POINT MAP BY NAME

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 105 | 065626 | 065662 | 065636 | E | ABORT | 12FEB87 | 12:31 | TAL | $OVER.T9618C00.SSIOLIB |
| 00 | 046 | 037254 | 037364 | 037254 | | ANYPRIVPROCS | 29APR87 | 13:44 | TAL | $OVER.T9618C00.SOBJECT |
| 00 | 047 | 037365 | 040455 | 037664 | | BADSS^COMMAND | 29APR87 | 13:44 | TAL | $OVER.T9618C00.SOBJECT |
| 00 | 003 | 002502 | 003046 | 002711 | | BOOLEAN^BITMAPS | 29APR87 | 13:43 | TAL | $OVER.T9618C00.SBITMAP |
| 00 | 004 | 003047 | 004207 | 003072 | | BOOLEAN^COMMAND | 29APR87 | 13:43 | TAL | $OVER.T9618C00.SBITMAP |
| 00 | 015 | 007221 | 007262 | 007240 | | CANTTOUCH | 23APR87 | 09:18 | TAL | $OVER.T9618C00.SCOVER |
| 00 | 050 | 040456 | 040633 | 040456 | | CHECKFILESECURITY | 29APR87 | 13:44 | TAL | $OVER.T9618C00.SOBJECT |
| 00 | 060 | 051471 | 051556 | 051471 | | CHECKSECURITY | 29APR87 | 16:04 | TAL | $OVER.T9618C00.SUPPER |
| 00 | 033 | 032162 | 032725 | 032263 | | CHECKTOGGLES | 03APR87 | 08:17 | TAL | $OVER.T9618C00.SLISTING |
| 00 | 005 | 004210 | 004267 | 004210 | | COMPUTEBITMAPSIZES | 29APR87 | 13:43 | TAL | $OVER.T9618C00.SBITMAP |
| 00 | 133 | 073522 | 073565 | 073522 | | CONVERTPITFORMAT | 17FEB87 | 15:46 | TAL | $OVER.T9618C00.SREADOBJ |
| 00 | 034 | 032726 | 033262 | 032726 | | COPYUNTILBEGIN | 03APR87 | 08:17 | TAL | $OVER.T9618C00.SLISTING |
| 00 | 027 | 010547 | 011145 | 010623 | M | COVER | 23APR87 | 09:18 | TAL | $OVER.T9618C00.SCOVER |
| 00 | 152 | 064145 | 064225 | 064145 | P | CRCB^EXISTS | 12FEB87 | 12:33 | TAL | $OVER.T9618C00.SUTIL1 |
| 00 | 137 | 073755 | 074016 | 073755 | V | CRTPIDCOLLAPSE | 12FEB87 | 12:29 | TAL | $OVER.T9618C00.SGP |
| 00 | 123 | 072315 | 072345 | 072315 | X | DEBLANK | 12FEB87 | 12:32 | TAL | $OVER.T9618C00.SSCAN |
| 00 | 020 | 007412 | 007472 | 007415 | | DEBUGCODE | 23APR87 | 09:18 | TAL | $OVER.T9618C00.SCOVER |
| 00 | 016 | 007263 | 007411 | 007300 | V | DEBUG^ERR | 23APR87 | 09:18 | TAL | $OVER.T9618C00.SCOVER |
| 00 | 142 | 051557 | 051615 | 051557 | PC | DISABLEPRIV | 29APR87 | 16:04 | TAL | $OVER.T9618C00.SUPPER |
| 00 | 061 | 051616 | 052222 | 051621 | | DISABLE^COMMAND | 29APR87 | 16:04 | TAL | $OVER.T9618C00.SUPPER |

| | | | | | | | | | | |
|---|---|---|---|---|---|---|---|---|---|---|
| 00 | 051 | 040634 | 043321 | 042333 | | DISPLAY^COMMAND | 29APR87 | 13:44 | TAL | $OVER.T9618C00.SOBJECT |
| 00 | 143 | 052223 | 052261 | 052223 | PC | ENABLEPRIV | 29APR87 | 16:04 | TAL | $OVER.T9618C00.SUPPER |
| 00 | 062 | 052262 | 053023 | 052265 | | ENABLE^COMMAND | 29APR87 | 16:04 | TAL | $OVER.T9618C00.SUPPER |
| 00 | 063 | 053024 | 053427 | 053126 | | ENV^COMMAND | 29APR87 | 16:04 | TAL | $OVER.T9618C00.SUPPER |
| 00 | 064 | 053430 | 053651 | 053472 | | ENV^INFO | 29APR87 | 16:04 | TAL | $OVER.T9618C00.SUPPER |
| 00 | 017 | 007263 | 007411 | 007317 | EV | FINGER^ERR | 23APR87 | 09:18 | TAL | $OVER.T9618C00.SCOVER |
| 00 | 021 | 007473 | 007610 | 007473 | | FIXIT | 23APR87 | 09:18 | TAL | $OVER.T9618C00.SCOVER |
| 00 | 052 | 043322 | 043453 | 043364 | | FORMATPROCSOURCEINFO | 29APR87 | 13:44 | TAL | $OVER.T9618C00.SOBJECT |
| 00 | 076 | 063005 | 064144 | 063036 | V | FPRINT | 12FEB87 | 12:30 | TAL | $OVER.T9618C00.SFPRINT |
| 00 | 077 | 063005 | 064144 | 063042 | EV | FPRINTABORT | 12FEB87 | 12:30 | TAL | $OVER.T9618C00.SFPRINT |
| 00 | 022 | 007611 | 007703 | 007611 | V | FPRINTPOOF | 23APR87 | 09:18 | TAL | $OVER.T9618C00.SCOVER |
| 00 | 035 | 033263 | 033441 | 033263 | | GETMARKER | 03APR87 | 08:17 | TAL | $OVER.T9618C00.SLISTING |
| 00 | 117 | 067523 | 067610 | 067523 | | GETNEXTEPT | 17FEB87 | 15:46 | TAL | $OVER.T9618C00.SREADOBJ |
| 00 | 110 | 066312 | 066646 | 066312 | | GETNEXTPROCEDURE | 17FEB87 | 15:46 | TAL | $OVER.T9618C00.SREADOBJ |
| 00 | 107 | 066201 | 066311 | 066201 | | GETNEXTSTATEMENT | 17FEB87 | 15:46 | TAL | $OVER.T9618C00.SREADOBJ |
| 00 | 144 | 053652 | 053734 | 053652 | PC | GETOBJECTNAMES | 29APR87 | 16:04 | TAL | $OVER.T9618C00.SUPPER |
| 00 | 150 | 070725 | 070766 | 070725 | PC | GETOSVERDATE | 12FEB87 | 12:33 | TAL | $OVER.T9618C00.SUTIL1 |
| 00 | 145 | 053735 | 054040 | 053735 | PC | GETPINVALUES | 29APR87 | 16:04 | TAL | $OVER.T9618C00.SUPPER |
| 00 | 132 | 073374 | 073521 | 073374 | | GETSOURCEORD | 17FEB87 | 15:46 | TAL | $OVER.T9618C00.SREADOBJ |
| 00 | 036 | 033442 | 033610 | 033442 | | GETUNIQUEPROC | 03APR87 | 08:17 | TAL | $OVER.T9618C00.SLISTING |
| 00 | 031 | 011147 | 032160 | 031775 | | HELP^COMMAND | 03APR87 | 09:17 | TAL | $OVER.T9618C00.SHELP |
| 00 | 023 | 007704 | 010156 | 007704 | | INITIALIZE | 23APR87 | 09:18 | TAL | $OVER.T9618C00.SCOVER |
| 00 | 153 | 074017 | 074063 | 074017 | P | LABELTOAXADR | 12FEB87 | 12:33 | TAL | $OVER.T9618C00.SUTIL1 |
| 00 | 037 | 033611 | 033746 | 033611 | | LINENUMBER | 03APR87 | 08:17 | TAL | $OVER.T9618C00.SLISTING |
| 00 | 053 | 043454 | 044056 | 043565 | | LIST^COMMAND | 29APR87 | 13:44 | TAL | $OVER.T9618C00.SOBJECT |
| 00 | 040 | 033747 | 035526 | 034153 | | MARKUP^COMMAND | 03APR87 | 08:17 | TAL | $OVER.T9618C00.SLISTING |
| 00 | 141 | 044057 | 046616 | 046117 | PC | MEASURE^COMMAND | 29APR87 | 13:44 | TAL | $OVER.T9618C00.SOBJECT |
| 00 | 140 | 004270 | 004575 | 004362 | PC | MOVEBITMAPTOMEM | 29APR87 | 13:43 | TAL | $OVER.T9618C00.SBITMAP |
| 00 | 100 | 064226 | 064447 | 064256 | V | MTIMESTAMPCOLLAPSE | 12FEB87 | 12:29 | TAL | $OVER.T9618C00.SGP |
| 00 | 024 | 010157 | 010231 | 010157 | V | NEXTCHAR | 23APR87 | 09:18 | TAL | $OVER.T9618C00.SCOVER |
| 00 | 124 | 072346 | 072724 | 072500 | V | NIN | 12FEB87 | 12:29 | TAL | $OVER.T9618C00.SGP |
| 00 | 125 | 072725 | 072771 | 072731 | V | NOUT | 12FEB87 | 12:29 | TAL | $OVER.T9618C00.SGP |
| 00 | 115 | 067457 | 067522 | 067463 | V | NOUT32 | 12FEB87 | 12:29 | TAL | $OVER.T9618C00.SGP |
| 00 | 116 | 067457 | 067522 | 067467 | EV | NOUT32M | 12FEB87 | 12:29 | TAL | $OVER.T9618C00.SGP |
| 00 | 127 | 072772 | 073355 | 073055 | V | NOUT64 | 12FEB87 | 12:29 | TAL | $OVER.T9618C00.SGP |
| 00 | 130 | 072772 | 073355 | 073065 | EV | NOUT64M | 12FEB87 | 12:29 | TAL | $OVER.T9618C00.SGP |
| 00 | 126 | 072725 | 072771 | 072735 | EV | NOUTM | 12FEB87 | 12:29 | TAL | $OVER.T9618C00.SGP |
| 00 | 041 | 035527 | 036562 | 035537 | | OPENLISTINGFILES | 03APR87 | 08:17 | TAL | $OVER.T9618C00.SLISTING |
| 00 | 111 | 066647 | 067121 | 066647 | | OPENOBJECTFILE | 17FEB87 | 15:46 | TAL | $OVER.T9618C00.SREADOBJ |
| 00 | 066 | 055175 | 061252 | 060436 | | ORDER^COMMAND | 07APR87 | 18:38 | TAL | $OVER.T9618C00.SORDER |
| 00 | 025 | 010232 | 010370 | 010273 | | PAGESIZE^COMMAND | 23APR87 | 09:18 | TAL | $OVER.T9618C00.SCOVER |
| 00 | 026 | 010371 | 010546 | 010403 | | PAUSE^COMMAND | 23APR87 | 09:18 | TAL | $OVER.T9618C00.SCOVER |
| 00 | 112 | 067122 | 067265 | 067122 | | POSITREAD | 17FEB87 | 15:46 | TAL | $OVER.T9618C00.SREADOBJ |
| 00 | 006 | 004576 | 004645 | 004576 | | POSITREADX | 29APR87 | 13:43 | TAL | $OVER.T9618C00.SBITMAP |
| 00 | 101 | 064450 | 065004 | 064455 | | PRINT | 12FEB87 | 12:31 | TAL | $OVER.T9618C00.SSIOLIB |
| 00 | 102 | 064450 | 065004 | 064461 | E | PRINTABORT | 12FEB87 | 12:31 | TAL | $OVER.T9618C00.SSIOLIB |
| 00 | 120 | 067646 | 070724 | 070130 | V | PRINTBANNER | 12FEB87 | 12:31 | TAL | $OVER.T9618C00.SSIOLIB |
| 00 | 106 | 065663 | 066200 | 065725 | V | PRINTHELP | 12FEB87 | 12:31 | TAL | $OVER.T9618C00.SSIOLIB |
| 00 | 007 | 004646 | 005655 | 004747 | X | READBITMAPFILE | 29APR87 | 13:43 | TAL | $OVER.T9618C00.SBITMAP |
| 00 | 042 | 036563 | 037155 | 036752 | | READLISTINGLINE | 03APR87 | 08:17 | TAL | $OVER.T9618C00.SLISTING |
| 00 | 146 | 054041 | 055173 | 054734 | PC | RESET^COMMAND | 29APR87 | 16:04 | TAL | $OVER.T9618C00.SUPPER |
| 00 | 134 | 073566 | 073614 | 073566 | | RO^GET^BASE^NAME | 17FEB87 | 11:51 | TAL | $EMI.T9621C00.SHREADS |
| 00 | 010 | 005656 | 006157 | 005662 | | SAVE^COMMAND | 29APR87 | 13:43 | TAL | $OVER.T9618C00.SBITMAP |
| 00 | 114 | 067266 | 067456 | 067323 | EX | SCANALPHA | 12FEB87 | 12:32 | TAL | $OVER.T9618C00.SSCAN |
| 00 | 074 | 062516 | 062661 | 062533 | EX | SCANDNAME | 12FEB87 | 12:32 | TAL | $OVER.T9618C00.SSCAN |
| 00 | 073 | 062516 | 062661 | 062527 | X | SCANFNAME | 12FEB87 | 12:32 | TAL | $OVER.T9618C00.SSCAN |
| 00 | 113 | 067266 | 067456 | 067317 | X | SCANID | 12FEB87 | 12:32 | TAL | $OVER.T9618C00.SSCAN |

| | | | | | | | | | | |
|---|---|---|---|---|---|---|---|---|---|---|
| 00 | 072 | 062255 | 062515 | 062301 | EX | SCANID1 | 12FEB87 | 12:32 | TAL | $OVER.T9618C00.SSCAN |
| 00 | 071 | 062255 | 062515 | 062275 | X | SCANID1A | 12FEB87 | 12:32 | TAL | $OVER.T9618C00.SSCAN |
| 00 | 075 | 062662 | 063004 | 062662 | X | SCANINT | 12FEB87 | 12:32 | TAL | $OVER.T9618C00.SSCAN |
| 00 | 056 | 046717 | 051467 | 050157 | | SORT^COMMAND | 07APR87 | 10:51 | TAL | $OVER.T9618C00.SSORT |
| 00 | 070 | 061254 | 062254 | 061254 | X | SPOOLSTART | 12FEB87 | 12:37 | TAL | $OVER.T9618C00.LIBSRC |
| 00 | 121 | 071036 | 071136 | 071073 | V | SPOOL^CHECKMSG | 12FEB87 | 12:37 | TAL | $OVER.T9618C00.LIBSRC |
| 00 | 122 | 071137 | 072314 | 071315 | | SPOOL^CINV | 12FEB87 | 12:37 | TAL | $OVER.T9618C00.LIBSRC |
| 00 | 103 | 065005 | 065625 | 065030 | | STARTUP | 12FEB87 | 12:31 | TAL | $OVER.T9618C00.SSIOLIB |
| 00 | 131 | 073356 | 073373 | 073356 | V | STARTUPSSTARTUPPROC | 12FEB87 | 12:31 | TAL | $OVER.T9618C00.SSIOLIB |
| 00 | 136 | 073675 | 073754 | 073675 | V | SYSIDCOLLAPSE | 12FEB87 | 12:29 | TAL | $OVER.T9618C00.SGP |
| 00 | 002 | 002501 | 002501 | 002501 | | T9618C00^15JUL87^BITMAP^29APR7 | 29APR87 | 13:43 | TAL | $OVER.T9618C00.SVERSION |
| 00 | 014 | 007220 | 007220 | 007220 | | T9618C00^15JUL87^COVER^23APR7 | 23APR87 | 09:18 | TAL | $OVER.T9618C00.SVERSION |
| 00 | 067 | 061253 | 061253 | 061253 | | T9618C00^15JUL87^GLOBAL^29APR7 | 29APR87 | 13:16 | TAL | $OVER.T9618C00.SVERSION |
| 00 | 030 | 011146 | 011146 | 011146 | | T9618C00^15JUL87^HELP^03APR7 | 03APR87 | 09:17 | TAL | $OVER.T9618C00.SVERSION |
| 00 | 032 | 032161 | 032161 | 032161 | | T9618C00^15JUL87^LISTING^02APR7 | 03APR87 | 08:17 | TAL | $OVER.T9618C00.SVERSION |
| 00 | 045 | 037253 | 037253 | 037253 | | T9618C00^15JUL87^OBJECT^29APR7 | 29APR87 | 13:44 | TAL | $OVER.T9618C00.SVERSION |
| 00 | 065 | 055174 | 055174 | 055174 | | T9618C00^15JUL87^ORDER^07APR7 | 07APR87 | 18:38 | TAL | $OVER.T9618C00.SVERSION |
| 00 | 055 | 046716 | 046716 | 046716 | | T9618C00^15JUL87^SORT^07APR7 | 07APR87 | 10:51 | TAL | $OVER.T9618C00.SVERSION |
| 00 | 057 | 051470 | 051470 | 051470 | | T9618C00^15JUL87^UPPER^29APR7 | 29APR87 | 16:04 | TAL | $OVER.T9618C00.SVERSION |
| 00 | 104 | 065626 | 065662 | 065632 | | TERMINATE | 12FEB87 | 12:31 | TAL | $OVER.T9618C00.SSIOLIB |
| 00 | 147 | 067611 | 067645 | 067611 | PC | TESTCOVERENABLED | 12FEB87 | 12:33 | TAL | $OVER.T9618C00.SUTIL1 |
| 00 | 151 | 070767 | 071035 | 070767 | PC | TESTCOVERHOOKS | 12FEB87 | 12:33 | TAL | $OVER.T9618C00.SUTIL1 |
| 00 | 011 | 006160 | 006230 | 006160 | | TESTFORHIT | 29APR87 | 13:43 | TAL | $OVER.T9618C00.SBITMAP |
| 00 | 135 | 073615 | 073674 | 073640 | | USERIDCOLLAPSE | 12FEB87 | 12:29 | TAL | $OVER.T9618C00.SGP |
| 00 | 012 | 006231 | 006513 | 006274 | | WHENCE^COMMAND | 29APR87 | 13:43 | TAL | $OVER.T9618C00.SBITMAP |
| 00 | 054 | 046617 | 046715 | 046617 | | WHYCANTREAD | 29APR87 | 13:44 | TAL | $OVER.T9618C00.SOBJECT |
| 00 | 013 | 006514 | 007217 | 006665 | | WRITEBITMAPTOFILE | 29APR87 | 13:43 | TAL | $OVER.T9618C00.SBITMAP |
| 00 | 043 | 037156 | 037252 | 037161 | | WRITELISTINGLINE | 03APR87 | 08:17 | TAL | $OVER.T9618C00.SLISTING |
| 00 | 044 | 037156 | 037252 | 037166 | E | WRITELISTINGLINE^NOMARK | 03APR87 | 08:17 | TAL | $OVER.T9618C00.SLISTING |

READ-ONLY DATA BLOCK MAP BY NAME

| SP | BASE | LIMIT | TYPE | MODE | NAME | DATE | TIME | LANGUAGE | SOURCE FILE |
|---|---|---|---|---|---|---|---|---|---|
| 00 | C001055 | 001073 | COMMON | STRING | ALREADYIN | 29APR87 | 13:16 | TAL | $OVER.T9618C00.SCOVERCM |
| 00 | C002177 | 002211 | COMMON | STRING | ASSUMESECONDS | 29APR87 | 13:16 | TAL | $OVER.T9618C00.SCOVERCM |
| 00 | C000276 | 000305 | COMMON | STRING | BINTOHEX | 29APR87 | 13:16 | TAL | $OVER.T9618C00.SCOVERCM |
| 00 | C000306 | 000326 | COMMON | STRING | BOTHBANDS | 29APR87 | 13:16 | TAL | $OVER.T9618C00.SCOVERCM |
| 00 | C000327 | 000344 | COMMON | STRING | BOTHPANDF | 29APR87 | 13:16 | TAL | $OVER.T9618C00.SCOVERCM |
| 00 | C000571 | 000617 | COMMON | STRING | CODEREQ | 29APR87 | 13:16 | TAL | $OVER.T9618C00.SCOVERCM |
| 00 | C000154 | 000274 | COMMON | STRING | COMMANDS | 29APR87 | 13:16 | TAL | $OVER.T9618C00.SCOVERCM |
| 00 | C000371 | 000407 | COMMON | STRING | CRCBINUSE | 29APR87 | 13:16 | TAL | $OVER.T9618C00.SCOVERCM |
| 00 | C002163 | 002176 | COMMON | STRING | DIFFERENTOBJECTSIZES | 29APR87 | 13:16 | TAL | $OVER.T9618C00.SCOVERCM |
| 00 | C001747 | 002015 | COMMON | STRING | DIFFERENTPROGS | 29APR87 | 13:16 | TAL | $OVER.T9618C00.SCOVERCM |
| 00 | C002017 | 002072 | COMMON | STRING | DIFFERENTTIMESTAMPS | 29APR87 | 13:16 | TAL | $OVER.T9618C00.SCOVERCM |
| 00 | C000620 | 000630 | COMMON | STRING | DISABLED | 29APR87 | 13:16 | TAL | $OVER.T9618C00.SCOVERCM |
| 00 | C000632 | 000647 | COMMON | STRING | ENABLEDNOPRIV | 29APR87 | 13:16 | TAL | $OVER.T9618C00.SCOVERCM |
| 00 | C000650 | 000663 | COMMON | STRING | ENABLEDPRIV | 29APR87 | 13:16 | TAL | $OVER.T9618C00.SCOVERCM |
| 00 | C000411 | 000441 | COMMON | STRING | ENABLEFE | 29APR87 | 13:16 | TAL | $OVER.T9618C00.SCOVERCM |
| 00 | C000443 | 000503 | COMMON | STRING | ENABLENP | 29APR87 | 13:16 | TAL | $OVER.T9618C00.SCOVERCM |
| 00 | C000761 | 000771 | COMMON | STRING | ERRORONF | 29APR87 | 13:16 | TAL | $OVER.T9618C00.SCOVERCM |
| 00 | C000773 | 001003 | COMMON | STRING | ERRORONFOCTAL | 29APR87 | 13:16 | TAL | $OVER.T9618C00.SCOVERCM |
| 00 | C001030 | 001053 | COMMON | STRING | FORMAT | 29APR87 | 13:16 | TAL | $OVER.T9618C00.SCOVERCM |
| 00 | C002221 | 002251 | COMMON | STRING | IGNORECPU | 29APR87 | 13:16 | TAL | $OVER.T9618C00.SCOVERCM |
| 00 | C001640 | 001663 | COMMON | STRING | INCOMPATIBLEOBJECT | 29APR87 | 13:16 | TAL | $OVER.T9618C00.SCOVERCM |

| | | | | | | | | | |
|---|---|---|---|---|---|---|---|---|---|
| 00 | C00 417 | 002456 | COMMON | STRING | INCONSISTENCY | 29APR87 | 13:16 | TAL | $OVER.T9618C00.SCOVERCM |
| 00 | C00 132 | 001150 | COMMON | STRING | INSMEM | 29APR87 | 13:16 | TAL | $OVER.T9618C00.SCOVERCM |
| 00 | C00 151 | 001170 | COMMON | STRING | INSPROCACCESS | 29APR87 | 13:16 | TAL | $OVER.T9618C00.SCOVERCM |
| 00 | C00 243 | 001266 | COMMON | STRING | INUSE | 29APR87 | 13:16 | TAL | $OVER.T9618C00.SCOVERCM |
| 00 | C00 171 | 001205 | COMMON | STRING | INVPIN | 29APR87 | 13:16 | TAL | $OVER.T9618C00.SCOVERCM |
| 00 | C00 310 | 001322 | COMMON | STRING | MISSINGINTO | 29APR87 | 13:16 | TAL | $OVER.T9618C00.SCOVERCM |
| 00 | C000505 | 000526 | COMMON | STRING | MONITOR | 29APR87 | 13:16 | TAL | $OVER.T9618C00.SCOVERCM |
| 00 | C000527 | 000541 | COMMON | STRING | MYSELF | 29APR87 | 13:16 | TAL | $OVER.T9618C00.SCOVERCM |
| 00 | C00 323 | 001344 | COMMON | STRING | NEITHER | 29APR87 | 13:16 | TAL | $OVER.T9618C00.SCOVERCM |
| 00 | C00 345 | 001367 | COMMON | STRING | NEITHERPINNOROBJECT | 29APR87 | 13:16 | TAL | $OVER.T9618C00.SCOVERCM |
| 00 | C00 370 | 001415 | COMMON | STRING | NEITHERPNORL | 29APR87 | 13:16 | TAL | $OVER.T9618C00.SCOVERCM |
| 00 | C00 547 | 001570 | COMMON | STRING | NEVERSAVED | 29APR87 | 13:16 | TAL | $OVER.T9618C00.SCOVERCM |
| 00 | C00 416 | 001433 | COMMON | STRING | NOFILE | 29APR87 | 13:16 | TAL | $OVER.T9618C00.SCOVERCM |
| 00 | C00 252 | 002263 | COMMON | STRING | NOLIB | 29APR87 | 13:16 | TAL | $OVER.T9618C00.SCOVERCM |
| 00 | C00 207 | 001242 | COMMON | STRING | NOLIBWITHG16 | 29APR87 | 13:16 | TAL | $OVER.T9618C00.SCOVERCM |
| 00 | C00 472 | 001513 | COMMON | STRING | NOMEASRUN | 29APR87 | 13:16 | TAL | $OVER.T9618C00.SCOVERCM |
| 00 | C00 514 | 001526 | COMMON | STRING | NOPIN | 29APR87 | 13:16 | TAL | $OVER.T9618C00.SCOVERCM |
| 00 | C00 265 | 002276 | COMMON | STRING | NOPROG | 29APR87 | 13:16 | TAL | $OVER.T9618C00.SCOVERCM |
| 00 | C00 571 | 001607 | COMMON | STRING | NOSAVEVOL | 29APR87 | 13:16 | TAL | $OVER.T9618C00.SCOVERCM |
| 00 | C000742 | 000757 | COMMON | STRING | NOSERVER | 29APR87 | 13:16 | TAL | $OVER.T9618C00.SCOVERCM |
| 00 | C001434 | 001451 | COMMON | STRING | NOSYMBOLS | 29APR87 | 13:16 | TAL | $OVER.T9618C00.SCOVERCM |
| 00 | C001665 | 001712 | COMMON | STRING | NOTANOBJECT | 29APR87 | 13:16 | TAL | $OVER.T9618C00.SCOVERCM |
| 00 | C001005 | 001026 | COMMON | STRING | NOTBITMAP | 29APR87 | 13:16 | TAL | $OVER.T9618C00.SCOVERCM |
| 00 | C001453 | 001471 | COMMON | STRING | NOTHINGTOMERGE | 29APR87 | 13:16 | TAL | $OVER.T9618C00.SCOVERCM |
| 00 | C000665 | 000706 | COMMON | STRING | NOTINSTALLED | 29APR87 | 13:16 | TAL | $OVER.T9618C00.SCOVERCM |
| 00 | C001115 | 001131 | COMMON | STRING | NOTINTABLE | 29APR87 | 13:16 | TAL | $OVER.T9618C00.SCOVERCM |
| 00 | C001611 | 001620 | COMMON | STRING | NOTINTERACTIVE | 29APR87 | 13:16 | TAL | $OVER.T9618C00.SCOVERCM |
| 00 | C001074 | 001113 | COMMON | STRING | NOTLOCAL | 29APR87 | 13:16 | TAL | $OVER.T9618C00.SCOVERCM |
| 00 | C001621 | 001637 | COMMON | STRING | NOTNUM | 29APR87 | 13:16 | TAL | $OVER.T9618C00.SCOVERCM |
| 00 | C001527 | 001546 | COMMON | STRING | NOTRUN | 29APR87 | 13:16 | TAL | $OVER.T9618C00.SCOVERCM |
| 00 | C000707 | 000740 | COMMON | STRING | NOTSUPPORTED | 29APR87 | 13:16 | TAL | $OVER.T9618C00.SCOVERCM |
| 00 | C00 121 | 002135 | COMMON | STRING | OK | 29APR87 | 13:16 | TAL | $OVER.T9618C00.SCOVERCM |
| 00 | C00 136 | 002162 | COMMON | STRING | PRIVNOTALLOWED | 29APR87 | 13:16 | TAL | $OVER.T9618C00.SCOVERCM |
| 00 | C00 543 | 000570 | COMMON | STRING | SPACEDIF | 29APR87 | 13:16 | TAL | $OVER.T9618C00.SCOVERCM |
| 00 | C001267 | 001306 | COMMON | STRING | STARTED | 29APR87 | 13:16 | TAL | $OVER.T9618C00.SCOVERCM |
| 00 | C002073 | 002120 | COMMON | STRING | SUPERONLY | 29APR87 | 13:16 | TAL | $OVER.T9618C00.SCOVERCM |
| 00 | C002212 | 002217 | COMMON | STRING | SYNTAXERR | 29APR87 | 13:16 | TAL | $OVER.T9618C00.SCOVERCM |
| 00 | C000346 | 000367 | COMMON | STRING | TABLEFULL | 29APR87 | 13:16 | TAL | $OVER.T9618C00.SCOVERCM |
| 00 | C002300 | 002325 | COMMON | STRING | UNABLEALLOC | 29APR87 | 13:16 | TAL | $OVER.T9618C00.SCOVERCM |
| 00 | C001713 | 001746 | COMMON | STRING | UNKNOWNRO^ | 29APR87 | 13:16 | TAL | $OVER.T9618C00.SCOVERCM |
| 00 | C002364 | 002416 | COMMON | STRING | WARNBEGINEND | 29APR87 | 13:16 | TAL | $OVER.T9618C00.SCOVERCM |
| 00 | C002327 | 002363 | COMMON | STRING | WARNBIND | 29APR87 | 13:16 | TAL | $OVER.T9618C00.SCOVERCM |
| 00 | C002460 | 002500 | COMMON | STRING | WARNSKIP | 29APR87 | 13:16 | TAL | $OVER.T9618C00.SCOVERCM |

DATA BLOCK MAP BY NAME

| BASE | LIMIT | TYPE | MODE | NAME | DATE | TIME | LANGUAGE | SOURCE FILE |
|---|---|---|---|---|---|---|---|---|
| 000000 | 000005 | COMMON | WORD | #GLOBAL | 29APR87 | 13:16 | TAL | $EM1.T9621C00.TBLFMT |
| 000217 | 003223 | COMMON | WORD | .INOUTSTUFF | 29APR87 | 13:16 | TAL | $OVER.T9618C00.DSIOLIB |
| 003634 | 006216 | COMMON | WORD | .MARKUP^DEFS | 29APR87 | 13:16 | TAL | $OVER.T9618C00.SCOVERCM |
| 006217 | 010306 | COMMON | WORD | .OBJECT^READING | 29APR87 | 13:16 | TAL | $OVER.T9618C00.DREADOBJ |
| 003224 | 003633 | COMMON | WORD | .PARSING^DEFS | 29APR87 | 13:16 | TAL | $OVER.T9618C00.SCOVERCM |
| 000035 | | COMMON | WORD | COMMAND^DEFS | 29APR87 | 13:16 | TAL | $OVER.T9618C00.SCOVERCM |
| 000217 | | COMMON | WORD | COVERROUTINE^DEFS | 29APR87 | 13:16 | TAL | $OVER.T9618C00.SVERSION |
| 000212 | | COMMON | WORD | ENVIRONMENT^REGISTER | 29APR87 | 13:16 | TAL | $OVER.T9618C00.DSVGN |

| | | | | | | | | |
|---|---|---|---|---|---|---|---|---|
| 000212 | 000216 | COMMON | WORD | GOTO^MAINLOOP^BLOCK | 29APR87 | 13:16 | TAL | $OVER.T9618C00.DSVGN |
| 000006 | 000034 | COMMON | WORD | INOUTSTUFF | 29APR87 | 13:16 | TAL | $OVER.T9618C00.DSIOLIB |
| 000075 | 000116 | COMMON | WORD | MARKUP^DEFS | 29APR87 | 13:16 | TAL | $OVER.T9618C00.SCOVERCM |
| 000052 | | COMMON | WORD | MESSAGE^DEFS | 29APR87 | 13:16 | TAL | $OVER.T9618C00.SCOVERCM |
| 000117 | 000211 | COMMON | WORD | OBJECT^READING | 29APR87 | 13:16 | TAL | $OVER.T9618C00.DREADOBJ |
| 000052 | 000074 | COMMON | WORD | PARSING^DEFS | 29APR87 | 13:16 | TAL | $OVER.T9618C00.SCOVERCM |
| 000035 | 000051 | COMMON | WORD | SERVER^DEFS | 29APR87 | 13:16 | TAL | $OVER.T9618C00.SCOVERCM |

ENTRY POINT MAP BY LOCATION
CODE SEGMENT 00

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 002 | 002501 | 002501 | 002501 | | T9618C00^15JUL87^BITMAP^29APR7 | 29APR87 | 13:43 | TAL | $OVER.T9618C00.SVERSION |
| 00 | 003 | 002502 | 003046 | 002711 | | BOOLEAN^BITMAPS | 29APR87 | 13:43 | TAL | $OVER.T9618C00.SBITMAP |
| 00 | 004 | 003047 | 004207 | 003072 | | BOOLEAN^COMMAND | 29APR87 | 13:43 | TAL | $OVER.T9618C00.SBITMAP |
| 00 | 005 | 004210 | 004267 | 004210 | | COMPUTEBITMAPSIZES | 29APR87 | 13:43 | TAL | $OVER.T9618C00.SBITMAP |
| 00 | 140 | 004270 | 004575 | 004362 | PC | MOVEBITMAPTOMEM | 29APR87 | 13:43 | TAL | $OVER.T9618C00.SBITMAP |
| 00 | 006 | 004576 | 004645 | 004576 | | POSITREADX | 29APR87 | 13:43 | TAL | $OVER.T9618C00.SBITMAP |
| 00 | 007 | 004646 | 005655 | 004747 | X | READBITMAPFILE | 29APR87 | 13:43 | TAL | $OVER.T9618C00.SBITMAP |
| 00 | 010 | 005656 | 006157 | 005662 | | SAVE^COMMAND | 29APR87 | 13:43 | TAL | $OVER.T9618C00.SBITMAP |
| 00 | 011 | 006160 | 006230 | 006160 | | TESTFORHIT | 29APR87 | 13:43 | TAL | $OVER.T9618C00.SBITMAP |
| 00 | 012 | 006231 | 006513 | 006274 | | WHENCE^COMMAND | 29APR87 | 13:43 | TAL | $OVER.T9618C00.SBITMAP |
| 00 | 013 | 006514 | 007217 | 006665 | | WRITEBITMAPTOFILE | 29APR87 | 13:43 | TAL | $OVER.T9618C00.SBITMAP |
| 00 | 014 | 007220 | 007220 | 007220 | | T9618C00^15JUL87^COVER^23APR7 | 23APR87 | 09:18 | TAL | $OVER.T9618C00.SVERSION |
| 00 | 015 | 007221 | 007262 | 007240 | | CANTTOUCH | 23APR87 | 09:18 | TAL | $OVER.T9618C00.SCOVER |
| 00 | 016 | 007263 | 007411 | 007300 | V | DEBUG^ERR | 23APR87 | 09:18 | TAL | $OVER.T9618C00.SCOVER |
| 00 | 017 | 007263 | 007411 | 007317 | EV | FINGER^ERR | 23APR87 | 09:18 | TAL | $OVER.T9618C00.SCOVER |
| 00 | 020 | 007412 | 007472 | 007415 | | DEBUGCODE | 23APR87 | 09:18 | TAL | $OVER.T9618C00.SCOVER |
| 00 | 021 | 007473 | 007610 | 007473 | | FIXIT | 23APR87 | 09:18 | TAL | $OVER.T9618C00.SCOVER |
| 00 | 022 | 007611 | 007703 | 007611 | V | FPRINTPOOF | 23APR87 | 09:18 | TAL | $OVER.T9618C00.SCOVER |
| 00 | 023 | 007704 | 010156 | 007704 | | INITIALIZE | 23APR87 | 09:18 | TAL | $OVER.T9618C00.SCOVER |
| 00 | 024 | 010157 | 010231 | 010157 | V | NEXTCHAR | 23APR87 | 09:18 | TAL | $OVER.T9618C00.SCOVER |
| 00 | 025 | 010232 | 010370 | 010273 | | PAGESIZE^COMMAND | 23APR87 | 09:18 | TAL | $OVER.T9618C00.SCOVER |
| 00 | 026 | 010371 | 010546 | 010403 | | PAUSE^COMMAND | 23APR87 | 09:18 | TAL | $OVER.T9618C00.SCOVER |
| 00 | 027 | 010547 | 011145 | 010623 | M | COVER | 23APR87 | 09:18 | TAL | $OVER.T9618C00.SCOVER |
| 00 | 030 | 011146 | 011146 | 011146 | | T9618C00^15JUL87^HELP^03APR7 | 03APR87 | 09:17 | TAL | $OVER.T9618C00.SVERSION |
| 00 | 031 | 011147 | 032160 | 031775 | | HELP^COMMAND | 03APR87 | 09:17 | TAL | $OVER.T9618C00.SHELP |
| 00 | 032 | 032161 | 032161 | 032161 | | T9618C00^15JUL87^LISTING^02APR7 | 03APR87 | 08:17 | TAL | $OVER.T9618C00.SVERSION |
| 00 | 033 | 032162 | 032725 | 032263 | | CHECKTOGGLES | 03APR87 | 08:17 | TAL | $OVER.T9618C00.SLISTING |
| 00 | 034 | 032726 | 033262 | 032726 | | COPYUNTILBEGIN | 03APR87 | 08:17 | TAL | $OVER.T9618C00.SLISTING |
| 00 | 035 | 033263 | 033441 | 033263 | | GETMARKER | 03APR87 | 08:17 | TAL | $OVER.T9618C00.SLISTING |
| 00 | 036 | 033442 | 033610 | 033442 | | GETUNIQUEPROC | 03APR87 | 08:17 | TAL | $OVER.T9618C00.SLISTING |
| 00 | 037 | 033611 | 033746 | 033611 | | LINENUMBER | 03APR87 | 08:17 | TAL | $OVER.T9618C00.SLISTING |
| 00 | 040 | 033747 | 035526 | 034153 | | MARKUP^COMMAND | 03APR87 | 08:17 | TAL | $OVER.T9618C00.SLISTING |
| 00 | 041 | 035527 | 036562 | 035537 | | OPENLISTINGFILES | 03APR87 | 08:17 | TAL | $OVER.T9618C00.SLISTING |
| 00 | 042 | 036563 | 037155 | 036752 | | READLISTINGLINE | 03APR87 | 08:17 | TAL | $OVER.T9618C00.SLISTING |
| 00 | 043 | 037156 | 037252 | 037161 | | WRITELISTINGLINE | 03APR87 | 08:17 | TAL | $OVER.T9618C00.SLISTING |
| 00 | 044 | 037156 | 037252 | 037166 | E | WRITELISTINGLINE^NOMARK | 03APR87 | 08:17 | TAL | $OVER.T9618C00.SLISTING |
| 00 | 045 | 037253 | 037253 | 037253 | | T9618C00^15JUL87^OBJECT^29APR7 | 29APR87 | 13:44 | TAL | $OVER.T9618C00.SVERSION |
| 00 | 046 | 037254 | 037364 | 037254 | | ANYPRIVPROCS | 29APR87 | 13:44 | TAL | $OVER.T9618C00.SOBJECT |
| 00 | 047 | 037365 | 040455 | 037664 | | BADSS^COMMAND | 29APR87 | 13:44 | TAL | $OVER.T9618C00.SOBJECT |
| 00 | 050 | 040456 | 040633 | 040456 | | CHECKFILESECURITY | 29APR87 | 13:44 | TAL | $OVER.T9618C00.SOBJECT |
| 00 | 051 | 040634 | 043321 | 042333 | | DISPLAY^COMMAND | 29APR87 | 13:44 | TAL | $OVER.T9618C00.SOBJECT |
| 00 | 052 | 043322 | 043453 | 043364 | | FORMATPROCSOURCEINFO | 29APR87 | 13:44 | TAL | $OVER.T9618C00.SOBJECT |
| 00 | 053 | 043454 | 044056 | 043565 | | LIST^COMMAND | 29APR87 | 13:44 | TAL | $OVER.T9618C00.SOBJECT |

| | | | | | | | | | | |
|---|---|---|---|---|---|---|---|---|---|---|
| 00 | 141 | 044057 | 046616 | 046117 | PC | MEASURE^COMMAND | 29APR87 | 13:44 | TAL | $OVER.T9618C00.SOBJECT |
| 00 | 054 | 046617 | 046715 | 046617 | | WHYCANTREAD | 29APR87 | 13:44 | TAL | $OVER.T9618C00.SOBJECT |
| 00 | 055 | 046716 | 046716 | 046716 | | T9618C00^15JUL87^SORT^07APR7 | 07APR87 | 10:51 | TAL | $OVER.T9618C00.SVERSION |
| 00 | 056 | 046717 | 051467 | 050157 | | SORT^COMMAND | 07APR87 | 10:51 | TAL | $OVER.T9618C00.SSORT |
| 00 | 057 | 051470 | 051470 | 051470 | | T9618C00^15JUL87^UPPER^29APR7 | 29APR87 | 16:04 | TAL | $OVER.T9618C00.SVERSION |
| 00 | 060 | 051471 | 051556 | 051471 | | CHECKSECURITY | 29APR87 | 16:04 | TAL | $OVER.T9618C00.SUPPER |
| 00 | 142 | 051557 | 051615 | 051557 | PC | DISABLEPRIV | 29APR87 | 16:04 | TAL | $OVER.T9618C00.SUPPER |
| 00 | 061 | 051616 | 052222 | 051621 | | DISABLE^COMMAND | 29APR87 | 16:04 | TAL | $OVER.T9618C00.SUPPER |
| 00 | 143 | 052223 | 052261 | 052223 | PC | ENABLEPRIV | 29APR87 | 16:04 | TAL | $OVER.T9618C00.SUPPER |
| 00 | 062 | 052262 | 053023 | 052265 | | ENABLE^COMMAND | 29APR87 | 16:04 | TAL | $OVER.T9618C00.SUPPER |
| 00 | 063 | 053024 | 053427 | 053126 | | ENV^COMMAND | 29APR87 | 16:04 | TAL | $OVER.T9618C00.SUPPER |
| 00 | 064 | 053430 | 053651 | 053472 | | ENV^INFO | 29APR87 | 16:04 | TAL | $OVER.T9618C00.SUPPER |
| 00 | 144 | 053652 | 053734 | 053652 | PC | GETOBJECTNAMES | 29APR87 | 16:04 | TAL | $OVER.T9618C00.SUPPER |
| 00 | 145 | 053735 | 054040 | 053735 | PC | GETPINVALUES | 29APR87 | 16:04 | TAL | $OVER.T9618C00.SUPPER |
| 00 | 146 | 054041 | 055173 | 054734 | PC | RESET^COMMAND | 29APR87 | 16:04 | TAL | $OVER.T9618C00.SUPPER |
| 00 | 065 | 055174 | 055174 | 055174 | | T9618C00^15JUL87^ORDER^07APR7 | 07APR87 | 18:38 | TAL | $OVER.T9618C00.SVERSION |
| 00 | 066 | 055175 | 061252 | 060436 | | ORDER^COMMAND | 07APR87 | 18:38 | TAL | $OVER.T9618C00.SORDER |
| 00 | 067 | 061253 | 061253 | 061253 | | T9618C00^15JUL87^GLOBAL^29APR7 | 29APR87 | 13:16 | TAL | $OVER.T9618C00.SVERSION |
| 00 | 070 | 061254 | 062254 | 061254 | X | SPOOLSTART | 12FEB87 | 12:37 | TAL | $OVER.T9618C00.LIBSRC |
| 00 | 071 | 062255 | 062515 | 062275 | X | SCANIDTA | 12FEB87 | 12:32 | TAL | $OVER.T9618C00.SSCAN |
| 00 | 072 | 062255 | 062515 | 062301 | EX | SCANIDT | 12FEB87 | 12:32 | TAL | $OVER.T9618C00.SSCAN |
| 00 | 073 | 062516 | 062661 | 062527 | X | SCANFNAME | 12FEB87 | 12:32 | TAL | $OVER.T9618C00.SSCAN |
| 00 | 074 | 062516 | 062661 | 062533 | EX | SCANDNAME | 12FEB87 | 12:32 | TAL | $OVER.T9618C00.SSCAN |
| 00 | 075 | 062662 | 063004 | 062662 | X | SCANINT | 12FEB87 | 12:32 | TAL | $OVER.T9618C00.SSCAN |
| 00 | 076 | 063005 | 064144 | 063036 | V | FPRINT | 12FEB87 | 12:30 | TAL | $OVER.T9618C00.SFPRINT |
| 00 | 077 | 063005 | 064144 | 063042 | EV | FPRINTABORT | 12FEB87 | 12:30 | TAL | $OVER.T9618C00.SFPRINT |
| 00 | 152 | 064145 | 064225 | 064145 | P | CRCB^EXISTS | 12FEB87 | 12:33 | TAL | $OVER.T9618C00.SUTIL1 |
| 00 | 100 | 064226 | 064447 | 064256 | V | MTIMESTAMPCOLLAPSE | 12FEB87 | 12:29 | TAL | $OVER.T9618C00.SGP |
| 00 | 101 | 064450 | 065004 | 064455 | | PRINT | 12FEB87 | 12:31 | TAL | $OVER.T9618C00.SSIOLIB |
| 00 | 102 | 064450 | 065004 | 064461 | E | PRINTABORT | 12FEB87 | 12:31 | TAL | $OVER.T9618C00.SSIOLIB |
| 00 | 103 | 065005 | 065625 | 065030 | | STARTUP | 12FEB87 | 12:31 | TAL | $OVER.T9618C00.SSIOLIB |
| 00 | 104 | 065626 | 065662 | 065632 | | TERMINATE | 12FEB87 | 12:31 | TAL | $OVER.T9618C00.SSIOLIB |
| 00 | 105 | 065626 | 065662 | 065636 | E | ABORT | 12FEB87 | 12:31 | TAL | $OVER.T9618C00.SSIOLIB |
| 00 | 106 | 065663 | 066200 | 065725 | V | PRINTHELP | 12FEB87 | 12:31 | TAL | $OVER.T9618C00.SSIOLIB |
| 00 | 107 | 066201 | 066311 | 066201 | | GETNEXTSTATEMENT | 17FEB87 | 15:46 | TAL | $OVER.T9618C00.SREADOBJ |
| 00 | 110 | 066312 | 066646 | 066312 | | GETNEXTPROCEDURE | 17FEB87 | 15:46 | TAL | $OVER.T9618C00.SREADOBJ |
| 00 | 111 | 066647 | 067121 | 066647 | | OPENOBJECTFILE | 17FEB87 | 15:46 | TAL | $OVER.T9618C00.SREADOBJ |
| 00 | 112 | 067122 | 067265 | 067122 | | POSITREAD | 17FEB87 | 15:46 | TAL | $OVER.T9618C00.SREADOBJ |
| 00 | 113 | 067266 | 067456 | 067317 | X | SCANID | 12FEB87 | 12:32 | TAL | $OVER.T9618C00.SSCAN |
| 00 | 114 | 067266 | 067456 | 067323 | EX | SCANALPHA | 12FEB87 | 12:32 | TAL | $OVER.T9618C00.SSCAN |
| 00 | 115 | 067457 | 067522 | 067463 | V | NOUT32 | 12FEB87 | 12:29 | TAL | $OVER.T9618C00.SGP |
| 00 | 116 | 067457 | 067522 | 067467 | EV | NOUT32M | 12FEB87 | 12:29 | TAL | $OVER.T9618C00.SGP |
| 00 | 117 | 067523 | 067610 | 067523 | | GETNEXTEPT | 17FEB87 | 15:46 | TAL | $OVER.T9618C00.SREADOBJ |
| 00 | 147 | 067611 | 067645 | 067611 | PC | TESTCOVERENABLED | 12FEB87 | 12:33 | TAL | $OVER.T9618C00.SUTIL1 |
| 00 | 120 | 067646 | 070724 | 070130 | V | PRINTBANNER | 12FEB87 | 12:31 | TAL | $OVER.T9618C00.SSIOLIB |
| 00 | 150 | 070725 | 070766 | 070725 | PC | GETOSVERDATE | 12FEB87 | 12:33 | TAL | $OVER.T9618C00.SUTIL1 |
| 00 | 151 | 070767 | 071035 | 070767 | PC | TESTCOVERHOOKS | 12FEB87 | 12:33 | TAL | $OVER.T9618C00.SUTIL1 |
| 00 | 121 | 071036 | 071136 | 071073 | V | SPOOL^CHECKMSG | 12FEB87 | 12:37 | TAL | $OVER.T9618C00.LIBSRC |
| 00 | 122 | 071137 | 072314 | 071315 | | SPOOL^CINV | 12FEB87 | 12:37 | TAL | $OVER.T9618C00.LIBSRC |
| 00 | 123 | 072315 | 072345 | 072315 | X | DEBLANK | 12FEB87 | 12:32 | TAL | $OVER.T9618C00.SSCAN |
| 00 | 124 | 072346 | 072724 | 072500 | V | NIN | 12FEB87 | 12:29 | TAL | $OVER.T9618C00.SGP |
| 00 | 125 | 072725 | 072771 | 072731 | V | NOUT | 12FEB87 | 12:29 | TAL | $OVER.T9618C00.SGP |
| 00 | 126 | 072725 | 072771 | 072735 | EV | NOUTM | 12FEB87 | 12:29 | TAL | $OVER.T9618C00.SGP |
| 00 | 127 | 072772 | 073355 | 073055 | V | NOUT64 | 12FEB87 | 12:29 | TAL | $OVER.T9618C00.SGP |
| 00 | 130 | 072772 | 073355 | 073065 | EV | NOUT64M | 12FEB87 | 12:29 | TAL | $OVER.T9618C00.SGP |
| 00 | 131 | 073356 | 073373 | 073356 | V | STARTUPSSTARTUPPROC | 12FEB87 | 12:31 | TAL | $OVER.T9618C00.SSIOLIB |
| 00 | 132 | 073374 | 073521 | 073374 | | GETSOURCEORD | 17FEB87 | 15:46 | TAL | $OVER.T9618C00.SREADOBJ |

| | | | | | | | | | | |
|---|---|---|---|---|---|---|---|---|---|---|
| 00 | 133 | 073522 | 073565 | 073522 | | CONVERTPITFORMAT | 17FEB87 | 15:46 | TAL | $OVER.T9618C00.SREADOBJ |
| 00 | 134 | 073566 | 073614 | 073566 | | RO^GET^BASE^NAME | 17FEB87 | 11:51 | TAL | $EM1.T9621C00.SHREADS |
| 00 | 135 | 073615 | 073674 | 073640 | | USERIDCOLLAPSE | 12FEB87 | 12:29 | TAL | $OVER.T9618C00.SGP |
| 00 | 136 | 073675 | 073754 | 073675 | V | SYSIDCOLLAPSE | 12FEB87 | 12:29 | TAL | $OVER.T9618C00.SGP |
| 00 | 137 | 073755 | 074016 | 073755 | V | CRTPIDCOLLAPSE | 12FEB87 | 12:29 | TAL | $OVER.T9618C00.SGP |
| 00 | 153 | 074017 | 074063 | 074017 | P | LABELTOAXADR | 12FEB87 | 12:33 | TAL | $OVER.T9618C00.SUTIL1 |

```
Code size = 30772 words
  PEP = 108 words
  Globa  P-relative arrays = 1237 words
  Procedures = 29427 words
  Gap at 32K = 0 words
  XEP = 73 words
Code area size = 31 pages

Resident code size = 0 pages
```

READ-ONLY DATA BLOCK MAP BY LOCATION
CODE SEGMENT 00

| SP | BASE | LIMIT | TYPE | MODE | NAME | DATE | TIME | LANGUAGE | SOURCE FILE |
|---|---|---|---|---|---|---|---|---|---|
| 00 | C00C154 | 000274 | COMMON | STRING | COMMANDS | 29APR87 | 13:16 | TAL | $OVER.T9618C00.SCOVERCM |
| 00 | C00C276 | 000305 | COMMON | STRING | BINTOHEX | 29APR87 | 13:16 | TAL | $OVER.T9618C00.SCOVERCM |
| 00 | C00C306 | 000326 | COMMON | STRING | BOTHBANDS | 29APR87 | 13:16 | TAL | $OVER.T9618C00.SCOVERCM |
| 00 | C00C327 | 000344 | COMMON | STRING | BOTHPANDF | 29APR87 | 13:16 | TAL | $OVER.T9618C00.SCOVERCM |
| 00 | C00C346 | 000367 | COMMON | STRING | TABLEFULL | 29APR87 | 13:16 | TAL | $OVER.T9618C00.SCOVERCM |
| 00 | C00C371 | 000407 | COMMON | STRING | CRCBINUSE | 29APR87 | 13:16 | TAL | $OVER.T9618C00.SCOVERCM |
| 00 | C00C411 | 000441 | COMMON | STRING | ENABLEFE | 29APR87 | 13:16 | TAL | $OVER.T9618C00.SCOVERCM |
| 00 | C00C443 | 000503 | COMMON | STRING | ENABLENP | 29APR87 | 13:16 | TAL | $OVER.T9618C00.SCOVERCM |
| 00 | C00C505 | 000526 | COMMON | STRING | MONITOR | 29APR87 | 13:16 | TAL | $OVER.T9618C00.SCOVERCM |
| 00 | C00C527 | 000541 | COMMON | STRING | MYSELF | 29APR87 | 13:16 | TAL | $OVER.T9618C00.SCOVERCM |
| 00 | C00C543 | 000570 | COMMON | STRING | SPACEDIF | 29APR87 | 13:16 | TAL | $OVER.T9618C00.SCOVERCM |
| 00 | C00C571 | 000617 | COMMON | STRING | CODEREQ | 29APR87 | 13:16 | TAL | $OVER.T9618C00.SCOVERCM |
| 00 | C00C620 | 000630 | COMMON | STRING | DISABLED | 29APR87 | 13:16 | TAL | $OVER.T9618C00.SCOVERCM |
| 00 | C00C632 | 000647 | COMMON | STRING | ENABLEDNOPRIV | 29APR87 | 13:16 | TAL | $OVER.T9618C00.SCOVERCM |
| 00 | C00C650 | 000663 | COMMON | STRING | ENABLEDPRIV | 29APR87 | 13:16 | TAL | $OVER.T9618C00.SCOVERCM |
| 00 | C00C665 | 000706 | COMMON | STRING | NOTINSTALLED | 29APR87 | 13:16 | TAL | $OVER.T9618C00.SCOVERCM |
| 00 | C00C707 | 000740 | COMMON | STRING | NOTSUPPORTED | 29APR87 | 13:16 | TAL | $OVER.T9618C00.SCOVERCM |
| 00 | C00C742 | 000757 | COMMON | STRING | NOSERVER | 29APR87 | 13:16 | TAL | $OVER.T9618C00.SCOVERCM |
| 00 | C000761 | 000771 | COMMON | STRING | ERRORONF | 29APR87 | 13:16 | TAL | $OVER.T9618C00.SCOVERCM |
| 00 | C000773 | 001003 | COMMON | STRING | ERRORONFOCTAL | 29APR87 | 13:16 | TAL | $OVER.T9618C00.SCOVERCM |
| 00 | C001005 | 001026 | COMMON | STRING | NOTBITMAP | 29APR87 | 13:16 | TAL | $OVER.T9619C00.SCOVERCM |
| 00 | C001030 | 001053 | COMMON | STRING | FORMAT | 29APR87 | 13:16 | TAL | $OVER.T9618C00.SCOVERCM |
| 00 | C001055 | 001073 | COMMON | STRING | ALREADYIN | 29APR87 | 13:16 | TAL | $OVER.T9618C00.SCOVERCM |
| 00 | C001074 | 001113 | COMMON | STRING | NOTLOCAL | 29APR87 | 13:16 | TAL | $OVER.T9618C00.SCOVERCM |
| 00 | C001115 | 001131 | COMMON | STRING | NOTINTABLE | 29APR87 | 13:16 | TAL | $OVER.T9618C00.SCOVERCM |
| 00 | C001132 | 001150 | COMMON | STRING | INSMEM | 29APR87 | 13:16 | TAL | $OVER.T9618C00.SCOVERCM |
| 00 | C001151 | 001170 | COMMON | STRING | INSPROCACCESS | 29APR87 | 13:16 | TAL | $OVER.T9618C00.SCOVERCM |
| 00 | C001171 | 001205 | COMMON | STRING | INVPIN | 29APR87 | 13:16 | TAL | $OVER.T9618C00.SCOVERCM |
| 00 | C001207 | 001242 | COMMON | STRING | NOLIBWITHG16 | 29APR87 | 13:16 | TAL | $OVER.T9618C00.SCOVERCM |
| 00 | C001243 | 001266 | COMMON | STRING | INUSE | 29APR87 | 13:16 | TAL | $OVER.T9618C00.SCOVERCM |
| 00 | C001267 | 001306 | COMMON | STRING | STARTED | 29APR87 | 13:16 | TAL | $OVER.T9618C00.SCOVERCM |
| 00 | C001310 | 001322 | COMMON | STRING | MISSINGINTO | 29APR87 | 13:16 | TAL | $OVER.T9618C00.SCOVERCM |

| | | | | | | | | | |
|---|---|---|---|---|---|---|---|---|---|
| 00 | C001323 | 001344 | COMMON | STRING | NEITHER | 29APR87 | 13:16 | TAL | $OVER.T9618C00.SCOVERCM |
| 00 | C001345 | 001367 | COMMON | STRING | NEITHERPINNOROBJECT | 29APR87 | 13:16 | TAL | $OVER.T9618C00.SCOVERCM |
| 00 | C001370 | 001415 | COMMON | STRING | NEITHERPNORL | 29APR87 | 13:16 | TAL | $OVER.T9618C00.SCOVERCM |
| 00 | C001416 | 001433 | COMMON | STRING | NOFILE | 29APR87 | 13:16 | TAL | $OVER.T9618C00.SCOVERCM |
| 00 | C001434 | 001451 | COMMON | STRING | NOSYMBOLS | 29APR87 | 13:16 | TAL | $OVER.T9618C00.SCOVERCM |
| 00 | C001453 | 001471 | COMMON | STRING | NOTHINGTOMERGE | 29APR87 | 13:16 | TAL | $OVER.T9618C00.SCOVERCM |
| 00 | C001472 | 001513 | COMMON | STRING | NOMEASRUN | 29APR87 | 13:16 | TAL | $OVER.T9618C00.SCOVERCM |
| 00 | C001514 | 001526 | COMMON | STRING | NOPIN | 29APR87 | 13:16 | TAL | $OVER.T9618C00.SCOVERCM |
| 00 | C001527 | 001546 | COMMON | STRING | NOTRUN | 29APR87 | 13:16 | TAL | $OVER.T9618C00.SCOVERCM |
| 00 | C001547 | 001570 | COMMON | STRING | NEVERSAVED | 29APR87 | 13:16 | TAL | $OVER.T9618C00.SCOVERCM |
| 00 | C001571 | 001607 | COMMON | STRING | NOSAVEVOL | 29APR87 | 13:16 | TAL | $OVER.T9618C00.SCOVERCM |
| 00 | C001611 | 001620 | COMMON | STRING | NOTINTERACTIVE | 29APR87 | 13:16 | TAL | $OVER.T9618C00.SCOVERCM |
| 00 | C001621 | 001637 | COMMON | STRING | NOTNUM | 29APR87 | 13:16 | TAL | $OVER.T9618C00.SCOVERCM |
| 00 | C001640 | 001663 | COMMON | STRING | INCOMPATIBLEOBJECT | 29APR87 | 13:16 | TAL | $OVER.T9618C00.SCOVERCM |
| 00 | C001665 | 001712 | COMMON | STRING | NOTANOBJECT | 29APR87 | 13:16 | TAL | $OVER.T9618C00.SCOVERCM |
| 00 | C001713 | 001746 | COMMON | STRING | UNKNOWNRO^ | 29APR87 | 13:16 | TAL | $OVER.T9618C00.SCOVERCM |
| 00 | C001747 | 002015 | COMMON | STRING | DIFFERENTPROGS | 29APR87 | 13:16 | TAL | $OVER.T9618C00.SCOVERCM |
| 00 | C002017 | 002072 | COMMON | STRING | DIFFERENTTIMESTAMPS | 29APR87 | 13:16 | TAL | $OVER.T9618C00.SCOVERCM |
| 00 | C002073 | 002120 | COMMON | STRING | SUPERONLY | 29APR87 | 13:16 | TAL | $OVER.T9618C00.SCOVERCM |
| 00 | C002121 | 002135 | COMMON | STRING | OK | 29APR87 | 13:16 | TAL | $OVER.T9618C00.SCOVERCM |
| 00 | C002136 | 002162 | COMMON | STRING | PRIVNOTALLOWED | 29APR87 | 13:16 | TAL | $OVER.T9618C00.SCOVERCM |
| 00 | C002163 | 002176 | COMMON | STRING | DIFFERENTOBJECTSIZES | 29APR87 | 13:16 | TAL | $OVER.T9618C00.SCOVERCM |
| 00 | C002177 | 002211 | COMMON | STRING | ASSUMESECONDS | 29APR87 | 13:16 | TAL | $OVER.T9618C00.SCOVERCM |
| 00 | C002212 | 002217 | COMMON | STRING | SYNTAXERR | 29APR87 | 13:16 | TAL | $OVER.T9618C00.SCOVERCM |
| 00 | C002221 | 002251 | COMMON | STRING | IGNORECPU | 29APR87 | 13:16 | TAL | $OVER.T9618C00.SCOVERCM |
| 00 | C002252 | 002263 | COMMON | STRING | NOLIB | 29APR87 | 13:16 | TAL | $OVER.T9618C00.SCOVERCM |
| 00 | C002265 | 002276 | COMMON | STRING | NOPROG | 29APR87 | 13:16 | TAL | $OVER.T9618C00.SCOVERCM |
| 00 | C002300 | 002325 | COMMON | STRING | UNABLEALLOC | 29APR87 | 13:16 | TAL | $OVER.T9618C00.SCOVERCM |
| 00 | C002327 | 002363 | COMMON | STRING | WARNBIND | 29APR87 | 13:16 | TAL | $OVER.T9618C00.SCOVERCM |
| 00 | C002364 | 002416 | COMMON | STRING | WARNBEGINEND | 29APR87 | 13:16 | TAL | $OVER.T9618C00.SCOVERCM |
| 00 | C002417 | 002456 | COMMON | STRING | INCONSISTENCY | 29APR87 | 13:16 | TAL | $OVER.T9618C00.SCOVERCM |
| 00 | C002460 | 002500 | COMMON | STRING | WARNSKIP | 29APR87 | 13:16 | TAL | $OVER.T9618C00.SCOVERCM |

DATA BLOCK MAP BY LOCATION

| BASE | LIMIT | TYPE | MODE | NAME | DATE | TIME | LANGUAGE | SOURCE FILE |
|---|---|---|---|---|---|---|---|---|
| 000000 | 000005 | COMMON | WORD | #GLOBAL | 29APR87 | 13:16 | TAL | $EM1.T9621C00.TBLFMT |
| 000006 | 000034 | COMMON | WORD | INOUTSTUFF | 29APR87 | 13:16 | TAL | $OVER.T9618C00.DSIOLIB |
| 000035 | | COMMON | WORD | COMMAND^DEFS | 29APR87 | 13:16 | TAL | $OVER.T9618C00.SCOVERCM |
| 000035 | 000051 | COMMON | WORD | SERVER^DEFS | 29APR87 | 13:16 | TAL | $OVER.T9618C00.SCOVERCM |
| 000052 | | COMMON | WORD | MESSAGE^DEFS | 29APR87 | 13:16 | TAL | $OVER.T9618C00.SCOVERCM |
| 000052 | 000074 | COMMON | WORD | PARSING^DEFS | 29APR87 | 13:16 | TAL | $OVER.T9618C00.SCOVERCM |
| 000075 | 000116 | COMMON | WORD | MARKUP^DEFS | 29APR87 | 13:16 | TAL | $OVER.T9618C00.SCOVERCM |
| 000117 | 000211 | COMMON | WORD | OBJECT^READING | 29APR87 | 13:16 | TAL | $OVER.T9618C00.DREADOBJ |
| 000212 | | COMMON | WORD | ENVIRONMENT^REGISTER | 29APR87 | 13:16 | TAL | $OVER.T9618C00.DSVGN |
| 000212 | 000216 | COMMON | WORD | GOTO^MAINLOOP^BLOCK | 29APR87 | 13:16 | TAL | $OVER.T9618C00.DSVGN |
| 000217 | | COMMON | WORD | COVERROUTINE^DEFS | 29APR87 | 13:16 | TAL | $OVER.T9618C00.SVERSION |
| 000217 | 003223 | COMMON | WORD | .INOUTSTUFF | 29APR87 | 13:16 | TAL | $OVER.T9618C00.DSIOLIB |
| 003224 | 003633 | COMMON | WORD | .PARSING^DEFS | 29APR87 | 13:16 | TAL | $OVER.T9618C00.SCOVERCM |
| 003634 | 006216 | COMMON | WORD | .MARKUP^DEFS | 29APR87 | 13:16 | TAL | $OVER.T9618C00.SCOVERCM |
| 006217 | 010306 | COMMON | WORD | .OBJECT^READING | 29APR87 | 13:16 | TAL | $OVER.T9618C00.DREADOBJ |

ENTRY POINT CROSS REFERENCE

| REFERENCED ENTRY POINT | REFERENCING CODE BLOCK | WORD OFFSET OF REFERENCES |
|---|---|---|
| ABEND | INITIALIZE | 00244 |
| | TERMINATE | 00025 |
| ABORT | FPRINT | 00130 00242 01123 |
| | PRINT | 00022 00157 00263 00316 |
| ALLOCATESEGMENT | INITIALIZE | 00204 |
| ANYPRIVPROCS | MEASURE^COMMAND | 01347 |
| BADSS^COMMAND | COVER | 00235 |
| BOOLEAN^BITMAPS | BOOLEAN^COMMAND | 01113 |
| BOOLEAN^COMMAND | COVER | 00233 00302 00324 |
| CANTTOUCH | INITIALIZE | 00236 |
| | ORDER^COMMAND | 01101 03755 04043 |
| | READBITMAPFILE | 00135 00552 |
| CHECKFILESECURITY | MEASURE^COMMAND | 00312 00433 01313 |
| | RESET^COMMAND | 00427 |
| CHECKSECURITY | BOOLEAN^COMMAND | 00352 |
| | DISPLAY^COMMAND | 02173 |
| | MEASURE^COMMAND | 00272 |
| | RESET^COMMAND | 00012 |
| | SAVE^COMMAND | 00235 |
| | SORT^COMMAND | 01735 |
| CHECKTOGGLES | READLISTINGLINE | 00351 |
| CHECK^BREAK | PRINT | 00014 00145 |
| CHECK^FILE | BADSS^COMMAND | 00644 |
| | PRINT | 00046 00061 |
| | STARTUP | 00156 00165 00174 |
| CLOSE | DISABLE^COMMAND | 00315 |
| | DISPLAY^COMMAND | 02431 02464 |
| | ENABLE^COMMAND | 00352 |
| | GETUNIQUEPROC | 00031 |
| | MARKUP^COMMAND | 01522 01540 01553 |
| | MEASURE^COMMAND | 00402 00411 00523 00532 01071 01355 01435 01444 |
| | OPENLISTINGFILES | 00035 00053 00250 00330 00363 00434 |
| | OPENOBJECTFILE | 00245 |
| | ORDER^COMMAND | 01563 01726 02060 02114 02140 |
| | POSITREADX | 00045 |
| | PRINTBANNER | 00153 |
| | READBITMAPFILE | 00417 00476 00542 00560 01002 |
| | RESET^COMMAND | 00342 |
| | SORT^COMMAND | 02271 02317 02537 |
| | WRITEBITMAPTOFILE | 00452 00464 |
| CLOSE^FILE | BADSS^COMMAND | 00653 01051 |
| | TERMINATE | 00015 |
| COMPUTEBITMAPSIZES | READBITMAPFILE | 00661 |
| | WRITEBITMAPTOFILE | 00161 |
| CONTIME | MTIMESTAMPCOLLAPSE | 00045 |
| CONTROL | SPOOLSTART | 00437 |
| | WRITEBITMAPTOFILE | 00377 |
| CONVERTFILEFORMAT | GETNEXTPROCEDURE | 00055 |
| COPYUNTILBEGIN | MARKUP^COMMAND | 01355 |
| COVERHOOK1 | TESTCOVERHOOKS | 00014 |
| CRCB^EXISTS | DISABLEPRIV | 00011 |
| | ENABLEPRIV | 00011 |
| | GETOBJECTNAMES | 00011 |
| | GETPENVALUES | 00016 |
| | MEASURE^COMMAND | 00566 01204 01451 |

| | | |
|---|---|---|
| | MOVEBITMAPTOMEM | 00116 |
| | RESET^COMMAND | 00022 00452 |
| CREATE | INITIALIZE | 00147 |
| | SPOOLSTART | 00056 |
| | WRITEBITMAPTOFILE | 00173 |
| CREATORACCESSID | DISABLE^COMMAND | 00067 |
| | ENABLE^COMMAND | 00071 |
| | OPENLISTINGFILES | 00315 |
| | PRINTBANNER | 00755 00760 |
| | SPOOLSTART | 00612 |
| CRTPIDCCLLAPSE | PRINTBANNER | 00545 00704 |
| DEBLANK | SCANFNAME | 00045 00140 |
| | SCANID | 00043 00164 |
| | SCANIDTA | 00032 00177 |
| | SCANINT | 00010 |
| DEBUG | DEBUGCODE | 00033 |
| | DEBUG^ERR | 00106 |
| | FPRINTPOOF | 00054 |
| | ORDER^COMMAND | 01460 01566 01731 02063 02117 |
| | READBITMAPFILE | 00114 00141 00221 00270 00347 00436 00514 00563 00637 00712 |
| | | 00761 |
| DEBUGCODE | COVER | 00243 |
| DEBUG^ERR | BADSS^COMMAND | 00357 00403 00432 00441 00467 00501 |
| | BOOLEAN^COMMAND | 00071 00125 00136 00174 00205 00241 00257 00266 00317 00333 |
| | | 00345 00475 00515 00637 00657 01027 01045 01065 01105 |
| | COVER | 00043 00265 00331 |
| | DEBUGCODE | 00032 00040 00057 |
| | DISABLE^COMMAND | 00033 00042 00066 |
| | DISPLAY^COMMAND | 01553 01622 01671 01725 01766 02003 02016 02033 02043 02060 |
| | | 02066 02122 02136 |
| | ENABLE^COMMAND | 00035 00044 00070 |
| | ENV^COMMAND | 00140 00152 00162 00207 |
| | HELP^COMMAND | 20775 |
| | LIST^COMMAND | 00131 00142 |
| | MARKUP^COMMAND | 00262 00314 00346 00400 00412 00447 00460 00511 00544 00563 |
| | MEASURE^COMMAND | 02115 02124 02173 02231 02272 02324 02405 02424 02443 02452 |
| | | 02506 |
| | ORDER^COMMAND | 03365 03452 03505 03533 03564 03602 |
| | PAGESIZE^COMMAND | 00101 |
| | PAUSE^COMMAND | 00150 |
| | RESET^COMMAND | 00734 00743 01004 01023 01053 01101 |
| | SAVE^COMMAND | 00041 00073 00124 00151 00164 00177 |
| | SORT^COMMAND | 01363 01432 01501 01535 01576 01613 01626 01661 01714 01730 |
| | WHENCE^COMMAND | 00065 00116 |
| DELAY | PAUSE^COMMAND | 00153 |
| DEVICEINFO | OPENLISTINGFILES | 00113 |
| | STARTUP | 00202 00207 |
| DISABLEPRIV | DISABLE^COMMAND | 00142 |
| DISABLE^COMMAND | COVER | 00245 |
| DISPLAY^COMMAND | COVER | 00247 |
| DNUMIN | LINENUMBER | 00025 |
| ENABLEPRIV | ENABLE^COMMAND | 00456 |
| ENABLE^COMMAND | COVER | 00251 |
| ENV^COMMAND | COVER | 00253 |
| ENV^INFO | ENV^COMMAND | 00212 |
| | INITIALIZE | 0004[illegible] |
| FILEERROR | PRINTBANNER | 00121 00145 00214 |

| | | |
|---|---|---|
| FILEINFO | BADSS^COMMAND | 00531 |
| | BOOLEAN^COMMAND | 00421 |
| | CHECKFILESECURITY | 00020 |
| | DISABLE^COMMAND | 00235 00276 |
| | DISPLAY^COMMAND | 00435 |
| | ENABLE^COMMAND | 00247 00333 |
| | INITIALIZE | 00161 |
| | LIST^COMMAND | 00173 |
| | MARKUP^COMMAND | 00763 |
| | MEASURE^COMMAND | 00737 01052 |
| | OPENLISTINGFILES | 00211 00564 |
| | OPENOBJECTFILE | 00036 00104 |
| | ORDER^COMMAND | 00273 01511 |
| | POSITREAD | 00050 00114 |
| | POSITREADX | 00040 |
| | PRINTBANNER | 00202 |
| | READBITMAPFILE | 00200 00330 00412 00620 |
| | SAVE^COMMAND | 00211 |
| | SORT^COMMAND | 00517 |
| | SPOOLSTART | 00413 00714 |
| | WRITEBITMAPTOFILE | 00041 00205 00234 00302 00326 00350 00367 00413 |
| FINGER^ERR | BOOLEAN^COMMAND | 00111 00160 00225 |
| | COVER | 00024 |
| | DISPLAY^COMMAND | 01575 01611 01642 01656 01711 01750 |
| | MARKUP^COMMAND | 00302 00334 00366 00434 00500 |
| | MEASURE^COMMAND | 01310 02150 02213 02251 02312 02344 02372 |
| | ORDER^COMMAND | 03406 03431 03472 03525 |
| | PAGESIZE^COMMAND | 00070 |
| | PAUSE^COMMAND | 00044 |
| | RESET^COMMAND | 00424 01043 |
| | SAVE^COMMAND | 00063 00116 |
| | SORT^COMMAND | 01405 01421 01452 01466 01521 01560 01653 |
| | WHENCE^COMMAND | 00105 |
| FIXIT | COVER | 00044 |
| FIXSTRING | FIXIT | 00111 |
| FNAMECOLLAPSE | CRTPIDCOLLAPSE | 00032 |
| | FPRINT | 00567 |
| | PRINTBANNER | 00074 |
| FNAMECOMPARE | BOOLEAN^COMMAND | 00546 00710 |
| | ORDER^COMMAND | 00326 00346 |
| | STARTUP | 00213 00257 00410 |
| FNAMEEXPAND | SCANFNAME | 00061 |
| FORMATPROCSOURCEINFO | BADSS^COMMAND | 00634 |
| | DISPLAY^COMMAND | 01102 |
| | LIST^COMMAND | 00273 |
| FPRINT | BADSS^COMMAND | 01066 |
| | BOOLEAN^COMMAND | 00374 00442 00562 00614 00724 00756 01131 |
| | CANTTOUCH | 00034 |
| | CHECKSECURITY | 00061 |
| | CHECKTOGGLES | 00231 00304 00347 |
| | DEBUG^ERR | 00100 |
| | DISABLE^COMMAND | 00102 00122 00136 00153 00247 00331 00350 00365 00401 |
| | DISPLAY^COMMAND | 00571 00646 00716 01472 02213 02336 02361 02404 |
| | ENABLE^COMMAND | 00104 00124 00221 00270 00366 00405 00424 00450 00467 00503 |
| | | 00517 |
| | ENV^INFO | 00125 |
| | FORMATPROCSOURCEINFO | 00075 00123 |

| | | |
|---|---|---|
| | FPRINTPOOF | 00072 |
| | MARKUP^COMMAND | 00637 00660 00701 01052 01101 01141 01216 01264 01327 01455 01473 01511 |
| | MEASURE^COMMAND | 00052 00106 00167 00226 00262 00555 00604 00644 01106 01130 01151 01171 01270 01366 01473 01530 01603 02033 02524 |
| | OPENLISTINGFILES | 00155 00224 00272 00310 00343 00405 00423 00472 00510 00535 00577 00634 00652 00741 00757 |
| | ORDER^COMMAND | 00550 00673 00732 01000 01045 02263 03623 03641 03720 04022 |
| | PAGESIZE^COMMAND | 00134 |
| | PAUSE^COMMAND | 00107 00136 |
| | PRINT | 00254 |
| | READBITMAPFILE | 00215 00264 00343 00432 00510 00633 00706 00755 |
| | READLISTINGLINE | 00310 00326 |
| | RESET^COMMAND | 00040 00127 00313 00353 00403 00474 00625 00666 00770 01117 |
| | SAVE^COMMAND | 00225 00255 00276 |
| | SORT^COMMAND | 00421 00651 00726 00776 01164 01756 02101 02124 02147 02352 02443 02510 |
| | WHYCANTREAD | 00015 00035 00055 00073 |
| | WRITEBITMAPTOFILE | 00477 |
| | WRITELISTINGLINE | 00052 00070 |
| FPRINTABORT | ENV^INFO | 00141 |
| | INITIALIZE | 00061 00173 00221 |
| | STARTUP | 00252 |
| FPRINTPOOF | BADSS^COMMAND | 00555 00630 01003 01031 |
| | DISPLAY^COMMAND | 00471 00534 00771 01043 01066 01165 01226 01270 01372 01406 02152 02166 02231 02254 |
| | ENV^COMMAND | 00236 00306 00330 00357 00402 |
| | ENV^INFO | 00156 00171 00204 |
| | LIST^COMMAND | 00217 00244 00266 00342 00367 |
| | MARKUP^COMMAND | 00605 01007 |
| | MEASURE^COMMAND | 00364 00505 01417 |
| | ORDER^COMMAND | 00602 00632 01542 01630 01670 02515 02701 |
| | SORT^COMMAND | 00551 00614 01774 02017 |
| | WHENCE^COMMAND | 00174 00260 |
| GETCPCBINFO | CHECKFILESECURITY | 00037 |
| GETCRTPID | CRTPIDCOLLAPSE | 00026 |
| | PRINTBANNER | 00515 |
| GETMARKER | MARKUP^COMMAND | 01413 |
| GETNEXTEPT | DISPLAY^COMMAND | 01001 |
| | LIST^COMMAND | 00247 |
| GETNEXTPROCEDURE | BADSS^COMMAND | 00560 |
| | DISPLAY^COMMAND | 00743 |
| | GETUNIQUEPROC | 00016 |
| | LIST^COMMAND | 00222 |
| | MEASURE^COMMAND | 00342 00463 01375 |
| | ORDER^COMMAND | 01774 |
| | SORT^COMMAND | 01022 |
| GETNEXTSTATEMENT | BADSS^COMMAND | 00734 |
| | DISPLAY^COMMAND | 01107 |
| | GETMARKER | 00121 |
| | GETNEXTPROCEDURE | 00321 |
| | GETUNIQUEPROC | 00067 00114 |
| | LIST^COMMAND | 00300 |
| | ORDER^COMMAND | 02004 |
| | SORT^COMMAND | 01062 |
| GETOBJECTNAMES | ENV^COMMAND | 00221 |
| GETOSVERDATE | ENV^INFO | 00103 |

| | | | | |
|---|---|---|---|---|
| GETPINVALUES | ENV^COMMAND | 00337 | | |
| GETSOURCEORD | GETNEXTPROCEDURE | 00247 | | |
| | GETNEXTSTATEMENT | 00062 | | |
| GETSYSTEMNAME | SYSIDCOLLAPSE | 00023 | | |
| GETUNIQUEPROC | MARKUP^COMMAND | 01365 | | |
| HELP^COMMAND | COVER | 00270 | | |
| INITIAL ZE | COVER | 00070 | | |
| INITIAL ZER | STARTUP | 00134 | | |
| LABELTOAXADR | GETOSVERDATE | 00004 | | |
| | TESTCOVERHOOKS | 00004 | | |
| LINENUMBER | MARKUP^COMMAND | 01407 | | |
| LIST^COMMAND | COVER | 00272 | | |
| LOOKUPPROCESSNAME | PRINTBANNER | 00561 | | |
| MARKUP^COMMAND | COVER | 00274 | | |
| MEASURE^COMMAND | COVER | 00276 | | |
| MOVEBITMAPTOMEM | BOOLEAN^COMMAND | 00361 | | |
| | DISPLAY^COMMAND | 02200 | | |
| | SAVE^COMMAND | 00242 | | |
| | SORT^COMMAND | 01743 | | |
| MTIMESTAMPCOLLAPSE | BADSS^COMMAND | 00537 | | |
| | DISPLAY^COMMAND | 00444 | | |
| | FORMATPROCSOURCEINFO | 00110 | | |
| | LIST^COMMAND | 00201 | | |
| | MARKUP^COMMAND | 00771 | | |
| | ORDER^COMMAND | 01520 | | |
| | PRINTBANNER | 00241 | 00724 | |
| | SORT^COMMAND | 00526 | | |
| | WHENCE^COMMAND | 00147 | 00231 | |
| MYPID | CHECKSECURITY | 00010 | | |
| | COVER | 00054 | | |
| | CRTPIDCOLLAPSE | 00023 | | |
| | DISABLE^COMMAND | 00202 | | |
| | ENABLE^COMMAND | 00147 | | |
| | ENV^INFO | 00057 | | |
| | INITIALIZE | 00015 | 00030 | 00106 |
| | MEASURE^COMMAND | 00704 | | |
| | PRINTBANNER | 00431 | 00512 | |
| | RESET^COMMAND | 00256 | | |
| | SORT^COMMAND | 02170 | | |
| MYSYSTEMNUMBER | SYSIDCOLLAPSE | 00020 | | |
| NEWPROCESS | ENABLE^COMMAND | 00176 | | |
| NEXTCHAR | BADSS^COMMAND | 00322 | 00462 | |
| | BOOLEAN^COMMAND | 00050 | 00312 | |
| | COVER | 00031 | 00036 | 00260 |
| | DEBUGCODE | 00006 | 00025 | |
| | DISABLE^COMMAND | 00012 | 00061 | |
| | DISPLAY^COMMAND | 01530 | 02115 | |
| | ENABLE^COMMAND | 00014 | 00063 | |
| | ENV^COMMAND | 00115 | 00202 | |
| | HELP^COMMAND | 20770 | | |
| | LIST^COMMAND | 00135 | | |
| | MARKUP^COMMAND | 00237 | 00537 | |
| | MEASURE^COMMAND | 02067 | 02501 | |
| | ORDER^COMMAND | 03337 | 03557 | |
| | PAGESIZE^COMMAND | 00045 | 00074 | |
| | PAUSE^COMMAND | 00020 | 00143 | |
| | RESET^COMMAND | 00706 | 01074 | |

| | | |
|---|---|---|
| | SAVE^COMMAND | 00017 00144 |
| | SORT^COMMAND | 01340 01707 |
| | WHENCE^COMMAND | 00111 |
| NEXTFILENAME | ORDER^COMMAND | 00237 |
| NIN | SCANINT | 00033 |
| NOUT | FPRINT | 01005 |
| | MTIMESTAMPCOLLAPSE | 00061 00115 00136 00157 00200 |
| | PRINTBANNER | 00010 00031 00573 00615 00637 00661 |
| NOUT32 | BADSS^COMMAND | 00755 |
| | DISPLAY^COMMAND | 01132 01351 01451 |
| | FORMATPROCSOURCEINFO | 00055 |
| | FPRINT | 01037 |
| | LIST^COMMAND | 00317 |
| | ORDER^COMMAND | 02434 02467 02606 02653 |
| | SORT^COMMAND | 02405 |
| NOUT32M | FPRINT | 01023 |
| NOUT64 | FPRINT | 01071 |
| | NOUT | 00043 |
| | NOUT32 | 00042 |
| NOUT64M | FPRINT | 01056 |
| | NOUT | 00041 |
| | NOUT32 | 00040 |
| NOUTM | FPRINT | 00774 |
| NUMIN | CHECKTOGGLES | 00035 |
| | OPENLISTINGFILES | 00134 |
| NUMOUT | INITIALIZE | 00024 00037 |
| OPEN | DISABLE^COMMAND | 00223 |
| | ENABLE^COMMAND | 00235 |
| | MEASURE^COMMAND | 00725 |
| | OPENLISTINGFILES | 00177 00552 |
| | OPENOBJECTFILE | 00072 |
| | PRINTBANNER | 00110 |
| | READBITMAPFILE | 00316 |
| | RESET^COMMAND | 00301 |
| | SPOOLSTART | 00066 |
| | WRITEBITMAPTOFILE | 00270 |
| OPENLISTINGFILES | MARKUP^COMMAND | 01343 |
| OPENOBJECTFILE | BADSS^COMMAND | 00505 |
| | DISPLAY^COMMAND | 00407 |
| | GETUNIQUEPROC | 00035 |
| | LIST^COMMAND | 00146 |
| | MARKUP^COMMAND | 00737 |
| | MEASURE^COMMAND | 00327 00450 01331 |
| | ORDER^COMMAND | 01447 |
| | SORT^COMMAND | 00471 |
| OPEN^FILE | BADSS^COMMAND | 00722 |
| | STARTUP | 00145 00376 00525 |
| ORDER^COMMAND | COVER | 00304 |
| PAGESIZE^COMMAND | COVER | 00306 |
| PAUSE^COMMAND | COVER | 00310 |
| POSITION | POSITREAD | 00036 |
| | POSITREADX | 00004 |
| | WRITEBITMAPTOFILE | 00004 00355 |
| POSITREAD | ANYPRIVPROCS | 00022 00051 |
| | DISPLAY^COMMAND | 00477 00605 |
| | GETNEXTLEFT | 00025 |
| | GETNEXTPROCEDURE | 00046 00164 00232 00307 |

| | | |
|---|---|---|
| | GETNEXTSTATEMENT | 00027 |
| | GETSOURCEORD | 00061 |
| | MARKUP^COMMAND | 01015 01155 |
| | OPENOBJECTFILE | 00122 00200 |
| | ORDER^COMMAND | 01550 01713 |
| | SORT^COMMAND | 00557 00665 |
| POSITREADX | READBITMAPFILE | 00055 |
| PRINT | DEBUG^ERR | 00071 |
| | FPRINT | 00120 00236 01117 |
| | PRINTBANNER | 00355 00421 00473 00736 01010 |
| | PRINTHELP | 00012 00300 |
| PRINTBANNER | ENV^INFO | 00055 |
| PRINTHELP | HELP^COMMAND | 21007 |
| PRINTREAD | READLISTINGLINE | 00201 |
| PRINTREADCOMMAND | OPENLISTINGFILES | 00446 |
| PRINTSTART | OPENLISTINGFILES | 00610 |
| PROCESS^ACCESSID | CHECKFILESECURITY | 00024 |
| | CHECKSECURITY | 00001 |
| | MEASURE^COMMAND | 01643 |
| | PRINTBANNER | 00762 00777 |
| PROCESSINFO | CHECKSECURITY | 00024 |
| | ENV^INFO | 00073 |
| | INITIALIZE | 00121 |
| | PRINTBANNER | 00444 |
| | SORT^COMMAND | 02203 |
| PROGRAM^FILENAME | ENABLE^COMMAND | 00132 |
| | PRINTBANNER | 00411 |
| READ | POSITREAD | 00102 |
| | PRINTBANNER | 00134 |
| READBITMAPFILE | BOOLEAN^COMMAND | 00407 00455 |
| | DISPLAY^COMMAND | 02241 |
| | MARKUP^COMMAND | 00572 |
| | ORDER^COMMAND | 00311 00407 |
| | SORT^COMMAND | 02004 |
| | WHENCE^COMMAND | 00125 |
| READLISTINGLINE | COPYUNTILBEGIN | 00023 00060 00127 00243 |
| | MARKUP^COMMAND | 01346 01431 01435 |
| READX | POSITREADX | 00024 |
| | READBITMAPFILE | 00374 |
| READ^FILE | BADSS^COMMAND | 00142 |
| | COVER | 00146 |
| | FIXIT | 00061 |
| | PRINT | 00105 |
| RESET^COMMAND | COVER | 00312 |
| RO^GET^BASE^NAME | GETNEXTEPT | 00040 |
| | GETNEXTPROCEDURE | 00100 |
| SAVE^COMMAND | COVER | 00314 |
| SCANALPHA | SCANIDTA | 00071 |
| SCANFNAME | BADSS^COMMAND | 00346 00372 |
| | BOOLEAN^COMMAND | 00100 00214 |
| | DISPLAY^COMMAND | 01631 01700 01737 |
| | LIST^COMMAND | 00120 |
| | MARKUP^COMMAND | 00271 00323 00355 00467 |
| | MEASURE^COMMAND | 02202 02240 02301 02333 |
| | ORDER^COMMAND | 03374 03461 03514 |
| | RESET^COMMAND | 01032 |
| | SAVE^COMMAND | 00102 |

| | | |
|---|---|---|
| | SORT^COMMAND | 01441 01510 01547 |
| | WHENCE^COMMAND | 00074 |
| SCANID | BADSS^COMMAND | 00424 |
| SCANIDT | BADSS^COMMAND | 00336 |
| | BOOLEAN^COMMAND | 00062 |
| | DEBUGCODE | 00020 |
| | DISABLE^COMMAND | 00024 |
| | DISPLAY^COMMAND | 01544 |
| | ENABLE^COMMAND | 00026 |
| | ENV^COMMAND | 00131 |
| | MARKUP^COMMAND | 00253 |
| | MEASURE^COMMAND | 02103 |
| | ORDER^COMMAND | 03353 |
| | RESET^COMMAND | 00722 |
| | SAVE^COMMAND | 00031 |
| | SORT^COMMAND | 01354 |
| | WHENCE^COMMAND | 00057 |
| SCANIDTA | COVER | 00226 |
| | HELP^COMMAND | 20645 |
| | PAUSE^COMMAND | 00055 |
| SCANINT | BOOLEAN^COMMAND | 00147 |
| | DISPLAY^COMMAND | 01564 |
| | MARKUP^COMMAND | 00423 |
| | MEASURE^COMMAND | 02137 |
| | PAGESIZE^COMMAND | 00057 |
| | PAUSE^COMMAND | 00033 |
| | RESET^COMMAND | 00756 |
| | SAVE^COMMAND | 00052 |
| | SORT^COMMAND | 01374 01642 |
| SETMODE | READBITMAPFILE | 00606 |
| | SPOOLSTART | 00450 00457 00466 00475 |
| | WRITEBITMAPTOFILE | 00336 |
| SETSTOP | DISABLEPRIV | 00007 00034 |
| | ENABLEPRIV | 00007 00034 |
| | GETOBJECTNAMES | 00007 00021 00057 |
| | GETPINVALUES | 00014 00026 00100 |
| | MEASURE^COMMAND | 00564 00610 00657 01243 01447 01461 01516 01571 02021 |
| | MOVEBITMAPTOMEM | 00114 00126 00161 00301 |
| | RESET^COMMAND | 00020 00044 00115 00246 00370 00450 00462 00613 00654 |
| SET^FILE | BADSS^COMMAND | 00663 00673 00703 |
| | STARTUP | 00042 00062 00102 00122 00303 00363 00432 00512 00535 00551 00574 00603 |
| SHIFTSTRING | BADSS^COMMAND | 00570 |
| | COVER | 00210 |
| | PRINTHELP | 00106 |
| | READLISTINGLINE | 00023 |
| | SCANFNAME | 00074 |
| SORTBUILDPARM | SORT^COMMAND | 02166 |
| SORTERRORSUM | SORT^COMMAND | 00377 |
| SORTMERGEFINISH | SORT^COMMAND | 02454 02517 02545 |
| SORTMERGERECEIVE | SORT^COMMAND | 02364 02467 |
| SORTMERGESEND | SORT^COMMAND | 01226 02332 |
| SORTMERGESTART | SORT^COMMAND | 02243 |
| SORT^COMMAND | COVER | 00316 |
| SPOOLCONTROL | READLISTINGLINE | 00235 |
| SPOOLEND | MARKUP^COMMAND | 01532 |
| | OPENLISTINGFILES | 00045 |

| | | |
|---|---|---|
| SPOOLEREQUEST | OPENLISTINGFILES | 00354 |
| SPOOLERSTATUS | OPENLISTINGFILES | 00241 |
| SPOOLSETMODE | READLISTINGLINE | 00256 |
| SPOOLSTART | OPENLISTINGFILES | 00715 |
| SPOOLWRITE | WRITELISTINGLINE | 00026 |
| SPOOL^CHECKMSG | SPOOLSTART | 00637 00667 |
| SPOOL^CINV | SPOOLSTART | 00131 00166 00224 00263 00315 |
| | SPOOL^CINV | 00642 01026 |
| STARTUP | INITIALIZE | 00040 |
| STARTUP$STARTUPPROC | STARTUP | 00223 |
| STOP | COVER | 00376 |
| | ENABLE^COMMAND | 00256 00436 |
| | TERMINATE | 00033 |
| SYSIDCOLLAPSE | PRINTBANNER | 00527 |
| SYSTEMPROCESSINFO | MEASURE^COMMAND | 00131 00152 |
| TERMINATE | COVER | 00130 00150 00266 |
| TESTCOVERENABLED | DISABLE^COMMAND | 00110 00172 |
| | ENABLE^COMMAND | 00110 |
| | ENV^INFO | 00143 |
| | MEASURE^COMMAND | 00174 01256 01342 |
| TESTCOVERHOOKS | ENV^INFO | 00127 |
| TESTFORHIT | DISPLAY^COMMAND | 01016 [illegible] |
| | GETMARKER | 00054 |
| | SORT^COMMAND | 01100 |
| TIME | MTIMESTAMPCOLLAPSE | 00051 |
| TIMESTAMP | SPOOLSTART | 00653 |
| TOSVERSION | ENV^INFO | 00075 00113 |
| | GETOSVERDATE | 00034 |
| | OPENOBJECTFILE | 00142 |
| USERIDCOLLAPSE | PRINTBANNER | 00047 |
| USERIDTOUSERNAME | USERIDCOLLAPSE | 00032 |
| USESEGMENT | INITIALIZE | 00230 |
| VERSIONERROR | INITIALIZE | 00047 |
| WHENCE^COMMAND | COVER | 00320 |
| WHYCANTREAD | BADSS^COMMAND | 00150 00513 00730 01014 01043 |
| | DISPLAY^COMMAND | 00415 00505 00613 01076 01300 01420 |
| | LIST^COMMAND | 00154 00352 00400 |
| | MARKUP^COMMAND | 00745 01023 01163 01376 01421 |
| | MEASURE^COMMAND | 00321 00335 00375 00442 00456 00516 01202 01240 01322 01337 01430 |
| | ORDER^COMMAND | 01455 01556 01721 02053 02107 |
| | RESET^COMMAND | 00442 |
| | SORT^COMMAND | 00477 00565 00673 01147 01201 |
| WRITE | DISABLE^COMMAND | 00265 |
| | ENABLE^COMMAND | 00305 00322 |
| | RESET^COMMAND | 00335 |
| | SPOOLSTART | 00702 |
| WRITEBITMAPTOFILE | BOOLEAN^COMMAND | 00430 01117 |
| | SAVE^COMMAND | 00264 |
| WRITELISTINGLINE | COPYUNTILBEGIN | 00015 00053 00121 00230 |
| | MARKUP^COMMAND | 01423 |
| WRITELISTINGLINE^NOMARK | READLISTINGLINE | 00363 |
| WRITEREAD | MEASURE^COMMAND | 01041 |
| WRITEX | WRITEBITMAPTOFILE | 00025 00314 |
| WRITE^FILE | EXIT | 00034 |
| | PRINT | 00121 00201 00312 |
| XBOUNDS | CANTTOUCH | 00023 |

COMMON BLOCK CROSS REFERENCE

| REFERENCED COMMON BLOCK | OFFSET | TYPE | REFERENCING CODE BLOCK | WORD OFFSET OF REFERENCES |
|---|---|---|---|---|
| ALREADYIN | 000000 000026 | BYTE | MEASURE^COMMAND | 01607 |
| ASSUMESECONDS | 000000 000024 | BYTE | PAUSE^COMMAND | 00112 |
| BINTOHEX | 000000 000060 | BYTE | MEASURE^COMMAND | 00741 |
| | 000000 000070 | BYTE | RESET^COMMAND | 00317 |
| | 000000 000106 | BYTE | DISABLE^COMMAND | 00252 |
| | 000000 000122 | BYTE | ENABLE^COMMAND | 00225 |
| BOTHBANDS | 000000 000020 | BYTE | DISPLAY^COMMAND | 02035 02062 |
| BOTHPANDF | 000000 000022 | BYTE | BOOLEAN^COMMAND | 00130 00177 |
| | | | DISPLAY^COMMAND | 01614 01661 |
| | | | SORT^COMMAND | 01424 01471 |
| CODEREQ | 000000 000030 | BYTE | MEASURE^COMMAND | 00267 |
| COMMANDS | 000000 000022 | BYTE | COVER | 00230 |
| | 000000 000030 | BYTE | HELP^COMMAND | 20742 |
| | 000000 000062 | BYTE | HELP^COMMAND | 20741 |
| | 000000 000104 | BYTE | HELP^COMMAND | 20740 |
| | 000000 000120 | BYTE | HELP^COMMAND | 20737 |
| | 000000 000140 | BYTE | HELP^COMMAND | 20736 |
| | 000000 000176 | BYTE | HELP^COMMAND | 20735 |
| CRCBINUSE | 000000 000024 | BYTE | DISABLE^COMMAND | 00353 |
| DIFFERENTOBJECTSIZES | 000000 000134 | BYTE | BOOLEAN^COMMAND | 00565 00727 |
| | 000000 000226 | BYTE | BOOLEAN^COMMAND | 01134 |
| DIFFERENTPROGS | 000000 000032 | BYTE | BOOLEAN^COMMAND | 00566 00730 |
| DIFFERENTTIMESTAMPS | 000000 000030 | BYTE | BOOLEAN^COMMAND | 00617 00761 |
| DISABLED | 000000 000022 | BYTE | ENV^INFO | 00160 |
| | 000000 000024 | BYTE | DISABLE^COMMAND | 00125 00404 |
| | | | ENABLE^COMMAND | 00127 |
| | 000000 000026 | BYTE | MEASURE^COMMAND | 01274 01477 |
| | | | RESET^COMMAND | 00500 |
| | 000000 000030 | BYTE | RESET^COMMAND | 00320 |
| | 000000 000036 | BYTE | MEASURE^COMMAND | 00614 |
| | | | RESET^COMMAND | 00050 |
| ENABLEDNOPRIV | 000000 000022 | BYTE | ENV^INFO | 00173 |
| | 000000 000024 | BYTE | DISABLE^COMMAND | 00141 |
| | | | ENABLE^COMMAND | 00410 00506 |
| ENABLEDPRIV | 000000 000022 | BYTE | ENV^INFO | 00206 |
| | 000000 000024 | BYTE | ENABLE^COMMAND | 00522 |
| ENABLEFE | 000000 000026 | BYTE | ENABLE^COMMAND | 00453 |
| ENABLENP | 000000 000034 | BYTE | ENABLE^COMMAND | 00226 |
| ERRORONF | 000000 000030 | BYTE | OPENLISTINGFILES | 00275 00410 00475 00637 |
| | | | | 00744 |
| | | | ORDER^COMMAND | 03644 |
| | | | READLISTINGLINE | 00313 |
| | | | WHYCANTREAD | 00020 |
| | | | WRITELISTINGLINE | 00055 |
| | 000000 000032 | BYTE | OPENLISTINGFILES | 00347 00541 00603 |
| | | | WRITEBITMAPTOFILE | 00503 |
| | 000000 000034 | BYTE | OPENLISTINGFILES | 00231 |
| | | | SAVE^COMMAND | 00232 |
| | 000000 000072 | BYTE | ORDER^COMMAND | 04046 |
| | 000000 000104 | BYTE | READBITMAPFILE | 01006 |
| | 000000 000132 | BYTE | READBITMAPFILE | 00407 |
| | 000000 000220 | BYTE | READBITMAPFILE | 01005 |
| | 000000 000246 | BYTE | READBITMAPFILE | 00544 |

```
                         000000 000344 BYTE READBITMAPFILE        01004
                         000000 000402 BYTE READBITMAPFILE        00405
ERRORONFOCTAL            000000 000032 BYTE OPENLISTINGFILES      00314 00427 00514 00656
                                                                  00763
                                            READLISTINGLINE       00332
                                            WRITELISTINGLINE      00074
GOTO^MAINLOOP^BLOCK      000000 000000 WORD COVER                 00066
                                            DEBUG^ERR             00107
                                            FPRINTPOOF            00055
                                            ORDER^COMMAND         01461 01567 01732 02064
                                                                  02120
                                            READBITMAPFILE        00115 00142 00222 00271
                                                                  00350 00437 00515 00564
                                                                  00640 00713 00762
                         000000 000004 WORD DEBUG^ERR             00104
                                            FPRINTPOOF            00052
                                            ORDER^COMMAND         01456 01564 01727 02061
                                                                  02115
                                            READBITMAPFILE        00112 00137 00217 00266
                                                                  00345 00434 00512 00561
                                                                  00635 00710 00757
IGNORECPU                000000 000026 BYTE CHECKTOGGLES          00234 00307 00352
INCOMPATIBLEOBJECT       000000 000026 BYTE WHYCANTREAD           00040
INCONSISTENCY            000000 000026 BYTE DISPLAY^COMMAND       01171
INOUTSTUFF               000000 000000 WORD BADSS^COMMAND         00342 00366
                                            BOOLEAN^COMMAND       00074 00210
                                            DISPLAY^COMMAND       01625 01674 01733
                                            LIST^COMMAND          00114
                                            MARKUP^COMMAND        00265 00317 00351 00463
                                            MEASURE^COMMAND       02176 02234 02275 02327
                                            OPENLISTINGFILES      00067 00667
                                            ORDER^COMMAND         03370 03455 03510
                                            RESET^COMMAND         01026
                                            SAVE^COMMAND          00076
                                            SORT^COMMAND          01435 01504 01543
                                            STARTUPSSTARTUPPROC   00000
                                            WHENCE^COMMAND        00070
                         000000 000001 WORD STARTUP               00124
                         000000 000002 WORD BADSS^COMMAND         00705
                                            PRINT                 00012 00143
                                            STARTUP               00136 00365 00514 00543
                                            TERMINATE             00011
                         000000 000003 WORD STARTUP               00034
                         000000 000004 WORD STARTUP               00054 00137 00147 00151
                                                                  00261 00412
                         000000 000005 WORD STARTUP               00074 00160 00262 00266
                                                                  00305 00366 00402 00527
                                                                  00537
                         000000 000006 WORD STARTUP               00114 00167 00403 00413
                                                                  00415 00434 00515 00531
                                                                  00541 00545
                         000000 000007 WORD BADSS^COMMAND         00131 00637 00647 00655
                                                                  00665 00675 00706 01045
                         000000 000012 WORD COVER                 00011 00136
                                            FIXIT                 00051
                                            STARTUP               00540 00566 00576
                         000000 000013 WORD COVER                 00012
```

```
                                            FIXIT                      00024
                                            PRINT                      00041 00053 00074 00112
                                                                       00172 00272
                                            STARTUP                    00150 00542 00570
                          000000 000014 WORD STARTUP                   00367
                          000000 000015 WORD STARTUP                   00516
                          000000 000016 WORD COVER                     00137
                                            DEBUG^ERR                  00064
                                            FIXIT                      00102
                                            STARTUPSSTARTUPPROC        00005
                          000000 000017 WORD COVER                     00131 00156 00157 00200
                                                                       00204
                                            DEBUG^ERR                  00037 00046 00050 00066
                                            FIXIT                      00007 00021
                                            INITIALIZE                 00063 00067 00074 00101
                          000000 000020 WORD FIXIT                     00025
                          000000 000021 WORD FIXIT                     00014
                          000000 000022 WORD PAGESIZE^COMMAND          00106 00112 00116
                                            PRINT                      00037 00276
                          000000 000023 WORD COVER                     00214
                                            PRINT                      00034 00036
                          000000 000024 WORD COVER                     00212
                                            PRINT                      00025 00033 00267 00271
                                                                       00300
                          000000 000025 WORD PAGESIZE^COMMAND          00114 00127
                                            PRINT                      00027
                                            STARTUP                    00563
                          000000 000026 WORD PRINT                     00203 00205 00207 00211
                                                                       00213 00215 00220 00222
                                                                       00224 00226 00233 00236
                                                                       00240 00242 00244 00246
                                                                       00251
INSMEM                    000000 000024 BYTE ENABLE^COMMAND            00427
                                            MEASURE^COMMAND            01133
INSPROCACCESS             000000 000026 BYTE CHECKSECURITY             00065
INUSE                     000000 000044 BYTE ENV^COMMAND               00370
                          000000 000056 BYTE MEASURE^COMMAND           00663
INVPIN                    000000 000020 BYTE MEASURE^COMMAND           02152
                          000000 000024 BYTE RESET^COMMAND             00773
MARKUP^DEFS               000000 000000 WORD GETMARKER                 00005 00015 00024 00031
                                                                       00051 00063 00072 00105
                                                                       00111 00113
                                            GETUNIQUEPROC              00100 00104 00106
                          000000 000001 WORD COPYUNTILBEGIN            00272
                                            MARKUP^COMMAND             00150 00166 00167 01457
                                                                       01477
                          000000 000002 WORD MARKUP^COMMAND            00231 00404 00414 00545
                                                                       00551
                                            READLISTINGLINE            00003
                          000000 000003 WORD COPYUNTILBEGIN            00043
                                            GETMARKER                  00004 00154
                                            MARKUP^COMMAND             01404
                                            OPENLISTINGFILES           00770
                                            WRITELISTINGLINE           00004
                          000000 000004 WORD CHECKTOGGLES              00224 00277 00342
                                            LINENUMBER                 00001
                                            READLISTINGLINE            00013 00336 00346 00355
```

```
                                WRITELISTINGLINE     00006 00011 00015
000000 000005 WORD READLISTINGLINE      00173 00227 00231 00246
                                                     00250 00252
                   WRITELISTINGLINE     00021
000000 000006 WORD READLISTINGLINE      00011 00016 00025 00040
                                        00042 00045 00051 00067
                                        00071 00100 00103 00105
                                        00111 00116 00122 00123
                                        00135 00152
000000 000007 WORD CHECKTOGGLES         00163 00167
                   COPYUNTILBEGIN       00012 00225
                   MARKUP^COMMAND       00066 00112 00124
                   READLISTINGLINE      00155
000000 000010 WORD CHECKTOGGLES         00105
                   COPYUNTILBEGIN       00001 00011 00031 00034
                                        00035 00040 00045 00046
                                        00051 00065 00067 00072
                                        00076 00102 00114 00117
                                        00141 00143 00144 00154
                                        00164 00174 00204 00214
                                        00224 00251 00254 00255
                                        00260 00262 00270 00273
                                        00276
                   MARKUP^COMMAND       00065 00071 00101 00111
                                        00115 00117 00123 00131
                                        00135 00136 00141 00144
                                        00153 00154 00157 00162
                   READLISTINGLINE      00126
000000 000011 WORD CHECKTOGGLES         00102
                   MARKUP^COMMAND       00233 00442 00451
000000 000012 WORD CHECKTOGGLES         00311 00354 00404 00412
                                        00442 00453
                   OPENLISTINGFILES     00774
000000 000013 WORD CHECKTOGGLES         00210 00236 00243 00262
                                        00314 00326 00357 00371
                                        00427
                   MARKUP^COMMAND       01442 01450 01475
                   OPENLISTINGFILES     00772
                   READLISTINGLINE      00360
000000 000014 WORD MARKUP^COMMAND       00264
                   OPENLISTINGFILES     00010 00064 00074 00102
                                        00217 00265 00303 00336
                                        00400 00416 00465 00503
                                        00530 00572 00627 00645
                                        00734 00752
                   READLISTINGLINE      00303 00321
                   WRITELISTINGLINE     00045 00063
000000 000015 WORD MARKUP^COMMAND       01513 01516 01543
                   OPENLISTINGFILES     00026 00031 00056 00543
                                        00606
000000 000016 WORD OPENLISTINGFILES     00604
                   READLISTINGLINE      00172
000000 000017 WORD MARKUP^COMMAND       00316
                   OPENLISTINGFILES     00013 00664 00674 00707
000000 000020 WORD MARKUP^COMMAND       01523 01534 01542
                   OPENLISTINGFILES     00036 00047 00055 00766
000000 000021 WORD MARKUP^COMMAND       01526
```

| | | | | | |
|---|---|---|---|---|---|
| | | | | OPENLISTINGFILES | 00041 00704 00765 |
| | | | | READLISTINGLINE | 00226 00245 |
| | | | | WRITELISTINGLINE | 00020 |
| MISSINGINTO | 000000 | 000036 | BYTE | BOOLEAN^COMMAND | 00356 |
| MONITOR | 000000 | 000026 | BYTE | MEASURE^COMMAND | 00173 |
| NEITHER | 000000 | 000034 | BYTE | SORT^COMMAND | 01740 |
| | 000000 | 000050 | BYTE | DISPLAY^COMMAND | 02154 |
| | 000000 | 000060 | BYTE | BOOLEAN^COMMAND | 00355 |
| NEITHERPINNOROBJECT | 000000 | 000024 | BYTE | MEASURE^COMMAND | 02527 |
| | | | | RESET^COMMAND | 01122 |
| NEITHERPFORL | 000000 | 000026 | BYTE | MEASURE^COMMAND | 00561 |
| NEVERSAVED | 000000 | 000026 | BYTE | RESET^COMMAND | 00133 |
| NOFILE | 000000 | 000020 | BYTE | ORDER^COMMAND | 03474 03527 |
| | | | | SAVE^COMMAND | 00120 |
| | 000000 | 000024 | BYTE | BADSS^COMMAND | 00363 00407 |
| | | | | BOOLEAN^COMMAND | 00231 |
| | | | | DISPLAY^COMMAND | 01715 01754 |
| | | | | MARKUP^COMMAND | 00306 00340 00372 |
| | | | | MEASURE^COMMAND | 02217 02255 02316 |
| | | | | RESET^COMMAND | 01047 |
| | | | | SORT^COMMAND | 01525 01564 |
| | 000000 | 000026 | BYTE | MARKUP^COMMAND | 00505 |
| | 000000 | 000050 | BYTE | BOOLEAN^COMMAND | 00127 |
| | | | | DISPLAY^COMMAND | 01660 |
| | | | | SORT^COMMAND | 01470 |
| | 000000 | 000066 | BYTE | LIST^COMMAND | 00156 |
| | 000000 | 000100 | BYTE | SAVE^COMMAND | 00231 |
| | 000000 | 000346 | BYTE | WHENCE^COMMAND | 00262 |
| NOLIB | 000000 | 000024 | BYTE | DISPLAY^COMMAND | 02364 |
| | | | | MARKUP^COMMAND | 00663 |
| | | | | SORT^COMMAND | 02127 |
| | 000000 | 000136 | BYTE | BOOLEAN^COMMAND | 01136 |
| NOLIBWITHG16 | 000000 | 000024 | BYTE | DISPLAY^COMMAND | 02341 |
| | | | | MARKUP^COMMAND | 00642 |
| | | | | SORT^COMMAND | 02104 |
| | 000000 | 000174 | BYTE | BOOLEAN^COMMAND | 01135 |
| NOMEASRUN | 000000 | 000026 | BYTE | BOOLEAN^COMMAND | 00377 |
| | | | | DISPLAY^COMMAND | 02216 |
| | | | | SAVE^COMMAND | 00260 |
| | | | | SORT^COMMAND | 01761 |
| | 000000 | 000030 | BYTE | RESET^COMMAND | 00407 |
| NOPIN | 000000 | 000020 | BYTE | SAVE^COMMAND | 00065 |
| | 000000 | 000026 | BYTE | MEASURE^COMMAND | 00056 |
| | 000000 | 000050 | BYTE | BOOLEAN^COMMAND | 00176 |
| | | | | DISPLAY^COMMAND | 01613 |
| | | | | SORT^COMMAND | 01423 |
| | 000000 | 000124 | BYTE | SAVE^COMMAND | 00230 |
| NOPROG | 000000 | 000024 | BYTE | DISPLAY^COMMAND | 02407 |
| | | | | MARKUP^COMMAND | 00704 |
| | | | | SORT^COMMAND | 02152 |
| | 000000 | 000100 | BYTE | BOOLEAN^COMMAND | 01137 |
| NOSAVEVOL | 000000 | 000026 | BYTE | MEASURE^COMMAND | 02377 |
| | 000000 | 000100 | BYTE | MEASURE^COMMAND | 02376 |
| NOSERVER | 000000 | 000026 | BYTE | DISABLE^COMMAND | 00370 |
| | | | | ENABLE^COMMAND | 00273 |
| | 000000 | 000030 | BYTE | DISABLE^COMMAND | 00253 |
| NOSYMBOLS | 000000 | 000026 | BYTE | BADSS^COMMAND | 01033 |

```
                                         DISPLAY^COMMAND          01410
                                         LIST^COMMAND             00371
                                         MEASURE^COMMAND          00366 00507 01421
NOTANOBJECT       000000 000034 BYTE     SORT^COMMAND             01171
NOTBITMAP         000000 000026 BYTE     WHYCANTREAD              00060
                  000000 000112 BYTE     READBITMAPFILE           00545
NOTHINGTOMERGE    000000 000264 BYTE     READBITMAPFILE           00406
NOTINSTALLED      000000 000020 BYTE     BOOLEAN^COMMAND          00477 00641
NOTINTABLE        000000 000026 BYTE     ENV^INFO                 00145
NOTINTERACTIVE    000000 000026 BYTE     RESET^COMMAND            00672
NOTLOCAL          000000 000064 BYTE     COVER                    00050
                  000000 000046 BYTE     MEASURE^COMMAND          01325
                  000000 000056 BYTE     RESET^COMMAND            00445
NOTNUM            000000 000020 BYTE     MARKUP^COMMAND           00436
                                         SORT^COMMAND             01655
                  000000 000026 BYTE     OPENLISTINGFILES         00161
                  000000 000042 BYTE     PAUSE^COMMAND            00057
                  000000 000054 BYTE     PAGESIZE^COMMAND         00110
                                         PAUSE^COMMAND            00155
NOTRUN            000000 000026 BYTE     MEASURE^COMMAND          01174
                  000000 000030 BYTE     MEASURE^COMMAND          00112
NOTSUPPORTED      000000 000370 BYTE     INITIALIZE               00246
OBJECT^READING    000000 000000 WORD     GETNEXTEPT               00004
                                         GETNEXTPROCEDURE         00021
                                         GETNEXTSTATEMENT         00004
                                         GETSOURCEORD             00004
                                         OPENOBJECTFILE           00013 00110 00250
                                         POSITREAD                00002
                  000000 000001 WORD     CONVERTPITFORMAT         00001 00017
                                         OPENOBJECTFILE           00210 00211
                  000000 000002 WORD     GETNEXTPROCEDURE         00154
                                         OPENOBJECTFILE           00222
                  000000 000004 WORD     GETNEXTPROCEDURE         00042 00057 00063
                                         OPENOBJECTFILE           00226
                  000000 000006 WORD     GETNEXTPROCEDURE         00031 00034
                                         OPENOBJECTFILE           00232
                  000000 000010 WORD     GETNEXTEPT               00061
                                         GETNEXTPROCEDURE         00066
                                         OPENOBJECTFILE           00236
                  000000 000012 WORD     GETNEXTEPT               00011 00021 00055 00063
                                         GETNEXTPROCEDURE         00070 00303
                  000000 000014 WORD     DISPLAY^COMMAND          01035 01060
                                         GETNEXTEPT               00035 00043
                                         LIST^COMMAND             00260
                  000000 000034 WORD     DISPLAY^COMMAND          01013 01034 01057
                                         GETNEXTEPT               00046
                                         LIST^COMMAND             00257
                  000000 000035 WORD     BADSS^COMMAND            00563 00571 00601 00617
                                                                  00621 00622 00632 01023
                                         DISPLAY^COMMAND          00760 00762 00763 00773
                                                                  01005 01012 01135 01142
                                                                  01400
                                         FORMATPROCSOURCEINFO     00046 00070 00105
                                         GETMARKER                00042 00047
                                         GETNEXTPROCEDURE         00030 00075 00103 00116
                                                                  00122 00126 00130 00135
                                                                  00243 00255 00262 00270
```

```
                                    GETNEXTSTATEMENT         00012
                                    GETUNIQUEPROC            00054 00063
                                    LIST^COMMAND             00233 00235 00236 00271
                                                             00361
                                    MEASURE^COMMAND          00346 00356 00467 00477
                                                             01401 01411
                                    ORDER^COMMAND            02000 02016 02025
                                    SORT^COMMAND             01030 01042 01047 01056
                                                             01066 01073 01156
               000000 000036 WORD   GETNEXTPROCEDURE         00175
                                    GETSOURCEORD             00050
               000000 000040 WORD   GETNEXTPROCEDURE         00200
                                    GETSOURCEORD             00116
               000000 000041 WORD   GETNEXTPROCEDURE         00206 00216 00227
                                    GETNEXTSTATEMENT         00024 00074 00101
                                    GETSOURCEORD             00037
               000000 000043 WORD   GETNEXTPROCEDURE         00211 00214
                                    GETNEXTSTATEMENT         00016 00102 00104 00106
                                    GETSOURCEORD             00035
               000000 000044 WORD   BADSS^COMMAND            00116 00174 00743 00770
                                                             00776
                                    DISPLAY^COMMAND          01120 01146 01213 01221
                                                             01255 01263
                                    GETMARKER                00065 00073 00103 00110
                                                             00114 00123 00127 00142
                                    GETNEXTSTATEMENT         00040 00050 00070
                                    GETUNIQUEPROC            00074 00103 00107 00116
                                                             00122 00135
                                    LIST^COMMAND             00305 00327 00335
                                    ORDER^COMMAND            02027
                                    SORT^COMMAND             01075 01116 01122 01131
               000000 000045 WORD   GETNEXTPROCEDURE         00213
                                    GETNEXTSTATEMENT         00054
                                    GETSOURCEORD             00012 00067
               000000 000046 WORD   GETNEXTPROCEDURE         00256
                                    GETNEXTSTATEMENT         00071
                                    GETSOURCEORD             00014 00072
               000000 000062 WORD   GETNEXTPROCEDURE         00263
                                    GETSOURCEORD             00015 00077
               000000 000065 WORD   OPENOBJECTFILE           00112
                                    POSITREAD                00010 00017 00120 00124
               000000 000067 WORD   OPENOBJECTFILE           00114
                                    POSITREAD                00021 00122
               000000 000070 WORD   OPENOBJECTFILE           00021 00043
                                    POSITREAD                00026 00057 00062
               000000 000072 WORD   POSITREAD                00073 00135
OK             000000 000024 BYTE   BOOLEAN^COMMAND          00445
                                    DISABLE^COMMAND          00156 00334
                                    ENABLE^COMMAND           00371 00472
                                    RESET^COMMAND            00356
                                    SAVE^COMMAND             00301
               000000 000026 BYTE   MEASURE^COMMAND          02037
                                    RESET^COMMAND            00631
               000000 000034 BYTE   BOOLEAN^COMMAND          01140
               000000 000132 BYTE   MARKUP^COMMAND           01557
PARSING^DEFS   000000 000000 WORD   COVER                    00140 00154 00201 00205
                                    FIXIT                    00012 00022 00026 00104
```

```
                                      INITIALIZE          00072 00073 00076 00077
                   000000 000001 WORD BADSS^COMMAND       00324 00340 00364 00410
                                      BOOLEAN^COMMAND     00052 00072 00137 00206
                                      COVER               00000 00005 00074 00077
                                                          00104 00107 00112 00114
                                                          00117 00160 00161 00164
                                                          00167 00171 00173 00215
                                                          00241
                                      DEBUGCODE           00010
                                      DEBUG^ERR           00047 00063 00065 00103
                                      DISABLE^COMMAND     00014
                                      DISPLAY^COMMAND     01532 01554 01623 01672
                                                          01726
                                      ENABLE^COMMAND      00016
                                      ENV^COMMAND         00121
                                      HELP^COMMAND        20634 20743 20745 20747
                                                          20752 20756 20757 20761
                                      LIST^COMMAND        00112
                                      MARKUP^COMMAND      00241 00263 00315 00347
                                                          00413 00461
                                      MEASURE^COMMAND     02071 02125 02174 02232
                                                          02273 02325
                                      NEXTCHAR            00007 00012 00021 00023
                                                          00027 00032 00037 00041
                                                          00044 00051
                                      ORDER^COMMAND       03341 03366 03453 03506
                                      PAGESIZE^COMMAND    00047
                                      PAUSE^COMMAND       00022 00045
                                      RESET^COMMAND       00710 00744 01024
                                      SAVE^COMMAND        00021 00042 00074
                                      SORT^COMMAND        01342 01364 01433 01502
                                                          01536 01632
                                      WHENCE^COMMAND      00047 00066
                   000000 000003 WORD COVER               00177
                                      FIXIT               00010
                   000000 000004 WORD COVER               00202
                                      FIXIT               00011
                   000000 000005 WORD COVER               00071 00073 00076 00240
                   000000 000006 WORD COVER               00132
                                      FIXIT               00015
                                      INITIALIZE          00011
                   000000 000010 WORD INITIALIZE          00025
                   000000 000021 WORD COVER               00045 00102 00124 00153
                                      INITIALIZE          00066
                   000000 000022 WORD COVER               00126
                                      INITIALIZE          00105
PRIVNOTALLOWED     000000 000026 BYTE MEASURE^COMMAND     00232 01372
SERVER^DEFS        000000 000000 WORD DISABLE^COMMAND     00176 00215
                                      ENABLE^COMMAND      00143 00170 00227
                                      MEASURE^COMMAND     00700 00717 01235
                                      RESET^COMMAND       00252 00271
                   000000 000014 WORD DISABLE^COMMAND     00216 00256 00266 00311
                                      ENABLE^COMMAND      00230 00276 00313 00323
                                                          00346
                                      MEASURE^COMMAND     00720 01030 01042 01065
                                      RESET^COMMAND       00274 00325 00336
SPACEDIF           000000 000024 BYTE DISPLAY^COMMAND     00574 00651
```

```
                                                    MARKUP^COMMAND          01144 01221 01267 01332
                                                    MEASURE^COMMAND         01154
                                                    SORT^COMMAND            00654 00731
                              000000 000030 BYTE    DISPLAY^COMMAND         00721
                                                    ORDER^COMMAND           00700 00737 01005 01052
                                                    SORT^COMMAND            01001
STARTED                       000000 000026 BYTE    MEASURE^COMMAND         01111
SUPERONLY                     000000 000024 BYTE    DISABLE^COMMAND         00105
                                                    ENABLE^COMMAND          00107
SYNTAXERR                     000000 000020 BYTE    DEBUG^ERR               00030
                              000000 000040 BYTE    DEBUG^ERR               00027
TABLEFULL                     000000 000026 BYTE    MEASURE^COMMAND         01534
UNABLEALLOC                   000000 000100 BYTE    INITIALIZE              00251
                              000000 000152 BYTE    INITIALIZE              00250
UNKNOWNRO^                    000000 000030 BYTE    WHYCANTREAD             00076
WARNBEGINEND                  000000 000170 BYTE    MARKUP^COMMAND          01556
WARNBIND                      000000 000024 BYTE    MARKUP^COMMAND          01055
                              000000 000046 BYTE    ORDER^COMMAND           01644
                              000000 000050 BYTE    DISPLAY^COMMAND         00551
                                                    SORT^COMMAND            00631
                              000000 000052 BYTE    MARKUP^COMMAND          01117
                              000000 000200 BYTE    ORDER^COMMAND           01761
WARNSKIP                      000000 000220 BYTE    MARKUP^COMMAND          01555

BINDER - OBJECT FILE BINDER - T9621C00 - (09SEP86)   SYSTEM \PRUNE
Object file name is $OVER.T9618C00.COVERCOM
Object file timestamp is 29APR87 16:07:39
Number of Binder errors = 0
Number of Binder warnings = 0
Primary data = 143 words
Secondary data = 4152 words
Code area size = 31 pages
Resident code size = 0 pages
Data area size = 18 pages
Extended data area size = 0 pages
Top of stack = 4295 words
Number of code segments  = 1 segment
Elapsed time - 00:01:35
```

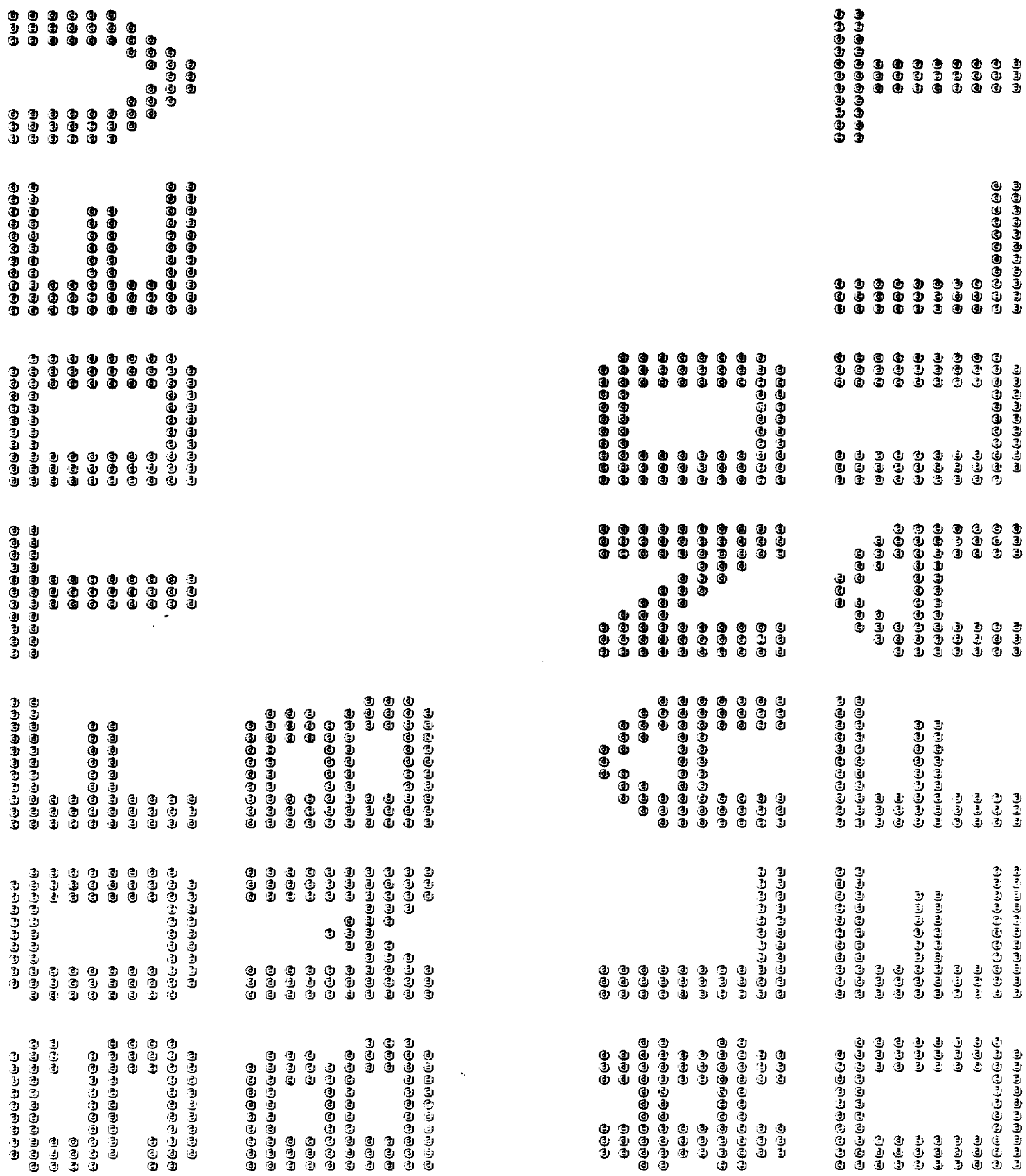

```
TAL - T9250B40 - (15SEP86)                           Source language: TAL - Target machine: Tandem NonStop II System
Date - Time :  29APR87 - 13:22:13                   Default options: On (LIST,CODE,MAP,WARN,LMAP) - Off (ICODE,INNERLIST)

                        ?ERRORFILE eCVRGARD,NOFIXUP,icode, code, SYMBOLS, MAP, NOGMAP, LMAP(ALPHA,LOC)
         000000 0  0    ?SOURCE copytal
Source file: [1]  $VIOLET.TOOLSCOO.COPYTAL  22APR87 - 16:33:11
         000000 0  0  ! +------------------------------------------------------------------+
         000000 0  0  ! |                                                                  |
         000000 0  0  ! |  Copyright (C) 1987 by TANDEM COMPUTERS INCORPORATED             |
         000000 0  0  ! |                                                                  |
         000000 0  0  ! |  Protected as an unpublished work.                               |
         000000 0  0  ! |                                                                  |
         000000 0  0  ! |  The computer program listings and specifications herein are    |
         000000 0  0  ! |  the property of TANDEM COMPUTERS INCORPORATED and shall not be  |
         000000 0  0  ! |  reproduced, copied, or used, in whole or in part, for any       |
         000000 0  0  ! |  reason without the written permission of TANDEM COMPUTERS       |
         000000 0  0  ! |  INCORPORATED.                                                  |
         000000 0  0  ! |                                                                  |
         000000 0  0  ! |  The following are trademarks or service marks of TANDEM        |
         000000 0  0  ! |  COMPUTERS INCORPORATED:                                        |
         000000 0  0  ! |                                                                  |
         000000 0  0  ! |  6AX            BINDER          CROSSREF        DDL              |
         000000 0  0  ! |  ENABLE         ENCOMPASS       ENCORE          ENFORM           |
         000000 0  0  ! |  ENSCRIBE       ENVOY           ENVOYACP/XF     EXCHANGE         |
         000000 0  0  ! |  EXPAND         FASTSORT        FAXLINK         FOX              |
         000000 0  0  ! |  FOXII          GUARDIAN        GUARDIAN 90     GUARDIAN 90XF    |
         000000 0  0  ! |  INSIGHT        INSPECT         LASER-LX        LXN              |
         000000 0  0  ! |  MEASURE        MULTILAN        NetBatch        NonStop          |
         000000 0  0  ! |  NonStop 1+     NonStop CLX     NonStop EXT     NonStop EXT10    |
         000000 0  0  ! |  NonStop EXT25  NonStop II      NonStop SQL     NonStop TXP      |
         000000 0  0  ! |  NonStop VLX    PATHMAKER       PC LINK         PCFORMAT         |
         000000 0  0  ! |  PERUSE         PS MAIL         PS TEXT EDIT    PS TEXT FORMAT   |
         000000 0  0  ! |  RDF            SAFE            SAFEGUARD       SAFE-T-NET       |
         000000 0  0  ! |  T-TEXT         TACL            TAL             Tandem           |
         000000 0  0  ! |  TGAL           THL             TIL             TMF              |
         000000 0  0  ! |  TRANSFER       VIEWPOINT       WORDLINK        XL8              |
         000000 0  0  ! |  XRAY                                                            |
         000000 0  0  ! |                                                                  |
         000000 0  0  ! +------------------------------------------------------------------+
         000000 0  0  ! |  HYPERchannel is a trademark of Network Systems Corporation.    |
         000000 0  0  ! |                                                                  |
         000000 0  0  ! |  IBM is a registered trademark of International Business Machines|
         000000 0  0  ! |  Corporation.                                                    |
         000000 0  0  ! |                                                                  |
         000000 0  0  ! |  Textpack4, Textpack6, IBM Displaywriter, DisplayWrite 2,        |
         000000 0  0  ! |  DisplayWrite 3, Displaywriter communication software, and CICS  |
         000000 0  0  ! |  are trademarks of International Business Machines Corporation. |
         000000 0  0  ! |                                                                  |
         000000 0  0  ! |  INFOSAT is a trademark in which both Tandem and American        |
         000000 0  0  ! |  Satellite have rights.                                          |
         000000 0  0  ! |                                                                  |
         000000 0  0  ! |  LATTICE is a registered trademark of Lattice, Inc.             |
         000000 0  0  ! |                                                                  |
         000000 0  0  ! |  MultiMate is a trademark of Ashton-Tate, Inc.                   |
         000000 0  0  ! |                                                                  |
         000000 0  0  ! |  UNIX is a trademark of AT&T.                                    |
```

```
000000 0  0   ! |                                                                  |
000000 0  0   ! |    Wang OIS workstation, Wang VS workstation, Wang OIS telecommu- |
000000 0  0   ! |    nication software, and Wang VS telecommunication software are  |
000000 0  0   ! |    trademarks of Wang, Inc.                                       |
000000 0  0   ! +-------------------------------------------------------------------+
000000 0  0   ! |    TANDEM COMPUTERS INCORPORATED -- PROPRIETARY AND CONFIDENTIAL  |
000000 0  0   ! +-------------------------------------------------------------------+
000000 0  0   ?NOLIST, source dsgaddr
000000 0  0   ?NOLIST, source dutil
000000 0  0   ?NOLIST, source derror
000000 0  0   ?NOLIST, source dmalloc
000000 0  0   ?NOLIST, source dcpuctl
000000 0  0   ?NOLIST, source dpctl
000000 0  0   ?NOLIST, source ddebug
000000 0  0
000000 0  0   ?SOURCE dcover
Source file:  [1]  $OVER.T9618C00.DCOVER   29APR87 - 13:14:11
000000 0  0   ?SECTION MICROCODE

000000 0  0   ! The basic measurement algorithm is to replace instructions within the
000000 0  0   ! measured code with a BPT instruction which will cause instruction breakpoint
000000 0  0   ! interrupts when executed.  For measured processes, the INSTRUCTIONBREAKPOINT
000000 0  0   ! interrupt handler will replace the BPT opcode with the original instruction,
000000 0  0   ! set a bit ON in a bitmap corresponding to each possible instruction location,
000000 0  0   ! and resume the operation.  At the end of a measurement period, we can
000000 0  0   ! determine which instruction locations were executed by examining the
000000 0  0   ! corresponding bit map.
000000 0  0
000000 0  0   literal      Icode^BPT = %451;       !Op code for BPT instruction
000000 0  0
000000 0  0   ?SECTION CONTROL

000000 0  0   ! We use a resident segment (CRCB) which is allocated by CVRMON when
000000 0  0   ! COVER is installed (by ENABLE).  The CRCB contains a control block
000000 0  0   ! which is used for regulating the COVER measurements.  If fully
000000 0  0   ! allocated (in CPUs with 256 PINs), the CRCB with the CoverPinData
000000 0  0   ! structures will require about 20 pages of physical memory.  The CRCB
000000 0  0   ! is addressed by the instruction breakpoint interrupt handler via an
000000 0  0   ! absolute extended pointer maintained in the bpt table header.
000000 0  0   ! CVRMON and COVERCOM can address this segment by calling USESEGMENT.
000000 0  0   ! Update access to the CRCB is controlled via a semaphore defined in
000000 0  0   ! the BPT table header.  COVERCOM can share the segments, so long as
000000 0  0   ! it holds the semaphore.
000000 0  0
000000 0  0   ! COVER will allocate space for the following structure in a Resident Segment,
000000 0  0   ! one copy for each PIN in the CPU.  This space will be allocated contiguously
000000 0  0   ! after the CRCB in the same segment for simplicity.
000000 0  0   ! This structure will, in turn, point to copies of the code/library files in
000000 0  0   ! memory (by absoute segment number) and to a similarly allocated code/library
000000 0  0   ! bitmap of measurement data.
000000 0  0
000000 0  0   struct      CoverPinDataCodespaceTemplate(*);
000000 0  0               begin
000000 0  1               int         Seg;              !Abs base segments
000000 0  1               int         CopySeg;
000000 0  1               int         Name[0:11];       !Program filename
000000 0  1               int         Timestamp[0:2];  !When it was bound
```

```
000000 0  1            int        SpaceCount;      !Number of code spaces
000000 0  1            int        SpaceSize[0:15];!Size (in words) of each code space
000000 0  1            string .EXT BitmapPtr;      !Pointer to measurement data
000000 0  1            end;
000000 0  0
000000 0  0  struct      CoverPinDataTemplate(*);
000000 0  0              begin
000000 0  1              int        State;      !Control of process (see below)
000000 0  1              int        EverSaved; !Flag.  Set when SAVE command completes
000000 0  1              int        SaveVol[0:7];    !Subvol to save bitmap on
000000 0  1              struct     UC( CoverPinDataCodespaceTemplate );
000000 0  1              struct     UL( CoverPinDataCodespaceTemplate );
000000 0  1              end;
000000 0  0
000000 0  0  ! State definitions:
000000 0  0  literal     CoverMeasureReset     = 0;   !Not in use; no control structures
000000 0  0  literal     CoverMeasureStarting = 1;   !Code file being read to set BPTs
000000 0  0  literal     CoverMeasureRunning  = 2;   !Measurement is in progress
000000 0  0  literal     CoverMeasureStopping = 3;   !Measurement has stopped, but bitmap
000000 0  0                                          !is not de-allocated.
000000 0  0
000000 0  0  ! Control of all COVER measurements within a cpu is achieved through the use of
000000 0  0  ! this structure (referred to as a CRCB) which remains in a resident segment as
000000 0  0  ! long as COVER is installed in a cpu.
000000 0  0
000000 0  0  struct      CoverRoutineControlBlock(*);
000000 0  0              begin
000000 0  1              int(32)    Verifier;          ! Contains eyecatcher "CovR"
000000 0  1              int        Version;           ! For format identification
000000 0  1              int        XCVRn^PIN;         ! PIN of $XCVRn server
000000 0  1              int        PrivEnabled;       ! TRUE if ENABLE PRIV
000000 0  1              int        MemoryRatio;       ! Don't create too much pressure
000000 0  1              int        CurrentTraceBuf;   ! Current pointer in trace buf
000000 0  1    struct      TraceBuf[0:127];           ! Trace buffer (for debugging)
000000 0  1                begin                      ! for tracing all BPT interrupts
000000 0  2                int      PIN;
000000 0  2                int      SpaceId;
000000 0  2                int      P;
000000 0  2                end;
000000 0  1              int        NumFiles;          ! # of entries in FilesToMeasure.
000000 0  1    struct      FilesToMeasure[0:127];     ! Table of filenames to measure.
000000 0  1                begin                      ! Always compressed to minimize
000000 0  2                int      FileName[0:11];   ! search time.
000000 0  2                int      UserID;           ! Who said "Measure OBJECT"
000000 0  2                int          SaveVol[0:7]; !Subvol to save bitmap on
000000 0  2                end;
000000 0  1    struct      ControlByPIN( CoverPinDataTemplate )
000000 0  1                [0:-1];                    ! Actually [0:<max pcbs>-1]
000000 0  1              end;
000000 0  0
000000 0  0  ! An eyecatcher is stashed in the CRCB just for sanity checking purposes.
000000 0  0  define      CoverVerifier = ($dbl1( "Co","vR" ))#; !eyecatcher
000000 0  0
000000 0  0  ! We will want to make sure that appropriate versions of COVER are looking at
000000 0  0  ! these control structures, so:
000000 0  0  literal     CoverControlLatestVersion = 13;
000000 0  0
```

```
000000 0  0   ! Since the CRCB structure may be larger than 32K bytes, we need to
000000 0  0   ! use the following to compute the address of a ControlByPIN entry.
000000 0  0   ! We assume that the user has initialized an .ext variable named
000000 0  0   ! "CRCB" that hold the address of the CRCB.
000000 0  0
000000 0  0   define ControlByPinAddress( pin ) =
000000 0  0      @CRCB + $udbl($offset(CoverRoutineControlBlock.ControlByPIN))
000000 0  0            + $len(CoverRoutineControlBlock.ControlByPIN) '*' pin#;
000000 0  0
000000 0  0
000000 0  0   ! The following SEGIDs are reserved for use by COVER.  They will
000000 0  0   ! define the resident segments needed to control measurements.  All
000000 0  0   ! the resident segments are allocated/deallocated by CVRMON and are
000000 0  0   ! owned the the $XCVRn process in each ENABLEd cpu.  A range of 256
000000 0  0   ! SEGIDs are reserved, one for each possible PIN, for each PIN's
000000 0  0   ! bitmap data, code copy, and library copy.  Only those segments which
000000 0  0   ! are actually in use will be allocated, and only the amount required
000000 0  0   ! for use will be locked down.
000000 0  0
000000 0  0   literal     CoverCrcbSegid       = 2302; !CRCB will belong to CVRMON
000000 0  0   literal     CoverBitmapSegids    = 2303; !2303 to 2558 for PINs 0 to 255 Bitmaps
000000 0  0   literal     CoverCodeCopySegids  = 2559; !2559 to 2814 for PINs 0 to 255 Code
000000 0  0   literal     CoverLibCopySegids   = 2815; !2815 to 3071 for PINs 0 to 255 Lib

000000 0  0   ! The bitmaps are allocated as an entire resident segment each, but only the
000000 0  0   ! pages actually needed are locked down.  This is enough for 16 spaces worth of
000000 0  0   ! bitmaps since a bitmap for each space is 64K bits, or 4KW.  Each space's
000000 0  0   ! bitmap starts on a 4KW boundary, so addressing is easy.
000000 0  0   ! We would LIKE to be able to define a struct to define this, but TAL limits
000000 0  0   ! structs to 32K words, and we need 64K words.  If we could, it would look like
000000 0  0   ! this:
000000 0  0   --struct       CoverSpaceBitmapTemplate(*);
000000 0  0   --             begin
000000 0  0   --   struct       Space[0:15];
000000 0  0   --                begin
000000 0  0   --                int         Bitmap[0:4095];
000000 0  0   --                end;
000000 0  0   --             end;
000000 0  0   ! But we'll have to do the 1st level of indexing ourselves, so we'll use an
000000 0  0   ! an array pointer which we'll initialize to the base + space index * size;
000000 0  0   ! The array will then look something like this:
000000 0  0   -- int .ext Bitmap[0:4095];
000000 0  0
000000 0  0   ! Note that programs may now have as many as 32 code spaces, but if
000000 0  0   ! they do, there can be no library.  COVER identifies these by making
000000 0  0   ! the UC and UL program names the same.  It then uses the UL bitmaps,
000000 0  0   ! etc. for the additional (>16) code spaces' data.
000000 0  0
000000 0  0   literal     SizeOfCoverSpaceBitmap = 8192d;  !In bytes
000000 0  0   literal     SizeOfCoverBitmapSegment = 16d * SizeOfCoverSpaceBitmap;
000000 0  0   ?SECTION DISC

000000 0  0   ! The disc output format for COVER measurement data is similar to the
000000 0  0   ! extended data structure which holds all measurement data for a
000000 0  0   ! particular PIN.
000000 0  0
000000 0  0   ! For the sake of ease of efficient writing, enough filler is included to
```

```
000000 0  0   ! force the bitmaps to start on a 2K boundary.  This is followed by two fully
000000 0  0   ! allocated (i.e., no empty space between bitmaps, even if much of the 16
000000 0  0   ! address spaces went unreferenced) copies of BitmapData.  The EOF will be the
000000 0  0   ! last bitmap address referenced (rounded up to an even page).  These can be
000000 0  0   ! referenced using the following:
000000 0  0
000000 0  0   struct        CoverDiscImageTemplate(*);
000000 0  0                 begin
000000 0  1                 int(32)     Verifier;              ! Contains eyecatcher "CovR"
000000 0  1                 int         Version;               ! For format identification
000000 0  1                 int         UCEverBooleaned;       ! TRUE if ever AND/OR/XOR'd
000000 0  1                 int         ULEverBooleaned;       ! TRUE if ever AND/OR/XOR'd
000000 0  1                 struct      UC( CoverPinDataCodespaceTemplate );
000000 0  1                 struct      UL( CoverPinDataCodespaceTemplate );
000000 0  1   !             FILLER      To round to a 2K boundary.
000000 0  1   -- struct        UCbitmapData( CoverSpaceBitmapTemplate );
000000 0  1   -- struct        ULbitmapData( CoverSpaceBitmapTemplate );
000000 0  1   ! We have to manage those last two substructs ourselves because TAL doesn't
000000 0  1   ! support structs that big!
000000 0  1                 end;
000000 0  0
000000 0  0   literal       CoverDiscLatestVersion = 2;
000000 0  0
000000 0  0   literal       CoverBitmapFilecode = 846;  !File code for bitmap files.
000000 0  0
000000 0  0   literal       CoverDiscHeaderSize = 2048d; !Round to page
000000 0  0   ?SECTION MESSAGES

000000 0  0   ! These messages are passed to the COVER server processes, $XCVR and
000000 0  0   ! $XCVRn.
000000 0  0   struct CVR^Server^Disable^Template(*);
000000 0  0                 begin
000000 0  1   int           MessageType;
000000 0  1                 end;
000000 0  0
000000 0  0   struct CVR^Server^Enable^Template(*);
000000 0  0                 begin
000000 0  1   int           MessageType;
000000 0  1                 end;
000000 0  0
000000 0  0   struct CVR^Server^Measure^Template(*);
000000 0  0                 begin
000000 0  1   int           MessageType;
000000 0  1   int           FromMonitor;                 !TRUE iff from Xnewprocess
000000 0  1   int           PIN;                         !PIN to measure
000000 0  1   int           Crtpid[0:2];                 !CRTPID of PIN to measure
000000 0  1   int           CodeSeg;                     !ABS segment of 1st program segment
000000 0  1   int           LibSeg;                      !ABS segment of 1st library segment
000000 0  1   int           CodeFilename[0:11];
000000 0  1   int           LibFilename[0:11];
000000 0  1   int           SaveVol[0:7];                !Subvol to save bitmap on
000000 0  1                 end;
000000 0  0
000000 0  0   struct CVR^Server^Save^Template(*);
000000 0  0                 begin
000000 0  1   int           MessageType;
000000 0  1   int           PIN;                         !PIN to save
```

```
  212.     000000 0  1   int          Owner;                    !CRAID of PIN to save
  213.     000000 0  1                end;
  214.     000000 0  0
  215.     000000 0  0   struct CVR^Server^Reset^Template(*);
  216.     000000 0  0                begin
  217.     000000 0  1   int          MessageType;
  218.     000000 0  1   int          PIN;                      !PIN to reset
  219.     000000 0  1                end;
  220.     000000 0  0
  221.     000000 0  0   ! The messages are identified by these MessageTypes:
  222.     000000 0  0   literal      CVR^Server^Disable  = 1;
  223.     000000 0  0   literal      CVR^Server^Enable   = 2;
  224.     000000 0  0   literal      CVR^Server^Measure  = 3;
  225.     000000 0  0   literal      CVR^Server^Save     = 4;
  226.     000000 0  0   literal      CVR^Server^Reset    = 5;
  227.     000000 0  0
  228.     000000 0  0   ! Special error returns from CVRMON must be negative (so as not to
  229.     000000 0  0   ! duplicate FE numbers) and must be different from RO^ routines' error
  230.     000000 0  0   ! codes.
  231.     000000 0  0   literal      CoverErrFirst          = -10; !First in the list *****
  232.     000000 0  0   literal      CoverErrAlready        = -10; !Already ENABLEd
  233.     000000 0  0   literal      CoverErrInsMem         = -11; !Insufficient memory
  234.     000000 0  0   literal      CoverErrNotRunning     = -12; !No (or wrong) process in PIN
  235.     000000 0  0   literal      CoverErrSpaceMismatch  = -13; !Code and object don't match
  236.     000000 0  0   literal      CoverErrInUse          = -14; !Some measurement running
  237.     000000 0  0   literal      CoverErrPriv           = -15; !PRIV process, but no ENABLE PRIV
  238.     000000 0  0   literal      CoverErrLast           = -15; !Last in the list ******
   19.     000000 0  0
   20.     000000 0  0   ?LIST
   21.     000000 0  0   ?NOLIST, source extdecs ( close,

   29.     000000 0  0   ?SOURCE sversion( version^cvrgard )
Source file:  [1]  $OVER.T9618C00.SVERSION  29APR87 - 09:45:32
   18.     000000 0  0   ?SECTION VERSION^CVRGARD
   19.     000000 0  0   PROC T9618C00^15JUL87^CVRGARD^29APR7;
   20.     000000 1  0   BEGIN END;

00000   125003


000000    7 EXIT      03

   30.     000000 0  0   ?SOURCE scvrgard
Source file:  [1]  $OVER.T9618C00.SCVRGARD  29APR87 - 12:45:27

    2.     000000 0  0   ! This is the real "guts" of the measurement.  It is called by
    3.     000000 0  0   ! the INSTRUCTIONBREAKPOINT interrupt handler right after entry.
    4.     000000 0  0   ! All the interrupt state is thus still available to us.  We can
    5.     000000 0  0   ! do whatever we need to for performing the measurement then
    6.     000000 0  0   ! simulate INSTRUCTIONBREAKPOINT's IXIT.  If we were entered and
    7.     000000 0  0   ! this was NOT because of a COVER bpt, then it's a real bpt, and
    8.     000000 0  0   ! we return to the INSTRUCTIONBREAKPOINT handler for normal
    9.     000000 0  0   ! handling.
   10.     000000 0  0   ! Package this in ODEBUG since it's a logical place for COVER
   11.     000000 0  0   ! code and keeps us from using up SC.
   12.     000000 0  0   !    N.B.  proc is loaded into resident memory and runs in an
   13.     000000 0  0   !     interrupt stack.  (e.g. priv, resident, traps off, 'g' =
```

```
000000 0  0   !    'sg', maybe no cpcb, etc).  Any procedure calls must be to
000000 0  0   !    RESIDENT procedures.
000000 0  0   ! Debugging note: To set breakpoints in this routine, you'll have
000000 0  0   ! to use the LOWBUG breakpoint facility or you'll recur; e.g.,
000000 0  0   ! B sc,123456 !
000000 0  0   proc CoverHook1 priv, resident;
000000 1  0   begin
000000 1  1   int         .st;                      !for accessing bottom of stack
000000 1  1   define      bpspaceid   = st[-5]#; !space id #
000000 1  1   define      msk         = st[-4]#; !interrupt mask
000000 1  1   define      sreg        = st[-3]#; !'s' reg
000000 1  1   define      preg        = st[-2]#; !'p' reg
000000 1  1   define      env         = st[-1]#; !'e' reg
000000 1  1   define      lreg        = st[ 0]#; !'l' reg
000000 1  1   define      r ![ 0:7 ]! = st[ 1]#; !reg stack
000000 1  1
000000 1  1   int         HisL = 'L';               !For access to my L register to IXIT
000000 1  1   string .ext crcb( CoverRoutineControlBlock );
000000 1  1   string .ext PinData( CoverPinDataTemplate );
000000 1  1   string .ext PinSpace( CoverPinDataCodespaceTemplate );
000000 1  1   int    .ext Bitmap;                   !16 * [0:4095]
000000 1  1   int    .ext xp;                       !address of source instruction
000000 1  1   int    .ext oxp;                      !address of copy of source instruction
000000 1  1   int     .sg bpth( bpttablehead ) := bpbase '-' wlen( bpth );
000000 1  1   int     .sg obp( bpt^template );
000000 1  1   int     .sg nbp( bpt^template );
000000 1  1   int         pin;                      !Pin # of process being measured
000000 1  1   int         CurCopySeg;               !Current abs segment (in code copy).
000000 1  1   int         CurSeg;                   !Corresponding original code segment
000000 1  1   label       ReExecute;
000000 1  1
000000 1  1   define      ENVSPACEID = <11:15>#; !Space id (index on base seg #)
000000 1  1   define      ENVCS = <7>#;             !Code space
000000 1  1   define      ENVDS = <6>#;             !Data space
000000 1  1   define      ENVLS = <4>#;             !Library space

000000 1  1   ! Return FALSE if access to xa will cause a fault, otherwise return TRUE
000000 1  1   ! NOTE: XA must be an absolute extended address.  No checking is done!
000000 1  1   int subproc CheckAddr ( xa );
000000 2  1   int(32)     xa;
000000 2  1   begin
000000 2  2   int         .ext spt( spt^template ); !segment page table
000000 2  2   int         pte;                      !a page table entry
000000 2  2
000000 2  2   stack^aspt( xa );
000005 2  2   store @spt;
000006 2  2   if $carry then return 0;
000012 2  2   stack xa;
000013 2  2   code( rspt );
000014 2  2   store pte;
000015 2  2   return if $carry or pte.absent then 0 else 1;
000026 2  2
000026 2  2   end; !subproc CheckAddr

PTE                  Variable        INT           Direct        S-000
SPT                  Variable,36     STRUCT-I      EXT Pointer   S-002
XA                   Variable        INT (32)      Direct        S-005
```

```
000026 1  1   ! BODY
000026 1  1   ! Find our cb and see if there's anything for us to do
000026 1  1   @crcb := @bpth.CoverCrcbPtr;
000037 1  1   if @crcb = 0d then return;          !Cover is not ENABLEd.
000044 1  1   if NOT (
000044 1  1           crcb.verifier = CoverVerifier AND
000044 1  1           crcb.version = CoverControlLatestVersion
000044 1  1           ) then PROCESSOR^HALT( DBG^Cover^Internal );
000065 1  1
000065 1  1   @st := siv[bkpt^siv].1;             !Make bottom of stack addressable
000070 1  1   if NOT @cpcb OR                     !Entered from interrupt env.  Let error be
000070 1  1                                       !handled by interrupt handler.
000070 1  1      env.ENVDS OR                     !Entered from interrupt env.  Error.
000070 1  1      bpspaceid.ENVCS then return;     !SC and SL not covered.
000103 1  1
000103 1  1   if SIV[ BKPT^SIV ].parm <> Icode^BPT     !Must have entered due to EXIT with
000103 1  1                     then return;      !ENV.<0> or DXIT
000112 1  1
000112 1  1   pin := cpcb.pcbmypin;               !Save our pin #
000116 1  1
000116 1  1   ! Trace interrupts
000116 1  1   use index;
000116 1  1   index := crcb.CurrentTraceBuf;
000121 1  1   crcb.TraceBuf[ index ].PIN := pin;
000130 1  1   crcb.TraceBuf[ index ].SpaceId := bpspaceid;
000140 1  1   crcb.TraceBuf[ index ].P := preg;
000150 1  1   if index = $occurs( crcb.TraceBuf ) -1 then
000153 1  1      crcb.CurrentTraceBuf := 0
000153 1  1   else
000157 1  1      crcb.CurrentTraceBuf := index + 1;
000163 1  1   drop index;
000163 1  1
000163 1  1   @PinData := ControlByPinAddress( pin );
000175 1  1
000175 1  1   if PinData.State <> CoverMeasureRunning then return;   !Not measured
000202 1  1
000202 1  1   use SpaceIndex;
000202 1  1   SpaceIndex := bpspaceid.ENVSPACEID;
000206 1  1   if bpspaceid.ENVLS then
000211 1  1      @PinSpace := @PinData.UL
000211 1  1   else
000217 1  1      @PinSpace := @PinData.UC;
000224 1  1
000224 1  1   if @PinSpace.BitmapPtr = 0d then return; !This space is not being measured
000235 1  1   if SpaceIndex >= PinSpace.SpaceCount then
000242 1  1      PROCESSOR^HALT( DBG^Cover^Internal );
000247 1  1
000247 1  1   ! Set the bit ON in the bitmap which corresponds to this instruction's
000247 1  1   ! address.  This indicates that this instruction was executed.
000247 1  1   @Bitmap := SizeOfCoverSpaceBitmap * $udbl(SpaceIndex) + @PinSpace.BitmapPtr;
000263 1  1   setbit ( preg , Bitmap );
000276 1  1   drop SpaceIndex;

000276 1  1   ! Figure out where the code and original copy of the code is.
000276 1  1   CurCopySeg := cmseg( bpspaceid.ENVLS*2 + bpspaceid.ENVCS + 2);
000317 1  1   @xp := axword( CurCopySeg, PREG);  !Point to ABS address of instruction
000326 1  1   CurSeg := CurCopySeg - (Pinspace.CopySeg - PinSpace.Seg);
```

```
000336 1 1   @oxp := axword( CurSeg, PREG );
000344 1 1   if NOT CheckAddr( @oxp ) then
000350 1 1      begin                           !The original is not resident
000350 1 2      stack @oxp,%174000;
000352 1 2      code( land );                   !Fault address with request set to 0
000353 1 2      store cpcb.pcbmemxa;
000355 1 2      dispatch;                       !Have MM page in original code
000356 1 2      goto ReExecute;                 !Get out and re-execute BPT
000360 1 2      end;
000360 1 1
000360 1 1   ! First look to see if BPT is one that's in BPT table.
000360 1 1   ! Note: we don't have to check crcb since we're the only one using this COPY
000360 1 1   ! of the code space.
000360 1 1   @obp := bpbase '-' wlen( obp );
000364 1 1   while (@obp := @obp[1]) '<' bplimit do
000373 1 1      if obp.bpaseg = CurCopySeg and obp.bpwadrs = PREG then
000407 1 1         begin                        !BPT set and known by DEBUG/INSPECT
000407 1 2         if obp.bpinstr = Icode^BPT then
000416 1 2            begin !It may have been set on top of a COVER BPT.  That means that
000416 1 3                  !its bpinstr is a BPT set by COVER.
000416 1 3            ! To find out, replace BPT's bpinstr with the original.
000416 1 3            if oxp <> Icode^BPT then
000424 1 3               obp.bpinstr := oxp     !That was easy
000424 1 3            else
000431 1 3               begin                  !Try to find entry in BPT table
000431 1 4               @nbp := bpbase '-' wlen( nbp );
000435 1 4               while (@nbp := @nbp[1]) '<' bplimit do
000444 1 4               if nbp.bpaseg = CurSeg and nbp.bpwadrs = PREG then
000460 1 4                  begin
000460 1 5                  obp.bpinstr := nbp.bpinstr;   !Here one is.  Use its instruction
000465 1 5                  return;
000466 1 5                  end;
000467 1 4               end;
000467 1 3            end;
000467 1 2         return;
000470 1 2         end;
000471 1 1
000471 1 1   xp := oxp;                         !Replace with original instr.
000475 1 1
000475 1 1   if oxp = Icode^BPT then
000503 1 1      begin
000503 1 2   !  This wasn't set by COVER.  It was in the original code or has been
000503 1 2   !  set there by another process.
000503 1 2   !  Look for entry in BPT table.
000503 1 2      @obp := bpbase '-' wlen( obp );
000507 1 2      while (@obp := @obp[1]) '<' bplimit do
000516 1 2         if obp.bpaseg = CurSeg and obp.bpwadrs = PREG then
000532 1 2            begin
000532 1 3            xp := obp.bpinstr;         !It was set there.  Use real instruction.
000537 1 3            goto ReExecute;
000540 1 3            end;
000541 1 2      return;                         !It was in original code.  Treat as invalop
000542 1 2      end;
000542 1 1
000542 1 1   ReExecute:
000542 1 1   ! Re-execute the interrupted instruction upon IXIT; COVER handled this.
000542 1 1   stack Hist;                        !Simulate part of EXIT
```

```
000543 1  1   code ( setl );
000544 1  1   code ( ixit );                    !Get out as if we were int handler itself
000545 1  1
000545 1  1   end; ! proc CoverHook1

BITMAP            Variable          INT        EXT Pointer   L+010
BPSPACEID         Define                       ST[-5]
BPTH              Variable,114      STRUCT-I   SG Pointer    L+016
CHECKADDR         Subproc           INT        %000000
CRCB              Variable,14020    STRUCT-S   EXT Pointer   L+002
CURCOPYSEG        Variable          INT        Direct        L+022
CURSEG            Variable          INT        Direct        L+023
ENV               Define                       ST[-1]
ENVCS             Define                       <7>
ENVDS             Define                       <6>
ENVLS             Define                       <4>
ENVSPACEID        Define                       <11:15>
HISL              Variable          INT        Direct        L+000
LREG              Define                       ST[ 0]
MSK               Define                       ST[-4]
NBP               Variable,22       STRUCT-I   SG Pointer    L+020
OBP               Variable,22       STRUCT-I   SG Pointer    L+017
OXP               Variable          INT        EXT Pointer   L+014
PIN               Variable          INT        Direct        L+021
PINDATA           Variable,244      STRUCT-S   EXT Pointer   L+004
PINSPACE          Variable,110      STRUCT-S   EXT Pointer   L+006
PREG              Define                       ST[-2]
R                 Define                       ST[ 1]
REEXECUTE         Label                        %000542
SREG              Define                       ST[-3]
ST                Variable          INT        Indirect      L+001
XP                Variable          INT        EXT Pointer   L+012

00000  002003 100036 060745 000470 000101 064742 017003 100000
00020  014402 100000 010401 100001 002775 025003 002015 103123
00040  000002 000225 015001 125003 060402 000412 005103 004157
00060  005014 004020 000027 000074 010776 103114 143604 044401
00100  007001 014401 125003 103117 143604 005001 004051 000215
00120  000117 040421 000137 100003 000202 000111 003007 026502
00140  101776 141401 000137 100003 000202 000111 003011 026502
00160  104001 100006 026502 060402 100000 005030 004020 000220
00200  012001 125003 102773 142401 006037 000117 142401 007010
00220  100024 060404 000220 064406 100000 100104 060406 000220
00240  000215 014005 005014 004020 000027 000074 010776 100000
00260  000412 000220 064410 005200 102776 142401 006017 030100
00300  102773 142401 030113 006001 100002 000212 000210 142401
00320  005100 000210 101776 141401 130001 064412 040422 100001
00340  000210 141401 130001 064414 060414 024711 117410 015410
00360  103123 043600 003767 044417 103011 173417 034417 102125
00400  103001 173417 000350 102776 142401 000215 015061 101002
00420  005001 004051 000215 012005 100000 026414 171417 000351
[illegible] [illegible] [illegible] 000205 013023 [illegible] 000350 040423 000215
00460  101002 171420 000350 171417 000351 125003 010746 125003
00500  004051 000215 015037 103123 043600 003767 044417 103011
00520  040423 000215 015015 103001 173417 000350 102776 142401
00540  010746 125003 040400 000020 000071

00010  002775 025003 060745 000424 044740 010003 040740 006001
00030  043600 003732 024700 002005 170416 000352 064402 060402
00050  005166 004122 000225 015004 100002 026402 001015 012005
00070  170603 014410 103777 143401 007002 015404 103773 143401
00110  012001 125003 103077 143603 006377 044421 100006 026402
00130  102773 142401 000137 100003 000202 000111 003010 026502
00150  000137 001177 015004 100000 100006 026502 010404 000137
00170  040421 100244 000202 000220 064404 100000 026404 001002
00210  014406 100000 100134 060404 000220 064406 010405 100000
00230  000412 000002 000225 015001 125003 000137 100021 026406
00250  005040 100000 000137 000222 100000 100104 060406 000220
00270  060410 100000 142401 030103 000220 000047 005002 004340
00310  030110 006001 000210 104002 000117 043600 044422 040422
00330  026406 100000 026406 000211 000211 044423 040423 005100
00350  060414 005370 000010 103020 167603 000073 010563 177421
00370  042600 000205 013076 170417 000350 040422 000215 015070
00410  171417 000350 005001 004051 000215 015051 100000 026414
00430  010436 103123 043600 003767 044420 103011 173420 034420
00450  015015 103001 173420 000350 102776 142401 000215 015006
00470  010673 100000 026414 100000 026512 100000 026414 005001
00510  173417 034417 102125 042600 000205 013023 170417 000350
00530  000215 015006 101002 171417 000350 100000 026512 010402
```

```
000000  7 ADDS +003          0 LDI  +036          2 LDD  S-005         2 CON  %000470   8   1 STRP 1              7 STD  S-002
000006  7 BNOC +003          0 LDI  +000          0 ADDS -003          0 RSUB 03              1 LDD  S-005          0 RSPT
000014  7 STOR S-000         7 BIC  +003          0 LOAD S-000         0 ANRI +001            7 BAZ  +002           0 LDI  +000
000022  0 BUN  +001          0 LDI  +001          0 ADDS -003          0 RSUB 03              7 ADDS +015           7 LDXI +123,7
000030  0 LOAD SG+000,7      0 LADI -046          7 PUSH 700           7 ADDS +005            0 LADR L+016,I        1 LDAS
000036  7 STD  L+002         1 LDD  L+002         3 ZERD               7 DCMP                 7 BNEQ +001           7 EXIT 03
000044  1 LDD  L+002         1 LDDX               2 LDLI +103          2 ORRI 157             3 LDLI +166           3 ORRI 122
000052  7 DCMP               7 BNEQ +004          0 LDI  +002          0 LWXX L+002           7 CMPI +015           7 BEQL +005
000060  0 LDLI +014          0 ORRI 020           7 SSW                7 HALT                 7 CON  %010776 ~      7 LDXI +114,7
000066  0 LOAD SG+004,I,7    7 STOR L+001         0 LADR SG+003,I      7 BAZ  +010            7 LDXI -001,7         0 LOAD L+001,I,7
000074  0 ANLI +002          7 BANZ +004          7 LDXI -005,7        0 LOAD L+001,I,7       0 ANLI +001           7 BAZ  +001
000102  7 EXIT 03            7 LDXI +117,7        0 LOAD SG+004,I,7    1 LDLI +001            1 ORRI 051            7 ICMP
000110  7 BEQL +001          7 EXIT 03            7 LDXI +077,7        0 LOAD SG+003,I,7      0 ANRI +377           7 STOR L+021
000116  0 LDI  +006          0 LWXX L+002         7 STAR 7             0 LOAD L+021           1 LDRA 7              2 LDI  +003
000124  2 LMPY               1 STAR 1             1 LADI +007          7 SWXX L+002           7 LDXI -005,6         0 LOAD L+001,I,6
000132  1 LDRA 7             2 LDI  +003          2 LMPY               1 STAR 1               1 LADI +010           7 SWXX L+002
000140  7 LDXI -002,5        0 LOAD L+001,I,5     1 LDRA 7             2 LDI  +003            2 LMPY                1 STAR 1
000146  1 LADI +011          7 SWXX L+002         0 LDRA 7             7 CMPI +177            7 BNEQ +004           0 LDI  +000
000154  1 LDI  +006          7 SWXX L+002         7 BUN  +004          0 LDRA 7               0 ADDI +001           1 LDI  +006
000162  7 SWXX L+002         1 LDD  L+002         2 LDI  +000          3 LDLI +030            3 ORRI 020            1 DADD
000170  2 LOAD L+021         3 LDI  +244          3 LMPY               1 DADD                 7 STD  L+004          0 LDI  +000
000176  0 LWXX L+004         7 CMPI +002          7 BEQL +001          7 EXIT 03              7 LDXI -005,6         0 LOAD L+001,I,6
000204  0 ANRI +037          7 STAR 7             0 LOAD L+001,I,6     0 ANLI +010            7 BAZ  +006           0 LDI  +000
000212  1 LDI  +134          3 LDD  L+004         1 DADD               7 STD  L+006           7 BUN  +005           0 LDI  +000
000220  1 LDI  +024          3 LDD  L+004         1 DADD               7 STD  L+006           0 LDI  +000           1 LDI  +104
000226  3 LDD  L+006         1 DADD               1 LDDX               3 ZERD                 7 DCMP                7 BNEQ +001
000234  7 EXIT 03            0 LDRA 7             1 LDI  +021          1 LWXX L+006           7 ICMP                7 BLSS +005
000242  0 LDLI +014          0 ORRI 020           7 SSW                7 HALT                 7 CON  %010776 ~      0 LDI  +000
000250  1 LDLI +040          2 LDI  +000          3 LDRA 7             1 DMPY                 2 LDI  +000           3 LDI  +104
000256  5 LDD  L+006         3 DADD               3 LDDX               1 DADD                 7 STD  L+010          0 LDLI +200
000264  0 LDXI -002,6        1 LOAD L+001,I,6     1 ANRI +017          0 LRS  00              2 LDD  L+010          3 LDI  +000
000272  4 LOAD L+001,I,6     4 LRS  03            2 DADD               7 ORX                  0 LDLI +002           0 ORRI 340
000300  0 LDXI -005,6        1 LOAD L+001,I,6     1 LRS  13            1 ANRI +001            2 LDI  +002           1 IMPY
000306  0 IADD               1 LOAD L+001,I,6     1 LRS  10            1 ANRI +001            0 IADD                0 ADDI +002
000314  7 STAR 7             0 LOAD SG+000,7      7 STOR L+022         0 LOAD L+022           1 LDLI +100           0 IADD
000322  0 LDXI -002,5        1 LOAD L+001,I,5     1 DLLS 01            7 STD  L+012           0 LOAD L+022          1 LDI  +001
000330  1 LWXX L+006         2 LDI  +000          2 LWXX L+006         1 ISUB                 0 ISUB                7 STOR L+023
000336  0 LOAD L+023         1 LDLI +100          0 IADD               1 LOAD L+001,I,5       1 DLLS 01             7 STD  L+014
000344  1 LDD  L+014         7 PUSH 711           7 BSUB +010,I        7 BANZ +010            1 LDD  L+014          2 LDLI +370
000352  1 LAND               1 LDXI +020,7        7 STD  SG+003,I,7    7 DISP                 7 BUN  +163           7 BLBL %177421
000360  7 LDXI +123,7        0 LOAD SG+000,7      0 LADI -011          7 STOR L+017           7 LDXI +011,7         0 LADR L+017,I,7
000366  0 NSTO L+017         0 LDXI +125,6        1 LOAD SG+000,6      7 LCMP                 7 BGEQ +076           0 LADR L+017,I
000374  0 LWAS               1 LOAD L+022         7 ICMP               7 BNEQ +070            7 LDXI +001,7         0 LADR L+017,I,7
000402  0 LWAS               0 LDXI -002,6        1 LOAD L+001,I,6     7 ICMP                 7 BNEQ +061           7 LDXI +002,5
000410  0 LADR L+017,I,5     0 LWAS               1 LDLI +001          1 ORRI 051             7 ICMP                7 BNEQ +051
000416  0 LDI  +000          0 LWXX L+014         1 LDLI +001          1 ORRI 051             7 ICMP                7 BEQL +005
000424  0 LDI  +000          0 LWXX L+014         1 LADR L+017,I,5     7 SWAS                 7 BUN  +036           7 LDXI +123,7
000432  0 LOAD SG+000,7      0 LADI -011          7 STOR L+020         7 LDXI +011,7          0 LADR L+020,I,7      0 NSTO L+020
000440  0 LDXI +125,6        1 LOAD SG+000,6      7 LCMP               7 BGEQ +023            0 LADR L+020,I        0 LWAS
000446  1 LOAD L+023         7 ICMP               7 BNEQ +015          7 LDXI +001,7          0 LADR L+020,I,7      0 LWAS
000454  0 LDXI -002,6        1 LOAD L+001,I,6     7 ICMP               7 BNEQ +006            7 LDXI +002,5         0 LADR L+020,I,5
000462  0 LWAS               1 LADR L+017,I,5     7 SWAS               7 EXIT 03              7 BUN  -032           7 EXIT 03
000470  7 BUN  -105          0 LDI  +000          0 LWXX L+014         1 LDI  +000            7 SWXX L+012          0 LDI  +000
000476  0 LWXX L+014         1 LDLI +001          1 ORRI 051           7 ICMP                 7 BNEQ +037           7 LDXI +123,7
000504  0 LOAD SG+000,7      0 LADI -011          7 STOR L+017         7 LDXI +011,7          0 LADR L+017,I,7      0 NSTO L+017
000512  0 LDXI +125,6        1 LOAD SG+000,6      7 LCMP               7 BGEQ +023            0 LADR L+017,I        0 LWAS
000520  1 LOAD L+023         7 ICMP               7 BNEQ +015          7 LDXI +001,7          0 LADR L+017,I,7      0 LWAS
```

```
000526   0 LDXI    -002,6    1 LOAD  L+001,I,6  7 ICMP           7 BNEQ   +006     7 LDXI   +002,5    0 LADR   L+017,I,5
000534   0 LWAS              1 LDI    +000      7 SWXX  L+012    7 BUN    +002     7 BUN    -032      7 EXIT      03
000542   0 LOAD  L+000       7 SETL             7 IXIT'

000000 0  0   ! This is the "real" CoverHook2.  It will look to see if this process
000000 0  0   ! was being measured and, if so, will send a message to the $XCVRn server
000000 0  0   ! to write the ZZCOnnnn file and de-allocate memory.
000000 0  0   !
000000 0  0   ! Programming note:  XSTOP is executed using the Phoenix process'
000000 0  0   ! stack.  This is only 2048 words (as of B40), so we have to keep XSTOP's
000000 0  0   ! stack small.
000000 0  0   proc CoverHook2( p ) priv;
000000 1  0   INT  .P( PCB^TEMPLATE );          ! copy of PCB                           B00,RKS #69
000000 1  0   begin
000000 1  1   int      .sg bpth( bpttablehead ) := bpbase '-' wlen( bpth );
000000 1  1   int      .sg CpuNumber := CPU^SGADDR;
000000 1  1   string .ext crcb( CoverRoutineControlBlock );
000000 1  1   string .ext PinData( CoverPinDataTemplate );
000000 1  1   int          PinToStop;
000000 1  1   int          error;                !Pandora's box
000000 1  1   int          ServerName[0:11] := ["$XCVRn              "];
000014 1  1   string       ServerName^S = ServerName;
000014 1  1   int          ServerFn;
000014 1  1   struct       Save( CVR^Server^Save^Template );
000014 1  1   string       BinToHex = 'P' := ["0123456789ABCDEF"];
000024 1  1
000024 1  1   psem (  bpth.CoverCrcbSem, -1d );  !Take control
000050 1  1   @crcb := @bpth.CoverCrcbPtr;
000053 1  1   if @crcb = 0d then
000057 1  1      begin                           !COVER is not ENABLEd
000057 1  2      vsem(  bpth.CoverCrcbSem );
000066 1  2      return;
000067 1  2      end;
000067 1  1
000067 1  1   PinToStop := p.pcbmypin;           !Determine which pin is being stopped
000073 1  1
000073 1  1   @PinData := ControlByPinAddress( PinToStop );
000105 1  1
000105 1  1   if PinData.State <> CoverMeasureRunning then
000111 1  1      begin                           !The PIN only needs to be fixed up if a
000111 1  2      vsem(  bpth.CoverCrcbSem );     !measurement is fully running.  Otherwise
000120 1  2      return;                         !Measure and REset will clean up.
000121 1  2      end;
000121 1  1
000121 1  1   PinData.State := CoverMeasureStopping;  !Don't let it get away.
000124 1  1   vsem(  bpth.CoverCrcbSem );        !Can now free the semaphore
000133 1  1
000133 1  1   ! Restore his pcb to the code & lib he had before measurement started.
000133 1  1   if PinData.UC.SpaceCount then p.pcbcodeseg := PinData.UC.Seg;
000142 1  1   if PinData.UL.SpaceCount then p.pcblibseg := PinData.UL.Seg;
000151 1  1
000151 1  1   ServerName^S[5] ':=' BinToHex[ CpuNumber ] for 1 bytes; !$XCVRn
000166 1  1   call open( ServerName, ServerFn );
000175 1  1   if <> then PROCESSOR^HALT( DBG^Cover^Internal );
000203 1  1   Save.MessageType := CVR^Server^Save;
000205 1  1   Save.PIN := p.pcbmypin;            !Which PIN is being saved
000211 1  1   Save.Owner := p.pcbcraid;          !File will be owned by guy who ran process
```

```
240.   000214 1  1   call write( ServerFn, Save, $len(Save) );
241.   000224 1  1   ! Monitor doesn't have to send RESET request; it's done by SAVE.
242.   000224 1  1   call close( ServerFn );
244.   000231 1  1   end; ! proc CoverHook2

BINTOHEX                 Variable        STRING     Direct        P+000
BPTH                     Variable,114    STRUCT-I   SG Pointer    L+001
CPUNUMBER                Variable        INT        SG Pointer    L+002
CRCB                     Variable,14020  STRUCT-S   EXT Pointer   L+003
ERROR                    Variable        INT        Direct        L+010
P                        Variable,200    STRUCT-I   Indirect      L-003
PINDATA                  Variable,244    STRUCT-S'  EXT Pointer   L+005
PINTOSTOP                Variable        INT        Direct        L+007
SAVE                     Variable,6      STRUCT     Direct        L+026
SERVERFN                 Variable        INT        Direct        L+025
SERVERNAME               Variable        INT        Direct        L+011
SERVERNAMEAS             Variable        STRING     Direct        L+011

00000 022130 041526 051156 020040 020040 020040 020040 020040   00010 020040 020040 020040 020040 030061 031063 032065 033067
00020 034071 040502 041504 042506 103123 043600 003732 100000   00030 024711 002026 070411 000025 003744 100014 026047 000001
00040 100001 102002 172401 130001 000423 000076 000007 000107   00050 170401 000352 064403 060403 000002 000225 015010 100001
00060 103002 173401 130001 000423 000077 000107 125004 103077   00070 143703 006377 044407 060403 100000 005030 004020 000220
00100 040407 100244 000202 000220 064405 100000 026405 001002   00110 012010 100001 102002 172401 130001 000423 000077 000107
00120 125004 100003 100000 026505 100001 103002 173401 130001   00130 000423 000077 000107 100033 026405 014404 100012 026405
00140 103011 147703 100077 026405 014404 100056 026405 103012   00150 147703 103005 000137 070411 030001 000200 170402 000350
00160 000025 030001 003466 000200 100001 126047 070411 070425   00170 024711 002006 100300 024700 027000 012005 005014 004020
00200 000027 000074 010776 100004 044426 103077 143703 006377   00210 044427 102064 142703 044430 040425 070426 100006 024722
00220 002003 100034 024700 027000 040425 100000 100002 024722   00230 027000 125004

000000  7 CON  %022130   $X  7 CON  %041526   CV  7 CON  %051156   Rn  7 CON  %020040      7 CON  %020040      7 CON  %020040
000006  7 CON  %020040       7 CON  %020040       7 CON  %020040       7 CON  %020040      7 CON  %020040      7 CON  %020040
000014  7 CON  %030061   01  7 CON  %031063   23  7 CON  %032065   45  7 CON  %033067  67  7 CON  %034071  89  7 CON  %040502  AB
000022  7 CON  %041504   CD  7 CON  %042506   EF  7 LDXI    +123,7     0 LOAD  SG+000,7    0 LADI     -046     1 LDI      +000
000030  7 PUSH     711       7 ADDS     +026      0 LADR   L+011       1 RDP               1 LADI     -034     2 LDI      +014
000036  7 MOVW     047       1 MOND               2 LDI     +001       2 LDXI    +002,6    3 LADR  L+001,I,6   3 DLLS       01
000044  3 CRAX               1 PSEM               0 BTST               7 STRP        7     0 LADR  L+001,I     1 LDAS
000052  7 STD    L+003       1 LDD     L+003      3 ZERD               7 DCMP              7 BNEQ     +010     0 LDI      +001
000060  0 LDXI  +002,7       1 LADR  L+001,I,7    1 DLLS      01       1 CRAX              0 VSEM              7 STRP        7
000066  7 EXIT      04       7 LDXI   +077,7      0 LOAD  L-003,I,7    0 ANRI     +377     7 STOR    L+007     1 LDD     L+003
000074  2 LDI     +000       3 LDLI     +030      3 ORRI     020       1 DADD              2 LOAD    L+007     3 LDI      +244
000102  3 LMPY               1 DADD               7 STD    L+005       0 LDI      +000     0 LWXX    L+005     7 CMPI     +002
000110  7 BEQL    +010       0 LDI      +001      0 LDXI   +002,6      1 LADR  L+001,I,6   1 DLLS       01     1 CRAX
000116  0 VSEM               7 STRP        7      7 EXIT      04       0 LDI      +003     1 LDI      +000     7 SWXX    L+005
000124  0 LDI     +001       0 LDXI   +002,7      1 LADR  L+001,I,7    1 DLLS       01     1 CRAX              0 VSEM
000132  7 STRP       7       0 LDI      +033      0 LWXX   L+005       7 BAZ      +004     0 LDI      +012     0 LWXX    L+005
000140  0 LDXI  +011,7       7 STOR  L-003,I,7    0 LDI     +077       0 LWXX    L+005     7 BAZ      +004     0 LDI      +056
000146  0 LWXX   L+005       0 LDXI   +012,7      7 STOR  L-003,I,7    7 LDXI    +005,7    0 LDRA        7     1 LADR    L+011
000154  1 LLS       01       0 LADD               1 LADR  L+002,I      1 LWAS              2 RDP               2 LLS        01
000162  2 LADI    -312       1 LADD               2 LDI     +001       7 MOVB      047     0 LADR    L+011     1 LADR    L+025
000170  7 PUSH     711       7 ADDS     +006      0 LDI     +300       7 PUSH      700     7 PCAL      000     7 BEQL     +005
000176  0 LDLI    +014       0 ORRI      020      7 SSW                7 HALT              7 CON  %010776   ~  0 LDI      +004
000204  7 STOR   L+026       7 LDXI   +077,7      0 LOAD  L-003,I,7    0 ANRI     +377     7 STOR    L+027     7 LDXI   +064,6
000212  0 LOAD L-003,I,6     7 STOR    L+030      0 LOAD   L+025       1 LADR    L+026     2 LDI      +006     7 PUSH      722
000220  7 ADDS    +003       0 LDI      +034      7 PUSH     700       7 PCAL      000     0 LOAD    L+025     1 LDI      +000
000226  2 LDI     +002       7 PUSH      722      7 PCAL     000       7 EXIT       04
```

```
000000 0  0   ! This is the "real" CoverHook3.  It will look to see if COVER is
000000 0  0   ! enabled in this cpu and whether this program should be measured.  If
000000 0  0   ! so, a message will be sent to $XCVRn which will start the
000000 0  0   ! measurement.  We will then return after the reply is received.
000000 0  0   !
000000 0  0   ! Programming note:  XNEWPROCESS is executed using the Phoenix process'
000000 0  0   ! stack.  This is only 3072 words (as of B40), so we have to keep our
000000 0  0   ! stack small.
000000 0  0   proc CoverHook3( P, ProgramFilename, LibraryFilename ) priv;
000000 1  0   INT          .P( PCB^TEMPLATE );      ! copy of PCB
000000 1  0   INT          .PROGRAMFILENAME;
000000 1  0   INT          .LIBRARYFILENAME;
000000 1  0   begin
000000 1  1   int      .sg bpth( bpttablehead ) := bpbase '-' wlen( bpth );
000000 1  1   int      .sg CpuNumber := CPU^SGADDR;
000000 1  1   string .ext crcb( CoverRoutineControlBlock );
000000 1  1   string .ext PinData( CoverPinDataTemplate );
000000 1  1   int          ServerName[0:11] := ["$XCVRn                    "];
000014 1  1   string       ServerName^S = ServerName;
000014 1  1   int          ServerFn;
000014 1  1   int          NoError;
000014 1  1   int          i,j;
000014 1  1   struct       Request( CVR^Server^Measure^Template );
000014 1  1   string       BinToHex = 'P' := ["0123456789ABCDEF"];
000024 1  1   int          CompareTableName[0:11];
000024 1  1   int          ProgramName[0:11];
000024 1  1   int          LibraryName[0:11];
000024 1  1   int          SaveVol[0:7];
000024 1  1   label        DontMeasure;
000024 1  1   label        GotError;
000024 1  1
000024 1  1   ! We test that COVER is enabled and that an object file is supposed to
000024 1  1   ! be measured BEFORE sending a message to $XCVRn, so we don't waste
000024 1  1   ! time for the majority of cases (where nothing is to be measured).
000024 1  1   psem (  bpth.CoverCrcbSem, -1d );  !Take control
000050 1  1   @crcb := @bpth.CoverCrcbPtr;
000053 1  1   if @crcb = 0d then goto DontMeasure;     !COVER is not ENABLEd
000060 1  1
000060 1  1   ! If not allowed to measure PRIV code and user has some then get out!
000060 1  1   if (p.PrivCodeF OR p.PrivLibF) and NOT crcb.PrivEnabled then goto DontMeasure;
000074 1  1   ProgramName ':='                            ";
000102 1  1   LibraryName ':=' "                          ";
000110 1  1   ! Look up Program and Library file names.
000110 1  1   j := crcb.NumFiles - 1;             !Convert count to 0-relative for speed
000115 1  1   for i := 0 to j do
000121 1  1      begin
000121 1  2      CompareTableName ':=' crcb.FilesToMeasure[ i ].Filename for 12 words;
000141 1  2      if NOT fnamecompare( CompareTableName, PROGRAMFILENAME ) then
000146 1  2         begin
000146 1  3         ProgramName ':=' PROGRAMFILENAME for 12 words;
000152 1  3         SaveVol ':=' crcb.FilesToMeasure[ i ].SaveVol for 8 words;
000172 1  3         i := j+1;                      !End loop
000175 1  3         end;
000175 1  2      end;
000203 1  1   if LIBRARYFILENAME <> "  " then for i := 0 to j do
000212 1  1      begin
000212 1  2      CompareTableName ':=' crcb.FilesToMeasure[ i ].Filename for 12 words;
```

B00,RKS #69

```
000232 1  2      if NOT fnamecompare( CompareTableName, LIBRARYFILENAME ) then
000237 1  2         begin
000237 1  3         LibraryName ':=' LIBRARYFILENAME for 12 words;
000243 1  3         SaveVol ':=' crcb.FilesToMeasure[ i ].SaveVol for 8 words;
000265 1  3         i := j+1;                  !End loop
000270 1  3         end;
000270 1  2      end;
000276 1  1
000276 1  1   if ProgramName = LibraryName for 12 then !Both are blank (can't be same)
000303 1  1      begin
000303 1  2   DontMeasure:
000303 1  2      vsem(  bpth.CoverCrcbSem );       !Unlock
000312 1  2      return;                           !Certainly no measurement
000313 1  2      end;
000313 1  1
000313 1  1   @PinData := ControlByPinAddress( p.pcbmypin );
000327 1  1   PinData.State := CoverMeasureStarting;  !Reserves crcb
000332 1  1   vsem(  bpth.CoverCrcbSem );          !Unlock
000341 1  1
000341 1  1   ServerName^S[5] ':=' BinToHex[ CpuNumber ] for 1 bytes; !$XCVRn
000360 1  1   call open( ServerName, ServerFn );
000367 1  1   if <> then goto GotError;            !Not enough LCBs, etc.
000371 1  1
000371 1  1   Request.MessageType := CVR^Server^Measure;
000373 1  1   Request.FromMonitor := 1;            !TRUE, it's from Xnewprocess
000375 1  1   Request.PIN := p.pcbmypin;           !Which PIN is being started
000401 1  1   Request.Crtpid ':=' p.pcbcrt for 3 words;
000406 1  1   Request.CodeSeg := p.pcbcodeseg;   !Where they are now
000411 1  1   Request.LibSeg := p.pcblibseg;
000414 1  1   Request.CodeFilename ':=' ProgramName for 12 words;
000420 1  1   Request.LibFilename ':='  LibraryName for 12 words;
000424 1  1   Request.SaveVol ':=' SaveVol for 8 words;
000430 1  1   call write( ServerFn, Request, $len(Request) );
000440 1  1   NoError := =;                        !Save result so we can go ahead and do
000445 1  1   call close( ServerFn );              !this close now.
000452 1  1
000452 1  1   if NoError then                      !All the setup was done OK
000454 1  1      begin
000454 1  2      !Swap the code segments
000454 1  2      if PinData.UC.SpaceCount then p.pcbcodeseg := PinData.UC.CopySeg;
000463 1  2      if PinData.UL.SpaceCount then p.pcblibseg := PinData.UL.CopySeg;
000472 1  2      PinData.State := CoverMeasureRunning;
000475 1  2      end
000475 1  1   else
000476 1  1   GotError:
000476 1  1      PinData.State := CoverMeasureReset;
000500 1  1
000500 1  1   end; ! proc CoverHook3
```

| | | | | |
|---|---|---|---|---|
| BINTOHEX | Variable | STRING | Direct | P+000 |
| BPTH | Variable,114 | STRUCT-I | SG Pointer | L+001 |
| COMPARETABLENAME | Variable | INT | Direct | L+077 |
| CPUNUMBER | Variable | INT | SG Pointer | L+002 |
| CRCB | Variable,14020 | STRUCT-S | EXT Pointer | L+003 |
| DONTMEASURE | Label | | %000303 | |
| GOTERROR | Label | | %000476 | |
| I | Variable | INT | Direct | L+025 |

```
J                      Variable        INT          Direct         L+026
LIBRARYFILENAME        Variable        INT          Indirect       L-003
LIBRARYNAME            Variable        INT          Direct         L+127
NOERROR                Variable        INT          Direct         L+024
P                      Variable,200    STRUCT-I     Indirect       L-005
PINDATA                Variable,244    STRUCT-S     EXT Pointer    L+005
PROGRAMFILENAME        Variable        INT          Indirect       L-004
PROGRAMNAME            Variable        INT          Direct         L+113
REQUEST                Variable,120    STRUCT       Direct         L+027
SAVEVOL                Variable        INT          Direct         L+143
SERVERFN               Variable        INT          Direct         L+023
SERVERNAME             Variable        INT          Direct         L+007
SERVERNAME^S           Variable        STRING       Direct         L+007

00000 022130 041526 051156 020040 020040 020040 020040 020040   00010 020040 020040 020040 020040 030061 031063 032065 033067
00020 034071 040502 041504 042506 103123 043600 003732 100000   00030 024711 002150 070407 000025 003744 100014 026047 000001
00040 100001 102002 172401 130001 000423 000076 000007 000107   00050 170401 000352 064403 060403 000002 000225 015001 110577
00060 103005 143705 007010 015404 103070 143705 007200 014404   00070 100004 026403 015401 110563 070513 000025 020020 000200
00100 100014 026047 070527 000025 020013 000200 100014 026047   00110 005001 004207 026403 104777 044426 100000 010460 000403
00120 000411 100000 070477 130001 040425 100025 000202 000112   00130 005001 004210 000200 000327 130201 060403 000220 100030
00140 000417 070477 170704 024711 027000 015427 070513 170704   00150 100014 026007 100000 070543 130001 040425 100025 000202
00160 000112 005001 004225 000200 000327 130201 060403 000220   00170 100020 000417 040426 104001 044425 040425 104001 034425
00200 040426 000215 016316 140703 005040 004040 000215 012066   00210 100000 010460 100000 070477 130001 040425 100025 000202
00220 000112 005001 004210 000200 000327 130201 060403 000220   00230 100030 000417 070477 170703 024711 027000 015431 070527
00240 170703 100014 026007 100000 070543 130001 040425 100025   00250 000202 000112 005001 004225 000200 000327 010401 000024
00260 130201 060403 000220 100020 000417 040426 104001 044425   00270 040425 104001 034425 040426 000215 016314 070513 070527
00300 100014 026207 015010 100001 103002 173401 130001 000423   00310 000077 000107 125006 060403 100000 005030 004020 000220
00320 100244 103077 143705 006377 000202 000220 064405 100001   00330 100000 026505 100001 102002 172401 130001 000423 000077
00340 000107 103005 000137 070407 030001 000200 170402 000350   00350 000025 030001 005376 004106 000200 000200 100001 126047
00360 070407 070423 024711 002006 100300 024700 027000 012001   00370 010505 100003 044427 100001 044430 103077 143705 006377
00400 044431 070432 102061 172705 100003 026007 101011 141705   00410 044435 103012 143705 044436 070437 070513 100014 026007
00420 070453 070527 100014 026007 070467 070543 100010 026007   00430 040423 070427 100120 024722 002003 100034 024700 027000
00440 015002 100777 010401 100000 044424 040423 100000 100002   00450 024722 027000 040424 014422 100033 026405 014404 100013
00460 026405 103011 147705 100077 026405 014404 100057 026405   00470 103012 147705 100002 100000 026505 010402 000002 026505
00500 125006 020040 020040 020040 020040 020040 020040 020040   00510 020040 020040 020040 020040 020040 020040 020040 020040
00520 020040 020040 020040 020040 020040 020040 020040 020040   00530 020040

000000  7 CON  %022130  $X   7 CON  %041526  CV   7 CON  %051156  Rn   7 CON  %020040       7 CON  %020040       7 CON  %020040

000006  7 CON  %020040       7 CON  %020040       7 CON  %020040       7 CON  %020040       7 CON  %020040       7 CON  %020040
000014  7 CON  %030061  01   7 CON  %031063  23   7 CON  %032065  45   7 CON  %033067  67   7 CON  %034071  89   7 CON  %040502  AB
000022  7 CON  %041504  CD   7 CON  %042506  EF   7 LDXI    +123,7     0 LOAD  SG+000,7     0 LADI     -046      1 LDI      +000
000030  7 PUSH     711       7 ADDS     +150      0 LADR    L+007      1 RDP                0 LADI     -034      2 LDI      +014
000036  7 MOVW     047       1 MOND               2 LDI      +001      2 LDXI   +002,6      3 LADR  L+001,I,6    3 DLLS       01
000044  3 CRAX               1 PSEM               0 BTST               7 STRP        7      0 LADR  L+001,I      1 LDAS
000052  7 STD    L+003       1 LDD    L+003       3 ZERD               7 DCMP               7 BNEQ     +001      7 BUN     +177,I
000060  7 LDXI  +005,7       0 LOAD  L-005,I,7    0 ANLI     +010      7 BANZ     +004      7 LDXI   +070,7      0 LOAD  L-005,I,7
000066  0 ANLI    +200       7 BAZ      +004      0 LDI      +004      0 LWXX    L+003      7 BANZ     +001      7 BUN     +163,I
000074  0 LADR   L+113       1 RDP                2 LWP      +020      1 LADD               2 LDI      +014      7 MOVW      047
000102  0 LADR   L+127       1 RDP                2 LWP      +013      1 LADD               2 LDI      +014      7 MOVW      047
000110  0 LDLI    +001       0 ORRI      207      0 LWXX    L+003      0 ADDI     -001      7 STOR    L+026      0 LDI      +000
000116  0 BUN     +060       0 CON  %000403       0 CON  %000411       0 LDI      +000      1 LADR    L+077      1 DLLS       01
000124  2 LOAD   L+025       3 LDI      +025      3 LMPY               2 STAR        2      3 LDLI     +001      3 ORRI      210
000132  2 LADD               3 CID                3 DALS        01     5 LDD     L+003      3 DADD               4 LDI      +030
000140  7 MVBX               0 LADR   L+077       1 LADR  L-004,I      7 PUSH      711      7 PCAL      000      7 BANZ     +027
```

```
000146  0 LADR  L+113      1 LADR  L-004,I    2 LDI   +014       7 MOVW  007        0 LDI   +000       1 LADR  L+143
000154  1 DLLS  01         2 LOAD  L+025      3 LDI   +025       3 LMPY             2 STAR  2          3 LDLI  +001
000162  3 ORRI  225        2 LADD             3 CID              3 DALS  01         5 LDD   L+003      3 DADD
000170  4 LDI   +020       7 MVBX             0 LOAD  L+026      0 ADDI  +001       7 STOR  L+025      0 LOAD  L+025
000176  0 ADDI  +001       0 NSTO  L+025      1 LOAD  L+026      7 ICMP             7 BLEQ  -062       0 LOAD  L-003,I
000204  1 LDLI  +040       1 ORRI  040        7 ICMP             7 BEQL  +066       0 LDI   +000       0 BUN   +060
000212  0 LDI   +000       1 LADR  L+077      1 DLLS  01         2 LOAD  L+025      3 LDI   +025       3 LMPY
000220  2 STAR  2          3 LDLI  +001       3 ORRI  210        2 LADD             3 CID              3 DALS  01
000226  5 LDD   L+003      3 DADD             4 LDI   +030       7 MVBX             0 LADR  L+077      1 LADR  L-003,I
000234  7 PUSH  711        7 PCAL  000        7 BANZ  +031       0 LADR  L+127      1 LADR  L-003,I    2 LDI   +014
000242  7 MOVW  007        0 LDI   +000       1 LADR  L+143      1 DLLS  01         2 LOAD  L+025      3 LDI   +025
000250  3 LMPY             2 STAR  2          3 LDLI  +001       3 ORRI  225        2 LADD             3 CID
000256  3 BUN   +001       3 BLBL  %000024    3 DALS  01         5 LDD   L+003      3 DADD             4 LDI   +020
000264  7 MVBX             0 LOAD  L+026      0 ADDI  +001       7 STOR  L+025      0 LOAD  L+025      0 ADDI  +001
000272  0 NSTO  L+025      1 LOAD  L+026      7 ICMP             7 BLEQ  -064       0 LADR  L+113      1 LADR  L+127
000300  2 LDI   +014       7 COMW  207        7 BNEQ  +010       0 LDI   +001       0 LDXI  +002,7     1 LADR  L+001,I,7
000306  1 DLLS  01         1 CRAX             0 VSEM             7 STRP  7          7 EXIT  06         1 LDD   L+003
000314  2 LDI   +000       3 LDLI  +030       3 ORRI  020        1 DADD             2 LDI   +244       2 LDXI  +077,7
000322  3 LOAD  L-005,I,7  3 ANRI  +377       3 LMPY             1 DADD             7 STD   L+005      0 LDI   +001
000330  1 LDI   +000       7 SWXX  L+005      0 LDI   +001       0 LDXI  +002,6     1 LADR  L+001,I,6  1 DLLS  01
000336  1 CRAX             0 VSEM             7 STRP  7          7 LDXI  +005,7     0 LDRA  7          1 LADR  L+007
000344  1 LLS   01         0 LADD             1 LADR  L+002,I    1 LWAS             2 ROP              2 LLS   01
000352  3 LDLI  +376       3 ORRI  106        2 LADD             1 LADD             2 LDI   +001       7 MOVB  047
000360  0 LADR  L+007      1 LADR  L+023      7 PUSH  711        7 ADDS  +006       0 LDI   +300       7 PUSH  700
000366  7 PCAL  000        7 BEQL  +001       7 BUN   +105       0 LDI   +003       7 STOR  L+027      0 LDI   +001
000374  7 STOR  L+030      7 LDXI  +077,7     0 LOAD  L-005,I,7  0 ANRI  +377       7 STOR  L+031      0 LADR  L+032
000402  0 LDXI  +061,6     1 LADR  L-005,I,6  2 LDI   +003       7 MOVW  007        7 LDXI  +011,5     0 LOAD  L-005,I,5
000410  7 STOR  L+035      7 LDXI  +012,7     0 LOAD  L-005,I,7  7 STOR  L+036      0 LADR  L+037      1 LADR  L+113
000416  2 LDI   +014       7 MOVW  007        0 LADR  L+053      1 LADR  L+127      2 LDI   +014       7 MOVW  007
000424  0 LADR  L+067      1 LADR  L+143      2 LDI   +010       7 MOVW  007        0 LOAD  L+023      1 LADR  L+027
000432  2 LDI   +120       7 PUSH  722        7 ADDS  +003       0 LDI   +034       7 PUSH  700        7 PCAL  000
000440  7 BNEQ  +002       0 LDI   -001       7 BUN   +001       0 LDI   +000       7 STOR  L+024      0 LOAD  L+023
000446  1 LDI   +000       2 LDI   +002       7 PUSH  722        7 PCAL  000        0 LOAD  L+024      7 BAZ   +022
000454  0 LDI   +033       0 LWXX  L+005      7 BAZ   +004       0 LDI   +013       0 LWXX  L+005      0 LDXI  +011,7
000462  7 STOR  L-005,I,7  0 LDI   +077       0 LWXX  L+005      7 BAZ   +004       0 LDI   +057       0 LWXX  L+005
000470  0 LDXI  +012,7     7 STOR  L-005,I,7  0 LDI   +002       1 LDI   +000       7 SWXX  L+005      7 BUN   +002
000476  1 ZERD             7 SWXX  L+005      7 EXIT  06         7 CON   %020040    7 CON   %020040    7 CON   %020040
000504  7 CON   %020040    7 CON   %020040    7 CON   %020040    7 CON   %020040    7 CON   %020040    7 CON   %020040
000512  7 CON   %020040    7 CON   %020040    7 CON   %020040    7 CON   %020040    7 CON   %020040    7 CON   %020040
000520  7 CON   %020040    7 CON   %020040    7 CON   %020040    7 CON   %020040    7 CON   %020040    7 CON   %020040
000526  7 CON   %020040    7 CON   %020040    7 CON   %020040
```

ENTRY POINT MAP BY NAME

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 003 | 000006 | 000552 | 000034 | PR | COVERHOOK1 | 29APR87 | 13:22 | TAL | $OVER.T9618C00.SCVRGARD |
| 00 | 004 | 000554 | 001005 | 000600 | P | COVERHOOK2 | 29APR87 | 13:22 | TAL | $OVER.T9618C00.SCVRGARD |
| 00 | 005 | 001006 | 001536 | 001032 | P | COVERHOOK3 | 29APR87 | 13:22 | TAL | $OVER.T9618C00.SCVRGARD |
| 00 | 002 | 000553 | 000553 | 000553 | | T9618C00^15JUL87^CVRGARD^29APR7 | 29APR87 | 13:22 | TAL | $OVER.T9618C00.SVERSION |

DATA BLOCK MAP BY NAME

| BASE | LIMIT | TYPE | MODE | NAME | DATE | TIME | LANGUAGE | SOURCE FILE |
|---|---|---|---|---|---|---|---|---|
| 000000 | | COMMON | WORD | #GLOBAL | 29APR87 | 13:22 | TAL | $VIOLET.TOOLSC00.ExtdecsO |

```
ENTRY POINT MAP BY LOCATION
CODE SEGMENT 00

SP  PEP  BASE    LIMIT   ENTRY   ATTRS   NAME                                DATE     TIME  LANGUAGE SOURCE FILE

00  003  000006  000552  000034  PR      COVERHOOK1                          29APR87  13:22 TAL      $OVER.T9618C00.SCVRGARD
00  002  000553  000553  000553          T9618C00^15JUL87^CVRGARD^29APR7     29APR87  13:22 TAL      $OVER.T9618C00.SVERSION
00  004  000554  001005  000600  P       COVERHOOK2                          29APR87  13:22 TAL      $OVER.T9618C00.SCVRGARD
00  005  001006  001536  001032  P       COVERHOOK3                          29APR87  13:22 TAL      $OVER.T9618C00.SCVRGARD

Code size = 863 words
  PEP = 6 words
  Procedures = 857 words
  Gap at 32K = 0 words
  XEP = 4 words
Code area size = 1 pages
Resident code size = 1 pages

DATA BLOCK MAP BY LOCATION

BASE    LIMIT   TYPE    MODE    NAME              DATE     TIME   LANGUAGE  SOURCE FILE

000000          COMMON  WORD    #GLOBAL           29APR87  13:22  TAL       $VIOLET.TOOLSC00.Extdecs0

BINDER - OBJECT FILE BINDER - T9621C00 - (09SEP86)    SYSTEM \PRUNE
Object file name is $OVER.T9618C00.oCVRGARD
Object file timestamp is 29APR87 13:22:13
Number of Binder errors = 0
Number of Binder warnings = 0
Code area size = 1 pages
Resident code size = 1 pages
Data area size = 1 pages
Extended data area size = 0 pages
Top of stack = 0 words
Number of code segments  = 1 segment


The object file will only run on a TNS/II
Errorfile file name is $OVER.T9618C00.ECVRGARD
Number of compiler errors =  0
Number of compiler warnings =  0
Maximum symbol table space used was = 133218 bytes
Number of source lines = 9458
Compile cpu time = 00:00:16
Total Elapsed time = 00:03:12
```

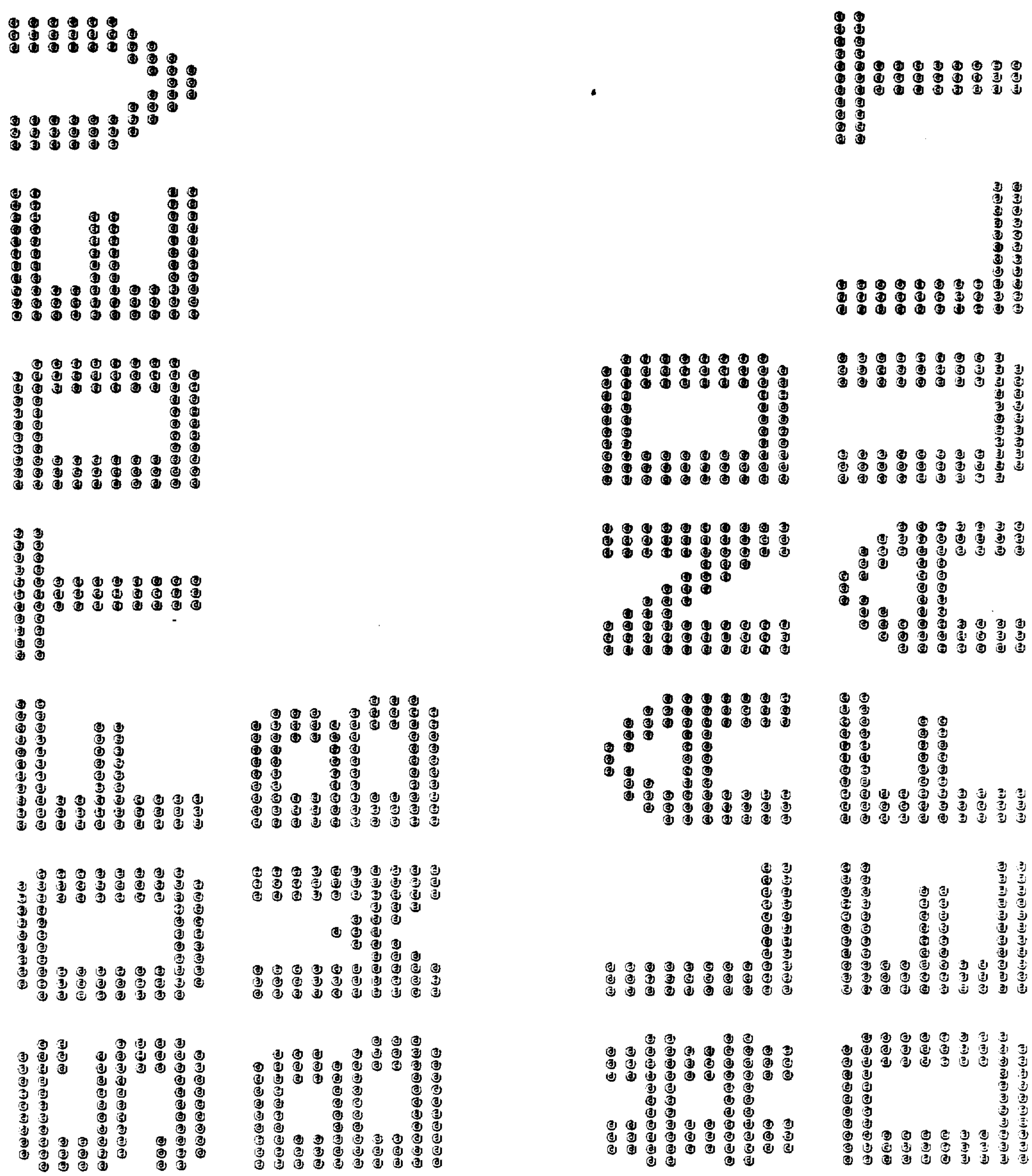

```
TAL - T9250B40 - (15SEP86)                              Source language: TAL - Target machine: Tandem NonStop II System
Date - Time :  29APR87 - 13:25:46                    Default options: On (LIST,CODE,MAP,WARN,LMAP) - Off (ICODE,INNERLIST)

                         ?ERRORFILE ecvrmon,NOCODE, SYMBOLS, MAP, NOGMAP, LMAP(ALPHA,LOC)
     2.    000000 0  0   NAME     COVERMON^PROGRAM;
     3.    000000 0  0   ?SOURCE copytal                   !Copyright notice
Source file:  [1]  $VIOLET.TOOLSCOO.COPYTAL  22APR87 - 16:33:11
     1.    000000 0  0   ! +-------------------------------------------------------------------+
     2.    000000 0  0   ! |                                                                   |
     3.    000000 0  0   ! |  Copyright (C) 1987 by TANDEM COMPUTERS INCORPORATED             |
     4.    000000 0  0   ! |                                                                   |
     5.    000000 0  0   ! |  Protected as an unpublished work.                               |
     6.    000000 0  0   ! |                                                                   |
     7.    000000 0  0   ! |  The computer program listings and specifications herein are    |
     8.    000000 0  0   ! |  the property of TANDEM COMPUTERS INCORPORATED and shall not be  |
     9.    000000 0  0   ! |  reproduced, copied, or used, in whole or in part, for any      |
    10.    000000 0  0   ! |  reason without the written permission of TANDEM COMPUTERS      |
    11.    000000 0  0   ! |  INCORPORATED.                                                   |
    12.    000000 0  0   ! |                                                                   |
    13.    000000 0  0   ! |  The following are trademarks or service marks of TANDEM        |
    14.    000000 0  0   ! |  COMPUTERS INCORPORATED:                                         |
    15.    000000 0  0   ! |                                                                   |
    16.    000000 0  0   ! |  6AX            BINDER         CROSSREF       DDL                 |
    17.    000000 0  0   ! |  ENABLE         ENCOMPASS      ENCORE         ENFORM              |
    18.    000000 0  0   ! |  ENSCRIBE       ENVOY          ENVOYACP/XF    EXCHANGE            |
    19.    000000 0  0   ! |  EXPAND         FASTSORT       FAXLINK        FOX                 |
    20.    000000 0  0   ! |  FOXII          GUARDIAN       GUARDIAN 90    GUARDIAN 90XF       |
    21.    000000 0  0   ! |  INSIGHT        INSPECT        LASER-LX       LXN                 |
    22.    000000 0  0   ! |  MEASURE        MULTILAN       NetBatch       NonStop             |
    23.    000000 0  0   ! |  NonStop 1+     NonStop CLX    NonStop EXT    NonStop EXT10       |
    24.    000000 0  0   ! |  NonStop EXT25  NonStop II     NonStop SQL    NonStop TXP         |
    25.    000000 0  0   ! |  NonStop VLX    PATHMAKER      PC LINK        PCFORMAT            |
    26.    000000 0  0   ! |  PERUSE         PS MAIL        PS TEXT EDIT   PS TEXT FORMAT      |
    27.    000000 0  0   ! |  RDF            SAFE           SAFEGUARD      SAFE-T-NET          |
    28.    000000 0  0   ! |  T-TEXT         TACL           TAL            Tandem              |
    29.    000000 0  0   ! |  TGAL           THL            TIL            TMF                 |
    30.    000000 0  0   ! |  TRANSFER       VIEWPOINT      WORDLINK       XLB                 |
    31.    000000 0  0   ! |  XRAY                                                             |
    32.    000000 0  0   ! |                                                                   |
    33.    000000 0  0   ! +-------------------------------------------------------------------+
    34.    000000 0  0   ! |  HYPERchannel is a trademark of Network Systems Corporation.     |
    35.    000000 0  0   ! |                                                                   |
    36.    000000 0  0   ! |  IBM is a registered trademark of International Business Machines |
    37.    000000 0  0   ! |  Corporation.                                                    |
    38.    000000 0  0   ! |                                                                   |
    39.    000000 0  0   ! |  Textpack4, Textpack6, IBM Displaywriter, DisplayWrite 2,        |
    40.    000000 0  0   ! |  DisplayWrite 3, Displaywriter communication software, and CICS  |
    41.    000000 0  0   ! |  are trademarks of International Business Machines Corporation. |
    42.    000000 0  0   ! |                                                                   |
    43.    000000 0  0   ! |  INFOSAT is a trademark in which both Tandem and American        |
    44.    000000 0  0   ! |  Satellite have rights.                                          |
    45.    000000 0  0   ! |                                                                   |
    46.    000000 0  0   ! |  LATTICE is a registered trademark of Lattice, Inc.              |
    47.    000000 0  0   ! |                                                                   |
    48.    000000 0  0   ! |  MultiMate is a trademark of Ashton-Tate, Inc.                   |
    49.    000000 0  0   ! |                                                                   |
```

```
50.     000000 0  0   ! |   UNIX is a trademark of AT&T.                                          |
51.     000000 0  0   ! |                                                                         |
52.     000000 0  0   ! |   Wang OIS workstation, Wang VS workstation, Wang OIS telecommu-        |
53.     000000 0  0   ! |   nication software, and Wang VS telecommunication software are         |
54.     000000 0  0   ! |   trademarks of Wang, Inc.                                              |
55.     000000 0  0   ! +-------------------------------------------------------------------------+
56.     000000 0  0   ! |   TANDEM COMPUTERS INCORPORATED -- PROPRIETARY AND CONFIDENTIAL         |
57.     000000 0  0   ! +-------------------------------------------------------------------------+
 4.     000000 0  0   ?NOLIST, source dsgaddr  ( global )
 6.     000000 0  0   ?NOLIST, source dutil    ( sgequivs, defines )
 8.     000000 0  0   ?NOLIST, source dmsgsys  ( listenxdecs )
10.     000000 0  0   ?NOLIST, source dmalloc  ( addressing,
22.     000000 0  0   ?NOLIST, source ddebug   ( bpttable )
24.     000000 0  0   ?NOLIST, source dpctl    ( pcblayout, processcontrol )
26.     000000 0  0   ?NOLIST, source derror   ( file^error^numbers, system^freeze^numbers )
28.     000000 0  0   ?NOLIST, source dgp      ( util2, layouts )
30.     000000 0  0   ?NOLIST, source dobjfmt  ( declaration )
32.     000000 0  0   ?NOLIST, source dreadobj ( object^reading )
35.     002070 0  0   BLOCK CoverRoutine^defs;
36.     000000 0  0
37.     000000 0  0   ?SOURCE dcover
Source file:  [1]  $OVER.T9618C00.DCOVER  29APR87 - 13:14:11
 1.     000000 0  0   ?SECTION MICROCODE
 3.     000000 0  0   ! The basic measurement algorithm is to replace instructions within the
 4.     000000 0  0   ! measured code with a BPT instruction which will cause instruction breakpoint
 5.     000000 0  0   ! interrupts when executed.  For measured processes, the INSTRUCTIONBREAKPOINT
 6.     000000 0  0   ! interrupt handler will replace the BPT opcode with the original instruction,
 7.     000000 0  0   ! set a bit ON in a bitmap corresponding to each possible instruction location,
 8.     000000 0  0   ! and resume the operation.  At the end of a measurement period, we can
 9.     000000 0  0   ! determine which instruction locations were executed by examining the
10.     000000 0  0   ! corresponding bit map.
11.     000000 0  0
12.     000000 0  0   literal     Icode^BPT = %451;      !Op code for BPT instruction
13.     000000 0  0
14.     000000 0  0   ?SECTION CONTROL
16.     000000 0  0   ! We use a resident segment (CRCB) which is allocated by CVRMON when
17.     000000 0  0   ! COVER is installed (by ENABLE).  The CRCB contains a control block
18.     000000 0  0   ! which is used for regulating the COVER measurements.  If fully
19.     000000 0  0   ! allocated (in CPUs with 256 PINs), the CRCB with the CoverPinData
20.     000000 0  0   ! structures will require about 20 pages of physical memory.  The CRCB
21.     000000 0  0   ! is addressed by the instruction breakpoint interrupt handler via an
22.     000000 0  0   ! absolute extended pointer maintained in the bpt table header.
23.     000000 0  0   ! CVRMON and COVERCOM can address this segment by calling USESEGMENT.
24.     000000 0  0   ! Update access to the CRCB is controlled via a semaphore defined in
25.     000000 0  0   ! the BPT table header.  COVERCOM can share the segments, so long as
26.     000000 0  0   ! it holds the semaphore.
27.     000000 0  0
28.     000000 0  0   ! COVER will allocate space for the following structure in a Resident Segment,
29.     000000 0  0   ! one copy for each PIN in the CPU.  This space will be allocated contiguously
30.     000000 0  0   ! after the CRCB in the same segment for simplicity.
31.     000000 0  0   ! This structure will, in turn, point to copies of the code/library files in
32.     000000 0  0   ! memory (by absoute segment number) and to a similarly allocated code/library
33.     000000 0  0   ! bitmap of measurement data.
34.     000000 0  0
35.     000000 0  0   struct      CoverPinDataCodespaceTemplate(*);
36.     000000 0  0               begin
37.     000000 0  1               int          Seg;        ,     !Abs base segments
```

```
000000 0  1              int         CopySeg;
000000 0  1              int         Name[0:11];       !Program filename
000000 0  1              int         Timestamp[0:2];  !When it was bound
000000 0  1              int         SpaceCount;       !Number of code spaces
000000 0  1              int         SpaceSize[0:15];!Size (in words) of each code space
000000 0  1              string .EXT BitmapPtr;        !Pointer to measurement data
000000 0  1              end;
000000 0  0
000000 0  0    struct    CoverPinDataTemplate(*);
000000 0  0              begin
000000 0  1              int         State;      !Control of process (see below)
000000 0  1              int         EverSaved; !Flag.  Set when SAVE command completes
000000 0  1              int         SaveVol[0:7];    !Subvol to save bitmap on
000000 0  1              struct      UC( CoverPinDataCodespaceTemplate );
000000 0  1              struct      UL( CoverPinDataCodespaceTemplate );
000000 0  1              end;
000000 0  0
000000 0  0    ! State definitions:
000000 0  0    literal   CoverMeasureReset    = 0;    !Not in use; no control structures
000000 0  0    literal   CoverMeasureStarting = 1;    !Code file being read to set BPTs
000000 0  0    literal   CoverMeasureRunning  = 2;    !Measurement is in progress
000000 0  0    literal   CoverMeasureStopping = 3;    !Measurement has stopped, but bitmap
000000 0  0                                           !is not de-allocated.
000000 0  0
000000 0  0    ! Control of all COVER measurements within a cpu is achieved through the use of
000000 0  0    ! this structure (referred to as a CRCB) which remains in a resident segment as
000000 0  0    ! long as COVER is installed in a cpu.
000000 0  0
000000 0  0    struct    CoverRoutineControlBlock(*);
000000 0  0              begin
000000 0  1              int(32)     Verifier;              ! Contains eyecatcher "CovR"
000000 0  1              int         Version;               ! For format identification
000000 0  1              int         XCVRn^PIN;             ! PIN of $XCVRn server
000000 0  1              int         PrivEnabled;           ! TRUE if ENABLE PRIV
000000 0  1              int         MemoryRatio;           ! Don't create too much pressure
000000 0  1              int         CurrentTraceBuf;       ! Current pointer in trace buf
000000 0  1       struct    TraceBuf[0:127];                ! Trace buffer (for debugging)
000000 0  1                 begin                           ! for tracing all BPT interrupts
000000 0  2                 int      PIN;
000000 0  2                 int      SpaceId;
000000 0  2                 int      P;
000000 0  2                 end;
000000 0  1              int         NumFiles;              ! # of entries in FilesToMeasure.
000000 0  1       struct    FilesToMeasure[0:127];          ! Table of filenames to measure.
000000 0  1                 begin                           ! Always compressed to minimize
000000 0  2                 int      FileName[0:11];        ! search time.
000000 0  2                 int      UserID;                ! Who said "Measure OBJECT"
000000 0  2                 int         SaveVol[0:7];       !Subvol to save bitmap on
000000 0  2                 end;
000000 0  1       struct    ControlByPIN( CoverPinDataTemplate )
000000 0  1                 [0:-1];                         ! Actually [0:<max pcbs>-1]
000000 0  1              end;
000000 0  0
000000 0  0    ! An eyecatcher is stashed in the CRCB just for sanity checking purposes.
000000 0  0    define    CoverVerifier = ($dbl1( "Co","vR" ))#; !eyecatcher
000000 0  0
000000 0  0    ! We will want to make sure that appropriate versions of COVER are looking at
```

```
000000 0  0   ! these control structures, so:
000000 0  0   literal     CoverControlLatestVersion = 13;
000000 0  0
000000 0  0   ! Since the CRCB structure may be larger than 32K bytes, we need to
000000 0  0   ! use the following to compute tne address of a ControlByPIN entry.
000000 0  0   ! We assume that the user has initialized an .ext variable named
000000 0  0   ! "CRCB" that hold the address of the CRCB.
000000 0  0
000000 0  0   define ControlByPinAddress( pin ) =
000000 0  0      @CRCB + $udbl($offset(CoverRoutineControlBlock.ControlByPIN))
000000 0  0            + $len(CoverRoutineControlBlock.ControlByPIN) '*' pin#;
000000 0  0
000000 0  0
000000 0  0   ! The following SEGIDs are reserved for use by COVER.  They will
000000 0  0   ! define the resident segments needed to control measurements.  All
000000 0  0   ! the resident segments are allocated/deallocated by CVRMON and are
000000 0  0   ! owned the the $XCVRn process in each ENABLEd cpu.  A range of 256
000000 0  0   ! SEGIDs are reserved, one for each possible PIN, for each PIN's
000000 0  0   ! bitmap data, code copy, and library copy.  Only those segments which
000000 0  0   ! are actually in use will be allocated, and only the amount required
000000 0  0   ! for use will be locked down.
000000 0  0
000000 0  0   literal     CoverCrcbSegid      = 2302; !CRCB will belong to CVRMON
000000 0  0   literal     CoverBitmapSegids   = 2303; !2303 to 2558 for PINs 0 to 255 Bitmaps
000000 0  0   literal     CoverCodeCopySegids = 2559; !2559 to 2814 for PINs 0 to 255 Code
000000 0  0   literal     CoverLibCopySegids  = 2815; !2815 to 3071 for PINs 0 to 255 Lib
000000 0  0   ! The bitmaps are allocated as an entire resident segment each, but only the
000000 0  0   ! pages actually needed are locked down.  This is enough for 16 spaces worth of
000000 0  0   ! bitmaps since a bitmap for each space is 64K bits, or 4KW.  Each space's
000000 0  0   ! bitmap starts on a 4KW boundary, so addressing is easy.
000000 0  0   ! We would LIKE to be able to define a struct to define this, but TAL limits
000000 0  0   ! structs to 32K words, and we need 64K words.  If we could, it would look like
000000 0  0   ! this:
000000 0  0   --struct       CoverSpaceBitmapTemplate(*);
000000 0  0   --             begin
000000 0  0   --   struct       Space[0:15];
000000 0  0   --                begin
000000 0  0   --                int          Bitmap[0:4095];
000000 0  0   --                end;
000000 0  0   --             end;
000000 0  0   ! But we'll have to do the 1st level of indexing ourselves, so we'll use an
000000 0  0   ! an array pointer which we'll initialize to the base + space index * size;
000000 0  0   ! The array will then look something like this:
000000 0  0   -- int .ext Bitmap[0:4095];
000000 0  0
000000 0  0   ! Note that programs may now have as many as 32 code spaces, but if
000000 0  0   ! they do, there can be no library.  COVER identifies these by making
000000 0  0   ! the UC and UL program names the same.  It then uses the UL bitmaps,
000000 0  0   ! etc. for the additional (>16) code spaces' data.
000000 0  0
000000 0  0   literal     SizeOfCoverSpaceBitmap = 8192d;  !In bytes
000000 0  0   literal     SizeOfCoverBitmapSegment = 16d * SizeOfCoverSpaceBitmap;
000000 0  0   ?SECTION DISC
000000 0  0   ! The disc output format for COVER measurement data is similar to the
000000 0  0   ! extended data structure which holds all measurement data for a
000000 0  0   ! particular PIN.
000000 0  0
```

```
000000 0  0   ! For the sake of ease of efficient writing, enough filler is included to
000000 0  0   ! force the bitmaps to start on a 2K boundary.  This is followed by two fully
000000 0  0   ! allocated (i.e., no empty space between bitmaps, even if much of the 16
000000 0  0   ! address spaces went unreferenced) copies of BitmapData.  The EOF will be the
000000 0  0   ! last bitmap address referenced (rounded up to an even page).  These can be
000000 0  0   ! referenced using the following:
000000 0  0
000000 0  0   struct      CoverDiscImageTemplate(*);
000000 0  0               begin
000000 0  1               int(32)     Verifier;            ! Contains eyecatcher "CovR"
000000 0  1               int         Version;             ! For format identification
000000 0  1               int         UCEverBooleaned;     ! TRUE if ever AND/OR/XOR'd
000000 0  1               int         ULEverBooleaned;     ! TRUE if ever AND/OR/XOR'd
000000 0  1               struct      UC( CoverPinDataCodespaceTemplate );
000000 0  1               struct      UL( CoverPinDataCodespaceTemplate );
000000 0  1   !           FILLER      To round to a 2K boundary.
000000 0  1   -- struct      UCbitmapData( CoverSpaceBitmapTemplate );
000000 0  1   -- struct      ULbitmapData( CoverSpaceBitmapTemplate );
000000 0  1   ! We have to manage those last two substructs ourselves because TAL doesn't
000000 0  1   ! support structs that big!
000000 0  1               end;
000000 0  0
000000 0  0   literal     CoverDiscLatestVersion = 2;
000000 0  0
000000 0  0   literal     CoverBitmapFilecode = 846;  !File code for bitmap files.
000000 0  0
000000 0  0   literal     CoverDiscHeaderSize = 2048d; !Round to page
000000 0  0   ?SECTION MESSAGES
000000 0                [illegible] to the COVER server processes, $XCVR and
000000 0  0   ! $XCVRn.
000000 0  0   struct CVR^Server^Disable^Template(*);
000000 0  0               begin
000000 0  1   int         MessageType;
000000 0  1               end;
000000 0  0
000000 0  0   struct CVR^Server^Enable^Template(*);
000000 0  0               begin
000000 0  1   int         MessageType;
000000 0  1               end;
000000 0  0
000000 0  0   struct CVR^Server^Measure^Template(*);
000000 0  0               begin
000000 0  1   int         MessageType;
000000 0  1   int         FromMonitor;            !TRUE iff from Xnewprocess
000000 0  1   int         PIN;                    !PIN to measure
000000 0  1   int         Crtpid[0:2];            !CRTPID of PIN to measure
000000 0  1   int         CodeSeg;                !ABS segment of 1st program segment
000000 0  1   int         LibSeg;                 !ABS segment of 1st library segment
000000 0  1   int         CodeFilename[0:11];
000000 0  1   int         LibFilename[0:11];
000000 0  1   int         SaveVol[0:7];           !Subvol to save bitmap on
000000 0  1               end;
000000 0  0
000000 0  0   struct CVR^Server^Save^Template(*);
000000 0  0               begin
000000 0  1   int         MessageType;
000000 0  1   int         PIN;                    !PIN to save
```

```
212.  000000 0  1   int          Owner;                      !CRAID of PIN to save
213.  000000 0  1                end;
214.  000000 0  0
215.  000000 0  0   struct CVR^Server^Reset^Template(*);
216.  000000 0  0                begin
217.  000000 0  1   int          MessageType;
218.  000000 0  1   int          PIN;                        !PIN to reset
219.  000000 0  1                end;
220.  000000 0  0
221.  000000 0  0   ! The messages are identified by these MessageTypes:
222.  000000 0  0   literal      CVR^Server^Disable  = 1;
223.  000000 0  0   literal      CVR^Server^Enable   = 2;
224.  000000 0  0   literal      CVR^Server^Measure  = 3;
225.  000000 0  0   literal      CVR^Server^Save     = 4;
226.  000000 0  0   literal      CVR^Server^Reset    = 5;
227.  000000 0  0
228.  000000 0  0   ! Special error returns from CVRMON must be negative (so as not to
229.  000000 0  0   ! duplicate FE numbers) and must be different from RO^ routines' error
230.  000000 0  0   ! codes.
231.  000000 0  0   literal      CoverErrFirst          = -10; !First in the list *****
232.  000000 0  0   literal      CoverErrAlready        = -10; !Already ENABLEd
233.  000000 0  0   literal      CoverErrInsMem         = -11; !Insufficient memory
234.  000000 0  0   literal      CoverErrNotRunning     = -12; !No (or wrong) process in PIN
235.  000000 0  0   literal      CoverErrSpaceMismatch  = -13; !Code and object don't match
236.  000000 0  0   literal      CoverErrInUse          = -14; !Some measurement running
237.  000000 0  0   literal      CoverErrPriv           = -15; !PRIV process, but no ENABLE PRIV
238.  000000 0  0   literal      CoverErrLast           = -15; !Last in the list ******
 38.  000000 0  0
 39.  000000 0  0   END BLOCK;
 40.  000000 0  0   ?BEGINCOMPILATION
 42.  000000 0  0   ?NOLIST, source extdecs   ( abend
 73.  000000 0  0   ?NOLIST, source pmsgsys   ( CONTROLMESSAGESYSTEM )
 75.  000000 0  0   ?NOLIST, source pver      ( VERSIONERROR )
 77.  000000 0  0   ?NOLIST, source pdebug    ( DBG^SET^ACCESSOR^ID )
 79.  000000 0  0   ?NOLIST, source preadobj
 81.  000000 0  0   ?SEARCH oreadobj
Search file:  $OVER.T9618C00.OREADOBJ  17FEB87 - 15:47:31
 82.  000000 0  0   ?NOLIST, source putill
 84.  000000 0  0   ?SEARCH outill
Search file:  $OVER.T9618C00.OUTIL1  12FEB87 - 12:36:06
 85.  000000 0  0   ?SETTOG 15                                  !For FORWARDs
 86.  000000 0  0   ?NOLIST, source pcvrmon
 88.  000000 0  0   ?RESETTOG 15
 90.  000000 0  0   ?SOURCE sversion( version^cvrmon )
Source file:  [1]  $OVER.T9618C00.SVERSION  29APR87 - 09:45:32
 21.  000000 0  0   ?SECTION VERSION^CVRMON
 22.  000000 0  0   PROC T9618C00^15JUL87^CVRMON^29APR7;
 23.  000000 1  0   BEGIN END;
 91.  000000 0  0   ?SOURCE scvrmon
Source file:  [1]  $OVER.T9618C00.SCVRMON  29APR87 - 13:21:20
  2.  000000 0  0   ! This will get an extended segment for a bitmap (code and library)
  3.  000000 0  0   ! and lock down what will be needed.
  4.  000000 0  0   ! The absolute extended address (or 0) will be put into the bitmap pointer.
  5.  000000 0  0   ! It returns 0 if successful.  Otherwise the error code from allocatesegment
  6.  000000 0  0   ! or lockmemory.
  7.  000000 0  0   int proc AllocateBitmap( PIN, PinData ) priv;
  8.  000000 1  0   int          PIN;                        !PIN for which this is being allocated
```

```
000000 1  0   string .ext PinData( CoverPinDataTemplate ); !ABS address passed!
000000 1  0   begin
000000 1  1   string .ext XP;                     !Address to get
000000 1  1   int(32)     BC;                     !Length to get (in bytes)
000000 1  1   literal     RelBase = %2000000d;    !Base address of relative extended segments
000000 1  1   literal     LengthOfSegment = SizeOfCoverBitmapSegment
000000 1  1                               + SizeOfCoverBitmapSegment;
000000 1  1   string .ext CodeBitBase := RelBase;
000000 1  1   string .ext LibBitBase := RelBase + SizeOfCoverBitmapSegment;
000000 1  1   int         Segid := CoverBitmapSegids + PIN;
000000 1  1   int         i;
000000 1  1   int         error;
000000 1  1   literal     WaitForMemory = 10d;    !100 ms.  Don't bother if we'll cause a lot
000000 1  1                                       !of pageouts.
000000 1  1
000000 1  1   ! Don't even bother if not enough memory for code & lib bitmaps
000000 1  1   if kccb.curlocks '+' LengthOfSegment '/' 2048 '>=' kccb.maxlocks then
000027 1  1      return CoverErrInsMem;
000031 1  1
000031 1  1   if allocatesegment( Segid, LengthOfSegment ) then return CoverErrInsMem;
000043 1  1
000043 1  1   call usesegment( Segid );           !Make it addressable.
000051 1  1
000051 1  1   ! Put ABS address of each space's bitmap into its pointer.
000051 1  1   if PinData.UC.SpaceCount then
000057 1  1      @PinData.UC.BitmapPtr := $AXADR( CodeBitBase )
000057 1  1   else
000067 1  1      @PinData.UC.BitmapPtr := 0d;
000075 1  1   if PinData.UL.SpaceCount then
000103 1  1      @PinData.UL.BitmapPtr := $AXADR( LibBitBase )
000103 1  1   else
000113 1  1      @PinData.UL.BitmapPtr := 0d;
000121 1  1
000121 1  1   ! For ease of error recovery, lock the whole segment, then lock again the
000121 1  1   ! pages that are needed, then unlock the whole segment (leaving just what's
000121 1  1   ! needed locked).
000121 1  1   if (error := lockmemory( CodeBitBase, !Lock the whole thing
000121 1  1                            LengthOfSegment,
000121 1  1                            WaitForMemory )) < 0 then
000135 1  1      begin
000135 1  2      call deallocatesegment( Segid );
000142 1  2      @PinData.UC.BitmapPtr := 0d;
000150 1  2      @PinData.UL.BitmapPtr := 0d;
000156 1  2      return error;
000160 1  2      end;
000160 1  1
000160 1  1   ! Lock the Code's
000160 1  1   if PinData.UC.SpaceCount then for i := 0 to PinData.UC.SpaceCount - 1 do
000170 1  1      begin
000170 1  2      @XP := @CodeBitBase + (i '*' 8192); !Each bitmap starts on 4KW
000176 1  2      BC := ($udbl(PinData.UC.SpaceSize[ i ]) + 7d) '>>' 3;
000213 1  2      if lockmemory( XP, BC, 1d ) then  !Should always work because it was already
000224 1  2         PROCESSOR^HALT( DBG^Cover^Internal ); !locked once.
000231 1  2      smear^ext( XP, $int(BC), 0 );   !Clear the bitmap
000244 1  2      end;
000257 1  1
000257 1  1   ! Lock the Lib's
```

```
000257 1  1   if PinData.UL.SpaceCount then for i := 0 to PinData.UL.SpaceCount - 1 do
000267 1  1      begin
000267 1  2      @XP := @LibBitBase + (i '*' 8192); !Each bitmap starts on 4KW
000275 1  2      BC := ($udbl(PinData.UL.SpaceSize[ i ]) + 7d) '>>' 3;
000312 1  2      if lockmemory( XP, BC, 1d ) then  !Should always work because it was already
000323 1  2         PROCESSOR^HALT( DBG^Cover^Internal ); !locked once.
000330 1  2      smear^ext( XP, $int(BC), 0 );   !Clear the bitmap
000343 1  2      end;
000356 1  1
000356 1  1   ! Undo the first lock of the whole thing.
000356 1  1   call unlockmemory( CodeBitBase, LengthOfSegment );
000363 1  1
000363 1  1   return FEOK;                          !All's well
000365 1  1
000365 1  1   end; !proc AllocateBitmap

BC                       Variable       INT (32)      Direct         L+003
CODEBI^BASE              Variable       STRING        EXT Pointer    L+005
ERROR                    Variable       INT           Direct         L+013
I                        Variable       INT           Direct         L+012
LENGTHOFSEGMENT          Literal        INT (32)      %000004 000000
LIBBITBASE               Variable       STRING        EXT Pointer    L+007
PIN                      Variable       INT           Direct         L-005
PINDATA                  Variable,244   STRUCT-S      EXT Pointer    L-004
RELBASE                  Literal        INT (32)      %000010 000000
SEGID                    Variable       INT           Direct         L+011
WAITFORMEMORY            Literal        INT (32)      %000000 000012
XP                       Variable       STRING        EXT Pointer    L+001
000000 0  0   proc ComputeBitmapSizes( PinData,
000000 1  0                            ExtentSize,
000000 1  0                            FileSize,
000000 1  0                            SizeOfFirstSegment );
000000 1  0   string .ext PinData( CoverDiscImageTemplate);
000000 1  0   int        .ExtentSize;            !Number of pages of file.
000000 1  0   int(32)    .FileSize;              !Number of bytes in file.
000000 1  0   int(32)    .SizeOfFirstSegment;
000000 1  0   begin
000000 1  1   int(32)     SizeOfSecondSegment;
000000 1  1   int         i;
000000 1  1
000000 1  1   i := PinData.UC.SpaceCount;
000007 1  1   if i then
000011 1  1      SizeOfFirstSegment := SizeOfCoverSpaceBitmap * $udbl( i )
000011 1  1   else
000020 1  1      SizeOfFirstSegment := 0d;
000022 1  1
000022 1  1   i := PinData.UL.SpaceCount;
000030 1  1   if i then
000032 1  1      SizeOfSecondSegment := SizeOfCoverSpaceBitmap * $udbl( i )
000032 1  1   else
000041 1  1      SizeOfSecondSegment := 0d;
000043 1  1
000043 1  1   FileSize := CoverDiscHeaderSize + SizeOfFirstSegment + SizeOfSecondSegment;
000052 1  1
000052 1  1   ExtentSize := FileSize '/' 2048;   !It'll all go on one extent.
000057 1  1
000057 1  1   end; !proc ComputeBitmapSizes
```

```
EXTENTSIZE                          Variable        INT             Indirect        L-005
FILESIZE                            Variable        INT (32)        Indirect        L-004
I                                   Variable        INT             Direct          L+003
PINDATA                             Variable,232    STRUCT-S        EXT Pointer     L-007
SIZEOFFIRSTSEGMENT                  Variable        INT (32)        Indirect        L-003
SIZEOFSECONDSEGMENT                 Variable        INT (32)        Direct          L+001

   112.   000000 0  0   ! This procedure returns TRUE if the requesting process is COVERCOM and it's
   113.   000000 0  0   ! on the same subvolume as us (CVRMON).
   114.   000000 0  0   int proc FromCovercom( pid, OurSubvol );
   115.   000000 1  0   int         pid;
   116.   000000 1  0   int        .OurSubvol;
   117.   000000 1  0   begin
   118.   000000 1  1   int         ProgramName[0:11];
   119.   000000 1  1
   120.   000000 1  1   call processinfo( pid,...., ProgramName );    !Get his program name
   121.   000015 1  1
   122.   000015 1  1   if ProgramName[8] = "COVERCOM" AND ProgramName = OurSubvol for 8 words then
   123.   000031 1  1      return TRUE
   124.   000031 1  1   else
   125.   000035 1  1      return FALSE;
   126.   000037 1  1
   127.   000037 1  1   end; !proc FromCovercom

OURSUBVOL                           Variable        INT             Indirect        L-003
PID                                 Variable        INT             Direct          L-004
PROGRAMNAME                         Variable        INT             Direct          L+001

   129.   000000 0  0   ! This procedure returns TRUE if the process is in XNEWPROCESS or XSTOP.
   130.   000000 0  0   int proc FromPhoenix( pin ) callable;
   131.   000000 1  0   int         pin;
   132.   000000 1  0   begin
   133.   000000 1  1   int     .ext PCBEXT( pcbext^template );
   134.   000000 1  1
   135.   000000 1  1   @PCBEXT := pcbx( pin );              !Address his PCBX
   136.   000010 1  1   if PCBEXT.PCBXPSTATE = PSTATESTARTING or
   137.   000010 1  1      PCBEXT.PCBXPSTATE = PSTATETERMINATING then
   138.   000022 1  1      return TRUE
   139.   000022 1  1   else
   140.   000025 1  1      return FALSE;
   141.   000027 1  1
   142.   000027 1  1   end; !proc FromPhoenix

PCBEXT                              Variable,260    STRUCT-I        EXT Pointer     L+001
PIN                                 Variable        INT             Direct          L-003

   144.   000000 0  0   ! This procedure returns TRUE if the process in PIN has PRIV code and is being
   145.   000000 0  0   ! run by SUPER.SUPER .  These conditions exists for COVERCOM to do ENABLE.
   146.   000000 0  0   int proc FromSuperPriv( pin ) callable;
   147.   000000 1  0   int         pin;
   148.   000000 1  0   begin
   149.   000000 1  1
   150.   000000 1  1   if pcb[ pin ].pcbcraid = -1 AND      !He must be started by SUPER.SUPER
   151.   000000 1  1      pcb[ pin ].privcodef then         !Code file must have PRIV code
   152.   000016 1  1      return TRUE
   153.   000016 1  1   else
   154.   000021 1  1      return FALSE;
```

```
   155.    000023 1  1
   156.    000023 1  1   end; !proc FromSuperPriv

PIN                              Variable      INT            Direct        L-003
   158.    000000 0  0   ! Deallocates the segment for the CRCB (and pin data).
   159.    000000 0  0   ! This is not performed if any PIN is being measured or if there are
   160.    000000 0  0   ! filenames in the CRCB.
   161.    000000 0  0   ! Returns:
   162.    000000 0  0   !   FEOK          if successful.
   163.    000000 0  0   !   CoverErrInUse if there is some PIN being measured or filename in CRCB.
   164.    000000 0  0   int proc HandleDisable callable;
   165.    000000 1  0   begin
   166.    000000 1  1   int      .sg bpth( bpttablehead ') := bpbase '-' wlen( bpth );
   167.    000000 1  1   string .ext crcb( CoverRoutineControlBlock );
   168.    000000 1  1   string .ext PinData( CoverPinDataTemplate );
   169.    000000 1  1   int          HdneMinusOne := pcbtable.hdne - 1; !Just for speed
   170.    000000 1  1   int          error;                 !Pandora's box
   171.    000000 1  1   int(32)      length;
   172.    000000 1  1   int          i;
   173.    000000 1  1
   174.    000000 1  1   if CRCB^Exists = 0d then return FEOK;   !Never ENABLEd.
   175.    000020 1  1   ! Under PSEM
   176.    000020 1  1   @crcb := %2000000d;                  !We can use relative addressing
   177.    000023 1  1   call usesegment( CoverCrcbSegid );
   178.    000032 1  1
   179.    000032 1  1   ! Make sure CRCB is not being used.
   180.    000032 1  1   if crcb.NumFiles then                !Filename in CRCB
   181.    000036 1  1      begin
   182.    000036 1  2      vsem( bpth.CoverCrcbSem );       !Give it up
   183.    000045 1  2      return CoverErrInUse;
   184.    000047 1  2      end;
   185.    000047 1  1
   186.    000047 1  1   for i := 0 to HdneMinusOne do
   187.    000051 1  1      begin
   188.    000051 1  2      @PinData := ControlByPinAddress( i );
   189.    000063 1  2      if PinData.State <> CoverMeasureReset then
   190.    000067 1  2         begin
   191.    000067 1  3         vsem( bpth.CoverCrcbSem );   !Give it up
   192.    000076 1  3         return CoverErrInUse;
   193.    000100 1  3         end;
   194.    000100 1  2      end;
   195.    000106 1  1
   196.    000106 1  1   ! It's not in use, so we can really free it now.
   197.    000106 1  1   @bpth.CoverCrcbPtr := 0d;            !Hide it
   198.    000111 1  1   vsem( bpth.CoverCrcbSem );           !Give it up
   199.    000120 1  1   length := $dbl( $len( crcb )) + ($len( crcb.ControlByPIN ) '*' pcbtable.hdne);
   200.    000132 1  1   call unlockmemory( crcb, length );
   201.    000136 1  1   call deallocatesegment( CoverCrcbSegid ); !Free the memory
   202.    000144 1  1   return FEOK;
   203.    000146 1  1
   204.    000146 1  1   end; !HandleDisable

BPTH                             Variable,114    STRUCT-I       SG Pointer    L+001
CRCB                             Variable,14020  STRUCT-S       EXT Pointer   L+002
ERROR                            Variable        INT            Direct        L+007
HDNEMINUSONE                     Variable        INT            Direct        L+006
I                                Variable        INT            Direct        L+012
```

```
LENGTH                          Variable         INT (32)       Direct         L+010
PINDATA                         Variable,244     STRUCT-S       EXT Pointer    L+004

000000 0  0   ! Allocates a segment for the CRCB (and pin data), locks down space for it, and
000000 0  0   ! moves the initialization data to it.
000000 0  0   ! Returns:
000000 0  0   !   FEOK            if successful.
000000 0  0   !   CoverErrAlready if there is already a CRCB installed.
000000 0  0   !   CoverErrInsMem  if the storage allocation failed.
000000 0  0   int proc HandleEnable callable;
000000 1  0   begin
000000 1  1   int      .sg bpth( bpttablehead' ) := bpbase '-' wlen( bpth );
000000 1  1   string .ext crcb( CoverRoutineControlBlock );
000000 1  1   int(32)       length;
000000 1  1   int           error;               !Pandora's box
000000 1  1   int           i;
000000 1  1
000000 1  1   call setstop( 2 );                 !Make us unSTOPpable.
000011 1  1
000011 1  1   if 0d <> @bpth.CoverCrcbPtr then return CoverErrAlready; !Already installed
000020 1  1
000020 1  1   length := $dbl( $len( crcb )) + ($len( crcb.ControlByPIN ) '*' pcbtable.hdne);
000032 1  1
000032 1  1   if allocatesegment( CoverCrcbSegid, length ) then return CoverErrInsMem;
000044 1  1   call usesegment( CoverCrcbSegid ); !Make it addressible
000053 1  1   @crcb := %2000000d;
000056 1  1
000056 1  1   error := lockmemory( CRCB, length, 1d ); !Really low priority.  If there's
000067 1  1   if error < 0 then                  !memory presure NOW, then there sure will
000072 1  1      begin                           !be when we try to MEASURE something!
000072 1  2      call deallocatesegment( CoverCrcbSegid ); !Return what we got
000100 1  2      return CoverErrInsMem;          !Not enough storage
000102 1  2      end;
000102 1  1
000102 1  1   ! Initialize CRCB
000102 1  1   smear^ext( crcb, $int( length ), 0 );   !Clear it
000115 1  1   crcb.Verifier := CoverVerifier;
000123 1  1   crcb.Version := CoverControlLatestVersion;
000126 1  1   crcb.XCVRn^PIN := mypid.pidpin;
000132 1  1   crcb.PrivEnabled := FALSE;
000135 1  1
000135 1  1   @bpth.CoverCrcbPtr := $AXADR( crcb ); !Install it
000141 1  1   return FEOK;                       !Installed OK
000143 1  1
000143 1  1   end; !HandleEnable

BPTH                            Variable,114     STRUCT-I       SG Pointer     L+001
CRCB                            Variable,14020   STRUCT-S       EXT Pointer    L+002
ERROR                           Variable         INT            Direct         L+006
I                               Variable         INT            Direct         L+007
LENGTH                          Variable         INT (32)       Direct         L+004

000000 0  0   ! Starts the measurement of a PIN
000000 0  0   ! If it's a request from the Monitor (XNEWPROCESS), then it will leave the
000000 0  0   ! swapping of the spaces to XNEWPROCESS.
000000 1  0   int proc HandleMeasure( FromMonitor,
                                      PIN,
```

```
000000 1  0                           Crtpid,
000000 1  0                           CodeSeg,
000000 1  0                           LibSeg,
000000 1  0                           CodeFilename,
000000 1  0                           LibFilename,
000000 1  0                           SaveVol,
000000 1  0                           HisCraid,
000000 1  0                           BadFile ) callable;
000000 1  0   int        FromMonitor;          !TRUE iff from XNEWPROCESS
000000 1  0   int        PIN;                  !PIN we are to measure
000000 1  0   int       .Crtpid;               !CRTPID of process to measure
000000 1  0   int        CodeSeg;              !ABS seg of original program code
000000 1  0   int        LibSeg;               !ABS seg of original library code
000000 1  0   int       .CodeFilename;         !Filename of program file
000000 1  0   int       .LibFilename;          !Filename of library file ("  " if none)
000000 1  0   int       .SaveVol;              !Volume&Subvolume to save bitmap on
000000 1  0   int        HisCraid;             !Creator accessor ID of guy running program
000000 1  0   int       .BadFile;              !Name of file which got error
000000 1  0   begin
000000 1  1   int        mask;                 !For MUTEX
000000 1  1   int        error;
000000 1  1   int    .sg Measure^PCB( pcb^template );
000000 1  1   int    .sg bpth( bpttablehead ) := bpbase '-' wlen( bpth );
000000 1  1   string .ext crcb( CoverRoutineControlBlock );    !ABS address!
000000 1  1   string .ext PinData( CoverPinDataTemplate );     !ABS address!
000000 1  1   int        space;
000000 1  1   int        G16 := FALSE;         !flag - TRUE if program has >16 segments.
000000 1  1   label                            !For backing out work in progress
000000 1  1              Undo^everything,
000000 1  1              Undo^replace^UL,
000000 1  1              Undo^replace^UC,
000000 1  1              Undo^bitmap,
000000 1  1              Undo^copy^UL,
000000 1  1              Undo^copy^UC,
000000 1  1              Undo^setup,
000000 1  1              Undo^PSEM;
000000 1  1
000000 1  1   @Measure^PCB := @pcb[ PIN ];     !Address of this pin's pcb
000015 1  1
000015 1  1   ! Make sure the guy we're trying to start a measurement on hasn't stopped.
000015 1  1   if NOT FromMonitor AND
000015 1  1      Crtpid <> Measure^PCB.pcbcrt for 3 words then return CoverErrNotRunning;
000027 1  1
000027 1  1   call DBG^SET^ACCESSOR^ID( HisCraid );   !Change our process access id to make
000033 1  1                                           !sure security is OK to read object
000033 1  1
000033 1  1   @crcb := CRCB^Exists;            !May do PSEM
000035 1  1   if @crcb = 0d then return FEINVALOP; !Someone other than COVERCOM started XCVRn
000043 1  1
000043 1  1   @PinData := ControlByPinAddress( PIN );
000055 1  1   if PinData.State <> CoverMeasureStarting then
000061 1  1      PROCESSOR^HALT( DBG^Cover^Internal );
000066 1  1
000066 1  1   if NOT FromMonitor AND           !Monitor does check for PrivEnabled;
000066 1  1      NOT crcb.PrivEnabled AND      !otherwise WE have to.
000066 1  1      (Measure^PCB.PrivCodeF OR
000066 1  1       Measure^PCB.PrivLibF  OR
```

```
000066 1  1        Measure^PCB.sysproc)
000066 1  1    then
000112 1  1       begin
000112 1  2       error := CoverErrPriv;
000114 1  2       goto Undo^PSEM;
000115 1  2       end;
000115 1  1
000115 1  1    PinData.UC.SpaceCount := 0;         !Assume program not measured
000120 1  1    PinData.UL.SpaceCount := 0;         !Assume library not measured
000123 1  1
000123 1  1    if CodeFilename <> "  " then
000130 1  1       if (error := SetupCodeStuff( CodeFilename,
000130 1  1                                    PinData.UC,
000130 1  1                                    PinData.UL )) then
000146 1  1          begin
000146 1  2          BadFile ':=' CodeFilename for 12 words;
000152 1  2          GOTO Undo^setup;
000153 1  2          end;
000153 1  1
000153 1  1    if PinData.UL.SpaceCount then G16 := TRUE;   !Program code is >16 segments
000160 1  1
000160 1  1    if LibFilename <> "  " then         !If there's a library
000165 1  1       begin
000165 1  2       if G16 then                      !If UC was > 16 spaces
000167 1  2          begin                         !Shouldn't ever happen!
000167 1  3          if LibFilename <> CodeFilename for 12 words then
000174 1  3             begin
000174 1  4             BadFile ':=' LibFilename for 12 words;
000200 1  4             error := -5;               !Treat it like invalid code file
000202 1  4             GOTO Undo^setup;
000203 1  4             end;
000203 1  3          end
000203 1  2       else
000204 1  2          if (error := SetupCodeStuff( LibFilename,
000204 1  2                                       PinData.UL )) then
000217 1  2          begin
000217 1  3          BadFile ':=' LibFilename for 12 words;
000223 1  3          GOTO Undo^setup;
000224 1  3          end;
000224 1  2       end;
000224 1  1
000224 1  1    if FromMonitor then
000226 1  1       begin                            !XNEWPROCESS passes the segment values
000226 1  2       PinData.UC.Seg := CodeSeg;
000231 1  2       PinData.UL.Seg := LibSeg;
000234 1  2       end
000234 1  1    else
000235 1  1       begin                            !Take the segment values from the PCB
000235 1  2       PinData.UC.Seg := Measure^PCB.pcbcodeseg;
000242 1  2       PinData.UL.Seg := Measure^PCB.pcblibseg;
000247 1  2
000247 1  2       ! Check that object files are reasonably like the code that's in memory.
000247 1  2       if PinData.UC.SpaceCount then
000252 1  2          begin
000252 1  3          BadFile ':=' CodeFilename for 12 words;
000256 1  3          if PinData.UC.SpaceCount <> Measure^PCB.pcbcodecount then
000266 1  3             begin error := CoverErrSpaceMismatch; GOTO Undo^setup; end;
```

```
000271 1 3          for space := 0 to PinData.UC.SpaceCount - 1 do
000273 1 3             if (PinData.UC.SpaceSize[ space ].<0:5> +
000273 1 3                (if PinData.UC.SpaceSize[ space ].<6:15> then 1 else 0))
000273 1 3                <>
000273 1 3                segsize( PinData.UC.Seg '+' space ) then
000327 1 3                begin error := CoverErrSpaceMismatch; GOTO Undo^setup; end;
000342 1 3          end;
000342 1 2       if PinData.UL.SpaceCount then
000345 1 2          begin
000345 1 3          BadFile ':=' LibFilename for 12 words;
000351 1 3          if PinData.UL.SpaceCount <> Measure^PCB.pcblibcount then
000363 1 3             begin error := CoverErrSpaceMismatch; GOTO Undo^setup; end;
000366 1 3          for space := 0 to PinData.UL.SpaceCount - 1 do
000370 1 3             if (PinData.UL.SpaceSize[ space ].<0:5> +
000370 1 3                (if PinData.UL.SpaceSize[ space ].<6:15> then 1 else 0))
000370 1 3                <>
000370 1 3                segsize( PinData.UL.Seg '+' space ) then
000422 1 3                begin error := CoverErrSpaceMismatch; GOTO Undo^setup; end;
000437 1 3          end;
000437 1 2       end;
000437 1 1
000437 1 1    ! Make copy of the object and lock it down
000437 1 1    if (error := CopyObject( PinData.UC )) then
000447 1 1       begin error := CoverErrInsMem; GOTO Undo^copy^UC; end;
000452 1 1    if (error := CopyObject( PinData.UL )) then
000462 1 1       begin error := CoverErrInsMem; GOTO Undo^copy^UL; end;
000465 1 1
000465 1 1    vsem( bpth.CoverCrcbSem );          !Unlock
000474 1 1
000474 1 1    PinData.SaveVol ':=' SaveVol for 8 words;
000505 1 1
000505 1 1    ! Get bitmap storage
000505 1 1    if (error := AllocateBitmap( PIN, PinData )) then
000513 1 1       begin error := CoverErrInsMem; GOTO Undo^Bitmap; end;
000516 1 1
000516 1 1    ! Replace 1st instruction of each statement with Icode^BPT.
000516 1 1    BadFile ':=' CodeFilename for 12 words; !In case of error
000522 1 1    if (error := ReplaceStatements( CodeFilename, PinData.UC, PinData.UL )) then
000540 1 1       GOTO Undo^Replace^UC;
000541 1 1    if NOT G16 then                      !If program >16 segs, then library was done
000543 1 1       begin
000543 1 2       BadFile ':=' LibFilename for 12 words; !In case of error
000547 1 2       if LibFilename <> "  " then
000554 1 2          if (error := ReplaceStatements( LibFilename, PinData.UL )) then
000567 1 2             GOTO Undo^Replace^UL;
000570 1 2       end;
000570 1 1
000570 1 1    psem( bpth.CoverCrcbSem, -1d );     !Serialize again
000601 1 1
000601 1 1    if NOT FromMonitor AND
000601 1 1      (Crtpid <> Measure^PCB.pcbcrt for 3 words OR
000601 1 1       NOT Measure^PCB.pcbpri) then
000615 1 1          begin                          !He's stopped on us!
000615 1 2          error := CoverErrNotRunning;
000617 1 2          GOTO Undo^everything;
000620 1 2          end;
000620 1 1
000620 1 1    PinData.EverSaved := FALSE;          !For RESET check
```

```
000622 1   1   if NOT FromMonitor then
000624 1   1      begin
000624 1   2      ! This will start the measurement
000624 1   2      mutexon( %20, %050 );           !Need stack for proc calls
000627 1   2
000627 1   2   !                                         vvvvvvvvvvvvvvvvvvvvvvvvvvvvvvvvvv
000627 1   2      PinData.State := CoverMeasureRunning; !This has to come first if we ever
000632 1   2                                            !want to measure ourself ($XCVRn).
000632 1   2   !                                         ^^^^^^^^^^^^^^^^^^^^^^^^^^^^^^^^^^
000632 1   2
000632 1   2      if PinData.UC.SpaceCount then   !If there's a program to measure
000635 1   2         begin
000635 1   3         call ReplaceBPTs( @Measure^PCB, PinData.UC );
000644 1   3         Measure^PCB.pcbcodeseg := PinData.UC.CopySeg; !Replace his code with ours
000654 1   3         end;
000654 1   2
000654 1   2      if PinData.UL.SpaceCount then   !If there's a library to measure
000657 1   2         begin
000657 1   3         call ReplaceBPTs( @Measure^PCB, PinData.UL );
000666 1   3         Measure^PCB.pcblibseg := PinData.UL.CopySeg; !Replace his code with ours
000673 1   3         end;
000673 1   2
000673 1   2      mutexoff;
000674 1   2      end;
000674 1   1
000674 1   1   vsem( bpth.CoverCrcbSem );          !Unlock
000703 1   1   return FEOK;
000705 1   1   ! Backout work in progress
000705 1   1   Undo^everything:
000705 1   1   vsem ( bpth.CoverCrcbSem );
000714 1   1   call ReturnBitmap( PIN, PinData );
000722 1   1   Undo^replace^UL:
000722 1   1   Undo^replace^UC:
000722 1   1   Undo^bitmap:
000722 1   1   psem( bpth.CoverCrcbSem, -1d );
000733 1   1   call UnLockCode( PinData.UL.CopySeg, PinData.UL.SpaceCount );
000741 1   1   call FreeSegs( PinData.UL.CopySeg, PinData.UL.SpaceCount );
000747 1   1   Undo^copy^UL:
000747 1   1   call UnLockCode( PinData.UC.CopySeg, PinData.UC.SpaceCount );
000755 1   1   call FreeSegs( PinData.UC.CopySeg, PinData.UC.SpaceCount );
000763 1   1   Undo^copy^UC:
000763 1   1
000763 1   1   Undo^setup:
000763 1   1   PinData.UL.SpaceCount := 0;         !Reset
000766 1   1   PinData.UC.SpaceCount := 0;         !Reset
000771 1   1
000771 1   1   Undo^PSEM:
000771 1   1   PinData.State := CoverMeasureReset;
000773 1   1   vsem( bpth.CoverCrcbSem );
001002 1   1
001002 1   1   return error;
001004 1   1
001004 1   1   end; ! proc HandleMeasure

BADFILE                 Variable         INT           Indirect      L-003
BPTH                    Variable,114     STRUCT-I      SG Pointer    L+004
CODEFILENAME            Variable         INT           Indirect      L-007
```

```
CODESEG                  Variable        INT        Direct        L-011
CRCB                     Variable,14020  STRUCT-S   EXT Pointer   L+005
CRTPID                   Variable        INT        Indirect      L-012
ERROR                    Variable        INT        Direct        L+002
FROMMONITOR              Variable        INT        Direct        L-014
G16                      Variable        INT        Direct        L+012
HISCRAID                 Variable        INT        Direct        L-004
LIBFILENAME              Variable        INT        Indirect      L-006
LIBSEG                   Variable        INT        Direct        L-010
MASK                     Variable        INT        Direct        L+001
MEASURE^PCB              Variable,200    STRUCT-I   SG Pointer    L+003
PIN                      Variable        INT        Direct        L-013
PINDATA                  Variable,244    STRUCT-S   EXT Pointer   L+007
SAVEVOL                  Variable        INT        Indirect      L-005
SPACE                    Variable        INT        Direct        L+011
UNDO^BITMAP              Label                      %000722
UNDO^COPY^UC             Label                      %000763
UNDO^COPY^UL             Label                      %000747
UNDO^EVERYTHING          Label                      %000705
UNDO^PSEM                Label                      %000771
UNDO^REPLACE^UC          Label                      %000722
UNDO^REPLACE^UL          Label                      %000722
UNDO^SETUP               Label                      %000763

000000 0  0   proc HandleReset( PIN ) callable;
000000 1  0   int          PIN;
000000 1  0   begin
000000 1  1   int      .sg bpth( bpttablehead ) := bpbase '-' wlen( bpth );
000000 1  1   string .ext crcb( CoverRoutineControlBlock );       !ABS address!
000000 1  1   string .ext PinData( CoverPinDataTemplate );        !ABS address!
000000 1  1
000000 1  1   @crcb := @bpth.CoverCrcbPtr;
000010 1  1   if @crcb = 0d then PROCESSOR^HALT( DBG^Cover^Internal );
000021 1  1
000021 1  1   @PinData := ControlByPinAddress( PIN );
000033 1  1
000033 1  1   if PinData.State <> CoverMeasureStopping then
000037 1  1      PROCESSOR^HALT( DBG^Cover^Internal );
000044 1  1
000044 1  1   ! Unlock the code copies
000044 1  1   call UnLockCode( PinData.UC.CopySeg, PinData.UC.SpaceCount );
000052 1  1   call UnLockCode( PinData.UL.CopySeg, PinData.UL.SpaceCount );
000060 1  1
000060 1  1   ! Free the code copy memory
000060 1  1   call FreeSegs( PinData.UC.CopySeg, PinData.UC.SpaceCount );
000066 1  1   call FreeSegs( PinData.UL.CopySeg, PinData.UL.SpaceCount );
000074 1  1
000074 1  1   ! Free the bitmaps
000074 1  1   call ReturnBitmap( PIN, PinData );
000100 1  1
000100 1  1   PinData.State := CoverMeasureReset;
000102 1  1
000102 1  1   end; !proc HandleReset

BPTH                     Variable,114    STRUCT-I   SG Pointer    L+001
CRCB                     Variable,14020  STRUCT-S   EXT Pointer   L+002
PIN                      Variable        INT        Direct        L-003
PINDATA                  Variable,244    STRUCT-S   EXT Pointer   L+004
```

```
000000 0  0   int proc HandleSave( PIN, Owner ) callable;
000000 1  0   int         PIN;
000000 1  0   int         Owner;
000000 1  0   begin
000000 1  1   int     .sg bpth( bpttablehead ) := bpbase '-' wlen( bpth );
000000 1  1   string .ext crcb( CoverRoutineControlBlock );
000000 1  1   string .ext PinData( CoverPinDataTemplate );
000000 1  1   literal     RelBase = %2000000d;   !Base address of relative extended segments
000000 1  1   string .ext CodeBitBase := RelBase;
000000 1  1   string .ext LibBitBase := RelBase + SizeOfCoverBitmapSegment;
000000 1  1   int         error;                 !Pandora's box
000000 1  1   int         BitFile[0:11];         !Filename of bitmap file
000000 1  1   string      BitFile^S = BitFile;
000000 1  1   int         BitFnum;               !Filenumber of bitmap file
000000 1  1   int         user^name[0:11];
000000 1  1   int         default[0:17];         !From VERIFYUSER
000000 1  1   int         Security;
000000 1  1   int         ExtentSize;
000000 1  1   int(32)     FileSize;
000000 1  1   int(32)     SizeOfFirstSegment;
000000 1  1   struct      DiscImage( CoverDiscImageTemplate );
000000 1  1
000000 1  1
000000 1  1   ! Write data to bitmap file.
000000 1  1   int subproc WriteBuffer( PositionAddr, From, length );
000000 2  1   int(32)     PositionAddr;          !File position to write to
000000 2  1   string .ext From;                  !Relative address of data to write
000000 2  1   int         length;                !Length in bytes
000000 2  1   begin
000000 2  2
000000 2  2   call position( BitFnum, PositionAddr );
000005 2  2   if = then
000006 2  2      begin
000006 2  3      length := ((length '+' 2047) '>>' 11) '<<' 11; !Ensure 2KB multiple.
000014 2  3      call writex( BitFnum, From, length );
000026 2  3      if = then return FEOK;          !All's well
000031 2  3      end;
000031 2  2
000031 2  2   call fileinfo( BitFnum, error );
000042 2  2   call close( BitFnum );
000047 2  2   return error;
000051 2  2
000051 2  2   end; !subproc WriteBuffer

FROM                    Variable     STRING       EXT Pointer    S-003
LENGTH                  Variable     INT          Direct         S-001
POSITIONADDR            Variable     INT (32)     Direct         S-005

000051 1  1   ! Assumes each bitmap starts on a 4KW boundary and that PositionAddr is an
000051 1  1   ! even multiple of 4K bytes.
000051 1  1   int subproc MoveBitmap( PinSpace, From, PositionAddr );
000051 2  1   string .ext PinSpace( CoverPinDataCodespaceTemplate ); !ABS address!
000051 2  1   string .ext From;                  !Relative address of bitmap
000051 2  1   int(32)     PositionAddr;          !IO position in file
000051 2  1   begin
000051 2  2   string .ext BitmapFrom;
000051 2  2   int(32)     BitmapTo;              !RBA in file
```

```
000051 2  2   int          BC;
000051 2  2   int          i;
000051 2  2
000051 2  2   if NOT PinSpace.SpaceCount then return FEOK; !Nothing to do
000063 2  2
000063 2  2   for i := 0 to PinSpace.SpaceCount - 1 do
000065 2  2      begin
000065 2  3      @BitmapFrom := @From + (i '*' 8192); !Each starts on 4KW
000073 2  3      BitmapTo := PositionAddr + (i '*' 8192);
000101 2  3      BC := $int( ($udbl(PinSpace.SpaceSize[ i ]) + 7d) '>>' 3 );
000117 2  3      ! Each bitmap may be up to 8KB.
000117 2  3      if (error := WriteBuffer( BitmapTo, BitmapFrom, BC )) then return error;
000132 2  3      end;
000145 2  2
000145 2  2   return FEOK;
000150 2  2
000150 2  2   end; !subproc MoveBitmap

BC                           Variable        INT          Direct        S-001
BITMAPFROM                   Variable        STRING       EXT Pointer   S-005
BITMAPTO                     Variable        INT (32)     Direct        S-00?
FROM                         Variable        STRING       EXT Pointer   S-ᴦ
I                            Variable        INT          Direct
PINSPACE                     Variable,110    STRUCT-S     EXT Pointer
POSITIONADDR                 Variable        INT (32)     Direct

000150 1  1   ! Rename the bitmap file to ZZCOnnnn, where nnnn is 0001 to 9999.
000150 1  1   ! Sets ERROR.
000150 1  1   subproc RenameBitFile;
000150 2  1   begin
000150 2  2   int          RenameTryCount := 9999;
000150 2  2   int          num;
000150 2  2   int          status;
000150 2  2   int          fname^number[0:2];
000150 2  2   string       fname^number^S = fname^number;
000150 2  2
000150 2  2   BitFile[4] ':=' PinData.SaveVol[4] for 4 words;
000165 2  2   BitFile[8] ':=' "ZZC00001";
000173 2  2   do
000173 2  2      begin
000173 2  3      call rename( BitFnum, BitFile );
000177 2  3      if = then
000200 2  3         error := 0
000200 2  3      else
000204 2  3         begin
000204 2  4         call fileinfo( BitFnum, error );
000215 2  4         if error = FEDUP then
000220 2  4            begin
000220 2  5            fname^number ':=' BitFile[10] for 2 words;
000224 2  5            fname^number[2] := 0;      !stop scan
000226 2  5            call numin( fname^number^s, num, 10, status );
000240 2  5            if status then PROCESSOR^HALT( DBG^Cover^Internal );
000247 2  5            call numout( BitFile^S[20], num + 1, 10, 4 );
000257 2  5            end;
000257 2  4         end
000257 2  3      end
000257 2  2   until error <> FEDUP or NOT (RenameTryCount := RenameTryCount - 1);
```

```
  614     000266 2  2
  615     000266 2  2    end; !subproc RenameBitFile

FNAME^NUMBER                     Variable      INT          Direct        S-002
FNAME^NUMBER^S                   Variable      STRING       Direct        S-002
NUM                              Variable      INT          Direct        S-004
RENAME^RYCOUNT                   Variable      INT          Direct        S-005
STATUS                           Variable      INT          Direct        S-003
  617.    000274 1  1    @crcb := @bpth.CoverCrcbPtr;
  618.    000312 1  1
  619.    000312 1  1    @PinData := ControlByPinAddress( PIN );
  620.    000324 1  1
  621.    000324 1  1    ! Find out where to build the bitmap file (temporary).
  622.    000324 1  1    BitFile ':=' PinData.SaveVol for 4 words & "              ";
  623.    000346 1  1
  624.    000346 1  1    call DBG^SET^ACCESSOR^ID( Owner ); !Change our process access id to make sure
  625.    000352 1  1                                       !we can write (and set owner).
  626.    000352 1  1
  627.    000352 1  1    ! Now move all of the data from memory to disc image.  It's OK to move all
  628.    000352 1  1    ! this data even while a measurement is running since RESET is queued on us.
  629.    000352 1  1    DiscImage.Verifier := CoverVerifier;
  630.    000360 1  1    DiscImage.Version := CoverDiscLatestVersion;
  631.    000362 1  1    DiscImage.UCEverBooleaned := FALSE;
  632.    000364 1  1    DiscImage.ULEverBooleaned := FALSE;
  633.    000366 1  1    DiscImage.UC ':=' PinData.UC for $len( DiscImage.UC ) bytes;
  634.    000400 1  1    DiscImage.UL ':=  PinData.UL for $len( DiscImage.UL ) bytes;
  635.    000412 1  1
  636.    000412 1  1    call ComputeBitmapSizes( DiscImage,
  637.    000412 1  1                             ExtentSize,
  638.    000412 1  1                             FileSize,
  639.    000412 1  1                             SizeOfFirstSegment );
  640.    000422 1  1
  641.    000422 1  1    @DiscImage.UC.BitmapPtr := %2000000d + CoverDiscHeaderSize;
  642.    000425 1  1    @DiscImage.UL.BitmapPtr := %2000000d + CoverDiscHeaderSize
  643.    000425 1  1                                         + SizeOfFirstSegment;
  644.    000434 1  1
  645.    000434 1  1    call create( BitFile, ExtentSize, CoverBitmapFilecode );
  646.    000446 1  1    if <> then begin call fileinfo( -1, error ); return error; end;
  647.    000463 1  1
  648.    000463 1  1    call open( BitFile, BitFnum, %24020 !unstruct,write,exclusive!, 0 );
  649.    000475 1  1    if <> then begin call fileinfo( -1, error ); return error; end;
  650.    000511 1  1
  651.    000511 1  1    ! Secure ZZCOnnnn while it's still a temp file.
  652.    000511 1  1    user^name[0] ':=' Owner for 1 words & 0 & user^name[1] for 10 words;
  653.    000525 1  1    call verifyuser( user^name, 0, default, 36 ); !Get default security.
  654.    000534 1  1    if <> then
  655.    000535 1  1       Security := %2222
  656.    000535 1  1    else
  657.    000542 1  1       Security := default[17];
  658.    000544 1  1    call setmode( BitFnum, 1, Security );
  659.    000553 1  1
  660.    000553 1  1    call write( BitFnum, DiscImage, $len(DiscImage) ); !Write header
  661.    000563 1  1    if <> then
  662.    000564 1  1       begin
  663.    000564 1  2       call fileinfo( BitFnum, error );
  664.    000575 1  2       call close( BitFnum );
  665.    000602 1  2       return error;
```

```
000604 1  2     end;
000604 1  1
000604 1  1  call setmode( BitFnum, 141, 1);     !Allow large transfers
000613 1  1  if <> then begin call fileinfo( BitFnum, error ); return error; end;
000627 1  1  ! For extra speed, put EOF at end.
000627 1  1  call position( BitFnum, FileSize );
000633 1  1  if <> then begin call fileinfo( BitFnum, error ); return error; end;
000647 1  1  call control( BitFnum, 2 );           !Write EOF way out there.
000656 1  1  if <> then begin call fileinfo( BitFnum, error ); return error; end;
000672 1  1
000672 1  1  ! Make bitmaps accessible with relative addressing.
000672 1  1  call usesegment( CoverBitmapSegids + PIN );
000702 1  1
000702 1  1  !Move any UC bitmap data
000702 1  1  if (error := MoveBitmap( PinData.UC, CodeBitBase, CoverDiscHeaderSize )) then
000715 1  1     return error;
000720 1  1  !Move any UL bitmap data
000720 1  1  if (error := MoveBitmap( PinData.UL, LibBitBase,
000720 1  1                          SizeOfFirstSegment+CoverDiscHeaderSize )) then
000735 1  1     return error;
000737 1  1
000737 1  1  PinData.EverSaved := TRUE;
000742 1  1
000742 1  1  call RenameBitFile;                   !Rename bitmap file to ZZCOnnnn
000743 1  1  call close( BitFnum );                !Close it, we're done
000750 1  1
000750 1  1  return error;
000753 1  1
000753 1  1  end; !proc HandleSave

BITFILE                  Variable         INT          Direct        L+013
BITFILE\S                Variable         STRING       Direct        L+013
BITFNUM                  Variable         INT          Direct        L+027
BPTH                     Variable,114     STRUCT-I     SG Pointer    L+001
CODEBITBASE              Variable         STRING       EXT Pointer   L+006
CRCB                     Variable,14020   STRUCT-S     EXT Pointer   L+002
DEFAULT                  Variable         INT          Direct        L+044
DISCIMAGE                Variable,232     STRUCT       Direct        L+074
ERROR                    Variable         INT          Direct        L+012
EXTENTSIZE               Variable         INT          Direct        L+067
FILESIZE                 Variable         INT (32)     Direct        L+070
LIBBITBASE               Variable         STRING       EXT Pointer   L+010
MOVEBITMAP               Subproc          INT          %000051
OWNER                    Variable         INT          Direct        L-003
PIN                      Variable         INT          Direct        L-004
PINDATA                  Variable,244     STRUCT-S     EXT Pointer   L+004
RELBASE                  Literal          INT (32)     %000010 000000
RENAMEBITFILE            Subproc                       %000150
SECURITY                 Variable         INT          Direct        L+066
SIZEOFFIRSTSEGMENT       Variable         INT (32)     Direct        L+072
USERANAME                Variable         INT          Direct        L+030
WRITEBUFFER              Subproc          INT          %000000

000000 0  0  ! Make sure we're running on supported Guardian version.
000000 0  0  ! Make sure COVER is installed in Guardian.
000000 0  0  ! Make sure we were run with the right name ($XCVRn).
000000 0  0  ! Make sure we were started by SUPER.SUPER .
```

```
700.    000000 0  0    ! ABEND if we're not!
701.    000000 0  0    ! Use XLBs and turn off console message 52.
702.    000000 0  0    proc Initialize( AncestorsId );
703.    000000 1  0    int         .AncestorsId; ![0:3]!    !Returns ancestor's process ID.
704.    000000 1  0    begin
705.    000000 1  1    int         MyCrtpid[0:8];
706.    000000 1  1    string      S^MyCrtpid = MyCrtpid;
707.    000000 1  1    string      BinToHex = 'P' := ["0123456789ABCDEF"];
708.    000010 1  1    int         craid;
709.    000010 1  1    literal     SUPERID = -1;
710.    000010 1  1    ?SOURCE sversion( MY^VERSION )
Source file:  [22]  $OVER.T9618C00.SVERSION  29APR87 - 09:45:32
   5.   000010 1  1    ?SECTION MY^VERSION
   6.   000010 1  1    DEFINE      MY^VERSION = (((
   7.   000010 1  1                "C"                      !<<<<< This is the real version id
   8.   000010 1  1                +("K"-"A"))'<<'8)'+'     !This is a correction factor for Rosewood
   9.   000010 1  1                00                       !<<<<< Don't forget
  10.   000010 1  1                )#;
  11.   000010 1  1
 711.   000010 1  1
 712.   000010 1  1    if VERSIONERROR( MY^VERSION ) then call abend;
 713.   000025 1  1
 714.   000025 1  1    ! Check we're right version of COVER.
 715.   000025 1  1    if NOT TestCoverHooks then call abend;
 716.   000034 1  1
 717.   000034 1  1    ! Check that we are named properly.
 718.   000034 1  1    if processinfo( mypid, MyCrtpid, craid ) then call abend;
 719.   000054 1  1    if S^MyCrtpid <> "$XCVR" then call abend;
 720.   000072 1  1    if S^MyCrtpid[5] <> BinToHex[ mypid.pidcpu ] for 1 bytes then call abend;
 721.   000120 1  1
 722.   000120 1  1    if craid <> SUPERID then call abend;
 723.   000130 1  1
 724.   000130 1  1    call lookupprocessname( MyCrtpid );
 725.   000133 1  1    if <> then call abend;               !Supposedly can't happen
 726.   000141 1  1    AncestorsId ':=' MyCrtpid[5] for 4 words;
 727.   000145 1  1
 728.   000145 1  1    ! Use XLBs so that it will be guaranteed that XSTOP can get to us.
 729.   000145 1  1    call controlmessagesystem( ctlmsgsys^setlistenx, TRUE );
 730.   000154 1  1    ! Inhibit console message 52.
 731.   000154 1  1    call controlmessagesystem( ctlmsgsys^setreceiveqwarning, FALSE );
 732.   000163 1  1
 733.   000163 1  1    end; ! proc Initialize

ANCESTORSID                       Variable      INT           Indirect      L-003
BINTOHEX                          Variable      STRING        Direct        P+000
CRAID                             Variable      INT           Direct        L+012
MYCRTPID                          Variable      INT           Direct        L+001
MY^VERSION                        Define                      ((( "C" +("K"-"A"))'<<'8)'+' 00 )
SUPERID                           Literal       INT           %177777
S^MYCRTPID                        Variable      STRING        Direct        L+001
   735.   000000 0  0    int !prv! proc ReplaceStatements( Filename, PinSpace, LibSpace )priv,variable;
   736.   000000 1  0    int         .Filename;
   737.   000000 1  0    string .ext PinSpace( CoverPinDataCodespaceTemplate );
   738.   000000 1  0    string .ext LibSpace( CoverPinDataCodespaceTemplate );
   739.   000000 1  0    begin
   740.   000000 1  1    int     .ext WhereToPutIt;          !Where to put the Icode^BPT
   741.   000000 1  1    literal      BFI^opcode = %30;      !Kludge to look for TAL bugs
```

```
000000 1  1  int     .ext LookForBFI;              !(TPR S850619-1317-3351 and
000000 1  1  label        SkipPutIt;               ! TPR S860813-1602-3351)
000000 1  1  int(32)      Base;
000000 1  1  int(32)      Limit;
000000 1  1  int(32)      CountSkips := 0d;       !For debugging count statements skipped.
000000 1  1  int          fn := -1;
000000 1  1  int          error;
000000 1  1  int          PrintErr;
000000 1  1  label        ReturnError;
000000 1  1
000000 1  1  ! Return FALSE if access to xa will cause a fault, otherwise return TRUE
000000 1  1  ! NOTE: XA must be an absolute extended address.  No checking is done!
000000 1  1  int subproc CheckAddr ( xa );
000000 2  1  int(32)      xa;
000000 2  1  begin
000000 2  2  int         .ext spt( spt^template ); !segment page table
000000 2  2  int          pte;                     !a page table entry
000000 2  2
000000 2  2  stack^aspt( xa );
000005 2  2  store @spt;
000006 2  2  if $carry then return 0;
000012 2  2  stack xa;
000013 2  2  code( rspt );
000014 2  2  store pte;
000015 2  2  return if $carry or pte.absent then 0 else 1;
000026 2  2
000026 2  2  end; !subproc CheckAddr

PTE                       Variable       INT            Direct         S-000
SPT                       Variable,36    STRUCT-I       EXT Pointer    S-002
XA                        Variable       INT (32)       Direct         S-005
000026 1  1  if PinSpace.SpaceCount = 0 then return 0;    !Nothing to do
000044 1  1
000044 1  1  if (error := OpenObjectFile( Filename, fn )) then GOTO ReturnError;
000053 1  1
000053 1  1  while NOT (error := GetNextProcedure( fn )) do !For every procedure
000060 1  1     if Procedure.HasInspect then
000063 1  1
000063 1  1        begin
000063 1  2        if Procedure.Spaceid >= 16 then
000067 1  2           begin
000067 1  3           ! Check that Spaceid is ligitimate; if not, then we probably have a
000067 1  3           ! bad object file.
000067 1  3              if PinSpace.SpaceCount <> 16 OR
000067 1  3                 NOT $param( LibSpace ) OR
000067 1  3                 (LibSpace.SpaceCount < Procedure.Spaceid-16+1) THEN
000114 1  3              begin error := -5; GOTO ReturnError; end;  !Sanity check
000117 1  3           Base := axword( LibSpace.CopySeg '+' (Procedure.Spaceid - 16),
000117 1  3                           Procedure.Offset );
000136 1  3           end
000136 1  2        else
000137 1  2           begin
000137 1  3           ! Check that Spaceid is ligitimate; if not, then we probably have a
000137 1  3           ! bad object file.
000137 1  3           if (PinSpace.SpaceCount < Procedure.Spaceid+1) THEN
000151 1  3              begin error := -5; GOTO ReturnError; end;  !Sanity check
000154 1  3           Base := axword( PinSpace.CopySeg '+' Procedure.Spaceid,
                                      Procedure.Offset );
```

```
000154 1  3
000172 1  3            end;
000172 1  2
000172 1  2         Limit := Base + Procedure.Length - 2d;
000202 1  2         ! Perform a check that Base and Limit are both in memory.  If not, then
000202 1  2         ! we probably have a bad object file.
000202 1  2         if NOT CheckAddr( Base ) OR NOT CheckAddr( Limit ) then
000212 1  2            begin error := -5; GOTO ReturnError; end;     !Sanity check
000216 1  2
000216 1  2         while NOT (error := GetNextEPT( fn )) do
000223 1  2            begin
000223 1  3            @WhereToPutIt := Base + 2 '*' EntryPointOffset;
000231 1  3            if @WhereToPutIt < Base OR @WhereToPutIt > Limit then
000241 1  3               begin error := -5; GOTO ReturnError; end;  !Sanity check
000244 1  3            WhereToPutIt := Icode^BPT;
000250 1  3            end;
000251 1  2         if error <> -1 then GOTO ReturnError;
000261 1  2
000261 1  2         !For every statement in the procedure
000261 1  2         while NOT (error := GetNextStatement( fn )) do
000266 1  2            begin
000266 1  3            @WhereToPutIt := Base + 2 '*' Statement.Offset;
000275 1  3            if @WhereToPutIt < Base OR @WhereToPutIt > Limit then
000305 1  3               begin error := -5; GOTO ReturnError; end;  !Sanity check
000310 1  3            if Statement.Offset then
000313 1  3               begin
000313 1  4               !Kludge around TPR S850619-1317-3351
000313 1  4               @LookForBFI := @WhereToPutIt - 2d;
000320 1  4               if LookForBFI = BFI^opcode then
000324 1  4                  begin CountSkips := CountSkips + 1d; GOTO SkipPutIt; end;
000331 1  4               !Kludge around TPR S860813-1602-3351
000331 1  4               if WhereToPutIt '<' 3 then
000336 1  4                  begin
000336 1  5                  @LookForBFI := @WhereToPutIt + 2d * $dbl( WhereToPutIt );
000350 1  5                  if @LookForBFI < Limit and LookForBFI = BFI^opcode then
000360 1  5                     begin CountSkips := CountSkips + 1d; GOTO SkipPutIt; end;
000365 1  5                  end;
000365 1  4
000365 1  4               WhereToPutIt := Icode^BPT;
000371 1  4   SkipPutIt:
000371 1  4               end;
000371 1  3            end;
000372 1  2         if error <> -1 then GOTO ReturnError;
000376 1  2         end;
000400 1  1
000400 1  1      if error <> -1 then GOTO ReturnError;
000404 1  1
000404 1  1   call close( fn );
000411 1  1   return 0;
000413 1  1
000413 1  1   ReturnError:
000413 1  1   if fn <> -1 then call close( fn );
000423 1  1   return error;
000425 1  1
000425 1  1   end; ! proc ReplaceStatements

BASE                Variable      INT (32)      Direct       L+005
```

```
BFI^OPCODE                     Literal        INT            %000030
CHECKADDR                      Subproc        INT            %000000
COUNTSKIPS                     Variable       INT (32)       Direct         L+011
ERROR                          Variable       INT            Direct         L+014
FILENAME                       Variable       INT            Indirect       L-010
FN                             Variable       INT            Direct         L+013
LIBSPACE                       Variable,110   STRUCT-S       EXT Pointer    L-005
LIMIT                          Variable       INT (32)       Direct         L+007
LOOKFORBFI                     Variable       INT            EXT Pointer    L+003
PINSPACE                       Variable,110   STRUCT-S       EXT Pointer    L-007
PRINTERR                       Variable       INT            Direct         L+015
RETURNERROR                    Label                         %000413
SKIPPUTIT                      Label                         %000371
WHERETOPUTIT                   Variable       INT            EXT Pointer    L+001
 000000 0  0   ! This will unlock the bitmaps for this PIN and free the segment.
 000000 0  0   ! It will also set the bitmap pointers to 0.
 000000 0  0   proc !prv! ReturnBitmap( PIN, PinData ) priv;
 000000 1  0   int          PIN;
 000000 1  0   string .ext PinData( CoverPinDataTemplate );
 000000 1  0   begin
 000000 1  1   int          Segid := CoverBitmapSegids + PIN;
 000000 1  1
 000000 1  1   call deallocatesegment( Segid );
 000011 1  1
 000011 1  1   @PinData.UC.BitmapPtr := 0d;        !Clear it
 000017 1  1   @PinData.UL.BitmapPtr := 0d;        !Clear it
 000025 1  1
 000025 1  1   end; !proc ReturnBitmap

PIN                             Variable       INT            Direct         L-005
PINDATA                         Variable,244   STRUCT-S       EXT Pointer    L-004
SEGID                           Variable       INT            Direct         L+001
 000000 0  0   ! Open the object file specified and return its filenumber.
 000000 0  0   ! Verify that the object file is in a current format (Binder format at least,
 000000 0  0   ! since we will require symbols).
 000000 0  0   ! Fill in all the information from the header and CSIL.
 000000 0  0   ! Note: If the code file has > 16 code spaces, the extra stuff is put into
 000000 0  0   ! LibData.
 000000 0  0   ! Returns: 0 when normal return.
 000000 0  0   !          >0 FE error nunber.
 000000 0  0   !          <0 RO^ error (-1 meaning end of list; no more Procedures)
 000000 0  0   int !prv! proc SetupCodeStuff( Fname, PinData, LibData ) priv, variable;
 000000 1  0   int          .Fname;                !Input:  Program/library filename
 000000 1  0   string .ext PinData( CoverPinDataCodespaceTemplate );
 000000 1  0   string .ext LibData( CoverPinDataCodespaceTemplate );
 000000 1  0   begin
 000000 1  1   int          fn;
 000000 1  1   int          error := 0;
 000000 1  1   struct      .csil( CODESPACEINFO^TEMPLATE )[0:31];
 000000 1  1   struct       hdr( OBJFILEHDR^TEMPLATE );
 000000 1  1   label        ReturnError;
 000000 1  1
 000000 1  1   smear^ext( PinData, $len(CoverPinDataCodespaceTemplate), 0 );
 000026 1  1
 000026 1  1   ! Open object file
 000026 1  1   if (error := OpenObjectFile( Fname, fn )) then GOTO ReturnError;
 000035 1  1
```

```
000035 1  1   if (error := PositRead( fn, hdr, 0d, $len(hdr) )) !Read object header
000035 1  1      then GOTO ReturnError;
000046 1  1
000046 1  1   ! Save header stuff
000046 1  1   PinData.Name ':=' Fname for 12 words;
000057 1  1   PinData.TimeStamp ':=' hdr.BINDTIME for 3 words;
000070 1  1   PinData.SpaceCount := hdr.CSILLENGTH/wlen(CODESPACEINFO^TEMPLATE);
000100 1  1
000100 1  1   ! Read CSIL
000100 1  1   if (error := PositRead( fn, csil, hdr.CSILADDR, hdr.CSILLENGTH'<<'1 ))
000100 1  1      then GOTO ReturnError;
000112 1  1
000112 1  1   use space;
000112 1  1
000112 1  1   if PinData.SpaceCount > 16 then
000121 1  1      begin
000121 1  2      if NOT $param( LibData ) then return -5;  !Lib can't be > 16 spaces
000126 1  2      smear^ext( LibData, $len(CoverPinDataCodespaceTemplate), 0 );
000137 1  2      LibData.Name ':=' PinData.Name for 12 words;
000151 1  2      LibData.TimeStamp ':=' PinData.TimeStamp for 3 words;
000163 1  2      LibData.SpaceCount := PinData.SpaceCount - 16;
000176 1  2      PinData.SpaceCount := 16;
000204 1  2      for space := 0 to LibData.SpaceCount - 1 do
000214 1  2         LibData.SpaceSize[ space ] := csil[ space + 16 ].CODEAREALENGTH;
000236 1  2      end;
000236 1  1
000236 1  1   for space := 0 to PinData.SpaceCount - 1 do
000246 1  1      PinData.SpaceSize[ space ] := csil[ space ].CODEAREALENGTH;
000265 1  1
000265 1  1   drop space;
000265 1  1
000265 1  1   ReturnError:
000265 1  1   if fn <> -1 then call close( fn );
000275 1  1   return error;
000277 1  1
000277 1  1   end; !SetupCodeStuff

CSIL                     Variable,54     STRUCT       Indirect      L+003
ERROR                    Variable        INT          Direct        L+002
FN                       Variable        INT          Direct        L+001
FNAME                    Variable        INT          Indirect      L-010
HDR                      Variable,1000   STRUCT       Direct        L+004
LIBDATA                  Variable,110    STRUCT-S     EXT Pointer   L-005
PINDATA                  Variable,110    STRUCT-S     EXT Pointer   L-007
RETURNERROR              Label                        %000265
000000 0  0   proc MainStreet main;
000000 1  0   begin
000000 1  1   int        Rcv[0:11]  := ["$RECEIVE              "];
000014 1  1   int        Oper[0:11] := ["$0                    "];
000030 1  1   int        RcvFn;
000030 1  1   int        OperFn;
000030 1  1   int        RcvCount;
000030 1  1   int        ReplyError;            !Error code for reply
000030 1  1   int        HisPin;                !PIN of requestor
000030 1  1   int        ProcessId[0:3];        !Process ID of requestor
000030 1  1   int        HisProcessAccessId;    !Process access ID of requestor
000030 1  1   int        AncestorsId[0:3];      !Process ID of guy who started us
```

```
000030 1  1   int         OurProg[0:11];          !Our program filename
000030 1  1   layout      (.RcvBuff, 132);        !Input buffer
000030 1  1   struct      .MeasureReq( CVR^Server^Measure^Template ) = RcvBuff;
000030 1  1   struct      .SaveReq( CVR^Server^Save^Template ) = RcvBuff;
000030 1  1   struct      .ResetReq( CVR^Server^Reset^Template ) = RcvBuff;
000030 1  1   int         ReplyLength;            !Length of reply
000030 1  1   int         .ReplyData[0:11];       !Measure may do a reply
000030 1  1   int         .MsgBuffer[0:66];
000030 1  1   string      .MsgBuffer^S := @MsgBuffer '<<' 1;
000030 1  1   int         error;
000030 1  1   label       DoReset;
000030 1  1   label       InvalOp;
000030 1  1   ! Format and send a message to $0 explaining why measurement wasn't started.
000030 1  1   subproc Send0NoStart;
000030 2  1   begin
000030 2  2   int          length;
000030 2  2   int          internal[0:11];
000030 2  2   string       internal^S = internal;
000030 2  2   string      .Msg;
000030 2  2
000030 2  2   @Msg := @MsgBuffer^S;
000033 2  2   Msg ':=' "COVER couldn't start measurement on " -> @Msg;
000043 2  2   internal ':=' MeasureReq.CodeFilename for 12 words;
000050 2  2   if internal^S[0] = "\" then
000053 2  2      internal^S[0] ':=' "$" & internal^S[2] for 6 bytes & " ";
000075 2  2   @Msg := @Msg '+' fnamecollapse( internal, Msg );
000110 2  2   Msg ':=' " due to " -> @Msg;
000120 2  2
000120 2  2   if ReplyError = CoverErrInsMem OR ReplyError = FENOPHYSMEM then
000126 2  2      Msg ':=' "insufficient memory." -> @Msg
000126 2  2   else if ReplyError = -5 OR ReplyError = -6 then
000152 2  2      Msg ':=' "incompatible object format." -> @Msg
000152 2  2   else if ReplyError < 0 then
000167 2  2      Msg ':=' "unknown error." -> @Msg
000167 2  2   else
000201 2  2      begin                              !FE error reading one of code or lib.
000201 2  3      Msg ':=' "error #" -> @Msg;
000211 2  3      call numout( Msg, ReplyError, 10, 3);
000217 2  3      @Msg := @Msg '+' 3;
000222 2  3      Msg ':=' " on file " -> @Msg;
000232 2  3      internal ':=' ReplyData for 12 words;
000236 2  3      if internal^S[0] = "\" then
000241 2  3         internal^S[0] ':=' "$" & internal^S[2] for 6 bytes & " ";
000263 2  3      @Msg := @Msg '+' fnamecollapse( internal, Msg );
000276 2  3      Msg ':=' "." -> @Msg;
000306 2  3      end;
000306 2  2
000306 2  2   call write( OperFn, MsgBuffer, @Msg '-' @MsgBuffer^S );
000320 2  2
000320 2  2   end; !subproc Send0NoStart

INTERNAL                  Variable     INT          Direct       S-014
INTERNAL^S                Variable     STRING       Direct       S-014
LENGTH                    Variable     INT          Direct       S-015
MSG                       Variable     STRING       Indirect     S-000
```

```
000432 1 1   call initialize( AncestorsId );     !Make sure we got started right
000470 1 1
000470 1 1   call open( Rcv, RcvFn, %40000 !syst msg!, 1 !reply! );
000501 1 1   if <> then call abend;
000507 1 1
000507 1 1   call open( Oper, OperFn );
000516 1 1   if <> then call abend;
000524 1 1
000524 1 1   call programfilename( OurProg );    !Save for OPEN checks
000527 1 1
000527 1 1   ! main command interpreter loop
000527 1 1   while true do
000527 1 1     begin
000527 1 2     ReplyLength := 0;                 !Normally nothing is returned.
000531 1 2     call readupdate( RcvFn, RcvBuff, $len(RcvBuff), RcvCount );
000542 1 2     ! If < then SHOULDN'T HAPPEN; just ignore because we can't do anything.
000542 1 2     call lastreceive( ProcessId );    !Find out from whom
000547 1 2     ! Must be from same CPU
000547 1 2     if ProcessId[3].pidcpu <> mypid.pidcpu then GOTO InvalOp;
000561 1 2     HisPin := ProcessId[3].pidpin;    !Save PIN of requestor.
000564 1 2     error := processinfo( ProcessId[3],,,HisProcessAccessId );
000577 1 2     if error then GOTO InvalOp;       !He went away!
000602 1 2
000602 1 2     case RcvBuff.word of
000604 1 2        begin
000604 1 3        -31!close! ->
000604 1 3        ReplyError := FEOK;            !Always allow CLOSEs.
000606 1 3
000606 1 3        -30!open! ->
000607 1 3        if RcvBuff.word[1].<12:15> > 1 then
000614 1 3           ReplyError := FETOOMANY
000614 1 3        else
000617 1 3           !Must be XNEWPROCESS, XSTOP, or COVERCOM.
000617 1 3           if FromPhoenix( HisPin ) OR      !XNEWPROCESS/XSTOP
000617 1 3              FromCovercom( ProcessId[3], OurProg ) then !COVERCOM
000630 1 3              ReplyError := FEOK
000630 1 3           else
000633 1 3              ReplyError := FENOTPRIV;
000635 1 3
000635 1 3        -1!startup! ->
000636 1 3        ReplyError := FEOK;
000640 1 3
000640 1 3        CVR^Server^Disable ->
000641 1 3        if FromSuperPriv( HisPin ) then     !Must be SUPER.SUPER
000645 1 3           ReplyError := HandleDisable
000645 1 3        else
000650 1 3           ReplyError := FEINVALOP;
000652 1 3
000652 1 3        CVR^Server^Enable ->
000653 1 3        if FromSuperPriv( HisPin ) then     !Must be SUPER.SUPER
000657 1 3           if ProcessId = AncestorsId for 4 words then
000664 1 3              ReplyError := HandleEnable !ENABLEr is same process as started us.
000664 1 3           else
000667 1 3              ReplyError := CoverErrAlready  !Race condition; other COVERCOM
000667 1 3        else
000672 1 3           ReplyError := FEINVALOP;
000674 1 3
```

```
000674 1 3        CVR^Server^Measure ->
000675 1 3        ReplyError := HandleMeasure( MeasureReq.FromMonitor,
000675 1 3                                     MeasureReq.PIN,
000675 1 3                                     MeasureReq.Crtpid,
000675 1 3                                     MeasureReq.CodeSeg,
000675 1 3                                     MeasureReq.LibSeg,
000675 1 3                                     MeasureReq.CodeFilename,
000675 1 3                                     MeasureReq.LibFilename,
000675 1 3                                     MeasureReq.SaveVol,
000675 1 3                                     HisProcessAccessId,
000675 1 3                                     ReplyData );
000723 1 3        if ReplyError AND ReplyError > CoverErrFirst then
000730 1 3           ReplyLength := 24;          !Return filename (24 bytes)
000732 1 3        if MeasureReq.FromMonitor AND
000732 1 3           ReplyError AND
000732 1 3           ReplyError <> FESECVIOL then
000742 1 3           call Send0NoStart;          !Notify $0
000743 1 3
000743 1 3        CVR^Server^Save ->
000745 1 3        ReplyError := HandleSave( SaveReq.PIN, SaveReq.Owner);
000754 1 3        if ReplyError then
000756 1 3           begin                       !XSTOP won't handle errors
000756 1 4           MsgBuffer ':=' "COVER couldn't write ZZCOnnnn file due to error #nnn.";
000766 1 4           call numout( MsgBuffer^S[49], ReplyError, 10, 3 );
000775 1 4           call write( OperFn, MsgBuffer, 53 );
001010 1 4           end;
001010 1 3        ResetReq.PIN := SaveReq.PIN;
001013 1 3        goto DoReset;                  !Monitor doesn't need to send a RESET msg.
001015 1 3
001015 1 3        CVR^Server^Reset ->
001016 1 3     DoReset:
001016 1 3        call HandleReset( ResetReq.PIN );
001022 1 3        ReplyError := FEOK;            !Never a reportable error on RESET
001024 1 3
001024 1 3        otherwise ->
001025 1 3     InvalOp:
001025 1 3        ReplyError := FEINVALOP;
001027 1 3        end;
001106 1 2
001106 1 2      ! Make sure error replies are in range 0 - 512.
001106 1 2      if ReplyError < 0 then ReplyError := FEFIRSTUSER - ReplyError;
001116 1 2      call reply( ReplyData, ReplyLength,,, ReplyError );
001125 1 2
001125 1 2      !Don't hang around if COVER is not enabled.
001125 1 2      if (RcvBuff.word = CVR^Server^Enable and NOT TestCoverEnabled) OR
001125 1 2         (RcvBuff.word = CVR^Server^Disable and ReplyError = FEOK) then
001140 1 2         begin
001140 1 3         call setstop( 0 );            !Allow us to stop
001144 1 3         call stop;
001151 1 3         end;
001151 1 2      end;
001153 1 1
001153 1 1     end;  ! proc MainStreet

ANCESTORSID          Variable     INT       Direct       L+043
DORESET              Label                  %001016
ERROR                Variable     INT       Direct       L+070
```

| | | | | |
|---|---|---|---|---|
| HISPIN | Variable | INT | Direct | L+035 |
| HISPROCESSACCESSID | Variable | INT | Direct | L+042 |
| INVALOP | Label | | %001025 | |
| MEASUREREQ | Variable,120 | STRUCT | Indirect | L+063 |
| MSGBUFFER | Variable | INT | Indirect | L+066 |
| MSGBUFFER^S | Variable | STRING | Indirect | L+067 |
| OPER | Variable | INT | Direct | L+015 |
| OPERFN | Variable | INT | Direct | L+032 |
| OURPROG | Variable | INT | Direct | L+047 |
| PROCESSID | Variable | INT | Direct | L+036 |
| RCV | Variable | INT | Direct | L+001 |
| RCVBUFF | Variable,204 | STRUCT | Indirect | L+063 |
| 1 WORD | 0,2 | INT | Direct | |
| 1 BYTE[0:131] | 0,1 | STRING | Direct | |
| RCVCOUNT | Variable | INT | Direct | L+033 |
| RCVFN | Variable | INT | Direct | L+031 |
| REPLYDATA | Variable | INT | Indirect | L+065 |
| REPLYERROR | Variable | INT | Direct | L+034 |
| REPLYLENGTH | Variable | INT | Direct | L+064 |
| RESETREQ | Variable,4 | STRUCT | Indirect | L+063 |
| SAVEREQ | Variable,6 | STRUCT | Indirect | L+063 |
| SENDONOSTART | Subproc | | %000030 | |

ENTRY POINT MAP BY NAME

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 031 | 000214 | 000600 | 000214 | P | ALLOCATEBITMAP | 29APR87 | 13:25 | TAL | $OVER.T9618C00.SCVRMON |
| 00 | 003 | 000601 | 000660 | 000601 | | COMPUTEBITMAPSIZES | 29APR87 | 13:25 | TAL | $OVER.T9618C00.SCVRMON |
| 00 | 014 | 010211 | 010254 | 010211 | | CONVERTPITFORMAT | 17FEB87 | 15:46 | TAL | $OVER.T9618C00.SREADOBJ |
| 00 | 036 | 006036 | 006275 | 006036 | P | COPYOBJECT | 12FEB87 | 12:33 | TAL | $OVER.T9618C00.SUTIL1 |
| 00 | 035 | 005755 | 006035 | 005755 | P | CRCB^EXISTS | 12FEB87 | 12:33 | TAL | $OVER.T9618C00.SUTIL1 |
| 00 | 040 | 006357 | 006431 | 006357 | P | FREESEGS | 12FEB87 | 12:33 | TAL | $OVER.T9618C00.SUTIL1 |
| 00 | 004 | 000661 | 000723 | 000661 | | FROMCOVERCOM | 29APR87 | 13:25 | TAL | $OVER.T9618C00.SCVRMON |
| 00 | 017 | 000724 | 000752 | 000724 | PC | FROMPHOENIX | 29APR87 | 13:25 | TAL | $OVER.T9618C00.SCVRMON |
| 00 | 020 | 000753 | 000775 | 000753 | PC | FROMSUPERPRIV | 29APR87 | 13:25 | TAL | $OVER.T9618C00.SCVRMON |
| 00 | 011 | 007311 | 007376 | 007311 | | GETNEXTEPT | 17FEB87 | 15:46 | TAL | $OVER.T9618C00.SREADOBJ |
| 00 | 010 | 006754 | 007310 | 006754 | | GETNEXTPROCEDURE | 17FEB87 | 15:46 | TAL | $OVER.T9618C00.SREADOBJ |
| 00 | 012 | 007377 | 007507 | 007377 | | GETNEXTSTATEMENT | 17FEB87 | 15:46 | TAL | $OVER.T9618C00.SREADOBJ |
| 00 | 016 | 010304 | 010431 | 010304 | | GETSOURCEORD | 17FEB87 | 15:46 | TAL | $OVER.T9618C00.SREADOBJ |
| 00 | 021 | 000776 | 001143 | 000776 | PC | HANDLEDISABLE | 29APR87 | 13:25 | TAL | $OVER.T9618C00.SCVRMON |
| 00 | 022 | 001144 | 001306 | 001144 | PC | HANDLEENABLE | 29APR87 | 13:25 | TAL | $OVER.T9618C00.SCVRMON |
| 00 | 023 | 001307 | 002312 | 001307 | PC | HANDLEMEASURE | 29APR87 | 13:25 | TAL | $OVER.T9618C00.SCVRMON |
| 00 | 024 | 002313 | 002415 | 002313 | PC | HANDLERESET | 29APR87 | 13:25 | TAL | $OVER.T9618C00.SCVRMON |
| 00 | 025 | 002416 | 003401 | 002712 | PC | HANDLESAVE | 29APR87 | 13:25 | TAL | $OVER.T9618C00.SCVRMON |
| 00 | 005 | 003402 | 003571 | 003412 | | INITIALIZE | 29APR87 | 13:25 | TAL | $OVER.T9618C00.SCVRMON |
| 00 | 043 | 010144 | 010210 | 010144 | P | LABELTOAXADR | 12FEB87 | 12:33 | TAL | $OVER.T9618C00.SUTIL1 |
| 00 | 041 | 007711 | 010116 | 007755 | P | LOCKCODE | 12FEB87 | 12:33 | TAL | $OVER.T9618C00.SUTIL1 |
| 00 | 006 | 004544 | 005754 | 005176 | M | MAINSTREET | 29APR87 | 13:25 | TAL | $OVER.T9618C00.SCVRMON |
| 00 | 007 | 006501 | 006753 | 006501 | | OPENOBJECTFILE | 17FEB87 | 15:46 | TAL | $OVER.T9618C00.SREADOBJ |
| 00 | 013 | 007510 | 007653 | 007510 | | POSITREAD | 17FEB87 | 15:46 | TAL | $OVER.T9618C00.SREADOBJ |
| 00 | 030 | 000044 | 000212 | 000044 | PR | REPLACEBPTS | 12FEB87 | 12:33 | TAL | $OVER.T9618C00.SUTIL1 |
| 00 | 032 | 003572 | 004216 | 003620 | PV | REPLACESTATEMENTS | 29APR87 | 13:25 | TAL | $OVER.T9618C00.SCVRMON |
| 00 | 033 | 004217 | 004244 | 004217 | P | RETURNBITMAP | 29APR87 | 13:25 | TAL | $OVER.T9618C00.SCVRMON |
| 00 | 015 | 010255 | 010303 | 010255 | | RO^GET^BASE^NAME | 17FEB87 | 11:51 | TAL | $EM1.T9621C00.SHREADS |
| 00 | 034 | 004245 | 004543 | 004245 | PV | SETUPCODESTUFF | 29APR87 | 13:25 | TAL | $OVER.T9618C00.SCVRMON |
| 00 | 002 | 000213 | 000213 | 000213 | | T9618C00^15JUL87^CVRMON^29APR7 | 29APR87 | 13:25 | TAL | $OVER.T9618C00.SVERSION |

```
00  027  007654  007710  007654  PC   TESTCOVERENABLED        12FEB87  12:33 TAL     $OVER.T9618C00.SUTIL1
00  026  006432  006500  006432  PC   TESTCOVERHOOKS          12FEB87  12:33 TAL     $OVER.T9618C00.SUTIL1
00  042  010117  010143  010117  P    TOSSSEGMENT             12FEB87  12:33 TAL     $OVER.T9618C00.SUTIL1
00  037  006276  006356  006276  P    UNLOCKCODE              12FEB87  12:33 TAL     $OVER.T9618C00.SUTIL1

BASE    LIMIT   TYPE    MODE  NAME                    DATE     TIME   LANGUAGE  SOURCE FILE

000000          COMMON  WORD  #GLOBAL                 29APR87  13:25  TAL       $OVER.T9618C00.DREADOBJ
000073  002162  COMMON  WORD  .OBJECT^READING         29APR87  13:25  TAL       $OVER.T9618C00.DREADOBJ
000073          COMMON  WORD  COVERROUTINE^DEFS       29APR87  13:25  TAL       $VIOLET.TOOLSC00.ExtdecsO
000000  000072  COMMON  WORD  OBJECT^READING          29APR87  13:25  TAL       $OVER.T9618C00.DREADOBJ

SP  PEP  BASE    LIMIT   ENTRY   ATTRS  NAME                              DATE     TIME  LANGUAGE SOURCE FILE

00  030  000044  000212  000044  PR     REPLACEBPTS                       12FEB87  12:33 TAL      $OVER.T9618C00.SUTIL1
00  002  000213  000213  000213         T9618C00^15JUL87^CVRMON^29APR7    29APR87  13:25 TAL      $OVER.T9618C00.SVERSION
00  031  000214  000600  000214  P      ALLOCATEBITMAP                    29APR87  13:25 TAL      $OVER.T9618C00.SCVRMON
00  003  000601  000660  000601         COMPUTEBITMAPSIZES                29APR87  13:25 TAL      $OVER.T9618C00.SCVRMON
00  004  000661  000723  000661         FROMCOVERCOM                      29APR87  13:25 TAL      $OVER.T9618C00.SCVRMON
00  017  000724  000752  000724  PC     FROMPHOENIX                       29APR87  13:25 TAL      $OVER.T9618C00.SCVRMON
00  020  000753  000775  000753  PC     FROMSUPERPRIV                     29APR87  13:25 TAL      $OVER.T9618C00.SCVRMON
00  021  000776  001143  000776  PC     HANDLEDISABLE                     29APR87  13:25 TAL      $OVER.T9618C00.SCVRMON
00  022  001144  001306  001144  PC     HANDLEENABLE                      29APR87  13:25 TAL      $OVER.T9618C00.SCVRMON
00  023  001307  002312  001307  PC     HANDLEMEASURE                     29APR87  13:25 TAL      $OVER.T9618C00.SCVRMON
00  024  002313  002415  002313  PC     HANDLERESET                       29APR87  13:25 TAL      $OVER.T9618C00.SCVRMON
00  025  002416  003401  002712  PC     HANDLESAVE                        29APR87  13:25 TAL      $OVER.T9618C00.SCVRMON
00  005  003402  003571  003412         INITIALIZE                        29APR87  13:25 TAL      $OVER.T9618C00.SCVRMON
00  032  003572  004216  003620  PV     REPLACESTATEMENTS                 29APR87  13:25 TAL      $OVER.T9618C00.SCVRMON
00  033  004217  004244  004217  P      RETURNBITMAP                      29APR87  13:25 TAL      $OVER.T9618C00.SCVRMON
00  034  004245  004543  004245  PV     SETUPCODESTUFF                    29APR87  13:25 TAL      $OVER.T9618C00.SCVRMON
00  006  004544  005754  005176  M      MAINSTREET                        29APR87  13:25 TAL      $OVER.T9618C00.SCVRMON
00  035  005755  006035  005755  P      CRCB^EXISTS                       12FEB87  12:33 TAL      $OVER.T9618C00.SUTIL1
00  036  006036  006275  006036  P      COPYOBJECT                        12FEB87  12:33 TAL      $OVER.T9618C00.SUTIL1
00  037  006276  006356  006276  P      UNLOCKCODE                        12FEB87  12:33 TAL      $OVER.T9618C00.SUTIL1
00  040  006357  006431  006357  P      FREESEGS                          12FEB87  12:33 TAL      $OVER.T9618C00.SUTIL1
00  026  006432  006500  006432  PC     TESTCOVERHOOKS                    12FEB87  12:33 TAL      $OVER.T9618C00.SUTIL1
00  007  006501  006753  006501         OPENOBJECTFILE                    17FEB87  15:46 TAL      $OVER.T9618C00.SREADOBJ
00  010  006754  007310  006754         GETNEXTPROCEDURE                  17FEB87  15:46 TAL      $OVER.T9618C00.SREADOBJ
00  011  007311  007376  007311         GETNEXTEPT                        17FEB87  15:46 TAL      $OVER.T9618C00.SREADOBJ
00  012  007377  007507  007377         GETNEXTSTATEMENT                  17FEB87  15:46 TAL      $OVER.T9618C00.SREADOBJ
00  013  007510  007653  007510         POSITREAD                         17FEB87  15:46 TAL      $OVER.T9618C00.SREADOBJ
00  027  007654  007710  007654  PC     TESTCOVERENABLED                  12FEB87  12:33 TAL      $OVER.T9618C00.SUTIL1
00  041  007711  010116  007755  P      LOCKCODE                          12FEB87  12:33 TAL      $OVER.T9618C00.SUTIL1
00  042  010117  010143  010117  P      TOSSSEGMENT                       12FEB87  12:33 TAL      $OVER.T9618C00.SUTIL1
00  043  010144  010210  010144  P      LABELTOAXADR                      12FEB87  12:33 TAL      $OVER.T9618C00.SUTIL1
00  014  010211  010254  010211         CONVERTPITFORMAT                  17FEB87  15:46 TAL      $OVER.T9618C00.SREADOBJ
00  015  010255  010303  010255         RO^GET^BASE^NAME                  17FEB87  11:51 TAL      $EM1.T9621C00.SHREADS
00  016  010304  010431  010304         GETSOURCEORD                      17FEB87  15:46 TAL      $OVER.T9618C00.SREADOBJ

Code size = 4378 words
  PEP = 36 words
  Procedures = 4342 words
  Gap at 32K = 0 words
  XEP = 39 words
Code area size = 5 pages
Resident code size = 1 pages
```

```
BASE    LIMIT   TYPE    MODE  NAME                     DATE     TIME   LANGUAGE  SOURCE FILE

000000          COMMON  WORD  #GLOBAL                  29APR87  13:25  TAL       $OVER.T9618C00.DREADOBJ
000000  000072  COMMON  WORD  OBJECT^READING           29APR87  13:25  TAL       $OVER.T9618C00.DREADOBJ
000073          COMMON  WORD  COVERROUTINE^DEFS        29APR87  13:25  TAL       $VIOLET.TOOLSC00.Extdecs0
000073  002162  COMMON  WORD  .OBJECT^READING          29APR87  13:25  TAL       $OVER.T9618C00.DREADOBJ


BINDER - OBJECT FILE BINDER - T9621C00 - (09SEP86)   SYSTEM \PRUNE
Object file name is $OVER.T9618C00.cvrmon
Object file timestamp is 29APR87 13:25:46
Number of Binder errors = 0
Number of Binder warnings = 0
Primary data = 59 words
Secondary data = 1080 words
Code area size = 5 pages
Resident code size = 1 pages
Data area size = 5 pages
Extended data area size = 0 pages
Top of stack = 1139 words
Number of code segments  = 1 segment


The object file will only run on a TNS/II
Errorfile file name is $OVER.T9618C00.ECVRMON
Number of compiler errors =  0
Number of compiler warnings =  0
Maximum symbol table space used was = 141420 bytes
Number of source lines = 13992
Compile cpu time = 00:00:23
Total Elapsed time = 00:10:20
```

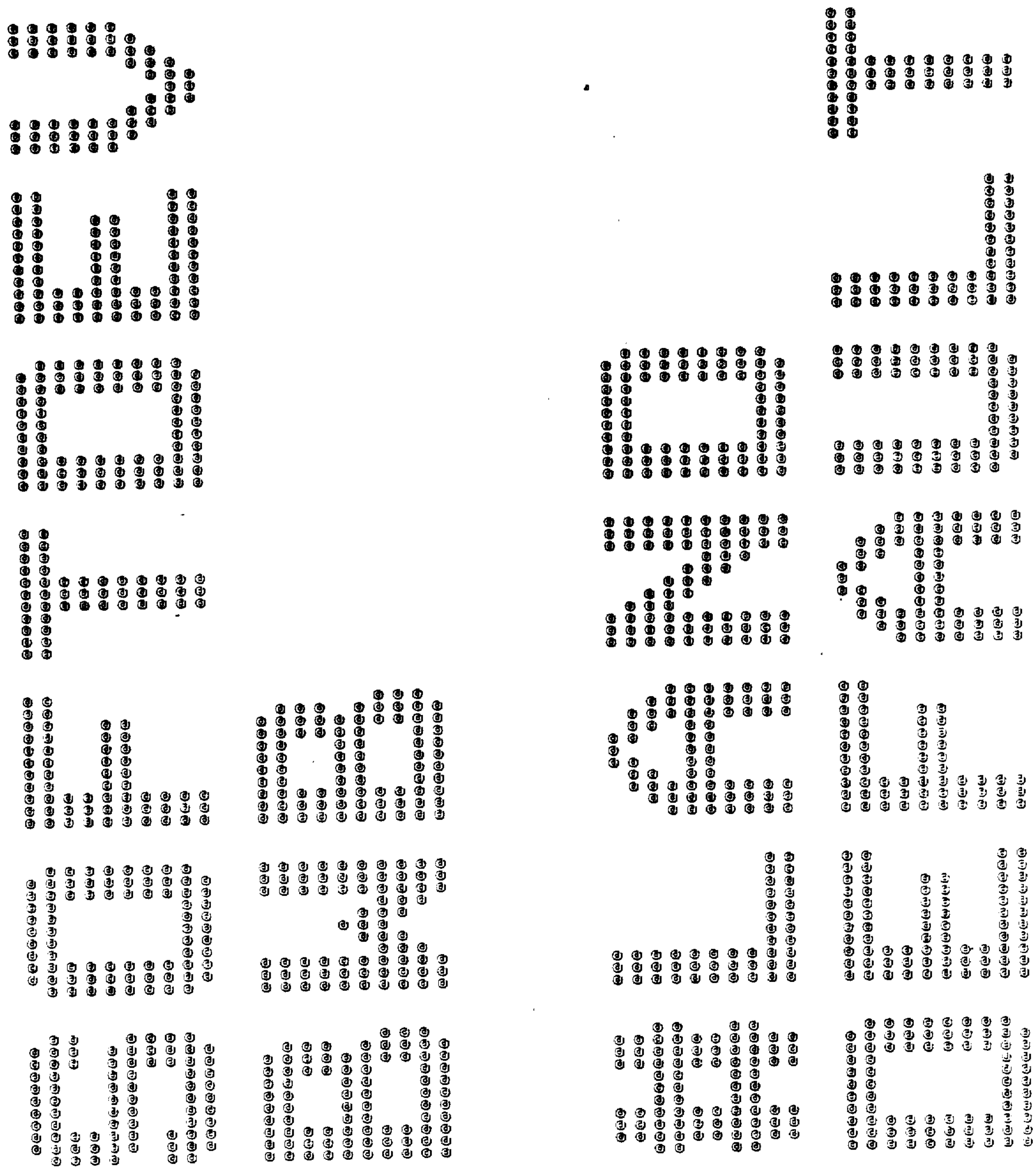

```
TAL - T9250B40 - (15SEP86)                         Source language: TAL - Target machine: Tandem NonStop II System
Date - Time :  12FEB87 - 12:30:25             Default options: On (LIST,CODE,MAP,WARN,LMAP) - Off (ICODE,INNERLIST)

                                ?ERRORFILE efprint,NOFIXUP,NOCODE, SYMBOLS, MAP, NOGMAP, LMAP(ALPHA,LOC)
    2.     000000 0  0     !
    3.     000000 0  0     ! A handy "format print" sort of procedure - FPRINT.
    4.     000000 0  0     !
    5.     000000 0  0     ! FPRINT provides a simple way for the TAL programmer to print lines using
    6.     000000 0  0     ! a predefined format which describes the lines to be printed and fields
    7.     000000 0  0     ! into which user parameters are edited.  It is described fully below.
    8.     000000 0  0     !
    9.     000000 0  0     ?NOLIST, source EXTDECS  ( FNAMECOLLAPSE )
   11.     000000 0  0     ?NOLIST, source PGP    ! ( nout..., nin... )
   13.     000000 0  0     ?SEARCH         OGP
 Search file:  $OVER.T9618C00.OGP  12FEB87 - 12:30:14
   14.     000000 0  0     !
   15.     000000 0  0     ! external declaration for procs the user will supply to fprint
   16.     000000 0  0     !
   17.     000000 0  0     INT PROC PRINT ( BUF, LEN );
   18.     000000 1  0              INT .BUF;
   19.     000000 1  0              INT  LEN;
   20.     000000 1  0
   21.     000000 1  0              EXTERNAL;

BUF                              Variable      INT            Indirect      L-004
LEN                              Variable      INT            Direct        L-003

   22.     000000 0  0
   23.     000000 0  0     PROC      ABORT;
   24.     000000 1  0              EXTERNAL;
   25.     000000 0  0     ?SOURCE  sversion( version^fprint )
 Source file:  [1]  $OVER.T9618C00.SVERSION  12FEB87 - 12:20:47
   32.     000000 0  0     ?SECTION VERSION^FPRINT
   33.     000000 0  0     PROC T9618C00^15JUL87^FPRINT^11F7;
   34.     000000 1  0     BEGIN END;
   35.     000000 0  0
   26.     000000 0  0     ?SOURCE  SFPRINT
 Source file:  [1]  $OVER.T9618C00.SFPRINT  01OCT86 - 14:21:29

    2.     000000 0  0     ?SECTION FPRINT
    3.     000000 0  0     !
    4.     000000 0  0     INT PROC !prv! FPRINTABORT ( FADR, P0, P1, P2, P3, P4, P5, P6, P7
    5.     000000 1  0                                , P8, P9, P10, P11, P12, P13, P14
    6.     000000 1  0                                ) VARIABLE;
    7.     000000 1  0       INT FADR;
    8.     000000 1  0       INT P0, P1, P2, P3, P4, P5, P6, P7, P8, P9, P10, P11, P12, P13, P14;
    9.     000000 1  0       ! an entry into fprint, below
   10.     000000 1  0       !
   11.     000000 1  0       ! when this entry point is used, a user supplied procedure named abort is
   12.     000000 1  0       ! called before returning to the user (caller).  abort must be declared:
   13.     000000 1  0       !
   14.     000000 1  0       ! PROC ABORT;
   15.     000000 1  0       FORWARD;

FADR                             Variable      INT            Direct        L-023
P0                               Variable      INT            Direct        L-022
```

```
P1                         Variable   INT        Direct      L-021
P10                        Variable   INT        Direct      L-010
P11                        Variable   INT        Direct      L-007
P12                        Variable   INT        Direct      L-006
P13                        Variable   INT        Direct      L-005
P14                        Variable   INT        Direct      L-004
P2                         Variable   INT        Direct      L-020
P3                         Variable   INT        Direct      L-017
P4                         Variable   INT        Direct      L-016
P5                         Variable   INT        Direct      L-015
P6                         Variable   INT        Direct      L-014
P7                         Variable   INT        Direct      L-013
P8                         Variable   INT        Direct      L-012
P9                         Variable   INT        Direct      L-011

000000 0  0  INT PROC !prv! FPRINT ( FADR, P0, P1, P2, P3, P4, P5, P6, P7
000000 1  0                        , P8, P9, P10, P11, P12, P13, P14
000000 1  0                        ) VARIABLE;
000000 1  0    INT FADR;
000000 1  0    INT P0, P1, P2, P3, P4, P5, P6, P7, P8, P9, P10, P11, P12, P13, P14;
000000 1  0    !
000000 1  0    ! This procedure accepts a byte address of a 'p' string (i.e. address of a
000000 1  0    ! 'p' string passed as @<name>) in FADR which contains a "format template"
000000 1  0    ! for one or more print lines which are to be passed to an externally
000000 1  0    ! supplied procedure named PRINT.  PRINT must be declared:
000000 1  0    !
000000 1  0    ! INT PROC PRINT ( BUF, LEN );
000000 1  0    !     INT .BUF, LEN;
000000 1  0    !
000000 1  0    ! When PRINT is called, BUF for LEN characters contains the print line
000000 1  0    ! derived from the template; the maximum length of a print line is 132 bytes.
000000 1  0    ! PRINT returns an error value; if the value is non-zero this procedure
000000 1  0    ! will immediately return to its caller without attempting furthur processing
000000 1  0    ! of the format.  This procedure returns the value it received from PRINT.
000000 1  0    !
000000 1  0    ! The format template may contain literal characters or editing characters.
000000 1  0    ! The format template is terminated with a null (0) character.
000000 1  0    !
000000 1  0    ! A literal is any character not defined (below) as an editing character, or
000000 1  0    ! any one character preceded by a "?" character.  Literals are simply copied
000000 1  0    ! into the print line buffer.
000000 1  0    !
000000 1  0    ! A format "field" is defined by a contiguous sequence of a particular type
000000 1  0    ! of editing character or an editing character optionally followed by an
000000 1  0    ! unsigned decimal integer.  In the former case the number of characters
000000 1  0    ! defines the format field width; in the latter the integer is taken as the
000000 1  0    ! explicit width (irrespective of the number of preceding editing
000000 1  0    ! characters).
000000 1  0    !
000000 1  0    ! As fields are encountered from left to right (ascending address) in the
000000 1  0    ! format template, the parameters P0:P14 are edited into the print line
000000 1  0    ! buffer.  There is a one to one correspondence between fields and
000000 1  0    ! parameters; P0 is edited into the first field, P1 into the second, P3 into
000000 1  0    ! the third, etc.  The parameter (P0:P14) which corresponds to a given field
000000 1  0    ! is referred to as P.
000000 1  0    !
000000 1  0    ! The editing character which composes a field defines the type of parameter
```

```
000000 1  0   ! in P and the way in which P is to be edited into the field in the print
000000 1  0   ! line.
000000 1  0   !
000000 1  0   ! A format field may have appended to it "decoration" characters which may
000000 1  0   ! furthur define P and modify the way in which P is edited into the print
000000 1  0   ! line.  A decoration character is recognized as such only when it
000000 1  0   ! immediately follows a format field (no intervening blanks, and the case -
000000 1  0   ! up/low - is significant).
000000 1  0   !
000000 1  0   ! If a format field occurs which requires a P not supplied in the call, that
000000 1  0   ! field is omitted from the print line (as if it didn't appear in the
000000 1  0   ! format).
000000 1  0   !

000000 1  0   !
000000 1  0   ! The editing characters and their effect are:
000000 1  0   !
000000 1  0   ! '... [ <width> ]  [ D | F ]  [ * | <exclam> ]
000000 1  0   !
000000 1  0   !    Data string insert.  Copy a string from 'g' into the print line.
000000 1  0   !    String may end with a null.
000000 1  0   !    Where:
000000 1  0   !
000000 1  0   !       D           P has int    address of internal form device name
000000 1  0   !       F           P has int    address of internal form file   name
000000 1  0   !       otherwise   P has string address of array to copy
000000 1  0   !
000000 1  0   !       <width>     explicit field width
000000 1  0   !       *           copy until end of string (or print line)
000000 1  0   !                   width is string length (regardless of format width)
000000 1  0   !       <exclam>    copy until end of format or end of string
000000 1  0   !                   width is minimum of format width and string length
000000 1  0   !       otherwise   copy until end of format or end of string
000000 1  0   !                   width is format width; blank fill on right if string
000000 1  0   !                   length is less than format width
000000 1  0   !
000000 1  0   !    If "D" or "F" appears, the internal form name at the address P is
000000 1  0   !    converted to external form in a local buffer; that buffer is then
000000 1  0   !    used as the string to be edited into the field.
000000 1  0   !
000000 1  0   ! '... [ <width> ]  [ * | <exclam> ]
000000 1  0   !
000000 1  0   !    Code string insert.  Copy a 'p' string into the print line.
000000 1  0   !    String may end with a null or "^".
000000 1  0   !    Where:
000000 1  0   !
000000 1  0   !       <width>     explicit field width
000000 1  0   !       *           copy until end of string (or print line)
000000 1  0   !                   width is string length (regardless of format width)
000000 1  0   !       <exclam>    copy until end of format or end of string
000000 1  0   !                   width is minimum of format width and string length
000000 1  0   !       otherwise   copy until end of format or end of string
000000 1  0   !                   width is format width; blank fill on right if string
000000 1  0   !                   length is less than format width
000000 1  0   !
000000 1  0   !    P contains the string address of the 'p' array to be copied.
000000 1  0   !
```

```
000000 1  0    !
000000 1  0    ! ( #...            )  [ <width> ]  [ D | F ]  [ Z | * | <exclam> ]
000000 1  0    ! ( &...            )
000000 1  0    ! ( %... [ B | H ] )
000000 1  0    !
000000 1  0    !   Numeric conversion.  P describes a binary value to be converted to
000000 1  0    !   ASCII and edited into the print line.  If the value cannot be
000000 1  0    !   represented in the indicated field width, the field is filled with
000000 1  0    !   "*" characters.
000000 1  0    !   Where:
000000 1  0    !
000000 1  0    !      #...    signed decimal   conversion
000000 1  0    !      &...    unsigned decimal conversion
000000 1  0    !      %...    octal            conversion
000000 1  0    !      %...B   binary           conversion
000000 1  0    !      %...H   hexadecimal      conversion
000000 1  0    !
000000 1  0    !      <width>    explicit field width
000000 1  0    !      D          P contains the address of a 32 bit value
000000 1  0    !      F          P contains the address of a 64 bit value
000000 1  0    !      otherwise  P contains the              16 bit value
000000 1  0    !
000000 1  0    !      Z          suppress leading zeros (blank fill on left)
000000 1  0    !                 width is format width
000000 1  0    !      *          width is number of significant chars of P value
000000 1  0    !                 (regardless of format width)
000000 1  0    !      <exclam>   width is minimum of format width and significant chars
000000 1  0    !                 of P value
000000 1  0    !      otherwise  width is format width
000000 1  0    !
000000 1  0    ! ? <any character>
000000 1  0    !
000000 1  0    !  Unconditionally copy <any character> into the print line.
000000 1  0    !
000000 1  0    !  This is an escape character to allow editing characters to be inserted as
000000 1  0    !  literals into the print line.
000000 1  0    !
000000 1  0    ! ^
000000 1  0    !
000000 1  0    !   End of print line; call PRINT to print the current line.
000000 1  0    !
000000 1  0    !   This is used to separate lines in a multi-line format.
000000 1  0    !   If more than one of these characters occurs with no intervening
000000 1  0    !   characters, empty print lines will be generated (i.e.  PRINT called with
000000 1  0    !   a LEN of 0).
000000 1  0    !

000000 1  0    ! \ <column>
000000 1  0    !
000000 1  0    !  Tab to the specified column in the print line.
000000 1  0    !
000000 1  0    ! $ [ $ ]
000000 1  0    !
000000 1  0    !  Insert 1 or 2 ascii characters from the value in P into the print line.
000000 1  0    !  If 1 character is to be inserted it is taken from the low order bits
000000 1  0    !  of P.
000000 1  0    !
```

```
000000 1  0     !
000000 1  0     ! When a print line is finished, either by exhausting the format template
000000 1  0     ! or by the occurrance of the "^" editing character, PRINT is called.
000000 1  0     !
000000 1  0     ! If the entry FPRINTABORT is used, then before returning to our caller a
000000 1  0     ! procedure named ABORT will be called.  This procedure must be supplied by
000000 1  0     ! the user; it is un-typed and has no parameters.
000000 1  0     !
000000 1  0     ! Return Values
000000 1  0     !
000000 1  0     !    <  -1    Required parameter missing
000000 1  0     !    =   0    Format processed and all print lines passed to PRINT
000000 1  0     !    >        Error value returned by PRINT
000000 1  0     !
000000 1  0     ! Example:
000000 1  0     !
000000 1  0     !   int proc print (.buf, len ); int .buf, len;
000000 1  0     !     begin
000000 1  0     !     return if check^break then 111 else write^file ( listfile, buf, len );
000000 1  0     !     end;
000000 1  0     !   proc example; !! note:  double "!!"'s below should really be single
000000 1  0     !     begin
000000 1  0     !     string msg = 'p' := [ "?'EXAMPLE?' procedure^"
000000 1  0     !                         , "File  'F*^"
000000 1  0     !                         , "Type  $ (#)^"
000000 1  0     !                         , "Ext   (#*, #*)^"
000000 1  0     !                         , "Block #5Z^"
000000 1  0     !                         , "Rec   #5^"
000000 1  0     !                         , "EOF   ##D!!^"
000000 1  0     !                         , "Time  '*"
000000 1  0     !                         , 0
000000 1  0     !                         ];
000000 1  0     !     int     fname [ 0:11 ] := ["$system system  sludge  "];
000000 1  0     !     string  types = 'p' := ["UREK"];
000000 1  0     !     int     type := 3, ext1 := 12, ext2 := 400, block := 2048, rec := 80;
000000 1  0     !     int(32) eof := 123D;
000000 1  0     !     string  time [0:79] := ["01 JUN 82, 07:30",0];
000000 1  0     !
000000 1  0     !     ...call fprint ( @msg, @fname, types[type], type, ext1, ext2,
000000 1  0     !                      block, rec, @eof, @time );
000000 1  0     !     end;
000000 1  0     !
000000 1  0     !   The program uses SIO to write a message which would look like:
000000 1  0     !
000000 1  0     !      'EXAMPLE' procedure
000000 1  0     !      File  $system.system.sludge
000000 1  0     !      Type  K (3)
000000 1  0     !      EXT   (12, 400)
000000 1  0     !      BLOCK  2048
000000 1  0     !      REC   00080
000000 1  0     !      EOF   **
000000 1  0     !      Time  01 JUN 82, 07:30
000000 1  0     !
```

```
000000 1  0   BEGIN
000000 1  1   ENTRY       FPRINTABORT;            ! entry to abort when finished
000000 1  1   INT         FATE := 1;              ! what to do when finished: 0=return 1=abort
000000 1  1   DEFINE      EXIT ( X ) =            ! how to finish
000000 1  1               BEGIN
000000 1  1               STACK ( X );
000000 1  1               IF FATE THEN CALL ABORT;
000000 1  1               RETURN;
000000 1  1               END#;
000000 1  1   DEFINE      FIRSTP = P0#;           ! first format parameter
000000 1  1   DEFINE      LASTP = P14#;           ! last format parameter
000000 1  1   INT         MASK = 'L' '-' 3;       ! tal parameter mask
000000 1  1   DEFINE      PEXISTS ( P ) =         ! return whether a format param is supplied
000000 1  1               ( @P '>=' @FIRSTP AND MASK LAND 1 '<<' ( @LASTP '-' @P ) )#;
000000 1  1   STRING      GS = 'G';
000000 1  1   INT         G  = 'G';
000000 1  1   INT         .P := @P0;              ! p parameter pointer
000000 1  1   INT         .PNEXT;                 ! points to next p
000000 1  1   INT         .PADR;                  ! for getting p reference params
000000 1  1   INT ( 32 )  .PADR32 = PADR;         ! for getting 32 bit P reference parameters
000000 1  1   FIXED       .PADR64 = PADR;         ! "   "      64 "   " "          "
000000 1  1   INT         ERROR;                  ! error return from print
000000 1  1   STRUCT      .BUF;                   ! print line buffer
000000 1  1               BEGIN
000000 1  2               INT    WORD [ 0:-1 ];
000000 1  2               STRING BYTE [ 0:131 ];
000000 1  2               END;
000000 1  1   STRING      .BUFP := @BUF.BYTE;     ! buf pointer, for building print line
000000 1  1   INT         F;                      ! current format character
000000 1  1   INT         FW;                     ! format field width
000000 1  1   LITERAL     FWB^ALEN = 3;           !
000000 1  1   STRING      FWB [ 0:FWB^ALEN ];     ! buffer for explicit field width
000000 1  1   INT         FWBI;                   ! index into same
000000 1  1   INT         D;                      ! format field decorations
000000 1  1   DEFINE      DTYPE   = D.<14:15>#;   !   numeric type 0,1,2 = int, int(32), fixed
000000 1  1                                       !   '        type 0,1,2 = plain, device, file
000000 1  1   DEFINE      DZ      = D.<13>#;      !   leading zero suppress numeric field
000000 1  1   DEFINE      DNOFILL = D.<11:12>#;   !   don't blank fill string field
000000 1  1   DEFINE      DSTAR   = D.<11>#;      !   field length is string length
000000 1  1   DEFINE      DEXCLAM = D.<12>#;      !   field length is min of string and field
000000 1  1   INT         BASE;                   ! base of numeric conversion
000000 1  1   STRING      .PS = 'P' := 0;         ! handy self pointer for 'p' access
000001 1  1   INT         ^FADR := FADR '-' @PS;! format address relative to self pointer
000001 1  1   INT         ^FADRNEXT;              ! next value for ^fadr after current field
000001 1  1   DEFINE      TRAPSOFF  =             ! disable local arithmetic traps
000001 1  1               CODE ( RDE; ANRI %577; SETE )#;
000001 1  1   DEFINE      INC ( X ) = X := X + 1#;
000001 1  1   DEFINE      DEC ( X ) = X := X - 1#;
000001 1  1   STRING      .XNAME [ 0:35 ];        ! external form file name
000001 1  1   INT         .INAME [ 0:11 ];        ! internal form file name
000001 1  1
000001 1  1   FATE := 0;
000034 1  1   FPRINTABORT;
000036 1  1   TRAPSOFF;                           ! disable overflow for signed arithmetic
000041 1  1   BUF ':=' "  " & BUF FOR ( ( $LEN ( BUF ) + 1 ) >> 1 );
000052 1  1
000052 1  1   ! we use index regs because we expect that moving literal chars will
```

```
000052 1  1    ! account for most of our work and reg use speeds this up significantly
000052 1  1     USE F^;                            ! (r7) pick up index regs, initialize below
000052 1  1     USE ^FADR^;                        ! (r6)
000052 1  1     USE BUFP^;                         ! (r5)
000052 1  1
000052 1  1     WHILE ( F^ := F := PS [ ^FADR^ := ^FADR ] ) DO
000057 1  1       BEGIN
000057 1  2       ! process the format until we hit the end
000057 1  2
000057 1  2       ! process literal chars
000057 1  2       BUFP^ := @BUFP;
000061 1  2       WHILE (    F^
000061 1  2             AND F^ <> "'" AND F^ <> "`"
000061 1  2             AND F^ <> "#" AND F^ <> "&" AND F^ <> "%"
000061 1  2             AND F^ <> "$"
000061 1  2             ) DO
000105 1  2         ! process literal chars and edit chars that don't use a 'p'
000105 1  2         BEGIN
000105 1  3         IF F^ = "^" THEN        ! print the line
000110 1  3           BEGIN
000110 1  4           GS [ BUFP^ ] := "^"; ! this lets print know theres more to come
000112 1  4           IF ( ERROR := PRINT ( BUF, BUFP^ '-' @BUF.BYTE ) ) THEN
000124 1  4             EXIT ( ERROR );
000134 1  4           BUFP^ := @BUF.BYTE;
000137 1  4           BUF ':=' "  " & BUF FOR ( ( $LEN ( BUF ) + 1 ) >> 1 );
000150 1  4           INC ( ^FADR^ );
000151 1  4           END
000151 1  3         ELSE IF F^ = "\" THEN  ! tab
000156 1  3           BEGIN
000156 1  4           FW := 0;
000160 1  4           WHILE $NUMERIC ( F^ := PS [ INC ( ^FADR^ ) ] ) DO
000165 1  4             FW :=  $INT ( FW '*' 10 ) + ( F^ - "0" );
000176 1  4           BUFP^ := @BUF.BYTE [ FW ];
000203 1  4           END
000203 1  3         ELSE                     ! move literal from format to print line
000204 1  3           BEGIN
000204 1  4           IF F^ = "?" THEN INC ( ^FADR^ );
000210 1  4           GS [ BUFP^ ] := PS [ ^FADR^ ];
000212 1  4           INC ( BUFP^ );
000213 1  4           INC ( ^FADR^ );
000214 1  4           END;
000214 1  3         F^ := PS [ ^FADR^ ];
000216 1  3         END;
000220 1  2
000220 1  2       ! save off index regs and drop them
000220 1  2       F := F^;            DROP F^;
000222 1  2       ^FADR := ^FADR^;    DROP ^FADR^;
000224 1  2       @BUFP := BUFP^;     DROP BUFP^;
000226 1  2
000226 1  2       ! if hit end of format while moving literals, print the line and exit
000226 1  2       IF NOT F THEN EXIT ( PRINT ( BUF, @BUFP '-' @BUF.BYTE ) );
000245 1  2
000245 1  2       ! find size of format field and point to next format char
000245 1  2       USE ^FADRNEXT^;
000245 1  2       IF F = "$" THEN
000250 1  2         ^FADRNEXT^ := ^FADR + ( FW := IF PS [ ^FADR + 1 ] = "$" THEN 2 ELSE 1 )
000250 1  2       ELSE
```

```
000270 1  2        BEGIN
000270 1  3        USE F^;
000270 1  3        SCAN PS [ ^FADR ] WHILE F -> ^FADRNEXT^;
000302 1  3        ^FADRNEXT^ := ^FADRNEXT^ - @PS;
000310 1  3        IF $NUMERIC ( F^ := PS [ ^FADRNEXT^ ] ) THEN
000314 1  3          BEGIN                                     ! explicit width
000314 1  4          FW := 0;
000316 1  4          DO    FW :=  $INT ( FW '*' 10 ) + ( F^ - "0" )
000316 1  4          UNTIL NOT $NUMERIC ( F^ := PS [ INC ( ^FADRNEXT^ ) ] );
000333 1  4          END
000333 1  3        ELSE
000334 1  3          FW := ^FADRNEXT^ - ^FADR;
000340 1  3        DROP F^;
000340 1  3        ^FADRNEXT := ^FADRNEXT^;
000342 1  3        END;
000342 1  2      @PNEXT := @P [ 1 ];
000345 1  2
000345 1  2      ! scan off any decorations
000345 1  2      D := BASE := 0;                             ! no decorations yet
000350 1  2      IF F = "%" THEN
000353 1  2        BEGIN                                     ! octal, binary, or hex
000353 1  3        IF ( BASE := IF   PS [ ^FADRNEXT^ ] = "B" THEN 2
000353 1  3                    ELSE IF PS [ ^FADRNEXT^ ] = "H" THEN 16 ELSE 8
000353 1  3           ) <> 8 THEN INC ( ^FADRNEXT^ );        ! binary or hex specified
000372 1  3        END
000372 1  2      ELSE                                        ! decimal base or not numeric
000373 1  2        IF      F = "#" THEN BASE := -10          ! unsigned decimal
000376 1  2        ELSE IF F = "&" THEN BASE := 10;          !   signed decimal
000406 1  2
000406 1  2      IF ( BASE OR F = "'" ) AND                  ! numeric or data string
000406 1  2         ( DTYPE := IF      PS [ ^FADRNEXT^ ] = "F" THEN 2
000406 1  2                   ELSE IF PS [ ^FADRNEXT^ ] = "D" THEN 1 ELSE 0
000406 1  2         ) THEN
000434 1  2         BEGIN
000434 1  3         @PADR := P;                              ! parm is by reference if numeric
000436 1  3         INC ( ^FADRNEXT^ );
000437 1  3         END;
000437 1  2
000437 1  2      IF ( BASE AND ( DZ := PS [ ^FADRNEXT^ ] = "Z" ) ) OR
000437 1  2         ( DEXCLAM := PS [ ^FADRNEXT^ ] = "!" ) OR
000437 1  2         ( DSTAR   := PS [ ^FADRNEXT^ ] = "*" ) THEN
000505 1  2         INC ( ^FADRNEXT^ );                      ! numeric or data/code string
000506 1  2
000506 1  2      IF DSTAR THEN                               ! P defines max width
000511 1  2        FW := @BUF [ 1 ].BYTE '-' @BUFP;          ! limit it to length left in buf
000517 1  2
000517 1  2      ^FADRNEXT := ^FADRNEXT^;
000521 1  2      DROP ^FADRNEXT^;
000521 1  2
000521 1  2      ! now have field and decorations, if the parm is supplied process it
000521 1  2      IF PEXISTS ( P ) THEN
000535 1  2        BEGIN                                  ! process field parm
000535 1  3
000535 1  3        IF F = "'" THEN
000540 1  3          BEGIN                                ! insert (data) string
000540 1  4          IF DTYPE THEN
000543 1  4            BEGIN                              ! internal form dev or file name
```

```
000543 1 5       IF DTYPE = 1 THEN
000547 1 5         BEGIN                                 ! dev name
000547 1 6         INAME ':=' G [ P ] FOR 4 & [ 8 * [ "  " ] ];
000561 1 6         P := @INAME;
000563 1 6         END;
000563 1 5       XNAME [ FNAMECOLLAPSE ( G [ P ], XNAME ) ] := 0;
000573 1 5       P := @XNAME;
000575 1 5       END;
000575 1 4
000575 1 4     USE FW^;     FW^ := FW;                   ! pick up and initialize index regs
000576 1 4     USE P^;      P^ := P;
000577 1 4     USE BUFP^;   BUFP^ := @BUFP;
000601 1 4
000601 1 4     WHILE FW^ AND GS [ P^ ] DO
000605 1 4       BEGIN                                   ! move chars from parm to print field
000605 1 5       GS [ BUFP^ ] := GS [ P^ ];
000607 1 5       INC ( P^ );
000610 1 5       INC ( BUFP^ );
000611 1 5       DEC ( FW^ );
000612 1 5       END;
000614 1 4
000614 1 4     IF NOT DNOFILL THEN                       ! blank fill the print field
000620 1 4       WHILE FW^ DO
000622 1 4         BEGIN
000622 1 5         GS [ BUFP^ ] := " ";
000624 1 5         INC ( BUFP^ );
000625 1 5         DEC ( FW^ );
000626 1 5         END;
000627 1 4
000627 1 4     @BUFP := BUFP^;  DROP BUFP^;              ! save off and drop index regs.
000631 1 4                      DROP P^;
000631 1 4                      DROP FW^;
000631 1 4     END
000631 1 3   ELSE IF f = "`" THEN
000635 1 3     BEGIN                                     ! insert 'p' string
000635 1 4     USE FW^;    FW^ := FW;                    ! pick up and initialize index regs
000636 1 4     USE P^;     P^ := P '-' @PS;
000646 1 4     USE BUFP^; BUFP^ := @BUFP;
000650 1 4
000650 1 4     WHILE FW^ AND PS [ P^ ] AND PS [ P^ ] <> "^" DO
000657 1 4       BEGIN                                   ! move chars from parm to print field
000657 1 5       GS [ BUFP^ ] := PS [ P^ ];
000661 1 5       INC ( BUFP^ );
000662 1 5       INC ( P^ );
000663 1 5       DEC ( FW^ );
000664 1 5       END;
000666 1 4
000666 1 4     IF NOT DNOFILL THEN                       ! blank fill the print field
000672 1 4       WHILE FW^ DO
000674 1 4         BEGIN
000674 1 5         GS [ BUFP^ ] := " ";
000676 1 5         INC ( BUFP^ );
000677 1 5         DEC ( FW^ );
000700 1 5         END;
000701 1 4
000701 1 4     @BUFP := BUFP^;  DROP BUFP^;              ! save off and drop index regs
000703 1 4                      DROP P^;
```

```
000703 1  4                          DROP FWA^;
000703 1  4        END ! F = "`"
000703 1  3      ELSE IF F = "$" THEN
000707 1  3        BEGIN                              ! ascii chars, by value
000707 1  4        IF FW > 1 THEN
000712 1  4          BEGIN
000712 1  5          IF ( BUFP := P.<0:7> ) < " " OR BUFP > "~" THEN BUFP := ".";
000727 1  5          @BUFP := @BUFP [ 1 ];
000732 1  5          END;
000732 1  4        IF ( BUFP := P ) < " " OR BUFP > "~" THEN BUFP := ".";
000744 1  4        @BUFP := @BUFP [ 1 ];
000747 1  4        END ! F = "$"
000747 1  3      ELSE ! if f = "#" or f = "&" or f = "%" then !
000750 1  3        BEGIN                              ! numeric conversion
000750 1  4        IF DZ THEN FW := - FW;
000756 1  4        @BUFP := @BUFP [ CASE DTYPE OF
000756 1  4                           BEGIN
000756 1  5                           IF DNOFILL THEN NOUTM    ( BUFP, P     , BASE, FW )
000756 1  5                                      ELSE NOUT     ( BUFP, P     , BASE, FW );
000756 1  5                           IF DNOFILL THEN NOUT32M  ( BUFP, PADR32, BASE, FW )
000756 1  5                                      ELSE NOUT32   ( BUFP, PADR32, BASE, FW );
000756 1  5                           IF DNOFILL THEN NOUT64M  ( BUFP, PADR64, BASE, FW )
000756 1  5                                      ELSE NOUT64   ( BUFP, PADR64, BASE, FW );
000756 1  5                           END
000756 1  4                        ];
001103 1  4
001103 1  4        END;
001103 1  3      END;                                 ! end of field parm processing
001103 1  2
001103 1  2    ^FADR := ^FADRNEXT;                    ! point to format char after field
001105 1  2    @P := @PNEXT;                          ! and next parm
001107 1  2
001107 1  2    END;                                   ! end of format processing while loop
001111 1  1
001111 1  1  EXIT ( PRINT ( BUF, @BUFP '-' @BUF.BYTE ) );
001126 1  1
001126 1  1  END; ! proc fprint

BASE                  Variable      INT        Direct      L+016
BUF                   Variable,204  STRUCT     Indirect    L+006
  1 WORD                   0,2      INT        Direct
  1 BYTE[0:131]            0,1      STRING     Direct
BUFP                  Variable      STRING     Indirect    L+007
D                     Variable      INT        Direct      L+015
DEC                   Define                    $1 :=  $1 - 1
DEXCLAM               Define                   D.<12>
DNOFILL               Define                   D.<11:12>
DSTAR                 Define                   D.<11>
DTYPE                 Define                   D.<14:15>
DZ                    Define                   D.<13>
ERROR                 Variable      INT        Direct      L+005
EXIT                  Define                    BEGIN STACK (  $1 ); IF FATE THEN CALL ABORT; RETURN; END
F                     Variable      INT        Direct      L+010
FADR                  Variable      INT        Direct      L-023
FATE                  Variable      INT        Direct      L+001
FIRSTP                Define                   P0
FPRINTABORT           Entry         INT        %000035
```

```
FW              Variable   INT          Direct      L+011
FWB             Variable   STRING       Direct      L+012
FWBI            Variable   INT          Direct      L+014
FWB^ALEN        Literal    INT          %000003
G               Variable   INT          Direct      G+000
GS              Variable   STRING       Direct      G+000
INAME           Variable   INT          Indirect    L+022
INC             Define                   $1 :=  $1 + 1
LASTP           Define                  P14
MASK            Variable   INT          Direct      L-003
P               Variable   INT          Indirect    L+002
P0              Variable   INT          Direct      L-022
P1              Variable   INT          Direct      L-021
P10             Variable   INT          Direct      L-010
P11             Variable   INT          Direct      L-007
P12             Variable   INT          Direct      L-006
P13             Variable   INT          Direct      L-005
P14             Variable   INT          Direct      L-004
P2              Variable   INT          Direct      L-020
P3              Variable   INT          Direct      L-017
P4              Variable   INT          Direct      L-016
P5              Variable   INT          Direct      L-015
P6              Variable   INT          Direct      L-014
P7              Variable   INT          Direct      L-013
P8              Variable   INT          Direct      L-012
P9              Variable   INT          Direct      L-011
PADR            Variable   INT          Indirect    L+004
PADR32          Variable   INT (32)     Indirect    L+004
PADR64          Variable   FIXED (0)    Indirect    L+004
PEXISTS         Define                   ( @ $1 '>=' @FIRSTP AND MASK LAND J '<<' ( @LASTP '-' @ $1
PNEXT           Variable   INT          Indirect    L+003
PS              Variable   STRING       Indirect    P+000
TRAPSOFF        Define                   CODE ( RDE; ANRI %577; SETE )
XNAME           Variable   STRING       Indirect    L+021
^FADR           Variable   INT          Direct      L+017
^FADRNEXT       Variable   INT          Direct      L+020

    27.      000000 0  0    ?NOMAP


ENTRY POINT MAP BY NAME

SP  PEP  BASE    LIMIT   ENTRY   ATTRS  NAME                            DATE     TIME  LANGUAGE SOURCE FILE

00  003  000014  001153  000045  V      FPRINT                          12FEB87  12:30 TAL      $OVER.T9618C00.SFPRINT
00  004  000014  001153  000051  EV     FPRINTABORT                     12FEB87  12:30 TAL      $OVER.T9618C00.SFPRINT
00  005  001154  001220  001160  V      NOUT                            12FEB87  12:29 TAL      $OVER.T9618C00.SGP
00  007  001221  001264  001225  V      NOUT32                          12FEB87  12:29 TAL      $OVER.T9618C00.SGP
00  010  001221  001264  001231  EV     NOUT32M                         12FEB87  12:29 TAL      $OVER.T9618C00.SGP
00  011  001265  001650  001350  V      NOUT64                          12FEB87  12:29 TAL      $OVER.T9618C00.SGP
00  012  001265  001650  001360  EV     NOUT64M                         12FEB87  12:29 TAL      $OVER.T9618C00.SGP
00  006  001154  001220  001164  EV     NOUTM                           12FEB87  12:29 TAL      $OVER.T9618C00.SGP
00  002  000013  000013  000013         T9618C00^15JUL87^FPRINT^11F7    12FEB87  12:30 TAL      $OVER.T9618C00.SVERSION
00  002  000013  000013  000013         T9618C00^15JUL87^FPRINT^11F7    12FEB87  12:30 TAL      $OVER.T9618C00.SVERSION
00  003  000014  001153  000045  V      FPRINT                          12FEB87  12:30 TAL      $OVER.T9618C00.SFPRINT
00  004  000014  001153  000051  EV     FPRINTABORT                     12FEB87  12:30 TAL      $OVER.T9618C00.SFPRINT
00  005  001154  001220  001160  V      NOUT                            12FEB87  12:29 TAL      $OVER.T9618C00.SGP
```

```
00  006  001154  001220  001164  EV      NOUTM                  12FEB87  12:29 TAL    $OVER.T9618C00.SGP
00  007  001221  001264  001225  V       NOUT32                 12FEB87  12:29 TAL    $OVER.T9618C00.SGP
00  010  001221  001264  001231  EV      NOUT32M                12FEB87  12:29 TAL    $OVER.T9618C00.SGP
00  011  001265  001650  001350  V       NOUT64                 12FEB87  12:29 TAL    $OVER.T9618C00.SGP
00  012  001265  001650  001360  EV      NOUT64M                12FEB87  12:29 TAL    $OVER.T9618C00.SGP

Code size = 937 words
  PEP = 11 words
  Procedures = 926 words
  Gap at 32K = 0 words
  XEP = 3 words
Code area size = 1 pages
Resident code size = 0 pages


BINDER - OBJECT FILE BINDER - T9621C00 - (09SEP86)   SYSTEM \PRUNE
Object file name is $OVER.T9618C00.ofprint
Object file timestamp is 12FEB87 12:30:25
Number of Binder errors = 0
Number of Binder warnings = 0
Code area size = 1 pages
Resident code size = 0 pages
Data area size = 1 pages
Extended data area size = 0 pages
Top of stack = 0 words
Number of code segments  = 1 segment


The object file will run on a TNS/II, but may not run on a TNS
Errorfile file name is $OVER.T9618C00.EFPRINT
Number of compiler errors =  0
Number of compiler warnings =  0
Maximum symbol table space used was = 24486 bytes
Number of source lines = 1643
Compile cpu time = 00:00:02
Total Elapsed time = 00:00:26
```

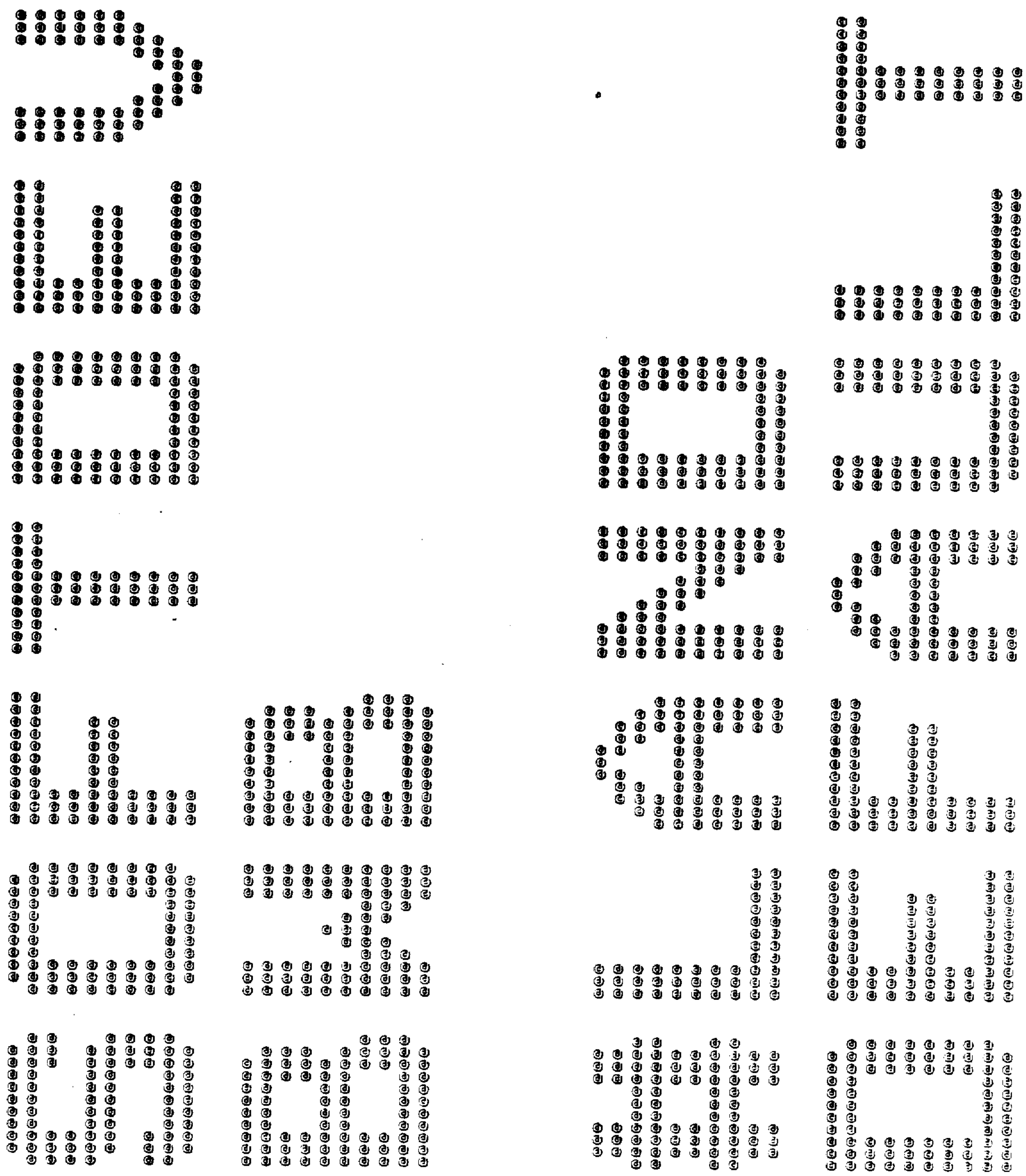

```
                                 ?ERRORFILE eglobal,SAVEGLOBALS ggloba1,NOCODE,NOFIXUP
     2.      000000 0   0   NAME      COVERCOM^DECLARATIONS;
     3.      000000 0   0   ?SOURCE copytal                    !Copyright notice
Source file:  [1]   $VIOLET.TOOLSCOO.COPYTAL   22APR87 - 16:33:11
     1.      000000 0   0   ! +------------------------------------------------------------------+
     2.      000000 0   0   ! |                                                                    |
     3.      000000 0   0   ! |  Copyright (C) 1987 by TANDEM COMPUTERS INCORPORATED               |
     4.      000000 0   0   ! |                                                                    |
     5.      000000 0   0   ! |  Protected as an unpublished work.                                 |
     6.      000000 0   0   ! |                                                                    |
     7.      000000 0   0   ! |  The computer program listings and specifications herein are      |
     8.      000000 0   0   ! |  the property of TANDEM COMPUTERS INCORPORATED and shall not be    |
     9.      000000 0   0   ! |  reproduced, copied, or used, in whole or in part, for any         |
    10.      000000 0   0   ! |  reason without the written permission of TANDEM COMPUTERS        |
    11.      000000 0   0   ! |  INCORPORATED.                                                     |
    12.      000000 0   0   ! |                                                                    |
    13.      000000 0   0   ! |  The following are trademarks or service marks of TANDEM          |
    14.      000000 0   0   ! |  COMPUTERS INCORPORATED:                                           |
    15.      000000 0   0   ! |                                                                    |
    16.      000000 0   0   ! |  6AX            BINDER          CROSSREF        DDL                |
    17.      000000 0   0   ! |  ENABLE         ENCOMPASS       ENCORE          ENFORM             |
    18.      000000 0   0   ! |  ENSCRIBE       ENVOY           ENVOYACP/XF     EXCHANGE           |
    19.      000000 0   0   ! |  EXPAND         FASTSORT        FAXLINK         FOX                |
    20.      000000 0   0   ! |  FOXII          GUARDIAN        GUARDIAN 90     GUARDIAN 90XF      |
    21.      000000 0   0   ! |  INSIGHT        INSPECT         LASER-LX        LXN                |
    22.      000000 0   0   ! |  MEASURE        MULTILAN        NetBatch        NonStop            |
    23.      000000 0   0   ! |  NonStop 1+     NonStop CLX     NonStop EXT     NonStop EXT10      |
    24.      000000 0   0   ! |  NonStop EXT25  NonStop II      NonStop SQL     NonStop TXP        |
    25.      000000 0   0   ! |  NonStop VLX    PATHMAKER       PC LINK         PCFORMAT           |
    26.      000000 0   0   ! |  PERUSE         PS MAIL         PS TEXT EDIT    PS TEXT FORMAT     |
    27.      000000 0   0   ! |  RDF            SAFE            SAFEGUARD       SAFE-T-NET         |
    28.      000000 0   0   ! |  T-TEXT         TACL            TAL             Tandem             |
    29.      000000 0   0   ! |  TGAL           THL             TIL             TMF                |
    30.      000000 0   0   ! |  TRANSFER       VIEWPOINT       WORDLINK        XLB                |
    31.      000000 0   0   ! |  XRAY                                                              |
    32.      000000 0   0   ! |                                                                    |
    33.      000000 0   0   ! +------------------------------------------------------------------+
    34.      000000 0   0   ! |  HYPERchannel is a trademark of Network Systems Corporation.       |
    35.      000000 0   0   ! |                                                                    |
    36.      000000 0   0   ! |  IBM is a registered trademark of International Business Machines |
    37.      000000 0   0   ! |  Corporation.                                                      |
    38.      000000 0   0   ! |                                                                    |
    39.      000000 0   0   ! |  Textpack4, Textpack6, IBM Displaywriter, DisplayWrite 2,          |
    40.      000000 0   0   ! |  DisplayWrite 3, Displaywriter communication software, and CICS   |
    41.      000000 0   0   ! |  are trademarks of International Business Machines Corporation.   |
    42.      000000 0   0   ! |                                                                    |
    43.      000000 0   0   ! |  INFOSAT is a trademark in which both Tandem and American         |
    44.      000000 0   0   ! |  Satellite have rights.                                            |
    45.      000000 0   0   ! |                                                                    |
    46.      000000 0   0   ! |  LATTICE is a registered trademark of Lattice, Inc.               |
    47.      000000 0   0   ! |                                                                    |
    48.      000000 0   0   ! |  MultiMate is a trademark of Ashton-Tate, Inc.                    |
    49.      000000 0   0   ! |                                                                    |
```

```
  50.     000000 0  0   ! |  UNIX is a trademark of AT&T.                                      |
  51.     000000 0  0   ! |                                                                    |
  52.     000000 0  0   ! |  Wang OIS workstation, Wang VS workstation, Wang OIS telecommu-    |
  53.     000000 0  0   ! |  nication software, and Wang VS telecommunication software are     |
  54.     000000 0  0   ! |  trademarks of Wang, Inc.                                          |
  55.     000000 0  0   ! +--------------------------------------------------------------------+
  56.     000000 0  0   ! |  TANDEM COMPUTERS INCORPORATED -- PROPRIETARY AND CONFIDENTIAL     |
  57.     000000 0  0   ! +--------------------------------------------------------------------+
   4.     000000 0  0
   5.     000000 0  0   ?NOPRINTSYM
   6.     000000 0  0   ?NOSYMBOLS

   8.      000000 0  0   ?        SOURCE dsgaddr  ( global )
Source file:  [1]  $IMT.T9050C00.DSGADDR  24OCT86 - 13:23:37
 1002.     000000 0  0   ?SECTION GLOBAL
 1003.     000000 0  0   LITERAL                                                                          !B00,RWC#9
 1004.     000000 0  0      CPU^SGADDR                 = %000,                                           !B00,RWC#9
 1005.     000000 0  0      NCPU^SGADDR                = %001,                                           !B00,RWC#9
 1006.     000000 0  0   !  DUMMY PRIORITY (0)         = %002,                                            B00,RWC#9
 1007.     000000 0  0      CPCB^SGADDR                = %003,     ! Known to microcode (MRL)             B00,RWC#9
 1008.     000000 0  0      SIV^SGADDR                 = %004,                                           !B00,RWC#9
 1009.     000000 0  0      IOC^SGADDR                 = %005,                                           !B00,RWC#9
 1010.     000000 0  0      CTL^SGADDR                 = %006,  ! Absolute ponter to CTL                  C00,HA#29
 1010.1    000000 0  0   !        "                    = %007,                                            C00,HA#29
 1010.2    000000 0  0      HITLISTPAGE^SGADDR         = %010,  ! Dynamic System Configuration            C00,SSW#30
 1011.     000000 0  0      PFAIL^SGADDR               = %011,                                           !C00,HA#29
 1014.     000000 0  0      TCT^SGADDR                 = %012,                                           !B00,RWC#9
 1015.     000000 0  0   !        "                    = %013,                                            B00,RWC#9
 1016.     000000 0  0      CSDAA^SGADDR               = %014,                                           !B30,Performance#24
 1017.     000000 0  0      POLLLIST^SGADDR            = %015,                                           !B00,RWC#9
 1018.     000000 0  0      TLE^SGADDR                 = %016,                                           !B00,RWC#9
 1019.     000000 0  0      BSDAA^SGADDR               = %017,                                           !B30,Performance#24
 1020.     000000 0  0      SACA^SGADDR                = %020,                                           !B30,Performance#24
 1021.     000000 0  0      RACA^SGADDR                = %021,                                           !B30,Performance#24
 1022.     000000 0  0      MSGCACHE^SGADDR            = %022, ! for READLINK cacheing                    B30,Performance#24
 1023.     000000 0  0   !                             = %023, reserved for msg system performance        B30,Performance#24
 1024.     000000 0  0      XLXFINDER^SGADDR           = %024, ! .EXT addr of table for finding an        C00,JDK#25
 1025.     000000 0  0   !                             = %025,   LCB or XLI from an XLX identifier.       C00,JDK#25
 1026.     000000 0  0   !                             = %026, reserved for msg system enhancements       B30,Performance#24
 1027.     000000 0  0   !                             = %027, reserved for msg system enhancements       B30,Performance#24
 1028.     000000 0  0   !                             = %030, reserved for msg system enhancements       B30,Performance#24
 1029.     000000 0  0   !                             = %031, reserved for msg system enhancements       B30,Performance#24
 1030.     000000 0  0      LCB^SGADDR                 = %032,                                           !B00,RWC#9
 1031.     000000 0  0      LCBTOP^SGADDR              = %033,                                           !B00,RWC#9
 1032.     000000 0  0      MBS^SGADDR                 = %034,                                           !B00,RWC#9
 1033.     000000 0  0      MBI^SGADDR                 = %035,                                           !B00,RWC#9
 1034.     000000 0  0      KERFLAG^SGADDR             = %036,                                           !B00,RWC#9
 1035.     000000 0  0      PCB^SGADDR                 = %037,                                           !B00,RWC#9
 1036.     000000 0  0      MMP^SGADDR                 = %040,                                           !B00,RWC#9
 1037.     000000 0  0      DCT^SGADDR                 = %041,                                           !B00,RWC#9
 1038.     000000 0  0   !        "                    = %042,                                            B00,RWC#9
 1039.     000000 0  0      MOP^SGADDR                 = %043,                                           !B30,MTR#21
 1040.     000000 0  0      RTAWAKE^SGADDR             = %044,                                           !B00,RWC#9
 1041.     000000 0  0      RTGROUP^SGADDR             = %045,                                           !B00,RWC#9
 1042.     000000 0  0      RTWAKELIST^SGADDR          = %046,                                           !B00,RWC#9
 1043.     000000 0  0      NRT^SGADDR                 = %047,                                           !B00,RWC#9
 1044.     000000 0  0      XGLOBAL^SGADDR             = %050,                                           !C00,HA#29
```

```
1044.1   000000 0  0   !      "                    = %051,                                      C00,HA#29
1044.2   000000 0  0      XSAMPLING^SGADDR         = %052,                                     !C00,HA#29
1047.    000000 0  0      XTLE^SGADDR              = %053,                                     !B00,RWC#9
1048.    000000 0  0      SYSPOOL^SGADDR           = %054,                                     !B00,RWC#9
1049.    000000 0  0   !      "                    = %055,                                      B00,RWC#9
1050.    000000 0  0      SCT^SGADDR               = %056,                                     !C00,HA#29
1051.    000000 0  0   !      "                    = %057,                                      C00,HA#29

2002.    000000 0  0      IOS^SGADDR               = %060,                                     !B00,RWC#9
2003.    000000 0  0      KCCB^SGADDR              = %061,                                     !B00,RWC#9
2004.    000000 0  0   !  RESERVED                 = %062,                                      B00,RWC#9
2005.    000000 0  0      CPCBX^SGADDR             = %063,                                     !B00,RWC#9
2006.    000000 0  0   !      "                    = %064,                                      B00,RWC#9
2007.    000000 0  0      SEGTABSIZE^SGADDR        = %065,   ! Known to microcode (XMEM)        B00,RWC#9
2008.    000000 0  0      SEG^SGADDR               = %066,                                     !B00,RWC#9
2009.    000000 0  0   !      "                    = %067,                                      B00,RWC#9
2010.    000000 0  0      PHYSEG^SGADDR            = %070,                                     !B00,RWC#9
2011.    000000 0  0   !      "                    = %071,                                      B00,RWC#9
2012.    000000 0  0      PHYPAGE^SGADDR           = %072,                                     !B00,RWC#9
2013.    000000 0  0   !      "                      %073,                                      B00,RWC#9
2014.    000000 0  0   !  RESERVED                 = %074,                                      B00,RWC#9
2015.    000000 0  0      LOCKWAITLIST^SGADDR      = %075,                                     !B00,RWC#9
2016.    000000 0  0      LOCKWAITTAIL^SGADDR      = %076,                                     !B00,RWC#9
2017.    000000 0  0      COLDPTR^SGADDR           = %077,                                     !B00,RWC#9
2018.    000000 0  0      RLIST^SGADDR             = %100,   ! Known to microcode (MRL)         B00,RWC#9
2019.    000000 0  0   !      "                    = %101      Known to microcode (MRL)         B00,RWC#9
2020.    000000 0  0   !  DUMMY PRIORITY (%377)    = %102      Known to microcode (MRL)         B00,RWC#9
2021.    000000 0  0      CLOCK^SGADDR             = %103,   ! Known to microcode (RCLK)        B00,RWC#9
2022.    000000 0  0   !      "                    = %104        "                              B00,RWC#9
2023.    000000 0  0   !      "                    = %105        "                              B00,RWC#9
2024.    000000 0  0   !      "                    = %106        "                              B00,RWC#9
2025.    000000 0  0      TLIST^SGADDR             = %107,   ! Known to microcode (FTL/DTL)     B00,RWC#9
2026.    000000 0  0   !      "                    = %110        "                              B00,RWC#9
2027.    000000 0  0   !  OSP I/O CONTROL BLOCK    = %111      Known to microcode (RSMT)        B00,RWC#9
2028.    000000 0  0   !          "                = %112        "                              B00,RWC#9
2029.    000000 0  0   !          "                = %113        "                              B00,RWC#9
2030.    000000 0  0   !          "                = %114        "                              B00,RWC#9
2031.    000000 0  0      BPADDR^SGADDR            = %115,   ! Known to microcode (SMBP)        B00,RWC#9
2032.    000000 0  0   !      "                      %116                                       B00,RWC#9
2033.    000000 0  0      TRBASE^SGADDR            = %117,   ! Known to microcode (TRCE)        B00,RWC#9
2034.    000000 0  0      TRLIMIT^SGADDR           = %120,   !   "                              B00,RWC#9
2035.    000000 0  0      TRACE^SGADDR             = %121,   !   "                              B00,RWC#9
2036.    000000 0  0   !  Lights save area         = %122      Known to microcode (SSW)         B00,RWC#9
2037.    000000 0  0      BPBASE^SGADDR            = %123,   ! Known to microcode               B00,RWC#9
2038.    000000 0  0      BPSIZE^SGADDR            = %124,   !   "                              B00,RWC#9
2039.    000000 0  0      BPLIMIT^SGADDR           = %125,   !   "                              B00,RWC#9
2040.    000000 0  0      PROCESSTIMER^SGADDR      = %126,   ! Known to microcode (interrupts)  B00,SS #14
2041.    000000 0  0   !      "                      %127        "                              B00,RWC#9
2042.    000000 0  0   !  RESERVED FOR ARCH. EXTENSN= %130,                                     B00,RWC#9
2043.    000000 0  0   !      "                      %131                                       B00,RWC#9
2044.    000000 0  0   !      "                      %132,                                      C00,HA#29
2044.1   000000 0  0      XBAGMAN^SGADDR           = %133,                                     !C00,HA#29
2046.    000000 0  0   !      "                      %134                                       B00,RWC#9
2047.    000000 0  0   !      "                      %135                                       B00,RWC#9
2048.    000000 0  0   !      "                      %136                                       B00,RWC#9
2049.    000000 0  0      BPADDRX^SGADDR           = %137,                                     !B00,RWC#9
```

```
000000 0  0     SEGTABSEM^SGADDR            = %140,                                          !A01,gcl
000000 0  0   !         "                     %141                                            A01,gcl
000000 0  0   !         "                     %142                                            B00,RWC#9
000000 0  0   !         "                     %143                                            B00,RWC#9
000000 0  0     DISK^CTLR^UCODE^SGADDR      = %144,                                          !C00,MBB#26
000000 0  0   ! free                        = %145,                                           B00,RWC#9
000000 0  0     TMFSEM^SGADDR               = %146,                                          !A03,CKS
000000 0  0   !         "                     %147                                            A03,CKS
000000 0  0   !         "                     %150                                            A03,CKS
000000 0  0   !        "                      %151                                            A03,CKS
000000 0  0     FOXIFC^SGADDR               = %152,                                          !B00,FOX#15
000000 0  0    !       "                    = %153,                                           B00,FOX#15
000000 0  0     MYEXTCPU^SGADDR             = %154,   ! Known to microcode (???)              B00,RWC#9
000000 0  0     CPUTYPE^SGADDR              = %155,                                          !A06,wbb #5
000000 0  0     TIMEINFO^SGADDR             = %156,                                          !A04,RWC#2
000000 0  0     LIGHTSCONTROL^SGADDR        = %157,                                          !B00,RWC#9
000000 0  0     PURPLEUCODESEG^SGADDR       = %160,   ! can be retired after C00              C00,MBB#26
000000 0  0     DISCDRIVERSEM^SGADDR        = %161,                                          !B00,RWC#9
000000 0  0   !        "                    = %162,                                           B00,RWC#9
000000 0  0   !        "                    = %163,                                           B00,RWC#9
000000 0  0   !        "                    = %164,                                           B00,RWC#9
000000 0  0     DISCDRIVERSEM2^SGADDR       = %165,                                          !B00,RWC#9
000000 0  0   !        "                    = %166,                                           B00,RWC#9
000000 0  0   !        "                    = %167,                                           B00,RWC#9
000000 0  0   !        "                    = %170,                                           B00,RWC#9
000000 0  0     ESEPEP^SGADDR               = %171,  ! extensible stack expansion             B00,RWC#9
000000 0  0     CCT^SGADDR                  = %172,  ! FOX cluster control table              B00,RWC#9
000000 0  0     SCTX^SGADDR                 = %173,  ! ABSOLUTE PTR TO SCT EXTENSION          B00,RWC#9
000000 0  0   !        "                    = %174,                                           B00,RWC#9
000000 0  0   ! EPT^SGADDR                  = %175,  !! pointer to ENTRY POINT TABLE in SG    B00,RWC#9
000000 0  0     DISCDRIVERSEM3^SGADDR       = %176,                                          !B00,RWC#9
000000 0  0   !        "                    = %177,                                           B00,RWC#9
000000 0  0   !        "                    = %200,                                           B00,RWC#9
000000 0  0   !        "                    = %201,                                           B00,RWC#9
000000 0  0     FOXHSCP^SGADDR              = %202,                                          !C00,HA#29
000000 0  0   !        "                    = %203,                                           B00,FOX#15
000000 0  0     SEP^SGADDR                  = %204,  ! pointer to System Entry Point table    B00,RWC#9
000000 0  0   !        "                    = %205,           "                               B00,RWC#9
000000 0  0     UCOPTIONLIST^SGADDR         = %206,                                          !B00,RWC#9
000000 0  0   !          "                    %207                                            B00,RWC#9
000000 0  0     UCOPTIONFLAG^SGADDR         = %210,  ! Known to Microcode                     B00,REY#17
000000 0  0   !          "                    %211            "                               B00,REY#17
000000 0  0     DISCDRIVERSEM4^SGADDR       = %212,                                          !B00 gcl #11
000000 0  0   !        "                    = %213,                                           B00 gcl #11
000000 0  0   !        "                    = %214,                                           B00 gcl #11
000000 0  0   !        "                    = %215,                                           B00 gcl #11
000000 0  0     DISCDRIVERSEM5^SGADDR       = %216,                                          !B00 gcl #11
000000 0  0   !        "                    = %217,                                           B00 gcl #11
000000 0  0   !        "                    = %220,                                           B00 gcl #11
000000 0  0   !        "                    = %221,                                           B00 gcl #11
000000 0  0     IDLETIMER^SGADDR            = %222,  ! processor idle time equivalent of      B00,SS #12
000000 0  0   !     "                         %223      PCBPTIMER                             B00,SS #12
000000 0  0     PROCESSORIDLETIME^SGADDR    = %224,  ! processor idle time equivalent of      B00,SS #12
000000 0  0   !     "                         %225      PCBXPTIME                             B00,SS #12
000000 0  0   !     "                         %226                                            B00,SS #12
000000 0  0   !     "                         %227                                            B00,SS #12
000000 0  0     SUMPROCESSBUSY^SGADDR       = %230,  ! total cpu time used in executing       B00,SS #12
```

```
3059.     000000 0  0   !     "                         %231     processes                                B00,SS #12
3060.     000000 0  0   !     "                         %232                                              B00,SS #12
3061.     000000 0  0   !     "                         %233                                              B00,SS #12
3062.     000000 0  0      PTLE^SGADDR                = %234,  ! absolute ptr to PTLE table, initialized B00,SS #12
3063.     000000 0  0   !     "                         %235     by SYSGEN; SHOULD BE AT EVEN WORD BDRY  C00,SS #27
3064.     000000 0  0      EXTPOOL^SGADDR             = %236,  ! pool like SYSPOOL, but in extmem         B00,JDK#13
3065.     000000 0  0   !      "                      = %237                                              B00,JDK#13
3066.     000000 0  0      MSNGRD^SGADDR              = %240,  ! supports SendViaMessenger facility       B00,JDK#13
3067.     000000 0  0   !      "                      = %241,              SendViaMessenger               B00,JDK#13
3068.     000000 0  0                                                                                    !B00,JDK#13
3069.     000000 0  0      CMETABLE^SGADDR            = %242,                                            !B00,VAZ#16
3069.1    000000 0  0      OBILOCATION^SGADDR         = %243,  ! pointer to table of obi process loc      B10,TCKC#18
3070.     000000 0  0      CST^SGADDR                 = %244,  ! Absolute pointer to Channel statistics   C00,HA#29
3070.01   000000 0  0   !     "                       = %245,                                             C00,HA#29
3070.02   000000 0  0      MAPPOOL^SGADDR             = %246,  ! Absolute pointer to MAPPOOL              C00,HA#29
3070.21   000000 0  0   !     "                       = %247,                                             C00,HA#29
3070.22   000000 0  0      HELPMAP^SGADDR             = %250,  ! label for proc HELPER^MAP                C00,HA#29
3070.32   000000 0  0      RSMT^BUF^SGADDR            = %251,  ! extended address of RSMT buffer          B30,RKS#23
3070.33   000000 0  0   !                               %252,                                             B30,RKS#23
3070.34   000000 0  0      RSMT^BYTES^SGADDR          = %253,  ! RSMT byte count                          B30,RKS#23
3070.35   000000 0  0      WSMT^BUF^SGADDR            = %254,  ! extended address of WSMT buffer          B30,RKS#23
3070.36   000000 0  0   !                               %255,                                             B30,RKS#23
3070.37   000000 0  0      WSMT^BYTES^SGADDR          = %256,  ! WSMT byte count                          B30,RKS#23
3070.38   000000 0  0      RESIZESEM^SGADDR           = %257,  ! segment resize semaphore                 C00,HA#29
3070.381  000000 0  0   !                             = %260,                                             C00,HA#29
3070.391  000000 0  0   !                             = %261,                                             C00,SS #27
3070.392  000000 0  0   !                             = %262,                                             C00,SS #27
3070.393  000000 0  0      RESIDENT^TEMPLATE^SGADDR   = %263,  ! abs addr of ems formatter resident       C00,EMC#28
3070.394  000000 0  0   !          "                  = %264,    templates segment                        C00,EMC#28
3070.4    000000 0  0   !  NOTUSED                    = %265,                                             C00,HA#29
3070.41   000000 0  0      XKERNEL^SGADDR             = %266,  ! Alltime "Process" counter record addr    C00,HA#29
3070.5    000000 0  0   !        "                      %267,                                             C00,HA#29
3071.     000000 0  0      XBAGBUSY^SGADDR            = %270,  ! TMF counter record address               C00,HA#29
3071.     000000 0  0   !        "                      %271,                                             C00,HA#29
3071. 1   000000 0  0                                                                                    !C00,HA#29
3071.2    000000 0  0      LASTSGADDR = %277, ! Amount reserved by sysgen                                 C00,HA#29
3072.     000000 0  0                                                                                    !B00,DW #10
3072.1    000000 0  0      XBSAVE^SGADDR              = %1146, ! Save area for Extended Base (XB)         B30,Check#22
3072.2    000000 0  0   !      "                      = %1147    register at powerfail and dump           B30,Check#22
3072.3    000000 0  0      XLSAVE^SGADDR              = %1150, ! Save area for Extended Limit (XL)        B30,Check#22
3072.4    000000 0  0   !      "                      = %1151    register at powerfail and dump           B30,Check#22
3073.     000000 0  0      DUMPRLFLAG^SGADDR          = %1153,     !Processor reset-load.                 B00,DW #10
3074.     000000 0  0                                                                                    !B00,DW #10
3075.     000000 0  0      MEMDUMPLASTPAGE^SGADDR     = %1154;     !Last page of processor.               B00,DW #10
   9.     000000 0  0   ?         SOURCE dutil      ( sgequivs, defines )
Source file:  [1]  $IMT.T9050C00.DUTIL  12OCT86 - 10:04:15
 1001.    000000 0  0   ?SECTION SGEQUIVS                                                                !B00,RWC#3
 1003.    000000 0  0   ! T9050 GUARDIAN   Utility Declarations !
 1004.    000000 0  0
 1005.    000000 0  0   INT  SG     = 'SG',          ! used to index into the system data map
 1006.    000000 0  0        SG0    = SG,
 1007.    000000 0  0        SG1    = SG+1,
 1008.    000000 0  0        SG2    = SG+2,
 1009.    000000 0  0        SG3    = SG+3,
 1010.    000000 0  0        SG4    = SG+4,
 1011.    000000 0  0        SG5    = SG+5,
 1012.    000000 0  0        SG6    = SG+6,
```

```
000000 0  0          SG7    = SG+7,
000000 0  0          SG8    = SG+8,
000000 0  0          SG9    = SG+9,
000000 0  0          SG10   = SG+10,
000000 0  0          SG11   = SG+11,
000000 0  0          SG12   = SG+12,
000000 0  0          SG13   = SG+13,
000000 0  0          SG14   = SG+14,
000000 0  0          SG15   = SG+15,
000000 0  0          SG16   = SG+16,
000000 0  0          SG17   = SG+17,
000000 0  0          SG18   = SG+18,
000000 0  0          SG19   = SG+19,
000000 0  0          SG20   = SG+20,
000000 0  0          SG21   = SG+21,
000000 0  0          SG22   = SG+22,
000000 0  0          SG23   = SG+23,
000000 0  0          SG24   = SG+24,
000000 0  0          SG25   = SG+25,
000000 0  0          SG26   = SG+26,
000000 0  0          SG27   = SG+27,
000000 0  0          SG28   = SG+28,
000000 0  0          SG29   = SG+29,
000000 0  0          SG30   = SG+30,
000000 0  0          SG31   = SG+31,
000000 0  0          SG32   = SG+32,
000000 0  0          SG33   = SG+33,
000000 0  0          SG34   = SG+34,
000000 0  0          SG35   = SG+35,
000000 0  0          SG36   = SG+36,
000000 0  0          SG37   = SG+37,
000000 0  0          SG38   = SG+38,
000000 0  0          SG39   = SG+39,
000000 0  0          SG40   = SG+40,
000000 0  0          SG41   = SG+41,
000000 0  0          SG42   = SG+42,
000000 0  0          SG43   = SG+43,
000000 0  0          SG44   = SG+44,
000000 0  0          SG45   = SG+45,
000000 0  0          SG46   = SG+46,
000000 0  0          SG47   = SG+47;
000000 0  0
000000 0  0   INT(32) SGD   = 'SG',
000000 0  0           SGD0  = SG,
000000 0  0           SGD1  = SG+1,
000000 0  0           SGD2  = SG+2,
000000 0  0           SGD3  = SG+3,
000000 0  0           SGD4  = SG+4,
000000 0  0           SGD5  = SG+5,
000000 0  0           SGD6  = SG+6,
000000 0  0           SGD7  = SG+7,
000000 0              SGD8  = SG+8,
000000 0  0           SGD9  = SG+9,
000000 0  0           SGD10= SG+10,
000000 0  0           SGD11= SG+11,
000000 0  0           SGD12= SG+12,
000000 0  0           SGD13= SG+13,
```

```
000000 0  0          SGD14= SG+14,
000000 0  0          SGD15= SG+15,
000000 0  0          SGD16= SG+16,
000000 0  0          SGD17= SG+17,
000000 0  0          SGD18= SG+18,
000000 0  0          SGD19= SG+19,
000000 0  0          SGD20= SG+20,
000000 0  0          SGD21= SG+21,
000000 0  0          SGD22= SG+22,
000000 0  0          SGD23= SG+23,
000000 0  0          SGD24= SG+24,
000000 0  0          SGD25= SG+25,
000000 0  0          SGD26= SG+26,
000000 0  0          SGD27= SG+27,
000000 0  0          SGD28= SG+28,
000000 0  0          SGD29= SG+29,
000000 0  0          SGD30= SG+30,
000000 0  0          SGD31= SG+31,
000000 0  0          SGD32= SG+32,
000000 0  0          SGD33= SG+33,
000000 0  0          SGD34= SG+34,
000000 0  0          SGD35= SG+35,
000000 0  0          SGD36= SG+36,
000000 0  0          SGD37= SG+37,
000000 0  0          SGD38= SG+38,
000000 0  0          SGD39= SG+39,
000000 0  0          SGD40= SG+40,
000000 0  0          SGD41= SG+41,
000000 0  0          SGD42= SG+42,
000000 0  0          SGD43= SG+43,
000000 0  0          SGD44= SG+44,
000000 0  0          SGD45= SG+45;
000000 0  0  STRING  SGS = 'SG';
000000 0  0  ?SECTION DEFINES
000000 0  0  !
000000 0  0  !  Instruction-related definitions:
000000 0  0  !
000000 0  0  !     Freeze system on error:
000000 0  0
000000 0  0  DEFINE  SYSTEM^FREEZE( NUMBER ) = BEGIN
000000 0  0                                   STACK NUMBER;  CODE( SSW; SFRZ; CON %10776 );
000000 0  0                                   END#,
000000 0  0  !     Halt processor on error: '                                              B00,RWC#5
000000 0  0                                                                               !B00,RWC#5
000000 0  0          PROCESSOR^HALT( NUMBER ) = BEGIN                                     !B00,RWC#5
000000 0  0                                   STACK NUMBER;  CODE( SSW; HALT; CON %10776 );!B00,RWC#5
000000 0  0                                   END#,                                       !B00,RWC#5
000000 0  0  !     Scheduling:
000000 0  0
000000 0  0          DISPATCH =  CODE( DISP )#,      ! enter Dispatcher for process switch
000000 0  0          QUEUESEND = CODE( SNDQ )#,      ! enter Dispatcher for bus sends
000000 0  0
000000 0  0  !     Mutual exclusion:
000000 0  0
000000 0  0          MUTEXON( DATA^WORDS, CODE^WORDS ) =                                  !B20,Rey#6
000000 0  0                         BEGIN                                                 !B20,Rey#6
000000 0  0                         STACK DATA^WORDS + ((CODE^WORDS+0)'<<'8);             !B20,Rey#6
```

```
000000 0  0                    CODE( MXON );                                                   !B20,Rey#6
000000 0  0                    END#,                                                           !B20,Rey#6
000000 0  0          MUTEXOFF =     CODE( MXFF )#,
000000 0  0
000000 0  0     !     List operations:
000000 0  0
000000 0  0          INSERT( X, Y ) =  BEGIN STACK X,Y; CODE( INSR ); END#,
000000 0  0          DELETE( X ) =     BEGIN STACK X; CODE( DLTE ); END#,
000000 0  0          MERGERL( X ) =    BEGIN
000000 0  0                            STACK X; CODE( MRL );
000000 0  0                            SSXRAVINCST( XGLOBAL, XRGLOBAL^DEF.READY^S );        !A04,RWC#1
000000 0  0                            END#,
000000 0  0          MERGERLNOX( X ) = BEGIN         ! for certain message system tasks
000000 0  0                            STACK X;      ! the process is deleted and
000000 0  0                            CODE( MRL );  ! merged onto the readylist without
000000 0  0                            END#,         ! counting, since the process is actually
000000 0  0                                          ! ready to run, however the message
000000 0  0                                          ! system is performing for it.
000000 0  0
000000 0  0     !     Semaphore operations:
000000 0  0
000000 0  0     PSEM( X, Y ) = BEGIN STACK Y,$AXADR(X); CODE( PSEM; BTST  ;STRP $RP-1 ); END#, !C00,HA#10
000000 0  0     PSEM^( X, Y )= BEGIN STACK Y,$AXADR(X); CODE( PSEM; CMPI 0;STRP $RP-1 ); END#, !C00,HA#10
000000 0  0     ! PSEM^ SETS CCE=TIMEOUT, CCG=SEM TAKEN                                          C00,HA#10
000000 0  0     VSEM( X ) =    BEGIN STACK $AXADR( X ); CODE( VSEM; STRP $RP-1 ); END#,       !C00,HA#10
000000 0  0     TRAPSOFF =     CODE( RDE; ANRI %577; SETE )#; ! traps off                        C00,HA#10
000000 0  0
000000 0  0     !     Bounds operations:
000000 0  0
000000 0  0     DEFINE  ^^^BOUNDS ( X, Y )
000000 0  0                            = $BOUNDS ( X, Y ) #;
000000 0  0
000000 0  0     DEFINE  ^PARMS^EXIST ( X ) = BEGIN STACK ( X ); CODE ( STRP 7 ); END #;
000000 0  0                            ! used to reference the lowest 'L'- parameter
000000 0  0                            ! of a callable procedure before it calls SYSIN
000000 0  0                            ! to become unstoppable.  Should be passed the
000000 0  0                            ! address of first parameter if it is a reference
000000 0  0                            ! parameter.
000000 0  0
000000 0  0     LITERAL  TOSSTACK = 350;   ! stack needed for callable system procedures.
000000 0  0              ! actually embedded in microcode, should be concurrently changed.
000000 0  0
000000 0  0
000000 0  0     DEFINE ALEN ( X ) = ( $LEN ( X ) - 1 )#;        ! array len of a struct or field A02,gcl
000000 0  0     DEFINE AOLEN ( X ) = ( $LEN ( X ) * $OCCURS ( X ) - 1 )#;  ! array move length
000000 0  0     DEFINE WLEN ( X ) = ( $LEN ( X ) >> 1 )#;        ! word len of a struct or field
000000 0  0     DEFINE AWLEN ( X ) = ( $LEN ( X ) >> 1 - 1 )#; ! as above, but for use with
000000 0  0                         ! array index bounds, as in X[ 0:AWLEN(struct.field) ]
000000 0  0     DEFINE AOFFSET^ ( X ) = ( $OFFSET ( X ) - 1 )#; ! array len of a byte field     A03,GCL
000000 0  0     DEFINE WOFFSET ( X ) = ( $OFFSET ( X ) >> 1 )#;
000000 0  0                         ! word offset of a struct or field
000000 0  0     DEFINE AWOFFSET ( X ) = ( $OFFSET ( X ) >> 1 - 1 )#;
000000 0  0                         ! array index bounds, as in X[ 0:AWOFFSET(struct.field) ]
000000 0  0     DEFINE OLEN ( X ) = ( $OCCURS ( X ) * $LEN ( X )) #; ! length of an array field
000000 0  0     DEFINE WOLEN ( X ) = ( $OCCURS ( X ) * WLEN ( X )) #;! as above, in words
000000 0  0     DEFINE WLADR ( X ) = $INT( @X'>>'1 )#; ! returns a word pointer from an .EXT    A02,lbl
000000 0  0                                                                                 !A02,lbl
```

```
000000 0  0                                                                                      !A02,lbl
000000 0  0   DEFINE ROUNDUP ( X ) = ( ( ( X ) + 1 ) LAND ( -2 ) ) #;                            !A03,GCL
000000 0  0                       ! rounds up any int values to an even number
000000 0  0   DEFINE ROUNDTOWORD ( X ) = ( ( ( X ) + 1 ) '>>' 1 ) #;                             !A02,gcl
000000 0  0                        ! converts any int byte counts to a word count
000000 0  0
000000 0  0   !     Translate a 16-bit relative address from the specified process' data,
000000 0  0   !     stack into an absolute extended address:
000000 0  0
000000 0  0   DEFINE  EXTENDEDADDR( RELADDR, PROCPIN ) =
000000 0  0      $DBLL( %40000 LOR PCB[ PROCPIN ].PCBSTACKSEG, RELADDR ) '<<' 1#;
000000 0  0   !                                                                                   A02,lbl
000000 0  0   !                                                                                   A02,lbl
000000 0  0   !     INT .EXT bit vector routines:                                                 A02,lbl
000000 0  0   !                                                                                   A02,lbl
000000 0  0   !                                                                                   A02,lbl
000000 0  0                                                                                      !A02,lbl
000000 0  0   DEFINE TESTBIT(BIT,          ! INT >=0 <= 65535                                     A02,lbl
000000 0  0                 VECTOR)=       ! INT                                                  A02,lbl
000000 0  0              (VECTOR[(BIT)'>>'4]'<<'(BIT).<12:15>)<0#,                               !A02,lbl
000000 0  0                                                                                      !A02,lbl
000000 0  0          SETBIT(BIT,           ! INT >=0 <= 65535                                     A02,lbl
000000 0  0                VECTOR)=        ! INT                                                  A02,lbl
000000 0  0              BEGIN                                                                   !A02,lbl
000000 0  0                  STACK %100000'>>'(BIT).<12:15>;                                     !A02,lbl
000000 0  0                  STACK @VECTOR+$DBLL(0,(BIT)'>>'3);                                  !A02,lbl
000000 0  0                  CODE (ORX);                            ! UNINTERRUPTABLE             A02,lbl
000000 0  0              END#,                                                                   !A02,lbl
000000 0  0                                                                                      !A02,lbl
000000 0  0          RESETBIT(BIT,         ! INT >=0 <= 65535                                     A02,lbl
000000 0  0                  VECTOR)=      ! INT                                                  A02,lbl
000000 0  0              BEGIN                                                                   !A02,lbl
000000 0  0                  STACK $COMP(%100000'>>'(BIT).<12:15>);                              !A02,lbl
000000 0  0                  STACK @VECTOR+$DBLL(0,(BIT)'>>'3);                                  !A02,lbl
000000 0  0                  CODE (ANX);                                                         !A02,lbl
000000 0  0              END#;                                      ! UNINTERRUPTABLE             A02,lbl
000000 0  0                                                                                      !A02,lbl
000000 0  0                                                                                      !A02,lbl
000000 0  0   DEFINE                                                                             !A03,RWC
000000 0  0      SETBITG(ARRAY,INDEX)= BEGIN STACK %100000'>>'(INDEX.<12:15>),                   !A03,RWC
000000 0  0                                           @ARRAY[INDEX.<0:11>];                      !A03,RWC
000000 0  0                            CODE (ORG)                                                !A03,RWC
000000 0  0                            END#,                                                     !A03,RWC
000000 0  0      CLEARBITG(ARRAY,INDEX)= BEGIN STACK $COMP(%100000'>>'(INDEX.<12:15>)),          !A03,RWC
000000 0  0                                             @ARRAY[INDEX.<0:11>];                    !A03,RWC
000000 0  0                              CODE (ANG)                                              !A03,RWC
000000 0  0                              END#;                                                   !A03,RWC
000000 0  0   DEFINE INCR( X ) = X := X + 1#;                                                    !A03,RWC
000000 0  0   DEFINE DECR( X ) = X := X - 1#;                                                    !A03,RWC
000000 0  0   DEFINE INCRD( X ) = X := X + 1D#;                                                  !A03,RWC
000000 0  0   DEFINE DECRD( X ) = X := X - 1D#;                                                  !A03,RWC
000000 0  0   DEFINE LINCR( X ) = X := X '+' 1#;                                                 !B40,SS#9
000000 0  0   DEFINE LDECR( X ) = X := X '-' 1#;                                                 !B40,SS#9
000000 0  0                                                                                      !A03,RWC
000000 0  0                                                                                      !A03,RWC
000000 0  0   DEFINE EXCHANGE (X, Y) = BEGIN STACK X, Y; STORE X, Y END#;                        !A03,RWC
000000 0  0                                                                                      !A03,RWC
```

```
000000 0 0  DEFINE RETURNCC( CC ) = BEGIN CODE ( CC ); RETURN; END#,                    !B00,RWC#3
000000 0 0        RETURNCCVAL( CC, VAL ) = BEGIN STACK VAL; CODE( CC ); RETURN; END#;   !B00,RWC#3
000000 0 0                                                                              !B00,MBB-DP2 #4
000000 0 0  !-------------------------------------------------------------------------- B00,MBB-DP2 #4
000000 0 0  ! THE FOLLOWING DEFINE CAN BE USED TO "SMEAR" A BYTE VALUE INTO AN ARRAY.   B00,MBB-DP2 #4
000000 0 0  !                                                                           B00,MBB-DP2 #4
000000 0 0  !   EXT^PTR = EXTENDED POINTER TO THE ARRAY TO BE SMEARED.  THE POINTER CAN BE B00,MBB-DP2 #4
000000 0 0  !             OF ANY TYPE (INT, STRING, STRUCT, FIXED, ETC) AS LONG AS      B00,MBB-DP2 #4
000000 0 0  !             @"EXT^PTR" IS A 32-BIT EXTENDED ADDRESS.                      B00,MBB-DP2 #4
000000 0 0  !                                                                           B00,MBB-DP2 #4
000000 0 0  !   COUNT   = NUMBER OF BYTES TO SMEAR (THIS IS AN "INT" VALUE).  NOTE THAT B00,MBB-DP2 #4
000000 0 0  !             THIS IS ALWAYS A BYTE COUNT REGARDLESS OF THE TYPE OF EXT^PTR. B00,MBB-DP2 #4
000000 0 0  !             A COUNT OF 0 IS INTERPRETED TO MEAN 64K BYTES.  THEREFORE, AN B00,MBB-DP2 #4
000000 0 0  !             EXPLICIT TEST IS NECESSARY IF THERE IS A POSSIBILITY THAT 0   B00,MBB-DP2 #4
000000 0 0  !             BYTES ARE TO BE SMEARED.                                      B00,MBB-DP2 #4
000000 0 0  !                                                                           B00,MBB-DP2 #4
000000 0 0  !   VALUE   = THE BYTE VALUE TO BE SMEARED INTO THE ARRAY IS IN <8:15>.     B00,MBB-DP2 #4
000000 0 0  !             <0:7> ARE DON'T CARES.                                        B00,MBB-DP2 #4
000000 0 0  !                                                                           B00,MBB-DP2 #4
000000 0 0  ! EXAMPLES:                                                                 B00,MBB-DP2 #4
000000 0 0  !                                                                           B00,MBB-DP2 #4
000000 0 0  ! 1.  SMEAR^EXT (CAT.VSN, $LEN (CAT.VSN), 0);  !! CLEAR CAT.VSN             B00,MBB-DP2 #4
000000 0 0  !                                                                           B00,MBB-DP2 #4
000000 0 0  ! 2.  IF WORD^COUNT THEN                       !! EXPLICIT TEST FOR 0       B00,MBB-DP2 #4
000000 0 0  !       SMEAR^EXT (XP, WORD^COUNT*2, -1);      !! SET WORDS IN XP TO -1     B00,MBB-DP2 #4
000000 0 0  !                                                                           B00,MBB-DP2 #4
000000 0 0  ! 3.  BUFFX := $XADR (BUFFER);                 !! MUST USE EXTENDED POINTER B00,MBB-DP2 #4
000000 0 0  !     SMEAR^EXT (BUFFX, 80, " ");              !! CLEAR BUFFER TO BLANKS    B00,MBB-DP2 #4
000000 0 0  !-------------------------------------------------------------------------- B00,MBB-DP2 #4
000000 0 0  DEFINE SMEAR^EXT (EXT^PTR, BYTE^COUNT, BYTE^VALUE) =                        !B00,MBB-DP2 #4
000000 0 0      BEGIN                                                                   !B00,MBB-DP2 #4
000000 0 0          STACK 0;                      ! R0 := 0                             B00,MBB-DP2 #4
000000 0 0          STACK BYTE^VALUE;             ! R1 := SMEAR BYTE                    B00,MBB-DP2 #4
000000 0 0          STACK @EXT^PTR;               ! R2:3 := STARTING EXT ADDR           B00,MBB-DP2 #4
000000 0 0          CODE (SBX);                   ! STORE VALUE IN FIRST BYTE; RP:=0    B00,MBB-DP2 #4
000000 0 0          STACK 1;                      ! R0:1 := 1D                          B00,MBB-DP2 #4
000000 0 0          CODE (STRP $RP+2);            ! R2:3 := STARTING (SOURCE) EXT ADDR  B00,MBB-DP2 #4
000000 0 0          CODE (DADD);                  ! R0:1 := DESTINATION ADDR (SOURCE+1D) B00,MBB-DP2 #4
000000 0 0          CODE (STRP $RP+2);            ! R2:3 := SOURCE ADDR, R0:1 := DEST ADDR B00,MBB-DP2 #4
000000 0 0          STACK (BYTE^COUNT)-1;         ! R4 := NUMBER OF BYTES TO MOVE       B00,MBB-DP2 #4
000000 0 0          CODE (MVBX);                  ! DO THE SMEAR                        B00,MBB-DP2 #4
000000 0 0      END  # ;                                                                !B00,MBB-DP2 #4
000000 0 0                                                                              !B30,EPN#7
000000 0 0   !                                                                          B30,EPN#7
000000 0 0   !  The following define is provided for use at the beginning of VARIABLE  B30,EPN#7
000000 0 0   !  procedures to protect against an EXTENSIBLE calling sequence.          B30,EPN#7
000000 0 0   !  It will verify that the calling sequence was indeed correct for a      B30,EPN#7
000000 0 0   !  variable procedure, i.e., that the caller did not use an EXTENSIBLE    B30,EPN#7
000000 0 0   !  procedure declaration for this procedure.  It will cause an instruction B30,EPN#7
000000 0 0   !  fault if the calling sequence was incorrect.                           B30,EPN#7
000000 0 0   !                                                                          B30,EPN#7
000000 0 0   !  ****************************************************************** !   !B30,EPN#7
000000 0 0   !  NOTE -- DO NOT USE THIS IN PROCEDURES HAVING MORE THAN 15 PARAMETERS !  !B30,EPN#7
000000 0 0   !  ****************************************************************** !   !B30,EPN#7
000000 0 0   !                                                                          B30,EPN#7
000000 0 0                                                                              !B30,EPN#7
000000 0 0  DEFINE VERIFY^VARIABLE^CALL =                                               !B30,EPN#7
                                                                                        !B30,EPN#7
```

```
2190.    000000 0  0   BEGIN
2191.    000000 0  0   CODE (CON %040703);   ! LOAD  L - 3                                    B30,EPN#7
2192.    000000 0  0   CODE (CON %013004);   ! BGEQ +4                                        B30,EPN#7
2193.    000000 0  0   STACK %175407;        !                                                B30,EPN#7
2194.    000000 0  0   CODE (SETE);          ! set non-PRIV                                   B30,EPN#7
2195.    000000 0  0   CODE (HALT);          ! instruction fault                              B30,EPN#7
2195.5   000000 0  0   CODE (STRP 7);        !                                                B30,EPN#8
2196.    000000 0  0   END #;                                                                !B30,EPN#7
  10.    000000 0  0  ?          SOURCE dmalloc  ( addressing,
  11.    000000 0  0  ?                            exttablelayout,
  12.    000000 0  0  ?                            kccblayout,
  13.    000000 0  0  ?                            mapping,
  14.    000000 0  0  ?                            memorymanager,
  15.    000000 0  0  ?                            pagetable,
  16.    000000 0  0  ?                            poollayout,
  17.    000000 0  0  ?                            spaceids,
  18.    000000 0  0  ?                            systempools,
  19.    000000 0  0  ?                            systemsegments,
  20.    000000 0  0  ?                            tablelayout )
Source file:  [1]  $IMT.T9050C00.DMALLOC  12NOV86 - 10:22:09
1001.    000000 0  0  ?SECTION TABLELAYOUT                                                   !B00,RWC#12
1003.    000000 0  0
1004.    000000 0  0  ! Standard tables, such as the PCB, LCB or TLE tables have a header of the
1005.    000000 0  0  ! following form:
1006.    000000 0  0  !
1007.    000000 0  0  STRUCT TABLEHEAD ( * );
1008.    000000 0  0     BEGIN                        !       ----------------------------------
1009.    000000 0  1     INT HDFL;                    !  -7:  *  free list header              *
1010.    000000 0  1                                  !       ----                          ----
1011.    000000 0  1     INT HDFLT;                   !  -6:  *                                *
1012.    000000 0  1                                  !       ----------------------------------
1013.    000000 0  1     INT HDFRC;                   !  -5:  *  free list count               *
1014.    000000 0  1                                  !       ----------------------------------
1015.    000000 0  1     INT HDFLC;                   !  -4:  *  # of times allocation failed  *
1016.    000000 0  1                                  !       ----------------------------------
1017.    000000 0  1     INT HDMC;                    !  -3:  *  minimum count ever free       *
1018.    000000 0  1                                  !       ----------------------------------
1019.    000000 0  1     INT HDENT;                   !  -2:  *  size of each entry            *
1020.    000000 0  1                                  !       ----------------------------------
1021.    000000 0  1     INT HDNE;                    !  -1:  *  number of entries             *
1022.    000000 0  1     END;                         !       ----------------------------------
1023.    000000 0  0
2000.    000000 0  0  ?SECTION EXTTABLELAYOUT                                                !B00,SS #16
2002.    000000 0  0                                                                         !B00,SS #16
2003.    000000 0  0  ! This section defines the template for the standard header of a table in   B00,SS #16
2004.    000000 0  0  ! extended memory. It is used by the PTLE table.                            B00,SS #16
2005.    000000 0  0  !                                                                           B00,SS #16
2006.    000000 0  0  STRUCT EXTTABLEHEAD ( * );                                                 !B00,SS #16
2007.    000000 0  0     BEGIN                        !       ----------------------------------  B00,SS #16
2008.    000000 0  1     INT( 32 ) HDFL;              ! -11:  *  free list header              *  B00,SS #16
2009.    000000 0  1                                  !       ----                          ----  B00,SS #16
2010.    000000 0  1                                  ! -10:  *                                *  B00,SS #16
2011.    000000 0  1                                  !       ----------          ----------  B00,SS #16
2012.    000000 0  1     INT( 32 ) HDFLT;             !  -7:  *                                *  B00,SS #16
2013.    000000 0  1                                  !       -----                         ----  B00,SS #16
2014.    000000 0  1
```

```
000000 0 1                                               !  -6:  *                                      *   B00,SS #16
000000 0 1      INT HDFRC;                               !        --------------------------------------    B00,SS #16
000000 0 1                                               !  -5:  *  free list count                     *   B00,SS #16
000000 0 1      INT HDFLC;                               !        --------------------------------------    B00,SS #16
000000 0 1                                               !  -4:  *  # of times allocation failed        *   B00,SS #16
000000 0 1      INT HDMC;                                !        --------------------------------------    B00,SS #16
000000 0 1                                               !  -3:  *  minimum count ever free             *   B00,SS #16
000000 0 1      INT HDENT;                               !        --------------------------------------    B00,SS #16
000000 0 1                                               !  -2:  *  size of each entry                  *   B00,SS #16
000000 0 1      INT HDNE;                                !        --------------------------------------    B00,SS #16
000000 0 1      END;                                     !  -1:  *  number of entries                   *   B00,SS #16
000000 0 0                                                        --------------------------------------    B00,SS #16
000000 0 0  ?SECTION POOLLAYOUT                                                                            !B00,SS #16
000000 0 0  !*************************************************************************** A04,RWC#4
000000 0 0  !***                   Dynamic Storage Allocation                        ** A04,RWC#4
000000 0 0  !*************************************************************************** A04,RWC#4
000000 0 0  ! Storage allocation is performed using the boundary tag method (Knuth V1,
000000 0 0  ! sec 2.5) and using a first-fit algorithm.  A pool has a 19 word header
000000 0 0  ! initialized by DEFINEPOOL.  The format is as follows:
000000 0 0  !
000000 0 0  STRUCT POOLHEADER (*);
000000 0 0      BEGIN
000000 0 1      FIXED LINKS [0:-1];                    !       -------------------------------- A04,RWC#4
000000 0 1                                             !    0: *                                A04,RWC#4
000000 0 1      INT (32) FREE^HEAD,                    !       ----  free list head         --- A04,RWC#4
000000 0 1                                             !    1: *                                A04,RWC#4
000000 0 1                                             !       -------                   ------ A04,RWC#4
000000 0 1                                             !    2: *                                A04,RWC#4
000000 0 1                 FREE^TAIL;                  !       ----  free list tail         --- A04,RWC#4
000000 0 1                                             !    3: *                                A04,RWC#4
000000 0 1                                             !       -------------------------------- A04,RWC#4
000000 0 1      INT(32) POOLSTART;                     !    4: *    extended address of the     A04,RWC#4
000000 0 1                                             !       ----                         --- A04,RWC#4
000000 0 1                                             !    5: *    beginning of the pool       A04,RWC#4
000000 0 1                                             !       -------------------------------- A04,RWC#4
000000 0 1      INT(32) POOLEND;                       !    6: *    first address outside       A04,RWC#4
000000 0 1                                             !       ----                         --- A04,RWC#4
000000 0 1                                             !    7: *    the poolspace               A04,RWC#4
000000 0 1                                             !       -------------------------------- A04,RWC#4
000000 0 1      INT(32) CURHIGH;                       !   10: *     current upper limit        A04,RWC#4
000000 0 1                                             !       ----                         --- A04,RWC#4
000000 0 1                                             !   11: *                                A04,RWC#4
000000 0 1                                             !       -------------------------------- A04,RWC#4
000000 0 1      INT(32) MAXHIGH;                       !   12: *     maximum upper limit        A04,RWC#4
000000 0 1                                             !       ----                         --- A04,RWC#4
000000 0 1                                             !   13: *                                A04,RWC#4
000000 0 1                                             !       -------------------------------- A04,RWC#4
000000 0 1      INT(32) CURALLOC;                      !   14: *   # of words now allocated     A04,RWC#4
000000 0 1                                             !       ----                         --- A04,RWC#4
000000 0 1                                             !   15: *   (double words)               A04,RWC#4
000000 0 1                                             !       -------------------------------- A04,RWC#4
000000 0 1      INT(32) MAXALLOC;                      !   16: *   maximum ever allocated       A04,RWC#4
000000 0 1                                             !       ----                         --- A04,RWC#4
000000 0 1                                             !   17: *   (double words)               A04,RWC#4
000000 0 1                                             !       -------------------------------- A04,RWC#4
000000 0 1      INT FAILSIZE;                          !   20: *   size of last failure         A04,RWC#4
```

```
000000 0  1                                          !          ----------------------------------  A04,RWC#4
000000 0  1      INT CURFRAG;                        !    21: *    current # of free fragments   A04,RWC#4
000000 0  1                                          !          ----------------------------------  A04,RWC#4
000000 0  1      INT MAXFRAG;                        !    22: *    maximum fragmentation          A04,RWC#4
000000 0  1                                          !          ----------------------------------  A04,RWC#4
000000 0  1      END;
000000 0  0  ! Storage is always allocated in multiples of double-words, although requests
000000 0  0  ! are made in terms of bytes; any excess storage allocated is ignored by the
000000 0  0  ! caller.  When a block is allocated two additional words, the head tag and
000000 0  0  ! end tag, surround the block.  Each tag of an allocated block contains the
000000 0  0  ! complement of the total block size in doublewords.  Note that the maximum siz A04,RWC#4
000000 0  0  ! block is 32767 double words.
000000 0  0  !
000000 0  0  ! When a block is freed, the tags are complemented (made positive) and the bloc A04,RWC#4
000000 0  0  ! is placed on the freelist in'memory address order.  Since all blocks have tag A04,RWC#4
000000 0  0  ! it is an easy matter to determine if an adjacent block is also free and to
000000 0  0  ! coalesce free blocks.
000000 0  0  !
000000 0  0  ! The formats of free and assigned blocks are:
000000 0  0  !
000000 0  0  STRUCT BLOCKHEAD(*);
000000 0  0     BEGIN
000000 0  1     FIXED QUAD[0:-1];!            ----------------------------------
000000 0  1     INT TAG;         !       0:  *             size                 *     free bloc A04,RWC#4
000000 0  1                      !            ----------------------------------
000000 0  1     FIXED LINKS[0:-1];!           *                                  *
000000 0  1     INT(32) NEXT;    !            ----                            ----
000000 0  1                      !            *                                  *
000000 0  1                      !            ----    free list link          ----
000000 0  1     INT(32) PREV;    !            *                                  *
000000 0  1                      !            ----                            ----
000000 0  1                      !            *                                  *
000000 0  1                      !            ----------------------------------
000000 0  1     INT SPACE;       !            .                                  .
000000 0  1                      !            .     space unlocked if pool       .
000000 0  1                      !            .     is resident.                 .
000000 0  1                      !            .                                  .
000000 0  1                      !            ----------------------------------
000000 0  1     INT ENDTAG;      ! size-1:   *             size                 *
000000 0  1                      !            ----------------------------------
000000 0  1
000000 0  1
000000 0  1                      !            ----------------------------------
000000 0  1                      !       0:  *           - size                 *     allocated
000000 0  1
000000 0  1                      !            ----------------------------------
000000 0  1     INT DATA =       !            .                                  .
000000 0  1            NEXT;     !            .       allocated space            .
000000 0  1                      !            .                                  .
000000 0  1                      !            ----------------------------------
000000 0  1                      ! size-1:   *           - size                 *
000000 0  1     END;             !            ----------------------------------
000000 0  0                      !
000000 0  0  !
000000 0  0  ! When memory is returned to the upper end of the pool (including CURHIGH),
000000 0  0  ! CURHIGH will be lowered and memory unlocked if applicable.
```

```
000000 0 0   ! An important feature of the boundary tag method is that it avoids fragmenting
000000 0 0   ! memory with small free storage blocks on the freelist.  The smallest block
000000 0 0   ! that can be allocated/deallocated is 8 doublewords, which represents an actua A04,RWC#4
000000 0 0   ! useable storage allocation of 28 bytes.
000000 0 0   !
000000 0 0   DEFINE
000000 0 0         MINSPLIT      =  8#,              ! minimum block size, including tags
000000 0 0                                           ! in doublewords.  Must be at least
000000 0 0                                           ! 3D to hold tags and freelist pointers.
000000 0 0         MINBLOCKSIZE = $UDBL( ( MINSPLIT - 1 ) * 4 )#;  ! = 28D
000000 0 0                                           ! Effective minimum request size, in
000000 0 0                                           ! bytes. Smaller requests will be rounde A04,RWC#4
000000 0 0                                           ! up to this size.
000000 0 0   ?SECTION SYSTEMPOOLS                                                   !B00,RWC#12
000000 0 0   !
000000 0 0   ! The following pools are predefined by Sysgen:                         B00,JDK#17
000000 0 0   !
000000 0 0   INT  .EXT SYSPOOL(`POOLHEADER ) ='SG'[SYSPOOL^SGADDR];
000000 0 0                               ! maintains the not used 'sg' addresspace.
000000 0 0                               !
000000 0 0   DEFINE MAPPOOL^AXADDR = SGD[ MAPPOOL^SGADDR >> 1 ]#;                    !C00,HA#39
000000 0 0                               ! pointer to an array of 8 poolheaders
000000 0 0                               ! whose pools are allocated out of the
000000 0 0                               ! I/O space in maps 6-13.  Each pool will
000000 0 0                               ! have a size of 8k words, but only as
000000 0 0                               ! many pools as are needed will be allocated.
000000 0 0   DEFINE  EXTPOOL^AXADDR = SGD[ EXTPOOL^SGADDR >> 1 ]#;                   !B00,JDK#17
000000 0 0                               ! Absolute extended address of a pool that   !B00,JDK#17
000000 0 0                               ! can sometimes be used instead of SYSPOOL.   B00,JDK#17
000000 0 0                               ! Data is in extended memory, not in SG.      B00,JDK#17
000000 0 0                                                                             B00,JDK#17
000000 0 0   ! Since the .EXT pointer to the EXTPOOL buffer pool is beyond           !B00,JDK#17
000000 0 0   ! the normal range of SG addressing, you need to copy the pointer        B00,JDK#17
000000 0 0   ! to your local stack, with a statement such as:                         B00,JDK#17
000000 0 0   !                                                                        B00,JDK#17
000000 0 0   !  INT .EXT EXTPOOL (POOLHEADER) := EXTPOOL^AXADDR;                      B00,JDK#17
000000 0 0                                                                            B00,JDK#17
000000 0 0   DEFINE  ZLOGPOOL^AXADDR = SGD[ MSNGRD^SGADDR >> 1 ]#;                   !B00,JDK#17
000000 0 0                               ! Absolute extended address of the pool the  !B00,JDK#17
000000 0 0                               ! SendViaMessenger procedure GETPOOLs message B00,JDK#17
000000 0 0                               ! buffers out of, for TOUCHSTONE event        B00,JDK#17
000000 0 0                               ! signatures.  The Messenger process sends    B00,JDK#17
000000 0 0                               ! and then PUTPOOLs the message buffers.      B00,JDK#17
000000 0 0   ! Since the .EXT pointer to the TOUCHSTONE buffer pool is beyond        !B00,JDK#17
000000 0 0   ! the normal range of SG addressing, you need to copy the pointer        B00,JDK#17
000000 0 0   ! to your local stack, with a statement such as:                         B00,JDK#17
00000^ 0 0   !                                                                        B00,JDK#17
00^    0 0   !  INT .EXT ZLOGPOOL (POOLHEADER) := ZLOGPOOL^AXADDR;                    B00,JDK#17
000000 0 0   ! The I/O address space in absolute segments 6-13 (which is also maps 6-13   A06,wbb #5
000000 0 0   ! for ROSEWOOD) is maintained by the "IOSPACETABLE" (IOS), which             A06,wbb #5
000000 0 0   ! has a four-word entry per block.  This entry will hold the absolute
000000 0 0   ! extended starting address and the size of the block.  On space
000000 0 0   ! allocation or deallocation the table will be scanned either for
000000 0 0   ! first fit on allocation, or for address match on deallocation.  On a
```

```
000000 0  0   ! split or join the rear part of the table will be blockmoved.  The
000000 0  0   ! table resides in system data, and is allocated by Sysgen.  The
000000 0  0   ! allocated I/O space grows upwards.  Allocation will fail when the I/O
000000 0  0   ! space grows out of map (segment) 13.                                    A06,wbb #5
000000 0  0
000000 0  0   INT .IOS = 'SG'[IOS^SGADDR];
000000 0  0   INT(32) .IOSDBL = IOS;
000000 0  0
000000 0  0   ! The IOS has a negatively-indexed header that keeps track of the current
000000 0  0   ! upper end of I/O space and some entry information:
000000 0  0   !
000000 0  0   STRUCT IOSHEAD ( * );
000000 0  0      BEGIN                           !        ----------------------------------
000000 0  1      INT(32) CURTOP;                 !  -4:   *   abs.ext.addrs. of the        *
000000 0  1                                      !        ----                          ----
000000 0  1                                      !  -3:   *   first word of free I/O space *
000000 0  1                                      !        ----------------------------------
000000 0  1      INT CURENTRIES;                 !  -2:   *  current # of entries in table *
000000 0  1                                      !        ----------------------------------
000000 0  1      INT MAXENTRIES;                 !  -1:   *  tablesize in entries          *
000000 0  1      END;                            !        ----------------------------------
000000 0  0   INT .IOS^STD^HDR( IOSHEAD ) = IOS;
000000 0  0   DEFINE  IOSTABLE = IOS^STD^HDR[ -1 ]#;
000000 0  0
000000 0  0
000000 0  0   ! If a MAPPOOL is allocated out of this space, it will be taken care that
000000 0  0   ! it does not cross a map (segment) boundary.                             A06,wbb #5
000000 0  0   !
000000 0  0   ! The format of the table entries is:
000000 0  0   !
000000 0  0   !              ----------------------------------
000000 0  0   !       0:     *                                *
000000 0  0   !              ----     abs. ext. address     ----
000000 0  0   !       1:     *                                *
000000 0  0   !              ----------------------------------
000000 0  0   !       2:     *                                *
000000 0  0   !              ----     block size in bytes   ----
000000 0  0   !       3:     *                                *
000000 0  0   !              ----------------------------------
000000 0  0   !
000000 0  0   ! The initial table will have no entry.
000000 0  0
000000 0  ^      ION KCCBLAYOUT                                                       !B00,RWC#12
000000 0  0   ! Kernel Counter/Control Block
000000 0  0   LITERAL WRITE^QUEUE^DEPTH = 4; ! max dirty pages queued for writing
000000 0  0
000000 0  0   STRUCT KCCB^TEMPLATE(*);
000000 0  0      BEGIN
000000 0  1      INT  MEMSIZE,                ! physical memory size in pages
000000 0  1           FIRSTVIRT,              ! first page not locked by Sysgen
000000 0  1           SWAPPABLE,              ! pages after fixed resident area
000000 0  1           FREEPAGES,              ! unassigned pages
000000 0  1           CURLOCKS,               ! current # of locked pages
000000 0  1           MAXLOCKS,               ! maximum allowed locks for waited locks    A04,RWC#4
000000 0  1           CLOCK^PTR,              ! physical page # where last search ended   A04,RWC#4
000000 0  1           HIGHLOCKS;              ! max pages ever locked                     A04,RWC#4
```

```
000000 0  1    INT LAST^FRAME^CLEANED;            ! Last frame removed from WRITE^QUEUE and
000000 0  1                                       ! cleaned. Good candidate for replacement.
000000 0  1
000000 0  1    INT WRITE^QUEUE[ 0:WRITE^QUEUE^DEPTH ]; !queue of dirty pages to write
000000 0  1                                          ! WRITE^QUEUE[0] is queue depth.    A04,RWC#4
000000 0  1    INT LB^FREE^SEGS,                  ! Lower bound of segment table free entries   A04,RWC#4
000000 0  1        MAX^SEG^USED;                  ! Highest segment number ever used   A04,RWC#4
000000 0  1                                                                          !A04,RWC#4
000000 0  1    INT DCT^LTRAN,                     ! Size of DCT that came as PIODATA    B00,JDK#24
000000 0  1        DST^LTRAN;                     ! Size of DST that came as PIODATA    B00,JDK#24
000000 0  1                                                                          !B00,JDK#24
000000 0  1    INT(32) UCME^TEST^AXADDR;          ! Absolute address for testing UCME's  B10,DW #26
000000 0  1                                                                          !B10,DW #26
000000 0  1    INT DISABLETRACECOUNT,             ! # of calls to DISABLETRACE since ENABLED   C00,GSC#41
000000 0  1        IOFIRST,                       ! First index into free table         B20,Antigen-HA#27
000000 0  1        IOMAX,                         ! Max ever used                       B20,Antigen-HA#27
000000 0  1        IOCURR,                        ! Current pages in use count          B20,Antigen-HA#27
000000 0  1        IOFAILS;                       ! Failures to allocate I/O pages      B20,Antigen-HA#27
000000 0  1    INT(32) IOCYCLES;                  ! Number of rounds made               B20,Antigen-HA#27
000000 0  1    INT IOSPARE[0:1];                  ! To be used soon                     B20,Antigen-HA#27
000000 0  1                                                                          !B20,Antigen-HA#27
000000 0  1    INT   SEGMENTS^ALLOCATED;          ! number of segments currently allocated   B40,RKS #35
000000 0  1    INT   SPARE[0:3];                  ! Spares, what's left of them         B40,RKS #35
000000 0  1
000000 0  1    FIXED   BASE^TIME,                 ! Measurement start time
000000 0  1            BEGIN^IDLE,                ! Start of latest idle period
000000 0  1            END^IDLE,                  ! End of idle period (zero if none)
000000 0  1            TOTAL^IDLE,                ! Sum of all idle periods
000000 0  1            SPARE^TIME[0:9];
000000 0  1
000000 0  1    INT(32) COUNTER[0:-1],             ! Dummy counter array name
000000 0  1          CLOCK^CALLS,
000000 0  1          CLOCK^FREE,
000000 0  1          CLOCK^REPLACES,
000000 0  1          CLOCK^LAST^CLEANED,
000000 0  1          CLOCK^CYCLES,
000000 0  1          CLOCK^FAILURES,
000000 0  1          LOCK^MEM^CALLS,
000000 0  1          LOCK^MEM^FAILURES,
000000 0  1          LOCK^MEM^TIMERS,
000000 0  1          UNLOCK^MEM^CALLS,
000000 0  1          LOCK^MEM^TIMEOUTS,
000000 ^             RESIDENT^GETPOOLS,
000000 0  1          POOL^PAGES^LOCKED,  ! NOT USED !
000000 0  1          RESIDENT^PUTPOOLS,
000000 0  1          POOL^PAGES^UNLOCKED,  ! NOT USED !
000000 0  1          PAGE^FAULTS[0:-1];
000000 0  1     INT D, PAGECNT;                   ! previously in low SG
000000 0  1     INT(32) PAGE^CLEAN^IOS,
000000 0  1          PREPAGES^CLEANED,
000000 0  1          PAGES^CREATED,
000000 0  1          PAGE^READ^IOS,
000000 0  1          PREPAGES^READ,
000000 0  1          PREPAGES^NEEDED,
000000 0  1          PAGE^CLEAN^MSGS,         ! count of resident cache msgs sent by memman   B00,RWC#15
000000 0  1                                                                          !B00,RWC#12
000000 0  1          UNSEQ^SENDS,             ! unsequenced packets sent            B00,RWC#12
```

```
000000 0  1          LCB^SENDS,                ! control packet sent                            B00,RWC#12
000000 0  1          SEND^DATA^DIST[0:15],     ! distribution of message lengths                B00,RWC#12
000000 0  1  ! DIST[ 0  1  2  3   4   5   6    7    8    9   10  11  12  13   14   15           B30,Performance#34
000000 0  1  !      >0 >4 >8 >16 >32 >64 >128 >256 >512 >1K >2K >4K >8K >16K >32K ---           B30,Performance#34
000000 0  1          INTERRUPTS[ 0 : 23 ];     ! interrupt counters, by interrupt type          B30,Performance#34
000000 0  1                                                                                    !B30,Performance#34
000000 0  1    ! The following counters keep tabs on the cache hits and misses for              B30,Performance#34
000000 0  1    ! message-system (READLINK) cacheing.  and misses.  They are                      B30,Performance#34
000000 0  1    ! divided up into various kinds of hits and misses.  PEEK computes               B30,Performance#34
000000 0  1    ! the totals.                                                                    B30,Performance#34
000000 0  1                                                                                    !B30,Performance#34
000000 0  1    INT(32) NODATAWASSENT;    ! A miss.  No data was sent.  Data too                 B30,Performance#34
000000 0  1                              ! long, or LCB came via FOX.  Yawn.                    B30,Performance#34
000000 0  1    INT(32) BUFFSTOLEN1;      ! A miss on the first READLINK for this                B30,Performance#34
000000 0  1                              ! message, because the buffer was stolen.              B30,Performance#34
000000 0  1    INT(32) BUFFSTOLEN2;      ! A miss on a later READLINK, because the              B30,Performance#34
000000 0  1                              ! buffer was stolen.                                   B30,Performance#34
000000 0  1    INT(32) CACHEUSED1;       ! A cache hit on the first READLINK for                B30,Performance#34
000000 0  1                              ! this message.  Oh frabjous joy!!                     B30,Performance#34
000000 0  1    INT(32) CACHEUSED2;       ! A cache hit on a later READLINK.  Probably           B30,Performance#34
000000 0  1                              ! unusual, but why not measure to find out?            B30,Performance#34
000000 0  1                                                                                    !B30,Performance#34
000000 0  1    INT(32) ITEMSCACHED;      ! Must be at least equal to sum of                     B30,Performance#34
000000 0  1                              ! CACHEUSED1 and BUFFSTOLEN1.                          B30,Performance#34
000000 0  1    INT(32) BADSTEALS;        ! Must be less than BUFFSTOLEN1.                       B30,Performance#34
000000 0  1    INT(32) LARGEST^SEG^EVER;! byte length of largest allocated segement             B40,RKS #35
000000 0  1                                                                                    !B30,Performance#34
000000 0  1    INT(32) SPARE^CTRS[0:12];! Fewer spares than there used to be                    B40,RKS #35
000000 0  1    END;
000000 0  0  INT .KCCB(KCCB^TEMPLATE) = 'SG'[ KCCB^SGADDR ] ;
000000 0  0  ?SECTION ADDRESSING                                                               !B00,RWC#12
000000 0  0  !**********************************************************************
000000 0  0  !***                         VIRTUAL MEMORY                           ***
000000 0  0  !**********************************************************************
000000 0  0  !***
000000 0  0  !*** Extended Addresses
000000 0  0  !***
000000 0  0  !
000000 0  0  ! The TNS II supports virtual 32-bit "extended" addresses. The extended address A04,RWC#4
000000 0  0  ! space consists of 8192 absolute segments; each segment contains 64 pages;
000000 0  0  ! each page is 2048 bytes.  The format of an Absolute Extended Address is:
000000 0  0  !
000000 0  0  !        0  1  2                         14  15          20  21          31
000000 0  0  !       ---------------------------------------------------------------------
000000 0  0  !       * 1  0 * Absolute Segment (13 bits) * Page (6 bits) * Byte (11 bits)*
000000 0  0  !       ---------------------------------------------------------------------
000000 0  0  !
000000 0  0  ! The "1" in bit 0 designates an "absolute" extended address.. Only privileged
000000 0  0  ! mode programs may use absolute extended addresses.
000000 0  0  !
000000 0  0  ! The format of a Relocatable Extended Address is:
000000 0  0  !
000000 0  0  !        0  1  2                         14  15          20  21          31
000000 0  0  !       ---------------------------------------------------------------------
000000 0  0  !       * 0  0 * Relocatable Seg (13 bits) * Page (6 bits) * Byte (11 bits) *
000000 0  0  !       ---------------------------------------------------------------------
000000 0  0  !
```

```
000000 0 0   ! The first 4 relocatable segments are always defined as:
000000 0 0   LITERAL                                                                          !A04,RWC#4
000000 0 0      CURRENTDATASEG = 0,  !  Current Data Segment (User Data or System Data Seg)   A04,RWC#4
000000 0 0   !
000000 0 0      SYSTEMDATASEG  = 1,  !  System Data Segment (always absolute segment 1)       B00,RWC#12
000000 0 0   !
000000 0 0      CURRENTCODESEG = 2,  !  Current Code Segment (User/System Code/Library)       A06,wbb #5
000000 0 0   !                                                                                A04,RWC#4
000000 0 0      USERCODESEG    = 3,  !  User Code Segment                                     A04,RWC#4
000000 0 0   !
000000 0 0   ! Relocatable segments 4-n are relocated to the current Extended Data Segment   A04,RWC#4
000000 0 0                                                                                    !A04,RWC#4
000000 0 0      EXTENDEDDATASEG =4;  ! Base of Extended Data Segment                          A04,RWC#4
000000 0 0                                                                                    !A04,RWC#4
000000 0 0   ! Addresses in segments 4-n are relocated to absolute segments by adding the
000000 0 0   ! address to the Segment Base and comparing it to the Segment Limit (XB and XL  A06,wbb #5
000000 0 0   ! respectively, kept in 32-bit registers in CASTLE and in map 14 entries 60-    A06,wbb #5
000000 0 0   ! 63 in ROSEWOOD).  Note that the Segment Base need not begin at a segment      A06,wbb #5
000000 0 0   ! (or even a page) boundary.  Thus, the extended address space may be located
000000 0 0   ! on any boundary and be arbitrarily small.
000000 0 0   !                                                                                B00,RWC#12
000000 0 0   ! The following general purpose DEFINEs manipulate extended addresses.          B00,RWC#12
000000 0 0   DEFINE                                                                          !B00,RWC#12
000000 0 0   ! Given an absolute segment number, return the number of pages in the seg.     B00,RWC#12
000000 0 0          SEGSIZE( S ) = ( $HIGH( SEG[ S ] ).SEGNPAGES )#, ! privileged           B20, MTR#29
000000 0 0                                                                                   !B00,RWC#12
000000 0 0   ! Given an extended address, extract the logical segment number.               B00,RWC#12
000000 0 0          LSEG( XA ) = ( $HIGH( XA ).<0:14> )#,                                   !B00,RWC#12
000000 0 0                                                                                   !B00,RWC#12
000000 0 r     Given an absolute extended address, extract the segment number.              B00,RWC#12
000000 '            ASEG( XA ) = ( $HIGH( XA ).<2:14> )#,                                   !B00,RWC#12
000000 0 0                                                                                   !B00,RWC#12
000000 0 0   ! Given an extended address, extract the logical page num or word/byte address B00,RWC#12
000000 0 0          LPAGE( X ) = ($HIGH( (X) '<<' 5) LAND %77)#,   ! logical page           B00,RWC#12
000000 0 0          LWORD( XA ) = ($INT( (XA) '>>' 1) )#,           ! logical word address   B00,RWC#12
000000 0 0          LBYTE( XA ) = ($INT( XA ) )#,                   ! logical byte address   B00,RWC#12
000000 0 0                                                                                   !B00,RWC#12
000000 0 0   ! Form extended address from an absolute segment num and a word/byte offset.   B00,RWC#12
000000 0 0          AXWORD( SEG, WORD ) = ($DBLL( %40000 + SEG, WORD)'<<'1)#,               !B00,RWC#12
000000 0 0          AXBYTE( SEG, BYTE ) = $DBLL(%100000'+'(SEG)'<<'1, BYTE)#,!best for first B00,RWC#12
000000 0 0                                                                                   !B00,RWC#12
000000 0 0   ! Form extended address from an relocatable segment num and a word/byte offset B00,RWC#12
000000 0 0            XWORD( SEG, WORD ) = ($DBLL(SEG, WORD)'<<'1)#,                        !B00,RWC#12
000000 0 0            XBYTE( SEG, BYTE ) = $DBLL((SEG)'<<'1, BYTE)#; ! best for first w/b   B00,RWC#12
000000 0 0                                                                                   !B00,RWC#12
000000 0 0   ! To obtain the absolute address of a memory location, use the $AXADR function B00,RWC#12
000000 0 0   ! in TAL. To convert an INT(32) pointer from relocateable to absolute, use:    B00,RWC#12
000000 0 0     DEFINE CRAXADR( ADRS ) = BEGIN STACK ADRS; CODE ( CRAX ); STORE ADRS END#;  !B00,RWC#12
000000 0 0   ?SECTION PAGETABLE                                                            !B00,RWC#12
000000 0 0   !***
000000 0 0   !*** Segment Page Tables
000000 0 0   !***
000000 0 0   !
000000 0 0   ! Each allocated segment is described by an entry in the Segment Table,
000000 0 0   ! described below, and a Segment Page Table, which consists of a header
000000 0 0   ! and from 1 to 64 Page Table Entries.  Each Page Table Entry has the format:
000000 0 0   !
```

```
000000 0  0    !           0 . . . . . . . . . . . . 12  13  14  15
000000 0  0    !          -----------------------------------------
000000 0  0    !          *   Frame (physical page #)  * R * D * A *
000000 0  0    !          -----------------------------------------
000000 0  0    !
000000 0  0    ! Page Table Entry fields:
000000 0  0       DEFINE  MFRAME = <0:12>#,      ! physical page frame
000000 0  0               REFERENCED = <13>#,    ! reference bit
000000 0  0               DIRTY = <14>#,         ! dirty bit
000000 0  0               ABSENT = <15>#;        ! page absent bit
000000 0  0
000000 0  0    ! If a page is absent from memory, the PTE will have the value %000001.        A06,wbb #5
000000 0  0    ! If a page is prepaged (loaded in memory before it is demanded), then the PTE
000000 0  0    ! will contain the page frame # that it occupies, but the absent bit will be
000000 0  0    ! set and a reference to the page will cause a page fault.
000000 0  0
000000 0            'er of PTEs is defined by the Segment Table Entry.
000000 0  0    ! The SPT headers have the following forms:
000000 0  0    STRUCT SPT^TEMPLATE (*);
000000 0  0       BEGIN                              !          ==================================
000000 0  1       INT  SWAPMAP[ 0:3 ];               ! -%17     *                                * A06,NRD#8
000000 0  1       ! 64-bit map; if zero then page       to      *   Primary Swap Map             *
000000 0  1       ! is in swapfile, otherwise          -%14     *                                * A06,NRD#8
000000 0  1       ! consult INITMAP.                            *                                *
000000 0  1                                          !          ==================================
000000 0  1       INT  INITMAP[ 0:3 ];               ! -%13     *                                * A06,NRD#8
000000 0  1       ! 64-bit map; if one then             to      *   Initial Data Swap Map        *
000000 0  1       ! initial data in progfile           -%10     *                                * A06,NRD#8
000000 0  1       ! otherwise zero page.                        *                                *
000000 0  1       INT(32)  SWAPOFFSET;               !          ================================== A06,NRD#8
000000 0  1                                          !          *        Byte  Offset            * A06,NRD#8
000000 0  1                                          !          ----                          ---- A06,NRD#8
000000 0  1                                          !     -6:  * into swap file of 1st page     * A06,NRD#8
000000 0  1                                          !          ---------------------------------- A06,NRD#8
000000 0  1       INT  SWAPFNUM;                     !     -5:  *  file number of swap file      *
000000 0  1                                          !          ----------------------------------
000000 0  1       INT  INITFNUM;                     !     -4:  *  fnum of code or initial data  * A06,RWC#11
000000 0  1                                          !          ----------------------------------
000000 0  1       INT(32) OFFSET[0:-1];              !     -3:  *. byte offset into program      * B00,RWC#15
000000 0  1       INT  OWNER;                        !          *  file for code and data segs.  * B40,MTR#36
000000 0  1       INT  RELSEGNUM;                    !          *  owner and segno for res cache * B00,RWC#15
000000 0  1                                          !          ----------------------------------
000000 0  1       INT  TYPEUSE;                      !     -1:  *  segment type & usage count    *
000000 0  1                                          !          ---------------------------------- A04,RWC#4
000000 0  1       INT  PAGETABLE[ 0 : -1 ];          !      0:  *  1 to 64 page table entries    * A04,RWC#4
000000 0  1       END;                               !          ----------------------------------
000000 0  0
000000 0  0    DEFINE  SPTUSE      = SPT.TYPEUSE.<0:8>#,  ! Segment use count                   C00,resizesegment#40
000000 0  0            SPTUSEMAX   =  512#,               ! Maximum value thereof               C00,resizesegment#40
000000 0  0            SPTXTENSIBLE = SPT.TYPEUSE.<9>#,   ! extensible segment                  C00,resizesegment#40
000000 0  0        SPTCOMPSTACKSEG = SPT.TYPEUSE.<10>#,   ! Compressed stack segment            B20,EPN#28
000000 0  0            SPTSHARE    = SPT.TYPEUSE.<11>#,   ! Share segment                       B30,MTR#30
000000 0  0            SPTXTAL     = SPT.TYPEUSE.<12>#,   ! Swapfile extent allocation needed   B30,MTR#30
000000 0  0            SPTRESIZE   = SPT.TYPEUSE.<13>#,   ! resize in progress                  C00,resizesegment#40
000000 0  0            SPTSEGTYPE = SPT.TYPEUSE.<14:15>#, ! Bits specified in GETSEGMENT        A04,RWC#4
000000 0  0            SPTRESIDENT = SPT.TYPEUSE.<14>#,   ! Resident segment: no swapfile.      A04,RWC#4
000000 0  0            SPTDATA     = (SPTSEGTYPE = 1)#,   ! Dirty pages get written back        B00,RWC#15
```

```
000000 0 0                                      ! before being replaced.              A04,RWC#4
000000 0 0      SPTCODE       = (SPTSEGTYPE = 0)#, ! Neither DATA nor RESIDENT        B00,RWC#15
000000 0 0      SPTRESIDENTCACHE = (SPTSEGTYPE = 3)#,! Resident cache segment         B00,RWC#15
000000 0 0      SPTCLEANABLE = (SPTDATA OR         ! Either DATA or RESIDENTCACHE     B40,MTR#36
000000 0 0                SPTRESIDENTCACHE AND NOT SPTNOCLEANING)#,                  !B40,MTR#36
000000 0 0      SPTOWNERPID  = SPT.OWNER.<4:15>#, ! Owner's pid                       B40,MTR#36
000000 0 0      SPTNOCLEANING= SPT.OWNER.<0>#;     ! Owner disabled cleaning          B40,MTR#36
000000 0 0                                                                           !B40,MTR#36
000000 0 0  ! Each segment type is handled differently for pagefaults, page replacement, B00,RWC#15
000000 0 0  ! and pool allocation.  Types are:
000000 0 0  LITERAL
000000 0 0    SPTCODESEG  = %B00,   ! Code Segment.  Pages are read from the program file  A04,RWC#4
000000 0 0                          ! Dirty pages never written back.                     A04,RWC#4
000000 0 0                          ! SPT header is 4 words. (TYPEUSE, OFFSET, INITFNUM).  A04,RWC#4
000000 0 0
000000 0 0      TASEG    = %B01,    ! Data Stack Segment.  Initial data pages read from   A04,RWC#4
000000.                             ! the initial data file if bit set in INITMAP.        A04,RWC#4
000000 0 0                          ! Dirty pages are written back to the swap file.
000000 0 0                          ! SPT header is 15 words. SWAPOFFSET contains the     A06,NRD#8
000000 0 0                          ! offset of the first page of this segment in the     A06,NRD#8
000000 0 0                          ! swap file. OFFSET contains the offset of the        A06,NRD#8
000000 0 0                          ! first initial data page in the program file for     A06,NRD#8
000000 0 0                          ! data stack segments and COBOL extended segments.    A06,NRD#8
000000 0 0
000000 0 0    SPTRESSEG   = %B10,   ! Resident Data Segment (PFS or I/O).  No swapping at B00,RWC#15
000000 0 0                          ! all.  Pagefaults cause illegal address reference
000000 0 0                          ! traps.
000000 0 0                          ! SPT header is one word (TYPEUSE)
000000 0 0
000000 0 0                          ! To use memory in a resident data segment, a program
000000 0 0                          ! should either explicitly LOCKMEMORY the desired
000000 0 0                          ! locations, or use GETPOOL/PUTPOOL which will auto-
000000 0 0                          ! matically allocate and lock memory.
000000 0 0                                                                           !B00,RWC#15
000000 0 0    SPTRESCACHESEG = %B11;! Resident Cache Segment ( special resident segment ) B00,RWC#15
000000 0 0                          ! Memory Manager will not reclaim unlocked dirty      B00,RWC#15
000000 0 0                          ! without notifying the owner.  Owner may retain the  B00,RWC#15
000000 0 0                          ! page by dirtying it again.  These segments are      B00,RWC#15
000000 0 0                          ! created by ALLOCATESEGMENT if the segid is between  B00,RWC#15
000000 0 0                          ! FIRST^CACHE^SEGMENT^ID and LAST^CACHE^SEGMENT^ID.   B00,RWC#15
000000 0 0                          ! SPT header is three words                           B00,RWC#15
000000 0 0                          ! (TYPEUSE, OWNERPID and RELSEGNUM ). OWNERPID is the B00,RWC#15
000000 0 0                          ! owner of the resident segment and RELSEGNUM is      B00,RWC#15
000000 0 0                          ! the relative segment number of this absolute segment B00,RWC#15
000000 0 0                          ! within the extended segment.                        B00,RWC#15
000000 0 0                                                                           !B00,RWC#15
000000 0 0  ! Determine length of header                                              A04,RWC#4
000000 0 0   DEFINE  SPTHEADERLENGTH = (CASE SPTSEGTYPE OF                           !A04,RWC#4
000000 0 0                             BEGIN                                         !A04,RWC#4
000000 0 0                             4;                       ! 0: CODE   !        !A04,RWC#4
000000 0 0                             WLEN( SPT^TEMPLATE );    ! 1: DATA   !        !A04,RWC#4
000000 0 0                             1;                       ! 2: RES    !        !A04,RWC#4
000000 0 0                             3;                       ! 3: esident Cache ! !B00,RWC#15
000000 0 0                             END)#;                                        !A04,RWC#4
000000 0 0                                                                           !A04,RWC#4
000000 0 0  ! The ASPT instruction can be used to find the SPT of a segment.          A04,RWC#4
000000 0 0  LITERAL ASPT^OPCODE = %470; ! used until TAL knows about ASPT             A04,RWC#4
```

```
7116.   000000 0  0  ! To find the SPT, use one of the following defines:                         A04,RWC#4
7117.   000000 0  0  !                                                                            A04,RWC#4
7118.   000000 0  0  DEFINE STACK^ASPT( EXT^ADDR ) = ! Given an extended address                  A04,RWC#4
7119.   000000 0  0           BEGIN                                                              !A04,RWC#4
7120.   000000 0  0           STACK $LEN( SPT^TEMPLATE ), EXT^ADDR;                              !A04,RWC#4
7121.   000000 0  0  !                                                                            A04,RWC#4
7122.   000000 0  0           CODE (CON ASPT^OPCODE);! @PAGETABLE(BA) - C                         A04,RWC#4
7123.   000000 0  0           CODE (STRP $RP-1); ! Needed to fake out TAL                         A04,RWC#4
7124.   000000 0  0           END#;                                                              !A04,RWC#4
7125.   000000 0  0  ! [ Should it become desireable to remove the ASPT instruction, replace the ] A04,RWC#4
7126.   000000 0  0  ! [ preceeding define with one which calls a procedure:                    ] A04,RWC#4
7127.   000000 0  0  ! [ DEFINE STACK^ASPT( EXT^ADDR ) = STACK PAGETABLEHEAD( EXT^ADDR )#;      ] A04,RWC#4
7128.   000000 0  0  ! [ This procedure must also set $CARRY if a failure is detected.          ] A04,RWC#4
7129.   000000 0  0                                                                              !A04,RWC#4
7130.   000000 0  0  ! The define places the absolute extended address of the SPT on the stack.   A04,RWC#4
7131.   000000 0  0  ! The $CARRY flag is set if the segment does not exist.                      A04,RWC#4
7132.   000000 0  0  ! The byte address is not checked for validity.                              A04,RWC#4

8000.   000000 0  0  ?SECTION MAPPING
8002.   000000 0  0  !***
8003.   000000 0  0  !*** Segment Table
8004.   000000 0  0  !***
8005.   000000 0  0  ! Segments are described by a Segment Table, containing up to 8192 doublewords.
8006.   000000 0  0  ! The (up to 16) pages of the Segment Table are themselves located in segment
8007.   000000 0  0  ! 14, starting at word %70000
8008.   000000 0  0  !
8009.   000000 0  0  DEFINE SEGTAB^AXADDR = AXWORD( MEMCONTROLSEG, %70000)#;                      !B00,RWC#12
8011.   000000 0  0  INT(32) .EXT SEG    = 'SG'[ SEG^SGADDR ]; ! pointer to segment table
8013.   000000 0  0  INT SEGTABSIZE ='SG'[ SEGTABSIZE^SGADDR ];! current size of segment table
8014.   000000 0  0                                            ! (entries)
8015.   000000 0  0
8016.   000000 0  0  ! Each ROSEWOOD segment table (SEG) entry is a doubleword in the format:       A06,wbb #5
8017.   000000 0  0  !
8018.   000000 0  0  !          0 . . . 4  5  6 . 8  9 . . . . . 15
8019.   000000 0  0  !          ------------------------------------------------
8020.   000000 0  0  !          *    Mapped     *  SptSeg   *  # Pages in Seg  *            B00,RWC#12
8021.   000000 0  0  !          ------------------------------------------------
8022.   000000 0  0  !          *        Pagetable Address (in SptSeg)         *            B00,RWC#12
8023.   000000 0  0  !          ------------------------------------------------
8024.   000000 0  0  !
8025.   000000 0  0  ! At any given time, each segment is either mapped or not mapped.  If it is
8026.   000000 0  0  ! mapped, its Segment Page Table has been loaded into one of the 16 hardware   B00,RWC#12
8027.   000000 0  0  ! segment maps.  In this case, 'Mapped' contains the map number; otherwise,   B00,RWC#12
8028.   000000 0  0  ! 'Mapped' contains %37.                                                      B00,RWC#12
8029.   000000 0  0                                                                               !B20, MTR#29
8029.01 000000 0  0  ! The following lay out the high order word of a SEG entry:                   B20, MTR#29
8029.02 000000 0  0                                                                               !B20, MTR#29
8029.03 000000 0  0  DEFINE  SEGUNMAPPED = <0>#,    ! not mapped (rosewood)                        B20, MTR#29
8029.04 000000 0  0          SEGMAPPED   = <0:4>#,  ! current map # (rosewood)                     B20, MTR#29
8029.05 000000 0  0          SEGSPTSEG   = <5:8>#,  ! spt segment number (6-13 if valid)           B20, MTR#29
8029.06 000000 0  0          SEGNPAGES   = <9:15>#, ! # of pages (1-64 if valid)                   B20, MTR#29
8029.07 000000 0  0          SEGASTATE   = <5:15>#; ! allocation state (0-free %3600-res %3400-resx) B20, MTR#29
8029.08 000000 0  0                                                                               !B20, MTR#29
8029.09 000000 0  0  LITERAL SEGFREE     = %174000, ! free                                         B20, MTR#29
8029.1  000000 0  0          SEGRES      = %177600, ! reserved but unallocated                     B20, MTR#29
8029.11 000000 0  0          SEGRESX     = %177400; ! reserved for extension but unallocated       B20, MTR#29
8029.12 000000 0  0                                                                               !B20, MTR#29
```

```
000000 0  0   ! Segment mapping on Rosewood has three main purposes.  First, most 16-bit     B00,RWC#12
000000 0  0   ! addresses are translated by refering to a particular map, such as           B00,RWC#12
000000 0  0   ! user or system data, user or system code, or user or system library.        B00,RWC#12
000000 0  0   ! Map selection is encoded in each instruction and the environment register.  B00,RWC#12
000000 0  0   ! Maps 0-5 are used for this purpose.                                         B00,RWC#12
000000 0  0   !                                                                             B00,RWC#12
000000 0  0   ! Second, certain functions require that the memory being referenced          B00,RWC#12
000000 0  0   ! is already mapped and accessible without a map cache fill operation.        B00,RWC#12
000000 0  0   ! These operations include I/O transfers and references to page tables,       B00,RWC#12
000000 0  0   ! the segment table, and PHYSEG.  Maps 6-14 are used for this purpose.        B00,RWC#12
000000 0  0                                                                                !B00,RWC#12
000000 0  0   ! Third, all physical memory references require the use of some map           B00,RWC#12
000000 0  0   ! entry.  Map 15 is used as to access all memory that is not already          B00,RWC#12
000000 0  0   ! mapped.  When an unmapped segment is referenced, the appropriate            B00,RWC#12
000000 0  0   ! page table entry must be loaded into an entry of map 15; map 15 is          B00,RWC#12
000000 0  0   ! maintained as a cache containing the recently used page table entries.      B00,RWC#12
000000 0  0                                                                                !B00,RWC#12
000000 0  0   ! The currently mapped segments (ROSEWOOD) are described by the array:        B00,RWC#12
000000 0  0                                                                                !B00,RWC#12
000000 0  0   DEFINE  CMSEG( X ) = SG[ %1340+X ]#;                                         !B00,RWC#12
000000 0  0                                                                                !B00,RWC#12
000000 0  0                                                                                !B00,RWC#12
000000 0  0                                                                                !B00,RWC#12
000000 0  0   ! Each CASTLE segment table (SEG) entry is a doubleword in the format:        A06,wbb #5
000000 0  0   !                                                                             A06,wbb #5
000000 0  0   !           0 . . . 4  5  6 . 8  9 . . . . . . 15                             A06,wbb #5
000000 0  0   !           ---------------------------------------------                     A06,wbb #5
000000 0  0   !           *  Unused     *  SptSeg   *   # Pages in Seg  *                   B00,RWC#12
000000 0  0   !           ---------------------------------------------                     B00,RWC#12
000000 0  0   !           *        Pagetable Address (in SptSeg)        *                   B00,RWC#12
000000 0  0   !           ---------------------------------------------                     B00,RWC#12
000000 0  0   !                                                                             A06,wbb #5
000000 0  0   ! At any given time, segments 0-15 can be considered to be mapped in that     A06,wbb #5
000000 0  0   ! their pagetable entries are all present in PCACHE.  The page table entries  A06,wbb #5
000000 0  0   ! for all other segments are faulted into PCACHE by the microcode as          A06,wbb #5
000000 0  0   ! referenced.  See the CASTLE Instruction Set Definition for details.         A06,wbb #5
000000 0  0                                                                                !A06,wbb #5
000000 0  0   ! Mem[ SptSeg, Pagetable Address ] is the location of the Segment Page Table  B00,RWC#12
000000 0  0   ! (SPT) for the segment.  All SPTs are allocated in MAPPOOL which is allocated B00,RWC#12
000000 0  0   ! in segments 6-13.  On Rosewood, these segments are permanently mapped, while B00,RWC#12
000000 0  0   ! on Castle these segments have permanently assigned PCACHE entries.  In either B00,RWC#12
000000 0  0   ! case, fetching data for an I/O transfer or a page table entry for MAPPOOL   B00,RWC#12
000000 0  0   ! never requires a main memory reference.                                     B00,RWC#12
000000 0  0                                                                                !A06,wbb #5
000000 0  0   ! In place of maps, CASTLE has the concept of a "short address space".  There A06,wbb #5
000000 0  0   ! are 16 short address spaces, which correspond closely to ROSEWOOD's 16      A06,wbb #5
000000 0  0   ! currently-mapped segments.  Each space has a corresponding absolute segment A06,wbb #5
000000 0  0   ! number, which can be set to -1 via the MAPS instruction if that space is    A06,wbb #5
000000 0  0   ! to be invalidated.  CASTLE keeps the 16 current segment numbers in a set    A06,wbb #5
000000 0  0   ! of registers called the Short Segment Table (SST).  The MAPS instruction is A06,wbb #5
000000 0  0   ! used to alter the SST.  It does not have to copy page table entries between A06,wbb #5
000000 0  0   ! memory and hardware registers, since the microcode moves page table entries A06,wbb #5
000000 0  0   ! into the page table cache (PCACHE) on a demand basis.  In a manner similar  A06,wbb #5
000000 0  0   ! to ROSEWOOD, MAPS keeps the Current Short Segment Table (memory copy of SST) A06,wbb #5
000000 0  0   ! updated:                                                                    A06,wbb #5
000000 0  0                                                                                !A06,wbb #5
000000 0  0   DEFINE  CSSEG( X ) = SG[ %1340+X ]#;                                         !A06,wbb #5
```

```
000000 0 0                                                                                    !A06,wbb #5
000000 0 0  ! In the case of CASTLE, absolute segments 0-15 are always present in PCACHE,      A06,wbb #5
000000 0 0  ! which makes them permanently mapped in some sense.  Note the Castle              B00,RWC#12
000000 0 0  ! distinguishes between between data that is referenced using short addresses     B00,RWC#12
000000 0 0  ! (i.e., non-extended data, code addresses, I/O buffers, page tables)            B00,RWC#12
000000 0 0  ! and data that must be accessible without a PCACHE fill operation.  On           B00,RWC#12
000000 0 0  ! Rosewood, these two concepts were merged because the memory architecture       B00,RWC#12
000000 0 0  ! was based on the 16-bit address; Castle supports 32-bit addresses              B00,RWC#12
000000 0 0  ! and does not require that items like user data and user code be mapped         B00,RWC#12
000000 0 0  ! before they are referenced.                                                    !B00,RWC#12
000000 0 0                                                                                    !A06,wbb #5
000000 0 0                                                                                    B00,RWC#12
000000 0 0  ! Some segments are permanently allocated to a map (Rosewood) or to a short      B00,RWC#12
000000 0 0  ! address space (Castle).  For such segments, the absolute segment number        B00,RWC#12
000000 0 0  ! matches the map number.  The permanently mapped segments are:                  !B00,RWC#12
000000 0 0                                                                                    !B00,RWC#12
000000 0 0  LITERAL                                                                           B00,RWC#12
000000 0 0  !       SYSTEMDATASEG =  1, -  System Data Segment                               B00,RWC#12
000000 0 0          SYSTEMCODESEG =  3, !  System Code Segment                               B00,RWC#12
000000 0 0          IOPOOLSEG     =  6, !  through 13 - MAPPOOL and IOPOOL Segments          B00,RWC#12
000000 0 0          MEMCONTROLSEG = 14,  ! SEG, PHYSEG, PHYPAGE; ucode scratch (ROSEWOOD)    !B00,RWC#12
000000 0 0  ! On Rosewood, map 15 is the map (or page table) cache and never has a segment   B00,RWC#12
000000 0 0  ! mapped in it.  On Castle, short segment 15 contains the Castle microcode       B00,RWC#12
000000 0 0  ! segment where it is handy for powerfail recovery.                              B00,RWC#12
000000 0 0                                                                                    !B00,RWC#12
000000 0 0          MAPCACHEMAP    = 15,  ! Address translation cache (ROSEWOOD)             B00,RWC#12
000000 0 0          MICROCODE2SEG = 15,  ! CASTLE microcode                                  B30,Check#33
000000 0 0          MICROCODE3SEG = 15;  ! CHECK microcode                                   B30,Check#33
000000 0 0                                                                                    !A06,wbb #5
000000 0 0                                                                                    !A06,wbb #5
000000 0 0  ! With a little care, CASTLE Guardian can "borrow" an unused PCACHE entry in     A06,wbb #5
000000 0 0  ! segment 14 or 15 if it needs to ensure that the PTE stay in PCACHE for the     B00,Bastogne #22
000000 0 0  ! duration of an operation.  See CORRECTABLEMEMORYERROR's page rewriting for     B00,Bastogne #22
000000 0 0  ! an example.  (Segment 4 is no longer available for this - it's now a           B00,Bastogne #22
000000 0 0  ! "popular" code segment.)  Note that WSPT should not be used to do this,        B00,Bastogne #22
000000 0 0  ! since the segments' page tables are only large enough to hold the microcode.   B00,Bastogne #22
000000 0 0                                                                                    !A06,wbb #5
000000 0 0  LITERAL CMRWPAGE = 0;  ! CME interrupt uses segment 14, page 0 to rewrite CMEs   B00,Bastogne #22
000000 0 0                                                                                    !B00,RWC#12
000000 0 0                                                                                    !A06,wbb #5
000000 0 0  ! Of the remaining maps (ROSEWOOD)/short address spaces (CASTLE), 0, 2 and 4     B00,RWC#12
000000 0 0  ! are dedicated to the current process's Data, Code and Library segments,        B00,RWC#12
000000 0 0  ! respectively.  Absolute segment numbers 0, 2 and 4 do not have a one-to-one    B00,RWC#12
000000 0 0  ! correspondence with those maps/address spaces, and are used as described       B00,RWC#12
000000 0 0  ! below.   With Bastogne, map 5 (ROSEWOOD)/short address space 5 (CASTLE)        B00,Bastogne #14
000000 0 0  ! is no longer dedicated to a fixed segment; it may be set with any of the       B00,Bastogne #14
000000 0 0  ! system library spaces.                                                         B00,Bastogne #14
000000 0 0                                                                                    !B00,Bastogne #14
000000 0 0  LITERAL USERDATAMAP   = 0, ! User Data                                           B00,RWC#12
000000 0 0          USERCODEMAP   = 2, ! User Code                                           B00,RWC#12
000000 0 0          USERLIBMAP    = 4, ! User Library                                        B00,Bastogne #14
000000 0 0          SYSTEMLIBMAP  = 5; ! System Library                                      B00,Bastogne #14
000000 0 0
000000 0 0  !***
000000 0 0  !*** Physical Page Frame Allocation Tables - PHYSEG & PHYPAGE
000000 0 0  !***
000000 0 0  ! Main memory is described by a pair of arrays containing one word for each
```

```
000000 0  0   ! physical page frame and are index by the relative frame number.  These arrays
000000 0  0   ! follow the Segment Table in segment 14:
000000 0  0   !
000000 0  0   DEFINE PHYSEG^AXADDR = AXWORD( MEMCONTROLSEG, %130000 )#;                  !B00,RWC#12
000000 0  0   DEFINE PHYPAGE^AXADDR = AXWORD( MEMCONTROLSEG, %150000 )#;                 !B00,RWC#12
000000 0  0
000000 0  0   INT  .EXT PHYSEG = 'SG'[ PHYSEG^SGADDR ];! pointer to physical segment table  B00,RWC#12
000000 0  0
000000 0  0   INT  .EXT PHYPAGE = 'SG'[ PHYPAGE^SGADDR ];! pointer to page table            B00,RWC#12
000000 0  0   LITERAL MAX^PHYSEG^PAGES = 8;      ! 16Mb/(2KB/PAGE)/(1KWORDS/PAGE)
000000 0  0   !
000000 0  0   ! In the PHYSEG table values between %0 and %17777 indicate the segment number
000000 0  0   ! of the virtual address that is assigned to the frame.  The values %40000 and
000000 0  0   ! %40001 designate free and unuseable frames, respectively.  Negative values
000000 0  0   ! indicate that the page is locked into a memory frame and may not be replaced
000000 0  0   ! The value is a lock "byte" count.
000000 0  0
000000 0  0   ! PHYSEG Literals
000000 0  0   LITERAL FREEMEM    = %40000,        ! physical page is free
000000 0  0           UNCMEM     = %40001,        ! page has had an uncorrectable memory
000000 0  0                                       ! error and is not available for use
000000 0  0          HCMEMEM     = %40002,        ! page has a hard correctable memory    B00,RWC#18
000000 0  0                                       ! error and is not available for use    B00,RWC#18
000000 0  0          UCMETEST    = %40003,        ! page is being tested for UCME         B10,DW #26
000000 0  0        LOCKEDMEM     = -1;            ! first/last lock on page               B00,RWC#18
000000 0  0   ! The PHYPAGE table contains the page number (0-63) of the page occupying the
000000 0  0   ! frame, an indicator that a page is a code page, and a hard CME indictor.    B00,RWC#18
000000 0  0   DEFINE  PHYPLPAG = <10:15>#,                                                !B00,RWC#18
000000 0  0           PHYPHCME = <0>#,            ! page needs to be dealloc for hard cme  B00,RWC#18
000000 0  0           PHYPCODE = <1>#;            ! page is a code segment page            B00,RWC#18
000000 0  0   LITERAL PHYPCODECON = %40000;       ! value to set PHYPCODE to 1             B00,Bastogne #20
000000 0  0   ! The currently allocated extended segments are described by a Process       B00,RWC#13
000000 0  0   ! Segment Table.  This table is pointed to by PCBSEG. The PST consists of    B00,RWC#13
000000 0  0   ! a header and an array of elements pointed to by the header.  These data    B00,RWC#13
000000 0  0   ! structures are created dynamically in SYSPOOL as needed.                   B00,RWC#13
000000 0  0   !                                                                            B00,RWC#13
000000 0  0   ! This PST has a header of the following form:                               B00,RWC#13
000000 0  0                                                                               !B00,RWC#13
000000 0  0   STRUCT PSTHEAD^TEMPLATE (*);                                                !B00,RWC#13
000000 0  0      BEGIN                                                                    !B00,RWC#13
000000 0  1      INT   PSTSIZE;              ! Size of table (# of PSTs)                   B00,RWC#13
000000 0  1      INT   PSTENTS;              ! Number of active PSTs                       B00,RWC#13
000000 0  1      INT   PSTLAST;                                                           !B00,RWC#13
000000 0  1      END;                                                                     !B00,RWC#13
000000 0  0                                                                               !B00,RWC#13
000000 0  0   ! Each entry has the following layout:                                       B00,RWC#13
000000 0  0                                                                               !B00,RWC#13
000000 0  0   STRUCT PSTENT^TEMPLATE (*);                                                 !B00,RWC#13
000000 0  0      BEGIN                                                                    !B00,RWC#13
000000 0  1      INT       ID;               ! SEGID (0-4095)                              B00,RWC#13
000000 0  1      FIXED BASELIMIT[ 0 : -1 ]; !                                              B00,RWC#13
000000 0  1      INT(32)  BASE;              ! Value added to reloc. addr if seg >= 4      B00,RWC#13
000000 0  1      INT(32)  LIMIT;             ! Complement of maximum absolute ext addr     B00,RWC#13
000000 0  1      INT       SYSUSE;           ! for use by ADJUSTSEGSYSUSE                  B40,RKS #35
000000 0  1      INT       LOW^LOCK^BYTES;   ! beginning locked bytes in I/O seg           B40,RKS #35
000000 0  1      INT       HIGH^LOCK^BYTES;  ! ending locked bytes in I/O seg              B40,RKS #35
000000 0  1      END;                                                                     !B00,RWC#13
```

```
000000 0 0                                                                                !B00,RWC#13
000000 0 0   ! The Process File Segment is accessed often by the file system and, therefore,  B00,RWC#13
000000 0 0   ! has been allocated a PSTENT in the PCB itself to eliminate searching through   B00,RWC#13
000000 0 0   ! the PST.                                                                        B00,RWC#13
000000 0 0   ! Note that for the PFS only the first 3 fields ( 5 words ) are included          B40,RKS #35
000000 0 0   ! in the PCB.                                                                     B40,RKS #35
000000 0 0                                                                                    !B40,RKS #35
000000 0 0   ! pool space allocated for multiples of this many PST entries.                    B40,RKS #35
000000 0 0                                                                                    !B40,RKS #35
000000 0 0   LITERAL PSTENTS^MIN = 2;                                                         !B40,RKS #35
000000 0 0                                                                                    !B40,RKS #35
000000 0 0   ?SECTION SYSTEMSEGMENTS                                                          !B00,RWC#13
000000 0 0   ! Various absolute segment numbers are permanently assigned to system            B00,RWC#13
000000 0 0   ! tables and other uses.  As described above, segments 1, 3, 6-13,              B00,Bastogne #22
000000 0 0   ! and 14 are both permanently assigned and permanently mapped (or are            B00,RWC#13
000000 0 0   ! permanent short segments).  Segment 15 is Castle microcode.  Segments          B00,RWC#13
000000 0 0   ! 2, 4, and 5 are now allocated by SYSGEN to "popular" code segments (NCP,       B00,Bastogne #22
000000 0 0   ! discprocess, tmp, etc).  These segments are permanent short segments on        B00,Bastogne #22
000000 0 0   ! Castle.  Segments 16-127 (%20-%177) are reserved for system use: microcode,    B00,Bastogne #22
000000 0 0   ! system library code segments, special data structures, etc.                    B00,Bastogne #22
000000 0 0                                                                                    !B00,Bastogne #22
000000 0 0                                                                                    !B00,Bastogne #22
000000 0 0   LITERAL XRAYCOUNTERSEG   =  0, ! Xray counters (assumed by CTRB etc.)            B00,RWC#13
000000 0 0                                                                                    !B00,RWC#13
000000 0 0          EIOC^SEGMENT      =  2, ! EIOCs are in segment 2 (and not SG)             C00,HA#39
000000 0 0   ! The PCBX and SCTX are built into segment %20(16).  The PCBX starts at offset   C00,HA#39
000000 0 0   ! zero in the segment, the SCTX follows the PCBX.  This segment is addressed     B00,RWC#13
000000 0 0   ! using absolute extended addresses ONLY.  Its size is fixed by SYSGEN.          B00,RWC#13
000000 0 0                                                                                    !B00,RWC#13
000000 0 0          PCBXSEG           = %20,    ! 16 PCBX and SCTX                            B00,Bastogne #22
000000 0 0                                                                                    !B00,RWC#13
000000 0 0   ! The DCT is located in segment %21.  It is initially built by SYSGEN,           B00,RWC#13
000000 0 0   ! but this copy is used only at cold load.  Other processors obtain              B00,RWC#13
000000 0 0   ! a current copy when they are loaded.  The DCT grows dynamically                B00,RWC#13
000000 0 0   ! as the number of names increases.                                               B00,RWC#13
000000 0 0                                                                                    !B00,RWC#13
000000 0 0          DCTSEG            = %21,    ! #17                                         B00,Bastogne #22
000000 0 0                                                                                    !B00,RWC#13
000000 0 0   ! The PAGEPIN is an array of bytes, one for each physical page.  It              B00,RWC#13
000000 0 0   ! contains the PIN of the process that caused the page to be allocated.          B00,RWC#13
000000 0 0   ! The PAGEPIN is preceeded by an array of 256 words, one for each possible       B10, MTR#25
000000 0 0   ! pin.  It contains the number of pages that pin caused to be allocated.         B10, MTR#25
000000 0 0   !                                                                                 B00,RWC#13
000000 0 0          PAGEPINSEG        = %22,    ! #18                                         B00,Bastogne #22
000000 0 0                                                                                    !B00,RWC#13
000000 0 0   ! The Network Routing Table is allocated if maxsystems is greater than one.      B00,RWC#13
000000 0 0   !                                                                                 B00,RWC#13
000000 0 0          NRTSEG            = %23,    ! #19                                         B00,Bastogne #22
000000 0 0                                                                                    !B00,RWC#13
000000 0 0   ! The System Code/Library Entry Point Table                                       B00,RWC#13
000000 0 0   !                                                                                 B00,RWC#13
000000 0 0          SEPSEG            = %24,    ! #20                                         B00,Bastogne #22
000000 0 0                                                                                    !B00,RWC#13
000000 0 0   ! The EXTPOOL segment contains data allocated out of EXTPOOL,                    B00,JDK#17
000000 0 0   ! which is like SYSPOOL, except that it's only addressable                       B00,JDK#17
000000 0 0   ! via absolute extended addressing...                                            B00,JDK#17
```

```
10043.     000000 0  0                                                                        !B00,JDK#17
10044.     000000 0  0          EXTPOOLSEG        = %25,    ! #21                              B00,Bastogne #22
10045.     000000 0  0                                                                        !B00,RWC#13
10046.     000000 0  0   ! The CLOCKSEG is used to hold the DST TRANSITION TABLE for those     B00,Grandfather #21
10047.     000000 0  0   ! systems that select the TABLE option for DST control.  Like the     B00,Grandfather #21
10048.     000000 0  0   ! DCT, pages are allocated on demand.  Initially, there are NO pages. B00,Grandfather #21
10049.     000000 0  0                                                                        !B00,Grandfather #21
10050.     000000 0  0          CLOCKSEG          = %26,    ! #22                              B00,Bastogne #22
10051.     000000 0  0                                                                        !B00,Grandfather #21
10051.C01  000000 0  0   ! The REGISTRYSEG contains Server Class information.  Speciffically,   B30,Rabbit#31
10051.C1   000000 0  0   ! the registry maintains data about opens registered by a reguester    B30,Rabbit#31
10051.C2   000000 0  0   ! and available server proceses to particular server classes.          B30,Rabbit#31
10051.C3   000000 0  0                                                                        !B30,Rabbit#31
10051.1    000000 0  0          REGISTRYSEG       = %27,    ! #23                              B30,Rabbit#31
10051.2    000000 0  0                                                                        !B30,Performance#34
10051.21   000000 0  0   ! The message system cache segment contains data for READLINK cacheing. B30,Performance#34
10051.22   000000 0  0   ! The data is kept in a separate segment (not SYSPOOL or EXTPOOL) to  B30,Performance#34
10051.23   000000 0  0   ! avoid causing fragmentation problems.                               B30,Performance#34
10051.24   000000 0  0                                                                        !B30,Performance#34
10051.25   000000 0  0          MSGCACHESEG       = %30,    ! #24                              B30,Performance#34
10051.26   000000 0  0                                                                        !B30,Performance#34
10052.     000000 0  0   ! Segments %30 through %33 are reserved for future system segments.   B30,Performance#34
10053.     000000 0  0                                                                        !B00,RWC#13
10054.     000000 0  0   ! Segments %34-%133 are reserved for System Library code spaces.      B00,Bastogne #22
10055.     000000 0  0                                                                        !B00,Bastogne #22
10056.     000000 0  0          FIRSTSLSEG        = %34,    ! #28                              B00,Bastogne #22
10057.     000000 0  0                                                                        !B00,Bastogne #22
10058.     000000 0  0                                                                        !B00,Bastogne #22
10058.1    000000 0  0   ! Utility segment                                                     B10,DW #26
10058.2    000000 0  0          UTILSEG           = %134,                                    !B10,DW #26
10058.3    000000 0  0          UTILSEGSIZE       = 1,        ! only one page used for now     B10,DW #26
10058.4    000000 0  0                                                                        !B10,DW #26
10058.5    000000 0  0          RESTEMPLATESEG    = %135,     ! 64 resident pages for ems formatter C00,EMC#38
10058.6    000000 0  0                                        ! templates                     C00,EMC#38
10058.7    000000 0  0                                                                        !C00,EMC#38
10059.     000000 0  0   ! Segments %136-%141 are reserved for future use                      C00,SSW#42
10059.1    000000 0  0                                                                        !C00,SSW#42
10060.     000000 0  0   ! Segment to hold dynamic system configuration hit list               C00,SSW#42
10060.01   000000 0  0          HITLISTSEG        = %142,                                    !C00,SSW#42
10060.1    000000 0  0                                                                        !C00,resizesegment#40
10060.2    000000 0  0   ! Segments %143 thru %162 (16 of them) are allocated on demand for XLIs C00,resizesegment#40
10060.3    000000 0  0          FIRSTXLISEG       = %143,  ! #99                               C00,resizesegment#40
10060.4    000000 0  0          LASTXLISEG        = %162,  ! #114                              C00,resizesegment#40
10060.5    000000 0  0                                                                        !C00,resizesegment#40
10060.6    000000 0  0                                                                        !C00,resizesegment#40
10060.7    000000 0  0   ! Segment to hold the XLX finder table (pages allocated on demand)    C00,resizesegment#40
10060.8    000000 0  0          XLXFINDERSEG      = %163,  ! #115                              C00,resizesegment#40
10060.9    000000 0  0                                                                        !C00,resizesegment#40
10061.     000000 0  0   ! Segment to hold the IOCX and IOPAGES tbls                           B20,Antigen-HA#27
10061.1    000000 0  0          IOCONTROLSEG      = %164,  ! #116                              B20,Antigen-HA#27
10061.2    000000 0  0                                                                        !B20,Antigen-HA#27
10061.3    000000 0  0   ! The Debug Stack segments (eight of them)                            B20,Antigen-HA#27
10062.     000000 0  0          DEBUGSTACKSEG     = %165,  ! %166, %167, %170, %171, %172, %173, %174  B10, MTR#25
10063.     000000 0  0                                                                        !B00,Bastogne #22
10064.     000000 0  0   ! Messenger's system status message buffer                            B00,Bastogne #22
10065.     000000 0  0                                                                        !B00,Bastogne #22
10066.     000000 0  0          STATUSMESSAGESEG = %175,  ! #125                               B00,Bastogne #22
```

```
000000 0  0                                                                                     !B00,Bastogne #22
000000 0  0  ! ROSEWOOD microcode segment  (CASTLE microcode may be moved to segment %176        B00,Bastogne #22
000000 0  0  ! in the future so we'll save the spot for now.)                                    B00,Bastogne #22
000000 0  0                                                                                     !B00,Bastogne #22
000000 0  0          MICROCODESEG      = %177,   ! #127                                          B00,Bastogne #22
000000 0  0                                                                                     !B00,Bastogne #22
000000 0  0  ! Segments above %200 (128-8191) are allocated to processes. Some are allocated B00,RWC#13
000000 0  0  ! statically by SYSGEN and the rest are allocated by NEWPROCESS or                  B00,RWC#13
000000 0  0  ! ALLOCATESEGMENT.                                                                  B00,RWC#13
000000 0  0                                                                                     !B00,RWC#13
000000 0  0          FIRSTPROCESSSEG       = %200;                                              !B00,RWC#13
000000 0  0  ?SECTION MEMORYMANAGER                                                             !B00,RWC#12
000000 0  0  !***
000000 0  0  !*** Memory Management Requests
000000 0  0  !***
000000 0  0  ! Processes that need Memory Manager services have their PCBMEMXA field set to
000000 0  0  ! the absolute extended address of the page/segment that requires service.
000000 0  0  ! When the process is ready to be dispatched, the dispatcher
000000 0  0  ! places the PCB in MMP and wakes the Memory Manager to process the request.
000000 0  0  ! When the MM clears PCBMEM (first word of PCBMEMXA) and MMP, the process can b A04,RWC#4
000000 0  0  ! executed and the MM is ready for another request.
000000 0  0
000000 0  0  ! Memory Manager Request Types  -  Code is placed in last 4 bits of PCBMEMXA
000000 0  0  LITERAL  MEMPAGEFAULT = %00,             ! Page Fault; PCBMEMXA identifies the
000000 0  0                                           ! needed page. If MEMLOCKED is set then
000000 0  0                                           ! page should be locked.
000000 0  0
000000 0  0          MEMFREEPAGE = %01,               ! Allocate a (locked) page for buffers.
000000 0  0                                           ! Physical page number returned in R0;
000000 0  0                                           ! if none available then R0 = 0.
000000 0  0
000000 0  0          MEMRELEASEMAP = %02,             ! Deallocate physical memory by segment A04,RWC#4
000000 0  0                                           ! R0 = IF TRUE THEN write dirty pages   A04,RWC#4
000000 0  0                                           !                        to swap file;  A04,RWC#4
000000 0  0                                           ! R1 = # of abs.segs.-1 to release;
000000 0  0                                           ! R2 = starting abs.seg.#.
000000 0  0          MEMCLEANSEGS   = %03,            ! Clean all dirty pages in segmnent     A06,NRD#8
000000 0  0                                           ! R1 = # of abs.segs.-1 to clean;       A04,RWC#4
000000 0  0                                           ! R2 = starting abs.seg.#.              A04,RWC#4
000000 0  0          MEMRESETSEG   = %04,             ! Reset part of a COBOL ext segment     B00,VAZ#19
000000 0  0                                           ! R0  = byte size to be reset(<= 2048)  A06,NRD#8
000000 0  0                                           ! R1 = low order word of the absolute   A06,NRD#9
000000 0  0                                           !      extended address to reset.       A06,NRD#8
000000 0  0                                                                                   !A06,NRD#8
000000 0  0          MEMHARDCME    = %05,             ! A hard cme was found by the cme       B30,MTR#30
000000 0  0                                           ! interrupt handler - get another       B00,VAZ#19
000000 0  0                                           ! page and move the infomation from     B00,VAZ#19
000000 0  0                                           ! the page with the hard cme into       B00,VAZ#19
000000 0  0                                           ! the new page                          B00,VAZ#19
000000 0  0                                                                                   !B30,MTR#30
000000 0  0          MEMXTAL       = %06,             ! A pagefault occurred in an extensible C00,resizesegment#40
000000 0  0                                           ! segment for which swapfile extent(s)  B30,MTR#30
000000 0  0                                           ! needs to be allocated                 B30,MTR#30
000000 0  0          MEMRESIZE     = %07;             ! The memory manager must make the      C00,resizesegment#40
000000 0  0                                           ! final adjustments on a segment        C00,resizesegment#40
000000 0  0                                           ! resize                                C00,resizesegment#40
                                                                                              !C00,resizesegment#40
```

```
000000 0  0   DEFINE    PCBMEMSEG = PCBMEM.<2:14>#,        ! Absolute segment number
000000 0  0             PCBMEMRQST = PCBMEM[1].<12:15>#,   ! request type
000000 0  0             PCBMEMLOCKED = PCBMEM[1].<11>#;    ! locked flag
000000 0  0   LITERAL   PCBMEMLK = %B10000;                ! locked flag
000000 0  0   !***
000000 0  0   !*** Lock Waiting
000000 0  0   !***
000000 0  0   ! If a process makes a LOCKMEMORY request that cannot be serviced immediately
000000 0  0   ! it is allocated a pair of TLE's; one TLE is placed on the Time List and will
000000 0  0   ! time-out the request if not satisfied within the allotted time.  The other
000000 0  0   ! TLE is placed on the Lockwaitlist which is checked every time a page is
000000 0  0   ! unlocked.
000000 0  0
000000 0  0   DEFINE  LOCKWAITLIST = SG[ LOCKWAITLIST^SGADDR ]#;                          !B00,RWC#12
000000 0  0   DEFINE  LOCKWAITTAIL = SG[ LOCKWAITTAIL^SGADDR ]#;                          !B00,RWC#12
000000 0  0
000000 0  0   ! Special TLE's which are on the lockwaitlist (TLETYP = TLCKWAIT)
000000 0  0   ! have a certain layout:
000000 0  0
000000 0  0
000000 0  0   STRUCT LOCKWAIT^TEMPLATE (*);
000000 0  0     BEGIN                                 !      ---------------------------------
000000 0  1     INT  TLINK[ 0:1 ];                    !  0:  *      list link                *
000000 0  1                                           !      ----                         ----
000000 0  1                                           !  1:  *                                *
000000 0  1     INT PLOCK[ 0 : -1 ]; !overlay next!!      ---------------------------------  B00,RWC#12
000000 0  1     INT(32) LOCK^COUNT;   !(3 Bytes)!     !  2:  * pages locked  *  original       *
000000 0  1                                           !      ----------------             ----
000000 0  1                                           !  3:  *              lock count        *  B00,RWC#12
000000 0  1                                           !      ---------------------------------
000000 0  1     INT  TLENT;                           !  4:  * address of corresponding TLE   *
000000 0  1                                           !      ---------------------------------
000000 0  1     INT(32)  LOCK^ADDR;                   !  5:  * extended address of start of   *
000000 0  1                                           !      ----                         ----
000000 0  1                                           !  6:  * lockspace                      *
000000 0  1                                           !      ---------------------------------
000000 0  1     INT  TTYPOWN;                         !  7:  *Q* type    *:*:* owner pin      *
000000 0  1                                           !      ---------------------------------
000000 0  1     END;
000000 0  0     DEFINE PAGES^LOCKED = PLOCK.<0:7>#;                                      !B00,RWC#12
000000 0  0   ?SECTION  SPACEIDS                                                         !B00,Bastogne #14
000000 0  0   !                                                                           B00,Bastogne #14
000000 0  0   !          ******************************************************           B00,Bastogne #14
000000 0  0   !          *                                                    *           B00,Bastogne #14
000000 0  0   !          *  SPACEIDs in procedure labels and stack marker ENVs *           B00,Bastogne #14
000000 0  0   !          *                                                    *           B00,Bastogne #14
000000 0  0   !          ******************************************************           B00,Bastogne #14
000000 0  0   !                                                                           B00,Bastogne #14
000000 0  0   ! A spaceid consists of a CS bit, a LS bit, and a 5-bit index.  These spaceid  B00,Bastogne #14
000000 0  0   ! appear in one of two formats throughout the system:  a stack marker format   B00,Bastogne #14
000000 0  0   ! is in every stack marker ENV register; and a procedure label format is in    B00,Bastogne #14
000000 0  0   ! the XEP and procedure labels in object code.                                B00,Bastogne #14
000000 0  0                                                                              !B00,Bastogne #14
000000 0  0   ! These describe the possible spaceids as they appear in a stack marker ENV.   B00,Bastogne #14
000000 0  0   ! The spaceid passed to interrupt handlers at L-5 is also in this form.        B00,Bastogne #14
000000 0  0   ! The CS bit is </>, LS is <4>, and index is <11:15> in the stack marker ENV.  B00,Bastogne #14
000000 0  0                                                                              !B00,Bastogne #14
```

```
12018.    000000 0  0   LITERAL   SCO^ENVSPACEID = %000400,                                   !B00,Bastogne #14
12019.    000000 0  0             SLO^ENVSPACEID = %004400,                                   !B00,Bastogne #14
12020.    000000 0  0             UCO^ENVSPACEID = %000000,                                   !B00,Bastogne #14
12021.    000000 0  0             ULO^ENVSPACEID = %004000;                                   !B00,Bastogne #14
12022.    000000 0  0                                                                         !B00,Bastogne #14
12023.    000000 0  0   ! These describe the format of a spaceid in a procedure label and XEP word.  B00,Bastogne #14
12024.    000000 0  0   ! The CS bit is <0>, LS is <1>, and index is <1:6> in the label word.  Bits  B00,Bastogne #14
12025.    000000 0  0   ! <7:15> are the PEP number.                                          B00,Bastogne #14
12026.    000000 0  0                                                                         !B00,Bastogne #14
12027.    000000 0  0   LITERAL   SCO^LABELSPACEID = %100000,                                 !B00,Bastogne #14
12028.    000000 0  0             SLO^LABELSPACEID = %140000,                                 !B00,Bastogne #14
12029.    000000 0  0             UCO^LABELSPACEID = %000000,                                 !B00,Bastogne #14
12030.    000000 0  0             ULO^LABELSPACEID = %040000;                                 !B00,Bastogne #14
12031.    000000 0  0                                                                         !B30,RKS #32
12032.    000000 0  0   ! Maximum number of spaces in each of SC, SL, UC and UL.               B30,RKS #32
12033.    000000 0  0                                                                         !B30,RKS #32
12034.    000000 0  0   LITERAL   SC^MAX^SPACES =  1,                                         !B30,RKS #32
12035.    000000 0  0             SL^MAX^SPACES = 32,                                         !B30,RKS #32
12036.    000000 0  0             UC^MAX^SPACES = 16,                                         !B30,RKS #32
12037.    000000 0  0             UL^MAX^SPACES = 16;                                         !B30,RKS #32
12038.    000000 0  0                                                                         !B30,RKS #32
   21.    000000 0  0   ?         SOURCE ddebug
Source file:  [1]  $IMT.T9050C00.DDEBUG  30JUL86 - 15:31:21

    2.    000000 0  0   ! T9050 GUARDIAN   Debugger Declarations
    3.    000000 0  0   ! COPYRIGHT (C)  TANDEM COMPUTERS, INC. -- 1981, 1982
  102.    000000 0  0   ?IF 15
  103.    000000 0  0   ?IFNOT 15
  104.    000000 0  0   This change occurred at 12:13 on 21 June 1982                         !A04,gcl #1
  104.001 000000 0  0        DEBUG extensions                        Glenn Linderman          !A04,gcl #1
  104.002 000000 0  0                                                                         !A04,gcl #1
  104.003 000000 0  0                                                                         !A04,gcl #1
  104.004 000000 0  0        The following extensions to the debugger have been found helpful !A04,gcl #1
  104.005 000000 0  0        in my personal debugging.  I would like to make them available   !A04,gcl #1
  104.006 000000 0  0        to everyone, users included.  The particular syntax is open to   !A04,gcl #1
  104.007 000000 0  0        discussion and change, if somebody wants to suggest a better one. !A04,gcl #1
  104.008 000000 0  0                                                                         !A04,gcl #1
  104.009 000000 0  0                                                                         !A04,gcl #1
  104.01  000000 0  0        Makes =#-20 return the same value as =-#20.                      !A04,gcl #1
  104.011 000000 0  0                                                                         !A04,gcl #1
  104.012 000000 0  0        Fix priv MAB condition checking.                                 !A04,gcl #1
  104.013 000000 0  0                                                                         !A04,gcl #1
  104.014 000000 0  0        Allow display of the priv MAB by PRV debuggers by the B command. !A04,gcl #1
  104.015 000000 0  0                                                                         !A04,gcl #1
  104.016 000000 0  0        Add | ,<listdev> | to the T command syntax, like the same parameter !A04,gcl #1
  104.017 000000 0  0           on the D command.                                             !A04,gcl #1
  104.018 000000 0  0                                                                         !A04,gcl #1
  104.019 000000 0  0        Clean up the D command syntax parsing so most parameters are position !A04,gcl #1
  104.02  000000 0  0           independent.                                                  !A04,gcl #1
  104.021 000000 0  0                                                                         !A04,gcl #1
  104.022 000000 0  0        Fixed trace termination condition.                               !A04,gcl #1
  104.023 000000 0  0                                                                         !A04,gcl #1
  104.024 000000 0  0        Better check for "<>" condition syntax.                          !A04,gcl #1
  104.025 000000 0  0                                                                         !A04,gcl #1
  104.026 000000 0  0        Allow spaces before commands to be ignored.                      !A04,gcl #1
  104.027 000000 0  0                                                                         !A04,gcl #1
  104.028 000000 0  0        Implement the FN command:                                        !A04,gcl #1
```

```
104.C29 000000 0 0                                                                               !A04,gcl #1
104.C3  000000 0 0      Syntax:   FN<addr>,<value>&<mask>                                        !A04,gcl #1
104.C31 000000 0 0                                                                               !A04,gcl #1
104.C32 000000 0 0      Semantics:  searches memory starting at <addr> until either              !A04,gcl #1
104.C33 000000 0 0         reaching a physical segment boundary, an absent page in a             !A04,gcl #1
104.034 000000 0 0         resident segment or a word whose contents LAND <mask> =               !A04,gcl #1
104.035 000000 0 0         <value> LAND <mask>.                                                  !A04,gcl #1
104.036 000000 0 0                                                                               !A04,gcl #1
104.037 000000 0 0         FN by itself, when issued immediately after a prior FN command        !A04,gcl #1
104.038 000000 0 0         repeats the search starting where the prior one left off.             !A04,gcl #1
104.039 000000 0 0                                                                               !A04,gcl #1
104.04  000000 0 0         FN<addr> uses the <value>&<mask> from the prior FN command, but       !A04,gcl #1
104.041 000000 0 0         starts at the new address.                                            !A04,gcl #1
104.042 000000 0 0                                                                               !A04,gcl #1
104.043 000000 0 0      Usefulness is in finding data structures with particular values,         !A04,gcl #1
104.044 000000 0 0      and in finding code that has moved slightly.                             !A04,gcl #1
104.045 000000 0 0                                                                               !A04,gcl #1
104.046 000000 0 0   Extended expression syntax, allowing variables to be used in                !A04,gcl #1
104.047 000000 0 0      expression calculations.                                                 !A04,gcl #1
104.048 000000 0 0                                                                               !A04,gcl #1
104.049 000000 0 0      Syntax for such expressions is "K [ X | D ] <address-expr>".             !A04,gcl #1
104.05  000000 0 0      Semantics are:  'K' means 'contents of', or one level of                 !A04,gcl #1
104.051 000000 0 0         indirection.  The contents of <address-expr> is extended to a         !A04,gcl #1
104.052 000000 0 0         double word by adding 16 leading zero bits unless one of the          !A04,gcl #1
104.053 000000 0 0         options is specified.  The option definitions are                     !A04,gcl #1
104.054 000000 0 0                                                                               !A04,gcl #1
104.055 000000 0 0         'D' means load a doubleword from the <address-expr>.                  !A04,gcl #1
104.056 000000 0 0         'X' means load a singleword from the <address-expr> and do sign       !A04,gcl #1
104.057 000000 0 0             extension.                                                        !A04,gcl #1
104.058 000000 0 0                                                                               !A04,gcl #1
104.059 000000 0 0         Example:  -=(KL53)+KX20I12                                            !A04,gcl #1
104.06  000000 0 0                                                                               !A04,gcl #1
104.061 000000 0 0   Allow multiple commands per line separated by ";"                           !A04,gcl #1
104.062 000000 0 0                                                                               !A04,gcl #1
104.063 000000 0 0      Use: To display a linked list, with entry by entry prompting, the        !A04,gcl #1
104.064 000000 0 0      following sequence could be used:                                        !A04,gcl #1
104.065 000000 0 0         - MS1,<pointer to list header>                                        !A04,gcl #1
104.066 000000 0 0         - DS1IG,22;AS1IG14,6;MS1,KS1IG;FC                                     !A04,gcl #1
104.067 000000 0 0                                                                               !A04,gcl #1
104.068 000000 0 0      To display the list in reverse sequence, the second command can be       !A04,gcl #1
104.069 000000 0 0      changed to                                                               !A04,gcl #1
104.07  000000 0 0         - DS1IG,22;AS1IG14,6;MS1,KS1IG1;FC                                    !A04,gcl #1
104.071 000000 0 0                                                                               !A04,gcl #1
104.072 000000 0 0      Note that this particular display format displays a complete LCB         !A04,gcl #1
104.073 000000 0 0      entry in octal, and also prints P1 through P6 in ascii.  Other           !A04,gcl #1
104.074 000000 0 0      formats are possible.  s+ variables can typically be used as             !A04,gcl #1
104.075 000000 0 0      temporary storage, as in this example.  Variations that display an       !A04,gcl #1
104.076 000000 0 0      associated data structure are also possible ( like the first n           !A04,gcl #1
104.077 000000 0 0      words of the buffer, etc. ).                                             !A04,gcl #1
104.078 000000 0 0                                                                               !A04,gcl #1
104.079 000000 0 0   Add a breakpoint with command buffer execution.                             !A04,gcl #1
104.08  000000 0 0      new "execute mode" syntax allowed as a replacement for conditional       !A04,gcl #1
104.081 000000 0 0      or trace expressions.  The syntax is:                                    !A04,gcl #1
104.082 000000 0 0                                                                               !A04,gcl #1
104.083 000000 0 0      b<address>,(<command string>)                                            !A04,gcl #1
104.084 000000 0 0                                                                               !A04,gcl #1
104.085 000000 0 0      When the breakpoint is hit, the debugger executes the command            !A04,gcl #1
```

```
104.086 000000 0  0          string, and then prompts for additional commands, unless the           !A04,gcl #1
104.087 000000 0  0          command string contains an 'r' command.                                !A04,gcl #1
104.088 000000 0  0                                                                                 !A04,gcl #1
104.089 000000 0  0          Use 1: To set memory access breakpoints only for the duration of a     !A04,gcl #1
104.09  000000 0  0          particular procedure, thus allowing some degree of multiple memory     !A04,gcl #1
104.091 000000 0  0          access breakpoints per process.                                        !A04,gcl #1
104.092 000000 0  0                                                                                 !A04,gcl #1
104.093 000000 0  0          Use 2: To enable 'fancy' traces, dumping several fields in various     !A04,gcl #1
104.094 000000 0  0          formats.                                                               !A04,gcl #1
104.095 000000 0  0                                                                                 !A04,gcl #1
104.096 000000 0  0          Use 3: To enable temporary code patches, setting or resetting state    !A04,gcl #1
104.097 000000 0  0          variables to particular values at particular points.  One variant     !A04,gcl #1
104.098 000000 0  0          is to modify the PREG to loop on a piece of interesting code, or to    !A04,gcl #1
104.099 000000 0  0          skip around certain code.                                              !A04,gcl #1
104.1   000000 0  0                                                                                 !A04,gcl #1
104.101 000000 0  0       Conditional returns for use in 'fancy' "execute mode" breakpoints.        !A04,gcl #1
104.102 000000 0  0                                                                                 !A04,gcl #1
104.103 000000 0  0          Syntax is "R <expr> <relop> <expr>"  where relop = '?' is illegal.     !A04,gcl #1
104.104 000000 0  0          Semantics are: if relation is true, the R command is executed.         !A04,gcl #1
104.105 000000 0  0                                                                                 !A04,gcl #1
104.106 000000 0  0          Use: Allows compound conditional breakpoints and conditional           !A04,gcl #1
104.107 000000 0  0          tracing.                                                               !A04,gcl #1
104.108 000000 0  0                                                                                 !A04,gcl #1
104.109 000000 0  0       The ability to execute a debug command at cold load time.  This           !A04,gcl #1
104.11  000000 0  0          sequence of 80 characters is obtained by CPULOAD from the file         !A04,gcl #1
104.111 000000 0  0          RELOADBP ( if it exists ) on the same subvolume as the OSIMAGE         !A04,gcl #1
104.112 000000 0  0          being reloaded.  It is edit format with the appropriate line being     !A04,gcl #1
104.113 000000 0  0          designated by the line number that is equal to the cpu number being    !A04,gcl #1
104.114 000000 0  0          reloaded.  The line is BOOTed to the cpu being reloaded, and the       !A04,gcl #1
104.115 000000 0  0          first process on the ready list gets an "execute mode" ( see above     !A04,gcl #1
104.116 000000 0  0          description ) breakpoint set for it, with the command line being       !A04,gcl #1
104.117 000000 0  0          that obtained from RELOADBP. If the file RELOADBP exists, it must      !A04,gcl #1
104.118 000000 0  0          be openable and readable for the reload to complete successfully.      !A04,gcl #1
105.    000000 0  0   This change occurred at 17:06 on 30 June 1982                                 !A04,RWC#2
105.001 000000 0  0   Added an INT(32) label, MABADDR, that is equivalenced to both MABHIGH          !A04,RWC#2
105.002 000000 0  0   and MABLOW.                                                                   !A04,RWC#2
105.003 000000 0  0                                                                                 !A04,RWC#2
106.    000000 0  0   This change occurred at 13:28 on 29 April 1983                                !A06,wbb&nrd #3
106.001 000000 0  0   CASTLE support:  added a STRP 7 to SETMAB to cover the difference in          !A06,wbb&nrd #3
106.002 000000 0  0                    parameters for SMBP;                                         !A06,wbb&nrd #3
106.003 000000 0  0                    aadded BPADDRX.                                              !A06,wbb&nrd #3
106.004 000000 0  0   Other:           (^oops!) cleaned up some errors in comments.                  A06,wbb&nrd #3
107.    000000 0  0   This change occurred at 9:39 on 6 July 1983                                   !A06,mtr #4
107.001 000000 0  0   Added comments about user memory access breakpoints that are now              !A06,mtr #4
107.002 000000 0  0   correctly deferred when encountered in system environment.  Mike Ribble       !A06,mtr #4
107.003 000000 0  0   made the changes, Linderman checked them out, and Sidaris installed the       !A06,mtr #4
107.0C4 000000 0  0   changes.  (TPRs 820219 1036 2717, 820322 1022 2972, 820610 2213 870, and      !A06,mtr #4
107.0C5 000000 0  0   830512 1600 2050)                                                             !A06,mtr #4
107.0C6 000000 0  0                                                                                 !A06,mtr #4
108.    000000 0  0   This change occurred at 21:01 on 10 March 1984                                !B00,RWC#5
108.001 000000 0  0   1.  Cleaned up difference between SETMAB on Rosewood and Castle.              !B00,RWC#5
108.002 000000 0  0                                                                                 !B00,RWC#5
108.003 000000 0  0   2.  Debug stacks now allocated to a known segment. Use DEBUGSTACK             !B00,RWC#5
108.004 000000 0  0       define.                                                                   !B00,RWC#5
109.    000000 0  0   This change occurred at 20:40 on 18 May 1984                                  !B00,Bastogne #6
109.001 000000 0  0   Bastogne changes to DDEBUG included changes to syntax description, and        !B00,Bastogne #6
109.002 000000 0  0   declaration of 4 new fields in the Breakpoint Table Header.                   !B00,Bastogne #6
```

```
109.003 000000 0  0
110.    000000 0  0  This change occurred at 7:11 on 5 June 1984                          !B00,Bastogne #6
110.001 000000 0  0  Documented the debugger syntax for the "i" command and ":i" option of !B00,MTR#7
110.002 000000 0  0  the "=" command.  Corrected some errors in syntax description.      !B00,MTR#7
111.    000000 0  0  This change occurred at 11:42 on 22 June 1984                         !B00,MTR#7
111.001 000000 0  0  A new define for process timing.                                      !B00,SS #8
112.    000000 0  0  This change occurred at 2:12 on 24 April 1985                         !B00,SS #8
112.001 000000 0  0  The size of the DEBUGSTACK has been doubled.                          !B10, MTR#9
113.    000000 0  0  This change occurred at 16:36 on 26 April 1985                        !B10, MTR#9
113.001 000000 0  0  Added the define DEBUGSTACKLEN; the byte size of the debug stack.     !B10, MTR#10
114.    000000 0  0  This change occurred at 16:33 on 9 January 1986                       !B10, MTR#10
114.001 000000 0  0  comment changes only                                                  !B30,MTR#11
114.002 000000 0  0  --------------------                                                  !B30,MTR#11
114.003 000000 0  0  Changed comments for MABTYPE to reflect reality (perhaps these are the !B30,MTR#11
114.004 000000 0  0  reason I've been finding so much impotent MAB code lately).           !B30,MTR#11
114.005 000000 0  0                                                                        !B30,MTR#11
114.006 000000 0  0  Added some comments to the description of the breakpoint table header !B30,MTR#11
114.007 000000 0  0  and entry templates pertaining to "execute mode" breakpoints and MABs. !B30,MTR#11
114.008 000000 0  0                                                                        !B30,MTR#11
114.009 000000 0  0  Deleted comments that indicated that the debugger command "B-1" would  !B30,MTR#11
114.01  000000 0  0  display global breakpoints (it was never implemented).                !B30,MTR#11
115.    000000 0  0  This change occurred at 21:56 on 3 May 1986                           !B30,MTR#11
115.001 000000 0  0  New fields in BPTTABLEHEAD for COVER                                  !B40,SS #12
1000.   000000 0  0  ?ENDIF 15                                                             !B40,SS #12
1002.   000000 0  0  !
1003.   000000 0  0  ! Command Syntax:
1004.   000000 0  0  !
1005.   000000 0  0  ! Notation: [ ... ] indicates that an item is optional.  { ... } indicate
1006.   000000 0  0  ! that one of the items must be chosen.  The notation ", ... " indicates a
1007.   000000 0  0  ! list of items.  A "|" is used to separate productions.
1008.   000000 0  0  !
1009.   000000 0  0  ! Debug prompts for <command string>s.  A <command string> is
1010.   000000 0  0  ! a set of commands separated by ";".                                   A04,gcl #1
1011.   000000 0  0  !                                                                     A04,gcl #1
1012.   000000 0  0  ! { D | A | I } [ <register> ] [ , <dev> ]                            A04,gcl #1
1013.   000000 0  0  !                                                                     B00,MTR#7
1014.   000000 0  0  !                                                                     B00,MTR#7
1015.   000000 0  0  !                              dump one or all registers in octal,    B00,MTR#7
1016.   000000 0  0  !                              ascii, or icode format, possibly to    B00,MTR#7
1017.   000000 0  0  !                              another file.                          B00,MTR#7
1018.   000000 0  0  ! M <register> [ , <expression-16> ]  modify a register using either the
1019.   000000 0  0  !                              given expression, or prompt for
1020.   000000 0  0  !                              the new value.
1021.   000000 0  0  !
1022.   000000 0  0  ! { D | A | I } <address> [ , [ <expression-16> ] ] [ ,B ] [ , <dev> ]
1023.   000000 0  0  !                                                                     B00,MTR#7
1024.   000000 0  0  !
1025.   000000 0  0  !                              dump memory in octal, ascii, or icode  B00,MTR#7
1026.   000000 0  0  !                              format, possibly to another file.      B00,MTR#7
1027.   000000 0  0  !                              Possibly in byte format.               B00,MTR#7
1028.   000000 0  0  ! M <address> [ , <expression-16> [ , ... ] ]                         B00,MTR#7
1029.   000000 0  0  !
1030.   000000 0  0  !
1031.   000000 0  0  !                              modify memory. if no new values are
1032.   000000 0  0  !                              specified, then the user will be
1033.   000000 0  0  !                              prompted with the current contents of
1034.   000000 0  0  !                              the cell.  A <space, cr> leaves the
1035.   000000 0  0  !                              value unchanged.  a <cr> stops the
```

```
                                                           prompting.
000000 0  0   !
000000 0  0   ! B [ <code address> [ , <test> ] [ , <break modes> [ , ... ] ] ]      A04,gcl #1
000000 0  0   !
000000 0  0   !                                            set a break point.  A "B" alone lists
000000 0  0   !                                            all the break points.          B30,MTR#11
000000 0  0   !
000000 0  0   ! C [ <code address> ]                       clears a breakpoint;
000000 0  0   !                                            - C clears the current breakpoint
000000 0  0   !                                            - C0 clears all breakpoints for the
000000 0  0   !                                              process.
000000 0  0   !                                            - C -1 clears all breakpoints.
000000 0  0   !
000000 0  0   ! BM <address>,( R | W | E ...) [ , <test> [ , <break modes> [ , ... ] ] ]  A04,gcl #1
000000 0  0   !
000000 0  0   !                                            set a memory access breakpoint
000000 0  0   !
000000 0  0   ! CM [ ,ALL ]                                clear memory access breakpoint  A04,gcl #1
000000 0  0   !
000000 0  0   ! ?                                          displays the current code and data
000000 0  0   !                                            segment numbers along with the
000000 0  0   !                                            current "Q" segment.
000000 0  0   !
000000 0  0   ! F [ <expression-16> ]                      print file name and last error #.
000000 0  0   !                                            If expression is omitted then
000000 0  0   !                                            information for all open files is
000000 0  0   !                                            displayed.
000000 0  0   !
000000 0  0   ! FREEZE                                     freeze system, takeover by OSP
000000 0  0   !
000000 0  0   ! HALT                                       halt processor, takeover by OSP
000000 0  0   !
000000 0  0   ! PRV                                        turn on priv. mode. superid only
000000 0  0   !
000000 0  0   ! P <expression-16>                          pause for a period of time (.01 sec
000000 0  0   !                                            units)
000000 0  0   !
000000 0  0   ! R [ <expression><relop><expression> ]      continue execution of a program   A04,gcl #1
000000 0  0   !                                            if condition is true.  All <relop>s  A04,gcl #1
000000 0  0   !                                            except "?" supported here.        A04,gcl #1
000000 0  0   !
000000 0  0   ! S                                          stop the current process.  Stop will
000000 0  0   !                                            be posted if the process is currently
000000 0  0   !                                            unstoppable.
000000 0  0   !
000000 0  0   ! T [<expression-16>][,<dev>]                stack trace back command.  The default A04,gcl #1
000000 0  0   !                                            stack is the current L setting.
000000 0  0   !                                            Can be directed to another device.  A04,gcl #1
000000 0  0   !
000000 0  0   ! V [ Q | QA ] [ <expression-16> ]           allows access to other address spaces.
000000 0  0   !                                            The items affected are the current
000000 0  0   !                                            code, current data, registers, and
000000 0  0   !                                            Q segment.
000000 0  0   !                                            - V -1 sets code=3, data=1, and Q=undef
000000 0  0   !                                            - V returns to current process' values
000000 0  0   !                                            - V <pin> sets code to the pin's code
000000 0  0   !                                              segment, data to its stack segment,
```

```
000000 0  0   !                                               Q to its in use segment, and the
000000 0  0   !                                               register operations will use its
000000 0  0   !                                               registers.
000000 0  0   !                                             - VQ sets the "Q" segment to some
000000 0  0   !                                               segment id
000000 0  0   !                                             - VQA sets Q to an absolute segment
000000 0  0   !
000000 0  0   ! FC                                            fix command.
000000 0  0   !                                                                                    B00,MTR#7
000000 0  0   ! = <expression> | : ( A | # | B | E | I ) |                                         B00,MTR#7
000000 0  0   !                                                                                    B00,MTR#7
000000 0  0   !                                             evaluate expression, display in        B00,MTR#7
000000 0  0   !                                             optional base (ascii, decimal,         B00,MTR#7
000000 0  0   !                                             binary, e reg format, icode format).   B00,MTR#7
000000 0  0   !
000000 0  0   ! <register> ::= SP | S | P | E | L | R0 | R1 | R2 | R3 | R4 | R5 | R6 | R7 |        B00,MTR#7
000000 0  0   !                RA | RB | RC | RD | RE | RF | RG | RH
000000 0  0   !
000000 0  0   !                                             the register set is that of the
000000 0  0   !                                             current process (see V command).
000000 0  0   !
000000 0  0   ! <test> ::=   <testaddress> | & <expression-16> | <relop> <expression-16>
000000 0  0   !
000000 0  0   !                                             the option "& <expression-16>" is a
000000 0  0   !                                             mask which will be AND'ed with the
000000 0  0   !                                             contents of the address before the
000000 0  0   !                                             test is made.
000000 0  0   !
000000 0  0   ! <test> ::=   ( <command string> )                                                  A04,gcl #1
000000 0  0   !                                             Breakpoints with this form of <test>   A04,gcl #1
000000 0  0   !                                             are called "execute mode" breakpoints  A04,gcl #1
000000 0  0   !                                             and the <command string> is executed   A04,gcl #1
000000 0  0   !                                             by DEBUG when the breakpoint is taken. A04,gcl #1
000000 0  0   !                                                                                    A04,gcl #1
000000 0  0   ! <relop> ::=  < | > | = | # | <> | ?         a "#" is a not equal test, so is
000000 0  0   !                                             "<>",">" and "<" are logical
000000 0  0   !                                             operators, and "?" results in
000000 0  0   !                                             a dump.
000000 0  0
000000 0  0   ! <break modes> ::= ALL | IC | OSP
000000 0  0   !
000000 0  0   ! <expression-16> ::= <expression> which may be represented in 16-bits
000000 0  0   !
000000 0  0   ! <dev> ::= device or file name
000000 0  0   !
000000 0  0   ! <code address> ::= <address> which is in a code space
000000 0  0   !
000000 0  0   ! <address> ::= [ <address mode> ] <expression> [ <indxmod> [ <expression> ] ]
000000 0  0   !           ::= M <expression>, <expression>    map #, offset                       B00,MTR#7
000000 0  0   !           ::= U <expression>, <expression>    physical page #, offset (RSWD)      B00,MTR#7
000000 0  0   !
000000 0  0   ! <address mode> ::= ( G | L | S | C | Q |                                           B00,Bastogne #6
000000 0  0   !                      UC[.<sp#>,] | UL[.<sp#>,] | SC[.<sp#>,] | SL[.<sp#>,] )       B00,Bastogne #6
000000 0  0   !
000000 0  0   ! <testaddress> ::= [ <testaddress mode> ] <expression>
000000 0  0   !                     [ <testindxmod> [ <expression> ] ]
000000 0  0   !
000000 0  0   ! <testaddress mode> ::= (   | L | S | X | R0 -> R7 )
```

```
000000 0  0  !
000000 0  0  ! <expression> ::=  <term> [ ( + | - ) <expression> ]
000000 0  0  !
000000 0  0  ! <term> ::= <primary> [ ( * | / | << | >> ) <term> ]
000000 0  0  !
000000 0  0  ! <primary> ::= <number> [ . <number> ]
000000 0  0  !           ::= ' <character> <character>
000000 0  0  !           ::=  ( <expression> )
000000 0  0  !           ::= K | X | D | <address>                                  A04,gcl #1
000000 0  0  !                       The "K" form of <primary> is evaluated to the contents A04,gcl #1
000000 0  0  !                       of the memory location specified by <address>.  The    A04,gcl #1
000000 0  0  !                       single word at that location is usually treated as     A04,gcl #1
000000 0  0  !                       an unsigned integer.  If "X" is specified, it is       A04,gcl #1
000000 0  0  !                       treated as a signed integer.  If "D" is specified,     A04,gcl #1
000000 0  0  !                       a doubleword is obtained from memory.  Byte addresses  A04,gcl #1
000000 0  0  !                       are rounded down by the machine.                       A04,gcl #1
000000 0  0  !
000000 0  0  ! <number> ::= T <number>
000000 0  0  !          ::= [ [ - ] | [ # ] ] ... <digits>                                  A04,gcl #1
000000 0  0  !          ::= <register>
000000 0  0  !
000000 0  0  ! <indxmod> ::= ( I | S | IX | SX | IG | SG )
000000 0  0  !
000000 0  0  ! <testindxmod> ::= ( I | IX | IG  )
000000 0  0  !
000000 0  0  ! The debug prompt will contain the cpu number and the current pin.  If the
000000 0  0  ! system is configured as an Expand system, then the system number will
000000 0  0  ! precede the cpu number.
000000 0  0  !
000000 0  0  ! The debug header that is displayed once on entry to DEBUG contains the        B00,Bastogne #6
000000 0  0  ! text "DEBUG", the current P and E values, and the space identifier for the    B00,Bastogne #6
000000 0  0  ! current space, e.g., UC.2.                                                   B00,Bastogne #6
000000 0  0  !                                                                              B00,Bastogne #6
000000 0  0  ! Note on breakpoints:
000000 0  0  !
000000 0  0  ! Terminology to keep consistent with LOWBUG has been defined June 16, 1982.    A04,gcl #1
000000 0  0  ! "Breakpoint" means Code Breakpoint.                                          A04,gcl #1
000000 0  0  ! "MAB" means Memory Access Breakpoint.                                        A04,gcl #1
000000 0  0  ! A "per process breakpoint" is the usual kind: B<address>[,<test>].           A04,gcl #1
000000 0  0  ! A "global breakpoint" is one set with ",ALL": B<address>,ALL[,<test>].       A04,gcl #1
000000 0  0  ! A "cooperative per process breakpoint" is a per process breakpoint           A04,gcl #1
000000 0  0  !    with ",OSP", or any per process breakpoint set by LOWBUG.                 A04,gcl #1
000000 0  0  ! A "cooperative global breakpoint" is a global breakpoint with ",OSP",        A04,gcl #1
000000 0  0  !    or any global breakpoint set by LOWBUG.                                   A04,gcl #1
000000 0  0  ! A "standalone breakpoint" is a global breakpoint set by LOWBUG with an       A04,gcl #1
000000 0  0  !    exclamation point after.  There are no standalone per process breakpoints. A04,gcl #1
000000 0  0  ! A "scheduled MAB" is the usual kind: BM<address>,RWE[,<test>].               A04,gcl #1
000000 0  0  ! A "priv MAB" is one set with ",ALL": BM<address>,RWE,ALL[,<test>].           A04,gcl #1
000000 0  0  ! A "cooperative scheduled MAB" and "cooperative priv MAB" are defined as      A04,gcl #1
000000 0  0  !    expected: with ",OSP", or set by LOWBUG.                                  A04,gcl #1
000000 0  0  ! A "standalone MAB" is a priv MAB set by LOWBUG with an exclamation point     A04,gcl #1
000000 0  0  !    after.                                                                    A04,gcl #1
000000 0  0  !                                                                              A04,gcl #1
000000 0  0  ! All "cooperative" breakpoints and MABs cause a system freeze when taken.     A04,gcl #1
000000 0  0  ! All PRIV breakpoints will be treated as "cooperative" if taken while the     A06,mtr #4
000000 0  0  ! dispatcher interrupt is masked off.  NON-PRIV code breakpoints cannot be set A06,mtr #4
000000 0  0  ! in locations where they can be hit under MUTEX.  NON-PRIV Memory Access     A06,mtr #4
```

```
000000 0  0  ! Breakpoints can be hit, but are treated in a special way, described below.    A06,mtr #4
000000 0  0  !                                                                               A06,mtr #4
000000 0  0  ! For conditional breakpoints, conditions evaluate to true if the memory        A06,mtr #4
000000 0  0  ! necessary to evaluate the condition is absent.                                A06,mtr #4
000000 0  0  !                                                                               A06,mtr #4
000000 0  0  ! The per process breakpoint is set for the current process and remains in      A04,gcl #1
000000 0  0  ! place until deleted.  Privileged callers may set other types of breakpoints.   A04,gcl #1
000000 0  0  !                                                                               A04,gcl #1
000000 0  0  ! Using the "IC" mode, a special check routine that has been previously
000000 0  0  ! loaded into the procedure CHECKROUTINE will be called to determine if the
000000 0  0  ! breakpoint should be taken.  This allows all sorts of exotic bug catchers to
000000 0  0  ! be built by the privileged caller.
000000 0  0  !
000000 0  0  ! The memory access breakpoint feature will be usable by all users in the form
000000 0  0  ! of a one-per-process scheduled MAB.  The dispatcher and memory manager will
000000 0  0  ! make everything work.  If there is a standalone MAB or priv MAB set, then      A04,gcl #1
000000 0  0  ! no one else may use it.                                                       A04,gcl #1
000000 0  0  !                                                                               A04,gcl #1
000000 0  0  ! Whenever the debugger is entered, it will display the current P and E
000000 0  0  ! register values and information as to why Debug was entered.
000000 0  0  !
000000 0  0  !   - <no further information> -   entered via a call to Debug, a call to
000000 0  0  !                                  an undefined external procedure, a DEBUG
000000 0  0  !                                  command, a RUND command, or after a memory
000000 0  0  !                                  access breakpoint was taken while executing
000000 0  0  !                                  system code (will be preceded by a message)
000000 0  0  !   - BREAKPOINT -
000000 0  0  !                                  the process took a code breakpoint
000000 0  0  !   - MEMORY ACCESS BREAKPOINT -   the process took its memory access
000000 0  0  !                                  breakpoint
000000 0  0  !
000000 0  0  !   -  TRAP #..  -
000000 0  0  !                                  a process got a trap without a trap handler,
000000 0  0  !                                  so Debug took it.
000000 0  0  ! A non-priv MAB which occurs while in system code will cause a message as
000000 0  0  ! described above to be displayed but no prompt will be issued.  If the         A06,mtr #4
000000 0  0  ! non-priv MAB occurs while in uninterruptible system code, the message will    A06,mtr #4
000000 0  0  ! be displayed as soon as the process becomes interruptible.  At most one       A06,mtr #4
000000 0  0  ! non-priv MAB occurring while in uninterruptible system code will be detected, A06,mtr #4
000000 0  0  ! and will be re-armed after it has been displayed.  A breakpoint will          A06,mtr #4
000000 0  0  ! subsequently occur in the process as soon as it returns to user code.         A06,mtr #4
000000 0  0  !                                                                               A06,mtr #4
000000 0  0  ! On entry to Debug, the current code, data, and Q segments will be set as      A06,mtr #4
000000 0  0  ! follows:                                                                      A06,mtr #4
000000 0  0  !
000000 0  0  !       - current code will be set the code that the process was running
000000 0  0  !       - current data will be set to the process' stack segment
000000 0  0  !       - Q will be set to the segment currently in use (if any)
000000 0  0  !
000000 0  0  ! Access rights to objects:
000000 0  0  !
000000 0  0  !       - the privileged user may read or write any object or set any type of
000000 0  0  !         breakpoint.
000000 0  0  !
000000 0  0  !       - the non-privileged user may only "debug" programs which the user has
000000 0  0  !         read access to.  Execute-only access will bar the user trying to use
000000 0  0  !         Debug on a process.
```

```
000000 0  0   !         the non-privileged user may read or write his data space or any of
000000 0  0   !         his extended segments.  This user may also read his code and his
000000 0  0   !         library if and only if the user has read access to the certain file.
000000 0  0   !         The user may not modify env.<0:7>.  In addition, this user will not
000000 0  0   !         be allowed breakpoints in a shared library (see below) as long as he
000000 0  0   !         is not the group manager.  Finally, the non-privileged user will
000000 0  0   !         not be allowed to put breakpoints in any segment which contains
000000 0  0   !         privileged code or change the contents of a segment that contains
000000 0  0   !         any code.
000000 0  0   !
000000 0  0   ! Interesting problem related to breakpoints:  the processor now allows private
000000 0  0   ! breakpoints, so breakpoints in shared code should be no problem, but a
000000 0  0   ! breakpoint put in the wrong place, i.e. over a constant or branch link, can
000000 0  0   ! cause all processes running that code to fail in odd ways.
000000 0  0   ?SECTION BPTTABLE
000000 0  0   !
000000 0  0   !
000000 0  0   DEFINE BPADDRH = SG[ BPADDR^SGADDR ]#,
000000 0  0          BPADDRL = SG[ BPADDR^SGADDR + 1 ]#,
000000 0  0          BPADDRX = SG[ BPADDRX^SGADDR ]#,                                !A06,wbb&nrd #3
000000 0  0          BPBASE  = SG[ BPBASE^SGADDR ]#,
000000 0  0          BPSIZE  = SG[ BPSIZE^SGADDR ]#,
000000 0  0          BPLIMIT = SG[ BPLIMIT^SGADDR ]#; ! these locations are known to the
000000 0  0                                           ! micro machine
000000 0  0   DEFINE MABTYPE = BPADDRH.<3:8>#; ! %  0: nonpriv, scheduled, virtual         B30,MTR#11
000000 0  0                                    ! %1-2: not used                            B30,MTR#11
000000 0  0                                    ! %  3: priv, nonscheduled, virtual or phys B30,MTR#11
000000 0  0                                    ! % 13: as type 3 and 'OSP'                 B30,MTR#11
000000 0  0                                    ! % 40: standalone (OSP only)               B30,MTR#11
000000 0  0   DEFINE MABMODE = BPADDRH.<0:2>#; ! <0> .. read                               B30,MTR#11
000000 0  0                                    ! <1> .. execute                            B30,MTR#11
000000 0  0                                    ! <2> .. write                              B30,MTR#11
000000 0  0   DEFINE MABACTIVE = BPADDRH#;
000000 0  0
000000 0  0
000000 0  0   ! The breakpoint table is preceded by a special header unlike the standard
000000 0  0   ! table header.  The format is of the following form:
000000 0  0
000000 0  0   STRUCT BPTTABLEHEAD (*);
000000 0  0     BEGIN
000000 0  1     STRING .EXT COVERCRCBPTR;    ! Abs ptr to COVER'S CRCB                   B40,SS #12
000000 0  1     INT COVERCRCBSEM[ 0:3 ];     ! synchronize addressing CRCB (for COVER)   B40,SS #12
000000 0  1     INT DEBUGGER^SPACEID;        ! env with spaceid of proc DEBUGGER         B00,Bastogne #6
000000 0  1     INT DEBUGGER^P;              ! location with system space of DEBUGGER    B00,Bastogne #6
000000 0  1     INT DEBUGTRAP^SPACEID;       ! env with spaceid of proc DEBUGTRAP        B00,Bastogne #6
000000 0  1     INT DEBUGTRAP^P;             ! location within system space of DEBUGTRAP B00,Bastogne #6
000000 0  1     INT INT^CATCHER^DS[ 0:15 ];  ! data area for the internal bug catcher    A03,CKS
000000 0  1                                  ! feature of debug.                         A03,CKS
000000 0  1     INT(32) DMONEVENTTBLPTR;     ! address of the event table for the DMON   A03,CKS
000000 0  1                                  ! process.  If the address is zero, there   A03,CKS
000000 0  1                                  ! is no DMON process in this cpu.           A03,CKS
000000 0  1     INT NUMBPTS;                 ! number of entries; this could be calculated A04,gcl #1
000000 0  1                                  ! from BPBASE, BPSIZE and BPLIMIT, but it's A04,gcl #1
000000 0  1                                  ! convenient to let SYSGEN set it up        A04,gcl #1
000000 0  1                                                                              !A06,wbb&nrd #3
000000 0  1     ! From this point on this data structure looks just like the breakpoint  A04,gcl #1
```

```
000000 0  1      ! table entry ( defined below ).  A pointer to PRIVMABPT can be             A04,gcl #1
000000 0  1      ! used like a breakpoint table entry.                                       A04,gcl #1
000000 0  1                                                                                 !A04,gcl #1
000000 0  1      INT PRIVMABPT [ 0:-1 ];       ! Beginning of priv MAB BPT entry.            A04,gcl #1
000000 0  1                                    ! ( Always -2)                                A04,gcl #1
000000 0  1      INT BPASEG;                   ! Same as below for priv MAB.                 A04,gcl #1
000000 0  1
000000 0  1      INT(32) MABADRS;              ! absolute extended address of privileged
000000 0  1                                    ! MAB, or its physical address  (ROSEWOOD only) A06,wbb&nrd #3
000000 0  1
000000 0  1      INT BPPCB;                    ! PCB of owner (Always -1).                   A04,gcl #1
000000 0  1                                                                                 !A04,gcl #1
000000 0  1      INT BPFLAG;                   ! flag word for priv. memory access breakpoint  A04,gcl #1
000000 0  1
000000 0  1      INT(32) MABCOMPADRS;          ! absolute extended address of comparison
000000 0  1                                    ! location, or index value if based to G, L, S, B30,MTR#11
000000 0  1                                    ! or abs. extended address of command string if B30,MTR#11
000000 0  1                                    ! execute mode                                B30,MTR#11
000000 0  1
000000 0  1      INT MABCVAL;                  ! comparison value or dump count
000000 0  1
000000 0  1      INT MABCMASK;                 ! comparison bit mask
000000 0  1      END;
000000 0  0
000000 0  0  DEFINE SETMAB = CODE(  SMBP  )#,                                               !B00,RWC#5
000000 0  0         SETMAB^CASTLE = CODE( SMBP; STRP $RP-1 )#; ! castle has 3rd parameter    B00,RWC#5
000000 0  0  LITERAL BPTHEADSIZE = WLEN( BPTTABLEHEAD );                                    !B00,RWC#5
000000 0  0
000000 0  0  ! To avoid long micro code searches in a fragmented table on a BPT instruction  A06,wbb&nrd #3
000000 0  0  ! and to make allocation and deallocation easier for the OSP, assigned and
000000 0  0  ! free breakpoint entries will not be kept on two doubly-linked lists as
000000 0  0  ! usual.  Free entries will be marked with -1 in word 0.  The OSP will
000000 0  0  ! take the first free entry and use it, and on deleting it will simply
000000 0  0  ! set word 0 to -1.
000000 0  0
000000 0  0  STRUCT BPT^TEMPLATE (*);
000000 0  0     BEGIN
000000 0  1      INT BPASEG;                       ! absolute segment containing breakpoint
000000 0  1                                        ! (-1 if not in use; -2 if used as MAB )
000000 0  1                                                                                 !A04,RWC#2
000000 0  1      INT (32) MABADDR[ 0: -1 ];        ! Absolute extended address of MAB        A04,RWC#2
000000 0  1      INT BPWADRS;                      ! word address in segment
000000 0  1      INT MABAHIGH = BPWADRS;           ! if MAB then high order abs. extended addr
000000 0  1
000000 0  1      INT BPINSTR;                      ! saved instruction
000000 0  1      INT MABALOW  = BPINSTR;           ! if MAB then low order abs. extended addr
000000 0  1
000000 0  1      INT BPPCB;                        ! PCB of breakpoint owner ( -1 if ALL )
000000 0  1
000000 0  1      INT BPFLAG;                       ! breakpoint flag word ( see bit defines )
000000 0  1
000000 0  1      INT(32) BPCOMPADRS;               ! absolute extended address of comparison
000000 0  1                                        ! location, or index value if based to G,
000000 0  1                                        ! L or S, or abs. extended addr of command  B30,MTR#11
000000 0  1                                        ! string if execute mode breakpoint or MAB  B30,MTR#11
000000 0  1
000000 0  1      INT BPCVAL;                       ! comparison value or dump count
000000 0  1
```

```
000000 0  1      INT BPCMASK;                      ! comparison bit mask
000000 0  1      END;
000000 0  0
000000 0  0   DEFINE BPACTIVE = BPFLAG.<0>#,       ! current hit breakpoint flag for OSP
000000 0  0          BPSMI    = BPFLAG.<1>#,       ! OSP breakpoint
000000 0  0          BPCBASE  = BPFLAG.<2:5>#,     ! 00 - 07 -> R0 - R7
000000 0  0                                        ! 10 -> L-relative comparison
000000 0  0                                        ! 11 -> S-relative comparison
000000 0  0                                        ! 12 -> extended address comparison
000000 0  0                                        ! 13 -> G-relative comparison
000000 0  0          BPCATCH  = BPFLAG.<6>#,       ! invoke internal bugcatcher
000000 0  0          BPIDX    = BPFLAG.<11:12>#,   ! index mode for conditional breakpoint:
000000 0  0                                        ! 00 -> no index
000000 0  0                                        ! 01 -> I
000000 0  0                                        ! 10 -> IG
000000 0  0                                        ! 11 -> IX
000000 0  0          BPCTYPE  = BPFLAG.<13:15>#,   ! comparison type:
000000 0  0                                        ! 0 - unconditional
000000 0  0                                        ! 1 - =
000000 0  0                                        ! 2 - # ( <> )
000000 0  0                                        ! 3 - <
000000 0  0                                        ! 4 - >
000000 0  0                                        ! 5 - ? (dump memory location)
000000 0  0                                        ! 6 - () "execute mode" breakpoint      A04,gcl #1
000000 0  0          BPPRIV   = BPFLAG.<7>#,       ! MAB set by priv debug
000000 0  0          BPREAD   = BPFLAG.<8>#,       ! MAB read access
000000 0  0          BPEXEC   = BPFLAG.<9>#,       ! MAB execute access
000000 0  0          BPWRITE  = BPFLAG.<10>#,      ! MAB write access
000000 0  0          BPMODE   = BPFLAG.<8:10>#;
000000 0  0                                                                                !B00,RWC#5
000000 0  0   LITERAL BPTSIZE  = WLEN( BPT^TEMPLATE );                                       !B0C,RWC#5
000000 0  0                                                                                !B00,RWC#5
000000 0  0   ! When a breakpoint or other debug entry occurs, the debugger must obtain       B00,RWC#5
000000 0  0   ! its own stack area in order to avoid trashing the user's stack.  Eight        B10, MTR#9
000000 0  0   ! segments are reserved for this purpose, each containing 32 blocks             B10, MTR#9
000000 0  0   ! of 1 page each in the first half of the segment.                               B10, MTR#9
000000 0  0                                                                                !B00,RWC#5
000000 0  0   DEFINE DEBUGSTACK^AXADDR = AXBYTE( DEBUGSTACKSEG, 0 )#,                         !B00,RWC#5
000000 0  0          DEBUGSTACKADDR( PIN ) =                                                  !B00,RWC#5
000000 0  0                AXWORD( DEBUGSTACKSEG + PIN.<8:10>, PIN.<11:15> << 10 )#;          !B10, MTR#9
000000 0  0                                                                                !B00,SS #8
000000 0  0   LITERAL DEBUGSTACKLEN = 2048D;                                                 !B10, MTR#10
000000 0  0                                                                                !B10, MTR#10
000000 0  0   ! The following define is used by various procedures in SDEBUG to inform the    B00,SS #8
000000 0  0   ! dispatcher that the process registers need not be saved and that only the    B00,SS #8
000000 0  0   ! process time needs to be updated and saved.                                   B00,SS #8
000000 0  0   DEFINE SETSAVEPROCESSTIME = SIV[ DISP^SIV ].PARM.<10> := 1#;                    !B00,SS #8
000000 0  0   ?        SOURCE dpctl     ( pcblayout, processcontrol )
Source file:  [1]  $IMT.T9050C00.DPCTL  24OCT86 - 13:22:54
000000 0  0   ?SECTION PCBLAYOUT                                                             !B00,RWC#13
000000 0  0   ! The format of a process control block is shown here.  Fields marked "lobug"  B00,Bastogne #14
000000 0  0   ! are known to LOBUG by location; LOBUG must be changed whenever these fields   B00,Bastogne #14
000000 0  0   ! are relocated in the PCB.                                                     B00,Bastogne #14
000000 0  0                                                                                !B00,Bastogne #14
000000 0  0                                                                                !B30,Performance#37
000000 0  0   ! revisers of the PCB format beware that there are additional                   B30,Performance#37
000000 0  0   ! definitions in this section to allow alternative use of more                  B30,Performance#37
000000 0  0   ! efficient SG relative addressing to the PCB in the low-level                  B30,Performance#37
```

```
000000 0  0   ! procedures of the message system                                          B30,Performance#37
000000 0  0   ! it is important to keep these duplicate definitions consistent            B30,Performance#37
000000 0  0   ! so be careful, especially when changing bit field definitions             B30,Performance#37
000000 0  0                                                                               !B30,Performance#37
000000 0  0   STRUCT PCB^TEMPLATE (*);
000000 0  0   BEGIN                            !                 ---------------------------------- B00,Bastogne #14
000000 0  1    INT PCBLIST[0:1];               !             0:  *   list header for RLIST etc.   * B00,Bastogne #14
000000 0  1                                    !                 ----                         ---- B00,Bastogne #14
000000 0  1                                    !             1:  *                                * B00,Bastogne #14
000000 0  1                                    !                 ---------------------------------- B00,Bastogne #14
000000 0  1    INT PCBPRI;                     !             2:  * init. priority, cur. priority  * B00,Bastogne #14
000000 0  1                                    !                 ---------------------------------- B00,Bastogne #14
000000 0  1    INT PCBWAIT;                    !             3:  *   wait field                   * B00,Bastogne #14
000000 0  1                                    !                 ---------------------------------- B00,Bastogne #14
000000 0  1    INT PCBAWAKE;                   !             4:  *   awake field                  * B00,Bastogne #14
000000 0  1                                    !                 ---------------------------------- B00,Bastogne #14
000000 0  1    INT PCBFLAGS;                   !             5:  *   flag  word                   * B00,Bastogne #14
000000 0  1                                    !                 ---------------------------------- B00,Bastogne #14
000000 0  1    INT PCBMCPU;                    !             6:  *   cpu up/down mask             * C00,HA#50
000000 0  1                                    !                 ---------------------------------- C00,HA#50
000000 0  1    INT PCBLCSEGS;                  ! (lobug)     7:  *   # ul segs  |  # uc segs      * B00,Bastogne #14
000000 0  1                                    !                 ---------------------------------- B00,Bastogne #14
000000 0  1    INT PCBSTACKSEG;                ! (lobug)    10:  *   datastack segment number     * B00,Bastogne #14
000000 0  1                                    !                 ---------------------------------- B00,Bastogne #14
000000 0  1    INT PCBCODESEG;                 ! (lobug)    11:  *   base code segment number     * B00,Bastogne #14
000000 0  1                                    !                 ---------------------------------- B00,Bastogne #14
000000 0  1    INT PCBLIBSEG;                  ! (lobug)    12:  *   base library segment number  * B00,Bastogne #14
000000 0  1                                    !                 ---------------------------------- B00,Bastogne #14
000000 0  1    INT PCBSEG;                     ! (lobug)    13:  *   process segment table ptr.   * B00,Bastogne #14
000000 0  1                                    !                 ---------------------------------- B00,Bastogne #14
000000 0  1    INT PCBCURSEG;                  ! (lobug)    14:  *   current user segment ptr.    * B00,Bastogne #14
000000 0  1                                    !                 ---------------------------------- B00,Bastogne #14
000000 0  1    INT PCBPFSID;                   ! (lobug)    15:  *   PFS    id                    * B00,Bastogne #14
000000 0  1                                    !                 ---------------------------------- B00,Bastogne #14
000000 0  1    FIXED PCBPFSBASELIMIT[0:-1];    ! (lobug)    16:  *                                * B00,Bastogne #14
000000 0  1    INT(32) PCBPFSBASE;             !                 ----                         ---- B00,Bastogne #14
000000 0  1                                    ! (lobug)    17:  *                                * B00,Bastogne #14
000000 0  1                                    !                 ---------------------------------- B00,Bastogne #14
000000 0  1    INT(32) PCBPFSLIMIT;            ! (lobug)    20:  *   PFS    limit                 * B00,Bastogne #14
000000 0  1                                    !                 ----                         ---- B00,Bastogne #14
000000 0  1                                    ! (lobug)    21:  *                                * B00,Bastogne #14
000000 0  1                                    !                 ---------------------------------- B00,Bastogne #14
000000 0  1    INT PCBCURSPACEID;              !see below   22:  *   ENV w/spaceid at suspension  * B40,DW #42
000000 0  1                                    !                 ---------------------------------- B00,Bastogne #14
000000 0  1    INT PCBCURRENTUC;               !see below   23:  *   seg # of current UC / M reg  * B40,DW #42
000000 0  1                                    !                 ---------------------------------- B00,Bastogne #14
000000 0  1    INT PCBREG[0:11];               ! (lobug)    24:  *   register storage       S     * B00,Bastogne #14
000000 0  1                                    !                 ---------------------------------- B00,Bastogne #14
000000 0  1                                    ! (lobug)    25:  *                          P     * B00,Bastogne #14
000000 0  1                                    !
000000 0  1                                    !                 ---------------------------------- B00,Bastogne #14
000000 0  1                                    ! (lobug)    26:  *                          E     * B00,Bastogne #14
000000 0  1                                    !                 ---------------------------------- B00,Bastogne #14
000000 0  1                                    ! (lobug)    27:  *                          L     * B00,Bastogne #14
000000 0  1                                    !                 ---------------------------------- B00,Bastogne #14
000000 0  1                                    ! (lobug)    30:  *                          R0    * B00,Bastogne #14
000000 0  1                                    !                 ---------------------------------- B00,Bastogne #14
000000 0  1                                    ! (lobug)    31:  *                          R1    * B00,Bastogne #14
```

```
000000 0   1                                 !                ---------------------------------- B00,Bastogne #14
000000 0   1                                 ! (lobug) 32:  *                          R2      * B00,Bastogne #14
000000 0   1                                 !                ---------------------------------- B00,Bastogne #14
000000 0   1                                 ! (lobug) 33:  *                          R3      * B00,Bastogne #14
000000 0   1                                 !                ---------------------------------- B00,Bastogne #14
000000 0   1                                 ! (lobug) 34:  *                          R4      * B00,Bastogne #14
000000 0   1                                 !                ---------------------------------- B00,Bastogne #14
000000 0   1                                 ! (lobug) 35:  *                          R5      * B00,Bastogne #14
000000 0   1                                 !                ---------------------------------- B00,Bastogne #14
000000 0   1                                 ! (lobug) 36:  *                          R6      * B00,Bastogne #14
000000 0   1                                 !                ---------------------------------- B00,Bastogne #14
000000 0   1                                 ! (lobug) 37:  *                          R7      * B00,Bastogne #14
000000 0   1                                 !                ---------------------------------- B00,Bastogne #14
000000 0   1   INT PCBMEM[0:1];              !         40:  *   Absolute extended address of * B00,Bastogne #14
000000 0   1                                 !                ---------------------------------- B00,Bastogne #14
000000 0   1   INT (32) PCBMEMXA = PCBMEM;   !         41:  *   page fault       |  request  * B00,Bastogne #14
000000 0   1                                 !                ---------------------------------- B00,Bastogne #14
000000 0   1   INT PCBMQ[0:1];               !         42:  *   message queue header         * B00,Bastogne #14
000000 0   1                                 !                ----                          ---- B00,Bastogne #14
000000 0   1                                 !         43:  *                                * B00,Bastogne #14
000000 0   1                                 !              ----------------------------------   B00,Bastogne #14
000000 0   1   INT PCBLCB;                   !         44:  *   LCB pointer for msg system   * B00,Bastogne #14
000000 0   1                                 !                ---------------------------------- B00,Bastogne #14
000000 0   1   INT PCBMCNT;                  !         45:  *   status message counter       * B00,Bastogne #14
000000 0   1                                 !                ---------------------------------- B00,Bastogne #14
000000 0   1   INT PCBLCBRR;                 !         46:  *   listen LCB reservations      * B00,Bastogne #14
000000 0   1                                 !                ---------------------------------- B00,Bastogne #14
000000 0   1   INT PCBLCBUR;                 !         47:  *   listen LCB usage             * B00,Bastogne #14
000000 0   1                                 !              ----------------------------------   B00,Bastogne #14
000000 0   1   INT PCBLCBRS;                 !         50:  *   link LCB reservations        * B00,Bastogne #14
000000 0   1                                 !                ---------------------------------- B00,Bastogne #14
000000 0   1   INT PCBLCBUS;                 !         51:  *   link LCB usage               * B00,Bastogne #14
000000 0   1                                 !                ---------------------------------- B00,Bastogne #14
000000 0   1   INT(32) PCBSEM;               !         52:  *   semaphore timeout address    * C00,HA#50
000000 0   1                                 !                ----                          ---- C00,HA#50
000000 0   1                                 !         53:  *                                * C00,HA#50
000000 0   1                                 !                ---------------------------------- C00,HA#50
000000 0   1   INT PCBTOL[0:1];              !         54:  *   timeout list link            * C00,HA#50
000000 0   1                                 !                ----                          ---- C00,HA#50
000000 0   1                                 !         55:  *                                * C00,HA#50
000000 0   1                                 !                ------------        ------------ C00,HA#50
000000 0   1   INT(32) PCBTO;                !         56:  *   timeout value in 10ms units  * C00,HA#50
000000 0   1                                 !                ----                          ---- B00,Bastogne #14
000000 0   1                                 !         57:  *     (PCBTO mod 2 must be 0)    * B00,Bastogne #14
000000 0   1                                 !                ---------------------------------- B00,Bastogne #14
000000 0   1   INT PCBGROUPINFO;             !         60:  *   process group control        * B00,Bastogne #14
000000 0   1                                 !                ---------------------------------- B00,Bastogne #14
000000 0   1   INT PCBCRT[0:2];              !         61:  *   creation                     * B00,Bastogne #14
000000 0   1                                 !                ----                          ---- B00,Bastogne #14
000000 0   1                                 !         62:  *   timestamp of                 * B00,Bastogne #14
000000 0   1                                 !                ----                          ---- B00,Bastogne #14
000000 0   1                                 !         63:  *   this process                 * B00,Bastogne #14
000000 0   1                                 !                ---------------------------------- B00,Bastogne #14
000000 0   1   INT PCBCRAID;                 !         64:  *   access id of creator         * B00,Bastogne #14
000000 0   1                                 !                ---------------------------------- B00,Bastogne #14
000000 0   1   INT PCBPROCAID;               !         65:  *   access id of process         * B00,Bastogne #14
000000 0   1                                 !                ---------------------------------- B00,Bastogne #14
000000 0   1   INT PCBMABSAVE;               !         66:  *   saved memory contents        * B00,Bastogne #14
```

```
000000 0 1                                       !            ---------------------------------- B00,Bastogne #14
000000 0 1    INT DEVELOPMENT;                   !       67:  *   spare location               * C00,HA#50
000000 0 1                                       !            ---------------------------------- C00,HA#50
000000 0 1    INT PCBMOREFLAGS;                  !       70:  *   more flag bits               * B00,Bastogne #14
000000 0 1                                       !            ---------------------------------- B00,Bastogne #14
000000 0 1    INT(32) PCBXPTR;                   !       71:  *                                * C00,HA#50
000000 0 1                                       !            --- ptr to Measure data block  --- C00,HA#50
000000 0 1                                       !       72:  *                                * C00,HA#50
000000 0 1                                       !            ---------------------------------- B00,Bastogne #14
000000 0 1    INT( 32 ) PCBPTIMER;               !       73:  * save area for process timer    * B00,SS #19
000000 0 1                                       !            ---                            --- C00,HA#50
000000 0 1                                       !       74:  *                                * B00,SS #19
000000 0 1                                       !            ---------------------------------- B00,Bastogne #14
000000 0 1    INT PCBAWAKEEVENT;                 !       75:  *        reason for awake        * C00,HA#50
000000 0 1                                       !            ---------------------------------- C00,HA#50
000000 0 1    INT PCBMAB;                        ! (lobug) 76:  *   ptr to MAB if armed        * B00,Bastogne #14
000000 0 1                                       !            ---------------------------------- B00,Bastogne #14
000000 0 1    INT PCBPID;                        !       77:  *    This PCB's PID (cpu,pin)    * C00,HA#50
000000 0 1                                       !            ---------------------------------- B00,Bastogne #14
000000 0 1   END;                                                                               !A04,FOX-NRT#2
000000 0 0                                                                                      !A05,NRD#7
000000 0 0   ! NOTE:                                                                             B00,Bastogne #14
000000 0 0   ! The field PCBCURSPACEID must always be located at PCBREG[-2].  Also, the          B00,Bastogne #14
000000 0 0   ! word PCBREG[-1] (for now PCBCURRENTUC) is used for two purposes : first to        B00,Bastogne #14
000000 0 0   ! store the absolute segment number of the currently mapped user code               B00,Bastogne #14
000000 0 0   ! segment and, second, to store the mask register just when a process is            B00,Bastogne #14
000000 0 0   ! about to be launched.  The dispatcher calculates the new value of the             B00,Bastogne #14
000000 0 0   ! interrupt mask register and stores it in PCBREG[-1], sets its L-reg to            B00,Bastogne #14
000000 0 0   ! point to PCBREG[3] and executes the IXIT instruction to launch the new             B00,Bastogne #14
000000 0 0   ! process.  IXIT uses the words L-5:L+8 to resume from the interrupt (which         B00,Bastogne #14
000000 0 0   ! is PCBCURSPACEID through PCBREG[11]).                                             B00,Bastogne #14
000000 0 0                                                                                      !A05,NRD#7
000000 0 0   DEFINE  STOPF = PCBFLAGS.<0:1>#,        ! stop mode
000000 0 0                                           !       0: anyone may stop me
000000 0 0                                           !       1: creator may stop me
000000 0 0                                           !       2: no one may stop me
000000 0 0           QSTOPF = PCBFLAGS.<2:3>#,       ! queued stops
000000 0 0                                           !       0: none
000000 0 0                                           !       1: an anyone tried to stop me
000000 0 0                                           !       2: creator tried to stop me
000000 0 0                                           ! stop will occur when  QSTOPF > STOPF
000000 0 0                                           !
000000 0 0           PRIVCODEF = PCBFLAGS.<4>#,      ! process has priv. user code
000000 0 0                                           !
000000 0 0           PRIORITYQ = PCBFLAGS.<5>#,      ! queue requests on a
000000 0 0                                           ! priority basis
000000 0 0                                           !
000000 0 0           SYSPROC = PCBFLAGS.<6>#,        ! system process
000000 0 0                                           !
000000 0 0           LOOPTIMEOUT = PCBFLAGS.<7>#,    ! process has timed out
000000 0 0                                           !
000000 0 0           PCBREMID = PCBFLAGS.<8>#,       ! remote logon
000000 0 0                                           !
000000 0 0           PCBMONNET = PCBFLAGS.<9>#,      ! net monitoring on
000000 0 0                                           !
000000 0 0           PCBIOMON  = PCBFLAGS.<10>#,     ! I/O-process type of status messages
000000 0 0                                           ! required
                                                     !
```

```
000000 0  0
000000 0  0          PCBMONNEW = PCBFLAGS.<11>#, ! monitoring new messages
000000 0  0                                      !
000000 0  0          PCBQABEND = PCBFLAGS.<12>#, ! queued stop is for abend          B30,MTR#33
000000 0  0                                      !                                    B00,DW #20
000000 0  0          PCBNOTUSED3 = PCBFLAGS.<13>#, ! yet another spare flag          B00,DW #20
000000 0  0                                      !                                    B00,DW #20
000000 0  0          PCBINSYSMAB = PCBFLAGS.<13>#,      !*** DELETE INSPECT ***       B00,DW #20
000000 0  0          PCBINDBG = PCBFLAGS.<12>#,         !*** DELETE INSPECT ***       B00,DW #20
000000 0  0          PCBXRAYED = PCBFLAGS.<14>#, ! process being looked at by Recorder
000000 0  0                                      !
000000 0  0          PCBMQVISIBLE = PCBFLAGS.<15>#; ! 1 if ok to queue incoming msgs    B30,Performance#37
000000 0  0                                      ! money.                              A04,RWC#4
000000 0  0
000000 0  0  DEFINE  PRIVLIBF = PCBMOREFLAGS.<0>#,  ! process has priv. library code
000000 0  0          READCODEF = PCBMOREFLAGS.<1>#, ! process has read access to user code
000000 0  0          READLIBF = PCBMOREFLAGS.<2>#,  ! process has read access to library code
000000 0  0          PCBWAITLCB = PCBMOREFLAGS.<3>#;! no looptimer traps in stoppable mode
000000 0  0  DEFINE  PCBPFSINIT = PCBMOREFLAGS.<4>#;! PFS has been initialized by filsys    A01,gcl
000000 0  0  DEFINE  PCBLISTENXB= PCBMOREFLAGS.<5>#;! queue messages for LISTENX (XLBs)     C00,JDK#47
000000 0  0  DEFINE  PCBFORCEZEROMSGTYPE =                                                 !A05,hsc #9
000000 0  0                    PCBMOREFLAGS.<6>#; ! force zero-type messages to be used     A05,hsc #9
000000 0  0                                       ! so dp doesn't queue tmp messages        A05,hsc #9
000000 0  0  DEFINE  PCBNOMSG52B= PCBMOREFLAGS.<7>#;!disable console message 52            C00,JDK#47
000000 0  0  DEFINE  PCBPFAULTNOTALLOWED =                                                 !B40,DW #42
000000 0  0                    PCBMOREFLAGS.<8>#; ! process not allowed to page fault      B40,DW #42
000000 0  0  DEFINE  IOPPROC     = PCBMOREFLAGS.<9>#; ! process is an IOP                   C00,SSW#51
000000 0  0  DEFINE  NOSTOPPROC = PCBMOREFLAGS.<11>#;! Runnable but unstoppable process     B00,RKS #15
000000 0  0  DEFINE  PCBSYSFTAB =                                                          !A05,GSK0719#5
000000 0  0                    PCBMOREFLAGS.<12>#; ! Process is using its system file table A05,GSK0719#5
000000 0  0                                                                                !A05,GSK0719#5
000000 0  0  DEFINE  PCBNOMONOPEN = PCBMOREFLAGS.<13:15>#;!to avoid monitor req during open  A03,wrl;K02,gcl
000000 0  0
000000 0  0  DEFINE PCBINITPRI = PCBPRI.<0:7>#,  ! initial priority of process
000000 0  0                                      !
000000 0  0         PCBCURPRI  = PCBPRI.<8:15>#; ! current priority of process
000000 0  0
000000 0  0
000000 0  0  ! Currently assigned events and corresponding bits.  Lowest bit # is highest
000000 0  0  ! priority:
000000 0  0                       !        15: LSEM - extended semaphore                 A06,ROL#12
000000 0  0                       !        14: PWU  - private wakeup                     A06,ROL#12
000000 0  0                       !        12: LRABBIT - Server class event.             B30,Rabbit#32
000000 0  0                       !         7: LREQ - requesting a link                  B00,RKS #15
000000 0  0                       !         6: LTMF - TMF request                        A02,lbl
000000 0  0                       !         5: LDONE - link done
000000 0  0                       !         4: LCAN - link cancel
000000 0  0                       !         3: LINSP - INSPECT event                     A03,CKS#1
000000 0  0                       !         2: INTR - interrupt
000000 0  0                       !         1: IOPON - I/O power on
000000 0  0                       !         0: PON - power on
000000 0  0                                                                            !A06,ROL#12
000000 0  0  LITERAL                      LSEM   = %1,                                 !A06,ROL#12
000000 0  0                               PWU    = %2,                                 !A06,ROL#12
000000 0  0                               LRABBIT = %10,                               !B30,Rabbit#32
000000 0  0                               LREQ   = %400,                               !A06,ROL#12
000000 0  0                               LTMF   = %1000,                              !A02,lbl
```

```
000000 0  0                                         LDONE = %2000,
000000 0  0                                         LCAN  = %4000,
000000 0  0                                         LINSP = %10000,                         !A03,CKS#1
000000 0  0                                         INTR  = %20000,
000000 0  0                                         IOPON = %40000,
000000 0  0                                         PON   = %100000;
000000 0  0                              !
000000 0  0   DEFINE PCBHEADPIN   = PCBGROUPINFO.<0:7>#, ! head pin of group               B00,Bastogne #14
000000 0  0          PCBGROUPNEXT = PCBGROUPINFO.<8:15>#;! next pin in grp or 0           B00,Bastogne #14
000000 0  0                                                                               !B00,Bastogne #14
000000 0  0   DEFINE PCBMYPIN     = PCBPID.<8:15>#;       ! PIN of each PCB               B00,Bastogne #14
000000 0  0                                                                               !B00,Bastogne #14
000000 0  0   DEFINE PCBLIBCOUNT  = PCBLCSEGS.<0:7> #;    ! number of library spaces      B00,Bastogne #14
000000 0  0   DEFINE PCBCODECOUNT = PCBLCSEGS.<8:15> #;   ! number of code spaces         B00,Bastogne #14
000000 0  0   ! This is the PCB extension.  It is allocated in a segment separate from system B00,Bastogne #14
000000 0  0   ! data.  Each PCB addresses its extension by a extended pointer.  These          B00,Bastogne #14
000000 0  0   ! pointers are initialized by SYSGEN.                                           B00,Bastogne #14
000000 0  0                                                                               !B00,Bastogne #14
000000 0  0   STRUCT PCBEXT^TEMPLATE (*);                                                     !B00,Bastogne #14
000000 0  0   BEGIN                            !           ---------------------------------- B00,Bastogne #14
000000 0  1    INT PCBXFLAGS;                  !      0:   *   flag word                    * B00,Bastogne #14
000000 0  1                                    !           ---------------------------------- B00,Bastogne #14
000000 0  1    INT PCBXDBGP;                   !      1:   *   saved P for debug stop       * B00,Bastogne #14
000000 0  1                                    !           ---------------------------------- B00,Bastogne #14
000000 0  1    INT PCBXDBGE;                   !      2:   *   saved E for debug stop       * B00,Bastogne #14
000000 0  1                                    !           ---------------------------------- B00,Bastogne #14
000000 0  1    INT PCBXDBGSPACEID;             !      3:   *   saved SPACEID for debug stop * B00,Bastogne #14
000000 0  1                                    !           ---------------------------------- B00,Bastogne #14
000000 0  1    INT PCBXFILESEC;                !      4:   *   default file security        * B00,Bastogne #14
000000 0  1                                    !           ---------------------------------- B00,Bastogne #14
000000 0  1    INT PCBXERROR;                  !      5:   *   last file error              * B00,Bastogne #14
000000 0  1                                    !           ---------------------------------- B00,Bastogne #14
000000 0  1    INT PCBXFIRSTSTACK;             !      6:   *   seg# of initial stack seg.   * B00,Bastogne #14
000000 0  1                                    !           ---------------------------------- B00,Bastogne #14
000000 0  1    INT PCBXMOM[0:3];               !      7:   *   creation                     * B00,Bastogne #14
000000 0  1                                    !           ----                          ---- B00,Bastogne #14
000000 0  1                                    !     10:   *   timestamp of                 * B00,Bastogne #14
000000 0  1                                    !           ----                          ---- B00,Bastogne #14
000000 0  1                                    !     11:   *   creator                      * B00,Bastogne #14
000000 0  1                                    !           -------  -------------  -------- B00,Bastogne #14
000000 0  1                                    !     12:   *   pid of creator               * B00,Bastogne #14
000000 0  1                                    !           ---------------------------------- B00,Bastogne #14
000000 0  1    INT PCBXIRE;                    !     13:   *   E reg. w/ spaceid for traps  * B00,Bastogne #14
000000 0  1                                    !           ---------------------------------- B00,Bastogne #14
000000 0  1    INT PCBXTRS;                    !     14:   *   S register for traps         * B00,Bastogne #14
000000 0  1                                    !           ---------------------------------- B00,Bastogne #14
000000 0  1    INT PCBXTRP;                    !     15:   *   P register for traps         * B00,Bastogne #14
000000 0  1                                    !           ---------------------------------- B00,Bastogne #14
000000 0  1    INT PCBXTERM[0:7];              !     16:   * hometerm name & subname        * B00,Bastogne #14
000000 0  1                                    !           ----                          ---- A06,cks #11
000000 0  1                                    !     17:   *                                * B00,Bastogne #14
000000 0  1                                    !           ----                          ---- A06,cks #11
000000 0  1                                    !     20:   *                                * B00,Bastogne #14
000000 0  1                                    !           ----                          ---- A06,cks #11
000000 0  1                                    !     21:   *                                * B00,Bastogne #14
000000 0  1                                    !           ----                          ---- A06,cks #11
000000 0  1                                    !     22:   *                                * B00,Bastogne #14
000000 0  1                                    !           ----                          ---- A06,cks #11
```

```
000000 0 1                                      !  23:  *                                  * B00,Bastogne #14
000000 0 1                                      !       ----                            ---- A06,cks #11
000000 0 1                                      !  24:  *                                  * B00,Bastogne #14
000000 0 1                                      !       ----                            ---- A06,cks #11
000000 0 1                                      !  25:  *                                  * B00,Bastogne #14
000000 0 1                                      !       ---------------------------------- B00,DW #17
000000 0 1   INT PCBXCRAID;                     !  26:  *  creator access id               * B00,DW #17
000000 0 1                                      !       ---------------------------------- B00,DW #17
000000 0 1   INT( 32 ) PCBXPTLIST[ 0:1 ];       !  27:  *  list header for process         * B00,SS #18
000000 0 1                                      !       ----                          ----- B00,SS #18
000000 0 1                                      !  30:  *  TLE ( PTLE ) list               * B00,SS #18
000000 0 1                                      !       ---------            ----------- B00,SS #18
000000 0 1                                      !  31:  *                                  * B00,SS #18
000000 0 1                                      !       ----                          ----- B00,SS #18
000000 0 1                                      !  32:  *                                  * B00,SS #18
000000 0 1                                      !       ---------------------------------- B00,SS #18
000000 0 1   FIXED PCBXPTIME;                   !  33:  *  process time in micro sec.      * B00,SS #18
000000 0 1                                      !       ----                          ----- B00,SS #18
000000 0 1                                      !  34:  *                                  * B00,SS #18
000000 0 1                                      !       ----                          ----- B00,SS #18
000000 0 1                                      !  35:  *                                  * B00,SS #18
000000 0 1                                      !       ----                          ----- B00,SS #18
000000 0 1                                      !  36:  *                                  * B00,SS #18
000000 0 1                                      !       ---------------------------------- B00,SS #18
000000 0 1  INT PCBXCONTEXTCHANGES;             !  37:  * # of changes to proc. context    * B20,SS #27
000000 0 1                                      !       ----                          ----- B00,SS #18
000000 0 1  FILLER 2;                           !  40:  *          unused                  * B20,SS #27
000000 0 1                                      !       ---------------------------------- B00,SS #18
000000 0 1   STRUCT PCBXPTLE[ 0:1 ];            !       two "reduced" PTLEs follow:         B00,SS #18
000000 0 1                                      !       PTLE for system loop timing         B00,SS #18
000000 0 1   BEGIN                              !       ---------------------------------- B00,SS #18
000000 0 2   INT (32) PTLINK[ 0:1 ];            !  41:  *list links (extended addresses) * B00,SS #18
000000 0 2                                      !       ----                          ---- B00,SS #18
000000 0 2   ! this struct defines two    !     !  42:  *                                * B00,SS #18
000000 0 2   ! "reduced" PTLEs that       !     !       --------              -------- B00,SS #18
000000 0 2   ! are smaller in size than   !     !  43:  *                                * B00,SS #18
000000 0 2   ! the regular PTLE which is  !     !       ----                          ---- B00,SS #18
000000 0 2   ! defined in a later section !     !  44:  *                                * B00,SS #18
000000 0 2   ! in this file               !     !       -------------------------------- B00,SS #18
000000 0 2   FIXED PTTOVAL;                     !  45:  *     timeout value in           * B00,SS #18
000000 0 2                                      !       ----                          ---- B00,SS #18
000000 0 2                                      !  46:  *     micro-seconds              * B00,SS #18
000000 0 2                                      !       ----                          ---- B00,SS #18
000000 0 2                                      !  47:  *                                * B00,SS #18
000000 0 2                                      !       ----                          ---- B00,SS #18
000000 0 2                                      !  50:  *                                * B00,SS #18
000000 0 2                                      !       -------------------------------- B00,SS #18
000000 0 2   INT PTTYPOWN;                      !  51:  *:* PTSYS   *:*:* owner pin      * B00,SS #18
000000 0 2   END;                               !       -------------------------------- B00,SS #18
000000 0 1                                      !       PTLE for user loop timing         B00,SS #18
000000 0 1                                      !       -------------------------------- B00,SS #18
000000 0 1                                      !  52:  *list links (extended addresses)* B00,SS #18
000000 0 1                                      !       ----                          ---- B00,SS #18
000000 0 1                                      !  53:  *                                * B00,SS #18
000000 0 1                                      !       --------              -------- B00,SS #18
000000 0 1                                      !  54:  *                                * B00,SS #18
000000 0 1                                      !       ----                          ---- B00,SS #18
```

```
3348.     000000 0  1                                   !    55:  *                                  *  B00,SS #18
3349.     000000 0  1                                   !         ------------------------------------  B00,SS #18
3350.     000000 0  1                                   !    56:  *      timeout value in            *  B00,SS #18
3351.     000000 0  1                                   !         ----                          ----  B00,SS #18
3352.     000000 0  1                                   !    57:  *      micro-seconds               *  B00,SS #18
3353.     000000 0  1                                   !         ----                          ----  B00,SS #18
3354.     000000 0  1                                   !    60:  *                                  *  B00,SS #18
3355.     000000 0  1                                   !         ----                          ----  B00,SS #18
3356.     000000 0  1                                   !    61:  *                                  *  B00,SS #18
3357.     000000 0  1                                   !         ------------------------------------  B00,SS #18
3358.     000000 0  1                                   !    62:  *:* PTUSER  *:*:* owner pin        *  B00,SS #18
3359.     000000 0  1                                   !         ------------------------------------  B00,SS #18
3360.     000000 0  1  INT PCBXPSTATEFLAGS;             !    63:  *       Process State Flags        *  B00,DW #20
3361.     000000 0  1                                   !         ------------------------------------  B00,DW #20
3361.01   000000 0  1  INT PCBXGMOMCRTPID[0:3];         !    64:  *           GMOM-CRTPID            *  B40,BDH#40
3361.02   000000 0  1                                   !         ----                          ----  B40,BDH#40
3361.03   000000 0  1                                   !    65:  *      If process belongs to       *  B40,BDH#40
3361.04   000000 0  1                                   !         ----                          ----  B40,BDH#40
3361.05   000000 0  1                                   !    66:  *      a Job, otherwise zero.      *  B40,BDH#40
3361.06   000000 0  1                                   !         ----                          ----  B40,BDH#40
3361.07   000000 0  1                                   !    67:  *                                  *  B40,BDH#40
3361.08   000000 0  1                                   !         ------------------------------------  B40,BDH#40
3361.09   000000 0  1  INT PCBXGMOMJOBID;               !    70:  *  GMOM-JOBID (for Batch job)      *  B40,BDH#40
3361.1    000000 0  1                                   !         ------------------------------------  B40,BDH#40
3361.11   000000 0  1  INT(32) PCBXCMPLCODEPTR;         !    71:  *  CMPLCODE ptr to EXTPOOL         *  B40,BDH#40
3361.12   000000 0  1                                   !         ----                          ----  B40,BDH#40
3361.13   000000 0  1                                   !    72:  *                                  *  B40,BDH#40
3361.14   000000 0  1                                   !         ------------------------------------  B40,BDH#40
3361.15   000000 0  1  INT PCBXRECVLIMIT;               !    73:  *       receive XLI limit          *  C00,JDK#47
3361.16   000000 0  1                                   !         ------------------------------------  C00,JDK#47
3361.17   000000 0  1  INT PCBXSENDLIMIT;               !    74:  *       send XLI limit             *  C00,JDK#47
3361.18   000000 0  1                                   !         ------------------------------------  C00,JDK#47
3361.19   000000 0  1  INT PCBXRECVUSE;                 !    75:  *       receive XLI use count      *  C00,JDK#47
3361.2    000000 0  1                                   !         ------------------------------------  C00,JDK#47
3361.21   000000 0  1  INT PCBXSENDUSE;                 !    76:  *       send XLI use count         *  C00,JDK#47
3361.22   000000 0  1                                   !         ------------------------------------  C00,JDK#47
3361.23   000000 0  1  FILLER 2;                        !    77:  *       unused                     *  C00,JDK#47
3361.24   000000 0  1                                   !         ------------------------------------  C00,JDK#47
3361.25   000000 0  1  INT(32) PCBXRECVHEAD,            !  %100:  *                                  *  C00,JDK#47
3361.26   000000 0  1          PCBXRECVQ =              !         ----    queue of XLBs for     ----  C00,JDK#47
3361.27   000000 0  1          PCBXRECVHEAD;            !   101:  *       this process (the          *  C00,JDK#47
3361.28   000000 0  1                                   !         -----   equivalent of PCBMQ, -----  C00,JDK#47
3361.29   000000 0  1  INT(32) PCBXRECVTAIL;            !   102:  *       for XLIs instead of      . *  C00,JDK#47
3361.3    000000 0  1                                   !         ----    LCBs)                 ----  C00,JDK#47
3361.31   000000 0  1                                   !   103:  *                                  *  C00,JDK#47
3361.32   000000 0  1                                   !         ------------------------------------  C00,JDK#47
3361.33   000000 0  1  INT(32) PCBXFSDONEHEAD,          !   104:  *                                  *  C00,JDK#47
3361.34   000000 0  1          PCBXFSDONEQ =            !         ----    queue of XLBs for     ----  C00,JDK#47
3361.35   000000 0  1          PCBXFSDONEHEAD;          !   105:  *       file-system DONE           *  C00,JDK#47
3361.36   000000 0  1                                   !         -----   queueing             -----  C00,JDK#47
3361.37   000000 0  1  INT(32) PCBXFSDONETAIL;          !   106:  *                                  *  C00,JDK#47
3361.38   000000 0  1                                   !         ----                          ----  C00,JDK#47
3361.39   000000 0  1                                   !   107:  *                                  *  C00,JDK#47
3361.4    000000 0  1                                   !         ------------------------------------  C00,JDK#47
3361.41   000000 0  1  INT(32) PCBXJUNKXLBHEAD,         !  %110:  *                                  *  C00,JDK#47
3361.42   000000 0  1          PCBXJUNKXLBQ =           !         ----    queue of idle XLBs s  ----  C00,JDK#47
3361.43   000000 0  1          PCBXJUNKXLBHEAD;         !   111:  *       for this process           *  C00,JDK#47
```

```
000000 0 1                                 !       ----   or process group     ----  C00,JDK#47
000000 0 1        INT(32) PCBXJUNKXLBTAIL;  !   112:  *                           *  C00,JDK#47
000000 0 1                                 !       ----                       ----  C00,JDK#47
000000 0 1                                 !   113:  *                           *  C00,JDK#47
000000 0 1                                 !       ---------------------------------  C00,JDK#47
000000 0 1        INT PCBXOWNEDXLIS;       !   114:  *    XLBs owned by process   *  C00,JDK#47
000000 0 1                                 !       ---------------------------------  C00,JDK#47
000000 0 1        FILLER 2*11;             !   115:  *    UNUSED                  *  C00,SS #49
000000 0 1                                 !       ----                       ----  C00,JDK#47
000000 0 1                                 !         *    UNUSED                  *  C00,SS #49
000000 0 1                                 !       ----                       ----  C00,JDK#47
000000 0 1                                 !  %127:  *    UNUSED                  *  C00,SS #49
000000 0 1                                 !       ---------------------------------  C00,JDK#47
000000 0 1                                                                          !C00,JDK#47
000000 0 1      INT .EXT PCBXRECVHEADITEM = PCBXRECVHEAD;                           !C00,JDK#47
000000 0 1      INT .EXT PCBXRECVTAILITEM = PCBXRECVTAIL;                           !C00,JDK#47
000000 0 1      INT .EXT PCBXFSDONEHEADITEM = PCBXFSDONEHEAD;                       !C00,JDK#47
000000 0 1      INT .EXT PCBXFSDONETAILITEM = PCBXFSDONETAIL;                       !C00,JDK#47
000000 0 1      INT .EXT PCBXJUNKXLBHEADITEM = PCBXJUNKXLBHEAD;                     !C00,JDK#47
000000 0 1      INT .EXT PCBXJUNKXLBTAILITEM = PCBXJUNKXLBTAIL;                     !C00,JDK#47
000000 0 1                                                                          !C00,JDK#47
000000 0 1      END;                                                                !B00,DW #20
000000 0 0                                                                          !A06,cks #11
000000 0 0  DEFINE  PCBX( N ) = $DBLL( %40000 LOR PCBXSEG,                          !A04,FOX-NRT#2
000000 0 0                  N * ( $LEN( PCBEXT^TEMPLATE )/2 ) ) '<<' 1 #;           !B30,Performance#37
000000 0 0                                                                          !A04,FOX-NRT#2
000000 0 0  DEFINE                                                                  !A05,RKS#6
000000 0 0       PCBXPBACKUP      = PCBXFLAGS.<0>#,      ! PROCESS STOP/ABEND IS PAIRED.      B40,Rey#38
000000 0 0       PCBXPABEND       = PCBXFLAGS.<1>#,      ! PROCESS TERMINATION IS ABEND.      B40,Rey#38
000000 0 0       PCBXDEFMODE    = PCBXFLAGS.<02:03>#,    ! STATUS OF DEFINE USE               B20,SS #26
000000 0 0       PCBXWAITDONE     = PCBXFLAGS.<04>#,     ! PROCESS HAS WAITED                 B00,SS #19
000000 0 0       PCBXTIMERTRAP    = PCBXFLAGS.<05>#,     ! PROCESS LOOP TIMEOUT TRAP PENDING; B00,SS #19
000000 0 0                                               ! EXIT BOMB SET IN LAST USER MARKER  B00,SS #18
000000 0 0                                               ! BY TRAPOUT                         B00,SS #18
000000 0 0       PCBXDEBUG        = PCBXFLAGS.<07>#,     ! EXIT BOMB SET IN LAST USER MARKER  B00,SS #19
000000 0 0                                               ! BY XDEBUG AND DEBUGGER TO INVOKE   B00,SS #18
000000 0 0                                               ! THE DEBUGGER ON EXIT FROM SYS CODE B00,SS #18
000000 0 0       PCBXFILELICENSED  = PCBXFLAGS.<08>#,    ! OBJECT FILE LICENSED               B40,RKS #41
000000 0 0       PCBXSQLLICENSED   = PCBXFLAGS.<08>#,    ! SQL LICENSED                       B40,RKS #41
000000 0 0       PCBXPSTOPBUFTYPE = PCBXFLAGS.<09:11>#,! STOP BUF TYPE; IF 1 ITS CCODE      C00,BATCH#48
000000 0 0                                               ! IF 2 ITS DOWN REV, IF 3 ITS TRAP.  B40,BATCH#46
000000 0 0                                               ! IF 4 ITS AWAKE FROM STOP/ABEND.    C00,BATCH#48
000000 0 0       PCBXINSPECTMODEON = PCBXFLAGS.<15>#,    ! INSPECT ENABLED                    A05,RKS#6
000000 0 0       PCBXSAVEABENDFILE = PCBXFLAGS.<14>#,    ! INSPECT ABEND FILE PROPAGATION ON  A05,RKS#6
000000 0 0       PCBXWANTSINSPECT  = PCBXFLAGS.<13>#;    ! INSPECT PROPAGATION ON             A05,RKS#6
000000 0 0                                                                          !B00,RKS #21
000000 0 0  DEFINE   PCBXPSTATE          = PCBXPSTATEFLAGS.<11:15>#, ! PROCESS STATE         B00,DW #20
000000 0 0           PCBXPSTATEPENDING   = PCBXPSTATEFLAGS.<10>#,    ! STATE PENDING FLAG    B00,DW #20
000000 0 0           PCBXPSTATELOGGEDON  = PCBXPSTATEFLAGS.<9>#,     ! LOGGED ON FLAG        B00,DW #20
000000 0 0           PCBXPHOENIXPROC     = PCBXPSTATEFLAGS.<8>#,     ! TEMPORARY PROCESS     B00,DW #20
000000 0 0           PCBXPSTATENOTUSED5    = PCBXPSTATEFLAGS.<7>#,   ! SAVED NO MSG FLAG     B30,Performance#37
000000 0 0           PCBXINSYSMAB        = PCBXPSTATEFLAGS.<6>#;     ! MAB IN SYSTEM CODE    B00,DW #20
000000 0 0  LITERAL  PSTATEUNALLOCATED =  0,     ! PCB IS UNALLOCATED                       B00,DW #20
000000 0 0           PSTATESTARTING    =  1,     ! PROCESS IS STARTING                      B00,DW #20
000000 0 0           PSTATERUNNABLE    =  2,     ! PROCESS IS READY TO RUN                  B00,DW #20
000000 0 0           PSTATESUSPENDED   =  3,     ! PROCESS IS SUSPENDED                     B00,DW #20
000000 0 0           PSTATEDEBUGMAB    =  4,     ! PROCESS IS IN MAB DEBUG                  B00,DW #20
```

```
3390.     000000 0  0          PSTATEDEBUGBRK     =  5,    ! PROCESS IS IN BREAKPOINT DEBUG          B00,DW #20
3391.     000000 0  0          PSTATEDEBUGTRAP    =  6,    ! PROCESS IS IN TRAP DEBUG                B00,DW #20
3392.     000000 0  0          PSTATEDEBUGREQ     =  7,    ! PROCESS IS IN REQUEST DEBUG             B00,DW #20
3393.     000000 0  0          PSTATEINSPECTMAB   =  8,    ! PROCESS IS IN MAB INSPECT               B00,DW #20
3394.     000000 0  0          PSTATEINSPECTBRK   =  9,    ! PROCESS IS IN BREAKPOINT INSPECT        B00,DW #20
3395.     000000 0  0          PSTATEINSPECTTRAP  = 10,    ! PROCESS IS IN TRAP INSPECT              B00,DW #20
3396.     000000 0  0          PSTATEINSPECTREQ   = 11,    ! PROCESS IS IN REQUEST INSPECT           B00,DW #20
3397.     000000 0  0          PSTATESAVEABEND    = 12,    ! PROCESS IS IN SAVE ABEND MODE           B00,DW #20
3398.     000000 0  0          PSTATETERMINATING  = 13;    ! PROCESS IS STOPPING                     B00,DW #20
3398.1    000000 0  0                                                                               !B10,HA#25
3399.     000000 0  0  DEFINE  PSTATEDEBUGINSPECT( X ) = (X.PCBXPSTATE >= PSTATEDEBUGMAB AND         !B10,HA#25
3400.     000000 0  0                                   X.PCBXPSTATE <= PSTATEINSPECTREQ)#;         !B10,HA#25
3401.     000000 0  0                                                                               !B10,HA#25
3402.     000000 0  0  DEFINE  PSTATEDEBUG( X )       = (X.PCBXPSTATE >= PSTATEDEBUGMAB AND         !B10,HA#25
3403.     000000 0  0                                   X.PCBXPSTATE <= PSTATEDEBUGREQ)#;           !B10,HA#25
3404.     000000 0  0                                                                               !B10,HA#25
3404.1    000000 0  0  ! the following literals are the possible contents of the PCBX field        B20,SS #26
3404.2    000000 0  0  ! PCBXDEFMODE                                                               B20,SS #26
3404.3    000000 0  0                                                                               !B20,SS #26
3404.4    000000 0  0  LITERAL  DEFDISABLE = 0,             ! all defines disabled                 B20,SS #26
3404.5    000000 0  0           DEFLOGICAL = 1,             ! logical defines enabled              B20,SS #26
3404.6    000000 0  0           DEFLOGICALPHYSICAL = 2;     ! logical and physical defines         B20,SS #26
3404.7    000000 0  0                                       ! enabled                              B20,SS #26
3404.701  000000 0  0  LITERAL CCODE^BUF^TYPE    = 1,       ! Completion code stop buf type.       B40,BATCH#46
3404.71   000000 0  0          DOWN^REV^BUF^TYPE = 2,       ! down rev buffer type i.e. short,     B40,BATCH#46
3404.72   000000 0  0          TRAP^BUF^TYPE     = 3,       ! trap buffer type.                    C00,BATCH#48
3404.73   000000 0  0          NO^INFO^BUF^TYPE  = 4;       ! no information i.e. no buffer.       C00,BATCH#48
3404.8    000000 0  0                                                                               !B20,SS #26
3407.     000000 0  0  DEFINE  PSTATEDEBUGTOINSPECT( X ) = (X + 4)#; ! maps debug -> inspect        B00,DW #20
4000.     000000 0  0  ?SECTION PROCESSCONTROL                                                      !B00,RWC#13
4002.     000000 0  0  INT  .PCB( PCB^TEMPLATE ) = 'SG'[ PCB^SGADDR ],
4003.     000000 0  0                            ! pointer to the process control block
4004.     000000 0  0                            ! table in resident memory.  Its entry
4005.     000000 0  0                            ! format is defined later
4006.     000000 0  0                            !
4007.     000000 0  0       .CPCB( PCB^TEMPLATE ) = 'SG'[ CPCB^SGADDR ],
4008.     000000 0  0                            ! pointer to the currently running process'
4009.     000000 0  0                            ! control block.  It is zero if there is no
4010.     000000 0  0                            ! process currently running
4011.     000000 0  0       .MMP( PCB^TEMPLATE ) = 'SG'[ MMP^SGADDR ],                            !B30,MTR#30
4012.     000000 0  0                            ! pointer to the PCB of the process that
4013.     000000 0  0                            ! the memory manager is working on.                B30,MTR#30
4014.     000000 0  0                            ! It will be zero if the Memory Manager
4015.     000000 0  0                            ! process is idle
4016.     000000 0  0                            !
4016.1    000000 0  0       .MOP( PCB^TEMPLATE ) = 'SG'[ MOP^SGADDR ];                            !B30,MTR#30
4016.2    000000 0  0                            ! pointer to the PCB of a process that             B30,MTR#30
4016.3    000000 0  0                            ! the monitor is working on (e.g.                  B30,MTR#30
4016.4    000000 0  0                            ! allocating swap space after a page fault)        B30,MTR#30
4017.     000000 0  0  INT  .EXT  CPCBX( PCBEXT^TEMPLATE ) = 'SG'[ CPCBX^SGADDR ];                 !A06,cks #11
4018.     000000 0  0                            ! pointer to the process control block extension   A06,cks #11
4019.     000000 0  0                            ! for the currently running process.  This field   A06,cks #11
4020.     000000 0  0                            ! is NOT cleared in the same manner as CPCB; if    A06,cks #11
4021.     000000 0  0                            ! CPCB is 0, CPCBX contains absolute address of the A06,cks #11
4022.     000000 0  0                            ! PCBX for the last executing process.             A06,cks #11
4023.     000000 0  0                            !                                                  A06,cks #11
4024.     000000 0  0  ! The header for the PCB is the standard table header preceded by additional A06,cks #11
```

```
000000 0  0   ! information.                                                                  A06,cks #11
000000 0  0                                                                                  !A06,cks #11
000000 0  0   STRUCT  PCBTABLEHEAD (*);                                                      !A06,cks #11
000000 0  0      BEGIN                                                                       !A06,cks #11
000000 0  1      FIXED      MAXIMUMCPUTIME;          ! max time allowed in usec between i/os  B00,SS #19
000000 0  1      INT( 32 ) INITIALPROCESSTIMER;   ! processtimer value corresponding to       B00,SS #19
000000 0  1                                       ! MAXIMUMCPUTIME ( also in usec )           B00,SS #19
000000 0  1      INT    PRIORITYCONTROL;                                                     !B00,RWC#13
000000 0  1      INT  PCBXSIZE;                  ! Number of words in each PCBX entry         A06,cks #11
000000 0  1      FILLER  $LEN( TABLEHEAD );  ! The standard table header                      A06,cks #11
000000 0  1      END;                                                                        !A06,cks #11
000000 0  0                                                                                  !A06,cks #11
000000 0  0   INT   .PCB^STD^HDR( TABLEHEAD ) = PCB;
000000 0  0   INT   .PCB^EXT^HDR( PCBTABLEHEAD ) = PCB;                                      !A06,cks #11
000000 0  0   DEFINE  PCBTABLE = PCB^STD^HDR[ -1 ]#;
000000 0  0   DEFINE  PCBTABLEX = PCB^EXT^HDR[ -1 ]#;                                        !A06,cks #11
000000 0  0
000000 0  0   DEFINE  RLIST = SG[ %100 ]#, ! ready list header.  All processes which are
000000 0  0           RLISTTAIL            ! ready to run are linked onto this list.  It
000000 0  0                 = SG[ %101 ]#; ! is ordered by priority with the highest at
000000 0  0                                ! the head of the list.  This header is to be
000000 0  0                                ! followed by 255, which is a dummy priority
000000 0  0                                !
000000 0  0   DEFINE  PRICONTROL = PCBTABLEX.PRIORITYCONTROL#;                               !B00,RWC#13
000000 0  0                              ! sysgened priority stepping values
000000 0  0   DEFINE
000000 0  0       PRISTEP     = PRICONTROL.<0:7>#,
000000 0  0       MAXPRIDELTA = PRICONTROL.<8:15>#;
000000 0  0   DEFINE MAXCPUTIME = PCBTABLEX.MAXIMUMCPUTIME#;                                 !B00,RWC#13
000000 0  0                              ! sysgened loop time value ( in usecs ).         B00,SS #19
000000 0  0   DEFINE INITMINTIME = PCBTABLEX.INITIALPROCESSTIMER#;                           !B00,SS #19
000000 0  0                              ! sysgened processtimer in usec corresp to MAXCPUTIME B00,SS #19
000000 0  0   !
000000 0  0   !
000000 0  0   ! Unmasked interrupt wakeup's:
000000 0  0   !
000000 0  0                             ! When any process is awoken by any interrupt
000000 0  0                             ! handler whose interrupt is not masked by
000000 0  0                             ! mutexon, the event flag will be saved in
000000 0  0                             ! RTWAKELIST[ pin ].  The bit which corresponds
000000 0  0                             ! with the to be awoken process will be set
000000 0  0                             ! in the RTGROUP array (16 words = 256 bits ).
000000 0  0                             ! Finally, RTAWAKE will be set to 1, and the
000000 0  0                             ! Dispatcher interrupt will be set.
000000 0  0                             ! This serves real-time I/O and CHANNELERROR.
000000 0  0
000000 0  0   INT RTAWAKE     = 'SG'[ RTAWAKE^SGADDR ];
000000 0  0
000000 0  0   INT .RTGROUP    = 'SG'[ RTGROUP^SGADDR ];
000000 0  0
000000 0  0   INT .RTWAKELIST = 'SG'[ RTWAKELIST^SGADDR ];
000000 0  0                                                                                  !B00,RWC#13
000000 0  0   ! Miscellaneaous defines                                                        B00,RWC#13
000000 0  0                                                                                  !B00,RWC#13
000000 0  0   DEFINE MYPIN = CPCB.PCBPID.<8:15>#,                                            !B00,RWC#13
000000 0  0          CURPIN = CPCB.PCBPID.<8:15>#,                                           !B00,RWC#13
000000 0  0          CURPID = CPCB.PCBPID#,                                                  !B00,RWC#13
```

```
4082.    000000 0  0          PIDCPU = <0:7>#,                                                    !B00,RWC#13
4083.    000000 0  0          PIDPIN = <8:15>#;                                                   !B00,RWC#13
4084.    000000 0  0    !                                                                          B00,RWC#13
  24.    000000 0  0    ?       SOURCE derror   ( file^error^numbers, system^freeze^numbers )
Source file:  [1]  $IMT.T9050C00.DERROR  18NOV86 - 13:48:47
1002.    000000 0  0    ?SECTION FILE^ERROR^NUMBERS                                               !A03,GCL
1003.    000000 0  0    ! T9050 GUARDIAN  Operating System - Standard Error Numbers
1004.    000000 0  0
1005.    000000 0  0    ! The following error numbers are defined for use by Tandem-supplied software,
1006.    000000 0  0    ! and are subject to meaningful interpretation by Tandem software, particularly
1007.    000000 0  0    ! by the file system and I/O processes.  A block of error numbers has been
1008.    000000 0  0    ! reserved by Tandem for user-defined errors.  Tandem places no meaning on that
1009.    000000 0  0    ! block of error numbers, and Tandem software will not attempt to interpret
1010.    000000 0  0    ! such error numbers.  The range is defined as FEFIRSTUSER through FELASTUSER.
1011.    000000 0  0
1012.    000000 0  0    LITERAL
1013.    000000 0  0       FEOK                   = 0, ! no error
1014.    000000 0  0    !
1015.    000000 0  0       FEEOF                  = 1, ! end-of-file on a disc or tape file read
1016.    000000 0  0                                   ! or end of physical media on a write to a
1017.    000000 0  0                                   ! line printer, terminal, etc.
1018.    000000 0  0       FEINVALOP              = 2, ! operation not allowed on this type of
1019.    000000 0  0                                   ! file
1020.    000000 0  0       FEPARTFAIL             = 3, ! failure to open or purge a partition
1021.    000000 0  0       FEKEYFAIL              = 4, ! failure to open alternate key file
1022.    000000 0  0       FESEQFAIL              = 5, ! failure to provide sequential buffering
1023.    000000 0  0       FESYSMESS              = 6, ! system message picked up on $receive
1024.    000000 0  0       FENOSYSMESS            = 7, ! unable to receive system messages
1024.1   000000 0  0       FEREADLOCKED           = 9, ! DP2 returned a record that was locked       B30,bert#45
1025.    000000 0  0    !
1026.    000000 0  0       FEBADERR              = 10, ! first of the errors that set CCL
1027.    000000 0  0       FEDUP                 = 10, ! file already exists
1028.    000000 0  0       FENOTFOUND            = 11, ! file not in directory
1029.    000000 0  0       FEINUSE               = 12, ! file is in use
1030.    000000 0  0       FEBADNAME             = 13, ! illegal filename specification
1031.    000000 0  0       FENOSUCHDEV           = 14, ! device does not exist
1032.    000000 0  0       FEWRONGDEV            = 15, ! volume specification to rename does not
1033.    000000 0  0                                   ! agree with name of volume on which file
1034.    000000 0  0                                   ! resides
1035.    000000 0  0       FENOTOPEN             = 16, ! file number has not been opened
1036.    000000 0  0       FENOPRIMARY           = 17, ! primary process specified is not alive
1037.    000000 0  0       FENOSUCHSYS           = 18, ! no such system is defined
1038.    000000 0  0       FENOMOREDEVS          = 19, ! no more devices in LDT
1039.    000000 0  0    !
1040.    000000 0  0       FENETVIOL             = 20, ! attempt to open network file with long crtpid
1041.    000000 0  0       FEBADCOUNT            = 21, ! illegal count specification or attempt
1042.    000000 0  0                                   ! to transfer to much or too little data
1043.    000000 0  0       FEBOUNDSERR           = 22, ! parameter or buffer out of bounds
1044.    000000 0  0       FEBADADDR             = 23, ! disc address out of bounds
1045.    000000 0  0       FENOTPRIV             = 24, ! privileged mode required for this
1046.    000000 0  0                                   ! operation
1047.    000000 0  0       FEWAITFILE            = 25, ! AWAITIO attempted on waited file
1048.    000000 0  0       FENONEOUT             = 26, ! AWAITIO attempted on file with no out-
1049.    000000 0  0                                   ! standing requests
1050.    000000 0  0       FEIOPEND              = 27, ! waited operation attempted when there
1051.    000000 0  0                                   ! were outstanding nowait requests
1052.    000000 0  0       FETOOMANY             = 28, ! # of outstanding I/O's would exceed
```

```
000000 0  0                             ! depth specification
000000 0  0      FEMISSPARM        = 29, ! missing parameter
000000 0  0   !
000000 0  0      FENOLCB           = 30, ! unable to obtain a link control block
000000 0  0      FENOBUFSPACE      = 31, ! unable to obtain file system buffer space
000000 0  0      FENOPOOLSPACE     = 32, ! unable to obtain storage pool space (SYSPOOL)
000000 0  0      FENOIOBUFSPACE    = 33, ! unable to obtain I/O segment space
000000 0  0      FENOCBSPACE       = 34, ! unable to obtain file system control block
000000 0  0      FENOIOCBSPACE     = 35, ! unable to obtain I/O process control block
000000 0  0      FENOPHYSMEM       = 36, ! unable to obtain physical memory
000000 0  0      FENOIOPHYSMEM     = 37, ! unable to obtain physical memory for I/O
000000 0  0      FEWRONGTNS        = 38, ! unable to run on this system (TNS or TNS/II only) A01
000000 0  0      FEOLDSYNC         = 39, ! ancient syncid encountered - process file        A03,GCL
000000 0  0   !
000000 0  0      FETIMEDOUT        = 40, ! operation timed out before completion
000000 0  0      FEBADSYNC         = 41, ! checksum error on file sync block
000000 0  0      FEUNALLOC         = 42, ! attempt to read from unallocated page
000000 0  0      FENODISCSPACE     = 43, ! unable to obtain disc space for file page
000000 0  0      FEDIRFULL         = 44, ! directory is full
000000 0  0      FEFILEFULL        = 45, ! file is full
000000 0  0      FEINVKEY          = 46, ! invalid key specified
000000 0  0      FEKEYSBAD         = 47, ! keys not consistent with file data
000000 0  0      FESECVIOL         = 48, ! security violation
000000 0  0      FEACCVIOL         = 49, ! access violation
000000 0  0   !
000000 0  0      FEDIRERR          = 50, ! directory error (directory is bad)
000000 0  0      FEDIRBAD          = 51, ! directory is messed up
000000 0  0      FEDFSERR          = 52, ! error in disc free space table
000000 0  0      FEFSERR           = 53, ! file system internal error
000000 0  0      FEDFSIO           = 54, ! i/o error in disc free space table or        B00,MBB-DP2 #21
000000 0  0                              !            in DP2 undo area                 B00,MBB-DP2 #21
000000 0  0      FEDIRIO           = 55, ! i/o error in directory
000000 0  0      FEVLABIO          = 56, ! i/o error on volume label
000000 0  0      FEDFSFULL         = 57, ! disc free space table is full
000000 0  0      FEDFSBAD          = 58, ! disc free space table is messed up
000000 0  0      FEFILEBAD         = 59, ! file is messed up
000000 0  0   !
000000 0  0      FEWRONGID         = 60, ! volume mounted is not the one on which
000000 0  0                              ! this file resides (volume changed) or
000000 0  0                              ! device downed and then upped (old
000000 0  0                              ! request)
000000 0  0      FEOPENSTOP        = 61, ! no more opens allowed on this volume
000000 0  0      FEUNEXMOUNT       = 62, ! volume was mounted, but no mount command
000000 0  0                              ! was given
000000 0  0      FEMOUNTEXP        = 63, ! waiting for mount interrupt
000000 0  0      FEMOUNTINPROG     = 64, ! mount is in progress on this device
000000 0  0      FESPECONLY        = 65, ! only special requests allowed
000000 0  0      FEDEVDOWN         = 66, ! device is down
000000 0  0   !
000000 0  0      FECONTINUE        = 70, ! continue file operation
000000 0  0      FEDUPREC          = 71, ! duplicate record
000000 0  0      FEBADPART         = 72, ! attempt to access unmounted partition
000000 0  0      FELOCKED          = 73, ! file or record locked
000000 0  0      FEBADREPLY        = 74, ! illegal reply number or no space for reply
000000 0  0      FENOTRANSID       = 75, ! trans mode operation with no transid
000000 0  0      FEENDEDTRANSID    = 76, ! transid in process of ending
000000 0  0   !                                                                        C00,sl #66
000000 0  0      FEINVTRANSID      = 78, ! invalid transid
000000 0  0      FENOTRANSLOCK     = 79, ! transid does not hold lock on record
```

```
000000 0  0      FEAUDITINVALOP      = 80, ! invalid op on audited file/non-audited volume
000000 0  0      FETRANSNOWAITOUT    = 81, ! > 0 nowait I/O's for transid outstanding
000000 0  0      FETMFNOTRUNNING     = 82, ! all or part of the TMF subsystem not running     C00,sl #66
000000 0  0      FETOOMANYTRANSBEGINS=83, ! > 1 or > TFILE depth transbegins
000000 0  0      FETMFNOTCONFIGURED = 84, ! TMF not configured
000000 0  0      FEDEVICEDOWNFORTMF = 85, ! the device is not up for TMF                     C00,sl #66
000000 0  0      FEBEGINTRDISABLED  = 86, ! BEGINTRANSACTION is disabled                     C00,sl #66
000000 0  0      FEEXPECTEDREAD     = 87, ! waiting on a read request and did not get it
000000 0  0      FEINVALIDSEQUENCE  = 88, ! a control read is pending, new read invalid
000000 0  0      FENODEVBUFSPACE    = 89, ! remote device has no buffer available
000000 0  0      FETRANSABRTOWNERDIED=90, ! begintrans process died: system abort
000000 0  0      FETRANSABRTBADDBID = 91, ! trans aborted by system: dbid's disagree
000000 0  0      FETRANSABRTNETDOWN = 92, ! trans aborted by system: unreachable node
000000 0  0      FETRANSABRTAUDOVFL = 93, ! trans aborted by system: spanned too many
000000 0  0                               !                          audit files
000000 0  0      FETRANSABRTOPRCMD  = 94, ! trans abrted by system: operator command
000000 0  0      FETRANSABRTDISCTKOVR=95, ! trans aborted due to DP2 takeover            B00,MBB-DP2 #21
000000 0  0                               ! 96 reserved for sysabort                      B00,MBB-DP2 #21
000000 0  0      FEABORTEDTRANSID   = 97, ! transid was aborted
000000 0  0      FENOMORETCBS       = 98, ! unable to allocate a TCB/NETTCB              B40,sl #60
000000 0  0    !
000000 0  0      FETOOCHEAP         = 99, ! failure to purchase Enscribe
000000 0  0    !
000000 0  0      FENOTRDY          = 100, ! device not ready
000000 0  0      FENOWRTRING       = 101, ! no write ring in mag tape
000000 0  0      FEPAPEROUT        = 102, ! paper out, bail open or end of ribbon        B00,SS #23
000000 0  0      FEPONNOTRDY       = 103, ! disc not ready due to power fail
000000 0  0      FENORESPONSE      = 104, ! device not responding                       !!A03,pkc
000000 0  0      FEVFUERR          = 105, ! printer VFU error                           !!A03,pkc
000000 0  0      FEPRIORWRITEFAIL  = 106, ! a previously-buffered write has failed       B00,gt #20
000000 0  0    !
000000 0  0      FEBREAKONLY       = 110, ! only break mode requests accepted
000000 0  0      FEBREAK           = 111, ! break occurred on this request
000000 0  0      FEOPWRITEABORT    = 112, ! read or writeread preempted by operator message
000000 0  0      FEOPTOOMANY       = 112, ! too many user console messages to operator console
000000 0  0      FEBADDEFUSE       = 113, ! invalid DEFINE passed to the tape process    B20,SS #41
000000 0  0      FEDATAPARITY      = 120, ! data parity
000000 0  0      FEOVERRUN         = 121, ! data overrun
000000 0  0      FEDATALOSS        = 122, ! possible data loss due to X.25 circuit reset      B00,MBB-DP2 #21
000000 0  0                               ! or DP2 takeover on buffered, syncdepth = 0 file   B00,MBB-DP2 #21
000000 0  0      FESUBBUSY         = 123, ! sub-device busy
000000 0  0      FELINERESET       = 124, ! a line reset is in progress
000000 0  0    !
000000 0  0      FEFIRSTDISC       = 130, ! 1st disc error
000000 0  0      FEADDRCHK         = 130, ! illegal address to disc drive
000000 0  0      FEWRTCHECK        = 131, ! write check error from disc
000000 0  0      FESEEKUNC         = 132, ! seek incomplete from disc
000000 0  0      FEACCNOTRDY       = 133, ! access not ready on disc
000000 0  0      FEADDRCOMP        = 134, ! address compare error on disc
000000 0  0      FEWRTPROTECT      = 135, ! attempt to write to protected disc
000000 0  0      FEUNITOWN         = 136, ! unit ownership error ( dual port discs)
000000 0  0      FEBUFPARITY       = 137, ! disc controller buffer parity error
000000 0  0      FEINTERRUPTOVERRUN= 138, ! long error name
000000 0  0      FECTLRERR         = 139, ! controller error
000000 0  0      FELASTDISC        = 139, ! last disc error
000000 0  0    !
000000 0  0      FEMODEMERR        = 140, ! modem disconnected or screwed up
000000 0  0      FEDISCONNECT      = 140, ! link disconnected
```

```
1167.     000000 0  0      FEMOTIONCHK        = 145, ! card reader motion check error
1168.     000000 0  0      FEREADCHK          = 146, ! card reader read check error
1169.     000000 0  0      FEINVALHOLRTH      = 147, ! card reader invalid Hollerith code read
1170.     000000 0  0   !
1171.     000000 0  0      FEEOT              = 150, ! end of tape
1172.     000000 0  0      FERUNAWAY          = 151, ! runaway tape
1173.     000000 0  0      FEOPABORT          = 152, ! unusual end (unit went offline)
1174.     000000 0  0      FETAPEPON          = 153, ! tape drive power on
1175.     000000 0  0      FEBOT              = 154, ! beginning of tape on BSR or BSF
1176.     000000 0  0      FE9TRKTAPEONLY     = 155, ! only nine-track magnetic tape permitted
1177.     000000 0  0      FEIOPROTOCOLERR    = 156, ! I/O protocol violation detected            A02,RLN
1178.     000000 0  0      FEIOPROCERR        = 157, ! I/O process internal error
1179.     000000 0  0      FEBADTHLFUNC       = 158, ! unknown function for THL                   B00,SS #23
1180.     000000 0  0      FEWRONGDEVMODE     = 159, ! device mode wrong for request              B00,SS #24
1181.     000000 0  0   !
1182.     000000 0  0   !  Data communications error numbers:                                 C00,SSW#64
1183.     000000 0  0   !        160 through 189
1184.     000000 0  0   !
1185.     000000 0  0      FEINVALIDSTATE     = 160, ! invalid state/ protocol error              C00,SSW#64
1185.01   000000 0  0      FEBADSTATE         = 161, ! impossible state                           C00,SSW#64
1185.02   000000 0  0      FERETRIESEXHAUSTED= 162, ! retry count exhausted                       C00,SSW#64
1185.021  000000 0  0      FEOPERATIONTIMEDOUT = FERETRIESEXHAUSTED, ! operation timed out        C00,SSW#71
1185.03   000000 0  0      FERECEIVEDEOT      = 163, ! eot was received                           C00,SSW#64
1185.04   000000 0  0      FERECEIVEDDISC     = 164, ! disconnect received                        C00,SSW#64
1185.05   000000 0  0      FERECEIVEDRVI      = 165, ! rvi was received                           C00,SSW#64
1185.06   000000 0  0      FERECEIVEDENQ      = 166, ! enq was received                           C00,SSW#64
1185.07   000000 0  0      FERECEIVEDEOTBID   = 167, ! eot received on line bid                   C00,SSW#64
1185.08   000000 0  0      FERECEIVEDNAKBID   = 168, ! nak received on line bid                   C00,SSW#64
1185.09   000000 0  0      FERECEIVEDWACKBID  = 169, ! wack received on line bid                  C00,SSW#64
1185.1    000000 0  0      FENOSEQUENCEID     = 170, ! no id sequence received                    C00,SSW#64
1185.11   000000 0  0      FENOTREPLYING      = 171, ! no reply received                          C00,SSW#64
1185.12   000000 0  0      FEIMPROPERREPLY    = 172, ! reply not proper for protocol              C00,SSW#64
1185.13   000000 0  0      FEMAXNAKS          = 173, ! too many naks from a 6520/6524 terminal    C00,SSW#64
1186.     000000 0  0      FERECEIVEDWACK     = 174, ! wack or busy was received                  C00,SSW#64
1186.01   000000 0  0      FEWRONGACK         = 175, ! ack out of sequence                        C00,SSW#64
1186.02   000000 0  0      FEPOLLEND          = 176, ! poll sequence ended                        C00,SSW#64
1186.03   000000 0  0      FETEXTOVERRUN      = 177, ! text received exceeds buffer size          C00,SSW#64
1186.04   000000 0  0      FEADDRERROR        = 178, ! illegal operation for address list         C00,SSW#64
1186.05   000000 0  0                                !   or address missing                       C00,SSW#64
1186.06   000000 0  0      FEBADFORMAT        = 179, ! application buffer is incorrect            C00,SSW#64
1186.07   000000 0  0      FERECEIVEDSTATUS   = 180, ! received status                            C00,SSW#64
1186.08   000000 0  0      FERECEIVEDDUPSTATUS = 181, ! received duplicate status                 C00,SSW#64
1186.081  000000 0  0      !                                                                      C00,SSW#71
1186.082  000000 0  0      FENODATA           = 187, ! no data available                          C00,SSW#71
1186.083  000000 0  0      FEDATALOST         = 188, ! data and/or context lost                   C00,SSW#71
1186.084  000000 0  0      FEDATACOMING       = 189, ! further reply is forthcoming               C00,SSW#71
1186.09   000000 0  0      FEDEVERR           = 190, ! undefined device error                     C00,SSW#64
1187.     000000 0  0      FEDEVPON           = 191, ! device power on
1188.     000000 0  0      FEDEVXERCISED      = 192, ! device is being exercised
1189.     000000 0  0      FENOMICROCODE      = 193, ! invalid or missing microcode file          A03,RLN
1189.1    000000 0  0      FEOPRREJECT        = 194, ! operator rejects the open request          B20,SS #41
1189.2    000000 0  0      FENOZSVR           = 195, ! $zsvr went lunch                           B20,SS #41
1189.3    000000 0  0      FEBADTAPELABEL     = 196, ! bad label field on a labeled tape          B20,SS #41
1189.4    000000 0  0                                                                            !B20,SS #41
1190.     000000 0  0      FEMISSDEF          = 198, ! missing DEFINE                             B20,SS #41
1190.1    000000 0  0      FEOBIPROTECTED     = 199, ! disc file is OBI protected                 B20, TCKC#39
1191.     000000 0  0      FECATERR           = 200, ! first of the path switch errors
```

```
000000 0  0      FEOWNERSHIP        = 200, ! device is owned by the other port
000000 0  0      FEPATHDOWN         = 201, ! unable to communicate over this path
000000 0  0   !
000000 0  0      FEOWNABORT         = 210, ! ownership changed during operation
000000 0  0      FECPUFAIL          = 211, ! cpu failed during operation
000000 0  0   !  (Error 212 no longer used)
000000 0  0
000000 0  0      FECHPARITY         = 213, ! channel data parity error
000000 0  0      !
000000 0  0      !  1) CCG on EIO and device status bit <3> = 1 (channel parity
000000 0  0      !     error detected by controller)
000000 0  0      !
000000 0  0      !  2) CCG on EIO, device status bits <0:3> = 0, and channel status
000000 0  0      !     = %000400 (channel parity error on RDST)
000000 0  0      !
000000 0  0      !  3) CCG on IIO and interrupt status bit <3> = 1 (channel parity
000000 0  0      !     error detected by controller)
000000 0  0      !
000000 0  0      !  4) CCG on IIO, interrupt status bit <2> = 1, and IOC transfer
000000 0  0      !     status = %13 (channel parity error iobus data to channel)
000000 0  0      !
000000 0  0      !  5) CCG on IIO, interrupt status bits <0:3> = 0, and channel
000000 0  0      !     status = %000200 or %000400 (channel parity error on RIC or
000000 0  0      !     RIST)
000000 0  0
000000 0  0      FECHTIMEOUT        = 214, ! channel timeout
000000 0  0      !
000000 0  0      !  1) CCL on EIO and channel status contains iobus control field
000000 0  0      !     where SVI, STI, and PADI are all 0
000000 0  0      !
000000 0  0      !  2) CCG on IIO, interrupt status bit <2> = 1, and IOC transfer
000000 0  0      !     status = %25 (channel timeout during data transfer)
000000 0  0
000000 0  0      FEMEMABS           = 215, ! I/O attempted to absent memory page
000000 0  0      !
000000 0  0      !  CCG on IIO, interrupt status bit <2> = 1, and IOC transfer
000000 0  0      !  status = %30 or %31 (page absent during data transfer or page
000000 0  0      !  absent on IOC1, IOC2, or IOC3)
000000 0  0
000000 0  0      FEMEMBRKPT         = 216, ! memory breakpoint encountered during this I/O
000000 0  0      !
000000 0  0      !  CCG on IIO, interrupt status bit <2> = 1, and IOC transfer
000000 0  0      !  status = %20, %21, %22, %23, or %24 (memory address breakpoint
000000 0  0      !  hit on IOC0, IOC1, IOC2, while reading data, or while writing
000000 0  0      !  data)
000000 0  0
000000 0  0      FEMEMPARITY        = 217, ! memory parity error during this I/O
000000 0  0      !
000000 0  0      !  CCG on IIO, interrupt status bit <2> = 1, and IOC transfer
000000 0  0      !  status = %11, %12, or %17 (uncorrectable memory error on IOC1,
000000 0  0      !  IOC2, or on data word during transfer)
000000 0  0
000000 0  0      FEINTTIMEOUT       = 218, ! interrupt timeout
000000 0  0      !
000000 0  0      !  An interrupt did not occur when expected
000000 0  0
000000 0  0      FEILLRECON         = 219, ! illegal device reconnect
```

```
000000 0  0     !
000000 0  0     !  1) CCG on IIO, interrupt status bit <2> = 1, and IOC transfer
000000 0  0     !     status = %02, %03, %06, or %07 (zero byte count on write,
000000 0  0     !     zero byte count on read, controller command not read or
000000 0  0     !     write, or reconnect when status already %01)
000000 0  0     !
000000 0  0     !  2) CCG on IIO, interrupt status bits <2> = 1, and IOC transfer
000000 0  0     !     status = %00 or %01 (abort with no cause)
000000 0  0     !                                                              B40,HAB#62
000000 0  0     !  3) CCG on IIO, interrupt status bits <2> = 1, and IOC transfer   B40,HAB#62
000000 0  0     !     status = %36 or %37 (Continuous reconnect detected by         B40,HAB#62
000000 0  0     !                           hardware, TXP only)                     B40,HAB#62
000000 0  0                                                                        !B40,HAB#62
000000 0  0     FEPROTECT          = 220, ! protect violation
000000 0  0     !
000000 0  0     !  CCG on IIO, interrupt status bits <2> = 1, and IOC transfer
000000 0  0     !  status = %14 (protect bit, IOC0.<0>, on for read)
000000 0  0
000000 0  0     FEHANDSHAKE        = 221, ! controller handshake violation
000000 0  0     !
000000 0  0     !  1) CCL on EIO and channel status contains iobus control field
000000 0  0     !     where the combination of SVI, STI, and PADI indicate the
000000 0  0     !     handshake which was detected as an error
000000 0  0     !
000000 0  0     !  2) CCG on IIO, interrupt status bits <2> = 1, and IOC transfer
000000 0  0     !     status = %10, %15, %16, or %26 (channel sent EOT and device
000000 0  0     !     did not return STI, channel sent PADO and device did not
000000 0  0     !     return PADI, device returned both SVI and STI, or device
000000 0  0     !     returned PADI without STI)
000000 0  0
000000 0  0     FEBADEIOSTAT       = 222, ! bad channel status from EIO instruction
000000 0  0     !
000000 0  0     !  1) Device status bit <0> = 1 after issuing take ownership
000000 0  0     !     command and retrying twenty times (constant ownership error)
000000 0  0     !
000000 0  0     !  2) Device status bit <1> = 1 after retrying twenty times
000000 0  0     !     (constant pending interrupt)
000000 0  0     !
000000 0  0     !  3) Device status bit <2> = 1 after retrying twenty times
000000 0  0     !     (constant busy)
000000 0  0
000000 0  0     FEBADIIOSTAT       = 223, ! bad channel status from IIO instruction
000000 0  0     !
000000 0  0     !  1) CCG, interrupt status bits <2> = 1, and IOC transfer status =
000000 0  0     !     %04, %05, %27, %32-37 (undefined status)
000000 0  0     !
000000 0  0     !  2) Interrupt status bit <1> = 1 (interrupt bit set following the
000000 0  0     !     IIO instruction)
000000 0  0
000000 0  0     FECTLERR           = 224, ! controller error                        A03,RLN
000000 0  0     FEUNITPOLLERR      = 225, ! no unit or multiple units at same unit #
000000 0  0   !
000000 0  0     FECPUPON           = 230, ! cpu power on during operation
000000 0  0     FEIOPON            = 231, ! controller power on during operation
000000 0  0   !
000000 0  0     FELHFIERR          = 240, ! first of the network errors
000000 0  0     FELHRETRY          = 240, ! line handler error, didn't get started
```

```
000000 0  0      FENETRETRY        = 241, ! network error, didn't get started
000000 0  0      FEBYPASSFAIL      = 246, ! FOX direct route failed, aborted req          A04,FOX-NRT#8
000000 0  0      FELHFAIL          = 248, ! line handler error, aborted
000000 0  0      FENETFAIL         = 249, ! network error, aborted
000000 0  0      FENETDOWN         = 250, ! all paths to the system are down
000000 0  0      FENETPROTOCOLERROR= 251, ! network protocol error
000000 0  0      FENOEXPANDCLASS   = 252, ! required expand class not available          A04,FOX-NRT#8
000000 0  0      FELHTOOMANYUPS    = 255, ! linehandler belched too often
000000 0  0      FEFIRSTUSER       = 300, ! errors 300 to 511 are reserved for
000000 0  0      FELASTUSER        = 511, ! use by the user.                              C00,gt#76
000000 0  0      FESHORTSTACK      = 632; ! not enough stack space available              C00,gt#76
000000 0  0    ?SECTION SYSTEM^FREEZE^NUMBERS                                            !A03,GCL
000000 0  0    !
000000 0  0    ! When a processor halt occurs, initiated by software executing a SYSTEM^FREEZE,
000000 0  0    ! a unique error number will be displayed in the lights.
000000 0  0    ! Bits <0:6> will identify the module in which the error happened,
000000 0  0    ! Bits <7:13> will give unique information.
000000 0  0    !
000000 0  0    ! Hardware & bootstrap errors: 0 -> %777
000000 0  0    !
000000 0  0    LITERAL
000000 0  0      UCME                 = 1,          ! uncorrectable memory error
000000 0  0      WCSFAULT             = 2,          ! verification of writeable control store
000000 0  0                                         ! failed
000000 0  0      UNEXINT              = 4,          ! an unexpected interrupt occurred
000000 0  0      BADOUTQ              = 5,          ! Too many OUTQ parity errors        B30,Check#49
000000 0  0      NOPDWN               = 6,          ! power on occurred with no corresponding
000000 0  0                                         ! interrupt
000000 0  0      LATEPON              = 7,          ! processor was powered off when part
000000 0  0                                         ! of the system resumed
000000 0  0      SW^7^UP              = %10,        ! LOBUG entered during coldload      B00,SS #26
000000 0  0                                         ! or reload because switch 7         B00,SS #26
000000 0  0                                         ! is set                             B00,SS #26
000000 0  0    !
000000 0  0    ! Cpu control errors:  %1000 -> %1777
000000 0  0    !
000000 0  0      CPU^INSTFAIL         = %1001,      ! instruction failure in a non-
000000 0  0                                         ! process environment.
000000 0  0      CPU^RELOADFAILED     = %1002,      ! reloader notified reloadee that    B00,RWC#17
000000 0  0                                         ! a bus reload failed.               B00,RWC#17
000000 0  0      CPU^BAD^TERMINAL     = %1003,      ! coldload terminal won't accept open.  B10,RKS #34
000000 0  0      CPU^BAD^OSPFLAG      = %1004,      ! inconsistency in CHECK OSPFLAG     B30,Check#49
000000 0  0                                         ! value. Initially added as a debugging  B30,Check#49
000000 0  0                                         ! aid. May be removed later.         B30,Check#49
000000 0  0      CPU^BADCPUTYPE       = %1005,      ! CPUTYPE value is unknown. Should   B30,Check#49
000000 0  0                                         ! never happen                       B30,Check#49
000000 0  0                                                                             !B30,Check#49
000000 0  0    !                                                                         B00,RWC#17
000000 0  0    ! System Monitor errors:  %2000 -> %2777
000000 0  0    !
000000 0  0      MON^NOMEM            = %2001,      ! Monitor unable to lock stack following
000000 0  0                                         ! a cold load
000000 0  0      MON^NOIMAGE          = %2002,      ! failure to open 'OSIMAGE' after
000000 0  0                                         ! cold load
000000 0  0      MON^INITICINEWPROCERR = %2003,     ! NEWPROCESS error on initial COMINT  B00,DW #22
000000 0  0                                         ! (Note: error returned by NEWPROCESS,
000000 0  0                                         !  not by XNEWPROCESS, which stops in
```

```
000000 0  0                                       !  line
000000 0  0   MON^XNEWFAIL             = %2004,   ! XNEWPROCESS of initial COMINT failed
000000 0  0   MON^NOTERM               = %2005,   ! failure to open OSP for unsatisfied
000000 0  0                                       ! external message.  Try to load cpu
000000 0  0                                       ! from panel
000000 0  0   MON^BADSEG               = %2006,   ! bad segment to deallocate on a stop
000000 0  0   MON^LCBSOUT              = %2007,   ! process stop with outstanding send LCBs
000000 0  0                                       ! after CLOSEFILES
000000 0  0   MON^NOGUARD              = %2010,   ! failure to purchase Guardian
000000 0  0   MON^EXTERNALRESETERR     = %2011,   ! internal logic error detected          A04,FOX-NRT#8
000000 0  0                                       ! while resetting external cluster       A04,FOX-NRT#8
000000 0  0   MON^INVAL^ALLOCSEG       = %2012,   ! invalid allocate segment request       A04,RWC#9
000000 0  0   MON^DATASEG              = %2013,   ! getsegment failure on newprocess/stop  B00,RKS #18
000000 0  0                                       ! data segment                           B00,RKS #18
000000 0  0   MON^LAUNCHERR            = %2014,   ! internal logic error detected in       B00,RKS #18
000000 0  0                                       ! management of XNEWPROCESS or XSTOP     B00,RKS #18
000000 0  0   MON^INITCIOPENERR        = %2015,   ! unable to open the initial CI to send  B00,DW #22
000000 0  0                                       ! it a startup message                   B00,DW #22
000000 0  0   MON^WRONGIMAGE           = %2016,   ! An alternate osimage specified for the B00,RWC#31
000000 0  0                                       ! cpu is not identical to the loader's   B00,RWC#31
000000 0  0   MON^EXTTHEFT             = %2017,   ! Misuse of EXT processor was detected:  B10,EPN#37
000000 0  0                                       ! neither reloader nor reloadee cpus had B10,EPN#37
000000 0  0                                       ! the universal prom and                 B10,EPN#37
000000 0  0                                       ! 1.  there is a mixture of EXT and      B10,EPN#37
000000 0  0                                       !     non-EXT cpus in the system         B10,EPN#37
000000 0  0                                       ! or                                     B10,EPN#37
000000 0  0                                       ! 2.  there are more than 4 EXT cpus     B10,EPN#37
000000 0  0   MON^BADSYSTERM           = %2020,   ! comm subdevice unusable as system term C00,FALCON#65
000000 0  0 !                                                                              C00,FALCON#65
000000 0  0 ! Memory Management errors:  %3000 -> %3777                                    B10,EPN#37
000000 0  0 !
000000 0  0   MEM^TOOSMALL             = %3000,   ! physical memory too small for config
000000 0  0   MEM^BADTABLE             = %3001,   ! bad freelist on table (GETENTRY)
000000 0  0   MEM^BADENT               = %3002,   ! bad entry returned to table (PUTENTRY)
000000 0  0   MEM^BADADRS              = %3003,   ! bad address supplied to
000000 0  0                                       ! LOCKMEMORY/UNLOCKMEMORY
000000 0  0   MEM^ULCKFAIL             = %3004,   ! attempt to unlock an absent page or
000000 0  0                                       ! to unlock more bytes in a page than
000000 0  0                                       ! were locked
000000 0  0   MEM^BADTLE               = %3005,   ! a LOCKTLE timed out with no
000000 0  0                                       ! corresponding LOCKWAITLIST entry
000000 0  0   MEM^BADWAITADRS          = %3006,   ! bad address found in LOCKWAITLIST
000000 0  0                                       ! entry
000000 0  0   MEM^BADSEND              = %3007,   ! SENDMEMORY attempted out of a non-
000000 0  0                                       ! resident segment
000000 0  0   MEM^BADRCV               = %3010,   ! RECEIVEMEMORY attempted into a non-
000000 0  0                                       ! resident segment
000000 0  0   MEM^WRONGSEND            = %3011,   ! wrong sender detected in RECEIVE-
000000 0  0                                       ! MEMORY
000000 0  0   MEM^BADIOSADRS           = %3012,   ! bad I/O segment address supplied
000000 0  0                                       ! to RETURNIOSPACE
000000 0  0   MEM^BADMAPPOOL           = %3013,   ! bad structures in a mappool
000000 0  0   MEM^BADSEGDROP           = %3014,   ! attempt to deallocate a currently
000000 0  0                                       ! mapped segment or a bad segment
000000 0  0                                       ! table entry
000000 0  0   MEM^STRANGESEGTYP        = %3015,   ! unknown segment type requested, or
000000 0  0                                       ! illegal segment type in pagetable
```

```
000000 0  0    MEM^BADSEGSIZE      = %3016,    ! illegal segment size passed to
000000 0  0                                    ! GETSEGMENT
000000 0  0    MEM^BADPST          = %3017,    ! a bad PST-entry led to attempt
000000 0  0                                    ! deallocation of a segment which
000000 0  0                                    ! does not exist
000000 0  0    MEM^BADFAULT        = %3020,    ! most common error:
000000 0  0                                    ! page fault in map 6:14 or upper
000000 0  0                                    ! half of map 15
000000 0  0    MEM^HIGHPRIFAULT    = %3021,    ! process with priority higher or equal
000000 0  0                                    ! to the Memory Manager got a page fault
000000 0  0    MEM^CRAZYFLRU       = %3022,    ! Bill Schweitzer returned conflicting
000000 0  0    MEM^BADSEG          = %3023,    ! bad segment requested to deallocate
000000 0  0                                    ! by Memory Manager
000000 0  0    MEM^BADCNT          = %3024,    ! bad page count detected in a pagetable
000000 0  0    MEM^STRANGEOP       = %3025,    ! unknown Memory Manager request
000000 0  0    MEM^IOSFULL         = %3026,    ! I/O space table full
000000 0  0    MEM^BADPAGETABLE    = %3027,    ! Inconsistent Pagetable/PHYSEG/PHYPAGE  A03,RWC#6
000000 0  0    MEM^BAD^GETPOOL     = %3030,    ! GETPOOL error in priv process          A03,RWC#7
000000 0  0    MEM^BAD^PUTPOOL     = %3031,    ! PUTPOOL error in priv process          A03,RWC#7
000000 0  0    MEM^SEGUSED         = %3032,    ! segid has a nonzero use count.         B40,RKS #57
000000 0  0    MEM^SEGUSEERROR     = %3033,    ! error adjusting seg. use counter       C00,resizesegment#69
000000 0  0   !                                                                         B00,SS #23
000000 0  0   ! Message System errors:  %4000 -> %4777
000000 0  0   !
000000 0  0    MES^BADSTATE        = %4001,    ! inconsistent state on a LINK
000000 0  0                                    ! are considered down by another
000000 0  0                                    ! processor
000000 0  0    MES^BADBRT          = %4002,    ! bad address in BRT found by
000000 0  0                                    ! receive microcode
000000 0  0    MES^BADBRPARM       = %4003,    ! BUSRECEIVE microcode returned an .     B10,NRD#36
000000 0  0                                    ! unknown error value                    B10,NRD#36
000000 0  0    MES^BADPIO          = %4004,    ! a PIO packet was received, but cannot
000000 0  0                                    ! be interpreted
000000 0  0    MES^BADPACK         = %4005,    ! an unknown packet type was received
000000 0  0    MES^NOLCB           = %4006,    ! no LCB available for a special request
000000 0  0    MES^BADCTL          = %4007,    ! bad backupcontroller entry on send-
000000 0  0                                    ! ownership
000000 0  0    MES^NOEXT           = %4010,    ! an LCB without extension was queued
000000 0  0                                    ! on the Messenger's receive queue
000000 0  0    MES^STRANGEOP       = %4011,    ! unknown Messenger request
000000 0  0    MES^BADWRITELINK    = %4012,    ! process attempted WRITELINK with an LCB
000000 0  0                                    ! not his
000000 0  0    MES^BADBREAKLINK    = %4013,    ! process attempted BREAKLINK with an LCB
000000 0  0                                    ! not his
000000 0  0    MES^BADIOPROCESS    = %4014,    ! I/O process wiped out LTRAN            tagline B40,JDK#55
000000 0  0    MES^BADBRTLONG      = %4015,    ! external packet received that          A04,FOX-NRT#8
000000 0  0                                    ! should not have been                   A04,FOX-NRT#8
000000 0  0    MES^BADLTRAN        = %4016,    ! linker's LLIM < LTRAN                  B20,DW #40
000000 0  0    MES^GLUPOUTOFSYNC   = %4017,    ! global resource sync failure           B00,RWC#17
000000 0  0    MES^CANTRESENDGLUP  = %4020,    ! cant resend last glup after cpufail    B00,RWC#19
000000 0  0   !                                                                         B00,RWC#19
000000 0  0    MES^BADCHECKSUMERR  = %4021,    ! bad checksum error flagged by hardware B00,FOX#28
000000 0  0    MES^BADIPBMON       = %4022,    ! IPB monitor internal inconsistency     B00,FOX#28
000000 0  0    MES^RCH^NOT^OURS    = %4023,    ! RCH doesn't point to LCB               B30,Performance#51
000000 0  0    MES^LCB^NOT^OURS    = %4024,    ! LCB doesn't point to RCH               B30,Performance#51
000000 0  0    MES^RCH^INUSE       = %4025,    ! RCH is already hooked to an LCB        B30,Performance#51
000000 0  0    MES^BSD^NO^RCH      = %4026,    ! BSD has no pending RCH                 B30,Performance#51
```

```
000000 0  0     MES^BSD^HAS^RCH        = %4027,     ! BSD has a pending RCH                      B30,Performance#51
000000 0  0     MES^ERT^BAD^CHAINS     = %4030,     ! RCH chains clobbered or RCHs lost          B30,Performance#51
000000 0  0     MES^ERT^NO^MEMORY      = %4031,     ! can't LOCKMEMORY the cache buffer          tagline B30,JDK#54
000000 0  0     MES^MISSED^POLL^TO^SELF = %4032,    ! can't send to self                         B30,ROL#52
000000 0  0                                         ! on either,bus                              B30,ROL#52
000000 0  0     MES^BAD^COMPLETELCB     = %4033,    ! COMPLETELCB was called                     B30,ROL#53
000000 0  0                ! with the LCB in a state that should not occur                       B30,ROL#53
000000 0  0     MES^BADBSDSYSGEN       = %4034,     ! BSD not addressable as string              tagline B40,JDK#55
000000 0  0                                                                                      !B40,REGROUP#56
000000 0  0     MES^RGP^INTERNAL^ERROR = %4035,      ! regroup algorithm logic error             B40,REGROUP#56
000000 0  0                                                                                      !C00,JDK/ROL#68
000000 0  0                                                                                      !C00,JDK/ROL#68
000000 0  0     MES^CNCLQOVERFLOW      = %4036,     ! cancel queue overflow                      C00,JDK/ROL#68
000000 0  0                                                                                      !C00,JDK/ROL#68
000000 0  0     MES^CONVERTERR         = %4037,     ! Error converting recv queue                C00,JDK/ROL#68
000000 0  0                                                                                      !C00,JDK/ROL#68
000000 0  0     MES^PARIAH              = %4040,     ! got poison packet from cpu n              B40,REGROUP#56
000000 0  0     MES^PARIAH^CPU0         = %4040,     ! got poison packet from cpu 0              B40,REGROUP#56
000000 0  0     MES^PARIAH^CPU1         = %4041,     ! got poison packet from cpu 1              B40,REGROUP#56
000000 0  0     MES^PARIAH^CPU2         = %4042,     ! got poison packet from cpu 2              B40,REGROUP#56
000000 0  0     MES^PARIAH^CPU3         = %4043,     ! got poison packet from cpu 3              B40,REGROUP#56
000000 0  0     MES^PARIAH^CPU4         = %4044,     ! got poison packet from cpu 4              B40,REGROUP#56
000000 0  0     MES^PARIAH^CPU5         = %4045,     ! got poison packet from cpu 5              B40,REGROUP#56
000000 0  0     MES^PARIAH^CPU6         = %4046,     ! got poison packet from cpu 6              B40,REGROUP#56
000000 0  0     MES^PARIAH^CPU7         = %4047,     ! got poison packet from cpu 7              B40,REGROUP#56
000000 0  0     MES^PARIAH^CPU8         = %4050,     ! got poison packet from cpu 8              B40,REGROUP#56
000000 0  0     MES^PARIAH^CPU9         = %4051,     ! got poison packet from cpu 9              B40,REGROUP#56
000000 0  0     MES^PARIAH^CPU10        = %4052,     ! got poison packet from cpu 10             B40,REGROUP#56
000000 0  0     MES^PARIAH^CPU11        = %4053,     ! got poison packet from cpu 11             B40,REGROUP#56
000000 0  0     MES^PARIAH^CPU12        = %4054,     ! got poison packet from cpu 12             B40,REGROUP#56
000000 0  0     MES^PARIAH^CPU13        = %4055,     ! got poison packet from cpu 13             B40,REGROUP#56
000000 0  0     MES^PARIAH^CPU14        = %4056,     ! got poison packet from cpu 14             B40,REGROUP#56
000000 0  0     MES^PARIAH^CPU15        = %4057,     ! got poison packet from cpu 15             B40,REGROUP#56
000000 0  0                                                                                      !C00,JDK/ROL#68
000000 0  0     MES^TOOMANYXLIS        = %4060,     ! No more XLIs are allowed                   C00,JDK/ROL#68
000000 0  0                                                                                      !C00,JDK/ROL#68
000000 0  0     MES^NOXLIMEMORY        = %4061,     ! unable to LOCKMEMORY while                 C00,JDK/ROL#68
000000 0  0                                         ! building XLIs                              C00,JDK/ROL#68
000000 0  0     MES^BADEXTCHAIN        = %4062,     ! bad .EXT chain pointer                     C00,JDK/ROL#68
000000 0  0     MES^IPBMON^SHOTERR      = %4060,     ! IPB monitor SHOTGUN error                 C00,DW #67
000000 0  0     MES^XLIALLOCERR        = %4063,     ! error detected while allocating XLI        C00,JDK/ROL#68
000000 0  0                                                                                      !C00,JDK/ROL#68
000000 0  0     MES^XLIRELEASEERR      = %4064,     ! error detected while releasing XLI         C00,JDK/ROL#68
000000 0  0                                                                                      !C00,JDK/ROL#68
000000 0  0     MES^BADLCBTABLE        = %4065,     ! bad LCB table or bad LCB                   C00,JDK/ROL#68
000000 0  0                                                                                      !C00,JDK/ROL#68
000000 0  0     MES^BADRECVQUEUE       = %4066,     ! bad $RECEIVE queue                         C00,JDK/ROL#68
000000 0  0                                                                                      !C00,JDK/ROL#68
000000 0  0     MES^BADTLE             = %4067,     ! bad Time List Entry                        C00,JDK/ROL#68
000000 0  0                                                                                      !C00,JDK/ROL#68
000000 0  0     MES^BADRCH             = %4070,     ! bad Readlink Cache Header or XLI           C00,JDK/ROL#68
000000 0  0                                                                                      !C00,JDK/ROL#68
000000 0  0     MES^BADXLX             = %4071,     ! bad XLI or LCB                             C00,JDK/ROL#68
000000 0  0                                                                                      !C00,JDK/ROL#68
000000 0  0     MES^BADLINKERCALL      = %4072,     ! bad Linker/requestor call                  C00,JDK/ROL#68
000000 0  0                                                                                      !C00,JDK/ROL#68
000000 0  0     MES^BADSERVERCALL      = %4073,     ! bad Listener/server call                   C00,JDK/ROL#68
```

```
2139.71  000000 0  0                                                                              !C00,JDK/ROL#68
2139.72  000000 0  0    MES^CANCELERR          = %4074,      ! error detected cancelling requests      C00,JDK/ROL#68
2139.73  000000 0  0                                                                              !C00,JDK/ROL#68
2139.78  000000 0  0    MES^XSTOPERR           = %4075,      ! error detected during process stop      C00,JDK/ROL#68
2139.79  000000 0  0                                                                              !C00,JDK/ROL#68
2139.8   000000 0  0                                                                              !C00,JDK/ROL#68
2139.81  000000 0  0                                                                              !C00,JDK/ROL#68
2139.82  000000 0  0                                                                              !C00,JDK/ROL#68
2139.83  000000 0  0                                                                              !C00,JDK/ROL#68
2139.84  000000 0  0                                                                              !C00,JDK/ROL#68
2140.    000000 0  0  ! Process control errors:  %5000 -> %5777
2141.    000000 0  0  !
2142.    000000 0  0    PRO^NOTRAPTLE          = %5002,      ! no TRAP-TLE was found on the receive-
2143.    000000 0  0                                         ! queue following a trapout action.
2144.    000000 0  0    PRO^BADWAIT            = %5003,      ! WAIT was called with either no process
2145.    000000 0  0                                         ! currently running or more likely under
2146.    000000 0  0                                         ! mutual exclusion
2147.    000000 0  0    PRO^BADWAKE            = %5004,      ! attempt to awake a nonexistent process
2147.    000000 0  0    PRO^MUTEXTRAP          = %5005,      ! trap occurred with mutex on             B30,SS #50
2148.    000000 0  0    PRO^SYSTRAP            = %5100,      ! an interrupt handler, an unstop-
2149.    000000 0  0                                         ! able process or a system process
2150.    000000 0  0                                         ! got a trap.  The trap number is
2151.    000000 0  0                                         ! displayed in bits <10:15>
2152.    000000 0  0    PTIM^BADENT            = %5200,      ! attempt to add an entry to a ptle list B00,SS #26
2153.    000000 0  0                                         ! that is already on a list, or attempt  B00,SS #26
2154.    000000 0  0                                         ! to delete an entry that is not on any  B00,SS #26
2155.    000000 0  0                                         ! list, from a ptle list                 B00,SS #26
2156.    000000 0  0    PTIM^BADVAL            = %5201,      ! attempt to add a ptle with a time      B00,SS #26
2157.    000000 0  0                                         ! value <= 0D to a ptle list             B00,SS #26
2158.    000000 0  0    PTIM^STRANGEPTLE       = %5202,      ! an entry of unexpected type            B00,SS #26
2159.    000000 0  0    PTIM^BADPTLETABLE      = %5203,      ! PTLE table not consistent              B00,SS #26
2160.    000000 0  0    PTIM^BADPROCESSTIMER   = %5204,      ! processtimer value invalid             B00,SS #27
2160.1   000000 0  0    DEF^ERROR              = %5210,      ! DEFINE internal error                  B20,SS #41
2160.2   000000 0  0    DYNAMICIOP^ERROR       = %5220,      ! Dynamic configuration error            C00,SSW#72
2161.    000000 0  0                                                                              !C00,SSW#72
2162.    000000 0  0  ! The current trap numbers are:                                              A04,RWC#9
2163.    000000 0  0                                                                              !A04,RWC#9
2164.    000000 0  0    TRAP^ADDRESS           =   %00,      ! illegal address reference              A04,RWC#9
2165.    000000 0  0    TRAP^INSTRUCTION       =   %01,      ! instruction failure (sometimes caused  A04,RWC#9
2166.    000000 0  0                                         ! by illegal extended addresses.)        A04,RWC#9
2167.    000000 0  0    TRAP^ARITHOVERFLOW     =   %02,      ! arithmetic overflow                    A04,RWC#9
2168.    000000 0  0    TRAP^STACKOVERFLOW     =   %03,      ! stack overflow                         A04,RWC#9
2169.    000000 0  0    TRAP^LOOP              =   %04,      ! loop timer overflow                    A04,RWC#9
2170.    000000 0  0    TRAP^FAULTREAD         =   %13,      ! io error reading from swapfile         A04,RWC#9
2171.    000000 0  0    TRAP^NOMEM             =   %14,      ! no memory available for faulted page   A04,RWC#9
2172.    000000 0  0    TRAP^UCME              =   %15,      ! uncorrectable memory error             A04,RWC#9
2173.    000000 0  0                                                                              !A04,RWC#9
2174.    000000 0  0  !
2175.    000000 0  0  ! Debug module errors:  %6000 -> %6777
2176.    000000 0  0  !
2177.    000000 0  0    DBG^INDBGTRAP          = %6001,      ! trap in debugger
2178.    000000 0  0    DBG^BADMAB             = %6002,      ! scheduled MAB does not correspond to
2179.    000000 0  0                                         ! PCB contents.  Problem in scheduling
2180.    000000 0  0                                         ! MABs
2181.    000000 0  0    DBG^MABNOTFOUND        = %6003,      ! memory access breakpoint was taken
2182.    000000 0  0                                         ! however it cannot be found in table.
2183.    000000 0  0                                         ! Talk to Don Wilson
```

```
000000 0  0      DBG^IMPOSSIBLE          = %6004,        ! Impossible error.
000000 0  0                                              ! Ignore it, it cannot be  !!!
000000 0  0      DBG^ENTERLOBUG          = %6005,        ! OSP breakpoint or under mutex        B40,SS #59
000000 0  0      DBG^COVER^INTERNAL      = %6020,        ! COVER has detected internal          B40,NRD#58
000000 0  0                                              ! inconsistency                        B40,NRD#58
000000 0  0    !
000000 0  0    ! Time control errors:  %7000 -> %7377                                           B00,RWC#17
000000 0  0    !
000000 0  0      TIM^BADENT              = %7001,        ! attempt to add an entry to the
000000 0  0                                              ! time list, which is already on another
000000 0  0                                              ! list...
000000 0  0      TIM^BADVAL              = %7002,        ! attempt to add an entry to the
000000 0  0                                              ! time list, with a time value of
000000 0  0                                              ! <= 0D
000000 0  0      TIM^NOMEM               = %7003,        ! unable to obtain SYSPOOL space for
000000 0  0                                              ! Xray pagepin table on come up
000000 0  0      TIM^STRANGETLE          = %7004,        ! a TLE of unknown type was picked
000000 0  0                                              ! up, timing out on TLIST
000000 0  0      TIM^STRANGEENTRY        = %7005,        ! an entry of an unexpected type
000000 0  0                                              ! was picked up, timing out on TLIST -
000000 0  0                                              ! maybe it's an LCB ?
000000 0  0      TIM^DSTNOMEM            = %7006,        ! unable to obtain memory for the      B00,Grandfather #29
000000 0  0                                              ! DST transition table.                B00,Grandfather #29
000000 0  0      TIM^BADCLOCK            = %7007,        ! clock (SG[103:106]) corrupted        B00,EPN#33
000000 0  0    !                                                                                B00,EPN#33
000000 0  0    ! Destination Control errors:  %7400 -> %7477                                    B30,Rabbit#44
000000 0  0    !                                                                                B00,RWC#17
000000 0  0      DCT^BADUPDATE           = %7401,        ! request to update an non-existing    B00,RWC#17
000000 0  0                                              ! DCT entry.                           B00,RWC#17
000000 0  0                                              !                                      B00,RWC#17
000000 0  0      DCT^NOTENOUGHMEM        = %7402,        ! Insufficient memory to hold the DCT  B00,RWC#17
000000 0  0                                              !                                      B00,RWC#17
000000 0  0      DCT^BADNAME             = %7403,        ! New process name not $A...           B00,RWC#17
000000 0  0                                              !                                      B00,RWC#17
000000 0  0                                              !                                      B00,RWC#17
000000 0  0    !                                                                                B30,Rabbit#44
000000 0  0    ! Server class errors : %7500 -> %7577                                           B30,Rabbit#44
000000 0  0    !                                                                                B30,Rabbit#44
000000 0  0      SC^REGINTERNAL    = %007501,            ! Internal inconsistency in the Registry B30,Rabbit#44
000000 0  0      SC^BADLIST        = %007502,            ! Bad list detected in Registry.       B30,Rabbit#44
000000 0  0      SC^ILLREGOP       = %007503,            ! Illegal operation attemped on Registry B30,Rabbit#44
000000 0  0      SC^SCASINTERNAL   = %007504,            ! Server Class access internal error.  B30,Rabbit#44
000000 0  0      SC^SLINKINTERNAL  = %007505,            ! Slink process internal error.        B30,Rabbit#44
000000 0  0    !                                                                                B30,Rabbit#44
000000 0  0    ! Operator process errors:  %10000 -> %10777
000000 0  0    !
000000 0  0      OPR^LOCKMEMORY          = %10001,       ! failed to lock memory in the FIFO
000000 0  0      OPR^RECEIVEMEMORY       = %10002,       ! backup process failed to get the
000000 0  0                                              ! FIFO from the primary
000000 0  0    !
000000 0  0    ! Disc process errors:  %11000 -> %11777
000000 0  0    !
000000 0  0      DSC^BADCOLDDEV          = %11000,       ! cold load from down disc.
000000 0  0      DSC^CACHE^TABLE^ERROR   = %11001,       ! error in cache tables in deletefree  A03,GCL
000000 0  0      DSC^CACHE^TABLE^ACB     = %11002,       ! failure on CBPOOL for cache tables
000000 0  0      DSC^CACHE^SEG           = %11003,       ! failure to obtain cache data segment
000000 0  0      DSC^CACHE^TABLE^SYS     = %11004,       ! failure on SYSPOOL for cache tables
```

```
000000 0  0       DSC^CACHE^NOBACKUPBUF = %11005,      ! no physical memory for backup buffer
000000 0  0       DSC^CACHE^NOSPACE     = %11006,      ! no cache space available for data      A03,GCL
000000 0  0       DSC^CACHE^NOSPACE2    = %11007,      ! no cache space available for audit     A03,GCL
000000 0  0       DSC^CACHE^SORTERROR   = %11010,      ! error detected in cache sort table     A03,GCL
000000 0  0       DSC^CACHE^VIRTUALAUDIT= %11011,      ! an audit page was unlocked             A03,GCL
000000 0  0       DSC^CACHE^NOBKUPAUDBUF= %11012,      ! no phys mem for audbuf in backup       A03,GCL
000000 0  0       DSC^CACHE^TABLE^ERROR2= %11013,      ! error in cache tables in cachewrite    A03,GCL
000000 0  0       DSC^CACHE^PUTUNLOCKED = %11014,      ! try to put an unlocked buffer          A03,GCL
000000 0  0       DSC^CACHE^BUFMINUS1D  = %11015,      ! buffer for use by cache passed = -1d   A03,GCL
000000 0  0       DSC^CACHE^MAPUNLOCKED = %11016,      ! mapping an unlocked buffer             A06,gt #13
000000 0  0       DSC^CACHE^MAPINUSE    = %11017,      ! mapping into an occupied i/o slot      A06,gt #13
000000 0  0       DSC^CACHE^NOREF       = %11020,      ! cache block with no ref entry          A06,gt #14
000000 0  0       DSC^CACHE^LOCKFAIL    = %11021,      ! failure to lock a dirty i/o buffer     B00,sl #25
000000 0  0       DSC^DRIVER^TOOMANYINTS= %11051,      ! more interrupts were received than
000000 0  0                                            ! expected
000000 0  0       DSC^LOADUCODEERROR    = %11052,      ! error during loading microcode         A05,gcl #12
000000 0  0       DSC^NOUCODE           = %11053,      ! no microcode found when needed         A05,gcl #12
000000 0  0       DSC^LIST^READY^INS    = %11101,      ! internal readylist garbled, detected
000000 0  0                                            ! during insert attempt
000000 0  0       DSC^LIST^LCB^INS      = %11102,      ! internal lcb list garbled, detected    B00,gt #20
000000 0  0                                            ! during insert attempt
000000 0  0       DSC^CBPOOL            = %11103,      ! failure to obtain CBPOOL for cbtables
000000 0  0       DSC^INIT^NOSTACK      = %11104,      ! no physical memory for stack
000000 0  0       DSC^INIT^DEFINEPOOL   = %11105,      ! internal error on DEFINEPOOL
000000 0  0       DSC^INIT^BADCONFIG    = %11106,      ! bad unit count from Sysgen
000000 0  0       DSC^INIT^NOVLABSEG    = %11107,      ! unable to obtain or use an I/O segment
000000 0  0       DSC^BACKUP^BADBUF     = %11110,      ! bad buffer address in readchkpdata     A03,GCL#2
000000 0  0       DSC^INIT^BADSUBTYPE   = %11111,      ! configured with unsupported subtype    A03,gcl #4
000000 0  0       DSC^BADAUDITCOUNT     = %11112,      ! audit page request size error          B20,sl #38
000000 0  0       DSC^LIST^DEL          = %11113,      ! attempted delete from invalid list     A06,gt #13
000000 0  0       DSC^LIST^INS          = %11114,      ! attempted insert into an invalid list  A06,gt #13
000000 0  0       DSC^BADPROCSTATE      = %11115,      ! invalid or inconsistent process state  A06,GT #15
000000 0  0       DSC^INTERNAL^ERROR    = %11117,      ! internal inconsistency detected        B20,sl #38
000000 0  0                                                                                    !A06,GT #15
000000 0  0       DSC^AUDIT^EXTRACALL   = %11200,      ! extra entry of audit state machine     A03,GCL
000000 0  0       DSC^AUDIT^NETWORKNAME = %11201,      ! network name found in illegal place    A03,GCL
000000 0  0       DSC^AUDIT^NOSPACE     = %11202,      ! audit buffer pre-allocation failure    A03,GCL
000000 0  0       DSC^AUDIT^NOAUDIT     = %11203,      ! audit called but not configured        A03,GCL
000000 0  0       DSC^AUDIT^BADTCBSTATE = %11204,      ! tcbstate out of range                  A03,GCL
000000 0  0    !  %11205,       **** NOT USED *** !                                            !B40,sl #61
000000 0  0       DSC^AUDIT^ROLLERRZERO = %11206,      ! doing rollover for no reason           A03,gcl #4
000000 0  0       DSC^DP2               = %11500,      ! dp2 error                              B00,MBB-DP2 #21
000000 0  0       DSC^DP2^NOMEMORY      = %11501,      ! dp2 unable to obtain physical memory   B00,BERT-DP2#32
000000 0  0       DSC^NODRSEG = %11700,                ! cannot obtain driver segment           B00,MBB-DP2 #21
000000 0  0       DSC^DRIVER^DPBUG = %11701,           ! bad info on driver/dp2 interface       B00,MBB-DP2 #21
000000 0  0       DSC^UNEXEVALSTATE = %11702,          ! unexpected evalstate                   B00,MBB-DP2 #21
000000 0  0       DSC^UNEXWAITRET = %11703,            ! unexpected wait return value           B00,MBB-DP2 #21
000000 0  0       DSC^COPYMAPERR = %11704,             ! error from copymap procedure           B00,MBB-DP2 #21
000000 0  0       DSC^BADCOMMAND = %11705,             ! bad command code in drr                B00,MBB-DP2 #21
000000 0  0       DSC^BADDR = %11706,                  ! internal driver consistency failure    B00,MBB-DP2 #21
000000 0  0       DSC^NOTDP2 = %11707,                 ! DP2 code without DCTDP2 bit            B00,MBB-DP2 #21
000000 0  0       DSC^FRATERNALFREEZE = %11710,        ! this driver froze because another did  B00,MBB-DP2 #21
000000 0  0       DSC^DRTAKEOVERQ = %11711,            ! trays q'd at takeover                  B00,MBB-DP2 #21
000000 0  0       DSC^BAD^INFERENCE = %11712,          ! inference proc rules failure           B00,MBB-DP2 #21
000000 0  0       DSC^BAD^POWERFAIL = %11713,          ! impossible state reached in pwrfail    B00,MBB-DP2 #21
000000 0  0       DSC^BADNDD = %11714,                 ! attempt to access NDD failed           B00,MBB-DP2 #21
000000 0  0       DSC^COLDLOADFROMOLD = %11715,        ! coldload from older mirror of pair     C00,MBB#63
```

```
2282.C06 000000 0  0    DSC^BAD^PKT = %11716,               ! packet len too large                 C00,MBB#74
2283.    000000 0  0  !
2284.    000000 0  0  ! OSP ( and RMI ) errors:  %12000 -> %12777                                  B30,Check#49
2285.    000000 0  0  !
2286.    000000 0  0    SMT^NOPROCESS         = %12001,      ! OSP interrupt with no OSP process
2287.    000000 0  0    SMT^READCNT           = %12002,      ! OSP read interrupt with count <= 0
2288.    000000 0  0    SMT^WRITECNT          = %12003,      ! OSP write interrupt with count <= 0
2289.    000000 0  0    SMT^BADPARAM          = %12004,      ! OSP interrupted with bad parameter
2289.1   000000 0  0                                                                              !B30,Check#49
2289.2   000000 0  0    RMIP^INIT^ERROR       = %12100,      ! OSP process initialization error     B30,Check#49
2289.21  000000 0  0    RMIP^INTERNAL^ERROR   = %12101,      ! OSP process internal error           B30,Check#49
2289.3   000000 0  0                                                                              !B30,Check#49
2289.4   000000 0  0                                                                              !B30,Check#49
2290.    000000 0  0  !                                                                            A02,lbl
2291.    000000 0  0  ! TMF errors: %13000 -> %13777                                               A02,lbl
2292.    000000 0  0  !                                                                            A02,lbl
2293.    000000 0  0                                                                              !B30,pjh#43
2294.    000000 0  0        !=========================================================!          !B30,pjh#43
2295.    000000 0  0        !                                                         !          !B30,pjh#43
2296.    000000 0  0        !   All freeze codes from %13000 to %13777 can be found   !          !B30,pjh#43
2297.    000000 0  0        !   in the file DTMFHALT in the release subvol for        !          !B30,pjh#43
2298.    000000 0  0        !   TMF (T9066).                                          !          !B30,pjh#43
2299.    000000 0  0        !                                                         !          !B30,pjh#43
2300.    000000 0  0        !=========================================================!          !B30,pjh#43
2301.    000000 0  0                                                                              !B30,pjh#43
2302.    000000 0  0                                                                              !B30,pjh#43
2303.    000000 0  0                                                                              !B30,pjh#43
2329.    000000 0  0                                                                              !A04,DMD#11
2330.    000000 0  0  !                                                                            A04,DMD#11
2331.    000000 0  0  ! XRAY internal errors:  %14000 -> %14777                                    A04,DMD#11
2332.    000000 0  0  !                                                                            A04,DMD#11
2333.    000000 0  0    XRAY^BADXPTR          = %14001,      ! Corrupted XPTR, check linking        A04,DMD#11
2334.    000000 0  0                                         ! process                              A04,DMD#11
2335.    000000 0  0
2336.    000000 0  0  !
2337.    000000 0  0  ! Communication product internal errors:  %40000 -> %47777
2338.    000000 0  0  !
2339.    000000 0  0  ! error number format;
2340.    000000 0  0  !                              111   111
2341.    000000 0  0  !  0   123   456   789         012   345
2342.    000000 0  0  !  0    4    'device'         '-error-'
2343.    000000 0  0  !              type             number
2344.    000000 0  0
2345.    000000 0  0  !---
2346.    000000 0  0  ! Expand line handler  type 63
2347.    000000 0  0  !---
2348.    000000 0  0
2349.    000000 0  0    NETLH^TRAP^0          = %47700,      ! frame list error,level 4
2350.    000000 0  0    NETLH^TRAP^1          = %47701,      ! level 4 length error
2351.    000000 0  0    NETLH^TRAP^2          = %47702,      ! level 4 state transition error
2352.    000000 0  0    NETLH^TRAP^3          = %47703,      ! frame list error,level 2 - send
2353.    000000 0  0    NETLH^TRAP^4          = %47704,      ! frame list error,level 2 - receive
2353.1   000000 0  0    NETLH^TRAP^5          = %47705,      ! level 2 state transition error       C00,SSW#71
2354.    000000 0  0    NETLH^TRAP^6          = %47706,      ! out of CBPOOL in ADD^NODE
2355.    000000 0  0    NETLH^TRAP^7          = %47707,      ! initialize halt for mem init stuff
2356.    000000 0  0    NETLH^TRAP^10         = %47710,      ! error on calling ESP procerdures     C00,HA #75
2356.1   000000 0  0                                                                              !C00,HA #75
```

```
000000 0  0    !---
000000 0  0    ! NCP  type 62
000000 0  0    !---
000000 0  0
000000 0  0      NCP^TRAP^0             = %47600,       ! out of CBPOOL in SET^NSCB
000000 0  0      NCP^TRAP^1             = %47601,       ! out of CBPOOL in INIT
000000 0  0
000000 0  0    !---
000000 0  0    ! X25 access method   type 61
000000 0  0    !---
000000 0  0
000000 0  0      X25^TRAP^0             = %47500,       ! 12: state tables invalid
000000 0  0      X25^TRAP^1             = %47501,       ! 12: messed up free list
000000 0  0      X25^TRAP^2             = %47502,       ! 12: messed up frame list
000000 0  0      X25^TRAP^3             = %47503,       ! 13: call to non-existent 14 protocol
000000 0  0      X25^TRAP^4             = %47504,       ! 13: cktcb points to invalid subdev
000000 0  0      X25^TRAP^5             = %47505,       ! 13: state tables invalid
000000 0  0      X25^TRAP^6             = %47506,       ! ios: memory allocation prob in checkp.
000000 0  0      X25^TRAP^7             = %47507,       ! ios: memory allocation prob in init.
000000 0  0
000000 0  0    !---
000000 0  0    ! AM3270/TR3271 access method  type 60
000000 0  0    !---
000000 0  0
000000 0  0      AMTR^TRAP^0            = %47400,       ! ios : no level 3 protocol sysgen'ed
000000 0  0      AMTR^TRAP^1            = %47401,       ! ios : memory allocation problem at init
000000 0  0      AMTR^TRAP^2            = %47402,       ! 12: invalid 12 state
000000 0  0      AMTR^TRAP^3            = %47403,       ! 13: invalid 13 state
000000 0  0      AMTR^TRAP^4            = %47404,       ! 13: invalid/improper level 4 protocol
000000 0  0      AMTR^TRAP^5            = %47405,       ! 13: poll list error
000000 0  0
000000 0  0    !---
000000 0  0    ! AM6520 access method  type 59
000000 0  0    !---
000000 0  0
000000 0  0      AM65^TRAP^0            = %47300,       ! ios : no level 3 protocol sysgen'ed
000000 0  0      AM65^TRAP^1            = %47301,       ! ios : memory allocation problem at init
000000 0  0      AM65^TRAP^2            = %47302,       ! 12: invalid 12 state
000000 0  0      AM65^TRAP^3            = %47303,       ! 13: invalid 13 state
000000 0  0      AM65^TRAP^4            = %47304,       ! 13: invalid/improper level 4 protocol
000000 0  0      AM65^TRAP^5            = %47305,       ! 13: poll list error
000000 0  0
000000 0  0    !---                                                                      B00,SS #23
000000 0  0    ! INFOSAT type 52                                                         B00,SS #23
000000 0  0    !---                                                                      B00,SS #23
000000 0  0                                                                             !B00,SS #23
000000 0  0      SLM^TRAP^2             = %46402,       ! unable to define pool, get segment     B00,SS #23
000000 0  0                                             ! or lock memory                 B00,SS #23
000000 0  0                                                                             !B00,SS #23
000000 0  0    !---                                                                      B00,SS #23
000000 0  0    ! THL type 26                                                             B00,SS #23
000000 0  0    !---                                                                      B00,SS #23
000000 0  0                                                                             !B00,SS #23
000000 0  0      THL^TRAP^0             = %43200,       ! direct call to driver with DRVENTRY    B00,SS #23
000000 0  0                                             ! set                            B00,SS #23
000000 0  0      THL^TRAP^1             = %43201,       ! continue with either DRVENTRY  B00,SS #23
000000 0  0                                             ! or PROCENTRY                   B00,SS #23
```

```
2414.      000000 0  0
2415.      000000 0  0    !---
2416.      000000 0  0    ! General access method internal errors
2417.      000000 0  0    !---
2418.      000000 0  0
2419.      000000 0  0      AX^TRAP^0              = %40000,      ! SIGNALPOOL failure in local pool
2419.1     000000 0  0                                                                              !C00,DCW#73
2419.2     000000 0  0    !                                                                           C00,DCW#73
2419.3     000000 0  0    ! The range %50000 through $50007 is assigned to TAPEPROCESS.               C00,DCW#73
2419.4     000000 0  0    !                                                                           C00,DCW#73
2419.5     000000 0  0      TAPE^PROCESS^INTERNAL^ERROR = %50000,                                    !C00,DCW#73
2419.6     000000 0  0                                                                              !C00,DCW#73
2420.      000000 0  0    !
2421.      000000 0  0    ! End of list.
2422.      000000 0  0    !
2423.      000000 0  0      IMPOSSIBLE^ERROR       = %77777;      ! should never happen
2424.      000000 0  0                                                                              !C00,DCW#73
3001.      000000 0  0
  25.      000000 0  0
  26.      000000 0  0
  27.      000000 0  0    ?SYMBOLS
  28.      000000 0  0    ?PRINTSYM
  30.      000000 0  0    ?        SOURCE dgp      ( util2, layouts )
Source file:  [1]  $OVER.T9618C00.DGP  01OCT86 - 10:26:04
 112.      000000 0  0    ?SECTION UTIL2
 113.      000000 0  0    !
 114.      000000 0  0    ! external dependencies: none
 115.      000000 0  0    !
 116.      000000 0  0    ! some extensions to dutil and other handinesses
 117.      000000 0  0    !
 118.      000000 0  0    LITERAL
 119.      000000 0  0          FALSE = 0
 120.      000000 0  0      ,   TRUE  = NOT FALSE
 121.      000000 0  0      ;
 122.      000000 0  0    DEFINE
 123.      000000 0  0          AWOLEN ( X )
 124.      000000 0  0            ! As WOLEN, for use in array index bounds
 125.      000000 0  0            = ( $OCCURS ( X ) * WLEN ( X ) - 1 )#
 126.      000000 0  0      ,   TRAPSON                                         ! enable arithmetic traps
 127.      000000 0  0            = CODE ( RDE; ORRI %200; SETE )#              ! undoes effect of trapsoff
 128.      000000 0  0      !
 129.      000000 0  0      !   arithmetic notational conveniences:
 130.      000000 0  0      !
 131.      000000 0  0      ,   INC     ( V )       = V   := V   + 1#          ! (signed 16 bit) increment
 132.      000000 0  0      ,   DINC    ( V )       = V   := V   + 1D#         ! double          increment
 133.      000000 0  0      ,   FINC    ( V )       = V   := V   + 1F#         ! fixed           increment
 134.      000000 0  0      ,   LINC    ( V )       = V   := V '+' 1#          ! logical         increment
 135.      000000 0  0      ,   PINC    ( P )       = @P  := @P [ 1 ]#         ! pointer         increment
 136.      000000 0  0      ,   DEC     ( V )       = V   := V   - 1#          ! (signed 16 bit) decrement
 137.      000000 0  0      ,   DDEC    ( V )       = V   := V   - 1D#         ! double          decrement
 138.      000000 0  0      ,   FDEC    ( V )       = V   := V   - 1F#         ! fixed           decrement
 139.      000000 0  0      ,   LDEC    ( V )       = V   := V '-' 1#          ! logical         decrement
 140.      000000 0  0      ,   PDEC    ( P )       = @P  := @P [ -1 ]#        ! pointer         decrement
 141.      000000 0  0      ,   MOD     ( A, B )    = ( A - ( A / B ) * B )#   ! a modulo b
 142.      000000 0  0      ,   BIT     ( B )       = ( %100000 '>>' ( B ) )#  ! bit b, b is (0:15)
 143.      000000 0  0          NOTBIT  ( B )       = $COMP ( BIT ( B ) )#     ! complement of bit b
 144.      000000 0  0
```

```
000000 0  0      .  UPCASEMASK
000000 0  0           ! Mask for upcasing alpha ascii chars
000000 0  0           = %157737#
000000 0  0      ,  UPCASE ( CHAR )
000000 0  0           ! Return ascii CHAR upcased
000000 0  0           = ( IF $ALPHA ( CHAR ) THEN ( CHAR ) LAND UPCASEMASK ELSE ( CHAR ) )#
000000 0  0      ,  INSTRUCTIONFAIL
000000 0  0           ! Generate an instruction failure trap
000000 0  0           = CODE ( LDI 0; INSR )#
000000 0  0      ,  TOUCH ( X )
000000 0  0           ! Evaluates X and deletes it.  X may be of any type value or reference.
000000 0  0           = BEGIN
000000 0  0             STACK X;
000000 0  0             CODE ( STRP 7 );
000000 0  0             END#
000000 0  0      ,  TESTINS =
000000 0  0           ! Tests cpu type; CCE if TNS (1.1)
000000 0  0           ! "scmp" is a no-op on a tns
000000 0  0           CODE ( ZERD; SCMP; LCMP )#
000000 0  0    ;
000000 0  0    ?SECTION LAYOUTS
000000 0  0    !
000000 0  0    ! external dependencies: none
000000 0  0    !
000000 0  0    ! implement the concept of a "layout".
000000 0  0    ! a layout name is formed for some name "l" as "l^layout".  a layout is a define
000000 0  0    ! which accepts some name "x" that, when expanded, defines a struct of name x
000000 0  0    ! having the form of l^layout.  the layout may be used to declare templates
000000 0  0    ! and disjoint or embedded structures of the indirect or direct variety
000000 0  0    ! (recall that templates cannot be used to declare embedded structures).
000000 0  0    !
000000 0  0    ! all layouts will generate "word aligned" structures which begin with the
000000 0  0    ! items (at offset zero) "word" and "byte", which are int and string types,
000000 0  0    ! respectively.  the presence of these items avoids some ambiguities when
000000 0  0    ! referring to a structure which may be embedded or disjoint, as a disjoint
000000 0  0    ! structure is accessed (by tal) as a word address and an embedded structure is
000000 0  0    ! accessed as a byte address.  given a structure x generated by an x^layout
000000 0  0    ! define , x.word [ n ] will always refer to word n and x.byte [ n ] will
000000 0  0    ! always refer to byte n.
000000 0  0    !
000000 0  0    ! the simplest form of a layout generates what is known as a "plain" structure.
000000 0  0    ! a plain structure is, effectively, a word aligned array which may be byte
000000 0  0    ! or word accessed and contains only the items "word" and "byte".
000000 0  0    ! such a layout is defined using the following:
000000 0  0    !
000000 0  0    DEFINE      LAYOUT ( X, BYTELENGTH ) =
000000 0  0                STRUCT   X;
000000 0  0                         BEGIN
000000 0  0                         INT     WORD [ 0:-1 ];
000000 0  0                         STRING  BYTE [ 0:((BYTELENGTH)-1) ];
000000 0  0                         END#;
000000 0  0    !
000000 0  0    ! layouts which are to generate structures which contain specific named items
000000 0  0    ! will begin with:
000000 0  0    !
000000 0  0    DEFINE      BEGIN^LAYOUT ( X ) =
000000 0  0                STRUCT        X;
```

```
000000 0  0                          BEGIN
000000 0  0                          INT      WORD [ 0:-1 ];
000000 0  0                          STRING   BYTE [ 0:-1 ];#;
000000 0  0   !
000000 0  0   ! followed by specific item definitions
000000 0  0   ! the layout will end with:
000000 0  0   !
000000 0  0   DEFINE      END^LAYOUT =
000000 0  0                          END#;
000000 0  0   !
000000 0  0   ! layouts and templates for various things
000000 0  0   !
000000 0  0   DEFINE      NAME^LAYOUT ( X ) =         ! name of device, subvol, et al
000000 0  0               LAYOUT ( X, 8 )#;
000000 0  0
000000 0  0   DEFINE      DEFAULTS^LAYOUT ( X ) =     ! file defaults ala fnameexpand
000000 0  0               BEGIN^LAYOUT     ( X )
000000 0  0                     NAME^LAYOUT   '( VOLUME );
000000 0  0                     NAME^LAYOUT    ( SUBVOL );
000000 0  0               END^LAYOUT#;
000000 0  0
000000 0  0   DEFINE      FILENAME^LAYOUT ( X ) =     ! internal form filename
000000 0  0               BEGIN^LAYOUT     ( X )
000000 0  0                     NAME^LAYOUT    ( VOLUME );
000000 0  0                     NAME^LAYOUT    ( SUBVOL );
000000 0  0                     NAME^LAYOUT    ( FILE );
000000 0  0               END^LAYOUT#;
000000 0  0
000000 0  0   DEFINE      XFILENAME^LAYOUT ( X ) =    ! external form filename
000000 0  0               LAYOUT ( X, 36 )#;
000000 0  0
000000 0  0   DEFINE      STARTUPMSG^LAYOUT ( X ) =   ! comint startup message
000000 0  0               BEGIN^LAYOUT       ( X )
000000 0  0                     INT                TYPE;
000000 0  0                     DEFAULTS^LAYOUT ( DEFAULTS );
000000 0  0                     FILENAME^LAYOUT ( IN );
000000 0  0                     FILENAME^LAYOUT ( OUT );
000000 0  0                     LAYOUT          ( PARAM, 4 * 132 );
000000 0  0               END^LAYOUT#;
000000 0  0   LITERAL     STARTUPMSG^TYPE = -1;
000000 0  0
000000 0  0   DEFINE      ASSIGNMSG^LAYOUT ( X ) =    ! comint assign message
000000 0  0               BEGIN^LAYOUT       ( X )
000000 0  0                     INT                TYPE;
000000 0  0                     BEGIN^LAYOUT    ( LOGICALUNIT )
000000 0  0                           STRING       PROGNAMELEN;
000000 0  0                           STRING       PROGNAME [ 0:30 ];
000000 0  0                           STRING       FILENAMELEN;
000000 0  0                           STRING       FILENAME [ 0:30 ];
000000 0  0                     END^LAYOUT;
000000 0  0                     INT ( 32 )         MASK;
000000 0  0                     FILENAME^LAYOUT ( FILENAME );
000000 0  0                     INT                PRIEXT;
000000 0  0                     INT                SECEXT;
000000 0  0                     INT                FILECODE;
000000 0  0                     INT                EXCLUSION;
000000 0  0                     INT                ACCESS;
000000 0  0                     INT                RECSIZE;
```

```
000000 0  0                       INT                BLKSIZE;
000000 0  0                 END^LAYOUT#;
000000 0  0     LITERAL     ASSIGNMSG^TYPE = -2;
000000 0  0     !
000000 0  0     ! the following define is passed the name of an assignmsg struct or struct
000000 0  0     ! pointer and the name of a field in the struct.  it examines the assign msg
000000 0  0     ! mask and returns whether the field is used.  note that all arithmetic after
000000 0  0     ! the "land" is a constant which is evaluated at compile-time
000000 0  0     !
000000 0  0     DEFINE      ASSIGN^EXISTS ( ASGN, ITEM ) =
000000 0  0                 ( $HIGH ( ASGN.MASK ) LAND
000000 0  0                   %100000 '>>'      '
000000 0  0                       ( IF $OFFSET ( ASGN.ITEM ) > $OFFSET ( ASGN.FILENAME ) THEN
000000 0  0                           ($OFFSET ( ASGN.ITEM ) - $OFFSET ( ASGN.PRIEXT ) + 2) / 2
000000 0  0                         ELSE
000000 0  0                           0
000000 0  0                       )
000000 0  0                 )#;
000000 0  0
000000 0  0     DEFINE      PARAMMSG^LAYOUT ( X ) =     ! comint param message
000000 0  0                 BEGIN^LAYOUT ( X )
000000 0  0                       INT            TYPE;
000000 0  0                       INT            NUMPARAMS;
000000 0  0                       LAYOUT       ( PARAMS, 1024 );
000000 0  0                 END^LAYOUT#;
000000 0  0     LITERAL     PARAMMSG^TYPE = -2;
000000 0  0
000000 0  0     !
000000 0  0     ! layouts for process names and ppd entries
000000 0  0     !
000000 0  0     DEFINE      CRT^LAYOUT    ( X ) =       ! process' creation timestamp or name
000000 0  0                 LAYOUT        ( X, 6 )#;
000000 0  0
000000 0  0     DEFINE      CRTNAMED      ( CRT ) =     ! crt is a name (not timestamp)
000000 0  0                 CRT.WORD.<0:1> <> 2#;
000000 0  0     DEFINE      CRTLOCAL      ( CRT ) =     ! crt is a local process
000000 0  0                 CRT.WORD.<0:7> = "$" OR NOT CRT.WORD.<8:15>#;
000000 0  0     DEFINE      CRTSYSTEMNUMBER ( CRT ) =   ! crt's system number if not local
000000 0  0                 CRT.WORD.<8:15>#;
000000 0  0     DEFINE      CRTREMOTE ( CRT, SYSID ) = ! crt is not local to system number sysid
000000 0  0                 CRT.CRTSYSTEMNUMBER <> SYSID#;
000000 0  0
000000 0  0     DEFINE      CRTPID^LAYOUT ( X ) =
000000 0  0                 BEGIN^LAYOUT  ( X )
000000 0  0                       CRT^LAYOUT     ( CRT );
000000 0  0                       INT               PID;
000000 0  0                 END^LAYOUT#;
000000 0  0
000000 0  0     DEFINE      PPDENT^LAYOUT ( X ) =
000000 0  0                 BEGIN^LAYOUT  ( X )
000000 0  0                       CRT^LAYOUT     ( CRT );
000000 0  0                       INT               PID1;
000000 0  0                       INT               PID2;
000000 0  0                       CRTPID^LAYOUT ( ANCESTOR );
000000 0  0                 END^LAYOUT#;
000000 0  0     !
000000 0  0     ! layouts for user id stuff (see 'guard2.ssecure)
```

```
000000 0  0   !
000000 0  0
000000 0  0   ! useridtousername and usernametouserid use a single parameter
000000 0  0   ! whose layout can be given by the following:
000000 0  0   DEFINE      USERIDNAME^LAYOUT ( X ) =
000000 0  0               BEGIN^LAYOUT  ( X )
000000 0  0                     INT           USERID [ 0:-1 ];
000000 0  0                     NAME^LAYOUT ( GROUPNAME );
000000 0  0                     NAME^LAYOUT ( USERNAME );
000000 0  0               END^LAYOUT#;
000000 0  0
000000 0  0   DEFINE      USERIDGROUP = <0:7>#;       ! group id bits in a user id word
000000 0  0   DEFINE      USERIDUSER  = <8:15>#;      ! user  id bits
000000 0  0
000000 0  0   !
000000 0  0   ! templates made from layouts above
000000 0  0   !
000000 0  0   PPDENT^LAYOUT                  ( PPDENT^TEMPLATE            ( * ) );
000000 0  0   CRTPID^LAYOUT                  ( CRTPID^TEMPLATE            ( * ) );
000000 0  0   CRT^LAYOUT                     ( CRT^TEMPLATE               ( * ) );
000000 0  0   PARAMMSG^LAYOUT                ( PARAMMSG^TEMPLATE          ( * ) );
000000 0  0   ASSIGNMSG^LAYOUT               ( ASSIGNMSG^TEMPLATE         ( * ) );
000000 0  0   STARTUPMSG^LAYOUT              ( STARTUPMSG^TEMPLATE        ( * ) );
000000 0  0   XFILENAME^LAYOUT               ( XFILENAME^TEMPLATE         ( * ) );
000000 0  0   FILENAME^LAYOUT                ( FILENAME^TEMPLATE          ( * ) );
000000 0  0   DEFAULTS^LAYOUT                ( DEFAULTS^TEMPLATE          ( * ) );
000000 0  0   NAME^LAYOUT                    ( NAME^TEMPLATE              ( * ) );
000000 0  0   USERIDNAME^LAYOUT              ( USERIDNAME^TEMPLATE        ( * ) );
000000 0  0
000000 0  0   ?        SOURCE gpldefs
Source file:  [1]  $VIOLET.TOOLSC00.GPLDEFS  06MAY86 - 11:50:13
000000 0  0   ! GPLDEFS T9600B40 (15SEP86) - SIO PROCEDURES - DEFINITIONS
000000 0  0   !
000000 0  0   ! COPYRIGHT (C) 1985 TANDEM COMPUTERS INCORPORATED
000000 0  0   ! Protected as an unpublished work.
000000 0  0   !
000000 0  0   ?SECTION  FCB^DEFS
000000 0  0   !
000000 0  0   ! FCB SIZE IN WORDS.
000000 0  0   !
000000 0  0   LITERAL
000000 0  0        FCBSIZE = 60;
000000 0  0   !
000000 0  0   ! DECLARE RUCB , PUCB, AND COMMON FCB.
000000 0  0   !
000000 0  0   DEFINE
000000 0  0        ALLOCATE^CBS ( RUCB^NAME , COMMON^FCB^NAME , NUM^FILES ) =
000000 0  0           INT .RUCB^NAME [ 0:65 ] :=
000000 0  0                  ! RUCB PART.
000000 0  0                  [ 62 , 1 , 27 * [ 0 ] , 62 , 32 * [ 0 ] ,
000000 0  0                  ! PUCB PART.
000000 0  0                    4 , NUM^FILES , 4 + FCBSIZE ];
000000 0  0           INT .COMMON^FCB^NAME [ 0:FCBSIZE - 1 ] :=
000000 0  0                  [ FCBSIZE * [ 0 ] ]#;
000000 0  0   !
000000 0  0   ! DECLARE FCB.
000000 0  0   !
```

```
000000 0  0  DEFINE
000000 0  0       ALLOCATE^FCB ( FCB^NAME , PHYS^FILENAME ) =
000000 0  0          INT .FCB^NAME [ 0:FCBSIZE - 1 ] :=
000000 0  0                 [ FCBSIZE , %000061 , -1 , %100000 , 0 , PHYS^FILENAME ,
000000 0  0                   ( FCBSIZE - 17 ) * [ 0 ] ]#;
000000 0  0  ?SECTION  OPEN^DEFS
000000 0  0  !
000000 0  0  ! OPEN ACCESS.
000000 0  0  !
000000 0  0  LITERAL
000000 0  0       READWRITE^ACCESS = 0,
000000 0  0       READ^ACCESS      = 1,
000000 0  0       WRITE^ACCESS     = 2;
000000 0  0  !
000000 0  0  ! OPEN EXCLUSION.
000000 0  0  !
000000 0  0  LITERAL
000000 0  0       SHARE     = 0,
000000 0  0       EXCLUSIVE = 1,
000000 0  0       PROTECTED = 3;
000000 0  0  !
000000 0  0  ! OPEN^FILE FLAGS                  V         111111
000000 0  0  !                                  0123456789012345
000000 0  0                        !      1111111111222222222233
000000 0  0  DEFINE                !4567890123456789012345678901
000000 0  0       ABORT^OPENERR = %B0000000000000000000000000001D#,
000000 0  0       ABORT^XFERERR = %B0000000000000000000000000010D#,
000000 0  0       PRINT^ERR^MSG = %B0000000000000000000000000100D#,
000000 0  0       AUTO^CREATE   = %B0000000000000000000000001000D#,
000000 0  0       MUSTBENEW     = %B0000000000000000000000010000D#,
000000 0  0       PURGE^DATA    = %B0000000000000000000000100000D#,
000000 0  0       AUTO^TOF      = %B0000000000000000000001000000D#,
000000 0  0       NOWAIT        = %B0000000000000000000010000000D#,
000000 0  0       BLOCKED       = %B0000000000000000000100000000D#,
000000 0  0       VAR^FORMAT    = %B0000000000000000001000000000D#,
000000 0  0       READ^TRIM     = %B0000000000000000010000000000D#,
000000 0  0       WRITE^TRIM    = %B0000000000000000100000000000D#,
000000 0  0       WRITE^FOLD    = %B0000000000000001000000000000D#,
000000 0  0       WRITE^PAD     = %B0000000000000010000000000000D#,
000000 0  0       CRLF^BREAK    = %B0000000000000100000000000000D#;
000000 0  0  ?SECTION  SET^FILE^DEFS
000000 0  0  !
000000 0  0  ! SET^FILE OPERATIONS.
000000 0  0  !
000000 0  0  LITERAL
000000 0  0        INIT^FILEFCB                 =   0,
000000 0  0        !
000000 0  0        ASSIGN^FILENAME              =   1,
000000 0  0        ASSIGN^LOGICALFILENAME       =   2,
000000 0  0        ASSIGN^OPENACCESS            =   3,
000000 0  0        ASSIGN^OPENEXCLUSION         =   4,
000000 0  0        ASSIGN^RECORDLENGTH          =   5,
000000 0  0        ASSIGN^RECORDLEN             =   ASSIGN^RECORDLENGTH,            !D01
000000 0  0        ASSIGN^FILECODE              =   6,
000000 0  0        ASSIGN^PRIMARYEXTENTSIZE     =   7,
000000 0  0        ASSIGN^PRIEXT                =   ASSIGN^PRIMARYEXTENTSIZE,       !D01
000000 0  0        ASSIGN^SECONDARYEXTENTSIZE =   8,
```

```
000000 0  0      ASSIGN^SECEXT             =  ASSIGN^SECONDARYEXTENTSIZE,      !D01
000000 0  0      ASSIGN^BLOCKLENGTH        =  9,
000000 0  0      ASSIGN^BLOCKBUFLEN        =  ASSIGN^BLOCKLENGTH,              !D01
000000 0  0      !
000000 0  0      SET^DUPFILE               = 10,
000000 0  0      SET^SYSTEMMESSAGES        = 11,
000000 0  0      SET^OPENERSPID            = 12,
000000 0  0      SET^RCVUSEROPENREPLY      = 13,
000000 0  0      SET^RCVOPENCNT            = 14,
000000 0  0      SET^RCVEOF                = 15,
000000 0  0      SET^USERFLAG              = 16,
000000 0  0      SET^ABORT^XFERERR         = 17,
000000 0  0      SET^PRINT^ERR^MSG         = 18,
000000 0  0      SET^READ^TRIM             = 19,
000000 0  0      SET^WRITE^TRIM            = 20,
000000 0  0      SET^WRITE^FOLD            = 21,
000000 0  0      SET^WRITE^PAD             = 22,
000000 0  0      SET^CRLF^BREAK            = 23,
000000 0  0      SET^PROMPT                = 24,
000000 0  0      SET^ERRORFILE             = 25,
000000 0  0      SET^PHYSIOOUT             = 26,
000000 0  0      SET^LOGIOOUT              = 27,
000000 0  0      SET^COUNTXFERRED          = 28,
000000 0  0      SET^ERROR                 = 29,
000000 0  0      SET^BREAKHIT              = 30,
000000 0  0      SET^TRACEBACK             = 31,
000000 0  0      !
000000 0  0      SET^EDITREAD^REPOSITION   = 32,
000000 0  0      !
000000 0  0      FILE^FILENAME^ADDR        = 33,
000000 0  0      FILE^LOGICALFILENAME^ADDR = 34,
000000 0  0      FILE^FNUM^ADDR            = 35,
000000 0  0      FILE^ERROR^ADDR           = 36,
000000 0  0      FILE^USERFLAG^ADDR        = 37,
000000 0  0      FILE^SEQNUM^ADDR          = 38,
000000 0  0      FILE^FILEINFO             = 39,
000000 0  0      FILE^CREATED              = 40,
000000 0  0      FILE^FNUM                 = 41,
000000 0  0      FILE^SEQNUM               = 42,
000000 0  0      FILE^ASSIGNMASK1          = 43,                               !D01
000000 0  0      FILE^ASSIGNMASK2          = 44,                               !D01
000000 0  0      FILE^FWDLINKFCB           = 45,                               !D01
000000 0  0      FILE^BWDLINKFCB           = 46,                               !D01
000000 0  0      !
000000 0  0      SET^CHECKSUM              = 47,                               !D01
000000 0  0      !
000000 0  0      FILE^OPENERSPID^ADDR      = 48,                               !D01
000000 0  0      !
000000 0  0      SET^SYSTEMMESSAGESMANY    = 49,                               !E03
000000 0  0      !
000000 0  0      FILE^FCB^ADDR             = 50,                               !B00
000000 0  0      !
000000 0  0      MAX^OPERATION             = 50,                               !B00
000000 0  0      !
000000 0  0      FILE^FILENAME             = ASSIGN^FILENAME         + 256,
000000 0  0      FILE^LOGICALFILENAME      = ASSIGN^LOGICALFILENAME  + 256,
000000 0  0      FILE^OPENACCESS           = ASSIGN^OPENACCESS       + 256,
```

```
000000 0  0       FILE^OPENEXCLUSION        = ASSIGN^OPENEXCLUSION       + 256,
000000 0  0       FILE^RECORDLEN            = ASSIGN^RECORDLENGTH        + 256,
000000 0  0       FILE^FILECODE             = ASSIGN^FILECODE            + 256,
000000 0  0       FILE^PRIEXT               = ASSIGN^PRIMARYEXTENTSIZE   + 256,
000000 0  0       FILE^SECEXT               = ASSIGN^SECONDARYEXTENTSIZE + 256,
000000 0  0       FILE^BLOCKBUFLEN          = ASSIGN^BLOCKLENGTH         + 256,
000000 0  0       FILE^DUPFILE              = SET^DUPFILE                + 256,
000000 0  0       FILE^SYSTEMMESSAGES       = SET^SYSTEMMESSAGES         + 256,
000000 0  0       FILE^OPENERSPID           = SET^OPENERSPID             + 256,
000000 0  0       FILE^RCVUSEROPENREPLY     = SET^RCVUSEROPENREPLY       + 256,
000000 0  0       FILE^RCVOPENCNT           = SET^RCVOPENCNT             + 256,
000000 0  0       FILE^RCVEOF               = SET^RCVEOF                 + 256,
000000 0  0       FILE^USERFLAG             = SET^USERFLAG               + 256,
000000 0  0       FILE^ABORT^XFERERR        = SET^ABORT^XFERERR          + 256,
000000 0  0       FILE^PRINT^ERR^MSG        = SET^PRINT^ERR^MSG          + 256,
000000 0  0       FILE^READ^TRIM            = SET^READ^TRIM              + 256,
000000 0  0       FILE^WRITE^TRIM           = SET^WRITE^TRIM             + 256,
000000 0  0       FILE^WRITE^FOLD           = SET^WRITE^FOLD             + 256,
000000 0  0       FILE^WRITE^PAD            = SET^WRITE^PAD              + 256,
000000 0  0       FILE^CRLF^BREAK           = SET^CRLF^BREAK             + 256,
000000 0  0       FILE^PROMPT               = SET^PROMPT                 + 256,
000000 0  0       FILE^ERRORFILE            = SET^ERRORFILE              + 256,
000000 0  0       FILE^PHYSIOOUT            = SET^PHYSIOOUT              + 256,
000000 0  0       FILE^LOGIOOUT             = SET^LOGIOOUT               + 256,
000000 0  0       FILE^COUNTXFERRED         = SET^COUNTXFERRED           + 256,
000000 0  0       FILE^ERROR                = SET^ERROR                  + 256,
000000 0  0       FILE^BREAKHIT             = SET^BREAKHIT               + 256,
000000 0  0       FILE^TRACEBACK            = SET^TRACEBACK              + 256,
000000 0  0       FILE^CHECKSUM             = SET^CHECKSUM               + 256,      !D01
000000 0  0       FILE^SYSTEMMESSAGESMANY   = SET^SYSTEMMESSAGESMANY     + 256;      !E03
000000 0  0   ?SECTION  ERROR^DEFS
000000 0  0   !
000000 0  0   ! sio procedure errors.
000000 0  0   !
000000 0  0   LITERAL
000000 0  0      SIOERR^INVALIDPARAM      = 512, ! parameter is invalid.
000000 0  0      SIOERR^MISSINGFILENAME   = 513, ! filename not supplied.
000000 0  0      SIOERR^DEVNOTSUPPORTED   = 514, ! device not supported.
000000 0  0      SIOERR^INVALIDACCESS     = 515, ! access mode incompatible with
000000 0  0                                      ! device.
000000 0  0      SIOERR^INVALIDBUFADDR    = 516, ! buffer address not in lower 32k.
000000 0  0      SIOERR^INVALIDFILECODE   = 517, ! file code of file does not match assigned
000000 0  0                                      ! file code.
000000 0  0      SIOERR^BUFTOOSMALL       = 518, ! buffer to small for edit write
000000 0  0                                      ! (ie., less than 1024 bytes) or buffer
000000 0  0                                      ! not sufficient for record length.
000000 0  0      SIOERR^INVALIDBLKLENGTH  = 519, ! assign block length > block buffer length.
000000 0  0      SIOERR^INVALIDRECLENGTH  = 520, ! record length = 0 or record length >
000000 0  0                                      ! maxrecordlength of OPEN^FILE or
000000 0  0                                      ! record length for $RECEIVE file < 14
000000 0  0                                      ! or record length > 254 and variable
000000 0  0                                      ! records specified
000000 0  0      SIOERR^INVALIDEDITFILE   = 521, ! edit file is invalid.
000000 0  0      SIOERR^FILEALREADYOPEN   = 522, ! OPEN^FILE called for file already open.
000000 0  0      SIOERR^EDITREADERR       = 523, ! edit read error.
000000 0  0      SIOERR^FILENOTOPEN       = 524, ! file not open.
000000 0  0      SIOERR^ACCESSVIOLATION   = 525, ! access not in effect for requested
```

```
198.   000000 0  0                                        ! operation.
199.   000000 0  0        SIOERR^NOSTACKSPACE     = 526,  ! insufficient stack space for temporary
200.   000000 0  0                                        ! buffer allocation.
201.   000000 0  0        SIOERR^BLOCKINGREQD     = 527,  ! block buffer required for nowait fold
202.   000000 0  0                                        ! or pad.
203.   000000 0  0        SIOERR^EDITDIROVERFLOW  = 528,  ! edit write directory overflow.
204.   000000 0  0        SIOERR^INVALIDEDITWRITE = 529,  ! write attempted after directory has been
205.   000000 0  0                                        ! written.
206.   000000 0  0        SIOERR^INVALIDRECVWRITE = 530,  ! write to $RECEIVE does not follow read.
207.   000000 0  0        SIOERR^CANTOPENRECV     = 531,  ! can't open $RECEIVE for break monitoring.
208.   000000 0  0        SIOERR^IORESTARTED      = 532,  ! nowait io restarted.
209.   000000 0  0        SIOERR^INTERNAL         = 533,  ! internal screwup.
210.   000000 0  0        SIOERR^CHECKSUMCOMM     = 534,  ! common FCB checksum error.          D01
211.   000000 0  0        SIOERR^CHECKSUM         = 535;  ! file FCB checksum error.            D01
 33.   000000 0  0   ?        SOURCE objfmt
Source file:  [1]  $EM1.T9621C00.OBJFMT  17DEC86 - 14:54:28

  2.   000000 0  0   !
  3.   000000 0  0   ! Object File Format
  4.   000000 0  0   !
  5.   000000 0  0   ! The object file (alias "program file") format has been revised and
  6.   000000 0  0   ! extended, retaining the major data structures needed by outside users
  7.   000000 0  0   ! while adding the new data structures required for Binder and Inspect.
  8.   000000 0  0   ! The format consists of a fixed position directory block, followed by
  9.   000000 0  0   ! information blocks, which can vary in position and (possibly) length.
 10.   000000 0  0   ! The information contained in the directory block is limited to that
 11.   000000 0  0   ! required by the system loader plus pointers to other directories to
 12.   000000 0  0   ! minimize the overhead of loading an object file and its associated
 13.   000000 0  0   ! library.
 14.   000000 0  0   !
 15.   000000 0  0   ! A description of the general format of the file is given here.
 16.   000000 0  0   !
 17.   000000 0  0   ! Most users will gain access to the information contained within the
 18.   000000 0  0   ! object file by querying a Binder interface.
 19.   000000 0  0   !
 20.   000000 0  0   ! All information needed by the operating systems, i.e.  code image,
 21.   000000 0  0   ! data image, directory block, fixup lists, etc., must be contained
 22.   000000 0  0   ! in the first extent of an object file.  The object file may
 23.   000000 0  0   ! contain up to 16 extents.  These additional extents (1-15) will
 24.   000000 0  0   ! contain Inspect's symbol table, and the Binder region.
 25.   000000 0  0   !
 26.   000000 0  0
 27.   000000 0  0   !
 28.   000000 0  0   ! Public Regions
 29.   000000 0  0   !
 30.   000000 0  0   ! The "public" regions are those whose format is known and accessible
 31.   000000 0  0   ! outside of the PDT project.  These regions may be accessed directly by
 32.   000000 0  0   ! any Tandem standard software, although most users should use the
 33.   000000 0  0   ! Binder server process instead of their own code to access them.
 34.   000000 0  0   !
 35.   000000 0  0   ! These regions include the Object File Directory Block, the External
 36.   000000 0  0   ! Procedure Identifier List and its associated fixup list, and the
 37.   000000 0  0   ! Internal Procedure Identifier and fixup lists.  These regions (with
 38.   000000 0  0   ! the exception of the Directory Block) are unchanged in format from the
 39.   000000 0  0   ! pre PDT object file.  The Binder will not use these regions for the
 40.   000000 0  0   ! binding process, but will maintain them for external users.
 41.   000000 0  0   !
```

```
000000 0  0
000000 0  0   !
000000 0  0   ! Object File Directory Block
000000 0  0   !
000000 0  0   ! The object file directory block is a page block of fixed format
000000 0  0   ! that contains pointers to the other blocks included in the object
000000 0  0   ! file.  It always is located at file position 0 of the object file,
000000 0  0   ! and all addresses contained in it are byte file offsets.  Its
000000 0  0   ! contents are as follows:
000000 0  0   !
000000 0  0   STRUCT  Object^File^Header^Def(*);
000000 0  0     BEGIN
000000 0  1     INT(32) EPIL^addr;        ! 0:Address of the external procedure identifier list
000000 0  1     INT(32) EPFL^addr;        ! 2:Address of the external procedure fixup list
000000 0  1     INT(32) IPIL^addr;        ! 4:Address of the internal procedure identifier list
000000 0  1     INT(32) IPFL^addr;        ! 6:Address of the internal procedure fixup list
000000 0  1     INT(32) GCSFL^addr;       ! 8:Address of the global code string fixup list
000000 0  1     INT(32) GCWFL^addr;       !10:Address of the global code word fixup list
000000 0  1     INT(32) data^area^addr;   !12:Address of the data area image
000000 0  1     INT(32) code^area^addr;   !14:Address of the code image
000000 0  1     INT(32) IPIL^main;        !16:Address of ipil entry for MAIN entry point
000000 0  1     INT     EPIL^length;      !18:w.Length of external procedure identifier list
000000 0  1     INT     EPFL^length;      !19:w.Length of external procedure fixup list
000000 0  1     INT     IPIL^length;      !20:w.Length of the internal procedure id list
000000 0  1     INT     IPFL^length;      !21:w.Length of the internal procedure fixup list
000000 0  1     INT     GCSFL^length;     !22:w.Length of the global code string fixup list
000000 0  1     INT     GCWFL^length;     !23:w.Length of the global code word fixup list
000000 0  1     INT     data^area^length;!24:w.Length of data area image
000000 0  1     INT     code^area^length;!25:w.Length of code area image
000000 0  1     INT     PCRIEV^PEP^size;  !26:P/C/R/I/E/new version flag/PEP size
000000 0  1     INT     initial^P;        !27:Initial P value
000000 0  1     INT     num^nonpriv;      !28:Number of non-privileged procedures
000000 0  1     INT     num^callable;     !29:Number of callable procedures
000000 0  1     INT     num^privileged;   !30:Number of privileged procedures
000000 0  1     INT     resident^size;    !31:w.Size of resident code
000000 0  1     INT     initial^L;        !32:Initial L value
000000 0  1     INT     num^data^pages;   !33:Number of data pages required for execution
000000 0  1     INT     global^code^size;!34:w.length of global read-only data
000000 0  1     INT     object^version;   !35:Object file version/object file creator number
000000 0  1     FILLER  14;               !36:Unused, must be zero
000000 0  1     INT     XEP^flag;         !43:XEP flag in bit zero; rest of word unused/MBZ
000000 0  1     FILLER  20;               !44:Unused, must be zero
000000 0  1     INT(32) userlib^extent;   !54 Address of first extent of code on 1.5 UL file
000000 0  1     INT     userlib^mod[0:2];!56:Timestamp of last modification to 1.5 UL file
000000 0  1     INT     userlib^name[0:11];!59:Internal file name of 1.5 UL file
000000 0  1     FILLER  6;                !71:Reserved, must be zero
000000 0  1     INT     data^bitmap[0:3];!74:Data page bit map (bit set if page is present)
000000 0  1     FILLER  2;                !78:Reserved, must be zero (1.5 segment limit)
000000 0  1     INT(32) binder^addr;      !79:Address of Binder region
000000 0  1     INT(32) inspect^addr;     !81:Address of Inspect region
000000 0  1     INT(32) binder^length;    !83:Length of Binder region
000000 0  1     INT(32) inspect^length;   !85:Length of Inspect region
000000 0  1     INT     CPU^version;      !87:CPU version required (bit 0=1.1, 1=1.5, 2=TXP)
000000 0  1     INT     language^mask;    !88:bit 0=tal,1=cobol,2=fortran
000000 0  1     INT     debug^flags;      !89:bit 0=inspect vs. debug,bit 1=save on abend
000000 0  1                               !   bit 2=COVER
000000 0  1     INT     binder^timestamp[0:2];!90:Time of object file construction
```

```
000000 0  1    INT(32) ESIL^addr;        !93:Address of first ESIL structure              A02a
000000 0  1    INT     ESIL^length;      !95:Word length of total ESIL structures         A02a
000000 0  1    INT(32) CSIL^addr;        !96:Address of first CSIL structure              A03w
000000 0  1    INT     CSIL^length;      !98:Word length of total CSIL structures         A03w
000000 0  1    INT     Initial^Space;    !99:Code segment number that has the MAIN proc   A03w
000000 0  1    INT     Process^Subtype;  !100:Process subtype, 1-63, 0=no subtype        A03aa
000000 0  1    INT     Ext^Data;         !101:15=FORTRAN,14=C,13=PASCAL                   C00p
000000 0  1    INT(32) IPIL^length^d;    !102:Double word for larger IPIL w. length       A03w
000000 0  1    INT(32) IPFL^length^d;    !104:Double word for larger IPFL w. length       A03w
000000 0  1    INT     object^flags;     !106:bit 0=no fixups,1=no MAIN,2=undef data      C00e
000000 0  1                              !         3=unresolved data reference to code   C0013
000000 0  1    INT     minimum^GUARDIAN^version;!107:0=>no restrict,or TOSVERSION needed C00n
000000 0  1    INT(32) RTDUL^addr;       !108:Address of run-time data unit list          B30a
000000 0  1    INT(32) RTDUL^length;     !110:Length of run-time data unit list           B30a
000000 0  1    FILLER  288;              !124:Reserved, must be zero
000000 0  1    END;
000000 0  0
000000 0  0  DEFINE  object^header^P = PCRIEV^PEP^size.<0>#,
000000 0  0          object^header^C = PCRIEV^PEP^size.<1>#,
000000 0  0          object^header^R = PCRIEV^PEP^size.<2>#,
000000 0  0          object^header^I = PCRIEV^PEP^size.<3>#,
000000 0  0          object^header^E = PCRIEV^PEP^size.<4>#,
000000 0  0          object^header^V = PCRIEV^PEP^size.<5>#,
000000 0  0          object^header^PEP^size = PCRIEV^PEP^size.<7:15>#;
000000 0  0
000000 0  0  DEFINE  object^flags^no^fixups  = object^flags.<0>#,                        !C00e
000000 0  0          object^flags^no^main    = object^flags.<1>#,                        !B301
000000 0  0          object^flags^undef^data = object^flags.<2>#,                        !B301
000000 0  0          object^flags^unres^data^ref = object^flags.<3>#;                   !C0013
000000 0  0
000000 0  0  DEFINE  FORTRAN^Ext^Data = Ext^Data.<15>#,                                  !C00p
000000 0  0          C^Ext^Data = Ext^Data.<14>#,                                        !C00p
000000 0  0          PASCAL^Ext^Data = Ext^Data.<13>#;                                   !C00p
000000 0  0
000000 0  0  !
000000 0  0  ! There are 21 words (and 2 partial words) unused and unavailable for
000000 0  0  ! future expansion since they have prior definitions attached to them.
000000 0  0  !
000000 0  0  ! The reader should note that all compiler-dependent items have been
000000 0  0  ! removed from the header, since this information (in a more complete
000000 0  0  ! form) will reside in the Binder region and is inappropriate in
000000 0  0  ! the header of a mixed language object file.
000000 0  0  !
000000 0  0  ! Word 26 contains a copy of the main procedure's program flags.
000000 0  0  ! P=1 if the main is a privileged mode procedure; C=1 if the main
000000 0  0  ! procedure is callable.  R, I, and E are retained in the object
000000 0  0  ! file for historical reasons.  If these bits are to be used for
000000 0  0  ! any other reasons the operating systems group should be
000000 0  0  ! consulted.  Bit 5 is the flag to determine whether the object
000000 0  0  ! file is in old or new format.  No old format file will have a
000000 0  0  ! non-zero bit in that position in that word.  Word 26 has the same
000000 0  0  ! format as in earlier object file formats, except for bit 5.
000000 0  0  !
000000 0  0  ! The cpu version flag in word 87 will insure that certain 1.5 object
000000 0  0  ! files are not executed on 1.1 systems and vice versa.  Non privileged
000000 0  0  ! 1.1 code will execute correctly in the user code map on the 1.5,
000000 0  0  ! and non-privileged 1.5 code (possibly) won't execute correctly on
```

```
000000 0  0   ! 1.1 systems.  Privileged code, however, must execute only in the
000000 0  0   ! proper cpu.  As other cpu types are defined, values for them will
000000 0  0   ! be added to the legal ones accepted in the flag word.  A cpu version
000000 0  0   ! flag of zero means the program should run on all cpu versions.
000000 0  0   !
000000 0  0   ! The high order bit of word 43 must be set to 1 if the Binder has
000000 0  0   ! reserved the space for the XEP in the code space image.  The rest
000000 0  0   ! of the word is unused and must be zero.
000000 0  0   !
000000 0  0   ! The areas marked for use by the 1.5 operating system must be left
000000 0  0   ! zero.  The system loader will fill in the proper values at
000000 0  0   ! NEWPROCESS time.  The remainder of the sector must be left as
000000 0  0   ! zeros.
000000 0  0
000000 0  0   !
000000 0  0   ! Code Image
000000 0  0   !
000000 0  0   ! The file address of the code image is given (in bytes) by the header
000000 0  0   ! words 14-15.  The length of the area (in words) is given by word 25.
000000 0  0   !
000000 0  0   ! The code area is composed of four regions as follows:
000000 0  0   !
000000 0  0   ! 1. Starting at code address 0 is the PEP, or Procedure Entry Point
000000 0  0   !    Table.  it contains the addresses of the entry points of every
000000 0  0   !    procedure contained within the code space.  These entry points are
000000 0  0   !    ordered into three clases:  nonprivileged, privileged but callable
000000 0  0   !    by nonprivileged code, and privileged procedures which are only
000000 0  0   !    callable by privileged code.  The PEP format is defined in
000000 0  0   !    the System Description Manual.
000000 0  0   !      A procedure located within the code space is called by a
000000 0  0   !    PCAL instruction which specifies an index in the PEP.  That
000000 0  0   !    location contains the entry point of the procedure being
000000 0  0   !    called.  If the caller runs in privileged mode, no checks are
000000 0  0   !    made and the procedure called runs in privileged mode.  If the
000000 0  0   !    caller is not in privileged mode, word 0 is examined to
000000 0  0   !    determine if the program is calling a privileged procedure.
000000 0  0   !    If the entry point location is less than the number contained
000000 0  0   !    in word 0, it is calling a nonprivileged procedure.
000000 0  0   !    Otherwise, word 1 is examined to determine if it is calling an
000000 0  0   !    uncallable procedure.  If it is, an Instruction Failure
000000 0  0   !    interrupt takes place.  If not, the call takes place and the
000000 0  0   !    procedure runs in privileged mode.
000000 0  0   !
000000 0  0   ! 2. Global P-relative arrays (read-only data) are allocated after
000000 0  0   !    the PEP tables.  These arrays remain resident throughout the
000000 0  0   !    execution of the program, if the program has any resident
000000 0  0   !    procedures.
000000 0  0   !
000000 0  0   ! 3. The procedure code follows the global P-relative arrays
000000 0  0   !    immediately.  The procedure code must be ordered with all
000000 0  0   !    resident code preceding nonresident code.  Otherwise, the
000000 0  0   !    non-resident code preceding the resident code would become
000000 0  0   !    resident.
000000 0  0   !
000000 0  0   ! 4. (The following is documented here for convenience only.
000000 0  0   !    Binder's only action is to reserve the space for the table.
000000 0  0   !    The format of the XEP is subject to change.) The space for the
```

```
000000 0  0  !  XEP (eXternal Entry Point table) is reserved between the last
000000 0  0  !  procedure and the end of the code area.  It must be large
000000 0  0  !  enough to provide one word per external procedure referenced
000000 0  0  !  in the code image.  It runs from the last word of the code
000000 0  0  !  image (on a page boundary) back towards the procedures. Before
000000 0  0  !  an object file is executed this space is all zeros.  The
000000 0  0  !  operating system fills in this area the first time the object
000000 0  0  !  file is executed since the last cold-load.
000000 0  0  !  The XCAL instruction is used by a program to call a procedure
000000 0  0  !  which resides in some other code space.  The instruction
000000 0  0  !  specifies a location in the caller's XEP which contains a
000000 0  0  !  label for the procedure.  This label is of the form:
000000 0  0  !
000000 0  0  !    +----+----+-------------------+--------------------------+
000000 0  0  !    | UC | UL |                   |                          |
000000 0  0  !    | SC | SL | Code segment #    | Pep number               |
000000 0  0  !    |    |    |                   |                          |
000000 0  0  !    +----+----+-------------------+--------------------------+
000000 0  0  !    0    1    2                 6 7                        15
000000 0  0  !
000000 0  0  !   where the fields are defined as follows:
000000 0  0  !
000000 0  0  !   UC/SC -- user code or system code.
000000 0  0  !
000000 0  0  !   UL/SL -- library bit.
000000 0  0  !
000000 0  0  !   Code segement # -- specifies the code segment # which contains
000000 0  0  !        the PEP for the procedure.
000000 0  0  !
000000 0  0  !   Pep number -- specifies the PEP entry in the map containing
000000 0  0  !        the procedure which has the procedure's entry point.
000000 0  0  !
000000 0  0  !  The total size of the code image must be an integral number of
000000 0  0  !  pages.
000000 0  0
000000 0  0  !
000000 0  0  !              Code Image
000000 0  0  !              __________
000000 0  0  !
000000 0  0  !    ---   +-------------------------------+     ---
000000 0  0  !     | 0: | PEP entry of first callable   |      |
000000 0  0  !     |    |     entry point               |      |
000000 0  0  !     |    +-------------------------------+      |   PEP SIZE =
000000 0  0  !     | 1: | PEP entry of first uncallable |      |    number of
000000 0  0  !     |    |         entry point           |      |    procedures + 2
000000 0  0  !     |    +-------------------------------+      |
000000 0  0  !     | 2: | Non privileged entry points   |      |
000000 0  0  !     |    |                               |      |
000000 0  0  !     |    +-------------------------------+      |
000000 0  0  !     |    |   Privileged but callable     |      |
000000 0  0  !     |    |        entry points           |      |
000000 0  0  !     |    +-------------------------------+  Resident
000000 0  0  !     |    |   Privileged but uncallable   |    size
000000 0  0  !     |    |        entry points           |      |
000000 0  0  !     |    +-------------------------------+      |
000000 0  0  !     |    |     P-relative Arrays         |      |
000000 0  0  !     |    |     (read-only data)          |      |
```

```
000000 0  0   !          |     +-------------------------------|      |
000000 0  0   !          |     |   Resident procs code space   |      |
000000 0  0   !   CODE-SIZE    |                               |      v
000000 0  0   !          |     +-------------------------------+    ------
000000 0  0   !          |     | Non-resident                  |
000000 0  0   !          |     |     procs code space          |
000000 0  0   !          |     +-------------------------------+
000000 0  0   !          |     |                               |
000000 0  0   !          |     |   filler 0's                  |
000000 0  0   !          |     +-------------------------------+
000000 0  0   !          v     |          XEP table            |
000000 0  0   !         ---    +-------------------------------+   (must be a
000000 0  0   !                                                     page boundary)
000000 0  0   !
000000 0  0   ! The code image will consist of consecutive pages of disk,
000000 0  0   ! starting on a page boundary in the file.  The last page of the
000000 0  0   ! code image will contain the external entry point table (aka
000000 0  0   ! "XEP") required for the 1.5 system.  The first page will begin
000000 0  0   ! with the PEP, with the code directly following.
000000 0  0   !
000000 0  0
000000 0  0   !
000000 0  0   ! Data Image
000000 0  0   !
000000 0  0   ! The file address of the data area is given (in bytes) by header
000000 0  0   ! words 12-13.  Its length (in words) is given by header word 24.
000000 0  0   !
000000 0  0   ! The data image (for relative segment 0) will consist of
000000 0  0   ! consecutive pages of disk, starting on a page boundary.  The
000000 0  0   ! actual storage represented will be determined from the data page
000000 0  0   ! bit map (words 74-77 of the directory).
000000 0  0
000000 0  0   !
000000 0  0   ! Data Page Bit Map
000000 0  0   !
000000 0  0   ! This bit map will be used by the loaders to build the data image
000000 0  0   ! for the object program.  This allows the data image to be
000000 0  0   ! loaded without reading uninitialized gaps.
000000 0  0   !
000000 0  0   ! The basic algorithm for loading the data image is:
000000 0  0   !    FOR each bit in the bit map, from bit zero to the bit
000000 0  0   !      corresponding to the last page required,
000000 0  0   !        IF it is set,
000000 0  0   !        THEN write the next page from the next data image page,
000000 0  0   !        ELSE write the next page with all zeros.
000000 0  0
000000 0  0   !
000000 0  0   ! Relocation Lists
000000 0  0   !
000000 0  0   ! Four lists contain sufficient information to delineate the
000000 0  0   ! procedure structure of the program file and the required external
000000 0  0   ! and internal procedures for the operating system.
000000 0  0   !
000000 0  0   ! The relocation lists are the following:
000000 0  0   !
000000 0  0   !    The external procedure identifier list and its associated
000000 0  0   !    reference (fixup) list which describe all procedure names and
```

```
000000 0  0   !   referencing locations which must be satisfied by the loader.
000000 0  0   !
000000 0  0   !   The internal procedure identifier list and its associated
000000 0  0   !   fixup list which describe the location, size, and attributes
000000 0  0   !   of all procedures.contained in the code area image, and their
000000 0  0   !   referencing locations.
000000 0  0   !
000000 0  0   ! External Procedure Identifier List
000000 0  0   !
000000 0  0   ! The External Procedure "ID" List is used only by the operating
000000 0  0   ! system in building the eXternal Entry Point (XEP) Table at the
000000 0  0   ! end of the code segment (TNS/II) or fixing up references to
000000 0  0   ! library procedures (TNS).  The format of this list is unchanged
000000 0  0   ! from the existing object file.  Each entry in the list will have
000000 0  0   ! at least one reference in code; present compilers may not check
000000 0  0   ! this.  The entries are variable length, their size depending on
000000 0  0   ! the name length.  They are sequentially allocated and sorted
000000 0  0   ! alphabetically by procedure name.
000000 0  0   !
000000 0  0   ! The name length is stored in the first byte.  It can range from 1
000000 0  0   ! to 255 characters.
000000 0  0   !
000000 0  0   !                           1 1 1 1 1 1
000000 0  0   !       0 1 2 3 4 5 6 7 8 9 0 1 2 3 4 5
000000 0  0   !      +---------------+---------------+
000000 0  0   !      | Name length   |    Name[0]    |
000000 0  0   !      |---------------+---------------|
000000 0  0   !      |    Name[1]    |    Name[2]    |
000000 0  0   !      |---------------+---------------|
000000 0  0   !      ~       .       .       .       ~
000000 0  0   !      ~       .       .       .       ~
000000 0  0   !      |---------------+---------------|
000000 0  0   !      |   Name[n-1]   |  (blank fill) |
000000 0  0   !      +---------------+---------------+
000000 0  0   !      |     Space for SEP number      |
000000 0  0   !      +-------------------------------+
000000 0  0   !      |       Number of fixups        |
000000 0  0   !      +-------------------------------+
000000 0  0   !
000000 0  0   ! The length of an entry is (name length + 2)/2 + 2 words.  The
000000 0  0   ! number of references indicates the number of fixups for this
000000 0  0   ! procedure in the external procedure fixup list.
000000 0  0   !
000000 0  0   ! There is one EPIL for every code segment.
000000 0  0
000000 0  0   !
000000 0  0   ! Internal Procedure Identifier List
000000 0  0   !
000000 0  0   ! The list is maintained in its present format only for
000000 0  0   ! the operating system use.  The same information is contained in
000000 0  0   ! the Procedure/Block Directory Structure which is used by the
000000 0  0   ! Binder, Inspect, and the compilers accessing the object file.
000000 0  0   !
000000 0  0   ! The entries in the Internal Procedure Identifier List are
000000 0  0   ! variable length, their size depending on the length of the name
000000 0  0   ! and the number of secondary entry points.  They are sequentially
000000 0  0   ! allocated and sorted alphabetically by the procedure name.
```

```
000000 0  0  !
000000 0  0  ! The name length is stored in the first byte.  It can range from 1
000000 0  0  ! to 255 characters.
000000 0  0  !
000000 0  0  !                           1 1 1 1 1 1
000000 0  0  !      0 1 2 3 4 5 6 7 8 9 0 1 2 3 4 5
000000 0  0  !     +---------------+---------------+
000000 0  0  !     | Name length   |    Name[0]    |
000000 0  0  !     |---------------+---------------|
000000 0  0  !     |    Name[1]    |    Name[2]    |
000000 0  0  !     |---------------+---------------|
000000 0  0  !     ~       .       .       .       ~
000000 0  0  !     ~       .       .       .       ~
000000 0  0  !     |---------------+---------------|
000000 0  0  !     |   Name[n-1]   |  (blank fill) |
000000 0  0  !     +---------------+---------------+
000000 0  0  !     | Procedure size (in words)     |
000000 0  0  !     +-------------------------------+
000000 0  0  !     | Base address of procedure     |
000000 0  0  !     +-------------------------------+
000000 0  0  !     | Offset from base to entry     |
000000 0  0  !     +-+-+-+-+-+-+-+-----------------+
000000 0  0  !     |P|C|R|I|E|V| |   PEP number    |
000000 0  0  !     +-+-+-+-+-+-+-+-----------------+
000000 0  0  !     | C.S. #  | Number of refs      |
000000 0  0  !     +-------------------------------+
000000 0  0  !     | Number of entry points        |  (excluding primary entry)
000000 0  0  !     +-------------------------------+
000000 0  0  !     | Byte address of entry point 1 |
000000 0  0  !     | in internal procedure id list |
000000 0  0  !     +-------------------------------+
000000 0  0  !     ~       .       .       .       ~
000000 0  0  !     ~       .       .       .       ~
000000 0  0  !     +-------------------------------+
000000 0  0  !     | Byte address of entry point n |
000000 0  0  !     | in internal procedure id list |
000000 0  0  !     +-------------------------------+
000000 0  0  !
000000 0  0  ! The length of an entry is (name length+2)/2 + 2*(# entry points)
000000 0  0  ! + 6.  Note that the length of the entry point region is twice the
000000 0  0  ! number of entry points.  If the E bit is 1, the (single) entry
000000 0  0  ! point contains the address in the internal procedure identifier
000000 0  0  ! list of the primary entry point.  If the E bit is 0, the entry
000000 0  0  ! point region contains the addresses of zero or more secondary
000000 0  0  ! entry point internal procedure identifier list entries.
000000 0  0  !
000000 0  0  ! The code segment number was added in B00 to indicate the code
000000 0  0  ! segment that the procedure resided in.
000000 0  0
000000 0  0  !
000000 0  0  ! External and internal procedure fixup lists
000000 0  0  !
000000 0  0  ! The fixup lists are composed of one or more entries in one-to-one
000000 0  0  ! correspondence with their associated identifier list entries.
000000 0  0  ! Each fixup list entry is composed of one or more P-relative
000000 0  0  ! addresses which correspond to the locations of the fixups.  The
000000 0  0  ! lengths of the fixup lists are contained in the header.  The
```

```
000000 0  0   ! length of a fixup list entry relative to a single procedure is
000000 0  0   ! the "number-of-references" word in the external procedure list
000000 0  0   ! for that procedure.  This fixup list is used by the operating
000000 0  0   ! system to fix up code to a form that is ready to execute.  Code
000000 0  0   ! is fixed up during the first attempt to execute a program file
000000 0  0   ! after a cold load.  The file label contains a word which
000000 0  0   ! indicates whether or not an object file has been fixed up since
000000 0  0   ! the last cold load.
000000 0  0   !
000000 0  0   ! For example, suppose the first three externals have three, one
000000 0  0   ! and four references, respectively.  The first three words of the
000000 0  0   ! external procedure fixup list give the locations (sorted in
000000 0  0   ! ascending order by address) of the three instructions which call
000000 0  0   ! the first external.  The fourth word of the fixup list gives the
000000 0  0   ! address of the reference to the second external, the next four
000000 0  0   ! words give the references for the third external, and so on.
000000 0  0
000000 0  0   !
000000 0  0   ! Example of identifier and fixup lists
000000 0  0   !
000000 0  0   ! The following diagram shows the first two entries in a
000000 0  0   ! hypothetical program's external identifier and external fixup
000000 0  0   ! lists.
000000 0  0   !
000000 0  0   ! The first entry describes an external named CLOSE, the second
000000 0  0   ! named CREATE.  There are three references to the first and five
000000 0  0   ! to the second.
000000 0  0   !
000000 0  0   !            Ext proc id list       Ext proc fixup list
000000 0  0   !
000000 0  0   !  -----  +-------+-------+      +-------------------+  -----
000000 0  0   !  First  |   5   |   C   |      |        204        |  References
000000 0  0   !  entry  |-------+-------|      +-------------------+  to CLOSE (3)
000000 0  0   !         |   L   |   O   |      |       1356        |
000000 0  0   !         |-------+-------|      +-------------------+
000000 0  0   !         |   S   |   E   |      |       3214        |
000000 0  0   !         +-------+-------+      +-------------------+  -----
000000 0  0   !         |       0       |      |        126        |  References
000000 0  0   !         +---------------+      +-------------------+  to CREATE (5)
000000 0  0   !         | 3 (# of fixes)|      |        514        |
000000 0  0   !  -----  +-------+-------+      +-------------------+
000000 0  0   !  Second |   6   |   C   |      |        517        |
000000 0  0   !  entry  |-------+-------|      +-------------------+
000000 0  0   !         |   R   |   E   |      |       1026        |
000000 0  0   !         |-------+-------|      +-------------------+
000000 0  0   !         |   A   |   T   |      |       2050        |
000000 0  0   !         |-------+-------|      +-------------------+  -----
000000 0  0   !         |   E   |       |                .
000000 0  0   !         +-------+-------+                .
000000 0  0   !         |       0       |                .
000000 0  0   !         +---------------+
000000 0  0   !         | 5 (# of fixes)|
000000 0  0   !  -----  +---------------+
000000 0  0   !                 .
000000 0  0   !                 .
000000 0  0   !                 .
000000 0  0   !
```

```
000000 0  0   !
000000 0  0
000000 0  0   !
000000 0  0   ! CSIL
000000 0  0   !
000000 0  0   !     CSIL stands for Code Space Information List.  It is a new list
000000 0  0   ! in the object file format, and will be added for the BASTOGNE project.
000000 0  0   ! The CSIL structure describes one element in the CSIL list.  The CSIL
000000 0  0   ! list contains one element for each code space in the object file.  A
000000 0  0   ! diagram of the CSIL is shown below.
000000 0  0   !
000000 0  0   !
000000 0  0   !
000000 0  0   !                    _____________________________
000000 0  0   !                   |__  Address of code        __|
000000 0  0   !                   |    space in object file     |
000000 0  0   !                   |                             |
000000 0  0   !                   |_____________________________|
000000 0  0   !                   |__  Address of EPIL        __|
000000 0  0   !                   |    for this space           |
000000 0  0   !                   |                             |
000000 0  0   !                   |_____________________________|
000000 0  0   !                   |__  Address of EPFL        __|
000000 0  0   !                   |    for this space           |
000000 0  0   !                   |_____________________________|
000000 0  0   !                   |                             |
000000 0  0   !                   |    word size of space       |
000000 0  0   !                   |_____________________________|
000000 0  0   !                   |                             |
000000 0  0   !                   |    word length of EPIL      |
000000 0  0   !                   |_____________________________|
000000 0  0   !                   |                             |
000000 0  0   !                   |    word length of EPFL      |
000000 0  0   !                   |_____________________________|
000000 0  0   !                   |                             |
000000 0  0   !                   |    space number             |
000000 0  0   !                   |_____________________________|
000000 0  0   !                   |                             |
000000 0  0   !                   |    P/C/R/PEP size           |
000000 0  0   !                   |_____________________________|
000000 0  0   !                   |                             |
000000 0  0   !                   |    Size of resident code    |
000000 0  0   !                   |_____________________________|
000000 0  0   !                   |                             |
000000 0  0   !                   |    Num nonpriv procs        |
000000 0  0   !                   |_____________________________|
000000 0  0   !                   |                             |
000000 0  0   !                   |    Num of callable procs    |
000000 0  0   !                   |_____________________________|
000000 0  0   !                   |                             |
000000 0  0   !                   |    Num of privileged procs  |
000000 0  0   !                   |_____________________________|
000000 0  0   !                   |__                         __|
000000 0  0   !                   |__                         __|
000000 0  0   !                   |__                         __|
000000 0  0   !                   |__                         __|
000000 0  0   !                   |__                         __|
```

```
000000 0  0    !                  |__      Spare data             __|
000000 0  0    !                  |__      fourteen bytes         __|
000000 0  0    !                  |__      initially 0            __|
000000 0  0    !                  |__                             __|
000000 0  0    !                  |__                             __|
000000 0  0    !                  |__                             __|
000000 0  0    !                  |__                             __|
000000 0  0    !                  |__                             __|
000000 0  0    !                  |_________________________________|
000000 0  0    !
000000 0  0    !                               CSIL
000000 0  0    !
000000 0  0    !                        Code Space Information List
000000 0  0    !
000000 0  0    ?         SOURCE pdtproto ( pdt^struct^templates )
Source file:  [1]  $EMI.S7001C00.PDTPROTO  22DEC86 - 10:30:32
000000 0  0    ?SECTION PDT^STRUCT^TEMPLATES
000000 0  0
000000 0  0          ! Structure templates for structures used as arguments to the
000000 0  0          ! PCI routines
000000 0  0
000000 0  0          DEFINE storage^info^DEFINE =
000000 0  0            BEGIN
000000 0  0            INT      storage^type;       ! common DESCRIBE type code (must         !
000000 0  0                                         ! be a member of PDT^DESC^types)          !
000000 0  0            INT      element^len;        ! length of an element (in bits)          !
000000 0  0            STRUCT   unit^size;          ! length of a unit (in elements)          !
000000 0  0              BEGIN
000000 0  0              STRING  variable^flags;
000000 0  0              STRING  compile^constant; ! 0->value is a unique id,                 !
000000 0  0              INT(32) value;             ! 1->value is a constant                  !
000000 0  0              END;
000000 0  0            INT      scale^factor;       ! digits to the right of dec. point       !
000000 0  0            END #;
000000 0  0
000000 0  0          STRUCT storage^info(*);
000000 0  0            storage^info^DEFINE;
000000 0  0
000000 0  0          DEFINE pattrib^DEFINE =
000000 0  0            BEGIN
000000 0  0            STRING   res^flag;           ! non-zero if proc is RESIDENT            !
000000 0  0            STRING   int^flag;           ! non-zero if proc is INTERRUPT           !
000000 0  0            STRING   private^flag;       ! non-zero if proc is PRIVATE             !
000000 0  0            END #;
000000 0  0
000000 0  0          STRUCT pattrib(*);             ! procedure attribute table               !
000000 0  0            pattrib^DEFINE;
000000 0  0
000000 0  0          DEFINE eattrib^flags^DEFINE =                                          !A01
000000 0  0            STRING   priv^flag;          ! non-zero if entry is PRIV               !
000000 0  0            STRING   call^flag;          ! non-zero if entry is CALLABLE           !
000000 0  0            STRING   var^or^ext^flag;    ! 1 => variable, 2 => extensible      A01!
000000 0  0            STRING   main^flag;          ! non-zero if entry is MAIN               !
000000 0  0            #;
000000 0  0
000000 0  0          DEFINE eattrib^DEFINE =
```

```
000000 0  0        BEGIN
000000 0  0        eattrib^flags^DEFINE                                                          !A01
000000 0  0        INT      params^when^var;    ! # of parameters when proc was var    A01!
000000 0  0        END #;
000000 0  0
000000 0  0      STRUCT eattrib(*);             ! entry point attribute table              !
000000 0  0        eattrib^DEFINE;
000000 0  0
000000 0  0      DEFINE param^id^list^DEFINE =
000000 0  0        BEGIN
000000 0  0        INT      param^mode;         ! member of PDT^param^modes ordinal        !
000000 0  0        INT(32) param^id;            ! unique id of formal parameter            !
000000 0  0        END #;
000000 0  0
000000 0  0      STRUCT param^id^list(*);       ! a repeated structure . . .               !
000000 0  0        param^id^list^DEFINE;
000000 0  0
000000 0  0      DEFINE dimension^term^DEFINE =
000000 0  0        BEGIN
000000 0  0        STRING  lower^constant;      ! 0->lower^bound is unique id,            !
000000 0  0                                     ! 1->lower^bound is a constant            !
000000 0  0        STRING  upper^constant;      ! likewise                                !
000000 0  0        INT(32) lower^bound;         ! Lower bound, for checking               !
000000 0  0        INT(32) upper^bound;         ! Upper bound                             !
000000 0  0        END #;
000000 0  0
000000 0  0      STRUCT  dimension^term(*);
000000 0  0        dimension^term^DEFINE;
000000 0  0
000000 0  0      DEFINE ref^list^DEFINE =
000000 0  0        BEGIN                        ! a repeated structure....                 !
000000 0  0        INT(32) caller;              ! unique id of referencing proc            !
000000 0  0        INT(32) offset;              ! word offset of the reference             !
000000 0  0                                     ! within that proc                         !
000000 0  0        INT      ref^type;           ! 1 => pointer (as used by DPCL),          !
000000 0  0                                     ! 0 => call instruction (XCAL,             !
000000 0  0                                     ! PCAL, LCAL, SCAL)                        !
000000 0  0        END #;
000000 0  0
000000 0  0      STRUCT ref^list(*);            ! offsets and types for externals          !
000000 0  0        ref^list^DEFINE;
000000 0  0
000000 0  0      DEFINE param^info^list^DEFINE =
000000 0  0        BEGIN
000000 0  0        INT      param^mode;         ! member of PDT^param^modes ordinal        !
000000 0  0        STRUCT  param^storage;       ! type information                         !
000000 0  0          storage^info^DEFINE;
000000 0  0        END #;
000000 0  0
000000 0  0      STRUCT param^info^list(*);     ! a repeated structure . . .               !
000000 0  0        param^info^list^DEFINE;
000000 0  0
000000 0  0      DEFINE  binder^listing^DEFINE =
000000 0  0        BEGIN
000000 0  0        FILLER  1;
000000 0  0        STRING  alpha;               ! initially on                             !
000000 0  0        STRING  loc;                 ! initially off                            !
```

```
 456.    000000 0  0          STRING  xref;               ! initially off                    !
 457.    000000 0  0          END #;
 458.    000000 0  0
 459.    000000 0  0        STRUCT  binder^listing(*);
 460.    000000 0  0          binder^listing^DEFINE;
 461.    000000 0  0
  35.    000000 0  0    ?     SOURCE tblfmt
Source file:  [1]  $EM1.T9621C00.TBLFMT  17DEC86 - 14:57:44
   2.    000000 0  0    ?SECTION BINDER^DECLARATIONS
   3.    000000 0  0    !
   4.    000000 0  0    ! BINDER Table Region (Object File)
   5.    000000 0  0    !
   6.    000000 0  0    ! The Binder portion of the object file will have a header and
   7.    000000 0  0    ! five major tables.  These tables are the Procedure Information Table (PIT),
   8.    000000 0  0    ! the Entry Point Table (EPT), the Data Block Information Table
   9.    000000 0  0    ! (DBIT), the Undefined Data Block Information Table (UDBIT), and the
  10.    000000 0  0    ! Run-Time Data Unit Information Table (RTDUT).  Each table has an
  11.    000000 0  0    ! associated hash table.
  12.    000000 0  0
  13.    000000 0  0    !
  14.    000000 0  0    ! Table Descriptions (Object File)
  15.    000000 0  0    !
  16.    000000 0  0    ! Pointers to entries in the following three tables are byte offsets
  17.    000000 0  0    ! from the start of the table. Pointers to other portions of the
  18.    000000 0  0    ! file, i.e. code blocks and data blocks, are byte offsets from
  19.    000000 0  0    ! the start of the file.
  20.    000000 0  0    !
  21.    000000 0  0
  22.    000000 0  0    !
  23.    000000 0  0    ! Structure for references to data blocks.
  24.    000000 0  0    !
  25.    000000 0  0    DEFINE  reference^offset^DEFINE =
  26.    000000 0  0      BEGIN
  27.    000000 0  0      INT(32) referencing^offset;        ! word offset                    !
  28.    000000 0  0      INT(32) offset^referenced;         ! word offset                    A02
  29.    000000 0  0      INT     reference^flags;
  30.    000000 0  0      END #,
  31.    000000 0  0            which^offset = reference^flags.<0> #,
  32.    000000 0  0            code^fixup = reference^flags.<1> #,                         !A03v
  33.    000000 0  0            reference^type = reference^flags.<2:15> #;       ! PDT^indirect^types!
  34.    000000 0  0    !
  35.    000000 0  0    ! Note: which^offset is always 1 in a stored entry. See description of
  36.    000000 0  0    ! PDT^Def^Fixup.
  37.    000000 0  0    !
  38.    000000 0  0    STRUCT  reference^offset(*);
  39.    000000 0  0      reference^offset^DEFINE;
  40.    000000 0  0
  41.    000000 0  0    !
  42.    000000 0  0    ! Structure for a reference to an entry point
  43.    000000 0  0    !
  44.    000000 0  0    DEFINE  reference^entry^DEFINE =
  45.    000000 0  0      BEGIN
  46.    000000 0  0      INT(32) referencing^offset;        ! word offset                      !
  47.    000000 0  0      INT     indirection;               ! 1->DPCL, 0->PCAL/SCAL... 2->DPCL/PUCB !
  48.    000000 0  0      END #;
  49.    000000 0  0    STRUCT  reference^entry(*);
  50.    000000 0  0      reference^entry^DEFINE;
```

```
000000 0  0
000000 0  0   !
000000 0  0   ! Common information for all blocks, internally and externally.
000000 0  0   !
000000 0  0   DEFINE common^ICL^IDL^PIT^DBIT^DEFINE =
000000 0  0     INT      compilation^timestamp[0:2];
000000 0  0     INT      language;                 ! PDT^{TAL,COBOL,FORTRAN}^Code        !
000000 0  0     INT      compatibility^level;      ! object compatibility flag           !
000000 0  0     STRING   compiler^product[0:7];
000000 0  0     INT(32)  first^word^address;       ! Base address of block in memory     A02a
000000 0  0     INT      block^modified;           ! Block has been patched              !
000000 0  0     INT      block^flags;              ! see defines below                   C00p
000000 0  0   #;
000000 0  0
000000 0  0   DEFINE  block^flags^private = block^flags.<0>#;                           !C00p
000000 0  0   DEFINE  block^flags^not^allocated = block^flags.<1>#;
000000 0  0   DEFINE  block^flags^data = block^flags.<2>#;
000000 0  0
000000 0  0   !
000000 0  0   ! I.  Procedure Information Table (PIT)
000000 0  0   !
000000 0  0   DEFINE  common^ICL^PIT^DEFINE =
000000 0  0     INT      proc^attribute;           ! R/I/NonStop (2-3 + 8)               !
000000 0  0     INT      local^storage;            ! compiler-provided                   !
000000 0  0     INT      absolute^reference;       ! 1->proc references G-absolute       !
000000 0  0     INT(32)  inspect^offset;           ! of inspect info                     !
000000 0  0     INT(32)  inspect^length;           ! in bytes                            !
000000 0  0     INT      lexical^level;            ! starts at 1                         C00p
000000 0  0   #,
000000 0  0           proc^attribute^R = proc^attribute.<2>#,
000000 0  0           proc^attribute^I = proc^attribute.<3>#,
000000 0  0           proc^attribute^NonStop = proc^attribute.<8>#,
000000 0  0           proc^attribute^512 = proc^attribute.<9>#,                        !A03ac
000000 0  0           proc^attribute^private = proc^attribute.<10>#;                   !C00p
000000 0  0
000000 0  0   STRUCT  PIT^entry^base(*);
000000 0  0     BEGIN
000000 0  1     INT(32)  total^length;             ! Length in bytes of entry in PIT (incl)!
000000 0  1     INT(32)  primary^entry;            ! offset of primary entry point in EPT  !
000000 0  1     INT(32)  block^length;             ! Length of contents of block in bytes  !
000000 0  1     INT(32)  file^offset;              ! Pointer to code block contents        !
000000 0  1     INT      source^file[ 0:11 ];      ! Internal form of source file name     !
000000 0  1     common^ICL^IDL^PIT^DBIT^DEFINE
000000 0  1     common^ICL^PIT^DEFINE
000000 0  1     STRING   block^name[0:255];        ! length in byte 0; padded to word bdy C00p
000000 0  1   ! INT(32)  own^total^length;        !! Total length of Own Block information !
000000 0  1   ! INT      own^block^count;         !! Number of repetitions of following    !
000000 0  1   ! STRUCT   own^block^information[0:-1];!!actual upper bound is own^block^count!
000000 0  1   !   BEGIN                            !
000000 0  1   !   INT(32) own^entry^length;       !! Inclusive length of entry             !
000000 0  1   !   INT(32) data^block;             !! Pointer to entry in DBIT for Own Block!
000000 0  1   !   INT      reference^count;       !! number of following references        !
000000 0  1   !   STRUCT   reference^struct[0:-1]; !! Reference offset structure           !
000000 0  1   !     reference^offset^DEFINE;       !
000000 0  1   !   END;                             !
000000 0  1   ! INT(32) global^total^length;      !! Total length of Data block information!
000000 0  1   ! STRUCT  global^block^information[0:-1]; !
```

```
000000 0  1   !   BEGIN                            !
000000 0  1   !   INT(32) global^entry^length;     !! Inclusive length of entry              !
000000 0  1   !   STRING  block^name[0:255];       !! Name of block, length in byte 0        !
000000 0  1   !   INT     reference^count;         !! number of following references         !
000000 0  1   !   STRUCT  reference^struct[0:-1];  !! Reference offset structure             !
000000 0  1   !     reference^offset^DEFINE;       !
000000 0  1   !   END;                             !
000000 0  1   ! INT(32) entry^total^length;        !! Total length of Entry point info       !
000000 0  1   ! STRUCT  entry^point^information[0:-1];!! References to entry points          !
000000 0  1   !   BEGIN                            !
000000 0  1   !   INT(32) entry^entry^length;      !! Inclusive length of entry              !
000000 0  1   !   STRING  entry^name[0:255];       !! Entry name, length in byte 0           !
000000 0  1   !   INT     external^entry;          !! 1=>proc is EXTERNAL, 0=>INTERNAL       !
000000 0  1   !   STRUCT  return^type;             !! Return type if function                !
000000 0  1   !     storage^info^DEFINE;           !
000000 0  1   !   INT     variable^or^extensible;  !! 1=>proc is VARIABLE                    !
000000 0  1   !   INT     parameter^count;         !
000000 0  1   !   STRUCT  parameter^list[0:-1];    !! actual upper bound is parameter^count !
000000 0  1   !     param^info^list^DEFINE;        !
000000 0  1   !   INT     reference^count;         !
000000 0  1   !   STRUCT  reference^struct[0:-1];  !! actual upper bound is reference^count !
000000 0  1   !     reference^entry^DEFINE;        !
000000 0  1   !   END;                             !
000000 0  1   ! INT(32) rtdu^total^length;         !! Total length of RTDU block information!
000000 0  1   ! STRUCT  rtdu^block^information[0:-1]; !
000000 0  1   !   BEGIN                            !
000000 0  1   !   STRING  block^name[0:31];        !! Name of block, length in byte 0        !
000000 0  1   !   END;                             !
000000 0  1     END;
000000 0  0
000000 0  0   !
000000 0  0   ! II.  Entry Point Table (EPT)
000000 0  0   !
000000 0  0   DEFINE common^IEL^EPT^DEFINE =
000000 0  0     INT     pep^number;
000000 0  0     INT     code^offset;               ! relative to start of code block        !
000000 0  0     INT     entry^attribute;           ! P/C/E/V/M/X (0,1,4,5,6,7)          A01!
000000 0  0                                        ! <11:15> is # params when proc was var !
000000 0  0     INT     parameter^count;
000000 0  0     STRUCT  return^type;               ! function return type                   !
000000 0  0       storage^info^DEFINE;
000000 0  0   #,
000000 0  0           entry^attribute^P = entry^attribute.<0>#,
000000 0  0           entry^attribute^C = entry^attribute.<1>#,
000000 0  0           entry^attribute^E = entry^attribute.<4>#,
000000 0  0           entry^attribute^V = entry^attribute.<5>#,
000000 0  0           entry^attribute^M = entry^attribute.<6>#,
000000 0  0           entry^attribute^X = entry^attribute.<7>#,                         !A01
000000 0  0           num^params^when^var = entry^attribute.<11:15>#;                   !A01
000000 0  0
000000 0  0   STRUCT  EPT^entry^base(*);
000000 0  0     BEGIN
000000 0  1     INT(32) total^length;              ! Length of entry in EPT in bytes (incl)!
000000 0  1     INT(32) next^entry;                ! next entry point for code block (EPT) !
000000 0  1     INT(32) code^block;                ! Pointer to associated code block PIT  !
000000 0  1     common^IEL^EPT^DEFINE
000000 0  1     STRING  entry^point^name[0:255];   ! length in byte 0; padded to word bdy C00p
```

```
000000 0  1   ! STRUCT  parameter^list[0:-1];       !! actual upper bound is parameter^count !
000000 0  1   !   param^info^list^DEFINE;           !
000000 0  1     END;
000000 0  0
000000 0  0   LITERAL PARAM^MAX = 29;               ! number of args to a procedure          !
000000 0  0
000000 0  0   !
000000 0  0   ! III.  Data Block Information Table (DBIT)
000000 0  0   !
000000 0  0   DEFINE  common^IDL^DBIT^DEFINE =
000000 0  0     INT      location^constraints;      ! PDT^block^relocation ordinal           !
000000 0  0     INT      address^mode;              ! PDT^address^modes ordinal              !
000000 0  0     INT      block^attributes;          ! PDT^block^attributes ordinal           !
000000 0  0     INT      block^type^code;           ! PDT^block^types ordinal/special code   !
000000 0  0     INT      read^only;                 ! 1->read-only, 0->read-write            !
000000 0  0     INT      buf^size;                  ! length of #HIGHBUF, words              !
000000 0  0     INT      rqtb^size;                 ! length of #RQTB, words                 !
000000 0  0     ! added with format^version 9      !
000000 0  0     INT(32) inspect^offset;             ! of inspect info                        !
000000 0  0     INT(32) inspect^length;             ! in bytes                               !
000000 0  0   #,
000000 0  0           block^type = block^type^code.<14:15> #,         ! PDT^block^types   !
000000 0  0           special^code = block^type^code.<0:13> #;
000000 0  0
000000 0  0   STRUCT  DBIT^entry^base(*);
000000 0  0     BEGIN
000000 0  1     INT(32) total^length;               ! Length of entry in DBIT in bytes       !
000000 0  1     INT(32) code^block;                 ! PIT entry if own block                 !
000000 0  1     INT(32) block^length;               ! Length of contents of block in bytes   !
000000 0  1     INT(32) file^offset;                ! Pointer to data block contents         !
000000 0  1     INT      source^file[ 0:11 ];       ! Internal form of source file name      !
000000 0  1     common^ICL^IDL^PIT^DBIT^DEFINE
000000 0  1     common^IDL^DBIT^DEFINE
000000 0  1     STRING  block^name[0:255];          ! length in byte 0; padded to word bdy A02e
000000 0  1   ! INT(32) ref^total^length;          !! Total length of reference information !
000000 0  1   ! STRUCT  ref^block^information[0:-1];!!actual upper bound is ref^block^count!
000000 0  1   !   BEGIN                             !
000000 0  1   !   INT(32) ref^entry^length;        !! Inclusive length of entry              !
000000 0  1   !   STRING  ref^block^name[0:255];   !! name of referenced block               !
000000 0  1   !   INT      reference^count;        !! number of following references         !
000000 0  1   !   STRUCT   reference^struct[0:-1]; !! Reference offset structure             !
000000 0  1   !     reference^offset^DEFINE;       !
000000 0  1   !   END;                             !
000000 0  1     END;
000000 0  0
000000 0  0   !
000000 0  0   ! IV.   Undefined Data Block Information Table (UDBIT), added for C00p
000000 0  0   !
000000 0  0   STRUCT  UDBIT^entry^base(*);
000000 0  0     BEGIN
000000 0  1     INT(32) total^length;               ! Length of entry in UDBIT in bytes      !
000000 0  1     STRING  block^name[0:32];           ! length in byte 0; padded to word body !
000000 0  1     END;
000000 0  0
000000 0  0   !
000000 0  0   ! V.   Run Time Data Unit Table (UDBIT), added for C001
000000 0  0   !
```

```
000000 0  0   STRUCT  RTDU^entry^base(*);
000000 0  0     BEGIN
000000 0  1     INT(32) total^length;              ! Length of entry in RTDU in bytes      !
000000 0  1     INT(32) type;
000000 0  1     INT(32) block^length;              ! Length of contents of block in bytes  !
000000 0  1     INT(32) file^offset;               ! Pointer to rtdu block contents        !
000000 0  1     INT     source^file[ 0:11 ];       ! Internal form of source file name    . !
000000 0  1     INT     compilation^timestamp[0:2];
000000 0  1     INT     language;                  ! PDT^(TAL,COBOL,FORTRAN)^Code          !
000000 0  1     STRING  block^name[0:32];          ! length in byte 0; padded to word bdy
000000 0  1   ! INT(32) rtdu^total^length;         !! Total length of reference information !
000000 0  1   ! STRUCT  rtdu^block^information[0:-1]; !
000000 0  1   !   BEGIN                            !
000000 0  1   !   STRING  block^name[0:31];        !! Name of block, length in byte 0      !
000000 0  1   !   END;                             !
000000 0  1     END;
000000 0  0
000000 0  0   !
000000 0  0   ! Table Indexing Method
000000 0  0   !
000000 0  0   ! The above tables will be indexed by separate hash tables (one for
000000 0  0   ! each of DBIT, EPT, PIT, UDBIT, and RTDUT). The location (byte offset from
000000 0  0   ! start of the file) and length (in number of entries) of each hash table
000000 0  0   ! is stored at the start of the Binder portion of the object file.
000000 0  0   ! Each table is preceded by its hash table. The order of tables is
000000 0  0   ! DBIT, EPT, PIT, UDBIT, and RTDUT.
000000 0  0   !
000000 0  0   ! The hash tables contain pointers, offsets into their respective tables.
000000 0  0   ! Collisions are resolved by open addressing. The hash function is
000000 0  0   ! implemented by RO^Compute^Hash.
000000 0  0
000000 0  0   !
000000 0  0   ! Binder Region header structure
000000 0  0   !
000000 0  0   DEFINE  table^status^DEFINE =
000000 0  0     BEGIN
000000 0  0     INT(32) hash^location;             ! file offset of hash table             !
000000 0  0     INT(32) hash^length;               ! bytes                                 !
000000 0  0     INT(32) first^entry;               ! file offset of 1st entry in list      !
000000 0  0     INT(32) last^entry;                ! file offset of last entry in list+1   !
000000 0  0     INT(32) entry^count;               ! number of entries in list             !
000000 0  0     END #;
000000 0  0   STRUCT  table^status(*);
000000 0  0     table^status^DEFINE;
000000 0  0
000000 0  0   STRUCT  binder^header(*);
000000 0  0     BEGIN
000000 0  1     STRING  nostrip^flag;
000000 0  1     STRING  format^version;            ! object file format version number     !
000000 0  1     STRUCT  DBIT^status;
000000 0  1       table^status^DEFINE;
000000 0  1     STRUCT  EPT^status;
000000 0  1       table^status^DEFINE;
000000 0  1     STRUCT  PIT^status;
000000 0  1       table^status^DEFINE;
000000 0  1     STRUCT  UDBIT^status;
000000 0  1       table^status^DEFINE;
```

```
000000 0  1     STRUCT  RTDU^status;
000000 0  1       table^status^DEFINE;
000000 0  1     END;
000000 0  0
000000 0  0   !
000000 0  0   ! Table codes used by RO routines called by BO and BT, Inspect.
000000 0  0   !
000000 0  0   LITERAL PIT^Table = 0,
000000 0  0           DBIT^Table = 1,
000000 0  0           EPI^Table = 2,
000000 0  0           INSPECT^Table = 3,           ! RO^Fread only                    !
000000 0  0           PIT^Hash^Table = 4,          ! ...                              !
000000 0  0           DBIT^Hash^Table = 5,         ! ...                              !
000000 0  0           EPT^Hash^Table = 6,          ! ...                              !
000000 0  0           UDBIT^Table = 7, .           !                                  C00p
000000 0  0           UDBIT^Hash^Table = 8,        ! ...                              C00p
000000 0  0           RTDU^Table = 9,              !                                  C001
000000 0  0           RTDU^Hash^Table = 10;        ! ...                              C001
000000 0  0
000000 0  0   LITERAL CURRENT^FORMAT^VERSION = 14;!value in binder^header.format^version !!C00
000000 0  0
000000 0  0   !
000000 0  0   ! These two control the load factor of the hash tables in the binder region,
000000 0  0   ! which is d/m, where
000000 0  0   !   d = Object^Hash^Divisor, and
000000 0  0   !   m = Object^Hash^Multiplier.
000000 0  0   ! These constants may be changed freely.
000000 0  0   !
000000 0  0   LITERAL Object^Hash^Multiplier = 3,
000000 0  0           Object^Hash^Divisor    = 1;
000000 0  0
000000 0  0   ?SECTION BASE^DECLARATIONS
000000 0  0   STRUCT CSIL^def(*);
000000 0  0     BEGIN
000000 0  1     INT(32) code^area^addr;    ! The byte address within the
000000 0  1                                ! object file of the code blocks
000000 0  1                                ! for this code space.  The code
000000 0  1                                ! space will begin on a page
000000 0  1                                ! boundary.
000000 0  1     INT(32) EPIL^addr;         ! The byte address of the EPIL
000000 0  1                                ! for this code space.
000000 0  1     INT(32) EPFL^addr;         ! The byte address of the EPFL
000000 0  1                                ! for this code space.
000000 0  1     INT     size;              ! The word size of the code space.
000000 0  1     INT     EPIL^length;       ! The word length of the EPIL for
000000 0  1                                ! this code space.
000000 0  1     INT     EPFL^length;       ! The word length of the EPFL for
000000 0  1                                ! this code space.
000000 0  1     INT     space^number;      ! The space number of the code
000000 0  1                                ! space.
000000 0  1     INT     PCR^PEP^size;      ! Procedure attribute flags and
000000 0  1                                ! PEP size for this code space.
000000 0  1     INT     resident^pages;    ! Number of pages of resident code
000000 0  1                                ! for this code space.
000000 0  1     INT     num^nonpriv;       ! Number of non-privileged procs
000000 0  1                                ! for this code space.
000000 0  1     INT     num^callable;      ! Number of callable procs for
```

```
000000 0  1                                     ! this code space.
000000 0  1     INT      num^privileged;        ! Number of privileged procs for
000000 0  1                                     ! this code space;
000000 0  1     FILLER  14;                     ! These seven words will be used for
000000 0  1                                     ! any more information that will be
000000 0  1                                     ! needed is the CSIL structure.
000000 0  1                                     ! Initially they will be set to 0.
000000 0  1                                     ! This has been implemented to save
000000 0  1                                     ! object file version checks later if
000000 0  1                                     ! the structure should get bigger.
000000 0  1     END;
000000 0  0   !
000000 0  0   ! This structure describes one element in the ESIL list.  The ESIL list
000000 0  0   ! contains one element for each extended segment requested.  At this
000000 0  0   ! first release the list will contain only one element which describes
000000 0  0   ! the COBOL extended segment.  In future other compilers may want to
000000 0  0   ! implement more than one extended segment.
000000 0  0   !
000000 0  0   STRUCT segment^info(*);
000000 0  0     BEGIN
000000 0  1     INT(32) size;                           ! The byte size of the extended segment
000000 0  1                                             ! to be allocated.  This value is used
000000 0  1                                             ! as the 2-nd parameter in a call to
000000 0  1                                             ! ALLOCATESEGMENT.
000000 0  1
000000 0  1     INT(32) addr^in^file;                   ! The byte address within the object file
000000 0  1                                             ! of the data with which the extended
000000 0  1                                             ! segment is to be initialized.  The
000000 0  1                                             ! initialization data will begin on a
000000 0  1                                             ! page boundary.  This is the same as
000000 0  1                                             ! seg^descript[1].addr.
000000 0  1
000000 0  1     INT      id;                            ! Segment-id for all to ALLOCATESEGMENT.
000000 0  1                                             ! The Tandem reserved segment-id for
000000 0  1                                             ! COBOL is 1024.
000000 0  1
000000 0  1     INT      init^segs;                     ! Number of 64K word relative segments
000000 0  1                                             ! which this extended segment is to
000000 0  1                                             ! initialize.  Init^segs should be
000000 0  1                                             ! equal to (size/64K) + 1.
000000 0  1
000000 0  1     INT(32) more^data;                      ! This is a byte address within the
000000 0  1                                             ! object file that contains more
000000 0  1                                             ! information for the ESIL structure.
000000 0  1                                             ! This pointer will be equal to -1D
000000 0  1                                             ! when there is no extra information.
000000 0  1                                             ! This has been implemented to save
000000 0  1                                             ! object file version checks later if
000000 0  1                                             ! the structure should get bigger.
000000 0  1
000000 0  1     END;
000000 0  0
000000 0  0   STRUCT seg^descrip;
000000 0  0     BEGIN
000000 0  1     INT(32) addr;                           ! Byte address within the object file
000000 0  1                                             ! of the first page of initialization
000000 0  1                                             ! data for the extended segment x
```

```
000000 0  1                                   ! as in seg^descrip[x].  The address will
000000 0  1                                   ! be on a page boundary.
000000 0  1
000000 0  1     INT bit^map[ 0:3 ];           ! One bit per page for the 64 pages in
000000 0  1                                   ! this segment.
000000 0  1     END;
000000 0  0   ?      SOURCE dsiolib  ( inoutstuff )
Source file:  [1]  $OVER.1961BC00.DSIOLIB  010C186 - 10:02:35
000000 0  0   ?SECTION INOUTSTUFF
000000 0  0   BLOCK    INOUTSTUFF;
000000 0  0   !
000000 0  0   ! External dependencies: layouts
000000 0  0   !                         system.gpldefs
000000 0  0   !                         client program must be named
000000 0  0   !
000000 0  0   ! A global block which may be initialized by startup (openinoutstuff) and used
000000 0  0   ! by the procedures input and print (presented later).
000000 0  0   !
000000 0  0   STRUCT        .DEFAULTS ( DEFAULTS^TEMPLATE );                ! from startup msg
000010 0  0   ALLOCATE^CBS ( RUCB, COMMONFCB, 7 );
000206 0  0   ALLOCATE^FCB (       RCVFCB    , "$RECEIVE              " ); ! message queue
000302 0  0   ALLOCATE^FCB (       TERMFCB   , "        #TERM         " ); ! home term
000376 0  0   ALLOCATE^FCB (       INFCB     , "        #IN           " ); ! in file
000472 0  0   ALLOCATE^FCB (       OUTFCB    , "        #OUT          " ); ! out file
000566 0  0   ALLOCATE^FCB (       GP1FCB    , "        #GP1          " ); ! g.p. #1
000662 0  0   ALLOCATE^FCB (       GP2FCB    , "        #GP2          " ); ! g.p. #2
000756 0  0   ALLOCATE^FCB (       GP3FCB    , "        #GP3          " ); ! g.p. #3
001052 0  0
001052 0  0   ! The following pointers are used for sio file access.  Infile and outfile are
001052 0  0   ! setup by the startup procedure to point to the infcb and outfcb (startup may
001052 0  0   ! make infcb point to termfcb and/or outfcb point to infcb, to avoid duplicate
001052 0  0   ! opens).  Infile or outfile could point to other fcbs if an "obey" or "list"
001052 0  0   ! file is to be used.  To use a list file, @outfile := @listfcb; to drop a list
001052 0  0   ! file, @outfile := @outfcb .
001052 0  0   INT          .ALLFILES  =  COMMONFCB;
001052 0  0   INT          .RCVFILE   =  RCVFCB;
001052 0  0   INT          .TERMFILE  =  TERMFCB;
001052 0  0   INT          .INFILE;
001052 0  0   INT          .OUTFILE;
001052 0  0
001052 0  0   ! The following will only be true if the files are a process or terminal
001052 0  0   ! (after calling startup).
001052 0  0   DEFINE        INTERACTIVE = ( @INFILE = @OUTFILE )#;
001052 0  0
001052 0  0   ! Layouts for input and output files and their associated block buffers.
001052 0  0   ! A block buffer is needed if the corresponding file is an edit type file.
001052 0  0   LAYOUT      ( INBUF^TEMPLATE    ( * ), 132 );
001052 0  0   LAYOUT      ( INBLOCK^TEMPLATE  ( * ), 256 );
001052 0  0   LAYOUT      ( OUTBUF^TEMPLATE   ( * ), 132 );
001052 0  0   LAYOUT      ( OUTBLOCK^TEMPLATE ( * ), 1024 );
001052 0  0
001052 0  0   STRUCT       .INFCBBLOCK  ( INBLOCK^TEMPLATE );
001252 0  0   STRUCT       .OUTFCBBLOCK ( OUTBLOCK^TEMPLATE );
002252 0  0
002252 0  0   ! After calling startup, the startup param (if any) is placed in this buffer.
002252 0  0   ! The inputcommand procedure returns input commands here.
002252 0  0   LAYOUT      (.COMMANDBUF, 132 * 4 );          !This gets re-used by INBUF
```

```
002662 0  0
002662 0  0   ! I/O buffers and pointers:
002662 0  0   INT          .INBUF = COMMANDBUF;               !Re-use
002662 0  0   STRING       .PTRIN := @INBUF '<<' 1;
002662 0  0
002662 0  0   INT          .OUTBUF [0:66];                    !output
002765 0  0   STRING       .PTROUT := @OUTBUF '<<' 1;
002765 0  0
002765 0  0   ! The print procedure will perform page breaking if the paging flag is set.
002765 0  0   ! The following controls this action.
002765 0  0   LITERAL        LINESPERPAGETERM    = 22;       ! if outfile is a terminal (need
002765 0  0                                                  ! 1 line for page break prompt)
002765 0  0   LITERAL        LINESPERPAGEPRINTER = 59;       ! if outfile is printer or process
002765 0  0   INT            PAGING := -1;                   ! <> if page break enabled
002765 0  0   INT            PAGE := 1;                      ! print maintains cur pg. # here
002765 0  0   INT            LINES := 0;                     ! counts lines printed on page
002765 0  0   INT            LINESPERPAGE := LINESPERPAGEPRINTER;
002765 0  0
002765 0  0   ! At page break time print checks pagehead.fadr, if <> then pagehead contains
002765 0  0   ! parameters to be passed to the fprint procedure.
002765 0  0   STRUCT       PAGEHEAD^TEMPLATE ( * );          ! user initialized page header
002765 0  0                BEGIN                             ! not used if fadr = 0
002765 0  1                INT  FADR;                        ! pointer to fprint format string
002765 0  1                INT  P [ 0:14 ];                  ! parms for format string
002765 0  1                END;
002765 0  0   STRUCT       .PAGEHEAD ( PAGEHEAD^TEMPLATE );
003005 0  0
003005 0  0   ! The following defines are used to determine the actual open access and
003005 0  0   ! exclusion mode for a file based upon a logical mode and device type word.
003005 0  0   DEFINE         OPENACCESSTYPE ( LOGICALACCESS, DTYPE ) =
003005 0  0                  ( IF DTYPE.<4:9> = 6 THEN !term!
003005 0  0                      READWRITE^ACCESS
003005 0  0                    ELSE
003005 0  0                      ( LOGICALACCESS )
003005 0  0                  )#;
003005 0  0   DEFINE         OPENEXCLUSIONTYPE ( LOGICALEXCLUSION, DTYPE ) =
003005 0  0                  ( CASE ( DTYPE ).<4:9> OF
003005 0  0                    BEGIN
003005 0  0                    !process! SHARE;
003005 0  0                    !oper    ! SHARE;
003005 0  0                    !receive! EXCLUSIVE;
003005 0  0                    !disc    ! ( LOGICALEXCLUSION );
003005 0  0                    !tape    ! EXCLUSIVE;
003005 0  0                    !printer! EXCLUSIVE;
003005 0  0                    !term    ! SHARE;
003005 0  0                    !comm    ! ( LOGICALEXCLUSION );
003005 0  0                    !card    ! EXCLUSIVE;
003005 0  0                    OTHERWISE ( LOGICALEXCLUSION ); !?!
003005 0  0                    END
003005 0  0                  )#;
003005 0  0   END       BLOCK;


003005 0  0   ?          SOURCE scovercm
Source file:  [1]  $OVER.T9618C00.SCOVERCM  03APR87   08:25:12
003005 0  0   ?SECTION COMMAND^DEFS
```

```
003005 0  0   block command^defs;
000000 0  0   string       commands = 'P' :=
000000 0  0   [3, "AND "
000000 0  0   ,5, "BADSS "                               !For debugging.  Don't document.
000000 0  0   ,7, "COMMENT "
000000 0  0   ,9, "DEBUGCODE "                           !For debugging. . Don't document.
000000 0  0   ,7, "DISABLE "
000000 0  0   ,3, "DISPLAY "
000000 0  0   ,6, "ENABLE "
000000 0  0   ,3, "ENV "
000000 0  0   ,1, "EXIT "
000000 0  0   ,2, "FC "
000000 0  0   ,1, "HELP "
000000 0  0   ,1, "LIST "
000000 0  0   ,4, "MARKUP "
000000 0  0   ,1, "MEASURE "
000000 0  0   ,2, "OR "
000000 0  0   ,5, "ORDER "
000000 0  0   ,4, "PAGESIZE "
000000 0  0   ,5, "PAUSE "
000000 0  0   ,2, "RESET "
000000 0  0   ,1, "SAVE "
000000 0  0   ,4, "SORT "
000000 0  0   ,6, "WHENCE "
000000 0  0   ,3, "XOR "
000000 0  0   ,0];
000000 0  0   end block;
000000 0  0   ?SECTION SERVER^DEFS
000000 0  0   block server^defs;
000000 0  0   string       BinToHex = 'P' := ["0123456789ABCDEF"];
000000 0  0   int          ServerName[0:11] := ["$XCVRn                 "];
000000 0  0   string       ServerName^S = ServerName;
000000 0  0   int          ServerFn;
000000 0  0   end block;
000000 0  0   ?SECTION MESSAGE^DEFS
000000 0  0   block message^defs;
000000 0  0   string       BothBandS = 'P' :=
000000 0  0                ["Both BRIEF and SUMMARY specified.",0];
000000 0  0   string       BothPandF = 'P' :=
000000 0  0                ["Both PIN and FILE specified.",0];
000000 0  0   string       TableFull = 'P' :=
000000 0  0                ["Cannot add filename.  Table is full.",0];
000000 0  0   string       CRCBinUse = 'P' :=
000000 0  0                ["COVER control block is in use.",0];
000000 0  0   string       EnableFE = 'P' :=
000000 0  0                ["Cannot ENABLE due to error ?#&* writing to $XCVRn.",0];
000000 0  0   string       EnableNP = 'P' :=
000000 0  0                ["Cannot ENABLE due to newprocess error ?#&*, ",
000000 0  0                 "filesystem error ?#&*.",0];
000000 0  0   string       Monitor  = 'P' :=
000000 0  0                ["Can?'t measure the Monitor process.",0];
000000 0  0   string       MySelf  = 'P' :=
000000 0  0                ["Can?'t measure myself.",0];
000000 0  0   string       SpaceDif = 'P' :=
000000 0  0                ["CODE file?'s spaces don?'t match process?'.",0];
000000 0  0   string       CodeReq = 'P' :=
000000 0  0                ["CODE parameter required for system processes.", 0];
```

```
000000 0  0   string    Disabled = 'P' :=
000000 0  0             ["COVER is DISABLEd.",0];
000000 0  0   string    EnabledNoPriv = 'P' :=
000000 0  0             ["COVER is ENABLEd (NO PRIV).",0];
000000 0  0   string    EnabledPriv = 'P' :=
000000 0  0             ["COVER is ENABLEd (PRIV).",0];
000000 0  0   string    NotInstalled = 'P' :=
000000 0  0             ["COVER is not installed in Guardian.",0];
000000 0  0   string    NotSupported = 'P' :=
000000 0  0             ["COVER version does not coincide with the OS version.",0];
000000 0  0   string    NoServer = 'P' :=
000000 0  0             ["Error ?#&* accessing CVRMON.",0];
000000 0  0   string    ErrorOnF = 'P' :=
000000 0  0             ["Error ?#&* on 'F*.",0];
000000 0  0   string    ErrorOnFoctal = 'P' :=
000000 0  0             ["Error ?%%6 on 'F*.",0];
000000 0  0   string    NotBitmap = 'P' :=
000000 0  0             ["File 'F* is not a COVER bitmap file.",0];
000000 0  0   string    Format = 'P' :=
000000 0  0             ["File 'F* is not in usable object format.",0];
000000 0  0   string    AlreadyIn = 'P' :=
000000 0  0             ["Filename is already in table.",0];
000000 0  0   string    NotLocal = 'P' :=
000000 0  0             ["Filename is not in local format.",0];
000000 0  0   string    NotInTable = 'P' :=
000000 0  0             ["Filename is not in table.",0];
000000 0  0   string    InsMem = 'P' :=
000000 0  0             ["Insufficient physical memory.",0];
000000 0  0   string    InsProcAccess = 'P' :=
000000 0  0             ["Insufficient process access ID.",0];
000000 0  0   string    InvPin  = 'P' :=
000000 0  0             ["Invalid PIN was specified.",0];
000000 0  0   string    NoLibWithG16 = 'P' :=
000000 0  0             ["Library not allowed when program file has >16 segments.",0];
000000 0  0   string    InUse = 'P' :=
000000 0  0             ["Measurement is in progress on PIN ?#&*.",0];
000000 0  0   string    Started = 'P' :=
000000 0  0             ["Measurement started on PIN ?#&*.",0];
000000 0  0   string    MissingINTO = 'P' :=
000000 0  0             ["Missing INTO keyword.",0];
000000 0  0   string    Neither = 'P' :=
000000 0  0             ["Neither FILE nor PIN was specified.",0];
000000 0  0   string    NeitherPinNorObject  = 'P' :=
000000 0  0             ["Neither PIN nor OBJECT was specified.",0];
000000 0  0   string    NeitherPnorL  = 'P' :=
000000 0  0             ["Neither PROGRAM nor LIBRARY being measured.",0];
000000 0  0   string    NoFile = 'P' :=
000000 0  0             ["No file name was specified.",0];
000000 0  0   string    NoSymbols = 'P' :=
000000 0  0             ["No Inspect symbols for '31!.",0];
000000 0  0   string    NothingToMerge = 'P' :=
000000 0  0             ["No measurement data to merge.",0];
000000 0  0   string    NoMeasRun = 'P' :=
000000 0  0             ["No measurement running in PIN ?#&*.",0];
000000 0  0   string    NoPin = 'P' :=
000000 0  0             ["No PIN was specified.",0];
000000 0  0   string    NotRun  = 'P' :=
```

```
000000 0  0                  ["No process running in PIN ?#&*.",0];
000000 0  0   string         NeverSaved = 'P' :=
000000 0  0                  ["No SAVE was performed before RESET.",0];
000000 0  0   string         NoSaveVol = 'P' :=
000000 0  0                  ["No SAVEVOL name was specified.",0];
000000 0  0   string         NotInteractive = 'P' :=
000000 0  0                  ["Not Interactive",0];
000000 0  0   string         NotNum = 'P' :=
000000 0  0                  ["Number is out of valid range.",0];
000000 0  0   string         IncompatibleObject = 'P' :=
000000 0  0                  ["Object file is incompatible on file 'F*.",0];
000000 0  0   string         NotAnObject = 'P' :=
000000 0  0                  ["Object file was expected to be on file 'F*.",0];
000000 0  0   string         UnknownRO^ = 'P' :=
000000 0  0                  ["Object file returned unknown RO error ?##* on file 'F*.",0];
000000 0  0   string         DifferentProgs = 'P' :=
000000 0  0                  ["Object files have different names, so their data ",
000000 0  0                   "won?'t be merged.",
000000 0  0                   "^'F* vs. 'F*",0];
000000 0  0   string         DifferentTimestamps = 'P' :=
000000 0  0                  ["Object files were bound at different times, so their data",
000000 0  0                   " won?'t be merged.",
000000 0  0                   "^'F* vs. 'F*",0];
000000 0  0   string         SuperOnly = 'P' :=
000000 0  0                  ["Only SUPER.SUPER can perform this function.",0];
000000 0  0   string         OK = 'P' :=
000000 0  0                  ["Operation was successful.",0];
000000 0  0   string         PrivNotAllowed = 'P' :=
000000 0  0                  ["Privileged processes may not be measured.",0];
000000 0  0   string         DifferentObjectSizes = 'P' :=
000000 0  0                  ["Programs are different.",0];
000000 0  0   string         AssumeSeconds = 'P' :=
000000 0  0                  ["Seconds were assumed.",0];
000000 0  0   string         SyntaxErr = 'P' :=
000000 0  0                  ["Syntax Error",0];
000000 0  0   string         IgnoreCPU = 'P' :=
000000 0  0                  ["The following compiler directive is ignored:^'80!",0];
000000 0  0   string         NoLib = 'P' :=
000000 0  0                  ["There is no library.",0];
000000 0  0   string         NoProg = 'P' :=
000000 0  0                  ["There is no program.",0];
000000 0  0   string         UnableAlloc = 'P' :=
000000 0  0                  ["Unable to ALLOCATESEGMENT due to error ?##*.",0];
000000 0  0   string         WarnBind = 'P' :=
000000 0  0                  ["**WARNING** ",
000000 0  0                   "Binder timestamp differs from that in bitmap.",0];
000000 0  0   string         WarnBeginEnd = 'P' :=
000000 0  0                  ["**WARNING** ",
000000 0  0                   "No END statement found for procedure '31!",0];
000000 0  0   string         Inconsistency = 'P' :=
000000 0  0                  ["**WARNING** ",
000000 0  0                   "No entry point entered, but some statement executed.",0];
000000 0  0   string         WarnSkip = 'P' :=
000000 0  0                  ["**WARNING** ",
000000 0  0                   "??ENDIF #* not found.",0];
000000 0  0   end block;
000000 0  0   ?SECTION PARSING^DEFS
```

```
000000 0  0  block parsing^defs;
000000 0  0  int          incnt;                              ! chars read in
000000 0  0  string       .char;                              ! next character to scan
000000 0  0  int          charadr = char;
000000 0  0
000000 0  0  int          .save   [ 0:awlen ( commandbuf ) ]; ! saves input buf
000410 0  0  string       .ptrsave := @save '<<' 1;           !
000410 0  0  int          savecnt;                            !          count
000410 0  0  int          savechar;                           !          char pointer
000410 0  0
000410 0  0  string       prompt [ 0:21 ] := "(cp,pin) COVER>"; ! prompt string
000410 0  0  literal      prmptcnt = 15;
000410 0  0
000410 0  0  int          fc := 0;
000410 0  0  int          Param^Commands^Only := 0;
000410 0  0
000410 0  0  ! check if char indicates end of command; syntax error if not
000410 0  0  define EOL = if nextchar( 0 ) then call debug^err#;
000410 0  0  end block;
000410 0  0  ?SECTION MARKUP^DEFS
000410 0  0  block markup^defs;
000000 0  0  struct       .GetMarkCurrent;         !For control of GetMarker proc
000000 0  0     begin
000000 0  1     int(32)   LineNum;
000000 0  1     int       Offset;
000000 0  1     int       FileName[0:11];
000000 0  1     end;
000017 0  0  int          BeginEndDepth;           !Block level
000017 0  0  int          Columns;                 !Which source file columns to ignore.
000017 0  0  literal      ColumnsDefault = 80;     !Default if keyword is not specified.
000017 0  0  literal      PeriodOffset = 6;        !Edit line # always has "."
000017 0  0
000017 0  0  ! Lines are marked with " " to indicate executed.
000017 0  0  ! Lines are marked with "*" to indicate NOT executed.
000017 0  0  ! Lines are marked with "+" to indicate mix of executed and unexecuted.
000017 0  0  ! Lines are marked with "?" to indicate not measured.
000017 0  0  literal      MarkSpot = 10;           !0-relative offset of markup column.
000017 0  0  string       MarkChar;                !Character that line should be marked with.
000017 0  0
000017 0  0  literal      StartSourceCol = 25;     !Column where source line text starts.
000017 0  0  literal      LineLengthWithSentinel = 132+8;
000017 0  0  string       .ListingLine[0:LineLengthWithSentinel-1];
000125 0  0  int          .ListingLine^I := @ListingLine'>>'1;
000125 0  0  ! Copy of ListingLine source upcased and no comments with blank then 0 trailer.
000125 0  0  string       .ListingByLine[0:LineLengthWithSentinel];
000234 0  0  int          StopByLineScan;          !(:= @ListingByLine + ByLineLength)
000234 0  0  string       .ByLineScanPtr;
000234 0  0  int          IgnoreToggles;           !TRUE if we're not supposed to bother
000234 0  0  int          .MarkupToggles[1:15];    !Keep track of ?SETTOGs
000253 0  0  int          MarkupSkipping;          !0 if not skipping input else 1-15
000253 0  0  int          .InListFilename[0:11];   !Contains filename entered
000267 0  0  int          InListFn := -1;          !Input listing's file number / -1
000267 0  0  int          .InListBuff[0:559];      !Printread buffer
001347 0  0  int          .OutListFilename[0:11];  !Contains filename entered
001363 0  0  int          OutListFn := -1;         !Output listing's file number / -1
001363 0  0  int          .OutListBuff[0:511];     !Level-3 spoolwrite buffer
002363 0  0  end block;
```

```
 40.     002363 0  0   ?        SOURCE dreadobj ( object^reading )
Source file:  [1]  $OVER.T9618C00.DREADOBJ  02OCT86 - 10:32:12
  1.     002363 0  0   ?SECTION OBJECT^READING
  3.     002363 0  0   block object^reading;
  4.     000000 0  0   int           SameFn := -1;          !At any time only 1 object file may be open
  5.     000000 0  0   string        BinderFormatVersion;
  6.     000000 0  0   int(32)       InspectAddress;        !Start of INSPECT area
  7.     000000 0  0   int(32)       PITentryAddr;          !0 relative address of current PIT entry
  8.     000000 0  0   int(32)       PITentryCount;
  9.     000000 0  0   int(32)       EPTbase;               !0 relative address of base of EPT
 10.     000000 0  0   int(32)       EPTentryAddr;          !0 relative address of current EPT entry
 11.     000000 0  0   string        EntryPointName[0:31];  !Room for stopper
 12.     000000 0  0   int           EntryPointOffset;
 13.     000000 0  0   struct       .Procedure;
 14.     000000 0  0      begin
 15.     000000 0  1      string     Name[0:31];            !Room for stopper
 16.     000000 0  1      int        Spaceid;
 17.     000000 0  1      int        Offset;                !Word offset of proc in this space
 18.     000000 0  1      int(32)    Length;                !Byte length of procedure
 19.     000000 0  1      int        CompilationTimestamp[0:2];
 20.     000000 0  1      int        HasInspect;            !flag - this proc has Inspect symbols
 21.     000000 0  1      int        SourceFileName[0:11];  !File name of source
 22.     000000 0  1      int(32)    SourceFileLine;        !Line # of PROC statement
 23.     000000 0  1      int        SourceFileTimestamp[0:2];
 24.     000000 0  1      end;
 25.     000051 0  0   int(32)       FileTableOffset;
 26.     000051 0  0   int           FileTableCount;
 27.     000051 0  0   int(32)       LocTableOffset;
 28.     000051 0  0   int           LocTableCount;
 29.     000051 0  0   struct       .Statement;
 30.     000051 0  0      begin
 31.     000051 0  1      int(32)    LineNum;
 32.     000051 0  1      int        Offset;                !Word offset of statement in this proc
 33.     000051 0  1      int        FileName[0:11];
 34.     000051 0  1      end;
 35.     000070 0  0
 36.     000070 0  0   int           SourceOrdNumber;       !Source file ordinal corresponding to the
 37.     000070 0  0                                        !name & timestamp.  0 if invalid
 38.     000070 0  0   int           SourceOrdName[0:11];   !Name corresponding to SourceOrdNumber
 39.     000070 0  0   int           SourceOrdTimestamp[0:2];!Timestamp correspondint to SourceOrdNumber
 40.     000070 0  0
 41.     000070 0  0   ! The following is for quicker access to sequential objects:
 42.     000070 0  0   int(32)       QuickPosition;         !Where in file
 43.     000070 0  0   int           QuickLength;           !For how long
 44.     000070 0  0   int(32)       QuickEOF;              !Length of file
 45.     000070 0  0   layout        (.QuickBuffer, 2048);  !Input buffer.  Not 4096 to avoid error 21s
 46.     002070 0  0   end block;
 42.     002070 0  0   ?        SOURCE dsvgn    ( envlayout )
Source file:  [1]  $OVER.T9618C00.DSVGN  10OCT86 - 14:42:23
  1.     002070 0  0   ?SECTION ENVLAYOUT
  2.     002070 0  0   block environment^register;
  3.     000000 0  0   ! ENV register bit fields.
  4.     000000 0  0   ! Why not put in one place instead of scattering about? (guard2 take note!!)
  5.     000000 0  0   ! The env register has differing fields defined depending on whether
  6.     000000 0  0   ! the env referred to is the actual hardware register (e.g., rde instruction)
  7.     000000 0  0   ! or the env which is saved in a stack marker (e.g., pcal & xcal instructions).
  8.     000000 0  0   ! The former are flagged as 'r' below, the latter are flagged 's'
```

```
 9.   000000 0  0   DEFINE     ENVRP        = <13:15>#;!r  !  !reg pointer (points to ra)
10.   000000 0  0   DEFINE     ENVCC        = <11:12>#;!r  !  !condition code
11.   000000 0  0   DEFINE     ENVSPACEID   = <11:15>#;!  s!  !space id (index on base seg #)
12.   000000 0  0   DEFINE     ENVV         = <10>    #;!r s!  !overflow bit
13.   000000 0  0   DEFINE     ENVK         = <9>     #;!r s!  !carry bit
14.   000000 0  0   DEFINE     ENVT         = <8>     #;!r s!  !arithmetic trap enabled bit
15.   000000 0  0   DEFINE     ENVCS        = <7>     #;!r s!  !code space bit
16.   000000 0  0   DEFINE     ENVDS        = <6>     #;!r s!  !data space bit
17.   000000 0  0   DEFINE     ENVPRV       = <5>     #;!r s!  !privileged mode bit
18.   000000 0  0   DEFINE     ENVLS        = <4>     #;!r s!  !library space bit
19.   000000 0  0   DEFINE     ENVRESUMEBP  = <1>     #;!  s!  !resume from bpt instr on exit
20.   000000 0  0   DEFINE     ENVTAKEBP    = <0>     #;!  s!  !take as if bpt instr on exit
21.   000000 0  0
22.   000000 0  0   ! procedure label (e.g., as found in the xep) bit fields:
23.   000000 0  0   DEFINE     LABELPEP      = <7:15>#; !pep number
24.   000000 0  0   DEFINE     LABELSPACEID  = <2:6> #; !space id (index on base seg #)
25.   000000 0  0   DEFINE     LABELCMAP     = <0:1> #; !code map indicator
26.   000000 0  0   DEFINE     LABELCS       = <0>   #; !code space bit
27.   000000 0  0   DEFINE     LABELLS       = <1>   #; !library space bit
28.   000000 0  0
29.   000000 0  0   end block;
44.   000000 0  0   ?          SOURCE dsvgn    ( goto^mainloop )
Source file:  [1]  $OVER.T9618C00.DSVGN  10OCT86 - 14:42:23
30.   000000 0  0   ?SECTION GOTO^MAINLOOP
31.   000000 0  0   block goto^mainloop^block;
32.   000000 0  0   ! Puffs of smoke used for escaping from some error conditions.
33.   000000 0  0   INT        MAINLOOP^S  = 'S';
34.   000000 0  0   DEFINE     MAINLOOP^SP = MAINLOOP^S [ 1 ]#;
35.   000000 0  0   DEFINE     MAINLOOP^SE = MAINLOOP^S [ 2 ]#;
36.   000000 0  0   DEFINE     MAINLOOP^SL = MAINLOOP^S [ 3 ]#;
37.   000000 0  0   FIXED      MAINLOOP^MARK;                          !saves all of the above
38.   000000 0  0   DEFINE     SET^MAINLOOP ( MAINLOOP^LABEL ) =       !set "mainloop"
39.   000000 0  0              BEGIN
40.   000000 0  0              STACK MYPID; CODE ( STRP $RP-1 );       !generate mainloop^s?
41.   000000 0  0              STACK @MAINLOOP^LABEL, MAINLOOP^SE, MAINLOOP^SL, @MAINLOOP^S;
42.   000000 0  0              STORE MAINLOOP^MARK;
43.   000000 0  0              END#;
44.   000000 0  0   INT        MAINLOOP^DEBUGFLAG := 0;                !debug on goto^mainloop
45.   000000 0  0   DEFINE     GOTO^MAINLOOP =                         !go to "mainloop"
46.   000000 0  0              BEGIN
47.   000000 0  0              IF MAINLOOP^DEBUGFLAG THEN CALL DEBUG;
48.   000000 0  0              STACK MAINLOOP^MARK;
49.   000000 0  0              CODE ( SETS );
50.   000000 0  0              STORE MAINLOOP^SL, MAINLOOP^SE, MAINLOOP^SP;
51.   000000 0  0              STACK @MAINLOOP^SL;
52.   000000 0  0              CODE ( SETL; EXIT 3 );
53.   000000 0  0              END#;
54.   000000 0  0   end block;
46.   000000 0  0   BLOCK CoverRoutine^defs;
47.   000000 0  0   ?          SOURCE dcover
Source file:  [1]  $OVER.T9618C00.DCOVER  29APR87 - 13:14:11
 1.   000000 0  0   ?SECTION MICROCODE
 3.   000000 0  0   ! The basic measurement algorithm is to replace instructions within the
 4.   000000 0  0   ! measured code with a BPT instruction which will cause instruction breakpoint
 5.   000000 0  0   ! interrupts when executed.  For measured processes, the INSTRUCTIONBREAKPOINT
 6.   000000 0  0   ! interrupt handler will replace the BPT opcode with the original instruction,
 7.   000000 0  0   ! set a bit ON in a bitmap corresponding to each possible instruction location,
```

```
000000 0  0   ! and resume the operation.  At the end of a measurement period, we can
000000 0  0   ! determine which instruction locations were executed by examining the
000000 0  0   ! corresponding bit map.
000000 0  0
000000 0  0   literal     Icode^BPT = %451;        !Op code for BPT instruction
000000 0  0
000000 0  0   ?SECTION CONTROL
000000 0  0   ! We use a resident segment (CRCB) which is allocated by CVRMON when
000000 0  0   ! COVER is installed (by ENABLE).  The CRCB contains a control block
000000 0  0   ! which is used for regulating the COVER measurements.  If fully
000000 0  0   ! allocated (in CPUs with 256 PINs), the CRCB with the CoverPinData
000000 0  0   ! structures will require about 20 pages of physical memory.  The CRCB
000000 0  0   ! is addressed by the instruction breakpoint interrupt handler via an
000000 0  0   ! absolute extended pointer maintained in the bpt table header.
000000 0  0   ! CVRMON and COVERCOM can address this segment by calling USESEGMENT.
000000 0  0   ! Update access to the CRCB is controlled via a semaphore defined in
000000 0  0   ! the BPT table header.  COVERCOM can share the segments, so long as
000000 0  0   ! it holds the semaphore.
000000 0  0
000000 0  0   ! COVER will allocate space for the following structure in a Resident Segment,
000000 0  0   ! one copy for each PIN in the CPU.  This space will be allocated contiguously
000000 0  0   ! after the CRCB in the same segment for simplicity.
000000 0  0   ! This structure will, in turn, point to copies of the code/library files in
000000 0  0   ! memory (by absoute segment number) and to a similarly allocated code/library
000000 0  0   ! bitmap of measurement data.
000000 0  0
000000 0  0   struct      CoverPinDataCodespaceTemplate(*);
000000 0  0               begin
000000 0  1               int         Seg;                !Abs base segments
000000 0  1               int         CopySeg;
000000 0  1               int         Name[0:11];         !Program filename
000000 0  1               int         Timestamp[0:2];     !When it was bound
000000 0  1               int         SpaceCount;         !Number of code spaces
000000 0  1               int         SpaceSize[0:15];    !Size (in words) of each code space
000000 0  1               string .EXT BitmapPtr;          !Pointer to measurement data
000000 0  1               end;
000000 0  0
000000 0  0   struct      CoverPinDataTemplate(*);
000000 0  0               begin
000000 0  1               int         State;      !Control of process (see below)
000000 0  1               int         EverSaved;  !Flag.  Set when SAVE command completes
000000 0  1               int         SaveVol[0:7];   !Subvol to save bitmap on
000000 0  1               struct      UC( CoverPinDataCodespaceTemplate );
000000 0  1               struct      UL( CoverPinDataCodespaceTemplate );
000000 0  1               end;
000000 0  0
000000 0  0   ! State definitions:
000000 0  0   literal     CoverMeasureReset    = 0;   !Not in use; no control structures
000000 0  0   literal     CoverMeasureStarting = 1;   !Code file being read to set BPTs
000000 0  0   literal     CoverMeasureRunning  = 2;   !Measurement is in progress
000000 0  0   literal     CoverMeasureStopping = 3;   !Measurement has stopped, but bitmap
000000 0  0                                           !is not de-allocated.
000000 0  0
000000 0  0   ! Control of all COVER measurements within a cpu is achieved through the use of
000000 0  0   ! this structure (referred to as a CRCB) which remains in a resident segment as
000000 0  0   ! long as COVER is installed in a cpu.
000000 0  0
```

```
000000 0 0   struct      CoverRoutineControlBlock(*);
000000 0 0               begin
000000 0 1               int(32)     Verifier;          ! Contains eyecatcher "CovR"
000000 0 1               int         Version;           ! For format identification
000000 0 1               int         XCVRn^PIN;         ! PIN of $XCVRn server
000000 0 1               int         PrivEnabled;       ! TRUE if ENABLE PRIV
000000 0 1               int         MemoryRatio;       ! Don't create too much pressure
000000 0 1               int         CurrentTraceBuf;   ! Current pointer in trace buf
000000 0 1      struct      TraceBuf[0:127];            ! Trace buffer (for debugging)
000000 0 1                  begin                       ! for tracing all BPT interrupts
000000 0 2                  int      PIN;
000000 0 2                  int      SpaceId;
000000 0 2                  int      P;
000000 0 2                  end;
000000 0 1               int         `NumFiles;         ! # of entries in FilesToMeasure.
000000 0 1      struct      FilesToMeasure[0:127];      ! Table of filenames to measure.
000000 0 1                  begin                       ! Always compressed to minimize
000000 0 2                  int      FileName[0:11];    ! search time.
000000 0 2                  int      UserID;            ! Who said "Measure OBJECT"
000000 0 2                  int         SaveVol[0:7];   !Subvol to save bitmap on
000000 0 2                  end;
000000 0 1      struct      ControlByPIN( CoverPinDataTemplate )
000000 0 1                  [0:-1];                     ! Actually [0:<max pcbs>-1]
000000 0 1               end;
000000 0 0
000000 0 0   ! An eyecatcher is stashed in the CRCB just for sanity checking purposes.
000000 0 0   define      CoverVerifier = ($dbl1( "Co","vR" ))#; !eyecatcher
000000 0 0
000000 0 0   ! We will want to make sure that appropriate versions of COVER are looking at
000000 0 0   ! these control structures, so:
000000 0 0   literal     CoverControlLatestVersion = 13;
000000 0 0
000000 0 0   ! Since the CRCB structure may be larger than 32K bytes, we need to
000000 0 0   ! use the following to compute the address of a ControlByPIN entry.
000000 0 0   ! We assume that the user has initialized an .ext variable named
000000 0 0   ! "CRCB" that hold the address of the CRCB.
000000 0 0
000000 0 0   define ControlByPinAddress( pin ) =
000000 0 0      @CRCB + $udbl($offset(CoverRoutineControlBlock.ControlByPIN))
000000 0 0            + $len(CoverRoutineControlBlock.ControlByPIN) '*' pin#;
000000 0 0
000000 0 0
000000 0 0   ! The following SEGIDs are reserved for use by COVER.  They will
000000 0 0   ! define the resident segments needed to control measurements.  All
000000 0 0   ! the resident segments are allocated/deallocated by CVRMON and are
000000 0 0   ! owned the the $XCVRn process in each ENABLEd cpu.  A range of 256
000000 0 0   ! SEGIDs are reserved, one for each possible PIN, for each PIN's
000000 0 0   ! bitmap data, code copy, and library copy.  Only those segments which
000000 0 0   ! are actually in use will be allocated, and only the amount required
000000 0 0   ! for use will be locked down.
000000 0 0
000000 0 0   literal     CoverCrcbSegid      = 2302; !CRCB will belong to CVRMON
000000 0 0   literal     CoverBitmapSegids   = 2303; !2303 to 2558 for PINs 0 to 255 Bitmaps
000000 0 0   literal     CoverCodeCopySegids = 2559; !2559 to 2814 for PINs 0 to 255 Code
000000 0 0   literal     CoverLibCopySegids  = 2815; !2815 to 3071 for PINs 0 to 255 Lib
000000 0 0   ! The bitmaps are allocated as an entire resident segment each, but only the
000000 0 0   ! pages actually needed are locked down  This is enough for 16 spaces worth of
```

```
000000 0  0   ! bitmaps since a bitmap for each space is 64K bits, or 4KW.  Each space's
000000 0  0   ! bitmap starts on a 4KW boundary, so addressing is easy.
000000 0  0   ! We would LIKE to be able to define a struct to define this, but TAL limits
000000 0  0   ! structs to 32K words, and we need 64K words.  If we could, it would look like
000000 0  0   ! this:
000000 0  0   --struct       CoverSpaceBitmapTemplate(*);
000000 0  0   --             begin
000000 0  0   --   struct       Space[0:15];
000000 0  0   --                begin
000000 0  0   --                int          Bitmap[0:4095];
000000 0  0   --                end;
000000 0  0   --             end;
000000 0  0   ! But we'll have to do the 1st level of indexing ourselves, so we'll use an
000000 0  0   ! an array pointer which we'll initialize to the base + space index * size;
000000 0  0   ! The array will then look something like this:
000000 0  0   -- int .ext Bitmap[0:4095];
000000 0  0
000000 0  0   ! Note that programs may now have as many as 32 code spaces, but if
000000 0  0   ! they do, there can be no library.  COVER identifies these by making
000000 0  0   ! the UC and UL program names the same.  It then uses the UL bitmaps,
000000 0  0   ! etc. for the additional (>16) code spaces' data.
000000 0  0
000000 0  0   literal      SizeOfCoverSpaceBitmap = 8192d;  !In bytes
000000 0  0   literal      SizeOfCoverBitmapSegment = 16d * SizeOfCoverSpaceBitmap;
000000 0  0   ?SECTION DISC
000000 0  0   ! The disc output format for COVER measurement data is similar to the
000000 0  0   ! extended data structure which holds all measurement data for a
000000 0  0   ! particular PIN.
000000 0  0
000000 0  0   ! For the sake of ease of efficient writing, enough filler is included to
000000 0  0   ! force the bitmaps to start on a 2K boundary.  This is followed by two fully
000000 0  0   ! allocated (i.e., no empty space between bitmaps, even if much of the 16
000000 0  0   ! address spaces went unreferenced) copies of BitmapData.  The EOF will be the
000000 0  0   ! last bitmap address referenced (rounded up to an even page).  These can be
000000 0  0   ! referenced using the following:
000000 0  0
000000 0  0   struct       CoverDiscImageTemplate(*);
000000 0  0                begin
000000 0  1                int(32)     Verifier;             ! Contains eyecatcher "CovR"
000000 0  1                int         Version;              ! For format identification
000000 0  1                int         UCEverBooleaned;      ! TRUE if ever AND/OR/XOR'd
000000 0  1                int         ULEverBooleaned;      ! TRUE if ever AND/OR/XOR'd
000000 0  1                struct      UC( CoverPinDataCodespaceTemplate );
000000 0  1                struct      UL( CoverPinDataCodespaceTemplate );
000000 0  1   !            FILLER      To round to a 2K boundary.
000000 0  1   -- struct       UCbitmapData( CoverSpaceBitmapTemplate );
000000 0  1   -- struct       ULbitmapData( CoverSpaceBitmapTemplate );
000000 0  1   ! We have to manage those last two substructs ourselves because TAL doesn't
000000 0  1   ! support structs that big!
000000 0  1                end;
000000 0  0
000000 0  0   literal      CoverDiscLatestVersion = 2;
000000 0  0
000000 0  0   literal      CoverBitmapFilecode = 846;  !File code for bitmap files.
000000 0  0
000000 0  0   literal      CoverDiscHeaderSize = 2048d; !Round to page
000000 0  0   ?SECTION MESSAGES
```

```
000000 0  0   ! These messages are passed to the COVER server processes, $XCVR and
000000 0  0   ! $XCVRn.
000000 0  0   struct CVR^Server^Disable^Template(*);
000000 0  0                 begin
000000 0  1   int           MessageType;
000000 0  1                 end;
000000 0  0
000000 0  0   struct CVR^Server^Enable^Template(*);
000000 0  0                 begin
000000 0  1   int           MessageType;
000000 0  1                 end;
000000 0  0
000000 0  0   struct CVR^Server^Measure^Template(*);
000000 0  0                 begin
000000 0  1   int           MessageType;
000000 0  1   int           FromMonitor;               !TRUE iff from Xnewprocess
000000 0  1   int           PIN;                       !PIN to measure
000000 0  1   int           Crtpid[0:2];               !CRTPID of PIN to measure
000000 0  1   int           CodeSeg;                   !ABS segment of 1st program segment
000000 0  1   int           LibSeg;                    !ABS segment of 1st library segment
000000 0  1   int           CodeFilename[0:11];
000000 0  1   int           LibFilename[0:11];
000000 0  1   int           SaveVol[0:7];              !Subvol to save bitmap on
000000 0  1                 end;
000000 0  0
000000 0  0   struct CVR^Server^Save^Template(*);
000000 0  0                 begin
000000 0  1   int           MessageType;
000000 0  1   int           PIN;                       !PIN to save
000000 0  1   int           Owner;                     !CRAID of PIN to save
000000 0  1                 end;
000000 0  0
000000 0  0   struct CVR^Server^Reset^Template(*);
000000 0  0                 begin
000000 0  1   int           MessageType;
000000 0  1   int           PIN;                       !PIN to reset
000000 0  1                 end;
000000 0  0
000000 0  0   ! The messages are identified by these MessageTypes:
000000 0  0   literal       CVR^Server^Disable  = 1;
000000 0  0   literal       CVR^Server^Enable   = 2;
000000 0  0   literal       CVR^Server^Measure  = 3;
000000 0  0   literal       CVR^Server^Save     = 4;
000000 0  0   literal       CVR^Server^Reset    = 5;
000000 0  0
000000 0  0   ! Special error returns from CVRMON must be negative (so as not to
000000 0  0   ! duplicate FE numbers) and must be different from RO^ routines' error
000000 0  0   ! codes.
000000 0  0   literal       CoverErrFirst          = -10; !First in the list *****
000000 0  0   literal       CoverErrAlready        = -10; !Already ENABLED
000000 0  0   literal       CoverErrInsMem         = -11; !Insufficient memory
000000 0  0   literal       CoverErrNotRunning     = -12; !No (or wrong) process in PIN
000000 0  0   literal       CoverErrSpaceMismatch  = -13; !Code and object don't match
000000 0  0   literal       CoverErrInUse          = -14; !Some measurement running
000000 0  0   literal       CoverErrPriv           = -15; !PRIV process, but no ENABLE PRIV
000000 0  0   literal       CoverErrLast           = -15; !Last in the list ******
000000 0  0   END BLOCK;
000000 0  0   ?BEGINCOMPILATION
```

```
   51.     000000 0  0    ?SOURCE sversion( version^global )
Source file:  [1]  $OVER.T9618C00.SVERSION  29APR87 - 09:45:32
   30.     000000 0  0    ?SECTION VERSION^GLOBAL
   31.     000000 0  0    PROC T9618C00^15JUL87^GLOBAL^29APR7;
   32.     000000 1  0    BEGIN END;
ABORT^OPENERR                  Define                       %B0000000000000000000000000001D
ABORT^XFERERR                  Define                       %B00000000000000000000000000010D
ALLFILES                       Variable        INT          Indirect       INOUTSTUFF+002
ALLOCATE^CBS                   Define                       INT . $1 [ 0:65 ] := [ 62 , 1 , 27 * [ 0 ] , 62 , 32 * [ 0 ]
ALLOCATE^FCB                   Define                       INT . $1 [ 0:FCBSIZE - 1 ] := [ FCBSIZE , %000061 , -1 , %10
ALREADYIN                      Variable        STRING       Direct          P+000
ASSIGNMSG^LAYOUT               Define                        BEGIN^LAYOUT (  $1 ) INT TYPE; BEGIN^LAYOUT ( LOGICALUNIT )
ASSIGNMSG^TEMPLATE             Variable        TEMPLATE ,154
  1 WORD                                 0,2   INT          Direct
  1 BYTE                                 0,1   STRING       Direct
  1 TYPE                                 0,2   INT          Direct
  1 LOGICALUNIT                          2,100  SUBSTRUCT
    2 WORD                               2,2   INT          Direct
    2 BYTE                               2,1   STRING       Direct
    2 PROGNAMELEN                        2,1   STRING       Direct
    2 PROGNAME[0:30]                     3,1   STRING       Direct
    2 FILENAMELEN                       42,1   STRING       Direct
    2 FILENAME[0:30]                    43,1   STRING       Direct
  1 MASK                               102,4   INT (32)     Direct
  1 FILENAME                           106,30   SUBSTRUCT
    2 WORD                             106,2   INT          Direct
    2 BYTE                             106,1   STRING       Direct
    2 VOLUME                           106,10   SUBSTRUCT
      3 WORD                           106,2   INT          Direct
      3 BYTE[0:7]                      106,1   STRING       Direct
    2 SUBVOL                           116,10   SUBSTRUCT
      3 WORD                           116,2   INT          Direct
      3 BYTE[0:7]                      116,1   STRING       Direct
    2 FILE                             126,10   SUBSTRUCT
      3 WORD                           126,2   INT          Direct
      3 BYTE[0:7]                      126,1   STRING       Direct
  1 PRIEXT                             136,2   INT          Direct
  1 SECEXT                             140,2   INT          Direct
  1 FILECODE                           142,2   INT          Direct
  1 EXCLUSION                          144,2   INT          Direct
  1 ACCESS                             146,2   INT          Direct
  1 RECSIZE                            150,2   INT          Direct
  1 BLKSIZE                            152,2   INT          Direct
ASSIGNMSG^TYPE                 Literal         INT          %177776
ASSIGN^BLOCKBUFLEN             Literal         INT          %000011
ASSIGN^BLOCKLENGTH             Literal         INT          %000011
ASSIGN^EXISTS                  Define                       ( $HIGH (  $1.MASK ) LAND %100000 '>>' ( IF $OFFSET (  $1. $P
ASSIGN^FILECODE                Literal         INT          %000006
ASSIGN^FILENAME                Literal         INT          %000001
ASSIGN^LOGICALFILENAME         Literal         INT          %000002
ASSIGN^OPENACCESS              Literal         INT          %000003
ASSIGN^OPENEXCLUSION           Literal         INT          %000004
ASSIGN^PRIEXT                  Literal         INT          %000007
ASSIGN^PRIMARYEXTENTSIZE       Literal         INT          %000007
ASSIGN^RECORDLEN               Literal         INT          %000005
ASSIGN^RECORDLENGTH            Literal         INT          %000005
ASSIGN^SECEXT                  Literal         INT          %000010
ASSIGN^SECONDARYEXTENTSIZE     Literal         INT          %000010
```

```
ASSUMESECONDS                  Variable     STRING             Direct        P+000
AUTO^CREATE                    Define                          %B00000000000000000000000000010000D
AUTO^TOF                       Define                          %B0000000000000000000000001000000D
AWOLEN                         Define                          ( $OCCURS (  $1 ) * WLEN (  $1 ) - 1 )
BEGINENDDEPTH                  Variable     INT                Direct        MARKUP^DEFS+001
BEGIN^LAYOUT                   Define                          STRUCT  $1; BEGIN INT WORD [ 0:-1 ]; STRING BYTE [ 0:-1 ];
BINDERFORMATVERSION            Variable     STRING             Direct        OBJECT^READING+001
BINDER^HEADER                  Variable     TEMPLATE ,146
  1 NOSTRIP^FLAG                    0,1     STRING             Direct
  1 FORMAT^VERSION                  1,1     STRING             Direct
  1 DBIT^STATUS                     2,24     SUBSTRUCT
    2 HASH^LOCATION                 2,4     INT (32)           Direct
    2 HASH^LENGTH                   6,4     INT (32)           Direct
    2 FIRST^ENTRY                  12,4     INT (32)           Direct
    2 LAST^ENTRY                   16,4     INT (32)           Direct
    2 ENTRY^COUNT                  22,4     INT (32)           Direct
  1 EPT^STATUS                     26,24     SUBSTRUCT
    2 HASH^LOCATION                26,4     INT (32)           Direct
    2 HASH^LENGTH                  32,4     INT (32)           Direct
    2 FIRST^ENTRY                  36,4     INT (32)           Direct
    2 LAST^ENTRY                   42,4     INT (32)           Direct
    2 ENTRY^COUNT                  46,4     INT (32)           Direct
  1 PIT^STATUS                     52,24     SUBSTRUCT
    2 HASH^LOCATION                52,4     INT (32)           Direct
    2 HASH^LENGTH                  56,4     INT (32)           Direct
    2 FIRST^ENTRY                  62,4     INT (32)           Direct
    2 LAST^ENTRY                   66,4     INT (32)           Direct
    2 ENTRY^COUNT                  72,4     INT (32)           Direct
  1 UDBIT^STATUS                   76,24     SUBSTRUCT
    2 HASH^LOCATION                76,4     INT (32)           Direct
    2 HASH^LENGTH                 102,4     INT (32)           Direct
    2 FIRST^ENTRY                 106,4     INT (32)           Direct
    2 LAST^ENTRY                  112,4     INT (32)           Direct
    2 ENTRY^COUNT                 116,4     INT (32)           Direct
  1 RTDU^STATUS                   122,24     SUBSTRUCT
    2 HASH^LOCATION               122,4     INT (32)           Direct
    2 HASH^LENGTH                 126,4     INT (32)           Direct
    2 FIRST^ENTRY                 132,4     INT (32)           Direct
    2 LAST^ENTRY                  136,4     INT (32)           Direct
    2 ENTRY^COUNT                 142,4     INT (32)           Direct
BINDER^LISTING                 Variable     TEMPLATE ,4
  1 FILLER                          0,1
  1 ALPHA                           1,1     STRING             Direct
  1 LOC                             2,1     STRING             Direct
  1 XREF                            3,1     STRING             Direct
BINDER^LISTING^DEFINE          Define                          BEGIN FILLER 1; STRING ALPHA; STRING LOC; STRING XREF; END
BINTOHEX                       Variable     STRING             Direct        P+000
BIT                            Define                          ( %100000 '>>' (  $1 ) )
BLOCKED                        Define                          %B0000000000000000000001000000000D
BLOCK^FLAGS^DATA               Define                          BLOCK^FLAGS.<2>
BLOCK^FLAGS^NOT^ALLOCATED      Define                          BLOCK^FLAGS.<1>
BLOCK^FLAGS^PRIVATE            Define                          BLOCK^FLAGS.<0>
BLOCK^TYPE                     Define                          BLOCK^TYPE^CODE.<14:15>
BOTHBANDS                      Variable     STRING             Direct        P+000
BOTHPANDF                      Variable     STRING             Direct        P+000
BYTLINESCANPTR                 Variable     STRING             Indirect      MARKUP^DEFS+010
CHAR                           Variable     STRING             Indirect      PARSING^DEFS+001
CHARADR                        Variable     INT                Direct        PARSING^DEFS+001
```

```
CODEREQ                              Variable        STRING          Direct         P+000
CODE^FIXUP                           Define                          REFERENCE^FLAGS.<1>
COLUMNS                              Variable        INT             Direct         MARKUP^DEFS+002
COLUMNSDEFAULT                       Literal         INT             %000120
COMMANDBUF                           Variable,1020   STRUCT          Indirect       INOUTSTUFF+016
  1 WORD                                  0,2        INT             Direct
  1 BYTE[0:527]                           0,1        STRING          Direct
COMMANDS                             Variable        STRING          Direct         P+000
COMMAND^DEFS                         Block
COMMONFCB                            Variable        INT             Indirect       INOUTSTUFF+002
COMMON^ICL^IDL^PIT^DBIT^DEFINE       Define                          INT COMPILATION^TIMESTAMP[0:2]; INT LANGUAGE; INT COMPATIBIL
COMMON^ICL^PIT^DEFINE                Define                          INT PROC^ATTRIBUTE; INT LOCAL^STORAGE; INT ABSOLUTE^REFERENC
COMMON^IDL^DBIT^DEFINE               Define                          INT LOCATION^CONSTRAINTS; INT ADDRESS^MODE; INT BLOCK^ATTRIB
COMMON^IEL^EPT^DEFINE                Define                          INT PEP^NUMBER; INT CODE^OFFSET; INT ENTRY^ATTRIBUTE; INT PA
CONTROLBYPINADDRESS                  Define                          @CRCB + $UDBL($OFFSET(COVERROUTINECONTROLBLOCK.CONTROLBYPIN)
COVERBITMAPFILECODE                  Literal         INT             %001516
COVERBITMAPSEGIDS                    Literal         INT             %004377
COVERCODECOPYSEGIDS                  Literal         INT             %004777
COVERCONTROLLATESTVERSION            Literal         INT             %000015
COVERCRCBSEGID                       Literal         INT             %004376
COVERDISCHEADERSIZE                  Literal         INT (32)        %000000 004000
COVERDISCIMAGETEMPLATE               Variable        TEMPLATE ,232
  1 VERIFIER                              0,4        INT (32)        Direct
  1 VERSION                               4,2        INT             Direct
  1 UCEVERBOOLEANED                       6,2        INT             Direct
  1 ULEVERBOOLEANED                      10,2        INT             Direct
  1 UC                                   12,110       SUBSTRUCT
  1 UL                                  122,110       SUBSTRUCT
COVERDISCLATESTVERSION               Literal         INT             %000002
COVERERRALREADY                      Literal         INT             %177766
COVERERRFIRST                        Literal         INT             %177766
COVERERRINSMEM                       Literal         INT             %177765
COVERERRINUSE                        Literal         INT             %177762
COVERERRLAST                         Literal         INT             %177761
COVERERRNOTRUNNING                   Literal         INT             %177764
COVERERRPRIV                         Literal         INT             %177761
COVERERRSPACEMISMATCH                Literal         INT             %177763
COVERLIBCOPYSEGIDS                   Literal         INT             %005377
COVERMEASURERESET                    Literal         INT             %000000
COVERMEASURERUNNING                  Literal         INT             %000002
COVERMEASURESTARTING                 Literal         INT             %000001
COVERMEASURESTOPPING                 Literal         INT             %000003
COVERPINDATACODESPACETEMPLATE        Variable        TEMPLATE ,110
  1 SEG                                   0,2        INT             Direct
  1 COPYSEG                               2,2        INT             Direct
  1 NAME[0:11]                            4,2        INT             Direct
  1 TIMESTAMP[0:2]                       34,2        INT             Direct
  1 SPACECOUNT                           42,2        INT             Direct
  1 SPACESIZE[0:15]                      44,2        INT             Direct
  1 BITMAPPTR                           104,1        STRING          EXT Pointer
COVERPINDATATEMPLATE                 Variable        TEMPLATE ,244
  1 STATE                                 0,2        INT             Direct
  1 EVERSAVED                             2,2        INT             Direct
  1 SAVEVOL[0:7]                          4,2        INT             Direct
  1 UC                                   24,110       SUBSTRUCT
  1 UI                                  134,110       SUBSTRUCT
COVERROUTINECONTROLBLOCK             Variable        TEMPLATE ,14020
  1 VERIFIER                              0,4        INT (32)        Direct
```

```
  1 VERSION                      4,2      INT             Direct
  1 XCVRN^PIN                    6,2      INT             Direct
  1 PRIVENABLED                 10,2      INT             Direct
  1 MEMORYRATIO                 12,2      INT             Direct
  1 CURRENTTRACEBUF             14,2      INT             Direct
  1 TRACEBUF[0:127]             16,6       SUBSTRUCT
    2 PIN                       16,2      INT             Direct
    2 SPACEID                   20,2      INT             Direct
    2 P                         22,2      INT             Direct
  1 NUMFILES                  1416,2      INT             Direct
  1 FILESTOMEASURE[0:127]     1420,52      SUBSTRUCT
    2 FILENAME[0:11]          1420,2      INT             Direct
    2 USERID                  1450,2      INT             Direct
    2 SAVEVOL[0:7]            1452,2      INT             Direct
  1 CONTROLBYPIN             14020,244     SUBSTRUCT
COVERROUTINE^DEFS             Block
COVERVERIFIER                 Define                      ($DBLL( "Co","vR" ))
CRCBINUSE                     Variable    STRING          Direct        P+000
CRLF^BREAK                    Define                      %B0000000000000010000000000000000D
CRTLOCAL                      Define                        $1.WORD.<0:7> = "$" OR NOT  $1.WORD.<8:15>
CRTNAMED                      Define                        $1.WORD.<0:1> <> 2
CRTPID^LAYOUT                 Define                      BEGIN^LAYOUT (  $1 ) CRT^LAYOUT ( CRT ); INT PID; END^LAYOUT
CRTPID^TEMPLATE               Variable    TEMPLATE ,10
  1 WORD                         0,2      INT             Direct
  1 BYTE                         0,1      STRING          Direct
  1 CRT                          0,6       SUBSTRUCT
    2 WORD                       0,2      INT             Direct
    2 BYTE[0:5]                  0,1      STRING          Direct
  1 PID                          6,2      INT             Direct
CRTREMOTE                     Define                        $1.CRTSYSTEMNUMBER <>  $2
CRTSYSTEMNUMBER               Define                        $1.WORD.<8:15>
CRT^LAYOUT                    Define                       LAYOUT (  $1, 6 )
CRT^TEMPLATE                  Variable    TEMPLATE ,6
  1 WORD                         0,2      INT             Direct
  1 BYTE[0:5]                    0,1      STRING          Direct
CSIL^DEF                      Variable    TEMPLATE ,54
  1 CODE^AREA^ADDR               0,4      INT (32)        Direct
  1 EPIL^ADDR                    4,4      INT (32)        Direct
  1 EPFL^ADDR                   10,4      INT (32)        Direct
  1 SIZE                        14,2      INT             Direct
  1 EPIL^LENGTH                 16,2      INT             Direct
  1 EPFL^LENGTH                 20,2      INT             Direct
  1 SPACE^NUMBER                22,2      INT             Direct
  1 PCR^PEP^SIZE                24,2      INT             Direct
  1 RESIDENT^PAGES              26,2      INT             Direct
  1 NUM^NONPRIV                 30,2      INT             Direct
  1 NUM^CALLABLE                32,2      INT             Direct
  1 NUM^PRIVILEGED              34,2      INT             Direct
  1 FILLER                      36,1
CURRENT^FORMAT^VERSION        Literal     INT             %000016
CVR^SERVER^DISABLE            Literal     INT             %000001
CVR^SERVER^DISABLE^TEMPLATE   Variable    TEMPLATE ,2
  1 MESSAGETYPE                  0,2      INT             Direct
CVR^SERVER^ENABLE             Literal     INT             %000002
CVR^SERVER^ENABLE^TEMPLATE    Variable    TEMPLATE ,2
  1 MESSAGETYPE                  0,2      INT             Direct
CVR^SERVER^MEASURE            Literal     INT             %000003
CVR^SERVER^MEASURE^TEMPLATE   Variable    TEMPLATE ,120
```

```
  1 MESSAGETYPE                      0,2     INT              Direct
  1 FROMMONITOR                      2,2     INT              Direct
  1 PIN                              4,2     INT              Direct
  1 CRTPID[0:2]                      6,2     INT              Direct
  1 CODESEG                         14,2     INT              Direct
  1 LIBSEG                          16,2     INT              Direct
  1 CODEFILENAME[0:11]              20,2     INT              Direct
  1 LIBFILENAME[0:11]               50,2     INT              Direct
  1 SAVEVOL[0:7]                   100,2     INT              Direct
CVR^SERVER^RESET                 Literal     INT              %000005
CVR^SERVER^RESET^TEMPLATE        Variable    TEMPLATE ,4
  1 MESSAGETYPE                      0,2     INT              Direct
  1 PIN                              2,2     INT              Direct
CVR^SERVER^SAVE                  Literal     INT              %000004
CVR^SERVER^SAVE^TEMPLATE         Variable    TEMPLATE ,6
  1 MESSAGETYPE                      0,2     INT              Direct
  1 PIN                              2,2     INT              Direct
  1 OWNER                            4,2     INT              Direct
C^EXT^DATA                       Define                       EXT^DATA.<14>
DBIT^ENTRY^BASE                  Variable    TEMPLATE ,530
  1 TOTAL^LENGTH                     0,4     INT (32)         Direct
  1 CODE^BLOCK                       4,4     INT (32)         Direct
  1 BLOCK^LENGTH                    10,4     INT (32)         Direct
  1 FILE^OFFSET                     14,4     INT (32)         Direct
  1 SOURCE^FILE[0:11]               20,2     INT              Direct
  1 COMPILATION^TIMESTAMP[0:2]      50,2     INT              Direct
  1 LANGUAGE                        56,2     INT              Direct
  1 COMPATIBILITY^LEVEL             60,2     INT              Direct
  1 COMPILER^PRODUCT[0:7]           62,1     STRING           Direct
  1 FIRST^WORD^ADDRESS              72,4     INT (32)         Direct
  1 BLOCK^MODIFIED                  76,2     INT              Direct
  1 BLOCK^FLAGS                    100,2     INT              Direct
  1 LOCATION^CONSTRAINTS           102,2     INT              Direct
  1 ADDRESS^MODE                   104,2     INT              Direct
  1 BLOCK^ATTRIBUTES               106,2     INT              Direct
  1 BLOCK^TYPE^CODE                110,2     INT              Direct
  1 READ^ONLY                      112,2     INT              Direct
  1 BUF^SIZE                       114,2     INT              Direct
  1 RQTB^SIZE                      116,2     INT              Direct
  1 INSPECT^OFFSET                 120,4     INT (32)         Direct
  1 INSPECT^LENGTH                 124,4     INT (32)         Direct
  1 BLOCK^NAME[0:255]              130,1     STRING           Direct
DBIT^HASH^TABLE                  Literal     INT              %000005
DBIT^TABLE                       Literal     INT              %000001
DDEC                             Define                        $1 :=  $1 - 1D
DEC                              Define                        $1 :=  $1 - 1
DEFAULTS                         Variable,20 STRUCT           Indirect     INOUTSTUFF+000
DEFAULTS^LAYOUT                  Define                        BEGIN^LAYOUT (  $1 ) NAME^LAYOUT ( VOLUME ); NAME^LAYOUT (
DEFAULTS^TEMPLATE                Variable    TEMPLATE ,20
  1 WORD                             0,2     INT              Direct
  1 BYTE                             0,1     STRING           Direct
  1 VOLUME                           0,10     SUBSTRUCT
    2 WORD                           0,2     INT              Direct
    2 BYTE[0:7]                      0,1     STRING           Direct
  1 SUBVOL                          10,10     SUBSTRUCT
    2 WORD                          10,2     INT              Direct
    2 BYTE[0:7]                     10,1     STRING           Direct
```

```
DIFFERENTOBJECTSIZES        Variable     STRING          Direct        P+000
DIFFERENTPROGS              Variable     STRING          Direct        P+000
DIFFERENTTIMESTAMPS         Variable     STRING          Direct        P+000
DIMENSION^TERM              Variable     TEMPLATE ,12
  1 LOWER^CONSTANT               0,1     STRING          Direct
  1 UPPER^CONSTANT               1,1     STRING          Direct
  1 LOWER^BOUND                  2,4     INT (32)        Direct
  1 UPPER^BOUND                  6,4     INT (32)        Direct
DIMENSION^TERM^DEFINE       Define                       BEGIN STRING LOWER^CONSTANT; STRING UPPER^CONSTANT; INT(32)
DINC                        Define                        $1 :=  $1 + 1D
DISABLED                    Variable     STRING          Direct        P+000
EATTRIB                     Variable     TEMPLATE ,6
  1 PRIV^FLAG                    0,1     STRING          Direct
  1 CALL^FLAG                    1,1     STRING          Direct
  1 VAR^OR^EXT^FLAG              2,1     STRING          Direct
  1 MAIN^FLAG                    3,1     STRING          Direct
  1 PARAMS^WHEN^VAR              4,2     INT             Direct
EATTRIB^DEFINE              Define                       BEGIN EATTRIB^FLAGS^DEFINE INT PARAMS^WHEN^VAR; END
EATTRIB^FLAGS^DEFINE        Define                        STRING PRIV^FLAG; STRING CALL^FLAG; STRING VAR^OR^EXT^FLAG;
ENABLEDNOPRIV               Variable     STRING          Direct        P+000
ENABLEDPRIV                 Variable     STRING          Direct        P+000
ENABLEFE                    Variable     STRING          Direct        P+000
ENABLENP                    Variable     STRING          Direct        P+000
END^LAYOUT                  Define                       END
ENTRYPOINTNAME              Variable     STRING          Direct       OBJECT^READING+014
ENTRYPOINTOFFSET            Variable     INT             Direct       OBJECT^READING+034
ENTRY^ATTRIBUTE^C           Define                       ENTRY^ATTRIBUTE.<1>
ENTRY^ATTRIBUTE^E           Define                       ENTRY^ATTRIBUTE.<4>
ENTRY^ATTRIBUTE^M           Define                       ENTRY^ATTRIBUTE.<6>
ENTRY^ATTRIBUTE^P           Define                       ENTRY^ATTRIBUTE.<0>
ENTRY^ATTRIBUTE^V           Define                       ENTRY^ATTRIBUTE.<5>
ENTRY^ATTRIBUTE^X           Define                       ENTRY^ATTRIBUTE.<7>
ENVCC                       Define                       <11:12>
ENVCS                       Define                       <7>
ENVDS                       Define                       <6>
ENVIRONMENT^REGISTER        Block
ENVK                        Define                       <9>
ENVLS                       Define                       <4>
ENVPRV                      Define                       <5>
ENVRESUMEBP                 Define                       <1>
ENVRP                       Define                       <13:15>
ENVSPACEID                  Define                       <11:15>
ENVT                        Define                       <8>
ENVTAKEBP                   Define                       <0>
ENVV                        Define                       <10>
EOL                         Define                       IF NEXTCHAR( 0 ) THEN CALL DEBUG^ERR
EPTBASE                     Variable     INT (32)        Direct       OBJECT^READING+010
EPTENTRYADDR                Variable     INT (32)        Direct       OBJECT^READING+012
EPT^ENTRY^BASE              Variable     TEMPLATE ,440
  1 TOTAL^LENGTH                 0,4     INT (32)        Direct
  1 NEXT^ENTRY                   4,4     INT (32)        Direct
  1 CODE^BLOCK                  10,4     INT (32)        Direct
  1 PEP^NUMBER                  14,2     INT             Direct
  1 CODE^OFFSET                 16,2     INT             Direct
  1 ENTRY^ATTRIBUTE             20,2     INT             Direct
  1 PARAMETER^COUNT             22,2     INT             Direct
  1 RETURN^TYPE                 24,14     SUBSTRUCT
```

```
    2 STORAGE^TYPE                   24,2    INT            Direct
    2 ELEMENT^LEN                    26,2    INT            Direct
    2 UNIT^SIZE                      30,6     SUBSTRUCT
      3 VARIABLE^FLAGS               30,1    STRING         Direct
      3 COMPILE^CONSTANT             31,1    STRING         Direct
      3 VALUE                        32,4    INT (32)       Direct
    2 SCALE^FACTOR                   36,2    INT            Direct
  1 ENTRY^POINT^NAME[0:255]          40,1    STRING         Direct
EPT^HASH^TABLE                  Literal      INT            %000006
EPT^TABLE                       Literal      INT            %000002
ERRORONF                        Variable     STRING         Direct        P+000
ERRORONFOCTAL                   Variable     STRING         Direct        P+000
EXCLUSIVE                       Literal      INT            %000001
FALSE                           Literal      INT            %000000
FC                              Variable     INT            Direct        PARSING^DEFS+021
FCBSIZE                         Literal      INT            %000074
FDEC                            Define                       $1 :=  $1 - 1F
FILENAME^LAYOUT                 Define                       BEGIN^LAYOUT (  $1 ) NAME^LAYOUT ( VOLUME ); NAME^LAYOUT (
FILENAME^TEMPLATE               Variable     TEMPLATE ,30
  1 WORD                              0,2    INT            Direct
  1 BYTE                              0,1    STRING         Direct
  1 VOLUME                            0,10    SUBSTRUCT
    2 WORD                            0,2    INT            Direct
    2 BYTE[0:7]                       0,1    STRING         Direct
  1 SUBVOL                           10,10    SUBSTRUCT
    2 WORD                           10,2    INT            Direct
    2 BYTE[0:7]                      10,1    STRING         Direct
  1 FILE                             20,10    SUBSTRUCT
    2 WORD                           20,2    INT            Direct
    2 BYTE[0:7]                      20,1    STRING         Direct
FILETABLECOUNT                  Variable     INT            Direct        OBJECT^READING+040
FILETABLEOFFSET                 Variable     INT (32)       Direct        OBJECT^READING+036
FILE^ABORT^XFERERR              Literal      INT            %000421
FILE^ASSIGNMASK1                Literal      INT            %000053
FILE^ASSIGNMASK2                Literal      INT            %000054
FILE^BLOCKBUFLEN                Literal      INT            %000411
FILE^BREAKHIT                   Literal      INT            %000436
FILE^BWDLINKFCB                 Literal      INT            %000056
FILE^CHECKSUM                   Literal      INT            %000457
FILE^COUNTXFERRED               Literal      INT            %000434
FILE^CREATED                    Literal      INT            %000050
FILE^CRLF^BREAK                 Literal      INT            %000427
FILE^DUPFILE                    Literal      INT            %000412
FILE^ERROR                      Literal      INT            %000435
FILE^ERRORFILE                  Literal      INT            %000431
FILE^ERROR^ADDR                 Literal      INT            %000044
FILE^FCB^ADDR                   Literal      INT            %000062
FILE^FILECODE                   Literal      INT            %000406
FILE^FILEINFO                   Literal      INT            %000047
FILE^FILENAME                   Literal      INT            %000401
FILE^FILENAME^ADDR              Literal      INT            %000041
FILE^FNUM                       Literal      INT            %000051
FILE^FNUM^ADDR                  Literal      INT            %000043
FILE^FWDLINKFCB                 Literal      INT            %000055
FILE^LOGICALFILENAME            Literal      INT            %000402
FILE^LOGICALFILENAME^ADDR       Literal      INT            %000042
FILE^LOGIOOUT                   Literal      INT            %000433
```

```
FILE^OPENACCESS              Literal        INT            %000403
FILE^OPENERSPID              Literal        INT            %000414
FILE^OPENERSPID^ADDR         Literal        INT            %000060
FILE^OPENEXCLUSION           Literal        INT            %000404
FILE^PHYSIOOUT               Literal        INT            %000432
FILE^PRIEXT                  Literal        INT            %000407
FILE^PRINT^ERR^MSG           Literal        INT            %000422
FILE^PROMPT                  Literal        INT            %000430
FILE^RCVEOF                  Literal        INT            %000417
FILE^RCVOPENCNT              Literal        INT            %000416
FILE^RCVUSEROPENREPLY        Literal        INT            %000415
FILE^READ^TRIM               Literal        INT            %000423
FILE^RECORDLEN               Literal        INT            %000405
FILE^SECEXT                  Literal        INT            %000410
FILE^SEQNUM                  Literal        INT            %000052
FILE^SEQNUM^ADDR             Literal        INT            %000046
FILE^SYSTEMMESSAGES          Literal        INT            %000413
FILE^SYSTEMMESSAGESMANY      Literal        INT            %000461
FILE^TRACEBACK               Literal        INT            %000437
FILE^USERFLAG                Literal        INT            %000420
FILE^USERFLAG^ADDR           Literal        INT            %000045
FILE^WRITE^FOLD              Literal        INT            %000425
FILE^WRITE^PAD               Literal        INT            %000426
FILE^WRITE^TRIM              Literal        INT            %000424
FINC                         Define                         $1 :=  $1 + 1F
FORMAT                       Variable       STRING         Direct        P+000
FORTRAN^EXT^DATA             Define                        EXT^DATA.<15>
GETMARKCURRENT               Variable,36    STRUCT         Indirect      MARKUP^DEFS+000
  1 LINENUM                         0,4     INT (32)       Direct
  1 OFFSET                          4,2     INT            Direct
  1 FILENAME[0:11]                  6,2     INT            Direct
GOTO^MAINLOOP                Define                         BEGIN IF MAINLOOP^DEBUGFLAG THEN CALL DEBUG; STACK MAINLOOP
GOTO^MAINLOOP^BLOCK          Block
GP1FCB                       Variable       INT            Indirect      INOUTSTUFF+007
GP2FCB                       Variable       INT            Indirect      INOUTSTUFF+010
GP3FCB                       Variable       INT            Indirect      INOUTSTUFF+011
ICODE^BPT                    Literal        INT            %000451
IGNORECPU                    Variable       STRING         Direct        P+000
IGNORETOGGLES                Variable       INT            Direct        MARKUP^DEFS+011
INBLOCK^TEMPLATE             Variable       TEMPLATE ,400
  1 WORD                            0,2     INT            Direct
  1 BYTE[0:255]                     0,1     STRING         Direct
INBUF                        Variable       INT            Indirect      INOUTSTUFF+016
INBUF^TEMPLATE               Variable       TEMPLATE ,204
  1 WORD                            0,2     INT            Direct
  1 BYTE[0:131]                     0,1     STRING         Direct
INC                          Define                         $1 :=  $1 + 1
INCNT                        Variable       INT            Direct        PARSING^DEFS+000
INCOMPATIBLEOBJECT           Variable       STRING         Direct        P+000
INCONSISTENCY                Variable       STRING         Direct        P+000
INFCB                        Variable       INT            Indirect      INOUTSTUFF+005
INFCBBLOCK                   Variable,400   STRUCT         Indirect      INOUTSTUFF+014
INFILE                       Variable       INT            Indirect      INOUTSTUFF+012
INIT^FILEFCB                 Literal        INT            %000000
INLISTBUFF                   Variable       INT            Indirect      MARKUP^DEFS+016
INLISTFILENAME               Variable       INT            Indirect      MARKUP^DEFS+014
INLISTFN                     Variable       INT            Direct        MARKUP^DEFS+015
```

```
INOUTSTUFF                Block
INSMEM                    Variable     STRING        Direct        P+000
INSPECTADDRESS            Variable     INT (32)      Direct       OBJECT^READING+002
INSPECT^TABLE             Literal      INT           %000003
INSPROCACCESS             Variable     STRING        Direct        P+000
INSTRUCTIONFAIL           Define                     CODE ( LDI 0; INSR )
INTERACTIVE               Define                     ( @INFILE = @OUTFILE )
INUSE                     Variable     STRING        Direct        P+000
INVPIN                    Variable     STRING        Direct        P+000
LABELCMAP                 Define                     <0:1>
LABELCS                   Define                     <0>
LABELLS                   Define                     <1>
LABELPEP                  Define                     <7:15>
LABELSPACEID              Define                     <2:6>
LAYOUT                    Define                     STRUCT  $1; BEGIN INT WORD [ 0:-1 ]; STRING BYTE [ 0:(( $2)-
LDEC                      Define                      $1 :=  $1 '-' 1
LINC                      Define                      $1 :=  $1 '+' 1
LINELENGTHWITHSENTINEL    Literal      INT           %000214
LINES                     Variable     INT           Direct        INOUTSTUFF+024
LINESPERPAGE              Variable     INT           Direct        INOUTSTUFF+025
LINESPERPAGEPRINTER       Literal      INT           %000073
LINESPERPAGETERM          Literal      INT           %000026
LISTINGBYLINE             Variable     STRING        Indirect      MARKUP^DEFS+006
LISTINGLINE               Variable     STRING        Indirect      MARKUP^DEFS+004
LISTINGLINE^I             Variable     INT           Indirect      MARKUP^DEFS+005
LOCTABLECOUNT             Variable     INT           Direct        OBJECT^READING+043
LOCTABLEOFFSET            Variable     INT (32)      Direct        OBJECT^READING+041
MAINLOOP^DEBUGFLAG        Variable     INT           Direct        GOTO^MAINLOOP^BLOCK+004
MAINLOOP^MARK             Variable     FIXED (0)     Direct        GOTO^MAINLOOP^BLOCK+000
MAINLOOP^S                Variable     INT           Direct         S-000
MAINLOOP^SE               Define                     MAINLOOP^S [ 2 ]
MAINLOOP^SL               Define                     MAINLOOP^S [ 3 ]
MAINLOOP^SP               Define                     MAINLOOP^S [ 1 ]
MARKCHAR                  Variable     STRING        Direct        MARKUP^DEFS+003
MARKSPOT                  Literal      INT           %000012
MARKUPSKIPPING            Variable     INT           Direct        MARKUP^DEFS+013
MARKUPTOGGLES             Variable     INT           Indirect      MARKUP^DEFS+012
MARKUP^DEFS               Block
MAX^OPERATION             Literal      INT           %000062
MESSAGE^DEFS              Block
MISSINGINTO               Variable     STRING        Direct        P+000
MOD                       Define                     (  $1 - (  $1 /  $2 ) *  $2 )
MONITOR                   Variable     STRING        Direct        P+000
MUSTBENEW                 Define                     %B0000000000000000000000000100000D
MYSELF                    Variable     STRING        Direct        P+000
NAME^LAYOUT               Define                      LAYOUT (  $1, 8 )
NAME^TEMPLATE             Variable     TEMPLATE ,10
  1 WORD                         0,2   INT           Direct
  1 BYTE[0:7]                    0,1   STRING        Direct
NEITHER                   Variable     STRING        Direct        P+000
NEITHERPINNOROBJECT       Variable     STRING        Direct        P+000
NEITHERPNORL              Variable     STRING        Direct        P+000
NEVERSAVED                Variable     STRING        Direct        P+000
NOFILE                    Variable     STRING        Direct        P+000
NOLIB                     Variable     STRING        Direct        P+000
NOLIBWITHG16              Variable     STRING        Direct        P+000
NOMEASRUN                 Variable     STRING        Direct        P+000
```

```
NOPIN                        Variable      STRING          Direct        P+000
NOPROG                       Variable      STRING          Direct        P+000
NOSAVEVOL                    Variable      STRING          Direct        P+000
NOSERVER                     Variable      STRING          Direct        P+000
NOSYMBOLS                    Variable      STRING          Direct        P+000
NOTANOBJECT                  Variable      STRING          Direct        P+000
NOTBIT                       Define                        $COMP ( BIT (  $1 ) )
NOTBITMAP                    Variable      STRING          Direct        P+000
NOTHINGTOMERGE               Variable      STRING          Direct        P+000
NOTINSTALLED                 Variable      STRING          Direct        P+000
NOTINTABLE                   Variable      STRING          Direct        P+000
NOTINTERACTIVE               Variable      STRING          Direct        P+000
NOTLOCAL                     Variable      STRING          Direct        P+000
NOTNUM                       Variable      STRING          Direct        P+000
NOTRUN                       Variable      STRING          Direct        P+000
NOTSUPPORTED                 Variable      STRING          Direct        P+000
NOWAIT                       Define                        %B0000000000000000000100000000D
NUM^PARAMS^WHEN^VAR          Define                        ENTRY^ATTRIBUTE.<11:15>
OBJECT^FILE^HEADER^DEF       Variable      TEMPLATE ,1000
   1 EPIL^ADDR                      0,4    INT (32)        Direct
   1 EPFL^ADDR                      4,4    INT (32)        Direct
   1 IPIL^ADDR                     10,4    INT (32)        Direct
   1 IPFL^ADDR                     14,4    INT (32)        Direct
   1 GCSFL^ADDR                    20,4    INT (32)        Direct
   1 GCWFL^ADDR                    24,4    INT (32)        Direct
   1 DATA^AREA^ADDR                30,4    INT (32)        Direct
   1 CODE^AREA^ADDR                34,4    INT (32)        Direct
   1 IPIL^MAIN                     40,4    INT (32)        Direct
   1 EPIL^LENGTH                   44,2    INT             Direct
   1 EPFL^LENGTH                   46,2    INT             Direct
   1 IPIL^LENGTH                   50,2    INT             Direct
   1 IPFL^LENGTH                   52,2    INT             Direct
   1 GCSFL^LENGTH                  54,2    INT             Direct
   1 GCWFL^LENGTH                  56,2    INT             Direct
   1 DATA^AREA^LENGTH              60,2    INT             Direct
   1 CODE^AREA^LENGTH              62,2    INT             Direct
   1 PCRIEV^PEP^SIZE               64,2    INT             Direct
   1 INITIAL^P                     66,2    INT             Direct
   1 NUM^NONPRIV                   70,2    INT             Direct
   1 NUM^CALLABLE                  72,2    INT             Direct
   1 NUM^PRIVILEGED                74,2    INT             Direct
   1 RESIDENT^SIZE                 76,2    INT             Direct
   1 INITIAL^L                    100,2    INT             Direct
   1 NUM^DATA^PAGES               102,2    INT             Direct
   1 GLOBAL^CODE^SIZE             104,2    INT             Direct
   1 OBJECT^VERSION               106,2    INT             Direct
   1 FILLER                       110,1
   1 XEP^FLAG                     126,2    INT             Direct
   1 FILLER                       130,1
   1 USERLIB^EXTENT               154,4    INT (32)        Direct
   1 USERLIB^MOD[0:2]             160,2    INT             Direct
   1 USERLIB^NAME[0:11]           166,2    INT             Direct
   1 FILLER                       216,1
   1 DATA^BITMAP[0:3]             224,2    INT             Direct
   1 FILLER                       234,1
   1 BINDER^ADDR                  236,4    INT (32)        Direct
   1 INSPECT^ADDR                 242,4    INT (32)        Direct
```

```
  1 BINDER^LENGTH                    246,4     INT (32)        Direct
  1 INSPECT^LENGTH                   252,4     INT (32)        Direct
  1 CPU^VERSION                      256,2     INT             Direct
  1 LANGUAGE^MASK                    260,2     INT             Direct
  1 DEBUG^FLAGS                      262,2     INT             Direct
  1 BINDER^TIMESTAMP[0:2]            264,2     INT             Direct
  1 ESIL^ADDR                        272,4     INT (32)        Direct
  1 ESIL^LENGTH                      276,2     INT             Direct
  1 CSIL^ADDR                        300,4     INT (32)        Direct
  1 CSIL^LENGTH                      304,2     INT             Direct
  1 INITIAL^SPACE                    306,2     INT             Direct
  1 PROCESS^SUBTYPE                  310,2     INT             Direct
  1 EXT^DATA                         312,2     INT             Direct
  1 IPIL^LENGTH^D                    314,4     INT (32)        Direct
  1 IPFL^LENGTH^D                    320,4     INT (32)        Direct
  1 OBJECT^FLAGS                     324,2     INT             Direct
  1 MINIMUM^GUARDIAN^VERSION         326,2     INT             Direct
  1 RTDUL^ADDR                       330,4     INT (32)        Direct
  1 RTDUL^LENGTH                     334,4     INT (32)        Direct
  1 FILLER                           340,1
OBJECT^FLAGS^NO^FIXUPS           Define                        OBJECT^FLAGS.<0>
OBJECT^FLAGS^NO^MAIN             Define                        OBJECT^FLAGS.<1>
OBJECT^FLAGS^UNDEF^DATA          Define                        OBJECT^FLAGS.<2>
OBJECT^FLAGS^UNRES^DATA^REF      Define                        OBJECT^FLAGS.<3>
OBJECT^HASH^DIVISOR              Literal       INT             %000001
OBJECT^HASH^MULTIPLIER           Literal       INT             %000003
OBJECT^HEADER^C                  Define                        PCRIEV^PEP^SIZE.<1>
OBJECT^HEADER^E                  Define                        PCRIEV^PEP^SIZE.<4>
OBJECT^HEADER^I                  Define                        PCRIEV^PEP^SIZE.<3>
OBJECT^HEADER^P                  Define                        PCRIEV^PEP^SIZE.<0>
OBJECT^HEADER^PEP^SIZE           Define                        PCRIEV^PEP^SIZE.<7:15>
OBJECT^HEADER^R                  Define                        PCRIEV^PEP^SIZE.<2>
OBJECT^HEADER^V                  Define                        PCRIEV^PEP^SIZE.<5>
OBJECT^READING                   Block
OK                               Variable      STRING          Direct     P+000
OPENACCESSTYPE                   Define                        ( IF  $2.<4:9> = 6 THEN READWRITE^ACCESS ELSE (  $1 ) )
OPENEXCLUSIONTYPE                Define                        ( CASE (  $2 ).<4:9> OF BEGIN SHARE; SHARE; EXCLUSIVE; (  $1
OUTBLOCK^TEMPLATE                Variable      TEMPLATE ,2000
  1 WORD                               0,2     INT             Direct
  1 BYTE[0:1023]                       0,1     STRING          Direct
OUTBUF                           Variable      INT             Indirect      INOUTSTUFF+020
OUTBUF^TEMPLATE                  Variable      TEMPLATE ,204
  1 WORD                               0,2     INT             Direct
  1 BYTE[0:131]                        0,1     STRING          Direct
OUTFCB                           Variable      INT             Indirect      INOUTSTUFF+006
OUTFCBBLOCK                      Variable,2000 STRUCT          Indirect      INOUTSTUFF+015
OUTFILE                          Variable      INT             Indirect      INOUTSTUFF+013
OUTLISTBUFF                      Variable      INT             Indirect      MARKUP^DEFS+021
OUTLISTFILENAME                  Variable      INT             Indirect      MARKUP^DEFS+017
OUTLISTFN                        Variable      INT             Direct        MARKUP^DEFS+020
PAGE                             Variable      INT             Direct        INOUTSTUFF+023
PAGEHEAD                         Variable,40   STRUCT          Indirect      INOUTSTUFF+026
PAGEHEAD^TEMPLATE                Variable      TEMPLATE ,40
  1 FADR                               0,2     INT             Direct
  1 P[0:14]                            2,2     INT             Direct
PAGING                           Variable      INT             Direct        INOUTSTUFF+022
PARAMMSG^LAYOUT                  Define                         BEGIN^LAYOUT (  $1 ) INT TYPE; INT NUMPARAMS; LAYOUT ( PARA
```

```
PARAMMSG^TEMPLATE              Variable      TEMPLATE ,2004
  1 WORD                              0,2    INT              Direct
  1 BYTE                              0,1    STRING           Direct
  1 TYPE                              0,2    INT              Direct
  1 NUMPARAMS                         2,2    INT              Direct
  1 PARAMS                            4,2000  SUBSTRUCT
    2 WORD                            4,2    INT              Direct
    2 BYTE[0:1023]                    4,1    STRING           Direct
PARAMMSG^TYPE                  Literal       INT              %177776
PARAM^COMMANDS^ONLY            Variable      INT              Direct       PARSING^DEFS+022
PARAM^ID^LIST                  Variable      TEMPLATE ,6
  1 PARAM^MODE                        0,2    INT              Direct
  1 PARAM^ID                          2,4    INT (32)         Direct
PARAM^ID^LIST^DEFINE           Define                         BEGIN INT PARAM^MODE; INT(32) PARAM^ID; END
PARAM^INFO^LIST                Variable      TEMPLATE ,16
  1 PARAM^MODE                        0,2    INT              Direct
  1 PARAM^STORAGE                     2,14    SUBSTRUCT
    2 STORAGE^TYPE                    2,2    INT              Direct
    2 ELEMENT^LEN                     4,2    INT              Direct
    2 UNIT^SIZE                       6,6     SUBSTRUCT
      3 VARIABLE^FLAGS                6,1    STRING           Direct
      3 COMPILE^CONSTANT              7,1    STRING           Direct
      3 VALUE                        10,4    INT (32)         Direct
    2 SCALE^FACTOR                   14,2    INT              Direct
PARAM^INFO^LIST^DEFINE         Define                         BEGIN INT PARAM^MODE; STRUCT PARAM^STORAGE; STORAGE^INFO^DEF
PARAM^MAX                      Literal       INT              %000035
PARSING^DEFS                   Block
PASCAL^EXT^DATA                Define                         EXT^DATA.<13>
PATTRIB                        Variable      TEMPLATE ,3
  1 RES^FLAG                          0,1    STRING           Direct
  1 INT^FLAG                          1,1    STRING           Direct
  1 PRIVATE^FLAG                      2,1    STRING           Direct
PATTRIB^DEFINE                 Define                         BEGIN STRING RES^FLAG; STRING INT^FLAG; STRING PRIVATE^FLAG;
PDEC                           Define                         @ $1 := @ $1 [ -1 ]
PERIODOFFSET                   Literal       INT              %000006
PINC                           Define                         @ $1 := @ $1 [ 1 ]
PITENTRYADDR                   Variable      INT (32)         Direct       OBJECT^READING+004
PITENTRYCOUNT                  Variable      INT (32)         Direct       OBJECT^READING+006
PIT^ENTRY^BASE                 Variable      TEMPLATE ,522
  1 TOTAL^LENGTH                      0,4    INT (32)         Direct
  1 PRIMARY^ENTRY                     4,4    INT (32)         Direct
  1 BLOCK^LENGTH                     10,4    INT (32)         Direct
  1 FILE^OFFSET                      14,4    INT (32)         Direct
  1 SOURCE^FILE[0:11]                20,2    INT              Direct
  1 COMPILATION^TIMESTAMP[0:2]       50,2    INT              Direct
  1 LANGUAGE                         56,2    INT              Direct
  1 COMPATIBILITY^LEVEL              60,2    INT              Direct
  1 COMPILER^PRODUCT[0:7]            62,1    STRING           Direct
  1 FIRST^WORD^ADDRESS               72,4    INT (32)         Direct
  1 BLOCK^MODIFIED                   76,2    INT              Direct
  1 BLOCK^FLAGS                     100,2    INT              Direct
  1 PROC^ATTRIBUTE                  102,2    INT              Direct
  1 LOCAL^STORAGE                   104,2    INT              Direct
  1 ABSOLUTE^REFERENCE              106,2    INT              Direct
  1 INSPECT^OFFSET                  110,4    INT (32)         Direct
  1 INSPECT^LENGTH                  114,4    INT (32)         Direct
  1 LEXICAL^LEVEL                   120,2    INT              Direct
```

```
  1 BLOCK^NAME[0:255]              122,1        STRING          Direct
PIT^HASH^TABLE                  Literal         INT             %000004
PIT^TABLE                       Literal         INT             %000000
PPDENT^LAYOUT                   Define                          BEGIN^LAYOUT (  $1 ) CRT^LAYOUT ( CRT ); INT PID1; INT PID2;
PPDENT^TEMPLATE                 Variable        TEMPLATE ,22
  1 WORD                             0,2        INT             Direct
  1 BYTE                             0,1        STRING          Direct
  1 CRT                              0,6         SUBSTRUCT
    2 WORD                           0,2        INT             Direct
    2 BYTE[0:5]                      0,1        STRING          Direct
  1 PID1                             6,2        INT             Direct
  1 PID2                            10,2        INT             Direct
  1 ANCESTOR                        12,10        SUBSTRUCT
    2 WORD                          12,2        INT             Direct
    2 BYTE                          12,1        STRING          Direct
    2 CRT                           12,6         SUBSTRUCT
      3 WORD                        12,2        INT             Direct
      3 BYTE[0:5]                   12,1        STRING          Direct
    2 PID                           20,2        INT             Direct
PRINT^ERR^MSG                   Define                          %B000000000000000000000000001000D
PRIVNOTALLOWED                  Variable        STRING          Direct          P+000
PRMPTCNT                        Literal         INT             %000017
PROCEDURE                       Variable,122    STRUCT          Indirect        OBJECT^READING+035
  1 NAME[0:31]                       0,1        STRING          Direct
  1 SPACEID                         40,2        INT             Direct
  1 OFFSET                          42,2        INT             Direct
  1 LENGTH                          44,4        INT (32)        Direct
  1 COMPILATIONTIMESTAMP[0:2]       50,2        INT             Direct
  1 HASINSPECT                      56,2        INT             Direct
  1 SOURCEFILENAME[0:11]            60,2        INT             Direct
  1 SOURCEFILELINE                 110,4        INT (32)        Direct
  1 SOURCEFILETIMESTAMP[0:2]       114,2        INT             Direct
PROC^ATTRIBUTE^512              Define                          PROC^ATTRIBUTE.<9>
PROC^ATTRIBUTE^I                Define                          PROC^ATTRIBUTE.<3>
PROC^ATTRIBUTE^NONSTOP          Define                          PROC^ATTRIBUTE.<8>
PROC^ATTRIBUTE^PRIVATE          Define                          PROC^ATTRIBUTE.<10>
PROC^ATTRIBUTE^R                Define                          PROC^ATTRIBUTE.<2>
PROMPT                          Variable        STRING          Direct          PARSING^DEFS+006
PROTECTED                       Literal         INT             %000003
PTRIN                           Variable        STRING          Indirect        INOUTSTUFF+017
PTROUT                          Variable        STRING          Indirect        INOUTSTUFF+021
PTRSAVE                         Variable        STRING          Indirect        PARSING^DEFS+003
PURGE^DATA                      Define                          %B00000000000000000000000100000D
QUICKBUFFER                     Variable,4000   STRUCT          Indirect        OBJECT^READING+072
  1 WORD                             0,2        INT             Direct
  1 BYTE[0:2047]                     0,1        STRING          Direct
QUICKEOF                        Variable        INT (32)        Direct          OBJECT^READING+070
QUICKLENGTH                     Variable        INT             Direct          OBJECT^READING+067
QUICKPOSITION                   Variable        INT (32)        Direct          OBJECT^READING+065
RCVFCB                          Variable        INT             Indirect        INOUTSTUFF+003
RCVFILE                         Variable        INT             Indirect        INOUTSTUFF+003
READWRITE^ACCESS                Literal         INT             %000000
READ^ACCESS                     Literal         INT             %000001
READ^TRIM                       Define                          %B000000000000000000100000000000D
REFERENCE^ENTRY                 Variable        TEMPLATE ,6
  1 REFERENCING^OFFSET               0,4        INT (32)        Direct
  1 INDIRECTION                      4,2        INT             Direct
```

```
REFERENCE^ENTRY^DEFINE           Define                                BEGIN INT(32) REFERENCING^OFFSET; INT INDIRECTION; END
REFERENCE^OFFSET                 Variable        TEMPLATE ,12
  1 REFERENCING^OFFSET                  0,4      INT (32)              Direct
  1 OFFSET^REFERENCED                   4,4      INT (32)              Direct
  1 REFERENCE^FLAGS                    10,2      INT                   Direct
REFERENCE^OFFSET^DEFINE          Define                                BEGIN INT(32) REFERENCING^OFFSET; INT(32) OFFSET^REFERENCED;
REFERENCE^TYPE                   Define                                REFERENCE^FLAGS.<2:15>
REF^LIST                         Variable        TEMPLATE ,12
  1 CALLER                              0,4      INT (32)              Direct
  1 OFFSET                              4,4      INT (32)              Direct
  1 REF^TYPE                           10,2      INT                   Direct
REF^LIST^DEFINE                  Define                                BEGIN INT(32) CALLER; INT(32) OFFSET; INT REF^TYPE; END
RTDU^ENTRY^BASE                  Variable        TEMPLATE ,121
  1 TOTAL^LENGTH                        0,4      INT (32)              Direct
  1 TYPE                                4,4      INT (32)              Direct
  1 BLOCK^LENGTH                       10,4      INT (32)              Direct
  1 FILE^OFFSET                        14,4      INT (32)              Direct
  1 SOURCE^FILE[0:11]                  20,2      INT                   Direct
  1 COMPILATION^TIMESTAMP[0:2]         50,2      INT                   Direct
  1 LANGUAGE                           56,2      INT                   Direct
  1 BLOCK^NAME[0:32]                   60,1      STRING                Direct
RTDU^HASH^TABLE                  Literal         INT                   %000012
RTDU^TABLE                       Literal         INT                   %000011
RUCB                             Variable        INT                   Indirect      INOUTSTUFF+001
SAMEFN                           Variable        INT                   Direct        OBJECT^READING+000
SAVE                             Variable        INT                   Indirect      PARSING^DEFS+002
SAVECHAR                         Variable        INT                   Direct        PARSING^DEFS+005
SAVECNT                          Variable        INT                   Direct        PARSING^DEFS+004
SEGMENT^INFO                     Variable        TEMPLATE ,20
  1 SIZE                                0,4      INT (32)              Direct
  1 ADDR^IN^FILE                        4,4      INT (32)              Direct
  1 ID                                 10,2      INT                   Direct
  1 INIT^SEGS                          12,2      INT                   Direct
  1 MORE^DATA                          14,4      INT (32)              Direct
SEG^DESCRIP                      Variable,14     STRUCT                Direct        #GLOBAL+000
  1 ADDR                                0,4      INT (32)              Direct
  1 BIT^MAP[0:3]                        4,2      INT                   Direct
SERVERFN                         Variable        INT                   Direct        SERVER^DEFS+014
SERVERNAME                       Variable        INT                   Direct        SERVER^DEFS+000
SERVERNAME^S                     Variable        STRING                Direct        SERVER^DEFS+000
SERVER^DEFS                      Block
SET^ABORT^XFERERR                Literal         INT                   %000021
SET^BREAKHIT                     Literal         INT                   %000036
SET^CHECKSUM                     Literal         INT                   %000057
SET^COUNTXFERRED                 Literal         INT                   %000034
SET^CRLF^BREAK                   Literal         INT                   %000027
SET^DUPFILE                      Literal         INT                   %000012
SET^EDITREAD^REPOSITION          Literal         INT                   %000040
SET^ERROR                        Literal         INT                   %000035
SET^ERRORFILE                    Literal         INT                   %000031
SET^LOGIOOUT                     Literal         INT                   %000033
SET^MAINLOOP                     Define                                 BEGIN STACK MYPID; CODE ( STRP $RP-1 ); STACK @ $1, MAINLOO
SET^OPENERSPID                   Literal         INT                   %000014
SET^PHYSIOOUT                    Literal         INT                   %000032
SET^PRINT^ERR^MSG                Literal         INT                   %000022
SET^PROMPT                       Literal         INT                   %000030
SET^RCVEOF                       Literal         INT                   %000017
```

```
SET^RCVOPENCNT              Literal     INT          %000016
SET^RCVUSEROPENREPLY        Literal     INT          %000015
SET^READ^TRIM               Literal     INT          %000023
SET^SYSTEMMESSAGES          Literal     INT          %000013
SET^SYSTEMMESSAGESMANY      Literal     INT          %000061
SET^TRACEBACK               Literal     INT          %000037
SET^USERFLAG                Literal     INT          %000020
SET^WRITE^FOLD              Literal     INT          %000025
SET^WRITE^PAD               Literal     INT          %000026
SET^WRITE^TRIM              Literal     INT          %000024
SHARE                       Literal     INT          %000000
SIOERR^ACCESSVIOLATION      Literal     INT          %001015
SIOERR^BLOCKINGREQD         Literal     INT          %001017
SIOERR^BUFTOOSMALL          Literal     INT          %001006
SIOERR^CANTOPENRECV         Literal     INT          %001023
SIOERR^CHECKSUM             Literal     INT          %001027
SIOERR^CHECKSUMCOMM         Literal     INT          %001026
SIOERR^DEVNOTSUPPORTED      Literal     INT          %001002
SIOERR^EDITDIROVERFLOW      Literal     INT          %001020
SIOERR^EDITREADERR          Literal     INT          %001013
SIOERR^FILEALREADYOPEN      Literal     INT          %001012
SIOERR^FILENOTOPEN          Literal     INT          %001014
SIOERR^INTERNAL             Literal     INT          %001025
SIOERR^INVALIDACCESS        Literal     INT          %001003
SIOERR^INVALIDBLKLENGTH     Literal     INT          %001007
SIOERR^INVALIDBUFADDR       Literal     INT          %001004
SIOERR^INVALIDEDITFILE      Literal     INT          %001011
SIOERR^INVALIDEDITWRITE     Literal     INT          %001021
SIOERR^INVALIDFILECODE      Literal     INT          %001005
SIOERR^INVALIDPARAM         Literal     INT          %001000
SIOERR^INVALIDRECLENGTH     Literal     INT          %001010
SIOERR^INVALIDRECVWRITE     Literal     INT          %001022
SIOERR^IORESTARTED          Literal     INT          %001024
SIOERR^MISSINGFILENAME      Literal     INT          %001001
SIOERR^NOSTACKSPACE         Literal     INT          %001016
SIZEOFCOVERBITMAPSEGMENT    Literal     INT (32)     %000002 000000
SIZEOFCOVERSPACEBITMAP      Literal     INT (32)     %000000 020000
SOURCEORDNAME               Variable    INT          Direct        OBJECT^READING+046
SOURCEORDNUMBER             Variable    INT          Direct        OBJECT^READING+045
SOURCEORDTIMESTAMP          Variable    INT          Direct        OBJECT^READING+062
SPACEDIF                    Variable    STRING       Direct          P+000
SPECIAL^CODE                Define                   BLOCK^TYPE^CODE.<0:13>
STARTED                     Variable    STRING       Direct          P+000
STARTSOURCECOL              Literal     INT          %000031
STARTUPMSG^LAYOUT           Define                    BEGIN^LAYOUT (  $1 ) INT TYPE; DEFAULTS^LAYOUT ( DEFAULTS )
STARTUPMSG^TEMPLATE         Variable    TEMPLATE ,1122
  1 WORD                          0,2   INT          Direct
  1 BYTE                          0,1   STRING       Direct
  1 TYPE                          0,2   INT          Direct
  1 DEFAULTS                      2,20   SUBSTRUCT
    2 WORD                        2,2   INT          Direct
    2 BYTE                        2,1   STRING       Direct
    2 VOLUME                      2,10   SUBSTRUCT
      3 WORD                      2,2   INT          Direct
      3 BYTE[0:7]                 2,1   STRING       Direct
    2 SUBVOL                     12,10   SUBSTRUCT
      3 WORD                     12,2   INT          Direct
```

```
      3 BYTE[0:7]                     12,1       STRING           Direct
  1 IN                                22,30       SUBSTRUCT
    2 WORD                            22,2       INT              Direct
    2 BYTE                            22,1       STRING           Direct
    2 VOLUME                          22,10       SUBSTRUCT
      3 WORD                          22,2       INT              Direct
      3 BYTE[0:7]                     22,1       STRING           Direct
    2 SUBVOL                          32,10       SUBSTRUCT
      3 WORD                          32,2       INT              Direct
      3 BYTE[0:7]                     32,1       STRING           Direct
    2 FILE                            42,10       SUBSTRUCT
      3 WORD                          42,2       INT              Direct
      3 BYTE[0:7]                     42,1       STRING           Direct
  1 OUT                               52,30       SUBSTRUCT
    2 WORD                            52,2       INT              Direct
    2 BYTE                            52,1       STRING           Direct
    2 VOLUME                          52,10       SUBSTRUCT
      3 WORD                          52,2       INT              Direct
      3 BYTE[0:7]                     52,1       STRING           Direct
    2 SUBVOL                          62,10       SUBSTRUCT
      3 WORD                          62,2       INT              Direct
      3 BYTE[0:7]                     62,1       STRING           Direct
    2 FILE                            72,10       SUBSTRUCT
      3 WORD                          72,2       INT              Direct
      3 BYTE[0:7]                     72,1       STRING           Direct
  1 PARAM                            102,1020     SUBSTRUCT
    2 WORD                           102,2       INT              Direct
    2 BYTE[0:527]                    102,1       STRING           Direct
STARTUPMSG^TYPE               Literal            INT              %177777
STATEMENT                     Variable,36        STRUCT           Indirect      OBJECT^READING+044
  1 LINENUM                            0,4       INT (32)         Direct
  1 OFFSET                             4,2       INT              Direct
  1 FILENAME[0:11]                     6,2       INT              Direct
STOPBYLINESCAN                Variable           INT              Direct        MARKUP^DEFS+007
STORAGE^INFO                  Variable           TEMPLATE ,14
  1 STORAGE^TYPE                       0,2       INT              Direct
  1 ELEMENT^LEN                        2,2       INT              Direct
  1 UNIT^SIZE                          4,6        SUBSTRUCT
    2 VARIABLE^FLAGS                   4,1       STRING           Direct
    2 COMPILE^CONSTANT                 5,1       STRING           Direct
    2 VALUE                            6,4       INT (32)         Direct
  1 SCALE^FACTOR                      12,2       INT              Direct
STORAGE^INFO^DEFINE           Define                              BEGIN INT STORAGE^TYPE; INT ELEMENT^LEN; STRUCT UNIT^SIZE; B
SUPERONLY                     Variable           STRING           Direct         P+000
SYNTAXERR                     Variable           STRING           Direct         P+000
T9618C00^15JUL87^GLOBAL^29APR7 Proc                               %000000
TABLEFULL                     Variable           STRING           Direct         P+000
TABLE^STATUS                  Variable           TEMPLATE ,24
  1 HASH^LOCATION                      0,4       INT (32)         Direct
  1 HASH^LENGTH                        4,4       INT (32)         Direct
  1 FIRST^ENTRY                       10,4       INT (32)         Direct
  1 LAST^ENTRY                        14,4       INT (32)         Direct
  1 ENTRY^COUNT                       20,4       INT (32)         Direct
TABLE^STATUS^DEFINE           Define                              BEGIN INT(32) HASH^LOCATION; INT(32) HASH^LENGTH; INT(32) FI
TERMFCB                       Variable           INT              Indirect      INOUTSTUFF+004
TERMFILE                      Variable           INT              Indirect      INOUTSTUFF+004
TESTINS                       Define                               CODE ( ZERD; SCMP; LCMP )
```

```
TOUCH                            Define                          BEGIN STACK  $1; CODE ( STRP 7 ); END
TRAPSON                          Define                          CODE ( RDE; ORRI %200; SETE )
TRUE                             Literal        INT              %177777
UDBIT^ENTRY^BASE                 Variable       TEMPLATE ,45
  1 TOTAL^LENGTH                        0,4     INT (32)         Direct
  1 BLOCK^NAME[0:32]                    4,1     STRING           Direct
UDBIT^HASH^TABLE                 Literal        INT              %000010
UDBIT^TABLE                      Literal        INT              %000007
UNABLEALLOC                      Variable       STRING           Direct          P+000
UNKNOWNRO^                       Variable       STRING           Direct          P+000
UPCASE                           Define                          ( IF $ALPHA (  $1 ) THEN (  $1 ) LAND UPCASEMASK ELSE (  $1
UPCASEMASK                       Define                          %157737
USERIDGROUP                      Define                          <0:7>
USERIDNAME^LAYOUT                Define                          BEGIN^LAYOUT (  $1 ) INT USERID [ 0:-1 ]; NAME^LAYOUT ( GROU
USERIDNAME^TEMPLATE              Variable       TEMPLATE ,20
  1 WORD                                0,2     INT              Direct
  1 BYTE                                0,1     STRING           Direct
  1 USERID                              0,2     INT              Direct
  1 GROUPNAME                           0,10     SUBSTRUCT
     2 WORD                             0,2     INT              Direct
     2 BYTE[0:7]                        0,1     STRING           Direct
  1 USERNAME                           10,10     SUBSTRUCT
     2 WORD                            10,2     INT              Direct
     2 BYTE[0:7]                       10,1     STRING           Direct
USERIDUSER                       Define                          <8:15>
VAR^FORMAT                       Define                          %B000000000000000000100000000D
WARNBEGINEND                     Variable       STRING           Direct          P+000
WARNBIND                         Variable       STRING           Direct          P+000
WARNSKIP                         Variable       STRING           Direct          P+000
WHICH^OFFSET                     Define                          REFERENCE^FLAGS.<0>
WRITE^ACCESS                     Literal        INT              %000002
WRITE^FOLD                       Define                          %B000000000000000100000000000D
WRITE^PAD                        Define                          %B000000000000001000000000000D
WRITE^TRIM                       Define                          %B000000000000000010000000000D
XFILENAME^LAYOUT                 Define                           LAYOUT (  $1, 36 )
XFILENAME^TEMPLATE               Variable       TEMPLATE ,44
  1 WORD                                0,2     INT              Direct
  1 BYTE[0:35]                          0,1     STRING           Direct


ENTRY POINT MAP BY NAME

SP  PEP  BASE    LIMIT   ENTRY   ATTRS   NAME                             DATE     TIME   LANGUAGE  SOURCE FILE

00  002  002330  002330  002330          T9618C00^15JUL87^GLOBAL^29APR7   29APR87  13:16  TAL       $OVER.T9618C00.SVERSION
```

READ ONLY DATA BLOCK MAP BY NAME

| SP | BASE | LIMIT | TYPE | MODE | NAME | DATE | TIME | LANGUAGE | SOURCE FILE |
|---|---|---|---|---|---|---|---|---|---|
| 00 | C000704 | 000722 | COMMON | STRING | ALREADYIN | 29APR87 | 13:16 | TAL | $OVER.T9618C00.SCOVERCM |
| 00 | C002026 | 002040 | COMMON | STRING | ASSUMESECONDS | 29APR87 | 13:16 | TAL | $OVER.T9618C00.SCOVERCM |
| 00 | C000125 | 000134 | COMMON | STRING | BINTOHEX | 29APR87 | 13:16 | TAL | $OVER.T9618C00.SCOVERCM |
| 00 | C000135 | 000155 | COMMON | STRING | BOTHBANDS | 29APR87 | 13:16 | TAL | $OVER.T9618C00.SCOVERCM |
| 00 | C000156 | 000173 | COMMON | STRING | BOTHPANDF | 29APR87 | 13:16 | TAL | $OVER.T9618C00.SCOVERCM |
| 00 | C000420 | 000446 | COMMON | STRING | CODEREQ | 29APR87 | 13:16 | TAL | $OVER.T9618C00.SCOVERCM |
| 00 | C000003 | 000123 | COMMON | STRING | COMMANDS | 29APR87 | 13:16 | TAL | $OVER.T9618C00.SCOVERCM |
| 00 | C000220 | 000236 | COMMON | STRING | CRCBINUSE | 29APR87 | 13:16 | TAL | $OVER.T9618C00.SCOVERCM |
| 00 | C002012 | 002025 | COMMON | STRING | DIFFERENTOBJECTSIZES | 29APR87 | 13:16 | TAL | $OVER.T9618C00.SCOVERCM |
| 00 | C001576 | 001644 | COMMON | STRING | DIFFERENTPROGS | 29APR87 | 13:16 | TAL | $OVER.T9618C00.SCOVERCM |
| 00 | C001646 | 001721 | COMMON | STRING | DIFFERENTTIMESTAMPS | 29APR87 | 13:16 | TAL | $OVER.T9618C00.SCOVERCM |
| 00 | C000447 | 000457 | COMMON | STRING | DISABLED | 29APR87 | 13:16 | TAL | $OVER.T9618C00.SCOVERCM |
| 00 | C000461 | 000476 | COMMON | STRING | ENABLEDNOPRIV | 29APR87 | 13:16 | TAL | $OVER.T9618C00.SCOVERCM |
| 00 | C000477 | 000512 | COMMON | STRING | ENABLEDPRIV | 29APR87 | 13:16 | TAL | $OVER.T9618C00.SCOVERCM |
| 00 | C000240 | 000270 | COMMON | STRING | ENABLEFE | 29APR87 | 13:16 | TAL | $OVER.T9618C00.SCOVERCM |
| 00 | C000272 | 000332 | COMMON | STRING | ENABLENP | 29APR87 | 13:16 | TAL | $OVER.T9618C00.SCOVERCM |
| 00 | C000610 | 000620 | COMMON | STRING | ERRORONF | 29APR87 | 13:16 | TAL | $OVER.T9618C00.SCOVERCM |
| 00 | C000622 | 000632 | COMMON | STRING | ERRORONFOCTAL | 29APR87 | 13:16 | TAL | $OVER.T9618C00.SCOVERCM |
| 00 | C000657 | 000702 | COMMON | STRING | FORMAT | 29APR87 | 13:16 | TAL | $OVER.T9618C00.SCOVERCM |
| 00 | C002050 | 002100 | COMMON | STRING | IGNORECPU | 29APR87 | 13:16 | TAL | $OVER.T9618C00.SCOVERCM |
| 00 | C001467 | 001512 | COMMON | STRING | INCOMPATIBLEOBJECT | 29APR87 | 13:16 | TAL | $OVER.T9618C00.SCOVERCM |
| 00 | C002246 | 002305 | COMMON | STRING | INCONSISTENCY | 29APR87 | 13:16 | TAL | $OVER.T9618C00.SCOVERCM |
| 00 | C000761 | 000777 | COMMON | STRING | INSMEM | 29APR87 | 13:16 | TAL | $OVER.T9618C00.SCOVERCM |
| 00 | C001000 | 001017 | COMMON | STRING | INSPROCACCESS | 29APR87 | 13:16 | TAL | $OVER.T9618C00.SCOVERCM |
| 00 | C001072 | 001115 | COMMON | STRING | INUSE | 29APR87 | 13:16 | TAL | $OVER.T9618C00.SCOVERCM |
| 00 | C001020 | 001034 | COMMON | STRING | INVPIN | 29APR87 | 13:16 | TAL | $OVER.T9618C00.SCOVERCM |
| 00 | C001137 | 001151 | COMMON | STRING | MISSINGINTO | 29APR87 | 13:16 | TAL | $OVER.T9618C00.SCOVERCM |
| 00 | C000334 | 000355 | COMMON | STRING | MONITOR | 29APR87 | 13:16 | TAL | $OVER.T9618C00.SCOVERCM |
| 00 | C000356 | 000370 | COMMON | STRING | MYSELF | 29APR87 | 13:16 | TAL | $OVER.T9618C00.SCOVERCM |
| 00 | C001152 | 001173 | COMMON | STRING | NEITHER | 29APR87 | 13:16 | TAL | $OVER.T9618C00.SCOVERCM |
| 00 | C001174 | 001216 | COMMON | STRING | NEITHERPINNOROBJECT | 29APR87 | 13:16 | TAL | $OVER.T9618C00.SCOVERCM |
| 00 | C001217 | 001244 | COMMON | STRING | NEITHERPNORL | 29APR87 | 13:16 | TAL | $OVER.T9618C00.SCOVERCM |
| 00 | C001376 | 001417 | COMMON | STRING | NEVERSAVED | 29APR87 | 13:16 | TAL | $OVER.T9618C00.SCOVERCM |
| 00 | C001245 | 001262 | COMMON | STRING | NOFILE | 29APR87 | 13:16 | TAL | $OVER.T9618C00.SCOVERCM |
| 00 | C002101 | 002112 | COMMON | STRING | NOLIB | 29APR87 | 13:16 | TAL | $OVER.T9618C00.SCOVERCM |
| 00 | C001036 | 001071 | COMMON | STRING | NOLIBWITHG16 | 29APR87 | 13:16 | TAL | $OVER.T9618C00.SCOVERCM |
| 00 | C001321 | 001342 | COMMON | STRING | NOMEASRUN | 29APR87 | 13:16 | TAL | $OVER.T9618C00.SCOVERCM |
| 00 | C001343 | 001355 | COMMON | STRING | NOPIN | 29APR87 | 13:16 | TAL | $OVER.T9618C00.SCOVERCM |
| 00 | C002114 | 002125 | COMMON | STRING | NOPROG | 29APR87 | 13:16 | TAL | $OVER.T9618C00.SCOVERCM |
| 00 | C001420 | 001436 | COMMON | STRING | NOSAVEVOL | 29APR87 | 13:16 | TAL | $OVER.T9618C00.SCOVERCM |
| 00 | C000571 | 000606 | COMMON | STRING | NOSERVER | 29APR87 | 13:16 | TAL | $OVER.T9618C00.SCOVERCM |
| 00 | C001263 | 001300 | COMMON | STRING | NOSYMBOLS | 29APR87 | 13:16 | TAL | $OVER.T9618C00.SCOVERCM |
| 00 | C001514 | 001541 | COMMON | STRING | NOTANOBJECT | 29APR87 | 13:16 | TAL | $OVER.T9618C00.SCOVERCM |
| 00 | C000634 | 000655 | COMMON | STRING | NOTBITMAP | 29APR87 | 13:16 | TAL | $OVER.T9618C00.SCOVERCM |
| 00 | C001302 | 001320 | COMMON | STRING | NOTHINGTOMERGE | 29APR87 | 13:16 | TAL | $OVER.T9618C00.SCOVERCM |
| 00 | C000514 | 000535 | COMMON | STRING | NOTINSTALLED | 29APR87 | 13:16 | TAL | $OVER.T9618C00.SCOVERCM |
| 00 | C000744 | 000760 | COMMON | STRING | NOTINTABLE | 29APR87 | 13:16 | TAL | $OVER.T9618C00.SCOVERCM |
| 00 | C001440 | 001447 | COMMON | STRING | NOTINTERACTIVE | 29APR87 | 13:16 | TAL | $OVER.T9618C00.SCOVERCM |
| 00 | C000723 | 000742 | COMMON | STRING | NOTLOCAL | 29APR87 | 13:16 | TAL | $OVER.T9618C00.SCOVERCM |
| 00 | C001450 | 001466 | COMMON | STRING | NOTNUM | 29APR87 | 13:16 | TAL | $OVER.T9618C00.SCOVERCM |
| 00 | C001356 | 001375 | COMMON | STRING | NOTRUN | 29APR87 | 13:16 | TAL | $OVER.T9618C00.SCOVERCM |
| 00 | C000536 | 000567 | COMMON | STRING | NOTSUPPORTED | 29APR87 | 13:16 | TAL | $OVER.T9618C00.SCOVERCM |
| 00 | C001750 | 001764 | COMMON | STRING | OK | 29APR87 | 13:16 | TAL | $OVER.T9618C00.SCOVERCM |

| | | | | | | | | | |
|---|---|---|---|---|---|---|---|---|---|
| 00 | C001765 | 002011 | COMMON | STRING | PRIVNOTALLOWED | 29APR87 | 13:16 | TAL | $OVER.T9618C00.SCOVERCM |
| 00 | C000372 | 000417 | COMMON | STRING | SPACEDIF | 29APR87 | 13:16 | TAL | $OVER.T9618C00.SCOVERCM |
| 00 | C001116 | 001135 | COMMON | STRING | STARTED | 29APR87 | 13:16 | TAL | $OVER.T9618C00.SCOVERCM |
| 00 | C001722 | 001747 | COMMON | STRING | SUPERONLY | 29APR87 | 13:16 | TAL | $OVER.T9618C00.SCOVERCM |
| 00 | C002041 | 002046 | COMMON | STRING | SYNTAXERR | 29APR87 | 13:16 | TAL | $OVER.T9618C00.SCOVERCM |
| 00 | C000175 | 000216 | COMMON | STRING | TABLEFULL | 29APR87 | 13:16 | TAL | $OVER.T9618C00.SCOVERCM |
| 00 | C002127 | 002154 | COMMON | STRING | UNABLEALLOC | 29APR87 | 13:16 | TAL | $OVER.T9618C00.SCOVERCM |
| 00 | C001542 | 001575 | COMMON | STRING | UNKNOWNRO^ | 29APR87 | 13:16 | TAL | $OVER.T9618C00.SCOVERCM |
| 00 | C002213 | 002245 | COMMON | STRING | WARNBEGINEND | 29APR87 | 13:16 | TAL | $OVER.T9618C00.SCOVERCM |
| 00 | C002156 | 002212 | COMMON | STRING | WARNBIND | 29APR87 | 13:16 | TAL | $OVER.T9618C00.SCOVERCM |
| 00 | C002307 | 002327 | COMMON | STRING | WARNSKIP | 29APR87 | 13:16 | TAL | $OVER.T9618C00.SCOVERCM |

DATA BLOCK MAP BY NAME

| BASE | LIMIT | TYPE | MODE | NAME | DATE | TIME | LANGUAGE | SOURCE FILE |
|---|---|---|---|---|---|---|---|---|
| 000000 | 000005 | COMMON | WORD | #GLOBAL | 29APR87 | 13:16 | TAL | $EMI.T9621C00.TBLFMT |
| 000217 | 003223 | COMMON | WORD | .INOUTSTUFF | 29APR87 | 13:16 | TAL | $OVER.T9618C00.DSIOLIB |
| 003634 | 006216 | COMMON | WORD | .MARKUP^DEFS | 29APR87 | 13:16 | TAL | $OVER.T9618C00.SCOVERCM |
| 006217 | 010306 | COMMON | WORD | .OBJECT^READING | 29APR87 | 13:16 | TAL | $OVER.T9618C00.DREADOBJ |
| 003224 | 003633 | COMMON | WORD | .PARSING^DEFS | 29APR87 | 13:16 | TAL | $OVER.T9618C00.SCOVERCM |
| 000035 | | COMMON | WORD | COMMAND^DEFS | 29APR87 | 13:16 | TAL | $OVER.T9618C00.SCOVERCM |
| 000217 | | COMMON | WORD | COVERROUTINE^DEFS | 29APR87 | 13:16 | TAL | $OVER.T9618C00.SVERSION |
| 000212 | | COMMON | WORD | ENVIRONMENT^REGISTER | 29APR87 | 13:16 | TAL | $OVER.T9618C00.DSVGN |
| 000212 | 000216 | COMMON | WORD | GOTO^MAINLOOP^BLOCK | 29APR87 | 13:16 | TAL | $OVER.T9618C00.DSVGN |
| 000006 | 000034 | COMMON | WORD | INOUTSTUFF | 29APR87 | 13:16 | TAL | $OVER.T9618C00.DSIOLIB |
| 000075 | 000116 | COMMON | WORD | MARKUP^DEFS | 29APR87 | 13:16 | TAL | $OVER.T9618C00.SCOVERCM |
| 000052 | | COMMON | WORD | MESSAGE^DEFS | 29APR87 | 13:16 | TAL | $OVER.T9618C00.SCOVERCM |
| 000117 | 000211 | COMMON | WORD | OBJECT^READING | 29APR87 | 13:16 | TAL | $OVER.T9618C00.DREADOBJ |
| 000052 | 000074 | COMMON | WORD | PARSING^DEFS | 29APR87 | 13:16 | TAL | $OVER.T9618C00.SCOVERCM |
| 000035 | 000051 | COMMON | WORD | SERVER^DEFS | 29APR87 | 13:16 | TAL | $OVER.T9618C00.SCOVERCM |

```
BINDER - OBJECT FILE BINDER - T9621C00 - (09SEP86)   SYSTEM \PRUNE
Object file name is $OVER.T9618C00.oglobal
Object file timestamp is 29APR87 13:16:13
Number of Binder errors = 0
Number of Binder warnings = 0
Primary data = 143 words
Secondary data = 4152 words
Code area size = 2 pages
Resident code size = 0 pages
Data area size = 6 pages
Extended data area size = 0 pages
Top of stack = 4295 words
Number of code segments  = 1 segment

The object file will run on a TNS/II, but may not run on a TNS
Saveglobals file name is $OVER.T9618C00.GGLOBAL
Errorfile file name is $OVER.T9618C00.EGLOBAL
Number of compiler errors =  0
Number of compiler warnings =  0
Maximum symbol table space used was = 151330 bytes
Number of source lines = 7679
Compile cpu time = 00:00:18
Total Elapsed time = 00:01:10
```

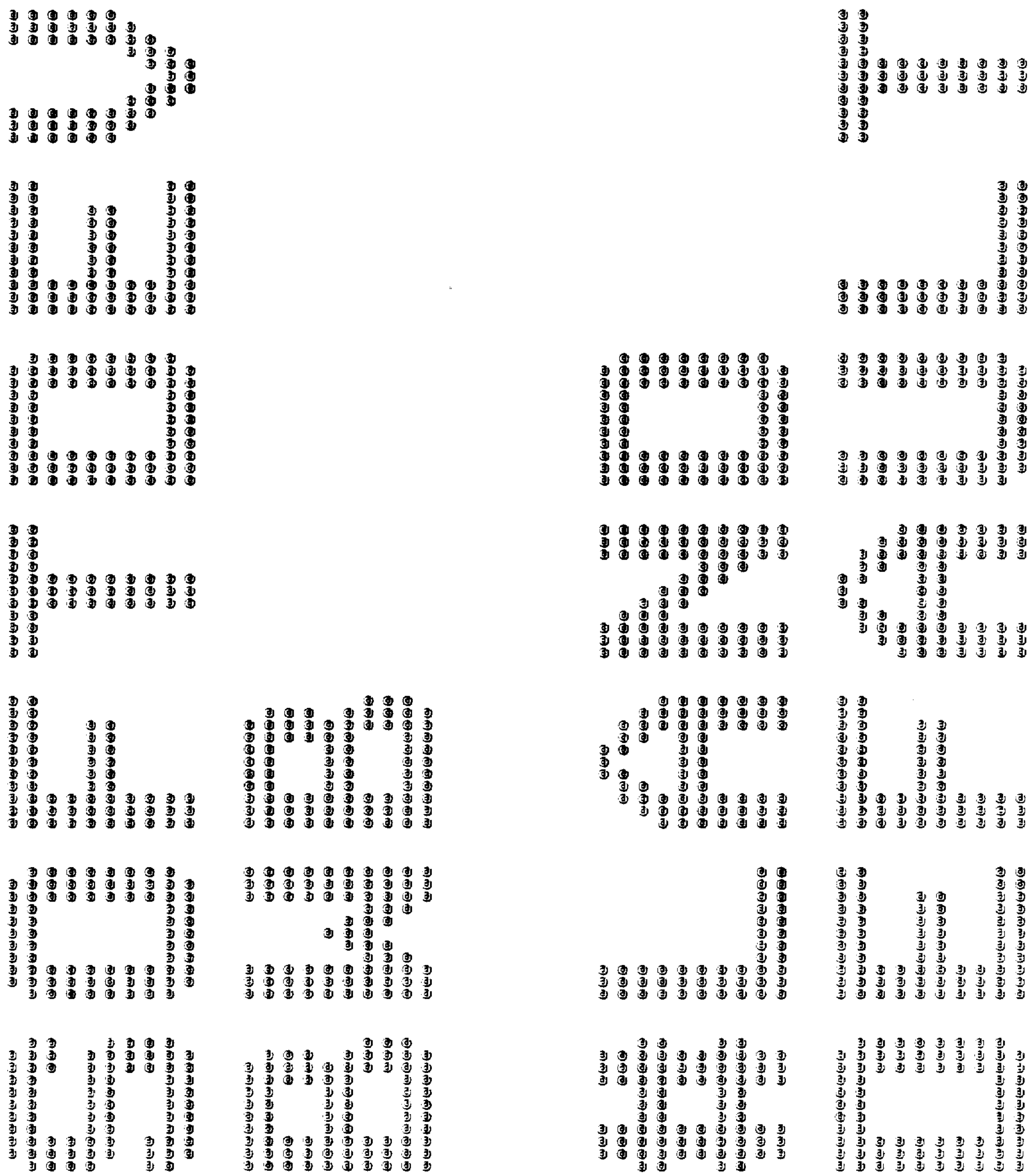

```
TAL - T9250B40   (15SEP86)                        Source language: TAL - Target machine: Tandem NonStop II System
Date - Time :  12FEB87 - 12:29:24              Default options: On (LIST,CODE,MAP,WARN,LMAP) - Off (ICODE,INNERLIST)

                        ?ERRORFILE egp,NOFIXUP,NOCODE, SYMBOLS, MAP, NOGMAP, LMAP(ALPHA,LOC)
      000000 0  0   !
      000000 0  0   ! General purpose stuff that has proven useful in lots of programs.
      000000 0  0   !
      000000 0  0   ! This subsystem contains defines for basic language extensions and notational
      000000 0  0   ! conveniences and procedures for such things as internal/external conversion
      000000 0  0   ! for 16/32/64 bit numbers, timestamps, and process names.
      000000 0  0   !
      000000 0  0   ?SOURCE  DGP
Source file:  [1]  $OVER.T9618C00.DGP  01OCT86 - 10:26:04


      000000 0  0   ?SECTION UTIL
      000000 0  0   !
      000000 0  0   ! external dependencies: none
      000000 0  0   !
      000000 0  0   ! duplicates much of "guard2.dutil" (the non priv stuff).
      000000 0  0   !
      000000 0  0   ! fixes some sneaky problems with the *len and *offset stuff (flagged "*" below)
      000000 0  0   !
      000000 0  0   DEFINE
      000000 0  0        ROUNDTOWORD ( X )
      000000 0  0          ! Converts any INT byte counts to a word count
      000000 0  0          = ( ( ( X ) + 1 ) >> 1 )#
      000000 0  0      ,  ROUNDUP ( X )
      000000 0  0          ! Rounds up any INT values to an even number
      000000 0  0          = ( ( ( X ) + 1 ) LAND ( -2 ) )#
      000000 0  0      ,  ALEN ( X )
      000000 0  0          ! Length of a struct or field for use with array index bounds, as in
      000000 0  0          ! "string x [ 0:alen ( struct.field ) ]"
      000000 0  0          = ( $LEN ( X ) - 1 )#
      000000 0  0      ,  WLEN ( X )
      000000 0  0          ! Word length of a struct or field for moving or indexing as in
      000000 0  0          ! "array^or^struct ':=' struct for wlen ( struct )"
      000000 0  0          ! was ( $LEN ( X ) >> 1 )                                          *
      000000 0  0          ! rounds odd byte length up to word; wlen(3)=2 instead of 1        *
      000000 0  0          = ROUNDTOWORD ( $LEN ( X ) )#
      000000 0  0      ,  AWLEN ( X )
      000000 0  0          ! As above, but for use with array index bounds, as in
      000000 0  0          ! "int x [ 0:awlen ( struct.field ) ]"
      000000 0  0          = ( WLEN ( X ) - 1 )#
      000000 0  0      ,  AOFFSET ( X )
      000000 0  0          ! Offset of a struct field for use with array index bounds, as in
      000000 0  0          ! "string x [ 0:aoffset ( struct.field ) ]"
      000000 0  0          = ( $OFFSET ( X ) - 1 )#
      000000 0  0      ,  AOFFSET^ ( X )
      000000 0  0          ! For guard2.dutil compatibility, same as aoffset
      000000 0  0          = AOFFSET ( X )#
      000000 0  0      ,  WOFFSET ( X )
      000000 0  0          ! Word offset of a struct or field, for moving or indexing, etc
      000000 0  0          = ( $OFFSET ( X ) >> 1 )#
      000000 0  0      ,  AWOFFSET ( X )
```

```
000000 0  0          ! Array index bounds, as in
000000 0  0          ! "int x [ 0:awoffset ( struct:field ) ]"
000000 0  0          = ( WOFFSET ( X ) - 1 )#
000000 0  0      ,  OLEN ( X )
000000 0  0          ! Length of an array field
000000 0  0          = ( $OCCURS ( X ) * $LEN ( X ) )#
000000 0  0      ,  AOLEN ( X )
000000 0  0          ! Length of an array field for use in array index bounds
000000 0  0          = ( OLEN ( X ) - 1 )#
000000 0  0      ,  WOLEN ( X )
000000 0  0          ! As above, in words
000000 0  0          ! was  ( $OCCURS ( X ) * WLEN ( X ) )                             *
000000 0  0          ! rounds up odd lengths; for struct x [0:511]; begin              *
000000 0  0          !                                               string y [0:30];  *
000000 0  0          !                                               end;              *
000000 0  0          !                          wolen(x.y) =   16 instead of 0         *
000000 0  0          !                          wolen(x)   = 7936 instead of 8192      *
000000 0  0          = ROUNDTOWORD ( OLEN ( X ) )#
000000 0  0      ,  TRAPSOFF
000000 0  0          ! Disable traps in the current local environment
000000 0  0          = CODE ( RDE; ANRI %577; SETE )#
000000 0  0      ,  EXCHANGE ( X, Y )
000000 0  0          ! Exchange the contents of X and Y (any type)
000000 0  0          = BEGIN
000000 0  0            STACK X, Y;
000000 0  0            STORE X, Y;
000000 0  0            END#
000000 0  0      ,  WLADR ( X )
000000 0  0          ! Like $LADR, converts an extended pointer to a word address
000000 0  0          = $INT ( @X >> 1 )#
000000 0  0      ;
000000 0  0    !
000000 0  0    ! bit vector defines
000000 0  0    ! it would be nice if the names and parameters were consistent, but that's
000000 0  0    ! not how its done in guard2.dutil and this section is supposed to be
000000 0  0    ! compatible
000000 0  0    !
000000 0  0    DEFINE      TESTBIT ( BIT, VECTOR ) =    ! test bit in an extended or 'g' vector
000000 0  0                ( VECTOR [ (BIT) '>>' 4 ] '<<' (BIT).<12:15> ) < 0#;
000000 0  0
000000 0  0    DEFINE      SETBIT  ( BIT, VECTOR ) =    ! set bit in an extended vector
000000 0  0                BEGIN
000000 0  0                STACK %100000 '>>' (BIT).<12:15>;
000000 0  0                STACK @VECTOR + $DBLL ( 0, (BIT) '>>' 3 );
000000 0  0                CODE ( ORX );
000000 0  0                END#;
000000 0  0
000000 0  0    DEFINE      RESETBIT  ( BIT, VECTOR ) = ! reset bit in an extended vector
000000 0  0                BEGIN
000000 0  0                STACK $COMP ( %100000 '>>' (BIT).<12:15> );
000000 0  0                STACK @VECTOR + $DBLL ( 0, (BIT) '>>' 3 );
000000 0  0                CODE ( ANX );
000000 0  0                END#;
000000 0  0
000000 0  0    DEFINE      SETBITG ( VECTOR, BIT ) =    ! set bit (0:65535) in an int 'g' vector
000000 0  0                BEGIN
```

```
000000 0  0             STACK %100000 '>>' (BIT).<12:15>;
000000 0  0             STACK @VECTOR [ (BIT).<0:11> ];
000000 0  0             CODE ( ORG );
000000 0  0             END#;
000000 0  0
000000 0  0   DEFINE    CLEARBITG ( VECTOR, BIT ) = ! clear bit (0:65535) in a 'g' vector
000000 0  0             BEGIN
000000 0  0             STACK $COMP ( %100000 '>>' (BIT).<12:15> );
000000 0  0             STACK @VECTOR [ (BIT).<0:11> ];
000000 0  0             CODE ( ANG )
000000 0  0             END#;
000000 0  0   ?SECTION UTIL^END
000000 0  0   ?SECTION UTIL2
000000 0  0   !
000000 0  0   ! external dependencies: none
000000 0  0   !
000000 0  0   ! some extensions to dutil and other handinesses
000000 0  0   !
000000 0  0   LITERAL
000000 0  0        FALSE = 0
000000 0  0      , TRUE  = NOT FALSE
000000 0  0     ;
000000 0  0   DEFINE
000000 0  0        AWOLEN ( X )
000000 0  0          ! As WOLEN, for use in array index bounds
000000 0  0          = ( $OCCURS ( X ) * WLEN ( X ) - 1 )#
000000 0  0      .  TRAPSON                                        ! enable arithmetic traps
000000 0  0          = CODE ( RDE; ORRI %200; SETE )#              ! undoes effect of trapsoff
000000 0  0     !
000000 0  0     !  arithmetic notational conveniences:
000000 0  0     !
000000 0  0      .  INC     ( V )      = V  := V  + 1#             ! (signed 16 bit) increment
000000 0  0      .  DINC    ( V )      = V  := V  + 1D#            ! double          increment
000000 0  0      .  FINC    ( V )      = V  := V  + 1F#            ! fixed           increment
000000 0  0      .  LINC    ( V )      = V  := V '+' 1#            ! logical         increment
000000 0  0      .  PINC    ( P )      = @P := @P [ 1 ]#           ! pointer         increment
000000 0  0      .  DEC     ( V )      = V  := V  - 1#             ! (signed 16 bit) decrement
000000 0  0      .  DDEC    ( V )      = V  := V  - 1D#            ! double          decrement
000000 0  0      .  FDEC    ( V )      = V  := V  - 1F#            ! fixed           decrement
000000 0  0      .  LDEC    ( V )      = V  := V '-' 1#            ! logical         decrement
000000 0  0      .  PDEC    ( P )      = @P := @P [ -1 ]#          ! pointer         decrement
000000 0  0      .  MOD     ( A, B )   = ( A - ( A / B ) * B )#    ! a modulo b
000000 0  0      .  BIT     ( B )      = ( %100000 '>>' ( B ) )#   ! bit b, b is (0:15)
000000 0  0      .  NOTBIT  ( B )      = $COMP ( BIT ( B ) )#      ! complement of bit b
000000 0  0
000000 0  0      .  UPCASEMASK
000000 0  0          ! Mask for upcasing alpha ascii chars
000000 0  0          = %157737#
000000 0  0      ,  UPCASE ( CHAR )
000000 0  0          ! Return ascii CHAR upcased
000000 0  0          = ( IF $ALPHA ( CHAR ) THEN ( CHAR ) LAND UPCASEMASK ELSE ( CHAR ) )#
000000 0  0      ,  INSTRUCTIONFAIL
000000 0  0          ! Generate an instruction failure trap
000000 0  0          = CODE ( LDI 0; INSR )#
000000 0  0      .  TOUCH ( X )
000000 0  0          ! Evaluates X and deletes it.  X may be of any type value or reference.
```

```
000000 0  0          = BEGIN
000000 0  0            STACK X;
000000 0  0            CODE ( STRP 7 );
000000 0  0            END#
000000 0  0      , TESTTNS =
000000 0  0          ! Tests cpu type; CCE if TNS (1.1)
000000 0  0          ! "scmp" is a no-op on a tns
000000 0  0          CODE ( ZERD; SCMP; LCMP )#
000000 0  0      ;
000000 0  0  ?SECTION UTIL2^END
000000 0  0  ?SECTION Z
000000 0  0  !
000000 0  0  ! external dependencies: none
000000 0  0  !
000000 0  0  ! The following "Zn" defines expand "Z" to "n" occurances
000000 0  0  !
000000 0  0  DEFINE
000000 0  0      Z1     ( Z ) =          Z                  #
000000 0  0    , Z2     ( Z ) = Z1     ( Z )    Z1     ( Z )#
000000 0  0    , Z4     ( Z ) = Z2     ( Z )    Z2     ( Z )#
000000 0  0    , Z8     ( Z ) = Z4     ( Z )    Z4     ( Z )#
000000 0  0    , Z16    ( Z ) = Z8     ( Z )    Z8     ( Z )#
000000 0  0    , Z32    ( Z ) = Z16    ( Z )    Z16    ( Z )#
000000 0  0    , Z64    ( Z ) = Z32    ( Z )    Z32    ( Z )#
000000 0  0    , Z128   ( Z ) = Z64    ( Z )    Z64    ( Z )#
000000 0  0    , Z256   ( Z ) = Z128   ( Z )    Z128   ( Z )#
000000 0  0    , Z512   ( Z ) = Z256   ( Z )    Z256   ( Z )#
000000 0  0    , Z1K    ( Z ) = Z512   ( Z )    Z512   ( Z )#
000000 0  0    , Z2K    ( Z ) = Z1K    ( Z )    Z1K    ( Z )#
000000 0  0    , Z4K    ( Z ) = Z2K    ( Z )    Z2K    ( Z )#
000000 0  0    , Z8K    ( Z ) = Z4K    ( Z )    Z4K    ( Z )#
000000 0  0    , Z16K   ( Z ) = Z8K    ( Z )    Z8K    ( Z )#
000000 0  0    , Z32K   ( Z ) = Z16K   ( Z )    Z16K   ( Z )#
000000 0  0    ;
000000 0  0  ?SECTION Z^END
000000 0  0  ?SECTION LAYOUTS
000000 0  0  !
000000 0  0  ! external dependencies: none
000000 0  0  !
000000 0  0  ! implement the concept of a "layout".
000000 0  0  ! a layout name is formed for some name "l" as "l^layout".  a layout is a define
000000 0  0  ! which accepts some name "x" that, when expanded, defines a struct of name x
000000 0  0  ! having the form of l^layout.  the layout may be used to declare templates
000000 0  0  ! and disjoint or embedded structures of the indirect or direct variety
000000 0  0  ! (recall that templates cannot be used to declare embedded structures).
000000 0  0  !
000000 0  0  ! all layouts will generate "word aligned" structures which begin with the
000000 0  0  ! items (at offset zero) "word" and "byte", which are int and string types,
000000 0  0  ! respectively.  the presence of these items avoids some ambiguities when
000000 0  0  ! referring to a structure which may be embedded or disjoint, as a disjoint
000000 0  0  ! structure is accessed (by tal) as a word address and an embedded structure is
000000 0  0  ! accessed as a byte address.  given a structure x generated by an x^layout
000000 0  0  ! define , x.word | n | will always refer to word n and x.byte | n | will
000000 0  0  ! always refer to byte n.
000000 0  0  !
000000 0  0  ! the simplest form of a layout generates what is known as a "plain" structure.
```

```
000000 0   0   ! a plain structure is, effectively, a word aligned array which may be byte
000000 0   0   ! or word accessed and contains only the items "word" and "byte".
000000 0   0   ! such a layout is defined using the following:
000000 0   0   !
000000 0   0   DEFINE      LAYOUT ( X, BYTELENGTH ) =
000000 0   0               STRUCT   X;
000000 0   0                        BEGIN
000000 0   0                        INT     WORD [ 0:-1 ];
000000 0   0                        STRING  BYTE [ 0:((BYTELENGTH)-1) ];
000000 0   0                        END#;
000000 0   0   !
000000 0   0   ! layouts which are to generate structures which contain specific named items
000000 0   0   ! will begin with:
000000 0   0   !
000000 0   0   DEFINE      BEGIN^LAYOUT ( X ) =
000000 0   0               STRUCT          X;
000000 0   0                        BEGIN
000000 0   0                        INT     WORD [ 0:-1 ];
000000 0   0                        STRING  BYTE [ 0:-1 ];#;
000000 0   0   !
000000 0   0   ! followed by specific item definitions
000000 0   0   ! the layout will end with:
000000 0   0   !
000000 0   0   DEFINE      END^LAYOUT =
000000 0   0                        END#;
000000 0   0   !
000000 0   0   ! layouts and templates for various things
000000 0   0   !
000000 0   0   DEFINE      NAME^LAYOUT ( X ) =          ! name of device, subvol, et al
000000 0   0               LAYOUT ( X, 8 )#;
000000 0   0
000000 0   0   DEFINE      DEFAULTS^LAYOUT ( X ) =     ! file defaults ala fnameexpand
000000 0   0               BEGIN^LAYOUT    ( X )
000000 0   0                     NAME^LAYOUT    ( VOLUME );
000000 0   0                     NAME^LAYOUT    ( SUBVOL );
000000 0   0               END^LAYOUT#;
000000 0   0
000000 0   0   DEFINE      FILENAME^LAYOUT ( X ) =     ! internal form filename
000000 0   0               BEGIN^LAYOUT    ( X )
000000 0   0                     NAME^LAYOUT    ( VOLUME );
000000 0   0                     NAME^LAYOUT    ( SUBVOL );
000000 0   0                     NAME^LAYOUT    ( FILE );
000000 0   0               END^LAYOUT#;
000000 0   0
000000 0   0   DEFINE      XFILENAME^LAYOUT ( X ) =    ! external form filename
000000 0   0               LAYOUT ( X, 36 )#;
000000 0   0
000000 0   0   DEFINE      STARTUPMSG^LAYOUT ( X ) =  ! comint startup message
000000 0   0               BEGIN^LAYOUT        ( X )
000000 0   0                     INT                TYPE;
000000 0   0                     DEFAULTS^LAYOUT ( DEFAULTS );
000000 0   0                     FILENAME^LAYOUT ( IN );
000000 0   0                     FILENAME^LAYOUT ( OUT );
000000 0   0                     LAYOUT          ( PARAM, 4 * 132 );
000000 0   0               END^LAYOUT#;
000000 0   0   LITERAL     STARTUPMSG^TYPE = -1;
000000 0   0
```

```
000000 0  0   DEFINE      ASSIGNMSG^LAYOUT ( X ) =    ! comint assign message
000000 0  0               BEGIN^LAYOUT     ( X )
000000 0  0                     INT                TYPE;
000000 0  0                     BEGIN^LAYOUT     ( LOGICALUNIT )
000000 0  0                           STRING       PROGNAMELEN;
000000 0  0                           STRING       PROGNAME [ 0:30 ];
000000 0  0                           STRING       FILENAMELEN;
000000 0  0                           STRING       FILENAME [ 0:30 ];
000000 0  0                     END^LAYOUT;
000000 0  0                     INT ( 32 )         MASK;
000000 0  0                     FILENAME^LAYOUT ( FILENAME );
000000 0  0                     INT                PRIEXT;
000000 0  0                     INT                SECEXT;
000000 0  0                     INT                FILECODE;
000000 0  0                     INT                EXCLUSION;
000000 0  0                     INT                ACCESS;
000000 0  0                     INT                RECSIZE;
000000 0  0                     INT                BLKSIZE;
000000 0  0               END^LAYOUT#;
000000 0  0   LITERAL     ASSIGNMSG^TYPE = -2;
000000 0  0   !
000000 0  0   ! the following define is passed the name of an assignmsg struct or struct
000000 0  0   ! pointer and the name of a field in the struct.  it examines the assign msg
000000 0  0   ! mask and returns whether the field is used.  note that all arithmetic after
000000 0  0   ! the "land" is a constant which is evaluated at compile-time
000000 0  0   !
000000 0  0   DEFINE      ASSIGN^EXISTS ( ASGN, ITEM ) =
000000 0  0               ( $HIGH ( ASGN.MASK ) LAND
000000 0  0                 %100000 '>>'
000000 0  0                     ( IF $OFFSET ( ASGN.ITEM ) > $OFFSET ( ASGN.FILENAME ) THEN
000000 0  0                         ($OFFSET ( ASGN.ITEM ) - $OFFSET ( ASGN.PRIEXT ) + 2) / 2
000000 0  0                       ELSE
000000 0  0                         0
000000 0  0                     )
000000 0  0               )#;
000000 0  0
000000 0  0   DEFINE      PARAMMSG^LAYOUT ( X ) =     ! comint param message
000000 0  0               BEGIN^LAYOUT ( X )
000000 0  0                     INT            TYPE;
000000 0  0                     INT            NUMPARAMS;
000000 0  0                     LAYOUT       ( PARAMS, 1024 );
000000 0  0               END^LAYOUT#;
000000 0  0   LITERAL     PARAMMSG^TYPE = -2;
000000 0  0
000000 0  0   !
000000 0  0   ! layouts for process names and ppd entries
000000 0  0   !
000000 0  0   DEFINE      CRT^LAYOUT    ( X ) =         ! process' creation timestamp or name
000000 0  0               LAYOUT        ( X, 6 )#;
000000 0  0
000000 0  0   DEFINE      CRTNAMED      ( CRT ) =       ! crt is a name (not timestamp)
000000 0  0               CRT.WORD.<0:1> <> 2#;
000000 0  0   DEFINE      CRTLOCAL      ( CRT ) =       ! crt is a local process
000000 0  0               CRT.WORD.<0:7> = "$" OR NOT CRT.WORD.<8:15>#;
000000 0  0   DEFINE      CRTSYSTEMNUMBER ( CRT ) =   ! crt's system number if not local
000000 0  0               CRT.WORD.<8:15>#;
```

```
000000 0  0   DEFINE      CRTREMOTE ( CRT, SYSID ) = ! crt is not local to system number sysid
000000 0  0               CRT.CRTSYSTEMNUMBER <> SYSID#;
000000 0  0
000000 0  0   DEFINE      CRTPID^LAYOUT ( X ) =
000000 0  0               BEGIN^LAYOUT  ( X )
000000 0  0                     CRT^LAYOUT    ( CRT );
000000 0  0                     INT             PID;
000000 0  0               END^LAYOUT#;
000000 0  0
000000 0  0   DEFINE      PPDENT^LAYOUT ( X ) =
000000 0  0               BEGIN^LAYOUT  ( X )
000000 0  0                     CRT^LAYOUT    ( CRT );
000000 0  0                     INT             PID1;
000000 0  0                     INT             PID2;
000000 0  0                     CRTPID^LAYOUT ( ANCESTOR );
000000 0  0               END^LAYOUT#;
000000 0  0   !
000000 0  0   ! layouts for user id stuff (see guard2.ssecure)
000000 0  0   !
000000 0  0
000000 0  0   ! useridtousername and usernametouserid use a single parameter
000000 0  0   ! whose layout can be given by the following:
000000 0  0   DEFINE      USERIDNAME^LAYOUT ( X ) =
000000 0  0               BEGIN^LAYOUT  ( X )
000000 0  0                     INT           USERID [ 0:-1 ];
000000 0  0                     NAME^LAYOUT ( GROUPNAME );
000000 0  0                     NAME^LAYOUT ( USERNAME );
000000 0  0               END^LAYOUT#;
000000 0  0
000000 0  0   DEFINE      USERIDGROUP = <0:7>#;       ! group id bits in a user id word
000000 0  0   DEFINE      USERIDUSER  = <8:15>#;      ! user  id bits
000000 0  0
000000 0  0   !
000000 0  0   ! templates made from layouts above
000000 0  0   !
000000 0  0   PPDENT^LAYOUT               ( PPDENT^TEMPLATE            ( * ) );
000000 0  0   CRTPID^LAYOUT               ( CRTPID^TEMPLATE            ( * ) );
000000 0  0   CRT^LAYOUT                  ( CRT^TEMPLATE               ( * ) );
000000 0  0   PARAMMSG^LAYOUT             ( PARAMMSG^TEMPLATE          ( * ) );
000000 0  0   ASSIGNMSG^LAYOUT            ( ASSIGNMSG^TEMPLATE         ( * ) );
000000 0  0   STARTUPMSG^LAYOUT           ( STARTUPMSG^TEMPLATE        ( * ) );
000000 0  0   XFILENAME^LAYOUT            ( XFILENAME^TEMPLATE         ( * ) );
000000 0  0   FILENAME^LAYOUT             ( FILENAME^TEMPLATE          ( * ) );
000000 0  0   DEFAULTS^LAYOUT             ( DEFAULTS^TEMPLATE          ( * ) );
000000 0  0   NAME^LAYOUT                 ( NAME^TEMPLATE              ( * ) );
000000 0  0   USERIDNAME^LAYOUT           ( USERIDNAME^TEMPLATE        ( * ) );
000000 0  0
000000 0  0   ?SECTION LAYOUTS^END

000000 0  0   ?NOLIST, SOURCE EXTDECS ( CONTIME, TIME, TIMESTAMP )
000000 0  0   ?NOLIST, SOURCE EXTDECS ( GETCRTPID, MYPID, FNAMECOLLAPSE )
000000 0  0   ?NOLIST, SOURCE EXTDECS ( GETSYSTEMNAME, MYSYSTEMNUMBER )
000000 0  0   ?NOLIST, SOURCE EXTDECS ( USERIDTOUSERNAME )
000000 0  0   ?NOLIST, SOURCE EXTDECS ( INITIALIZER )
000000 0  0   ?SOURCE  sversion( version^gp )
Source file:  [1]  $OVER.T9618C00.SVERSION  12FEB87 - 12:20:47
```

```
000000 0  0    ?SECTION VERSION^GP
000000 0  0    PROC T9618C00^15JUL87^GP^11F7;
000000 1  0    BEGIN END;
000000 0  0
000000 0  0    ?SOURCE  SGP
Source file:  [1]  $OVER.T9618C00.SGP  01OCT86 - 12:53:07

000000 0  0    ?SECTION  NIN
000000 0  0    !
000000 0  0    INT PROC !prv! NIN ( SP, V, B, R, S, T ) VARIABLE;
000000 1  0    !
000000 1  0      STRING      .SP;      ! Required.  Points to ASCII number to convert
000000 1  0      INT         .V;       ! Required.  Returned binary result
000000 1  0      INT          B;       ! Optional.  Conversion base, +|- (2:16), default -10
000000 1  0      INT         .R;       ! Required.  Conversion result :
000000 1  0                            !            < error, = ok, > sp doesn't point to number
000000 1  0      INT         .S;       ! Optional.  If supplied SP may have a fraction and
000000 1  0                            !            the following is returned to S:
000000 1  0                            !              .<0>      1 if signed conversion
000000 1  0                            !              .<1:5>    actual conversion base
000000 1  0                            !              .<10:15> fractional (negative) scale
000000 1  0      INT          T;       ! Optional.  Type of conversion:
000000 1  0                            !              0  16 bit (V is INT)        (default)
000000 1  0                            !              1  32 bit (V is INT (32))
000000 1  0                            !              2  64 bit (V is FIXED)
000000 1  0      !
000000 1  0      !    NIN converts the ASCII representation of the number at SP into its
000000 1  0      ! binary representation, like GUARDIANS NUMIN.
000000 1  0      !
000000 1  0      !    However...
000000 1  0      !
000000 1  0      !    The ASCII number in the array at SP may be of the form :
000000 1  0      !
000000 1  0      !        ( [+|-] [#|% [B|H] ] )  ( <digit>...["."[<digit>...]] )
000000 1  0      !        ( [#|% [B|H] ] [+|-] )  ( [<digit>...]"."<digit>...    )
000000 1  0      !
000000 1  0      !    Where, #, %, %B, and %H represent UNSIGNED bases 10, 8, 2, and 16,
000000 1  0      ! respectively.  If a sign, (+|-), appears in SP, the ASCII number is
000000 1  0      ! converted to a signed binary number.  If the "." appears in SP, digits
000000 1  0      ! to the left thereof specify a fraction in the base of the conversion.
000000 1  0      ! The "." and succeeding digits are converted only if the S parameter is
000000 1  0      ! supplied (described below).
000000 1  0      !
000000 1  0      !    V is the binary result of the conversion.  V may be of INT, INT ( 32 ),
000000 1  0      ! or FIXED types.  The type is specified by T.  Note that TAL enforces
000000 1  0      ! numeric types when a reference is passed.  Thus if T is supplied with a
000000 1  0      ! value other than 0, the callers V must be address equated.  For example:
000000 1  0      !
000000 1  0      !    fixed v;           !! 64 bit result
000000 1  0      !    int   v^ = v;      !! equivalence to satisfy tal
000000 1  0      !    string .input;     !! input string pointer
000000 1  0      !
000000 1  0      !    @input := nin ( input, v^, !!base!!, rslt, !!scale!!, 2 );
000000 1  0      !
000000 1  0      !    As an alternative to address equation as above, two "jacket" procedures
000000 1  0      ! are supplied ("NIN32" and "NIN64") below which will return a 32 and 64 bit
```

```
000000 1  0    ! V (respectively).
000000 1  0    !
000000 1  0    !
000000 1  0    !    B specifies the default number base for conversion, in the range of
000000 1  0    ! +|- (2:16).  If B is positive, the conversion is unsigned.  If negative,
000000 1  0    ! signed conversion is performed.  The string in SP may override the value
000000 1  0    ! of B if one of # or % appears therein.  Note that if the base is specified
000000 1  0    ! in SP, signed conversion takes place ONLY if a sign appears in SP
000000 1  0    ! (overriding the sign of B).  B defaults to -10.
000000 1  0    !
000000 1  0    !    To R is returned the result of the conversion, where
000000 1  0    !
000000 1  0    !       -1  Illegal ASCII number
000000 1  0    !        0  Successful conversion
000000 1  0    !        1  SP does not contain a number
000000 1  0    !
000000 1  0    !    S, if present, causes the ASCII number in SP to be examined for a
000000 1  0    ! fractional part following a "." character.  If a fraction is seen and
000000 1  0    ! S was supplied, S.<10:15> receives the scale of the fraction (number of
000000 1  0    ! digits to the right of the ".").  S.<1:4> receives the conversion base
000000 1  0    ! actually used.  S.<0> is set to the type of conversion actually performed
000000 1  0    ! (where 1 = signed, 0 = unsigned).  Values are normalized to their
000000 1  0    ! integer representations.  For example :
000000 1  0    !
000000 1  0    !       SP            #V        S.<0>     S.<1:5>     S.<10:15>
000000 1  0    !       "123.45"      12345     B.<0>     $ABS( B )   2
000000 1  0    !       "#.12345"     12345     0         10          5
000000 1  0    !       "+%H123."       291     1         0           0
000000 1  0    !       "-.123"      -123       1         $ABS( B )   3
000000 1  0    !
000000 1  0    !    The procedure returns the address of the character in SP where scanning
000000 1  0    ! stopped (not used in the conversion).  Except where noted, this procedure
000000 1  0    ! is functionally identical to NUMIN and may serve as a compile time
000000 1  0    ! substitute for NUMIN.
000000 1  0    !
000000 1  0    !    No optional instructions are used (e.g. for 64 bit arithmetic).
000000 1  0    !
000000 1  0    BEGIN
000000 1  1    INT          SIGN;            ! <> if signed conversion, < if V is negative
000000 1  1    INT          SIGNSEEN := 0;   ! Sign (+|-) scanned off of SP string
000000 1  1    INT ( 32 )  .V32 = V;         ! Equivalence for returning 32 bit V
000000 1  1    FIXED       .V64 = V;         ! Equivalence for returning 64 bit V
000000 1  1    DEFINE       TRAPSOFF =       ! Disable local arithmetic traps
000000 1  1                 CODE ( RDE; ANRI %577; SETE )#;
000000 1  1    SUBPROC NEXTSP;               ! Advance SP and set R to error value
000000 2  1      BEGIN
000000 2  2      @SP := @SP [ 1 ];
000003 2  2      R := -1;
000005 2  2      END;
000006 1  1
000006 1  1    SUBPROC CHECKSIGN;            ! Check for sign character in SP and set flags
000006 2  1      BEGIN
000006 2  2      IF NOT SIGNSEEN THEN
000010 2  2         IF SP = "-" THEN
000013 2  2           BEGIN
000013 2  3           SIGNSEEN := SIGN := -1;
```

```
000016 2  3            CALL NEXTSP;
000017 2  3            END
000017 2  2          ELSE
000020 2  2            IF SP = "+" THEN
000023 2  2              BEGIN
000023 2  3              SIGNSEEN := SIGN := 1;
000026 2  3              CALL NEXTSP;
000027 2  3              END;
000027 2  2      END;
000030 1  1
000030 1  1    INT SUBPROC CONVERT;        ! If SP is digit, convert to binary, accumulate in
000030 2  1      BEGIN                     ! V, advance SP; otherwise return error.
000030 2  2      USE D;
000030 2  2      IF NOT ( $NUMERIC ( SP ) AND ( D := SP - "0" ) < B
000030 2  2               OR SP >= "A" AND ( D := SP - "A" + 10 ) < B
000030 2  2             ) THEN RETURN 1;    ! Not a digit, return error to caller
000055 2  2      USE VX;
000055 2  2      FOR VX := T DOWNTO 0 DO     ! V [ * ] := V [ * ] * V [ * ] + D
000057 2  2        BEGIN
000057 2  3        STACK V [ VX ], B;
000061 2  3        CODE ( LMPY );
000062 2  3        STACK 0; CODE ( EXCH ); ! $UDBL( $INT( product ) )
000064 2  3        STACK 0, D;             ! $UDBL( D )
000066 2  3        CODE ( DADD );
000067 2  3        STORE V [ VX ];
000070 2  3        CODE ( LADD );          ! $HIGH( product ) + $HIGH( $INT( product ) + D )
000071 2  3        STORE D;
000072 2  3        END;
000077 2  2      IF ( R := ( D OR SIGN AND V '>' %77777 - $MIN ( SIGN, 0 ) ) ) THEN
000123 2  2        RETURN -1;              ! Overflowed V, return error to caller and user
000125 2  2
000125 2  2      @SP := @SP [ 1 ];         ! Success, advance to next SP
000130 2  2      RETURN 0;
000132 2  2      END;

D                    Variable     INT          Direct        X 007
VX                   Variable     INT          Direct        X 006

000132 1  1
000132 1  1    IF NOT $PARAM ( B ) THEN B := -10;
000142 1  1    SIGN := B.<0>;
000145 1  1    B := $ABS ( B );
000151 1  1    IF $PARAM ( S ) THEN S := 0;
000156 1  1    IF NOT $PARAM ( T ) THEN T := 0;
000163 1  1    IF $PARAM ( R ) THEN R := -2;
000170 1  1
000170 1  1    IF T = 2 THEN T := 3;
000175 1  1    R := 1;
000177 1  1
000177 1  1    CALL CHECKSIGN;
000200 1  1    IF SP = "#" THEN
000203 1  1      BEGIN
000203 1  2      B := 10;
000205 1  2      CALL NEXTSP;
000206 1  2      IF NOT SIGNSEEN THEN SIGN := 0;
000212 1  2      END
000212 1  1    ELSE
```

```
000214 1  1       IF SP = "%" THEN
000217 1  1         BEGIN
000217 1  2         CALL NEXTSP;
000220 1  2         IF NOT SIGNSEEN THEN SIGN := 0;
000224 1  2         IF ( B := IF SP = "B" THEN 2 ELSE IF SP = "H" THEN 16 ELSE 8 ) <> 8 THEN
000242 1  2           CALL NEXTSP;
000243 1  2         END;
000243 1  1     CALL CHECKSIGN;
000244 1  1
000244 1  1     TRAPSOFF;
000247 1  1
000247 1  1     USE VX; FOR VX := 0 TO T DO V [ VX ] := 0; DROP VX;
000256 1  1
000256 1  1     IF NOT ( $PARAM ( S ) AND SP = "." ) THEN
000264 1  1       WHILE NOT CONVERT DO  ! Get digits to left of "."
000266 1  1     ELSE
000271 1  1       R := -1;              ! No digits left of ".", must find digit right of "."
000273 1  1     IF $PARAM ( S ) THEN
000276 1  1       BEGIN
000276 1  2       IF SP = "." THEN
000301 1  2         BEGIN
000301 1  3         @SP := @SP [ 1 ];
000304 1  3         WHILE NOT CONVERT DO S := S + 1;
000311 1  3         END;
000311 1  2       S.<0> := SIGN;
000316 1  2       S.<1:5> := B;
000323 1  2       END;
000323 1  1
000323 1  1     IF SIGN.<0> THEN        ! Negative result
000326 1  1       CASE T OF
000330 1  1         BEGIN
000330 1  2         V := -V;
000334 1 CE1        V32 := -V32;
000340 1 CE2        ;
000340 1 CE3        V64 := 0F - V64;    ! Standard instructions
000350 1 CE4        END;
000355 1  1
000355 1  1     RETURN @SP;
000357 1  1
000357 1  1     END; ! NIN
```

| | | | | |
|---|---|---|---|---|
| B | Variable | INT | Direct | L-007 |
| CHECKSIGN | Subproc | | %000006 | |
| CONVERT | Subproc | INT | %000030 | |
| NEXTSP | Subproc | | %000000 | |
| R | Variable | INT | Indirect | L-006 |
| S | Variable | INT | Indirect | L-005 |
| SIGN | Variable | INT | Direct | L+001 |
| SIGNSEEN | Variable | INT | Direct | L+002 |
| SP | Variable | STRING | Indirect | L-011 |
| T | Variable | INT | Direct | L-004 |
| TRAPSOFF | Define | | CODE ( RDE; ANRI %577; SETE ) | |
| V | Variable | INT | Indirect | L-010 |
| V32 | Variable | INT (32) | Indirect | L-010 |
| V64 | Variable | FIXED (0) | Indirect | L-010 |

```
000000 0  0    !
000000 0  0    INT PROC !prv! NIN32 ( SP, V, B, R, S, T ) VARIABLE;
000000 1  0    !
000000 1  0      STRING      .SP;        ! Required.  Points to ASCII number to convert
000000 1  0      INT ( 32 ) .V;          ! Required.  Returned binary result
000000 1  0      INT          B;         ! Optional.  Number conversion base, (2:16), default 10
000000 1  0      INT         .R;         ! Required.  Conversion result
000000 1  0      INT         .S;         ! Optional.  Scale; if supplied SP may have a fraction.
000000 1  0      INT          T;         ! Optional.  Not used.
000000 1  0      !
000000 1  0      ! A jacket for calling NIN (above), for returning a 32 bit V.
000000 1  0      !
000000 1  0      BEGIN
000000 1  1      INT MASK = 'L' - 3;                            ! tal parameter mask
000000 1  1
000000 1  1      STACK @SP, @V, B, @R, @S, 1, MASK LOR 1;       ! stack parms to nin and parm mask
000010 1  1      CODE ( PUSH %766 );                            ! push parms and mask
000011 1  1
000011 1  1      CODE ( PCAL NIN );                             ! call nin, stacking return value
000012 1  1    ?DECS 7, RP 0
000012 1  1
000012 1  1      RETURN;
000013 1  1
000013 1  1      END; ! NIN32

B                          Variable      INT            Direct        L-007
MASK                       Variable      INT            Direct        L-003
R                          Variable      INT            Indirect      L-006
S                          Variable      INT            Indirect      L-005
SP                         Variable      STRING         Indirect      L-011
T                          Variable      INT            Direct        L-004
V                          Variable      INT (32)       Indirect      L-010

000000 0  0    !
000000 0  0    INT PROC !prv! NIN64 ( SP, V, B, R, S, T ) VARIABLE;
000000 1  0    !
000000 1  0      STRING      .SP;        ! Required.  Points to ASCII number to convert
000000 1  0      FIXED       .V;         ! Required.  Returned binary result
000000 1  0      INT          B;         ! Optional.  Number conversion base, (2:16), default 10
000000 1  0      INT         .R;         ! Required.  Conversion result
000000 1  0      INT         .S;         ! Optional.  Scale; if supplied SP may have a fraction.
000000 1  0      INT          T;         ! Optional.  Not used.
000000 1  0      !
000000 1  0      ! A jacket for calling NIN (above), for returning a 64 bit V.
000000 1  0      !
000000 1  0      BEGIN
000000 1  1      INT MASK = 'L' - 3;                            ! tal parameter mask
000000 1  1
000000 1  1      STACK @SP, @V, B, @R, @S, 1, MASK LOR 2;       ! stack parms to nin and parm mask
000010 1  1      CODE ( PUSH %766 );                            ! push parms and mask
000011 1  1
000011 1  1      CODE ( PCAL NIN );                             ! call nin, stacking return value
000012 1  1    ?DECS 7, RP 0
000012 1  1
000012 1  1      RETURN;
000013 1  1
000013 1  1      END;
```

```
B                                 Variable     INT            Direct       L-007
MASK                              Variable     INT            Direct       L-003
R                                 Variable     INT            Indirect     L-006
S                                 Variable     INT            Indirect     L-005
SP                                Variable     STRING         Indirect     L-011
T                                 Variable     INT            Direct       L-004
V                                 Variable     FIXED (0)      Indirect     L-010

   253.   000000 0  0   ?SECTION  NIN^END
   255.   000000 0  0   ?SECTION  NOUT
   256.   000000 0  0   !
   257.   000000 0  0   INT PROC !prv! NOUT64M ( DEST, V, B, L, S ) VARIABLE;
   258.   000000 1  0   !
   259.   000000 1  0     STRING     .DEST;     ! Required.  Result string
   260.   000000 1  0     FIXED       V;        ! Required.  Value to be converted to ASCII in DEST
   261.   000000 1  0     INT         B;        ! Optional.  ( 2:16 ), Number base of conversion
   262.   000000 1  0     INT         L;        ! Optional.  ( 1:130 ), Length of converted string
   263.   000000 1  0     INT         S;        ! Optional.  ( 0:63 ), Scale for converted string
   264.   000000 1  0
   265.   000000 1  0     FORWARD;              ! An entry into NOUT64, below

B                                 Variable     INT            Direct       L-006
DEST                              Variable     STRING         Indirect     L-013
L                                 Variable     INT            Direct       L-005
S                                 Variable     INT            Direct       L-004
V                                 Variable     FIXED (0)      Direct       L-012

   267.   000000 0  0   !
   268.   000000 0  0   INT PROC !prv! NOUT64 ( DEST, V, B, L, S ) VARIABLE;
   269.   000000 1  0   !
   270.   000000 1  0     STRING     .DEST;     ! Required.  Result string
   271.   000000 1  0     FIXED       V;        ! Required.  Value to be converted to ASCII in DEST
   272.   000000 1  0     INT         B;        ! Optional.  ( 2:16 ), Number base of conversion
   273.   000000 1  0     INT         L;        ! Optional.  ( 1:130 ), Length of converted string
   274.   000000 1  0     INT         S;        ! Optional.  ( 0:63 ), Scale for converted string
   275.   000000 1  0     !
   276.   000000 1  0     !    NOUT64 converts the 64 bit binary quantity in V to an unsigned ASCII
   277.   000000 1  0     ! string of base B and byte length L and deposits the result in DEST, right
   278.   000000 1  0     ! justified, padded on the left with zeroes, like GUARDIAN's NUMOUT.
   279.   000000 1  0     !
   280.   000000 1  0     !    However...
   281.   000000 1  0     !
   282.   000000 1  0     !    The length of the result string is returned.
   283.   000000 1  0     !
   284.   000000 1  0     !    If L is negative leading zeros are replaced by blanks.
   285.   000000 1  0     !
   286.   000000 1  0     !    If B is negative, V is treated as a signed value and the ASCII result
   287.   000000 1  0     ! will contain a leading "-" if V is negative.  Valid for all values of B.
   288.   000000 1  0     !
   289.   000000 1  0     !    B and L are optional and default to -10 and the minimum width
   290.   000000 1  0     ! required to represent the value, respectively.
   291.   000000 1  0     !
   292.   000000 1  0     !    If the entry point NOUT64M is used, then the length of the result string
   293.   000000 1  0     ! contains only significant characters but does not exceed the absolute value
   294.   000000 1  0     ! of L (if L is provided).
   295.   000000 1  0     !
   296.   000000 1  0     !    S may optionally specify a scaling factor for the converted string (the
```

```
000000 1  0    ! form of the result string is, effectively,  V * B ** S.  S defaults to 0;
000000 1  0    ! it may not exceed 63.
000000 1  0    !
000000 1  0    ! If V contains more significant digits than L, a string of "*"s is returned.
000000 1  0    !
000000 1  0    !    Two jacket procedures are presented later, NOUT32/NOUT32M and NOUT/NOUTM
000000 1  0    ! which use this procedure to perform output conversion for 32 and 16 bit
000000 1  0    ! values, respectively.
000000 1  0    !
000000 1  0    !    No optional instructions are used (e.g. for 64 bit arithmetic)
000000 1  0    !
000000 1  0    BEGIN
000000 1  1    ENTRY   NOUT64M;              ! return minimum string if came this way
000000 1  1    LITERAL SMAX = 63;            ! max abs value of s
000000 1  1    LITERAL LMAX =                ! max abs value of l
000000 1  1            64 !bits! + 1 !sign! + SMAX !max scale! + 1 !radix point! + 1 !0!;
000000 1  1    STRING  DEST^ [ 0:LMAX-1 ]; ! local copy of result string
000000 1  1    INT     WDEST^ = DEST^;       ! handy word equivalence
000000 1  1    INT     V0 = V;               ! equivalences, for interpretive 64 bit ops
000000 1  1    INT     V1 = V + 1;           ! "
000000 1  1    INT     V2 = V + 2;           ! "
000000 1  1    INT     V3 = V + 3;           ! "
000000 1  1    INT     ML;                   ! return min string to dest
000000 1  1    INT     K := LMAX;            ! descending dest^ index
000000 1  1    INT     MINUS :=              ! doing signed conversion and v is negative
000000 1  1            ( ( IF $PARAM ( B ) THEN B ELSE B := -10 ) < 0 AND V0.<0> );
000000 1  1    INT     NZS := 0;             ! non-zero seen flag, for trimming zeroes on right
000000 1  1    STRING  CHAR;                 ! character to put in dest^ to right of radix pt.
000000 1  1    DEFINE  VNOTO =               ! test for non-zero V using standard instructions
000000 1  1            V0 <> [ 0, 0, 0, 0 ]#;
000000 1  1    DEFINE  TRAPSOFF =            ! disables local arithmetic traps
000000 1  1            CODE ( RDE; ANRI %577; SETE )#;
000000 1  1    STRING SUBPROC CONVERT;
000000 2  1      ! returns the ascii form of the low order digit in v
000000 2  1      BEGIN
000000 2  2      STRING  DIGIT = 'P' := [ "0123456789ABCDEF" ];
000010 2  2
000010 2  2      STACK 0, V0, B;             ! "logical divide" word 0 by B
000013 2  2      CODE ( LDIV );
000014 2  2      STORE V0;                   ! save and leave remainder stacked
000015 2  2
000015 2  2      STACK V1, B;                ! again, to word 1
000017 2  2      CODE ( LDIV );
000020 2  2      STORE V1;
000021 2  2
000021 2  2      STACK V2, B;                ! again, to word 2
000023 2  2      CODE ( LDIV );
000024 2  2      STORE V2;
000025 2  2
000025 2  2      STACK V3, B;                ! again, to word 3
000027 2  2      CODE ( LDIV );
000030 2  2      STORE V3;
000031 2  2
000031 2  2      USE DIGITX;
000031 2  2      STORE DIGITX;               ! remainder from ldiv of low order word (word 3)
000032 2  2      RETURN DIGIT [ DIGITX ];
```

```
000034 2   2
000034 2   2       END;

DIGIT                    Variable      STRING       Direct       P+000
DIGITX                   Variable      INT          Direct       X 007

000034 1   1    IF $PARAM ( L ) THEN ML := 0 ELSE NOUT64M: ML := -1;
000076 1   1    IF NOT ML THEN                    ! fill dest^
000100 1   1      BEGIN
000100 1   2      WDEST^ := IF L.<0> THEN "  " ELSE "00";
000111 1   2      WDEST^ [ 1 ] ':=' WDEST^ FOR ( ( LMAX - 1 ) >> 1 );
000115 1   2      END;
000115 1   1    L := $ABS ( L );                  ! don't care if supplied or not
000121 1   1    B := $ABS ( B );                  ! needs be positive for convert
000125 1   1
000125 1   1    TRAPSOFF;                         ! expect overflow in conversion
000130 1   1    IF MINUS THEN V := OF - V;        ! make positive for convert
000141 1   1
000141 1   1    IF $PARAM ( S ) THEN              ! scale supplied
000144 1   1      IF S < 0 THEN                   ! negative scaling
000147 1   1        BEGIN
000147 1   2        DO                            ! lay down fractional digits right to left
000147 1   2          IF ( CHAR := CONVERT ) <> "0" OR NZS THEN
000156 1   2            BEGIN
000156 1   3            DEST^ [ K := K - 1 ] := CHAR;
000164 1   3            NZS := 1;
000166 1   3            END
000166 1   2          ELSE                        ! haven't seen a non "0" yet
000167 1   2            IF NOT ML THEN K := K - 1
000171 1   2        UNTIL NOT ( S := S + 1 );
000177 1   2        IF NZS OR NOT ML THEN         ! add "." if non 0 to right or not min string
000203 1   2          DEST^ [ K := K - 1 ] := ".";
000211 1   2        END
000211 1   1      ELSE
000212 1   1        IF S AND VNOTO THEN           ! positive scaling needed
000223 1   1          DO DEST^ [ K := K - 1 ] := "0" UNTIL NOT ( S := S - 1 );
000235 1   1
000235 1   1    ! lay down significant digits to left of radix point
000235 1   1    DO DEST^ [ K := K - 1 ] := CONVERT UNTIL NOT VNOTO;
000252 1   1
000252 1   1    IF MINUS THEN                     ! need "-"
000254 1   1      DEST^ [ K := ( IF ML THEN K - 1 ELSE $MIN ( K - 1, LMAX - L ) ) ] := "-";
000301 1   1
000301 1   1    IF NOT $PARAM ( L ) OR L >= LMAX - K THEN
000312 1   1      BEGIN                           ! move the result string to caller's dest
000312 1   2      IF ML THEN L := LMAX - K;
000320 1   2      DEST [ L - 1 ] '=:' DEST^ [ LMAX - 1 ] FOR L;
000332 1   2      END
000332 1   1    ELSE                              ! result won't fit in caller's dest
000333 1   1      IF L THEN DEST ':=' "*" & DEST FOR L - 1;
000350 1   1
000350 1   1    RETURN L;
000353 1   1
000353 1   1    END; ! nout64
```

```
B                Variable    INT          Direct        L-006
CHAR             Variable    STRING       Direct        L+106
CONVERT          Subproc     STRING       %000010
DEST             Variable    STRING       Indirect      L-013
DEST^            Variable    STRING       Direct        L+001
K                Variable    INT          Direct        L+103
L                Variable    INT          Direct        L-005
LMAX             Literal     INT          %000202
MINUS            Variable    INT          Direct        L+104
ML               Variable    INT          Direct        L+102
NOUT64M          Entry       INT          %000073
NZS              Variable    INT          Direct        L+105
S                Variable    INT          Direct        L-004
SMAX             Literal     INT          %000077
TRAPSOFF         Define                    CODE ( RDE; ANRI %577; SETE )
V                Variable    FIXED (0)    Direct        L-012
V0               Variable    INT          Direct        L-012
V1               Variable    INT          Direct        L-011
V2               Variable    INT          Direct        L-010
V3               Variable    INT          Direct        L-007
VNOTO            Define                    V0 <> [ 0, 0, 0, 0 ]
WDEST^           Variable    INT          Direct        L+001

000000 0  0   !
000000 0  0   INT PROC !prv! NOUT32M ( DEST, V, B, L, S ) VARIABLE;
000000 1  0   !
000000 1  0     STRING     .DEST;    ! Required.  Result string
000000 1  0     INT ( 32 )  V;       ! Required.  Value to be converted to ASCII in DEST
000000 1  0     INT         B;       ! Optional.  ( 2:16 ), Number base of conversion
000000 1  0     INT         L;       ! Optional.  ( 1:130 ), Length of converted string
000000 1  0     INT         S;       ! Optional.  ( 0:63 ), Scale for converted string
000000 1  0
000000 1  0     FORWARD;             ! An entry into NOUT32, below

B                Variable    INT          Direct        L-006
DEST             Variable    STRING       Indirect      L-011
L                Variable    INT          Direct        L-005
S                Variable    INT          Direct        L-004
V                Variable    INT (32)     Direct        L-010

000000 0  0   !
000000 0  0   INT PROC !prv! NOUT32 ( DEST, V, B, L, S ) VARIABLE;
000000 1  0   !
000000 1  0     STRING     .DEST;    ! Required.  Result string
000000 1  0     INT ( 32 )  V;       ! Required.  Value to be converted to ASCII in DEST
000000 1  0     INT         B;       ! Optional.  ( 2:16 ), Number base of conversion
000000 1  0     INT         L;       ! Optional.  ( 1:130 ), Length of converted string
000000 1  0     INT         S;       ! Optional.  ( 0:63 ), Scale for converted string
000000 1  0     !
000000 1  0     ! A jacket for calling NOUT64 and NOUT64M (above) where V is a 32 bit value.
000000 1  0     !
000000 1  0     BEGIN
000000 1  1     ENTRY NOUT32M;
000000 1  1     INT MASK = 'L' '<<' 3;          ! my parm mask
000000 1  1     INT PROC1 := 1;                 ! 0:call nout64, 1:call nout64m
000000 1  1
```

```
000000 1  1     PROCL := 0;
000007 1  1     NOUT32M:
000011 1  1
000011 1  1     STACK @DEST;
000012 1  1     IF ( NOT $PARAM ( B ) OR B < 0 ) AND $HIGH ( V ).<0> THEN
000024 1  1       STACK -1D                      ! extend sign
000024 1  1     ELSE
000026 1  1       STACK  0D;                     ! no sign extension
000027 1  1     STACK V;
000030 1  1     STACK B, L, S;
000033 1  1     CODE ( PUSH %777 );              ! push parms onto stack
000034 1  1     STACK MASK; CODE ( PUSH %700 );! push parm mask onto stack
000036 1  1
000036 1  1     IF PROCL THEN CODE ( PCAL NOUT64M ) ELSE CODE ( PCAL NOUT64 );
000043 1  1
000043 1  1   ?DECS 9, RP 0
000043 1  1     RETURN;
000044 1  1
000044 1  1     END; ! NOUT32

B                        Variable     INT          Direct     L-006
DEST                     Variable     STRING       Indirect   L-011
L                        Variable     INT          Direct     L-005
MASK                     Variable     INT          Direct     L-003
NOUT32M                  Entry        INT          %000010
PROCL                    Variable     INT          Direct     L+001
S                        Variable     INT          Direct     L-004
V                        Variable     INT (32)     Direct     L-010

000000 0  0   !
000000 0  0   INT PROC !prv! NOUTM ( DEST, V, B, L, S ) VARIABLE;
000000 1  0   !
000000 1  0     STRING     .DEST;    ! Required.  Result string
000000 1  0     INT         V;       ! Required.  Value to be converted to ASCII in DEST
000000 1  0     INT         B;       ! Optional.  ( 2:16 ), Number base of conversion
000000 1  0     INT         L;       ! Optional.  ( 1:130 ), Length of converted string
000000 1  0     INT         S;       ! Optional.  ( 0:63 ), Scale for converted string
000000 1  0
000000 1  0     FORWARD;             ! An entry into NOUT, below

B                        Variable     INT          Direct     L-006
DEST                     Variable     STRING       Indirect   L-010
L                        Variable     INT          Direct     L-005
S                        Variable     INT          Direct     L-004
V                        Variable     INT          Direct     L-007

000000 0  0   !
000000 0  0   INT PROC !prv! NOUT ( DEST, V, B, L, S ) VARIABLE;
000000 1  0   !
000000 1  0     STRING     .DEST;    ! Required.  Result string
000000 1  0     INT         V;       ! Required.  Value to be converted to ASCII in DEST
000000 1  0     INT         B;       ! Optional.  ( 2:16 ), Number base of conversion
000000 1  0     INT         L;       ! Optional.  ( 1:130 ), Length of converted string
000000 1  0     INT         S;       ! Optional.  ( 0:63 ), Scale for converted string
000000 1  0     !
000000 1  0     ! A jacket for calling NOUT64 and NOUT64M (above) where V is a 16 bit value.
```

```
000000 1  0      !
000000 1  0      BEGIN
000000 1  1      ENTRY NOUTM;
000000 1  1      INT MASK = 'L' '-' 3;
000000 1  1      INT PROCL := 1;                 ! 0:call nout64, 1:call nout64m
000000 1  1
000000 1  1      PROCL := 0;
000007 1  1      NOUTM:
000011 1  1
000011 1  1      STACK @DEST;
000012 1  1      IF ( NOT $PARAM ( B ) OR B < 0 ) AND V.<0> THEN
000023 1  1        STACK -1D, -1                 ! extend sign
000024 1  1      ELSE
000026 1  1        STACK  0D,  0;                ! no sign extension
000030 1  1      STACK V;
000031 1  1      STACK B, L, S;
000034 1  1      CODE ( PUSH %777 );             ! push parms onto stack
000035 1  1      STACK MASK; CODE ( PUSH %700 );! push parm mask onto stack
000037 1  1
000037 1  1      IF PROCL THEN CODE ( PCAL NOUT64M ) ELSE CODE ( PCAL NOUT64 );
000044 1  1
000044 1  1    ?DECS 9, RP 0
000044 1  1      RETURN;
000045 1  1
000045 1  1      END; ! NOUT

B                        Variable     INT        Direct      L-006
DEST                     Variable     STRING     Indirect    L-010
L                        Variable     INT        Direct      L-005
MASK                     Variable     INT        Direct      L-003
NOUTM                    Entry        INT        %000010
PROCL                    Variable     INT        Direct      L+001
S                        Variable     INT        Direct      L-004
V                        Variable     INT        Direct      L-007

000000 0  0    ?SECTION  NOUT^END

000000 0  0    ?SECTION  MTIMESTAMPCOLLAPSE
000000 0  0    !
000000 0  0    INT PROC !prv! MTIMESTAMPCOLLAPSE ( DEST, TIMESTAMP ) VARIABLE;
000000 1  0    !
000000 1  0      STRING .DEST;         ! [0:21]  Destination string pointer
000000 1  0      INT    .TIMESTAMP;    ! [0:2]   48 bit timestamp, defaults to current time
000000 1  0      !
000000 1  0      ! deposits in dest a null terminated ascii military style representation of
000000 1  0      ! timestamp (dd MMM yyyy, hh:mm:ss) and returns the length.
000000 1  0      !
000000 1  0      BEGIN
000000 1  1      INT     DT [ 0:6 ];
000000 1  1      STRING .PTR := @DEST;
000000 1  1      STRING  MONTHS [ 0:( 12 * 4 - 1 ) ] = 'P' :=
000030 1  1                     "Jan Feb Mar Apr May Jun Jul Aug Sep Oct Nov Dec ";
000030 1  1
000030 1  1      IF $PARAM ( TIMESTAMP ) THEN
000036 1  1        CALL CONTIME ( DT, TIMESTAMP, TIMESTAMP [ 1 ], TIMESTAMP [ 2 ] )
000046 1  1      ELSE
```

```
520.   000047 1  1      CALL TIME ( DT );
521.   000052 1  1
522.   000052 1  1     @PTR := @PTR [ NOUT ( PTR, DT [ 2 ],, -2 ) ];                       ! day
523.   000065 1  1     PTR ':=' " " & MONTHS [ ( DT [ 1 ] - 1 ) * 4 ] FOR 4 -> @PTR;  ! month
524.   000107 1  1     PTR [ NOUT ( PTR, DT ) ] ':=' ", " -> @PTR;                        ! year
525.   000127 1  1     PTR [ NOUT ( PTR, DT [ 3 ],, -2 ) ] ':=' ":" -> @PTR;              ! hour
526.   000150 1  1     PTR [ NOUT ( PTR, DT [ 4 ],,  2 ) ] ':=' ":" -> @PTR;              ! minute
527.   000171 1  1     @PTR := @PTR [ NOUT ( PTR, DT [ 5 ],,  2 ) ];                       ! second
528.   000204 1  1
529.   000204 1  1     PTR := 0;
530.   000206 1  1     RETURN @PTR '-' @DEST;
531.   000216 1  1
532.   000216 1  1     END; ! mtimestampcollapse

DEST                          Variable      STRING      Indirect     L-005
DT                            Variable      INT         Direct       L+001
MONTHS                        Variable      STRING      Direct       P+000
PTR                           Variable      STRING      Indirect     L+010
TIMESTAMP                     Variable      INT         Indirect     L-004

533.   000000 0  0   ?SECTION  MTIMESTAMPCOLLAPSE^END
535.   000000 0  0   ?SECTION  CRTPIDCOLLAPSE
536.   000000 0  0   !
537.   000000 0  0   INT PROC !prv! CRTPIDCOLLAPSE ( DEST, CRTPID ) VARIABLE;
538.   000000 1  0   !
539.   000000 1  0     STRING .DEST;    ! [*]                  result string, 17 bytes max length
540.   000000 1  0     INT    .CRTPID; ! (crtpid^template)   process id, defaults to my crtpid (local)
541.   000000 1  0     !
542.   000000 1  0     ! deposits the null terminated external form name of crtpid in dest and
543.   000000 1  0     ! returns the string length, excluding the null.
544.   000000 1  0     !
545.   000000 1  0     BEGIN
546.   000000 1  1     INT     LEN;
547.   000000 1  1     STRUCT  CRTPIDFILE ( FILENAME^TEMPLATE );
548.   000000 1  1
549.   000000 1  1     CRTPIDFILE ':=' "  " & CRTPIDFILE FOR AWLEN ( CRTPIDFILE );
550.   000012 1  1     IF $PARAM ( CRTPID ) THEN
551.   000015 1  1       CRTPIDFILE ':=' CRTPID FOR WLEN ( CRTPID^TEMPLATE )
552.   000015 1  1     ELSE
553.   000023 1  1       CALL GETCRTPID ( MYPID, CRTPIDFILE );
554.   000027 1  1
555.   000027 1  1     DEST [ LEN := FNAMECOLLAPSE ( CRTPIDFILE, DEST ) ] := 0;
556.   000037 1  1     RETURN LEN;
557.   000041 1  1
558.   000041 1  1     END; ! crtpidcollapse

CRTPID                        Variable      INT         Indirect     L-004
CRTPIDFILE                    Variable,30   STRUCT      Direct       L+002
DEST                          Variable      STRING      Indirect     L-005
LEN                           Variable      INT         Direct       L+001

559.   000000 0  0   ?SECTION  CRTPIDCOLLAPSE^END
561.   000000 0  0   ?SECTION  SYSIDCOLLAPSE
562.   000000 0  0
563.   000000 0  0
564.   000000 0  0   ! Deposits the null terminated external form name of a system number
```

```
000000 0  0   ! in dest and returns the string length, excluding the null.
000000 0  0   ! If sysid is not defined a length of zero is returned.
000000 0  0   INT PROC !prv! SYSIDCOLLAPSE ( DEST, SYSID ) VARIABLE;
000000 1  0
000000 1  0     STRING .DEST;    ! [*] result string, 9 bytes max length
000000 1  0     INT     SYSID;   ! a system number, defaults to mysystemnumber
000000 1  0     BEGIN
000000 1  1     STRUCT    SVSNAME ( NAME^TEMPLATE );
000000 1  1     INT       LDEV;
000000 1  1     STRING    .PTR;
000000 1  1
000000 1  1     SYSNAME.WORD ':=' "  " & SYSNAME.WORD FOR AWLEN ( SYSNAME );
000012 1  1     CALL GETSYSTEMNAME ( IF $PARAM ( SYSID ) THEN SYSID ELSE MYSYSTEMNUMBER,
000012 1  1                          SYSNAME );
000025 1  1     SCAN SYSNAME.BYTE UNTIL " " -> @PTR;
000032 1  1     DEST ':=' SYSNAME.BYTE FOR @PTR '-' @SYSNAME.BYTE & 0;
000050 1  1     RETURN @PTR '-' @SYSNAME.BYTE;
000056 1  1
000056 1  1     END; ! sysidcollapse

DEST                    Variable       STRING         Indirect       L-005
LDEV                    Variable       INT            Direct         L+005
PTR                     Variable       STRING         Indirect       L+006
SYSID                   Variable       INT            Direct         L-004
SYSNAME                 Variable,10    STRUCT         Direct         L+001

000000 0  0   ?SECTION  SYSIDCOLLAPSE^END
000000 0  0   ?SECTION  USERIDCOLLAPSE
000000 0  0   !
000000 0  0   INT PROC !prv! USERIDCOLLAPSE ( DEST, USERID );
000000 1  0   !
000000 1  0     STRING .DEST;    ! [*] result string, 17 bytes max length
000000 1  0     INT     USERID;  ! user id to collapse and deposit in dest
000000 1  0     !
000000 1  0     ! deposits the null terminated external form name of the userid
000000 1  0     ! in dest and returns the string length, excluding the null.
000000 1  0     ! if userid is not defined a length of zero is returned.
000000 1  0     !
000000 1  0     BEGIN
000000 1  1     STRUCT    USERIDNAME ( USERIDNAME^TEMPLATE );
000000 1  1     STRING    .P := @DEST;
000000 1  1
000000 1  1     SUBPROC MOVENAME ( NP );
000000 2  1       STRING .NP ( NAME^TEMPLATE );
000000 2  1       BEGIN
000000 2  2       USE X; USE C;
000000 2  2       FOR X := 0 TO ALEN ( NP ) DO IF ( C := NP.BYTE [ X ] ) <> " " THEN
000011 2  2                                       BEGIN
000011 2  3                                       P := C; PINC ( P );
000016 2  3                                       END
000016 2  2                                     ELSE
000017 2  2                                       RETURN;
000022 2  2       END;

C                       Variable       INT            Direct         X 006
NP                      Variable,10    STRUCT S       Indirect       S-001
X                       Variable       INT            Direct         X 007
```

```
000023 1  1
000023 1  1      USERIDNAME.USERID := USERID;
000030 1  1      CALL USERIDTOUSERNAME ( USERIDNAME );
000033 1  1      IF =  THEN
000034 1  1        BEGIN
000034 1  2        CALL MOVENAME ( USERIDNAME.GROUPNAME );
000040 1  2        P := "."; PINC ( P );
000045 1  2        CALL MOVENAME ( USERIDNAME.USERNAME );
000052 1  2        END;
000052 1  1      P := 0;
000054 1  1      RETURN @P '-' @DEST;
000060 1  1
000060 1  1      END; ! useridcollapse
```

| | | | | |
|---|---|---|---|---|
| DEST | Variable | STRING | Indirect | L-004 |
| MOVENAME | Subproc | | %000000 | |
| P | Variable | STRING | Indirect | L+011 |
| USERID | Variable | INT | Direct | L-003 |
| USERIDNAME | Variable,20 | STRUCT | Direct | L+001 |

ENTRY POINT MAP BY NAME

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 015 | 001345 | 001406 | 001345 | V | CRTPIDCOLLAPSE | 12FEB87 | 12:29 | TAL | $OVER.T9618C00.SGP |
| 00 | 014 | 001123 | 001344 | 001153 | V | MTIMESTAMPCOLLAPSE | 12FEB87 | 12:29 | TAL | $OVER.T9618C00.SGP |
| 00 | 003 | 000021 | 000377 | 000153 | V | NIN | 12FEB87 | 12:29 | TAL | $OVER.T9618C00.SGP |
| 00 | 004 | 000400 | 000412 | 000400 | V | NIN32 | 12FEB87 | 12:29 | TAL | $OVER.T9618C00.SGP |
| 00 | 005 | 000413 | 000425 | 000413 | V | NIN64 | 12FEB87 | 12:29 | TAL | $OVER.T9618C00.SGP |
| 00 | 012 | 001056 | 001122 | 001062 | V | NOUT | 12FEB87 | 12:29 | TAL | $OVER.T9618C00.SGP |
| 00 | 010 | 001012 | 001055 | 001016 | V | NOUT32 | 12FEB87 | 12:29 | TAL | $OVER.T9618C00.SGP |
| 00 | 011 | 001012 | 001055 | 001022 | EV | NOUT32M | 12FEB87 | 12:29 | TAL | $OVER.T9618C00.SGP |
| 00 | 006 | 000426 | 001011 | 000511 | V | NOUT64 | 12FEB87 | 12:29 | TAL | $OVER.T9618C00.SGP |
| 00 | 007 | 000426 | 001011 | 000521 | EV | NOUT64M | 12FEB87 | 12:29 | TAL | $OVER.T9618C00.SGP |
| 00 | 013 | 001056 | 001122 | 001066 | EV | NOUTM | 12FEB87 | 12:29 | TAL | $OVER.T9618C00.SGP |
| 00 | 016 | 001407 | 001466 | 001407 | V | SYSIDCOLLAPSE | 12FEB87 | 12:29 | TAL | $OVER.T9618C00.SGP |
| 00 | 002 | 000020 | 000020 | 000020 | | T9618C00^15JUL87^GP^11F7 | 12FEB87 | 12:29 | TAL | $OVER.T9618C00.SVERSION |
| 00 | 017 | 001467 | 001546 | 001512 | | USERIDCOLLAPSE | 12FEB87 | 12:29 | TAL | $OVER.T9618C00.SGP |
| | | 000000 | | COMMON | WORD | #GLOBAL | 12FEB87 | 12:29 | TAL | $VIOLET.TOOLSC00.ExtdecsO |

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 002 | 000020 | 000020 | 000020 | | T9618C00^15JUL87^GP^11F7 | 12FEB87 | 12:29 | TAL | $OVER.T9618C00.SVERSION |
| 00 | 003 | 000021 | 000377 | 000153 | V | NIN | 12FEB87 | 12:29 | TAL | $OVER.T9618C00.SGP |
| 00 | 004 | 000400 | 000412 | 000400 | V | NIN32 | 12FEB87 | 12:29 | TAL | $OVER.T9618C00.SGP |
| 00 | 005 | 000413 | 000425 | 000413 | V | NIN64 | 12FEB87 | 12:29 | TAL | $OVER.T9618C00.SGP |
| 00 | 006 | 000426 | 001011 | 000511 | V | NOUT64 | 12FEB87 | 12:29 | TAL | $OVER.T9618C00.SGP |
| 00 | 007 | 000426 | 001011 | 000521 | EV | NOUT64M | 12FEB87 | 12:29 | TAL | $OVER.T9618C00.SGP |
| 00 | 010 | 001012 | 001055 | 001016 | V | NOUT32 | 12FEB87 | 12:29 | TAL | $OVER.T9618C00.SGP |
| 00 | 011 | 001012 | 001055 | 001022 | EV | NOUT32M | 12FEB87 | 12:29 | TAL | $OVER.T9618C00.SGP |
| 00 | 012 | 001056 | 001122 | 001062 | V | NOUT | 12FEB87 | 12:29 | TAL | $OVER.T9618C00.SGP |
| 00 | 013 | 001056 | 001122 | 001066 | EV | NOUTM | 12FEB87 | 12:29 | TAL | $OVER.T9618C00.SGP |
| 00 | 014 | 001123 | 001344 | 001153 | V | MTIMESTAMPCOLLAPSE | 12FEB87 | 12:29 | TAL | $OVER.T9618C00.SGP |
| 00 | 015 | 001345 | 001406 | 001345 | V | CRTPIDCOLLAPSE | 12FEB87 | 12:29 | TAL | $OVER.T9618C00.SGP |

```
00  016  001407  001466  001407  V        SYSIDCOLLAPSE              12FEB87  12:29 TAL     $OVER.T9618C00:SGP
00  017  001467  001546  001512           USERIDCOLLAPSE             12FEB87  12:29 TAL     $OVER.T9618C00.SGP

Code size = 871 words
  PEP = 16 words
  Procedures = 855 words
  Gap at 32K = 0 words
  XEP = 8 words
Code area size = 1 pages
Resident code size = 0 pages

  000000          COMMON   WORD    #GLOBAL                   12FEB87  12:29  TAL      $VIOLET.TOOLSC00.Extdecs0

BINDER - OBJECT FILE BINDER - T9621C00 - (09SEP86)   SYSTEM \PRUNE
Object file name is $OVER.T9618C00.ogp
Object file timestamp is 12FEB87 12:29:24
Number of Binder errors = 0
Number of Binder warnings = 0
Code area size = 1 pages
Resident code size = 0 pages
Data area size = 1 pages
Extended data area size = 0 pages
Top of stack = 0 words
Number of code segments  = 1 segment


The object file will run on a TNS/II, but may not run on a TNS
Errorfile file name is $OVER.T9618C00.EGP
Number of compiler errors =  0
Number of compiler warnings =  0
Maximum symbol table space used was = 36860 bytes
Number of source lines = 10052
Compile cpu time = 00:00:08
Total Elapsed time = 00:00:52
```

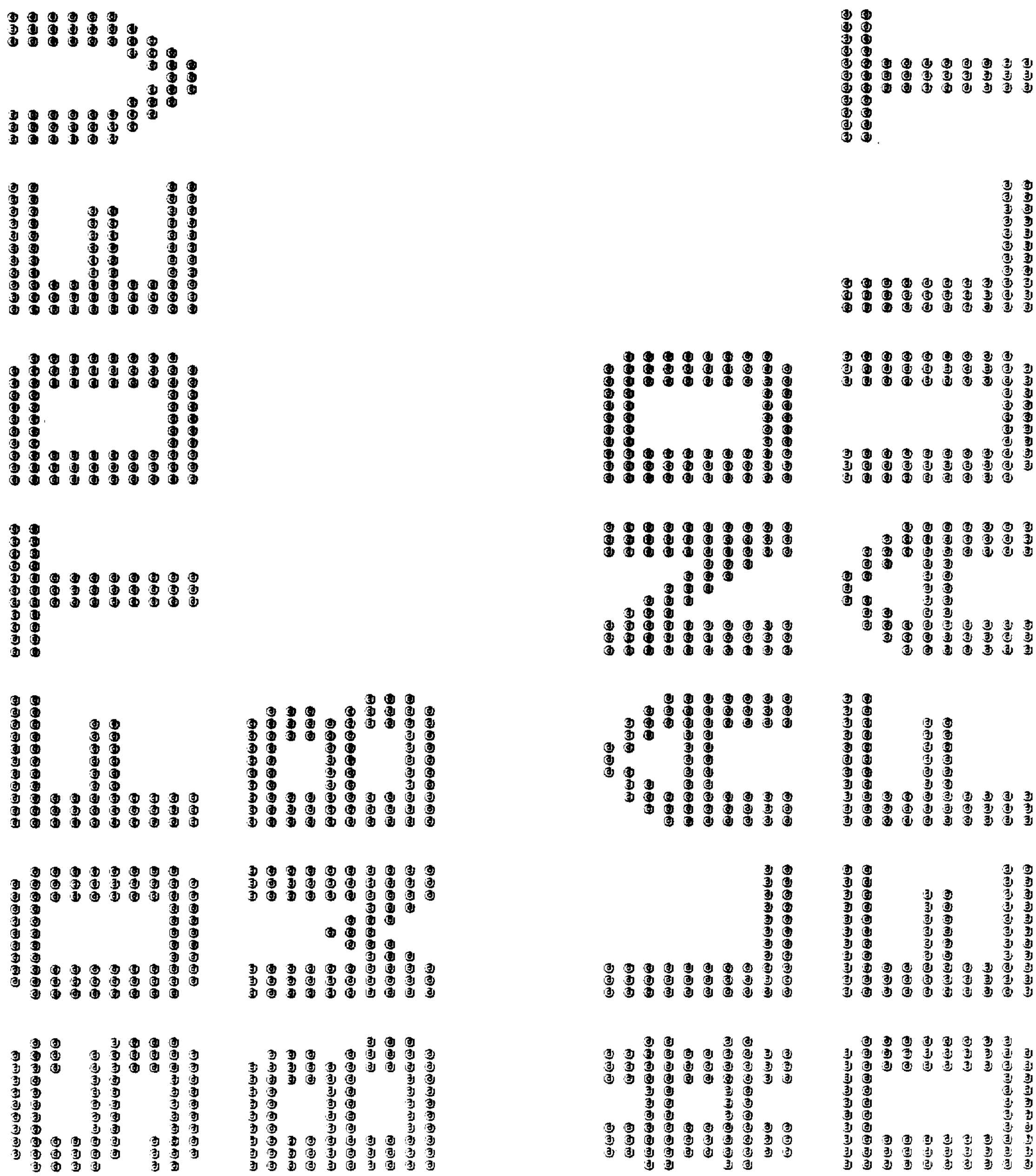

```
TAL - T9250B40 - (15SEP86)                          Source language: TAL - Target machine: Tandem NonStop II System
Date - Time :  03APR87 - 09:17:10                 Default options: On (LIST,CODE,MAP,WARN,LMAP) - Off (ICODE,INNERLIST)

                          ? ERRORFILE ehelp,USEGLOBALS ggloba1,SEARCH ogloba1,NOCODE,SYMBOLS,NOGMAP,NOLMAP,NOFIXUP
UseGlobals file:  $OVER.T9618C00.GGLOBAL  02APR87 - 16:53:52
Search file:  $OVER.T9618C00.OGLOBAL  02APR87 - 16:55:07
    2.     000000 0  0    NAME     COVERCOM^HELP;
    3.     000000 0  0    ?NOLIST
   34.     000000 0  0    ?BEGINCOMPILATION
   35.     000000 0  0    ?SOURCE copytal                        !Copyright notice
Source file:  [1]  $VIOLET.TOOLSC00.COPYTAL  18FEB87 - 09:37:02
    1.     000000 0  0    ! +-------------------------------------------------------------------+
    2.     000000 0  0    ! |                                                                   |
    3.     000000 0  0    ! |   Copyright (C) 1987 by TANDEM COMPUTERS INCORPORATED             |
    4.     000000 0  0    ! |                                                                   |
    5.     000000 0  0    ! |   Protected as an unpublished work.                               |
    6.     000000 0  0    ! |                                                                   |
    7.     000000 0  0    ! |   The computer program listings and specifications herein are     |
    8.     000000 0  0    ! |   the property of TANDEM COMPUTERS INCORPORATED and shall not be  |
    9.     000000 0  0    ! |   reproduced, copied, or used, in whole or in part, for any       |
   10.     000000 0  0    ! |   reason without the written permission of TANDEM COMPUTERS       |
   11.     000000 0  0    ! |   INCORPORATED.                                                   |
   12.     000000 0  0    ! |                                                                   |
   13.     000000 0  0    ! |   The following are trademarks or service marks of TANDEM         |
   14.     000000 0  0    ! |   COMPUTERS INCORPORATED:                                         |
   15.     000000 0  0    ! |                                                                   |
   16.     000000 0  0    ! |   6AX         ENSCRIBE      INFOSAT*      PATHMAKER       TAL      |
   17.     000000 0  0    ! |   APEX/SQL    ENVOY         INSPECT       PCFORMAT        Tandem   |
   18.     000000 0  0    ! |   BINDER      ENVOYACP/XF   MEASURE       PERUSE          TGAL     |
   19.     000000 0  0    ! |   CROSSREF    EXCHANGE      MULTILAN      PS MAIL         THL      |
   20.     000000 0  0    ! |   DATABOLT    EXPAND        NonStop       PS TEXT EDIT    TIL      |
   21.     000000 0  0    ! |   DDL         FASTSORT      NonStop 1+    PS TEXT FORMAT  TMF      |
   22.     000000 0  0    ! |   DYNABUS     FAXLINK       NonStop EXT   RDF             TRANSFER |
   23.     000000 0  0    ! |   DYNAMITE    FOX           NonStop EXT10 SAFE            WORDLINK |
   24.     000000 0  0    ! |   ENABLE      FOXII         NonStop EXT25 SAFEGUARD       XLB      |
   25.     000000 0  0    ! |   ENCOMPASS   GUARDIAN      NonStop II    SAFE-T-NET      XRAY     |
   26.     000000 0  0    ! |   ENCORE      GUARDIAN 90   NonStop TXP   T-TEXT                   |
   27.     000000 0  0    ! |   ENFORM      GUARDIAN 90XF NonStop VLX   TACL                     |
   28.     000000 0  0    ! |                                                                   |
   29.     000000 0  0    ! +-------------------------------------------------------------------+
   30.     000000 0  0    ! | * INFOSAT is a trademark in which both Tandem and American        |
   31.     000000 0  0    ! |   Satellite have rights.                                          |
   32.     000000 0  0    ! +-------------------------------------------------------------------+
   33.     000000 0  0    ! |   TANDEM COMPUTERS INCORPORATED -- PROPRIETARY AND CONFIDENTIAL   |
   34.     000000 0  0    ! +-------------------------------------------------------------------+
   36.     000000 0  0    ?NOLIST, source pscan    ( scanidta )
   38.     000000 0  0    ?NOLIST, source psiolib  ( printhelp )
   40.     000000 0  0    ?NOLIST, source pcover   ( debug^err, nextchar )
   42.     000000 0  0    ?SOURCE sversion( version^help )
Source file:  [1]  $OVER.T9618C00.SVERSION  03APR87 - 08:28:53
   33.     000000 0  0    ?SECTION VERSION^HELP
   34.     000000 0  0    PROC T9618C00^15JUL87^HELP^03APR7;
   35.     000000 1  0    BEGIN END;
   43.     000000 0  0    ?SOURCE shelp
Source file:  [1]  $OVER.T9618C00.SHELP  05MAR87 - 08:53:51
```

```
000000 0  0   proc !prv! help^command;
000000 1  0   begin
000000 1  1   int         x;                 ! command number
000000 1  1   int         n;                 ! next address
000000 1  1   int         i := 0;            ! index
000000 1  1   int         l := 0;            ! length
000000 1  1   string    .line [ 0:31 ];      ! handy buffer
000000 1  1
000000 1  1   ?SOURCE shcover
Source file:  [7]  $OVER.T9618C00.SHCOVER  03APR87 - 09:17:08
000000 1  1   STRING       HelpText = 'P' :=
000000 1  1   ["^"
000000 1  1   ,"AND                 COMMENT           DISABLE           DISplay^"
000001 1  1   ,"ENABLE              ENV               Exit              FC^"
000043 1  1   ,"Help                List              MARKup            Measure^"
000102 1  1   ,"OR                  ORDER             PAGEsize          PAUSE^"
000144 1  1   ,"REset               Save              SORT              WHENCE^"
000205 1  1   ,"XOR^"
000247 1  1   ,"~AND~^"
000251 1  1   ,"AND { FILE <fileA> }^"
000254 1  1   ,"    { PIN <pin>    }^"
000266 1  1   ,"^"
000301 1  1   ,"     INTO <fileB>^"
000301 1  1   ,"^"
000312 1  1   ,"     [PROGRAMONLY|^"
000312 1  1   ,"     [LIBRARYONLY]^"
000323 1  1   ,"^"
000334 1  1   ,"Performs the logical AND of the bitmaps in the two files specified and^"
000335 1  1   ,"writes the result back to <fileB>.  If <fileB> does not exist, it is^"
000400 1  1   ,"created (and will simply be a copy of <fileA>.)  This is useful for^"
000443 1  1   ,"merging the results of multiple test runs to determine what HAS been^"
000505 1  1   ,"covered by ALL of the tests.^"
000547 1  1   ,"^"
000566 1  1   ,"Either FILE or PIN must be specified.^"
000566 1  1   ,"^"
000611 1  1   ,"PROGRAMONLY is used to indicate that only the measurement data for the^"
000612 1  1   ,"PROGRAM is to be included in the AND operation.  The LIBRARY data (if^"
000655 1  1   ,"any) will be that which was originally in <fileB>.^"
000720 1  1   ,"^"
000752 1  1   ,"LIBRARYONLY is used to indicate that only the measurement data for the^"
000752 1  1   ,"LIBRARY is to be included in the AND operation.  The PROGRAM data will^"
001016 1  1   ,"be that which was originally in <fileB>.^"
001061 1  1   ,"~COMMENT~^"
001106 1  1   ,"^"
001113 1  1   ,"Standard COMMENT command.  This will cause the rest of the input line^"
001113 1  1   ,"to be ignored (including "";""'s).^"
001156 1  1   ,"~DISABLE~^"
001177 1  1   ,"DISABLE [PRIV]                        (SUPER.SUPER only)^"
001204 1  1   ,"^"
001237 1  1   ,"DISABLE will cause COVERCOM to free the COVER control block from^"
001237 1  1   ,"memory, making further measurements impossible in this processor until^"
001300 1  1   ,"another ENABLE is issued.  If the COVER control block is in use (a^"
001343 1  1   ,"measurement is in progress on some PIN or a filename is in the Measure^"
001405 1  1   ,"OBJECT list), then the DISABLE will not be performed.^"
001450 1  1   ,"^"
001503 1  1   ,"PRIV: Mearly disables the measuring of privileged programs.  This does^"
001504 1  1   ,"      NOT free the COVER control block.^"
```

```
001547 1  1   ,"^"
001573 1  1   ,"This command is used by the system operator to control the use of^"
001574 1  1   ,"COVER within a given processor.^"
001635 1  1   ,"~DISPLAY~^"
001655 1  1   ,"DISplay {FILE <bitmap file>}^"
001662 1  1   ,"        {PIN <pin>         }^"
001700 1  1   ,"^"
001717 1  1   ,"        [CODE <object file>]^"
001717 1  1   ,"^"
001736 1  1   ,"        [LIB  <object file>]^"
001736 1  1   ,"^"
001755 1  1   ,"        [PROGRAMONLY]^"
001755 1  1   ,"        [LIBRARYONLY]^"
001770 1  1   ,"^"
002003 1  1   ,"        [BRIEF   ]^"
002004 1  1   ,"        [SUMMARY]^"
002015 1  1   ,"^"
002026 1  1   ,"Displays a listing of all statements' source file line numbers in the^"
002026 1  1   ,"measured program.  The procedure name and entry points will be^"
002071 1  1   ,"included.  All unexecuted statements will be marked with an asterisk^"
002131 1  1   ,"(*) in the left column.  For each procedure and for the total program,^"
002173 1  1   ,"statistics will be included indicating the number of statements and^"
002237 1  1   ,"percentage of those not executed.  If FILE <bitmap file> is specified,^"
002301 1  1   ,"the measurement data will be read from that file, otherwise it will be^"
002344 1  1   ,"read from the memory image specified by PIN <pin>.^"
002410 1  1   ,"^"
002441 1  1   ,"CODE may be used to specify an object file other than that indicated^"
002442 1  1   ,"in the PIN's PCB (the object file specified in the RUN command, or^"
002504 1  1   ,"OSIMAGE for system processes).  This is necessary, for instance, for^"
002546 1  1   ,"measuring system procedures.  These require you to point to a copy of^"
002610 1  1   ,"the corresponding object file which includes Inspect ?SYMBOLS.  THIS^"
002653 1  1   ,"COPY SHOULD BE THE ONE USED TO PERFORM THE SYSGEN SO ALL ICODE^"
002716 1  1   ,"LOCATIONS WILL MATCH THOSE IN MEMORY!^"
002755 1  1   ,"^"
003000 1  1   ,"LIB may be used in a similar manner to CODE but is used to specify an^"
003001 1  1   ,"object file for the library.^"
003044 1  1   ,"^"
003062 1  1   ,"PROGRAMONLY will cause only the PROGRAM code to be measured.^"
003063 1  1   ,"^"
003121 1  1   ,"LIBRARYONLY will cause only the LIBRARY code to be measured.^"
003122 1  1   ,"^"
003160 1  1   ,"If BRIEF is specified, only unexecuted statements will be listed.  In^"
003161 1  1   ,"addition, if no statements within the procedure were executed, a^"
003224 1  1   ,"message to that effect will be output rather than a list of all^"
003264 1  1   ,"statements in the procedure.^"
003324 1  1   ,"^"
003343 1  1   ,"If SUMMARY is specified, no statement detail will be listed.^"
003343 1  1   ,"~ENABLE~^"
003402 1  1   ,"ENABLE [PRIV]                      (SUPER.SUPER only)^"
003406 1  1   ,"^"
003441 1  1   ,"ENABLE will cause COVERCOM to build a COVER control block in memory^"
003442 1  1   ,"and establish addressability to it through an 'SG' location.  An^"
003504 1  1   ,"ENABLE must be performed before any COVER measurements can be^"
003544 1  1   ,"performed in the processor.  If a processor is reloaded an ENABLE must^"
003603 1  1   ,"again be performed to enable measurements.^"
003647 1  1   ,"^"
003674 1  1   ,"^"
```

```
003675 1  1   ,"PRIV: Enable the measuring of privileged programs.  COVER must already^"
003675 1  1   ,"      have been ENABLEd before this option may be used.  Measuring^"
003741 1  1   ,"      otherwise working privileged programs may cause system failures^"
004002 1  1   ,"      due to erroneous Inspect symbols produced by the compiler.^"
004045 1  1   ,"^"
004106 1  1   ,"This command is used by the system operator to control the use of^"
004106 1  1   ,"COVER within a given processor.^"
004147 1  1   ,"-ENV-^"
004167 1  1   ,"ENV  [PIN]  [OBJECT]^"
004172 1  1   ,"^"
004205 1  1   ,"PIN:^"
004205 1  1   ,"List all PINs that are currently being measured in this cpu.^"
004210 1  1   ,"^"
004246 1  1   ,"OBJECT:^"
004247 1  1   ,"List all filenames that are in the OBJECT list; i.e., will be^"
004253 1  1   ,"measured automatically when they are run in this cpu.^"
004312 1  1   ,"^"
004345 1  1   ,"No parameter list:^"
004345 1  1   ,"This provides an indication of which version of COVERCOM is running,^"
004357 1  1   ,"where it resides, and when it was compiled.  Further, it describes the^"
004421 1  1   ,"process itself: the system, cpu, and pin, the start time, and the user^"
004465 1  1   ,"who ran it.  It then describes which system image was cold loaded and^"
004530 1  1   ,"what version it is.  Finally it indicates whether COVER is ENABLEd or^"
004573 1  1   ,"DISABLEd in this cpu.^"
004636 1  1   ,"-EXIT-^"
004651 1  1   ,"Exit^"
004655 1  1   ,"^"
004657 1  1   ,"Exits from the program.  An <eof> is equivalent.^"
004660 1  1   ,"~FC~^"
004710 1  1   ,"FC^"
004713 1  1   ,"^"
004714 1  1   ,"Standard fix command.^"
004715 1  1   ,"~HELP~^"
004730 1  1   ,"Help  [ <command name> ]^"
004733 1  1   ,"^"
004750 1  1   ,"""HELP"" alone displays a table of commands.^"
004750 1  1   ,"^"
004776 1  1   ,"Displays help information about the specified command name.^"
004776 1  1   ,"^"
005034 1  1   ,"Keywords that may be abbreviated are displayed in mixed case, where^"
005035 1  1   ,"the minimum abbreviation is upper case and the remaining characters^"
005077 1  1   ,"are lower case (e.g. the help command may be abbreviated to ""H"").^"
005141 1  1   ,"^"
005202 1  1   ,"COVERCOM is run as follows:^"
005202 1  1   ,"[RUN] COVERCOM [ <initial command> [; <initial command>] ... [;]]^"
005220 1  1   ,"^"
005261 1  1   ,"For <command> you can specify any valid COVERCOM command.  If the last^"
005262 1  1   ,"character in the parameter line is a "";"", then these commands will be^"
005325 1  1   ,"executed before any specified in the IN file.  Otherwise these^"
005370 1  1   ,"commands will be executed and COVERCOM will terminate.  In either^"
005430 1  1   ,"case, syntax errors in the commands will cause COVERCOM to prompt the^"
005471 1  1   ,"user if the IN file is a terminal.^"
005534 1  1   ,"^"
005555 1  1   ,"The IN file is the name of a file from which COVERCOM reads commands.^"
005556 1  1   ,"COVERCOM reads records from the specified command file until it^"
005621 1  1   ,"encounters an EXIT command or the end of file.  The IN file is read^"
005661 1  1   ,"after the initial commands, if any, are processed.  If run^"
```

```
005723 1  1   ,"interactively, you will be prompted with '(cp,pin) COVER>', where 'cp'^"
005760 1  1   ,"is the cpu and 'pin' the pin in which COVERCOM is running.^"
006024 1  1   ,"^"
006061 1  1   ,"This sample measurement assumes that FUP was compiled with ?SYMBOLS.^"
006062 1  1   ,"We assume COVER has been ENABLEd previously, that FUP is on^"
006124 1  1   ,"$system.sys77, and that there are not other bitmap files named^"
006162 1  1   ,"ZZCOnnnn in $system.sys77.  What you type is in lower case:^"
006222 1  1   ,":logon super.super                 SO YOU HAVE WRITE AUTHORITY TO FUP^"
006260 1  1   ,":covercom/cpu 0/measure object $system.sys77.fup^"
006322 1  1   ,":run $system.sys77.fup/cpu 0/     MUST BE SAME CPU AS COVERCOM^"
006352 1  1   ,"-create filea                     DO SOME FUP COMMANDS^"
006411 1  1   ,"-exit^"
006444 1  1   ,"^"
006447 1  1   ,"You can print out a report of which statements were not executed^"
006450 1  1   ,"(assuming that FUP was compiled with ?SYMBOLS) as follows^"
006510 1  1   ,":covercom /out $s.#titan/display file $system.sys77.zzco0001^"
006545 1  1   ,"-LIST-^"
006604 1  1   ,"List <object file name>^"
006607 1  1   ,"^"
006623 1  1   ,"Lists all procedures, entry points, statement offsets and their EDIT^"
006624 1  1   ,"line numbers for a given object file in a format similar to the^"
006666 1  1   ,"DISPLAY command.  This is primarily useful as an aid in understanding^"
006726 1  1   ,"what is considered a program statement.^"
006771 1  1   ,"~MARKUP~^"
007015 1  1   ,"MARKup LISTING <inlist file>^"
007022 1  1   ,"^"
007040 1  1   ,"        TO <outlist file>^"
007041 1  1   ,"^"
007055 1  1   ,"        BITMAP <bitmap file>^"
007056 1  1   ,"^"
007074 1  1   ,"        [LIBRARY]^"
007074 1  1   ,"^"
007105 1  1   ,"        [OBJECT <object file name>]^"
007105 1  1   ,"^"
007127 1  1   ,"        [COLUMNS <col>]^"
007127 1  1   ,"^"
007143 1  1   ,"        [IGNORETOGGLES]^"
007143 1  1   ,"^"
007157 1  1   ,"This facility will markup a program listing indicating which^"
007157 1  1   ,"statements were executed.  Note that there may be more than one^"
007216 1  1   ,"statement on a given source line.  For each statement line in the^"
007256 1  1   ,"program, one of the following characters will be inserted in the^"
007317 1  1   ,"^"
007357 1  1   ,"listing directly after the edit line number:^"
007360 1  1   ,"* indicates that NO statements on the line were executed.^"
007406 1  1   ,"+ indicates that some statement was executed but another was not.^"
007443 1  1   ,"? indicates that the statement was not measured.^"
007504 1  1   ,"If a line is not marked, then ALL statements on the line WERE executed.^"
007535 1  1   ,"^"
007601 1  1   ,"Any question of accuracy of the MARKUP facility should be checked with^"
007601 1  1   ,"the DISPLAY command, which is always correct.^"
007645 1  1   ,"^"
007674 1  1   ,"<inlist file> must be a spooled job, either in the spooler or in a^"
007674 1  1   ,"disk file (code 129).  Spooler jobs are denoted by^"
007736 1  1   ,"""[$<supervisor name>.]#<job num>"".  If the supervisor name is omitted,^"
007767 1  1   ,"then $SPLS will be assumed.^"
010033 1  1   ,"^"
```

```
010051 1 1 ,"<outlist file> must be a spooler collector or disk file (code 129)^"
010051 1 1 ,"since level-3 spooling will be done.^"
010113 1 1 ,"^"
010135 1 1 ,"<bitmap file> specifies a bitmap file of measurement results.  When^"
010136 1 1 ,"the bitmap file was created, the name of the corresponding object file^"
010200 1 1 ,"was stored.  It is the user's responsibility to ensure that the^"
010243 1 1 ,"specified listing <inlist file> corresponds to the object file^"
010303 1 1 ,"referenced in the bitmap file.^"
010343 1 1 ,"^"
010362 1 1 ,"The LIBRARY indicates that the listing contains procedures which were^"
010363 1 1 ,"executed as the library as specified in the RUN command (LIB <fn>) or^"
010426 1 1 ,"as specified to the BINDER.^"
010471 1 1 ,"^"
010507 1 1 ,"<object file name> specifies the name of the object file that was^"
010507 1 1 ,"measured, either a program or a library file.  It is the user's^"
010550 1 1 ,"responsibility to ensure that this object file is identical to the one^"
010610 1 1 ,"measured to create <bitmap file>.^"
010654 1 1 ,"^"
010675 1 1 ,"<cols> specifies which source columns are to be ignored.  This^"
010675 1 1 ,"corresponds to the ?COLUMNS compiler directive.^"
010735 1 1 ,"^"
010765 1 1 ,"IGNORETOGGLES is your way of helping MARKUP parse the listing.  In^"
010765 1 1 ,"general, there is no way to parse or pattern-match an arbitrary^"
011027 1 1 ,"listing.  This is due primarily to the unrestricted use of ?[NO]LIST^"
011067 1 1 ,"directives.  If IGNORETOGGLES is specified, MARKUP will^"
011131 1 1 ,"ignore ?IF[NOT], ?ENDIF, and ?[RE]SETTOG compiler directives.^"
011165 1 1 ,"Otherwise, MARKUP will honor those directives as best it can, but^"
011224 1 1 ,"then ?[RE]SETTOGs and ?IF[NOT] / ?ENDIF pairs must be ""visible"" on the^"
011265 1 1 ,"listing.^"
011331 1 1 ,"-MEASURE-^"
011335 1 1 ,"Measure { OBJECT <object file>           }^"
011342 1 1 ,"        {                                }^"
011370 1 1 ,"        { PIN <pin> [CODE <object file>] }^"
011415 1 1 ,"        {                                }^"
011443 1 1 ,"        {           [LIB  <object file>] }^"
011470 1 1 ,"        {                                }^"
011516 1 1 ,"        {           [PROGRAMONLY]        }^"
011543 1 1 ,"        {           [LIBRARYONLY]^"
011571 1 1 ,"^"
011612 1 1 ,"          [SAVEVOL <savevol>]^"
011612 1 1 ,"^"
011631 1 1 ,"          [NOWARN]^"
011632 1 1 ,"^"
011643 1 1 ,"OBJECT version:^"
011644 1 1 ,"Start a measurement every time <object file> is run in this cpu.  You^"
011654 1 1 ,"must have read/write/execute authority for <object file name> to^"
011717 1 1 ,"perform this command.  Only processes with read/execute authority^"
011757 1 1 ,"for <object file> will be measured.^"
012020 1 1 ,"^"
012042 1 1 ,"^"
012043 1 1 ,"PIN version:^"
012043 1 1 ,"Start building the bitmap for the process at <pin>.  When the process^"
012052 1 1 ,"stops, the measurement will be turned off and the bitmap saved to a^"
012115 1 1 ,"file named ""ZZCOnnnn"" in the same subvolume as the corresponding^"
012157 1 1 ,"program file.  RESET will also turn off the measurement.  The^"
012217 1 1 ,"measurement data may be SAVEd and/or DISPLAYed at any point, without^"
012256 1 1 ,"impacting the measurement.  No further measurements on this PIN may be^"
```

```
012321 1   1   ,"performed BY ANY USER until a RESET command is issued for this PIN or^"
012364 1   1   ,"the process has stopped.^"
012427 1   1   ,"^"
012444 1   1   ,"CODE <object file> may be used to refer to the symbol information in^"
012444 1   1   ,"the specified object file.  It is up to the user to ensure that the^"
012507 1   1   ,"object file specified is identical in all other respects to the one^"
012551 1   1   ,"currently being executed by <pin>.  This is particularly useful for^"
012613 1   1   ,"measuring system procedures which all reside in OSIMAGE (which has a^"
012655 1   1   ,"special format and does not have symbols).^"
012717 1   1   ,"^"
012745 1   1   ,"**WARNING** If the code portion of the file specified by CODE is not^"
012745 1   1   ,"EXACTLY identical to the code being measured, spurious results will^"
013010 1   1   ,"occur.  The Inspect region of the CODE file is used to determine where^"
013052 1   1   ,"statements start, and breakpoints are set there.  If these do not^"
013115 1   1   ,"correspond to the object code being measured, breakpoints may overlay^"
013156 1   1   ,"constants, for instance.  For privileged code this could cause a loss^"
013221 1   1   ,"of integrity to the system, including data corruption and system^"
013264 1   1   ,"halts!^"
013325 1   1   ,"^"
013330 1   1   ,"LIB may be used in a similar manner to CODE but is used to specify an^"
013331 1   1   ,"object file for the library.^"
013374 1   1   ,"^"
013412 1   1   ,"PROGRAMONLY is used to indicate that only the PROGRAM code is to be^"
013413 1   1   ,"measured.^"
013455 1   1   ,"^"
013462 1   1   ,"LIBRARYONLY is used to indicate that only the LIBRARY code is to be^"
013462 1   1   ,"measured.^"
013524 1   1   ,"^"
013531 1   1   ,"^"
013532 1   1   ,"^"
013532 1   1   ,"SAVEVOL <savevol> allows you to specify a subvolume on which to save^"
013533 1   1   ,"the bitmap file when the process terminates.  If SAVEVOL is not^"
013575 1   1   ,"specified, it will default to the volume and subvolume of <object file>.^"
013635 1   1   ,"This parameter applies to both the OBJECT and the PIN versions.^"
013702 1   1   ,"^"
013742 1   1   ,"NOWARN will inhibit the warnings about procedures which do not have^"
013742 1   1   ,"Inspect symbols.  This keyword applies to both the OBJECT and the PIN^"
014004 1   1   ,"versions.^"
014047 1   1   ,"~OR~^"
014054 1   1   ,"OR  ( FILE <fileA> )^"
014057 1   1   ,"    ( PIN <pin>    )^"
014071 1   1   ,"^"
014104 1   1   ,"    INTO <fileB>^"
014104 1   1   ,"^"
014115 1   1   ,"    |PROGRAMONLY|^"
014115 1   1   ,"    |LIBRARYONLY|^"
014126 1   1   ,"^"
014137 1   1   ,"Performs the logical OR of the bitmaps in the two files specified and^"
014140 1   1   ,"writes the result back to <fileB>.  If <fileB> does not exist, it is^"
014203 1   1   ,"created (and will simply be a copy of <fileA>.)  This is useful for^"
014245 1   1   ,"merging the results of multiple test runs to determine what has not^"
014307 1   1   ,"been covered by ANY of the tests.^"
014351 1   1   ,"^"
014372 1   1   ,"Either FILE or PIN must be specified.^"
014373 1   1   ,"^"
014416 1   1   ,"PROGRAMONLY is used to indicate that only the measurement data for the^"
014416 1   1   ,"PROGRAM is to be included in the OR operation.  The LIBRARY data (if^"
```

```
014462 1 1  ,"any) will be that which was originally in <fileB>.^"
014524 1 1  ,"^"
014556 1 1  ,"LIBRARYONLY is used to indicate that only the measurement data for the^"
014556 1 1  ,"LIBRARY is to be included in the OR operation.  The PROGRAM data will^"
014622 1 1  ,"be that which was originally in <fileB>.^"
014665 1 1  ,"~ORDER-^"
014711 1 1  ,"ORDER SUBVOL <subvol> PROGRAM <pfname> [OBJECT <objfname>]^"
014715 1 1  ,"^"
014753 1 1  ,"Will print a sorted report of all the bitmap files in <subvol> that^"
014753 1 1  ,"have a bitmap for the program <pfname>.^"
015015 1 1  ,"^"
015041 1 1  ,"PROGRAM <pfname> specifies the name of an object file which was being^"
015042 1 1  ,"measured to create the bitmaps.  All bitmap files have the program^"
015105 1 1  ,"(and library, if present) filenames included in a header.  These^"
015146 1 1  ,"headers are searched for each file in <subvol> to locate logical^"
015207 1 1  ,"groups of bitmap files.^"
015247 1 1  ,"^"
015263 1 1  ,"OBJECT <objfname> specifies the name of the object file that^"
015264 1 1  ,"corresponds to the one measured, either a program or a library file.^"
015322 1 1  ,"It may be used to supply symbols is the <pfname> object file was^"
015365 1 1  ,"stripped.  It is the user's responsibility to ensure that this object^"
015425 1 1  ,"file is identical to the one measured to create the bitmap file.^"
015470 1 1  ,"^"
015531 1 1  ,"^"
015531 1 1  ,"Given that bitmap (bitmapN) corresponds to a test case (testN), we^"
015532 1 1  ,"will select bitmap1 to correspond to the test case which provides the^"
015573 1 1  ,"most coverage.  Once test1 through testN have been run, testN+1 will^"
015636 1 1  ,"be selected to be the test that adds the most coverage.^"
015701 1 1  ,"^"
015735 1 1  ,"The report will include the bitmap file name, its percent coverage,^"
015735 1 1  ,"and the accumulated percent.^"
015777 1 1  ,"-PAGESIZE~^"
016016 1 1  ,"PAGEsize [ <lines> |  0 ]^"
016023 1 1  ,"^"
016040 1 1  ,"Sets the maximum lines to display on terminal screen before prompting^"
016041 1 1  ,"the user.  Default is 22.  Range is 0 through 88.^"
016104 1 1  ,"^"
016135 1 1  ,"Specifying 0 disables paging.^"
016135 1 1  ,"~PAUSE~^"
016154 1 1  ,"PAUSE <number> (SEC)^"
016160 1 1  ,"                (MIN)^"
016173 1 1  ,"^"
016205 1 1  ,"Causes this command interpreter to delay for <number> seconds or^"
016206 1 1  ,"minutes.  This allows you to use the terminal for other things while^"
016246 1 1  ,"you are running a measurement.^"
016311 1 1  ,"~RESET-^"
016330 1 1  ,"REset { OBJECT <object file name> }^"
016334 1 1  ,"      { PIN <pin> [!]             }^"
016356 1 1  ,"^"
016400 1 1  ,"OBJECT version:^"
016401 1 1  ,"No further measurements of <object file name> will be performed in^"
016411 1 1  ,"this cpu.  Any currently running measurements will run to completion.^"
016452 1 1  ,"They may be stopped individually using the PIN version of this^"
016515 1 1  ,"command.^"
016555 1 1  ,"^"
016561 1 1  ,"PIN version:^"
016562 1 1  ,"This will stop the measurement of <pin> (if the process was not^"
```

```
016570 1   1   ,"already stopped) and free all the memory that was used to MEASURE^"
016630 1   1   ,"this PIN.^"
016671 1   1   ,"^"
016676 1   1   ,"The ""!"" operator is required if no previous SAVE command was issued^"
016677 1   1   ,"for this pin.^"
016741 1   1   ,"~SAVE~^"
016750 1   1   ,"Save PIN <pin> TO <filename>^"
016753 1   1   ,"^"
016772 1   1   ,"Dumps the contents of the <pin> measurement data (bitmap), in raw^"
016772 1   1   ,"binary data format, to the unstructured file <filename>.  From there,^"
017033 1   1   ,"it will be available for further processing; e.g., merging runs and^"
017076 1   1   ,"printing reports with statement line numbers.^"
017140 1   1   ,"~SORT~^"
017167 1   1   ,"SORT { FILE <bitmapfile> }^"
017173 1   1   ,"     { PIN <pin>          }^"
017210 1   1   ,"^"
017226 1   1   ,"^"
017226 1   1   ,"     [ CODE <object file> ]^"
017227 1   1   ,"^"
017245 1   1   ,"     [ LIB <object file> ]^"
017245 1   1   ,"^"
017263 1   1   ,"     [ PROGRAMONLY ]^"
017263 1   1   ,"     [ LIBRARYONLY ]^"
017276 1   1   ,"^"
017310 1   1   ,"     [ OVER <nn> ]^"
017311 1   1   ,"^"
017322 1   1   ,"Reports all sequences of over <nn> unexecuted statements in decreasing^"
017323 1   1   ,"order of size (where size means number of statements).^"
017366 1   1   ,"^"
017422 1   1   ,"OVER <nn> may be used to limit the sort to sequences of more than <nn>^"
017422 1   1   ,"statements.  The default is 1, so only sequences of 2 or more^"
017466 1   1   ,"statements are normally reported.  Zero (0) may be specified to report^"
017525 1   1   ,"individual statements.^"
017570 1   1   ,"~WHENCE~^"
017604 1   1   ,"WHENCE FILE <bitmapfile>^"
017610 1   1   ,"^"
017625 1   1   ,"Will print out the names of the program and library files which were^"
017625 1   1   ,"being measured to produce the bitmap file <bitmapfile>.  The binder^"
017670 1   1   ,"timestamp(s) are also included.^"
017732 1   1   ,"~XOR~^"
017752 1   1   ,"XOR { FILE <fileA> }^"
017755 1   1   ,"    { PIN <pin>    }^"
017767 1   1   ,"^"
020002 1   1   ,"    INTO <fileB>^"
020002 1   1   ,"^"
020013 1   1   ,"     [PROGRAMONLY]^"
020013 1   1   ,"     [LIBRARYONLY]^"
020024 1   1   ,"^"
020035 1   1   ,"Performs the logical XOR of the bitmaps in the two files specified and^"
020036 1   1   ,"writes the result back to <fileB>.  If <fileB> does not exist, it is^"
020101 1   1   ,"created (and will simply be a copy of <fileA>.)  This is useful for^"
020144 1   1   ,"merging the results of multiple test runs to determine what has been^"
020206 1   1   ,"covered by THIS test that wasn't covered by the others.^"
020250 1   1   ,"^"
020304 1   1   ,"Either FILE or PIN must be specified.^"
020305 1   1   ,"^"
020330 1   1   ,"PROGRAMONLY is used to indicate that only the measurement data for the^"
```

```
447.     020330 1  1    ,"PROGRAM is to be included in the XOR operation.  The LIBRARY data (if^"
448.     020374 1  1    ,"any) will be that which was originally in <fileB>.^"
449.     020437 1  1    ,"^"
450.     020470 1  1    ,"LIBRARYONLY is used to indicate that only the measurement data for the^"
451.     020471 1  1    ,"LIBRARY is to be included in the XOR operation.  The PROGRAM data will^"
452.     020534 1  1    ,"be that which was originally in <fileB>.^"
453.     020600 1  1    ,"^"
454.     020624 1  1    ,0,0];
 11.     020626 1  1
 12.     020626 1  1    if ( x := scanidta ( charadr, @commands ) ) >= 0 then
 13.     020651 1  1      begin
 14.     020651 1  2      do
 15.     020651 1  2        begin
 16.     020651 1  3        scan commands [ i := i + 1 ] while " " -> n;
 17.     020665 1  3        scan commands [.i := n '-' @commands + 1 ] until " " -> n;
 18.     020705 1  3        l := n '-' @commands [ i ];
 19.     020716 1  3        end
 20.     020716 1  2      until ( x := x - 1 ) < 0;
 21.     020723 1  2      line ':=' commands [ i ] for l;
 22.     020734 1  2      end
 23.     020734 1  1    else
 24.     020743 1  1      begin
 25.     020743 1  2      @line := @char;
 26.     020745 1  2      while char and char <> ";" and char <> " " do @char := @char [ 1 ];
 27.     020761 1  2      l := @char '-' @line;
 28.     020765 1  2      end;
 29.     020765 1  1
 30.     020765 1  1    eol;
 31.     020776 1  1    call printhelp ( @helptext, line, l );
 32.     021011 1  1
 33.     021011 1  1    end; !proc help^command
HELPTEXT                         Variable      STRING        Direct        P+000
I                                Variable      INT           Direct        L+003
L                                Variable      INT           Direct        L+004
LINE                             Variable      STRING        Indirect      L+005
N                                Variable      INT           Direct        L+002
X                                Variable      INT           Direct        L+001
BINDER - OBJECT FILE BINDER - T9621C00 - (09SEP86)   SYSTEM \PRUNE
Object file name is $OVER.T9618C00.ohelp
Object file timestamp is 03APR87 09:17:10
Number of Binder errors = 0
Number of Binder warnings = 0
Primary data = 143 words
Secondary data = 4152 words
Code area size = 10 pages
Resident code size = 0 pages
Data area size = 6 pages
Extended data area size = 0 pages
Top of stack = 4295 words
Number of code segments = 1 segment
The object file will run on a TNS/II, but may not run on a TNS
Errorfile file name is $OVER.T9618C00.EHELP
Number of compiler errors =  0
Number of compiler warnings =  0
Maximum symbol table space used was = 152230 bytes
Number of source lines = 818
Compile cpu time = 00:00:02
Total Elapsed time = 00:00:34
```

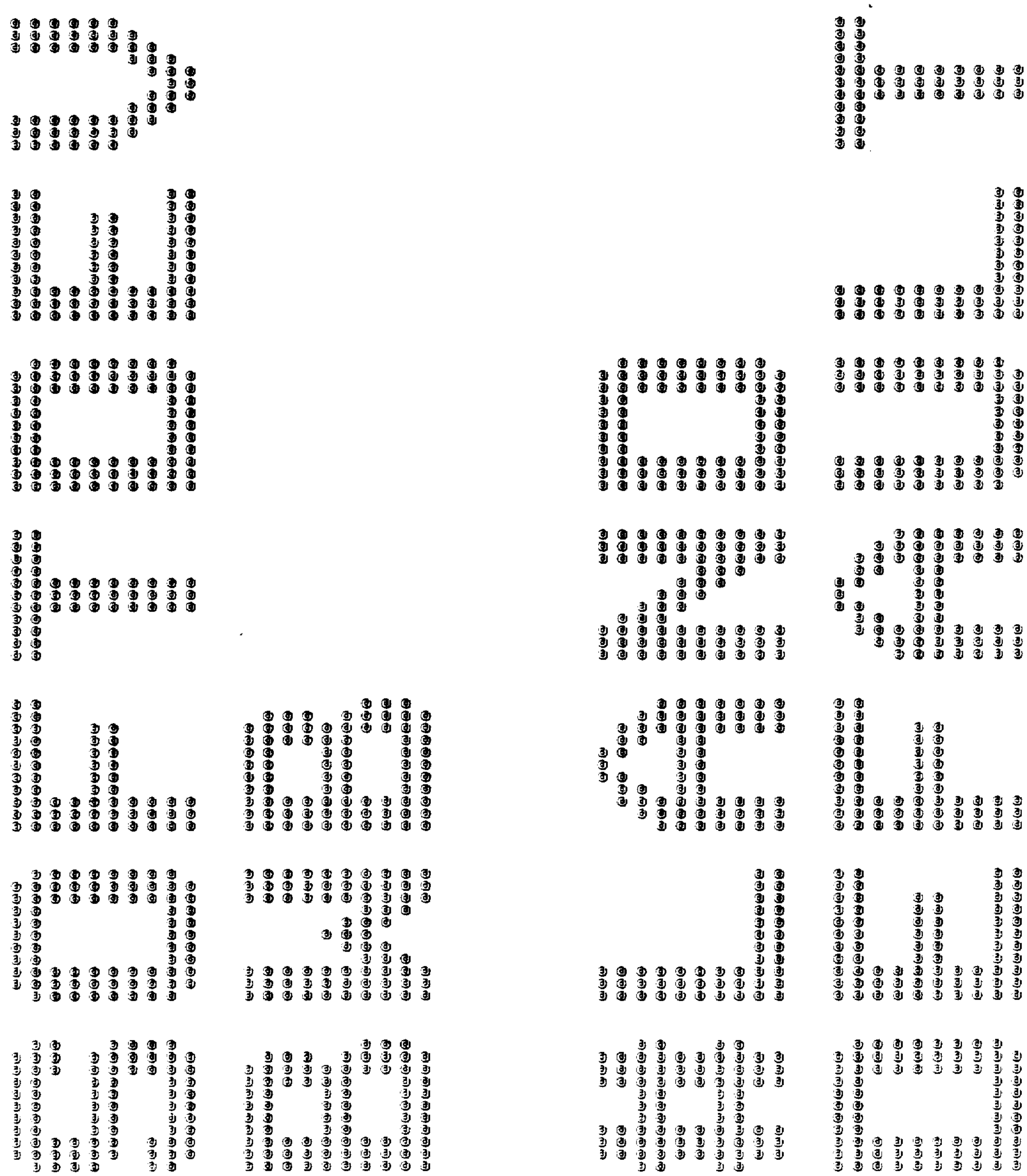

```
TAL    19250B40    (15SEP86)                                    Source language: TAL - Target machine: Tandem NonStop II. System
Date - Time :   12FEB87 - 12:37:48                             Default options: On (LIST,CODE,MAP,WARN,LMAP) - Off (ICODE,INNERLIST)

                              ?ERRORFILE elibsrc,NOFIXUP,cpu tns,NOCODE, SYMBOLS, MAP, NOGMAP, LMAP(ALPHA,LOC)
     1.    000000 0  0    ?SOURCE VERSRC(VERSION^HEADER)
Source file:  [1]  $OVER.T9618C00.VERSRC  12NOV85 - 21:20:13
     1.    000000 0  0    ?SECTION VERSION^HEADER
     2.    000000 0  0    !
     2.1   000000 0  0    !         COPYRIGHT (C) TANDEM COMPUTERS INC.  1984
     2.2   000000 0  0    !
     2.3   000000 0  0    !         THESE COMPUTER PROGRAM LISTINGS AND SPECIFICATIONS HEREIN ARE THE
     2.4   000000 0  0    !         PROPERTY OF TANDEM COMPUTERS INC. AND ARE NOT TO BE REPRODUCED OR
     2.5   000000 0  0    !         COPIED IN WHOLE OR IN PART FOR ANY REASON WITHOUT THE WRITTEN
     2.6   000000 0  0    !         PERMISSION OF TANDEM.
     3.1   000000 0  0    !
     4.    000000 0  0    !         VERSION:  T9101B00x - MODIFIED FOR DISC JOBS BY MITCH BUTLER
     5.    000000 0  0    !         DATE:     10aug85
     2.    000000 0  0    !         SOURCE:   SPOOLER LIBRARY PROCEDURES
     5.    000000 0  0    !
     6.    000000 0  0    !
     8.    000000 0  0    ?SOURCE COMSRC
Source file:  [1]  $OVER.T9618C00.COMSRC  03SEP85 - 14:41:28
     1.    000000 0  0    ?SOURCE VERSRC(VERSION^HEADER)
Source file:  [3]  $OVER.T9618C00.VERSRC  12NOV85 - 21:20:13
     1.    000000 0  0    ?SECTION VERSION^HEADER
     2.    000000 0  0    !
     2.1   000000 0  0    !         COPYRIGHT (C) TANDEM COMPUTERS INC.  1984
     2.2   000000 0  0    !
     2.3   000000 0  0    !         THESE COMPUTER PROGRAM LISTINGS AND SPECIFICATIONS HEREIN ARE THE
     2.4   000000 0  0    !         PROPERTY OF TANDEM COMPUTERS INC. AND ARE NOT TO BE REPRODUCED OR
     2.5   000000 0  0    !         COPIED IN WHOLE OR IN PART FOR ANY REASON WITHOUT THE WRITTEN
     2.6   000000 0  0    !         PERMISSION OF TANDEM.
     3.1   000000 0  0    !
     4.    000000 0  0    !         VERSION:  T9101B00x - MODIFIED FOR DISC JOBS BY MITCH BUTLER
     5.    000000 0  0    !         DATE:     10aug85
     2.    000000 0  0    !         SOURCE:   SPOOLER COMMON DECLARATIONS
     5.    000000 0  0    !
     6.    000000 0  0    !
     8.    000000 0  0    !
     9.    000000 0  0    ! SPOOL PROCEDURES DEFINES AND LITERALS
    10.    000000 0  0    !
    11.    000000 0  0    ?SOURCE VERSRC(VERSION^STRING)
Source file:  [3]  $OVER.T9618C00.VERSRC  12NOV85 - 21:20:13
     6.    000000 0  0    ?SECTION VERSION^STRING
     7.    000000 0  0    DEFINE
     8.    000000 0  0      VERSION^STRING="T9101B00x- (10aug85)"#;                          !!!!!!!!!
     9.    000000 0  0    LITERAL
    10.    000000 0  0      VERSION^STRING^LEN=20;                                             !!!!!!!!!
    12.    000000 0  0    LITERAL
    13.    000000 0  0            JOB^DEFAULTFLAGS=%4,      ! DEFAULT FLAGS WORD FROM SPOOLSTART
    14.    000000 0  0            JOB^DEFAULTPAGESIZE=60,      ! DEFAULT PAGESIZE FROM SPOOLSTART
    15.    000000 0  0            JOB^DEFAULTCOPIES=1,      ! DEFAULT NUMBER OF COPIES
    16.    000000 0  0            SPOOL^CHECK=%125353,      ! CHECK WORD FOR CONSISTANCY CHECK
    16.1   000000 0  0            HBATCH=2,                 ! BATCH HEADER INDICATOR !                        !C13,AT #1
    16.2   000000 0  0            CONTROL^VALUE^MIN = -100,  ! MINIMUM VALUE FOR CONTROL(OP,PARM) !          !B00,AT #1
    16.3   000000 0  0            CONTROL^VALUE^MAX =  100,  ! MAXIMUM VALUE FOR CONTROL(OP,PARM) !          !B00,AT #1
```

```
000000 0  0         BLOCK^SIZE = 512;                    ! I/O BLOCK SIZE IN WORDS
000000 0  0       DEFINE                       ! DEFINE BLOCK LENGTHS
000000 0  0    !***  SETBIT(ARRAY, INDEX)=ARRAY[INDEX.<0:11>]:=ARRAY[INDEX.<0:11>]'+'              C12 #7
000000 0  0    !***                                          %100000'>>'(INDEX.<12:15>)#,     C12 #7
000000 0  0    !***  CLEARBIT(ARRAY, INDEX)=ARRAY[INDEX.<0:11>]:=ARRAY[INDEX.<0:11>]'-'           C12 #7
000000 0  0    !***                                            %100000'>>'(INDEX.<12:15>)#,   C12 #7
000000 0  0                                                                                  !C12 #7
000000 0  0         SETBIT(ARRAY, INDEX)=BEGIN                                               !C12 #7
000000 0  0                             STACK %100000 '>>' (INDEX.<12:15>),                  !C12 #7
000000 0  0                             @ARRAY[INDEX.<0:11>];                                !C12 #7
000000 0  0                             CODE(ORG)                                            !C12 #7
000000 0  0                             END #,                                               !C12 #7
000000 0  0         CLEARBIT(ARRAY, INDEX)=BEGIN                                             !C12 #7
000000 0  0                             STACK $COMP( %100000 '>>' (INDEX.<12:15>) ),         !C12 #7
000000 0  0                             @ARRAY[INDEX.<0:11>];                                !C12 #7
000000 0  0                             CODE(ANG)                                            !C12 #7
000000 0  0                             END #,                                               !C12 #7
000000 0  0         BITSET(ARRAY, INDEX)=0>(ARRAY[INDEX.<0:11>]'<<'(INDEX.<12:15>))#,
000000 0  0         WORDFORBIT(ARRAY, INDEX)=ARRAY[INDEX.<0:11>]#,
000000 0  0         BLANKFILL(ARRAY, LEN)=ARRAY ':=' [" "] & ARRAY FOR LEN-1#,
000000 0  0         ZEROFILL(ARRAY, LEN)=ARRAY ':=' [0] & ARRAY FOR LEN-1#,
000000 0  0         ERROR^IN=ERROR:=#,
000000 0  0         PRINTPROCESS^TIMEOUT=360000D#,
000000 0  0    !    BLOCK^HEAD^LEN = (@BLOCK.COUNT '-' @BLOCK '+' 1)#, !! BLOCK HEADER SIZE   B30,MBB============= #XXX
000000 0  0         BLOCK^HEAD^LEN = ($OFFSET (BLOCK.DATA) / 2) #,      ! BLOCK HEADER SIZE   B30,MBB============= #XXX
000000 0  0         MAX^DATA^LEN = (BLOCK^SIZE - BLOCK^HEAD^LEN)#;      ! DATA PORTION SIZE
000000 0  0    !
000000 0  0    ! THE FOLLOWING ARE THE LEGAL VALUES USED BY SPOOLERSTATUS
000000 0  0    ! IN THE COMMAND AND SCAN PARAMETERS
000000 0  0    !
000000 0  0    LITERAL
000000 0  0      SCAN^THIS=0,      ! SCANTYPE FOR FIND THIS ENTRY
000000 0  0      SCAN^NEXT=1,      ! SCAN TYPE FOR FIND NEXT ENTRY
000000 0  0      STATCOM^DEV=1,      ! DEVICE STATUS
000000 0  0      STATCOM^JOB=2,      ! JOB STATUS
000000 0  0      STATCOM^LOC=3,      ! LOCATION STATUS
000000 0  0      STATCOM^COL=4,      ! COLLECTOR STATUS
000000 0  0      STATCOM^PRT=5,      ! PRINT PROCESS STATUS
000000 0  0      STATCOM^SPL=6,      ! SPOOLER STATUS
000000 0  0      STATCOM^DEV^Q=7,      ! QUEUE STATUS BY DEVICE
000000 0  0      STATCOM^JOB^Q=8,      ! QUEUE STATUS BY JOB
000000 0  0      STATCOM^LOC^Q=9,      ! QUEUE STATUS BY LOCATION                               C11 E6
000000 0  0      STATCOM^XREF^LOC=10,   ! XREF STATUS BY LOCATION                               C11 E6
000000 0  0      STATCOM^XREF^DEV=11,   ! XREF STATUS BY DEVICE                                 C11 E6
000000 0  0      STATCOM^XREF^PRT=12;   ! XREF STATUS BY PRINTER                                C11 E6
000000 0  0    !
000000 0  0    ! VALUES OF THE TYPE PARAMETER WHICH IS PASSED BY PRINTSTATUS
000000 0  0    ! TO THE SUPERVISOR.
000000 0  0    !
000000 0  0    LITERAL
000000 0  0      TYPE^STATUS=0,      ! STATUS REPLY
000000 0  0      TYPE^ERROR=1,     ! DEVICE ERROR
000000 0  0      TYPE^END=2,     ! END JOB
000000 0  0      TYPE^OPEN=3,     ! FAILED TO OPEN DEVICE
000000 0  0      TYPE^INV=4,     ! INVALID OPERATION IN THIS STATE
000000 0  0      TYPE^FIRST^ERROR=5;     ! FIRST ERROR AFTER GOOD OP
```

```
000000 0  0   !
000000 0  0   ! VALUES OF THE CONTROL PARAMETER WHICH CAN BE SENT TO  A
000000 0  0   ! PRINT PROCESS.
000000 0  0   !
000000 0  0   LITERAL
000000 0  0     PRT^OPENDEVICE=0,
000000 0  0     PRT^CLOSEDEVICE=1,
000000 0  0     PRT^STARTJOB=2,
000000 0  0     PRT^STOPJOB=3,
000000 0  0     PRT^RESUMEJOB=4,
000000 0  0     PRT^SUSPENDJOB=5,
000000 0  0     PRT^ALIGNDEVICE=6,
000000 0  0     PRT^SKIPTOPAGE=7,
000000 0  0     PRT^SKIPBYPAGE=8,
000000 0  0     PRT^SENDSTATUS=9;
000000 0  0   !
000000 0  0   ! DEFINITION OF THE BIT FIELDS USED IN THE FLAGS
000000 0  0   ! WORD OF A JOB
000000 0  0   !
000000 0  0   DEFINE                                                                      B30,MBB============= #XXX
000000 0  0     JOBTEXTCOMPRESS=FLAGS.<2>#,        ! USE 5-BIT TEXT COMPRESSION              C07
000000 0  0     JOBSETMODENOSPACE=FLAGS.<4>#,      ! SETMODE NO SPACE HAS BEEN ISSUED        C07
000000 0  0     JOBSETMODEPRESPACE=FLAGS.<3>#,     ! SETMODE PRESPACE HAS BEEN ISSUED
000000 0  0     JOBIGNOREFIRSTTOF=FLAGS.<5>#,      ! DON'T PUT IN PAGE MARK AT NEXT TOF
000000 0  0     JOBBAD=FLAGS.<6>#,     ! JOB MARKED BAD
000000 0  0     JOBUSERBLOCKING=FLAGS.<7>#,     ! USER DOING BLOCKING
000000 0  0     JOBCANCEL=FLAGS.<8>#,     ! CANCEL A JOB
000000 0  0     JOBHOLD=FLAGS.<9>#,     ! HOLD BEFORE PRINTING
000000 0  0     JOBHOLDAFTER=FLAGS.<10>#,     ! HOLD AFTER PRINTING
000000 0  0     JOBEXITBEFORE=FLAGS.<11>#,     ! EXIT PROCEDURE JUST BEFORE WRITE
000000 0  0     JOBHOLDAFTERINTERNAL=FLAGS.<11>#,     ! HOLD AFTER PRINTING ONCE
000000 0  0     JOBTIMETOWRITE=FLAGS.<12>#,     ! WRITE IS DONE
000000 0  0     JOBSELPRI=FLAGS.<13:15>#;     ! SELECTION PRIORITY
000000 0  0   !
000000 0  0   ! THE LENGTH, IN WORDS, OF SOME OF THE MORE COMMONLY USED
000000 0  0   ! FIELDS IN THE SPOOLING SYSTEM
000000 0  0   !
000000 0  0   LITERAL
000000 0  0     WLEN^DEVICENAME=12,     ! NUMBER WORDS IN 12 WORD TYPE FILENAME
000000 0  0     WLEN^LONGDEVICENAME=16,! NUMBER WORDS IN 16 WORD TYPE FILENAME
000000 0  0     WLEN^PROCESSNAME=3,     ! NUMBER WORDS IN PROCESS NAME
000000 0  0     WLEN^FILENAME=12,     ! NUMBER WORDS IN FILE NAME
000000 0  0     WLEN^GROUPNAME=4,     ! NUMBER WORDS IN LOCATIONS GROUP NAME
000000 0  0     WLEN^DESTNAME=4,     ! NUMBER WORDS IN LOCATIONS DESTINATION NAME    C07
000000 0  0     WLEN^LOCNAME=8,     ! NUMBER WORDS IN LOCATION NAME
000000 0  0     WLEN^REPORTNAME=8,     ! NUMBER WORDS IN REPORT NAME
000000 0  0     WLEN^FORMNAME=8,     ! NUMBER WORDS IN FORM NAME
000000 0  0     WLEN^TS=3,     ! NUMBER WORDS IN A TIME STAMP
000000 0  0     WLEN^CRTPID=4;     ! NUMBER WORDS IN A CTRPID                        B30,MBB============= #XXX
000000 0  0   !                                                                       B30,MBB============= #XXX
000000 0  0   ! VALUES AND STRUCTURES DEFINED FOR DISC-SPOOLED JOBS                   B30,MBB============= #XXX
000000 0  0   !                                                                       B30,MBB============= #XXX
000000 0  0   LITERAL                                                                !B30,MBB============= #XXX
000000 0  0     DJOB^NUM = -1,          ! JOB NUMBER OF A DISC JOB                    B30,MBB============= #XXX
000000 0  0     DJOB^FILECODE = 129,    ! FILECODE INDICATING A SPOOLED DISC JOB      B30,MBB============= #XXX
000000 0  0     DJOB^EXTENT = 50,       ! DEFAULT EXTENT SIZE                         B30,MBB============= #XXX
```

```
000000 0  0      DJOB^MAXEXTENTS = 100, ! DEFAULT MAXEXTENTS (SOMETHING REASONABLY LARGE)     B30,MBB============= #XXX
000000 0  0      DJOB^BUFFSIZE = 4096,  ! UNSTRUCTURED BUFFER SIZE TO USE ON DJOB'S           B30,MBB============= #XXX
000000 0  0      DJOB^VERSION = 0,      ! CURRENT VERSION WORD                                B30,MBB============= #XXX
000000 0  0      DJOB^UNITSIZE = 4,     ! 4 BLOCKS (4K BYTES) PER UNIT                        B30,MBB============= #XXX
000000 0  0      DJOB^UNITSIZEBYTES = 4096; ! UNITSIZE IN BYTES                               B30,MBB============= #XXX
000000 0  0                                                                                  !B30,MBB============= #XXX
000000 0  0      ! FORMAT OF HEADER IN DISC JOB (CONTAINS PPCONTROL STRUCTURE DUPLICATE)      B30,MBB============= #XXX
000000 0  0    ! VALUES AND STRUCTURES DEFINED FOR DISC-SPOOLED JOBS                          B30,MBB============= #XXX
000000 0  0      STRUCT DJOB^HEADER(*);                                                      !B30,MBB============= #XXX
000000 0  0       BEGIN                                                                      !B30,MBB============= #XXX
000000 0  1        INT      VERSION;              !DISC FILE FORMAT VERSION                   B30,MBB============= #XXX
000000 0  1        ! START DUPLICATE OF PPCONTROL                                             B30,MBB============= #XXX
000000 0  1        INT      MSG;                  !MESSAGE TYPE.                              B30,MBB============= #XXX
000000 0  1    !                                                                              B30,MBB============= #XXX
000000 0  1        INT      CHECK;                !CHECK WORD                                 B30,MBB============= #XXX
000000 0  1        INT      CONTROL;              !CONTROL TYPE                               B30,MBB============= #XXX
000000 0  1        INT      DEVICE[0:11];         !DEVICE.                                    B30,MBB============= #XXX
000000 0  1        INT      DATAFILENAME[0:11];   !FILE WHERE DATA STORED                     B30,MBB============= #XXX
000000 0  1        INT      SYNC;                 !UNIQUE JOB QUALIFIER                       B30,MBB============= #XXX
000000 0  1        INT(32)  BLOCK;                !ADRESS OF FIRST BLOCK IN DATA FILE.        B30,MBB============= #XXX
000000 0  1        INT      JOB;                  !JOB NUMBER.                                B30,MBB============= #XXX
000000 0  1        INT      DEST[0:7];            !DESTINATION.                               B30,MBB============= #XXX
000000 0  1        INT      FORM[0:7];            !FORM NAME.                                 B30,MBB============= #XXX
000000 0  1        INT      REPORT[0:7];          !REPORT NAME.                               B30,MBB============= #XXX
000000 0  1        INT      NOCOPIES;             !NUMBER OF COPIES.                          B30,MBB============= #XXX
000000 0  1        INT      PAGE;                 !SPECIFIED PAGE SIZE.                       B30,MBB============= #XXX
000000 0  1        INT      DEVFLAGS;             !DEVICE FLAGS WORD.                         B30,MBB============= #XXX
000000 0  1        INT      SKIP^PAGE;            !PAGE ( ONLY USED FOR SKIP AND SKIP TO )    B30,MBB============= #XXX
000000 0  1        INT      OWNER = SKIP^PAGE;    !JOB OWNER ( ONLY USED IN JOB START )       B30,MBB============= #XXX
000000 0  1        INT      DEVPARM;              !USER PARAMETER                             B30,MBB============= #XXX
000000 0  1        INT      DEVWIDTH;             !DEVICE WIDTH                               B30,MBB============= #XXX
000000 0  1        INT      PAGES;                !# PAGES IN JOB (-1 IF NOT CLOSED YET)      B30,MBB============= #XXX
000000 0  1        INT      UNITSIZE;             !UNITSIZE OF COLLECTOR THAT COLLECTED JOB   B30,MBB============= #XXX
000000 0  1        INT      UNITSALLOCATED;       !UNITS ALLOCATED FOR JOB (-1 IF NOT CLOSED) B30,MBB============= #XXX
000000 0  1        ! END DUPLICATE OF PPCONTROL                                               B30,MBB============= #XXX
000000 0  1        INT      TOTLINES;             !# LINES IN JOB                             B30,MBB============= #XXX
000000 0  1        INT      CLOSETIME [0:2];      !TIMESTAMP WHEN JOB CLOSED                  B30,MBB============= #XXX
000000 0  1        ! NOTE: FIELDS PAGES -> CLOSETIME SHOULD REMAIN IN ORDER FOR SPOOLEND      B30,MBB============= #XXX
000000 0  1        INT      OPENTIME [0:2];       !TIMESTAMP WHEN JOB OPENED                  B30,MBB============= #XXX
000000 0  1       END;                                                                       !B30,MBB============= #XXX
000000 0  0    !
000000 0  0    ! ERROR CODES WHICH ARE RETURNED BY SPOOLING PROCEDURES
000000 0  0    !
000000 0  0      LITERAL
000000 0  0          SPERR^OK             = %0,           !    NO ERROR
000000 0  0          SPERR^COLL^FE        = %1000,        !    FILE ERROR-COLLECTOR
000000 0  0          SPERR^DATA^FE        = %2000,        !    DATA FILE ERROR
000000 0  0          SPERR^CONTROL^FE     = %3000,        !    CONTROL PROCESS FILE ERROR
000000 0  0          SPERR^DEV^FE         = %4000,        !    DEVICE FILE ERROR
000000 0  0          SPERR^PRT^FE         = %5000,        !    PRINT PROCESS FILE ERROR
000000 0  0                                        !ALL PROCS MAY RETURN
000000 0  0          SPERR^PARAM          = %10000,       !    PARAM MISSING
000000 0  0          SPERR^CONTENT        = %10001,       !    PARAM IN ERROR
000000 0  0                                        !SPOOL PROCS RETURN
000000 0  0          SPERR^WRITE^NEEDED   = %11000,       !    CHECKPOINT EXIT
000000 0  0          SPERR^INVALID^FILE   = %11001,       !    RETURNED IF -1
000000 0  0          SPERR^TOOLONG        = %1025,        !    TOO MUCH DATA IN LINE
```

```
000000 0 0                                        !PRINT PROCS SPECIAL RETURN
000000 0 0        SPERR^EOF              = %12000,          !    END OF FILE FOUND
000000 0 0        SPERR^ENDOFCOPY        = %12001,          !    END OF COPY
000000 0 0        SPERR^MISMATCH         = %12002,          !    INVALID DATA FILE
000000 0 0        SPERR^CONTROL          = %12003,          !    CONTROL FOUND
000000 0 0        SPERR^SETMODE          = %12004,          !    SETMODE FOUND
000000 0 0        SPERR^CONTROLBUF       = %12005,          !    CONTROLBUF FOUND            C08,GIL
000000 0 0                                        !PRINT PROCESS BAD ERRORS
000000 0 0                                                  ! TYPE
000000 0 0                                                  !   COMMAND
000000 0 0        SPERR^NO^SUCH^DEVICE     = %13000,        !  CLOSE/STOP/RESUME/SUS/SKIP/STAT
000000 0 0        SPERR^ALREADY^OPEN       = %13001,        !  OPEN
000000 0 0        SPERR^NO^JOB             = %13002,        !  STOP/RESUME/SUSPEND/SKIP/STATUS
000000 0 0        SPERR^JOB^RUNNING        = %13003,        !  START/RESUME/ALIGN
000000 0 0        SPERR^NO^MORE^OPENS      = %13004,        !  START/OPEN/ALIGN  TABLES FULL
000000 0 0                                        ! SPOOLERCOMMAND/STATUS ERRORS
000000 0 0        SPERR^COM^INV          = %14000,          !    INVALID COMMAND
000000 0 0        SPERR^COM^VAL^MISS     = %14001,          !    COMMAND VALUE MISSING
000000 0 0        SPERR^COM^VAL          = %14002,          !    COMMAND VALUE IN ERROR
000000 0 0        SPERR^SUB^INV          = %14003,          !    INVALID SUBCOMMAND
000000 0 0        SPERR^SUB^VAL^MISS     = %14004,          !    MISSING SUBCOMMAND VALUE
000000 0 0        SPERR^SUB^VAL          = %14005,          !    SUBCOMMAND VALUE IN ERROR
000000 0 0        SPERR^STAT^EOF         = %14006,          !    END OF SPOOLERSTATUS HITS
000000 0 0        SPERR^STAT^NOTFOUND    = %14007,          !    NOTOFUND IN SPOOLERSTATUS
000000 0 0        SPERR^COM^NOROOM       = %14010,          !    CANNOT ADD THIS TO TABLES
000000 0 0        SPERR^COM^NOTFOUND     = %14011,          !    CANNOT FIND THIS ENTRY
000000 0 0        SPERR^COM^ILLSTATE     = %14012,          !    WRONG STATE FOR THIS COMMAND
000000 0 0        SPERR^COM^INUSE        = %14013,          !    PRESENTLY IN USE
000000 0 0        SPERR^COM^SECURITY     = %14014,          !    SECURITY VIOLATION
000000 0 0        SPERR^INV^MSG          = %14015,          !    TALKING TO BAD PROCESS
000000 0 0        SPERR^COM^INPROGRESS = %14016,            !    REQUEST IN PROGRESS (RECALL)  C11 E6
000000 0 0        SPERR^NEWPROCESS       = %100000;         !    NEW PROCESS ERROR
000000 0 0   !
000000 0 0   ! DEFINITION OF THE BUFFER MAINTAINED IN THE USERS STACK BY
000000 0 0   ! PRINTREAD.
000000 0 0   !
000000 0 0   ?NOWARN
000000 0 0     STRUCT PPBLOCK(*);
000000 0 0      BEGIN
000000 0 1       INT      STATUS;                  !0-UNASSIGNED
000000 0 1                                         !1-INITIALIZED
000000 0 1                                         !2-WRITE PENDING
000000 0 1                                         !3-PAUSED
000000 0 1       INT      NOCOPIES;                !NUMBER OF COPIES REMAINING
000000 0 1       INT      THIS^PAGE;               !CURRENT PAGE NUMBER
000000 0 1       INT      THIS^LINE;               !CURRENT LINE ON PAGE
000000 0 1       INT      DATA^FILE;               !FILE NUMBER TO DATA FILE
000000 0 1       INT      LINES^PRINTED;           !NUMBER OF LINES PRINTED
000000 0 1       INT      LAST^COUNT;              !POINTER TO LAST LINE GIVEN TO PRINT PROCESS
000000 0 1       INT      THIS^COUNT;              !ADRESS OF NEXT LINE IN BUFFER
000000 0 1       INT(32) UNITSIZE;                 !SIZE OF COLLECTORS UNITS (IN BYTES)        C05
000000 0 1       INT      UNITSALLOCATED;          !UNITS ALLOCATED FOR THIS JOB               C05
000000 0 1       INT      PAGES;                   !PAGES IN JOB                               C05
000000 0 1       INT(32) BITMAP^BLOCK;             !POINTER TO JOBS BITMAP BLOCK               C05
000000 0 1       INT      IOBLOCK;                 !DATA FILE BLOCK START DO NOT MOVE
000000 0 1       INT      MSG = IOBLOCK;           !MESSAGE TYPE
```

```
000000 0  1       INT      SVNC = IOBLOCK;           !UNIQUE JOB QUALIFIER
000000 0  1       INT      CHECK;                    !CHECK WORD
000000 0  1       INT      JOB;                      !JOB NUMBER.
000000 0  1       INT      STPAGE;                   !FIRST PAGE NUMBER IN THE BLOCK.
000000 0  1       INT      ENDPAGE;                  !LAST PAGE NUMBER IN THE BLOCK.
000000 0  1       INT      PAGESIZE;                 !LINES PER PAGE
000000 0  1       INT      NOLINES;                  !NUMBER OF LINES SPOOLED.
000000 0  1       INT(32) NEXT^BLOCK = PAGESIZE; !ADRESS OF NEXT BLOCK ON DISK .
000000 0  1       INT      FLAGS;                    !FLAGS WORD FROM STARTUP MESSAGE.
000000 0  1       INT      ENDLINE;                  !LAST LINE NUMBER IN LAST PAGE THIS BLOCK
000000 0  1       INT(32) LAST^BLOCK = FLAGS;       !ADRESS OF LAST BLOCK ON DISK.
000000 0  1       INT(32) UNUSED;
000000 0  1       INT      COUNT;                    !END OF BLOCK POINTER.
000000 0  1       INT      DATA|0:499|;              !BLOCKED DATA AREA
000000 0  1     END;
000000 0  0   ?WARN
000000 0  0   !
000000 0  0   ! MESSAGE TYPE NUMBERS FOR ALL SPOOLING SYSTEM MESSAGES
000000 0  0   ! MSG^MAX AND MSG^MIN ARE USED TO CHECK FOR LEGAL MESSAGE
000000 0  0   ! TYPES. THESE MESSAGE NUMBERS MUST STAY AS THEY ARE FOR COMPATIBILITY
000000 0  0   ! WITH THE MESSAGE CHECKING ROUTINE.
000000 0  0   !
000000 0  0   LITERAL
000000 0  0     MSG^MIN=100,     ! MIN MESSAGE NUMBER
000000 0  0     MSG^START=100,     ! SPOOLSTART MESSAGE
000000 0  0     MSG^BLOCK=101,     ! DATA BLOCK TRANSFER MESSAGE
000000 0  0     MSG^END=102,     ! SPOOLEND MESSAGE
000000 0  0     MSG^ERROR=103,     ! ERROR MESSAGE
000000 0  0     MSG^PRINT^PROMPT=104,     ! PRINT PROC PROMPT TO CONTROL PROC
000000 0  0     MSG^PRINT^GIMME=105,     ! PRINT PRQC PROMPT FOR CONTROL MESSAGE
000000 0  0     MSG^PRINT^STATUS=106,     ! PRINT PROC STATUS TO CONTROL PROC
000000 0  0     MSG^PRINT^CONTROL=107,     ! CONTROL PROC REPLY TO PRINT PROC
000000 0  0     MSG^PRINT^WAKEUP=108,     ! CONTROL TO PRINT "WILL SEND MESSAGE"
000000 0  0     MSG^PRINT^REQUEST=109,     ! PRINT REQUEST CALL REPLY IS -120
000000 0  0     MSG^COMMAND=110,     ! SPOOLERCOMMAND MESSAGE
000000 0  0     MSG^STATUS^DEV=111,     ! STATUS DEVICE REPLY
000000 0  0     MSG^STATUS^JOB=112,     ! JOB
000000 0  0     MSG^STATUS^LOC=113,     ! LOC
000000 0  0     MSG^STATUS^COLLECT=114,     ! COLLECT
000000 0  0     MSG^STATUS^PRINT=115,     ! PRINT
000000 0  0     MSG^STATUS^SPOOLER=116,     ! SPOOLER
000000 0  0     MSG^STATUS^QUEUE=117,     ! DEVICE QUEUE
000000 0  0     MSG^COLLECT^JOBOPEN=118,     ! COLLECTOR TO SUPERVISOR  JOB START
000000 0  0     MSG^COLLECT^JOBOPENRTN=119,     ! SUPERVISOR TO COLLECTOR JOB START
000000 0  0     MSG^COLLECT^JOBCLOSE=120,     ! COLLECTOR TO SUPERVISOR  JOB CLOSE
000000 0  0     MSG^COLLECT^START=121,     ! SUPERVISOR TO COLLECTOR  START UP MSG
000000 0  0     MSG^COLLECT^STATUS=122,     ! COLLECTOR TO SUPERVISOR  JOB STATUS
000000 0  0     MSG^COLLECT^CONTROL=123,     ! SUPERVISOR TO COLLECTOR  CONTROL
000000 0  0     MSG^COLLECT^PROMPT=124,     ! COLLECTOR TO SUPERVISOR  HOOK
000000 0  0     MSG^COLLECT^GIMME=125,     ! COLLECTOR TO SUPERVISOR  GIMME
000000 0  0     MSG^COLLECT^WAKEUP=126,     ! SUPERVISOR TO COLLECTOR (HOOK'S REPLY)
000000 0  0     MSG^JOBNUM=127,     ! APPLICATION TO COLLECTOR REQUEST FOR JOB #
000000 0  0     MSG^STATUS^XREF=128,     ! STATUS XREF                                   C11 E6
000000 0  0     MSG^MAX=128;     ! MAX MESSAGE NUMBER                                     C11 E6
000000 0  0   ?NOWARN
```

```
000000 0  0    !
000000 0  0    ! MESSAGES SENT BY APPLICATIONS TO THE COLLECTOR PROCESS
000000 0  0    !
000000 0  0      STRUCT APBLOCK (*);
000000 0  0       BEGIN
000000 0  1         INT      IOBLOCK;                 !DATA FILE BLOCK START DO NOT MOVE
000000 0  1         INT      MSG = IOBLOCK;           !MESSAGE TYPE
000000 0  1         INT      SYNC = IOBLOCK;          !UNIQUE JOB QUALIFIER
000000 0  1         INT      CHECK;                   !CHECK WORD
000000 0  1         INT      JOB;                     !JOB NUMBER.
000000 0  1         INT      STPAGE;                  !FIRST PAGE NUMBER IN THE BLOCK.
000000 0  1         INT      ENDPAGE;                 !LAST PAGE NUMBER IN THE BLOCK.
000000 0  1         INT      PAGESIZE;                !LINES PER PAGE
000000 0  1         INT      NOLINES;                 !NUMBER OF LINES SPOOLED.
000000 0  1         INT(32) NEXT^BLOCK = PAGESIZE;    !ADRESS OF NEXT BLOCK ON DISK .
000000 0  1         INT      FLAGS;                   !FLAGS WORD FROM STARTUP MESSAGE.
000000 0  1         INT      ENDLINE;                 !LAST LINE NUMBER IN LAST PAGE THIS BLOCK
000000 0  1         INT(32) LAST^BLOCK = FLAGS;       !ADRESS OF LAST BLOCK ON DISK.
000000 0  1         INT(32) FILEMARKER;               !UNIQUE MARK FOR FILE INTEGRETY
000000 0  1         INT      COUNT;                   !END OF BLOCK POINTER.
000000 0  1         INT      DATA[0:499];             !BLOCKED DATA AREA
000000 0  1       END;
000000 0  0    ?WARN
000000 0  0
000000 0  0      STRUCT APSTART(*);
000000 0  0       BEGIN
000000 0  1         INT      MSG;                     !MESSAGE TYPE
000000 0  1         INT      CHECK;                   !CHECK WORD
000000 0  1         INT      DEST[0:7];               !DESTINATION.
000000 0  1         INT      FORM[0:7];               !FORM NAME.
000000 0  1         INT      REPORT[0:7];             !REPORT NAME.
000000 0  1         INT      NOCOPIES;                !NUMBER OF COPIES.
000000 0  1         INT      PAGE;                    !PAGE SIZE.
000000 0  1         INT      FLAGS;                   !FLAGS WORD
000000 0  1         INT      OWNER;                   !OWNER                          C12 E3
000000 0  1       END;
000000 0  0
000000 0  0      STRUCT APEND(*);
000000 0  0       BEGIN
000000 0  1         INT      MSG;                     !MESSAGE TYPE
000000 0  1         INT      CHECK;                   !CHECK WORD
000000 0  1         INT      LINES;                   !TOTAL NUMBER OF LINES FOR THIS JOB.
000000 0  1         INT      PAGES;                   !TOTAL NUMBER OF PAGES FOR THIS JOB.
000000 0  1         INT      FLAGS;                    !FLAGS FOR JOB
000000 0  1       END;
000000 0  0
000000 0  0    STRUCT APJOBNUM(*);
000000 0  0      BEGIN
000000 0  1        INT    MSG;                 ! MESSAGE TYPE
000000 0  1        INT    CHECK;               ! CHECK WORD
000000 0  1      END;
000000 0  0    !
000000 0  0    ! MESSAGES EXCHANGED BETWEEN PRINT PROCESSES AND THE SUPERVISOR
000000 0  0    !
000000 0  0      STRUCT PPPROMPT(*);
000000 0  0        BEGIN
```

```
000000 0  1        INT    MSG;                   !MESSAGE TYPE
000000 0  1        INT    CHECK;                 !CHECK WORD
000000 0  1      END;
000000 0  0
000000 0  0    STRUCT PPGIMME(*);
000000 0  0      BEGIN
000000 0  1        INT    MSG;                   ! MESSAGE TYPE
000000 0  1        INT    CHECK;                 !CHECK WORD
000000 0  1      END;
000000 0  0
000000 0  0    STRUCT PPSTATUS(*);
000000 0  0     BEGIN
000000 0  1      INT      MSG;                   !MESSAGE TYPE.
000000 0  1      INT      CHECK;                 !CHECK WORD
000000 0  1      INT      TYPE;                  !TYPE OF STATUS
000000 0  1      INT      DEVICE[0:11];           !DEVICE IN ERROR
000000 0  1      INT      ERROR;                 !ERROR.
000000 0  1      INT      COPY;                  !NUMBER OF COPIES LEFT INCLUDING THIS ONE
000000 0  1      INT      PAGE;                  !PAGE NUMBER BEING PRINTED.
000000 0  1      INT      LINE;                  !LINE ON PAGE BEING PRINTED
000000 0  1      INT      TOTLINES;              !LINES PRINTED.
000000 0  1     END;
000000 0  0
000000 0  0    STRUCT PPCONTROL(*);      ! NOTE: STRUCTURE DUPLICATED IN DJOB^HEADER        B30,MBB============= #XXX
000000 0  0     BEGIN
000000 0  1      INT      MSG;                   !MESSAGE TYPE.
000000 0  1      INT      CHECK;                 !CHECK WORD
000000 0  1      INT      CONTROL;               !CONTROL TYPE
000000 0  1      INT      DEVICE[0:11];           !DEVICE.
000000 0  1      INT      DATAFILENAME[0:11];    !FILE WHERE DATA STORED
000000 0  1      INT      SYNC;                  !UNIQUE JOB QUALIFIER
000000 0  1      INT(32)  BLOCK;                 !ADRESS OF FIRST BLOCK IN DATA FILE.
000000 0  1      INT      JOB;                   !JOB NUMBER.
000000 0  1      INT      DEST[0:7];             !DESTINATION.
000000 0  1      INT      FORM[0:7];             !FORM NAME.
000000 0  1      INT      REPORT[0:7];           !REPORT NAME.
000000 0  1      INT      NOCOPIES;              !NUMBER OF COPIES.
000000 0  1      INT      PAGE;                  !SPECIFIED PAGE SIZE.
000000 0  1      INT      DEVFLAGS;                 !DEVICE FLAGS WORD.
000000 0  1      INT      SKIP^PAGE;             !PAGE ( ONLY USED FOR SKIP AND SKIP TO )        C12 E
000000 0  1      INT      OWNER = SKIP^PAGE;     !JOB OWNER ( ONLY USED IN JOB START )           C12 E
000000 0  1      INT      DEVPARM;               !USER PARAMETER
000000 0  1      INT      DEVWIDTH;              !DEVICE WIDTH
000000 0  1      INT      PAGES;                 !# PAGES IN JOB (-1 IF NOT CLOSED YET)          C05
000000 0  1      INT      UNITSIZE;              !UNITSIZE OF COLLECTOR THAT COLLECTED JOB       C05
000000 0  1      INT      UNITSALLOCATED;        !UNITS ALLOCATED FOR JOB (-1 IF NOT CLOSED)     C05
000000 0  1     END;
000000 0  0
000000 0  0    STRUCT PPWAKEUP(*);
000000 0  0      BEGIN
000000 0  1        INT      MSG;         !MESSAGE TYPE
000000 0  1        INT      CHECK;       !CHECK WORD
000000 0  1      END;
000000 0  0
000000 0  0    STRUCT
000000 0  0      PPSTART(*);
```

```
000000 0 0         BEGIN
000000 0 1         INT
000000 0 1           MSG,     ! MESSAGE TYPE
000000 0 1           VOLSUBVOL[0:7],      ! VOLUME AND SUBVOLUME
000000 0 1           INFILE[0:11],     ! IN FILE NAME
000000 0 1           OUTFILE[0:11];      ! OUT FILE NAME
000000 0 1         STRING
000000 0 1           PARM[0:9];      ! PARAMETER STRING
000000 0 1         END;
000000 0 0   !
000000 0 0   ! MESSAGES EXCHANGED BETWEEN APPLICATIONS AND THE SUPERVISOR
000000 0 0   !
000000 0 0     STRUCT PPREQUEST(*);
000000 0 0      BEGIN
000000 0 1       INT      MSG;                       !MESSAGE TYPE
000000 0 1       INT      CHECK;                     !CHECK WORD
000000 0 1       INT      JOB;                       !JOB NUMBER
000000 0 1      END;
000000 0 0
000000 0 0     STRUCT SCOMMAND(*);
000000 0 0      BEGIN
000000 0 1       INT      MSG;                       !MESSAGE TYPE.
000000 0 1       INT      CHECK;                     !CHECK WORD
000000 0 1       INT      COMMAND;                   !COMMAND NUMBER
000000 0 1       INT      COM^VAL[0:15];             !COMMAND VALUE
000000 0 1       INT      SUBCOMMAND;                !SUBCOMMAND NUMBER
000000 0 1       INT      SUB^VAL[0:15];             !SUBCOMMAND VALUE
000000 0 1      END;
000000 0 0
000000 0 0     STRUCT SSTATUS^DEV(*);
000000 0 0      BEGIN
000000 0 1       INT      MSG;                       !MESSAGE NUMBER
000000 0 1       INT      CHECK;                     !CHECK WORD
000000 0 1       INT      COMMAND;                   !COMMAND TYPE    1
000000 0 1       INT      SCANTYPE;                  !TYPE OF SCAN
000000 0 1       INT      DEVICE[0:15];              !DEVICE NAME  - KEY
000000 0 1       INT      STATE;                     !STATE OF DEVICE
000000 0 1       INT      LASTERROR;                 !LAST ERROR ON DEVICE
000000 0 1       INT      FLAGS;                     !DEVICE FLAGS
000000 0 1       INT      FORM[0:7];                 !FORM FOR JOB
000000 0 1       INT      RETRY;                     !RETRY INTERVAL
000000 0 1       INT      TIMEOUT;                   !NUMBER OF RETRIES BEFORE TIMEOUT
000000 0 1       INT      SPEED;                     !DEVICE SPEED
000000 0 1       INT      PROCESS[0:2];              !PRINT PROCESS NAME
000000 0 1       INT      CURRENTJOB;                !CURRENT JOB PRINTING
000000 0 1       INT      DEVPARM;                   !USER PARAMETER
000000 0 1       INT      DEVWIDTH;                  !DEVICE WIDTH
000000 0 1       INT      RETRIESUSED;               !RETRIES USED
000000 0 1       INT(32) TIMELEFT;                   !SECONDS TILL JOB FINISHES
000000 0 1       INT      RESTART;                   !SECONDS BETWEEN DEVICE RESTART TRIES !      !C11 E1
000000 0 1      END;
000000 0 0
000000 0 0     STRUCT SSTATUS^JOB(*);
000000 0 0      BEGIN
000000 0 1       INT      MSG;                       !MESSAGE NUMBER
000000 0 1       INT      CHECK;                     !CHECK WORD
000000 0 1       INT      COMMAND;                   !COMMAND TYPE  2
```

```
000000 0  1      INT      SCANTYPE;               !TYPE OF SCAN
000000 0  1      INT      JOB;                    !JOB NUMBER - KEY
000000 0  1      INT      STATE;                  !STATE OF JOB
000000 0  1      INT      LOCATION[0:7];          !LOCATION WHERE JOB IS TO PRINT
000000 0  1      INT      FORM[0:7];              !FORM FOR JOB
000000 0  1      INT      REPORT[0:7];            !REPORT NAME
000000 0  1      INT      FLAGS;                  !JOB FLAGS
000000 0  1      INT      PAGESIZE;               !PAGE SIZE
000000 0  1      INT      ACCESSID;               !OWNER OF JOBS ID
000000 0  1      INT      COPIES;                 !TOTAL NUMBER OF COPIES FOR JOB
000000 0  1      INT      PAGES;                  !TOTAL NUMBER OF PAGES FOR JOB
000000 0  1      INT      TOTLINES;               !TOTAL NUMBER OF LINES FOR JOB
000000 0  1      INT      OPENTIME[0:2];          !TIME STAMP FOR TIME JOB OPENED
000000 0  1      INT      CLOSETIME[0:2];         !TIME STAMP FOR TIME JOB COMPLETED
000000 0  1      INT      DATAFILENAME[0:11];     !DATA FILE WHERE SPOOLED DATA RESIDES
000000 0  1      INT      COLLECTORNAME[0:2];     !NAME OF COLLECTOR PROCESS
000000 0  1      INT      UNITSALLOCATED;         !UNITS ALLOCATED FOR THIS JOB          C05
000000 0  1     END;
000000 0  0
000000 0  0    STRUCT SSTATUS^LOC(*);
000000 0  0     BEGIN
000000 0  1      INT      MSG;                    !MESSAGE NUMBER
000000 0  1      INT      CHECK;                  !CHECK WORD
000000 0  1      INT      COMMAND;                !COMMAND TYPE   3
000000 0  1      INT      SCANTYPE;               !TYPE OF SCAN
000000 0  1      INT      LOCATION[0:7];          !LOCATION NAME - KEY
000000 0  1      INT      FLAGS;                  !LOCATION FLAGS
000000 0  1      INT      DEVICE[0:15];           !DEVICE NAME FOR LOCATION
000000 0  1     END;
000000 0  0
000000 0  0    STRUCT SSTATUS^COLLECT(*);
000000 0  0     BEGIN
000000 0  1      INT      MSG;                    !MESSAGE NUMBER
000000 0  1      INT      CHECK;                  !CHECK WORD
000000 0  1      INT      COMMAND;                !COMMAND TYPE   4
000000 0  1      INT      SCANTYPE;               !TYPE OF SCAN
000000 0  1      INT      COLLECTOR[0:2];         !COLLECTOR PROCESS NAME - KEY
000000 0  1      INT      STATE;                  !STATE OF COLLECTOR
000000 0  1      INT      FLAGS;                  !FLAGS FOR COLLECTOR
000000 0  1      INT      LASTERROR;              !LAST ERROR ACCESSING COLLECTOR
000000 0  1      INT      PROGNAME[0:11];         !PROGRAM FILE NAME
000000 0  1      INT      CPUPAIR;                !PRIMARY AND BACKUP CPUS
000000 0  1      INT      PRI;                    !PROCESS PRIORITY
000000 0  1      INT      DATAFILE[0:11];         !FILE NAME OF DATA FILE
000000 0  1      INT      UNITSIZE;               !SIZE OF ALLOCATION UNIT
000000 0  1      INT      ALLOCATEDUNITS;         !UNITS ALLOCATED OUT OF DATA FILE      C05
000000 0  1      INT      TOTALUNITS;             !TOTAL UNITS IN FILE                   C05
000000 0  1     END;
000000 0  0
000000 0  0    STRUCT SSTATUS^PRINT(*);
000000 0  0     BEGIN
000000 0  1      INT      MSG;                    !MESSAGE NUMBER
000000 0  1      INT      CHECK;                  !CHECK WORD
000000 0  1      INT      COMMAND;                !COMMAND TYPE   5
000000 0  1      INT      SCANTYPE;               !TYPE OF SCAN
000000 0  1      INT      PRINTER[0:2];           !PRINT PROCESS NAME - KEY
```

```
000000 0  1      INT       STATE;                 !STATE OF PRINT PROCESS
000000 0  1      INT       FLAGS;                 !FLAGS FOR PRINT PROCESS
000000 0  1      INT       LASTERROR;             !LAST ERROR ACCESSING PRINTER
000000 0  1      INT       PROGNAME[0:11];        !PROGRAM FILE NAME
000000 0  1      INT       CPUPAIR;               !PRIMARY AND BACKUP CPUS
000000 0  1      INT       PRI;                   !PROCESS PRIORITY
000000 0  1      INT       PRINTPARM;              !USER PARAMETER
000000 0  1    END;
000000 0  0
000000 0  0   STRUCT SSTATUS^SPOOLER(*);
uuuuuu u  u    BEGIN
000000 0  1      INT       MSG;                   !MESSAGE NUMBER
000000 0  1      INT       CHECK;                 !CHECK WORD
000000 0  1      INT       COMMAND;               !COMMAND TYPE  6
000000 0  1      INT       SCANTYPE;              !TYPE OF SCAN
000000 0  1      INT       STATE;                 !STATE OF SPOOLING SYSTEM
000000 0  1      INT       FLAGS;                 !FLAGS FOR SPOOLING SYSTEM
000000 0  1      INT       ERRORFILE[0:11];       !ERROR LOG FILE NAME
000000 0  1      INT       LASTERROR;             !LAST ERROR ACCESSING LOGGING FILE
000000 0  1    END;
000000 0  0
000000 0  0   STRUCT SSTATUS^Q(*);
000000 0  0    BEGIN
000000 0  1      INT       MSG;                   !MESSAGE NUMBER
000000 0  1      INT       CHECK;                 !CHECK WORD
000000 0  1      INT       COMMAND;               !COMMAND TYPE
000000 0  1      INT       SCANTYPE;              !TYPE OF SCAN
000000 0  1      INT       STATE;                 !QUEUE TYPE OR STATE
000000 0  1      INT       DEVICE[0:15];           !DEVICE
000000 0  1      INT       SEQUENCE;              !PLACE ON DEVICE QUEUE
000000 0  1      INT       JOB;                   !JOB NUMBER
000000 0  1      INT       LOCATION[0:7];         !LOCATION
000000 0  1      INT       COPIES;                !NUMBER OF COPIES
000000 0  1      INT       PAGES;                 !NUMBER OF PAGES OR PAGE NUMBER
000000 0  1      INT       LINE;                  !LINE NUMBER ON PAGE IF PRINTING
000000 0  1      INT       TOTLINES;              !TOTAL LINES SPOOLED OR PRINTED
000000 0  1      INT       FORM [0:7];            !FORM NAME
000000 0  1      INT       ACCESSID;              !JOB ACCESSID
000000 0  1    END;
000000 0  0                                                                   !C11 E6
000000 0  0   STRUCT SSTATUS^XREF(*);                                         !C11 E6
000000 0  0    BEGIN                                                           C11 E6
000000 0  1      INT       MSG;                   !MESSAGE NUMBER              C11 E6
000000 0  1      INT       CHECK;                 !CHECK WORD                  C11 E6
000000 0  1      INT       COMMAND;               !COMMAND TYPE                C11 E6
000000 0  1      INT       SCANTYPE;              !TYPE OF SCAN                C11 E6
000000 0  1      INT       LOCATION[0:7];         !LOCATION                    C11 E6
000000 0  1      INT       DEVICE[0:15];          !DEVICE                      C11 E6
000000 0  1      INT       PRINTER[0:2];          !PRINT PROCESS NAME - KEY    C11 E6
000000 0  1      INT       MARKER;                !PLACE HOLDER - (INTERNAL USE) !C11 E6
000000 0  1    END;                                                           !C11 E6
000000 0  0
000000 0  0   STRUCT
000000 0  0     SERROR(*);
000000 0  0       BEGIN
000000 0  1        INT      MSG;      ! MESSAGE NUMBER
```

```
000000 0  1        INT      CHECK;      ! CHECK WORD
000000 0  1        INT      ERROR;      ! ERROR CONDITION
000000 0  1        END;
000000 0  0   !
000000 0  0   ! STRUCTURES FOR COMMUNICATIONS BETWEEN AN COLLECTOR PROCESS
000000 0  0   ! AND ITS SUPERVISOR.
000000 0  0   !
000000 0  0     STRUCT COLPROMPT(*);
000000 0  0       BEGIN
000000 0  1         INT   MSG;                     !MESSAGE TYPE
000000 0  1         INT   CHECK;                   !CHECK WORD
000000 0  1         INT   ALLOCATEDUNITS;          !UNITS ALLOCATED OUT OF DATA FILE       C05
000000 0  1         INT   TOTALUNITS;              !TOTAL UNITS IN DATA FILE               C05
000000 0  1       END;
000000 0  0
000000 0  0     STRUCT COLGIMME(*);
000000 0  0       BEGIN
000000 0  1         INT   MSG;                     ! MESSAGE TYPE
000000 0  1         INT   CHECK;                   !CHECK WORD
000000 0  1       END;
000000 0  0
000000 0  0     STRUCT COLWAKEUP(*);
000000 0  0       BEGIN
000000 0  1         INT     MSG;         !MESSAGE TYPE
000000 0  1         INT     CHECK;       !CHECK WORD
000000 0  1       END;
000000 0  0
000000 0  0   STRUCT
000000 0  0     COLSTART(*);
000000 0  0       BEGIN
000000 0  1       INT
000000 0  1         MSG,     ! MESSAGE TYPE OF THIS MESSAGE
000000 0  1         CHECK,     ! CHECK WORD
000000 0  1         FLAGS,     ! STARTUP FLAGS
000000 0  1         CTRLNAME[0:11],      ! NAME OF CONTROLLER PROCESS
000000 0  1         BACKUPCPU,     ! -1 IF NO BACKUP
000000 0  1         DATAFILENAME[0:11],      ! NAME OF SPOOLING DATA FILE
000000 0  1         UNITSIZE;     ! UNIT SIZE IN BLOCKS
000000 0  1       END;
000000 0  0
000000 0  0   STRUCT
000000 0  0     COLJOBOPEN(*);
000000 0  0       BEGIN
000000 0  1       INT
000000 0  1         MSG,     ! MESSAGE TYPE
000000 0  1         CHECK,     ! CHECK WORD
000000 0  1         DEST[0:7],      ! DESTINATION
000000 0  1         FORM[0:7],      ! FORM
000000 0  1         REPORT[0:7],      ! REPORT NAME
000000 0  1         NOCOPIES,      ! NUMBER OF COPIES
000000 0  1         PAGE,     ! PAGE SIZE
000000 0  1         FLAGS;     ! OPEN FLAGS
000000 0  1       INT
000000 0  1         OWNER,     ! USER THAT OWNS THE JOB
000000 0  1         DATAFILENAME[0:11],      ! JOB DATA FILE
000000 0  1         UNITSIZE; ! COLLECTOR UNIT SIZE
000000 0  1       INT(32)                                                              C05
```

```
550.    000000 0  1        STARTPTR;     ! STARTING BYTE ADDRESS FOR JOB
551.    000000 0  1      END;
552.    000000 0  0
553.    000000 0  0  STRUCT
554.    000000 0  0    COLJOBOPENRTN(*);
555.    000000 0  0      BEGIN
556.    000000 0  1      INT
557.    000000 0  1        MSG,     ! MSG TYPE
558.    000000 0  1        CHECK,     ! CHECK WORD
559.    000000 0  1        ERROR,     ! ERROR CODE
560.    000000 0  1        JOBID,     ! JOB NUMBER FROM CONTROLLER
561.    000000 0  1        SYNC;     ! SYNC NUMBER FROM CONTROLLER
562.    000000 0  1      END;
563.    000000 0  0
564.    000000 0  0  STRUCT
565.    000000 0  0    COLJOBCLOSE(*);
566.    000000 0  0      BEGIN
567.    000000 0  1      INT
568.    000000 0  1        MSG,     ! MESSAGE TYPE
569.    000000 0  1        CHECK,     ! CHECK WORD
570.    000000 0  1        JOBID,     ! JOB TO BE CLOSED
571.    000000 0  1        LINES,     ! TOTAL LINES
572.    000000 0  1        PAGES,     ! TOTAL PAGES
573.    000000 0  1        FLAGS,     ! FLAGS
573.1   000000 0  1        UNITSALLOCATED; ! UNITS ALLOCATED FOR JOB
574.    000000 0  1      END;
575.    000000 0  0
576.    000000 0  0  STRUCT
577.    000000 0  0    COLSTATUS(*);
578.    000000 0  0      BEGIN
579.    000000 0  1      INT
580.    000000 0  1        MSG,     ! MESSAGE TYPE
581.    000000 0  1        CHECK,     ! CHECK WORD
582.    000000 0  1        JOBID,     ! JOB NUMBER THAT STATUS IS FOR
583.    000000 0  1        LINES,     ! NUMBER OF LINES SPOOLED SO FAR
584.    000000 0  1        PAGES;     ! NUMBER OF PAGES SPOOLED SO FAR
585.    000000 0  1      END;
586.    000000 0  0
587.    000000 0  0  STRUCT
588.    000000 0  0    COLCONTROL(*);
589.    000000 0  0      BEGIN
590.    000000 0  1      INT
591.    000000 0  1        MSG,     ! MESSAGE TYPE OF THIS MESSAGE
592.    000000 0  1        CHECK,     ! CHECK WORD
593.    000000 0  1        TYPE,     ! TYPE OF CONTROL
594.    000000 0  1        JOBID,     ! JOB NUMBER TO RETURN STATUS FOR
595.    000000 0  1        SYNC;     ! SYNC FOR JOB
596.    000000 0  1      INT(32)
597.    000000 0  1        STARTPTR;     ! START DATA FILE ADDRESS FOR JOB
598.    000000 0  1      END;

600.    000000 0  0  !
601.    000000 0  0  ! MESSAGES SENT BY THE OPERATING SYSTEM
602.    000000 0  0  !
603.    000000 0  0  STRUCT
604.    000000 0  0    SYSTARTUP(*);
605.    000000 0  0      BEGIN
```

C05

```
000000 0  1        INT
000000 0  1          MSG,      ! MESSAGE TYPE
000000 0  1          VOLSUBVOL[0:7],     ! VOLUME AND SUBVOLUME
000000 0  1          INFILE[0:11],     ! IN FILE NAME
000000 0  1          OUTFILE[0:11];     ! OUT FILE NAME
000000 0  1        STRING
000000 0  1          PARM;     ! PARAMETER STRING
000000 0  1        END;
000000 0  0
000000 0  0    STRUCT
000000 0  0      SYPROCESSORFAIL(*);
000000 0  0        BEGIN
000000 0  1        INT
000000 0  1          MSG,      ! MESSAGE TYPE
000000 0  1          CPU;      ! CPU OF FAILED PROCESSOR
000000 0  1        END;
000000 0  0
000000 0  0    STRUCT
000000 0  0      SYANCESTORFAIL(*);
000000 0  0        BEGIN
000000 0  1        INT
000000 0  1          MSG,      ! MESSAGE TYPE
000000 0  1          PID[0:2];      ! ANCESTOR PID (ONLY NAME PART IS VALID)
000000 0  1        END;
000000 0  0
000000 0  0    STRUCT
000000 0  0      SYPROCESSORUP(*);
000000 0  0        BEGIN
000000 0  1        INT
000000 0  1          MSG,      ! MESSAGE TYPE
000000 0  1          CPU;      ! NUMBER OF UP CPU
000000 0  1        END;
000000 0  0
000000 0  0    STRUCT
000000 0  0      SYSTOP(*);
000000 0  0        BEGIN
000000 0  1        INT
000000 0  1          MSG,      ! MESSAGE TYPE
000000 0  1          PID[0:3];      ! PROCESS ID OF STOPPED PROCESS (-PAIR)
000000 0  1        END;
000000 0  0
000000 0  0    STRUCT
000000 0  0      SYABEND(*);
000000 0  0        BEGIN
000000 0  1        INT
000000 0  1          MSG,      ! MESSAGE TYPE
000000 0  1          PID[0:3];      ! PROCESS ID OF ABENDED PROCESS (-PAIR)
000000 0  1        END;
000000 0  0
000000 0  0    STRUCT
000000 0  0      SYBREAK(*);
```

```
657.    000000 0  0        BEGIN
658.    000000 0  1        INT
659.    000000 0  1          MSG,     ! MESSAGE TYPE
660.    000000 0  1          LDEV;     ! LOGICAL DEVICE NUMBER OF BROKEN TERMINAL
661.    000000 0  1        END;
662.    000000 0  0
663.    000000 0  0    STRUCT
664.    000000 0  0      SYOPEN(*);
665.    000000 0  0        BEGIN
666.    000000 0  1        INT
667.    000000 0  1          MSG,     ! MESSAGE TYPE
668.    000000 0  1          FLAGS,     ! OPEN FLAGS
669.    000000 0  1          SYNCDEPTH,      ! SYNC OR RECEIVE DEPTH
670.    000000 0  1          PID[0:3],     ! PID OF PRIMARY FOR BACKUP OPEN
671.    000000 0  1          BACKUPFILE,     ! BACKUP FILE NUMBER
672.    000000 0  1          ACCESSID,     ! ACCESSOR ID OF USER RUNNING OPENER
673.    000000 0  1          ROUTE[0:7];      ! ROUTING FOR FILE
674.    000000 0  1        END;
675.    000000 0  0
676.    000000 0  0    STRUCT
677.    000000 0  0      SYCLOSE(*);
678.    000000 0  0        BEGIN
679.    000000 0  1        INT
680.    000000 0  1          MSG;     ! MESSAGE TYPE
681.    000000 0  1        END;
682.    000000 0  0
683.    000000 0  0    STRUCT
684.    000000 0  0      SYCONTROL(*);
685.    000000 0  0        BEGIN
686.    000000 0  1        INT
687.    000000 0  1          MSG,     ! MESSAGE TYPE
688.    000000 0  1          OPERATION,      ! CONTROL OPERATION
689.    000000 0  1          PARAMETER;      ! CONTROL PARAMETER
690.    000000 0  1        END;
691.    000000 0  0
692.    000000 0  0    STRUCT
693.    000000 0  0      SYSETMODE(*);
694.    000000 0  0        BEGIN
695.    000000 0  1        INT
696.    000000 0  1          MSG,     ! MESSAGE TYPE
697.    000000 0  1          FUNCTION,     ! FUNCTION
698.    000000 0  1          PARAMETER1,     ! FIRST PARAMETER
699.    000000 0  1          PARAMETER2;     ! SECOND PARAMETER
700.    000000 0  1        END;
701.    000000 0  0
702.    000000 0  0    STRUCT
703.    000000 0  0      SYRESETSYNC(*);
704.    000000 0  0        BEGIN
705.    000000 0  1        INT
706.    000000 0  1          MSG;     ! MESSAGE TYPE
707.    000000 0  1        END;
708.    000000 0  0                                                                  !C08,GIL
708.1   000000 0  0    STRUCT                                                        !C08,GIL
708.2   000000 0  0      SYCONTROLBUF(*);                                            !C08,GIL
708.3   000000 0  0        BEGIN                                                     !C08,GIL
708.4   000000 0  1        INT                                                        C08,GIL
708.5   000000 0  1          MSG,     ! MESSAGE TYPE
```

```
000000 0  1        OPERATION,     ! CONTROLBUF OPERATION
000000 0  1        COUNT,  ! COUNT
000000 0  1        BUF;    ! BUFFER
000000 0  1      END;
000000 0  0    STRUCT
000000 0  0      SYNETPROCESSORFAIL(*);
000000 0  0        BEGIN
000000 0  1        INT
000000 0  1          MSG,     ! MESSAGE TYPE
000000 0  1          SYSNUM,     ! SYSTEM NUMBER
000000 0  1          NEWSTATUS,     ! NEW PROCESSOR MASK
000000 0  1          OLDSTATUS;     ! OLD PROCESSOR MASK
000000 0  1        END;
000000 0  0
000000 0  0    STRUCT
000000 0  0      PID^STRUCT(*);
000000 0  0        BEGIN
000000 0  1        INT
000000 0  1          NAME[0:2],     ! PROCESS NAME
000000 0  1          CPUPIN;     ! CPU,PIN
000000 0  1        END;
000000 0  0    ?SOURCE LDECLARE( ERRORS )
Source file:  [3]  $OVER.T9618C00.LDECLARE  12DEC84 - 23:08:39
000000 0  0    ?SECTION ERRORS                                                         !D05
000000 0  0    !
000000 0  0    !     ***** F I L E   A N D   I / O   E R R O R   N U M B E R S *****
000000 0  0    !
000000 0  0    ! THE FILE AND I/O PORTIONS OF THE SYSTEM USE THE SAME SET OF LITERALS
000000 0  0    ! FOR DEFINING ERROR NUMBERS. ERRORS ARE DIVIDED INTO THREE GROUPS,
000000 0  0    ! ACCORDING TO THE CONDITION CODE THAT IS SET ON RETURN FROM A FILE
000000 0  0    ! PROCEDURE:
000000 0  0    !            CCE          NO ERROR
000000 0  0    !            CCG          WARNING
000000 0  0    !            CCL          BAD ERROR
000000 0  0    ! IN ADDITION, ERROR NUMBER >= "FECATERR" ARE PATH ERRORS AND REQUIRE
000000 0  0    ! THAT THE BACKUP PROCESS FOR A DEVICE BE ACTIVATED
000000 0  0    !
000000 0  0    !  SEE COMMENT ABOUT ERRORS BY THE ERROR WORD IN THE STANDARD SECTION   D03
000000 0  0    !  SECTION OF THE ACB DEFINITION FOR THE FILE SYSTEM DATA STRUCTURES.  D03
000000 0  0    !  ALSO ERRORS 300-511 ARE RESERVED FOR USER USE.                      D03
000000 0  0    LITERAL FEOK       = 0,         ! NO ERROR
000000 0  0    !
000000 0  0            FEEOF      = 1,         ! END-OF-FILE ON A DISC OR TAPE FILE READ
000000 0  0                                    ! OR END OF PHYSICAL MEDIA ON A WRITE TO A
000000 0  0                                    ! LINE PRINTER, TERMINAL, ETC.
000000 0  0            FEINVALOP = 2,          ! OPERATION NOT ALLOWED ON THIS TYPE OF
000000 0  0                                    ! FILE
000000 0  0            FEPARTFAIL= 3,          ! FAILURE TO OPEN OR PURGE A PARTITION
000000 0  0            FEKEYFAIL = 4,          ! FAILURE TO OPEN ALTERNATE KEY FILE
000000 0  0            FESEQFAIL = 5,          ! FAILURE TO PROVIDE SEQUENTIAL BUFFERING
000000 0  0            FESYSMESS = 6,          ! SYSTEM MESSAGE PICKED UP ON $RECEIVE
000000 0  0            FENOSYSMESS=7,          ! UNABLE TO RECEIVE SYSTEM MESSAGES
000000 0  0    !
000000 0  0            FEBADERR  = 10,         ! FIRST OF THE ERRORS WHICH SET CCL
000000 0  0            FEDUP     = 10,         ! FILE ALREADY EXISTS
000000 0  0            FENOTFOUND= 11,         ! FILE NOT IN DIRECTORY
```

```
16035.  000000 0  0        FEINUSE    = 12,       ! FILE IS IN USE
16036.  000000 0  0        FEBADNAME  = 13,       ! ILLEGAL FILENAME SPECIFICATION
16037.  000000 0  0        FENOSUCHDEV=14,        ! DEVICE DOES NOT EXIST
16038.  000000 0  0        FEWRONGDEV= 15,        ! VOLUME SPECIFICATION TO RENAME DOES NOT
16039.  000000 0  0                               ! AGREE WITH NAME OF VOLUME ON WHICH FILE
16040.  000000 0  0                               ! RESIDES
16041.  000000 0  0        FENOTOPEN = 16,        ! FILE NUMBER HAS NOT BEEN OPENED
16042.  000000 0  0        FENOPRIMARY=17,        ! PRIMARY PROCESS SPECIFIED IS NOT ALIVE
16043.  000000 0  0        FENOSUCHSYS=18,        ! NO SUCH SYSTEM IS DEFINED
16044.  000000 0  0        FENOMOREDEVS=19,       ! NO MORE DEVICES IN LDT
16045.  000000 0  0   !
16046.  000000 0  0        FENETVIOL = 20,        ! ATTEMPT TO OPEN NETWORK FILE WITH LONG CRTPID
16047.  000000 0  0        FEBADCOUNT= 21,        ! ILLEGAL COUNT SPECIFICATION OR ATTEMPT
16048.  000000 0  0                               ! TO TRANSFER TO MUCH OR TOO LITTLE DATA
16049.  000000 0  0        FEBOUNDSERR=22,        ! PARAMETER OR BUFFER OUT OF BOUNDS
16050.  000000 0  0        FEBADADDR = 23,        ! DISC ADDRESS OUT OF BOUNDS
16051.  000000 0  0        FENOTPRIV = 24,        ! PRIVILEGED MODE REQUIRED FOR THIS
16052.  000000 0  0                               ! OPERATION
16053.  000000 0  0        FEWAITFILE= 25,        ! AWAITIO ATTEMPTED ON WAITED FILE
16054.  000000 0  0        FENONEOUT = 26,        ! AWAITIO ATTEMPTED ON FILE WITH NO OUT-
16055.  000000 0  0                               ! STANDING REQUESTS
16056.  000000 0  0        FEIOPEND  = 27,        ! WAITED OPERATION ATTEMPTED WHEN THERE
16057.  000000 0  0                               ! WERE OUTSTANDING NO-WAIT REQUESTS
16058.  000000 0  0        FETOOMANY = 28,        ! # OF OUTSTANDING I/O'S WOULD EXCEED
16059.  000000 0  0                               ! DEPTH SPECIFICATION
16060.  000000 0  0        FEMISSPARM= 29,        ! MISSING PARAMETER
16061.  000000 0  0   !
16062.  000000 0  0        FENOLCB   = 30,        ! UNABLE TO OBTAIN A LINK CONTROL BLOCK
16063.  000000 0  0        FENOBUFSPACE=31,       ! UNABLE TO OBTAIN BUFFER SPACE
16064.  000000 0  0        FENOCBSPACE=32,        ! UNABLE TO OBTAIN FILE CONTROL BLOCK
16065.  000000 0  0        FENOIOBUFSPACE=33,     ! UNABLE TO OBTAIN IO BUFFER SPACE
16066.  000000 0  0                               ! SPACE
16067.  000000 0  0   !                                                                   E02,BER
16068.  000000 0  0        FEWRONGTNS= 38,        ! OPERATION ATTEMPTED ON WRONG TYPE SYSTEM  E02,BER
16069.  000000 0  0        FEOLDSYNC = 39,        ! NONSTOP PROCESS GOT REQUEST WITH OLD SYNCID E04,gc1#1
16070.  000000 0  0        FETIMEDOUT= 40,        ! OPERATION TIMED OUT BEFORE COMPLETION
16071.  000000 0  0        FEBADSYNC = 41,        ! CHECKSUM ERROR ON FILE SYNC BLOCK
16072.  000000 0  0        FEUNALLOC = 42,        ! ATTEMPT TO READ FROM UNALLOCATED PAGE
16073.  000000 0  0        FENODISCSPACE=43,      ! UNABLE TO OBTAIN DISC SPACE FOR FILE
16074.  000000 0  0                               ! PAGE
16075.  000000 0  0        FEDIRFULL = 44,        ! DIRECTORY IS FULL
16076.  000000 0  0        FEFILEFULL= 45,        ! FILE IS FULL
16077.  000000 0  0        FEINVKEY  = 46,        ! INVALID KEY SPECIFIED
16078.  000000 0  0        FEKEYSBAD = 47,        ! KEYS NOT CONSISTENT WITH FILE DATA
16079.  000000 0  0        FESECVIOL = 48,        ! SECURITY VIOLATION
16080.  000000 0  0        FEACCVIOL = 49,        ! ACCESS VIOLATION
16081.  000000 0  0   !
16082.  000000 0  0        FEDIRERR  = 50,        ! DIRECTORY ERROR (DIRECTORY IS BAD)
16083.  000000 0  0        FEDIRBAD  = 51,        ! DIRECTORY IS MESSED UP
16084.  000000 0  0        FEDFSERR  = 52,        ! ERROR IN DISC FREE SPACE TABLE
16085.  000000 0  0        FEFSERR   = 53,        ! FILE SYSTEM INTERNAL ERROR
16086.  000000 0  0        FEDFSIO   = 54,        ! I/O ERROR IN DISC FREE SPACE TABLE
16087.  000000 0  0        FEDIRIO   = 55,        ! I/O ERROR IN DIRECTORY
16088.  000000 0  0        FEVLABIO  = 56,        ! I/O ERROR ON VOLUME LABEL
16089.  000000 0  0        FEDFSFULL = 57,        ! DISC FREE SPACE TABLE IS FULL
16090.  000000 0  0        FEDFSBAD  = 58,        ! DISC FREE SPACE TABLE IS MESSED UP
```

```
000000 0  0          FEFILEBAD = 59,          ! FILE IS MESSED UP
000000 0  0    !
000000 0  0          FEWRONGID = 60,          ! VOLUME MOUNTED IS NOT THE ONE ON WHICH
000000 0  0                                   ! THIS FILE RESIDES (VOLUME CHANGED) OR
000000 0  0                                   ! DEVICE DOWNED AND THEN UPPED (OLD
000000 0  0                                   ! REQUEST
000000 0  0          FEOPENSTOP= 61,          ! NO MORE OPENS ALLOWED ON THIS VOLUME
000000 0  0          FEUNEXMOUNT=62,          ! VOLUME WAS MOUNTED, BUT NO MOUNT COMMAND
000000 0  0                                   ! WAS GIVEN
000000 0  0          FEMOUNTEXP= 63,          ! WAITING FOR MOUNT INTERRUPT
000000 0  0          FEMOUNTINPROG= 64,       ! MOUNT IS IN PROGRESS ON THIS DEVICE
000000 0  0          FESPECONLY= 65,          ! ONLY SPECIAL REQUESTS ALLOWED
000000 0  0          FEDEVDOWN = 66,          ! DEVICE IS DOWN
000000 0  0    !
000000 0  0          FECONTINUE= 70,          ! CONTINUE FILE OPERATION
000000 0  0          FEDUPREC  = 71,          ! DUPLICATE RECORD
000000 0  0          FEBADPART = 72,          ! ATTEMPT TO ACCESS UNMOUNTED PARTITION
000000 0  0          FELOCKED  = 73,          ! FILE OR RECORD LOCKED
000000 0  0          FEBADREPLY= 74,          ! ILLEGAL REPLY NUMBER OR NO SPACE FOR REPLY
000000 0  0          FENOTRANSID = 75,        ! TRANS MODE OPERATION WITH NO TRANSID         E00
000000 0  0          FEENDEDTRANSID = 76,     ! TRANSID IN PROCESS OF ENDING                  E00
000000 0  0          FEAUDFILEWRONGCODE=77,!  AUDITCONFIG FILE HAS WRONG FILECODE             E00
000000 0  0          FEINVTRANSID = 78,       ! INVALID TRANSID                               E00
000000 0  0          FENOTRANSLOCK = 79,      ! TRANSID DOES NOT HOLD LOCK ON RECORD          E00
000000 0  0          FEAUDITINVALOP = 80,     ! INVALID OP ON AUDITED FILE/NON-AUDITED VOLUME E00
000000 0  0          FETRANSNOWAITOUT = 81,!  > 0 NOWAIT IO'S FOR TRANSID OUTSTANDING         E00
000000 0  0          FETMFNOTRUNNING = 82,  ! TMF NOT STARTED UP                              E00
000000 0  0          FETOOMANYTRANSBEGINS=83,! > 1 OR > TFILE DEPTH TRANSBEGINS               E00
000000 0  0          FETMFNOTCONFIGURED = 84,! TMF NOT CONFIGURED                             E00
000000 0  0          FEEXPECTEDREAD = 87,   ! WAITING ON A READ REQUEST AND DID NOT GET IT    D02
000000 0  0          FEINVALIDSEQUENCE =88,! A CONTROL READ IS PENDING, NEW READ INVALID      D02
000000 0  0          FENODEVBUFSPACE = 89,  ! REMOTE DEVICE HAS NO BUFFER AVAILABLE           D04
000000 0  0          FETRANSABRTOWNERDIED=90,! BEGINTRANS PROCESS DIED: SYSTEM ABRT           E00
000000 0  0          FETRANSABRTBADDBID=91,! TRANS ABRTED BY SYSTEM: DBID'S DISAGREE          E00
000000 0  0          FETRANSABRTNETDOWN=92,! TRANS ABRTED BY SYSTEM: UNREACHABLE NODE         E00
000000 0  0          FETRANSABRTAUDOVFL=93,! TRANS ABRTED BY SYSTEM: SPANNED TOO MANY         E00
000000 0  0                                 !                       AUDIT FILES               E00
000000 0  0          FETRANSABRTOPRCMD= 94,! TRANS ABRTED BY SYSTEM: OPERATOR COMMAND         E00
000000 0  0                                 ! 95,96 RESERVED FOR SYSABORTS                    E00
000000 0  0          FEABORTEDTRANSID = 97,! TRANSID WAS ABORTED                              E00
000000 0  0          FETMFNATFULL = 98,     ! NAT TABLE FULL                                  E00
000000 0  0    !
000000 0  0          FETOOCHEAP= 99,          ! FAILURE TO PURCHASE ENSCRIBE
000000 0  0    !
000000 0  0          FENOTRDY  = 100,         ! DEVICE NOT READY
000000 0  0          FENOWRTRING=101,         ! NO WRITE RING IN MAG TAPE
000000 0  0          FEPAPEROUT= 102,         ! PAPER OUT ON LINE PRINTER
000000 0  0          FEPONNOTRDY=103,         ! DISC NOT READY DUE TO POWER FAIL
000000 0  0          FENORESPONSE=104,        ! DEVICE NOT RESPONDING                         E03,RLN
000000 0  0          FEVFUERR  = 105,         ! PRINTER VFU ERROR                             E03,RLN
000000 0  0    !
000000 0  0          FEBREAKONLY=110,         ! ONLY BREAK MODE REQUESTS ACCEPTED
000000 0  0          FEBREAK   = 111,         ! BREAK OCCURRED ON THIS REQUEST
000000 0  0          FEOPWRITEABORT=112,      ! HIGH PRIORITY WRITE TO THE OPERATOR
000000 0  0                                   ! CONSOLE ABORTED THIS READ OR WRITEREAD
000000 0  0          FEDATAPARITY=120,        ! DATA PARITY
```

```
000000 0 0          FEOVERRUN = 121,       ! DATA OVERRUN
000000 0 0          FEDATALOSS= 122,       ! X.25 CIRCUIT RESET, POSSIBLE DATA LOSS          X25
000000 0 0          FESUBBUSY = 123,       ! SUB-DEVICE BUSY                                 D02
000000 0 0          FELINERESET = 124,     ! A LINE RESET IS IN PROGRESS                     D02
000000 0 0    !
000000 0 0          FEFIRSTDISC=130,       ! 1ST DISC ERROR
000000 0 0          FEADDRCHK = 130,       ! ILLEGAL ADDRESS TO DISC DRIVE
000000 0 0          FEWRTCHECK= 131,       ! WRITE CHECK ERROR FROM DISC
000000 0 0          FESEEKUNC = 132,       ! SEEK INCOMPLETE FROM DISC
000000 0 0          FEACCNOTRDY=133,       ! ACCESS NOT READY ON DISC
000000 0 0          FEADDRCOMP= 134,       ! ADDRESS COMPARE ERROR ON DISC
000000 0 0          FEWRTPROTECT=135,      ! ATTEMPT TO WRITE TO PROTECTED DISC
000000 0 0          FEUNITOWN= 136,        ! UNIT OWNERSHIP ERROR ( DUAL PORT DISCS)
000000 0 0          FEBUFPARITY=137,       ! DISC CONTROLLER BUFFER PARITY ERROR
000000 0 0          FEINTERRUPTOVERRUN=138, ! > 1 INTERRUPT SINCE LAST EIO !                !E01,GSK
000000 0 0          FELASTDISC= 139,       ! LAST DISC ERROR
000000 0 0    !
000000 0 0          FEMODEMERR= 140,       ! MODEM DISCONNECTED OR SCREWED UP
000000 0 0          FEDISCONNECT = 140,    ! TANDEM TO IBM SYSTEM LINK IS DISCONNECTED       D03
000000 0 0          FEMOTIONCHK = 145,     ! CARD READER MOTION CHECK ERROR                  D02
000000 0 0          FEREADCHK = 146,       ! CARD READER READ CHECK ERROR                    D02
000000 0 0          FEINVALHOLRTH = 147,   ! CARD READER INVALID HOLLERITH CODE READ         D02
000000 0 0    !
000000 0 0          FEEOT     = 150,       ! END OF TAPE
000000 0 0          FERUNAWAY = 151,       ! RUNAWAY TAPE
000000 0 0          FEOPABORT = 152,       ! UNUSUAL END (UNIT WENT OFFLINE)
000000 0 0          FETAPEPON = 153,       ! TAPE DRIVE POWER ON
000000 0 0          FEBOT     = 154,       ! BEGINNING OF TAPE ON BSR OR BSF
000000 0 0          FE9TRKTAPEONLY = 155,  ! ONLY NINE TRACK MAGNETIC TAPE PERMITTED
000000 0 0          FEIOPROTOCOLERR=156, ! PROTOCOL VIOLATION !                             !E03,WPB
000000 0 0    ! DELETION !                                                                   !E03,WPB
000000 0 0          FEIOPROCERR = 157,     ! I/O PROCESS INTERNAL ERROR                      D02
000000 0 0          FEBADTHLFUNC= 158,     ! INVALID TANDEM-HYPER-LINK FUNCTION CODE         E01
000000 0 0    !
000000 0 0    !     ENVOV data communications error numbers                                 D02
000000 0 0    !            160 through 189                                                   D02
000000 0 0    !
000000 0 0          FEDEVERR  = 190,       ! UNDEFINED DEVICE ERROR
000000 0 0          FEDEVPON  = 191,       ! DEVICE POWER ON
000000 0 0          FEDEVXERCISED=192,     ! DEVICE IS BEING EXERCISED                       D03
000000 0 0          FENOMICROCODE=193,     ! CONTROLLER MICROCODE NOT LOADED !              !E03,GSK
000000 0 0    !
000000 0 0          FECATERR  = 200,       ! FIRST OF THE PATH SWITCH ERRORS
000000 0 0          FEOWNERSHIP=200,       ! DEVICE IS OWNED BY THE OTHER PORT
000000 0 0          FEPATHDOWN= 201,       ! UNABLE TO COMMUNICATE OVER THIS PATH
000000 0 0    !
000000 0 0          FEOWNABORT= 210,       ! OWNERSHIP CHANGED DURING OPERATION
000000 0 0          FECPUFAIL = 211,       ! CPU FAILED DURING OPERATION
000000 0 0          FEEIOFAIL = 212,       ! EIO INSTRUCTION FAILURE
000000 0 0          FECHPARITY= 213,       ! CHANNEL DATA PARITY
000000 0 0          FECHTIMEOUT=214,       ! CHANNEL TIMEOUT
000000 0 0          FEMEMABS  = 215,       ! I/O ATTEMPTED TO ABSENT PAGE
000000 0 0          FEMAPPARITY=216,       ! PARITY ERROR IN MAP DURING I/O
000000 0 0          FEMEMPARITY=217,       ! MEMORY PARITY ERROR DURING I/O
000000 0 0          FEINTTIMEOUT=218,      ! INTERRUPT TIMEOUT
000000 0 0          FEILLRECON= 219,       ! ILLEGAL RECONNECT
```

```
16203.   000000 0  0           FEPROTECT = 220,        ! PROTECT VIOLATION
16204.   000000 0  0           FEPADIN   = 221,        ! PADIN VIOLATION
16205.   000000 0  0           FEBADEIOSTAT=222,       ! BAD CHANNEL STATUS FROM EIO
16206.   000000 0  0           FEBADIIOSTAT=223,       ! BAD CHANNEL STATUS FROM IIO
16207.   000000 0  0           FECTLERR = 224,         ! CONTROLLER ERROR
16208.   000000 0  0           FEUNITPOLLERR = 225,    ! NO UNIT OR MULTIPLE UNITS AT SAME UNIT#
16209.   000000 0  0           FECONTROLLERBUSY = 226,                                         !D05
16210.   000000 0  0      !
16211.   000000 0  0           FECPUPON  = 230,        ! CPU POWER ON DURING OPERATION
16212.   000000 0  0           FEIOPON   = 231,        ! CONTROLLER POWER ON DURING OPERATION
16213.   000000 0  0      !
16214.   000000 0  0           FENETERR  = 240,        ! FIRST OF THE NETWORK ERRORS
16215.   000000 0  0           FELHRETRY = 240,        ! LINE HANDLER ERROR, DIDN'T GET STARTED
16216.   000000 0  0           FENETRETRY= 241,        ! NETWORK ERROR, DIDN'T GET STARTED
16217.   000000 0  0           FELHFAIL  = 248,        ! LINE HANDLER ERROR, ABORTED
16218.   000000 0  0           FENETFAIL = 249,        ! NETWORK ERROR, ABORTED
16219.   000000 0  0           FENETDOWN = 250,        ! ALL PATHS TO THE SYSTEM ARE DOWN
16220.   000000 0  0           FENETPROTOCOLERROR=251,!NETWORK PROTOCOL ERROR
16220.1  000000 0  0           FENOEXPANDCLASS = 252,! EXPAND- REQUIRED SERVICE CLASS NOT  AVAIL    E05,EMC#10
16221.   000000 0  0           FEFIRSTUSER = 300,      ! ERRORS 300 TO 511 ARE RESERVED FOR         D03
16222.   000000 0  0           FELASTUSER = 511;       !   USE BY THE USER.                         D03
    9.   000000 0  0      !?NOMAP                                                                   C11
   10.   000000 0  0      INT PROC
   11.   000000 0  0      SPOOL^CHECKMSG(TYPE, MSG, LEN) VARIABLE;
   12.   000000 1  0      INT
   13.   000000 1  0        TYPE,
   14.   000000 1  0        .MSG,
   15.   000000 1  0        LEN;
   16.   000000 1  0      FORWARD;

LEN                            Variable      INT          Direct       L-004
MSG                            Variable      INT          Indirect     L-005
TYPE                           Variable      INT          Direct       L-006

   16.1  000000 0  0      ?NOLIST
   26.1  000000 0  0      ?SOURCE SPLTXCMP
Source file:  [1]  $OVER.T9618C00.SPLTXCMP  26AUG85 - 12:36:39                    !B30,MBB============ #XXX
    2.   000000 0  0      !-----------------------------------------------------------------------------
    3.   000000 0  0      ! Compress 8-bit ascii into 5-bit nybbles.
    4.   000000 0  0      !  1st nybble   2nd nybble   3rd nybble   4th nybble    Character
    5.   000000 0  0      !  ----------   ----------   ----------   ----------    ---------
    6.   000000 0  0      !     %00                                               blank
    7.   000000 0  0      !
    8.   000000 0  0      !  %01 -> %32                                           nybble + prefix
    9.   000000 0  0      !
   10.   000000 0  0      !     %34                                               next prefix (perm)
   11.   000000 0  0      !     %35                                               prev prefix (perm)
   12.   000000 0  0      !     %36                                               next prefix (temp)
   13.   000000 0  0      !     %37                                               prev prefix (temp)
   14.   000000 0  0      !          %B 11 1tp  (t=temp, p=prev)
   15.   000000 0  0      !
   16.   000000 0  0      !     %33       %B 11 111    %B 00 xxx    %B xx xxx     8-bit character (x)
   17.   000000 0  0      !
   18.   000000 0  0      !     %33       %B 11 111    %B xx xxx    %B xx 111     next 2 nybbles are a
   19.   000000 0  0      !                                                         10 bit count
   20.   000000 0  0      !
```

```
000000 0  0   !      %33       %B 11 111    %B xx xxx    %B xx ccc    7-bit ascii (x)
000000 0  0   !                                                         for (ccc) + 4
000000 0  0   !
000000 0  0   !      %33       %B 1c ccc                              blanks for (cccc) + 3
000000 0  0   !
000000 0  0   !      %33       %B 0x xxx                              special chars
000000 0  0   !                      00  ;                              (xxxx) = index
000000 0  0   !                      01  <
000000 0  0   !                      02  =
000000 0  0   !                      03  >
000000 0  0   !                      04  ?
000000 0  0   !                      05  @
000000 0  0   !                      06  [
000000 0  0   !                      07  \
000000 0  0   !                      08  ]
000000 0  0   !                      09  ^
000000 0  0   !                      10  _
000000 0  0   !                      11  `
000000 0  0   !                      12  {
000000 0  0   !                      13  |
000000 0  0   !                      14  }
000000 0  0   !                      15  ~
000000 0  0   !--------------------------------------------------------------------------
000000 0  0   INT PROC SPOOL^TEXTCOMPRESS (DEST, MAX^DEST^WORDS, SOURCE, SOURCE^BYTES);
000000 1  0                        ! returns dest word count in <1:15>
000000 1  0                        ! if <0>=1, then source was too long to fit in dest
000000 1  0      INT      .DEST;
000000 1  0      INT       MAX^DEST^WORDS;
000000 1  0      STRING   .SOURCE;
000000 1  0      INT       SOURCE^BYTES;
000000 1  0
000000 1  0   begin
000000 1  1
000000 1  1   int       prefix := %40;
000000 1  1   int       prevprefix := %40;
000000 1  1   int       bitcnt := 0;
000000 1  1   int       adjust^prefix := 0;
000000 1  1   int       .nextdest;
000000 1  1   int       .enddest;
000000 1  1   string    .endsource;
000000 1  1   int       bits;
000000 1  1   int       cnt;
000000 1  1   int       newprefix;
000000 1  1   int       char;
000000 1  1   int       endbyte;
000000 1  1   string    .enddup;
000000 1  1   int       dupcnt;
000000 1  1   int       i;
000000 1  1   int       adjchar;
000000 1  1   int       .lastprefix;
000000 1  1   int       lastprefix^bit;
000000 1  1
000000 1  1   ! subproc emit
000000 1  1   subproc emit (nybble);
000000 2  1      int nybble;     ! 5 bits
000000 2  1   begin
```

```
000000 2  2
000000 2  2   use bc;          ! current bit cnt
000000 2  2   bc := bitcnt;
000001 2  2   stack $udbl (bits) '<<' 5;
000004 2  2   stack nybble.<11:15>;
000006 2  2   code (ladd);
000007 2  2   code (nsto bits);
000010 2  2   bc := bc + 5;
000011 2  2   if bc >= 16 then begin
000014 2  3      ! flush out a word
000014 2  3      if @nextdest = @enddest then begin
000020 2  4         code (strp 7);
000021 2  4         stack max^dest^words lor %100000;
000023 2  4         goto do^exit;
000024 2  4      end;
000024 2  3      bc := bc - 16;
000025 2  3      stack bc;
000026 2  3      code (dlrs 0);
000027 2  3      code (nsto nextdest);
000030 2  3      @nextdest := @nextdest + 1;
000032 2  3   end;
000032 2  2   code (strp 7);
000033 2  2   bitcnt := bc;
000035 2  2   if adjust^prefix then begin
000037 2  3      ! adjust last prefix to temporary
000037 2  3      lastprefix := lastprefix + (%100000 '>>' lastprefix^bit.<12:15>);
000044 2  3      adjust^prefix := 0;
000046 2  3   end;
000046 2  2   return;
000047 2  2
000047 2  2   end;                            ! of subproc emit

BC                            Variable       INT             Direct         X 007
DO^EXIT                       Label                          %177777
NYBBLE                        Variable       INT             Direct         S-001

000050 1  1
000050 1  1   ! subproc emit^special
000050 1  1   subproc emit^special (nybble);
000050 2  1      int nybble;
000050 2  1   begin
000050 2  2      call emit (%33);
000053 2  2      call emit (%37);
000056 2  2      call emit (nybble);
000061 2  2   end;                            ! of subproc emit^special

NYBBLE                        Variable       INT             Direct         S-001

000062 1  1
000062 1  1   ! code starts here
000062 1  1   code (rde; anri %577; sete);          ! traps off
000072 1  1   @enddest := (@nextdest := @dest) + max^dest^words;
000077 1  1   @endsource := @source [source^bytes];
000102 1  1   endbyte := endsource;
000104 1  1   endsource := 0;     ! scan stopper
000106 1  1
000106 1  1   while @source <> @endsource do begin
```

```
000114 1  2      stack (char := source);
000116 1  2      @source := @source + 1;
000117 1  2      code (cmpi " ");
000120 1  3      if = then begin
000120 1  3         ! blank
000122 1  3         dupcnt := 1;
000125 1  4         if source = " " then begin
000125 1  4            ! multiple blanks
000132 1  4            scan source[1] while " " -> @enddup;
000141 1  4            if (dupcnt := (@enddup '-' @source) + 1) > ( (17 * 2) + 1) then
000142 1  4               goto large^dup;
000145 1  5            while dupcnt > 2 do begin
000145 1  5               ! more than 2 blanks
000150 1  5               call emit (%33);
000162 1  5               call emit ( (cnt := $min (dupcnt, 17) ) + (%20 - 3) );
000165 1  5               dupcnt := dupcnt - cnt;
000166 1  4            end;
000170 1  4            @source := @enddup;
000170 1  3         end;
000170 1  3         ! remaining blanks
000172 1  4         for i := 1 to dupcnt do begin
000175 1  4            call emit (%00);
000203 1  3         end;
000211 1  3      end else if (char - " ") '>' ("~" - " ") then begin
000211 1  3         ! non-printable ascii char
000215 1  3         call emit^special (char >> 5);
000220 1  3         call emit (char);
000222 1  3      end else begin
000222 1  3         ! printable ascii char
000240 1  4         if source = char and source[1] = char and source[2] = char then begin
000240 1  4            ! at least 4 duplicate ascii printable characters
000245 1  4            scan source[3] while char -> @enddup;
000252 1  4            dupcnt := (@enddup '-' @source) + 1;
000252 1  4      large^dup:
000256 1  4            call emit^special (char >> 2);  ! first 5 bits
000261 1  5            if dupcnt <= 10 then begin
000270 1  5               call emit ( (char << 3) + dupcnt - 4);
000272 1  5            end else begin
000277 1  5               call emit ( (char << 3) + 7);
000313 1  5               cnt := (dupcnt := $lmin (dupcnt, 1023 + 11) ) - 11;
000317 1  5               call emit (cnt >> 5);
000322 1  5               call emit (cnt);
000322 1  4            end;
000325 1  4            @source := @source + (dupcnt - 1);
000326 1  4         end else begin
000326 1  4            ! emit single printable char
000334 1  5            if (adjchar := (char - %73)).<11:15> <= 5 then begin
000334 1  5               ! special char (0,%33,%34,%35,%36,%37)
000337 1  5               call emit (%33);
000350 1  5               call emit ( ( (adjchar >> 5) * 6) + adjchar.<11:15> );
000351 1  5            end else begin
000351 1  5               ! normal char
000357 1  6               if (newprefix := char land %340) = prefix then begin
000362 1  6                  call emit (char);
000364 1  6                  prevprefix := prefix;
000371 1  6               end else if newprefix = prevprefix then begin
                              call emit (char);
```

```
183.     000374 1  6                prefix := prevprefix;
184.     000376 1  6                adjust^prefix := 1;
185.     000400 1  6             end else begin
186.     000401 1  6                ! must change prefix
187.     000401 1  6                use x;
188.     000401 1  6                x := newprefix - prefix;
189.     000410 1  6                if <= then x := x + %140;
190.     000412 1  6                call emit (%34 + (x >> 6) );
191.     000421 1  6                drop x;
192.     000421 1  6                @lastprefix := @nextdest[ (lastprefix^bit := bitcnt - 2) >> 4];
193.     000430 1  6                prevprefix := prefix;
194.     000432 1  6                prefix := newprefix;
195.     000434 1  6                call emit (char);
196.     000437 1  6             end;
197.     000437 1  5          end;
198.     000437 1  4       end;
199.     000437 1  3    end;
200.     000437 1  2 end;
201.     000442 1  1
202.     000442 1  1 ! flush out remaining word and do last prefix adjust (if any)
203.     000442 1  1 call emit^special (0);
204.     000445 1  1
205.     000445 1  1 stack (@nextdest '-' @dest);
206.     000450 1  1
207.     000450 1  1 do^exit:
208.     000453 1  1 endsource := endbyte;
209.     000455 1  1 return;
210.     000456 1  1
211.     000456 1  1 end;                      ! of proc spool^textcompress

ADJCHAR                     Variable     INT          Direct       L+020
ADJUST^PREFIX               Variable     INT          Direct       L+004
BITCNT                      Variable     INT          Direct       L+003
BITS                        Variable     INT          Direct       L+010
CHAR                        Variable     INT          Direct       L+013
CNT                         Variable     INT          Direct       L+011
DEST                        Variable     INT          Indirect     L-006
DO^EXIT                     Label                     %000453
DUPCNT                      Variable     INT          Direct       L+016
EMIT                        Subproc                   %000000
EMIT^SPECIAL                Subproc                   %000050
ENDBYTE                     Variable     INT          Direct       L+014
ENDDEST                     Variable     INT          Indirect     L+006
ENDDUP                      Variable     STRING       Indirect     L+015
ENDSOURCE                   Variable     STRING       Indirect     L+007
I                           Variable     INT          Direct       L+017
LARGE^DUP                   Label                     %000252
LASTPREFIX                  Variable     INT          Indirect     L+021
LASTPREFIX^BIT              Variable     INT          Direct       L+022
MAX^DEST^WORDS              Variable     INT          Direct       L-005
NEWPREFIX                   Variable     INT          Direct       L+012
NEXTDEST                    Variable     INT          Indirect     L+005
PREFIX                      Variable     INT          Direct       L+001
PREVPREFIX                  Variable     INT          Direct       L+002
SOURCE                      Variable     STRING       Indirect     L-004
SOURCE^BYTES                Variable     INT          Direct       L-003

 212.     000000 0  0
```

```
000000 0  0  INT PROC SPOOL^TEXTEXPAND (DEST, MAX^DEST^BYTES, SOURCE, SOURCE^WORDS);
000000 1  0                         ! returns dest byte count in <1:15>
000000 1  0                         ! if <0>=1, then source was too long to fit in dest
000000 1  0     STRING   .DEST;
000000 1  0     INT       MAX^DEST^BYTES;
000000 1  0     INT      .SOURCE;
000000 1  0     INT       SOURCE^WORDS;
000000 1  0
000000 1  0  begin
000000 1  1
000000 1  1  int      prefix := %40;
000000 1  1  int      next^prefix := %40;
000000 1  1  int      bitcnt := 0;
000000 1  1  string   .sptr;
000000 1  1  string   .endsptr;
000000 1  1  int      nybble;
000000 1  1  int      nybble2;
000000 1  1  int      bits;
000000 1  1  int      cnt;
000000 1  1  int      .endsource;
000000 1  1
000000 1  1  ! subproc get^nybble
000000 1  1  int subproc get^nybble;
000000 2  1  begin
000000 2  2
000000 2  2  use bc;
000000 2  2  bc := bitcnt;
000001 2  2  stack $udbl (bits);
000003 2  2  bc := bc - 5;
000004 2  2  if >= then begin
000005 2  3     code (dlls 5);
000006 2  3  end else begin
000007 2  3     if @source = @endsource then begin
000013 2  4        code (strp 7);
000014 2  4        stack (@sptr '-' @dest);
000017 2  4        goto do^exit;
000020 2  4     end;
000020 2  3     stack bc + 5;
000022 2  3     code (dlls 0);
000023 2  3     code (strp 0);
000024 2  3     stack source;
000025 2  3     @source := @source + 1;
000027 2  3     stack -bc;
000031 2  3     code (dlls 0);
000032 2  3     bc := bc + 16;
000033 2  3  end;
000033 2  2  store bits;
000034 2  2  bitcnt := bc;
000036 2  2  return;
000037 2  2  end;                          ! of subproc get^nybble

BC                       Variable     INT           Direct        X 007
DO^EXIT                  Label                      %177777

000040 1  1
000040 1  1  ! code starts here
000040 1  1  code (rde; anri %577; sete);        ! traps off
```

```
000050 1  1   @endsptr := (@sptr := @dest) + max^dest^bytes;
000055 1  1   @endsource := @source [source^words];
000060 1  1   while (@sptr <> @endsptr) do begin
000064 1  2      if not (nybble := get^nybble) then begin
000067 1  3         ! blank
000067 1  3         stack " ";
000070 1  3      end else if nybble < %33 then begin
000074 1  3         ! normal char
000074 1  3         stack nybble lor prefix;
000077 1  3         prefix := next^prefix;
000101 1  3      end else if = then begin
000103 1  3         ! nybble = %33, see next
000103 1  3         if (nybble := get^nybble).<11> then begin
000107 1  4            if nybble <> %37 then begin
000112 1  5               ! multiple blanks
000112 1  5               sptr := " ";
000114 1  5               cnt := nybble + (3 - %20);
000117 1  5               goto dup^chars;
000120 1  5            end else begin
000121 1  5               ! see next nybble
000121 1  5               if (nybble := get^nybble) <= 7 then begin
000125 1  6                  ! non-printable ascii char
000125 1  6                  stack get^nybble + (nybble << 5);
000131 1  6               end else begin
000132 1  6                  ! duplicate ascii chars
000132 1  6                  nybble2 := get^nybble;
000134 1  6                  sptr := (nybble << 2) + (nybble2 >> 3);
000142 1  6                  if (cnt := nybble2.<13:15> + 4) = 11 then begin
000150 1  7                     nybble := get^nybble;
000152 1  7                     cnt := get^nybble + (nybble << 5) + 11;
000160 1  7                  end;
000160 1  6                dup^chars:
000160 1  6                  sptr[1] ':=' sptr for
000160 1  6                        ($lmin (cnt, @endsptr '-' @sptr) - 1) -> @sptr;
000176 1  6                  goto no^char;
000177 1  6               end;
000177 1  5            end;
000177 1  4         end else begin
000200 1  4            ! special char
000200 1  4            stack $udbl (nybble);
000202 1  4            stack 6;
000203 1  4            code (ldiv);
000204 1  4            code (lls 5);
000205 1  4            code (ladd);
000206 1  4            code (addi %73);
000207 1  4         end;
000207 1  3      end else begin
000210 1  3         ! %34 <= nybble <= %37, change prefix
000210 1  3         use x;
000210 1  3         if (x := prefix + (%40 << nybble.<15>) ) > %140 then begin
000221 1  4            x := x - %140;
000222 1  4         end;
000222 1  3         prefix := x;
000224 1  3         if not nybble.<14> then next^prefix := x;
000231 1  3         drop x;
000231 1  3         goto no^char;
000232 1  3      end:
```

```
000232 1  2      store sptr;
000233 1  2      @sptr := @sptr + 1;
000235 1  2    no^char;
000235 1  2  end;
000236 1  1
000236 1  1  stack max^dest^bytes lor %100000;
000240 1  1
000240 1  1  do^exit;
000243 1  1  return;
000244 1  1
000244 1  1  end;                        ! of proc spool^textexpand

BITCNT                       Variable    INT         Direct      L+003
BITS                         Variable    INT         Direct      L+010
CNT                          Variable    INT         Direct      L+011
DEST                         Variable    STRING      Indirect    L-006
DO^EXIT                      Label                   %000243
DUP^CHARS                    Label                   %000160
ENDSOURCE                    Variable    INT         Indirect    L+012
ENDSPTR                      Variable    STRING      Indirect    L+005
GET^NYBBLE                   Subproc     INT         %000000
MAX^DEST^BYTES               Variable    INT         Direct      L-005
NEXT^PREFIX                  Variable    INT         Direct      L+002
NO^CHAR                      Label                   %000235
NYBBLE                       Variable    INT         Direct      L+006
NYBBLE2                      Variable    INT         Direct      L+007
PREFIX                       Variable    INT         Direct      L+001
SOURCE                       Variable    INT         Indirect    L-004
SOURCE^WORDS                 Variable    INT         Direct      L-003
SPTR                         Variable    STRING      Indirect    L+004

000000 0  0  INT PROC SPOOL^COMPRESS (DEST, SOURCE, SOURCE^BYTES, THRESHOLDS, MODE);
000000 1  0    INT      .DEST;
000000 1  0    INT      .SOURCE;
000000 1  0    INT       SOURCE^BYTES;
000000 1  0    INT       THRESHOLDS;
000000 1  0    INT       MODE;
000000 1  0
000000 1  0    BEGIN
000000 1  1
000000 1  1    LITERAL  TRUE = -1,
000000 1  1             FALSE = 0;
000000 1  1
000000 1  1    DEFINE    DUPCODE = <0:1>#,
000000 1  1             DUPCOUNT = <2:7>#,
000000 1  1          NONDUPCOUNT = <8:15>#;
000000 1  1
000000 1  1    STRING    THRESH = THRESHOLDS;
000000 1  1
000000 1  1    INT        G^ZERO =  'G' + 0,
000000 1  1              SG^ZERO = 'SG' + 0;
000000 1  1
000000 1  1    INT       CALLERS^E = 'L' - 1;
                                   ^
**** WARNING **** 56 -- Format of ENV register on data stack has changed as of GUARDIAN release B00
```

```
000000 1  1     DEFINE   P = <05:05>#;
000000 1  1
000000 1  1     INT      FROM^SG := FALSE;
000000 1  1     INT        TO^SG := FALSE;
000000 1  1
000000 1  1     INT      .SOURCE^END := @SOURCE '+' SOURCE^BYTES/2;
000000 1  1
000000 1  1     INT      SEGMENT^CODE := 0;
000000 1  1     INT      DUPLICATE^COUNT;
000000 1  1     INT      NONDUPLICATE^COUNT;
000000 1  1
000000 1  1     INT      .OLD^DEST;
000000 1  1     INT      .OLD^SOURCE;
000000 1  1     INT      SOURCE^WORDS;
000000 1  1     INT      COUNT^REMAINING;
000000 1  1  INT SUBPROC QUALIFIED^DUPLICATE;
000000 2  1     BEGIN
000000 2  2
000000 2  2     INT      QUOT;
000000 2  2     INT      REM;
000000 2  2
000000 2  2     USE      SOURCE^INDEX;    ! NOTE !! SET BY CALLER !
000001 2  2
000001 2  2     STACK 0, IF FROM^SG THEN SG^ZERO[SOURCE^INDEX] ELSE G^ZERO[SOURCE^INDEX], %010020;
000011 2  2     CODE (LDIV);
000012 2  2     STORE QUOT, REM;
000014 2  2
000014 2  2     IF NOT REM AND QUOT < 4 AND QUOT <> 1 THEN
000024 2  2        BEGIN  ! QUALIFIED !
000024 2  3        SEGMENT^CODE := QUOT '<<' 14;
000027 2  3        RETURN -1;
000032 2  3        END
000032 2  2     ELSE
000033 2  2        BEGIN  ! NOT QUALIFIED !
000033 2  3        RETURN 0;
000036 2  3        END;
000036 2  2
000036 2  2     DROP     SOURCE^INDEX;
000036 2  2
000036 2  2     END;  ! INT SUBPROC QUALIFIED^DUPLICATE !

QUOT                 Variable     INT          Direct       S-001
REM                  Variable     INT          Direct       S-000

000036 1  1  !  START OF PROC'S CODE !
000036 1  1
000036 1  1     IF CALLERS^E.P THEN
000053 1  1        BEGIN
000053 1  2        FROM^SG := MODE.<14:14>;
000057 1  2          TO^SG := MODE.<15:15>;
000062 1  2        MODE := MODE LAND 3;
000065 1  2        END
000065 1  1     ELSE
000066 1  1        BEGIN
000066 1  2        MODE := 0;
000070 1  2        END;
```

```
000070 1   1
000070 1   1        USE SOURCE^INDEX,
000070 1   1              DEST^INDEX;
000070 1   1
000070 1   1        SOURCE^INDEX := @SOURCE;
000072 1   1          DEST^INDEX := @DEST;
000074 1   1
000074 1   1        WHILE (SOURCE^WORDS := @SOURCE^END '-' (@OLD^SOURCE:=SOURCE^INDEX)) DO
000102 1   1           BEGIN
000102 1   2
000102 1   2           STACK @OLD^DEST:=DEST^INDEX'+'1, SOURCE^INDEX, $MIN (SOURCE^WORDS, 255);
000114 1   2        CONTINUE^THIS^SEGMENT;
000114 1   2           STACK $COMP(IF FROM^SG THEN SG^ZERO[SOURCE^INDEX]
000114 1   2                                  ELSE G^ZERO[SOURCE^INDEX]);  ! FIRST "LASTWORD"
000122 1   2           CASE MODE OF BEGIN
000124 1   3              !0! CODE (MNGG);
000126 1 CE1              !1! CODE (MNGS);
000130 1 CE2              !2! CODE (MNSG);
000132 1 CE3              !3! CODE (MNSS);
000134 1 CE4              END;  ! OF CASE ON MODE !
000141 1   2    !      CODE (STRP $RP-1);            DELETED DUE TO TAL E00 CORRECTION          C09,gil
000141 1   2           STORE COUNT^REMAINING, SOURCE^INDEX, DEST^INDEX;
000144 1   2
000144 1   2           IF = THEN
000145 1   2              BEGIN  ! SEGMENT OR SOURCE EXHAUSTED BEFORE DUPLICATE !
000145 1   3
000145 1   3              DUPLICATE^COUNT := 0;
000147 1   3
000147 1   3              END    ! SEGMENT OR SOURCE EXHAUSTED BEFORE DUPLICATE !
000147 1   2           ELSE
000150 1   2              BEGIN  ! DUPLICATE !
000150 1   3
000150 1   3              IF QUALIFIED^DUPLICATE THEN
000154 1   3                 BEGIN  ! QUALIFIED DUPLICATE !
000154 1   4                 DEST^INDEX := DEST^INDEX '-' 1;
000157 1   4                 STACK SOURCE^INDEX, $MIN (62, @SOURCE^END '-' SOURCE^INDEX), 1;
000171 1   4                 IF FROM^SG THEN
000173 1   4                    BEGIN
000173 1   5                    CODE (CDS);
000174 1   5                    END
000174 1   4                 ELSE
000175 1   4                    BEGIN
000175 1   5                    CODE (CDG);
000176 1   5                    END;
000176 1   4                 STORE DUPLICATE^COUNT, SOURCE^INDEX, SOURCE^INDEX;
000201 1   4                 END    ! QUALIFIED DUPLICATE !
000201 1   3              ELSE
000202 1   3                 BEGIN  ! DUPLICATE BUT NOT QUALIFIED !
000202 1   4                 STACK SOURCE^INDEX, COUNT^REMAINING, 0;
000205 1   4                 IF FROM^SG THEN
000207 1   4                    BEGIN
000207 1   5                    CODE (CDS);
000210 1   5                    END
000210 1   4                 ELSE
000211 1   4                    BEGIN
000211 1   5                    CODE (CDG);
000212 1   5                    END;
```

```
000212 1  4            STORE DUPLICATE^COUNT, COUNT^REMAINING, SOURCE^INDEX;
000215 1  4            STACK DEST^INDEX, DEST^INDEX '-' 1, DUPLICATE^COUNT;
000221 1  4            IF TO^SG THEN
000223 1  4               BEGIN
000223 1  5               CODE (MOVW %30);
000224 1  5               END
000224 1  4            ELSE
000225 1  4               BEGIN
000225 1  5               CODE (MOVW %00);
000226 1  5               END;
000226 1  4            STORE DEST^INDEX;
000227 1  4            IF COUNT^REMAINING THEN
000231 1  4               BEGIN
000231 1  5               STACK DEST^INDEX, SOURCE^INDEX, COUNT^REMAINING;
000234 1  5               GOTO CONTINUE^THIS^SEGMENT;
000235 1  5               END;
000235 1  4            DUPLICATE^COUNT := 0;
000237 1  4            END;   ! DUPLICATE BUT NOT QUALIFIED !
000237 1  3         END;   ! DUPLICATE !
000237 1  2
000237 1  2      STACK SEGMENT^CODE '+' DUPLICATE^COUNT '<<' 8 '+' (DEST^INDEX '-' @OLD^DEST);
000247 1  2      IF TO^SG THEN
000251 1  2         BEGIN
000251 1  3         STORE SG^ZERO[@OLD^DEST '-' 1];
000255 1  3         END
000255 1  2      ELSE
000256 1  2         BEGIN
000256 1  3         STORE OLD^DEST[-1];
000260 1  3         END;
000260 1  2
000260 1  2      END;  ! OF SOURCE WORDS REMAIN !
000261 1  1
000261 1  1   IF SOURCE^BYTES.<15> THEN
000264 1  1      BEGIN
000264 1  2      STACK %040000 + (IF FROM^SG THEN SG^ZERO[@SOURCE '+' SOURCE^BYTES/2]
000264 1  2                                  ELSE SOURCE[SOURCE^BYTES/2]).<0:7>;
000306 1  2      IF TO^SG THEN
000310 1  2         STORE SG^ZERO[DEST^INDEX]
000310 1  2      ELSE
000312 1  2         STORE  G^ZERO[DEST^INDEX];
000313 1  2      DEST^INDEX := DEST^INDEX '+' 1;
000316 1  2      END;
000316 1  1
000316 1  1   RETURN DEST^INDEX '-' @DEST;
000322 1  1
000322 1  1   DROP DEST^INDEX,
000322 1  1      SOURCE^INDEX;
000322 1  1
000322 1  1   END;  ! OF INT PROC COMPRESS !

CALLERS^E                  Variable     INT       Direct       L-001
CONTINUE^THIS^SEGMENT      Label                  %000114
COUNT^REMAINING            Variable     INT       Direct       L+012
DEST                       Variable     INT       Indirect     L-007
DUPCODE                    Define                 <0:1>
DUPCOUNT                   Define                 <2:7>
```

```
DUPLICATE^COUNT               Variable    INT       Direct      L+005
FALSE                         Literal     INT       %000000
FROM^SG                       Variable    INT       Direct      L+001
G^ZERO                        Variable    INT       Direct      G+000
MODE                          Variable    INT       Direct      L-003
NONDUPCOUNT                   Define                <8:15>
NONDUPLICATE^COUNT            Variable    INT       Direct      L+006
OLD^DEST                      Variable    INT       Indirect    L+007
OLD^SOURCE                    Variable    INT       Indirect    L+010
P                             Define                <05:05>
QUALIFIED^DUPLICATE           Subproc     INT       %000000
SEGMENT^CODE                  Variable    INT       Direct      L+004
SG^ZERO                       Variable    INT       Direct      SG+000
SOURCE                        Variable    INT       Indirect    L-006
SOURCE^BYTES                  Variable    INT       Direct      L-005
SOURCE^END                    Variable    INT       Indirect    L+003
SOURCE^WORDS                  Variable    INT       Direct      L+011
THRESH                        Variable    STRING    Direct      L-004
THRESHOLDS                    Variable    INT       Direct      L-004
TO^SG                         Variable    INT       Direct      L+002
TRUE                          Literal     INT       %177777

000000 0  0    INT PROC SPOOL^EXPAND (DEST, MAX^DEST^BYTES, SOURCE, SOURCE^WORDS, MODE);
000000 1  0       INT     .DEST;
000000 1  0       INT      MAX^DEST^BYTES;
000000 1  0       INT     .SOURCE;
000000 1  0       INT      SOURCE^WORDS;
000000 1  0       INT      MODE;
000000 1  0
000000 1  0       BEGIN
000000 1  1
000000 1  1       LITERAL  TRUE = -1,
000000 1  1               FALSE = 0;
000000 1  1
000000 1  1       DEFINE   DUPCODE = <0:1>#,
000000 1  1               DUPCOUNT = <2:7>#,
000000 1  1            NONDUPCOUNT = <8:15>#;
000000 1  1
000000 1  1       INT        G^ZERO =  'G' + 0,
000000 1  1                 SG^ZERO = 'SG' + 0;
000000 1  1
000000 1  1       INT      CALLERS^E = 'L' - 1;
                                                  ^
**** WARNING **** 56 -- Format of ENV register on data stack has changed as of GUARDIAN release B00
               PREVIOUS ON PAGE # 36 IN PROC SPOOL^COMPRESS

000000 1  1       DEFINE   P = <05:05>#;
000000 1  1
000000 1  1       INT      FROM^SG := FALSE;
000000 1  1       INT        TO^SG := FALSE;
000000 1  1
000000 1  1       INT      DUPLICATE^WORDS = 'P' := [%000000, %010020, %020040, %030060];
000004 1  1
000004 1  1       INT      ODD^BYTE := 0;
000004 1  1
```

```
000004 1  1      INT       ERROR := FALSE;
000004 1  1
000004 1  1      INT       DUP^CODE,
000004 1  1                DUP^COUNT,
000004 1  1                NONDUP^COUNT;
000004 1  1
000004 1  1
000004 1  1      IF CALLERS^E.P THEN
000013 1  1         BEGIN
000013 1  2         FROM^SG := MODE.<15:15>;
000016 1  2           TO^SG := MODE.<14:14>;
000022 1  2         MODE := MODE LAND 3;
000025 1  2         END
000025 1  1      ELSE
000026 1  1         BEGIN
000026 1  2         MODE := 0;
000030 1  2         END;
000030 1  1
000030 1  1      USE SOURCE^INDEX,
000030 1  1            DEST^INDEX;
000030 1  1
000030 1  1      SOURCE^INDEX := @SOURCE;
000032 1  1        DEST^INDEX := @DEST;
000034 1  1
000034 1  1      WHILE SOURCE^WORDS DO
000036 1  1         BEGIN
000036 1  2
000036 1  2         STACK IF FROM^SG THEN SG^ZERO[SOURCE^INDEX] ELSE G^ZERO[SOURCE^INDEX];
000043 1  2         CODE (LDRA 0; ANRI %377); STORE NONDUP^COUNT;
000046 1  2         CODE (LDRA 0; LRS 8; ANRI %077); STORE DUP^COUNT;
000052 1  2         CODE (LRS 14; ANRI %003); STORE DUP^CODE;
000055 1  2
000055 1  2         MAX^DEST^BYTES :=  MAX^DEST^BYTES -
000055 1  2                            (IF DUP^CODE = 1 THEN 1 ELSE
000055 1  2                             (NONDUP^COUNT + DUP^COUNT) << 1);
000070 1  2
000070 1  2         IF < THEN
000071 1  2            BEGIN
000071 1  3            SOURCE^WORDS := 0;
000073 1  3            ERROR := TRUE;
000075 1  3            END
000075 1  2         ELSE
000076 1  2            BEGIN
000076 1  3
000076 1  3            IF DUP^CODE = 1 THEN
000101 1  3               BEGIN
000101 1  4               ODD^BYTE := 1;
000103 1  4               STACK NONDUP^COUNT '<<' 8;  ! ACTUALLY LAST CHARACTER !
000105 1  4               IF TO^SG THEN
000107 1  4                  BEGIN
000107 1  5                  STORE SG^ZERO[DEST^INDEX];
000110 1  5                  END
000110 1  4               ELSE
000111 1  4                  BEGIN
000111 1  5                  STORE G^ZERO[DEST^INDEX];
000112 1  5                  END;
```

```
000112 1   4          SOURCE^WORDS := SOURCE^WORDS - 1;
000114 1   4          END
000114 1   3       ELSE
000115 1   3          BEGIN
000115 1   4          STACK DEST^INDEX, SOURCE^INDEX '+' 1, NONDUP^COUNT;
000121 1   4          CASE MODE OF BEGIN
000123 1   5             !0! CODE (MOVW %00);
000125 1 CE1             !1! CODE (MOVW %20);
000127 1 CE2             !2! CODE (MOVW %10);
000131 1 CE3             !3! CODE (MOVW %30);
000133 1 CE4             END;  ! OF CASE ON MODE !
000140 1   4          STORE DEST^INDEX;
000141 1   4          SOURCE^WORDS := SOURCE^WORDS - NONDUP^COUNT - 1;
000146 1   4          END;
000146 1   3
000146 1   3       IF DUP^COUNT THEN
000150 1   3          BEGIN
000150 1   4          STACK DUPLICATE^WORDS[DUP^CODE];
000152 1   4          IF TO^SG THEN
000154 1   4             BEGIN
000154 1   5             STORE SG^ZERO[DEST^INDEX];
000155 1   5             END
000155 1   4          ELSE
000156 1   4             BEGIN
000156 1   5             STORE G^ZERO[DEST^INDEX];
000157 1   5             END;
000157 1   4
000157 1   4          STACK DEST^INDEX '+' 1, DEST^INDEX, DUP^COUNT - 1;
000164 1   4          IF TO^SG THEN
000166 1   4             BEGIN
000166 1   5             CODE (MOVW %30);
000167 1   5             END
000167 1   4          ELSE
000170 1   4             BEGIN
000170 1   5             CODE (MOVW %00);
000171 1   5             END;
000171 1   4          STORE DEST^INDEX;
000172 1   4          END;
000172 1   3
000172 1   3       SOURCE^INDEX := SOURCE^INDEX '+' NONDUP^COUNT '+' 1;
000177 1   3
000177 1   3       END;
000177 1   2
000177 1   2    END;
000200 1   1
000200 1   1 RETURN IF ERROR THEN -1 ELSE (DEST^INDEX '-' @DEST) << 1 + ODD^BYTE;
000213 1   1
000213 1   1 DROP DEST^INDEX,
000213 1   1    SOURCE^INDEX;
000213 1   1
000213 1   1 END;  ! OF INT PROC EXPAND !

CALLERS^E
DEST              Variable     INT          Direct      L-001
DUPCODE           Variable     INT          Indirect    L-007
DUPCOUNT          Define                    <0:1>
                  Define                    <2:7>
```

```
DUPLICATE^WORDS                 Variable    INT     Direct      P+000
DUP^CODE                        Variable    INT     Direct      L+005
DUP^COUNT                       Variable    INT     Direct      L+006
ERROR                           Variable    INT     Direct      L+004
FALSE                           Literal     INT     %000000
FROM^SG                         Variable    INT     Direct      L+001
G^ZERO                          Variable    INT     Direct      G+000
MAX^DEST^BYTES                  Variable    INT     Direct      L-006
MODE                            Variable    INT     Direct      L-003
NONDUPCOUNT                     Define              <8:15>
NONDUP^COUNT                    Variable    INT     Direct      L+007
ODD^BYTE                        Variable    INT     Direct      L+003
P                               Define              <05:05>
SG^ZERO                         Variable    INT     Direct      SG+000
SOURCE                          Variable    INT     Indirect    L-005
SOURCE^WORDS                    Variable    INT     Direct      L-004
TO^SG                           Variable    INT     Direct      L+002
TRUE                            Literal     INT     %177777
```

```
346.    000000 0  0   !
347.    000000 0  0   ! THIS PROCEDURE WRITES A DATA BLOCK FROM THE
348.    000000 0  0   ! APPLICATION TO THE COLLECTOR PROCESS
349.    000000 0  0   !
350.    000000 0  0   INT PROC
351.    000000 0  0   SPOOL^WBLK(BLOCK);
352.    000000 1  0   INT
353.    000000 1  0     .BLOCK(APBLOCK);     ! BLOCK TO BE WRITTEN
354.    000000 1  0
355.    000000 1  0     BEGIN
356.    000000 1  1
357.    000000 1  1     INT
358.    000000 1  1       FILE^NO,     ! FILE NUMBER SAVE
359.    000000 1  1       ERROR;     ! ERROR TEMP
360.    000000 1  1
361.    000000 1  1     ! SPOOL^WBLK CODE
362.    000000 1  1
363.    000000 1  1     FILE^NO:=BLOCK.MSG;
364.    000003 1  1
365.    000003 1  1     IF FILE^NO>=0 THEN
366.    000006 1  1       BEGIN  ! ACTUALLY DO THE I/O
367.    000006 1  2       CALL SPOOL^CHECKMSG(MSG^BLOCK, BLOCK, $LEN(BLOCK));
368.    000015 1  2       CALL WRITE (FILE^NO,BLOCK,$LEN(BLOCK));
369.    000025 1  2       IF <> THEN
370.    000026 1  2         BEGIN
371.    000026 1  3         CALL FILEINFO(FILE^NO, ERROR);
371.1   000037 1  3         BLOCK.MSG:=FILE^NO;
372.    000041 1  3         RETURN SPERR^COLL^FE+ERROR;
373.    000045 1  3         END;
374.    000045 1  2       END;  ! ACTUALLY DO THE I/O
375.    000045 1  1
376.    000045 1  1     BLOCK.STPAGE:=BLOCK.ENDPAGE;  ! UPDATE PAGE COUNTS
377.    000051 1  1     BLOCK.COUNT:=0;  ! RESET COOUNT
378.    000054 1  1     BLOCK.JOBTIMETOWRITE:=0;  ! RESET EXIT FLAG
379.    000060 1  1
380.    000060 1  1     BLOCK.MSG:=FILE^NO;    ! RESTORE FILE NUMBER
381.    000062 1  1
```

!C08,bmm

```
 382.     000062 1  1      RETURN FEOK;
 383.     000064 1  1      END;  ! PROC SPOOL^WBLK

BLOCK                         Variable,2000  STRUCT-I      Indirect     L-003
ERROR                         Variable       INT           Direct       L+002
FILE^NO                       Variable       INT           Direct       L+001

 385.   000000 0  0   !
 386.   000000 0  0   ! THE FOLLOWING PROCEDURE IS USED TO VALIDATE A PARAMETER USED BY THE
 387.   000000 0  0   ! SPOOLING SYSTEM. 'VAL' IS AN ARRAY CONTAINING THE PARAMETER. 'VAL'
 388.   000000 0  0   ! MUST BY IN BYTE ADDRESSABLE STORAGE AND IT WILL POSSIBLY BE
 389.   000000 0  0   ! MODIFIED BY THIS ROUTINE.
 390.   000000 0  0   ! 'CONTROL' IS AN INTEGER WHICH SPECIFIES THE PARAMETER CHECKING AS
 391.   000000 0  0   ! FOLLOWS:
 392.   000000 0  0   !
 393.   000000 0  0   !   CONTROL.<0>       0 = OPTIONAL PARAMETER
 394.   000000 0  0   !                     1 = REQUIRED PARAMETER
 395.   000000 0  0   !
 396.   000000 0  0   !   CONTROL.<1:6>     PARAMETER LENGTH IN BYTES
 397.   000000 0  0   !                     (THIS IS NOT USED BY SPOOL^CINV)
 398.   000000 0  0   !
 399.   000000 0  0   !   CONTROL.<7:12>    VALIDATION CODE
 400.   000000 0  0   !                  %00 = 16 BIT INTEGER IN RANGE  -32768:32767
 401.   000000 0  0   !                  %01 =                               0:32767
 402.   000000 0  0   !                  %02 =                               1:32767
 403.   000000 0  0   !                  %03 =                              -1:32767
 404.   000000 0  0   !                  %04 =                               1:1
 405.   000000 0  0   !                  %05 =                               0:7
 406.   000000 0  0   !                  %06 =                               0:15
 407.   000000 0  0   !                  %07 =                               1:199
 408.   000000 0  0   !                  %10 =                               2:32767
 409.   000000 0  0   !                  %11 =                      .        0:2              C11 E3
 410.   000000 0  0   !                  %12 =
 411.   000000 0  0   !                  %13 =
 412.   000000 0  0   !                  %14 = ALPHANUM/1ST CHARACTER ALPHA - FORM NAME
 413.   000000 0  0   !                  %15 = ALPHANUM/1ST CHARACTER ALPHA/SPACES OK - REPORT NAME
 414.   000000 0  0   !                  %16 = $ALPHANUM/1S1 CHAR AFTER $ ALPHA - PROCESS NAME
 415.   000000 0  0   !                  %17 =
 416.   000000 0  0   !                  %20 =
 417.   000000 0  0   !                  %21 =
 418.   000000 0  0   !                  %22 = GROUP NAME, LOC NAME, OR FULL LOCATION NAME        C02
 419.   000000 0  0   !                  %23 = LOCAL DISC FILE NAME
 420.   000000 0  0   !                  %24 = LOCAL NAME FOR ANY KIND OF FILE
 421.   000000 0  0   !                  %25 =
 422.   000000 0  0   !                  %26 =
 423.   000000 0  0   !                  %27 = LOCAL OR NETWORK NAME FOR ANY KIND OF FILE
 424.   000000 0  0   !                  %30 =
 425.   000000 0  0   !
 426.   000000 0  0   !   CONTROL.<13:15> DEFAULT VALUE
 427.   000000 0  0   !                  0 = 0
 428.   000000 0  0   !                  1 = -1
 429.   000000 0  0   !                  2 = BLANK
 430.   000000 0  0   !
 431.   000000 0  0   INT PROC
 432.   000000 0  0   SPOOL^CINV(VAL, CONTROL);
 433.   000000 1  0   INT
 434.   000000 1  0     .VAL,      ! PARAMETER VALUE
```

```
000000 1 0    CONTROL;     ! VALIDATION CONTROL
000000 1 0
000000 1 0    BEGIN
000000 1 1
000000 1 1    DEFINE
000000 1 1      VAL^REQUIRED=CONTROL.<0>#,
000000 1 1      VAL^LEN=CONTROL.<1:6>#,
000000 1 1      VAL^VALID=CONTROL.<7:12>#,
000000 1 1      VAL^DEFAULT=CONTROL.<13:15>#;
000000 1 1    INT
000000 1 1      J,
000000 1 1      NOTFOUND,
000000 1 1      TYPE,
000000 1 1      HOLD^LEN,
000000 1 1      ERROR;
000000 1 1    STRING
000000 1 1      .S^VAL:=@VAL'<<'1;
000000 1 1
000000 1 1    !
000000 1 1    ! THIS SUBPROC UPSHIFTS 'BUF' WHICH IS 'LEN' LONG
000000 1 1    !
000000 1 1    SUBPROC
000000 1 1    UPSHIFT(BUF, LEN);
000000 2 1    STRING
000000 2 1      .BUF;      ! ARRAY TO BE UPSHIFTED
000000 2 1    INT
000000 2 1      LEN;      ! NUMBER OF CHARACTERS TO UPSHIFT
000000 2 1
000000 2 1      BEGIN
000000 2 2
000000 2 2      ! UPSHIFT CODE
000000 2 2
000000 2 2      USE I;
000000 2 2
000000 2 2      FOR I:=0 TO LEN-1 DO
000004 2 2        IF $ALPHA(BUF[I]) THEN
000007 2 2          BUF[I]:=BUF[I] LAND %337;
000013 2 2
000013 2 2      DROP I;
000013 2 2
000013 2 2      END;  ! SUBPROC UPSHIFT

BUF                       Variable      STRING        Indirect       S-002
LEN                       Variable      INT           Direct         S-001

000014 1 1    !
000014 1 1    ! MAKES SURE THAT THE STRING 'BUF' WHICH IS 'LEN' LONG
000014 1 1    ! CONTAINS AN ALPHA FOLLOWED BY ALPHA-NUMERICS FOLLOWED
000014 1 1    ! BY SPACES. IF NOT THEN RETURN SPERR^CONTENT.
000014 1 1    !
000014 1 1    INT SUBPROC
000014 1 1    LEGALNAME(BUF, LEN);
000014 2 1    STRING
000014 2 1      .BUF;      ! BUFFER TO BE CHECKED
000014 2 1    INT
000014 2 1      LEN;      ! NUMBER OF BYTES TO CHECK
000014 2 1
```

```
000014 2  1        BEGIN
000014 2  2
000014 2  2        ! LEGALNAME CODE
000014 2  2
000014 2  2        USE I;
000014 2  2        IF NOT $ALPHA(BUF) THEN
000017 2  2          RETURN SPERR^CONTENT;
000022 2  2        I:=LEN-1;
000025 2  2        WHILE BUF[I]=" " DO
000030 2  2          I:=I-1;
000032 2  2        WHILE I>0 DO
000035 2  2          BEGIN                                                          !C13,AT #1
000035 2  3          IF $SPECIAL(BUF[I]) THEN
000040 2  3            RETURN SPERR^CONTENT;
000043 2  3          I:=I-1;
000044 2  3          END;
000045 2  2
000045 2  2        DROP I;
000045 2  2        RETURN SPERR^OK;
000047 2  2        END;  ! SUBPROC LEGALNAME

BUF                    Variable      STRING        Indirect      S-002
LEN                    Variable      INT           Direct        S-001

000047 1  1      !
000047 1  1      ! CHECK IF 'BUF' FOR 'LEN' CONSISTS OF NUMERIC CHARACTERS FOLLOWED
000047 1  1      ! BY SPACES. IF NOT RETURN SPERR^CONTENT.
000047 1  1      !
000047 1  1      INT SUBPROC
000047 1  1      LEGALNUMBER(BUF, LEN);
000047 2  1      STRING
000047 2  1        .BUF;     ! CHARACTERS TO BE CHECKED
000047 2  1      INT
000047 2  1        LEN;     ! NUMBER OF BYTES TO CHECK
000047 2  1
000047 2  1        BEGIN
000047 2  2
000047 2  2        ! LEGALNUMBER CODE
000047 2  2
000047 2  2        USE I;
000047 2  2        IF NOT $NUMERIC(BUF) THEN
000052 2  2          RETURN SPERR^CONTENT;
000055 2  2        I:=LEN-1;
000060 2  2        WHILE BUF[I]=" " DO
000063 2  2          I:=I-1;
000065 2  2        WHILE I>0 DO
000070 2  2          BEGIN                                                          !C13,AT #1
000070 2  3          IF NOT $NUMERIC(BUF[I]) THEN
000073 2  3            RETURN SPERR^CONTENT;
000076 2  3          I:=I-1;
000077 2  3          END;
000100 2  2
000100 2  2        DROP I;
000100 2  2        RETURN SPERR^OK;
000102 2  2        END;  ! SUBPROC LEGALNUMBER
```

```
BUF                    Variable       STRING         Indirect       S-002
LEN                    Variable       INT            Direct         S-001

000102 1  1     !
000102 1  1     !  CHECKS TO SEE THAT 'BUF' FOR 'LEN' IS ALL SPACES.
000102 1  1     !  RETURNS SPERR^CONTENT IF NOT.
000102 1  1     !
000102 1  1     INT SUBPROC
000102 1  1     LEGALBLANK(BUF, LEN);
000102 2  1     STRING
000102 2  1       .BUF;     ! STRING TO CHECK
000102 2  1     INT
000102 2  1       LEN;     ! NUMBER OF BYTES TO CHECK
000102 2  1
000102 2  1       BEGIN
000102 2  2
000102 2  2       ! LEGALBLANK CODE
000102 2  2
000102 2  2       USE I;
000102 2  2       I:=LEN-1;
000105 2  2       WHILE I>=0 DO
000110 2  2         BEGIN
000110 2  3         IF BUF[I]<>" " THEN
000113 2  3           RETURN SPERR^CONTENT;
000116 2  3         I:=I-1;
000117 2  3         END;
000120 2  2
000120 2  2       DROP I;
000120 2  2       RETURN SPERR^OK;
000122 2  2       END;  ! SUBPROC LEGALBLANK

BUF                    Variable       STRING         Indirect       S-002
LEN                    Variable       INT            Direct         S-001

000122 1  1     !
000122 1  1     ! THIS ROUTINE CHECKS 'VAL^REQUIRED' IF IT IS TRUE THEN SPERR^CONTENT
000122 1  1     ! IS RETURNED. IF 'VAL^REQUIRED' IS FALSE THEN 'S^VAL' IS CHECKED TO SEE
000122 1  1     ! IF IT CONFORMS TO THE TYPE OF DEFAULT SPECIFIED BY 'VAL^DEFAULT':
000122 1  1     !
000122 1  1     !      0  -  DEFAULT IS 'DEFAULT^LEN' %000
000122 1  1     !      1  -  DEFAULT IS 'DEFAULT^LEN' %377
000122 1  1     !      2  -  DEFAULT IS 'DEFAULT^LEN' %040 (BLANK)
000122 1  1     !
000122 1  1     ! IF THE DEFAULT IS PROPER THEN SPERR^OK IS RETURNED ELSE SPERR^CONTENT IS
000122 1  1     ! RETURNED.
000122 1  1     !
000122 1  1     INT SUBPROC
000122 1  1     LEGALDEFAULT(DEFAULT^LEN);
000122 2  1     INT
000122 2  1       DEFAULT^LEN;     ! NUMBER OF BYTES IN DEFAULT
000122 2  1
000122 2  1       BEGIN
000122 2  2
000122 2  2       STRING
000122 2  2         CHAR='P':=[ %000, %377, %040 ];
000124 2  2
000124 2  2       ! LEGALDEFAULT CODE
```

```
000124 2  2
000124 2  2        USE I;
000124 2  2        IF VAL^REQUIRED THEN
000127 2  2          RETURN SPERR^CONTENT;
000132 2  2        I:=DEFAULT^LEN-1;
000135 2  2        WHILE I>=0 DO
000140 2  2          BEGIN
000140 2  3          IF S^VAL[I]<>CHAR[VAL^DEFAULT] THEN
000147 2  3             RETURN SPERR^CONTENT;
000152 2  3           I:=I-1;
000153 2  3           END;
000154 2  2
000154 2  2         DROP I;
000154 2  2         RETURN SPERR^OK;
000156 2  2         END;  ! SUBPROC LEGALDEFAULT

CHAR                           Variable      STRING        Direct       P+000
DEFAULT^LEN                    Variable      INT           Direct       S-001

000156 1  1
000156 1  1       ! SPOOL^CINV CODE
000156 1  1
000156 1  1       CASE VAL^VALID OF
000166 1  1         BEGIN
000166 1  2
000166 1  2         BEGIN  ! %00
000166 1 CE0        END;  ! %00
000167 1 CE1
000167 1  2         BEGIN  ! %01
000167 1  3         IF VAL < 0 THEN
000172 1  3           RETURN LEGALDEFAULT(2);
000176 1  3         END;  ! %01
000177 1 CE2
000177 1  2         BEGIN  ! %02
000177 1  3         IF VAL <= 0 THEN
000202 1  3           RETURN LEGALDEFAULT(2);
000206 1  3         END;  ! %02
000207 1 CE3
000207 1  2         BEGIN  ! %03
000207 1  3         IF VAL < -1 THEN
000212 1  3           RETURN LEGALDEFAULT(2);
000216 1  3         END;  ! %03
000217 1 CE4
000217 1  2         BEGIN  ! %04
000217 1  3         IF VAL <> 1 THEN
000222 1  3           RETURN LEGALDEFAULT(2);
000226 1  3         END;  ! %04
000227 1 CE5
000227 1  2         BEGIN  ! %05
000227 1  3         IF VAL < 0 OR VAL > 7 THEN
000235 1  3           RETURN LEGALDEFAULT(2);
000241 1  3         END;  ! %05
000242 1 CE6
000242 1  2         BEGIN  ! %06
000242 1  3         IF VAL < 0 OR VAL > 15 THEN
000250 1  3           RETURN LEGALDEFAULT(2);
```

```
000254 1  3        END;  ! %06
000255 1 CE7
000255 1  2        BEGIN  ! %07
000255 1  3        IF VAL < 1 OR VAL > 199 THEN
000263 1  3          RETURN LEGALDEFAULT(2);
000267 1  3        END;  ! %07
000270 1 CEB
000270 1  2        BEGIN  ! %10
000270 1  3        IF VAL < 2 THEN
000273 1  3          RETURN LEGALDEFAULT(2);
000277 1  3        END;  ! %10
000300 1 CE9
000300 1  2        BEGIN  ! %11
000300 1  3        IF VAL <> 1 AND VAL <> 2 THEN                                   !C11 E3
000306 1  3          RETURN LEGALDEFAULT(0);                                       !C11 E3
000312 1  3        END;  ! %11
000313 1 CE10
000313 1  2        BEGIN  ! %12
000313 1  3        RETURN SPERR^CONTENT;
000316 1  3        END;  ! %12
000316 1 CE11
000316 1  2        BEGIN  ! %13
000316 1  3        RETURN SPERR^CONTENT;
000321 1  3        END;  ! %13
000321 1 CE12
000321 1  2        BEGIN  ! %14
000321 1  3        CALL UPSHIFT(S^VAL, 16);
000325 1  3        IF ERROR^IN LEGALNAME(S^VAL, 16) THEN
000333 1  3          RETURN LEGALDEFAULT(16);
000342 1  3        END;  ! %14
000343 1 CE13
000343 1  2        BEGIN  ! %15
000343 1  3        CALL UPSHIFT(S^VAL, 16);
000347 1  3        USE I;
000347 1  3        IF NOT $ALPHA(S^VAL) THEN
000352 1  3          RETURN LEGALDEFAULT(16);
000357 1  3        I:=15;
000360 1  3        WHILE I>=0 DO
000363 1  3          BEGIN
000363 1  4          IF $SPECIAL(S^VAL[I]) AND
000363 1  4              S^VAL[I]<>" " THEN
000374 1  4            RETURN LEGALDEFAULT(16);
000401 1  4          I:=I-1;
000402 1  4          END;
000403 1  3        END;  ! %15
000404 1 CE14
000404 1  2        BEGIN  ! %16
000404 1  3        CALL UPSHIFT(S^VAL, 6);
000411 1  3        IF S^VAL<>"$" OR
000411 1  3            (ERROR^IN LEGALNAME(S^VAL[1], 5)) THEN
000424 1  3          RETURN LEGALDEFAULT(6);
000431 1  3        END;  ! %16
000432 1 CE15
000432 1  2        BEGIN  ! %17
000432 1  3        RETURN SPERR^CONTENT;
000435 1  3        END;  ! %17
000435 1 CE16
```

```
697.     000435 1   2      BEGIN  ! %20
698.     000435 1   3      RETURN SPERR^CONTENT;
699.     000440 1   3      END;  ! %20
700.     000440 1 CE17
701.     000440 1   2      BEGIN  ! %21
702.     000440 1   3      RETURN SPERR^CONTENT;
703.     000443 1   3      END;  ! %21
704.     000443 1 CE18
705.     000443 1   2      BEGIN  ! %22
706.     000443 1   3      CALL UPSHIFT(S^VAL, 16);
706.1    000450 1   3      IF (ERROR^IN LEGALBLANK(S^VAL[0], 8)) OR
706.11   000450 1   3         (ERROR^IN LEGALNAME(S^VAL[8], 8)) THEN                  !C02
706.2    000467 1   3        BEGIN                                                    !C02
707.     000467 1   4        IF S^VAL<>"#" THEN                                       !C02
708.     000472 1   4          RETURN LEGALDEFAULT(16);                               !C02
709.     000500 1   4        IF ERROR^IN LEGALNAME( S^VAL[1], 7) THEN                 !C02
710.     000510 1   4          RETURN LEGALDEFAULT(16);                               !C02
711.     000515 1   4        IF (ERROR^IN LEGALNAME( S^VAL[8], 8)) AND                !C02
712.     000515 1   4           (ERROR^IN LEGALBLANK(S^VAL[8], 8)) THEN               !C02
713.     000535 1   4          RETURN LEGALDEFAULT(16);                               !C02
713.1    000542 1   4        END;                                                     !C02
714.     000542 1   3      END;  ! %22                                                !C02
715.     000543 1 CE19
716.     000543 1   2      BEGIN  ! %23
717.     000543 1   3      CALL UPSHIFT(S^VAL, 24);
718.     000550 1   3      IF S^VAL<>"$" THEN
719.     000553 1   3        RETURN LEGALDEFAULT(24);
720.     000562 1   3      IF (ERROR^IN LEGALNAME(S^VAL[1], 7)) OR
721.     000562 1   3         (ERROR^IN LEGALNAME(S^VAL[8], 8)) OR
722.     000562 1   3         (ERROR^IN LEGALNAME(S^VAL[16], 8)) THEN
723.     000612 1   3        RETURN LEGALDEFAULT(24);
724.     000620 1   3      END;  ! %23
725.     000621 1 CE20
726.     000621 1   2      BEGIN  ! %24
727.     000621 1   3      CALL UPSHIFT(S^VAL, 24);
728.     000626 1   3      IF S^VAL<>"$" THEN
729.     000631 1   3        RETURN LEGALDEFAULT(24);
730.     000636 1   3      IF ERROR^IN SPOOL^CINV(VAL, %100230) THEN
731.     000646 1   3        IF (ERROR^IN LEGALNUMBER(S^VAL[1], 7)) OR
732.     000646 1   3           (ERROR^IN LEGALBLANK(S^VAL[8], 16)) THEN
733.     000666 1   3          IF (ERROR^IN LEGALNAME(S^VAL[1], 7)) OR
734.     000666 1   3             (ERROR^IN LEGALBLANK(S^VAL[8], 16)) THEN
735.     000706 1   3            IF (ERROR^IN LEGALNAME(S^VAL[1], 7)) OR
736.     000706 1   3               S^VAL[8]<>"#" OR
737.     000706 1   3               (ERROR^IN LEGALNAME(S^VAL[9], 7)) OR
738.     000706 1   3               (ERROR^IN LEGALBLANK(S^VAL[16], 8)) THEN
739.     000742 1   3              IF (ERROR^IN LEGALNAME(S^VAL[1], 7)) OR
740.     000742 1   3                 S^VAL[8]<>"#" OR
741.     000742 1   3                 (ERROR^IN LEGALNAME(S^VAL[9], 7)) OR
742.     000742 1   3                 (ERROR^IN LEGALNAME(S^VAL[16], 8)) THEN
743.     000776 1   3                RETURN LEGALDEFAULT(24);
744.     001006 1   3      END;  ! %24
745.     001007 1 CE21
746.     001007 1   2      BEGIN  ! %25
747.     001007 1   3      ERROR := SPERR^CONTENT;
748.     001012 1   3      END;  ! %255
```

```
001013 1 CE22
001013 1  2     BEGIN  ! %26
001013 1  3     ERROR := SPERR^CONTENT;
001016 1  3     END;  ! %26
001017 1 CE23
001017 1  2     BEGIN  ! %27
001017 1  3     IF ERROR^IN SPOOL^CINV(VAL[4], %100240) THEN
001032 1  3       RETURN LEGALDEFAULT(32)
001032 1  3     ELSE
001040 1  3       BEGIN  ! CHECK THE SYSTEM NAME PORTION

001040 1  4       CALL UPSHIFT(S^VAL, 8);
001045 1  4       IF S^VAL<>"        " AND
001045 1  4          (S^VAL<>"\" OR
001045 1  4           (ERROR^IN LEGALNAME(S^VAL[1], 7))) THEN
001070 1  4         RETURN SPERR^CONTENT;
001076 1  4       END;  ! CHECK THE SYSTEM NAME PORTION
001076 1  3     END;  ! %27
001077 1 CE24
001077 1  2     BEGIN  ! %30
001077 1  3     RETURN SPERR^CONTENT;
001102 1  3     END;  ! %30
001102 1 CE25
001102 1  2     OTHERWISE
001102 1  2       BEGIN
001102 1  3       RETURN LEGALDEFAULT(2);
001107 1  3       END;
001107 1  2
001107 1  2     END;  ! CASE
001150 1  1
001150 1  1   RETURN SPERR^OK;
001152 1  1   END;  ! PROC SPOOL^CINV
```

| | | | | |
|---|---|---|---|---|
| CONTROL | Variable | INT | Direct | L-003 |
| ERROR | Variable | INT | Direct | L+005 |
| HOLD^LEN | Variable | INT | Direct | L+004 |
| I | Variable | INT | Direct | X 007 |
| J | Variable | INT | Direct | L+001 |
| LEGALBLANK | Subproc | INT | %000102 | |
| LEGALDEFAULT | Subproc | INT | %000124 | |
| LEGALNAME | Subproc | INT | %000014 | |
| LEGALNUMBER | Subproc | INT | %000047 | |
| NOTFOUND | Variable | INT | Direct | L+002 |
| S^VAL | Variable | STRING | Indirect | L+006 |
| TYPE | Variable | INT | Direct | L+003 |
| UPSHIFT | Subproc | | %000000 | |
| VAL | Variable | INT | Indirect | L-004 |
| VAL^DEFAULT | Define | | CONTROL.<13:15> | |
| VAL^LEN | Define | | CONTROL.<1:6> | |
| VAL^REQUIRED | Define | | CONTROL.<0> | |
| VAL^VALID | Define | | CONTROL.<7:12> | |

```
781.     000000 0  0   INT PROC
782.     000000 0  0   SPOOLSTART(FILE, BLKBUF, LOCATION, FORM,
783.     000000 1  0              REPORT, COPIES, PAGESIZE, FLAGS, OWNER,            !B30,MBB============= #XXX
783.1    000000 1  0              FILENAME, EXTENT ) EXTENSIBLE(8);                  !B30,MBB============= #XXX
783.2    000000 1  0   INT                                                            !B30,MBB============= #XXX
785.     000000 1  0     FILE,     ! FILE TO SPOOL COLLECTOR PROCESS
786.     000000 1  0     .BLKBUF,     ! BLOCKING BUFFER
787.     000000 1  0     .LOCATION,     ! LOCATION FOR SPOOLED DATA
788.     000000 1  0     .FORM,     ! FORM NAME
789.     000000 1  0     .REPORT,     ! REPORT NAME
790.     000000 1  0     COPIES,      ! NUMBER OF COPIES
791.     000000 1  0     PAGESIZE,     ! PAGE SIZE
792.     000000 1  0     FLAGS,     ! FLAGS WORD                                      C12 E3
792.1    000000 1  0     OWNER,     ! JOB OWNER                                       B30,MBB============= #XXX
792.2    000000 1  0     .FILENAME,   ! OPTIONAL, NAME OF FILE TO CREATE/OPEN       B30,MBB============= #XXX
792.3    000000 1  0     EXTENT;      ! OPTIONAL, EXTENT SIZE OF FILE IF CREATED    B30,MBB============= #XXX
792.4    000000 1  0                                                                  !B30,MBB============= #XXX
794.     000000 1  0     BEGIN
795.     000000 1  1
796.     000000 1  1     STRUCT
797.     000000 1  1       .STARTMESS(APSTART);              !STARTUP MESSAGE FORMAT
798.     000000 1  1     INT
799.     000000 1  1       ERROR,
800.     000000 1  1       COUNT,
800.1    000000 1  1       MSG^LEN,                                                   !B30,MBB============= #XXX
800.2    000000 1  1      .BLOCK(APBLOCK)=BLKBUF,                                     !B30,MBB============= #XXX
801.1    000000 1  1      .DJOB(DJOB^HEADER)=BLKBUF,                                  !B30,MBB============= #XXX
801.3    000000 1  1      .MSG^PTR,                                                   !B30,MBB============= #XXX
801.5    000000 1  1       DEVTYPE,                                                   !B30,MBB============= #XXX
801.6    000000 1  1       FILECODE;                                                  !B30,MBB============= #XXX
802.     000000 1  1     STRING
803.     000000 1  1       .S^POINT;     ! POINTER TO PARAMETER
804.     000000 1  1
805.     000000 1  1     ! SPOOLSTART CODE
806.     000000 1  1
807.     000000 1  1     ! CHECK PARAMETERS FOR CORRECTNESS
808.     000000 1  1     IF $PARAM(FLAGS) AND
809.     000007 1  1        FLAGS<>-1 AND
810.     000007 1  1        (JOBBAD OR
811.     000007 1  1         JOBIGNOREFIRSTTOF OR
812.     000007 1  1          JOBUSERBLOCKING OR
813.     000007 1  1        JOBCANCEL) THEN
814.     000031 1  1       RETURN SPERR^CONTENT;
815.     000034 1  1
815.01   000034 1  1     IF $PARAM(FILENAME) THEN                                     !B30,MBB============= #XXX
815.02   000037 1  1       BEGIN    ! CREATE/OPEN FILE FIRST                          B30,MBB============= #XXX
815.03   000037 1  2       IF NOT $PARAM(EXTENT) OR NOT EXTENT THEN EXTENT := DJOB^EXTENT;   !B30,MBB============= #XXX
815.04   000046 1  2       CALL CREATE(FILENAME, EXTENT, DJOB^FILECODE);             !B30,MBB============= #XXX
815.1    000057 1  2       ! IGNORE ERRORS IN CASE NOT A DISC OR FILE ALREADY EXISTS   B30,MBB============= #XXX
815.4    000057 1  2       CALL OPEN(FILENAME, FILE, %000000, 1);  ! READ/WRITE, SHARED, SYNC 1   B30,MBB============= #XXX
815.41   000067 1  2       IF <> THEN GOTO RETURN^ERROR;  ! GET ERROR AND RETURN IT   B30,MBB============= #XXX
815.6    000071 1  2       END                                                        !B30,MBB============= #XXX
816.     000071 1  1     ELSE IF NOT $PARAM(FILE) THEN                                !B30,MBB============= #XXX
817.     000075 1  1       RETURN SPERR^PARAM;
818.     000077 1  1
819.     000077 1  1     IF $PARAM(FLAGS) AND
820.     000077 1  1        FLAGS<>-1 AND
```

```
000077 1  1      JOBEXITBEFORE AND
000077 1  1      NOT $PARAM(BLKBUF) THEN
000113 1  1     RETURN SPERR^PARAM;
000115 1  1
000115 1  1   ! BUILD STARTUP MESSAGE FOR SUPERVISOR
000115 1  1
000115 1  1   IF $PARAM(LOCATION) THEN
000120 1  1     BEGIN
000120 1  2     STARTMESS.DEST ':=' LOCATION FOR WLEN^LOCNAME;
000125 1  2     IF ERROR^IN SPOOL^CINV(STARTMESS.DEST, %020222) THEN
000134 1  2       RETURN SPERR^CONTENT;
000137 1  2     END
000137 1  1   ELSE
000140 1  1     BLANKFILL(STARTMESS.DEST, WLEN^LOCNAME);
000152 1  1
000152 1  1   IF $PARAM(FORM) THEN
000155 1  1     BEGIN
000155 1  2     STARTMESS.FORM ':=' FORM FOR WLEN^FORMNAME;
000162 1  2     IF ERROR^IN SPOOL^CINV(STARTMESS.FORM, %020142) THEN
000171 1  2       RETURN SPERR^CONTENT;
000175 1  2     END
000175 1  1   ELSE
000176 1  1     BLANKFILL(STARTMESS.FORM, WLEN^FORMNAME);
000210 1  1
000210 1  1   IF $PARAM(REPORT) THEN
000213 1  1     BEGIN
000213 1  2     STARTMESS.REPORT ':=' REPORT FOR WLEN^REPORTNAME;
000220 1  2     IF ERROR^IN SPOOL^CINV(STARTMESS.REPORT, %020152) THEN
000227 1  2       RETURN SPERR^CONTENT;
000233 1  2     END
000233 1  1   ELSE
000234 1  1     BLANKFILL(STARTMESS.REPORT, WLEN^REPORTNAME);
000246 1  1
000246 1  1   IF $PARAM(COPIES) AND
000246 1  1      COPIES<>-1 THEN
000254 1  1     BEGIN
000254 1  2     STARTMESS.NOCOPIES:=COPIES;
000257 1  2     IF ERROR^IN SPOOL^CINV(STARTMESS.NOCOPIES, %102020) THEN
000266 1  2       RETURN SPERR^CONTENT;
000274 1  2     END
000274 1  1   ELSE
000275 1  1     STARTMESS.NOCOPIES:=JOB^DEFAULTCOPIES;  ! DEFAULT
000300 1  1
000300 1  1   IF $PARAM(PAGESIZE) AND
000300 1  1      PAGESIZE<>-1 THEN
000306 1  1     BEGIN
000306 1  2     STARTMESS.PAGE:=PAGESIZE;
000311 1  2     IF ERROR^IN SPOOL^CINV(STARTMESS.PAGE, %102020) THEN
000320 1  2       RETURN SPERR^CONTENT;
000323 1  2     END
000323 1  1   ELSE
000324 1  1     STARTMESS.PAGE:=JOB^DEFAULTPAGESIZE;  ! DEFAULT
000327 1  1
000327 1  1   IF $PARAM(FLAGS) AND
000327 1  1      FLAGS<>-1 THEN
000335 1  1     STARTMESS.FLAGS:=FLAGS
000335 1  1   ELSE
```

```
000341 1  1      STARTMESS.FLAGS:=JOB^DEFAULTFLAGS;   ! DEFAULT                    !C12 E3
000344 1  1                                                                        !C12 E3
000344 1  1    IF $PARAM( OWNER ) THEN                                             !B30,MBB============= #XXX
000347 1  1      BEGIN                                                             !B30,MBB============= #XXX
000347 1  2      STARTMESS.OWNER := OWNER;                                         !B30,MBB============= #XXX
000352 1  2      MSG^LEN := $LEN(STARTMESS);                                       !B30,MBB============= #XXX
000354 1  2      END                                                               !B30,MBB============= #XXX
000354 1  1    ELSE                          ! leave OWNER out of message !        !C12 E3
000355 1  1      MSG^LEN := $LEN(STARTMESS) - 2;                                   !C12 E3
000357 1  1
000357 1  1    STARTMESS.JOBUSERBLOCKING:=IF $PARAM(BLKBUF) THEN
000357 1  1                                   1
000357 1  1                                 ELSE
000357 1  1                                   0;
000372 1  1
000372 1  1    IF FILE>0 THEN
000375 1  1      BEGIN                                                             !B30,MBB============= #XXX
000375 1  2      CALL FILEINFO(FILE, , , , DEVTYPE, , , , , FILECODE);             !B30,MBB============= #XXX
000414 1  2      IF <> THEN GOTO RETURN^ERROR;                                     !B30,MBB============= #XXX
000416 1  2      IF DEVTYPE.<4:9> = 3 THEN                                         !B30,MBB============= #XXX
000423 1  2        BEGIN   ! SPOOL TO DISC JOB                                      B30,MBB============= #XXX
000423 1  3        IF FILECODE <> DJOB^FILECODE THEN RETURN SPERR^MISMATCH;        !B30,MBB============= #XXX
000431 1  3        CALL CONTROL (FILE, 20);        ! PURGEDATA                      B30,MBB============= #XXX
000440 1  3        IF <> THEN GOTO RETURN^ERROR;                                   !B30,MBB============= #XXX
000442 1  3        CALL SETMODE (FILE, 90, 0);  ! BUFFERED CACHE                    B30,MBB============= #XXX
000451 1  3        CALL SETMODE (FILE, 91, 3);  ! SEQUENTIAL I/O ACCESS             B30,MBB============= #XXX
000460 1  3        CALL SETMODE (FILE, 92, DJOB^MAXEXTENTS);  ! SET DP2 MAXEXTENTS  B30,MBB============= #XXX
000467 1  3        CALL SETMODE (FILE, 93, DJOB^BUFFSIZE);  ! DP2 CACHE SIZE = 4K BLOCKS   B30,MBB============= #XXX
000476 1  3        ! IGNORE ERRORS ON ALL ABOVE CALLS IN CASE USING A DP1 DISC      B30,MBB============= #XXX
000476 1  3        BLKBUF := 0;        ! ZERO THE BLK BUFFER                        B30,MBB============= #XXX
000500 1  3        BLKBUF[1] ':=' BLKBUF FOR BLOCK^SIZE-1;                         !B30,MBB============= #XXX
000505 1  3        DJOB.VERSION := DJOB^VERSION;                                   !B30,MBB============= #XXX
000507 1  3          ! THE FOLLOWING FIELDS ARE LEFT ZERO:                          B30,MBB============= #XXX
000507 1  3          !    CONTROL, DEVFLAGS, DEVPARM, DEVWIDTH                      B30,MBB============= #XXX
000507 1  3          ! MSG AND CHECK WILL BE FILLED IN DURING SPOOL^CHECKMSG        B30,MBB============= #XXX
000507 1  3        BLANKFILL(DJOB.DEVICE, WLEN^DEVICENAME);                        !B30,MBB============= #XXX
000521 1  3        BLANKFILL(DJOB.DATAFILENAME, WLEN^FILENAME);                    !B30,MBB============= #XXX
000533 1  3        DJOB.SYNC := MSG^BLOCK;     ! PUT IN SPOOLED BLOCKS BY SPOOL^WBLK   B30,MBB============= #XXX
000536 1  3        DJOB.BLOCK := BLOCK^SIZE '*' 2;     ! WHERE FIRST DATA BLOCK IS  B30,MBB============= #XXX
000543 1  3        DJOB.JOB := DJOB^NUM;                                           !B30,MBB============= #XXX
000546 1  3        DJOB.DEST ':=' STARTMESS.DEST FOR WLEN^LOCNAME;                 !B30,MBB============= #XXX
000554 1  3        DJOB.FORM ':=' STARTMESS.FORM FOR WLEN^FORMNAME;                !B30,MBB============= #XXX
000562 1  3        DJOB.REPORT ':=' STARTMESS.REPORT FOR WLEN^REPORTNAME;          !B30,MBB============= #XXX
000570 1  3        DJOB.NOCOPIES := STARTMESS.NOCOPIES;                            !B30,MBB============= #XXX
000576 1  3        DJOB.PAGE := STARTMESS.PAGE;                                    !B30,MBB============= #XXX
000602 1  3        DJOB.OWNER := (IF $PARAM(OWNER) THEN STARTMESS.OWNER            !B30,MBB============= #XXX
000602 1  3                                        ELSE CREATORACCESSID);          !B30,MBB============= #XXX
000615 1  3        DJOB.PAGES := DJOB.UNITSALLOCATED := DJOB.TOTLINES := -1; ! JOB IS OPEN   B30,MBB============= #XXX
000626 1  3        DJOB.UNITSIZE := DJOB^UNITSIZE;                                 !B30,MBB============= #XXX
000631 1  3        CALL SPOOL^CHECKMSG(MSG^PRINT^CONTROL, DJOB.MSG, $LEN(PPCONTROL));   !B30,MBB============= #XXX
000641 1  3        DJOB.CLOSETIME ':=' [3*[-1]];    ! JOB IS OPEN                   B30,MBB============= #XXX
000650 1  3        CALL TIMESTAMP(DJOB.OPENTIME);                                  !B30,MBB============= #XXX
000654 1  3        ! POINT TO THE MESSAGE                                           B30,MBB============= #XXX
000654 1  3        @MSG^PTR := @BLKBUF;                                            !B30,MBB============= #XXX
000656 1  3        MSG^LEN := BLOCK^SIZE*2;                                        !B30,MBB============= #XXX
000660 1  3        END                                                             !B30,MBB============= #XXX
000660 1  2      ELSE                                                              !B30,MBB============= #XXX
```

```
885.39   000662 1  2        BEGIN   ! SPOOL TO COLLECTOR PROCESS                              B30,MBB============= #XXX
885.4    000662 1  3        CALL SPOOL^CHECKMSG(MSG^START, STARTMESS, MSG^LEN);              !B30,MBB============= #XXX
885.41   000671 1  3        @MSG^PTR := @STARTMESS;                                          !B30,MBB============= #XXX
885.42   000673 1  3        END;                                                             !B30,MBB============= #XXX
885.43   000673 1  2      CALL WRITE(FILE, MSG^PTR, MSG^LEN);                                !B30,MBB============= #XXX
887.     000703 1  2      IF <> THEN                                                         !B30,MBB============= #XXX
889.     000704 1  2        BEGIN
889.1    000704 1  3     RETURN^ERROR:                                                       !B30,MBB============= #XXX
890.     000704 1  3        CALL FILEINFO(FILE, ERROR);
891.     000715 1  3        RETURN SPERR^COLL^FE+ERROR;
892.     000721 1  3        END;
893.     000721 1  2      END;
894.     000721 1  1
895.     000721 1  1    IF $PARAM(BLKBUF) THEN
896.     000724 1  1      BEGIN  ! FORMAT BLOCKING BUFFER
897.     000724 1  2      BLOCK.PAGESIZE:=STARTMESS.PAGE;
898.     000730 1  2      BLOCK.NOLINES:=0;
899.     000733 1  2      BLOCK.STPAGE:=0;
900.     000736 1  2      BLOCK.ENDPAGE:=0;
901.     000741 1  2      BLOCK.FLAGS:=STARTMESS.FLAGS;
902.     000745 1  2      BLOCK.ENDLINE:=0;
903.     000750 1  2      BLOCK.COUNT:=0;
904.     000753 1  2      BLOCK.MSG:=FILE;
904.1    000755 1  2      BLOCK.JOB:=DJOB^NUM;     ! IN CASE THIS IS A DISC JOB             B30,MBB============= #XXX
905.     000760 1  2      END;  ! FORMAT BLOCKING BUFFER
906.     000760 1  1
907.     000760 1  1    IF FILE<0 THEN
908.     000763 1  1      RETURN SPERR^INVALID^FILE
909.     000763 1  1    ELSE
910.     000767 1  1      RETURN FEOK;
911.     000771 1  1    END;  ! PROC SPOOLSTART

BLKBUF                     Variable        INT          Indirect     L-016
BLOCK                      Variable,2000   STRUCT-I     Indirect     L-016
COPIES                     Variable        INT          Direct       L-012
COUNT                      Variable        INT          Direct       L+003
DEVTYPE                    Variable        INT          Direct       L+006
DJOB                       Variable,220    STRUCT-I     Indirect     L-016
ERROR                      Variable        INT          Direct       L+002
EXTENT                     Variable        INT          Direct       L-005
FILE                       Variable        INT          Direct       L-017
FILECODE                   Variable        INT          Direct       L+007
FILENAME                   Variable        INT          Indirect     L-006
FLAGS                      Variable        INT          Direct       L-010
FORM                       Variable        INT          Indirect     L-014
LOCATION                   Variable        INT          Indirect     L-015
MSG^LEN                    Variable        INT          Direct       L+004
MSG^PTR                    Variable        INT          Indirect     L+005
OWNER                      Variable        INT          Direct       L-007
PAGESIZE                   Variable        INT          Direct       L-011
REPORT                     Variable        INT          Indirect     L-013
RETURN^ERROR               Label                        %000704
STARTMESS                  Variable,74     STRUCT       Indirect     L+001
S^POINT                    Variable        STRING       Indirect     L+010
```

```
000000 0  0   INT PROC SPOOLWRITE (P^BUFFER,P^LINE,P^COUNT,P^WRITTEN)
000000 1  0                       VARIABLE;
000000 1  0     INT
000000 1  0       .P^BUFFER,                          !BLOCKING BUFFER
000000 1  0       .P^LINE,                            !DATA LINE
000000 1  0       P^COUNT,                            !NUMBER OF BYTES IN LINE
000000 1  0       .P^WRITTEN;                         !NUMBER OF BYTES IN BUFFER
000000 1  0
000000 1  0
000000 1  0
000000 1  0     BEGIN
000000 1  1
000000 1  1       INT .WORK^BUF [0:(BLOCK^SIZE+10)], !WORKING BUFFER
000000 1  1           .NEXT^WORD := @WORK^BUF,          !POINTER TO WORK^BUF
000000 1  1           DATA^LEN := 0;                    !WORD COUNT OF DATA
000000 1  1
000000 1  1
000000 1  1                                             !ALLOCATE MESSAGE BUFFERS
000000 1  1       INT .BLOCK (APBLOCK)=P^BUFFER;        !USERS BUFFER FORMAT
000000 1  1       INT .FLAGS := @BLOCK.FLAGS;           !SET UP FLAGS POINTER
000000 1  1       INT .COMP^BUF := @P^LINE;             !IN CASE TEXT COMPRESSION USED      B30,MBB============= #XXX
000000 1  1
000000 1  1       INT LINECOUNT,                        !WORKING LINECOUNT
000000 1  1           PAGE := 0,                         !NEW PAGE FLAG
000000 1  1           MAX^LEN := P^COUNT '>>' 1,                                          !B30,MBB============= #XXX
000000 1  1           ERROR := FEOK;
000000 1  1                                                                               !B30,MBB============= #XXX
000000 1  1       STRING .S^COMP^BUF;                                                     !B30,MBB============= #XXX
000000 1  1                                                                               !B30,MBB============= #XXX
000000 1  1       SUBPROC HEADUP;
000000 2  1         BEGIN
000000 2  2           NEXT^WORD := -1;                  !INSERT HEAD MARKER
000002 2  2           @NEXT^WORD := @NEXT^WORD [1];
000005 2  2           DATA^LEN := DATA^LEN + 1;
000007 2  2           PAGE := PAGE'+'1;                 !SET PAGE CHANGE FLAG
000012 2  2           LINECOUNT := LINECOUNT'-'BLOCK.PAGESIZE;    !ALTER LINECOUNT
000017 2  2         END;
000020 1  1       INT SUBPROC WRITE^VALID^PARAMS;
000020 2  1         BEGIN
000020 2  2           INT ERROR := FEOK;
000020 2  2                                             !VALIDATE REQUIRED PARAMETERS
000020 2  2           IF NOT $PARAM (P^BUFFER) OR NOT $PARAM(P^LINE) OR NOT $PARAM (P^COUNT)
000022 2  2             THEN ERROR := SPERR^PARAM               !REQUIRED PARAMS MISSING
000033 2  2           ELSE
000036 2  2                                             !VALIDATE COUNT
000036 2  2           IF P^COUNT > (MAX^DATA^LEN - 1)'<<'1 OR P^COUNT < 0
000036 2  2             THEN ERROR := SPERR^COLL^FE+FEBADCOUNT;
000051 2  2
000051 2  2           RETURN ERROR;
000054 2  2         END;                                !SUBPROC VALID^PARAMS

ERROR                     Variable      INT           Direct        S-000

000054 1  1       INT SUBPROC BLOCKFLUSH;
000054 2  1         BEGIN
000054 2  2           INT ERROR := FEOK;
000054 2  2           IF JOBEXITBEFORE                   !EXIT TO CHECKPOINT
```

```
  963.    000056 2  2          AND NOT JOBTIMETOWRITE                   !FLAG NOT SET
  964.    000056 2  2          THEN
  965.    000064 2  2            BEGIN                                  !RETURN END POINTER
  965.1   000064 2  3              IF $PARAM( P^WRITTEN ) THEN
  966.    000067 2  3                 P^WRITTEN := (BLOCK.COUNT + BLOCK^HEAD^LEN)'<<'1;          !C05
  967.    000074 2  3              JOBTIMETOWRITE := 1;               !SET FLAG
  968.    000077 2  3              ERROR := SPERR^WRITE^NEEDED;       !RETURN EOF
  969.    000101 2  3            END
  970.    000101 2  2        ELSE
  971.    000102 2  2          ERROR := SPOOL^WBLK(BLOCK);              !ABLE TO WRITE
  972.    000106 2  2
  973.    000106 2  2        RETURN ERROR;
  974.    000111 2  2      END;
                                                                    !SUBPROC BLOCKFLUSH
ERROR
          Variable       INT              Direct          S-000

  975.    000111 1  1    SUBPROC UPDATE^BLOCK;
  976.    000111 2  1      BEGIN
  977.    000111 2  2
  978.    000111 2  2        IF PAGE THEN
  979.    000113 2  2          BLOCK.ENDPAGE := BLOCK.ENDPAGE'+'PAGE;   !UPDATE PAGE COUNT
  980.    000120 2  2        BLOCK.ENDLINE := LINECOUNT;
  981.    000123 2  2                                                   !UPDATE LINE COUNT
  982.    000123 2  2        @NEXT^WORD := @BLOCK.COUNT'+'BLOCK.COUNT'+'1;!POINT TO BLOCK DATA
  983.    000131 2  2
  984.    000131 2  2        NEXT^WORD ':=' WORK^BUF FOR DATA^LEN;      !MOVE NEW DATA
  985.    000135 2  2
  986.    000135 2  2        BLOCK.COUNT := BLOCK.COUNT + DATA^LEN;     !UPDATE COUNT
  987.    000137 2  2
  988.    000137 2  2    END;
                                                                  !SUBPROC UPDATE^BLOCK

  990.    000140 1  1    IF NOT (ERROR := WRITE^VALID^PARAMS) THEN
  991.    000170 1  1      BEGIN
  992.    000170 1  2
  993.    000170 1  2        LINECOUNT := BLOCK.ENDLINE;            !TEMPORARY LINE COUNT
  994.    000173 1  2        IF BLOCK.ENDPAGE = 0 THEN              !NO CONTROL 1,0 SO UPDATE PAGE
  995.    000177 1  2          BEGIN
  996.    000177 1  3            LINECOUNT := LINECOUNT + BLOCK.PAGESIZE;
  997.    000202 1  3            CALL HEADUP;
  998.    000203 1  3          END;
  999.    000203 1  2
 1000.    000203 1  2        JOBIGNOREFIRSTTOF:=0;  ! DON'T IGNORE THE FIRST TOF ANY MORE
 1000.1   000206 1  2        IF NOT JOBSETMODENOSPACE THEN                                       !C07
 1001.    000211 1  2          LINECOUNT := LINECOUNT + 1;          !ADD 1 TO LINE COUNT          C07
 1002.    000213 1  2        IF LINECOUNT > BLOCK.PAGESIZE OR
 1002.1   000213 1  2           (LINECOUNT = BLOCK.PAGESIZE AND JOBSETMODEPRESPACE) THEN         !C07
 1003.    000230 1  2          CALL HEADUP;
 1004.    000231 1  2
 1005.    000231 1  2                                                !COMPRESS DATA LINE
 1006.    000231 1  2        IF JOBTEXTCOMPRESS THEN                               B30,MBB============= #XXX
 1006.001 000234 1  2          BEGIN   ! TRY TEXT COMPRESSION                     !B30,MBB============= #XXX
 1006.003 000234 1  3          IF (@P^LINE LOR @P^LINE[MAX^LEN]).<0> THEN          B30,MBB============= #XXX
 1006.004 000242 1  3            BEGIN                                            !B30,MBB============= #XXX
 1006.005 000242 1  4            IF MAX^LEN > 256 THEN GOTO OLD^COMPRESS;         !B30,MBB============= #XXX
 1006.01  000250 1  4            @COMP^BUF := @WORK^BUF [256];                    !B30,MBB============= #XXX
 1006.02  000254 1  4            COMP^BUF ':=' P^LINE FOR MAX^LEN + 1;            !B30,MBB============= #XXX
 1006.03  000261 1  4            END;                                             !B30,MBB============= #XXX
                                                                                  !B30,MBB============= #XXX
```

```
1006.04  000261 1  3          @S^COMP^BUF := @COMP^BUF '<<' 1;                                   [illegible]
1006.08  000264 1  3          IF (NEXT^WORD := SPOOL^TEXTCOMPRESS (NEXT^WORD[1], MAX^LEN,          !B30,MBB============ #XXX
1006.1   000264 1  3               S^COMP^BUF, P^COUNT) LOR %40000) < 0 THEN GOTO OLD^COMPRESS;    !B30,MBB============ #XXX
1006.2   000300 1  3          END                                                                  !B30,MBB============ #XXX
1006.3   000300 1  2        ELSE                                                                   !B30,MBB============ #XXX
1006.4   000301 1  2      OLD^COMPRESS:                                                            !B30,MBB============ #XXX
1006.5   000301 1  2          NEXT^WORD := SPOOL^COMPRESS (NEXT^WORD[1],P^LINE,P^COUNT, 0, 0);     !B30,MBB============ #XXX
1007.    000311 1  2        DATA^LEN := DATA^LEN + (NEXT^WORD.<2:15> + 1);                         !B30,MBB============ #XXX
1008.    000315 1  2                                                                               !B30,MBB============ #XXX
1009.    000315 1  2
1010.    000315 1  2        IF DATA^LEN > MAX^DATA^LEN THEN          !BIGGER THAN BUFFER
1011.    000322 1  2          ERROR :=  SPERR^TOOLONG
1012.    000322 1  2        ELSE
1013.    000326 1  2          BEGIN
1014.    000326 1  3            IF DATA^LEN > (MAX^DATA^LEN - BLOCK.COUNT) !NEED TO WRITE
1015.    000326 1  3              THEN
1016.    000336 1  3              IF (ERROR := BLOCKFLUSH) THEN       !WRITE ERROR
1017.    000341 1  3                RETURN ERROR;
1018.    000344 1  3
1019.    000344 1  3            CALL UPDATE^BLOCK;
1020.    000345 1  3            BLOCK.NOLINES := BLOCK.NOLINES'+'1;    !UPDATE LINE TOTAL
1021.    000351 1  3
1022.    000351 1  3            IF $PARAM (P^WRITTEN) THEN
1023.    000354 1  3              P^WRITTEN := (BLOCK.COUNT + BLOCK^HEAD^LEN)'<<'1; !END OF BUFFER
1024.    000361 1  3
1025.    000361 1  3          END;
1026.    000361 1  2      END;
1027.    000361 1  1
1028.    000361 1  1    RETURN ERROR;
1029.    000364 1  1
1030.    000364 1  1  END;                                         !SPOOLWRITE
```

| | | | | |
|---|---|---|---|---|
| BLOCK | Variable,2000 | STRUCT-I | Indirect | L-007 |
| BLOCKFLUSH | Subproc | INT | %000054 | |
| COMP^BUF | Variable | INT | Indirect | L+005 |
| DATA^LEN | Variable | INT | Direct | L+003 |
| ERROR | Variable | INT | Direct | L+011 |
| FLAGS | Variable | INT | Indirect | L+004 |
| HEADUP | Subproc | | %000000 | |
| LINECOUNT | Variable | INT | Direct | L+006 |
| MAX^LEN | Variable | INT | Direct | L+010 |
| NEXT^WORD | Variable | INT | Indirect | L+002 |
| OLD^COMPRESS | Label | | %000301 | |
| PAGE | Variable | INT | Direct | L+007 |
| P^BUFFER | Variable | INT | Indirect | L-007 |
| P^COUNT | Variable | INT | Direct | L-005 |
| P^LINE | Variable | INT | Indirect | L-006 |
| P^WRITTEN | Variable | INT | Indirect | L-004 |
| S^COMP^BUF | Variable | STRING | Indirect | L+012 |
| UPDATE^BLOCK | Subproc | | %000111 | |
| WORK^BUF | Variable | INT | Indirect | L+001 |
| WRITE^VALID^PARAMS | Subproc | INT | %000020 | |

```
000000 0  0   INT PROC SPOOLEND (P^BUFFER,P^FLAGS) VARIABLE;
000000 1  0
000000 1  0     INT
000000 1  0       .P^BUFFER,                              !BLOCKING BUFFER
000000 1  0       P^FLAGS;                                 !FLAGS WORD
000000 1  0
000000 1  0     BEGIN
000000 1  1       INT ERROR := FEOK;                      !ERROR RETURN                            B30,MBB============= #XXX
000000 1  1       INT .MSG^PTR;                                                                   !B30,MBB============= #XXX
000000 1  1       INT MSG^LEN;                                                                    !B30,MBB============= #XXX
000000 1  1       INT DEVTYPE;                                                                    !B30,MBB============= #XXX
000000 1  1                                                                                       !B30,MBB============= #XXX
000000 1  1       INT(32) EOF;                                                                    !B30,MBB============= #XXX
000000 1  1                                                                                       !B30,MBB============= #XXX
000000 1  1       INT .BLOCK (APBLOCK)=P^BUFFER;          !USERS FORMAT
000000 1  1
000000 1  1       INT .FLAGS := @BLOCK.FLAGS;             !FLAGS WORD
000000 1  1
000000 1  1       STRUCT END^MESS (APEND);                !END MESSAGE BUFFER                      B30,MBB============= #XXX
000000 1  1                                                                                       !B30,MBB============= #XXX
000000 1  1       STRUCT DJOB^END;                        !DISCJOB END RECORD                      B30,MBB============= #XXX
000000 1  1        BEGIN                         !THIS IS A PORTION OF PPCONTROL                   B30,MBB============= #XXX
000000 1  2         INT PAGES;                   !# PAGES IN JOB (-1 IF NOT CLOSED YET)            B30,MBB============= #XXX
000000 1  2         INT UNITSIZE;                !UNITSIZE OF COLLECTOR THAT COLLECTED JOB         B30,MBB============= #XXX
000000 1  2         INT UNITSALLOCATED;          !UNITS ALLOCATED FOR JOB (-1 IF NOT CLOSED)       B30,MBB============= #XXX
000000 1  2         INT TOTLINES;                !# LINES IN JOB (-1 IF NOT CLOSED)                B30,MBB============= #XXX
000000 1  2         INT CLOSETIME [0:2];         !TIMESTAMP WHEN JOB CLOSED                        B30,MBB============= #XXX
000000 1  2        END;                                                                           !B30,MBB============= #XXX
000000 1  1                                                                                       !B30,MBB============= #XXX
000000 1  1       SUBPROC FORMAT^END^MESSAGE;
000000 2  1
000000 2  1         BEGIN
000000 2  2           END^MESS.LINES := BLOCK.NOLINES;     !TOTAL LINES SPOOLED
000003 2  2           END^MESS.PAGES := BLOCK.ENDPAGE;     !TOTAL PAGES SPOOLED
000006 2  2           IF $PARAM(P^FLAGS) AND
000006 2  2              P^FLAGS<>-1 THEN
000014 2  2             BEGIN
000014 2  3             END^MESS.FLAGS := P^FLAGS;    ! DISPOSITION
000016 2  3             END^MESS.JOBBAD:=0;
000021 2  3             END
000021 2  2           ELSE
000022 2  2             END^MESS.FLAGS := -1;   ! DEFAULT
000024 2  2           CALL SPOOL^CHECKMSG(MSG^END, END^MESS, $LEN(END^MESS));                       !B30,MBB============= #XXX
000033 2  2           @MSG^PTR := @END^MESS;                                                      !B30,MBB============= #XXX
000035 2  2           MSG^LEN := $LEN(END^MESS);                                                  !B30,MBB============= #XXX
000037 2  2
000037 2  2         END;                                   !FORMAT END MESSAGE
000040 1  1                                                                                       !B30,MBB============= #XXX
000040 1  1       SUBPROC PREPARE^DISCJOB^END;                                                    !B30,MBB============= #XXX
000040 2  1                                                                                       !B30,MBB============= #XXX
000040 2  1         BEGIN                                                                         !B30,MBB============= #XXX
000040 2  2           DJOB^END.PAGES := BLOCK.ENDPAGE;     !TOTAL PAGES SPOOLED                     B30,MBB============= #XXX
000043 2  2           DJOB^END.UNITSIZE := DJOB^UNITSIZE;                                         !B30,MBB============= #XXX
000045 2  2           DJOB^END.UNITSALLOCATED :=                                                  !B30,MBB============= #XXX
000045 2  2             (EOF + $UDBL(DJOB^UNITSIZEBYTES - 1) ) '/' DJOB^UNITSIZEBYTES;            !B30,MBB============= #XXX
000055 2  2           DJOB^END.TOTLINES := BLOCK.NOLINES; !TOTAL LINES SPOOLED                      B30,MBB============= #XXX
000060 2  2           CALL TIMESTAMP(DJOB^END.CLOSETIME);                                         !B30,MBB============= #XXX
```

```
1062.12   000063 2  2        CALL POSITION (BLOCK.MSG, $UDBL($OFFSET(DJOB^HEADER.PAGES)));           !B30,MBB============= #XXX
1062.13   000070 2  2        IF <> THEN                                                              !B30,MBB============= #XXX
1062.14   000071 2  2          GOTO ERROR^EXIT;                                                      !B30,MBB============= #XXX
1062.2    000072 2  2        @MSG^PTR := @DJOB^END;                                                  !B30,MBB============= #XXX
1062.3    000074 2  2        MSG^LEN := $LEN(DJOB^END);                                              !B30,MBB============= #XXX
1062.7    000076 2  2                                                                                !B30,MBB============= #XXX
1062.8    000076 2  2      END;                                  !PREPARE DISCJOB END                 B30,MBB============= #XXX

ERROR^EXIT                   Label                     %177777

1064.     000100 1  1    IF NOT $PARAM (P^BUFFER) THEN
1065.     000112 1  1      ERROR := SPERR^PARAM                    !NO BUFFER PARAM
1066.     000112 1  1    ELSE
1067.     000115 1  1
1068.     000115 1  1      BEGIN                                 !WRITE REMAINING BLOCK
1069.     000115 1  2        IF BLOCK.COUNT <> 0 THEN
1070.     000121 1  2          IF (ERROR := SPOOL^WBLK(BLOCK)) THEN
1071.     000126 1  2            RETURN ERROR;                     !WRITE ERROR
1072.     000130 1  2
1072.01   000130 1  2        CALL FILEINFO(BLOCK.MSG, , , , DEVTYPE, , EOF);                        !B30,MBB============= #XXX
1072.011  000145 1  2        IF ERROR THEN GOTO ERROR^EXIT;                                          !B30,MBB============= #XXX
1072.02   000150 1  2        IF DEVTYPE.<4:9> = 3 THEN                                               !B30,MBB============= #XXX
1072.041  000155 1  2          BEGIN                                                                 !B30,MBB============= #XXX
1072.042  000155 1  3          CALL CONTROL (BLOCK.MSG, 21, 0);   ! DEALLOCATE UNUSED EXTENTS         B30,MBB============= #XXX
1072.043  000164 1  3          IF <> THEN GOTO ERROR^EXIT;                                           !B30,MBB============= #XXX
1072.05   000166 1  3          CALL PREPARE^DISCJOB^END;                                             !B30,MBB============= #XXX
1072.1    000167 1  3          END                                                                   !B30,MBB============= #XXX
1072.3    000167 1  2        ELSE                                                                    !B30,MBB============= #XXX
1073.     000170 1  2          CALL FORMAT^END^MESSAGE;            !FORMAT END MESSAGE                 B30,MBB============= #XXX
1074.     000171 1  2                                              !CONTROL END COMING
1075.     000171 1  2        IF BLOCK.MSG >= 0 THEN                !NO I/O FOR NEGATIVE FILE
1076.     000174 1  2          BEGIN
1078.     000174 1  3          CALL WRITE (BLOCK.MSG,MSG^PTR,MSG^LEN);                               !B30,MBB============= #XXX
1079.     000204 1  3          IF <> THEN
1080.     000205 1  3            BEGIN
1080.1    000205 1  4        ERROR^EXIT:                                                             !B30,MBB============= #XXX
1081.     000210 1  4            CALL FILEINFO(BLOCK.MSG, ERROR);
1082.     000221 1  4            RETURN SPERR^COLL^FE LOR ERROR;                                     !B30,MBB============= #XXX
1083.     000224 1  4            END;
1084.     000224 1  3          END;
1085.     000224 1  2
1086.     000224 1  2      END;
1087.     000224 1  1
1088.     000224 1  1  UP^EXIT:                                                                      !B30,MBB============= #XXX
1089.     000224 1  1    RETURN ERROR;
1090.     000226 1  1
1091.     000226 1  1   END;                                     !SPOOLEND

BLOCK                       Variable,2000  STRUCT-I      Indirect      L-005
DEVTYPE                     Variable       INT           Direct        L+004
DJOB^END                    Variable,16    STRUCT        Direct        L+015
  1 PAGES                           0,2    INT           Direct
  1 UNITSIZE                        2,2    INT           Direct
  1 UNITSALLOCATED                  4,2    INT           Direct
  1 TOTLINES                        6,2    INT           Direct
  1 CLOSETIME[0:2]                 10,2    INT           Direct
END^MESS                    Variable,12    STRUCT        Direct        L+010
```

```
EOF                         Variable     INT (32)     Direct       L+005
ERROR                       Variable     INT          Direct       L+001
ERROR^EXIT                  Label                     %000210
FLAGS                       Variable     INT          Indirect     L+007
FORMAT^END^MESSAGE          Subproc                   %000000
MSG^LEN                     Variable     INT          Direct       L+003
MSG^PTR                     Variable     INT          Indirect     L+002
PREPARE^DISCJOB^END         Subproc                   %000040
P^BUFFER                    Variable     INT          Indirect     L-005
P^FLAGS                     Variable     INT          Direct       L-004
UP^EXIT                     Label                     %000224

1093.     000000 0  0   INT PROC SPOOLCONTROL (P^BUFFER,P^OP,P^CONTROL,P^WRITTEN) VARIABLE;
1094.     000000 1  0
1095.     000000 1  0     INT
1096.     000000 1  0       .P^BUFFER,                       !BLOCKING BUFFER
1097.     000000 1  0       P^OP,                            !CONTROL OPERATION
1098.     000000 1  0       P^CONTROL,                       !CONTROL PARAMETER
1099.     000000 1  0       .P^WRITTEN;                      !NUMBER OF BYTES IN BUFFER
1100.     000000 1  0
1101.     000000 1  0
1102.     000000 1  0
1103.     000000 1  0     BEGIN
1104.     000000 1  1
1105.     000000 1  1       INT .WORK^BUF [0:(BLOCK^SIZE'>>'1+2)], !WORKING BUFFER
1106.     000000 1  1           .NEXT^WORD := @WORK^BUF,          !POINTER TO WORK^BUF
1107.     000000 1  1           DATA^LEN := 0;                   !WORD COUNT OF DATA
1108.     000000 1  1
1109.     000000 1  1                                            !ALLOCATE MESSAGE BUFFERS
1110.     000000 1  1       INT .BLOCK (APBLOCK)=P^BUFFER;         !USERS BUFFER FORMAT
1111.     000000 1  1       INT .FLAGS := @BLOCK.FLAGS;            !SET UP FLAGS POINTER
1112.     000000 1  1
1113.     000000 1  1       INT LINECOUNT,                         !WORKING LINECOUNT
1114.     000000 1  1           PAGE := 0,                          !NEW PAGE FLAG
1115.     000000 1  1           ERROR := FEOK;
1116.     000000 1  1
1117.     000000 1  1       SUBPROC HEADUP;
1118.     000000 1  1         BEGIN
1119.     000000 2  1           NEXT^WORD := -1;                   !INSERT HEAD MARKER
1120.     000000 2  2           @NEXT^WORD := @NEXT^WORD [1];
1121.     000002 2  2           DATA^LEN := DATA^LEN + 1;
1122.     000005 2  2           PAGE := PAGE'+'1;                  !SET PAGE CHANGE FLAG
1123.     000007 2  2           LINECOUNT := LINECOUNT'-'BLOCK.PAGESIZE;    !ALTER LINECOUNT
1124.     000012 2  2         END;
1125.     000017 2  2       INT SUBPROC CONTROL^VALID^PARAMS;
1126.     000020 1  1         BEGIN
1127.     000020 2  1           INT ERROR := FEOK;
1128.     000020 2  2                                            !VALIDATE REQUIRED PARAMETERS
1129.     000020 2  2           IF NOT $PARAM (P^BUFFER) OR NOT $PARAM(P^OP) OR NOT $PARAM (P^CONTROL)
1130.     000020 2  2             THEN RETURN  SPERR^PARAM;               !REQUIRED PARAMS MISSING !
1131.     000022 2  2
1131.1    000036 2  2
1132.     000036 2  2           IF P^OP = 1 AND                                              !B00,AT #1
1132.01   000036 2  2              (P^CONTROL < CONTROL^VALUE^MIN OR                         !B00,AT #1
1132.1    000036 2  2               P^CONTROL > CONTROL^VALUE^MAX) THEN                      !B00,AT #1
1132.2    000036 2  2              RETURN SPERR^CONTENT;                                     !B00,AT #1
1133.     000047 2  2
```

```
000053 2  2
000053 2  2       END;                                   !SUBPROC VALID^PARAMS

ERROR               Variable      INT          Direct        S-000

000056 1  1     INT SUBPROC BLOCKFLUSH;
000056 2  1       BEGIN
000056 2  2         INT ERROR := FEOK;
000056 2  2         IF JOBEXITBEFORE                       !EXIT TO CHECKPOINT
000060 2  2           AND NOT JOBTIMETOWRITE               !FLAG NOT SET
000060 2  2           THEN
000066 2  2             BEGIN                              !RETURN END POINTER
000066 2  3               IF $PARAM(P^WRITTEN) THEN                                   !C08,bmm
000071 2  3               P^WRITTEN := (BLOCK.COUNT + BLOCK^HEAD^LEN)'<<'1;
000076 2  3               JOBTIMETOWRITE := 1;             !SET FLAG
000101 2  3               ERROR := SPERR^WRITE^NEEDED;     !RETURN EOF
000103 2  3             END
000103 2  2         ELSE                                   !ABLE TO WRITE
000104 2  2           ERROR := SPOOL^WBLK(BLOCK);
000110 2  2
000110 2  2         RETURN ERROR;
000113 2  2       END;                                     !SUBPROC BLOCKFLUSH

ERROR               Variable      INT          Direct        S-000

000113 1  1
000113 1  1     SUBPROC UPDATE^BLOCK;
000113 2  1       BEGIN
000113 2  2
000113 2  2         IF PAGE THEN                               !UPDATE PAGE COUNT
000115 2  2           BLOCK.ENDPAGE := BLOCK.ENDPAGE'+'PAGE;
000122 2  2         BLOCK.ENDLINE := LINECOUNT;                !UPDATE LINE COUNT
000125 2  2
000125 2  2         @NEXT^WORD := @BLOCK.COUNT'+'BLOCK.COUNT'+'1;!POINT TO BLOCK DATA
000133 2  2
000133 2  2         NEXT^WORD ':=' WORK^BUF FOR DATA^LEN;      !MOVE NEW DATA
000137 2  2
000137 2  2         BLOCK.COUNT := BLOCK.COUNT + DATA^LEN;     !UPDATE COUNT
000141 2  2
000141 2  2       END;                                         !SUBPROC UPDATE^BLOCK
000142 1  1     SUBPROC VFU^CONTROL;
000142 2  1       BEGIN
000142 2  2
000142 2  2         IF P^CONTROL > 15 THEN               !SKIP NO. LINES
000145 2  2           LINECOUNT := LINECOUNT + P^CONTROL - 16
000145 2  2         ELSE
000153 2  2           IF P^CONTROL <> 0 THEN             !SKIP VFU
000156 2  2             LINECOUNT := LINECOUNT + 1
000156 2  2           ELSE
000161 2  2             BEGIN  ! HEAD OF FORM
000161 2  3             IF JOBIGNOREFIRSTTOF THEN
000164 2  3                JOBIGNOREFIRSTTOF:=0
000164 2  3             ELSE
000170 2  3                LINECOUNT := BLOCK.PAGESIZE + 1;
000174 2  3             END;
```

```
000174 2  2
000174 2  2      WHILE LINECOUNT > BLOCK.PAGESIZE DO !PAGE FULL
000201 2  2        BEGIN                                                        !C07
000201 2  3        CALL HEADUP;
000202 2  3        IF P^CONTROL = 0 THEN                                        !C07
000205 2  3          LINECOUNT := 0;                                            !C07
000207 2  3        END;                                                         !C07
000211 2  2
000211 2  2      NEXT^WORD ':=' [-32,1];            !CREATE CONTROL MESSAGE
000217 2  2      NEXT^WORD [2] := P^CONTROL;
000222 2  2      @NEXT^WORD := @NEXT^WORD [3];
000225 2  2
000225 2  2    END;                                 !SUBPROC VFU^CONTROL
000231 1  1  IF NOT (ERROR := CONTROL^VALID^PARAMS) THEN
000254 1  1    BEGIN
000254 1  2
000254 1  2      LINECOUNT := BLOCK.ENDLINE;                  !TEMPORARY LINE COUNT
000257 1  2      IF BLOCK.ENDPAGE = 0 AND
000257 1  2         NOT (P^OP=1 AND P^CONTROL=0) THEN
000271 1  2        BEGIN  ! NO USER SUPPLIED TOP OF FORM, PUT IN PAGE MARK
000271 1  3          LINECOUNT := LINECOUNT + BLOCK.PAGESIZE;
000274 1  3          CALL HEADUP;
000275 1  3          JOBIGNOREFIRSTTOF:=1;
000300 1  3        END;
000300 1  2
000300 1  2      IF P^OP = 1 THEN
000303 1  2        CALL VFU^CONTROL
000303 1  2      ELSE
000306 1  2        BEGIN
000306 1  3          NEXT^WORD := -32;                        !NO CARRIAGE CONTROL
000310 1  3          NEXT^WORD[1] := P^OP;
000313 1  3          NEXT^WORD[2] := P^CONTROL;
000316 1  3          @NEXT^WORD := @NEXT^WORD [3];
000321 1  3        END;
000321 1  2
000321 1  2                                                   !CALC DATA TO BE ADDED
000321 1  2      DATA^LEN := DATA^LEN + 3;
000323 1  2
000323 1  2      IF DATA^LEN > MAX^DATA^LEN THEN              !BIGGER THAN BUFFER
000330 1  2        ERROR :=  SPERR^TOOLONG
000330 1  2      ELSE
000334 1  2        BEGIN
000334 1  3          IF DATA^LEN > (MAX^DATA^LEN - BLOCK.COUNT) !NEED TO WRITE
000334 1  3            THEN
000344 1  3            IF (ERROR := BLOCKFLUSH) THEN       !WRITE ERROR
000347 1  3              RETURN ERROR;
000352 1  3
000352 1  3          CALL UPDATE^BLOCK;
000353 1  3
000353 1  3          IF $PARAM (P^WRITTEN) THEN
000356 1  3            P^WRITTEN := (BLOCK.COUNT + BLOCK^HEAD^LEN)'<<'1; !END OF BUFFER
000363 1  3
000363 1  3        END;
000363 1  2    END;
000363 1  1
000363 1  1  RETURN ERROR;
```

```
000366 1  1
000366 1  1      END;                                         !SPOOLCONTROL

BLOCK                          Variable,2000  STRUCT-I    Indirect     L-007
BLOCKFLUSH                     Subproc        INT         %000056
CONTROL^VALID^PARAMS           Subproc        INT         %000020
DATA^LEN                       Variable       INT         Direct       L+003
ERROR                          Variable       INT         Direct       L+007
FLAGS                          Variable       INT         Indirect     L+004
HEADUP                         Subproc                    %000000
LINECOUNT                      Variable       INT         Direct       L+005
NEXT^WORD                      Variable       INT         Indirect     L+002
PAGE                           Variable       INT         Direct       L+006
P^BUFFER                       Variable       INT         Indirect     L-007
P^CONTROL                      Variable       INT         Direct       L-005
P^OP                           Variable       INT         Direct       L-006
P^WRITTEN                      Variable       INT         Indirect     L-004
UPDATE^BLOCK                   Subproc                    %000113
VFU^CONTROL                    Subproc                    %000142
WORK^BUF                       Variable       INT         Indirect     L+001

000000 0  0   INT PROC SPOOLSETMODE (P^BUFFER,P^FUNCTION,P^PARAM1,P^PARAM2,P^WRITTEN)
000000 1  0           VARIABLE;
000000 1  0
000000 1  0     INT
000000 1  0       .P^BUFFER,                              !BLOCKING BUFFER
000000 1  0       P^FUNCTION,                             !SETMODE FUNCTION
000000 1  0       P^PARAM1,                               !FIRST PARAMETER
000000 1  0       P^PARAM2,                               !SECOND PARAMETER
000000 1  0       .P^WRITTEN;                             !NUMBER OF BYTES IN BUFFER
000000 1  0
000000 1  0
000000 1  0     BEGIN
000000 1  1
000000 1  1       INT .WORK^BUF [0:(BLOCK^SIZE'>>'1+2)], !WORKING BUFFER
000000 1  1           .NEXT^WORD := @WORK^BUF,              !POINTER TO WORK^BUF
000000 1  1            DATA^LEN := 0;
000000 1  1
000000 1  1
000000 1  1                                                 !ALLOCATE MESSAGE BUFFERS
000000 1  1       INT .BLOCK (APBLOCK)=P^BUFFER;            !USERS BUFFER FORMAT
000000 1  1       INT .FLAGS := @BLOCK.FLAGS;               !SET UP FLAGS POINTER
000000 1  1
000000 1  1       INT LINECOUNT,                            !WORKING LINECOUNT
000000 1  1           PAGE := 0,                             !NEW PAGE FLAG
000000 1  1           ERROR := FEOK;
000000 1  1
000000 1  1       SUBPROC HEADUP;
000000 2  1         BEGIN
000000 2  2           NEXT^WORD := -1;                      !INSERT HEAD MARKER
000002 2  2           @NEXT^WORD := @NEXT^WORD [1];
000005 2  2           DATA^LEN := DATA^LEN + 1;
000007 2  2           PAGE := PAGE'+'1;                     !SET PAGE CHANGE FLAG
000012 2  2           LINECOUNT := LINECOUNT'-'BLOCK.PAGESIZE;     !ALTER LINECOUNT
000017 2  2         END;
```

```
1272.    000020 1  1    INT SUBPROC SETMODE^VALID^PARAMS;
1273.    000020 2  1      BEGIN
1274.    000020 2  2        INT ERROR := FEOK;
1275.    000020 2  2                                              !VALIDATE REQUIRED PARAMETERS
1276.    000020 2  2        IF NOT $PARAM (P^BUFFER) OR NOT $PARAM(P^FUNCTION)
1277.    000022 2  2          THEN ERROR := SPERR^PARAM;            !REQUIRED PARAMS MISSING
1278.    000032 2  2
1279.    000032 2  2        RETURN ERROR;
1280.    000035 2  2      END;                                    !SUBPROC VALID^PARAMS

ERROR                   Variable       INT            Direct          S-000

1281.    000035 1  1    INT SUBPROC BLOCKFLUSH;
1282.    000035 2  1      BEGIN
1283.    000035 2  2        INT ERROR := FEOK;
1284.    000035 2  2        IF JOBEXITBEFORE                      !EXIT TO CHECKPOINT
1285.    000037 2  2          AND NOT JOBTIMETOWRITE              !FLAG NOT SET
1286.    000037 2  2          THEN
1287.    000045 2  2            BEGIN                               !RETURN END POINTER
1287.1   000045 2  3               IF $PARAM(P^WRITTEN) THEN                                        !C08,bmm
1288.    000050 2  3               P^WRITTEN := (BLOCK.COUNT + BLOCK^HEAD^LEN)'<<'1;
1289.    000055 2  3              JOBTIMETOWRITE := 1;             !SET FLAG
1290.    000060 2  3              ERROR := SPERR^WRITE^NEEDED;     !RETURN EOF
1291.    000062 2  3            END
1292.    000062 2  2        ELSE                                    !ABLE TO WRITE
1293.    000063 2  2          ERROR := SPOOL^WBLK(BLOCK);
1294.    000067 2  2
1295.    000067 2  2        RETURN ERROR;
1296.    000072 2  2      END;                                    !SUBPROC BLOCKFLUSH

ERROR                   Variable       INT            Direct          S-000

1297.    000072 1  1
1298.    000072 1  1    SUBPROC UPDATE^BLOCK;
1299.    000072 2  1      BEGIN
1300.    000072 2  2
1301.    000072 2  2        IF PAGE THEN                              !UPDATE PAGE COUNT
1302.    000074 2  2          BLOCK.ENDPAGE := BLOCK.ENDPAGE'+'PAGE;
1303.    000101 2  2        BLOCK.ENDLINE := LINECOUNT;               !UPDATE LINE COUNT
1304.    000104 2  2
1305.    000104 2  2        @NEXT^WORD := @BLOCK.COUNT'+'BLOCK.COUNT'+'1;!POINT TO BLOCK DATA
1306.    000112 2  2
1307.    000112 2  2        NEXT^WORD ':=' WORK^BUF FOR DATA^LEN;     !MOVE NEW DATA
1308.    000116 2  2
1309.    000116 2  2        BLOCK.COUNT := BLOCK.COUNT + DATA^LEN;    !UPDATE COUNT
1310.    000120 2  2
1311.    000120 2  2      END;                                        !SUBPROC UPDATE^BLOCK
1313.    000121 1  1    IF NOT (ERROR := SETMODE^VALID^PARAMS) THEN
1314.    000144 1  1      BEGIN
1315.    000144 1  2
1316.    000144 1  2        LINECOUNT := BLOCK.ENDLINE;               !TEMPORARY LINE COUNT
1317.    000147 1  2        IF BLOCK.ENDPAGE = 0 THEN             !NO CONTROL 1,0 SO UPDATE PAGE
1318.    000153 1  2          BEGIN
1319.    000153 1  3            LINECOUNT := LINECOUNT + BLOCK.PAGESIZE;
1320.    000156 1  3            CALL HEADUP;
1321.    000157 1  3            JOBIGNOREFIRSTTOF:=1;
```

```
1322.     000162 1  3          END;
1323.     000162 1  2
1324.     000162 1  2        IF P^FUNCTION = 5 THEN                    !SET PAGE SIZE FUNCTION
1325.     000165 1  2          BEGIN
1326.     000165 1  3            IF $PARAM(P^PARAM1) AND R^PARAM1 THEN
1327.     000172 1  3              BLOCK.PAGESIZE := 60                !CHANGE PAGE SIZE
1328.     000172 1  3            ELSE BLOCK.PAGESIZE := 66;            !DEFAULT PAGE SIZE
1329.     000201 1  3            IF LINECOUNT > BLOCK.PAGESIZE THEN    !NEW PAGE
1330.     000206 1  3              CALL HEADUP;
1331.     000207 1  3          END                                                                  !C07
1331.1    000207 1  2        ELSE                                                                   !C07
1331.2    000211 1  2          IF P^FUNCTION = 6 THEN                                               !C07
1331.3    000214 1  2            IF P^PARAM1 THEN                                                   !C07
1331.4    000216 1  2              JOBSETMODENOSPACE := 0                                           !C07
1331.5    000216 1  2            ELSE                                                               !C07
1331.6    000222 1  2              JOBSETMODENOSPACE := 1                                           !C07
1331.7    000222 1  2          ELSE                                                                 !C07
1331.8    000226 1  2            IF P^FUNCTION = 27 THEN                                            !C07
1331.9    000231 1  2              JOBSETMODEPRESPACE:=P^PARAM1;                                    !C07
1332.     000236 1  2
1333.     000236 1  2        NEXT^WORD := -33;                         !CREATE SETMODE SUB-MESSAGE
1334.     000240 1  2        NEXT^WORD[1] := P^FUNCTION;               !FUNCTION
1335.     000243 1  2        IF $PARAM (P^PARAM1) THEN                 !PARAMETER 1
1336.     000246 1  2          NEXT^WORD[2] := P^PARAM1
1337.     000246 1  2        ELSE NEXT^WORD[2] := 0;
1338.     000255 1  2        IF $PARAM (P^PARAM2) THEN                 !PARAMETER 2
1339.     000260 1  2          NEXT^WORD[3] := P^PARAM2
1340.     000260 1  2        ELSE NEXT^WORD[3] := 0;
1341.     000267 1  2        @NEXT^WORD := @NEXT^WORD [4];             !UPDATE POINTER
1342.     000272 1  2
1343.     000272 1  2                                                   !CALC DATA TO BE ADDED
1344.     000272 1  2        DATA^LEN := DATA^LEN + 4;
1345.     000274 1  2
1346.     000274 1  2        IF DATA^LEN > MAX^DATA^LEN THEN            !BIGGER THAN BUFFER
1347.     000301 1  2          ERROR :=  SPERR^TOOLONG
1348.     000301 1  2        ELSE
1349.     000305 1  2          BEGIN
1350.     000305 1  3            IF DATA^LEN > (MAX^DATA^LEN - BLOCK.COUNT) !NEED TO WRITE
1351.     000305 1  3              THEN
1352.     000315 1  3              IF (ERROR := BLOCKFLUSH) THEN        !WRITE ERROR
1353.     000320 1  3                RETURN ERROR;
1354.     000323 1  3
1355.     000323 1  3            CALL UPDATE^BLOCK;
1356.     000324 1  3
1357.     000324 1  3            IF $PARAM (P^WRITTEN) THEN
1358.     000327 1  3              P^WRITTEN := (BLOCK.COUNT + BLOCK^HEAD^LEN)'<<'1; !END OF BUFFER
1359.     000334 1  3
1360.     000334 1  3          END;
1361.     000334 1  2        END;
1362.     000334 1  1
1363.     000334 1  1      RETURN ERROR;
1364.     000337 1  1
1365.     000337 1  1    END;                                       !SPOOLSETMODE

BLOCK                     Variable,2000  STRUCT-I     Indirect     L-010
BLOCKFLUSH                Subproc        INT          %000035
DATA^LEN                  Variable       INT          Direct       L+003
```

```
ERROR                                Variable   INT        Direct     L+007
FLAGS                                Variable   INT        Indirect   L+004
HEADUP                               Subproc               %000000
LINECOUNT                            Variable   INT        Direct     L+005
NEXT^WORD                            Variable   INT        Indirect   L+002
PAGE                                 Variable   INT        Direct     L+006
P^BUFFER                             Variable   INT        Indirect   L-010
P^FUNCTION                           Variable   INT        Direct     L-007
P^PARAM1                             Variable   INT        Direct     L-006
P^PARAM2                             Variable   INT        Direct     L-005
P^WRITTEN                            Variable   INT        Indirect   L-004
SETMODE^VALID^PARAMS                 Subproc    INT        %000020
UPDATE^BLOCK                         Subproc               %000072
WORK^BUF                             Variable   INT        Indirect   L+001
1365.02  000000 0  0  INT PROC SPOOLCONTROLBUF (P^BUFFER,P^OP,P^BUF,P^COUNT,P^WRITTEN) VARIABLE;   !C08
1365.03  000000 1  0                                                                               !C08
1365.04  000000 1  0    INT                                                                        !C08
1365.05  000000 1  0      .P^BUFFER,                !BLOCKING BUFFER                                C08
1365.06  000000 1  0      P^OP,                     !CONTROLBUF OPERATION                           C08
1365.07  000000 1  0      .P^BUF,                   !CONTROLBUF BUFFER                              C08
1365.08  000000 1  0      P^COUNT,                  !NUMBER OF BYTES IN CONTROLBUF BUFFER           C08
1365.09  000000 1  0      .P^WRITTEN;               !NUMBER OF BYTES IN BLOCKING BUFFER             C08
1365.1   000000 1  0                                                                               !C08
1365.11  000000 1  0                                                                               !C08
1365.12  000000 1  0    BEGIN                                                                      !C08
1365.13  000000 1  1                                                                               !C08
1365.14  000000 1  1      INT .WORK^BUF [0:BLOCK^SIZE-1],        !WORKING BUFFER                    C08
1365.15  000000 1  1          .NEXT^WORD := @WORK^BUF,           !POINTER TO WORK^BUF               C08
1365.16  000000 1  1          DATA^LEN := 0;                    !WORD COUNT OF DATA                 C08
1365.17  000000 1  1                                                                               !C08
1365.18  000000 1  1                                                                               !C08
1365.19  000000 1  1                                            !ALLOCATE MESSAGE BUFFERS           C08
1365.2   000000 1  1      INT .BLOCK (APBLOCK)=P^BUFFER;        !USERS BUFFER FORMAT                C08
1365.21. 000000 1  1      INT .FLAGS := @BLOCK.FLAGS;           !SET UP FLAGS POINTER               C08
1365.22  000000 1  1                                                                               !C08
1365.23  000000 1  1      INT LINECOUNT,                        !WORKING LINECOUNT                  C08
1365.24  000000 1  1          PAGE := 0,                         !NEW PAGE FLAG                     C08
1365.25  000000 1  1          ERROR := FEOK;                                                       !C08
1365.26  000000 1  1                                                                               !C08
1365.27  000000 1  1      SUBPROC HEADUP;                                                          !C08
1365.28  000000 2  1        BEGIN                                                                  !C08
1365.29  000000 2  2          NEXT^WORD := -1;                  !INSERT HEAD MARKER                 C08
1365.3   000002 2  2          @NEXT^WORD := @NEXT^WORD [1];                                        !C08
1365.31  000005 2  2          DATA^LEN := DATA^LEN + 1;                                            !C08
1365.32  000007 2  2          PAGE := PAGE'+'1;                 !SET PAGE CHANGE FLAG               C08
1365.33  000012 2  2          LINECOUNT := LINECOUNT'-'BLOCK.PAGESIZE;    !ALTER LINECOUNT          C08
1365.34  000017 2  2        END;                                                                   !C08
1365.35  000020 1  1      INT SUBPROC CONTROLBUF^VALID^PARAMS;                                     !C08
1365.36  000020 2  1        BEGIN                                                                  !C08
1365.37  000020 2  2          INT ERROR := FEOK;                                                   !C08
1365.38  000020 2  2          IF NOT $PARAM (P^BUFFER) OR NOT $PARAM(P^OP) OR NOT $PARAM (P^BUF)   !C08
1365.39  000022 2  2             THEN ERROR := SPERR^PARAM        !REQUIRED PARAMS MISSING           C08
1365.4   000033 2  2          ELSE                                                                 !C08
1365.41  000036 2  2          IF ((P^COUNT+1)'>>'1+3) > MAX^DATA^LEN-1 OR P^COUNT < 0 THEN         !C08
1365.42  000051 2  2            ERROR := SPERR^CULL^FE+FEBADCOUNT;                                 !C08
1365.43  000054 2  2          RETURN ERROR;                                                        !C08
1365.44  000057 2  2        END;                                                                   !C08
```

```
ERROR                                  Variable       INT              Direct          S-000

 1365.45   000057 1  1         INT SUBPROC BLOCKFLUSH;                                                      !C08
 1365.46   000057 2  1           BEGIN                                                                      !C08
 1365.47   000057 2  2             INT ERROR := FEOK;                                                       !C08
 1365.48   000057 2  2             IF JOBEXITBEFORE                        !EXIT TO CHECKPOINT               C08
 1365.49   000061 2  2               AND NOT JOBTIMETOWRITE                 !FLAG NOT SET                    C08
 1365.5    000061 2  2               THEN                                                                   !C08
 1365.51   000067 2  2                 BEGIN                                  !RETURN END POINTER            C08
 1365.511  000067 2  3                   IF $PARAM(P^WRITTEN) THEN                                          !C08,bmm
 1365.52   000072 2  3                     P^WRITTEN := (BLOCK.COUNT + BLOCK^HEAD^LEN)'<<'1;                !C08
 1365.53   000077 2  3                   JOBTIMETOWRITE := 1;              !SET FLAG                         C08
 1365.54   000102 2  3                   ERROR := SPERR^WRITE^NEEDED;     !RETURN EOF                        C08
 1365.55   000104 2  3                 END                                                                  !C08
 1365.56   000104 2  2             ELSE                                     !ABLE TO WRITE                   C08
 1365.57   000105 2  2               ERROR := SPOOL^WBLK(BLOCK);                                            !C08
 1365.58   000111 2  2                                                                                      !C08
 1365.59   000111 2  2             RETURN ERROR;                                                            !C08
 1365.6    000114 2  2           END;                                  !SUBPROC BLOCKFLUSH                   C08

ERROR                                  Variable       INT              Direct          S-000

 1365.61   000114 1  1                                                                                      !C08
 1365.62   000114 1  1         SUBPROC UPDATE^BLOCK;                                                        !C08
 1365.63   000114 2  1           BEGIN                                                                      !C08
 1365.64   000114 2  2                                                                                      !C08
 1365.65   000114 2  2             IF PAGE THEN                               !UPDATE PAGE COUNT             C08
 1365.66   000116 2  2               BLOCK.ENDPAGE := BLOCK.ENDPAGE'+'PAGE;                                 !C08
 1365.67   000123 2  2             BLOCK.ENDLINE := LINECOUNT;                !UPDATE LINE COUNT             C08
 1365.68   000126 2  2                                                                                      !C08
 1365.69   000126 2  2             @NEXT^WORD := @BLOCK.COUNT'+'BLOCK.COUNT'+'1;!POINT TO BLOCK DATA         C08
 1365.7    000134 2  2                                                                                      !C08
 1365.71   000134 2  2             NEXT^WORD ':=' WORK^BUF FOR DATA^LEN;      !MOVE NEW DATA                 C08
 1365.72   000140 2  2                                                                                      !C08
 1365.73   000140 2  2             BLOCK.COUNT := BLOCK.COUNT + DATA^LEN;     !UPDATE COUNT                  C08
 1365.74   000142 2  2                                                                                      !C08
 1365.75   000142 2  2           END;                                         !SUBPROC UPDATE^BLOCK          C08
 1365.77   000143 1  1         IF NOT (ERROR := CONTROLBUF^VALID^PARAMS) THEN
 1365.78   000165 1  1           BEGIN                                                                      !C08
 1365.79   000165 1  2           LINECOUNT := BLOCK.ENDLINE;             !TEMPORARY LINE COUNT              !C08
 1365.8    000170 1  2           IF BLOCK.ENDPAGE = 0 THEN               !NO CONTROL1,0 SO UPDATEPAGE        C08
 1365.81   000174 1  2             BEGIN                                                                     C08
 1365.82   000174 1  3               LINECOUNT := LINECOUNT + BLOCK.PAGESIZE;                               !C08
 1365.83   000177 1  3               CALL HEADUP;                                                           !C08
 1365.84   000200 1  3               JOBIGNOREFIRSTTOF := 1;                                                !C08
 1365.85   000203 1  3             END;                                                                     !C08
 1365.86   000203 1  2           NEXT^WORD := -35;                     !CREATE CONTROLBUF SUB-MESSAGE       !C08
 1365.87   000205 1  2           NEXT^WORD[1] := P^OP;                                                       C08
 1365.88   000210 1  2           NEXT^WORD[2] := P^COUNT;                                                   !C08
 1365.89   000213 1  2           NEXT^WORD[3] ':=' P^BUF FOR (P^COUNT+1)'>>'1;                              !C08
 1365.9    000222 1  2           @NEXT^WORD := @NEXT^WORD[3+((P^COUNT+1)'>>'1)];                            !C08
 1365.91   000232 1  2           DATA^LEN := DATA^LEN+3+(P^COUNT+1)'>>'1;                                   !C08
 1365.92   000241 1  2           IF DATA^LEN > MAX^DATA^LEN                                                 !C08
 1365.93   000241 1  2             THEN ERROR := SPERR^TOOLONG                                              !C08
 1365.94   000246 1  2           ELSE                                                                       !C08
 1365.95   000253 1  2             BEGIN                                                                    !C08
                                                                                                            !C08
```

```
1365.96   000253 1  3          IF DATA^LEN > (MAX^DATA^LEN - BLOCK.COUNT) THEN !NEED TO WRITE       C08
1365.97   000263 1  3            IF (ERROR := BLOCKFLUSH)                      !WRITE ERROR           C08
1365.98   000263 1  3              THEN RETURN ERROR;                                                !C08
1365.99   000271 1  3          CALL UPDATE^BLOCK;                                                    !C08
1366.     000272 1  3          IF $PARAM(P^WRITTEN) THEN                                             !C08
1366.01   000275 1  3            P^WRITTEN:=(BLOCK.COUNT+BLOCK^HEAD^LEN)'<<'1; !END OF BUFFER         C08
1366.02   000302 1  3          END;                                                                  !C08
1366.03   000302 1  2        END;                                                                    !C08
1366.04   000302 1  1      RETURN ERROR;                                                             !C08
1366.05   000304 1  1    END;                                                                        !C08

BLOCK                            Variable,2000  STRUCT-I     Indirect    L-010
BLOCKFLUSH                       Subproc        INT          %000057
CONTROLBUF^VALID^PARAMS          Subproc        INT          %000020
DATA^LEN                         Variable       INT          Direct      L+003
ERROR                            Variable       INT          Direct      L+007
FLAGS                            Variable       INT          Indirect    L+004
HEADUP                           Subproc                     %000000
LINECOUNT                        Variable       INT          Direct      L+005
NEXT^WORD                        Variable       INT          Indirect    L+002
PAGE                             Variable       INT          Direct      L+006
P^BUF                            Variable       INT          Indirect    L-006
P^BUFFER                         Variable       INT          Indirect    L-010
P^COUNT                          Variable       INT          Direct      L-005
P^OP                             Variable       INT          Direct      L-007
P^WRITTEN                        Variable       INT          Indirect    L-004
UPDATE^BLOCK                     Subproc                     %000114
WORK^BUF                         Variable       INT          Indirect    L+001
1367.    000000 0  0   INT PROC
1368.    000000 0  0   SPOOLJOBNUM(FILE, JOBNUM);
1369.    000000 1  0   INT
1370.    000000 1  0     FILE,    ! FILE NUMBER OF FILE OPEN TO THE COLLECTOR
1371.    000000 1  0     .JOBNUM;     ! RETURN FOR JOB NUMBER
1372.    000000 1  0
1373.    000000 1  0     BEGIN
1374.    000000 1  1
1375.    000000 1  1     INT
1376.    000000 1  1       ERROR;     ! ERROR TEMP
1377.    000000 1  1     STRUCT
1378.    000000 1  1       .JOBNUMMSG(APJOBNUM);     ! MESSAGE BUFFER
1379.    000000 1  1
1380.    000000 1  1     ! SPOOLJOBNUM CODE
1381.    000000 1  1
1382.    000000 1  1     CALL SPOOL^CHECKMSG(MSG^JOBNUM, JOBNUMMSG, $LEN(JOBNUMMSG));
1383.    000013 1  1     CALL WRITEREAD(FILE, JOBNUMMSG, $LEN(JOBNUMMSG), 2);
1384.    000024 1  1     IF <> THEN
1385.    000025 1  1       BEGIN  ! FILE ERROR
1386.    000025 1  2       CALL FILEINFO(FILE, ERROR);
1387.    000036 1  2       RETURN SPERR^COLL^FE+ERROR;
1388.    000042 1  2       END;  ! FILE ERROR
1389.    000042 1  1     JOBNUM:=JOBNUMMSG.MSG;     ! JOB NUMBER STORED HERE IN RETURN MSG
1390.    000044 1  1     RETURN FEOK;
1391.    000046 1  1     END;  ! PROC SPOOLJOBNUM

ERROR                         Variable       INT          Direct      L+001
FILE                          Variable       INT          Direct      L-004
JOBNUM                        Variable       INT          Indirect    L-003
JOBNUMMSG                     Variable,4     STRUCT       Indirect    L+002
```

```
000000 0  0   INT PROC
000000 0  0   PRINTREADCOMMAND (MSGBUF, CONTROL, DEVICE, DEVFLAGS, DEVPARM,
000000 1  0                     DEVWIDTH, SKIP,
000000 1  0                     DATAFILENAME, JOB, LOCATION,
000000 1  0                     FORM, REPORT, PAGESIZE) VARIABLE;
000000 1  0   INT
000000 1  0     .MSGBUF,      ! MESSAGE FROM SUPERVISOR PROCESS
000000 1  0     .CONTROL,      ! PRINT PROCESS CONTROL NUMBER
000000 1  0     .DEVICE,     ! DEVICE TO BE CONTROLLED
000000 1  0     .DEVFLAGS,     ! DEVICE FLAGS
000000 1  0     .DEVPARM,     ! DEVICE PARM
000000 1  0     .DEVWIDTH,     ! DEVICE WIDTH
000000 1  0     .SKIP,     ! SKIP PARAMETER
000000 1  0     .DATAFILENAME,     ! NAME OF DATA FILE FOR SPOOLED JOB
000000 1  0     .JOB,     ! JOB NUMBER FOR SPOOLED JOB
000000 1  0     .LOCATION,     ! LOCATION NAME FOR SPOOLED JOB
000000 1  0     .FORM,     ! FORM NAME FOR SPOOLED JOB
000000 1  0     .REPORT,     ! REPORT NAME FOR SPOOLED JOB
000000 1  0     .PAGESIZE;     ! PAGE SIZE FOR SPOOLED JOB
000000 1  0
000000 1  0     BEGIN
000000 1  1
000000 1  1     INT
000000 1  1       .CONT(PPCONTROL)=MSGBUF,     ! COMMUNICATIONS BUFFER
000000 1  1       ERROR;     ! ERROR TEMP
000000 1  1
000000 1  1     ! PRINTREADCOMMAND CODE
000000 1  1
000000 1  1     IF NOT $PARAM(MSGBUF) THEN
000004 1  1       RETURN SPERR^PARAM;
000006 1  1
000006 1  1     IF $PARAM(CONTROL) THEN
000011 1  1       CONTROL:=CONT.CONTROL;
000014 1  1     IF $PARAM(DATAFILENAME) THEN
000017 1  1       DATAFILENAME ':=' CONT.DATAFILENAME FOR WLEN^FILENAME;
000024 1  1     IF $PARAM(DEVICE) THEN
000027 1  1       DEVICE ':=' CONT.DEVICE FOR WLEN^DEVICENAME;
000034 1  1     IF $PARAM(JOB) THEN
000037 1  1       JOB:=CONT.JOB;
000042 1  1     IF $PARAM(LOCATION) THEN
000045 1  1       LOCATION ':=' CONT.DEST FOR WLEN^LOCNAME;
000052 1  1     IF $PARAM(FORM) THEN
000055 1  1       FORM ':=' CONT.FORM FOR WLEN^FORMNAME;
000062 1  1     IF $PARAM(REPORT) THEN
000065 1  1       REPORT ':=' CONT.REPORT FOR WLEN^REPORTNAME;
000072 1  1     IF $PARAM(DEVFLAGS) THEN
000075 1  1       DEVFLAGS:=CONT.DEVFLAGS;
000100 1  1     IF $PARAM(PAGESIZE) THEN
000103 1  1       PAGESIZE:=CONT.PAGE;
000106 1  1     IF $PARAM(SKIP) THEN
000111 1  1       SKIP:=CONT.SKIP^PAGE;
000114 1  1     IF $PARAM(DEVPARM) THEN
000117 1  1       DEVPARM:=CONT.DEVPARM;
000122 1  1     IF $PARAM(DEVWIDTH) THEN
000125 1  1       DEVWIDTH:=CONT.DEVWIDTH;
000130 1  1
000130 1  1     RETURN FEOK;
```

```
000132 1  1       END;  ! PROC PRINTREADCOMMAND

CONT                          Variable,200   STRUCT-I     Indirect     L-020
CONTROL                       Variable       INT          Indirect     L-017
DATAFILENAME                  Variable       INT          Indirect     L-011
DEVFLAGS                      Variable       INT          Indirect     L-015
DEVICE                        Variable       INT          Indirect     L-016
DEVPARM                       Variable       INT          Indirect     L-014
DEVWIDTH                      Variable       INT          Indirect     L-013
ERROR                         Variable       INT          Direct       L+001
FORM                          Variable       INT          Indirect     L-006
JOB                           Variable       INT          Indirect     L-010
LOCATION                      Variable       INT          Indirect     L-007
MSGBUF                        Variable       INT          Indirect     L-020
PAGESIZE                      Variable       INT          Indirect     L-004
REPORT                        Variable       INT          Indirect     L-005
SKIP                          Variable       INT          Indirect     L-012

000000 0  0   INT PROC PRINTREAD (P^BUFFER,P^LINE,P^READ,P^COUNT,P^SKIP^NO) VARIABLE;
000000 1  0
000000 1  0     INT .P^BUFFER,                          !USERS BUFFER
000000 1  0         .P^LINE,                            !RETURNED DATA LINE
000000 1  0         P^READ,                             !BYTES TO BE READ
000000 1  0         .P^COUNT,                           !BYTES READ
000000 1  0         P^SKIP^NO;                          !PAGE NUMBER TO BE SKIPPED TO
000000 1  0                                             ! OR IF < 0 READ LAST LINE
000000 1  0
000000 1  0     BEGIN
000000 1  1
000000 1  1     LITERAL
000000 1  1       RETURN^HOF=-1,
000000 1  1       RETURN^INTERNAL=-2;
000000 1  1       INT .USER(PPBLOCK)=P^BUFFER;          !STRUCT POINTER TO USERS BUFFER
000000 1  1       INT .WORK^BUF[0:BLOCK^SIZE];          !WORKING I/O STRUCTURE                    C05
000000 1  1                                             !(BLOCKSIZE PLUS 1 FOR SCAN STOPPER      B30,MBB============= #XXX
000000 1  1       INT .APB(APBLOCK)=WORK^BUF;           !APPLICATION BLOCK                        B30,MBB============= #XXX
000000 1  1       INT  BITCOUNT,                                                                 !C05
000000 1  1            LASTINDEX,                                                                !C05
000000 1  1            NEXTTOLASTINDEX,                                                          !C05
000000 1  1            STARTINDEX;                                                               !C05
000000 1  1
000000 1  1       INT  .T^LINE[0:2];                                                             !C08
000000 1  1
000000 1  1       STRING .S^P^LINE := @P^LINE '<<' 1; !STRING POINTER TO OUTPUT
000000 1  1       STRING .S^WORK^BUF := @WORK^BUF'<<'1; !STRING POINTER TO UNPACK LINE
000000 1  1
000000 1  1       INT ERROR := FEOK;
000000 1  1
000000 1  1       INT SUBPROC PREAD^VALID^PARAMS;             !VALIDATE PARAMETERS
000000 2  1         BEGIN
000000 2  2
000000 2  2         INT ERROR := FEOK;
000000 2  2
000000 2  2           IF NOT $PARAM(P^BUFFER) OR NOT $PARAM(P^LINE) OR NOT $PARAM(P^READ)
000002 2  2             THEN ERROR := SPERR^PARAM           !REQUIRED PARAMS MISSING
000013 2  2           ELSE
```

```
000016 2  2
000016 2  2        IF P^READ <= 0 THEN                     !VALID READ COUNT
000021 2  2          ERROR := SPERR^CONTENT;
000024 2  2
000024 2  2        RETURN ERROR;
000027 2  2
000027 2  2      END;                                      !SUBPROC VALID^PARAMS

ERROR              Variable      INT            Direct          S-000

000027 1  1      INT SUBPROC READ^BLOCK (SP^NEXT^BLOCK, FLAG);                              !C05
000027 2  1        INT(32) SP^NEXT^BLOCK;
000027 2  1        INT     FLAG;            ! IF TRUE, VALIDATE BLOCK INTERNALS AND COPY    C05
000027 2  1
000027 2  1        BEGIN
000027 2  2
000027 2  2        INT ERROR := FEOK,
000027 2  2            COUNT^READ;
000027 2  2
000027 2  2        IF SP^NEXT^BLOCK < 0D THEN           !LAST BLOCK IN CHAIN
000036 2  2          ERROR := SPERR^EOF
000036 2  2        ELSE
000041 2  2          BEGIN
000041 2  3            IF USER.DATA^FILE THEN  ! NO POSITION IF $RECEIVE                   B30,MBB============= #XXX
000044 2  3              CALL POSITION (USER.DATA^FILE,SP^NEXT^BLOCK);!POSITION TO BLOCK   B30,MBB============= #XXX
000051 2  3            IF <> THEN
000052 2  3              BEGIN
000052 2  4              CALL FILEINFO (USER.DATA^FILE,ERROR); !POSITION ERROR
000065 2  4              ERROR:=ERROR+SPERR^DATA^FE;
000067 2  4              END
000067 2  3            ELSE
000070 2  3              BEGIN                             !READ THE BLOCK
000070 2  4            READ^AGAIN:                                                         !B30,MBB============= #XXX
000070 2  4                CALL READ (USER.DATA^FILE,WORK^BUF,(BLOCK^SIZE'<<'1),           !B30,MBB============= #XXX
000070 2  4                             COUNT^READ);                                       !B30,MBB============= #XXX
000102 2  4                IF <> THEN
000103 2  4                  BEGIN
000103 2  5                    CALL FILEINFO (USER.DATA^FILE,ERROR);
000116 2  5                    ERROR:=ERROR+SPERR^DATA^FE;
000120 2  5                    IF ERROR.<8:15> = 1 THEN
000124 2  5                      ERROR := (IF USER.JOB = DJOB^NUM THEN SPERR^EOF              !B30,MBB============= #XXX
000124 2  5                                                 ELSE SPERR^MISMATCH);         !B30,MBB============= #XXX
000135 2  5                  END
000135 2  4                ELSE                            !WRONG BLOCK SIZE?
000136 2  4                  BEGIN                                                           !B30,MBB============= #XXX
000136 2  5                  IF NOT USER.DATA^FILE THEN                                      !B30,MBB============= #XXX
000141 2  5                    BEGIN  ! $RECEIVE                                              B30,MBB============= #XXX
000141 2  6                      IF APB.CHECK <> SPOOL^CHECK OR APB.MSG < MSG^START          !B30,MBB============= #XXX
000141 2  6                           OR APB.MSG > MSG^END THEN                              !B30,MBB============= #XXX
000155 2  6                        RETURN SPERR^MISMATCH;                                    !B30,MBB============= #XXX
000161 2  6                      IF APB.MSG < MSG^BLOCK THEN                                 !B30,MBB============= #XXX
000164 2  6                        GOTO READ^AGAIN;    ! SKIP MSG^START                       B30,MBB============= #XXX
000165 2  6                      IF > THEN RETURN SPERR^EOF;   ! IF MSG^END                   B30,MBB============= #XXX
000171 2  6                      USER.MSG ':=' WORK^BUF FOR 3;   ! TO PASS NEXT TEST          B30,MBB============= #XXX
000176 2  6                    END;                                                          !B30,MBB============= #XXX
000176 2  5                  IF COUNT^READ <> BLOCK^SIZE'<<'1 THEN
000202 2  5                    ERROR := SPERR^MISMATCH
```

```
1521.     000202 2  5                ELSE                             !BLOCK FOR SAME JOB?
1521.1    000206 2  5                  IF FLAG THEN                                                        !C05
1522.     000210 2  5                    IF USER.MSG <> WORK^BUF OR
1522.1    000210 2  5                      (WORK^BUF[3] = 0 AND WORK^BUF[4] = 0) OR                        !C09,bmm
1523.     000210 2  5                      USER.JOB <> WORK^BUF[2] THEN
1524.     000233 2  5                        ERROR := SPERR^MISMATCH
1525.     000233 2  5                    ELSE
1526.     000237 2  5                      BEGIN                 !MOVE NEW BLOCK
1527.     000237 2  6                        USER.THIS^COUNT := 0;
1528.     000244 2  6                        USER.LAST^COUNT := -1;
1529.     000247 2  6                        USER.IOBLOCK ':=' WORK^BUF FOR BLOCK^SIZE;
1530.     000254 2  6                        USER.THIS^PAGE := USER.STPAGE;
1530.1    000260 2  6                        IF USER.JOB = DJOB^NUM THEN                                   !B30,MBB============= #XXX
1530.2    000264 2  6                          BEGIN                                                       !B30,MBB============= #XXX
1530.3    000264 2  7                            USER.NEXT^BLOCK:=SP^NEXT^BLOCK+(BLOCK^SIZE'*'2);!B30,MBB============= #XXX
1530.4    000275 2  7                            USER.LAST^BLOCK:=SP^NEXT^BLOCK-(BLOCK^SIZE'*'2);!B30,MBB============= #XXX
1530.5    000304 2  7                          END;                                                        !B30,MBB============= #XXX
1531.     000304 2  6                      END;
1531.1    000304 2  5                END;                                                                  !B30,MBB============= #XXX
1532.     000304 2  4            END;
1533.     000304 2  3        END;
1534.     000304 2  2
1535.     000304 2  2      RETURN ERROR;
1536.     000307 2  2
1537.     000307 2  2    END;                                     !SUBPROC READ^BLOCK

COUNT^READ              Variable     INT            Direct      S-000
ERROR                   Variable     INT            Direct      S-001
FLAG                    Variable     INT            Direct      S-003
READ^AGAIN              Label                       %000070
SP^NEXT^BLOCK           Variable     INT (32)       Direct      S-005

1537.01   000307 1  1    !
1537.02   000307 1  1    ! THIS PROCEDURE FINDS ANALYZES THE ALLOCATION UNIT BITMAP FOR A
1537.03   000307 1  1    ! JOB.
1537.04   000307 1  1    !
1537.05   000307 1  1    ! IN:   COUNT -        LOOK FOR THIS BIT
1537.06   000307 1  1    !
1537.07   000307 1  1    ! OUT:
1537.08   000307 1  1    !
1537.09   000307 1  1    ! REFERENCED L-REL PROC VARIABLES:
1537.1    000307 1  1    !
1537.11   000307 1  1    !     STARTINDEX -         START SEARCH HERE
1537.12   000307 1  1    !     LASTINDEX -          LAST INUSE BIT
1537.13   000307 1  1    !     NEXTTOLASTINDEX -    NEXT TO LAST INUSE BIT
1537.14   000307 1  1    !     BITCOUNT -           # OF INUSE BITS FOUND SO FAR
1537.15   000307 1  1    !
1537.16   000307 1  1    ! NOTE THAT A JOBS BITMAP IS THE INVERSE OF HOW A BITMAP IS USUALLY
1537.17   000307 1  1    ! USED, I.E., A "0" BIT MEANS IN-USE AND A "1" BIT MEANS FREE. THIS
1537.18   000307 1  1    ! WAS DONE SO THAT THIS ROUTINE CAN USE SCANS TO FIND THE NEXT UNIT
1537.19   000307 1  1    ! OF THE JOB.
1537.2    000307 1  1    !
1537.21   000307 1  1
1537.22   000307 1  1    SUBPROC FINDBIT( HITCOUNT );                                              !C05
1537.23   000307 2  1
1537.24   000307 2  1    INT      HITCOUNT;
1537.25   000307 2  1
1537.26   000307 2  1    BEGIN
```

```
000307 2  2
000307 2  2      INT     CURINDEX := STARTINDEX;
000307 2  2      STRING .S;
000307 2  2      INT(32) EOF;                                                      !B30,MBB============ #XXX
000307 2  2
000307 2  2      BITCOUNT := 0;
000314 2  2
000314 2  2      IF USER.JOB = DJOB^NUM THEN                                       !B30,MBB============ #XXX
000320 2  2        BEGIN                                                           !B30,MBB============ #XXX
000320 2  3        CALL FILEINFO(USER.DATA^FILE, , , , , , EOF);                   !B30,MBB============ #XXX
000334 2  3        LASTINDEX :=                                                    !B30,MBB============ #XXX
000334 2  3            (EOF + $UDBL(DJOB^UNITSIZEBYTES) - 1D) '/' DJOB^UNITSIZEBYTES; !B30,MBB============ #XXX
000346 2  3        LASTINDEX := $MIN(LASTINDEX, HITCOUNT - 1);                     !B30,MBB============ #XXX
000356 2  3        NEXTTOLASTINDEX := LASTINDEX - 1;                               !B30,MBB============ #XXX
000361 2  3        BITCOUNT := LASTINDEX - STARTINDEX + 1;                         !B30,MBB============ #XXX
000366 2  3        RETURN;                                                         !B30,MBB============ #XXX
000370 2  3        END;                                                            !B30,MBB============ #XXX
000370 2  2                                                                        !B30,MBB============ #XXX
000370 2  2      DO                                                                !B30,MBB============ #XXX
000370 2  2         BEGIN
000370 2  3         IF NOT BITSET(WORK^BUF,CURINDEX) THEN
000402 2  3            BEGIN  ! THIS UNIT IN-USE BY THIS JOB
000402 2  4            NEXTTOLASTINDEX := LASTINDEX;
000404 2  4            LASTINDEX := CURINDEX;
000406 2  4            BITCOUNT := BITCOUNT + 1;
000410 2  4            END;
000410 2  3         CURINDEX := CURINDEX + 1;
000412 2  3         IF NOT (CURINDEX LAND 7) THEN
000415 2  3            BEGIN
000415 2  4            SCAN S^WORK^BUF[ CURINDEX '>>' 3 ] WHILE %377 -> @S;
000424 2  4            IF (CURINDEX := (@S '-' @S^WORK^BUF) '<<' 3) = 8192 THEN
000434 2  4               BEGIN  ! RAN OFF OF EDGE -- WRAP AROUND
000434 2  5               SCAN S^WORK^BUF WHILE %377 -> @S;
000440 2  5               CURINDEX := (@S '-' @S^WORK^BUF) '<<' 3;
000445 2  5               END;
000445 2  4            END;
000445 2  3         END
000445 2  2      UNTIL (CURINDEX = STARTINDEX) OR (BITCOUNT = HITCOUNT);
000455 2  2
000455 2  2      RETURN;
000457 2  2
000457 2  2      END;

CURINDEX              Variable      INT           Direct       S-003
EOF                   Variable      INT (32)      Direct       S-001
HITCOUNT              Variable      INT           Direct       S-005
S                     Variable      STRING        Indirect     S-002

000457 1  1
000457 1  1      !
000457 1  1      ! THIS ROUTINE ATTEMPTS TO QUICKLY FIND THE PAGE IN THE DATA FILE
000457 1  1      ! THAT THE USER WANTS TO SKIP TO.  AT THIS POINT THE USERS ORIGINAL
000457 1  1      ! BLOCK WAS SEARCHED AND THE PAGE WAS NOT FOUND AND THE TARGET PAGE
000457 1  1      ! IS OVER 10 PAGES AWAY FROM THE CURRENT PAGE.  SINCE THIS ROUTINE
000457 1  1      ! ONLY ESTIMATES WHERE THE TARGET PAGE IS, THE NUMBER 10 WAS
000457 1  1      ! ARBITRARILY CHOSEN AS THE BREAKEVEN POINT.
```

```
000457 1 1   !
000457 1 1   ! THE SEARCH IS PERFORMED USING THE JOB'S UNIT ALLOCATION BITMAP.
000457 1 1   ! IT ASSUMES THAT TYPICALLY JOB PAGES ARE ABOUT THE SAME SIZE, AND
000457 1 1   ! HENCE USES THE RELATIONSHIP TARGETPAGE/PAGES = TARGETUNIT/UNITS
000457 1 1   ! TO OBTAIN THE ADDRESS OF A GOOD UNIT TO START THE SEARCH.  THE
000457 1 1   ! SEARCH STARTS AT THE FIRST BLOCK OF THE COMPUTED TARGETUNT AND
000457 1 1   ! PROCEEDS SEQUENTIALLY FROM THERE.
000457 1 1   !
000457 1 1   ! IF, WHEN PRINTSTART WAS CALLED ON THE JOB THE JOB WAS STILL OPEN,
000457 1 1   ! THEN THE # OF PAGES AND # OF UNITS THAT MAKE UP THE JOB ARE NOT
000457 1 1   ! AVAILABLE.  TO OBTAIN A VALUE FOR THE # OF UNITS, THE BITS ARE COUNTED
000457 1 1   ! IN THE BITMAP.  TO OBTAIN A VALUE FOR THE # OF PAGES,  THE LAST BLOCK
000457 1 1   ! OF THE NEXT-TO-LAST UNIT IS READ, AND THE PAGE NUMBER IN THAT BLOCK IS
000457 1 1   ! USED.  (THE NEXT-TO-LAST UNIT IS USED INSTEAD OF THE LAST UNIT BECAUSE
000457 1 1   ! THE LAST UNIT MAY NOT CONTAIN DATA FOR THE JOB BECAUSE THE COLLECTOR
000457 1 1   ! IS BLOCKING IT UP.)
000457 1 1   !
000457 2 1   SUBPROC PRINTSEARCH( TARGETPAGE );                                      !C05
000457 2 1
000457 2 1   INT     TARGETPAGE;
000457 2 1
000457 2 2   BEGIN
000457 2 2
000457 2 2   INT     ERROR,
000457 2 2           JOBUNITS,
000457 2 2           JOBPAGES,
000457 2 2           TARGETUNIT;
000457 2 2
000457 2 2   IF READ^BLOCK(USER.BITMAP^BLOCK,0) THEN RETURN;  ! READ IN JOB'S BITMAP
000471 2 2   S^WORK^BUF[ BLOCK^SIZE*2 ] := 0;                 ! TERMINATOR FOR SCANS
000475 2 2   STARTINDEX := $INT( USER.BITMAP^BLOCK / USER.UNITSIZE );
000504 2 2
000504 2 2   IF USER.UNITSALLOCATED = -1 THEN
000510 2 2      BEGIN  ! JOB OPEN (OR BAD) WHEN WE ATTACHED THE JOB FOR PRINTING
000510 2 3      CALL FINDBIT( 8192 );  ! COUNT INUSE BITS, OBTAIN NEXT-TO-LAST
000513 2 3      JOBUNITS := BITCOUNT - 1;       ! IGNORE LAST UNIT
000516 2 3      IF READ^BLOCK($DBL(NEXTTOLASTINDEX) * USER.UNITSIZE
000516 2 3                  + (USER.UNITSIZE - $DBL(BLOCK^SIZE*2)), 1) THEN RETURN;
000541 2 3      JOBPAGES := USER.ENDPAGE;       ! LAST PAGE OF LAST BLOCK OF NEXT-
000544 2 3                                      ! TO-LAST UNIT
000544 2 3      IF READ^BLOCK(USER.BITMAP^BLOCK,0) THEN RETURN;   ! REREAD BITMAP
000554 2 3      END
000554 2 2   ELSE
000555 2 2      BEGIN  ! JOB WAS CLOSED NORMALLY
000555 2 3      JOBUNITS := USER.UNITSALLOCATED - 1;
000561 2 3      JOBPAGES := USER.PAGES;
000564 2 3      END;
000564 2 2
000564 2 2   IF NOT JOBUNITS THEN RETURN;   ! ONLY ONE UNIT FOR JOB, FORGET IT
000570 2 2
000570 2 2   IF TARGETPAGE > JOBPAGES THEN TARGETPAGE := JOBPAGES;
000576 2 2
000576 2 2   TARGETUNIT :=  $INT($DBL(JOBUNITS) * $DBL(TARGETPAGE) / $DBL(JOBPAGES));
000613 2 2
000613 2 2   CALL FINDBIT($MIN( $MAX(2, TARGETUNIT), JOBUNITS ));
000630 2 2
000630 2 2   CALL READ^BLOCK(USER.UNITSIZE * $DBL(LASTINDEX), 1);
```

```
1538.66   000642 2  2
1538.67   000642 2  2        END;

ERROR                           Variable     INT          Direct        S-003
JOBPAGES                        Variable     INT          Direct        S-001
JOBUNITS                        Variable     INT          Direct        S-002
TARGETPAGE                      Variable     INT          Direct        S-005
TARGETUNIT                      Variable     INT          Direct        S-000

1538.68   000644 1  1
1538.7    000644 1  1
1538.8    000644 1  1        INT SUBPROC READ^NEXT^LINE;
1539.     000644 2  1          BEGIN
1540.     000644 2  2
1541.     000644 2  2          INT ERROR := FEOK,                                                    !C08
1541.1    000644 2  2              WORD^COUNT,
1542.     000644 2  2              COUNT^READ;
1543.     000644 2  2
1544.     000644 2  2          IF $PARAM(P^SKIP^NO) AND P^SKIP^NO < 0 THEN
1545.     000655 2  2            IF USER.LAST^COUNT >= 0 THEN
1546.     000661 2  2              BEGIN                            !POINT BACK TO LAST LINE
1547.     000661 2  3                USER.THIS^COUNT := USER.LAST^COUNT;
1548.     000664 2  3                USER.LINES^PRINTED := USER.LINES^PRINTED'-'1;
1549.     000670 2  3                USER.THIS^LINE := USER.THIS^LINE'-'1;
1550.     000674 2  3              END;
1551.     000674 2  2
1552.     000674 2  2          IF NOT ERROR THEN
1553.     000676 2  2            IF USER.THIS^COUNT >= USER.COUNT !END OF BLOCK
1554.     000676 2  2              AND (ERROR := READ^BLOCK (USER.NEXT^BLOCK,1)) THEN                !C05
1555.     000714 2  2                                               !READ THE NEXT BLOCK
1556.     000714 2  2            ELSE                               !NO ERROR
1557.     000716 2  2              IF (WORD^COUNT := USER.DATA[USER.THIS^COUNT]) >= 0 THEN   !DATA LINE  B30,MBB============= #XXX
1558.     000726 2  2                BEGIN                                                   !B30,MBB============= #XXX
1559.     000726 2  3                  COUNT^READ := IF WORD^COUNT.<1> THEN                  !B30,MBB============= #XXX
1559.1    000726 2  3                          SPOOL^TEXTEXPAND(S^WORK^BUF,
1560.     000726 2  3                                          (BLOCK^SIZE'<<'1),
1561.     000726 2  3                                          USER.DATA[USER.THIS^COUNT+1],
1562.     000726 2  3                                          WORD^COUNT.<2:15> )           !B30,MBB============= #XXX
1562.1    000726 2  3                     ELSE  SPOOL^EXPAND(WORK^BUF,                       !B30,MBB============= #XXX
1562.2    000726 2  3                                          (BLOCK^SIZE'<<'1),            !B30,MBB============= #XXX
1562.3    000726 2  3                                          USER.DATA[USER.THIS^COUNT+1], !B30,MBB============= #XXX
1562.4    000726 2  3                                          WORD^COUNT,                   !B30,MBB============= #XXX
1562.5    000726 2  3                                          0);                           !B30,MBB============= #XXX
1564.     000763 2  3                  COUNT^READ := $MIN(COUNT^READ.<1:15>,P^READ);  !FIND RETURN COUNT B30,MBB============= #XXX
1565.     000773 2  3                  S^P^LINE ':=' S^WORK^BUF FOR COUNT^READ;!RETURN DATA
1566.     000777 2  3                  IF $PARAM(P^COUNT) THEN
1567.     001002 2  3                    P^COUNT := COUNT^READ;                 !RETURN COUNT
1568.     001004 2  3                  USER.LAST^COUNT := USER.THIS^COUNT;      !STORE LAST POINTER
1569.     001010 2  3                  USER.THIS^COUNT := USER.THIS^COUNT + (WORD^COUNT.<2:15> + 1);   !B30,MBB============= #XXX
1571.     001014 2  3                  USER.THIS^LINE := USER.THIS^LINE'+'1;
1572.     001020 2  3                  USER.LINES^PRINTED := USER.LINES^PRINTED'+'1;
1573.     001024 2  3                END
1574.     001024 2  2              ELSE                             !NEW PAGE MARKER
1575.     001025 2  2                IF WORD^COUNT = -1 THEN                                 !B30,MBB============= #XXX
1576.     001030 2  2                  BEGIN
1577.     001030 2  3                    USER.THIS^PAGE := USER.THIS^PAGE'+'1;
1578.     001034 2  3                    USER.THIS^LINE := 0;
```

```
1579.    001037 2  3             USER.THIS^COUNT := USER.THIS^COUNT + 1;
1580.    001042 2  3             ERROR := RETURN^HOF;          !HEAD OF PAGE FOUND
1581.    001044 2  3           END
1582.    001044 2  2         ELSE
1583.    001045 2  2           CASE (WORD^COUNT + 35) OF                                          !B30,MBB============= #XXX
1583.1   001050 2  2             BEGIN
1583.2   001050 2  3               BEGIN                                  !CONTROLBUF FOUND       C08
1583.3   001050 2 CE0                WORD^COUNT := 3 + ((USER.DATA[USER.THIS^COUNT+2]+1)'>>'1); !C08
1583.4   001063 2  4                 T^LINE := USER.DATA[USER.THIS^COUNT+1];      ! OPERATION     C08
1583.5   001071 2  4                 T^LINE[1] := @USER.DATA[USER.THIS^COUNT+3]; ! BUFFER ADDR   C08
1583.6   001103 2  4                 T^LINE[2] := USER.DATA[USER.THIS^COUNT+2];    ! COUNT        C08
1583.61  001113 2  4                 P^LINE ':=' T^LINE FOR $MIN(3,(P^READ+1)'>>'1);             !C08
1583.7   001126 2  4                 USER.LAST^COUNT := USER.THIS^COUNT; !STORE LAST POINTER     C08
1583.8   001131 2  4                 USER.THIS^COUNT := USER.THIS^COUNT + WORD^COUNT;            !C08
1583.9   001134 2  4                 IF $PARAM(P^COUNT) THEN                                     !C08
1584.    001137 2  4                   P^COUNT := $MIN(6,P^READ);                                !C08
1584.1   001146 2  4                 ERROR := SPERR^CONTROLBUF;                                  !C08
1584.2   001151 2  4               END;                                                          !C08
1584.3   001152 2 CE1              ERROR := SPERR^MISMATCH;               !-34 FOUND              C08
1585.    001156 2 CE2              BEGIN                          !SETMODE LINE FOUND
1586.    001156 2  4                 P^LINE ':=' USER.DATA[USER.THIS^COUNT+1] FOR
1587.    001156 2  4                               $MIN(3,(P^READ+1)'>>'1);
1588.    001176 2  4                 USER.LAST^COUNT := USER.THIS^COUNT; !STORE LAST POINTER
1589.    001201 2  4                 USER.THIS^COUNT := USER.THIS^COUNT + 4;
1590.    001203 2  4                 IF $PARAM (P^COUNT) THEN
1591.    001206 2  4                   P^COUNT := $MIN(6,P^READ);
1592.    001215 2  4                 ERROR := SPERR^SETMODE;
1593.    001220 2  4               END;
1594.    001221 2 CE3              BEGIN                          !CONTROL LINE FOUND
1595.    001221 2  4                 P^LINE ':=' USER.DATA[USER.THIS^COUNT+1] FOR
1596.    001221 2  4                               $MIN(2,(P^READ+1)'>>'1);
1597.    001245 2  4                 USER.LAST^COUNT := USER.THIS^COUNT; !STORE LAST POINTER
1598.    001250 2  4                 USER.THIS^COUNT := USER.THIS^COUNT + 3;
1599.    001252 2  4                 IF $PARAM (P^COUNT) THEN
1600.    001255 2  4                   P^COUNT := $MIN(4,P^READ);
1601.    001264 2  4                 ERROR := SPERR^CONTROL;
1602.    001267 2  4               END;
1603.    001270 2 CE4              OTHERWISE ERROR := SPERR^MISMATCH;
1604.    001273 2  3             END;
1605.    001310 2  2
1606.    001310 2  2
1607.    001310 2  2      RETURN ERROR;
1608.    001313 2  2
1609.    001313 2  2    END;                              !SUBPROC READ^NEXT^LINE

COUNT^READ                Variable      INT          Direct        S-000
ERROR                     Variable      INT          Direct        S-002
WORD^COUNT                Variable      INT          Direct        S-001

1610.    001313 1  1   INT SUBPROC SKIP (SP^SKIP^NO);
1611.    001313 2  1     INT SP^SKIP^NO;
1612.    001313 2  1     BEGIN
1613.    001313 2  2
1614.    001313 2  2     INT ERROR := FEOK,
1614.1   001313 2  2         FIRSTTIME := 1;                                                  !C05
1614.2   001313 2  2       IF NOT USER.DATA^FILE THEN                                         !B30,MBB============= #XXX
```

```
001320 2 2      RETURN SPERR^MISMATCH;  ! NO SKIP ON $RECEIVE                B30,MBB============= #XXX
001324 2 2                                        !FIND BLOCK WITH THAT PAGE
001324 2 2   WHILE NOT (USER.STPAGE < SP^SKIP^NO
001324 2 2           AND USER.ENDPAGE >= SP^SKIP^NO) !BLOCK FOUND
001324 2 2       AND NOT ERROR DO                   !AND NO ERROR
001340 2 2     BEGIN
001340 2 3                                                                    !C05
001340 2 3     IF FIRSTTIME AND $ABS(SP^SKIP^NO - USER.STPAGE) > 10 THEN     !C05
001352 2 3        CALL PRINTSEARCH(SP^SKIP^NO);                              '!C05
001355 2 3                                                                    !C05
001355 2 3     IF USER.STPAGE < SP^SKIP^NO THEN  !READ FORWARDS
001362 2 3        IF (ERROR := READ^BLOCK(USER.NEXT^BLOCK,1)) = SPERR^EOF THEN      !C05
001374 2 3           BEGIN
001374 2 4           SP^SKIP^NO := USER.ENDPAGE;
001377 2 4           ERROR := RETURN^INTERNAL;
001401 2 4           END
001401 2 3        ELSE
001404 2 3     ELSE                                    !READ BACK
001405 2 3       IF (ERROR := READ^BLOCK(USER.LAST^BLOCK,1)) = SPERR^EOF THEN       !C05
001417 2 3
001421 2 3          ERROR := RETURN^INTERNAL;
001421 2 3
001423 2 3     FIRSTTIME := 0;
001423 2 3                                                                    !C05
001424 2 2     END;                                                           !C05
001424 2 2                                                                    !C05
001427 2 2   IF ERROR = RETURN^INTERNAL THEN          !SKIPPED TO START
001431 2 2     ERROR := FEOK;
001431 2 2
001433 2 2   IF NOT ERROR THEN
001433 2 3     BEGIN
001440 2 3       IF USER.THIS^PAGE >= SP^SKIP^NO THEN
001440 2 4         BEGIN  ! RESTART SEARCH AT BEGENNING OF BLOCK
001443 2 4           USER.THIS^COUNT := 0;
001446 2 4           USER.LAST^COUNT := -1;
001452 2 4           USER.THIS^PAGE := USER.STPAGE;
001452 2 3         END;
001457 2 3       WHILE USER.THIS^PAGE < SP^SKIP^NO DO  !SKIP WITHIN BLOCK
001466 2 3         IF USER.DATA[USER.THIS^COUNT] >= 0 THEN  !DATA LINE
001466 2 4           BEGIN
001471 2 4             USER.LAST^COUNT := USER.THIS^COUNT;
001471 2 4             USER.THIS^COUNT := USER.THIS^COUNT + 1 +
001503 2 4                       USER.DATA[USER.THIS^COUNT].<2:15>;
001503 2 3           END                                                  !B30,MBB============= #XXX
001504 2 3         ELSE
001513 2 3           IF USER.DATA[USER.THIS^COUNT] = -1 THEN !PAGE MARKER
001513 2 4             BEGIN
001515 2 4               USER.THIS^COUNT := USER.THIS^COUNT + 1;
001520 2 4               USER.THIS^LINE := 0;
001524 2 4               USER.THIS^PAGE := USER.THIS^PAGE'+'1;
001524 2 3             END
001525 2 3           ELSE
001525 2 4             BEGIN
001531 2 4               USER.LAST^COUNT := USER.THIS^COUNT;
001537 2 4               CASE (USER.DATA[USER.THIS^COUNT] + 35) OF           !C08
001537 2 5                 BEGIN
001537 2 CEO                 USER.THIS^COUNT := USER.THIS^COUNT +     !CONTROLBUF     C08
```

```
1659.3    001537 2  5                                        ((USER.DATA[USER.THIS^COUNT+2]+1)'>>'1)!C08
1659.4    001554 2 CE1                                       + 3;                                    !C08
1660.     001560 2 CE2                     ERROR := SPERR^MISMATCH;                   !-34            C08
1661.     001564 2 CE3                     USER.THIS^COUNT := USER.THIS^COUNT + 4; !SETMODE
1662.     001570 2 CE4                     USER.THIS^COUNT := USER.THIS^COUNT + 3; !CONTROL
1663.     001573 2  5                      OTHERWISE ERROR := SPERR^MISMATCH;
1664.     001610 2  4                    END;
1665.     001611 2  3                END;
1666.     001611 2  2        END;
1667.     001614 2  2      RETURN ERROR;
1668.     001614 2  2
                        END;                                 !SUBPROC SKIP
ERROR
FIRSTTIME                 Variable       INT          Direct          S-001
SP^SKIP^NO                Variable       INT          Direct          S-000
                          Variable       INT          Direct          S-003
 1670.    001614 1  1
 1671.    001614 1  1     IF NOT (ERROR := PREAD^VALID^PARAMS) THEN
 1672.    001643 1  1       BEGIN                                  !PARAMETERS VALID
 1673.    001643 1  2         IF $PARAM (P^SKIP^NO) AND P^SKIP^NO > 0 AND (ERROR := SKIP (P^SKIP^NO)) THEN
 1674.    001656 1  2                                                !SKIP TO PAGE NUMBER
 1675.    001656 1  2         ELSE                                   !NO SKIP ERROR
 1676.    001661 1  2           BEGIN
 1677.    001661 1  3             ERROR := RETURN^HOF;               !READ THE NEXT NOT HEADING LINE
 1678.    001663 1  3             WHILE ERROR = RETURN^HOF DO
 1679.    001666 1  3               ERROR := READ^NEXT^LINE;
 1680.    001672 1  3           END;
 1681.    001672 1  2
 1682.    001672 1  2         IF ERROR = SPERR^EOF                 !VALID END OF FILE
 1683.    001672 1  2           AND (USER.NOCOPIES := USER.NOCOPIES-1) > 0 THEN
 1684.    001704 1  2                                                !MORE COPIES
 1685.    001704 1  2           IF NOT (ERROR := SKIP (1))  THEN     !SKIP TO FIRST PAGE
 1686.    001711 1  2             ERROR := SPERR^ENDOFCOPY;
 1687.    001714 1  2
 1688.    001714 1  2       END;
 1689.    001714 1  1
 1690.    001714 1  1     RETURN ERROR;
 1691.    001716 1  1
 1692.    001716 1  1   END;                                         !PRINTREAD

APB                       Variable,2000  STRUCT-I     Indirect        L+001
BITCOUNT                  Variable       INT          Direct          L+002
ERROR                     Variable       INT          Direct          L+011
FINDBIT                   Subproc                     %000307
LASTINDEX                 Variable       INT          Direct          L+003
NEXTTOLASTINDEX           Variable       INT          Direct          L+004
PREAD^VALID^PARAMS        Subproc        INT          %000000
PRINTSEARCH               Subproc                     %000457
P^BUFFER                  Variable       INT          Indirect        L-010
P^COUNT                   Variable       INT          Indirect        L-005
P^LINE                    Variable       INT          Indirect        L-007
P^READ                    Variable       INT          Direct          L-006
P^SKIP^NO                 Variable       INT          Direct          L-004
READ^BLOCK                Subproc        INT          %000027
READ^NEXT^LINE            Subproc        INT          %000644
RETURN^HOF                Literal        INT          %177777
RETURN^INTERNAL           Literal        INT          %177776
```

```
SKIP              Subproc          INT        %001313
STARTINDEX        Variable         INT        Direct      L+005
S^P^LINE          Variable         STRING     Indirect    L+007
S^WORK^BUF        Variable         STRING     Indirect    L+010
T^LINE            Variable         INT        Indirect    L+006
USER              Variable,2034    STRUCT-I   Indirect    L-010
WORK^BUF          Variable         INT        Indirect    L+001

000000 0  0   INT PROC
000000 0  0   PRINTINFO(BLKBUF, COPY, PAGE, LINE, TOTLINES) VARIABLE;
000000 1  0   INT
000000 1  0    .BLKBUF,      ! BLOCKING BUFFER
000000 1  0    .COPY,      ! NUMBER OF COPIES LEFT
000000 1  0    .PAGE,      ! PAGE NUMBER
000000 1  0    .LINE,      ! LINE NUMBER
000000 1  0    .TOTLINES;      ! TOTAL LINES
000000 1  0
000000 1  0     BEGIN
000000 1  1
000000 1  1     INT
000000 1  1       .USER(PPBLOCK)=BLKBUF,      ! PRINT PROCESS BLOCKING BUFFER
000000 1  1       ERROR;     ! ERROR TEMP
000000 1  1
000000 1  1     ! PRINTINFO CODE
000000 1  1
000000 1  1     IF NOT $PARAM(BLKBUF) THEN
000004 1  1       RETURN SPERR^PARAM;
000006 1  1
000006 1  1     IF $PARAM(PAGE) THEN
000011 1  1       PAGE:=USER.THIS^PAGE;
000014 1  1     IF $PARAM(LINE) THEN
000017 1  1       LINE:=USER.THIS^LINE;
000022 1  1     IF $PARAM(TOTLINES) THEN
000025 1  1       TOTLINES:=USER.LINES^PRINTED;
000030 1  1     IF $PARAM(COPY) THEN
000033 1  1       COPY:=USER.NOCOPIES;
000036 1  1
000036 1  1     RETURN FEOK;
000040 1  1     END;  ! PROC PRINTINFO

BLKBUF            Variable         INT        Indirect    L-010
COPY              Variable         INT        Indirect    L-007
ERROR             Variable         INT        Direct      L+001
LINE              Variable         INT        Indirect    L-005
PAGE              Variable         INT        Indirect    L-006
TOTLINES          Variable         INT        Indirect    L-004
USER              Variable,2034    STRUCT-I   Indirect    L-010
```

```
1726.     000000 0  0   INT PROC
1727.     000000 0  0   PRINTSTART(BLKBUF, MSGBUF, DATAFILE);
1728.     000000 1  0   INT
1729.     000000 1  0     .BLKBUF,     ! BLOCKING BUFFER
1730.     000000 1  0     .MSGBUF,     ! MESSAGE FROM SPOOL SUPERVISOR
1731.     000000 1  0     DATAFILE;     ! FILE TO THE DATA FILE WHICH CONTAINS THE SPOOLED DATA
1732.     000000 1  0
1733.     000000 1  0     BEGIN
1734.     000000 1  1
1735.     000000 1  1     INT
1736.     000000 1  1       .USER(PPBLOCK)=BLKBUF,     ! PRINT PROCESS BLOCKING BUFFER
1737.     000000 1  1       .STARTMESS(PPCONTROL)=MSGBUF,     ! COMMUNICATIONS BUFFER
1737.01   000000 1  1       .DJOB(DJOB^HEADER)=BLKBUF,                                   !B30,MBB============= #XXX
1737.1    000000 1  1       FILECODE,                                                    !B30,MBB============= #XXX
1737.2    000000 1  1       DEVTYPE,                                                     !B30,MBB============= #XXX
1738.     000000 1  1       ERROR;     ! ERROR TEMP
1739.     000000 1  1
1740.     000000 1  1     ! PRINTSTART CODE
1741.     000000 1  1
1741.001 000000 1  1     IF NOT DATAFILE THEN                                           !B30,MBB============= #XXX
1741.002 000003 1  1       BEGIN   ! $RECEIVE                                           B30,MBB============= #XXX
1741.003 000003 1  2       MSGBUF := 0;                                                 !B30,MBB============= #XXX
1741.004 000005 1  2       MSGBUF[1] ':=' MSGBUF FOR 63;    ! CLEAR STARTMESS           B30,MBB============= #XXX
1741.005 000012 1  2       END                                                          !B30,MBB============= #XXX
1741.006 000012 1  1     ELSE IF NOT MSGBUF THEN                                        !B30,MBB============= #XXX
1741.007 000015 1  1       BEGIN  ! MUST BE DJOB FILE                                   B30,MBB============= #XXX
1741.008 000015 1  2       CALL FILEINFO(DATAFILE, , , , DEVTYPE, , , , , FILECODE);    !B30,MBB============= #XXX
1741.009 000034 1  2       IF <> THEN GOTO ERROR^EXIT;                                  !B30,MBB============= #XXX
1741.01   000036 1  2       IF DEVTYPE.<4:9> <> 3 OR FILECODE <> DJOB^FILECODE THEN      !B30,MBB============= #XXX
1741.04   000046 1  2         RETURN SPERR^MISMATCH;                                     !B30,MBB============= #XXX
1741.05   000051 1  2       CALL POSITION(DATAFILE, 0D);                                 !B30,MBB============= #XXX
1741.07   000055 1  2       IF <> THEN                                                   !B30,MBB============= #XXX
1741.071 000056 1  2         BEGIN                                                      !B30,MBB============= #XXX
1741.072 000056 1  3     ERROR^EXIT:                                                    !B30,MBB============= #XXX
1741.073 000056 1  3         CALL FILEINFO(DATAFILE, ERROR);                            !B30,MBB============= #XXX
1741.074 000067 1  3         RETURN ERROR LOR SPERR^DATA^FE;                            !B30,MBB============= #XXX
1741.075 000072 1  3         END;                                                       !B30,MBB============= #XXX
1741.08   000072 1  2       CALL READ(DATAFILE, DJOB, $LEN(DJOB) );                      !B30,MBB============= #XXX
1741.21   000102 1  2       IF <> THEN GOTO ERROR^EXIT;                                  !B30,MBB============= #XXX
1741.22   000104 1  2       IF DJOB.VERSION <> [DJOB^VERSION, MSG^PRINT^CONTROL, SPOOL^CHECK]    !B30,MBB============= #XXX
1741.3    000104 1  2   !B00,MBB============ #XXX                                       B30,MBB============= #XXX
1741.42   000104 1  2           OR DJOB.SYNC <> [MSG^BLOCK, BLOCK^SIZE'*'2, DJOB^NUM]   !B30,MBB============= #XXX
1741.43   000104 1  2           OR DJOB.UNITSIZE <> DJOB^UNITSIZE THEN                  !B30,MBB============= #XXX
1741.6    000127 1  2         RETURN SPERR^MISMATCH;                                     !B30,MBB============= #XXX
1741.62   000134 1  2       CALL SETMODE (DATAFILE, 93, DJOB^BUFFSIZE);  ! DP2 CACHE SIZE = 4K BLOCKS   B30,MBB============= #XXX
1741.63   000143 1  2       ! IGNORE ERRORS ON ABOVE CALL IN CASE USING A DP1 DISC       B30,MBB============= #XXX
1741.7    000143 1  2       STARTMESS ':=' DJOB.MSG FOR ( $LEN(STARTMESS) / 2);          !B30,MBB============= #XXX
1741.8    000150 1  2       END;                                                         !B30,MBB============= #XXX
1742.     000150 1  1
1742.1    000150 1  1     CALL SETMODE (DATAFILE, 91, 3);  ! SEQUENTIAL I/O ACCESS       B30,MBB============= #XXX
1742.2    000157 1  1     ! IGNORE ERRORS ON ABOVE CALL IN CASE USING A DP1 DISC         B30,MBB============= #XXX
1743.     000157 1  1     USER.NOCOPIES:=STARTMESS.NOCOPIES;
1744.     000163 1  1     USER.THIS^PAGE:=0;
1745.     000166 1  1     USER.THIS^LINE:=0;
1746.     000171 1  1     USER.DATA^FILE:=DATAFILE;
1747.     000174 1  1     USER.LINES^PRINTED:=0;
1748.     000177 1  1     USER.LAST^COUNT:=-1;
```

```
000202 1   1       USER.THIS^COUNT:=0;
000205 1   1       USER.PAGES := STARTMESS.PAGES;
000211 1   1       USER.UNITSALLOCATED := STARTMESS.UNITSALLOCATED;                     !C05
000215 1   1       USER.UNITSIZE := $DBL(STARTMESS.UNITSIZE) * $DBL(BLOCK^SIZE'<<'1);   !C05
000227 1   1       USER.BITMAP^BLOCK := STARTMESS.BLOCK - $DBL(BLOCK^SIZE*2);           !C06
000237 1   1       USER.MSG:=STARTMESS.SYNC;                                            !C05
000242 1   1       USER.JOB:=STARTMESS.JOB;
000246 1   1       USER.STPAGE:=0;
000251 1   1       USER.ENDPAGE:=0;
000254 1   1       USER.NEXT^BLOCK:=STARTMESS.BLOCK;
000261 1   1       USER.LAST^BLOCK:=-1D;
000265 1   1       USER.COUNT:=0;
000270 1   1
000270 1   1       RETURN FEOK;
000272 1   1       END;  ! PROC PRINTSTART

BLKBUF                 Variable        INT          Indirect     L-005
DATAFILE               Variable        INT          Direct       L-003
DEVTYPE                Variable        INT          Direct       L+002
DJOB                   Variable,220    STRUCT-I     Indirect     L-005
ERROR                  Variable        INT          Direct       L+003
ERROR^EXIT             Label                        %000056
FILECODE               Variable        INT          Direct       L+001
MSGBUF                 Variable        INT          Indirect     L-004
STARTMESS              Variable,200    STRUCT-I     Indirect     L-004
USER                   Variable,2034   STRUCT-I     Indirect     L-005
000000 0   0   INT PROC
000000 0   0   PRINTSTATUS(FILE, MSGBUF, TYPE, DEVICE, ERROR,
000000 1   0               COPY, PAGE, LINE, TOTLINES) VARIABLE;
000000 1   0   INT
000000 1   0     FILE,     ! FILE TO THE SPOOL SUPERVISOR
000000 1   0     .MSGBUF,     ! BUFFER FOR SPOOL SUPERVISOR
000000 1   0     TYPE,     ! TYPE OF STATUS
000000 1   0     .DEVICE,     ! DEVICE NAME
000000 1   0     ERROR,     ! ERROR
000000 1   0     COPY,     ! NUMBER OF COPIES LEFT
000000 1   0     PAGE,     ! PAGE NUMBER
000000 1   0     LINE,     ! LINE NUMBER
000000 1   0     TOTLINES;     ! TOTAL LINES
000000 1   0
000000 1   0     BEGIN
000000 1   1
000000 1   1     INT
000000 1   1       .ENDMESS(PPSTATUS)=MSGBUF,     ! COMMUNICATIONS BUFFER
000000 1   1       .PROMPT(PPPROMPT)=MSGBUF;     ! COMMUNICATIONS BUFFER
000000 1   1
000000 1   1     ! PRINTSTATUS CODE
000000 1   1
000000 1   1     IF NOT $PARAM(FILE) OR
000000 1   1        NOT $PARAM(MSGBUF) OR
000000 1   1        NOT $PARAM(TYPE) THEN
000011 1   1       RETURN SPERR^PARAM;
000013 1   1
000013 1   1
000013 1   1     IF TYPE < 0 OR
000013 1   1        TYPE > 5 THEN
000021 1   1       RETURN SPERR^CONTENT;
```

```
000024 1   1
000024 1   1      CASE TYPE OF
000026 1   1        BEGIN  ! CASE ON TYPE
000026 1   2
000026 1   2        IF NOT $PARAM(DEVICE) OR
000026 1 CE0           NOT $PARAM(COPY) OR
000026 1   2           NOT $PARAM(TOTLINES) OR
000026 1   2           NOT $PARAM(PAGE) OR
000026 1   2           NOT $PARAM(LINE) THEN
000045 1   2          RETURN SPERR^PARAM;
000050 1 CE1
000050 1   2        IF NOT $PARAM(ERROR) OR
000050 1   2           NOT $PARAM(DEVICE) THEN
000056 1   2          RETURN SPERR^PARAM;
000061 1 CE2
000061 1   2        IF NOT $PARAM(DEVICE) THEN
000064 1   2          RETURN SPERR^PARAM;
000067 1 CE3
000067 1   2        IF NOT $PARAM (DEVICE) THEN
000072 1   2          RETURN SPERR^PARAM;
000075 1 CE4
000075 1   2        IF NOT $PARAM(ERROR) THEN
000100 1   2          RETURN SPERR^PARAM;
000103 1 CE5
000103 1   2        IF NOT $PARAM(ERROR) OR
000103 1   2           NOT $PARAM(DEVICE) THEN
000111 1   2          RETURN SPERR^PARAM;
000114 1 CE6
000114 1   2        END;  ! CASE ON TYPE
000123 1   1
000123 1   1      CALL CANCEL(FILE);
000126 1   1      ENDMESS.TYPE:=TYPE;
000131 1   1      IF $PARAM(DEVICE) THEN
000134 1   1        ENDMESS.DEVICE ':=' DEVICE FOR WLEN^DEVICENAME
000134 1   1      ELSE
000142 1   1        BLANKFILL(ENDMESS.DEVICE, WLEN^DEVICENAME);
000154 1   1
000154 1   1      IF $PARAM(ERROR) THEN
000157 1   1        ENDMESS.ERROR:=ERROR
000157 1   1      ELSE
000164 1   1        ENDMESS.ERROR:=FEOK;
000167 1   1
000167 1   1      CALL SPOOL^CHECKMSG(MSG^PRINT^STATUS, MSGBUF, $LEN(ENDMESS));
000176 1   1      CALL WRITE(FILE, MSGBUF, $LEN(ENDMESS));
000206 1   1      IF = THEN
000207 1   1        CALL AWAITIO(FILE,,,, PRINTPROCESS^TIMEOUT);
000220 1   1      IF <> THEN
000221 1   1        BEGIN
000221 1   2        CALL FILEINFO(FILE, ERROR);
000232 1   2        RETURN  ERROR+SPERR^CONTROL^FE;
000236 1   2        END;
000236 1   1
000236 1   1      CALL SPOOL^CHECKMSG(MSG^PRINT^PROMPT, MSGBUF, $LEN(PPWAKEUP));
000245 1   1      CALL WRITEREAD (FILE, MSGBUF, $LEN(PROMPT), $LEN(PPWAKEUP));
000256 1   1      IF <> THEN
000257 1   1        BEGIN
000257 1   2        CALL FILEINFO(FILE, ERROR);
```

```
1849.    000270 1  2        RETURN ERROR+SPERR^CONTROL^FE;
1850.    000274 1  2        END;
1851.    000274 1  1
1852.    000274 1  1      RETURN FEOK;
1853.    000276 1  1      END;   ! PROC PRINTSTATUS

COPY                        Variable      INT          Direct     L-007
DEVICE                      Variable      INT          Indirect   L-011
ENDMESS                     Variable,50   STRUCT-I     Indirect   L-013
ERROR                       Variable      INT          Direct     L-010
FILE                        Variable      INT          Direct     L-014
LINE                        Variable      INT          Direct     L-005
MSGBUF                      Variable      INT          Indirect   L-013
PAGE                        Variable      INT          Direct     L-006
PROMPT                      Variable,4    STRUCT-I     Indirect   L-013
TOTLINES                    Variable      INT          Direct     L-004
TYPE                        Variable      INT          Direct     L-012
1855.   000000 0  0   INT PROC
1856.   000000 0  0   PRINTCOMPLETE(FILE, MSGBUF);
1857.   000000 1  0   INT
1858.   000000 1  0     FILE,    ! FILE TO SPOOL SUPERVISOR
1859.   000000 1  0     .MSGBUF;    ! BUFFER FOR SPOOL SUPERVISOR
1860.   000000 1  0
1861.   000000 1  0     BEGIN
1862.   000000 1  1
1863.   000000 1  1     INT
1864.   000000 1  1       .PROMPT(PPPROMPT)=MSGBUF,     ! COMMUNICATIONS BUFFER TEMPLATE
1865.   000000 1  1       .GIMME(PPGIMME)=MSGBUF,     ! COMMUNICATIONS BUFFER TEMPLATE
1866.   000000 1  1       .WAKEUP(PPWAKEUP)=MSGBUF,     ! COMMUNICATIONS BUFFER TEMPLATE
1867.   000000 1  1       .CONT(PPCONTROL)=MSGBUF,     ! COMMUNICATIONS BUFFER TEMPLATE
1868.   000000 1  1       ERROR,    ! ERROR TEMP
1869.   000000 1  1       COUNT^READ;    ! COUNT RETURNED FROM AWAITIO
1870.   000000 1  1
1871.   000000 1  1     ! PRINTCOMPLETE CODE
1872.   000000 1  1
1873.   000000 1  1     CALL FILEINFO(FILE, ERROR);
1874.   000012 1  1     IF ERROR THEN
1875.   000014 1  1       RETURN ERROR+SPERR^CONTROL^FE;
1876.   000020 1  1
1877.   000020 1  1     IF (ERROR^IN SPOOL^CHECKMSG(, WAKEUP, $LEN(WAKEUP))) OR
1878.   000020 1  1         WAKEUP.MSG<>MSG^PRINT^WAKEUP THEN
1879.   000033 1  1       RETURN SPERR^INV^MSG;
1880.   000036 1  1
1881.   000036 1  1     CALL SPOOL^CHECKMSG(MSG^PRINT^GIMME, GIMME, $LEN(GIMME));
1882.   000045 1  1     CALL WRITEREAD (FILE, GIMME, $LEN(GIMME), $LEN(CONT));
1883.   000056 1  1     IF <> THEN
1884.   000057 1  1       BEGIN
1885.   000057 1  2       CALL FILEINFO(FILE, ERROR);
1886.   000070 1  2       RETURN ERROR+SPERR^CONTROL^FE;
1887.   000074 1  2       END;
1888.   000074 1  1
1889.   000074 1  1     CALL AWAITIO (FILE,, COUNT^READ,, PRINTPROCESS^TIMEOUT);
1890.   000107 1  1     IF <> THEN
1891.   000110 1  1       BEGIN
1892.   000110 1  2       CALL FILEINFO(FILE, ERROR);
1893.   000121 1  2       RETURN ERROR+SPERR^CONTROL^FE;
1894.   000125 1  2       END;
```

```
000125 1  1
000125 1  1      IF (ERROR^IN SPOOL^CHECKMSG(, CONT, $LEN(CONT))) OR
000125 1  1         CONT.MSG<>MSG^PRINT^CONTROL THEN
000140 1  1        RETURN SPERR^INV^MSG;
000143 1  1
000143 1  1      CALL SPOOL^CHECKMSG(MSG^PRINT^PROMPT, PROMPT, $LEN(PROMPT));
000152 1  1      CALL WRITEREAD (FILE, PROMPT, $LEN(PROMPT), $LEN(PPWAKEUP));
000163 1  1      IF <> THEN
000164 1  1        BEGIN
000164 1  2        CALL FILEINFO(FILE, ERROR);
000175 1  2        ERROR:=ERROR+SPERR^CONTROL^FE;
000177 1  2        END;
000177 1  1
000177 1  1      RETURN FEOK;
000201 1  1      END;  ! PROC PRINTCOMPLETE

CONT                        Variable,200   STRUCT-I      Indirect     L-003
  COUNT^READ                  Variable       INT           Direct       L+002
  ERROR                       Variable       INT           Direct       L+001
  FILE                        Variable       INT           Direct       L-004
  GIMME                       Variable,4     STRUCT-I      Indirect     L-003
  MSGBUF                      Variable       INT           Indirect     L-003
  PROMPT                      Variable,4     STRUCT-I      Indirect     L-003
  WAKEUP                      Variable,4     STRUCT-I      Indirect     L-003

000000 0  0      INT PROC
000000 0  0      PRINTINIT(FILE, MSGBUF);
000000 1  0      INT
000000 1  0        FILE,     ! FILE TO SPOOL SUPERVISOR
000000 1  0        .MSGBUF;     ! BUFFER FOR SPOOL SUPERVISOR
000000 1  0
000000 1  0        BEGIN
000000 1  1
000000 1  1        INT
000000 1  1          .PROMPT(PPPROMPT)=MSGBUF,     ! COMMUNICATIONS BUFFER
000000 1  1          ERROR;     ! ERROR TEMP
000000 1  1
000000 1  1        ! PRINTINIT CODE
000000 1  1
000000 1  1        CALL SPOOL^CHECKMSG(MSG^PRINT^PROMPT, MSGBUF, $LEN(PROMPT));
000010 1  1        CALL WRITEREAD (FILE, MSGBUF, $LEN(PROMPT), $LEN(PPWAKEUP));
000021 1  1        IF <> THEN
000022 1  1          BEGIN
000022 1  2          CALL FILEINFO(FILE, ERROR);
000033 1  2          RETURN ERROR+SPERR^CONTROL^FE;
000037 1  2          END;
000037 1  1
000037 1  1        RETURN FEOK;
000041 1  1        END;  ! PROC PRINTINIT

ERROR                       Variable       INT           Direct       L+001
FILE                        Variable       INT           Direct       L-004
MSGBUF                      Variable       INT           Indirect     L-003
PROMPT                      Variable,4     STRUCT-I      Indirect     L-003
```

```
000000 0  0   INT PROC SPOOLERCOMMAND (P^FILE,P^COMMAND,P^COMMAND^VAL,P^SUBCOMMAND,P^SUB^VAL)
000000 1  0                          VARIABLE;
000000 1  0     INT P^FILE;                        !FILE NUMBER TO CONTROL PROCESS
000000 1  0     INT P^COMMAND;                     !COMMAND NUMBER
000000 1  0     INT .P^COMMAND^VAL;                !COMMAND ARRAY, DEPENDS ON COMMAND NUMBER
000000 1  0     INT P^SUBCOMMAND;                  !SUBCOMMAND NUMBER
000000 1  0     INT .P^SUB^VAL;                    !SUBCOMMAND VALUE
000000 1  0     BEGIN
000000 1  1
000000 1  1       LITERAL NUM^COMMANDS = 6,      !NUMBER OF VALID COMMANDS
000000 1  1               NUM^SUBCOMMANDS = 39;!NUMBER OF VALID SUB-COMMANDS              C11 E3
000000 1  1       DEFINE  REQUIRED = <0>#,       !COMMAND TABLE BITS
000000 1  1               LENGTH = <1:6>#,
000000 1  1               VALID = <7:12>#,
000000 1  1               DEFAULT = <13:15>#;
000000 1  1
000000 1  1       INT .COMMAND^TABLE[0:(2 * NUM^COMMANDS) + 1] := [                      !C12
000000 1  1       !   THE COMMAND TABLE DESCRIBES THE COMMAND VALIDATION
000000 1  1       !   THERE ARE TWO WORDS FOR EACH COMMAND :-
000000 1  1           %140270,1,      !DEV REQUIRED FILE NAME
000002 1  1           %102020,2,      !JOB REQUIRED JOB NUMBER
000004 1  1           %020222,3,      !LOC ANY FORM OF LOCATION NAME
000006 1  1           %106160,4,      !COLLECT REQUIRED PROC NAME
000010 1  1           %106160,5,      !PRINT REQUIRED PROC NAME
000012 1  1           %000000,6,      !SPOOLER ANY VALUE
000014 1  1           %000000,0];     !STOPPER
000016 1  1       INT .SUBCOMMAND^TABLE[0:(2 * NUM^SUBCOMMANDS) + 1] := [                !C12
000016 1  1       !   FORMATTED AS FOR COMMAND TABLE
000016 1  1           %000000,100,        !NO SUBCOMMAND
000020 1  1           %102020,101,        !SPEED REQUIRED >0
000022 1  1           %106160,102,        !PROCESS REQUIRED PROC NAME
000024 1  1           %002110,103,        !EXCLUSIVE =1, 2 OR DEFAULT 0   !              !C11 E3
000026 1  1           %002040,104,        !FIFO = 1 OR DEFAULT 0
000030 1  1           %102020,105,        !RETRY REQUIRED >0
000032 1  1           %102030,106,        !TIMEOUT REQUIRED >=-1
000034 1  1           %020142,107,        !FORM  1ST ALPHA
000036 1  1           %102000,108,        !SKIP ANY VALUE
000040 1  1           %102020,109,        !SKIPTO REQUIRED >0
000042 1  1           %002110,110,        !HEADER =1 OR DEFAULT 0    !                   !C13,AT #3
000044 1  1           %100000,111,        !SUSPEND ANY VALUE
000046 1  1           %002040,112,        !CLEAR = 1 DEFAULT 0
000050 1  1           %000000,113,        !DOWN NO PARAMETER
000052 1  1           %000000,114,        !DRAIN NO PARAMETER
000054 1  1           %000000,115,        !START NO PARAMETER
000056 1  1           %000000,116,        !DELETE NO PARAMETER
000060 1  1           %102020,117,        !JOB REQUIRED >0
000062 1  1           %002040,118,        !TRUNC = 1 OR DEFAULT 0
000064 1  1           %102030,119,        !WIDTH REQUIRED >= -1
000066 1  1           %102010,120,        !RESTART INTERVAL 0 TO 32767 !                 !C11 E1
000070 1  1           %002040,121,        !HOLDAFTER =1 OR DEFAULT 0
000072 1  1           %002040,122,        !HOLD = 1 OR DEFAULT 0
000074 1  1           %102020,123,        !COPIES REQUIRED >0
000076 1  1           %020152,124,        !REPORT 1ST ALPHA SPACES OK
000100 1  1           %020222,125,        !LOC GROUP OR LOCATION NAME
000102 1  1           %102050,126,        !SELPRI REQUIRED >=0 < 8
000104 1  1           %102000,127,        !OWNER, ANY VALUE IS OK
000106 1  1           %040272,131,        !DEV OPTIONAL FILE NAME
```

```
1992.    000110 1  1        %002040,132,        !BROADCAST = 1OR DEFAULT 0
1993.    000112 1  1        %130230,141,        !FILE REQUIRED FILE NAME FORMAT
1994.    000114 1  1        %102060,142,        !CPU REQUIRED >=0 < 16
1995.    000116 1  1        %002061,143,        !BACKUP  >=-1 < 16
1996.    000120 1  1        %102070,144,        !PRI REQUIRED >0 <200
1997.    000122 1  1        %130230,145,        !DATA REQUIRED FILE NAME
1998.    000124 1  1        %102100,146,        !UNIT REQUIRED >=2
1999.    000126 1  1        %002040,147,        !DEBUG= 1 OR DEFAULT 0
2000.    000130 1  1        %102000,148,        !PARM ANY VALUE
2001.    000132 1  1        %030242,151,        !ERRLOG REQUIRED FILE NAME!
2002.    000134 1  1        %000000,000];       !STOPPER                                  !C13,AT #2
2003.    000136 1  1                                                                      !C12
2003.1   000136 1  1    INT .COMMAND^MATRIX = 'P' :=[                                     !C12
2004.    000136 1  1    !   DESCRIBES VALID COMMAND - SUBCOMMAND COMBINATIONS
2005.    000136 1  1        1,100,
2006.    000140 1  1        1,101,
2007.    000142 1  1        1,102,
2008.    000144 1  1        1,103,
2009.    000146 1  1        1,104,
2010.    000150 1  1        1,105,
2011.    000152 1  1        1,106,
2012.    000154 1  1        1,107,
2013.    000156 1  1        1,108,
2014.    000160 1  1        1,109,
2015.    000162 1  1        1,110,
2016.    000164 1  1        1,111,
2017.    000166 1  1        1,112,
2018.    000170 1  1        1,113,
2019.    000172 1  1        1,114,
2020.    000174 1  1        1,115,
2021.    000176 1  1        1,116,
2022.    000200 1  1        1,117,
2023.    000202 1  1        1,118,
2024.    000204 1  1        1,119,
2024.1   000206 1  1        1,120,                                                        !C11 E1
2025.    000210 1  1        1,148,
2026.    000212 1  1        2,115,
2027.    000214 1  1        2,121,
2028.    000216 1  1        2,122,
2029.    000220 1  1        2,123,
2030.    000222 1  1        2,124,
2031.    000224 1  1        2,107,
2032.    000226 1  1        2,125,
2033.    000230 1  1        2,126,
2034.    000232 1  1        2,127,
2035.    000234 1  1        2,116,
2036.    000236 1  1        3,100,
2037.    000240 1  1        3,131,
2038.    000242 1  1        3,132,
2039.    000244 1  1        3,116,
2040.    000246 1  1        4,100,
2041.    000250 1  1        4,114,
2042.    000252 1  1        4,115,
?043.    000254 1  1        4,141,
'044.    000256 1  1        4,142,
045.     000260 1  1        4,143,
046.     000262 1  1        4,144,
```

```
000264 1  1           4,145,
000266 1  1           4,146,
000270 1  1           4,147,
000272 1  1           4,116,
000274 1  1           5,100,
000276 1  1           5,115,
000300 1  1           5,141,
000302 1  1           5,142,
000304 1  1           5,143,
000306 1  1           5,144,
000310 1  1           5,147,
000312 1  1           5,148,
000314 1  1           5,116,
000316 1  1           6,115,
000320 1  1           6,114,
000322 1  1           6,151,
000324 1  1           6,147,
000326 1  1           0,0];
000330 1  1
000330 1  1
000330 1  1       STRUCT .COMMAND^MESS(SCOMMAND);
000330 1  1       INT ERROR := 0,         !ERROR RETURNED
000330 1  1           .ERRORRTN(SERROR)=COMMAND^MESS,
000330 1  1           COUNT^READ;
000330 1  1       INT .ZEROS[0:15] := 16*[0],
000350 1  1           .SPACES[0:15] := [16*["  "]];
000370 1  1
000370 1  1       INT SUBPROC FIND^COMMAND(TABLE,COMMAND);
000370 2  1         INT .TABLE;                           !COMMAND TABLE
000370 2  1         INT COMMAND;                          !COMMAND NUMBER
000370 2  1           BEGIN
000370 2  2           INT I := 0;
000370 2  2           INT NOTFOUND := -1;
000370 2  2             WHILE NOTFOUND AND I >= 0 DO
000400 2  2               BEGIN
000400 2  3                 IF TABLE[I+1] = 0 THEN
000405 2  3                   I := -1
000405 2  3                 ELSE
000410 2  3                   IF TABLE[I+1] = COMMAND THEN
000416 2  3                     NOTFOUND := 0
000416 2  3                   ELSE
000421 2  3                     I := I+2;
000423 2  3               END;
000424 2  2             RETURN I;                         !RETURN TABLE ENTRY # OR -1
000427 2  2           END;                                !SUBPROC FIND^COMMAND

COMMAND                   Variable      INT          Direct        S-003
I                         Variable      INT          Direct        S-001
NOTFOUND                  Variable      INT          Direct        S-000
TABLE                     Variable      INT          Indirect      S-004

000427 1  1    !  INT .COMMAND^MATRIX = 'P' := [                                C12
000427 1  1       !   DESCRIBES VALID COMMAND - SUBCOMMAND COMBINATIONS
000427 1  1       !   1,100,
000427 1  1       !   1,101,
000427 1  1       INT SUBPROC VALID^COMB(COMMAND,SUBCOMMAND);
000427 2  1         INT COMMAND;
```

```
000427 2  1        INT SUBCOMMAND;
000427 2  1        BEGIN
000427 2  2          INT I := 0;
000427 2  2          WHILE I >= 0 DO
000434 2  2            BEGIN
000434 2  3              IF COMMAND^MATRIX[I] = 0 THEN
000440 2  3                I := -2
000440 2  3              ELSE
000444 2  3                IF COMMAND^MATRIX[I] = COMMAND AND
000444 2  3                   COMMAND^MATRIX[I+1] = SUBCOMMAND THEN
000460 2  3                  I := -1
000460 2  3              ELSE
000463 2  3                I := I + 2;
000465 2  3            END;
000466 2  2          IF I = -2 THEN
000471 2  2            I := 0;
000473 2  2          RETURN I;
000476 2  2        END;                                    !SUBPROC VALID^COMB

COMMAND                  Variable     INT          Direct       S-003
I                        Variable     INT          Direct       S-000
SUBCOMMAND               Variable     INT          Direct       S-002

000476 1  1      INT SUBPROC COMMAND^VALID^PARAMS;
000476 2  1        BEGIN
000476 2  2        INT ERROR := 0,
000476 2  2            COM^INDEX,
000476 2  2            SUB^INDEX;
000476 2  2        STRING .S^COM := @P^COMMAND^VAL'<<'1,
000476 2  2               .S^SUB := @P^SUB^VAL'<<'1;
000476 2  2          IF NOT $PARAM(P^FILE) OR NOT $PARAM(P^COMMAND) THEN
000515 2  2            ERROR := SPERR^PARAM
000515 2  2          ELSE
000520 2  2            IF (COM^INDEX := FIND^COMMAND(COMMAND^TABLE,P^COMMAND)) < 0 THEN
000527 2  2              ERROR := SPERR^COM^INV
000527 2  2            ELSE
000532 2  2              IF NOT $PARAM(P^COMMAND^VAL)
000532 2  2                  AND COMMAND^TABLE[COM^INDEX].REQUIRED = -1 THEN
000542 2  2                ERROR := SPERR^COM^VAL^MISS
000542 2  2              ELSE
000546 2  2                IF $PARAM(P^COMMAND^VAL)
000546 2  2                    AND SPOOL^CINV(P^COMMAND^VAL
000546 2  2                                   ,COMMAND^TABLE[COM^INDEX]) THEN
000557 2  2                  ERROR := SPERR^COM^VAL
000557 2  2                ELSE
000563 2  2                  IF NOT $PARAM(P^SUBCOMMAND) THEN
000566 2  2                    BEGIN
000566 2  3                      IF NOT VALID^COMB(P^COMMAND,100) THEN
000573 2  3                        ERROR := SPERR^SUB^INV
000573 2  3                    END
000576 2  2                  ELSE
000577 2  2                    IF NOT VALID^COMB(P^COMMAND,P^SUBCOMMAND) THEN
000604 2  2                      ERROR := SPERR^SUB^INV
000604 2  2                    ELSE
000610 2  2                      IF (SUB^INDEX := FIND^COMMAND(SUBCOMMAND^TABLE
000610 2  2                                                ,P^SUBCOMMAND)) < 0 THEN
000617 2  2                        ERROR := SPERR^SUB^INV
```

```
000617 2   2                  ELSE
000624 2   2                    IF NOT $PARAM(P^SUB^VAL) AND
000624 2   2                        SUBCOMMAND^TABLE[SUB^INDEX].REQUIRED = -1 THEN
000634 2   2                      ERROR := SPERR^SUB^VAL^MISS
000634 2   2                    ELSE
000640 2   2                      IF $PARAM(P^SUB^VAL) AND
000640 2   2                          SPOOL^CINV(P^SUB^VAL
000640 2   2                                        ,SUBCOMMAND^TABLE[SUB^INDEX]) THEN
000651 2   2                        ERROR := SPERR^SUB^VAL;
000654 2   2        IF NOT ERROR THEN
000656 2   2          BEGIN                    !EXTRA LOCATION VALIDATION
000656 2   3           IF P^COMMAND = 3 THEN
000661 2   3             BEGIN
000661 2   4               IF P^SUBCOMMAND = 100 AND (S^COM = " " OR S^COM[8] = " ") THEN
000673 2   4                 ERROR := SPERR^COM^VAL;
000676 2   4               IF P^SUBCOMMAND = 131 AND S^COM[8] = " " THEN
000705 2   4                 ERROR := SPERR^COM^VAL;
000710 2   4               IF P^SUBCOMMAND = 132 AND (S^COM = " " OR S^COM[8] <> " ") THEN
000722 2   4                 ERROR := SPERR^COM^VAL;
000725 2   4               IF P^SUBCOMMAND = 116 AND S^COM = " " THEN
000733 2   4                 ERROR := SPERR^COM^VAL;
000736 2   4             END;
000736 2   3           IF P^SUBCOMMAND = 125 AND S^SUB = " " THEN
000744 2   3             ERROR := SPERR^SUB^VAL;
000747 2   3         END;
000747 2   2
000747 2   2       RETURN ERROR;
000752 2   2     END;                               !SUBPROC COMMAND^VALID^PARAMS

COM^INDEX                Variable     INT        Direct      S-003
ERROR                    Variable     INT        Direct      S-004
SUB^INDEX                Variable     INT        Direct      S-002
S^COM                    Variable     STRING     Indirect    S-001
S^SUB                    Variable     STRING     Indirect    S-000

000752 1   1    SUBPROC FORMAT^COMMAND^MESSAGE;
000752 2   1      BEGIN
000752 2   2      INT COM^INDEX,
000752 2   2          SUB^INDEX;
000752 2   2        COMMAND^MESS.COMMAND := P^COMMAND;
000756 2   2            COM^INDEX := FIND^COMMAND(COMMAND^TABLE,P^COMMAND);
000763 2   2            IF $PARAM(P^COMMAND^VAL) THEN
000766 2   2              COMMAND^MESS.COM^VAL ':=' P^COMMAND^VAL FOR
000766 2   2                   (COMMAND^TABLE[COM^INDEX].LENGTH+1)'>>'1
000766 2   2            ELSE
001001 2   2              CASE COMMAND^TABLE[COM^INDEX].DEFAULT OF
001005 2   2                BEGIN
001005 2   3                  COMMAND^MESS.COM^VAL ':=' ZEROS FOR
001005 2 CE0                    (COMMAND^TABLE[COM^INDEX].LENGTH+1)'>>'1;
001020 2 CE1                  COMMAND^MESS.COM^VAL := -1;
001024 2 CE2                  COMMAND^MESS.COM^VAL ':=' SPACES FOR
001024 2   3                    (COMMAND^TABLE[COM^INDEX].LENGTH+1)'>>'1;
001037 2 CE3                END;
001043 2   2        IF NOT $PARAM(P^SUBCOMMAND) THEN
001046 2   2          COMMAND^MESS.SUBCOMMAND := 100
001046 2   2        ELSE
001052 2   2          BEGIN
```

```
001052 2  3       COMMAND^MESS.SUBCOMMAND := P^SUBCOMMAND;
001055 2  3       SUB^INDEX := FIND^COMMAND(SUBCOMMAND^TABLE,P^SUBCOMMAND);
001062 2  3       IF $PARAM(P^SUB^VAL) THEN
001065 2  3         COMMAND^MESS.SUB^VAL ':=' P^SUB^VAL FOR
001065 2  3              (SUBCOMMAND^TABLE[SUB^INDEX].LENGTH+1)'>>'1
001065 2  3       ELSE
001101 2  3         CASE SUBCOMMAND^TABLE[SUB^INDEX].DEFAULT OF
001105 2  3           BEGIN
001105 2  4             COMMAND^MESS.SUB^VAL ':=' ZEROS FOR
001105 2 CE0              (SUBCOMMAND^TABLE[SUB^INDEX].LENGTH+1)'>>'1;
001120 2 CE1            COMMAND^MESS.SUB^VAL := -1;
001124 2 CE2            COMMAND^MESS.SUB^VAL ':=' ZEROS FOR
001124 2  4               (SUBCOMMAND^TABLE[SUB^INDEX].LENGTH+1)'>>'1;
001137 2 CE3          END;
001143 2  3     END;
001143 2  2   END;

COM^INDEX             Variable     INT          Direct      S-001
SUB^INDEX             Variable     INT          Direct      S-000

001145 1  1   IF ERROR^IN COMMAND^VALID^PARAMS THEN
001221 1  1     RETURN ERROR;
001224 1  1
001224 1  1   CALL FORMAT^COMMAND^MESSAGE;
001225 1  1   CALL SPOOL^CHECKMSG(MSG^COMMAND, COMMAND^MESS, $LEN(COMMAND^MESS));
001234 1  1   CALL WRITEREAD(P^FILE,COMMAND^MESS,$LEN(COMMAND^MESS), $LEN(ERRORRTN), COUNT^READ);
001246 1  1   IF <> THEN
001247 1  1     BEGIN
001247 1  2     CALL FILEINFO(P^FILE, ERROR);
001260 1  2     RETURN ERROR+SPERR^CONTROL^FE;
001265 1  2     END
001265 1  1   ELSE
001266 1  1     IF COUNT^READ THEN
001270 1  1       IF ERROR^IN SPOOL^CHECKMSG(, ERRORRTN, COUNT^READ) THEN
001300 1  1         RETURN SPERR^INV^MSG
001300 1  1       ELSE
001304 1  1         RETURN  ERRORRTN.ERROR;
001307 1  1   RETURN FEOK;
001311 1  1 END;

COMMAND^MATRIX           Variable       INT          Indirect    P+000
COMMAND^MESS             Variable,110   STRUCT       Indirect    L+003
COMMAND^TABLE            Variable       INT          Indirect    L+001
COMMAND^VALID^PARAMS     Subproc        INT          %000476
COUNT^READ               Variable       INT          Direct      L+005
DEFAULT                  Define                      <13:15>
ERROR                    Variable       INT          Direct      L+004
ERRORRTN                 Variable,6     STRUCT-I     Indirect    L+003
FIND^COMMAND             Subproc        INT          %000370
FORMAT^COMMAND^MESSAGE   Subproc                     %000752
LENGTH                   Define                      <1:6>
NUM^COMMANDS             Literal        INT          %000006
NUM^SUBCOMMANDS          Literal        INT          %000047
P^COMMAND                Variable       INT          Direct      L-007
P^COMMAND^VAL            Variable       INT          Indirect    L-006
P^FILE                   Variable       INT          Direct      L-010
P^SUBCOMMAND             Variable       INT          Direct      L-005
```

```
P^SUB^VAL                 Variable    INT        Indirect    L-004
REQUIRED                  Define                 <0>
SPACES                    Variable    INT        Indirect    L+007
SUBCOMMAND^TABLE          Variable    INT        Indirect    L+002
VALID                     Define                 <7:12>
VALID^COMB                Subproc     INT        %000427
ZEROS                     Variable    INT        Indirect    L+006

000000 0  0  INT PROC SPOOLERSTATUS (P^FILE,P^COMMAND,P^SCANTYPE,P^BUFFER);
000000 1  0    INT P^FILE;                     !FILE NUMBER TO CONTROL PROCESS
000000 1  0    INT P^COMMAND;                  !COMMAND NUMBER
000000 1  0    INT P^SCANTYPE;                 !0-FIND THE NEXT ITEM AFTER KEY
000000 1  0                                    !1-FIND THE ITEM FOR THE KEY
000000 1  0    INT .P^BUFFER;                  !BUFFER WHERE STATUS INFO IS RETURNED
000000 1  0                                    !WORD 4 CONTAINS THE KEY ON INPUT
000000 1  0    BEGIN
000000 1  1
000000 1  1      LITERAL NUM^COMMANDS =12;     !NUMBER OF VALID COMMANDS
000000 1  1
000000 1  1      INT .COMMAND^TABLE[0:NUM^COMMANDS]:=[
000000 1  1      !   THE COMMAND TABLE DESCRIBES THE COMMAND VALIDATION
000000 1  1          %102010,        ! QUEUE SEQUENCE FOR DEVICE
000001 1  1          %140270,        ! 1 DEV  DEVICE NAME
000002 1  1          %102000,        ! 2 JOB  JOB NUMBER                              C06
000003 1  1          %120220,        ! 3 LOC  ANY FORM OF LOCATION NAME
000004 1  1          %106160,        ! 4 COLLECT  PROC NAME
000005 1  1          %106160,        ! 5 PRINT  PROC NAME
000006 1  1          %000000,        ! 6 SPOOLER ANY VALUE
000007 1  1          %140270,        ! 7 QUEUED JOBS BY DEV  DEVICE NAME
000010 1  1          %102020,        ! 8 QUEUED JOBS BY JOB  JOB NUMBER
000011 1  1          %120220,        ! 9 QUEUED JOBS BY LOC  ANY FORM OF LOCATION NAME   C11 E6
000012 1  1          %020222,        !10 XREF BY LOCATION                               C11 E6
000013 1  1          %040272,        !11 XREF BY DEVICE                                 C11 E6
000014 1  1          %006162];       !12 XREF BY PRINT PROCESS                          C11 E6
000015 1  1
000015 1  1       INT
000015 1  1         .MSGBUF[0:127];  ! BUFFER BIG ENOUGH FOR BIGGEST STATUS MESSAGE
000015 1  1      INT .SDEV(SSTATUS^DEV) = MSGBUF,
000015 1  1          .SJOB(SSTATUS^JOB) = MSGBUF,
000015 1  1          .SLOC(SSTATUS^LOC) = MSGBUF,
000015 1  1          .ERRORRTN(SERROR)=MSGBUF,
000015 1  1          .SCOLLECT(SSTATUS^COLLECT) = MSGBUF,
000015 1  1          .SPRINT(SSTATUS^PRINT) = MSGBUF,
000015 1  1          .SSPOOLER(SSTATUS^SPOOLER) = MSGBUF,
000015 1  1          .SXREF(SSTATUS^XREF) = MSGBUF,                                   !C11 E6
000015 1  1          .SQUEUE(SSTATUS^Q) = MSGBUF;
000015 1  1
000015 1  1    INT
000015 1  1      MSGTYPE[0:NUM^COMMANDS]:=[
000015 1  1        0,     ! NOT USED
000016 1  1        MSG^STATUS^DEV,       ! DEVICE STATUS
000017 1  1        MSG^STATUS^JOB,       ! JOB STATUS
000020 1  1        MSG^STATUS^LOC,       ! LOCATION STATUS
000021 1  1        MSG^STATUS^COLLECT,     ! COLLECTION PROCESS STATUS
000022 1  1        MSG^STATUS^PRINT,     ! PRINT PROCESS STATUS
000023 1  1        MSG^STATUS^SPOOLER,     ! SUPERVISOR STATUS
000024 1  1        MSG^STATUS^QUEUE,     ! QUEUE BY DEVICE
```

```
000025 1 1     MSG^STATUS^QUEUE,      ! QUEUE BY JOB
000026 1 1     MSG^STATUS^QUEUE,                                    !C11 E6
000027 1 1     MSG^STATUS^XREF,                                     !C11 E6
000030 1 1     MSG^STATUS^XREF,                                     !C11 E6
000031 1 1     MSG^STATUS^XREF],                                    !C11 E6
000032 1 1   MSGLEN[0:NUM^COMMANDS]:=[
000032 1 1     0,     ! NOT USED
000033 1 1     $LEN(SDEV),
000034 1 1     $LEN(SJOB),
000035 1 1     $LEN(SLOC),
000036 1 1     $LEN(SCOLLECT),
000037 1 1     $LEN(SPRINT),
000040 1 1     $LEN(SSPOOLER),
000041 1 1     $LEN(SQUEUE),
000042 1 1     $LEN(SQUEUE),
000043 1 1     $LEN(SQUEUE),                                        !C11 E6
000044 1 1     $LEN(SXREF),                                         !C11 E6
000045 1 1     $LEN(SXREF),                                         !C11 E6
000046 1 1     $LEN(SXREF)];                                        !C11 E6
000047 1 1
000047 1 1   INT ERROR,
000047 1 1       COUNT^READ;
000047 1 1   INT .ZEROS[0:15] := 16*[0],
000067 1 1       .SPACES[0:15] := [16*["  "]];
000107 1 1   INT BUFFER^LEN;
000107 1 1   INT DEVTYPE;                                               !B30,MBB============= #XXX
000107 1 1   INT FILECODE;                                              !B30,MBB============= #XXX
000107 1 1   INT POSITION^BLOCK[0:3];   ! FOR UNSTRUCTURED FILES        B30,MBB============= #XXX
000107 1 1                                                              !B30,MBB============= #XXX
000107 1 1 INT SUBPROC GET^DJOB^STATUS;                                 !B30,MBB============= #XXX
000107 2 1 BEGIN                                                        !B30,MBB============= #XXX
000107 2 2   INT .SJ(SSTATUS^JOB) := @P^BUFFER '-' ($OFFSET (SJOB.JOB) / 2);   !B30,MBB============= #XXX
000107 2 2   INT .DJOB(DJOB^HEADER) = MSGBUF;                           !B30,MBB============= #XXX
000107 2 2                                                              !B30,MBB============= #XXX
000107 2 2   CALL SAVEPOSITION(P^FILE, POSITION^BLOCK);                 !B30,MBB============= #XXX
000120 2 2   IF <> THEN GOTO ERROR^EXIT;                                !B30,MBB============= #XXX
000122 2 2   CALL POSITION(P^FILE, 0D);                                 !B30,MBB============= #XXX
000126 2 2   IF <> THEN GOTO ERROR^EXIT;                                !B30,MBB============= #XXX
000130 2 2   CALL READ(P^FILE, DJOB, $LEN(DJOB));                       !B30,MBB============= #XXX
000140 2 2   IF <> THEN GOTO ERROR^EXIT;                                !B30,MBB============= #XXX
000142 2 2   IF DJOB.VERSION <> [DJOB^VERSION, MSG^PRINT^CONTROL, SPOOL^CHECK]   !B30,MBB============= #XXX
000142 2 2       OR DJOB.SYNC <> [MSG^BLOCK, BLOCK^SIZE'*'2, DJOB^NUM]   !B30,MBB============= #XXX
000142 2 2       OR DJOB.UNITSIZE <> DJOB^UNITSIZE THEN                 !B30,MBB============= #XXX
000165 2 2     RETURN SPERR^MISMATCH;                                   !B30,MBB============= #XXX
000173 2 2   SJ.STATE := (IF (SJ.PAGES := DJOB.PAGES) = -1 THEN 1   ! OPEN      !B30,MBB============= #XXX
000173 2 2                                                ELSE 2); ! READY    B30,MBB============= #XXX
000206 2 2   SJ.LOCATION ':=' DJOB.DEST FOR                             B30,MBB============= #XXX
000206 2 2       (WLEN^LOCNAME + WLEN^FORMNAME + WLEN^REPORTNAME);      !B30,MBB============= #XXX
000214 2 2   SJ.FLAGS := 0;                                             !B30,MBB============= #XXX
000217 2 2   SJ.PAGESIZE := DJOB.PAGE;                                  !B30,MBB============= #XXX
000223 2 2   SJ.ACCESSID := DJOB.OWNER;                                 !B30,MBB============= #XXX
000227 2 2   SJ.COPIES := DJOB.NOCOPIES;                                !B30,MBB============= #XXX
000233 2 2   SJ.TOTLINES := DJOB.TOTLINES;                              !B30,MBB============= #XXX
000237 2 2   SJ.OPENTIME ':=' DJOB.OPENTIME FOR 3;                      !B30,MBB============= #XXX
000245 2 2   SJ.CLOSETIME ':=' DJOB.CLOSETIME FOR 3;                    !B30,MBB============= #XXX
000253 2 2   CALL FILEINFO(P^FILE, , SJ.DATAFILENAME);                  !B30,MBB============= #XXX
```

```
2300.67   000267 2  2      IF <> THEN GOTO ERROR^EXIT;                                               !B30,MBB============ #XXX
2300.68   000271 2  2      BLANKFILL(SJ.COLLECTORNAME, WLEN^PROCESSNAME);                            !B30,MBB============ #XXX
2300.7    000303 2  2      SJ.UNITSALLOCATED := DJOB.UNITSALLOCATED;                                 !B30,MBB============ #XXX
2300.71   000307 2  2      CALL REPOSITION(P^FILE, POSITION^BLOCK);  ! PUT IT BACK WHERE IT WAS       B30,MBB============ #XXX
2300.72   000313 2  2      IF <> THEN GOTO ERROR^EXIT;                                               !B30,MBB============ #XXX
2300.8    000316 2  2      RETURN FEOK;                                                              !B30,MBB============ #XXX
2300.9    000323 2  2    END;                                                                        !B30,MBB============ #XXX

DJOB                             Variable,220   STRUCT-I        Indirect       L+002

ERROR^EXIT                       Label                          %177777
SJ                               Variable,164   STRUCT-I        Indirect       S-000

2301.     000333 1  1
2302.     000333 1  1    ! MOVE USERS MESSAGE TO WORKING BUFFER
2303.     000333 1  1    MSGBUF[4] ':=' P^BUFFER FOR (MSGLEN[P^COMMAND]'>>'1)-4;
2304.     000407 1  1
2305.     000407 1  1    IF P^SCANTYPE < 0 OR P^SCANTYPE > 1 THEN
2306.     000415 1  1      RETURN SPERR^CONTENT
2307.     000415 1  1    ELSE
2308.     000421 1  1      CASE P^COMMAND OF
2309.     000423 1  1        BEGIN
2310.     000423 1  2          RETURN SPERR^COM^INV;      !NO COMMAND 0
2311.     000425 1 CE1                                      ! 1 DEV
2312.     000425 1  2          IF SPOOL^CINV(SDEV.DEVICE,COMMAND^TABLE[P^COMMAND]) THEN
2313.     000434 1  2            IF SDEV.DEVICE <> SPACES FOR $OCCURS(SDEV.DEVICE) OR
2314.     000434 1  2               P^SCANTYPE <> SCAN^NEXT THEN
2315.     000445 1  2              RETURN SPERR^COM^VAL;
2316.     000451 1 CE2                                      ! 2 JOB
2316.1    000451 1  2          IF SJOB.JOB = DJOB^NUM THEN                                           !B30,MBB============ #XXX
2316.11   000455 1  2            BEGIN                                                               !B30,MBB============ #XXX
2316.111  000455 1  3              CALL FILEINFO(P^FILE, , , , DEVTYPE, , , , , FILECODE);           !B30,MBB============ #XXX
2316.112  000474 1  3              IF <> THEN                                                        !B30,MBB============ #XXX
2316.113  000475 1  3                BEGIN                                                           !B30,MBB============ #XXX
2316.114  000475 1  4           ERROR^EXIT:                                                          !B30,MBB============ #XXX
2316.115  000501 1  4                 CALL FILEINFO(P^FILE, ERROR);                                  !B30,MBB============ #XXX
2316.12   000512 1  4                 RETURN ERROR LOR SPERR^CONTROL^FE;                             !B30,MBB============ #XXX
2316.13   000515 1  4                END;                                                            !B30,MBB============ #XXX
2316.15   000515 1  3              IF DEVTYPE.<4:9> = 3 AND FILECODE = DJOB^FILECODE THEN            !B30,MBB============ #XXX
2316.2    000525 1  3                RETURN GET^DJOB^STATUS;                                         !B30,MBB============ #XXX
2316.4    000530 1  3            END;                                                                !B30,MBB============ #XXX
2317.     000531 1 CE3          IF SPOOL^CINV(SJOB.JOB,COMMAND^TABLE[P^COMMAND]) THEN
2318.     000540 1  2            IF SJOB.JOB <> 0 OR P^SCANTYPE <> SCAN^NEXT THEN
2319.     000547 1  2              RETURN SPERR^COM^VAL;
2320.     000553 1 CE4                                      ! 3 LOC
2321.     000553 1  2          IF SPOOL^CINV(SLOC.LOCATION,COMMAND^TABLE[P^COMMAND]) THEN
2322.     000562 1  2            BEGIN
2323.     000562 1  3              IF SLOC.LOCATION <> SPACES FOR $OCCURS(SLOC.LOCATION) OR
2324.     000562 1  3                 P^SCANTYPE <> SCAN^NEXT THEN
2325.     000573 1  3                RETURN SPERR^COM^VAL;
2326.     000576 1  3            END
2327.     000576 1  2          ELSE
2328.     000577 1  2            IF SLOC.LOCATION = SPACES THEN
2329.     000604 1  2              RETURN SPERR^COM^VAL;
2330.     000610 1 CE5                                      ! 4 COLLECT
2331.     000610 1  2          IF SPOOL^CINV(SCOLLECT.COLLECTOR,COMMAND^TABLE[P^COMMAND])
2332.     000610 1  2                                                                     THEN
```

```
000617 1  2            IF SCOLLECT.COLLECTOR <> SPACES
000617 1  2                                   FOR $OCCURS(SCOLLECT.COLLECTOR) OR
000617 1  2               P^SCANTYPE <> SCAN^NEXT THEN
000633 1  2              RETURN SPERR^COM^VAL;
000637 1 CE6                                ! 5 PRINT
000637 1  2          IF SPOOL^CINV(SPRINT.PRINTER,COMMAND^TABLE[P^COMMAND]) THEN
000646 1  2            IF SPRINT.PRINTER <> SPACES FOR $OCCURS(SPRINT.PRINTER) OR
000646 1  2               P^SCANTYPE <> SCAN^NEXT THEN
000661 1  2              RETURN SPERR^COM^VAL;
000665 1 CE7          ;                     ! 6 SPOOLER
000665 1 CE8                                ! 7 QUEUE BY DEVICE
000665 1  2           IF SPOOL^CINV(SQUEUE.DEVICE,COMMAND^TABLE[P^COMMAND]) OR
000665 1  2              SPOOL^CINV(SQUEUE.SEQUENCE,COMMAND^TABLE) THEN
000702 1  2             RETURN SPERR^COM^VAL;
000706 1 CE9                                ! 8 QUEUE BY JOB
000706 1  2           IF SPOOL^CINV(SQUEUE.JOB,COMMAND^TABLE[P^COMMAND]) OR
000706 1  2              SPOOL^CINV(SQUEUE.SEQUENCE,COMMAND^TABLE) OR
000706 1  2              (SPOOL^CINV(SQUEUE.DEVICE,%000272) AND
000706 1  2               SQUEUE.DEVICE<>SPACES FOR $OCCURS(SQUEUE.DEVICE))
000706 1  2               THEN
000737 1  2             RETURN SPERR^COM^VAL;
000743 1 CE10                               ! 9 QUEUE BY LOC
000743 1  2           IF SPOOL^CINV(SQUEUE.LOCATION,COMMAND^TABLE[P^COMMAND]) OR
000743 1  2              SPOOL^CINV(SQUEUE.SEQUENCE,COMMAND^TABLE)
000743 1  2   !***********(SPOOL^CINV(SQUEUE.DEVICE,%000272) AND                        !C11 #6
000743 1  2   !************SQUEUE.DEVICE<>SPACES FOR $OCCURS(SQUEUE.DEVICE))              C11 #6
000743 1  2               THEN                                                          C11 #6
000760 1  2             RETURN SPERR^COM^VAL;
000764 1 CE11                               ! 10 XREF BY LOCATION                        C11 E6
000764 1  2           IF SPOOL^CINV(SXREF.LOCATION,COMMAND^TABLE[STATCOM^XREF^LOC]) OR     !C11 E6
000764 1  2              SPOOL^CINV(SXREF.DEVICE,COMMAND^TABLE[STATCOM^XREF^DEV]) OR       !C11 E6
000764 1  2              SPOOL^CINV(SXREF.PRINTER,COMMAND^TABLE[STATCOM^XREF^PRT]) THEN    !C11 E6
001011 1  2             RETURN SPERR^COM^VAL;                                          !C11 E6
001015 1 CE12                               ! 11 XREF BY DEVICE                          C11 E6
001015 1  2           IF SPOOL^CINV(SXREF.LOCATION,COMMAND^TABLE[STATCOM^XREF^LOC]) OR     !C11 E6
001015 1  2              SPOOL^CINV(SXREF.DEVICE,COMMAND^TABLE[STATCOM^XREF^DEV]) OR       !C11 E6
001015 1  2              SPOOL^CINV(SXREF.PRINTER,COMMAND^TABLE[STATCOM^XREF^PRT]) THEN    !C11 E6
001042 1  2             RETURN SPERR^COM^VAL;                                          !C11 E6
001046 1 CE13                               ! 12 XREF BY PRINTER                         C11 E6
001046 1  2           IF SPOOL^CINV(SXREF.LOCATION,COMMAND^TABLE[STATCOM^XREF^LOC]) OR     !C11 E6
001046 1  2              SPOOL^CINV(SXREF.DEVICE,COMMAND^TABLE[STATCOM^XREF^DEV]) OR       !C11 E6
001046 1  2              SPOOL^CINV(SXREF.PRINTER,COMMAND^TABLE[STATCOM^XREF^PRT]) THEN    !C11 E6
001073 1  2             RETURN SPERR^COM^VAL;                                          !C11 E6
001077 1 CE14                                                                          !C11 E6
001077 1  2          OTHERWISE
001077 1  2            RETURN  SPERR^COM^INV;
001101 1  2        END;                         !CASE
001127 1  1
001127 1  1   SDEV.COMMAND := P^COMMAND;
001132 1  1   SDEV.SCANTYPE := P^SCANTYPE;
001135 1  1   CALL SPOOL^CHECKMSG(MSGTYPE[P^COMMAND], MSGBUF, MSGLEN[P^COMMAND]);
001145 1  1   CALL WRITEREAD(P^FILE,MSGBUF,MSGLEN[P^COMMAND],MSGLEN[P^COMMAND],COUNT^READ);
001160 1  1   IF <> THEN
001161 1  1     BEGIN
001161 1  2     CALL FILEINFO(P^FILE,ERROR);
001172 1  2                                 ! request in progress !                     !C11 E6
001172 1  2     IF ERROR = FECONTINUE THEN                                              !C11 E6
```

```
2372.12  001175 1  2        BEGIN                          ! return message buffer !           !C11 E6
2372.13  001175 1  3        P^BUFFER ':=' MSGBUF[4] FOR (MSGLEN[P^COMMAND]'>>'1)-4;           !C11 E6
2372.2   001205 1  3        RETURN  SPERR^COM^INPROGRESS;                                      !C11 E6
2372.3   001210 1  3        END;                                                               !C11 E6
2372.4   001210 1  2                                                                           !C11 E6
2373.    001210 1  2      RETURN ERROR+SPERR^CONTROL^FE;
2374.    001214 1  2      END
2375.    001214 1  1    ELSE
2376.    001215 1  1      IF ERROR^IN SPOOL^CHECKMSG(, MSGBUF, COUNT^READ) THEN
2377.    001225 1  1        RETURN SPERR^INV^MSG
2378.    001225 1  1      ELSE
2379.    001231 1  1        IF ERRORRTN.MSG=MSG^ERROR THEN
2380.    001234 1  1          RETURN ERRORRTN.ERROR;
2381.    001237 1  1
2382.    001237 1  1    P^BUFFER ':=' MSGBUF[4] FOR (MSGLEN[P^COMMAND]'>>'1)-4;
2383.    001247 1  1
2384.    001247 1  1    RETURN FEOK;
2385.    001251 1  1    END;

BUFFER^LEN                 Variable        INT          Direct      L+041
COMMAND^TABLE              Variable        INT          Indirect    L+001
COUNT^READ                 Variable        INT          Direct      L+036
DEVTYPE                    Variable        INT          Direct      L+042
ERROR                      Variable        INT          Direct      L+035
ERRORRTN                   Variable,6      STRUCT-I     Indirect    L+002
ERROR^EXIT                 Label                        %000501
FILECODE                   Variable        INT          Direct      L+043
GET^DJOB^STATUS            Subproc         INT          %000107
MSGBUF                     Variable        INT          Indirect    L+002
MSGLEN                     Variable        INT          Direct      L+020
MSGTYPE                    Variable        INT          Direct      L+003
NUM^COMMANDS               Literal         INT          %000014
POSITION^BLOCK             Variable        INT          Direct      L+044
P^BUFFER                   Variable        INT          Indirect    L-003
P^COMMAND                  Variable        INT          Direct      L-005
P^FILE                     Variable        INT          Direct      L-006
P^SCANTYPE                 Variable        INT          Direct      L-004
SCOLLECT                   Variable,116    STRUCT-I     Indirect    L+002
SDEV                       Variable,130    STRUCT-I     Indirect    L+002
SJOB                       Variable,164    STRUCT-I     Indirect    L+002
SLOC                       Variable,72     STRUCT-I     Indirect    L+002
SPACES                     Variable        INT          Indirect    L+040
SPRINT                     Variable,62     STRUCT-I     Indirect    L+002
SQUEUE                     Variable,130    STRUCT-I     Indirect    L+002
SSPOOLER                   Variable,46     STRUCT-I     Indirect    L+002
SXREF                      Variable,100    STRUCT-I     Indirect    L+002
ZEROS                      Variable        INT          Indirect    L+037

2387.    000000 0  0  INT PROC SPOOLEREQUEST (P^SPOOL^FILE,P^JOB,P^MESSAGE);
2388.    000000 1  0    INT P^SPOOL^FILE,                   !FILE NUMBER TO THE SPOOLER
2389.    000000 1  0        P^JOB,                          !JOB NUMBER TO BE RETRIEVED
2390.    000000 1  0        .P^MESSAGE;                     !BUFFER TO STORE MESSAGE FORM SPOOLER
2391.    000000 1  0
2392.    000000 1  0    BEGIN
2393.    000000 1  1    INT ERROR,
2394.    000000 1  1        COUNT^READ;
2395.    000000 1  1    INT .ERRORRTN(SERROR)=P^MESSAGE;  ! POSSIBLE ERROR REPLY
```

```
000000 1  1     INT .STARTMESS(PPCONTROL)=P^MESSAGE;!REPLY MESSAGE FROM SPOOLER
000000 1  1     INT .REQMESS(PPREQUEST)=P^MESSAGE;!REQUEST MESSAGE TO SPOOLER
000000 1  1
000000 1  1       REQMESS.JOB := P^JOB;
000004 1  1       CALL SPOOL^CHECKMSG(MSG^PRINT^REQUEST, REQMESS, $LEN(REQMESS));
000013 1  1       CALL WRITEREAD(P^SPOOL^FILE,REQMESS,$LEN(REQMESS),$LEN(STARTMESS),COUNT^READ);
000025 1  1
000025 1  1       IF <> THEN                   !WRITE ERROR
000026 1  1         BEGIN
000026 1  2         CALL FILEINFO(P^SPOOL^FILE,ERROR);
000037 1  2         RETURN ERROR+SPERR^CONTROL^FE;
000043 1  2         END
000043 1  1       ELSE
000044 1  1         IF ERROR^IN SPOOL^CHECKMSG(, P^MESSAGE, COUNT^READ) THEN
000054 1  1           RETURN SPERR^INV^MSG     !WRONG REPLY
000054 1  1         ELSE
000060 1  1           IF P^MESSAGE=MSG^ERROR THEN
000063 1  1             RETURN  ERRORRTN.ERROR;
000066 1  1
000066 1  1
000066 1  1     RETURN FEOK;
000070 1  1     END;                                   !PROC SPOOLEREQUEST

COUNT^READ                  Variable        INT          Direct       L+002
ERROR                       Variable        INT          Direct       L+001
ERRORRTN                    Variable,6      STRUCT-I     Indirect     L-003
P^JOB                       Variable        INT          Direct       L-004
P^MESSAGE                   Variable        INT          Indirect     L-003
P^SPOOL^FILE                Variable        INT          Direct       L-005
REQMESS                     Variable,6      STRUCT-I     Indirect     L-003
STARTMESS                   Variable,200    STRUCT-I     Indirect     L-003
000000 0  0   !
000000 0  0   ! THIS PROC WILL PREPARE SPOOLING SYSTEM INTER PROCESS
000000 0  0   ! MESSAGES FOR SHIPMENT AND CHECK THEIR LEGALITY ON
000000 0  0   ! RECEIPT. FEINVALOP IS RETURNED FROM SPOOL^CHECKMSG IF
000000 0  0   ! THE MESSAGE IS NOT CORRECT
000000 0  0   INT PROC
000000 0  0   SPOOL^CHECKMSG(TYPE, MSG, LEN) VARIABLE;
000000 1  0   INT
000000 1  0     TYPE,    ! MESSAGE TYPE
000000 1  0     .MSG,    ! MESSAGE TEXT
000000 1  0     LEN;    ! LENGTH OF MESSAGE IN BYTES
000000 1  0
000000 1  0     BEGIN
000000 1  1
000000 1  1     INT
000000 1  1       CHECK='P':=[
000000 1  1         $LEN(APSTART),
000001 1  1         $LEN(APBLOCK),
000002 1  1         $LEN(APEND),
000003 1  1         $LEN(SERROR),
000004 1  1         $LEN(PPPROMPT),
000005 1  1         $LEN(PPGIMME),
000006 1  1         $LEN(PPSTATUS),
000007 1  1         $LEN(PPCONTROL),
000010 1  1         $LEN(PPWAKEUP),
000011 1  1         $LEN(PPREQUEST),
```

```
000012 1  1          $LEN(SCOMMAND),
000013 1  1          $LEN(SSTATUS^DEV),
000014 1  1          $LEN(SSTATUS^JOB),
000015 1  1          $LEN(SSTATUS^LOC),
000016 1  1          $LEN(SSTATUS^COLLECT),
000017 1  1          $LEN(SSTATUS^PRINT),
000020 1  1          $LEN(SSTATUS^SPOOLER),
000021 1  1          $LEN(SSTATUS^Q),
000022 1  1          $LEN(COLJOBOPEN),
000023 1  1          $LEN(COLJOBOPENRTN),
000024 1  1          $LEN(COLJOBCLOSE),
000025 1  1          $LEN(COLSTART),
000026 1  1          $LEN(COLSTATUS),
000027 1  1          $LEN(COLCONTROL),
000030 1  1          $LEN(COLPROMPT),
000031 1  1          $LEN(COLGIMME),
000032 1  1          $LEN(COLWAKEUP),
000033 1  1          $LEN(APJOBNUM),                              !C11 E6
000034 1  1          $LEN(SSTATUS^XREF)];                         !C11 E6
000035 1  1
000035 1  1    ! SPOOL^CHECKMSG CODE
000035 1  1
000035 1  1    IF $PARAM(TYPE) THEN
000040 1  1      BEGIN  ! PREPARE MESSAGE
000040 1  2      MSG:=TYPE;
000042 1  2      MSG[1]:=SPOOL^CHECK;
000046 1  2      END  ! PREPARE MESSAGE
000046 1  1    ELSE
000047 1  1      BEGIN  ! CHECK MESSAGE
000047 1  2      IF MSG[1]=SPOOL^CHECK AND
000047 1  2         MSG>=MSG^MIN AND
000047 1  2         MSG<=MSG^MAX AND
000047 1  2         CHECK[MSG-MSG^MIN]=LEN THEN
000072 1  2        RETURN FEOK
000072 1  2      ELSE
000075 1  2        RETURN FEINVALOP;
000077 1  2      END;  ! CHECK MESSAGE
000077 1  1
000077 1  1    RETURN FEOK;
000101 1  1    END;  ! SPOOL^CHECKMSG

CHECK                   Variable     INT        Direct       P+000
LEN                     Variable     INT        Direct       L-004
MSG                     Variable     INT        Indirect     L-005
TYPE                    Variable     INT        Direct       L-006

000000 0  0    !
000000 0  0    ! PLACE THE CURRENT VERSION STRING IN 'BUF' AND RETURN
000000 0  0    !
000000 0  0    PROC
000000 0  0    SPOOL^LIBVERSION(BUF);
000000 1  0    STRING
000000 1  0      .BUF;     ! LIBRARY VERSION STRING RETURN PARAMETER
000000 1  0
000000 1  0      BEGIN
000000 1  1
```

```
 2495.     000000 1  1      ! SPOOL^LIBVERSION CODE
 2496.     000000 1  1
 2497.     000000 1  1      BUF ':=' VERSION^STRING;
 2498.     000007 1  1
 2499.     000007 1  1      END;  ! PROC SPOOL^LIBVERSION

BUF                              Variable       STRING          Indirect       L-003

 2500.     000000 0  0    ?SOURCE VERSRC(VERSION^PROC)
Source file:  [1]  $OVER.T9618C00.VERSRC  12NOV85 - 21:20:13
   11.     000000 0  0    ?SECTION VERSION^PROC
   13.     000000 0  0    !
   14.     000000 0  0    ! THIS PROCEDURE DOCUMENTS THE CURRENT VERSION
   15.     000000 0  0    ! OF THE PROGRAM
   16.     000000 0  0    !
   17.     000000 0  0    PROC T9101B00x^10aug85;
   18.     000000 1  0
   19.     000000 1  0      BEGIN
   20.     000000 1  1
   21.     000000 1  1      ! T9101B00x^10aug85 CODE
   22.     000000 1  1
   23.     000000 1  1      END;  ! PROC T9101B00x^10aug85
 2501.     000000 0  0    ?SOURCE VERSRC(LIBRARY^VERSION^PROCS)
Source file:  [1]  $OVER.T9618C00.VERSRC  12NOV85 - 21:20:13
   24.     000000 0  0    ?SECTION LIBRARY^VERSION^PROCS

   26.     000000 0  0    !
   27.     000000 0  0    ! THE NEXT TWO PROCEDURES DOCUMENT THE CURRENT VERSION
   28.     000000 0  0    ! FOR THE (COLLECTIVE) SYSTEM LIBRARY OBJECT FILES.
   29.     000000 0  0    !
   30.     000000 0  0    PROC T9101B00x^10aug85^LIBRARY;
   31.     000000 1  0
   32.     000000 1  0      BEGIN
   33.     000000 1  1
   34.     000000 1  1      ! T9101B00x^10aug85^LIBRARY CODE
   35.     000000 1  1
   36.     000000 1  1      END;  ! PROC T9101B00x^10aug85^LIBRARY
   37.     000000 0  0    !
   38.     000000 0  0    PROC T9101B00x^10aug85^LIBRARYX;
   39.     000000 1  0
   40.     000000 1  0      BEGIN
   41.     000000 1  1
   42.     000000 1  1      ! T9101B00x^10aug85^LIBRARYX CODE
   43.     000000 1  1
   44.     000000 1  1      END;  ! PROC T9101B00x^10aug85^LIBRARYX
 2502.     000000 0  0    ?MAP, NOLMAP, LMAP loc                                   !B30,MBB============= #XXX
```

| PEP | BASE | LIMIT | ENTRY | ATTRS | NAME | DATE | TIME | LANGUAGE | SOURCE FILE |
|---|---|---|---|---|---|---|---|---|---|
| 002 | 000036 | 000513 | 000120 | | SPOOL^TEXTCOMPRESS | 12FEB87 | 12:37 | TAL | $OVER.T9618C00.SPLTXCMP |
| 003 | 000514 | 000757 | 000554 | | SPOOL^TEXTEXPAND | 12FEB87 | 12:37 | TAL | $OVER.T9618C00.SPLTXCMP |
| 004 | 000760 | 001301 | 001016 | | SPOOL^COMPRESS | 12FEB87 | 12:37 | TAL | $OVER.T9618C00.LIBSRC |
| 005 | 001302 | 001514 | 001306 | | SPOOL^EXPAND | 12FEB87 | 12:37 | TAL | $OVER.T9618C00.LIBSRC |
| 006 | 001515 | 001600 | 001515 | | SPOOL^WBLK | 12FEB87 | 12:37 | TAL | $OVER.T9618C00.LIBSRC |
| 007 | 001601 | 002756 | 001757 | | SPOOL^CINV | 12FEB87 | 12:37 | TAL | $OVER.T9618C00.LIBSRC |
| 010 | 002757 | 003757 | 002757 | X | SPOOLSTART | 12FEB87 | 12:37 | TAL | $OVER.T9618C00.LIBSRC |
| 011 | 003760 | 004343 | 004120 | V | SPOOLWRITE | 12FEB87 | 12:37 | TAL | $OVER.T9618C00.LIBSRC |
| 012 | 004344 | 004571 | 004444 | V | SPOOLEND | 12FEB87 | 12:37 | TAL | $OVER.T9618C00.LIBSRC |
| 013 | 004572 | 005157 | 005023 | V | SPOOLCONTROL | 12FEB87 | 12:37 | TAL | $OVER.T9618C00.LIBSRC |
| 014 | 005160 | 005516 | 005301 | V | SPOOLSETMODE | 12FEB87 | 12:37 | TAL | $OVER.T9618C00.LIBSRC |
| 015 | 005517 | 006022 | 005662 | V | SPOOLCONTROLBUF | 12FEB87 | 12:37 | TAL | $OVER.T9618C00.LIBSRC |
| 016 | 006023 | 006070 | 006023 | | SPOOLJOBNUM | 12FEB87 | 12:37 | TAL | $OVER.T9618C00.LIBSRC |
| 017 | 006071 | 006222 | 006071 | V | PRINTREADCOMMAND | 12FEB87 | 12:37 | TAL | $OVER.T9618C00.LIBSRC |
| 020 | 006223 | 010140 | 010037 | V | PRINTREAD | 12FEB87 | 12:37 | TAL | $OVER.T9618C00.LIBSRC |
| 021 | 010141 | 010200 | 010141 | V | PRINTINFO | 12FEB87 | 12:37 | TAL | $OVER.T9618C00.LIBSRC |
| 022 | 010201 | 010501 | 010201 | | PRINTSTART | 12FEB87 | 12:37 | TAL | $OVER.T9618C00.LIBSRC |
| 023 | 010502 | 011000 | 010502 | V | PRINTSTATUS | 12FEB87 | 12:37 | TAL | $OVER.T9618C00.LIBSRC |
| 024 | 011001 | 011201 | 011001 | | PRINTCOMPLETE | 12FEB87 | 12:37 | TAL | $OVER.T9618C00.LIBSRC |
| 025 | 011202 | 011242 | 011202 | | PRINTINIT | 12FEB87 | 12:37 | TAL | $OVER.T9618C00.LIBSRC |
| 026 | 011243 | 012553 | 012410 | V | SPOOLERCOMMAND | 12FEB87 | 12:37 | TAL | $OVER.T9618C00.LIBSRC |
| 027 | 012554 | 014024 | 013107 | | SPOOLERSTATUS | 12FEB87 | 12:37 | TAL | $OVER.T9618C00.LIBSRC |
| 030 | 014025 | 014114 | 014025 | | SPOOLEREQUEST | 12FEB87 | 12:37 | TAL | $OVER.T9618C00.LIBSRC |
| 031 | 014115 | 014215 | 014152 | V | SPOOL^CHECKMSG | 12FEB87 | 12:37 | TAL | $OVER.T9618C00.LIBSRC |
| 032 | 014216 | 014240 | 014216 | | SPOOL^LIBVERSION | 12FEB87 | 12:37 | TAL | $OVER.T9618C00.LIBSRC |
| 033 | 014241 | 014241 | 014241 | | T9101B00X^10AUG85 | 12FEB87 | 12:37 | TAL | $OVER.T9618C00.VERSRC |
| 034 | 014242 | 014242 | 014242 | | T9101B00X^10AUG85^LIBRARY | 12FEB87 | 12:37 | TAL | $OVER.T9618C00.VERSRC |
| 035 | 014243 | 014243 | 014243 | | T9101B00X^10AUG85^LIBRARYX | 12FEB87 | 12:37 | TAL | $OVER.T9618C00.VERSRC |

DATA BLOCK MAP BY LOCATION

| BASE | LIMIT | TYPE | MODE | NAME | DATE | TIME | LANGUAGE | SOURCE FILE |
|---|---|---|---|---|---|---|---|---|
| 000000 | | COMMON | WORD | #GLOBAL | 12FEB87 | 12:37 | TAL | $OVER.T9618C00.LIBSRC |

```
BINDER - OBJECT FILE BINDER - T9621C00 - (09SEP86)   SYSTEM \PRUNE
Object file name is $OVER.T9618C00.spoollib
Object file timestamp is 12FEB87 12:37:48
Number of Binder errors = 0
Number of Binder warnings = 0
Code size = 6308 words
  PEP = 30 words
  Procedures = 6278 words
  Gap at 32K = 0 words
  XEP = 15 words
Code area size = 7 pages
Resident code size = 0 pages
Data area size = 3 pages
Extended data area size = 0 pages
Top of stack = 0 words
```

```
The object file will run on either a TNS or a TNS/II
Errorfile file name is $OVER.T9618C00.ELIBSRC
Number of compiler errors =  0
Number of compiler warnings =  6
Last compiler warning on page #  40 IN PROC SPOOL^EXPAND
Maximum symbol table space used was = 66824 bytes
Number of source lines = 7136
Compile cpu time = 00:00:20
Total Elapsed time = 00:02:27


                    ? ERRORFILE elisting,USEGLOBALS ggloba1,SEARCH ogloba1,NOCODE,SYMBOLS,NOGMAP,NOLMAP,NOFIXUP
UseGlobals file:  $OVER.T9618C00.GGLOBAL  02APR87 - 16:53:52
Search file:  $OVER.T9618C00.OGLOBAL  02APR87 - 16:55:07
     2.     000000 0  0   NAME     COVERCOM^LISTING;
     3.     000000 0  0   ?NOLIST
    34.     000000 0  0   ?BEGINCOMPILATION
    35.     000000 0  0   ?SOURCE copytal                    !Copyright notice
Source file:  [1]  $VIOLET.TOOLSC00.COPYTAL  18FEB87 - 09:37:02
     1.     000000 0  0   ! +---------------------------------------------------------------------+
     2.     000000 0  0   ! |                                                                     |
     3.     000000 0  0   ! |   Copyright (C) 1987 by TANDEM COMPUTERS INCORPORATED               |
     4.     000000 0  0   ! |                                                                     |
     5.     000000 0  0   ! |   Protected as an unpublished work.                                 |
     6.     000000 0  0   ! |                                                                     |
     7.     000000 0  0   ! |   The computer program listings and specifications herein are       |
     8.     000000 0  0   ! |   the property of TANDEM COMPUTERS INCORPORATED and shall not be    |
     9.     000000 0  0   ! |   reproduced, copied, or used, in whole or in part, for any         |
    10.     000000 0  0   ! |   reason without the written permission of TANDEM COMPUTERS         |
    11.     000000 0  0   ! |   INCORPORATED.                                                     |
    12.     000000 0  0   ! |                                                                     |
    13.     000000 0  0   ! |   The following are trademarks or service marks of TANDEM           |
    14.     000000 0  0   ! |   COMPUTERS INCORPORATED:                                           |
    15.     000000 0  0   ! |                                                                     |
    16.     000000 0  0   ! |   6AX         ENSCRIBE      INFOSAT*      PATHMAKER       TAL       |
    17.     000000 0  0   ! |   APEX/SQL    ENVOY         INSPECT       PCFORMAT        Tandem    |
    18.     000000 0  0   ! |   BINDER      ENVOYACP/XF   MEASURE       PERUSE          TGAL      |
    19.     000000 0  0   ! |   CROSSREF    EXCHANGE      MULTILAN      PS MAIL         THL       |
    20.     000000 0  0   ! |   DATABOLT    EXPAND        NonStop       PS TEXT EDIT    TIL       |
    21.     000000 0  0   ! |   DDL         FASTSORT      NonStop 1+    PS TEXT FORMAT  TMF       |
    22.     000000 0  0   ! |   DYNABUS     FAXLINK       NonStop EXT   RDF             TRANSFER  |
    23.     000000 0  0   ! |   DYNAMITE    FOX           NonStop EXT10 SAFE            WORDLINK  |
    24.     000000 0  0   ! |   ENABLE      FOXII         NonStop EXT25 SAFEGUARD       XL8       |
    25.     000000 0  0   ! |   ENCOMPASS   GUARDIAN      NonStop II    SAFE-T-NET      XRAY      |
    26.     000000 0  0   ! |   ENCORE      GUARDIAN 90   NonStop TXP   T-TEXT                    |
    27.     000000 0  0   ! |   ENFORM      GUARDIAN 90XF NonStop VLX   TACL                      |
    28.     000000 0  0   ! |                                                                     |
    29.     000000 0  0   ! +---------------------------------------------------------------------+
    30.     000000 0  0   ! | * INFOSAT is a trademark in which both Tandem and American          |
    31.     000000 0  0   ! |   Satellite have rights.                                            |
    32.     000000 0  0   ! +---------------------------------------------------------------------+
    33.     000000 0  0   ! |   TANDEM COMPUTERS INCORPORATED -- PROPRIETARY AND CONFIDENTIAL     |
    34.     000000 0  0   ! +---------------------------------------------------------------------+
    36.     000000 0  0   ?NOLIST, source extdecs  (
    56.     000000 0  0   ?NOLIST, source splext(spoolstart)  ! new spoolstart parameters
    58.     000000 0  0   ?NOLIST, source pfprint( fprint )
```

```
 60.     000000 0  0   ?NOLIST, source pscan
 62.     000000 0  0   ?NOLIST, source pgp( mtimestampcollapse )
 64.     000000 0  0   ?NOLIST, source preadobj
 66.     000000 0  0   ?NOLIST, source pobject( WhyCantRead )
 68.     000000 0  0   ?NOLIST, source pbitmap( ReadBitmapFile, TestForHit )
 70.     000000 0  0   ?NOLIST, source pcover( debug^err, finger^err, FprintPoof, nextchar )
 72.     000000 0  0   ?SETTOG 15                              !For FORWARDs
 73.     000000 0  0   ?NOLIST, source plisting
 75.     000000 0  0   ?RESETTOG 15
 76.     000000 0  0   ?LIST
 77.     000000 0  0   ?SOURCE sversion( version^listing )
Source file:  [1]  $OVER.T9618C00.SVERSION  02APR87 - 13:48:41
 36.     000000 0  0   ?SECTION VERSION^LISTING
 37.     000000 0  0   PROC T9618C00^15JUL87^LISTING^02APR7;
 38.     000000 1  0   BEGIN END;
 78.     000000 0  0   ?SOURCE slisting
Source file:  [1]  $OVER.T9618C00.SLISTING  03APR87 - 08:16:11

  2.    000000 0  0   ! This procedure will scan the ListingByLine looking for toggle
  3.    000000 0  0   ! directives which may influence whether or not a source line should
  4.    000000 0  0   ! be parsed by the MarkupListing routine.  We are called by
  5.    000000 0  0   ! ReadListingLine when a compiler directive line is read ("?" in the
  6.    000000 0  0   ! 1st column).  The directives we're interested in are:
  7.    000000 0  0   ! ?ENDIF
  8.    000000 0  0   ! ?IF[NOT]
  9.    000000 0  0   ! ?[RE]SETTOG
 10.    000000 0  0   !
 11.    000000 0  0   ! We'll simply RETURN if IGNORETOGGLES was specified.
 12.    000000 0  0   !
 13.    000000 0  0   ! Implementation note: We assume that these directives are always the
 14.    000000 0  0   ! LAST ones on any given directive line (so they'll always be followed by
 15.    000000 0  0   ! at least one blank.)
 16.    000000 0  0   !
 17.    000000 0  0   ! This procedure sets and resets the globals MarkupToggles and MarkupSkipping.
 18.    000000 0  0   proc CheckToggles;
 19.    000000 1  0   begin
 20.    000000 1  1   string      .ScanPtr;
 21.    000000 1  1   int          temp;
 22.    000000 1  1
 23.    000000 1  1
 24.    000000 1  1
 25.    000000 1  1   ! This subproc will return the value of the next number then point to the
 26.    000000 1  1   ! following one.
 27.    000000 1  1   ! It returns 0 if no number found or if number is out of
 28.    000000 1  1   ! the range 1 through 15.
 29.    000000 1  1   ! It returns -1 if "TNS" or "TNS/II" is found.
 30.    000000 1  1   int subproc getnum;
 31.    000000 2  1   begin
 32.    000000 2  2   int          result;
 33.    000000 2  2   int          status;
 34.    000000 2  2
 35.    000000 2  2   if ScanPtr = "TNS" or ScanPtr = "TNS/II" then
 36.    000021 2  2      return -1;                        !?CPU TNS[/II] not supported.
 37.    000026 2  2
 38.    000026 2  2   @ScanPtr := numin( ScanPtr, result, 10, status );
 39.    000037 2  2   if status then return 0;
```

```
000044 2  2   if result > 15 or result < 1 then return 0;
000055 2  2
000055 2  2   ! Point to following number, if any.
000055 2  2   scan ScanPtr while " " -> @ScanPtr;
000061 2  2   scan ScanPtr while "," -> @ScanPtr;
000065 2  2   scan ScanPtr while " " -> @ScanPtr;
000071 2  2
000071 2  2   return result;
000074 2  2
000074 2  2   end; !subproc getnum

RESULT                 Variable      INT          Direct        S-001
STATUS                 Variable      INT          Direct        S-000


000101 1  1   if IgnoreToggles then return;        !Don't bother.
000105 1  1
000105 1  1   @ScanPtr := @ByLineScanPtr;          !Initialize scan
000107 1  1
000107 1  1   do @ScanPtr := @ScanPtr '+' 1 until
000112 1  1         ScanPtr = "ENDIF " or
000112 1  1         ScanPtr = "IF " or
000112 1  1         ScanPtr = "IFNOT " or
000112 1  1         ScanPtr = "RESETTOG " or
000112 1  1         ScanPtr = "SETTOG " or
000112 1  1         @ScanPtr >= StopByLineScan;
000166 1  1
000166 1  1   if @ScanPtr >= StopByLineScan then
000172 1  1      return;                           !Got to end of line
000200 1  1
000200 1  1   ! Found one of the above toggle directives.  Handle it.
000200 1  1   if ScanPtr = "E" then begin             !ENDIF
000203 1  2      scan ScanPtr[6] while " " -> @ScanPtr;
000210 1  2      if NOT MarkupSkipping then return; !Ignore it
000213 1  2      temp := getnum;
000215 1  2      if temp = -1 then begin
000220 1  3         call fprint( @IgnoreCPU, @ListingLine ); return; end;
000236 1  2      if MarkupSkipping = temp then
000242 1  2         MarkupSkipping := 0;          !End of skipping
000244 1  2
000244 1  2   end else if ScanPtr = "IFN" then begin   !IFNOT
000255 1  2      scan ScanPtr[6] while " " -> @ScanPtr;
000262 1  2      if MarkupSkipping then return;  !Ignore it.
000266 1  2      temp := getnum;
000270 1  2      if temp = -1 then begin
000273 1  3         call fprint( @IgnoreCPU, @ListingLine ); return; end;
000310 1  2      if MarkupToggles[temp] then MarkupSkipping := temp;
000315 1  2
000315 1  2   end else if ScanPtr = "I" then begin     !IF
000321 1  2      scan ScanPtr[3] while " " -> @ScanPtr;
000326 1  2      if MarkupSkipping then return;  !Ignore it.
000331 1  2      temp := getnum;
000333 1  2      if temp = -1 then begin
000336 1  3         call fprint( @IgnoreCPU, @ListingLine ); return; end;
000353 1  2      if NOT MarkupToggles[temp] then MarkupSkipping := temp;
```

```
000360 1  2
000360 1  2   end else if ScanPtr = "R" then begin      !RESETTOG
000364 1  2      scan ScanPtr[9] while " " -> @ScanPtr;
000371 1  2      if MarkupSkipping then return;  !Ignore it.
000374 1  2      temp := getnum;
000376 1  2      if temp then begin                   !RESET them individually
000400 1  3         while temp do begin
000402 1  4         MarkupToggles[temp] := FALSE;
000405 1  4         temp := getnum;                   !Get next, if any
000407 1  4         end;
000410 1  3      end else MarkupToggles[1] ':=' [15 * [FALSE]];
000420 1  2
000420 1  2   end else begin                            !SETTOG
000422 1  2      scan ScanPtr[7] while " " -> @ScanPtr;
000427 1  2      if MarkupSkipping then return;  !Ignore it.
000432 1  2      temp := getnum;
000434 1  2      if temp then begin                   !SET them individually
000436 1  3         while temp do begin
000440 1  4         MarkupToggles[temp] := TRUE;
000443 1  4         temp := getnum;                   !Get next, if any
000447 1  4         end;
000451 1  3      end else MarkupToggles[1] ':=' [15 * [TRUE]];
000461 1  2
000461 1  2      end;
000461 1  1
000461 1  1   end; !proc CheckToggles

GETNUM                   Subproc      INT          %000000
SCANPTR                  Variable     STRING       Indirect     L+001
TEMP                     Variable     INT          Direct       L+002

000000 0  0   ! Copy listing until a PROC statement has been followed by a BEGIN.  When
000000 0  0   ! it has, return the name of the procedure found.
000000 0  0   int proc CopyUntilBegin( ProcName );
000000 1  0   string     .ProcName;                   !Name is terminated with 0.
000000 1  0   begin
000000 1  1   string     .ptr;
000000 1  1   int         error;
000000 1  1   label       TryNext;
000000 1  1
000000 1  1   TryNext:
000001 1  1   ! Copy until PROC reserved word is found.
000001 1  1   while ByLineScanPtr <> "PROC " do begin
000011 1  2      if @ByLineScanPtr >= StopByLineScan then begin  !Got to end of line before
000015 1  3                                           !finding PROC, so write this line and read
000015 1  3                                           !the next one.
000015 1  3         if (error := WriteListingLine) then return error;
000023 1  3         if (error := ReadListingLine) then return error;
000030 1  3         end
000030 1  2      else begin
000031 1  3         scan ByLineScanPtr until " " -> @ByLineScanPtr;
000035 1  3         scan ByLineScanPtr while " " -> @ByLineScanPtr;
000041 1  3         end;
000041 1  2      end;
000042 1  1
```

```
000042 1  1   ! We've found PROC definition
000042 1  1   MarkChar := " ";                      !Don't mark any PROC headers
000044 1  1
000044 1  1   @ByLineScanPtr := @ByLineScanPtr + 5;    !Skip "PROC "
000046 1  1   scan ByLineScanPtr while " " -> @ByLineScanPtr;    !Find 1st character after
000052 1  1   if $carry then begin                  !Didn't find name
000053 1  2      if (error := WriteListingLine) then return error;
000060 1  2      if (error := ReadListingLine) then return error;
000065 1  2      end;
000065 1  1
000065 1  1   ! Now we're pointing to a proc name!
000065 1  1   @ptr := @ByLineScanPtr;               !Save start position
000067 1  1   while NOT $special(ByLineScanPtr)     !Look for end of proc name
000067 1  1         OR ByLineScanPtr = "^" do
000075 1  1      @ByLineScanPtr := @ByLineScanPtr + 1; !Look at next character in line
000100 1  1   ProcName ':=' ptr for (@ByLineScanPtr - @ptr) bytes & 0;
000114 1  1
000114 1  1   ! Find ";" terminating proc header
000114 1  1   do begin
000114 1  2      scan ByLineScanPtr until ";" -> @ByLineScanPtr;
000120 1  2      if $carry then begin
000121 1  3         if (error := WriteListingLine) then return error;
000127 1  3         if (error := ReadListingLine) then return error;
000134 1  3         end
000134 1  2      else error := TRUE;                !Terminate loop
000137 1  2   end until error;
000141 1  1   @ByLineScanPtr := @ByLineScanPtr '+' 1; !Past ";"
000144 1  1
000144 1  1   ! Look for FORWARD, EXTERNAL, or BEGIN.
000144 1  1   while ByLineScanPtr <> "FORWARD " AND
000144 1  1         ByLineScanPtr <> "FORWARD;" AND
000144 1  1         ByLineScanPtr <> "EXTERNAL " AND
000144 1  1         ByLineScanPtr <> "EXTERNAL;" AND
000144 1  1         ByLineScanPtr <> "BEGIN " AND
000144 1  1         ByLineScanPtr <> "BEGIN;" do begin
000224 1  2      if @ByLineScanPtr >= StopByLineScan then begin  !Got to end of line
000230 1  3                                         !before finding reserved word, so
000230 1  3                                         !write this line and read the next one.
000230 1  3         if (error := WriteListingLine) then return error;
000243 1  3         if (error := ReadListingLine) then return error;
000250 1  3         end
000250 1  2      else begin
000251 1  3         scan ByLineScanPtr until " " -> @ByLineScanPtr;
000255 1  3         scan ByLineScanPtr while " " -> @ByLineScanPtr;
000261 1  3         end;
000261 1  2      end;
000262 1  1
000262 1  1   ! We found one of the three.
000262 1  1   if ByLineScanPtr <> "B" then GOTO TryNext; !Skip FORWARD and EXTERNAL
000267 1  1                                         !definitions.
000267 1  1
000267 1  1   ! We've found BEGIN of proc
000267 1  1   @ByLineScanPtr := @ByLineScanPtr + 6; !Past BEGIN (and " " or ";")
000271 1  1   BeginEndDepth := 1;                   !Initialize END of PROC scan.
000273 1  1
000273 1  1   scan ByLineScanPtr while " " -> @ByLineScanPtr;    !Find 1st character after
```

```
        000277 1  1
        000277 1  1   return 0;                          !We've not encountered any I/O errors
        000301 1  1
        000301 1  1   end; !proc CopyUntilBegin

ERROR                          Variable     INT         Direct       L+002
PROCNAME                       Variable     STRING      Indirect     L-003
PTR                            Variable     STRING      Indirect     L+001
TRYNEXT                        Label                    %000001
        000000 0  0   ! Read object file statement starters to determine whether a source line's
        000000 0  0   ! statements were executed, unexecuted, or mixed.  Set MarkChar accordingly.
        000000 0  0   ! Returns any I/O or RO^ errors except -1 (EOF).  Normal return is 0.
        000000 0  0   int proc GetMarker( LineNumber, Library, ObjFn );
        000000 1  0   int(32)     LineNumber;            !Edit line number
        000000 1  0   int         Library;               !0 if program; 1 if library.
        000000 1  0   int         ObjFn;                 !File number of object file
        000000 1  0   begin
        000000 1  1   int         executed := FALSE;     !TRUE if an executed statement is here.
        000000 1  1   int         unexecuted := FALSE;   !TRUE if an unexecuted statement is here.
        000000 1  1   int         error;
        000000 1  1   int         SameLine;
        000000 1  1
        000000 1  1   MarkChar := " ";                   !Assume executed
        000005 1  1
        000005 1  1   if GetMarkCurrent.LineNum = 0d then return 0; !All were read already
        000014 1  1
        000014 1  1   if LineNumber < GetMarkCurrent.LineNum then return 0; !Not yet to line
        000023 1  1
        000023 1  1   ! If locals were initialized then there is a statement starter for the
        000023 1  1   ! "PROC" line number which we may have already passed (BEGIN statement
        000023 1  1   ! is on a line following the PROC statement.)
        000023 1  1   if LineNumber > GetMarkCurrent.LineNum AND
        000023 1  1      GetMarkCurrent.Offset then return 0; !Not yet to line
        000035 1  1
        000035 1  1   ! Read all the statement starters for this edit line number and test for hit.
        000035 1  1   SameLine := TRUE;
        000037 1  1   while SameLine do
        000041 1  1      begin
        000041 1  2      if TestForHit( Procedure.Spaceid + (Library << 11),
        000041 1  2                     Procedure.Offset '+' GetMarkCurrent.Offset )
        000041 1  2      then executed := TRUE else unexecuted := TRUE;
        000063 1  2
        000063 1  2      ! "Read" next.
        000063 1  2      SameLine := (GetMarkCurrent.LineNum = Statement.LineNum) AND
        000063 1  2              (GetMarkCurrent.FileName = Statement.FileName for 12 words);
        000103 1  2      GetMarkCurrent.LineNum := Statement.LineNum;
        000107 1  2      GetMarkCurrent.Offset := Statement.Offset;
        000112 1  2      GetMarkCurrent.FileName ':=' Statement.FileName for 12 words;
        000117 1  2
        000117 1  2      ! Do read-ahead.
        000117 1  2      error := GetNextStatement( ObjFn );
        000123 1  2      Statement.LineNum := $abs(Statement.LineNum); !For COBOL
        000131 1  2      if error then if error <> -1 then return error
        000136 1  2      else Statement.LineNum := 0d; !Indicate no more to read.
        000144 1  2      end;
        000145 1  1
        000145 1  1   if unexecuted then
```

```
 251.     000147 1  1       MarkChar := (if executed then "+" else "*");
 252.     000155 1  1
 253.     000155 1  1    return 0;                         !We've not encountered any I/O errors
 254.     000157 1  1
 255.     000157 1  1    end; !proc GetMarker

ERROR                        Variable      INT           Direct        L+003
EXECUTED                     Variable      INT           Direct        L+001
LIBRARY                      Variable      INT           Direct        L-004
LINENUMBER                   Variable      INT (32)      Direct        L-006
OBJFN                        Variable      INT           Direct        L-003
SAMELINE                     Variable      INT           Direct        L+004
UNEXECUTED                   Variable      INT           Direct        L+002
 257.     000000 0  0.  ! Set up scan of object file for this procedure name.
 258.     000000 0  0   ! Returns 0 if Procedure name found and we could initialize get next statement
 259.     000000 0  0   ! scan.  Otherwise returns RO^ error.  (-1 means not found, no symbols, or no
 260.     000000 0  0   ! statement starters.
 261.     000000 0  0   int proc GetUniqueProc( ObjFileName, ObjFn, ProcName );
 262.     000000 1  0   int        .ObjFileName;            !Needed for re-open
 263.     000000 1  0   int        .ObjFn;                  !Call by reference, so can change w/ re-open
 264.     000000 1  0   string     .ProcName;               !Name is terminated with 0.
 265.     000000 1  0   begin
 266.     000000 1  1   string     .ptr;
 267.     000000 1  1   int         NameLength;             !Procedure name length INCLUDING trailing 0.
 268.     000000 1  1   int         error;
 269.     000000 1  1   int         Pass2 := FALSE;
 270.     000000 1  1
 271.     000000 1  1   scan ProcName until 0 -> @ptr;     !Find stopper.
 272.     000007 1  1   NameLength := @ptr '-' @ProcName '+' 1;
 273.     000014 1  1
 274.     000014 1  1   ! The algorithm for finding the PIT header for this procedure name is
 275.     000014 1  1   ! to search from the current PIT header until we find the procedure
 276.     000014 1  1   ! desired.  If we reach the end of the PIT headers, then we will close
 277.     000014 1  1   ! and re-open the object file which will allow us to start scanning
 278.     000014 1  1   ! from the beginning again.  We will do this at most one time.  The
 279.     000014 1  1   ! reason we don't ALWAYS start the search from the beginning is that
 280.     000014 1  1   ! in general the procedures will be in the same order in the object
 281.     000014 1  1   ! file as they are in the listing, so we'll usually find the proc
 282.     000014 1  1   ! we're looking for in the very next PIT header.
 283.     000014 1  1
 284.     000014 1  1   while TRUE do
 285.     000014 1  1      begin
 286.     000014 1  2
 287.     000014 1  2      error := GetNextProcedure( ObjFn ); !Get next procedure name.
 288.     000020 1  2
 289.     000020 1  2      if error then
 290.     000022 1  2         begin
 291.     000022 1  3         if error = -1 then begin
 292.     000025 1  4            call close( ObjFn );       !We've reached end.  Close and start over.
 293.     000032 1  4            if (error := OpenObjectFile( ObjFileName, ObjFn )) then return error;
 294.     000042 1  4            if Pass2 then return -1;  !We scanned entire file and didn't find it.
 295.     000046 1  4            Pass2 := TRUE;             !Don't loop more than once.
 296.     000050 1  4            end
 297.     000050 1  3         else return error;
 298.     000053 1  3         end
 299.     000053 1  2
```

```
000053 1  2      else
000054 1  2
000054 1  2         begin
000054 1  3         if Procedure.Name = ProcName for NameLength then begin !Found it!
000062 1  4            if Procedure.HasInspect then !Are there any statement starters?
000065 1  4               begin
000065 1  5               if (error := GetNextStatement( ObjFn )) then return error;
000074 1  5               ! Initialize GetMarker
000074 1  5               GetMarkCurrent.LineNum := $abs(Statement.LineNum); !For COBOL.
000102 1  5               GetMarkCurrent.Offset := Statement.Offset;
000105 1  5               GetMarkCurrent.FileName ':=' Statement.FileName for 12 words;
000112 1  5               error := GetNextStatement( ObjFn );
000116 1  5               Statement.LineNum := $abs(Statement.LineNum);
000124 1  5               if error then if error <> -1 then return error
000131 1  5               else Statement.LineNum := 0d; !Indicate no more to read.
000137 1  5               return 0                    !This was measured.
000137 1  5               end
000141 1  4            else
000142 1  4               return -1;                  !Pretend it wasn't found.
000144 1  4            end;
000144 1  3         end;
000144 1  2
000144 1  2      end;
000145 1  1
000145 1  1   end; !proc GetUniqueProc

ERROR                       Variable      INT          Direct        L+003
NAMELENGTH                  Variable      INT          Direct        L+002
OBJFILENAME                 Variable      INT          Indirect      L-005
OBJFN                       Variable      INT          Indirect      L-004
PASS2                       Variable      INT          Direct        L+004
PROCNAME                    Variable      STRING       Indirect      L-003
PTR                         Variable      STRING       Indirect      L+001

000000 0  0   ! This procedure returns the EDIT line number from the current listing line.
000000 0  0   ! Returns 0d if there is an error in conversion.
000000 0  0   int(32) proc LineNumber;
000000 1  0   begin
000000 1  1   int(32)     HighPart;
000000 1  1   string      .StdPtr;
000000 1  1   string .ext ExtPtr;
000000 1  1   int         status;
000000 1  1
000000 1  1   scan ListingLine while " " -> @StdPtr;  !Find 1st numeric
000005 1  1   @ExtPtr := $XADR( StdPtr );          !Use extended pointer
000010 1  1   @ExtPtr := dnumin( ExtPtr, HighPart, 10, status, %6 !no sign & prefix! );
000027 1  1   if status <> 0 then return 0d;       !Error in conversion
000034 1  1   if ExtPtr <> "." then return 0d;     !Listings all print the decimal point
000042 1  1
000042 1  1   HighPart := HighPart * 1000d;        !Scale factor
000050 1  1
000050 1  1   @ExtPtr := @ExtPtr + 1d;
000054 1  1   if ExtPtr = " " then return HighPart;
000062 1  1   HighPart := HighPart + (100 '*' (ExtPtr - "0"));
000072 1  1
000072 1  1   @ExtPtr := @ExtPtr + 1d;
000076 1  1   if ExtPtr = " " then return HighPart;
```

```
000104 1   1   HighPart := HighPart + (10 '*' (ExtPtr - "0"));
000114 1   1
000114 1   1   @ExtPtr := @ExtPtr + 1d;
000120 1   1   if ExtPtr = " " then return HighPart;
000126 1   1   HighPart := HighPart + ($udbl(ExtPtr - "0"));
000134 1   1
000134 1   1   return HighPart;
000136 1   1
000136 1   1   end; !proc LineNumber

EXTPTR                  Variable     STRING       EXT Pointer    L+004
HIGHPART                Variable     INT (32)     Direct         L+001
STATUS                  Variable     INT          Direct         L+006
STDPTR                  Variable     STRING       Indirect       L+003
000000 0   0   proc !prv! Markup^Command;
000000 1   0   begin
000000 1   1   string      Params = 'P' := ["LISTING ",
000004 1   1                                "TO ",
000006 1   1                                "BITMAP ",
000011 1   1                                "LIBRARY ",
000015 1   1                                "COLUMNS ",
000021 1   1                                "IGNORETOGGLES ",
000030 1   1                                "OBJECT",0];
000034 1   1   string      TellBitmapF = 'P' :=
000034 1   1               ["Bitmap is from 'F*",0];
000046 1   1   string      TellObj = 'P' :=
000046 1   1               ["Object file is 'F* dated '22!",0];
000065 1   1
000065 1   1   string .ext DiscImage( CoverDiscImageTemplate ) := %2000000d;
000065 1   1   struct      .csil( CSIL^def )[0:31];
000065 1   1   struct      .hdr( Object^File^Header^Def );
000065 1   1
000065 1   1   int         ListingKeywd := FALSE; !flag - LISTING file specified
000065 1   1   int         BitmapKeywd := FALSE;  !flag - BITMAP file specified
000065 1   1   int         ToKeywd := FALSE;      !flag - TO file specified
000065 1   1   int         LibraryKeywd := FALSE; !flag - LIBRARY keyword specified
000065 1   1   int         ObjKeywd := FALSE;     !flag - OBJECT file specified override
000065 1   1   int         BitmapFile[0:11];
000065 1   1   int         ObjFile[0:11];
000065 1   1   int         ObjFn;
000065 1   1
000065 1   1   int         G16 := FALSE;          !TRUE iff >16 segment code file
000065 1   1   int         error;
000065 1   1   int         space;
000065 1   1   int         Timestamp[0:2];
000065 1   1   string      ProcName[0:31];        !Procedure name to find.
000065 1   1   string      ws[0:22];
000065 1   1   label       DoneProc;
000065 1   1   label       CloseReturn;
000065 1   1   ! This subproc will scan the ListingByLine for a terminating END reserved word.
000065 1   1   int subproc EndFound;
000065 2   1   begin
000065 2   2
000065 2   2   while @ByLineScanPtr < StopByLineScan do begin
000071 2   3     while
000071 2   3           ByLineScanPtr <> "END" and
```

```
000071 2  3          ByLineScanPtr <> "BEGIN" and
000071 2  3          @ByLineScanPtr < StopByLineScan
000071 2  3    do @ByLineScanPtr := @ByLineScanPtr '+' 1;
000123 2  3
000123 2  3    if @ByLineScanPtr >= StopByLineScan then
000127 2  3       return FALSE;                      !Got to end of line
000131 2  3
000131 2  3    if ByLineScanPtr = "B" then begin !Found BEGIN
000134 2  4       @ByLineScanPtr := @ByLineScanPtr + 5; !Past BEGIN
000136 2  4       if ByLineScanPtr = " " OR     !token end
000136 2  4          ByLineScanPtr = ";" OR     !statement end
000136 2  4          ByLineScanPtr = "#" then   !define end
000147 2  4          begin
000147 2  5          BeginEndDepth := BeginEndDepth + 1;
000151 2  5          end;
000151 2  4    end else begin                        !Found END
000152 2  4       @ByLineScanPtr := @ByLineScanPtr + 3; !Past END
000154 2  4       if ByLineScanPtr = " " OR     !token end
000154 2  4          ByLineScanPtr = ";" OR     !statement end
000154 2  4          ByLineScanPtr = "#" then   !define end
000165 2  4          begin
000165 2  5          BeginEndDepth := BeginEndDepth - 1;
000167 2  5          end;
000167 2  4       if BeginEndDepth = 0 then return TRUE;
000174 2  4       end;
000174 2  3
000174 2  3    end;
000175 2  2
000175 2  2 end;
000204 1  1 columns := -1;                        !Indicate keyword not specified yet.
000232 1  1 IgnoreToggles := FALSE;               !Default
000234 1  1
000234 1  1 while nextchar(0) do
000241 1  1    case scanidt( charadr, @Params ) of
000255 1  1    begin
000255 1  2    !LISTING! begin
000255 1 CE0            if ListingKeywd then call debug^err;
000263 1  3             if NOT scanfname( charadr, InListFilename, defaults.word ) then
000273 1  3                call finger^err( @NoFile );
000303 1  3             ListingKeywd := TRUE;
000305 1  3             end;
000307 1 CE1   !TO    ! begin
000307 1  3             if ToKeywd then call debug^err;
000315 1  3             if NOT scanfname( charadr, OutListFilename, defaults.word ) then
000325 1  3                call finger^err( @NoFile );
000335 1  3             ToKeywd := TRUE;
000337 1  3             end;
000341 1 CE2   !BITMAP ! begin
000341 1  3             if BitmapKeywd then call debug^err;
000347 1  3             if NOT scanfname( charadr, BitmapFile, defaults.word ) then
000357 1  3                call finger^err( @NoFile );
000367 1  3             BitmapKeywd := TRUE;
000371 1  3             end;
000373 1 CE3   !LIBRARY!begin
000373 1  3             if LibraryKeywd then call debug^err;
000401 1  3             LibraryKeywd := TRUE;
000403 1  3             end;
```

```
000404 1 CE4     !COLUMNS! begin
000404 1  3               if Columns <> -1 then call debug^err;
000413 1  3               if scanint( charadr, Columns,, 1, 110 ) then
000425 1  3                  call finger^err( @NotNum );
000435 1  3               end;
000437 1 CE5     !IGNORETOGGLES! begin
000437 1  3               if IgnoreToggles then call debug^err;
000450 1  3               IgnoreToggles := TRUE;
000452 1  3               end;
000453 1 CE6     !OBJECT! begin
000453 1  3               if ObjKeywd then call debug^err;
000461 1  3               if NOT scanfname( charadr, ObjFile, defaults.word ) then
000471 1  3                  call finger^err( @NoFile );
000501 1  3               ObjKeywd := TRUE;
000503 1  3               end;
000506 1 CE7        otherwise call debug^err;
000512 1  2         end;
000534 1  1      eol;
000545 1  1
000545 1  1      if columns = -1 then columns := ColumnsDefault;
000552 1  1      ! Test for missing keywords.
000552 1  1      if NOT ListingKeywd OR
000552 1  1         NOT BitmapKeywd OR
000552 1  1         NOT ToKeywd then call debug^err;

000564 1  1      call ReadBitmapFile( BitmapFile, DiscImage );
000573 1  1      call FprintPoof( @TellBitmapF, @BitmapFile );
000606 1  1
000606 1  1      if DiscImage.UC.Name = DiscImage.UL.Name for 12 words then
000621 1  1         G16 := TRUE;                         !Program is more than 16 segments
000623 1  1
000623 1  1      if G16 AND LibraryKeywd then
000627 1  1         begin call Fprint( @NoLibWithG16 ); return; end;
000643 1  1      if LibraryKeywd AND NOT DiscImage.UL.SpaceCount then
000650 1  1         begin call Fprint( @NoLib ); return; end;
000664 1  1      if NOT LibraryKeywd AND NOT DiscImage.UC.SpaceCount then
000671 1  1         begin call Fprint( @NoProg ); return; end;
000705 1  1
000705 1  1      if NOT ObjKeywd then                   !Get name of object file from bitmap file.
000707 1  1         if LibraryKeywd then
000711 1  1            ObjFile ':=' DiscImage.UL.Name for 12 words
000711 1  1         else
000723 1  1            ObjFile ':=' DiscImage.UC.Name for 12 words;
000734 1  1
000734 1  1      if (error := OpenObjectFile( ObjFile, ObjFn )) then
000742 1  1         begin call WhyCantRead( ObjFile, error ); return; end;
000747 1  1
000747 1  1      call fileinfo(,,ObjFile,,,,,,Timestamp);
000764 1  1      call mtimestampcollapse( ws, Timestamp );
000773 1  1      call FprintPoof( @TellObj, @ObjFile, @ws );
001010 1  1
001010 1  1      if (error := PositRead( ObjFn, hdr, 0d, $len(hdr) )) then !Read header
001020 1  1         begin
001020 1  2         call WhyCantRead( ObjFile, error );
001024 1  2         goto CloseReturn;
001025 1  2         end;
001025 1  1
```

```
001025 1  1   ! Check that object file has same binder timestamp.  Just warning if not.
001025 1  1   if LibraryKeywd then
001027 1  1      begin
001027 1  2      if DiscImage.UL.Timestamp <> hdr.binder^timestamp for 3 words then
001042 1  2         call fprint( @WarnBind );
001054 1  2      end
001054 1  1   else
001056 1  1      begin
001056 1  2      if DiscImage.UC.Timestamp <> hdr.binder^timestamp for 3 words then
001071 1  2         call fprint( @WarnBind );
001103 1  2      end;
001103 1  1
001103 1  1   ! Make sure spaces are reasonable.
001103 1  1   if hdr.CSIL^length/wlen(CSIL^def) <>
001103 1  1      (if G16 then DiscImage.UC.SpaceCount + DiscImage.UL.SpaceCount
001103 1  1       else if LibraryKeywd then DiscImage.UL.SpaceCount
001103 1  1            else                 DiscImage.UC.SpaceCount) then
001131 1  1         begin call fprint( @SpaceDif ); goto CloseReturn; end;
001145 1  1
001145 1  1   if (error := PositRead(ObjFn, csil, hdr.CSIL^addr, hdr.CSIL^length'<<'1))
001145 1  1   then begin call WhyCantRead( ObjFile, error ); goto CloseReturn; end;
001165 1  1
001165 1  1   if G16 then for space := 0 to DiscImage.UL.SpaceCount - 1 do
001171 1  1      if DiscImage.UL.SpaceSize[ space ] <> csil[ space + 16 ].size then
001206 1  1         begin call fprint( @SpaceDif ); goto CloseReturn; end;
001234 1  1
001234 1  1   if LibraryKeywd then
001236 1  1      begin
001236 1  2      for space := 0 to DiscImage.UL.SpaceCount - 1 do
001240 1  2         if DiscImage.UL.SpaceSize[ space ] <> csil[ space ].size then
001254 1  2            begin call fprint( @SpaceDif ); goto CloseReturn; end;
001300 1  2      end
001300 1  1   else
001301 1  1      begin
001301 1  2      for space := 0 to DiscImage.UC.SpaceCount - 1 do
001303 1  2         if DiscImage.UC.SpaceSize[ space ] <> csil[ space ].size then
001317 1  2            begin call fprint( @SpaceDif ); goto CloseReturn; end;
001343 1  2      end;
001343 1  1
001343 1  1   if NOT OpenListingFiles then GOTO CloseReturn;
001346 1  1   error := ReadListingLine;            !Initialize loop
001350 1  1   while NOT error do begin
001352 1  2      !Copy input to output until proc name is found and we've reached a BEGIN.
001352 1  2      !Any lines that are output during scan will be marked " " or "?".
001352 1  2      if NOT (error := CopyUntilBegin( ProcName )) then begin
001360 1  3         !Find proc header in object file and initialize GetMarker.
001360 1  3         if (error := GetUniqueProc( ObjFile, ObjFn, ProcName )) then begin
001370 1  4            if error <> -1 then
001373 1  4               begin
001373 1  5               call WhyCantRead( ObjFile, error );
001377 1  5               GOTO CloseReturn;
001400 1  5               end
001400 1  4            else
001401 1  4               begin
001401 1  5               error := 0;            !-1 is OK; it means not found or no symbols.
001403 1  5               MarkChar := "?";       !This procedure isn't in object file.
```

```
001405 1  5              GOTO DoneProc;          !Go ahead to next proc, marking this one.
001406 1  5              end;
001406 1  4           end
001406 1  3        else begin
001407 1  4           !Do whole procedure (until END statement has been marked).
001407 1  4           do begin
001407 1  5              !Set MarkChar depending on LineNumber from listing.
001407 1  5              if (error := GetMarker( LineNumber, LibraryKeywd, ObjFn )) then
001416 1  5                 begin
001416 1  6                 call WhyCantRead( ObjFile, error );
001422 1  6                 GOTO CloseReturn;
001423 1  6                 end;
001423 1  5              if (error := WriteListingLine) then GOTO CloseReturn;
001427 1  5              if EndFound then
001431 1  5                 begin                   !Done with this proc
001431 1  6                 error := ReadListingLine; !Prepare for next proc
001433 1  6                 GOTO DoneProc;
001435 1  6                 end;
001435 1  5              error := ReadListingLine;
001437 1  5              end until error;
001441 1  4           end;
001441 1  3        end;
001441 1  2  DoneProc:
001441 1  2     end;
001442 1  1
001442 1  1  ! If something looks fishy, print a warning.
001442 1  1  if MarkupSkipping then call fprint( @WarnSkip, MarkupSkipping );
001457 1  1  if BeginEndDepth then call fprint( @WarnBeginEnd, @ProcName );
001475 1  1
001475 1  1  if NOT MarkupSkipping and
001475 1  1     NOT BeginEndDepth then call fprint( @OK );
001513 1  1
001513 1  1  CloseReturn:
001513 1  1  ! Close all open files.
001513 1  1  if InListFn <> -1 then call close( InListFn );
001523 1  1  if OutListFn <> -1 then
001526 1  1     begin
001526 1  2     call spoolend( OutListBuff );
001534 1  2     call close( OutListFn );
001541 1  2     end;
001541 1  1  InListFn := OutListFn := -1;         !Indicate that they're closed.
001544 1  1
001544 1  1  if ObjFn > 0 then call close( ObjFn );
001554 1  1
001554 1  1  end; !Markup^Command

BITMAPFILE                 Variable         INT            Direct        L+012
BITMAPKEYWD                Variable         INT            Direct        L+006
CLOSERETURN                Label                           %001513
CSIL                       Variable,54      STRUCT         Indirect      L+003
DISCIMAGE                  Variable,232     STRUCT-S       EXT Pointer   L+001
DONEPROC                   Label                           %001441
ENDFOUND                   Subproc          INT            %000065
ERROR                      Variable         INT            Direct        L+044
GI6                        Variable         INT            Direct        L+043
HDR                        Variable,1000    STRUCT         Indirect      L+004
LIBRARYKEYWD               Variable         INT            Direct        L+010
```

```
LISTINGKEYWD                  Variable    INT        Direct     L+005
OBJFILE                       Variable    INT        Direct     L+026
OBJFN                         Variable    INT        Direct     L+042
OBJKEYWD                      Variable    INT        Direct     L+011
PARAMS                        Variable    STRING     Direct     P+000
PROCNAME                      Variable    STRING     Direct     L+051
SPACE                         Variable    INT        Direct     L+045
TELLBITMAPF                   Variable    STRING     Direct     P+000
TELLOBJ                       Variable    STRING     Direct     P+000
TIMESTAMP                     Variable    INT        Direct     L+046
TOKEYWD                       Variable    INT        Direct     L+007
WS                            Variable    STRING     Direct     L+071

000000 0  0   ! Returns TRUE if both opened OK.
000000 0  0   int !prv! proc OpenListingFiles;
000000 1  0   begin
000000 1  1   string     .ins := @InListFilename '<<' 1;
000000 1  1   string     .outs := @OutListFilename '<<' 1;
000000 1  1   int         default^supervisor = 'P' := ["$SPLS    "]; !In case only job num
000004 1  1   int         default^collector  = 'P' := ["$S       "]; !In case only location
000010 1  1   string     .sptr1;                 !temp ptrs
000010 1  1   string     .sptr2;
000010 1  1   int         status;                !for numin
000010 1  1   int         job;                   !job #
000010 1  1   int         spls;                  !file num of spool supervisor
000010 1  1   int         error;
000010 1  1   int         devtype;               !for deviceinfo
000010 1  1   int         recsize;               !  "
000010 1  1   int         length;                !length of job's name scanned from sptr
000010 1  1   int        .pcb [0:63];            !misc buffer for spool routines
000010 1  1   int        .datafilename [0:11];
000010 1  1   string     .datafilename^s := @datafilename '<<' 1;  ! string version
000010 1  1
000010 1  1   if InListFn <> -1 then call close( InListFn );
000036 1  1   if OutListFn <> -1 then
000041 1  1      begin
000041 1  2      call spoolend( OutListBuff );
000047 1  2      call close( OutListFn );
000054 1  2      end;
000054 1  1   InListFn := OutListFn := -1;       !Indicate that file is originally closed.
000057 1  1
000057 1  1   ! Get job filenames, open, and verify.
000057 1  1   if ins[8] = "#" and
000057 1  1      InListFilename = defaults.volume for 4 words then
000074 1  1         InListFilename ':=' default^supervisor for 4;
000101 1  1
000101 1  1   datafilename ':=' InListFilename for 12 words; !Get a copy to work with
000105 1  1   pcb := 0;       ! must be zero if disc job passed to printstart
000107 1  1   call deviceinfo (datafilename, devtype, recsize);
000114 1  1   if devtype.<4:9> = 0 then begin
000121 1  2      ! assume supervisor process
000121 1  2      rscan datafilename^s [23] while " " -> @sptr2; ! back scan trailing blanks
000126 1  2      @sptr1 := numin (datafilename^s [9], job, 10, status);  ! get job #
000136 1  2      if status or @sptr1 <> @sptr2 [1] then
000145 1  2         begin                       !Invalid job number
000145 1  3         call fprint( @NotNum );
000157 1  3         return FALSE;
```

```
000162 1  3        end;
000162 1  2     datafilename [4] ':=' [8*[" "]]; !Blank out job number
000171 1  2     call open(datafilename, spls);  !Open supervisor
000200 1  2     if <> then
000201 1  2        begin
000201 1  3        call fileinfo( -1, error );
000212 1  3        call fprint( @ErrorOnF,error,@InListFilename );
000226 1  3        return FALSE;
000232 1  3        end;
000232 1  2
000232 1  2     ! test accessid of job for security
000232 1  2     pcb := job;
000234 1  2     if (error := spoolerstatus (spls, 2 !job!, 0 !specified item!, pcb) ) then

000244 1  2        begin
000244 1  3        call close( spls );
000251 1  3        if error > 0 and error <= FELASTUSER then
000260 1  3           call fprint( @ErrorOnF,error,@InListFilename )
000274 1  3        else
000276 1  3           call fprint( @ErrorOnFoctal,error,@InListFilename );
000312 1  3        return FALSE;
000315 1  3        end;
000315 1  2     if creatoraccessid <> pcb [28] then
000324 1  2        begin
000324 1  3        call close( spls );
000331 1  3        call fprint( @ErrorOnF,FESECVIOL,@InListFilename );
000345 1  3        return FALSE;
000350 1  3        end;
000350 1  2
000350 1  2     ! get input file name
000350 1  2     if (error := spoolerequest(spls, job, pcb) ) then
000357 1  2        begin
000357 1  3        call close( spls );
000364 1  3        if error > 0 and error <= FELASTUSER then
000373 1  3           call fprint( @ErrorOnF,error,@InListFilename )
000407 1  3        else
000411 1  3           call fprint( @ErrorOnFoctal,error,@InListFilename );
000425 1  3        return FALSE;
000430 1  3        end;
000430 1  2     call close (spls);                  !Don't need supervisor anymore
000430 1  2     if (error := printreadcommand(pcb, !control#!, !device!, !dev flags!,
000435 1  2                                    !dev param!, !dev width!, !skip num!,
000435 1  2                                    datafilename)) then
000435 1  2
000451 1  2        begin
000451 1  3        if error > 0 and error <= FELASTUSER then
000460 1  3           call fprint( @ErrorOnF,error,@InListFilename )
000474 1  3        else
000476 1  3           call fprint( @ErrorOnFoctal,error,@InListFilename );
000512 1  3        return FALSE;
000515 1  3        end;
000515 1  2     end else if devtype.<4:9> <> 3 then
000523 1  1        ! Illegal job file type
000523 1  1        begin
000523 1  2        call fprint( @ErrorOnF,FEINVALOP,@InListFilename );
000537 1  2        return FALSE;
000542 1  2        end;
```

```
000542 1  1
000542 1  1   ! open input file
000542 1  1   call open (datafilename, InListFn, %002000, 1);   !read-only, shared, sync 1
000553 1  1   if <> then
000554 1  1      begin
000554 1  2      call fileinfo( -1, error );
000565 1  2      call fprint( @ErrorOnF,error,@InListFilename );
000601 1  2      return FALSE;
000604 1  2      end;
000604 1  1   if (error := printstart( InListBuff, pcb, InListFn )) then
000613 1  1      begin
000613 1  2      if error > 0 and error <= FELASTUSER then
000622 1  2         call fprint( @ErrorOnF,error,@InListFilename )
000636 1  2      else
000640 1  2         call fprint( @ErrorOnFoctal,error,@InListFilename );
000654 1  2      return FALSE;
000657 1  2      end;
000657 1  1
000657 1  1   ! Open output file (level-3 spooling assumed, default extent size)
000657 1  1   if outs[8] = "#" and
000657 1  1      OutListFilename = defaults.volume for 4 words then
000674 1  1         OutListFilename ':=' default^collector for 4 words;
000703 1  1   if (error := spoolstart( ,OutListBuff,, ... ,,,OutListFilename )) then
000720 1  1      begin
000720 1  2      if error > 0 and error <= FELASTUSER then
000727 1  2         call fprint( @ErrorOnF,error,@InListFilename )
000743 1  2      else
000745 1  2         call fprint( @ErrorOnFoctal,error,@InListFilename );
000761 1  2      return FALSE;
000764 1  2      end
000764 1  1   else
000765 1  1      OutListFn := OutListBuff[0];     !Indicate it's open with file number.
000767 1  1
000767 1  1   ! Initialize ReadListingLine.
000767 1  1   MarkChar := " ";                    !Don't mark lines until unexecuted found.
000771 1  1   MarkupSkipping := 0;                !We're not skipping due to ?IF[NOT].
000773 1  1   MarkupToggles[1] ':=' [15 * [FALSE]]; !Assume all toggles are reset.
001002 1  1
001002 1  1   return TRUE;
001005 1  1
001005 1  1   end; !proc OpenListingFiles
```

| | | | | |
|---|---|---|---|---|
| DATAFILENAME | Variable | INT | Indirect | L+015 |
| DATAFILENAME^S | Variable | STRING | Indirect | L+016 |
| DEFAULT^COLLECTOR | Variable | INT | Direct | P+000 |
| DEFAULT^SUPERVISOR | Variable | INT | Direct | P+000 |
| DEVTYPE | Variable | INT | Direct | L+011 |
| ERROR | Variable | INT | Direct | L+010 |
| INS | Variable | STRING | Indirect | L+001 |
| JOB | Variable | INT | Direct | L+006 |
| LENGTH | Variable | INT | Direct | L+013 |
| OUTS | Variable | STRING | Indirect | L+002 |
| PCB | Variable | INT | Indirect | L+014 |
| RECSIZE | Variable | INT | Direct | L+012 |
| SPLS | Variable | INT | Direct | L+007 |
| SPTR1 | Variable | STRING | Indirect | L+003 |
| SPTR2 | Variable | STRING | Indirect | L+004 |
| STATUS | Variable | INT | Direct | L+005 |

```
000000 0 0   ! Read the listing one line at a time.
000000 0 0   ! Write any control information to the output listing file.
000000 0 0   ! Return only lines that are non-blank, non-compiler directive, and have
000000 0 0   ! source code on them (as opposed to page headers, maps, etc.).
000000 0 0   ! All other lines are simply copied to the output listing file.
000000 0 0   !
000000 0 0   ! This procedure keeps track of toggles and ?IF[NOT] - ?ENDIF pairs.
000000 0 0   ! Lines which the compiler ignores are simply copied to the output,
000000 0 0   ! and the next line is read.
000000 0 0   !
000000 0 0   ! An upshifted copy of the line, with comments eliminated, is created
000000 0 0   ! to facilitate parsing by this (and other) routines.
000000 0 0   !
000000 0 0   ! Return 0 if no error, else file error number.
000000 0 0   !
000000 0 0   int !prv! proc ReadListingLine;
000000 1 0   begin
000000 1 1   literal     PrintEof          = %12000;
000000 1 1   literal     PrintEndOfCopy    = %12001;
000000 1 1   literal     PrintDeleted      = %12002;
000000 1 1   literal     PrintControl      = %12003;
000000 1 1   literal     PrintSetmode      = %12004;
000000 1 1   literal     PrintControlbuf   = %12005;
000000 1 1   int         error := 0;
000000 1 1   int         length;
000000 1 1   label       DoneRead;
000000 1 1   label       CopyLine;
000000 1 1
000000 1 1   ! Make a copy for easier parsing.  It will be upshifted and have comments
000000 1 1   ! removed.  Returns FALSE if it is equivalent to a comment (blank) line.
000000 1 1   int subproc BuildByLine;
000000 2 1   begin
000000 2 2   int         ByLineLength;
000000 2 2   int         i;
000000 2 2   label       DoneScan;
000000 2 2
000000 2 2   ByLineLength := $min( length-StartSourceCol, Columns );
000011 2 2   ListingByLine ':=' ListingLine[StartSourceCol] for ByLineLength bytes;
000016 2 2   call shiftstring( ListingByLine, ByLineLength, 0 !upshift! );
000024 2 2   ListingByLine[ByLineLength] ':=' [0,0];
000034 2 2   i := ByLineLength := 0;              !Strip comments.
000037 2 2   do
000037 2 2      begin
000037 2 3      while ListingByLine[i] AND
000037 2 3            ListingByLine[i] <> "!" AND
000037 2 3            ListingByLine[i] <> """" DO
000050 2 3         begin
000050 2 4         !Look for end of line comment.
000050 2 4         if ListingByLine[i] = "--" then
000061 2 4            begin
000061 2 5            ByLineLength := i;
000063 2 5      GOTO DoneScan;
000066 2 5      end;
000066 2 4         ListingByLine[ByLineLength] := ListingByLine[i];
000072 2 4         ByLineLength := ByLineLength + 1;
000074 2 4         i := i + 1;
000076 2 4         end;
```

```
000077 2  3      if ListingByLine[i] then
000102 2  3         begin                        !Found comment indicator or quote.
000102 2  4         scan ListingByLine[i+1] until ListingByLine[i] -> i;
000110 2  4         i := i - @ListingByLine + 1;
000115 2  4         end;
000115 2  3      end
000115 2  2   until NOT ListingByLine[i];
000120 2  2
000120 2  2   DoneScan:
000120 2  2
000120 2  2   ListingByLine[ByLineLength] := 0;
000123 2  2   scan ListingByLine while " " -> @ByLineScanPtr;
000127 2  2   if $carry then
000130 2  2      return FALSE                       !Equivalent to blank line
000130 2  2   else
000134 2  2      begin     !Not equivalent to blank line
000134 2  3      ! For simpler word separator checks add blank.  Ensure terminator.
000134 2  3      ListingByLine[ByLineLength] ':=' " " & 0;
000152 2  3      StopByLineScan := @ListingByLine + ByLineLength;
000156 2  3      return TRUE;                       !Line is not just a comment
000163 2  3      end;
000163 2  2
000163 2  2   end; !subproc BuildByLine

BYLINELENGTH                Variable      INT           Direct        S-001
DONESCAN                    Label                       %000120
I                           Variable      INT           Direct        S-000

000167 1  1   while TRUE do begin
000172 1  2      if (error := printread( InListBuff, ListingLine^I, 132, length )) then begin
000204 1  3         if error = PrintEof OR error = PrintEndOfCopy then begin
000215 1  4            error := 1;                !FEEOF
000217 1  4            goto DoneRead;
000220 1  4         end else if error = PrintControl then
000226 1  3            call spoolcontrol( OutListBuff, ListingLine^I[0],
000226 1  3                                            ListingLine^I[1] )
000237 1  3         else if error = PrintSetmode then
000245 1  3            call spoolsetmode( OutListBuff, ListingLine^I[0],
000245 1  3                                            ListingLine^I[1],
000245 1  3                                            ListingLine^I[2] )
000260 1  3         else if error = PrintControlbuf then begin !ignore!
000266 1  4         end else begin !We have some filesystem or weird spooler error.
000267 1  4            if error > 0 and error <= FELASTUSER then
000276 1  4               call fprint( @ErrorOnF,error,@InListFilename )
000312 1  4            else
000314 1  4               call fprint( @ErrorOnFoctal,error,@InListFilename );
000330 1  4            return error;
000333 1  4         end;
000333 1  3      end else begin                    !No error.  Handle the line.
000334 1  3         ListingLine[length] := 0;      !Sentinel
000337 1  3         if length <= StartSourceCol then goto CopyLine;  !Nothing to look at
000343 1  3         if BuildByLine then begin
000345 1  4            if ListingLine[StartSourceCol] = "?" then
000351 1  4               begin                    !Assume there's a compiler directive.
000351 1  5               call CheckToggles;       !Look for toggle stuff and set globals.
000352 1  5               GOTO CopyLine;           !Copy it to output.
000354 1  5               end;
```

```
000354 1  4          if ListingLine[PeriodOffset] = "." !EDIT line
000354 1  4             AND NOT MarkupSkipping then
000362 1  4             GOTO DoneRead;          !This is real source that we want to parse.
000363 1  4          end;
000363 1  3
000363 1  3   CopyLine:                         !Copy line just read to output.
000363 1  3         if (error := WriteListingLine^NoMark) then return error;
000370 1  3         end;
000370 1  2      end; !while
000371 1  1
000371 1  1   DoneRead:
000371 1  1   return error;
000373 1  1
000373 1  1   end; !proc ReadListingLine

BUILDBYLINE                 Subproc      INT        %000000
COPYLINE                    Label                   %000363
DONEREAD                    Label                   %000371
ERROR                       Variable     INT        Direct      L+001
LENGTH                      Variable     INT        Direct      L+002
PRINTCONTROL                Literal      INT        %012003
PRINTCONTROLBUF             Literal      INT        %012005
PRINTDELETED                Literal      INT        %012002
PRINTENDOFCOPY              Literal      INT        %012001
PRINTEOF                    Literal      INT        %012000
PRINTSETMODE                Literal      INT        %012004

000000 0  0   ! Write the listing line to the output listing file.
000000 0  0   ! Insert the markup character if appropriate.
000000 0  0   !
000000 0  0   ! Return 0 if no error, else file error number.
000000 0  0   !
000000 0  0   ?IF 12       !For FPU only
000000 0  0   ?IFNOT 12
000000 0  0   int !prv! proc WriteListingLine^NoMark;
000000 0  0   EXTERNAL;
000000 0  0   ?ENDIF 12
000000 0  0   int !prv! proc WriteListingLine;
000000 1  0   begin
000000 1  1   entry       WriteListingLine^NoMark; !Enter here to avoid marking line.
000000 1  1   int         error;
000000 1  1   int         length;
000000 1  1
000000 1  1   ListingLine[MarkSpot] := MarkChar;
000007 1  1
000007 1  1   WriteListingLine^NoMark:
000011 1  1
000011 1  1   scan ListingLine until 0 -> length;  !Determine length of line
000015 1  1   length := length - @ListingLine;
000020 1  1
000020 1  1   if (error := spoolwrite( OutListBuff, ListingLine^I, length )) then
000031 1  1      if error > 0 and error <= FELASTUSER then
000040 1  1         call fprint( @ErrorOnF,error,@InListFilename )
000054 1  1      else
000056 1  1         call fprint( @ErrorOnFoctal,error,@InListFilename );
000072 1  1
000072 1  1   return error;
```

```
917.     000075 1  1
918.     000075 1  1    end; !proc WriteListingLine

ERROR                             Variable    INT      Direct      L+001
LENGTH                            Variable    INT      Direct      L+002
WRITELISTINGLINE^NOMARK           Entry       INT      %000010


BINDER - OBJECT FILE BINDER - T9621C00 - (09SEP86)   SYSTEM \PRUNE
Object file name is $OVER.T9618C00.olisting
Object file timestamp is 03APR87 08:17:10
Number of Binder errors = 0
Number of Binder warnings = 0
Primary data = 143 words
Secondary data = 4152 words
Code area size = 4 pages
Resident code size = 0 pages
Data area size = 7 pages
Extended data area size = 0 pages
Top of stack = 4295 words
Number of code segments  = 1 segment


The object file will run on a TNS/II, but may not run on a TNS
Errorfile file name is $OVER.T9618C00.ELISTING
Number of compiler errors =  0
Number of compiler warnings =  0
Maximum symbol table space used was = 182608 bytes
Number of source lines = 4116
Compile cpu time = 00:00:08
Total Elapsed time = 00:00:54
```

```
Source file:  [1]  $VIOLET.TOOLSCOO.COPYTAL  22APR87 - 16:33:11        !Copyright notice
000000 0  0    ! +---------------------------------------------------------------------------+
000000 0  0    ! |                                                                           |
000000 0  0    ! |  Copyright (C) 1987 by TANDEM COMPUTERS INCORPORATED                      |
000000 0  0    ! |                                                                           |
000000 0  0    ! |  Protected as an unpublished work.                                        |
000000 0  0    ! |                                                                           |
000000 0  0    ! |  The computer program listings and specifications herein are             |
000000 0  0    ! |  the property of TANDEM COMPUTERS INCORPORATED and shall not be           |
000000 0  0    ! |  reproduced, copied, or used, in whole or in part, for any                |
000000 0  0    ! |  reason without the written permission of TANDEM COMPUTERS                |
000000 0  0    ! |  INCORPORATED.                                                            |
000000 0  0    ! |                                                                           |
000000 0  0    ! |  The following are trademarks or service marks of TANDEM                  |
000000 0  0    ! |  COMPUTERS INCORPORATED:                                                  |
000000 0  0    ! |                                                                           |
000000 0  0    ! |  6AX            BINDER          CROSSREF         DDL                      |
000000 0  0    ! |  ENABLE         ENCOMPASS       ENCORE           ENFORM                   |
000000 0  0    ! |  ENSCRIBE       ENVOY           ENVOYACP/XF      EXCHANGE                 |
000000 0  0    ! |  EXPAND         FASTSORT.       FAXLINK          FOX                      |
000000 0  0    ! |  FOXII          GUARDIAN        GUARDIAN 90      GUARDIAN 90XF            |
000000 0  0    ! |  INSIGHT        INSPECT         LASER-LX         LXN                      |
000000 0  0    ! |  MEASURE        MULTILAN        NetBatch         NonStop                  |
000000 0  0    ! |  NonStop 1+     NonStop CLX     NonStop EXT      NonStop EXT10            |
000000 0  0    ! |  NonStop EXT25  NonStop II      NonStop SQL      NonStop TXP              |
000000 0  0    ! |  NonStop VLX    PATHMAKER       PC LINK          PCFORMAT                 |
000000 0  0    ! |  PERUSE         PS MAIL         PS TEXT EDIT     PS TEXT FORMAT           |
000000 0  0    ! |  RDF            SAFE            SAFEGUARD        SAFE-T-NET               |
000000 0  0    ! |  T-TEXT         TACL            TAL              Tandem                   |
000000 0  0    ! |  TGAL           THL             TIL              TMF                      |
000000 0  0    ! |  TRANSFER       VIEWPOINT       WORDLINK         XLB                      |
000000 0  0    ! |  XRAV                                                                     |
000000 0  0    ! |                                                                           |
000000 0  0    ! +---------------------------------------------------------------------------+
000000 0  0    ! |  HYPERchannel is a trademark of Network Systems Corporation.              |
000000 0  0    ! |                                                                           |
000000 0  0    ! |  IBM is a registered trademark of International Business Machines         |
000000 0  0    ! |  Corporation.                                                             |
000000 0  0    ! |                                                                           |
000000 0  0    ! |  Textpack4, Textpack6, IBM Displaywriter, DisplayWrite 2,                 |
000000 0  0    ! |  DisplayWrite 3, Displaywriter communication software, and CICS           |
000000 0  0    ! |  are trademarks of International Business Machines Corporation.           |
000000 0  0    ! |                                                                           |
000000 0  0    ! |  INFOSAT is a trademark in which both Tandem and American                 |
000000 0  0    ! |  Satellite have rights.                                                   |
000000 0  0    ! |                                                                           |
000000 0  0    ! |  LATTICE is a registered trademark of Lattice, Inc.                       |
000000 0  0    ! |                                                                           |
000000 0  0    ! |  MultiMate is a trademark of Ashton-Tate, Inc.                            |
000000 0  0    ! |                                                                           |
000000 0  0    ! |  UNIX is a trademark of AT&T.                                             |
000000 0  0    ! |                                                                           |
000000 0  0    ! |  Wang OIS workstation, Wang VS workstation, Wang OIS telecommu-           |
000000 0  0    ! |  nication software, and Wang VS telecommunication software are            |
000000 0  0    ! |  trademarks of Wang, Inc.                                                 |
```

```
  55.     000000 0  0   ! +--------------------------------------------------------------------+
  56.     000000 0  0   ! |   TANDEM COMPUTERS INCORPORATED -- PROPRIETARY AND CONFIDENTIAL     |
  57.     000000 0  0   ! +--------------------------------------------------------------------+
  38.     000000 0  0   ?NOLIST, source extdecs   (
  57.     000000 0  0   ?NOLIST, source pfprint   ( fprint )
  59.     000000 0  0   ?NOLIST, source pscan
  61.     000000 0  0   ?NOLIST, source pgp       ( mtimestampcollapse, nout32 )
  63.     000000 0  0   ?NOLIST, source psiolib
  65.     000000 0  0   ?NOLIST, source ppctl     ( systemprocessinfo )
  67.     000000 0  0   ?NOLIST, source preadobj
  69.     000000 0  0   ?NOLIST, source putill    ( CRCB^Exists, TestCoverEnabled )
  71.     000000 0  0   ?NOLIST, source pbitmap   ( MoveBitmapToMem, ReadBitmapFile, TestForHit )
  73.     000000 0  0   ?NOLIST, source pupper    ( CheckSecurity )
  75.     000000 0  0   ?NOLIST, source pcover    ( debug^err, finger^err, FprintPoof, nextchar )
  77.     000000 0  0   ?SETTOG 15                          !For FORWARDs
  78.     000000 0  0   ?NOLIST, source pobject
  80.     000000 0  0   ?RESETTOG 15
  81.     000000 0  0   ?LIST
  82.     000000 0  0   ?SOURCE sversion( version^object )
Source file:  [1]  $OVER.T9618C00.SVERSION  29APR87 - 09:45:32
  39.     000000 0  0   ?SECTION VERSION^OBJECT
  40.     000000 0  0   PROC T9618C00^15JUL87^OBJECT^29APR7;
  41.     000000 1  0   BEGIN END;
  83.     000000 0  0   ?SOURCE sobject
Source file:  [1]  $OVER.T9618C00.SOBJECT  29APR87 - 13:26:38
   2.     000000 0  0   ! Return FALSE if there are NO priv (or callable) procedures in the object
   3.     000000 0  0   ! file.
   4.     000000 0  0   ! If there are any I/O errors, then assume there ARE priv procs.
   5.     000000 0  0   int proc AnyPrivProcs( fn );
   6.     000000 1  0   int          fn;
   7.     000000 1  0   begin
   8.     000000 1  1   int          Space;
   9.     000000 1  1   int          TopSpace;
  10.     000000 1  1   struct      .csil( CSIL^def )[0:31];
  11.     000000 1  1   struct      .hdr( Object^File^Header^Def );
  12.     000000 1  1
  13.     000000 1  1   ! Read Header
  14.     000000 1  1   if PositRead( fn, hdr, 0d, $len(hdr) ) then return TRUE; !I/O error
  15.     000026 1  1   if hdr.object^header^P then return TRUE; !Priv MAIN
  16.     000034 1  1   TopSpace := hdr.CSIL^length/wlen(CSIL^def) - 1;
  17.     000042 1  1
  18.     000042 1  1   ! Read CSIL
  19.     000042 1  1   if PositRead( fn, csil, hdr.CSIL^addr, hdr.CSIL^length'<<'1 ) then
  20.     000053 1  1      return TRUE;
  21.     000055 1  1
  22.     000055 1  1   for Space := 0 to TopSpace do
  23.     000057 1  1      if CSIL[ Space ].num^callable OR
  24.     000057 1  1         CSIL[ Space ].num^privileged then return TRUE;
  25.     000107 1  1
  26.     000107 1  1   return FALSE;                         !No priv procs
  27.     000111 1  1
  28.     000111 1  1   end; !proc AnyPrivProcs

CSIL                          Variable,54     STRUCT       Indirect      L+003
FN                            Variable        INT          Direct        L-003
HDR                           Variable,1000   STRUCT       Indirect      L+004
SPACE                         Variable        INT          Direct        L+001
TOPSPACE                      Variable        INT          Direct        L+002
```

```
000000 0  0    ! List all the statement starters which have a BLBL or CON in the
000000 0  0    ! corresponding ICODE listing position.
000000 0  0    ! Syntax is: BADSS OBJECT <fn> SOURCE <fn> PROC <name>
000000 0  0    ! First record of SOURCE is assumed to be the first line of the ICODE
000000 0  0    ! listing for the PROC in question.  It may be an EDIT file or an ES file.
000000 0  0    ! We assume the listing is in the TAL format; e.g.,
000000 0  0    ! 01234567890123456789012345678901234567890123456789012345678901234567890...
000000 0  0    !  000000    7 ADDS     +016       0 LDI      +010       7 STOR    G+053       0...
000000 0  0    !  000006    0 LOAD    G+013       7 BAZ      +017       0 LADR    G+162       0...
000000 0  0    proc !prv! BADSS^Command;
000000 1  0    begin
000000 1  1    string      Params = 'P' := ["OBJECT LISTING PROC",0];
000012 1  1    string      TellObj = 'P' :=
000012 1  1                ["Code file is 'F* dated '22!",0];
000030 1  1    string      ProcedureDetail = 'P' :=
000030 1  1                ["Spaceid %2 word offset %6 is base of '31",0];
000055 1  1    string      StatementDetail = 'P' :=
000055 1  1                ["  Word offset %6 is line '10 in 'F*",0];
000077 1  1    string      AlphaX = 'P' := ["^-_",0]; !Valid in procedure names
000101 1  1    string      ProcNotFound = 'P' := ["Procedure not found.",0];
000114 1  1    int         ObjFileName[0:11];
000114 1  1    int         ObjTimestamp[0:2];
000114 1  1    int         SourceFileName[0:11];
000114 1  1    string      ProcedureName[0:31];
000114 1  1    int         length;                 !Length of procedure name
000114 1  1    int         ObjectF := FALSE;
000114 1  1    int         SourceF := FALSE;
000114 1  1    int         ProcF := FALSE;
000114 1  1    int         FoundProc := FALSE;
000114 1  1    string      ws[0:22];               !For formatting output
000114 1  1    int         Fnum;
000114 1  1    int         CountRead;
000114 1  1    int         error;
000114 1  1    int         RecNum := 0;            !Current LISTING record number
000114 1  1    layout    (.line, 132);
000114 1  1    layout    (.BlockBuf, 1024);
000114 1  1    ! Return TRUE if Procedure.Offset has a BLBL or a CON.
000114 1  1    int subproc BLBLorCON;
000114 2  1    begin
000114 2  2    int         LineNumber  := $udbl(Statement.Offset)'/'6 '+'1;!1-relative
000114 2  2    int         OffsetInLine;           !0-relative
000114 2  2
000114 2  2    while RecNum '<' LineNumber do
000131 2  2       begin
000131 2  3       if (error := read^file( gplfcb, line, CountRead,, $len(line) )) then
000145 2  3          begin call WhyCantRead( SourceFileName, error ); return TRUE; end;
000154 2  3       if line.word = " 0" or line.word = " 1" then !Skip blank lines, etc.
000166 2  3          RecNum := RecNum '+' 1;
000171 2  3       end;
000172 2  2
000172 2  2    case $udbl(Statement.Offset)'\'6 of
000201 2  2       begin
000201 2  3       OffsetInLine := 12;
000204 2 CE1      OffsetInLine := 32;
000207 2 CE2      OffsetInLine := 52;
000212 2 CE3      OffsetInLine := 72;
000215 2 CE4      OffsetInLine := 92;
```

```
000220 2 CE5      OffsetInLine := 112;
000223 2 CE6      end;
000232 2  2
000232 2  2    if line.byte[OffsetInLine] = "BLBL " OR
000232 2  2       line.byte[OffsetInLine] = "CON  " then return TRUE else return FALSE;
000271 2  2
000271 2  2    end; !subproc BLBLorCON

LINENUMBER                    Variable     INT          Direct      S-001
OFFSETINLINE                  Variable     INT          Direct      S-000
000277 1  1   while nextchar(0) do
000324 1  1      case scanidt( charadr, @Params ) of
000340 1  1      begin
000340 1  2      !OBJECT! begin
000340 1 CE0        if NOT scanfname( charadr, ObjFileName, defaults.word ) then
000350 1  3            call debug^err( @NoFile );
000360 1  3         ObjectF := TRUE;
000362 1  3         end;
000364 1 CE1     !LISTING! begin
000364 1  3         if NOT scanfname( charadr, SourceFileName, defaults.word ) then
000374 1  3            call debug^err( @NoFile );
000404 1  3         SourceF := TRUE;
000406 1  3         end;
000410 1 CE2     !PROC ! begin
000410 1  3         if NOT (length := scanid( charadr,     !Returns name upshifted.
000410 1  3                                   ProcedureName,
000410 1  3                                   31,
000410 1  3                                   @AlphaX )) then call debug^err;
000433 1  3         ProcF := TRUE;
000435 1  3         end;
000436 1 CE3     otherwise call debug^err;
000442 1  2      end;
000457 1  1   eol;
000470 1  1
000470 1  1   if NOT ObjectF OR NOT SourceF OR NOT ProcF then call debug^err;
000502 1  1
000502 1  1   if (error := OpenObjectFile( ObjFileName, Fnum )) then
000510 1  1      begin call WhyCantRead( ObjFileName, error ); return; end;
000515 1  1   call fileinfo(,,ObjFileName,,,,,,ObjTimestamp);
000532 1  1   call mtimestampcollapse( ws, ObjTimestamp );
000541 1  1   call FprintPoof( @TellObj, @ObjFileName, @ws );
000556 1  1
000556 1  1   while NOT (error := GetNextProcedure( Fnum )) do !For every procedure
000563 1  1      begin
000563 1  2      call shiftstring( Procedure.Name, length, 0 ); !Upshift
000571 1  2      if Procedure.Name = ProcedureName for length bytes AND
000571 1  2         Procedure.Name[length] = 0 then
000607 1  2         begin
000607 1  3         FoundProc := TRUE;
000611 1  3         call FprintPoof( @ProcedureDetail,
000611 1  3                          Procedure.Spaceid,
000611 1  3                          Procedure.Offset,
000611 1  3                          @Procedure.Name );
000631 1  3
000631 1  3         if Procedure.HasInspect then
000634 1  3            begin
```

```
000634 1 4          if FormatProcSourceInfo then return;
000637 1 4          if check^file( gplfcb, file^fnum^addr ) <> -1 then
000647 1 4             call close^file( gplfcb );
000655 1 4          call set^file( gplfcb, assign^filename, @SourceFileName );
000665 1 4          call set^file( gplfcb, assign^openaccess, read^access );
000675 1 4          call set^file( gplfcb, assign^recordlen, $len(line) );
000705 1 4          if (error := open^file( allfiles, gplfcb,
000705 1 4                                  BlockBuf.word, $len(BlockBuf),,
000705 1 4                                  abort^openerr+abort^xfererr,0 )) then
000725 1 4             begin
000725 1 5             call WhyCantRead( SourceFileName, error );
000731 1 5             return;
000732 1 5             end;
000732 1 4          !For every statement in the procedure
000737 1 4          while NOT (error := GetNextStatement( Fnum )) do
000737 1 5             begin
000741 1 5             if BLBLorCON then
000741 1 6                begin
                                        !Negates VERBs' line numbers in COBOL.
000741 1 6                call nout32( ws, $ABS(Statement.LineNum), 10, -12, -3 );
000757 1 6                call FprintPoof( @StatementDetail,
000757 1 6                                 Statement.Offset,
000757 1 6                                 @ws[2], !line number
000757 1 6                                 @Statement.FileName );
001004 1 6                end;
001004 1 5             end;
001006 1 4          if error <> -1 then
001011 1 4             begin
001011 1 5             call WhyCantRead( ObjFileName, error );
001015 1 5             return;
001016 1 5             end;
001016 1 4          end
001016 1 3
001016 1 3       else
001017 1 3          call FprintPoof( @NoSymbols, @Procedure.Name );
001032 1 3       end;
001032 1 2
001032 1 2    end;
001035 1 1 if error <> -1 then
001040 1 1    begin
001040 1 2    call WhyCantRead( ObjFileName, error );
001044 1 2    return;
001045 1 2    end;
001045 1 1
001045 1 1 call close^file( gplfcb );
001053 1 1
001053 1 1 if NOT FoundProc then call fprint( @ProcNotFound );
001070 1 1
001070 1 1 end; !proc BADSS^Command
```

| | | | | |
|---|---|---|---|---|
| ALPHAX | Variable | STRING | Direct | P+000 |
| BLBLORCON | Subproc | INT | %000114 | |
| BLOCKBUF | Variable,2000 | STRUCT | Indirect | L+102 |
| 1 WORD | 0,2 | INT | Direct | |
| 1 BYTE[0:1023] | 0,1 | STRING | Direct | |
| COUNTREAD | Variable | INT | Direct | L+076 |

```
ERROR                       Variable        INT         Direct      L+077
FNUM                        Variable        INT         Direct      L+075
FOUNDPROC                   Variable        INT         Direct      L+060
LENGTH                      Variable        INT         Direct      L+054
LINE                        Variable,204    STRUCT      Indirect    L+101
  1 WORD                         0,2        INT         Direct
  1 BYTE[0:131]                  0,1        STRING      Direct
OBJECTF                     Variable        INT         Direct      L+055
OBJFILENAME                 Variable        INT         Direct      L+001
OBJTIMESTAMP                Variable        INT         Direct      L+015
PARAMS                      Variable        STRING      Direct      P+000
PROCEDUREDETAIL             Variable        STRING      Direct      P+000
PROCEDURENAME               Variable        STRING      Direct      L+034
PROCF                       Variable        INT         Direct      L+057
PROCNOTFOUND                Variable        STRING      Direct      P+000
RECNUM                      Variable        INT         Direct      L+100
SOURCEF                     Variable        INT         Direct      L+056
SOURCEFILENAME              Variable        INT         Direct      L+020
STATEMENTDETAIL             Variable        STRING      Direct      P+000
TELLOBJ                     Variable        STRING      Direct      P+000
WS                          Variable        STRING      Direct      L+061

000000 0  0   ! This routine will return 0 if the caller's process access id has
000000 0  0   ! adequate security to access the file for read, write, and execute.
000000 0  0   ! Otherwise, the FE error will be returned.
000000 0  0   int !prv! proc CheckFileSecurity( FileName );
000000 1  0   int         .FileName;
000000 1  0   begin
000000 1  1   int          error;
000000 1  1   int          Accessor;               !My process access ID
000000 1  1   int          Owner;
000000 1  1   int          Remote;
000000 1  1   int          junk;
000000 1  1   int          AccessClass;            ! 0 - anyone local
000000 1  1                                        ! 1 - owner's local group
000000 1  1                                        ! 2 - owner
000000 1  1   string       Security[0:4];
000000 1  1   literal      SUPERID = -1;
000000 1  1
000000 1  1   call fileinfo( , error, FileName, ... ... ... ,, Owner, Security );
000021 1  1   if <> then return error;
000024 1  1
000024 1  1   Accessor := processaccessid;
000026 1  1   call getcpcbinfo( 0!remote!, Remote, 2, junk, error );
000040 1  1
000040 1  1   if Accessor <> SUPERID or Remote then
000045 1  1      begin                             !Must do checking
000045 1  2      AccessClass := ( if Accessor = Owner or
000045 1  2                          Accessor = SUPERID or
000045 1  2                          Accessor.<0:7> = Owner and Accessor.<8:15> = 255
000045 1  2                       then 2
000045 1  2                       else if Accessor.<0:7> = Owner.<0:7> then 1 else 0 );
000101 1  2      if AccessClass < Security[1].<14:15> OR    !Read
000101 1  2         Remote > Security[1].<13> then return FESECVIOL;
000120 1  2      if AccessClass < Security[2].<14:15> OR    !Write
000120 1  2         Remote > Security[2].<13> then return FESECVIOL;
```

```
226.    000135 1  2      if AccessClass < Security[3].<14:15> OR    !Execute
227.    000135 1  2         Remote > Security[3].<13> then return FESECVIOL;
228.    000154 1  2      end;
229.    000154 1  1
230.    000154 1  1   return FEOK;
231.    000156 1  1
232.    000156 1  1   end; !proc CheckFileSecurity

ACCESSCLASS                    Variable    INT        Direct     L+006
ACCESSOR                       Variable    INT        Direct     L+002
ERROR                          Variable    INT        Direct     L+001
FILENAME                       Variable    INT        Indirect   L-003
JUNK                           Variable    INT        Direct     L+005
OWNER                          Variable    INT        Direct     L+003
REMOTE                         Variable    INT        Direct     L+004
SECURITY                       Variable    STRING     Direct     L+007
SUPERID                        Literal     INT        %177777
 234.   000000 0  0   ! Display which statements were not executed during a coverage measurement.
 235.   000000 0  0   proc !prv! Display^Command;
 236.   000000 1  0   begin
 237.   000000 1  1   string      Params = 'P' := ["PIN FILE ",
 238.   000005 1  1                                "CODE LIB ",
 239.   000011 1  1                                "PROGRAMONLY LIBRARYONLY ",
 240.   000025 1  1                                "BRIEF SUMMARY",0];
 241.   000034 1  1   string      HeadingE = 'P' := ["Execution report.",
 242.   000045 1  1                                  "  Entry points",
 243.   000054 1  1                                  " marked ""*"" were NOT executed.",0];
 244.   000073 1  1   string      HeadingS = 'P' := ["Execution report.",
 245.   000104 1  1                                  "  Statements",
 246.   000112 1  1                                  " marked ""*"" were NOT executed.",0];
 247.   000131 1  1   string      TellBitmapP = 'P' :=
 248.   000131 1  1               ["Bitmap is from PIN ?#&*",0];
 249.   000145 1  1   string      TellBitmapF = 'P' :=
 250.   000145 1  1               ["Bitmap is from 'F*",0];
 251.   000157 1  1
 252.   000157 1  1   string .ext DiscImage( CoverDiscImageTemplate ) := %2000000d;
 253.   000157 1  1   struct      .csil( CSIL^def )[0:31];
 254.   000157 1  1   struct      .hdr( Object^File^Header^Def );
 255.   000157 1  1   int         UsePin := FALSE;        !flag - use memory image
 256.   000157 1  1   int         UseFile := FALSE;       !flag - use disc image
 257.   000157 1  1   int         Prog := FALSE;          !flag - use prog file specified in CRCB
 258.   000157 1  1   int         Lib  := FALSE;          !flag - use prog file specified in CRCB
 259.   000157 1  1   int         ProgramOnly := FALSE;   !flag
 260.   000157 1  1   int         LibraryOnly := FALSE;   !flag
 261.   000157 1  1   int         Brief := FALSE;         !flag - print only brief report
 262.   000157 1  1   int         Summary := FALSE;       !flag - print only summary report
 263.   000157 1  1   int         NotAny;                 !flag - Procedure was not entered at all
 264.   000157 1  1   int         G16 := FALSE;           !flag - Program has >16 segments
 265.   000157 1  1   int         pin;
 266.   000157 1  1   int         BitmapFile[0:11];
 267.   000157 1  1   int         ProgName[0:11];
 268.   000157 1  1   int         LibName[0:11];
 269.   000157 1  1   int         Fnum;
 270.   000157 1  1   int         error;
 271.   000157 1  1   string      ws[0:22];               !For formatting output
 272.   000157 1  1   label       PrintExecuted;
 273.   000157 1  1   label       CloseReturn;
```

```
000157 1  1  subproc DisplaySpace( filename, PinSpace, library );
000157 2  1  int          .filename;               !Object file
000157 2  1  string .ext PinSpace( CoverPinDataCodespaceTemplate );
000157 2  1  int          library;                 !1 if library; 0 if program
000157 2  1  begin
000157 2  2  string       ProcedureDetail = 'P' :=
000157 2  2               ["^Spaceid %2 word offset %6 is base of '31!.",0];
000205 2  2  string       EPTdetail = 'P' :=
000205 2  2               ["`1 Entry point at word offset %6 is '31",0];
000231 2  2  string       StatementDetail = 'P' :=
000231 2  2               ["`1 Word offset %6 is line '10 in 'F*",0];
000254 2  2  string       TellProg = 'P' :=
000254 2  2               ["Program file is 'F* dated '22!",0];
000274 2  2  string       TellLib = 'P' :=
000274 2  2               ["Library file is 'F* dated '22!",0];
000314 2  2  string       Executed = 'P' := [" "];
000315 2  2  string       UnExecuted = 'P' := ["*"];
000316 2  2  string       StatisticS = 'P' := ["Of #6DZ statements, #6DZ ('5?%) were",
000340 2  2                 " not executed.",0];
000350 2  2  string       StatisticT = 'P' := ["^^Of #6DZ statements, #6DZ ('5?%) were",
000373 2  2                 " not executed.",0];
000403 2  2
000403 2  2  int(32)      TotalStatements;        !Total # of statements in program
000403 2  2  int(32)      TotalUnexecuted;        !Total unexecuted statements in program
000403 2  2  int(32)      SubtotalStatements;     !Total # of statements in proc
000403 2  2  int(32)      SubtotalUnexecuted;     !Total unexecuted statements in proc
000403 2  2  int(32)      Percent;                !Percentage of statements executed
000403 2  2  int          Timestamp[0:2];
000403 2  2  int          space;
000403 2  2
000403 2  2  if (error := OpenObjectFile( filename, Fnum )) then
000412 2  2     begin call WhyCantRead( filename, error ); return; end;
000420 2  2
000420 2  2  call fileinfo(,,filename,,,,,,Timestamp);
000436 2  2  call mtimestampcollapse( ws, Timestamp );
000446 2  2  call FprintPoof( if library then @TellLib else @TellProg, @filename, @ws );
000472 2  2
000472 2  2  if (error := PositRead( Fnum, hdr, 0d, $len(hdr) )) then !Read header
000502 2  2     begin
000502 2  3     call WhyCantRead( filename, error );
000506 2  3     goto CloseReturn;
000507 2  3     end;
000507 2  2
000507 2  2  if Prog then
000511 2  2     begin
000511 2  3     ! Check that object file has same binder timestamp.  Just warning if not.
000511 2  3     if PinSpace.Timestamp <> hdr.binder^timestamp for 3 words then
000524 2  3        call FprintPoof( @WarnBind );
000535 2  3     end;
000535 2  2
000535 2  2  ! Make sure spaces are reasonable.
000535 2  2  if hdr.CSIL^length/wlen(CSIL^def) <>
000535 2  2     (if G16 then DiscImage.UC.SpaceCount + DiscImage.UL.SpaceCount
000535 2  2      else PinSpace.SpaceCount) then
000561 2  2        begin call fprint( @SpaceDif ); goto CloseReturn; end;
000575 2  2
000575 2  2  if (error := PositRead(Fnum, csil, hdr.CSIL^addr, hdr.CSIL^length'<<'1)) then
```

```
000610 2  2      begin call WhyCantRead( filename, error ); goto CloseReturn; end;
000615 2  2
000615 2  2   if G16 then for space := 0 to DiscImage.UL.SpaceCount - 1 do
000621 2  2      if DiscImage.UL.SpaceSize[ space ] <> csil[ space + 16 ].size then
000636 2  2         begin call fprint( @SpaceDif ); goto CloseReturn; end;
000662 2  2
000662 2  2   for space := 0 to PinSpace.SpaceCount - 1 do
000664 2  2      if PinSpace.SpaceSize[ space ] <> csil[ space ].size then
000704 2  2         begin call fprint( @SpaceDif ); goto CloseReturn; end;
000735 2  2
000735 2  2   TotalStatements := TotalUnexecuted := 0d;     !Initialize counters
000741 2  2
000741 2  2   while NOT (error := GetNextProcedure( Fnum )) do !For every procedure
000746 2  2      begin
000746 2  3      SubtotalStatements := SubtotalUnexecuted := 0d; !Initialize counters
000752 2  3      call FprintPoof( @ProcedureDetail,
000752 2  3                       Procedure.Spaceid,
000752 2  3                       Procedure.Offset,
000752 2  3                       @Procedure.Name );
000772 2  3
000772 2  3      if Procedure.HasInspect then
000775 2  3         begin
000775 2  4
000775 2  4         NotAny := TRUE;                   !Assume no entry point was entered
000777 2  4         while NOT (error := GetNextEPT( Fnum )) do
001004 2  4            begin
001004 2  5            if TestForHit( Procedure.Spaceid + (library << 11),
001004 2  5                           Procedure.Offset '+' EntryPointOffset ) then
001020 2  5               begin
001020 2  6               NotAny := FALSE;           !At least one entry point was entered
001022 2  6               call FprintPoof( @EPTdetail, @Executed,
001022 2  6                                EntryPointOffset,
001022 2  6                                @EntryPointName );
001044 2  6               end
001044 2  5            else
001045 2  5               begin
001045 2  6               call FprintPoof( @EPTdetail, @UnExecuted,
001045 2  6                                EntryPointOffset,
001045 2  6                                @EntryPointName );
001067 2  6               end;
001067 2  5            end;
001070 2  4         if error <> -1 then
001073 2  4            begin
001073 2  5            call WhyCantRead( filename, error );
001077 2  5            goto CloseReturn;
001100 2  5            end;
001100 2  4
001100 2  4
001100 2  4         if NOT Summary then          !Print source file info only if not summary
001102 2  4            if FormatProcSourceInfo then GOTO CloseReturn;
001105 2  4
001105 2  4         !For every statement in the procedure
001105 2  4         while NOT (error := GetNextStatement( Fnum )) do
001112 2  4            begin
001112 2  5            SubtotalStatements := SubtotalStatements + 1d;
001116 2  5            call nout32( ws, $ABS(Statement.LineNum), 10, -12, -3 ); !COBOL
001134 2  5                                         !negates VERBs' line numbers.
```

```
001134 2  5          if TestForHit( Procedure.Spaceid + (library << 11),
001134 2  5                     Procedure.Offset '+' Statement.Offset ) then
001153 2  5             begin
001153 2  6             if NotAny then
001155 2  6                begin                !Often happens with system processes
001155 2  7                call FprintPoof( @Inconsistency );
001166 2  7                NotAny := FALSE;     !Do once per procedure
001170 2  7                goto PrintExecuted;
001172 2  7                end;
001172 2  6             if NOT brief and NOT summary then
001200 2  6  PrintExecuted:
001200 2  6                call FprintPoof( @StatementDetail,
001200 2  6                                 @Executed,
001200 2  6                                 Statement.Offset,
001200 2  6                                 @ws[2], !line number
001200 2  6                                 @Statement.FileName );
001227 2  6             end
001227 2  5          else
001230 2  5             begin
001230 2  6             SubtotalUnexecuted := SubtotalUnexecuted + 1d;
001234 2  6             if NOT (brief AND NotAny) and NOT summary then
001242 2  6                call FprintPoof( @StatementDetail,
001242 2  6                                 @Unexecuted,
001242 2  6                                 Statement.Offset,
001242 2  6                                 @ws[2], !line number
001242 2  6                                 @Statement.FileName );
001271 2  6             end;
001271 2  5          end;
001272 2  4       if error <> -1 then
001275 2  4          begin
001275 2  5          call WhyCantRead( filename, error );
001301 2  5          goto CloseReturn;
001302 2  5          end;
001302 2  4
001302 2  4       if SubtotalStatements = 0d then   !There's got to be at least 1
001306 2  4          SubtotalUnexecuted := SubtotalStatements := 1d;
001312 2  4       TotalStatements := TotalStatements + SubtotalStatements;
001316 2  4       TotalUnexecuted := TotalUnexecuted + SubtotalUnexecuted;
001322 2  4       Percent := (SubtotalUnexecuted * 10000d / SubtotalStatements + 5d)/10d;
001340 2  4       call nout32( ws, Percent, 10, -5, -1 );
001353 2  4       call FprintPoof( @StatisticS, @SubtotalStatements,
001353 2  4                        @SubtotalUnexecuted, @ws );
001373 2  4       end
001373 2  3
001373 2  3    else
001374 2  3       call FprintPoof( @NoSymbols, @Procedure.Name );
001407 2  3
001407 2  3    end;
001412 2  2 if error <> -1 then
001415 2  2    begin
001415 2  3    call WhyCantRead( filename, error );
001421 2  3    goto CloseReturn;
001422 2  3    end;
001422 2  2
001422 2  2 Percent := (TotalUnexecuted * 10000d / TotalStatements + 5d)/10d;
001440 2  2 call nout32( ws, Percent, 10, -5, -1 );
001453 2  2 call fprint( @StatisticT, @TotalStatements, @TotalUnexecuted, @ws );
```

```
001474 2  2
001474 2  2   end; !subproc DisplaySpace

CLOSERETURN                  Label                        %177777
EPTDETAIL                    Variable       STRING        Direct         P+000
EXECUTED                     Variable       STRING        Direct         P+000
FILENAME                     Variable       INT           Indirect       S-022
LIBRARY                      Variable       INT           Direct         S-017
PERCENT                      Variable       INT (32)      Direct         S-005
PINSPACE                     Variable,110   STRUCT-S      EXT Pointer    S-021
PRINTEXECUTED                Label                        %001200
PROCEDUREDETAIL              Variable       STRING        Direct         P+000
SPACE                        Variable       INT           Direct         S-000
STATEMENTDETAIL              Variable       STRING        Direct         P+000
STATISTICS                   Variable       STRING        Direct         P+000
STATISTICT                   Variable       STRING        Direct         P+000
SUBTOTALSTATEMENTS           Variable       INT (32)      Direct         S-011
SUBTOTALUNEXECUTED           Variable       INT (32)      Direct         S-007
TELLLIB                      Variable       STRING        Direct         P+000
TELLPROG                     Variable       STRING        Direct         P+000
TIMESTAMP                    Variable       INT           Direct         S-003
TOTALSTATEMENTS              Variable       INT (32)      Direct         S-015
TOTALUNEXECUTED              Variable       INT (32)      Direct         S-013
UNEXECUTED                   Variable       STRING        Direct         P+000
001477 1  1   while nextchar(0) do
001532 1  1     case scanidt( charadr, @Params ) of
001546 1  1     begin
001546 1  2     !PIN    ! begin
001546 1 CE0              if UsePin then call debug^err;  !Specified twice
001554 1  3               if scanint( charadr, pin, , 0, 255 ) then
001566 1  3                  call finger^err( @NoPin );
001576 1  3               UsePin := TRUE;        !Read CRCB from memory
001600 1  3               if UseFile then call finger^err( @BothPandF );
001612 1  3               end;
001615 1 CE1    !FILE   ! begin
001615 1  3               if UseFile then call debug^err; !Specified twice
001623 1  3               if NOT scanfname( charadr, BitmapFile, defaults.word ) then
001633 1  3                  call finger^err( @NoFile );
001643 1  3               UseFile := TRUE;       !Read CRCB from the file
001645 1  3               if UsePin then call finger^err( @BothPandF );
001657 1  3               end;
001662 1 CE2    !CODE   ! begin
001662 1  3              if Prog OR LibraryOnly then call debug^err;
001672 1  3              if NOT scanfname( charadr, ProgName, defaults.word ) then
001702 1  3                 call finger^err( @NoFile );
001712 1  3              Prog := TRUE;
001714 1  3              end;
001716 1 CE3    !LIB    ! begin
001716 1  3              if Lib OR ProgramOnly then call debug^err;
001726 1  3              if NOT scanfname( charadr, LibName, defaults.word ) then
001741 1  3                 call finger^err( @NoFile );
001751 1  3              Lib := TRUE;
001753 1  3              end;
001755 1 CE4    !PROGRAMONLY! begin
001755 1  3              if ProgramOnly OR LibraryOnly OR Lib
001755 1  3                 then call debug^err;
```

```
001767 1  3              ProgramOnly := TRUE;
001771 1  3              end;
001772 1 CE5       !LIBRARYONLY! begin
001772 1  3              if ProgramOnly OR LibraryOnly OR Prog
001772 1  3                 then call debug^err;
002004 1  3              LibraryOnly := TRUE;
002006 1  3              end;
002007 1 CE6       !BRIEF  ! begin
002007 1  3              if Brief then call debug^err else Brief := TRUE;
002022 1  3              if Summary then call debug^err( @BothBandS );
002034 1  3              end;
002036 1 CE7       !SUMMARY! begin
002036 1  3              if Summary then call debug^err else Summary := TRUE;
002047 1  3              if Brief then call debug^err( @BothBandS );
002061 1  3              end;
002063 1 CE8       otherwise call debug^err;
002067 1  2        end;
002112 1  1     eol;
002123 1  1
002123 1  1     if NOT UsePin and NOT UseFile then call debug^err( @Neither );
002137 1  1
002137 1  1     if Summary then
002141 1  1        call FprintPoof( @HeadingE )
002153 1  1     else
002155 1  1        call FprintPoof( @HeadingS );
002167 1  1
002167 1  1     if UsePin then
002171 1  1        begin
002171 1  2        if NOT CheckSecurity( pin ) then return;
002176 1  2        if NOT MoveBitmapToMem( pin ) then
002202 1  2           begin call fprint( @NoMeasRun, pin ); return; end;
002217 1  2        call FprintPoof( @TellBitmapP, pin );
002232 1  2        end
002232 1  1     else
002233 1  1        begin
002233 1  2        call ReadBitmapFile( BitmapFile, DiscImage );
002242 1  2        call FprintPoof( @TellBitmapF, @BitmapFile );
002255 1  2        end;
002255 1  1
002255 1  1     if NOT Prog then ProgName ':=' DiscImage.UC.Name for 12 words;
002270 1  1     if NOT Lib then LibName ':=' DiscImage.UL.Name for 12 words;
002303 1  1
002303 1  1     if DiscImage.UC.Name = DiscImage.UL.Name for 12 words then
002316 1  1        G16 := TRUE;                     !Program is more than 16 segments
002320 1  1
002320 1  1     if G16 AND (Lib OR LibraryOnly) then
002326 1  1        begin call Fprint( @NoLibWithG16 ); return; end;
002342 1  1     if (Lib OR LibraryOnly) AND NOT DiscImage.UL.SpaceCount then
002351 1  1        begin call Fprint( @NoLib ); return; end;
002365 1  1     if (Prog OR ProgramOnly) AND NOT DiscImage.UC.SpaceCount then
002374 1  1        begin call Fprint( @NoProg ); return; end;
002410 1  1
002410 1  1     if DiscImage.UC.SpaceCount AND NOT LibraryOnly then
002415 1  1        begin
002415 1  2        call DisplaySpace( ProgName, DiscImage.UC, 0 !prog! );
002425 1  2        call close( Fnum );
```

```
537.   002432 1  2      end;
538.   002432 1  1   if DiscImage.UL.SpaceCount AND NOT ProgramOnly AND NOT G16 then
539.   002441 1  1      call DisplaySpace( LibName, DiscImage.UL, 1 !lib! );
540.   002451 1  1
541.   002451 1  1   CloseReturn:
542.   002460 1  1   call close( Fnum );
543.   002465 1  1
544.   002465 1  1   end; !proc DISplay^Command

BITMAPFILE                Variable        INT          Direct         L+020
BRIEF                     Variable        INT          Direct         L+013
CLOSERETURN               Label                        %002460
CSIL                      Variable,54     STRUCT       Indirect       L+003
DISCIMAGE                 Variable,232    STRUCT-S     EXT Pointer    L+001
DISPLAYSPACE              Subproc                      %000403
ERROR                     Variable        INT          Direct         L+065
FNUM                      Variable        INT          Direct         L+064
G16                       Variable        INT          Direct         L+016
HDR                       Variable,1000   STRUCT       Indirect       L+004
HEADINGE                  Variable        STRING       Direct         P+000
HEADINGS                  Variable        STRING       Direct         P+000
LIB                       Variable        INT          Direct         L+010
LIBNAME                   Variable        INT          Direct         L+050
LIBRARYONLY               Variable        INT          Direct         L+012
NOTANY                    Variable        INT          Direct         L+015
PARAMS                    Variable        STRING       Direct         P+000

PIN                       Variable        INT          Direct         L+017
PRINTEXECUTED             Label                        %177777
PROG                      Variable        INT          Direct         L+007
PROGNAME                  Variable        INT          Direct         L+034
PROGRAMONLY               Variable        INT          Direct         L+011
SUMMARY                   Variable        INT          Direct         L+014
TELLBITMAPF               Variable        STRING       Direct         P+000
TELLBITMAPP               Variable        STRING       Direct         P+000
USEFILE                   Variable        INT          Direct         L+006
USEPIN                    Variable        INT          Direct         L+005
WS                        Variable        STRING       Direct         L+066
546.   000000 0  0   ! Format the EDIT line #, the Source filename, and the modification
547.   000000 0  0   ! timestamp for the PROC header (or 1st statement).
548.   000000 0  0   ! Returns FPRINT's error return.
549.   000000 0  0   int !prv! proc FormatProcSourceInfo;
550.   000000 1  0   begin
551.   000000 1  1   string      SourceFile1 = 'P' :=
552.   000000 1  1               ["Procedure header at line '10 in 'F*",0];
553.   000022 1  1   string      SourceFile2 = 'P' :=
554.   000022 1  1               ["Source file timestamp was '22!.",0];
555.   000042 1  1   string      ws[0:22];                !For formatting output
556.   000042 1  1   int         error;
557.   000042 1  1
558.   000042 1  1   call nout32( ws, Procedure.SourceFileLine, 10, -12, -3 );
559.   000057 1  1
560.   000057 1  1   if (error := fprint( @SourceFile1, @ws[2], @Procedure.SourceFileName )) then
561.   000100 1  1      return error;
562.   000102 1  1
563.   000102 1  1   call mtimestampcollapse( ws, Procedure.SourceFileTimestamp );
564.   000112 1  1
```

```
000112 1  1    if (error := fprint( @SourceFile2, @ws )) then return error;
000130 1  1
000130 1  1    return 0;                          !All's well
000132 1  1
000132 1  1    end; !proc FormatProcSourceInfo

ERROR                            Variable      INT          Direct       L+015
SOURCEFILE1                      Variable      STRING       Direct       P+000
SOURCEFILE2                      Variable      STRING       Direct       P+000
WS                               Variable      STRING       Direct       L+001


000000 0  0    ! List all the interesting information about every procedure, entry
000000 0  0    ! point, and statement in some object file.
000000 0  0    proc !prv! List^Command;
000000 1  0    begin
000000 1  1    string      TellObj = 'P' :=
000000 1  1                ["Code file is 'F* dated '22!",0];
000016 1  1    string      ProcedureDetail = 'P' :=
000016 1  1                ["Spaceid %2 word offset %6 is base of '31",0];
000043 1  1    string      EPTdetail = 'P' :=
000043 1  1                ["  Entry point at word offset %6 is '31",0];
000067 1  1    string      StatementDetail = 'P' :=
000067 1  1                ["  Word offset %6 is line '10 in 'F*",0];
000111 1  1    int         ObjFileName[0:11];
000111 1  1    int         ObjTimestamp[0:2];
000111 1  1    string      ws[0:22];                 !For formatting output
000111 1  1    int         Fnum;
000111 1  1    int         error;
000111 1  1
000111 1  1    if NOT scanfname( charadr, ObjFileName, defaults.word ) then
000122 1  1       call debug^err( @NoFile );
000132 1  1    eol;
000143 1  1
000143 1  1    if (error := OpenObjectFile( ObjFileName, Fnum )) then
000151 1  1       begin call WhyCantRead( ObjFileName, error ); return; end;
000157 1  1    call fileinfo(,,ObjFileName,,,,,,ObjTimestamp);
000174 1  1    call mtimestampcollapse( ws, ObjTimestamp );
000203 1  1    call FprintPoof( @TellObj, @ObjFileName, @ws );
000220 1  1
000220 1  1    while NOT (error := GetNextProcedure( Fnum )) do !For every procedure
000225 1  1       begin
000225 1  2       call FprintPoof( @ProcedureDetail,
000225 1  2                        Procedure.Spaceid,
000225 1  2                        Procedure.Offset,
000225 1  2                        @Procedure.Name );
000245 1  2       while NOT (error := GetNextEPT( Fnum )) do
000252 1  2          call FprintPoof( @EPTdetail,
000252 1  2                           EntryPointOffset,
000252 1  2                           @EntryPointName );
000270 1  2
000270 1  2       if Procedure.HasInspect then
000273 1  2          begin
000273 1  3          if FormatProcSourceInfo then return;
```

```
613.    000276 1  3        !For every statement in the procedure
614.    000276 1  3        while NOT (error := GetNextStatement( Fnum )) do
615.    000303 1  3           begin
616.    000303 1  4           call nout32( ws, $ABS(Statement.LineNum), 10, -12, -3 ); !COBOL
617.    000321 1  4                                  !negates VERBs' line numbers.
618.    000321 1  4           call FprintPoof( @StatementDetail,
619.    000321 1  4                            Statement.Offset,
620.    000321 1  4                            @ws[2], !line number
621.    000321 1  4                            @Statement.FileName );
622.    000343 1  4           end;
623.    000344 1  3        if error <> -1 then
624.    000347 1  3           begin
625.    000347 1  4           call WhyCantRead( ObjFileName, error );
626.    000353 1  4           return;
627.    000354 1  4           end;
628.    000354 1  3        end
629.    000354 1  2
630.    000354 1  2     else
631.    000355 1  2        call FprintPoof( @NoSymbols, @Procedure.Name );
632.    000370 1  2
633.    000370 1  2     end;
634.    000372 1  1  if error <> -1 then
635.    000375 1  1     begin
636.    000375 1  2     call WhyCantRead( ObjFileName, error );
637.    000401 1  2     return;
638.    000402 1  2     end;
639.    000402 1  1
640.    000402 1  1  end; !proc List^Command

EPTDETAIL                    Variable   STRING     Direct     P+000
ERROR                        Variable   INT        Direct     L+035
FNUM                         Variable   INT        Direct     L+034
OBJFILENAME                  Variable   INT        Direct     L+001
OBJTIMESTAMP                 Variable   INT        Direct     L+015
PROCEDUREDETAIL              Variable   STRING     Direct     P+000
STATEMENTDETAIL              Variable   STRING     Direct     P+000
TELLOBJ                      Variable   STRING     Direct     P+000
WS                           Variable   STRING     Direct     L+020

642.    000000 0  0  ! Starts the measurement of a PIN or object file.
```

ase
lock

```
000036 1  1    subproc Measure^PIN;
000036 2  1    begin
000036 2  2    int      .sg Measure^PCB( pcb^template );
000036 2  2    int          SavePcbcrt[0:2];
000036 2  2    int          ReadLen;
000036 2  2    label        ServerReadError;
000036 2  2
000036 2  2    if pin < 0 then begin call fprint( @NoPin ); return; end;
000057 2  2    @Measure^PCB := @pcb[ pin ];        !Address of this pin's pcb
000064 2  2
000064 2  2    ! Save stuff from PCB.  After we're ready, make sure PCB hasn't changed.
000064 2  2    SavePcbcrt ':=' Measure^PCB.pcbcrt for 3 words;
000071 2  2
000071 2  2    if NOT Measure^PCB.pcbpri then begin call fprint(@NotRun,pin); return; end;
000113 2  2
000113 2  2    ! If filenames aren't supplied then get them from the system.
000113 2  2    if NOT Prog then
000115 2  2       call systemprocessinfo(Measure^PCB.pcbpid,....,ProgName);
000133 2  2    if NOT Lib then
000135 2  2       call systemprocessinfo(Measure^PCB.pcbpid,.. ... ... ... ,LibName);
000154 2  2
000154 2  2    ! Can't measure Monitor because some of its code (XSTOP & XNEWPROCESS) is
000154 2  2    ! actually executed under other processes.
000154 2  2    if pin = 0 then
000157 2  2       begin call fprint(@Monitor); return; end;
000174 2  2
000174 2  2    if TestCoverEnabled < 2 AND (Measure^PCB.PrivCodeF OR
000174 2  2                                 Measure^PCB.PrivLibF  OR
000174 2  2                                 Measure^PCB.sysproc     ) then
000216 2  2       begin call fprint( @PrivNotAllowed ); return; end;
000233 2  2
000233 2  2    if (Measure^PCB.sysproc OR ProgName[8] = ["OSIMAGE "] ) AND
000233 2  2       NOT Prog then
000252 2  2       begin call fprint(@CodeReq); return; end;
000270 2  2
000270 2  2    if NOT CheckSecurity( pin ) then return;
000276 2  2
000276 2  2    if LibraryOnly then
000300 2  2       ProgName ':=' "  "                !Don't measure program
000300 2  2    else
000310 2  2       begin
000310 2  3       error := CheckFileSecurity( ProgName );
000314 2  3       if error then
000316 2  3          begin
000316 2  4          call WhyCantRead( ProgName, error );
000322 2  4          return;
000324 2  4          end;
000324 2  3       ! Scan all of object file and report procs that won't get measured.
000324 2  3       if (error := OpenObjectFile( ProgName, fn )) then
000332 2  3          begin
000332 2  4          call WhyCantRead( ProgName, error );
000336 2  4          return;
000340 2  4          end;
000340 2  3       while NOT (error := GetNextProcedure( fn )) do !For every procedure
000345 2  3          if NOT Procedure.HasInspect AND NOT NoWarn then
000352 2  3             call FprintPoof( @NoSymbols, @Procedure.Name );
000367 2  3       if error <> -1 then
```

```
000372 2  3          begin
000372 2  4          call WhyCantRead( ProgName, error );
000376 2  4          call close( fn );
000403 2  4          return;
000405 2  4          end;
000405 2  3       call close( fn );
000412 2  3       end;
000412 2  2
000412 2  2    if ProgramOnly then
000414 2  2       LibName ':=' "  "                 !Don't measure library
000414 2  2    else
000424 2  2       if LibName <> "   " then          !There may not even BE a library
000431 2  2       begin
000431 2  3       error := CheckFileSecurity( LibName );
000435 2  3       if error then
000437 2  3          begin
000437 2  4          call WhyCantRead( LibName, error );
000443 2  4          return;
000445 2  4          end;
000445 2  3       ! Scan all of object file and report procs that won't get measured.
000445 2  3       if (error := OpenObjectFile( LibName, fn )) then
000453 2  3          begin
000453 2  4          call WhyCantRead( LibName, error );
000457 2  4          return;
000461 2  4          end;
000461 2  3       while NOT (error := GetNextProcedure( fn )) do !For every procedure
000466 2  3          if NOT Procedure.HasInspect AND NOT NoWarn then
000473 2  3             call FprintPoof( @NoSymbols, @Procedure.Name );
000510 2  3       if error <> -1 then
000513 2  3          begin
000513 2  4          call WhyCantRead( LibName, error );
000517 2  4          call close( fn );
000524 2  4          return;
000526 2  4          end;
000526 2  3       call close( fn );
000533 2  3       end;
000533 2  2
000533 2  2    if ProgName = "   " AND LibName = "   " then    !We must be measuring at least one
000545 2  2       begin call fprint( @NeitherPnorL ); return; end;
000562 2  2
000562 2  2    call setstop( 2 );                    !Make us unstoppable
000566 2  2
000566 2  2    @crcb := CRCB^Exists;                 !May do PSEM
000570 2  2    if @crcb = 0d then
000574 2  2       begin
000574 2  3       call fprint( @Disabled );          !COVER is not ENABLEd, so
000606 2  3       call setstop( 0 );
000612 2  3       return;
000615 2  3       end;
000615 2  2
000615 2  2    @PinData := ControlByPinAddress( pin );
000627 2  2
000627 2  2    if PinData.State <> CoverMeasureReset then
000633 2  2       begin
000633 2  3       call fprint( @InUse, pin);
000646 2  3       vsem( bpth.CoverCrcbSem );         !Unlock
000655 2  3       call setstop( 0 );
```

```
000661 2 3        return;
000664 2 3        end;
000664 2 2
000664 2 2     PinData.State := CoverMeasureStarting;
000667 2 2
000667 2 2     vsem( bpth.CoverCrcbSem );          !Unlock
000676 2 2
000676 2 2     ServerName^S[5] ':=' BinToHex[ mypid.pidcpu ] for 1 bytes; !$XCVRn
000717 2 2     call open( ServerName, ServerFn );
000726 2 2     if <> then
000727 2 2        begin
000727 2 3        call fileinfo( -1, error );
000740 2 3        GOTO ServerReadError;
000742 2 3        end;
000742 2 2     Request.MessageType := CVR^Server^Measure;
000744 2 2     Request.FromMonitor := FALSE;
000747 2 2     Request.PIN := PIN;
000752 2 2     Request.Crtpid ':=' SavePcbcrt for 3 words;
000757 2 2     Request.CodeFilename ':=' ProgName for 12 words;
000764 2 2     Request.LibFilename ':=' LibName for 12 words;
000771 2 2     if SaveVolKw then
000773 2 2        begin
000773 2 3        ! Move VOLUME part.
000773 2 3        Request.SaveVol ':=' SaveVol for 4 words;
001000 2 3        ! Move SUBVOL part.
001000 2 3        if SaveVol[4] = "  " then
001006 2 3           Request.SaveVol[4] ':='
001006 2 3           ProgName[4] for 4 words      !Only VOLUME was specified.
001006 2 3        else
001014 2 3           Request.SaveVol[4] ':='
001014 2 3           SaveVol[8] for 4 words;
001022 2 3        end
001022 2 2     else
001023 2 2        Request.SaveVol ':=' ProgName for 8 words;
001030 2 2     call writeread( ServerFn, Request, $len(Request), 24, ReadLen );
001042 2 2     call fileinfo( ServerFn, error );  !Save error response
001053 2 2     if error > FEFIRSTUSER then error := FEFIRSTUSER - error; !Normalize
001065 2 2     call close( ServerFn );            !We're done with it.
001072 2 2
001072 2 2     if error = FEOK then
001075 2 2        call fprint( @Started, PIN )
001110 2 2     else if error = CoverErrInsMem OR error = FENOPHYSMEM then
001120 2 2        call fprint( @InsMem )
001132 2 2     else if error = CoverErrSpaceMismatch then
001137 2 2        call fprint( @SpaceDif )
001153 2 2     else if error = CoverErrNotRunning then
001160 2 2        call fprint( @NotRun, PIN )
001173 2 2     else if ReadLen then
001177 2 2        call WhyCantRead( ReadFname, error )
001203 2 2     else
001204 2 2     ServerReadError:
001204 2 2        begin                           !This should be nearly impossible.
001204 2 3        @crcb := CRCB^Exists;           !Will probably PSEM
001206 2 3        if @crcb <> 0d then
001212 2 3           begin
001212 2 4           @PinData := ControlByPinAddress( pin );
001224 2 4           PinData.State := CoverMeasureReset;
```

```
001226 2  4        vsem( bpth.CoverCrcbSem );
001235 2  4        end;
001235 2  3      call WhyCantRead( ServerName, error );
001241 2  3      end;
001241 2  2
001241 2  2   call setstop( 0 );
001245 2  2
001245 2  2   end; !subproc Measure^PIN

MEASURE^PCB                   Variable,200   STRUCT-I       SG Pointer     S-004
READLEN                       Variable       INT            Direct         S-000
SAVEPCBCRT                    Variable       INT            Direct         S-003
SERVERREADERROR               Label                         %001204
001255 1  1   subproc Measure^Object;
001255 2  1   begin
001255 2  2   int          i;
001255 2  2
001255 2  2   if NOT TestCoverEnabled then
001260 2  2      begin call fprint( @Disabled ); return; end;
001275 2  2
001275 2  2   if ProgName.<0:7> <> "$" then call finger^err( @NotLocal ); !Must be local
001311 2  2
001311 2  2   error := CheckFileSecurity( ProgName );
001315 2  2   if error then
001317 2  2      begin
001317 2  3      call WhyCantRead( ProgName, error );
001323 2  3      return;
001326 2  3      end;
001326 2  2
001326 2  2   ! Scan all of object file and report procs that won't get measured.
001326 2  2   if (error := OpenObjectFile( ProgName, fn )) then
001334 2  2      begin
001334 2  3      call WhyCantRead( ProgName, error );
001340 2  3      return;
001342 2  3      end;
001342 2  2
001342 2  2   if TestCoverEnabled <> 2 AND AnyPrivProcs( fn ) then
001351 2  2      begin call close( fn ); call fprint( @PrivNotAllowed ); return; end;
001373 2  2
001373 2  2   while NOT (error := GetNextProcedure( fn )) do !For every procedure
001400 2  2      if NOT Procedure.HasInspect AND NOT NoWarn then
001405 2  2         call FprintPoof( @NoSymbols, @Procedure.Name );
001422 2  2   if error <> -1 then
001425 2  2      begin
001425 2  3      call WhyCantRead( ProgName, error );
001431 2  3      call close( fn );
001436 2  3      return;
001440 2  3      end;
001440 2  2   call close( fn );
001445 2  2
001445 2  2   call setstop( 2 );                !Make us unstoppable
001451 2  2
001451 2  2   @crcb := CRCB^Exists;             !May do PSEM
001453 2  2   if @crcb = 0d then
001457 2  2      begin
001457 2  3      call setstop( 0 );
```

```
001463 2  3        call fprint( @Disabled );
001475 2  3        return;
001500 2  3        end;
001500 2  2
001500 2  2     if crcb.NumFiles >= $occurs( crcb.FilesToMeasure ) then
001505 2  2        begin
001505 2  3        vsem ( bpth.CoverCrcbSem );
001514 2  3        call setstop( 0 );
001520 2  3        call fprint( @TableFull );
001532 2  3        return;
001535 2  3        end;
001535 2  2
001535 2  2     for i := 0 to crcb.NumFiles - 1 do
001537 2  2        if ProgName = crcb.FilesToMeasure[ i ].FileName for 12 words then
001560 2  2           begin
001560 2  3           vsem ( bpth.CoverCrcbSem );
001567 2  3           call setstop( 0 );
001573 2  3           call fprint( @AlreadyIn );
001605 2  3           return;
001610 2  3           end;
001621 2  2
001621 2  2     ! Add file name to table.
001621 2  2     crcb.FilesToMeasure[crcb.NumFiles].FileName ':=' ProgName for 12 words;
001643 2  2     crcb.FilesToMeasure[crcb.NumFiles].UserID := processaccessid;
001656 2  2     if SaveVolKw then
001660 2  2        begin
001660 2  3        ! Move VOLUME part.
001660 2  3        crcb.FilesToMeasure[crcb.NumFiles].SaveVol ':=' SaveVol for 4 words;
001702 2  3        ! Move SUBVOL part.
001702 2  3        if SaveVol[4] = "  " then
001710 2  3           crcb.FilesToMeasure[crcb.NumFiles].SaveVol[4] ':='
001710 2  3           ProgName[4] for 4 words       !Only VOLUME was specified.
001710 2  3        else
001733 2  3           crcb.FilesToMeasure[crcb.NumFiles].SaveVol[4] ':='
001733 2  3           SaveVol[8] for 4 words;
001756 2  3        end
001756 2  2     else
001757 2  2        crcb.FilesToMeasure[crcb.NumFiles].SaveVol ':=' ProgName for 8 words;
002001 2  2     crcb.NumFiles := crcb.NumFiles + 1;
002010 2  2     vsem ( bpth.CoverCrcbSem );
002017 2  2     call setstop( 0 );
002023 2  2     call fprint( @OK );
002035 2  2     return;
002040 2  2
002040 2  2     end; !subproc Measure^Object

                    Variable       INT              Direct          S-000
002040 1  1     while nextchar(0) do
002071 1  1        case scanidt( charadr, @Params ) of
002105 1  1        begin
002105 1  2        !PIN!     begin
002105 1 CEO                 if Object OR Pin <> -1 then call debug^err;
002116 1  3                  if pin >= 0 then call debug^err; !Specified twice
002125 1  3                  if scanint( charadr, pin, , 0, pcbtable.hdne - 1 ) then
002141 1  3                     call finger^err( @InvPin );
002151 1  3                  end;
```

```
002153 1 CE1     !OBJECT! begin
002153 1  3               if Object OR Pin <> -1 OR Prog OR Lib OR ProgramOnly OR LibraryOnly
002153 1  3                  then call debug^err;
002174 1  3               if NOT scanfname( charadr, ProgName, defaults.word ) then
002204 1  3                  call finger^err( @NoFile );
002214 1  3               Object := TRUE;
002216 1  3               end;
002220 1 CE2     !CODE  ! begin
002220 1  3               if Object OR Prog OR LibraryOnly then call debug^err;
002232 1  3               if NOT scanfname( charadr, ProgName, defaults.word ) then
002242 1  3                  call finger^err( @NoFile );
002252 1  3               Prog := TRUE;
002254 1  3               end;
002256 1 CE3     !LIB   ! begin
002256 1  3               if Object OR Lib OR ProgramOnly then call debug^err;
002273 1  3               if NOT scanfname( charadr, LibName, defaults.word ) then
002303 1  3                  call finger^err( @NoFile );
002313 1  3               Lib := TRUE;
002315 1  3               end;
002317 1 CE4     !SAVEVOL! begin
002317 1  3               if SaveVolKw then call debug^err;
002325 1  3               if NOT scanfname( charadr, SaveVol, defaults.word ) then
002335 1  3                  call finger^err( @NoSaveVol );
002345 1  3               if SaveVol[8] = "  " and SaveVol[4] <> "  " then
002363 1  3                  call finger^err( @NoSaveVol ); !Must have been $v.#<1st>
002373 1  3               SaveVolKw := TRUE;
002375 1  3               end;
002400 1 CE5     !NOWARN! begin
002400 1  3               if NoWarn then call debug^err;
002406 1  3               NoWarn := TRUE;
002410 1  3               end;
002411 1 CE6     !PROGRAMONLY! begin
002411 1  3               if Object OR ProgramOnly OR LibraryOnly OR Lib
002411 1  3                  then call debug^err;
002425 1  3               ProgramOnly := TRUE;
002427 1  3               end;
002430 1 CE7     !LIBRARYONLY! begin
002430 1  3               if Object OR ProgramOnly OR LibraryOnly OR Prog
002430 1  3                  then call debug^err;
002444 1  3               LibraryOnly := TRUE;
002446 1  3               end;
002447 1 CE8     otherwise call debug^err;
002453 1  2      end;
002476 1  1   eol;
002507 1  1
002507 1  1   if pin = -1 and NOT Object then
002514 1  1      begin
002514 1  2      call fprint( @NeitherPinNorObject );
002526 1  2      return;
002530 1  2      end;
002530 1  1
002530 1  1   if Object then
002532 1  1      call Measure^Object
002532 1  1   else
002535 1  1      call Measure^PIN;
002536 1  1
002536 1  1   end; !proc Measure^Command
```

```
BPTH                     Variable,114    STRUCT-I    SG Pointer    L+002
CRCB                     Variable,14020  STRUCT-S    EXT Pointer   L+003
ERROR                    Variable        INT         Direct        L+023
FN                       Variable        INT         Direct        L+022
LIB                      Variable        INT         Direct        L+012
LIBNAME                  Variable        INT         Indirect      L+020
LIBRARYONLY              Variable        INT         Direct        L+014
MASK                     Variable        INT         Direct        L+001
MEASURE^OBJECT           Subproc                     %001255
MEASURE^PIN              Subproc                     %000036
NOWARN                   Variable        INT         Direct        L+016
OBJECT                   Variable        INT         Direct        L+010
PARAMS                   Variable        STRING      Direct        P+000
PIN                      Variable        INT         Direct        L+007
PINDATA                  Variable,244    STRUCT-S    EXT Pointer   L+005
PROG                     Variable        INT         Direct        L+011
PROGNAME                 Variable        INT         Indirect      L+017
PROGRAMONLY              Variable        INT         Direct        L+013
READFNAME                Variable,120    STRUCT      Indirect      L+024
  1 WORD                      0,2        INT         Direct
  1 BYTE[0:79]                0,1        STRING      Direct
REQUEST                  Variable,120    STRUCT      Indirect      L+024
SAVEVOL                  Variable        INT         Indirect      L+021
SAVEVOLKW                Variable        INT         Direct        L+015
   1004.   000000 0  0   ! This procedure expects error to be an FE error if positive or an RO^
   1005.   000000 0  0   ! error if negative.
   1006.   000000 0  0   proc !prv! WhyCantRead( filename, error );
   1007.   000000 1  0   int        .filename;
   1008.   000000 1  0   int         error;
   1009.   000000 1  0   begin
   1010.   000000 1  1
   1011.   000000 1  1   if error > 0 then
   1012.   000003 1  1      call fprint( @ErrorOnF, error, @filename )
   1013.   000017 1  1   else if error = -5 then
   1014.   000024 1  1      call fprint( @IncompatibleObject, @filename )
   1015.   000037 1  1   else if error = -6 then
   1016.   000044 1  1      call fprint( @NotAnObject, @filename )
   1017.   000057 1  1   else
   1018.   000061 1  1      call fprint( @UnknownRO^, error, @filename );
   1019.   000075 1  1
   1020.   000075 1  1   end; !proc WhyCantRead

ERROR                    Variable        INT         Direct        L-003
FILENAME                 Variable        INT         Indirect      L-004
BINDER - OBJECT FILE BINDER - T9621C00 - (09SEP86)    SYSTEM \PRUNE
Object file name is $OVER.T9618C00.oobject
Object file timestamp is 29APR87 13:44:20
Number of Binder errors = 0
Number of Binder warnings = 0
Primary data = 143 words
Secondary data = 4152 words
Code area size = 6 pages
Resident code size = 0 pages
Data area size = 8 pages
[illegible]ded data area size = 0 pages
Top of stack = 4295 words
```

```
Number of code segments  = 1 segment

The object file will only run on a TNS/II
Errorfile file name is $OVER.T9618C00.EOBJECT
Number of compiler errors =  0
Number of compiler warnings =  0
Maximum symbol table space used was = 184752 bytes
Number of source lines = 4752
Compile cpu time = 00:00:10
Total Elapsed time = 00:01:37
```

```
PAGE 1     $OVER.T9618C00.CORDER [1]

TAL - T9250B40 - (15SEP86)                          Source language: TAL - Target machine: Tandem NonStop II System
Date - Time :  07APR87 - 18:38:46                Default options: On (LIST,CODE,MAP,WARN,LMAP) - Off (ICODE,INNERLIST)

                        ? ERRORFILE eorder,USEGLOBALS gglobal,SEARCH oglobal,NOCODE,SYMBOLS,NOGMAP,NOLMAP,NOFIXUP
UseGlobals file:  $OVER.T9618C00.GGLOBAL  02APR87 - 16:53:52
Search file:  $OVER.T9618C00.OGLOBAL  02APR87 - 16:55:07
     2.    000000 0  0    NAME     COVERCOM^ORDER;
     3.    000000 0  0    ?NOLIST
    34.    000000 0  0    ?BEGINCOMPILATION
    35.    000000 0  0    ?SOURCE copytal                    !Copyright notice
Source file:  [1]  $VIOLET.TOOLSC00.COPYTAL   18FEB87 - 09:37:02
     1.    000000 0  0    ! +-------------------------------------------------------------------+
     2.    000000 0  0    ! |                                                                   |
     3.    000000 0  0    ! |   Copyright (C) 1987 by TANDEM COMPUTERS INCORPORATED             |
     4.    000000 0  0    ! |                                                                   |
     5.    000000 0  0    ! |   Protected as an unpublished work.                               |
     6.    000000 0  0    ! |                                                                   |
     7.    000000 0  0    ! |  *The computer program listings and specifications herein are    |
     8.    000000 0  0    ! |   the property of TANDEM COMPUTERS INCORPORATED and shall not be  |
     9.    000000 0  0    ! |   reproduced, copied, or used, in whole or in part, for any       |
    10.    000000 0  0    ! |   reason without the written permission of TANDEM COMPUTERS       |
    11.    000000 0  0    ! |   INCORPORATED.                                                   |
    12.    000000 0  0    ! |                                                                   |
    13.    000000 0  0    ! |   The following are trademarks or service marks of TANDEM         |
    14.    000000 0  0    ! |   COMPUTERS INCORPORATED:                                         |
    15.    000000 0  0    ! |                                                                   |
    16.    000000 0  0    ! |   6AX         ENSCRIBE     INFOSAT*      PATHMAKER       TAL      |
    17.    000000 0  0    ! |   APEX/SQL    ENVOY        INSPECT       PCFORMAT        Tandem   |
    18.    000000 0  0    ! |   BINDER      ENVOYACP/XF  MEASURE       PERUSE          TGAL     |
    19.    000000 0  0    ! |   CROSSREF    EXCHANGE     MULTILAN      PS MAIL         THL      |
    20.    000000 0  0    ! |   DATABOLT    EXPAND       NonStop       PS TEXT EDIT    TIL      |
    21.    000000 0  0    ! |   DDL         FASTSORT     NonStop 1+    PS TEXT FORMAT  TMF      |
    22.    000000 0  0    ! |   DYNABUS     FAXLINK      NonStop EXT   RDF             TRANSFER |
    23.    000000 0  0    ! |   DYNAMITE    FOX          NonStop EXT10 SAFE            WORDLINK |
    24.    000000 0  0    ! |   ENABLE      FOXII        NonStop EXT25 SAFEGUARD       XL8      |
    25.    000000 0  0    ! |   ENCOMPASS   GUARDIAN     NonStop II    SAFE-T-NET      XRAY     |
    26.    000000 0  0    ! |   ENCORE      GUARDIAN 90  NonStop TXP   T-TEXT                   |
    27.    000000 0  0    ! |   ENFORM      GUARDIAN 90XF NonStop VLX  TACL                     |
    28.    000000 0  0    ! |                                                                   |
    29.    000000 0  0    ! +-------------------------------------------------------------------+
    30.    000000 0  0    ! | * INFOSAT is a trademark in which both Tandem and American       |
    31.    000000 0  0    ! |   Satellite have rights.                                          |
    32.    000000 0  0    ! +-------------------------------------------------------------------+
    33.    000000 0  0    ! |   TANDEM COMPUTERS INCORPORATED -- PROPRIETARY AND CONFIDENTIAL   |
    34.    000000 0  0    ! +-------------------------------------------------------------------+
    36.    000000 0  0    ?NOLIST, source extdecs  (
    44.    000000 0  0    ?NOLIST, source pgp      ( mtimestampcollapse, nout32 )
    46.    000000 0  0    ?NOLIST, source pfprint
    48.    000000 0  0    ?NOLIST, source pscan
    50.    000000 0  0    ?NOLIST, source preadobj
    52.    000000 0  0    ?NOLIST, source pcover
    54.    000000 0  0    ?NOLIST, source pbitmap
```

```
   56.     000000 0  0   ?NOLIST, source pobject( WhyCantRead )
   58.     000000 0  0   ?SOURCE sversion( version^order )
Source file:  [1]  $OVER.T9618C00.SVERSION  07APR87 - 11:24:18
   42.     000000 0  0   ?SECTION VERSION^ORDER
   43.     000000 0  0   PROC T9618C00^15JUL87^ORDER^07APR7;
   44.     000000 1  0   BEGIN END;
   59.     000000 0  0   ?SOURCE sorder
Source file:  [1]  $OVER.T9618C00.SORDER  07APR87 - 18:37:43
    2.     000000 0  0   ?IF 15
    3.     000000 0  0   ?IFNOT 15
    4.     000000 0  0     COMMAND SYNTAX:
    5.     000000 0  0     ORDER SUBVOL <subvol> PROGRAM <pfname> [OBJECT <objfname>]
    6.     000000 0  0
    7.     000000 0  0     OPERATION:
    8.     000000 0  0     Will print a sorted report of all the bitmap files in <subvol> that
    9.     000000 0  0     have a bitmap for the program <pfname>.
   10.     000000 0  0
   11.     000000 0  0     Given that bitmap (bitmapN) corresponds to a test case (testN), we
   12.     000000 0  0     will select bitmap1 to correspond to the test case which provides
   13.     000000 0  0     the most coverage.  Once test1 through testN have been run, testN+1
   14.     000000 0  0     will be selected to be the test that adds the most coverage.
   15.     000000 0  0
   16.     000000 0  0     The report will include the bitmap file name, its percent coverage,
   17.     000000 0  0     and the accumulated percent.
   18.     000000 0  0
   19.     000000 0  0
   20.     000000 0  0     DESIGN:
   21.     000000 0  0     Read through <subvol> looking for bitmaps with <pfname> in them,
   22.     000000 0  0     either as the program or the library code file.  For each bitmap,
   23.     000000 0  0     add a row to <sortarray> which indicates which statements were
   24.     000000 0  0     executed.  Once all bitmaps have been read, sort <sortarray> in
   25.     000000 0  0     memory (the sort algorithm will be described later).  Finally, print
   26.     000000 0  0     the report based on the results of the sort.
   27.     000000 0  0
   28.     000000 0  0     The sort array is compressed to minimize storage so that it may be
   29.     000000 0  0     held in a single extended segment for subsequent sorting.  Each row
   30.     000000 0  0     of the array will be <n> bits wide (plus padding to an even word
   31.     000000 0  0     boundary plus four words for a file name) where <n> is the number of
   32.     000000 0  0     statements in the program <pfname> (as may be determined reading
   33.     000000 0  0     <objfname>).  There will be <ntests> of these rows, where <ntests>
   34.     000000 0  0     is the number of bitmaps in <subvol> which have data for <pfname>.
   35.     000000 0  0     Given a program with 200,000 statements (DP2 is about 17,000 in 2
   36.     000000 0  0     code spaces) and 1000 bitmaps, <sortarray> will look like this:
   37.     000000 0  0
   38.     000000 0  0       ---------------------------------------------------------
   39.     000000 0  0       | filename1     |   bits1    [1:200000]  (25000 bytes)  |
   40.     000000 0  0       | filename2     |   bits2    [1:200000]                 |
   41.     000000 0  0       |     .         |     .                                 |
   42.     000000 0  0       |     .         |     .                                 |
   43.     000000 0  0       |     .         |     .                                 |
   44.     000000 0  0       | filename1000  |   bits1000 [1:200000]                 |
   45.     000000 0  0       ---------------------------------------------------------
   46.     000000 0  0
   47.     000000 0  0     This takes a total of (25000+2)*1000 = 25MB of storage.  This can
   48.     000000 0  0     reasonably be stored in an extended segment.  Sorting it will cause
   49.     000000 0  0     page swapping, but this example is probably 50-100 times bigger than
```

```
000000 0  0     the average test library will produce.
000000 0  0
000000 0  0     When the 1st bitmap is found, build a bit vector <cmask> which has
000000 0  0     <m> elements, where <m> is the number of code locations of <pfname>.
000000 0  0     This <cmask> will, in fact, be stored in the same format as a
000000 0  0     bitmap, but a "1" bit indicates the location of a statement starter
000000 0  0     whether executed or not.  <cmask> will be used to compress all the
000000 0  0     bitmap files in <subvol> into another <sortarray> row, and is used
000000 0  0     mearly to avoid the need to re-read the statement starters for each
000000 0  0     bitmap file added to the sort.
000000 0  0
000000 0  0
000000 0  0     SORT ALGORITHM:
000000 0  0     It is desirable to expose a product to very broad testing in as
000000 0  0     short a time as possible.  Given an existing set of test cases which
000000 0  0     have been separately measured, it is useful to order those test
000000 0  0     cases so that the test with the highest coverage is run first.  Once
000000 0  0     this is run, the next test case should be selected so that it adds
000000 0  0     the most to the total coverage, and so forth.  This is a natural
000000 0  0     sort order for the measurement results.
000000 0  0
000000 0  0     For simplicity, assume that all test case executions require the
000000 0  0     same elapsed time.  Assume there is a set of K test cases for a
000000 0  0     product and that the product comprises N program statements.  We may
000000 0  0     represent the results of a statement coverage measurement on a
000000 0  0     product as a bit matrix X consisting of K rows and N columns,
000000 0  0     X(K,N), where X(k,n) is 1 if statement "n" was executed by test case
000000 0  0     "k"; otherwise X(k,n) is 0.
000000 0  0
000000 0  0     In reality, the array X is the sort key of a record which includes
000000 0  0     the filename of the corresponding bitmap file.  For simplicity, we
000000 0  0     show only the sorting of the keys.
000000 0  0
000000 0  0     The following pseudo-code should give a reasonably clear picture of
000000 0  0     the algorithm.  Note that the selection of a test case depends on
000000 0  0     first selecting all the "better" test cases.  This is what precludes
000000 0  0     the use of a partitioned sort algorithm.  A consequence of this is
000000 0  0     that ORDER is an  O(K**2) algorithm.
000000 0  0   ?ENDIF 15
000000 0  0   ?IF 15
000000 0  0   ?IFNOT 15
000000 0  0     proc ORDER( BigK, BigN, X );
000000 0  0        integer BigK, BigN;              --Array dimensions.
000000 0  0        bit array X( BigK, BigN );       --Test measurement results.
000000 0  0        bit array V( BigN ); --Cumulative measurement result
000000 0  0     -- Temporary variables
000000 0  0        integer SumJ, SumK, SumMax, j, k, Max;
000000 0  0        bit array swap( BigN );
000000 0  0
000000 0  0     -- The notation "*" as an array subscript means "all elements
000000 0  0     -- along that coordinate taken one at a time."
000000 0  0
000000 0  0     -- The function "LOR" is the boolean inclusive OR.
000000 0  0
000000 0  0     -- The function "AddElements" computes the sum of the elements
000000 0  0     -- of its vector argument.
```

```
000000 0  0
000000 0  0      V(*) := 0;
000000 0  0
000000 0  0      for k := 1 to BigK-1 do
000000 0  0         begin
000000 0  0         SumMax := SumK := AddElements( V(*) LOR X(k,*) );
000000 0  0         Max := k+1;
000000 0  0         --Find the test case which helps the most.
000000 0  0         for j := Max to BigK do
000000 0  0            begin
000000 0  0            SumJ := AddElements( V(*) LOR X(j,*) );
000000 0  0            if SumJ > SumMax then
000000 0  0               begin
000000 0  0               --Establish a new bound
000000 0  0               SumMax := SumJ;
000000 0  0               --Keep track of index for later swap
000000 0  0               Max := j;
000000 0  0               end;
000000 0  0            end; --j
000000 0  0
000000 0  0         if SumMax > SumK then
000000 0  0            begin
000000 0  0            --Swap X(k,*) with X(Max,*)
000000 0  0            swap(*) := X(k,*);
000000 0  0            X(k,*) := X(Max,*);
000000 0  0            X(Max,*) := swap(*);
000000 0  0            end;
000000 0  0
000000 0  0         V(*) := X(k,*) LOR V(*);
000000 0  0
000000 0  0         end; --k
000000 0  0    ?ENDIF 15
000000 0  0    proc !prv! ORDER^Command;
000000 1  0    begin
000000 1  1    string       Params = 'P' := ["SUBVOL PROGRAM OBJECT",0];
000013 1  1    string       NoSubvol = 'P' := ["SUBVOL not specified.",0];
000026 1  1    string       NoBitmapWithProgram = 'P' :=
000026 1  1                 ["No bitmap was found on the subvol for this program.",0];
000060 1  1    string       TooManyStatements = 'P' :=
000060 1  1                 ["Too many statements in program; there are #7DZ.",0];
000110 1  1    string       TooManyBitmaps = 'P' :=
000110 1  1                 ["Too many bitmaps.",0];
000121 1  1    string .ext DiscImage( CoverDiscImageTemplate ) := %2000000d;
000121 1  1    string .ext cmask( CoverDiscImageTemplate )
000121 1  1            := @DiscImage + CoverDiscHeaderSize + 2d * SizeOfCoverBitmapSegment;
000121 1  1    struct       Row(*);
000121 1  1       begin
000121 1  2       int       FileName[0:3];          !Unqualified file name of bitmap
000121 1  2       int       X[0:-1];                !Compressed bitmap (length determined later)
000121 1  2       int(32)   XD[0:-1];               !May want to reference bitmaps 2 words at
000121 1  2                                         !a time for speed.
000121 1  2       end;
000121 1  1    string .ext SortArray( Row )         !Each row will be a doubleword multiple.
000121 1  1            := @cmask + CoverDiscHeaderSize + 2d * SizeOfCoverBitmapSegment;
000121 1  1    !            SortArray[1:BigK].X will have compressed bitmaps for the
000121 1  1    !            bitmap files
```

```
000121 1  1   !              SortArray[1:BigK].FileName.
000121 1  1   !              SortArray[0].X will be used to hold "V"
000121 1  1   define  V = SortArray[0].X#;
000121 1  1   define VD = SortArray[0].XD#;
000121 1  1   struct third(*);                    !Can be used to make extended address
000121 1  1      begin                            !references to Doublewords, Words, or Bytes.
000121 1  2      int(32)  D[0:-1];
000121 1  2      int      W[0:-1];
000121 1  2      string   B[0:-1];
000121 1  2      end;
000121 1  1   string .ext TempX(third);           !Will end up at top of SortArray for w/s
000121 1  1   string .ext Temp1(third);           !These extended pointers can be used within
000121 1  1   string .ext Temp2(third);           !the subprocs to provide more speed, since
000121 1  1   string .ext Temp3(third);           !they are below L[63].
000121 1  1   struct      .csil( CSIL^def )[0:31];
000121 1  1   struct      .hdr( Object^File^Header^Def );
000121 1  1   int          Subvol[0:11] := [12*["  "]];
000135 1  1   int          Program[0:11] := [12*["  "]];
000151 1  1   int          Object[0:11] := [12*["  "]];
000165 1  1   int          G16 := FALSE;          !flag - TRUE if >16 code spaces.
000165 1  1   int          Lib := FALSE;          !flag - TRUE if looking at library.
000165 1  1   int          error;
000165 1  1   literal      MaxStatements = 64000d * 8d; !512000 is plenty for one program!
000165 1  1   int(32)      TotalStatements;       !Total number of statements for Object.
000165 1  1   int          ND;                    !Dimension in DOUBLE WORDS of SortArray.row
000165 1  1   int          NW;                    !Dimension in WORDS of SortArray.row
000165 1  1   int          NB;                    !Dimension in BYTES of SortArray.row
000165 1  1   int          BigK := 0;             !Number of rows in SortArray.
000165 1  1   string       ws[0:22];              !For formatting output.
000165 1  1
000165 1  1   subproc SwapX( a, b );
000165 2  1   int          a, b;
000165 2  1   forward;
A                   Variable      INT          Direct        S-002
B                   Variable      INT          Direct        S-001
000165 1  1   ! Return the sum of the 1 bits that are in TempX.
000165 1  1   int(32) subproc AddElements( Where );
000165 2  1   string .ext Where;
000165 2  1   begin
000165 2  2   int(32)      sum := 0d;
000165 2  2   int          i;
000165 2  2   label        InnerLoop, SkipAdd, DoneNoPartial;
000165 2  2
000165 2  2   @Temp1 := @Where;                   !Initialize pointer
000172 2  2
000172 2  2
000172 2  2   for i := 1 to ND do
000174 2  2      begin
000174 2  3      ! Sorry about this assembler code,, but this is done K**2 * ND times!
000174 2  3   USE Partial;                        !Will hold sum of bits in double word
000174 2  3      Partial := 0;                    !Initialize count
000175 2  3      stack Temp1.D;                   !Put doubleword into reg. stack
000177 2  3      code(
000177 2  3   ?RP = 7                             !This isn't true, but it'll keep TAL happy.
000177 2  3      BEQL DoneNoPartial;              !Don't bother if there are no 1 bits.
000200 2  3   InnerLoop:
```

```
000200 2  3      BGTR   SkipAdd;                  !0 in high-order bit.
000201 2  3      ADXI   1,Partial;                !1 in high-order bit.  Count it.
000202 2  3   SkipAdd:
000202 2  3      DLLS   1;                        !Shift doubleword left 1 bit.
000203 2  3      BNEQ   InnerLoop                 !Repeat until zero.
000203 2  3      );
000204 2  3
000204 2  3      sum := $udbl(Partial) + sum;
000211 2  3   DROP Partial;
000211 2  3
000211 2  3   DoneNoPartial:
000211 2  3      code( STRP  7 );                 !So we don't keep rolling around
000212 2  3      @Templ := @Templ + 4d;
000217 2  3      end;
000225 2  2
000225 2  2   return sum;
000230 2  2
000230 2  2   end; !subproc AddElements

DONENOPARTIAL          Label                      %000211
I                      Variable     INT           Direct         S-000
INNERLOOP              Label                      %000200
SKIPADD                Label                      %000202
SUM                    Variable     INT (32)      Direct         S-002
WHERE                  Variable     STRING        EXT Pointer    S-005
000230 1  1   ! Read the next bitmap file in Subvol which has data for Program.
000230 1  1   ! Returns 0 if found one and no errors occured else FE error code.
000230 1  1   int subproc GetNextBitmap;
000230 2  1   begin
000230 2  2   int         BreakName[0:11];      !To test for subvol break
000230 2  2   int         TempName[0:11];       !For FNAMECOMPARE
000230 2  2   int         filecode;
000230 2  2
000230 2  2   BreakName ':=' Subvol for 12 words; !Save in case we whip past our subvol.
000235 2  2
000235 2  2   do begin                          !Find next bitmap with given <pfname>.
000235 2  3      error := nextfilename( Subvol );
000241 2  3      if Subvol <> BreakName for 8 then
000246 2  3         begin
000246 2  4         Subvol ':=' BreakName for 12 words; !Restore last filename
000252 2  4         error := 1;                 !Indicate end of subvol.
000254 2  4         end;
000254 2  3      if NOT error then
000256 2  3         begin
000256 2  4         call fileinfo( , error, Subvol, ,,, ,,, filecode );
000274 2  4         if NOT error AND filecode = CoverBitmapFilecode then
000303 2  4            begin                    !This is probably a bitmap file.
000303 2  5            call ReadBitmapFile( Subvol, DiscImage, TRUE ); !Read header for check
000312 2  5            ! Set error to -1 to indicate that the program name was found in
000312 2  5            ! either the program bitmap segment or the library bitmap segment.
000312 2  5            TempName ':=' DiscImage.UC.Name for 12 words;
000323 2  5            if NOT fnamecompare( TempName, Program ) then error := -1;
000332 2  5            TempName ':=' DiscImage.UL.Name for 12 words;
000343 2  5            if NOT fnamecompare( TempName, Program ) then
000350 2  5               begin
000350 2  6               Lib := TRUE;          !We will look at library
```

```
000352 2  6              error := -1;
000354 2  6              end;
000354 2  5            end;
000354 2  4          end;
000354 2  3        end until error;
000356 2  2
000356 2  2     if error <> -1 then return error;
000364 2  2
000364 2  2     if DiscImage.UC.Name = DiscImage.UL.Name for 12 words then G16 := TRUE;
000401 2  2
000401 2  2     call ReadBitmapFile( Subvol, DiscImage ); !Read entire bitmap file now.
000410 2  2
000410 2  2     return 0;                              !No error
000413 2  2
000413 2  2     end; !subproc GetNextBitmap

BREAKNAME                  Variable      INT            Direct        S-030
FILECODE                   Variable      INT            Direct        S-000
TEMPNAME                   Variable      INT            Direct        S-014
000413 1  1     ! This will do a LOR of SortArray[Xindex].X and V into BitString;
000413 1  1     subproc LORvTOx( BitString, Xindex );
000413 2  1     string .ext BitString;
000413 2  1     int         Xindex;
000413 2  1     begin
000413 2  2
000413 2  2     @Temp1 := @V;
000420 2  2     @Temp2 := @SortArray[0].X + Xindex '*' (NB + $offset(SortArray.X));
000432 2  2     @Temp3 := @BitString;
000434 2  2
000434 2  2     use i;                                 !So BOX instruction will be used for speed.
000434 2  2     for i := -NW to -1 do                  !Do a word at a time, NW times.
000442 2  2        begin
000442 2  3        Temp3.W := Temp1.W LOR Temp2.W;
000451 2  3        @Temp1 := @Temp1 + 2d;              !Up to next
000456 2  3        @Temp2 := @Temp2 + 2d;
000463 2  3        @Temp3 := @Temp3 + 2d;
000470 2  3        end;
000471 2  2     drop i;
000471 2  2
000471 2  2     end; !subproc LORvTOx

BITSTRING                  Variable      STRING         EXT Pointer   S-003
XINDEX                     Variable      INT            Direct        S-001
000472 1  1     ! Compress the bitmap just read and put it into the sort array.
000472 1  1     ! Do some sanity checking here.
000472 1  1     ! Don't bother speeding this up too much since it's only called once
000472 1  1     ! per bitmap.
000472 1  1     int subproc PutBitmapIntoX;
000472 2  1     begin
000472 2  2     string      ErrorBind = 'P' :=
000472 2  2                 ["Binder timestamp in bitmap file 'F* differed from others.",0];
000527 2  2     int    .ext BitmapPtr;                 !TESTBIT requires .EXT ptrs to be INT.
000527 2  2     int    .ext cmaskPtr;
000527 2  2     int    .ext Xptr;
000527 2  2     int         space;
000527 2  2     int         BitsInSpace;
```

```
000527 2  2   int           i;
000527 2  2   int(32)       n := 0d;
000527 2  2
000527 2  2   if (BigK := BigK+1) < 0 then        !Increment number of rows in SortArray
000537 2  2      begin
000537 2  3      call fprint( @TooManyBitmaps );
000552 2  3      return TRUE;                     !Error
000555 2  3      end;
000555 2  2
000555 2  2   ! Check that the bitmap doesn't have different binder timestamp from previous.
000555 2  2   if Lib then
000557 2  2      begin
000557 2  3      if DiscImage.UL.Timestamp <> hdr.binder^timestamp for 3 words then
000572 2  3         begin
000572 2  4         call FprintPoof( @ErrorBind, @Subvol );
000603 2  4         return TRUE;
000606 2  4         end;
000606 2  3      end
000606 2  2   else
000607 2  2      begin
000607 2  3      if DiscImage.UC.Timestamp <> hdr.binder^timestamp for 3 words then
000622 2  3         begin
000622 2  4         call FprintPoof( @ErrorBind, @Subvol );
000633 2  4         return TRUE;
000636 2  4         end;
000636 2  3      end;
000636 2  2
000636 2  2   ! Make sure spaces are reasonable.
000636 2  2   if hdr.CSIL^length/wlen(CSIL^def) <>
000636 2  2      (if G16 then DiscImage.UC.SpaceCount + DiscImage.UL.SpaceCount
000636 2  2       else (if Lib then DiscImage.UL.SpaceCount else DiscImage.UC.SpaceCount))
000636 2  2   then
000663 2  2      begin
000663 2  3      call fprint( @SpaceDif );
000675 2  3      return TRUE;
000701 2  3      end;
000701 2  2
000701 2  2   if G16 then for space := 0 to DiscImage.UL.SpaceCount - 1 do
000705 2  2      if DiscImage.UL.SpaceSize[ space ] <> csil[ space + 16 ].size then
000722 2  2         begin
000722 2  3         call fprint( @SpaceDif );
000734 2  3         return TRUE;
000740 2  3         end;
000750 2  2
000750 2  2   if Lib then
000752 2  2      begin
000752 2  3      for space := 0 to DiscImage.UL.SpaceCount - 1 do
000754 2  3         if DiscImage.UL.SpaceSize[ space ] <> csil[ space ].size then
000770 2  3            begin
000770 2  4            call fprint( @SpaceDif );
001002 2  4            return TRUE;
001006 2  4            end;
001016 2  3      end
001016 2  2   else
001017 2  2      begin
001017 2  3      for space := 0 to DiscImage.UC.SpaceCount - 1 do
```

```
001021 2  3        if DiscImage.UC.SpaceSize[ space ] <> csil[ space ].size then
001035 2  3          begin
001035 2  4          call fprint( @SpaceDif );
001047 2  4          return TRUE;
001053 2  4          end;
001063 2  3      end;
001063 2  2
001063 2  2
001063 2  2  ! Now put it in.
001063 2  2
001063 2  2  @Xptr := @SortArray[0].FileName + BigK '*' (NB + $offset(SortArray.X));
001072 2  2  ! Make sure there's backing storage for another row.
001072 2  2
001072 2  2  if CantTouch( Xptr, $udbl(NB) + 8d ) then return TRUE;
001106 2  2  Xptr ':=' Subvol[8] for 4 words;   !Save unqualified file name.
001114 2  2  @Xptr := @Xptr + 8d;               !Point to X
001121 2  2  smear^ext( Xptr, NB, 0 );          !Initialize X to 0
001133 2  2
001133 2  2  for space := 0 to cmask.UC.SpaceCount - 1 do
001135 2  2     begin
001135 2  3     @BitmapPtr := @DiscImage.UC.BitmapPtr + (space '*' 8192);
001147 2  3     @cmaskPtr := @cmask.UC.BitmapPtr + (space '*' 8192);
001161 2  3     ! Put number of words (-1) in space into temporary for speed.
001161 2  3     ! Don't worry about last word; it's in the XEP.
001161 2  3     BitsInSpace := DiscImage.UC.SpaceSize[space];
001165 2  3     i := 0;
001167 2  3     while i '<' BitsInSpace do
001173 2  3        begin
001173 2  4        if testbit( i, cmaskPtr ) then
001207 2  4           begin                       !There is a statement here
001207 2  5           ! If corresponding statement was executed, then set X[n] bit ON.
001207 2  5           if testbit( i, BitmapPtr ) then
001223 2  5              begin
001223 2  6              stack %100000 '>>' $int(n).<12:15>;
001230 2  6              stack @Xptr + (n '>>' 3);
001234 2  6              code (ORX);
001235 2  6              end;
001235 2  5           n := n + 1d;
001241 2  5           end;
001241 2  4        i := i '+' 1;
001244 2  4        end;
001245 2  3     end;
001255 2  2
001255 2  2  for space := 0 to cmask.UL.SpaceCount - 1 do
001257 2  2     begin
001257 2  3     @BitmapPtr := @DiscImage.UL.BitmapPtr + (space '*' 8192);
001271 2  3     @cmaskPtr := @cmask.UL.BitmapPtr + (space '*' 8192);
001303 2  3     ! Put number of words (-1) in space into temporary for speed.
001303 2  3     ! Don't worry about last word; it's in the XEP.
001303 2  3     BitsInSpace := DiscImage.UL.SpaceSize[space];
001307 2  3     i := 0;
001311 2  3     while i '<' BitsInSpace do
001315 2  3        begin
001315 2  4        if testbit( i, cmaskPtr ) then
001331 2  4           begin                       !There is a statement here
001331 2  5           ! If corresponding statement was executed, then set X[n] bit ON.
```

```
001331 2  5              if testbit( i, BitmapPtr ) then
001345 2  5                 begin
001345 2  6                 stack %100000 '>>' $int(n).<12:15>;
001352 2  6                 stack @xPtr + (n '>>' 3);
001356 2  6                 code (ORX);
001357 2  6                 end;
001357 2  5              n := n + 1d;
001363 2  5              end;
001363 2  4           i := i '+' 1;
001366 2  4           end;
001367 2  3        end;
001377 2  2
001377 2  2     return FALSE;                          !OK to use (no errors)
001402 2  2
001402 2  2     end; !subproc PutBitmapIntoX

BITMAPPTR                      Variable     INT            EXT Pointer    S-012
BITSINSPACE                    Variable     INT            Direct         S-003
CMASKPTR                       Variable     INT            EXT Pointer    S-010
ERRORBIND                      Variable     STRING         Direct         P+000
I                              Variable     INT            Direct         S-002
N                              Variable     INT (32)       Direct         S-001
SPACE                          Variable     INT            Direct         S-004
XPTR                           Variable     INT            EXT Pointer    S-006
001402 1  1     subproc PutStartersIntoCmask;
001402 2  1     begin
001402 2  2     string       TellProg = 'P' :=
001402 2  2                  ["Program file is 'F* dated '22!",0];
001422 2  2     string       TellLib = 'P' :=
001422 2  2                  ["Library file is 'F* dated '22!",0];
001442 2  2     int          Fnum;                     !File number of object file
001442 2  2     int(32)      BaseOfBitmap;
001442 2  2     int     .ext Bitmap;
001442 2  2     int          offset;
001442 2  2     int          Timestamp[0:2];
001442 2  2
001442 2  2     if (error := OpenObjectFile( Object, Fnum )) then
001452 2  2        begin
001452 2  3        call WhyCantRead( Object, error );
001456 2  3        GOTO^MAINLOOP;
001475 2  3        end;
001475 2  2
001475 2  2     call fileinfo(,,Object,,,,,,Timestamp);
001512 2  2     call mtimestampcollapse( ws, Timestamp );
001522 2  2     call FprintPoof( if Lib then @TellLib else @TellProg, @Object, @ws );
001543 2  2
001543 2  2     if (error := PositRead( Fnum, hdr, 0d, $len(hdr) )) then !Read header
001553 2  2        begin
001553 2  3        call WhyCantRead( Object, error );
001557 2  3        call close( Fnum );
001564 2  3        GOTO^MAINLOOP;
001603 2  3        end;
001603 2  2
001603 2  2     ! Check that object file has same binder timestamp.  Just warning if not.
001603 2  2     if Lib then
001605 2  2        begin
```

```
001605 2  3       if DiscImage.UL.Timestamp <> hdr.binder^timestamp for 3 words then
001620 2  3          begin
001620 2  4          call FprintPoof( @WarnBind );
001631 2  4          hdr.binder^timestamp ':=' DiscImage.UL.Timestamp for 3 words; !Save
001643 2  4          end;
001643 2  3       end
001643 2  2    else
001645 2  2       begin
001645 2  3       if DiscImage.UC.Timestamp <> hdr.binder^timestamp for 3 words then
001660 2  3          begin
001660 2  4          call FprintPoof( @WarnBind );
001671 2  4          hdr.binder^timestamp ':=' DiscImage.UC.Timestamp for 3 words; !Save
001703 2  4          end;
001703 2  3       end;
001703 2  2
001703 2  2    if (error := PositRead(Fnum, csil, hdr.CSIL^addr, hdr.CSIL^length'<<'1)) then
001716 2  2       begin
001716 2  3       call WhyCantRead( Object, error );
001722 2  3       call close( Fnum );
001727 2  3       GOTO^MAINLOOP;
001746 2  3       end;
001746 2  2
001746 2  2
001746 2  2    if G16 OR NOT Lib then
001752 2  2       BaseOfBitmap := @cmask.UC.BitmapPtr
001752 2  2    else
001762 2  2       BaseOfBitmap := @cmask.UL.BitmapPtr;
001770 2  2
001770 2  2    TotalStatements := 0d;             !Initialize counter
001772 2  2
001772 2  2    while NOT (error := GetNextProcedure( Fnum )) do !For every procedure
001777 2  2       begin
001777 2  3       if Procedure.HasInspect then
002002 2  3          begin
002002 2  4          !For every statement in the procedure
002002 2  4          while NOT (error := GetNextStatement( Fnum )) do
002007 2  4             begin
002007 2  5             TotalStatements := TotalStatements + 1d;
002013 2  5             @Bitmap := BaseOfBitmap
002013 2  5                      + $udbl(Procedure.Spaceid) * SizeOfCoverSpaceBitmap;
002024 2  5             offset := Procedure.Offset '+' Statement.Offset;
002032 2  5             setbit( offset, Bitmap ); !Indicate where the statement is.
002044 2  5             end;
002045 2  4          if error <> -1 then
002050 2  4             begin
002050 2  5             call WhyCantRead( Object, error );
002054 2  5             call close( Fnum );
002061 2  5             GOTO^MAINLOOP;
002100 2  5             end;
002100 2  4          end; !HasInspect
002100 2  3       end; !GetNextProcedure
002101 2  2    if error <> -1 then
002104 2  2       begin
002104 2  3       call WhyCantRead( Object, error );
002110 2  3       call close( Fnum );
002115 2  3       GOTO^MAINLOOP;
```

```
 536.   002134 2  3      end;
 537.   002134 2  2
 538.   002134 2  2   call close( Fnum );
 539.   002141 2  2
 540.   002141 2  2   end; !subproc PutStartersIntoCmask;

BASEOFBITMAP                 Variable      INT (32)      Direct         S-007
BITMAP                       Variable      INT           EXT Pointer    S-005
FNUM                         Variable      INT           Direct         S-010
OFFSET                       Variable      INT           Direct         S-003
TELLLIB                      Variable      STRING        Direct         P+000
TELLPROG                     Variable      STRING        Direct         P+000
TIMESTAMP                    Variable      INT           Direct         S-002
 542.   002143 1  1   ! The SortArray has been filled and is ready to sort.  Now perform the
 543.   002143 1  1   ! sort.  Print results as we find them.  The only reason for printing
 544.   002143 1  1   ! at the same time as sorting is so that the user can interrupt the
 545.   002143 1  1   ! sort when he's got enough detail.
 546.   002143 1  1   subproc SortX;
 547.   002143 2  1   begin
 548.   002143 2  2   string      OrderHeader = 'P' := [
 549.   002143 2  2               "Measurement of 'F* which comprises #D* statements^",
 550.   002174 2  2               "Sequence   Filename    ?% Coverage    ?% Cumulative",0];
 551.   002226 2  2   string      OrderDetail = 'P' :=
 552.   002226 2  2               ["   &5Z   '8         '5?%            '5?%",0];
 553.   002251 2  2   int         j, k;                    !Loop control
 554.   002251 2  2   int         Max;                     !Keeps track of index of biggest element.
 555.   002251 2  2   int(32)     SumK, SumJ, SumMax;
 556.   002251 2  2   int(32)     Percent;                 !Percent covered by this test
 557.   002251 2  2   string      TempName[0:7];
 558.   002251 2  2   string      ws1[0:5];                !For formatting percentages
 559.   002251 2  2   string      ws2[0:5];
 560.   002251 2  2
 561.   002251 2  2   !Print a header line.
 562.   002251 2  2   call fprint( @OrderHeader, @Object, @TotalStatements );
 563.   002265 2  2
 564.   002265 2  2   for k := 1 to BigK-1 do
 565.   002267 2  2      begin
 566.   002267 2  3      call LORvTOx( TempX, k );        !TempX := V(*) LOR X(k,*)
 567.   002274 2  3      SumMax := SumK := AddElements( TempX );
 568.   002302 2  3      Max := k+1;                      !Initially assume that next element is big
 569.   002305 2  3      --Find the test case which helps the most.
 570.   002305 2  3      for j := Max to BigK do
 571.   002311 2  3         begin
 572.   002311 2  4         call LORvTOx( TempX, j );     !TempX := V(*) LOR X(j,*)
 573.   002316 2  4         SumJ := AddElements( TempX );!Sum of TempX bits
 574.   002322 2  4         if SumJ > SumMax then
 575.   002326 2  4            begin                      !Establish a new bound
 576.   002326 2  5            Max := j;                  !Which element.
 577.   002330 2  5            SumMax := SumJ;            !How big.
 578.   002332 2  5            end;
 579.   002332 2  4         end; --j
 580.   002340 2  3
 581.   002340 2  3      if SumMax > SumK then call SwapX( k, Max );
 582.   002351 2  3      call LORvIOx( V, k );            !V(*) := V(*) LOR X(k,*)
 583.   002361 2  3
 584.   002361 2  3   !  Get filename.
```

```
002361 2 3        @Temp3 := @SortArray[0].FileName + k '*' (NB + $offset(SortArray.X));
002370 2 3        TempName ':=' Temp3.B for 8 bytes;
002376 2 3     !  Calculate percent coverage by THIS test.
002376 2 3        @Temp3 := @Temp3 + $udbl($offset(SortArray.X));
002403 2 3        Percent := (AddElements( Temp3 ) * 10000d / TotalStatements + 5d) / 10d;
002423 2 3        call nout32( ws1, Percent, 10, -5, -1 );
002436 2 3     !  Calculate cumulative percent.
002436 2 3        Percent := (SumMax * 10000d / TotalStatements + 5d) / 10d;
002454 2 3        call nout32( ws2, Percent, 10, -5, -1 );
002471 2 3        call fprintpoof( @OrderDetail, k, @TempName, @ws1, @ws2 );
002516 2 3
002516 2 3        end; --k
002525 2 2
002525 2 2     ! Handle final (Kth) element.
002525 2 2     !  Get filename.
002525 2 2     @Temp3 := @SortArray[0].FileName + BigK '*' (NB + $offset(SortArray.X));
002534 2 2     TempName ':=' Temp3.B for 8 bytes;
002542 2 2     !  Calculate percent coverage by THIS test.
002542 2 2     @Temp3 := @Temp3 + $udbl($offset(SortArray.X));
002547 2 2     Percent := AddElements( Temp3 );
002555 2 2     Percent := (AddElements( Temp3 ) * 10000d / TotalStatements + 5d) / 10d;
002575 2 2     call nout32( ws1, Percent, 10, -5, -1 );
002610 2 2     !  Calculate cumulative percent.
002610 2 2     call LORvTOx( V, BigK );          !LOR last bitmap to V.
002617 2 2     Percent := (AddElements( V ) * 10000d / TotalStatements + 5d) / 10d;
002642 2 2     call nout32( ws2, Percent, 10, -5, -1 );
002655 2 2     call fprintpoof( @OrderDetail, k, @TempName, @ws1, @ws2 );
002702 2 2
002702 2 2     end; !subproc SortX

J                      Variable     INT          Direct      S-024
K                      Variable     INT          Direct      S-023
MAX                    Variable     INT          Direct      S-022
ORDERDETAIL            Variable     STRING       Direct      P+000
ORDERHEADER            Variable     STRING       Direct      P+000
PERCENT                Variable     INT (32)     Direct      S-013
SUMJ                   Variable     INT (32)     Direct      S-017
SUMK                   Variable     INT (32)     Direct      S-021
SUMMAX                 Variable     INT (32)     Direct      S-015
TEMPNAME               Variable     STRING       Direct      S-011
WS1                    Variable     STRING       Direct      S-005
WS2                    Variable     STRING       Direct      S-002
002707 1 1     subproc SwapX( a, b );
002707 2 1     int        a, b;                  !Indices into SortArray of elements to swap.
002707 2 1     begin
002707 2 2     int         TempName[0:3];
002707 2 2
002707 2 2     ! Initialize pointers to start of each element.
002707 2 2     @Temp1 := @SortArray[0].FileName + a '*' (NB + $offset(SortArray.X));
002717 2 2     @Temp2 := @SortArray[0].FileName + b '*' (NB + $offset(SortArray.X));
002726 2 2
002726 2 2     ! Swap filenames.
002726 2 2     TempName ':=' Temp1.W for 4 words;
002734 2 2     Temp1.W  ':=' Temp2.W for 4 words;
002740 2 2     Temp2.W  ':=' TempName for 4 words;
002746 2 2
```

```
002746 2  2   ! Swap the compressed bitmaps.
002746 2  2   @Templ := @Templ + $udbl($offset(SortArray.X));
002753 2  2   @Temp2 := @Temp2 + $udbl($offset(SortArray.X));
002760 2  2   use i;                              !So BOX instruction will be used for speed.
002760 2  2   for i := -ND to -1 do               !Do ND times
002766 2  2      begin                            !Swap the elements two words at a time.
002766 2  3      stack Templ.D, Temp2.D;
002772 2  3      store Templ.D, Temp2.D;
002776 2  3      @Templ := @Templ + 4d;           !Point to next double word
003003 2  3      @Temp2 := @Temp2 + 4d;
003010 2  3      end;
003011 2  2   drop i;
003011 2  2   end; !subproc SwapX

A                       Variable      INT           Direct        S-006
B                       Variable      INT           Direct        S-005
TEMPNAME                Variable      INT           Direct        S-003
003013 1  1   ! Make cmask look like a bitmap file of unexecuted program.
003013 1  1   subproc ZeroCmask;
003013 2  1   begin
003013 2  2   string .ext XP;                      !Address of bitmap
003013 2  2   int(32)     BC;                      !Length of bitmap (in bytes)
003013 2  2   int         i;
003013 2  2
003013 2  2   ! Copy bulk for both spaces.
003013 2  2   cmask.UC ':=' DiscImage.UC for $len(cmask.UC);
003026 2  2   cmask.UL ':=' DiscImage.UL for $len(cmask.UL);
003040 2  2
003040 2  2   ! Use cmask.XX.SpaceCount to indicate which one(s) we'll use.
003040 2  2   if NOT G16 then
003042 2  2      begin    !Zero one of them.
003042 2  3      if Lib then
003044 2  3         cmask.UC.SpaceCount := 0
003044 2  3      else
003050 2  3         cmask.UL.SpaceCount := 0;
003053 2  3      end;
003053 2  2
003053 2  2   ! Fix address of each space's bitmap.
003053 2  2   @cmask.UC.BitmapPtr := @cmask + CoverDiscHeaderSize;
003064 2  2   @cmask.UL.BitmapPtr := @cmask.UC.BitmapPtr + SizeOfCoverBitmapSegment;
003101 2  2
003101 2  2   for i := 0 to cmask.UC.SpaceCount - 1 do
003103 2  2      begin
003103 2  3      @XP := @cmask.UC.BitmapPtr + (i '*' 8192); !Each bitmap starts on 4KW
003115 2  3      BC := ($udbl(cmask.UC.SpaceSize[ i ]) + 7d) '>>' 3;
003126 2  3      BC := (( BC + 3d) >> 2) << 2;    !Round to doubleword
003135 2  3      smear^ext( XP, $int(BC), 0 );    !Clear the bitmap
003150 2  3      end;
003160 2  2   for i := 0 to cmask.UL.SpaceCount - 1 do
003162 2  2      begin
003162 2  3      @XP := @cmask.UL.BitmapPtr + (i '*' 8192); !Each bitmap starts on 4KW
003174 2  3      BC := ($udbl(cmask.UL.SpaceSize[ i ]) + 7d) '>>' 3;
003205 2  3      BC := (( BC + 3d) >> 2) << 2;    !Round to doubleword
003214 2  3      smear^ext( XP, $int(BC), 0 );    !Clear the bitmap
003227 2  3      end;
003237 2  2
```

```
003237 2   2   end; !subproc ZeroCmask

                        Variable      INT (32)      Direct         S-002
                        Variable      INT           Direct         S-000
                        Variable      STRING        EXT Pointer    S-004
003241 1   1   while nextchar(0) do
003341 1   1      case scanidt( charadr, @Params ) of
003355 1   1      begin
003355 1   2      !SUBVOL! begin
003355 1 CE0               if Subvol <> "  " then call debug^err;
003366 1   3               if NOT scanfname( charadr, Subvol, defaults.word ) then
003376 1   3                  call finger^err( @NoSubvol );
003407 1   3               if Subvol[8] = "  " and Subvol[4] <> "  " then
003421 1   3                  call finger^err( @NoSubvol ); !Must have been $v.#<lst>
003432 1   3               Subvol[8] ':=' "          ";
003440 1   3               end;
003442 1 CE1      !PROGRAM! begin
003442 1   3               if Program <> "  " then call debug^err;
003453 1   3               if NOT scanfname( charadr, Program, defaults.word ) then
003463 1   3                  call finger^err( @NoFile );
003473 1   3               end;
003475 1 CE2      !OBJECT! begin
003475 1   3               if Object <> "  " then call debug^err;
003506 1   3               if NOT scanfname( charadr, Object, defaults.word ) then
003516 1   3                  call finger^err( @NoFile );
003526 1   3               end;
003530 1 CE3      otherwise call debug^err;
003534 1   2      end;
003554 1   1   eol;
003565 1   1
003565 1   1   if Subvol = "  " OR Program = "  " then call debug^err;
003603 1   1   error := GetNextBitmap;            !Find first bitmap with given <pfname>.
003605 1   1
003605 1   1   if error then
003607 1   1      begin                           !We didn't find the bitmap we wanted.
003607 1   2      if error = 1 then
003612 1   2         call fprint( @NoBitmapWithProgram )
003625 1   2      else
003627 1   2         call fprint( @ErrorOnF, error, Subvol );
003643 1   2      return;                         !There's nothing further we can do.
003645 1   2      end;
003645 1   1
003645 1   1   if Object = "  " then
003652 1   1      if Lib then                     !Fill in Object file name from bitmap file.
003654 1   1         Object ':=' DiscImage.UL.Name for 12 words
003654 1   1      else
003666 1   1         Object ':=' DiscImage.UC.Name for 12 words;
003677 1   1
003677 1   1   call ZeroCmask;                    !Make Cmask look like a bitmap with all 0's
003700 1   1
003700 1   1   call PutStartersIntoCmask;         !Read object file and mark cmask.  Also
003701 1   1                                      !initializes sanity check.
003701 1   1
003701 1   1   if TotalStatements > MaxStatements then
003706 1   1      begin
003706 1   2      call fprint( @TooManyStatements, @TotalStatements );
```

```
736.   003722 1  2     return;
737.   003725 1  2     end;
738.   003725 1  1  ND := (TotalStatements + 31d) '/' 32;
739.   003735 1  1  NW := ND * 2;
740.   003741 1  1  NB := $int(NW '*' 2);
742.   003746 1  1  if CantTouch( V, $udbl(NB) ) then return; !Make sure there's room.
743.   003760 1  1
744.   003760 1  1  smear^ext( V, NB, 0 );          !V(*) := 0;
745.   003775 1  1
746.   003775 1  1  !Put the 1st bitmap (which we've already read) into X[1].
747.   003775 1  1  do
748.   003775 1  1     begin
749.   003775 1  2     if PutBitmapIntoX then return;
750.   004001 1  2     error := GetNextBitmap;
751.   004003 1  2     end
752.   004003 1  1  until error;
753.   004005 1  1
754.   004005 1  1  ! We should expect to get error = 1 indicating no more bitmap files in subvol.
755.   004005 1  1  if error <> 1 then call fprint( @ErrorOnF, error, Subvol );
756.   004024 1  1
757.   004024 1  1  ! X[BigK+1] is used later as a temporary for a compressed bitmap element.
758.   004024 1  1  @TempX := @SortArray[0].X + (BigK + 1) '*' (NB + $offset(SortArray.X));
759.   004037 1  1  if CantTouch( TempX, $udbl(NB) ) then return; !Make sure there's room.
760.   004047 1  1
761.   004047 1  1
762.   004047 1  1  call SortX;                             !Now sort all the elements.
763.   004050 1  1
764.   004050 1  1  end; !proc ORDER^Command

ADDELEMENTS                  Subproc         INT (32)       %000165
BIGK                         Variable        INT            Direct         L+075
CMASK                        Variable,232    STRUCT-S       EXT Pointer    L+003
CSIL                         Variable,54     STRUCT         Indirect       L+017
DISCIMAGE                    Variable,232    STRUCT-S       EXT Pointer    L+001
ERROR                        Variable        INT            Direct         L+067
G16                          Variable        INT            Direct         L+065
GETNEXTBITMAP                Subproc         INT            %000230
HDR                          Variable,1000   STRUCT         Indirect       L+020
LIB                          Variable        INT            Direct         L+066
LORVTOX                      Subproc                        %000413
MAXSTATEMENTS                Literal         INT (32)       %000007 150000
NB                           Variable        INT            Direct         L+074
ND                           Variable        INT            Direct         L+072
NOBITMAPWITHPROGRAM          Variable        STRING         Direct         P+000
NOSUBVOL                     Variable        STRING         Direct         P+000
NW                           Variable        INT            Direct         L+073
OBJECT                       Variable        INT            Direct         L+051
PARAMS                       Variable        STRING         Direct         P+000
PROGRAM                      Variable        INT            Direct         L+035
PUTBITMAPINTOX               Subproc         INT            %000527
PUTSTARTERSINTOCMASK         Subproc                        %001442
ROW                          Variable        TEMPLATE ,10
  1 FILENAME[0:3]                    0,2     INT            Direct
  1 X                               10,2     INT            Direct
  1 XD                              10,4     INT (32)       Direct
SORTARRAY                    Variable,10     STRUCT-S       EXT Pointer    L+005
```

```
SORTX                    Subproc                             %002251
SUBVOL                   Variable       INT                  Direct          L+021
SWAPX                    Subproc                             %002707
TEMP1                    Variable,0     STRUCT-S             EXT Pointer     L+011
TEMP2                    Variable,0     STRUCT-S             EXT Pointer     L+013
TEMP3                    Variable,0     STRUCT-S             EXT Pointer     L+015
TEMPX                    Variable,0     STRUCT-S             EXT Pointer     L+007
THIRD                    Variable       TEMPLATE ,0
  1 D                          0,4      INT (32)             Direct
  1 W                          0,2      INT                  Direct
  1 B                          0,1      STRING               Direct
TOOMANYBITMAPS           Variable       STRING               Direct          P+000
TOOMANYSTATEMENTS        Variable       STRING               Direct          P+000
TOTALSTATEMENTS          Variable       INT (32)             Direct          L+070
V                        Define                              SORTARRAY[0].X
VD                       Define                              SORTARRAY[0].XD
WS                       Variable       STRING               Direct          L+076
ZEROCMASK                Subproc                             %003013
BINDER - OBJECT FILE BINDER - T9621C00 - (09SEP86)   SYSTEM \PRUNE
Object file name is $OVER.T9618C00.oorder
Object file timestamp is 07APR87 18:38:46
Number of Binder errors = 0
Number of Binder warnings = 0
Primary data = 143 words
Secondary data = 4152 words
Code area size = 4 pages
Resident code size = 0 pages
Data area size = 7 pages
Extended data area size = 0 pages
Top of stack = 4295 words
Number of code segments  = 1 segment


The object file will run on a TNS/II, but may not run on a TNS
Errorfile file name is $OVER.T9618C00.EORDER
Number of compiler errors =  0
Number of compiler warnings =  0
Maximum symbol table space used was = 181624 bytes
Number of source lines = 3054
Compile cpu time = 00:00:06
Total Elapsed time = 00:01:03
```

SOFTDEV
SWB
#LAND
DEFAULT

```
PAGE 1    $OVER.T9618C00.CREADOBJ [1]

TAL - T9250B40 - (15SEP86)                          Source language: TAL - Target machine: Tandem NonStop II System
Date - Time :  17FEB87 - 15:46:12                Default options: On (LIST,CODE,MAP,WARN,LMAP) - Off (ICODE,INNERLIST)

                        ?ERRORFILE ereadobj,NOFIXUP,NOCODE, SYMBOLS, MAP, NOGMAP, LMAP(ALPHA,LOC)
     2.    000000 0  0  NAME     READ^OBJECT^ROUTINES;
     3.    000000 0  0  ?SOURCE copytal                    !Copyright notice
Source file: [1]  $VIOLET.TOOLSCOO.COPYTAL  23DEC86 - 12:00:25
     1.    000000 0  0  ! +-------------------------------------------------------------------+
     2.    000000 0  0  ! |                                                                   |
     3.    000000 0  0  ! |   Copyright (C) 1987 by TANDEM COMPUTERS INCORPORATED             |
     4.    000000 0  0  ! |                                                                   |
     5.    000000 0  0  ! |   Protected as an unpublished work.                               |
     6.    000000 0  0  ! |                                                                   |
     7.    000000 0  0  ! |   The computer program listings and specifications herein are    |
     8.    000000 0  0  ! |   the property of TANDEM COMPUTERS INCORPORATED and shall not be |
     9.    000000 0  0  ! |   reproduced, copied, or used, in whole or in part, for any      |
    10.    000000 0  0  ! |   reason without the written permission of TANDEM COMPUTERS      |
    11.    000000 0  0  ! |   INCORPORATED.                                                   |
    12.    000000 0  0  ! |                                                                   |
    13.    000000 0  0  ! |   The following are trademarks or service marks of TANDEM        |
    14.    000000 0  0  ! |   COMPUTERS INCORPORATED:                                         |
    15.    000000 0  0  ! |                                                                   |
    16.    000000 0  0  ! |   BINDER      ENVOY         MULTILAN      PS TEXT EDIT    THL      |
    17.    000000 0  0  ! |   CROSSREF    EXCHANGE      NonStop       PS TEXT FORMAT  TIL      |
    18.    000000 0  0  ! |   DATABOLT    EXPAND        NonStop 1+    RDF             TMF      |
    19.    000000 0  0  ! |   DDL         FASTSORT      NonStop EXT   SAFE            TRANSFER |
    20.    000000 0  0  ! |   DYNABUS     FAXLINK       NonStop II    SAFE-T-NET      WORDLINK |
    21.    000000 0  0  ! |   DYNAMITE    FOX           NonStop TXP   SAFEGUARD       XL8      |
    22.    000000 0  0  ! |   ENABLE      GUARDIAN      NonStop VLX   T-TEXT          XRAY     |
    23.    000000 0  0  ! |   ENCOMPASS   GUARDIAN 90   PATHMAKER     TACL            6AX      |
    24.    000000 0  0  ! |   ENCORE      GUARDIAN 90XF PCFORMAT      TAL                      |
    25.    000000 0  0  ! |   ENFORM      INFOSAT*      PERUSE        Tandem                   |
    26.    000000 0  0  ! |   ENSCRIBE    INSPECT       PS MAIL       TGAL                     |
    27.    000000 0  0  ! +-------------------------------------------------------------------+
    28.    000000 0  0  ! | * INFOSAT is a trademark in which both Tandem and American       |
    29.    000000 0  0  ! |   Satellite have rights.                                          |
    30.    000000 0  0  ! +-------------------------------------------------------------------+
    31.    000000 0  0  ! |   TANDEM COMPUTERS INCORPORATED -- PROPRIETARY AND CONFIDENTIAL   |
    32.    000000 0  0  ! +-------------------------------------------------------------------+
     4.    000000 0  0  ?NOLIST, source dgp      ( util2, layouts )
     6.    000000 0  0  ?NOLIST, source objfmt
     8.    000000 0  0  ?NOLIST, source pdtproto ( pdt^struct^templates )
    10.    000000 0  0  ?NOLIST, source tblfmt
    12.    000000 0  0  ?NOLIST, source isymtab  ( internal )
    14.    000000 0  0  ?SOURCE  dreadobj
Source file: [1]  $OVER.T9618C00.DREADOBJ  02OCT86 - 10:32:12
     1.    000000 0  0  ?SECTION OBJECT^READING

     3.    000000 0  0  block object^reading;
     4.    000000 0  0  int         SameFn := 1;          !At any time only 1 object file may be open
     5.    000000 0  0  string      BinderFormatVersion;
     6.    000000 0  0  int(32)     InspectAddress;       !Start of INSPECT area
```

```
 7.   000000 0  0   int(32)     PITentryAddr;           !0 relative address of current PIT entry
 8.   000000 0  0   int(32)     PITentryCount;
 9.   000000 0  0   int(32)     EPTbase;                !0 relative address of base of EPT
10.   000000 0  0   int(32)     EPTentryAddr;           !0 relative address of current EPT entry
11.   000000 0  0   string      EntryPointName[0:31];   !Room for stopper
12.   000000 0  0   int         EntryPointOffset;
13.   000000 0  0   struct     .Procedure;
14.   000000 0  0      begin
15.   000000 0  1      string   Name[0:31];             !Room for stopper
16.   000000 0  1      int      Spaceid;
17.   000000 0  1      int      Offset;                 !Word offset of proc in this space
18.   000000 0  1      int(32)  Length;                 !Byte length of procedure
19.   000000 0  1      int      CompilationTimestamp[0:2];
20.   000000 0  1      int      HasInspect;             !flag - this proc has Inspect symbols
21.   000000 0  1      int      SourceFileName[0:11];   !File name of source
22.   000000 0  1      int(32)  SourceFileLine;         !Line # of PROC statement
23.   000000 0  1      int      SourceFileTimestamp[0:2];
24.   000000 0  1      end;
25.   000051 0  0   int(32)     FileTableOffset;
26.   000051 0  0   int         FileTableCount;
27.   000051 0  0   int(32)     LocTableOffset;
28.   000051 0  0   int         LocTableCount;
29.   000051 0  0   struct     .Statement;
30.   000051 0  0      begin
31.   000051 0  1      int(32)  LineNum;
32.   000051 0  1      int      Offset;                 !Word offset of statement in this proc
33.   000051 0  1      int      FileName[0:11];
34.   000051 0  1      end;
35.   000070 0  0
36.   000070 0  0   int         SourceOrdNumber;        !Source file ordinal corresponding to the
37.   000070 0  0                                       !name & timestamp.  0 if invalid
38.   000070 0  0   int         SourceOrdName[0:11];    !Name corresponding to SourceOrdNumber
39.   000070 0  0   int         SourceOrdTimestamp[0:2];!Timestamp correspondint to SourceOrdNumber
40.   000070 0  0
41.   000070 0  0   ! The following is for quicker access to sequential objects:
42.   000070 0  0   int(32)     QuickPosition;          !Where in file
43.   000070 0  0   int         QuickLength;            !For how long
44.   000070 0  0   int(32)     QuickEOF;               !Length of file
45.   000070 0  0   layout      (.QuickBuffer, 2048);   !Input buffer.  Not 4096 to avoid error 21s
46.   002070 0  0   end block;
15.   002070 0  0   ?BEGINCOMPILATION
17.   002070 0  0   ?NOLIST, source extdecs (close, fileinfo, open, position, read, tosversion )
19.   000000 0  0   ?NOLIST, source shreadp  ( RO^Get^Base^Name )
21.   000000 0  0   ?SEARCH           shreado
Search file:  $EM1.T9621C00.SHREADO  17FEB87 - 11:53:00
22.   000000 0  0   ?SETTOG 15                          !For FORWARDs
23.   000000 0  0   ?NOLIST, source preadobj
25.   000000 0  0   ?RESETTOG 15
27.   000000 0  0   ?SOURCE  sversion(version^readobj)
Source file:  [1]  $OVER.T9618C00.SVERSION  12FEB87 - 12:20:47
12.   000000 0  0   ?SECTION VERSION^READOBJ
13.   000000 0  0   PROC T9618C00^15JUL87^READOBJ^11F7;
14.   000000 1  0   BEGIN END;
15.   000000 0  0
28.   000000 0  0   ?SOURCE  sreadobj
Source file:  [1]  $OVER.T9618C00.SREADOBJ  02OCT86 - 10:36:15
```

```
000000 0  0   ! The Binder region of the object file is fairly volatile from release
000000 0  0   ! to release.  This routine converts old formats of the PIT to the
000000 0  0   ! lastest format.  It is based on the Binder READOBJ routine
000000 0  0   ! RO^GET^SOME^BLOCK.  See that routine to upgrade this one.
000000 0  0   ! It operates entirely within IOAREA and assumes it is big enough for
000000 0  0   ! each version of the PIT.
000000 0  0   int !prv! proc ConvertPITformat( store^addr );
000000 1  0   int          .store^addr;
000000 1  0   begin
000000 1  1
000000 1  1   ! **WARNING** watch out for the following define.  It differs from the global
000000 1  1   ! one!
000000 1  1   define       WLEN(bytes) = ((bytes '+' 1) '>>' 1)#;
000000 1  1
000000 1  1   literal      max^size = $len( PIT^entry^base );
000000 1  1   int          .dbit( PIT^entry^base ) = store^addr;
000000 1  1   int          .pit( PIT^entry^base ) = store^addr;
000000 1  1   int          .fwa^ptr;
000000 1  1
000000 1  1   if BinderFormatVersion < 11 then
000004 1  1      begin
000004 1  2      store^addr[ wlen(max^size) - 1] '=:'
000004 1  2         store^addr[ wlen(max^size - 2) - 1] FOR
000004 1  2            wlen(max^size) - wlen($offset(DBIT^Entry^Base.first^word^address));
000012 1  2      @fwa^ptr:= @dbit.first^word^address;
000015 1  2      fwa^ptr := 0;
000017 1  2      end;
000017 1  1
000017 1  1   if BinderFormatVersion < 12 then
000022 1  1      begin
000022 1  2      store^addr[ wlen(max^size) - 1] '=:'
000022 1  2         store^addr[ wlen(max^size - 2) - 1] FOR
000022 1  2            wlen(max^size) - wlen($offset(DBIT^Entry^Base.location^constraints));
000030 1  2      dbit.block^flags := 0;
000033 1  2
000033 1  2      store^addr[ wlen(max^size) - 1] '=:'
000033 1  2         store^addr[ wlen(max^size - 2) - 1] FOR
000033 1  2            wlen(max^size) - wlen($offset(PIT^Entry^Base.block^name));
000037 1  2      pit.lexical^level := 1;
000042 1  2      end;
000042 1  1
000042 1  1   return 0;                              !Always successful
000044 1  1
000044 1  1   end; ! proc ConvertPITformat

DBIT                          Variable,522   STRUCT-I      Indirect      L-003
FWA^PTR                       Variable       INT           Indirect      L+001
MAX^SIZE                      Literal        INT           %000522
PIT                           Variable,522   STRUCT-I      Indirect      L-003
STORE^ADDR                    Variable       INT           Indirect      L-003
WLEN                          Define                       (( $1 '+' 1) '>>' 1)
000000 0  0   ! Returns: 0 when normal return.
000000 0  0   !          >0 FE error nunber.
000000 0  0   !          <0 RO^ error ( 1 meaning end of list; no more EPTs)
000000 0  0   int !prv! proc GetNextEPT( fn );
000000 1  0   int fn;
```

```
000000 1  0   begin
000000 1  1   struct      .EPTentry( EPT^entry^base );
000000 1  1   int          error;
000000 1  1
000000 1  1   if fn <> SameFn then return 16; !FENOTOPEN
000011 1  1
000011 1  1   if EPTentryAddr <= 0d then return -1; !No more EPT entries
000017 1  1
000017 1  1   if (error := PositRead( fn, EPTentry, EPTentryAddr, $len(EPTentry))) then
000030 1  1      return error;
000032 1  1   EntryPointName[ RO^Get^Base^Name( EPTentry.entry^point^name, EntryPointName ) ]
000032 1  1             := 0;                   !Convert to base name and add stopper
000044 1  1   EntryPointOffset := EPTentry.code^offset;
000047 1  1
000047 1  1   if EPTentry.next^entry = 0d then
000054 1  1      EPTentryAddr := 0d
000054 1  1   else
000057 1  1      EPTentryAddr := EPTentry.next^entry + EPTbase;
000064 1  1
000064 1  1   return 0;
000066 1  1   end; ! proc GetNextEPT

EPTENTRY                   Variable,440   STRUCT          Indirect       L+001
ERROR                      Variable       INT             Direct         L+002
FN                         Variable       INT             Direct         L-003
000000 0  0   ! Get the next procedure.  This will assemble the compilation
000000 0  0   ! timestamp and initialize the pointers for getting the INSPECT
000000 0  0   ! information.
000000 0  0   !
000000 0  0   ! Initialize the source file information for the PROC header.
000000 0  0   ! Note: The 1st statement starter will be used.  For releases prior to B20,
000000 0  0   ! this will reflect the 1st statement (in TAL).  As of B20, TAL emits a
000000 0  0   ! statement starter for the PROC statement itself (which is nice for this
000000 0  0   ! purpose, but which ends up being missing if the entry point offset is 0.)
000000 0  0   !
000000 0  0   ! Returns: 0 when normal return.
000000 0  0   !          >0 FE error nunber.
000000 0  0   !          <0 RO^ error (-1 meaning end of list; no more Procedures)
000000 0  0   int !prv! proc GetNextProcedure( fn );
000000 1  0   int          fn;
000000 1  0   begin
000000 1  1   struct      .PITentry( PIT^entry^base );
000000 1  1   struct      .ScopeUnitHdr( Scope^unit^header );
000000 1  1   struct      .LocTableEntry( Loc^table^entry );
000000 1  1   struct      .EPTentry( EPT^entry^base );
000000 1  1   int(32)      HeaderAddr;
000000 1  1   int(32)      ProcFirstWordAddress;
000000 1  1   int          error;
000000 1  1
000000 1  1   if fn <> SameFn then return 16; !FENOTOPEN
000026 1  1
000026 1  1   Procedure.HasInspect := FALSE;      !Assume this procedure has no symbols
000031 1  1   PITentryCount := PITentryCount - 1d;     !Number of procedures left to go
000035 1  1   if < then return -1;                     !No more procedures
000040 1  1
000040 1  1   if (error := PositRead( fn, PITentry, PITentryAddr, $len(PITentry))) then
```

```
000051 1  1      return error;
000053 1  1   call ConvertPITformat( PITentry ); !The Binder format changes fairly frequently
000057 1  1   PITentryAddr := PITentryAddr + PITentry.total^length; !bump to next PIT entry
000064 1  1
000064 1  1   EPTentryAddr := PITentry.primary^entry + EPTbase;
000071 1  1   Procedure.Name[ RO^Get^Base^Name( PITentry.block^name, Procedure.Name ) ]
000071 1  1                 := 0;              !Convert to base name and add stopper
000107 1  1   ProcFirstWordAddress := PITentry.first^word^address;
000113 1  1   Procedure.Spaceid := $high( ProcFirstWordAddress );
000117 1  1   Procedure.Offset := $int( ProcFirstWordAddress );
000123 1  1   Procedure.Length := PITentry.block^length;
000127 1  1   Procedure.CompilationTimestamp ':=' PITentry.compilation^timestamp for 3;
000134 1  1   Procedure.SourceFileName ':=' PITentry.source^file for 12 words;
000142 1  1
000142 1  1   if PITentry.inspect^offset = 0d then    !no Inspect info for this proc
000147 1  1      return 0                          !Return now (no error, just useless proc)
000147 1  1   else
000152 1  1      begin
000152 1  2      HeaderAddr := PITentry.inspect^offset + InspectAddress;
000157 1  2      if (error := PositRead( fn, ScopeUnitHdr, HeaderAddr, $len(ScopeUnitHdr)))
000157 1  2         then return error;
000171 1  2      FileTableOffset := ScopeUnitHdr.file^table^offset + HeaderAddr;
000176 1  2      FileTableCount := ScopeUnitHdr.file^table^count;
000201 1  2      LocTableOffset := ScopeUnitHdr.loc^table^offset + HeaderAddr;
000207 1  2      LocTableCount := ScopeUnitHdr.loc^table^count;
000212 1  2
000212 1  2      ! Initialize PROC header information
000212 1  2      SourceOrdNumber := 0;             !Invalidate source file information to
000214 1  2                                        !cause fresh search for file ordinal.
000214 1  2      if NOT LocTableCount OR LocTableOffset <= 0d then
000222 1  2         return -5                      !If symbols, there must be some source!
000222 1  2      else
000225 1  2         begin
000225 1  3         if (error := PositRead( fn,
000225 1  3                                 LocTableEntry,
000225 1  3                                 LocTableOffset,
000225 1  3                                 $len(LocTableEntry))) then return error;
000237 1  3         Procedure.SourceFileLine := LocTableEntry.line^num;
000244 1  3         if (error := GetSourceOrd( fn, LocTableEntry.file^ord )) then
000252 1  3            return error;
000254 1  3         Procedure.SourceFileName ':=' SourceOrdName for 12 words;
000261 1  3         Procedure.SourceFileTimestamp ':=' SourceOrdTimestamp for 3 words;
000266 1  3         end;
000266 1  2
000266 1  2      ! Initialize GetNextStatement (i.e., remove 1st s.s. as required)
000266 1  2      Procedure.HasInspect := TRUE;    !GetNextStatement needs it
000271 1  2      if LocTableEntry.offset <> 0d then
000277 1  2         return 0;                      !No bogus s.s. (must be pre-b20). Done.
000301 1  2      if (error := PositRead( fn, EPTentry, EPTentryAddr, $len(EPTentry))) then
000312 1  2         return error;
000314 1  2      if EPTentry.code^offset then      !Loc 0 s.s. is not entry point of proc.
000317 1  2         begin
000317 1  3         error := GetNextStatement( fn );!Remove extra statement starter
000323 1  3         if error = -1 then             !Statement starter missing?
000326 1  3            return -5                   !Must be wierd object file
000326 1  3         else
```

```
 161.   000331 1  3          return error;
 162.   000333 1  3       end;
 163.   000333 1  2
 164.   000333 1  2    end;
 165.   000333 1  1
 166.   000333 1  1 return 0;
 167.   000335 1  1
 168.   000335 1  1 end; ! proc GetNextProcedure

EPTENTRY                       Variable,440  STRUCT      Indirect    L+004
ERROR                          Variable      INT         Direct      L+011
FN                             Variable      INT         Direct      L-003
HEADERADDR                     Variable      INT (32)    Direct      L+005
LOCTABLEENTRY                  Variable,12   STRUCT      Indirect    L+003
PITENTRY                       Variable,522  STRUCT      Indirect    L+001
PROCFIRSTWORDADDRESS           Variable      INT (32)    Direct      L+007
SCOPEUNITHDR                   Variable,50   STRUCT      Indirect    L+002
 170.   000000 0  0 ! Returns: 0 when normal return.
 171.   000000 0  0 !          >0 FE error nunber.
 172.   000000 0  0 !          <0 RO^ error (-1 meaning end of list; no more statements)
 173.   000000 0  0 int !prv! proc GetNextStatement( fn );
 174.   000000 1  0 int         fn;
 175.   000000 1  0 begin
 176.   000000 1  1 struct     .LocTableEntry( Loc^table^entry );
 177.   000000 1  1 int         FileOrd;
 178.   000000 1  1 int         error;
 179.   000000 1  1
 180.   000000 1  1 if fn <> SameFn then return 16; !FENOTOPEN
 181.   000011 1  1
 182.   000011 1  1 if NOT Procedure.HasInspect then return -1; !No Inspect symbols, so no s.s.'s
 183.   000016 1  1 if NOT LocTableCount then return -1;    !No more
 184.   000022 1  1 error := PositRead( fn, LocTableEntry, LocTableOffset, $len(LocTableEntry));
 185.   000031 1  1 if error then return error;
 186.   000035 1  1 Statement.LineNum := LocTableEntry.line^num;
 187.   000042 1  1 Statement.Offset := $int( LocTableEntry.offset >> 1 ); !word offset
 188.   000051 1  1
 189.   000051 1  1 FileOrd := LocTableEntry.file^ord;
 190.   000053 1  1 if FileOrd <> SourceOrdNumber then
 191.   000057 1  1    if (error := GetSourceOrd( fn, FileOrd )) then return error;
 192.   000067 1  1 Statement.FileName ':=' SourceOrdName for 12 words;
 193.   000074 1  1
 194.   000074 1  1 LocTableOffset := LocTableOffset + $dbl( $len( LocTableEntry ) );
 195.   000102 1  1 if LocTableCount then             !Don't ever go lower than 0
 196.   000104 1  1    LocTableCount := LocTableCount '-' 1; !Number of source location entries
 197.   000107 1  1
 198.   000107 1  1 return 0;
 199.   000111 1  1 end; ! proc GetNextStatement

ERROR                          Variable      INT         Direct      L+003
FILEORD                        Variable      INT         Direct      L+002
FN                             Variable      INT         Direct      L-003
LOCTABLEENTRY                  Variable,12   STRUCT      Indirect    L+001
 201.   000000 0  0 ! Updates the SourceOrdNumber, SourceOrdName, and SourceOrdTimestamp.
 202.   000000 0  0 ! Sets them to 0's if error.
 203.   000000 0  0 ! Returns: 0 when normal return.
 204.   000000 0  0 !          >0 FE error number.
```

```
000000 0  0   !            <0 RO^ error
000000 0  0   int !prv! proc GetSourceOrd( fn, Ordinal );
000000 1  0   int          fn;
000000 1  0   int          Ordinal;
000000 1  0   begin
000000 1  1   struct      .FileTable( File^table^entry );
000000 1  1   int(32)      TablePosition;
000000 1  1   int          i;
000000 1  1   int          error;
000000 1  1
000000 1  1   if fn <> SameFn then return 16; !FENOTOPEN
000011 1  1
000011 1  1   SourceOrdNumber := Ordinal;
000013 1  1   SourceOrdName := 0;                !Initialize to not found condition
000015 1  1   SourceOrdTimestamp ':=' 0 & 0 & 0;
000035 1  1
000035 1  1   if NOT LocTableCount OR LocTableOffset <= 0d then return -5; !None; must be bad
000050 1  1
000050 1  1   TablePosition := FileTableOffset;
000052 1  1   for i := 1 to FileTableCount do
000054 1  1      begin
000054 1  2      if (error := PositRead( fn, FileTable, TablePosition, $len(FileTable))) then
000064 1  2         return error;
000066 1  2      if FileTable.ord = SourceOrdNumber then
000072 1  2         begin                           !We found it
000072 1  3         SourceOrdName ':=' FileTable.name for 12 words;
000077 1  3         SourceOrdTimestamp ':=' FileTable.timestamp for 3 words;
000104 1  3         return 0;                       !Done
000106 1  3         end;
000106 1  2      TablePosition := TablePosition + $udbl($len(FileTable));
000113 1  2      end;
000121 1  1
000121 1  1   return -5;                            !Couldn't find it; it must be bad object
000123 1  1
000123 1  1   end; !proc GetSourceOrd

ERROR                      Variable       INT           Direct       L+005
FILETABLE                  Variable,40    STRUCT        Indirect     L+001
FN                         Variable       INT           Direct       L-004
I                          Variable       INT           Direct       L+004
ORDINAL                    Variable       INT           Direct       L-003
TABLEPOSITION              Variable       INT (32)      Direct       L+002
000000 0  0   ! Open the object file and return its file number.  Do some checking to
000000 0  0   ! ensure it's a ligitimate object file.
000000 0  0   ! Returns: 0 when normal return.
000000 0  0   !            >0 FE error nunber.
000000 0  0   !            <0 RO^ error
000000 0  0   int !prv! proc OpenObjectFile( filename, fn );
000000 1  0   int          .filename;
000000 1  0   int          .fn;
000000 1  0   begin
000000 1  1   int           filecode;
000000 1  1   int           filetype;
000000 1  1   int           error;
000000 1  1   struct       .BinderHdr( binder^header );
000000 1  1   struct       .hdr( Object^File^Header^Def );
000000 1  1   label         ReturnError;
```

```
000000 1  1
000000 1  1    SameFn := fn := -1;                  !Indicate closed
000014 1  1
000014 1  1    call fileinfo( , error, filename, ,,, QuickEof,,, filecode,,, ,,, ,,,
000014 1  1                 ,, filetype );
000037 1  1    if error then return error;          !Couldn't get to file
000043 1  1    if QuickEof < 2048d OR               !Too small to be an object file
000043 1  1       filecode <> 100  OR               !Not an object file code
000043 1  1       filetype.<13:15> <> 0 then        !Not an unstructured file
000057 1  1       return -6;                        !Not an object file
000061 1  1
000061 1  1    call open( filename, fn, %2060, 1 );     !read, protected
000073 1  1    if <> then
000074 1  1       begin
000074 1  2       call fileinfo( -1, error );
000105 1  2       return error;
000107 1  2       end;
000107 1  1
000107 1  1    SameFn := fn;                        !Save so other procedures can check.
000111 1  1
000111 1  1    ! Initialize quick access
000111 1  1    QuickPosition := 0D;
000113 1  1    QuickLength := 0;                    !Indicate buffer is empty.
000115 1  1
000115 1  1    if (error := PositRead( fn, hdr, 0d, $len(hdr) )) then !Read object header
000125 1  1       GOTO ReturnError;
000126 1  1
000126 1  1    if NOT hdr.object^header^V OR
000126 1  1       hdr.CSIL^addr = 0d OR
000126 1  1       hdr.minimum^GUARDIAN^version '>' tosversion then
000147 1  1       begin
000147 1  2       error := -5;                      !Wrong version
000151 1  2       GOTO ReturnError;
000152 1  2       end;
000152 1  1    if hdr.binder^length = 0d OR
000152 1  1       hdr.inspect^length = 0d then
000166 1  1       begin
000166 1  2       error := -5;                      !Wrong version
000170 1  2       GOTO ReturnError;
000171 1  2       end;
000171 1  1
000171 1  1    ! Get BINDER header
000171 1  1    if (error := PositRead( fn, BinderHdr, hdr.binder^addr, $len(BinderHdr),)) then
000203 1  1       begin
000203 1  2       GOTO ReturnError;
000204 1  2       end;
000204 1  1    BinderFormatVersion := BinderHdr.format^version;
000211 1  1    if BinderFormatVersion > current^format^version then
000214 1  1       begin
000214 1  2       error := -5;                      !Wrong version
000216 1  2       GOTO ReturnError;
000217 1  2       end;
000217 1  1
000217 1  1    ! Initialize fields needed to search through the PIT entries.
000217 1  1    InspectAddress :=hdr.inspect^addr;
000223 1  1    PITentryAddr := BinderHdr.PIT^status.first^entry;
```

```
000227 1  1   PITentryCount := BinderHdr.PIT^status.entry^count;
000233 1  1   EPTbase := BinderHdr.EPT^status.first^entry;
000237 1  1
000237 1  1   return 0;
000241 1  1
000241 1  1   ReturnError:
000241 1  1   call close( fn );
000246 1  1   SameFn := fn := -1;                 !Indicate closed
000251 1  1   return error;
000253 1  1
000253 1  1   end; ! proc OpenObjectFile

BINDERHDR                 Variable,146   STRUCT       Indirect     L+004
ERROR                     Variable       INT          Direct       L+003
FILECODE                  Variable       INT          Direct       L+001
FILENAME                  Variable       INT          Indirect     L-004
FILETYPE                  Variable       INT          Direct       L+002
FN                        Variable       INT          Indirect     L-003
HDR                       Variable,1000  STRUCT       Indirect     L+005
RETURNERROR               Label                       %000241
000000 0  0   ! Position the object file then read a block.
000000 0  0   ! Returns: 0 when normal return.
000000 0  0   !          >0 FE error nunber.
000000 0  0   int !prv! proc PositRead( fn, inarea, PositionAddress, Length );
000000 1  0   int          fn;                    !i
000000 1  0   int         .inarea;                !o
000000 1  0   int(32)      PositionAddress;       !i
000000 1  0   int          Length;                !i
000000 1  0   begin
000000 1  1   int          ReadLength;
000000 1  1   int          CountRead;
000000 1  1   int          error;
000000 1  1   int          offset;
000000 1  1
000000 1  1   if fn <> SameFn then return 16; !FENOTOPEN
000007 1  1
000007 1  1   if PositionAddress < QuickPosition OR
000007 1  1      (PositionAddress + $udbl(Length)) > (QuickPosition + $udbl(QuickLength))
000007 1  1      THEN begin                     !Need to read fresh data
000025 1  2      if PositionAddress > QuickEOF THEN
000031 1  2      ! Kludge.  S/B PositionAddress + $udbl(length), but when reading PIT
000031 1  2      ! entries (variable length), the maximum entry length is in length, and
000031 1  2      ! a short read is OK.  **TODO**
000031 1  2         return 1;                   !He's calling out of range
000033 1  2
000033 1  2      call position( fn, PositionAddress );
000037 1  2      if <> then
000040 1  2         begin
000040 1  3         call fileinfo( fn, error );
000051 1  3         return error;
000053 1  3         end;
000053 1  2
000053 1  2      if (PositionAddress + $udbl($len(QuickBuffer))) > QuickEOF THEN
000062 1  2         ReadLength := $int( QuickEOF - PositionAddress )
000062 1  2      ELSE
000070 1  2         ReadLength := $len(QuickBuffer);
```

```
000072 1  2
000072 1  2       call read( fn, QuickBuffer, ReadLength, CountRead );
000103 1  2       if <> then
000104 1  2          begin
000104 1  3          call fileinfo( fn, error );
000115 1  3          return error;
000117 1  3          end;
000117 1  2       QuickPosition := PositionAddress;
000121 1  2       QuickLength := CountRead;
000123 1  2       end;
000123 1  1
000123 1  1    offset := $int( PositionAddress - QuickPosition );
000130 1  1    inarea ':=' QuickBuffer.byte[ offset] for Length BYTES;
000142 1  1
000142 1  1    end; ! proc PositRead
```

| | | | | |
|---|---|---|---|---|
| COUNTREAD | Variable | INT | Direct | L+002 |
| ERROR | Variable | INT | Direct | L+003 |
| FN | Variable | INT | Direct | L-007 |
| INAREA | Variable | INT | Indirect | L-006 |
| LENGTH | Variable | INT | Direct | L-003 |
| OFFSET | Variable | INT | Direct | L+004 |
| POSITIONADDRESS | Variable | INT (32) | Direct | L-005 |
| [illegible]ENGTH | Variable | INT | Direct | L+001 |

ENTRY POINT MAP BY NAME

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 003 | 000014 | 000057 | 000014 | | CONVERTPITFORMAT | 17FEB87 | 15:46 | TAL | $OVER.T9618C00.SREADOBJ |
| 00 | 004 | 000060 | 000145 | 000060 | | GETNEXTEPT | 17FEB87 | 15:46 | TAL | $OVER.T9618C00.SREADOBJ |
| 00 | 005 | 000146 | 000502 | 000146 | | GETNEXTPROCEDURE | 17FEB87 | 15:46 | TAL | $OVER.T9618C00.SREADOBJ |
| 00 | 006 | 000503 | 000613 | 000503 | | GETNEXTSTATEMENT | 17FEB87 | 15:46 | TAL | $OVER.T9618C00.SREADOBJ |
| 00 | 007 | 000614 | 000741 | 000614 | | GETSOURCEORD | 17FEB87 | 15:46 | TAL | $OVER.T9618C00.SREADOBJ |
| 00 | 010 | 000742 | 001214 | 000742 | | OPENOBJECTFILE | 17FEB87 | 15:46 | TAL | $OVER.T9618C00.SREADOBJ |
| 00 | 011 | 001215 | 001360 | 001215 | | POSITREAD | 17FEB87 | 15:46 | TAL | $OVER.T9618C00.SREADOBJ |
| 00 | 012 | 001361 | 001407 | 001361 | | RO^GET^BASE^NAME | 17FEB87 | 11:51 | TAL | $EM1.T9621C00.SHREADS |
| 00 | 002 | 000013 | 000013 | 000013 | | T9618C00^15JUL87^READOBJ^11F7 | 17FEB87 | 15:46 | TAL | $OVER.T9618C00.SVERSION |

DATA BLOCK MAP BY NAME

| BASE | LIMIT | TYPE | MODE | NAME | DATE | TIME | LANGUAGE | SOURCE FILE |
|---|---|---|---|---|---|---|---|---|
| 000000 | 000005 | COMMON | WORD | #GLOBAL | 17FEB87 | 15:46 | TAL | $EM1.T9621C00.TBLFMT |
| 000101 | 002170 | COMMON | WORD | .OBJECT^READING | 17FEB87 | 15:46 | TAL | $OVER.T9618C00.DREADOBJ |
| 000006 | 000100 | COMMON | WORD | OBJECT^READING | 17FEB87 | 15:46 | TAL | $OVER.T9618C00.DREADOBJ |

ENTRY POINT MAP BY LOCATION
CODE SEGMENT 00

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 002 | 000013 | 000013 | 000013 | | T9618C00^15JUL87^READOBJ^11F7 | 17FEB87 | 15:46 | TAL | $OVER.T9618C00.SVERSION |
| 00 | 003 | 000014 | 000057 | 000014 | | CONVERTPITFORMAT | 17FEB87 | 15:46 | TAL | $OVER.T9618C00.SREADOBJ |
| 00 | 004 | 000060 | 000145 | 000060 | | GETNEXTEPT | 17FEB87 | 15:46 | TAL | $OVER.T9618C00.SREADOBJ |
| 00 | 005 | 000146 | 000502 | 000146 | | GETNEXTPROCEDURE | 17FEB87 | 15:46 | TAL | $OVER.T9618C00.SREADOBJ |
| 00 | 006 | 000503 | 000613 | 000503 | | GETNEXTSTATEMENT | 17FEB87 | 15:46 | TAL | $OVER.T9618C00.SREADOBJ |
| 00 | 007 | 000614 | 000741 | 000614 | | GETSOURCEORD | 17FEB87 | 15:46 | TAL | $OVER.T9618C00.SREADOBJ |
| 00 | 010 | 000742 | 001214 | 000742 | | OPENOBJECTFILE | 17FEB87 | 15:46 | TAL | $OVER.T9618C00.SREADOBJ |

```
00  011  001215  001360  001215          POSITREAD                          17FEB87  15:46 TAL       $OVER.T9618C00.SREADOBJ
00  012  001361  001407  001361          RO^GET^BASE^NAME                   17FEB87  11:51 TAL       $EM1.T9621C00.SHREADS

Code size = 776 words
  PEP = 11 words
  Procedures = 765 words
  Gap at 32K = 0 words
  XEP = 6 words
Code area size = 1 pages
Resident code size = 0 pages
DATA BLOCK MAP BY LOCATION

 BASE    LIMIT   TYPE     MODE    NAME                                DATE     TIME   LANGUAGE  SOURCE FILE

 000000  000005  COMMON   WORD    #GLOBAL                             17FEB87  15:46  TAL       $EM1.T9621C00.TBLFMT
 000006  000100  COMMON   WORD    OBJECT^READING                      17FEB87  15:46  TAL       $OVER.T9618C00.DREADOBJ
 000101  002170  COMMON   WORD    .OBJECT^READING                     17FEB87  15:46  TAL       $OVER.T9618C00.DREADOBJ
BINDER - OBJECT FILE BINDER - T9621C00 - (09SEP86)   SYSTEM \PRUNE
Object file name is $OVER.T9618C00.oreadobj
Object file timestamp is 17FEB87 15:46:12
Number of Binder errors = 0
Number of Binder warnings = 0
Primary data = 65 words
Secondary data = 1080 words
Code area size = 1 pages
Resident code size = 0 pages
Data area size = 3 pages
Extended data area size = 0 pages
Top of stack = 1145 words
Number of code segments  = 1 segment


The object file will run on a TNS/II, but may not run on a TNS
Errorfile file name is $OVER.T9618C00.EREADOBJ
Number of compiler errors =  0
Number of compiler warnings =  0
Maximum symbol table space used was = 59276 bytes
Number of source lines = 5196
Compile cpu time = 00:00:07
Total Elapsed time = 00:01:21
```

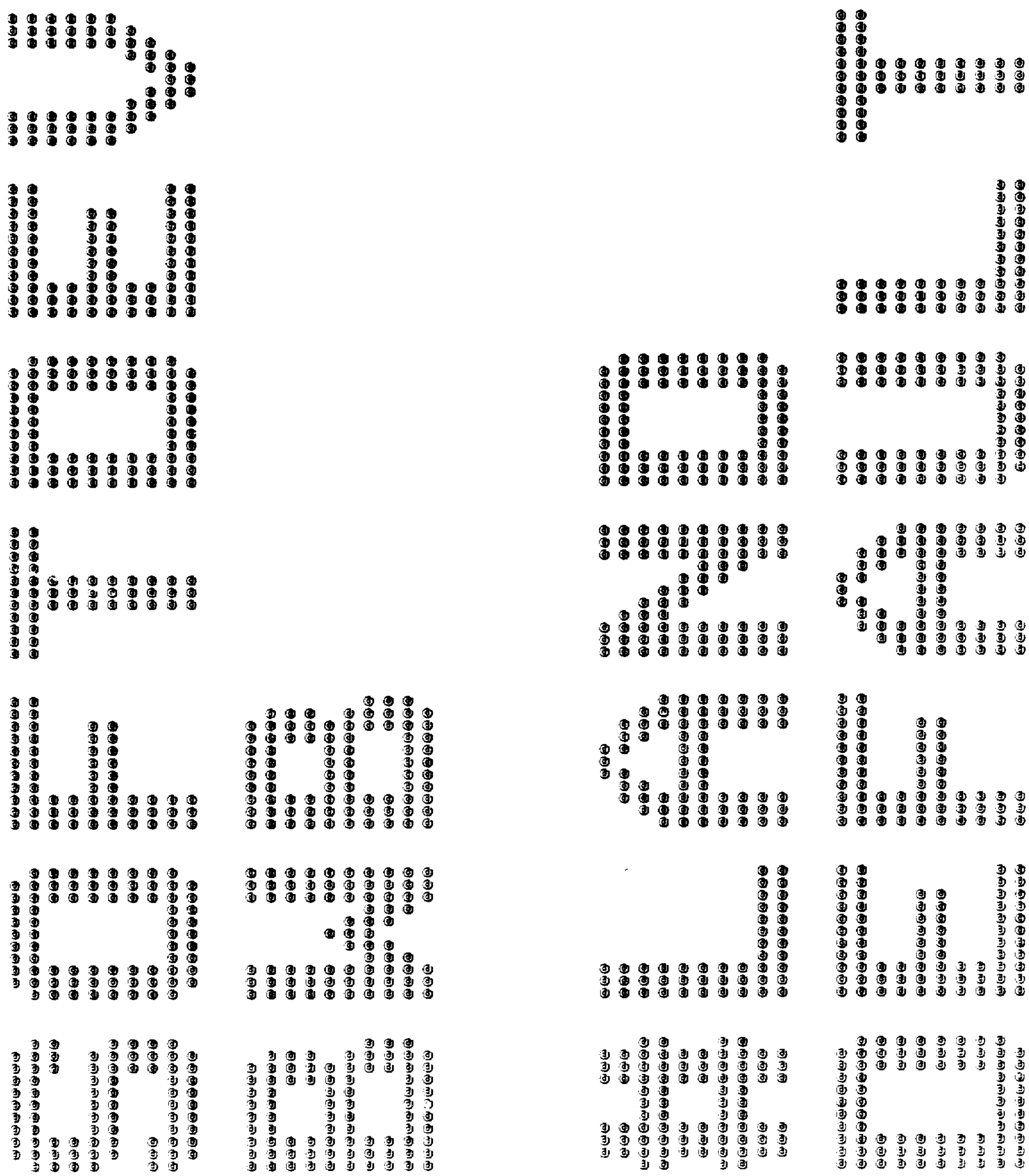

```
PAGE 1     $OVER.T9618C00.CSCAN [1]

TAL - T9250B40 - (15SEP86)                       Source language: TAL - Target machine: Tandem NonStop II System
Date - Time :  12FEB87 - 12:32:19           Default options: On (LIST,CODE,MAP,WARN,LMAP) - Off (ICODE,INNERLIST)

                      ?ERRORFILE escan,NOFIXUP,NOCODE, SYMBOLS, MAP, NOGMAP, LMAP(ALPHA,LOC)
        000000 0  0   ! Some simple scanning utility procs.  All of these accept a "pointer address"
        000000 0  0   ! which is a reference to a scan string pointer used by the caller.  That
        000000 0  0   ! pointer is updated by the utility proc.  The caller passes a direct variable
        000000 0  0   ! which is address equated to the caller's pointer, e.g.
        000000 0  0   !
        000000 0  0   !   string .pointer;
        000000 0  0   !   int     pointeraddress = mypointer;
        000000 0  0   !   call    utilityproc ( pointeraddress );
        000000 0  0   !
        000000 0  0   ! The pointer address is passed to the utility proc, which may update the
        000000 0  0   ! caller's pointer.
        000000 0  0   ?NOLIST, source dgp      ( util, util2, layouts )
        000000 0  0   ?NOLIST, source pgp      ( nin, nin32, nin64 )
        000000 0  0   ?SEARCH          ogp
Search file:  $OVER.T9618C00.OGP  12FEB87 - 12:30:14
        000000 0  0   ?NOLIST, source extdecs  ( fnameexpand, locatesystem, shiftstring )
        000000 0  0   ?SOURCE  sversion( version^scan )
Source file:  [1]  $OVER.T9618C00.SVERSION  12FEB87 - 12:20:47
        000000 0  0   ?SECTION VERSION^SCAN
        000000 0  0   PROC T9618C00^15JUL87^SCAN^11F7;
        000000 1  0   BEGIN END;
        000000 0  0
        000000 0  0   ?SOURCE  sscan
Source file:  [1]  $OVER.T9618C00.SSCAN  01OCT86 - 14:50:34
         000000 0  0   INT !prv! PROC DEBLANK ( PTRADR, OFFSET ) EXTENSIBLE;
         000000 1  0     INT        .PTRADR;   ! address of scan string pointer
         000000 1  0     INT         OFFSET;   ! optional offset to pointer at PTRADR
         000000 1  0     ! scan off leading blanks from the string via the pointer at PTRADR
         000000 1  0     ! and return the upcased leading character of the string.
         000000 1  0     !
         000000 1  0     ! returns
         000000 1  0     !    <          not returned
         000000 1  0     !    =  0       null character (end of string)
         000000 1  0     !    >  <char>  string deblanked, upcased leading character returned
         000000 1  0     BEGIN
         000000 1  1     STRING       GS = 'G';
         000000 1  1
         000000 1  1     USE PTRADR^;
         000002 1  1     PTRADR^ := IF $PARAM ( OFFSET ) THEN PTRADR '+' OFFSET ELSE PTRADR;
         000013 1  1     SCAN GS [ PTRADR^ ] WHILE " " -> PTRADR; ! Deblank
         000022 1  1     STACK GS [ PTRADR ];                    ! Next character
         000024 1  1     CODE ( LDRA $RP; BTST );                ! cc(character type)
         000026 1  1     IF = THEN CODE ( ANRI UPCASEMASK );     ! If alpha, upcase it
         000030 1  1     RETURN;
         000031 1  1
         000031 1  1     END; ! proc deblank

GS                    Variable       STRING          Direct          G+000
```

```
OFFSET                          Variable     INT          Direct      L-005
PTRADR                          Variable     INT          Indirect    L-006
PTRADR^                         Variable     INT          Direct      X 007
000000 0  0   INT !prv! PROC SCANCHAR ( PTRADR, CHAR );
000000 1  0     INT        .PTRADR;   ! address of scan string pointer
000000 1  0     INT         CHAR;     ! character to scan off
000000 1  0     ! if the next character in the string via the pointer at PTRADR equals CHAR,
000000 1  0     ! scan it off and return it upcased, otherwise return 0.  an end of line check
000000 1  0     ! is performed if CHAR = 0.
000000 1  0     !
000000 1  0     ! returns
000000 1  0     !    <          not returned
000000 1  0     !    =  0       next character <> CHAR or end of string (null char)
000000 1  0     !    >  <char>  upcased character off of string via pointer at PTRADR
000000 1  0     BEGIN
000000 1  1
000000 1  1     STACK DEBLANK ( PTRADR );
000006 1  1     USE CHAR^;
000006 1  1     STORE CHAR^;
000007 1  1     IF CHAR = ( CHAR^ := UPCASE ( CHAR^ ) ) THEN
000024 1  1       BEGIN
000024 1  2       IF CHAR^ THEN CALL DEBLANK ( PTRADR, 1 );
000036 1  2       RETURN CHAR^;
000040 1  2       END;
000040 1  1
000040 1  1     RETURN 0;
000042 1  1
000042 1  1     END; ! proc scanchar

CHAR                            Variable     INT          Direct      L-003
CHAR^                           Variable     INT          Direct      X 007
PTRADR                          Variable     INT          Indirect    L-004
000000 0  0   INT !prv! PROC SCANALPHA ( PTRADR, ID, MAXIDLEN, ALPHAX ) EXTENSIBLE;
000000 1  0     INT        .PTRADR;    ! required  address of scan string pointer
000000 1  0     STRING     .ID;        ! required  array in which to deposit upcased id
000000 1  0     INT         MAXIDLEN;  ! required  max length of id to accept
000000 1  0     INT         ALPHAX;    ! optional  address of 'p' string containing alpha chars
000000 1  0     ! entry into scanid, below.  accepts only alpha (not alphanumeric) ids
000000 1  0     FORWARD;

ALPHAX                          Variable     INT          Direct      L-005
ID                              Variable     STRING       Indirect    L-007
MAXIDLEN                        Variable     INT          Direct      L-006
PTRADR                          Variable     INT          Indirect    L-010

000000 0  0
000000 0  0   INT !prv! PROC SCANID ( PTRADR, ID, MAXIDLEN, ALPHAX ) EXTENSIBLE;
000000 1  0     INT        .PTRADR;    ! required address of scan string pointer
000000 1  0     STRING     .ID;        ! required array in which to deposit upcased id
000000 1  0     INT         MAXIDLEN;  ! required max length of id to accept
000000 1  0     INT         ALPHAX;    ! optional address of 'p' string containing alpha chars
000000 1  0     ! if the string via the pointer at ptradr contains an alphanumeric identifier
000000 1  0     ! which does not exceed maxidlen characters in length, scan it off and return
000000 1  0     ! its byte length.  the upcased identifier is deposited blank filled in id.
000000 1  0     ! alphax may specify the address of a null terminated 'p' string which
000000 1  0     ! contains special characters which are to be treated as if they were alpha.
```

```
000000 1 0      !
000000 1 0      ! returns
000000 1 0      !    <            not returned
000000 1 0      !    =  0         empty string or invalid id (e.g. > maxidlen)
000000 1 0      !    >  <length>  length of id at string via pointer at ptradr
000000 1 0      BEGIN
000000 1 1      ENTRY        SCANALPHA;
000000 1 1      STRING       GS = 'G';
000000 1 1      INT          CHAR;
000000 1 1      INT          LEN;
000000 1 1      STRING      .AP = 'P' := 0;
000001 1 1      INT          APX := ALPHAX '-' @AP;
000001 1 1      DEFINE       ALPHA =
000001 1 1                   ( $ALPHA ( CHAR ) OR ( $PARAM ( ALPHAX ) AND XALPHAX ) )#;
000001 1 1      INT          NUMERICOK := 0;
000001 1 1      DEFINE       NUMERIC ( X ) =
000001 1 1                   ( $NUMERIC ( X ) AND NUMERICOK )#;
000001 1 1
000001 1 1      INT SUBPROC XALPHAX;
000001 2 1        BEGIN
000001 2 2        SCAN AP [ APX ] UNTIL CHAR;
000010 2 2        RETURN NOT $CARRY;
000015 2 2        END;
000015 1 1
000015 1 1      NUMERICOK := 1;
000034 1 1      SCANALPHA:
000036 1 1
000036 1 1      CHAR := DEBLANK ( PTRADR );
000045 1 1      IF NOT ALPHA THEN RETURN 0;                ! invalid id
000057 1 1      USE IDADR^;                                ! 'g' address of returned id
000057 1 1      IDADR^ := @ID;
000061 1 1      GS [ IDADR^ ] ':=' " " & GS [ IDADR^ ] FOR ( MAXIDLEN - 1 );
000102 1 1      USE PTRADR^;                               ! 'g' address of scan string
000102 1 1      PTRADR^ := PTRADR;
000103 1 1
000103 1 1      TRAPSOFF;
000106 1 1      DO                                         ! until not alphanumeric char
000106 1 1        BEGIN
000106 1 2        IF NOT MAXIDLEN THEN RETURN 0;           ! invalid id, too long
000113 1 2        INC ( PTRADR^ );
000114 1 2        GS [ IDADR^ ] := UPCASE ( CHAR );
000126 1 2        INC ( IDADR^ );
000127 1 2        DEC ( MAXIDLEN );
000131 1 2        END
000131 1 1      UNTIL NOT ( NUMERIC ( CHAR := GS [ PTRADR^ ] ) OR ALPHA );
000151 1 1
000151 1 1      LEN := PTRADR^ - PTRADR;
000155 1 1      PTRADR := PTRADR^;
000157 1 1      DROP PTRADR^, IDADR^;
000157 1 1      CALL DEBLANK( PTRADR );
000166 1 1      RETURN LEN;
000170 1 1
000170 1 1      END; ! proc scanid

ALPHA                Define                      ( $ALPHA ( CHAR ) OR ( $PARAM ( ALPHAX ) AND XALPHAX ) )
ALPHAX               Variable       INT          Direct        L-005
```

```
AP                          Variable     STRING      Indirect     P+000
APX                         Variable     INT         Direct       L+003
CHAR                        Variable     INT         Direct       L+001
GS                          Variable     STRING      Direct       G+000
ID                          Variable     STRING      Indirect     L-007
LEN                         Variable     INT         Direct       L+002
MAXIDLEN                    Variable     INT         Direct       L-006
NUMERIC                     Define                   ( $NUMERIC (  $1 ) AND NUMERICOK )
NUMERICOK                   Variable     INT         Direct       L+004
PTRADR                      Variable     INT         Indirect     L-010
SCANALPHA                   Entry        INT         %000035
XALPHAX                     Subproc      INT         %000001
      000000 0  0   INT !prv! PROC SCANIDT ( PTRADR, IDTADR, WASTE ) EXTENSIBLE;
      000000 1  0     INT        .PTRADR;  ! optional  address of scan string pointer
      000000 1  0     INT         IDTADR;  ! optional  byte address of id table 'p' string array
      000000 1  0     INT         WASTE;
      000000 1  0     ! entry into scanidta, below, which inhibits abbreviating
      000000 1  0     ! if used, the id table must not contain flag bytes
      000000 1  0     FORWARD;

IDTADR                      Variable     INT         Direct       L-006
PTRADR                      Variable     INT         Indirect     L-007
WASTE                       Variable     INT         Direct       L-005

      000000 0  0
      000000 0  0   INT !prv! PROC SCANIDTA ( PTRADR, IDTADR, IDTFLAG ) EXTENSIBLE;
      000000 1  0     INT        .PTRADR;  ! optional  address of scan string pointer
      000000 1  0     INT         IDTADR;  ! optional  byte address of id table 'p' string array
      000000 1  0     INT         IDTFLAG; ! optional  returned idt flag byte
      000000 1  0     ! if the string via the pointer at ptradr contains a sequence of special
      000000 1  0     ! characters which matches one of the items in the id table or the string
      000000 1  0     ! contains an alpha id of 31 or less characters which matches one of the id
      000000 1  0     ! table items or an abbreviation thereof, (whew!!)  scan it off and return its
      000000 1  0     ! table number (0:n-1, where n is the number of items in the table)
      000000 1  0     !
      000000 1  0     ! table ids are upper case and separated by one or more blanks.
      000000 1  0     ! the table ends with a null byte.
      000000 1  0     !
      000000 1  0     ! each id in the table starts with a flag byte (unless scanidt entry used):
      000000 1  0     !
      000000 1  0     !   <11:15>:  abbreviation length, 1-31
      000000 1  0     !   <8 :10>:  user defined flags
      000000 1  0     !
      000000 1  0     ! the abbreviation length gives the minimum acceptable abbreviation
      000000 1  0     ! for the id to be scanned.
      000000 1  0     ! the abbreviation length is ignored for ids that start with special
      000000 1  0     ! characters.
      000000 1  0     !
      000000 1  0     ! returns
      000000 1  0     !    <    -1  end of string, invalid id, or id not in table
      000000 1  0     !    >=  0:n  id number
      000000 1  0     BEGIN
      000000 1  1     ENTRY       SCANIDT;
      000000 1  1     STRING      GS = 'G';                  ! handy equivalence
      000000 1  1     INT         PTRADRNEXT;                ! next value for ptradr
      000000 1  1     LITERAL     MAXIDLEN = 32;             ! max byte length of an id
```

```
000000 1  1   STRING     .ID [ 0:MAXIDLEN-1 ];       ! id buffer
000000 1  1   INT         IDLEN;                     ! byte length of id
000000 1  1   STRING     .IDTPTR = 'P' := 0;         ! pointer for searching id table
000001 1  1   INT         IDTLEN;                    ! byte length of an id in table
000001 1  1   INT         IDTN := 0;                 ! id table number
000001 1  1   INT         SPECIAL;                   ! if id is special
000001 1  1   INT         ABBY := 0;                 ! abbreviations ok
000001 1  1   INT         FLAG := 0;                 ! flag byte from idt
000001 1  1   DEFINE      ABBYF = <11:15>#;          ! abbreviation length field  therein
000001 1  1   DEFINE      USERF = <00:10>#;          ! other                fields therein
000001 1  1
000001 1  1   ABBY := 1;
000023 1  1   SCANIDT:
000025 1  1
000025 1  1   ! pointing to anything worth looking at?
000025 1  1   IF NOT DEBLANK ( PTRADR ) THEN RETURN -1;
000036 1  1   PTRADRNEXT := PTRADR;
000040 1  1   IF ( SPECIAL := $SPECIAL ( GS [ PTRADR ] ) ) THEN
000051 1  1     ID ':=' GS [ PTRADR ] FOR MAXIDLEN
000051 1  1   ELSE
000062 1  1     IF NOT ( IDLEN := SCANALPHA ( PTRADRNEXT, ID, MAXIDLEN ) ) THEN RETURN -1;
000076 1  1
000076 1  1   ! search for match with id in table
000076 1  1   TRAPSOFF;
000101 1  1   USE IDTADR^;
000101 1  1   IDTADR^ := IDTADR - @IDTPTR;
000107 1  1   WHILE IDTPTR [ IDTADR^ ] DO
000111 1  1     BEGIN
000111 1  2     IF ABBY THEN
000113 1  2       BEGIN
000113 1  3       FLAG := IDTPTR [ IDTADR^ ];
000115 1  3       IDTADR^ := IDTADR^ + 1;
000116 1  3       END;
000116 1  2     SCAN IDTPTR [ IDTADR^ ] UNTIL " " -> IDTLEN;
000126 1  2     IDTLEN := IDTLEN - @IDTPTR [ IDTADR^ ];
000135 1  2     IF SPECIAL THEN IDLEN := IDTLEN;
000141 1  2     IF ( IDLEN = IDTLEN OR ABBY AND IDLEN <= IDTLEN ) AND
000141 1  2        ID = IDTPTR [ IDTADR^ ] FOR $MAX ( FLAG.ABBYF, IDLEN ) THEN
000172 1  2       BEGIN
000172 1  3       CALL DEBLANK ( PTRADR, IDLEN );
000202 1  3       IF $PARAM ( IDTFLAG ) THEN IDTFLAG := FLAG;
000207 1  3       RETURN IDTN;
000211 1  3       END;
000211 1  2     SCAN IDTPTR [ IDTADR^ := IDTADR^ + IDTLEN ] WHILE " " -> IDTADR^;
000226 1  2     IDTADR^ := IDTADR^ - @IDTPTR;
000234 1  2     INC ( IDTN );
000236 1  2     END;
000237 1  1
000237 1  1   RETURN -1;
000241 1  1
000241 1  1   END; ! proc scanidta | scanidt

ABBY                Variable     INT          Direct       L+007
ABBYF               Define                    <11:15>
FLAG                Variable     INT          Direct       L+010
GS                  Variable     STRING       Direct       G+000
```

```
ID                              Variable     STRING      Indirect     L+002
IDLEN                           Variable     INT         Direct       L+003
IDTADR                          Variable     INT         Direct       L-006
IDTADR^                         Variable     INT         Direct       X 007
IDTFLAG                         Variable     INT         Direct       L-005
IDTLEN                          Variable     INT         Direct       L+004
IDTN                            Variable     INT         Direct       L+005
IDTPTR                          Variable     STRING      Indirect     P+000
MAXIDLEN                        Literal      INT         %000040
PTRADR                          Variable     INT         Indirect     L-007
PTRADRNEXT                      Variable     INT         Direct       L+001
SCANIDT                         Entry        INT         %000024
SPECIAL                         Variable     INT         Direct       L+006
USERF                           Define                   <00:10>
   214.   000000 0  0   INT !prv! PROC SCANINT ( PTRADR, NUM, BASE, LOW, HIGH ) EXTENSIBLE;
   215.   000000 1  0     INT        .PTRADR; ! address of scan string pointer
   216.   000000 1  0     INT        .NUM;    ! returned value of scanned off number
   217.   000000 1  0     INT         BASE;   ! conversion base, [-] (2:16), signed if -, default -10
   218.   000000 1  0     INT         LOW;    ! min legal value of num, default is no test
   219.   000000 1  0     INT         HIGH;   ! max legal value of num, default is no test
   220.   000000 1  0     ! if the string via the pointer at ptradr contains a number which can be
   221.   000000 1  0     ! represented in num and (optionally) is in the range of low:high, scan it
   222.   000000 1  0     ! off and deposit the binary result in num.  base indicates the default
   223.   000000 1  0     ! conversion base, which the string may override (e.g. "%").  If base is
   224.   000000 1  0     ! negative signed conversion is performed and a signed test for low:high
   225.   000000 1  0     ! range is used, otherwise conversion and range test is unsigned.
   226.   000000 1  0     !
   227.   000000 1  0     ! returns
   228.   000000 1  0     !    <  -2  Number not in range LOW:HIGH
   229.   000000 1  0     !    <  -1  Illegal number
   230.   000000 1  0     !    =   0  Successful conversion
   231.   000000 1  0     !    >   1  String doesn't contain a number or end of string
   232.   000000 1  0     BEGIN
   233.   000000 1  1     STRING      GS = 'G';
   234.   000000 1  1     INT         TEMP;
   235.   000000 1  1     INT         PTRADRNEXT;
   236.   000000 1  1
   237.   000000 1  1     CALL DEBLANK ( PTRADR );
   238.   000012 1  1     IF NOT $PARAM ( BASE ) THEN BASE := -10;
   239.   000017 1  1     PTRADRNEXT := NIN ( GS [ PTRADR ], NUM, BASE, TEMP );
   240.   000035 1  1     IF TEMP THEN RETURN TEMP;
   241.   000041 1  1     IF ( $PARAM ( LOW ) AND ( IF BASE.<0> THEN NUM < LOW ELSE NUM '<' LOW ) ) OR
   242.   000041 1  1        ( $PARAM ( HIGH ) AND ( IF BASE.<0> THEN NUM > HIGH ELSE NUM '>' HIGH ) )
   243.   000041 1  1        THEN RETURN -2;
   244.   000117 1  1     PTRADR := PTRADRNEXT;
   245.   000121 1  1     RETURN 0;
   246.   000123 1  1
   247.   000123 1  1     END; ! proc scanint

BASE                            Variable     INT         Direct       L-007
GS                              Variable     STRING      Direct       G+000
HIGH                            Variable     INT         Direct       L-005
LOW                             Variable     INT         Direct       L-006
NUM                             Variable     INT         Indirect     L-010
PTRADR                          Variable     INT         Indirect     L-011
PTRADRNEXT                      Variable     INT         Direct       L+002
TEMP                            Variable     INT         Direct       L+001
```

```
000000 0  0   INT !prv! PROC SCANINT32 ( PTRADR, NUM, BASE, LOW, HIGH ) EXTENSIBLE;
000000 1  0     INT          .PTRADR; ! address of scan string pointer
000000 1  0     INT ( 32 ) .NUM;      ! returned value of scanned off number
000000 1  0     INT           BASE;   ! conversion base, (2:16), default 10
000000 1  0     INT ( 32 )  LOW;      ! min legal value of num, default is no test
000000 1  0     INT ( 32 )  HIGH;     ! max legal value of num, default is no test
000000 1  0     ! if the string via the pointer at ptradr contains a number which can be
000000 1  0     ! represented in num and (optionally) is in the range of low:high, scan it
000000 1  0     ! off and deposit the binary result in num.  base indicates the default
000000 1  0     ! conversion base, which the string may override (e.g. "%").
000000 1  0     ! Conversion and range test is signed.
000000 1  0     !
000000 1  0     ! Returns
000000 1  0     !     <  -2  Number not in range low:high
000000 1  0     !     <  -1  Illegal number
000000 1  0     !     =   0  Successful conversion
000000 1  0     !     >   1  String doesn't contain a number or end of string
000000 1  0     BEGIN
000000 1  1     STRING        GS = 'G';
000000 1  1     INT           TEMP;
000000 1  1     INT           PTRADRNEXT;
000000 1  1
000000 1  1     CALL DEBLANK ( PTRADR );
000012 1  1     IF NOT $PARAM ( BASE ) THEN BASE := 10;
000017 1  1     PTRADRNEXT := NIN32 ( GS [ PTRADR ], NUM, BASE, TEMP );
000035 1  1     IF TEMP THEN RETURN TEMP;
000041 1  1     IF ( $PARAM ( LOW ) AND NUM < LOW ) OR
000041 1  1        ( $PARAM ( HIGH ) AND NUM > HIGH ) THEN
000057 1  1        RETURN -2;
000061 1  1     PTRADR := PTRADRNEXT;
000063 1  1     RETURN 0;
000065 1  1
000065 1  1     END; ! proc scanint32

BASE                      Variable     INT          Direct      L-011
GS                        Variable     STRING       Direct      G+000
HIGH                      Variable     INT (32)     Direct      L-006
LOW                       Variable     INT (32)     Direct      L-010
NUM                       Variable     INT (32)     Indirect    L-012
PTRADR                    Variable     INT          Indirect    L-013
PTRADRNEXT                Variable     INT          Direct      L+002
TEMP                      Variable     INT          Direct      L+001

000000 0  0   INT !prv! PROC SCANINT64 ( PTRADR, NUM, BASE, LOW, HIGH ) EXTENSIBLE;
000000 1  0     INT          .PTRADR; ! address of scan string pointer
000000 1  0     FIXED        .NUM;    ! returned value of scanned off number
000000 1  0     INT           BASE;   ! conversion base, (2:16), default 10
000000 1  0     FIXED         LOW;    ! min legal value of num, default is no test
000000 1  0     FIXED         HIGH;   ! max legal value of num, default is no test
000000 1  0     ! if the string via the pointer at ptradr contains a number which can be
000000 1  0     ! represented in num and (optionally) is in the range of low:high, scan it
000000 1  0     ! off and deposit the binary result in num.  base indicates the default
000000 1  0     ! conversion base, which the string may override (e.g. "%").
000000 1  0     ! Conversion and range test is signed.
000000 1  0     !
000000 1  0     ! Returns
000000 1  0     !     <  -2  Number not in range LOW:HIGH
```

```
297.    000000 1 0     !    <  -1  Illegal number
298.    000000 1 0     !    =   0  Successful conversion
299.    000000 1 0     !    >   1  String doesn't contain a number or end of string
300.    000000 1 0     BEGIN
301.    000000 1 1     STRING      GS = 'G';
302.    000000 1 1     INT         TEMP;
303.    000000 1 1     INT         PTRADRNEXT;
304.    000000 1 1
305.    000000 1 1     CALL DEBLANK ( PTRADR );
306.    000012 1 1     IF NOT $PARAM ( BASE ) THEN BASE := 10;
307.    000017 1 1     PTRADRNEXT := NIN64 ( GS [ PTRADR ], NUM, BASE, TEMP );
308.    000035 1 1     IF TEMP THEN RETURN TEMP;
309.    000041 1 1     IF ( $PARAM ( LOW ) AND NUM < LOW ) OR
310.    000041 1 1        ( $PARAM ( HIGH ) AND NUM > HIGH ) THEN
311.    000063 1 1        RETURN -2;
312.    000065 1 1     PTRADR := PTRADRNEXT;
313.    000067 1 1     RETURN 0;
314.    000071 1 1
315.    000071 1 1     END; ! proc scanint64

BASE                       Variable      INT            Direct      L-015
GS                         Variable      STRING         Direct      G+000
HIGH                       Variable      FIXED (0)      Direct      L-010
LOW                        Variable      FIXED (0)      Direct      L-014
NUM                        Variable      FIXED (0)      Indirect    L-016
PTRADR                     Variable      INT            Indirect    L-017
PTRADRNEXT                 Variable      INT            Direct      L+002
TEMP                       Variable      INT            Direct      L+001
317.    000000 0 0    INT !prv! PROC SCANSYSTEM ( PTRADR, SYSNAME^, SYSNUM^ ) EXTENSIBLE;
318.    000000 1 0      INT         .PTRADR;    ! address of scan string pointer
319.    000000 1 0      STRING      .SYSNAME^;  ! optional [0:7] returned upcased system name
320.    000000 1 0      INT         .SYSNUM^;   ! optional returned system number, or 255 (undefined)
321.    000000 1 0      ! if the string via the pointer at ptradr contains a "\<system name>",
322.    000000 1 0      ! scan it off and deposit the upcased name in sysname^ and the system number
323.    000000 1 0      ! in sysnum^.  Both sysname^ and sysnum^ are optional.  Sysnum^ will be set
324.    000000 1 0      ! to 255 if the system is undefined.
325.    000000 1 0      !
326.    000000 1 0      ! Returns
327.    000000 1 0      !    <       not returned
328.    000000 1 0      !    =    0  string doesn't contain a system name
329.    000000 1 0      !    >       length of scanned off system name
330.    000000 1 0      BEGIN
331.    000000 1 1      STRING      GS = 'G';
332.    000000 1 1      INT         PTRADRNEXT;
333.    000000 1 1      STRUCT      .SYSNAME ( NAME^TEMPLATE );
334.    000000 1 1      INT         .SYSNUM  [ 0:0 ];
335.    000000 1 1      LITERAL     SYSNUMUNDEFINED = 255;
336.    000000 1 1
337.    000000 1 1      IF $PARAM ( SYSNAME^ ) THEN @SYSNAME := @SYSNAME^;
338.    000014 1 1      IF $PARAM ( SYSNUM^ ) THEN @SYSNUM := @SYSNUM^;
339.    000021 1 1
340.    000021 1 1      IF NOT ( ( SYSNAME.BYTE := DEBLANK ( PTRADR ) ) = "\" AND
341.    000021 1 1               $ALPHA ( GS [ PTRADRNEXT := PTRADR '+' 1 ] ) AND
342.    000021 1 1               SCANID ( PTRADRNEXT, SYSNAME.BYTE [ 1 ], ALEN ( SYSNAME) )
343.    000021 1 1             ) THEN RETURN 0;
344.    000061 1 1      IF NOT LOCATESYSTEM ( SYSNUM, SYSNAME ) THEN SYSNUM := SYSNUMUNDEFINED;
```

```
345.   000071 1  1
346.   000071 1  1     STACK PTRADRNEXT '-' PTRADR;
347.   000074 1  1     PTRADR := PTRADRNEXT;
348.   000076 1  1     CALL DEBLANK ( PTRADR );
349.   000105 1  1     RETURN;
350.   000106 1  1
351.   000106 1  1     END; ! proc scansystem

GS                         Variable       STRING        Direct       G+000
PTRADR                     Variable       INT           Indirect     L-007
PTRADRNEXT                 Variable       INT           Direct       L+001
SYSNAME                    Variable,10    STRUCT        Indirect     L+002
SYSNAME^                   Variable       STRING        Indirect     L-006
SYSNUM                     Variable       INT           Indirect     L+003
SYSNUMUNDEFINED            Literal        INT           %000377
SYSNUM^                    Variable       INT           Indirect     L-005
   353.   000000 0  0   INT !prv! PROC SCANDNAME ( PTRADR, FNAME^, DEFAULTS^ ) EXTENSIBLE;
   354.   000000 1  0     INT        .PTRADR;     ! address of scan string pointer
   355.   000000 1  0     INT        .FNAME^;     ! returned upcased device name [0:7]
   356.   000000 1  0     INT        .DEFAULTS^;  ! optional file defaults [0:7]
   357.   000000 1  0     ! if the string via the pointer at ptradr contains a device name (e.g.
   358.   000000 1  0     ! [\system.]$<name>), scan it off and deposit the upcased internal
   359.   000000 1  0     ! form name in fname^;
   360.   000000 1  0     !
   361.   000000 1  0     ! Returns
   362.   000000 1  0     !    <      not returned
   363.   000000 1  0     !    =   0  string doesn't contain a valid name
   364.   000000 1  0     !    >      length of scanned off name
   365.   000000 1  0     FORWARD;

DEFAULTS^                  Variable       INT           Indirect     L-005
FNAME^                     Variable       INT           Indirect     L-006
PTRADR                     Variable       INT           Indirect     L-007

   366.   000000 0  0
   368.   000000 0  0   INT !prv! PROC SCANFNAME ( PTRADR, FNAME^, DEFAULTS^ ) EXTENSIBLE;
   369.   000000 1  0     INT        .PTRADR;     ! address of scan string pointer
   370.   000000 1  0     INT        .FNAME^;     ! returned upcased file name [0:11]
   371.   000000 1  0     INT        .DEFAULTS^;  ! optional file defaults [0:7]
   372.   000000 1  0     ! if the string via the pointer at ptradr contains a file name, scan it off
   373.   000000 1  0     ! and deposit the upcased internal form name in fname^.
   374.   000000 1  0     !
   375.   000000 1  0     ! returns
   376.   000000 1  0     !    <      not returned
   377.   000000 1  0     !    =   0  string doesn't contain a valid name
   378.   000000 1  0     !    >      length of scanned off name
   379.   000000 1  0     BEGIN
   380.   000000 1  1     ENTRY       SCANDNAME;
   381.   000000 1  1     STRING      GS = 'G';
   382.   000000 1  1     INT         TYPE := 1;
   383.   000000 1  1     STRUCT     .FNAME ( FILENAME^TEMPLATE );
   384.   000000 1  1     STRUCT     .DEFAULTS ( DEFAULTS^TEMPLATE );
   385.   000000 1  1     INT         PTRADRSAVE;
   386.   000000 1  1     INT         L;
   387.   000000 1  1
   388.   000000 1  1     TYPE := 0;
```

```
389.   000014 1  1     SCANDNAME:
390.   000016 1  1
391.   000016 1  1     FNAME.WORD ':=' "   " & FNAME.WORD FOR AWLEN ( FNAME );
392.   000027 1  1     DEFAULTS.WORD ':=' FNAME.WORD FOR WLEN ( DEFAULTS );
393.   000033 1  1     IF $PARAM ( DEFAULTS^ ) THEN @DEFAULTS := @DEFAULTS^;
394.   000040 1  1
395.   000040 1  1     CALL DEBLANK ( PTRADR );
396.   000047 1  1     PTRADR := ( PTRADRSAVE := PTRADR ) '+'
397.   000047 1  1              ( L := FNAMEEXPAND ( GS | PTRADR |, FNAME, DEFAULTS ) );
398.   000067 1  1     CALL SHIFTSTRING ( FNAME.BYTE, $LEN ( FNAME ), 0 );
399.   000075 1  1     IF TYPE AND NOT ( FNAME.SUBVOL.WORD = "   " AND
400.   000075 1  1                       FNAME.FILE.WORD = "   " ) THEN L := 0;
401.   000115 1  1     STACK L;
402.   000116 1  1     IF <> THEN
403.   000117 1  1       FNAME^ ':=' FNAME FOR ( IF TYPE THEN WLEN ( NAME^TEMPLATE )
404.   000117 1  1                                        ELSE WLEN ( FNAME ) )
405.   000117 1  1     ELSE
406.   000131 1  1       PTRADR := PTRADRSAVE;
407.   000133 1  1     CALL DEBLANK ( PTRADR );
408.   000142 1  1     RETURN;
409.   000143 1  1
410.   000143 1  1     END; ! proc scanfname | scandname

DEFAULTS                        Variable,20   STRUCT     Indirect    L+003
DEFAULTS^                       Variable      INT        Indirect    L-005
FNAME                           Variable,30   STRUCT     Indirect    L+002
FNAME^                          Variable      INT        Indirect    L-006
GS                              Variable      STRING     Direct      G+000
L                               Variable      INT        Direct      L+005
PTRADR                          Variable      INT        Indirect    L-007
PTRADRSAVE                      Variable      INT        Direct      L+004
SCANDNAME                       Entry         INT        %000015
TYPE                            Variable      INT        Direct      L+001
ENTRY POINT MAP BY NAME

SP  PEP  BASE    LIMIT   ENTRY   ATTRS  NAME                            DATE     TIME  LANGUAGE SOURCE FILE

00  003  000023  000053  000023  X      DEBLANK                         12FEB87  12:32 TAL      $OVER.T9618C00.SSCAN
00  017  001323  001701  001455  V      NIN                             12FEB87  12:29 TAL      $OVER.T9618C00.SGP
00  020  001702  001714  001702  V      NIN32                           12FEB87  12:29 TAL      $OVER.T9618C00.SGP
00  021  001715  001727  001715  V      NIN64                           12FEB87  12:29 TAL      $OVER.T9618C00.SGP
00  006  000116  000306  000153  EX     SCANALPHA                       12FEB87  12:32 TAL      $OVER.T9618C00.SSCAN
00  004  000054  000115  000054         SCANCHAR                        12FEB87  12:32 TAL      $OVER.T9618C00.SSCAN
00  016  001157  001322  001174  EX     SCANDNAME                       12FEB87  12:32 TAL      $OVER.T9618C00.SSCAN
00  015  001157  001322  001170  X      SCANFNAME                       12FEB87  12:32 TAL      $OVER.T9618C00.SSCAN
00  005  000116  000306  000147  X      SCANID                          12FEB87  12:32 TAL      $OVER.T9618C00.SSCAN
00  010  000307  000547  000333  EX     SCANIDT                         12FEB87  12:32 TAL      $OVER.T9618C00.SSCAN
00  007  000307  000547  000327  X      SCANIDTA                        12FEB87  12:32 TAL      $OVER.T9618C00.SSCAN
00  011  000550  000672  000550  X      SCANINT                         12FEB87  12:32 TAL      $OVER.T9618C00.SSCAN
00  012  000673  000757  000673  X      SCANINT32                       12FEB87  12:32 TAL      $OVER.T9618C00.SSCAN
00  013  000760  001050  000760  X      SCANINT64                       12FEB87  12:32 TAL      $OVER.T9618C00.SSCAN
00  014  001051  001156  001051  X      SCANSYSTEM                      12FEB87  12:32 TAL      $OVER.T9618C00.SSCAN
00  002  000022  000022  000022         T9618C00^15JUL87^SCAN^11F7      12FEB87  12:32 TAL      $OVER.T9618C00.SVERSION
DATA BLOCK MAP BY NAME

BASE      LIMIT   TYPE     MODE    NAME                       DATE     TIME   LANGUAGE  SOURCE FILE

[illegible]       COMMON   WORD    #GLOBAL                    12FEB87  12:32  TAL       $OVER.T9618C00.PGP
```

ENTRY POINT MAP BY LOCATION
CODE SEGMENT 00

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 002 | 000022 | 000022 | 000022 | | T9618C00^15JUL87^SCAN^11F7 | 12FEB87 | 12:32 | TAL | $OVER.T9618C00.SVERSION |
| 00 | 003 | 000023 | 000053 | 000023 | X | DEBLANK | 12FEB87 | 12:32 | TAL | $OVER.T9618C00.SSCAN |
| 00 | 004 | 000054 | 000115 | 000054 | | SCANCHAR | 12FEB87 | 12:32 | TAL | $OVER.T9618C00.SSCAN |
| 00 | 005 | 000116 | 000306 | 000147 | X | SCANID | 12FEB87 | 12:32 | TAL | $OVER.T9618C00.SSCAN |
| 00 | 006 | 000116 | 000306 | 000153 | EX | SCANALPHA | 12FEB87 | 12:32 | TAL | $OVER.T9618C00.SSCAN |
| 00 | 007 | 000307 | 000547 | 000327 | X | SCANIDTA | 12FEB87 | 12:32 | TAL | $OVER.T9618C00.SSCAN |
| 00 | 010 | 000307 | 000547 | 000333 | EX | SCANIDT | 12FEB87 | 12:32 | TAL | $OVER.T9618C00.SSCAN |
| 00 | 011 | 000550 | 000672 | 000550 | X | SCANINT | 12FEB87 | 12:32 | TAL | $OVER.T9618C00.SSCAN |
| 00 | 012 | 000673 | 000757 | 000673 | X | SCANINT32 | 12FEB87 | 12:32 | TAL | $OVER.T9618C00.SSCAN |
| 00 | 013 | 000760 | 001050 | 000760 | X | SCANINT64 | 12FEB87 | 12:32 | TAL | $OVER.T9618C00.SSCAN |
| 00 | 014 | 001051 | 001156 | 001051 | X | SCANSYSTEM | 12FEB87 | 12:32 | TAL | $OVER.T9618C00.SSCAN |
| 00 | 015 | 001157 | 001322 | 001170 | X | SCANFNAME | 12FEB87 | 12:32 | TAL | $OVER.T9618C00.SSCAN |
| 00 | 016 | 001157 | 001322 | 001174 | EX | SCANDNAME | 12FEB87 | 12:32 | TAL | $OVER.T9618C00.SSCAN |
| 00 | 017 | 001323 | 001701 | 001455 | V | NIN | 12FEB87 | 12:29 | TAL | $OVER.T9618C00.SGP |
| 00 | 020 | 001702 | 001714 | 001702 | V | NIN32 | 12FEB87 | 12:29 | TAL | $OVER.T9618C00.SGP |
| 00 | 021 | 001715 | 001727 | 001715 | V | NIN64 | 12FEB87 | 12:29 | TAL | $OVER.T9618C00.SGP |

Code size = 984 words
  PEP = 18 words
  Procedures = 966 words
  Gap at 32K = 0 words
  XEP = 3 words
Code area size = 1 pages
Resident code size = 0 pages
DATA BLOCK MAP BY LOCATION

| BASE | LIMIT | TYPE | MODE | NAME | DATE | TIME | LANGUAGE | SOURCE FILE |
|---|---|---|---|---|---|---|---|---|
| 000000 | | COMMON | WORD | #GLOBAL | 12FEB87 | 12:32 | TAL | $OVER.T9618C00.PGP |

BINDER - OBJECT FILE BINDER - T9621C00 - (09SEP86)   SYSTEM \PRUNE
Object file name is $OVER.T9618C00.oscan
Object file timestamp is 12FEB87 12:32:19
Number of Binder errors = 0
Number of Binder warnings = 0
Code area size = 1 pages
Resident code size = 0 pages
Data area size = 1 pages
Extended data area size = 0 pages
Top of stack = 0 words
Number of code segments  = 1 segment The object file will run on a TNS/II, but may not run on a TNS
Errorfile file name is $OVER.T9618C00.ESCAN
Number of compiler errors =  0
Number of compiler warnings =  0
Maximum symbol table space used was = 35364 bytes
Number of source lines = 3294
Compile cpu time = 00:00:04
Total Elapsed time = 00:00:48

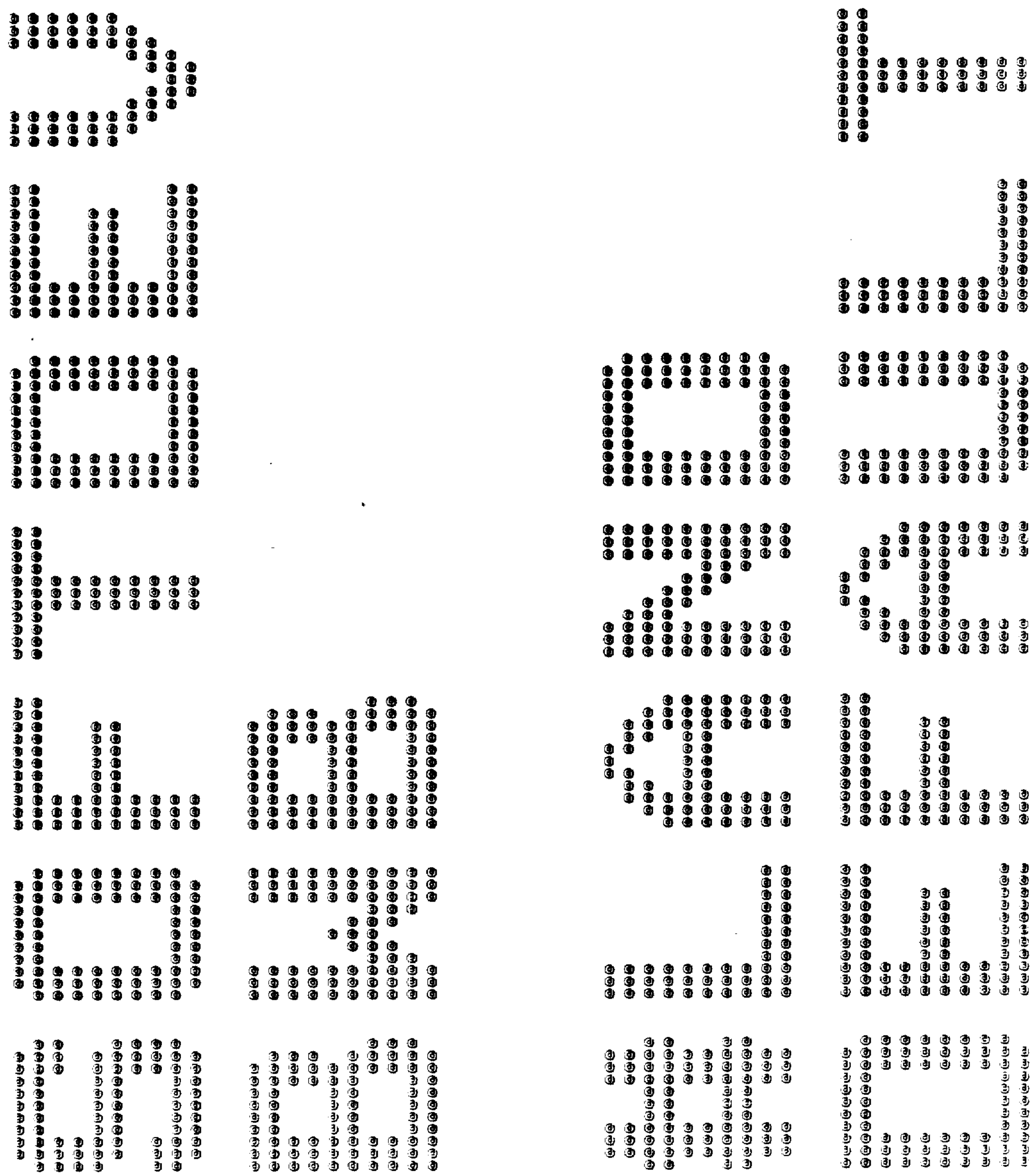

```
PAGE 1    $OVER.T9618C00.CSIOLIB [1]

TAL - T9250B40 - (15SEP86)                         Source language: TAL - Target machine: Tandem NonStop II System
Date - Time :  12FEB87 - 12:31:01               Default options: On (LIST,CODE,MAP,WARN,LMAP) - Off (ICODE,INNERLIST)

                            ?ERRORFILE esiolib,NOFIXUP,NOCODE, SYMBOLS, MAP, NOGMAP, LMAP(ALPHA,LOC)
    1.    000000 0  0   NAME      SIOLIB;
    3.    000000 0  0   ?NOLIST, SOURCE  DGP     ( UTIL, UTIL2, LAYOUTS )
    5.    000000 0  0   ?NOLIST, SOURCE  DTYP    ( DTYP )
    7.    000000 0  0   ?NOLIST, SOURCE  GPLDEFS
    9.    000000 0  0   ?NOLIST, SOURCE  DOBJFMT ( DECLARATION ) ! for printbanner
   11.    000000 0  0   ?SOURCE  DSIOLIB
Source file:  [1]  $OVER.T9618C00.DSIOLIB  01OCT86 - 10:02:35
    2.    000000 0  0   ?SECTION INOUTSTUFF
    3.    000000 0  0   BLOCK     INOUTSTUFF;
    4.    000000 0  0   !
    5.    000000 0  0   ! External dependencies: layouts
    6.    000000 0  0   !                        system.gpldefs
    7.    000000 0  0   !                        client program must be named
    8.    000000 0  0   !
    9.    000000 0  0   ! A global block which may be initialized by startup (openinoutstuff) and used
   10.    000000 0  0   ! by the procedures input and print (presented later).
   11.    000000 0  0   !
   12.    000000 0  0   STRUCT        .DEFAULTS ( DEFAULTS^TEMPLATE );                  ! from startup msg
   13.    000010 0  0   ALLOCATE^CBS ( RUCB, COMMONFCB, 7 );
   14.    000206 0  0   ALLOCATE^FCB (       RCVFCB   , "$RECEIVE                 " ); ! message queue
   15.    000302 0  0   ALLOCATE^FCB (       TERMFCB  , "          #TERM         " ); ! home term
   16.    000376 0  0   ALLOCATE^FCB (       INFCB    , "          #IN           " ); ! in file
   17.    000472 0  0   ALLOCATE^FCB (       OUTFCB   , "          #OUT          " ); ! out file
   18.    000566 0  0   ALLOCATE^FCB (       GP1FCB   , "          #GP1          " ); ! g.p. #1
   19.    000662 0  0   ALLOCATE^FCB (       GP2FCB   , "          #GP2          " ); ! g.p. #2
   20.    000756 0  0   ALLOCATE^FCB (       GP3FCB   , "          #GP3          " ); ! g.p. #3
   21.    001052 0  0
   22.    001052 0  0   ! The following pointers are used for sio file access.  Infile and outfile are
   23.    001052 0  0   ! setup by the startup procedure to point to the infcb and outfcb (startup may
   24.    001052 0  0   ! make infcb point to termfcb and/or outfcb point to infcb, to avoid duplicate
   25.    001052 0  0   ! opens).  Infile or outfile could point to other fcbs if an "obey" or "list"
   26.    001052 0  0   ! file is to be used.  To use a list file, @outfile := @listfcb; to drop a list
   27.    001052 0  0   ! file, @outfile := @outfcb .
   28.    001052 0  0   INT          .ALLFILES   =  COMMONFCB;
   29.    001052 0  0   INT          .RCVFILE    =  RCVFCB;
   30.    001052 0  0   INT          .TERMFILE   =  TERMFCB;
   31.    001052 0  0   INT          .INFILE;
   32.    001052 0  0   INT          .OUTFILE;
   33.    001052 0  0
   34.    001052 0  0   ! The following will only be true if the files are a process or terminal
   35.    001052 0  0   ! (after calling startup).
   36.    001052 0  0   DEFINE        INTERACTIVE = ( @INFILE = @OUTFILE )#;
   37.    001052 0  0
   38.    001052 0  0   ! Layouts for input and output files and their associated block buffers.
   39.    001052 0  0   ! A block buffer is needed if the corresponding file is an edit type file.
   40.    001052 0  0   LAYOUT       ( INBUF^TEMPLATE    ( * ), 132 );
   41.    001052 0  0   LAYOUT       ( INBLOCK^TEMPLATE  ( * ), 256 );
   42.    001052 0  0   LAYOUT       ( OUTBUF^TEMPLATE   ( * ), 132 );
```

```
001052 0  0   LAYOUT       ( OUTBLOCK^TEMPLATE ( * ), 1024 );
001052 0  0
001052 0  0   STRUCT        .INFCBBLOCK  ( INBLOCK^TEMPLATE );
001252 0  0   STRUCT        .OUTFCBBLOCK ( OUTBLOCK^TEMPLATE );
002252 0  0
002252 0  0   ! After calling startup, the startup param (if any) is p'aced in this buffer.
002252 0  0   ! The inputcommand procedure returns input commands here.
002252 0  0   LAYOUT       (.COMMANDBUF, 132 * 4 );          !This gets re-used by INBUF
002662 0  0
002662 0  0   ! I/O buffers and pointers:
002662 0  0   INT           .INBUF = COMMANDBUF;             !Re-use
002662 0  0   STRING        .PTRIN := @INBUF '<<' 1;
002662 0  0
002662 0  0   INT           .OUTBUF [0:66];                  !output
002765 0  0   STRING        .PTROUT := @OUTBUF '<<' 1;
002765 0  0
002765 0  0   ! The print procedure will perform page breaking if the paging flag is set.
002765 0  0   ! The following controls this action.
002765 0  0   LITERAL        LINESPERPAGETERM    = 22;       ! if outfile is a terminal (need
002765 0  0                                                  ! 1 line for page break prompt)
002765 0  0   LITERAL        LINESPERPAGEPRINTER = 59;       ! if outfile is printer or process
002765 0  0   INT            PAGING := -1;                   ! <> if page break enabled
002765 0  0   INT            PAGE := 1;                      ! print maintains cur pg. # here
002765 0  0   INT            LINES := 0;                     ! counts lines printed on page
002765 0  0   INT            LINESPERPAGE := LINESPERPAGEPRINTER;
002765 0  0
002765 0  0   ! At page break time print checks pagehead.fadr, if <> then pagehead contains
002765 0  0   ! parameters to be passed to the fprint procedure.
002765 0  0   STRUCT         PAGEHEAD^TEMPLATE ( * );        ! user initialized page header
002765 0  0                  BEGIN                           ! not used if fadr = 0
002765 0  1                  INT  FADR;                      ! pointer to fprint format string
002765 0  1                  INT  P [ 0:14 ];                ! parms for format string
002765 0  1                  END;
002765 0  0   STRUCT        .PAGEHEAD ( PAGEHEAD^TEMPLATE );
003005 0  0
003005 0  0   ! The following defines are used to determine the actual open access and
003005 0  0   ! exclusion mode for a file based upon a logical mode and device type word.
003005 0  0   DEFINE         OPENACCESSTYPE ( LOGICALACCESS, DTYPE ) =
003005 0  0                  ( IF DTYPE.<4:9> = 6 THEN !term!
003005 0  0                      READWRITE^ACCESS
003005 0  0                    ELSE
003005 0  0                      ( LOGICALACCESS )
003005 0  0                  )#;
003005 0  0   DEFINE         OPENEXCLUSIONTYPE ( LOGICALEXCLUSION, DTYPE ) =
003005 0  0                  ( CASE ( DTYPE ).<4:9> OF
003005 0  0                    BEGIN
003005 0  0                    !process! SHARE;
003005 0  0                    !oper    ! SHARE;
003005 0  0                    !receive! EXCLUSIVE;
003005 0  0                    !disc    ! ( LOGICALEXCLUSION );
003005 0  0                    !tape    ! EXCLUSIVE;
003005 0  0                    !printer! EXCLUSIVE;
003005 0  0                    !term    ! SHARE;
003005 0  0                    !comm    ! ( LOGICALEXCLUSION );
003005 0  0                    !card    ! EXCLUSIVE;
003005 0  0                    OTHERWISE ( LOGICALEXCLUSION ); !?!
003005 0  0                    END
```

```
 100.      003005 0  0                   )#;
 101.      003005 0  0    END       BLOCK;
 102.      003005 0  0    ?SECTION INOUTSTUFF^END
  13.      003005 0  0    ?NOLIST, SOURCE EXTDECS ( INITIALIZER, SET^FILE, CHECK^FILE, OPEN^FILE,
  22.      000000 0  0    ?NOLIST, SOURCE PGP
  24.      000000 0  0    ?SEARCH         OGP
Search file:  $OVER.T9618C00.OGP  12FEB87 - 12:30:14
  25.      000000 0  0    ?NOLIST, SOURCE PFPRINT  ( FPRINT, FPRINTABORT )
  27.      000000 0  0    ?SEARCH         OFPRINT
Search file:  $OVER.T9618C00.OFPRINT  12FEB87 - 12:30:49
  28.      000000 0  0    ?SOURCE  sversion( version^siolib )
Source file:  [1]  $OVER.T9618C00.SVERSION  12FEB87 - 12:20:47
  44.      000000 0  0    ?SECTION VERSION^SIOLIB
  45.      000000 0  0    PROC T9618C00^15JUL87^SIOLIB^11F7;
  46.      000000 1  0    BEGIN END;
  29.      000000 0  0    ?SOURCE  SSIOLIB
Source file:  [1]  $OVER.T9618C00.SSIOLIB  02OCT86 - 13:44:33
   2.      000000 0  0    ?SECTION  STARTUPSSTARTUPPROC
   3.      000000 0  0    !
   4.      000000 0  0    PROC !prv! STARTUPSSTARTUPPROC ( R, P, MSG, MSGLEN, M ) VARIABLE;
   5.      000000 1  0    !
   6.      000000 1  0      INT .R, .P, .MSG,  MSGLEN,  M;
   7.      000000 1  0      !
   8.      000000 1  0      ! <startupproc> passed to initializer, used by startup (below).
   9.      000000 1  0      !
  10.      000000 1  0      BEGIN
  11.      000000 1  1      INT .STARTUPMSG ( STARTUPMSG^TEMPLATE ) = MSG;
  12.      000000 1  1
  13.      000000 1  1      DEFAULTS.WORD ':=' STARTUPMSG.DEFAULTS.WORD FOR WLEN ( DEFAULTS );
  14.      000005 1  1      COMMANDBUF.WORD ':=' STARTUPMSG.PARAM.WORD FOR
  15.      000005 1  1                           ROUNDTOWORD ( MSGLEN ) - WOFFSET ( STARTUPMSG.PARAM );
  16.      000015 1  1
  17.      000015 1  1      END; ! startupsstartupproc

M                                 Variable        INT          Direct        L-004
MSG                               Variable        INT          Indirect      L-006
MSGLEN                            Variable        INT          Direct        L-005
P                                 Variable        INT          Indirect      L-007
R                                 Variable        INT          Indirect      L-010
STARTUPMSG                        Variable,1122   STRUCT-I     Indirect      L-006

  18.      000000 0  0    ?SECTION  STARTUPPROC^END
  20.      000000 0  0    ?SECTION  STARTUP
  21.      000000 0  0    PROC !prv! STARTUP;
  22.      000000 1  0      ! Call initializer to get the startup and assign messages,
  23.      000000 1  0      ! initialize the inoutstuff block, and open the term, in, and out files.
  24.      000000 1  0      BEGIN
  25.      000000 1  1      INT      .TERMNAME;              ! points to home term name
  26.      000000 1  1      INT      .INNAME;                ! points to in file name
  27.      000000 1  1      INT      .OUTNAME;               ! points to out file name
  28.      000000 1  1      INT       INTYPE;                ! in file device type
  29.      000000 1  1      INT       OUTTYPE;               ! out file device type
  30.      000000 1  1      INT       RECLEN;                ! deviceinfo record length
  31.      000000 1  1      LAYOUT   ( LFN, 8 );             ! logical file name
  32.      000000 1  1      INT       INTERACTIVE;           ! TRUE if interactive
  33.      000000 1  1      STRING    INCANTBEOUT = 'P' :=
```

```
000000 1 1             ["IN and OUT files may not be the same",0];
000023 1 1
000023 1 1     ! set logical file names for assign messages on in or out (not term) file
000023 1 1     LFN.BYTE ':=' [ 7, "RECEIVE" ];
000034 1 1     CALL SET^FILE ( RCVFCB, ASSIGN^LOGICALFILENAME, @LFN.WORD );
000044 1 1
000044 1 1     LFN.BYTE ':=' [ 4, "TERM" ];
000054 1 1     CALL SET^FILE ( TERMFCB, ASSIGN^LOGICALFILENAME, @LFN.WORD );
000064 1 1
000064 1 1     LFN.BYTE ':=' [ 2, "IN" ];
000074 1 1     CALL SET^FILE ( INFCB, ASSIGN^LOGICALFILENAME, @LFN.WORD );
000104 1 1
000104 1 1     LFN.BYTE ':=' [ 3, "OUT" ];
000114 1 1     CALL SET^FILE ( OUTFCB, ASSIGN^LOGICALFILENAME, @LFN.WORD );
000124 1 1
000124 1 1     ! pick up the startup and assign msgs, save file defaults and startup parm
000124 1 1     CALL INITIALIZER ( RUCB,, STARTUPSSTARTUPPROC );
000136 1 1
000136 1 1     CALL OPEN^FILE ( ALLFILES, TERMFILE );                 ! read/write, share
000147 1 1     @OUTFILE := @TERMFILE;                                 ! tentative!!
000151 1 1
000151 1 1     @TERMNAME := CHECK^FILE ( TERMFILE, FILE^FILENAME^ADDR );
000160 1 1     @INNAME   := CHECK^FILE ( INFCB   , FILE^FILENAME^ADDR );
000167 1 1     @OUTNAME  := CHECK^FILE ( OUTFCB  , FILE^FILENAME^ADDR );
000176 1 1     CALL DEVICEINFO ( INNAME ,  INTYPE, RECLEN  );
000203 1 1     CALL DEVICEINFO ( OUTNAME, OUTTYPE, RECLEN );
000210 1 1
000210 1 1     ! if in = out and are type process or terminal then we're interactive
000210 1 1     ! otherwise in may not = out
000210 1 1     IF ( INTERACTIVE := NOT FNAMECOMPARE ( INNAME, OUTNAME ) ) AND
000210 1 1       NOT ( INTYPE.DTYP^TYPE = DTYPPROC OR INTYPE.DTYP^TYPE = DTYPTERM ) THEN
000241 1 1       CALL FPRINTABORT ( @INCANTBEOUT );
000254 1 1
000254 1 1     IF NOT FNAMECOMPARE ( TERMNAME, INNAME ) THEN          ! in file is home term
000261 1 1       @INFCB := @TERMFCB
000261 1 1     ELSE                                                   ! open the in file
000264 1 1       BEGIN
000264 1 2       IF NOT INTERACTIVE THEN
000266 1 2         CALL SET^FILE ( INFCB, ASSIGN^OPENACCESS,
000266 1 2                         OPENACCESSTYPE ( READ^ACCESS, INTYPE ) );
000305 1 2       CALL SET^FILE ( INFCB, ASSIGN^OPENEXCLUSION,
000305 1 2                       OPENEXCLUSIONTYPE ( PROTECTED, INTYPE ) );
000365 1 2       CALL OPEN^FILE ( ALLFILES, INFCB, INFCBBLOCK, $LEN ( INFCBBLOCK ) );
000400 1 2       END;
000400 1 1
000400 1 1     IF INTERACTIVE THEN                                    ! out file is in file
000402 1 1       @OUTFCB := @INFCB
000402 1 1     ELSE
000405 1 1       IF NOT FNAMECOMPARE ( TERMNAME, OUTNAME ) THEN       ! out file is home term
000412 1 1         @OUTFCB := @TERMFCB
000412 1 1       ELSE                                                 ! open the out file
000415 1 1         BEGIN
000415 1 2         CALL SET^FILE ( OUTFCB, ASSIGN^OPENACCESS,
000415 1 2                         OPENACCESSTYPE ( WRITE^ACCESS, OUTTYPE ) );
000434 1 2         CALL SET^FILE ( OUTFCB, ASSIGN^OPENEXCLUSION,
000434 1 2                         OPENEXCLUSIONTYPE ( PROTECTED, OUTTYPE ) );
```

```
000514 1  2        CALL OPEN^FILE ( ALLFILES, OUTFCB, OUTFCBBLOCK, $LEN ( OUTFCBBLOCK ) );
000527 1  2        CALL SET^FILE ( INFCB, SET^DUPFILE, @OUTFCB );
000537 1  2        END;
000537 1  1
000537 1  1    @INFILE := @INFCB;
000541 1  1    @OUTFILE := @OUTFCB;
000543 1  1    CALL SET^FILE ( ALLFILES, SET^ERRORFILE, @OUTFCB );
000553 1  1
000553 1  1    LINESPERPAGE := IF OUTTYPE.DTYP^TYPE = DTYPTERM
000553 1  1                    THEN LINESPERPAGETERM ELSE LINESPERPAGEPRINTER;
000564 1  1
000564 1  1    IF NOT INTERACTIVE THEN
000566 1  1      CALL SET^FILE ( INFILE, SET^DUPFILE, @OUTFILE );
000576 1  1    CALL SET^FILE ( INFILE, SET^READ^TRIM, 0 );
000605 1  1
000605 1  1    END; ! proc startup

INCANTBEOUT                Variable      STRING      Direct      P+000
INNAME                     Variable      INT         Indirect    L+002
INTERACTIVE                Variable      INT         Direct      L+013
INTYPE                     Variable      INT         Direct      L+004
LFN                        Variable,10   STRUCT      Direct      L+007
  1 WORD                        0,2      INT         Direct
  1 BYTE[0:7]                   0,1      STRING      Direct
OUTNAME                    Variable      INT         Indirect    L+003
OUTTYPE                    Variable      INT         Direct      L+005
RECLEN                     Variable      INT         Direct      L+006
TERMNAME                   Variable      INT         Indirect    L+001

000000 0  0  ?SECTION  STARTUP^END
000000 0  0  ?SECTION  ABORT
000000 0  0  !
000000 0  0  PROC !prv! ABORT;
000000 1  0  !
000000 1  0    FORWARD;
000000 0  0  ?SECTION  TERMINATE
000000 0  0  !
000000 0  0  PROC !prv! TERMINATE;
000000 1  0  !
000000 1  0    !
000000 1  0    ! close all files (particularly needed if any are edit type files) and
000000 1  0    ! stop or, if the abort entry point is used, abend
000000 1  0    !
000000 1  0    BEGIN
000000 1  1    ENTRY  ABORT;
000000 1  1    INT    FATE := 1;
000000 1  1
000000 1  1    FATE := 0;
000007 1  1    ABORT;
000011 1  1
000011 1  1    CALL CLOSE^FILE ( ALLFILES );
000017 1  1
000017 1  1    IF FATE THEN CALL ABEND ELSE CALL STOP;
000034 1  1
000034 1  1    END;
```

```
ABORT                       Entry                      %000010
FATE                        Variable      INT          Direct          L+001

   134.  000000 0  0  ?SECTION  TERMINATE^END
   135.  000000 0  0  ?SECTION  PRINTABORT
   136.  000000 0  0  !
   137.  000000 0  0  INT PROC !prv! PRINTABORT ( BUF, LEN );
   138.  000000 1  0  !
   139.  000000 1  0    INT .BUF;
   140.  000000 1  0    INT  LEN;
   141.  000000 1  0    !
   142.  000000 1  0    ! an entry into print, below.  when used, calls the procedure abort before
   143.  000000 1  0    ! returning to the caller.
   144.  000000 1  0    !
   145.  000000 1  0    FORWARD;

BUF                         Variable      INT          Indirect        L-004
LEN                         Variable      INT          Direct          L-003

   146.  000000 0  0  ?SECTION  PRINTABORT^END
   148.  000000 0  0  ?SECTION  PRINT
   149.  000000 0  0  !
   150.  000000 0  0  INT PROC !prv! PRINT ( BUF, LEN );
   151.  000000 1  0  !
   152.  000000 1  0    INT .BUF;
   153.  000000 1  0    INT  LEN;
   154.  000000 1  0    !
   155.  000000 1  0    ! print buf for len bytes on the list file and return the error status or,
   156.  000000 1  0    ! if the printabort entry is used, call abort.
   157.  000000 1  0    ! if the paging flag is set, count lines and perform page breaking and
   158.  000000 1  0    ! optional pageheader printing
   159.  000000 1  0    !
   160.  000000 1  0    BEGIN
   161.  000000 1  1    ENTRY         PRINTABORT;        ! entry to abort after printing
   162.  000000 1  1    INT           FATE := 1;         ! what to do when finished: 0=return 1=abort
   163.  000000 1  1    DEFINE        EXIT ( X ) =       ! how to finish
   164.  000000 1  1                  BEGIN
   165.  000000 1  1                  STACK ( X );
   166.  000000 1  1                  IF FATE THEN CALL ABORT;
   167.  000000 1  1                  RETURN;
   168.  000000 1  1                  END#;
   169.  000000 1  1    INT           ERROR;             ! handy error stash
   170.  000000 1  1    INT           COUNTREAD;         ! count read from page break prompt
   171.  000000 1  1    LAYOUT     (  PROMPT, 18 );      ! page break prompt buffer
   172.  000000 1  1    LITERAL       FEBREAK = 111;     ! error code for break
   173.  000000 1  1    DEFINE        P^ = PAGEHEAD.P#;  ! page header parameter
   174.  000000 1  1
   175.  000000 1  1    FATE := 0;
   176.  000010 1  1    PRINTABORT:
   177.  000012 1  1
   178.  000012 1  1    IF CHECK^BREAK ( ALLFILES ) THEN EXIT ( FEBREAK );
   179.  000025 1  1
   180.  000025 1  1    IF LINES '+' 1 '>' LINESPERPAGE THEN
   181.  000032 1  1      BEGIN                                      ! new page
   182.  000032 1  2      LINES := 0;
   183.  000034 1  2      PAGE := PAGE '+' 1;
   184.  000037 1  2      IF PAGING THEN
```

```
185.   000041 1  2        BEGIN
186.   000041 1  3        IF CHECK^FILE ( OUTFILE, FILE^FILEINFO ).DTYP^TYPE = DTYPTERM AND
187.   000041 1  3           CHECK^FILE ( OUTFILE, FILE^OPENACCESS ) = READWRITE^ACCESS THEN
188.   000064 1  3          BEGIN                                    ! page break terminal
189.   000064 1  4          PROMPT.BYTE ':=' "Want more ([Y]|N)?";
190.   000074 1  4          IF NOT ( ERROR := READ^FILE ( OUTFILE, PROMPT, COUNTREAD,
191.   000074 1  4                                        $LEN ( PROMPT ), 1 )
192.   000074 1  4                 ) AND COUNTREAD THEN
193.   000112 1  4             CALL WRITE^FILE ( OUTFILE, BUF, 0 );! need carriage return
194.   000123 1  4          IF ERROR OR COUNTREAD AND UPCASE ( PROMPT.BYTE ) <> "Y" THEN
195.   000143 1  4             BEGIN                                 ! stop
196.   000143 1  5             CALL CHECK^BREAK ( ALLFILES );        ! flush pending breaks
197.   000147 1  5             EXIT ( IF ERROR THEN ERROR ELSE FEBREAK );
198.   000162 1  5             END;
199.   000162 1  4          PROMPT.BYTE ':=' [ %33, "A", %33, "K", %33, "A" ];
200.   000172 1  4          CALL WRITE^FILE ( OUTFILE, PROMPT, 6 );! cursor up, eol, cursor up
201.   000203 1  4          END;
202.   000203 1  3        IF PAGEHEAD.FADR THEN                       ! user has a page header
203.   000205 1  3          IF ( ERROR := FPRINT ( PAGEHEAD.FADR,     ! recurse to print it
204.   000205 1  3                                 P^[0] , P^[1] , P^[2] , P^[3] , P^[4]  ,
205.   000205 1  3                                 P^[5] , P^[6] , P^[7] , P^[8] , P^[9]  ,
206.   000205 1  3                                 P^[10], P^[11], P^[12], P^[13], P^[14] )
207.   000205 1  3             ) THEN EXIT ( ERROR );
208.   000267 1  3        END;
209.   000267 1  2      END;
210.   000267 1  1
211.   000267 1  1    ! print a line
212.   000267 1  1    ! if paging and printing line 1 do a page eject
213.   000267 1  1    LINES := LINES '+' 1;
214.   000272 1  1    EXIT ( WRITE^FILE ( OUTFILE, BUF, LEN, , NOT ( PAGING AND LINES = 1 ) ) );
215.   000321 1  1
216.   000321 1  1    END;

BUF                          Variable      INT         Indirect      L-004
COUNTREAD                    Variable      INT         Direct        L+003
ERROR                        Variable      INT         Direct        L+002
EXIT                         Define                     BEGIN STACK (  $1 ); IF FATE THEN CALL ABORT; RETURN; END
FATE                         Variable      INT         Direct        L+001
FEBREAK                      Literal       INT         %000157
LEN                          Variable      INT         Direct        L-003
PRINTABORT                   Entry         INT         %000011
PROMPT                       Variable,22   STRUCT      Direct        L+004
  1 WORD                           0,2     INT         Direct
  1 BYTE[0:17]                     0,1     STRING      Direct
P^                           Define                    PAGEHEAD.P

217.   000000 0  0   ?SECTION  PRINT^END
219.   000000 0  0   ?SECTION  PRINTBANNER
220.   000000 0  0   INT PROC !prv! PRINTBANNER ( BANNERADR ) VARIABLE;
221.   000000 1  0     INT  BANNERADR; ! optional byte addr of 'p' string containing program banner
222.   000000 1  0     ! prints the text in the 'p' string at banneradr (up to 132 characters),
223.   000000 1  0     ! if supplied; the text is terminated with a null.
224.   000000 1  0     ! prints the process' system and crtpid and the current date and time
225.   000000 1  0     ! return value reflects any print error
226.   000000 1  0     BEGIN
227.   000000 1  1     LAYOUT  ( .BUF, 132 );                         ! print buffer
```

```
000000 1  1    STRING .BUFP;                                 ! buffer pointer
000000 1  1    STRING .PTR = 'P' := 0;                       ! 'p' pointer
000001 1  1    INT     L;                                    ! byte length of text
000001 1  1    STRUCT .PPDENT ( PPDENT^TEMPLATE );           ! my crtpid/ppd entry
000001 1  1    DEFINE  PIDCPU = <4:7>#;
000001 1  1    DEFINE  PIDPIN = <8:15>#;
000001 1  1    STRUCT .FNAME ( FILENAME^TEMPLATE );          ! object file name
000001 1  1    STRUCT .OBJFILEHDR ( OBJFILEHDR^TEMPLATE );   ! object file header
000001 1  1    INT     ERROR;
000001 1  1    DEFINE  PRINTBUF ( L ) =
000001 1  1            IF ( ERROR := PRINT ( BUF, L ) ) THEN RETURN ERROR#;
000001 1  1
000001 1  1    SUBPROC PUTUSER ( USERID );
000001 2  1      INT USERID;
000001 2  1      ! move the user id (and user name) to the print buffer
000001 2  1      BEGIN
000001 2  2      BUFP [ NOUT ( BUFP, USERID.USERIDGROUP ) ] ':=' "," -> @BUFP;
000022 2  2      BUFP [ NOUT ( BUFP, USERID.USERIDUSER ) ] ':=' " (" -> @BUFP;
000043 2  2      BUFP [ USERIDCOLLAPSE ( BUFP, USERID ) ] ':=' ")" -> @BUFP;
000061 2  2      END;

USERID                 Variable       INT              Direct          S-001

000070 1  1
000070 1  1    SUBPROC PUTCOMPILETIME;
000070 2  1      ! move the object file name in fname and its compile time or (if read error)
000070 2  1      ! its last modified time into the print buffer
000070 2  1      BEGIN
000070 2  2      INT  FILE;
000070 2  2
000070 2  2      @BUFP := @BUFP [ FNAMECOLLAPSE ( FNAME, BUFP ) ];
000100 2  2      DO    CALL OPEN ( FNAME, FILE, !read only, share! %2000 )
000111 2  2      UNTIL NOT ( ( ERROR := <> ) AND FILEERROR ( -1 ) );
000123 2  2      IF NOT ERROR THEN
000125 2  2        BEGIN
000125 2  3        DO    CALL READ ( FILE, OBJFILEHDR, $LEN ( OBJFILEHDR ) )
000135 2  3        UNTIL NOT ( ( ERROR := <> ) AND FILEERROR ( -1 ) );
000147 2  3        CALL CLOSE ( FILE );
000154 2  3        END;
000154 2  2      IF ERROR THEN
000156 2  2        BEGIN
000156 2  3        BUFP ':=' " modified ";
000165 2  3        DO    CALL FILEINFO ( ,, FNAME,....., OBJFILEHDR.BINDTIME )
000203 2  3        UNTIL NOT ( ( ERROR := <> ) AND FILEERROR ( -1 ) );
000216 2  3        END
000216 2  2      ELSE
000217 2  2        BUFP ':=' " compiled ";
000226 2  2      IF ERROR THEN RETURN;
000233 2  2      @BUFP := @BUFP [ MTIMESTAMPCOLLAPSE ( BUFP [ 10 ], OBJFILEHDR.BINDTIME )
000233 2  2                              + 10 ];
000246 2  2      END;

FILE                   Variable       INT              Direct          S-000
```

```
000262 1  1    ! print the banner text
000262 1  1    IF $PARAM ( BANNERADR ) THEN
000300 1  1      BEGIN
000300 1  2      USE X;
000300 1  2      SCAN PTR | X := BANNERADR '-' @PTR | UNTIL 0 -> L;
000321 1  2      BUF.BYTE ':=' PTR [ X ] FOR ( L := $MIN ( L '-' @PTR [ X ], $LEN (BUF) ) );
000352 1  2      DROP X;
000352 1  2      PRINTBUF ( L );
000362 1  2      END;
000362 1  1
000362 1  1    ! print the program file name and compile time
000362 1  1    @BUFP := @BUF.BYTE;
000365 1  1    IF $PARAM ( BANNERADR ) THEN BUFP ':=' "  " -> @BUFP;
000377 1  1    BUFP ':=' "Program " -> @BUFP;
000407 1  1    CALL PROGRAMFILENAME ( FNAME );
000412 1  1    CALL PUTCOMPILETIME;
000413 1  1    PRINTBUF ( @BUFP '-' @BUF.BYTE );
000431 1  1
000431 1  1    ! if running with a library, print its name and compile time
000431 1  1    IF NOT ( PROCESSINFO( MYPID,............., FNAME ) OR FNAME.BYTE = " " ) THEN
000453 1  1      BEGIN
000453 1  2      BUF.BYTE ':=' "  Library " -> @BUFP;
000464 1  2      CALL PUTCOMPILETIME;
000465 1  2      PRINTBUF ( @BUFP '-' @BUF.BYTE );
000501 1  2      END;
000501 1  1
000501 1  1    ! print the "system name.process id" and run time
000501 1  1    BUF.BYTE ':=' "  Process " -> @BUFP;
000512 1  1    CALL GETCRTPID ( MYPID, PPDENT );
000516 1  1    IF PPDENT.CRT.BYTE = "$" THEN                    ! named process
000523 1  1      BEGIN
000523 1  2      BUFP [ SYSIDCOLLAPSE ( BUFP ) ] ':=' "." -> @BUFP;
000541 1  2      BUFP [ CRTPIDCOLLAPSE ( BUFP ) ] ':=' " (" -> @BUFP;
000557 1  2      CALL LOOKUPPROCESSNAME ( PPDENT );
000562 1  2      BUFP [ NOUT ( BUFP, PPDENT.PID1.PIDCPU ) ] ':=' "," -> @BUFP;
000605 1  2      @BUFP := @BUFP [ NOUT ( BUFP, PPDENT.PID1.PIDPIN ) ];
000621 1  2      IF PPDENT.PID2 THEN                            ! backup process
000624 1  2        BEGIN
000624 1  3        BUFP := "/";
000626 1  3        BUFP [ NOUT ( BUFP [ 1 ], PPDENT.PID2.PIDCPU ) ] ':=' "," -> @BUFP;
000651 1  3        @BUFP := @BUFP [ NOUT ( BUFP, PPDENT.PID2.PIDPIN ) ];
000665 1  3        END;
000665 1  2      BUFP := ")"; @BUFP := @BUFP [ 1 ];
000672 1  2      END
000672 1  1    ELSE                                             ! unnamed process
000700 1  1      @BUFP := @BUFP [ CRTPIDCOLLAPSE ( BUFP ) ];
000710 1  1    BUFP ':=' " run " -> @BUFP;
000720 1  1    @BUFP := @BUFP [ MTIMESTAMPCOLLAPSE ( BUFP ) ];
000730 1  1    PRINTBUF ( @BUFP '-' @BUF.BYTE );
000744 1  1
000744 1  1    ! print the user running the process and, if progid, user process running as
000744 1  1    BUF.BYTE ':=' "  by user " -> @BUFP;
000755 1  1    CALL PUTUSER ( CREATORACCESSID );
000760 1  1    IF CREATORACCESSID <> PROCESSACCESSID THEN
000767 1  1      BEGIN
000767 1  2      BUFP ':=' " as " -> @BUFP;
000777 1  2      CALL PUTUSER ( PROCESSACCESSID );
```

```
 334.   001002 1  2       END;
 335.   001002 1  1     PRINTBUF ( @BUFP '-' @BUF.BYTE );
 336.   001020 1  1
 337.   001020 1  1     END; ! proc printbanner

BANNERADR                     Variable        INT          Direct        L-004
BUF                           Variable,204    STRUCT       Indirect      L+001
  | WORD                            0,2       INT          Direct
  | BYTE[0:131]                     0,1       STRING       Direct
BUFP                          Variable        STRING       Indirect      L+002
ERROR                         Variable        INT          Direct        L+007
FNAME                         Variable,30     STRUCT       Indirect      L+005
L                             Variable        INT          Direct        L+003
OBJFILEHDR                    Variable,1000   STRUCT       Indirect      L+006
PIDCPU                        Define                       <4:7>
PIDPIN                        Define                       <8:15>
PPDENT                        Variable,22     STRUCT       Indirect      L+004
PRINTBUF                      Define                       IF ( ERROR := PRINT ( BUF,  $1 ) ) THEN RETURN ERROR
PTR                           Variable        STRING       Indirect      P+000
PUTCOMPILETIME                Subproc                      %000070
PUTUSER                       Subproc                      %000001

 338.   000000 0  0   ?SECTION  PRINTBANNER^END

 340.   000000 0  0   ?SECTION  PRINTHELP
 341.   000000 0  0   INT PROC !prv! PRINTHELP ( HELPTEXTADR, KEY, KEYLEN ) VARIABLE;
 342.   000000 1  0     INT         HELPTEXTADR;     ! required address of 'p' string help text
 343.   000000 1  0     STRING     .KEY;             ! optional help text key (e.g. command)
 344.   000000 1  0     INT         KEYLEN;          ! optional byte length of key
 345.   000000 1  0     ! Print the "helptext" in the 'p' string array at "helptextadr".
 346.   000000 1  0     !
 347.   000000 1  0     ! Each and every line in the help text must be terminated with a "^"
 348.   000000 1  0     ! character.  The help text array is terminated with a null byte.
 349.   000000 1  0     !
 350.   000000 1  0     ! The help text may contain lines with keywords, in upper case, delimited
 351.   000000 1  0     ! by "~" (curly squiggle) characters.  A line of keywords starts a section
 352.   000000 1  0     ! of text associated with the keywords; the section ends at the next "~" or
 353.   000000 1  0     ! null.
 354.   000000 1  0     !
 355.   000000 1  0     ! If key is not supplied or is empty, the start of the helptext up to the
 356.   000000 1  0     ! first "~" is printed.  Key ends with a null unless keylen is given.
 357.   000000 1  0     ! Otherwise, the help text is searched for a matching keyword, and the
 358.   000000 1  0     ! associated help text section is displayed.
 359.   000000 1  0     !
 360.   000000 1  0     ! The next address in key (that of the null or ";") is returned.
 361.   000000 1  0     BEGIN
 362.   000000 1  1     INT         I := 0;                ! help index
 363.   000000 1  1     INT         L := 0;                !      line length
 364.   000000 1  1     INT         N;                     !      next address
 365.   000000 1  1     LAYOUT      ( BUF, 132 );          ! output buffer
 366.   000000 1  1     STRING     .BUFP := @BUF.BYTE;
 367.   000000 1  1     STRING     .HTP = 'P' := 0;        ! handy self pointer
 368.   000001 1  1     INT         HTA = HELPTEXTADR;     ! shorthand
 369.   000001 1  1     INT         HTO := HTA '-' @HTP;   ! offset of help text from self pointer
 370.   000001 1  1     DEFINE      HT ( X ) =             ! accesses byte x of the help text
 371.   000001 1  1                 HTP [ HTO '+' ( X ) ]#;
 372.   000001 1  1
```

```
 373.   000001 1  1    INT SUBPROC NOTFOUND;
 374.   000001 2  1      BEGIN
 375.   000001 2  2      ENTRY       DONE;
 376.   000001 2  2
 377.   000001 2  2      BUF.WORD ':=' "No help is available.";
 378.   000007 2  2      CALL PRINT ( BUF, 21 );
 379.   000014 2  2      KEYLEN := 0;
 380.   000016 2  2      DONE:
 381.   000016 2  2      RETURN IF $PARAM ( KEY ) THEN @KEY [ KEYLEN ] ELSE 0;
 382.   000027 2  2      END;

DONE                        Entry          INT            %000016

 383.   000042 1  1
 384.   000042 1  1    ! if key supplied, find matching key in help text
 385.   000042 1  1    IF $PARAM ( KEY ) THEN
 386.   000061 1  1      BEGIN
 387.   000061 1  2      IF NOT $PARAM ( KEYLEN ) THEN
 388.   000064 1  2        BEGIN
 389.   000064 1  3        SCAN KEY UNTIL 0 -> KEYLEN;
 390.   000070 1  3        KEYLEN := KEYLEN '-' @KEY;
 391.   000074 1  3        END;
 392.   000074 1  2      IF KEYLEN THEN
 393.   000076 1  2        BEGIN
 394.   000076 1  3        BUFP ':=' KEY FOR KEYLEN;
 395.   000102 1  3        CALL SHIFTSTRING ( BUFP, KEYLEN, 0 );
 396.   000107 1  3        DO
 397.   000107 1  3          BEGIN
 398.   000107 1  4          SCAN HT ( I '+' L '+' 1 ) UNTIL "~" -> N;
 399.   000124 1  4          IF $CARRY THEN RETURN NOTFOUND;
 400.   000127 1  4          SCAN HT ( I := N '-' HTA '+' 1 ) UNTIL "~" -> N;
 401.   000145 1  4          IF $CARRY THEN RETURN NOTFOUND;
 402.   000150 1  4          END
 403.   000150 1  3        UNTIL ( L := N '-' @HT ( I ) ) = KEYLEN AND BUFP = HT ( I ) FOR L;
 404.   000200 1  3        SCAN HT ( I ) UNTIL "^" -> N;
 405.   000214 1  3        I := N '-' HTA '+' 1;
 406.   000221 1  3        END;
 407.   000221 1  2      END;
 408.   000221 1  1
 409.   000221 1  1    ! display help text lines
 410.   000221 1  1    WHILE HT ( I ) AND HT ( I ) <> "~" DO
 411.   000232 1  1      BEGIN
 412.   000232 1  2      SCAN HT ( I ) UNTIL "^" -> N;
 413.   000246 1  2      BUFP ':=' HT ( I ) FOR ( L := N '-' @HT ( I ) );
 414.   000275 1  2      IF PRINT ( BUF, L ) THEN RETURN DONE;
 415.   000306 1  2      I := I + L + 1;
 416.   000313 1  2      END;
 417.   000314 1  1
 418.   000314 1  1    RETURN DONE;
 419.   000316 1  1
 420.   000316 1  1    END; ! proc printhelp

BUF                         Variable,204   STRUCT         Direct       L+004
  1 WORD                           0,2     INT            Direct
  1 BYTE[0:131]                    0,1     STRING         Direct
BUFP                        Variable       STRING         Indirect     L+106
```

```
DONE                             Subproc    INT      %000016
HELPTEXTADR                      Variable   INT      Direct     L-006
HT                               Define              HTP [ HTO '+' ( $1 ) ]
HTA                              Variable   INT      Direct     L-006
HTO                              Variable   INT      Direct     L+107
HTP                              Variable   STRING   Indirect   P+000
I                                Variable   INT      Direct     L+001
KEY                              Variable   STRING   Indirect   L-005
KEYLEN                           Variable   INT      Direct     L-004
L                                Variable   INT      Direct     L+002
N                                Variable   INT      Direct     L+003
NOTFOUND                         Subproc    INT      %000001

  421.   000000 0  0   ?SECTION  PRINTHELP^END
ENTRY POINT MAP BY NAME

SP  PEP  BASE    LIMIT   ENTRY   ATTRS  NAME                              DATE     TIME  LANGUAGE SOURCE FILE

00  006  000667  000723  000677  E      ABORT                             12FEB87  12:31 TAL      $OVER.T9618C00.SSIOLIB
00  022  004445  004506  004445  V      CRTPIDCOLLAPSE                    12FEB87  12:29 TAL      $OVER.T9618C00.SGP
00  013  002656  004015  002707  V      FPRINT                            12FEB87  12:30 TAL      $OVER.T9618C00.SFPRINT
00  014  002656  004015  002713  EV     FPRINTABORT                       12FEB87  12:30 TAL      $OVER.T9618C00.SFPRINT
00  020  004143  004364  004173  V      MTIMESTAMPCOLLAPSE                12FEB87  12:29 TAL      $OVER.T9618C00.SGP
00  015  004016  004062  004022  V      NOUT                              12FEB87  12:29 TAL      $OVER.T9618C00.SGP
00  023  004507  004552  004513  V      NOUT32                            12FEB87  12:29 TAL      $OVER.T9618C00.SGP
00  024  004507  004552  004517  EV     NOUT32M                           12FEB87  12:29 TAL      $OVER.T9618C00.SGP
00  025  004553  005136  004636  V      NOUT64                            12FEB87  12:29 TAL      $OVER.T9618C00.SGP
00  026  004553  005136  004646  EV     NOUT64M                           12FEB87  12:29 TAL      $OVER.T9618C00.SGP
00  016  004016  004062  004026  EV     NOUTM                             12FEB87  12:29 TAL      $OVER.T9618C00.SGP
00  007  000724  001260  000731         PRINT                             12FEB87  12:31 TAL      $OVER.T9618C00.SSIOLIB
00  010  000724  001260  000735  E      PRINTABORT                        12FEB87  12:31 TAL      $OVER.T9618C00.SSIOLIB
00  011  001261  002337  001543  V      PRINTBANNER                       12FEB87  12:31 TAL      $OVER.T9618C00.SSIOLIB
00  012  002340  002655  002402  V      PRINTHELP                         12FEB87  12:31 TAL      $OVER.T9618C00.SSIOLIB
00  004  000046  000666  000071         STARTUP                           12FEB87  12:31 TAL      $OVER.T9618C00.SSIOLIB
00  003  000030  000045  000030  V      STARTUPSSTARTUPPROC               12FEB87  12:31 TAL      $OVER.T9618C00.SSIOLIB
00  021  004365  004444  004365  V      SYSIDCOLLAPSE                     12FEB87  12:29 TAL      $OVER.T9618C00.SGP
00  002  000027  000027  000027         T9618C00^15JUL87^SIOLIB^11F7      12FEB87  12:31 TAL      $OVER.T9618C00.SVERSION
00  005  000667  000723  000673         TERMINATE                         12FEB87  12:31 TAL      $OVER.T9618C00.SSIOLIB
00  017  004063  004142  004106         USERIDCOLLAPSE                    12FEB87  12:29 TAL      $OVER.T9618C00.SGP
DATA BLOCK MAP BY NAME

BASE    LIMIT   TYPE    MODE  NAME                DATE     TIME   LANGUAGE  SOURCE FILE

000000          COMMON  WORD  #GLOBAL             12FEB87  12:31  TAL       $OVER.T9618C00.DSIOLIB
000027  003033  COMMON  WORD  .INOUTSTUFF         12FEB87  12:31  TAL       $OVER.T9618C00.DSIOLIB
000000  000026  COMMON  WORD  INOUTSTUFF          12FEB87  12:31  TAL       $OVER.T9618C00.DSIOLIB
ENTRY POINT MAP BY LOCATION
CODE SEGMENT 00

SP  PEP  BASE    LIMIT   ENTRY   ATTRS  NAME                              DATE     TIME  LANGUAGE SOURCE FILE

00  002  000027  000027  000027         T9618C00^15JUL87^SIOLIB^11F7      12FEB87  12:31 TAL      $OVER.T9618C00.SVERSION
00  003  000030  000045  000030  V      STARTUPSSTARTUPPROC               12FEB87  12:31 TAL      $OVER.T9618C00.SSIOLIB
00  004  000046  000666  000071         STARTUP                           12FEB87  12:31 TAL      $OVER.T9618C00.SSIOLIB
00  005  000667  000723  000673         TERMINATE                         12FEB87  12:31 TAL      $OVER.T9618C00.SSIOLIB
00  006  000667  000723  000677  E      ABORT                             12FEB87  12:31 TAL      $OVER.T9618C00.SSIOLIB
00  007  000724  001260  000731         PRINT                             12FEB87  12:31 TAL      $OVER.T9618C00.SSIOLIB
```

```
00  010  000724  001260  000735  E    PRINTABORT            12FEB87  12:31 TAL    $OVER.T9618C00.SSIOLIB
00  011  001261  002337  001543  V    PRINTBANNER           12FEB87  12:31 TAL    $OVER.T9618C00.SSIOLIB
00  012  002340  002655  002402  V    PRINTHELP             12FEB87  12:31 TAL    $OVER.T9618C00.SSIOLIB
00  013  002656  004015  002707  V    FPRINT                12FEB87  12:30 TAL    $OVER.T9618C00.SFPRINT
00  014  002656  004015  002713  EV   FPRINTABORT           12FEB87  12:30 TAL    $OVER.T9618C00.SFPRINT
00  015  004016  004062  004022  V    NOUT                  12FEB87  12:29 TAL    $OVER.T9618C00.SGP
00  016  004016  004062  004026  EV   NOUTM                 12FEB87  12:29 TAL    $OVER.T9618C00.SGP
00  017  004063  004142  004106       USERIDCOLLAPSE        12FEB87  12:29 TAL    $OVER.T9618C00.SGP
00  020  004143  004364  004173  V    MTIMESTAMPCOLLAPSE    12FEB87  12:29 TAL    $OVER.T9618C00.SGP
00  021  004365  004444  004365  V    SYSIDCOLLAPSE         12FEB87  12:29 TAL    $OVER.T9618C00.SGP
00  022  004445  004506  004445  V    CRTPIDCOLLAPSE        12FEB87  12:29 TAL    $OVER.T9618C00.SGP
00  023  004507  004552  004513  V    NOUT32                12FEB87  12:29 TAL    $OVER.T9618C00.SGP
00  024  004507  004552  004517  EV   NOUT32M               12FEB87  12:29 TAL    $OVER.T9618C00.SGP
00  025  004553  005136  004636  V    NOUT64                12FEB87  12:29 TAL    $OVER.T9618C00.SGP
00  026  004553  005136  004646  EV   NOUT64M               12FEB87  12:29 TAL    $OVER.T9618C00.SGP

Code size = 2655 words
  PEP = 23 words
  Procedures = 2632 words
  Gap at 32K = 0 words
  XEP = 31 words
Code area size = 3 pages
Resident code size = 0 pages
DATA BLOCK MAP BY LOCATION

 BASE    LIMIT   TYPE    MODE   NAME                        DATE     TIME   LANGUAGE  SOURCE FILE

 000000          COMMON  WORD   #GLOBAL                     12FEB87  12:31  TAL       $OVER.T9618C00.DSIOLIB
 000000  000026  COMMON  WORD   INOUTSTUFF                  12FEB87  12:31  TAL       $OVER.T9618C00.DSIOLIB
 000027  003033  COMMON  WORD   .INOUTSTUFF                 12FEB87  12:31  TAL       $OVER.T9618C00.DSIOLIB
BINDER - OBJECT FILE BINDER - T9621C00 - (09SEP86)   SYSTEM \PRUNE
Object file name is $OVER.T9618C00.osiolib
Object file timestamp is 12FEB87 12:31:01
Number of Binder errors = 0
Number of Binder warnings = 0
Primary data = 23 words
Secondary data = 1541 words
Code area size = 3 pages
Resident code size = 0 pages
Data area size = 3 pages
Extended data area size = 0 pages
Top of stack = 1564 words
Number of code segments  = 1 segment


The object file will run on a TNS/II, but may not run on a TNS
Errorfile file name is $OVER.T9618C00.ESIOLIB
Number of compiler errors =  0
Number of compiler warnings =  0
Maximum symbol table space used was = 59668 bytes
Number of source lines = 4209
Compile cpu time = 00:00:08
Total Elapsed time = 00:01:09
```

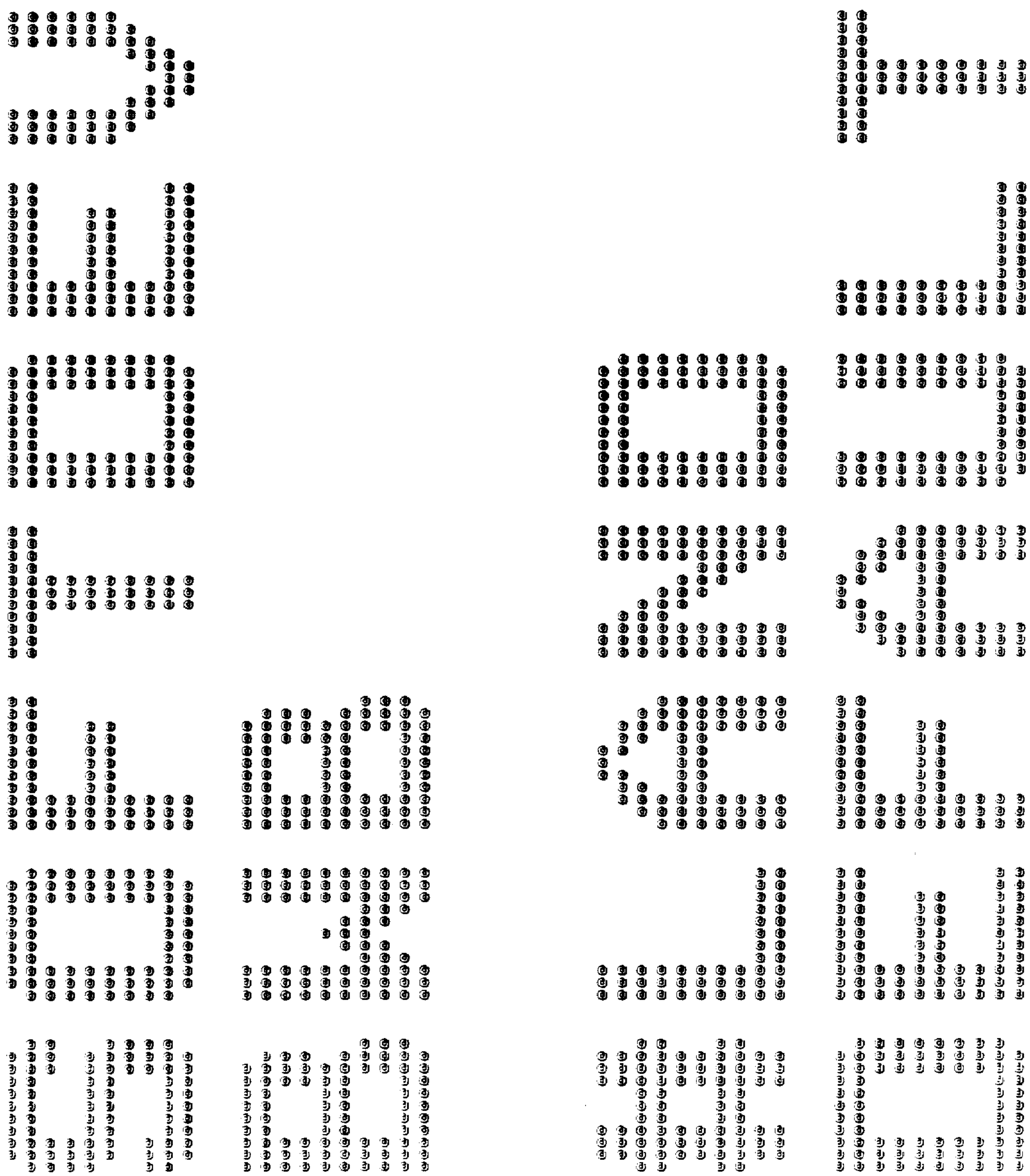

```
PAGE 1    $OVER.T9618C00.CSORT [1]

TAL - T9250B40 - (15SEP86)                          Source language: TAL - Target machine: Tandem NonStop II System
Date - Time : 07APR87 - 10:51:00                Default options: On (LIST,CODE,MAP,WARN,LMAP) - Off (ICODE,INNERLIST)

                     ? ERRORFILE esort,USEGLOBALS gglobal,SEARCH oglobal,NOCODE,SYMBOLS,NOGMAP,NOLMAP,NOFIXUP
UseGlobals file:  $OVER.T9618C00.GGLOBAL  02APR87 - 16:53:52
Search file:  $OVER.T9618C00.OGLOBAL  02APR87 - 16:55:07
     2.    000000 0  0    NAME     COVERCOM^SORT;
     3.    000000 0  0    ?NOLIST
    34.    000000 0  0    ?BEGINCOMPILATION
    35.    000000 0  0    ?SOURCE copytal                !Copyright notice
Source file:  [1]  $VIOLET.TOOLSC00.COPYTAL  18FEB87 - 09:37:02
     1.    000000 0  0    ! +-----------------------------------------------------------------+
     2.    000000 0  0    ! |                                                                 |
     3.    000000 0  0    ! |  Copyright (C) 1987 by TANDEM COMPUTERS INCORPORATED            |
     4.    000000 0  0    ! |                                                                 |
     5.    000000 0  0    ! |  Protected as an unpublished work.                              |
     6.    000000 0  0    ! |                                                                 |
     7.    000000 0  0    ! |  The computer program listings and specifications herein are   |
     8.    000000 0  0    ! |  the property of TANDEM COMPUTERS INCORPORATED and shall not be |
     9.    000000 0  0    ! |  reproduced, copied, or used, in whole or in part, for any      |
    10.    000000 0  0    ! |  reason without the written permission of TANDEM COMPUTERS     |
    11.    000000 0  0    ! |  INCORPORATED.                                                  |
    12.    000000 0  0    ! |                                                                 |
    13.    000000 0  0    ! |  The following are trademarks or service marks of TANDEM        |
    14.    000000 0  0    ! |  COMPUTERS INCORPORATED:                                        |
    15.    000000 0  0    ! |                                                                 |
    16.    000000 0  0    ! |  6AX        ENSCRIBE       INFOSAT*      PATHMAKER      TAL      |
    17.    000000 0  0    ! |  APEX/SQL   ENVOY          INSPECT       PCFORMAT       Tandem   |
    18.    000000 0  0    ! |  BINDER     ENVOYACP/XF    MEASURE       PERUSE         TGAL     |
    19.    000000 0  0    ! |  CROSSREF   EXCHANGE       MULTILAN      PS MAIL        THL      |
    20.    000000 0  0    ! |  DATABOLT   EXPAND         NonStop       PS TEXT EDIT   TIL      |
    21.    000000 0  0    ! |  DDL        FASTSORT       NonStop 1+    PS TEXT FORMAT TMF      |
    22.    000000 0  0    ! |  DYNABUS    FAXLINK        NonStop EXT   RDF            TRANSFER |
    23.    000000 0  0    ! |  DYNAMITE   FOX            NonStop EXT10 SAFE           WORDLINK |
    24.    000000 0  0    ! |  ENABLE     FOXII          NonStop EXT25 SAFEGUARD      XL8      |
    25.    000000 0  0    ! |  ENCOMPASS  GUARDIAN       NonStop II    SAFE-T-NET     XRAY     |
    26.    000000 0  0    ! |  ENCORE     GUARDIAN 90    NonStop TXP   T-TEXT                  |
    27.    000000 0  0    ! |  ENFORM     GUARDIAN 90XF  NonStop VLX   TACL                    |
    28.    000000 0  0    ! |                                                                 |
    29.    000000 0  0    ! +-----------------------------------------------------------------+
    30.    000000 0  0    ! | * INFOSAT is a trademark in which both Tandem and American      |
    31.    000000 0  0    ! |   Satellite have rights.                                        |
    32.    000000 0  0    ! +-----------------------------------------------------------------+
    33.    000000 0  0    ! |  TANDEM COMPUTERS INCORPORATED -- PROPRIETARY AND CONFIDENTIAL  |
    34.    000000 0  0    ! +-----------------------------------------------------------------+
    36.    000000 0  0    ?NOLIST, source extdecs   (
    53.    000000 0  0    ?NOLIST, source pfprint   ( fprint )
    55.    000000 0  0    ?NOLIST, source pscan
    57.    000000 0  0    ?NOLIST, source preadobj
    59.    000000 0  0    ?NOLIST, source pgp       ( mtimestampcollapse, nout32 )
    61.    000000 0  0    ?NOLIST, source pbitmap   ( MoveBitmapToMem, ReadBitmapFile, TestForHit )
    63.    000000 0  0    ?NOLIST, source pupper    ( CheckSecurity )
```

```
 65.    000000 0  0   ?NOLIST, source pobject  ( WhyCantRead )
 67.    000000 0  0   ?NOLIST, source pcover   ( debug^err, finger^err, FprintPoof, nextchar )
 69.    000000 0  0   ?SOURCE sversion( version^sort )
Source file:  [1]  $OVER.T9618C00.SVERSION  07APR87 - 10:49:12
 54.    000000 0  0   ?SECTION VERSION^SORT
 55.    000000 0  0   PROC T9618C00^15JUL87^SORT^07APR7;
 56.    000000 1  0   BEGIN END;
 70.    000000 0  0   ?SOURCE ssort
Source file:  [1]  $OVER.T9618C00.SSORT  07APR87 - 10:49:14
  2.    000000 0  0   proc !prv! SORT^Command;
  3.    000000 1  0   begin
  4.    000000 1  1   struct       SortRecordTemplate(*);
  5.    000000 1  1      begin
  6.    000000 1  2      string    BaseName[0:31];
  7.    000000 1  2      string    SourceFile[0:7];
  8.    000000 1  2      int(32)   LineNumber;
  9.    000000 1  2      int       Offset;
 10.    000000 1  2      int       NumUnex;
 11.    000000 1  2      end;
 12.    000000 1  1   string       Params = 'P' := ["PIN FILE ",
 13.    000005 1  1                                 "CODE LIB ",
 14.    000011 1  1                                 "PROGRAMONLY LIBRARYONLY ",
 15.    000025 1  1                                 "OVER",0];
 16.    000030 1  1   string       TellBitmapP = 'P' :=
 17.    000030 1  1                ["Bitmap is from PIN ?#&*",0];
 18.    000044 1  1   string       TellBitmapF = 'P' :=
 19.    000044 1  1                ["Bitmap is from 'F*",0];
 20.    000056 1  1   string       NoSegmentsOver = 'P' :=
 21.    000056 1  1                ["There were no unexecuted statement sequences larger than &*.",0];
 22.    000115 1  1   string       Heading = 'P' :=
 23.    000115 1  1                ["Procedure name                    ",
 24.    000135 1  1                 "Source file  Line number Offset  Statements",0];
 25.    000163 1  1   string       Detail = 'P' :=
 26.    000163 1  1                ["'31  'B     '10 %6       &5Z",0];
 27.    000202 1  1
 28.    000202 1  1   string .ext DiscImage( CoverDiscImageTemplate ) := %2000000d;
 29.    000202 1  1   struct      .csil( CSIL^def )[0:31];
 30.    000202 1  1   struct      .hdr( Object^File^Header^Def );
 31.    000202 1  1   int          UsePin := FALSE;        !flag - use memory image
 32.    000202 1  1   int          UseFile := FALSE;       !flag - use disc image
 33.    000202 1  1   int          Prog := FALSE;          !flag - use prog file specified in CRCB
 34.    000202 1  1   int          Lib  := FALSE;          !flag - use prog file specified in CRCB
 35.    000202 1  1   int          ProgramOnly := FALSE;   !flag
 36.    000202 1  1   int          LibraryOnly := FALSE;   !flag
 37.    000202 1  1   int          OverKwd := FALSE;       !flag
 38.    000202 1  1   int          Over := 1;              !Default
 39.    000202 1  1   int          G16 := FALSE;           !flag - Program has >16 segments
 40.    000202 1  1   int          pin;
 41.    000202 1  1   int          BitmapFile[0:11];
 42.    000202 1  1   int          ProgName[0:11];
 43.    000202 1  1   int          LibName[0:11];
 44.    000202 1  1   int          ScratchFile[0:11];
 45.    000202 1  1   int          Fnum := -1;
 46.    000202 1  1   int          DidWrite := FALSE;      !flag - some record was written to sort.
 47.    000202 1  1   int          error;
 48.    000202 1  1   int          length;
```

```
000202 1  1   int         ErrorText[0:32];          !1 extra for terminator
000202 1  1   string      S^ErrorText = ErrorText;
000202 1  1   string      ws[0:22];                 !For formatting output
000202 1  1
000202 1  1   int         .ctlblock[0:199];         !SORT control block
000202 1  1   int         .ScratchFilename[0:11] := [12 * ["  "]];
000216 1  1   literal     BlockLength = 4096;
000216 1  1   string      .buffer1[0:BlockLength-1]; !For block buffering
000216 1  1   int         KeyBlock[0:3] := [1 !number of keys!
000216 1  1                               ,%100000 !descending! '+' 10 !binary unsigned!
000217 1  1                               ,2 !key length!
000220 1  1                               ,$offset(SortRecordTemplate.NumUnex)];
000222 1  1   int         RecLength := $len(SortRecordTemplate);
000222 1  1   int(32)     RecCount;                 !Estimated number of records.
000222 1  1   struct      UnRefRec( SortRecordTemplate );
000222 1  1
000222 1  1   label       CloseReturn;
000222 1  1
000222 1  1   subproc WriteIfOver; forward;
000222 1  1   ! This subproc will return an estimate of the number of records which
000222 1  1   ! will be sorted.  There are several ways we could do this.  A good
000222 1  1   ! estimate would be to count the number of segments of (OVER * 2)
000222 1  1   ! contiguous 0 bits in the bitmap which are separated by a 1 bit, but
000222 1  1   ! this would take quite a while.  Instead, we'll simply assume that an
000222 1  1   ! average statement takes 3 code words and count the code words.
000222 1  1   int(32) subproc EstimateNumberOfRecords;
000222 2  1   begin
000222 2  2   int(32)     TotalCodeWords;
000222 2  2   int(32)     TotalStatements;
000222 2  2   int         space;
000222 2  2
000222 2  2   TotalCodeWords := 0d;                 !Initialize
000225 2  2
000225 2  2   if NOT LibraryOnly AND DiscImage.UC.SpaceCount then
000232 2  2      for space := 0 to DiscImage.UC.SpaceCount do
000234 2  2         TotalCodeWords := TotalCodeWords
000234 2  2                          + $udbl(DiscImage.UC.SpaceSize[ space ]);
000252 2  2
000252 2  2   if G16 OR (NOT ProgramOnly AND DiscImage.UL.SpaceCount) then
000261 2  2      for space := 0 to DiscImage.UL.SpaceCount do
000263 2  2         TotalCodeWords := TotalCodeWords
000263 2  2                          + $udbl(DiscImage.UL.SpaceSize[ space ]);
000301 2  2
000301 2  2   TotalStatements := (TotalCodeWords + 100d !fudge factor!) / 3d;
000311 2  2   TotalStatements := TotalStatements + 2 '*' (over + 1); !Fudge factor
000320 2  2   return TotalStatements / $udbl(over + 1);
000327 2  2
000327 2  2   end; !subproc EstimateNumberOfRecords

SPACE                         Variable     INT          Direct      S-000
TOTALCODEWORDS                Variable     INT (32)     Direct      S-004
TOTALSTATEMENTS               Variable     INT (32)     Direct      S-002
000327 1  1   subproc ItsAsortError;
000327 2  1   begin
000327 2  2   string      SortError = 'P' :=
000327 2  2               ["SORT error occured.  Error code is: ?%%6.%6; error text:^'*",0];
```

```
000365 2  2   int(32)      ErrorCode;
000365 2  2
000365 2  2   ! Get error text.
000365 2  2   length := sorterrorsum( ctlblock, ErrorText, ErrorCode );
000401 2  2   S^ErrorText[length] := 0;          !Terminator for fprint
000404 2  2   call fprint( @SortError, $high(ErrorCode), $int(ErrorCode), @S^ErrorText );
000423 2  2
000423 2  2   GOTO CloseReturn;                  !Give up.
000424 2  2
000424 2  2   end; !subproc ItsAsortError

CLOSERETURN                    Label                     %177777
ERRORCODE                      Variable     INT (32)     Direct        S-001
SORTERROR                      Variable     STRING       Direct        P+000

000425 1  1   subproc SortSpace( filename, PinSpace, library );
000425 2  1   int          .filename;              !Object file
000425 2  1   string .ext PinSpace( CoverPinDataCodespaceTemplate );
000425 2  1   int          library;                !1 if library; 0 if program
000425 2  1   begin
000425 2  2   string       TellProg = 'P' :=
000425 2  2                ["Program file is 'F* dated '22!",0];
000445 2  2   string       TellLib = 'P' :=
000445 2  2                ["Library file is 'F* dated '22!",0];
000465 2  2   int          Timestamp[0:2];
000465 2  2   int          space;
000465 2  2
000465 2  2   if (error := OpenObjectFile( filename, Fnum )) then
000474 2  2      begin call WhyCantRead( filename, error ); return; end;
000502 2  2
000502 2  2   call fileinfo(,,filename,,,,,,Timestamp);
000520 2  2   call mtimestampcollapse( ws, Timestamp );
000530 2  2   call FprintPoof( if library then @TellLib else @TellProg, @filename, @ws );
000552 2  2
000552 2  2   if (error := PositRead( Fnum, hdr, 0d, $len(hdr) )) then !Read header
000562 2  2      begin
000562 2  3      call WhyCantRead( filename, error );
000566 2  3      GOTO CloseReturn;
000567 2  3      end;
000567 2  2
000567 2  2   if Prog then
000571 2  2      begin
000571 2  3      ! Check that object file has same binder timestamp.  Just warning if not.
000571 2  3      if PinSpace.Timestamp <> hdr.binder^timestamp for 3 words then
000604 2  3         call FprintPoof( @WarnBind );
000615 2  3      end;
000615 2  2
000615 2  2   ! Make sure spaces are reasonable.
000615 2  2   if hdr.CSIL^length/wlen(CSIL^def) <>
000615 2  2      (if G16 then DiscImage.UC.SpaceCount + DiscImage.UL.SpaceCount
000615 2  2       else PinSpace.SpaceCount) then
000641 2  2         begin call fprint( @SpaceDif ); GOTO CloseReturn; end;
000655 2  2
000655 2  2   if (error := PositRead(Fnum, csil, hdr.CSIL^addr, hdr.CSIL^length'<<'1)) then
000670 2  2      begin call WhyCantRead( filename, error ); GOTO CloseReturn; end;
000675 2  2
000675 2  2   if G16 then for space := 0 to DiscImage.UL.SpaceCount - 1 do
```

```
000701 2  2       if DiscImage.UL.SpaceSize[ space ] <> csil[ space + 16 ].size then
000716 2  2          begin call fprint( @SpaceDif ); GOTO CloseReturn; end;
000742 2  2
000742 2  2    for space := 0 to PinSpace.SpaceCount - 1 do
000744 2  2       if PinSpace.SpaceSize[ space ] <> csil[ space ].size then
000764 2  2          begin call fprint( @SpaceDif ); GOTO CloseReturn; end;
001015 2  2    UnRefRec.NumUnex := 0;              !Initialize count
001020 2  2    while NOT (error := GetNextProcedure( Fnum )) do !For every procedure
001025 2  2       begin
001025 2  3       call WriteIfOver;
001026 2  3       UnRefRec.BaseName ':=' Procedure.Name for 16 words;
001034 2  3       ! Initialize as if proc header were 1st statement.
001034 2  3       UnRefRec.SourceFile ':=' Procedure.SourceFileName[8] for 4 words;
001046 2  3       UnRefRec.LineNumber := Procedure.SourceFileLine;
001052 2  3       UnRefRec.Offset := 0;
001055 2  3       if Procedure.HasInspect then
001060 2  3          begin
001060 2  4          !For every statement in the procedure
001060 2  4          while NOT (error := GetNextStatement( Fnum )) do
001065 2  4             begin
001065 2  5             if TestForHit( Procedure.SpaceId + (library << 11),
001065 2  5                            Procedure.Offset '+' Statement.Offset ) then
001102 2  5                begin !Statement was executed.
001102 2  6                call WriteIfOver;
001103 2  6                end
001103 2  5             else
001104 2  5                begin !Statement not executed.
001104 2  6                if UnRefRec.NumUnex = 0 then
001110 2  6                   begin !Save statement info for 1st unexecuted statement of group
001110 2  7                   UnRefRec.SourceFile ':=' Statement.Filename[8] for 4 words;
001122 2  7                   UnRefRec.LineNumber := $ABS( Statement.LineNum );
001130 2  7                   UnRefRec.Offset := Statement.Offset;
001134 2  7                   end;
001134 2  6                !Count group of unexecuted statements
001134 2  6                UnRefRec.NumUnex := UnRefRec.NumUnex '+' 1;
001140 2  6                end;
001140 2  5             end;
001141 2  4          if error <> -1 then
001144 2  4             begin
001144 2  5             call WhyCantRead( filename, error );
001150 2  5             GOTO CloseReturn;
001151 2  5             end;
001151 2  4
001151 2  4          end
001151 2  3
001151 2  3       else
001152 2  3
001152 2  3          begin !No symbols for procedure
001152 2  4          error := fprint( @NoSymbols, @Procedure.Name );
001166 2  4          if error then GOTO CloseReturn;
001172 2  4          end;
001172 2  3
001172 2  3       end;
001173 2  2    if error <> -1 then
001176 2  2       begin
001176 2  3       call WhyCantRead( filename, error );
```

```
 213.    001202 2  3      GOTO CloseReturn;
 214.    001203 2  3      end;
 215.    001203 2  2
 216.    001203 2  2   end; !subproc SortSpace

CLOSERETURN                      Label                            %177777
FILENAME                         Variable       INT               Indirect        S-010
LIBRARY                          Variable       INT               Direct          S-005
PINSPACE                         Variable,110   STRUCT-S          EXT Pointer     S-007
SPACE                            Variable       INT               Direct          S-000
TELLLIB                          Variable       STRING            Direct          P+000
TELLPROG                         Variable       STRING            Direct          P+000
TIMESTAMP                        Variable       INT               Direct          S-003
 218.    001207 1  1   ! Write sort record if there are enough contiguous unexecuted statements.
 219.    001207 1  1   subproc WriteIfOver;
 220.    001207 2  1   begin
 221.    001207 2  2   if UnRefRec.NumUnex '>' Over then
 222.    001214 2  2      begin                           !Write a record
 223.    001214 2  3      DidWrite := TRUE;               !Indicate that at least one was written
 224.    001216 2  3      error := sortmergesend( ctlblock, UnRefRec, RecLength );
 225.    001230 2  3      if error then call ItsAsortError;
 226.    001233 2  3      end;
 227.    001233 2  2
 228.    001233 2  2   UnRefRec.NumUnex := 0; !Reset
 229.    001236 2  2   end; !subproc WriteIfOver
 231.    001240 1  1   while nextchar(0) do
 232.    001342 1  1      case scanidt( charadr, @Params ) of
 233.    001356 1  1      begin
 234.    001356 1  2      !PIN    ! begin
 235.    001356 1 CE0              if UsePin then call debug^err;  !Specified twice
 236.    001364 1  3              if scanint( charadr, pin, , 0, 255 ) then
 237.    001376 1  3                 call finger^err( @NoPin );
 238.    001406 1  3              UsePin := TRUE;         !Read CRCB from memory
 239.    001410 1  3              if UseFile then call finger^err( @BothPandF );
 240.    001422 1  3              end;
 241.    001425 1 CE1     !FILE   ! begin
 242.    001425 1  3              if UseFile then call debug^err; !Specified twice·
 243.    001433 1  3              if NOT scanfname( charadr, BitmapFile, defaults.word ) then
 244.    001443 1  3                 call finger^err( @NoFile );
 245.    001453 1  3              UseFile := TRUE;        !Read CRCB from the file
 246.    001455 1  3              if UsePin then call finger^err( @BothPandF );
 247.    001467 1  3              end;
 248.    001472 1 CE2     !CODE  ! begin
 249.    001472 1  3             if Prog OR LibraryOnly then call debug^err;
 250.    001502 1  3             if NOT scanfname( charadr, ProgName, defaults.word ) then
 251.    001512 1  3                call finger^err( @NoFile );
 252.    001522 1  3             Prog := TRUE;
 253.    001524 1  3             end;
 254.    001526 1 CE3     !LIB   ! begin
 255.    001526 1  3             if Lib OR ProgramOnly then call debug^err;
 256.    001536 1  3             if NOT scanfname( charadr, LibName, defaults.word ) then
 257.    001551 1  3                call finger^err( @NoFile );
 258.    001561 1  3             Lib := TRUE;
 259.    001563 1  3             end;
 260.    001565 1 CE4     !PROGRAMONLY! begin
 261.    001565 1  3             if ProgramOnly OR LibraryOnly OR Lib
```

```
001565 1  3                 then call debug^err;
001577 1  3              ProgramOnly := TRUE;
001601 1  3              end;
001602 1 CE5     !LIBRARYONLY! begin
001602 1  3              if ProgramOnly OR LibraryOnly OR Prog
001602 1  3                 then call debug^err;
001614 1  3              LibraryOnly := TRUE;
001616 1  3              end;
001617 1 CE6     !OVER   ! begin
001617 1  3              if OverKwd then call debug^err else OverKwd := TRUE;
001632 1  3              if scanint( charadr, Over, , 0, 32000 ) then
001644 1  3                 call finger^err( @NotNum );
001654 1  3              end;
001656 1 CE7     otherwise call debug^err;
001662 1  2      end;
001704 1  1   eol;
001715 1  1
001715 1  1   if NOT UsePin and NOT UseFile then call debug^err( @Neither );
001731 1  1
001731 1  1   if UsePin then
001733 1  1      begin
001733 1  2      if NOT CheckSecurity( pin ) then return;
001741 1  2      if NOT MoveBitmapToMem( pin ) then
001745 1  2         begin call fprint( @NoMeasRun, pin ); return; end;
001762 1  2      call FprintPoof( @TellBitmapP, pin );
001775 1  2      end
001775 1  1   else
001776 1  1      begin
001776 1  2      call ReadBitmapFile( BitmapFile, DiscImage );
002005 1  2      call FprintPoof( @TellBitmapF, @BitmapFile );
002020 1  2      end;
002020 1  1
002020 1  1   if NOT Prog then ProgName ':=' DiscImage.UC.Name for 12 words;
002033 1  1   if NOT Lib then LibName ':=' DiscImage.UL.Name for 12 words;
002046 1  1
002046 1  1   if DiscImage.UC.Name = DiscImage.UL.Name for 12 words then
002061 1  1      G16 := TRUE;                    !Program is more than 16 segments
002063 1  1
002063 1  1   if G16 AND (Lib OR LibraryOnly) then
002071 1  1      begin call Fprint( @NoLibWithG16 ); return; end;
002105 1  1   if (Lib OR LibraryOnly) AND NOT DiscImage.UL.SpaceCount then
002114 1  1      begin call Fprint( @NoLib ); return; end;
002130 1  1   if (Prog OR ProgramOnly) AND NOT DiscImage.UC.SpaceCount then
002137 1  1      begin call Fprint( @NoProg ); return; end;
002153 1  1   ! Initialize the sort controls.
002153 1  1   call sortbuildparm( ctlblock,,, $xadr(buffer1),, BlockLength ); !Use blocking
002170 1  1   call processinfo( mypid,,, ,,, ,,, ,,, ,, ScratchFile );
002205 1  1   ScratchFile[4] ':=' "  " & ScratchFile[4] for 7 words; !Volume only
002216 1  1   RecCount := EstimateNumberOfRecords;
002220 1  1
002220 1  1   ! Start a sort process.
002220 1  1   error := sortmergestart( ctlblock, KeyBlock,, 1,,, RecCount,
002220 1  1                            RecLength,,, ,,, ,, ScratchFile,,, RecLength );
002245 1  1   if error then call ItsAsortError;
002250 1  1
002250 1  1   ! Now pass all the unexecuted records to the sort.
```

```
002250 1  1   if DiscImage.UC.SpaceCount AND NOT LibraryOnly then
002255 1  1      begin
002255 1  2      call SortSpace( ProgName, DiscImage.UC, 0 !prog! );
002265 1  2      call close( Fnum );
002272 1  2      Fnum := -1;                       !Indicate it's closed.
002274 1  2      end;
002274 1  1   if DiscImage.UL.SpaceCount AND NOT ProgramOnly AND NOT G16 then
002303 1  1      begin
002303 1  2      call SortSpace( LibName, DiscImage.UL, 1 !lib! );
002313 1  2      call close( Fnum );
002320 1  2      Fnum := -1;                       !Indicate it's closed.
002322 1  2      end;
002322 1  1
002322 1  1   ! Tell the sort we've passed it all we've got; now start sorting.
002322 1  1   error := sortmergesend( ctlblock, UnRefRec, -1 );
002334 1  1   if error then call ItsAsortError;

002337 1  1   if DidWrite then
002341 1  1      begin
002341 1  2      ! Start reading all the sorted records back and print them out.
002341 1  2      call fprint( @Heading );          !First print heading
002354 1  2      error := sortmergereceive( ctlblock, UnRefRec, length );
002366 1  2      while NOT error AND length <> -1 do
002373 1  2         begin
002373 1  3         call nout32( ws, UnRefRec.LineNumber, 10, -12, -3 );
002414 1  3         error := fprint( @Detail,
002414 1  3                          @UnRefRec.BaseName,
002414 1  3                          @UnRefRec.SourceFile,
002414 1  3                          @ws[2], !LineNumber
002414 1  3                          UnRefRec.Offset,
002414 1  3                          UnRefRec.NumUnex );
002445 1  3         if error then
002447 1  3            begin                      !Couldn't print.  Assume <break>
002447 1  4            call sortmergefinish( ctlblock, 1 !abend! ); !Terminate the sort now
002456 1  4            return;
002457 1  4            end;
002457 1  3         error := sortmergereceive( ctlblock, UnRefRec, length );
002471 1  3         end;
002472 1  2      if error then call ItsAsortError;
002475 1  2      end
002475 1  1
002475 1  1   else
002476 1  1
002476 1  1      call fprint( @NoSegmentsOver, Over ); !No records were written to sort
002512 1  1
002512 1  1   call sortmergefinish( ctlblock );  !Normal sort termination.
002521 1  1
002521 1  1   return;                            !Normal completely successful return.
002522 1  1
002522 1  1   CloseReturn:                       !This is a common error return.
002530 1  1   if Fnum <> -1 then call close( Fnum ); !Close object file.
002540 1  1   call sortmergefinish( ctlblock, 1 !abend! ); !Terminate the sort now
002547 1  1
002547 1  1   end; !proc SORT^Command
```

```
BITMAPFILE                  Variable       INT            Direct        L+017
BLOCKLENGTH                 Literal        INT            %010000
BUFFER1                     Variable       STRING         Indirect      L+162
CLOSERETURN                 Label                         %002530
CSIL                        Variable,54    STRUCT         Indirect      L+003
CTLBLOCK                    Variable       INT            Indirect      L+160
DETAIL                      Variable       STRING         Direct        P+000
DIDWRITE                    Variable       INT            Direct        L+100
DISCIMAGE                   Variable,232   STRUCT-S       EXT Pointer   L+001
ERROR                       Variable       INT            Direct        L+101
ERRORTEXT                   Variable       INT            Direct        L+103
ESTIMATENUMBEROFRECORDS     Subproc        INT (32)       %000222
FNUM                        Variable       INT            Direct        L+077
G16                         Variable       INT            Direct        L+015
HDR                         Variable,1000  STRUCT         Indirect      L+004
HEADING                     Variable       STRING         Direct        P+000
ITSASORTERROR               Subproc                       %000365
KEYBLOCK                    Variable       INT            Direct        L+163
LENGTH                      Variable       INT            Direct        L+102
LIB                         Variable       INT            Direct        L+010
LIBNAME                     Variable       INT            Direct        L+047
LIBRARYONLY                 Variable       INT            Direct        L+012
NOSEGMENTSOVER              Variable       STRING         Direct        P+000
OVER                        Variable       INT            Direct        L+014
OVERKWD                     Variable       INT            Direct        L+013
PARAMS                      Variable       STRING         Direct        P+000
PIN                         Variable       INT            Direct        L+016
PROG                        Variable       INT            Direct        L+007
PROGNAME                    Variable       INT            Direct        L+033
PROGRAMONLY                 Variable       INT            Direct        L+011
RECCOUNT                    Variable       INT (32)       Direct        L+170
RECLENGTH                   Variable       INT            Direct        L+167
SCRATCHFILE                 Variable       INT            Direct        L+063
SCRATCHFILENAME             Variable       INT            Indirect      L+161
SORTRECORDTEMPLATE          Variable       TEMPLATE ,60
  1 BASENAME[0:31]                0,1      STRING         Direct
  1 SOURCEFILE[0:7]              40,1      STRING         Direct
  1 LINENUMBER                   50,4      INT (32)       Direct
  1 OFFSET                       54,2      INT            Direct
  1 NUMUNEX                      56,2      INT            Direct
SORTSPACE                   Subproc                       %000465
S^ERRORTEXT                 Variable       STRING         Direct        L+103
TELLBITMAPF                 Variable       STRING         Direct        P+000
TELLBITMAPP                 Variable       STRING         Direct        P+000
UNREFREC                    Variable,60    STRUCT         Direct        L+172
USEFILE                     Variable       INT            Direct        L+006
USEPIN                      Variable       INT            Direct        L+005
WRITEIFOVER                 Subproc                       %001207
WS                          Variable       STRING         Direct        [illegible]
BINDER   OBJECT FILE BINDER - T9621C00 - (09SEP86)   SYSTEM \PRUNE
Object file name is $OVER.T9618C00.osort
Object file timestamp is 07APR87 10:51:00
Number of Binder errors = 0
Number of Binder warnings = 0
Primary data = 143 words
Secondary data = 4152 words
```

```
Code area size = 3 pages
Resident code size = 0 pages
Data area size = 9 pages
Extended data area size = 0 pages
Top of stack = 4295 words
Number of code segments  = 1 segment


The object file will run on a TNS/II, but may not run on a TNS
Errorfile file name is $OVER.T9618C00.ESORT
Number of compiler errors =  0
Number of compiler warnings =  0
Maximum symbol table space used was = 184486 bytes
Number of source lines = 3630
Compile cpu time = 00:00:06
Total Elapsed time = 00:00:53
```

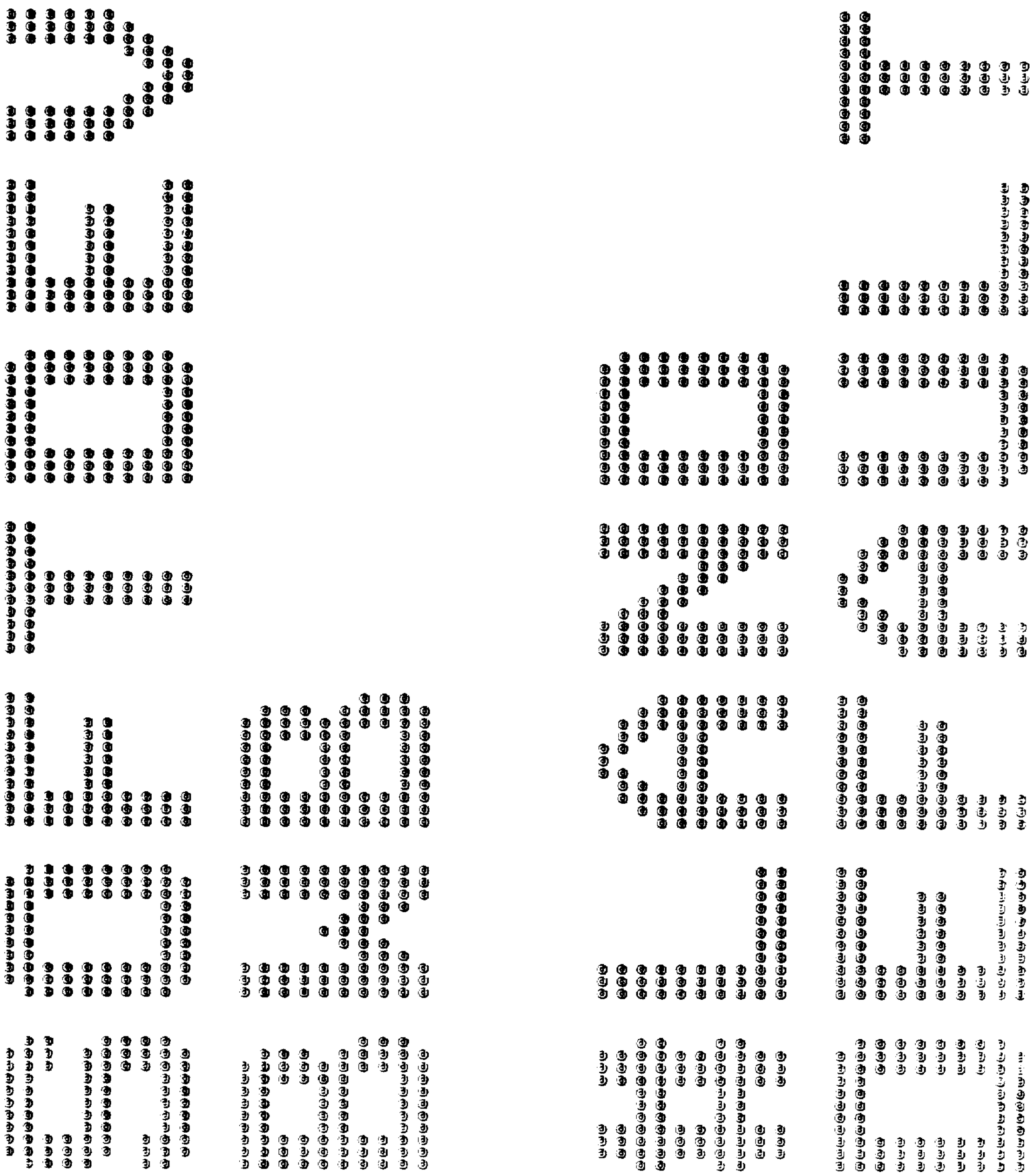

```
PAGE 1    $OVER.T9618C00.CUPPER [1]

TAL - T9250B40 - (15SEP86)                          Source language: TAL - Target machine: Tandem NonStop II System
Date - Time :  29APR87 - 16:04:15                 Default options: On (LIST,CODE,MAP,WARN,LMAP) - Off (ICODE,INNERLIST)

                    ? ERRORFILE eupper,USEGLOBALS ggloba1,SEARCH ogloba1,NOCODE,SYMBOLS,NOGMAP,NOLMAP,NOFIXUP
UseGlobals file:  $OVER.T9618C00.GGLOBAL  29APR87 - 13:17:01
Search file:  $OVER.T9618C00.OGLOBAL  29APR87 - 13:17:20
    2.   000000 0  0   NAME    COVERCOM^UPPER;
    3.   000000 0  0   ?NOLIST
   34.   000000 0  0   ?BEGINCOMPILATION
   35.   000000 0  0   ?SOURCE copytal                     !Copyright notice
Source file:  [1]  $VIOLET.TOOLSC00.COPYTAL  22APR87 - 16:33:11
    1.   000000 0  0   ! +-------------------------------------------------------------------+
    2.   000000 0  0   ! |                                                                   |
    3.   000000 0  0   ! |  Copyright (C) 1987 by TANDEM COMPUTERS INCORPORATED              |
    4.   000000 0  0   ! |                                                                   |
    5.   000000 0  0   ! |  Protected as an unpublished work.                                |
    6.   000000 0  0   ! |                                                                   |
    7.   000000 0  0   ! |  The computer program listings and specifications herein are     |
    8.   000000 0  0   ! |  the property of TANDEM COMPUTERS INCORPORATED and shall not be   |
    9.   000000 0  0   ! |  reproduced, copied, or used, in whole or in part, for any        |
   10.   000000 0  0   ! |  reason without the written permission of TANDEM COMPUTERS       |
   11.   000000 0  0   ! |  INCORPORATED.                                                    |
   12.   000000 0  0   ! |                                                                   |
   13.   000000 0  0   ! |  The following are trademarks or service marks of TANDEM         |
   14.   000000 0  0   ! |  COMPUTERS INCORPORATED:                                          |
   15.   000000 0  0   ! |                                                                   |
   16.   000000 0  0   ! |  6AX           BINDER        CROSSREF       DDL                   |
   17.   000000 0  0   ! |  ENABLE        ENCOMPASS     ENCORE         ENFORM                |
   18.   000000 0  0   ! |  ENSCRIBE      ENVOY         ENVOYACP/XF    EXCHANGE              |
   19.   000000 0  0   ! |  EXPAND        FASTSORT      FAXLINK        FOX                   |
   20.   000000 0  0   ! |  FOXII         GUARDIAN      GUARDIAN 90    GUARDIAN 90XF         |
   21.   000000 0  0   ! |  INSIGHT       INSPECT       LASER-LX       LXN                   |
   22.   000000 0  0   ! |  MEASURE       MULTILAN      NetBatch       NonStop               |
   23.   000000 0  0   ! |  NonStop 1+    NonStop CLX   NonStop EXT    NonStop EXT10         |
   24.   000000 0  0   ! |  NonStop EXT25 NonStop II    NonStop SQL    NonStop TXP           |
   25.   000000 0  0   ! |  NonStop VLX   PATHMAKER     PC LINK        PCFORMAT              |
   26.   000000 0  0   ! |  PERUSE        PS MAIL       PS TEXT EDIT   PS TEXT FORMAT        |
   27.   000000 0  0   ! |  RDF           SAFE          SAFEGUARD      SAFE-T-NET            |
   28.   000000 0  0   ! |  T-TEXT        TACL          TAL            Tandem                |
   29.   000000 0  0   ! |  TGAL          THL           TIL            TMF                   |
   30.   000000 0  0   ! |  TRANSFER      VIEWPOINT     WORDLINK       XLB                   |
   31.   000000 0  0   ! |  XRAY                                                             |
   32.   000000 0  0   ! |                                                                   |
   33.   000000 0  0   ! +-------------------------------------------------------------------+
   34.   000000 0  0   ! |  HYPERchannel is a trademark of Network Systems Corporation.      |
   35.   000000 0  0   ! |                                                                   |
   36.   000000 0  0   ! |  IBM is a registered trademark of International Business Machines |
   37.   000000 0  0   ! |  Corporation.                                                     |
   38.   000000 0  0   ! |                                                                   |
   39.   000000 0  0   ! |  Textpack4, Textpack6, IBM Displaywriter, DisplayWrite 2,         |
   40.   000000 0  0   ! |  DisplayWrite 3, Displaywriter communication software, and CICS   |
   41.   000000 0  0   ! |  are trademarks of International Business Machines Corporation.  |
```

```
 42.    000000 0  0   ! |                                                                      |
 43.    000000 0  0   ! |   INFOSAT is a trademark in which both Tandem and American          |
 44.    000000 0  0   ! |   Satellite have rights.                                             |
 45.    000000 0  0   ! |                                                                      |
 46.    000000 0  0   ! |   LATTICE is a registered trademark of Lattice, Inc.                |
 47.    000000 0  0   ! |                                                                      |
 48.    000000 0  0   ! |   MultiMate is a trademark of Ashton-Tate, Inc.                     |
 49.    000000 0  0   ! |                                                                      |
 50.    000000 0  0   ! |   UNIX is a trademark of AT&T.                                      |
 51.    000000 0  0   ! |                                                                      |
 52.    000000 0  0   ! |   Wang OIS workstation, Wang VS workstation, Wang OIS telecommu-    |
 53.    000000 0  0   ! |   nication software, and Wang VS telecommunication software are     |
 54.    000000 0  0   ! |   trademarks of Wang, Inc.                                           |
 55.    000000 0  0   ! +----------------------------------------------------------------------+
 56.    000000 0  0   ! |   TANDEM COMPUTERS INCORPORATED -- PROPRIETARY AND CONFIDENTIAL     |
 57.    000000 0  0   ! +----------------------------------------------------------------------+
 36.    000000 0  0   ?NOLIST, source extdecs  (
 52.    000000 0  0   ?NOLIST, source pfprint  ( fprint, fprintabort )
 54.    000000 0  0   ?NOLIST, source pgp
 56.    000000 0  0   ?NOLIST, source pscan
 58.    000000 0  0   ?NOLIST, source psiolib
 60.    000000 0  0   ?NOLIST, source putill    ( CRCB^Exists,
 65.    000000 0  0   ?NOLIST, source pcover ( debug^err, finger^err, nextchar, FprintPoof )
 67.    000000 0  0   ?NOLIST, source pobject ( CheckFileSecurity, WhyCantRead )
 69.    000000 0  0   ?SETTOG 15                          !For FORWARDs
 70.    000000 0  0   ?NOLIST, source pupper
 72.    000000 0  0   ?RESETTOG 15
 73.    000000 0  0   ?SOURCE sversion( version^upper )
Source file:  [1]  $OVER.T9618C00.SVERSION  29APR87 - 09:45:32
 57.    000000 0  0   ?SECTION VERSION^UPPER
 58.    000000 0  0   PROC T9618C00^15JUL87^UPPER^29APR7;
 59.    000000 1  0   BEGIN END;
 74.    000000 0  0   ?SOURCE supper
Source file:  [1]  $OVER.T9618C00.SUPPER  29APR87 - 16:00:36
  2.    000000 0  0   ! This routine will return TRUE if the caller's process access id has adequate
  3.    000000 0  0   ! security to access a target's measurement.  That is, you must be:
  4.    000000 0  0   ! . SUPER.SUPER ID (255,255), or
  5.    000000 0  0   ! . The group manager (*,255), or
  6.    000000 0  0   ! . Your process access ID is the same as that of the process in question.
  7.    000000 0  0   ! Otherwise, an error message will be produced and FALSE returned.
  8.    000000 0  0   int !prv! proc CheckSecurity( HisPin );
  9.    000000 1  0   int          HisPin;
 10.    000000 1  0   begin
 11.    000000 1  1   int          His;                    !His process access ID
 12.    000000 1  1   int          Mine;                   !My process access ID
 13.    000000 1  1   literal      pidcpumask = %177400;
 14.    000000 1  1   label        Insufficient;
 15.    000000 1  1
 16.    000000 1  1   Mine := processaccessid;
 17.    000003 1  1
 18.    000003 1  1   if Mine = -1 then return TRUE;      !I'm SUPER.SUPER, so I can do anything
 19.    000010 1  1
 20.    000010 1  1   if processinfo( mypid land pidcpumask lor HisPin,,His) then
 21.    000026 1  1      goto Insufficient;               !He's not even there!
 22.    000027 1  1
 23.    000027 1  1   if Mine = His then return TRUE;     !I'm the same as he
```

```
  24.   000035 1  1
  25.   000035 1  1   if Mine.<0:7> = His.<0:7> AND Mine.<8:15> = 255 then
  26.   000047 1  1      return TRUE;                      !I'm the group manager
  27.   000051 1  1
  28.   000051 1  1   Insufficient:                        !You're not allowed!
  29.   000051 1  1   call fprint( @InsProcAccess );
  30.   000063 1  1   return FALSE;
  31.   000066 1  1
  32.   000066 1  1   end; !proc CheckSecurity

HIS                           Variable      INT           Direct        L+001
HISPIN                        Variable      INT           Direct        L-003
INSUFFICIENT                  Label                       %000051
MINE                          Variable      INT           Direct        L+002
PIDCPUMASK                    Literal       INT           %177400
  34.   000000 0  0   ! Disable privileged programs from being measured.
  35.   000000 0  0   proc DisablePriv callable;
  36.   000000 1  0   begin
  37.   000000 1  1   int      .sg bpth( bpttablehead ) := bpbase '-' wlen( bpth );
  38.   000000 1  1   string .ext crcb( CoverRoutineControlBlock );
  39.   000000 1  1   label        GetOut;
  40.   000000 1  1
  41.   000000 1  1   call setstop( 2 );                   !Make us unstoppable (for PSEM)
  42.   000011 1  1
  43.   000011 1  1   @crcb := CRCB^Exists;                !May do PSEM
  44.   000013 1  1   if @crcb = 0d then goto GetOut;
  45.   000020 1  1
  46.   000020 1  1   crcb.PrivEnabled := FALSE;
  47.   000023 1  1
  48.   000023 1  1   vsem( bpth.CoverCrcbSem );
  49.   000032 1  1
  50.   000032 1  1   GetOut:
  51.   000032 1  1   call setstop( 0 );
  52.   000036 1  1
  53.   000036 1  1   end; !proc DisablePriv

BPTH                          Variable,114   STRUCT-I     SG Pointer    L+001
CRCB                          Variable,14020 STRUCT-S     EXT Pointer   L+002
GETOUT                        Label                       %000032
  55.   000000 0  0   ! (SUPER.SUPER only)
  56.   000000 0  0   !
  57.   000000 0  0   ! Returns memory for the CRCB and disables further measurements.
  58.   000000 0  0   ! This operation will not be performed at all if any PIN is being measured.
  59.   000000 0  0   proc !prv! DISABLE^command;
  60.   000000 1  0   begin
  61.   000000 1  1   string      Params = 'P' := ["PRIV",0];
  62.   000003 1  1   int         error;                   !Pandora's box
  63.   000003 1  1   int         Privy := FALSE;          !flag
  64.   000003 1  1   struct      Request( CVR^Server^Disable^Template );
  65.   000003 1  1
  66.   000003 1  1   while nextchar(0) do
  67.   000014 1  1      case scanidt( charadr, @Params ) of
  68.   000026 1  1      begin
  69.   000026 1  2      !PRIV' begin
  70.   000026 1 CEO        if Privy then call debug^err;
  71.   000034 1  3         Privy := TRUE;
```

```
000036 1  3        end;
000037 1 CE1     otherwise call debug^err;
000043 1  2      end;
000056 1  1   eol;
000067 1  1
000067 1  1   if creatoraccessid <> -1 then       !Must be SUPER.SUPER
000072 1  1      begin
000072 1  2      call fprint( @SuperOnly );
000104 1  2      return;
000106 1  2      end;
000106 1  1
000106 1  1   if Privy then
000110 1  1      begin
000110 1  2      case TestCoverEnabled of
000112 1  2         begin
000112 1  3      0->    call fprint( @Disabled );
000124 1  3      1->    call fprint( @EnabledNoPriv );
000140 1  3      otherwise ->
000142 1  3             begin
000142 1  4             call DisablePriv;
000143 1  4             call fprint( @OK );
000155 1  4             end;
000155 1  3         end;
000171 1  2      return;
000172 1  2      end;
000172 1  1   if TestCoverEnabled then
000174 1  1      begin
000174 1  2      ServerName^S[5] ':=' BinToHex[ mypid.pidcpu ] for 1 bytes; !$XCVRn
000215 1  2      call open( ServerName, ServerFn );
000224 1  2      if <> then
000225 1  2         begin
000225 1  3         call fileinfo( -1, error );
000236 1  3         call fprint( @NoServer, error );
000251 1  3         return;
000254 1  3         end;
000254 1  2      Request.MessageType := CVR^Server^Disable;
000256 1  2      call write( ServerFn, Request, $len(Request) );
000266 1  2      call fileinfo( ServerFn, error ); !Save error response
000277 1  2      if error > FEFIRSTUSER then error := FEFIRSTUSER - error; !Normalize
000311 1  2      call close( ServerFn );       !We're done with it.
000316 1  2
000316 1  2      if error = FEOK then
000321 1  2         call fprint( @OK )
000333 1  2      else if error = CoverErrInUse then
000340 1  2         call fprint( @CRCBinUse )
000352 1  2      else call fprint( @NoServer, error ); !Any other errors imply something's
000367 1  2      end                                   !wrong with the server.
000367 1  1   else
000371 1  1      call fprint( @Disabled );
000403 1  1
000403 1  1   end; !proc DISABLE^command

ERROR                  Variable       INT          Direct        L+001
PARAMS                 Variable       STRING       Direct        P+000
PRIVY                  Variable       INT          Direct        L+002
REQUEST                Variable,2     STRUCT       Direct        L+003
```

```
000000 0  0   ! Enable privileged programs for measurement.
000000 0  0   proc EnablePriv callable;
000000 1  0   begin
000000 1  1   int      .sg bpth( bpttablehead ) := bpbase '-' wlen( bpth );
000000 1  1   string .ext crcb( CoverRoutineControlBlock );
000000 1  1   label        GetOut;
000000 1  1
000000 1  1   call setstop( 2 );                   !Make us unstoppable (for PSEM)
000011 1  1
000011 1  1   @crcb := CRCB^Exists;                !May do PSEM
000013 1  1   if @crcb = 0d then goto GetOut;
000020 1  1
000020 1  1   crcb.PrivEnabled := TRUE;
000023 1  1
000023 1  1   vsem( bpth.CoverCrcbSem );
000032 1  1
000032 1  1   GetOut:
000032 1  1   call setstop( 0 );
000036 1  1
000036 1  1   end; !proc EnablePriv

BPTH                         Variable,114   STRUCT-I        SG Pointer     L+001
CRCB                         Variable,14020 STRUCT-S        EXT Pointer    L+002
GETOUT                       Label                          %000032
000000 0  0   ! (SUPER.SUPER only)
000000 0  0   ! This installs COVER into a cpu.  This can only be performed by
000000 0  0   ! SUPER.SUPER .  This is typically done after a cpu is loaded, then it
000000 0  0   ! is just left there.  However, COVER may be DISABLEd and later
000000 0  0   ! re-ENABLEd.  We start a process named $XCVRn, where "n" is our cpu
000000 0  0   ! number in hexadecimal.  It is then sent an ENABLE message, which
000000 0  0   ! tells it to become unstoppable and allocates the CRCB.
000000 0  0   proc !prv! enable^command;
000000 1  0   begin
000000 1  1   string       Params = 'P' := ["PRIV",0];
000003 1  1   int          Privy := FALSE;          !flag
000003 1  1   int          ProgramFile[0:11];
000003 1  1   int          Priority := 199;         !$XCVRn will run at highest user priority
000003 1  1   int          ProcessId[0:3];          !Save for STOP
000003 1  1   struct       Request( CVR^Server^Enable^Template );
000003 1  1   int          error;
000003 1  1   int          FE;
000003 1  1   int          NP;
000003 1  1
000003 1  1   while nextchar(0) do
000016 1  1      case scanidt( charadr, @Params ) of
000030 1  1      begin
000030 1  2      !PRIV! begin
000030 1 CE0        if Privy then call debug^err;
000036 1  3         Privy := TRUE;
000040 1  3         end;
000041 1 CE1     otherwise call debug^err;
000045 1  2      end;
000060 1  1   eol;
000071 1  1
000071 1  1   if creatoraccessid <> -1 then       !Must be SUPER.SUPER
000074 1  1      begin
```

```
000074 1  2     call fprint( @SuperOnly );
000106 1  2     return;
000110 1  2     end;
000110 1  1
000110 1  1  case TestCoverEnabled of      .
000112 1  1     begin
000112 1  2  0 ->  begin
000112 1  3        if Privy then
000114 1  3           call fprint( @Disabled )
000126 1  3        else
000130 1  3           begin                        !Do ENABLE!
000130 1  4           ! Build filename of CVRMON
000130 1  4           call programfilename( ProgramFile );
000133 1  4           ProgramFile[8] ':=' "CVRMON  ";
000141 1  4
000141 1  4           ServerName^S[5] ':=' BinToHex[ mypid.pidcpu ] for 1 bytes; !$XCVRn
000162 1  4           call newprocess( ProgramFile, Priority, !default mem!, !same cpu!,
000162 1  4                            ProcessId, error, ServerName );
000177 1  4           if NOT ProcessId then
000201 1  4              begin
000201 1  5              NP := error.<0:7>;          !Save newprocess error
000204 1  5              FE := error.<8:15>;         !Save filesystem error
000207 1  5              call fprint( @EnableNP, NP, FE );
000223 1  5              return;
000227 1  5              end;
000227 1  4
000227 1  4           call open( ServerName, ServerFn );
000236 1  4           if <> then
000237 1  4              begin
000237 1  5              call fileinfo( -1, error );
000250 1  5              call stop( ProcessId );   !Just in case it's still around
000257 1  5              call fprint( @NoServer, error );
000272 1  5              return;
000274 1  5              end;
000274 1  4           ! He doesn't need a meaningful startup message
000274 1  4           Request.MessageType := -1; !Startup message code
000276 1  4           call write( ServerFn, Request.MessageType, 2 ); !Short startup message
000306 1  4
000306 1  4           Request.MessageType := CVR^Server^Enable;
000310 1  4           call write( ServerFn, Request, $len(Request) );
000323 1  4           call fileinfo( ServerFn, error );  !Save error response
000334 1  4           if error > FEFIRSTUSER then error := FEFIRSTUSER - error; !Normalize
000346 1  4           call close( ServerFn );   !We're done with it.
000353 1  4           if error = FEOK then
000356 1  4              call fprint( @OK )
000370 1  4           else if error = CoverErrAlready then
000375 1  4              call fprint( @EnabledNoPriv )
000407 1  4           else if error = CoverErrInsMem then
000414 1  4              call fprint( @InsMem )
000426 1  4           else
000430 1  4              begin
000430 1  5              call stop( ProcessId ); !Just in case
000437 1  5              call fprint( @EnableFE, FE );
000452 1  5              end;
000452 1  4           end;
000452 1  3        end;
```

```
000452 1  2   1 ->  begin
000454 1  3         if Privy then
000456 1  3            begin
000456 1  4            call EnablePriv;
000457 1  4            call fprint( @OK );
000471 1  4            end
000471 1  3         else
000473 1  3            call fprint( @EnabledNoPriv );
000505 1  3         end;
000505 1  2   otherwise ->
000507 1  2         call fprint( @EnabledPriv );
000521 1  2      end;
000535 1  1
000535 1  1   end; !proc enable^command

ERROR                         Variable     INT        Direct     L+024
FE                            Variable     INT        Direct     L+025
NP                            Variable     INT        Direct     L+026
PARAMS                        Variable     STRING     Direct     P+000
PRIORITY                      Variable     INT        Direct     L+016
PRIVY                         Variable     INT        Direct     L+001
PROCESSID                     Variable     INT        Direct     L+017
PROGRAMFILE                   Variable     INT        Direct     L+002
REQUEST                       Variable,2   STRUCT     Direct     L+023
000000 0  0   ! Displays information about the state of things
000000 0  0   proc !prv! ENV^Command;
000000 1  0   begin
000000 1  1   string      Params = 'P' := ["OBJECT PIN",0];
000006 1  1   string      ObjectFileList = 'P' := ["OBJECT file list ",
000017 1  1               "(file/savevol/user):",0];
000031 1  1   string      NoObjectFileList = 'P' := ["There is no OBJECT file list.",0];
000050 1  1   string      ObjectFileItem = 'P' := ["'26F '16 (&*,&*)",0];
000061 1  1   string      NoPinsInProgress = 'P' := ["No PINs currently being measured.",0];
000102 1  1   int         Some := FALSE;
000102 1  1   int         Object := FALSE;
000102 1  1   int         Pin := FALSE;
000102 1  1   int         count;
000102 1  1   int         i;
000102 1  1   struct      Names[0:$occurs(CoverRoutineControlBlock.FilesToMeasure)-1];
000102 1  1               begin
000102 1  2               int   Name[0:11];
000102 1  2               int   Userid;
000102 1  2               string SaveVol[0:15];
000102 1  2               end;
000102 1  1   int         Pins = Names;
000102 1  1
000102 1  1   while nextchar(0) do
000117 1  1      begin
000117 1  2      Some := TRUE;                       !ENV has some argument(s)
000121 1  2      case scanidt( charadr, @params ) of
000133 1  2         begin
000133 1  3         !OBJECT! if Object then call debug^err else Object := TRUE;
000145 1 CE1        ! PIN  ! if Pin    then call debug^err else Pin    := TRUE;
000157 1 CE2        otherwise call debug^err;
000163 1  3         end;
000176 1  2      end;
```

```
 281.   000177 1  1   eol;
 282.   000210 1  1
 283.   000210 1  1   if NOT Some then call Env^Info;     !Print basic environment
 284.   000213 1  1
 285.   000213 1  1   if Object then
 286.   000215 1  1      begin
 287.   000215 1  2      count := GetObjectNames( Names ); !Get names of object files in CRCB
 288.   000223 1  2      if count then
 289.   000225 1  2         begin
 290.   000225 1  3         call fprintpoof( @ObjectFileList );
 291.   000237 1  3         for i := 0 to count - 1 do
 292.   000241 1  3            call fprintpoof( @ObjectFileItem,
 293.   000241 1  3                             @Names[ i ].Name,
 294.   000241 1  3                             @Names[ i ].SaveVol,
 295.   000241 1  3                              Names[ i ].Userid.<0:7>,
 296.   000241 1  3                              Names[ i ].Userid.<8:15> );
 297.   000316 1  3         end
 298.   000316 1  2      else
 299.   000317 1  2         call fprintpoof( @NoObjectFileList );
 300.   000331 1  2      end;
 301.   000331 1  1
 302.   000331 1  1   if Pin then
 303.   000333 1  1      begin
 304.   000333 1  2      count := GetPinValues( Pins );  !Get PINs being measured.
 305.   000341 1  2      if count then
 306.   000343 1  2         for i := 0 to count - 1 do
 307.   000345 1  2            call fprintpoof( @Inuse, Pins[ i ] )
 308.   000367 1  2      else
 309.   000371 1  2         call fprintpoof( @NoPinsInProgress );
 310.   000403 1  2      end;
 311.   000403 1  1
 312.   000403 1  1   end; !proc ENV^Command

COUNT                             Variable      INT          Direct      L+004
I                                 Variable      INT          Direct      L+005
NAMES                             Variable,52   STRUCT       Direct      L+006
  1 NAME[0:11]                          0,2     INT          Direct
  1 USERID                             30,2     INT          Direct
  1 SAVEVOL[0:15]                      32,1     STRING       Direct
NOOBJECTFILELIST                  Variable      STRING       Direct      P+000
NOPINSINPROGRESS                  Variable      STRING       Direct      P+000
OBJECT                            Variable      INT          Direct      L+002
OBJECTFILEITEM                    Variable      STRING       Direct      P+000
OBJECTFILELIST                    Variable      STRING       Direct      P+000
PARAMS                            Variable      STRING       Direct      P+000
PIN                               Variable      INT          Direct      L+003
PINS                              Variable      INT          Direct      L+006
SOME                              Variable      INT          Direct      L+001
   314.   000000 0  0   proc !prv! Env^Info;
   315.   000000 1  0   begin
   316.   000000 1  1   ?SOURCE sversion( version^string )
 Source file:  [13]  $OVER.T9618C00.SVERSION   29APR87 - 09:45:32
     2.   000000 1  1   ?SECTION VERSION^STRING
     3.   000000 1  1   DEFINE      VERSION^STRING = "COVER - T9618C00 - (15JUL87)"#;
     4.   000000 1  1
   317.   000000 1  1   string      banner    -'P':- [ version^string ,0];
```

```
000017 1  1   literal     pidcpumask = %177400;
000017 1  1   literal     monitor^process = 0;
000017 1  1   int         osname[0:11];
000017 1  1   string      VersionLetter[0:1] := ["x",0];
000020 1  1   string      VersionDate[0:9];
000020 1  1   string      CurrentOS = 'P' := ["Current OS is 'F* - Version '1&2 '9",0];
000042 1  1
000042 1  1   call printbanner ( @banner );
000057 1  1
000057 1  1   call processinfo( mypid land pidcpumask lor monitor^process,,,,, osname);
000075 1  1   VersionLetter[0] := tosversion.<0:7>;
000100 1  1   call GetOsVERDATE( VersionDate );
000104 1  1   call fprint    ( @CurrentOS,
000104 1  1                    @osname,
000104 1  1                    @VersionLetter,
000104 1  1                    tosversion.<8:15>,
000104 1  1                    @VersionDate );
000127 1  1
000127 1  1   if NOT TestCoverHooks then          !COVER not SYSGENed.
000131 1  1      call fprintabort( @NotInstalled );
000143 1  1
000143 1  1   case TestCoverEnabled of
000146 1  1      begin
000146 1  2   0->   call FprintPoof( @Disabled );
000157 1  2   1->   call FprintPoof( @EnabledNoPriv );
000172 1  2   otherwise ->
000174 1  2         call FprintPoof( @EnabledPriv );
000205 1  2      end;
000221 1  1
000221 1  1   end; !proc Env^Info

BANNER                 Variable    STRING    Direct      P+000
CURRENTOS              Variable    STRING    Direct      P+000
MONITOR^PROCESS        Literal     INT       %000000
OSNAME                 Variable    INT       Direct      L+001
PIDCPUMASK             Literal     INT       %177400
VERSIONDATE            Variable    STRING    Direct      L+016
VERSIONLETTER          Variable    STRING    Direct      L+015
VERSION^STRING         Define                "COVER - T9618C00 - (15JUL87)"

000000 0  0   int !prv! proc GetObjectNames( Names ) callable;
000000 1  0   string .ext Names;
000000 1  0   begin
000000 1  1   int      .sg bpth( bpttablehead ) := bpbase '-' wlen( bpth );
000000 1  1   string .ext crcb( CoverRoutineControlBlock );
000000 1  1   int           count;
000000 1  1
000000 1  1   call setstop( 2 );
000011 1  1
000011 1  1   @crcb := CRCB^Exists;                  !May do PSEM
000013 1  1   if @crcb = 0d then
000017 1  1      begin call setstop( 0 ); return 0; end;
000025 1  1
000025 1  1   count := crcb.NumFiles;
000031 1  1
000031 1  1   if count then
000033 1  1      Names ':=' crcb.FilesToMeasure for 21 * count words;
```

```
000046 1  1
000046 1  1   vsem( bpth.CoverCrcbSem );
000055 1  1   call setstop( 0 );
000061 1  1   return count;
000063 1  1
000063 1  1   end; !proc GetObjectNames

BPTH                     Variable,114   STRUCT-I       SG Pointer     L+001
COUNT                    Variable       INT            Direct         L+004
CRCB                     Variable,14020 STRUCT-S       EXT Pointer    L+002
NAMES                    Variable       STRING         EXT Pointer    L-004
000000 0  0   int !prv! proc GetPinValues( Pins ) callable;
000000 1  0   int     .ext Pins;
000000 1  0   begin
000000 1  1   int      .sg bpth( bpttablehead ) := bpbase '-' wlen( bpth );
000000 1  1   string .ext crcb( CoverRoutineControlBlock );
000000 1  1   string .ext PinData( CoverPinDataTemplate );
000000 1  1   int          HdneMinusOne := pcbtable.hdne - 1; !Just for speed
000000 1  1   int          count;
000000 1  1
000000 1  1   call setstop( 2 );
000016 1  1
000016 1  1   @crcb := CRCB^Exists;                  !May do PSEM
000020 1  1   if @crcb = 0d then
000024 1  1      begin call setstop( 0 ); return 0; end;
000032 1  1
000032 1  1   count := 0;
000034 1  1   use i;
000034 1  1   for i := 0 to HdneMinusOne do
000037 1  1      begin
000037 1  2      @PinData := ControlByPinAddress( i );
000051 1  2      if PinData.State <> CoverMeasureReset then
000055 1  2         begin
000055 1  3         Pins[ count ] := i;           !This PIN is used
000064 1  3         count := count + 1;
000066 1  3         end;
000066 1  2       end;
000067 1  1   drop i;
000067 1  1
000067 1  1   vsem( bpth.CoverCrcbSem );
000076 1  1   call setstop( 0 );
000102 1  1   return count;
000104 1  1
000104 1  1   end; !proc GetPinValues

BPTH                     Variable,114   STRUCT-I       SG Pointer     L+001
COUNT                    Variable       INT            Direct         L+007
CRCB                     Variable,14020 STRUCT-S       EXT Pointer    L+002
HDNEMINUSONE             Variable       INT            Direct         L+006
PINDATA                  Variable,244   STRUCT-S       EXT Pointer    L+004
PINS                     Variable       INT            EXT Pointer    L-004
000000 0  0   ! This will stop measurement on a pin if it's still running.  It will then free
000000 0  0   ! all memory associated with the measurement of this pin.
000000 0  0   proc !prv! Reset^Command callable;
000000 1  0   begin
000000 1  1   int          Mask;                  !MUTEX stash box
```

```
000000 1  1   string      Params = 'P' := ["PIN ! OBJECT",0];
000007 1  1   string .ext crcb( CoverRoutineControlBlock );
000007 1  1   int     .sg bpth( bpttablehead ) := bpbase '-' wlen( bpth );
000007 1  1   int         pin := -1;               !PIN to stop
000007 1  1   int         Object := FALSE;
000007 1  1   int         Exclam := FALSE;         !Force reset even if no SAVE
000007 1  1   int         ProgName[0:11];
000007 1  1
000007 1  1   subproc Reset^PIN;
000007 2  1   begin
000007 2  2   string .ext PinData( CoverPinDataTemplate );
000007 2  2   int     .sg Measure^PCB( pcb^template );
000007 2  2   struct      Request( CVR^Server^Reset^Template );
000007 2  2
000007 2  2   if NOT CheckSecurity( pin ) then return;
000016 2  2
000016 2  2   call setstop( 2 );                   !Make us unstoppable
000022 2  2
000022 2  2   @crcb := CRCB^Exists;                !May PSEM
000024 2  2   if @crcb = 0d then
000030 2  2     begin
000030 2  3     call fprint( @Disabled );
000042 2  3     call setstop( 0 );
000046 2  3     return;
000051 2  3     end;
000051 2  2
000051 2  2   ! We know which PIN to stop.
000051 2  2   @Measure^PCB := @pcb[ pin ];         !Point to its PCB
000056 2  2   @PinData := ControlByPinAddress( pin );
000070 2  2
000070 2  2   ! Stop the measurement (if it's still running)
000070 2  2   if PinData.State = CoverMeasureRunning then
000074 2  2     begin
000074 2  3     ! Make sure data was previously SAVEd
000074 2  3     if NOT PinData.EverSaved and NOT Exclam then
000104 2  3       begin
000104 2  4       vsem( bpth.CoverCrcbSem );
000113 2  4       call setstop( 0 );
000117 2  4       call fprint( @NeverSaved );
000131 2  4       return;
000134 2  4       end;
000134 2  3
000134 2  3     ! Restore code segments
000134 2  3     mutexon( 0, %100 );
000136 2  3     if PinData.UC.SpaceCount then
000144 2  3       Measure^PCB.pcbcodeseg := PinData.UC.Seg;
000154 2  3     if PinData.UL.SpaceCount then
000162 2  3       Measure^PCB.pcblibseg := PinData.UL.Seg;
000172 2  3     USE SpaceDiff;
000172 2  3     SpaceDiff := Measure^PCB.pcbcurrentuc '-' PinData.UC.CopySeg;
000204 2  3     if SpaceDiff >= 0 and SpaceDiff <= PinData.UC.SpaceCount then
000217 2  3       Measure^PCB.pcbcurrentuc := PinData.UC.Seg '+' SpaceDiff;
000230 2  3     DROP SpaceDiff;
000230 2  3     mutexoff;
000231 2  3
000231 2  3     !In case it's THIS process being reset, make sure we're re mapped
```

```
000231 2  3      !before changing state (or we'll hit one of our BPTs which will be
000231 2  3      !interpreted as a call to debug.
000231 2  3      dispatch;
000232 2  3      PinData.State := CoverMeasureStopping;
000235 2  3      vsem( bpth.CoverCrcbSem );
000244 2  3      call setstop( 0 );
000250 2  3
000250 2  3      ServerName^S[5] ':=' BinToHex[ mypid.pidcpu ] for 1 bytes; !$XCVRn
000271 2  3      call open( ServerName, ServerFn );
000302 2  3      if <> then
000303 2  3         begin
000303 2  4         call fprint( @Disabled );
000315 2  4         return;
000321 2  4         end;
000321 2  3      Request.MessageType := CVR^Server^Reset;
000323 2  3      Request.PIN := PIN;
000325 2  3      call write( ServerFn, Request, $len(Request) );
000336 2  3      call close( ServerFn );             !We're done with it.
000343 2  3      call fprint( @OK );
000355 2  3      end
000355 2  2
000355 2  2   else
000357 2  2
000357 2  2      begin
000357 2  3      vsem( bpth.CoverCrcbSem );
000366 2  3      call setstop( 0 );
000372 2  3      call fprint( @NoMeasRun, pin );
000405 2  3      end;
000405 2  2
000405 2  2   end; !subproc Reset^PIN

MEASURE^PCB                    Variable,200   STRUCT-I       SG Pointer     S-002
PINDATA                        Variable,244   STRUCT-S       EXT Pointer    S-004
REQUEST                        Variable,4     STRUCT         Direct         S-001
000410 1  1   subproc Reset^Object;
000410 2  1   begin
000410 2  2   int        i;
000410 2  2   int        error;
000410 2  2
000410 2  2   if ProgName.<0:7> <> "$" then call finger^err( @NotLocal ); !Must be local
000425 2  2
000425 2  2   error := CheckFileSecurity( ProgName );
000431 2  2   ! If file no longer exists, let anyone remove it from table.
000431 2  2   if error AND error <> FENOTFOUND then
000436 2  2      begin
000436 2  3      call WhyCantRead( ProgName, error );
000443 2  3      return;
000446 2  3      end;
000446 2  2
000446 2  2   call setstop( 2 );                    !Make us unstoppable
000452 2  2
000452 2  2   @crcb := CRCB^Exists;                 !May do PSEM
000454 2  2   if @crcb = 0d then
000460 2  2      begin
000460 2  3      call setstop( 0 );
000464 2  3      call fprint( @Disabled );
```

```
000476 2  3       return;
000501 2  3       end;
000501 2  2
000501 2  2   for i := 0 to crcb.NumFiles - 1 do
000503 2  2      if ProgName = crcb.FilesToMeasure[ i ].FileName for 12 words then
000524 2  2         begin                         !Found.  Delete it from table
000524 2  3         if i < crcb.NumFiles - 1 then
000533 2  3            crcb.FilesToMeasure[ i ].FileName ':='
000533 2  3               crcb.FilesToMeasure[ i + 1].FileName for
000533 2  3                  (crcb.NumFiles - 1 - i) * $len(crcb.FilesToMeasure) bytes;
000573 2  3         crcb.NumFiles := crcb.NumFiles - 1;
000602 2  3         vsem ( bpth.CoverCrcbSem );
000611 2  3         call setstop( 0 );
000615 2  3         call fprint( @OK );
000627 2  3         return;
000632 2  3         end;
000643 2  2
000643 2  2   vsem ( bpth.CoverCrcbSem );
000652 2  2   call setstop( 0 );
000656 2  2   call fprint( @NotInTable );
000670 2  2   return;
000673 2  2
000673 2  2   end; !subproc Reset^Object

ERROR                    Variable       INT             Direct          S-000
I                        Variable       INT             Direct          S-001
000673 1  1   while nextchar( 0 ) do
000710 1  1      case scanidt( charadr, @Params ) of
000724 1  1      begin
000724 1  2      !PIN ! begin
000724 1 CE0           if Object OR pin <> -1 then call debug^err;
000735 1  3            if pin > -1 then call debug^err;   !Specified twice
000744 1  3            if scanint( charadr, pin, , 0, pcbtable.hdne - 1 ) then
000760 1  3               begin call fprint( @InvPin ); return; end;
000774 1  3            end;
000775 1 CE1     ! !! ! if Exclam OR Object then call debug^err else Exclam := TRUE;
001011 1 CE2     !OBJECT! begin
001011 1  3               if Object OR Exclam OR Pin <> -1 then call debug^err;
001024 1  3               if NOT scanfname( charadr, ProgName, defaults.word ) then
001034 1  3                  call finger^err( @NoFile );
001044 1  3               Object := TRUE;
001046 1  3               end;
001050 1 CE3     OTHERWISE call debug^err;
001054 1  2      end;
001071 1  1   eol;
001102 1  1
001102 1  1   if pin = -1 and NOT Object then
001107 1  1      begin
001107 1  2      call fprint( @NeitherPinNorObject );
001121 1  2      return;
001123 1  2      end;
001123 1  1
001123 1  1   if Object then
001125 1  1      call Reset^Object
001125 1  1   else
001130 1  1      call Reset^PIN;
```

```
001131 1  1
001131 1  1   end; !proc Reset^command;

BPTH                          Variable,114    STRUCT-I     SG Pointer    L+004
CRCB                          Variable,14020  STRUCT-S     EXT Pointer   L+002
EXCLAM                        Variable        INT          Direct        L+007
MASK                          Variable        INT          Direct        L+001
OBJECT                        Variable        INT          Direct        L+006
PARAMS                        Variable        STRING       Direct        P+000
PIN                           Variable        INT          Direct        L+005
PROGNAME                      Variable        INT          Direct        L+010
RESET^OBJECT                  Subproc                      %000410
RESET^PIN                     Subproc                      %000007
BINDER - OBJECT FILE BINDER - T9621C00 - (09SEP86)   SYSTEM \PRUNE
Object file name is $OVER.T9618C00.oupper
Object file timestamp is 29APR87 16:04:15
Number of Binder errors = 0
Number of Binder warnings = 0
Primary data = 143 words
Secondary data = 4152 words
Code area size = 4 pages
Resident code size = 0 pages
Data area size = 8 pages
Extended data area size = 0 pages
Top of stack = 4295 words
Number of code segments  = 1 segment


The object file will only run on a TNS/II
Errorfile file name is $OVER.T9618C00.EUPPER
Number of compiler errors =  0
Number of compiler warnings =  0
Maximum symbol table space used was = 185242 bytes
Number of source lines = 3995
Compile cpu time = 00:00:08
Total Elapsed time = 00:01:54
```

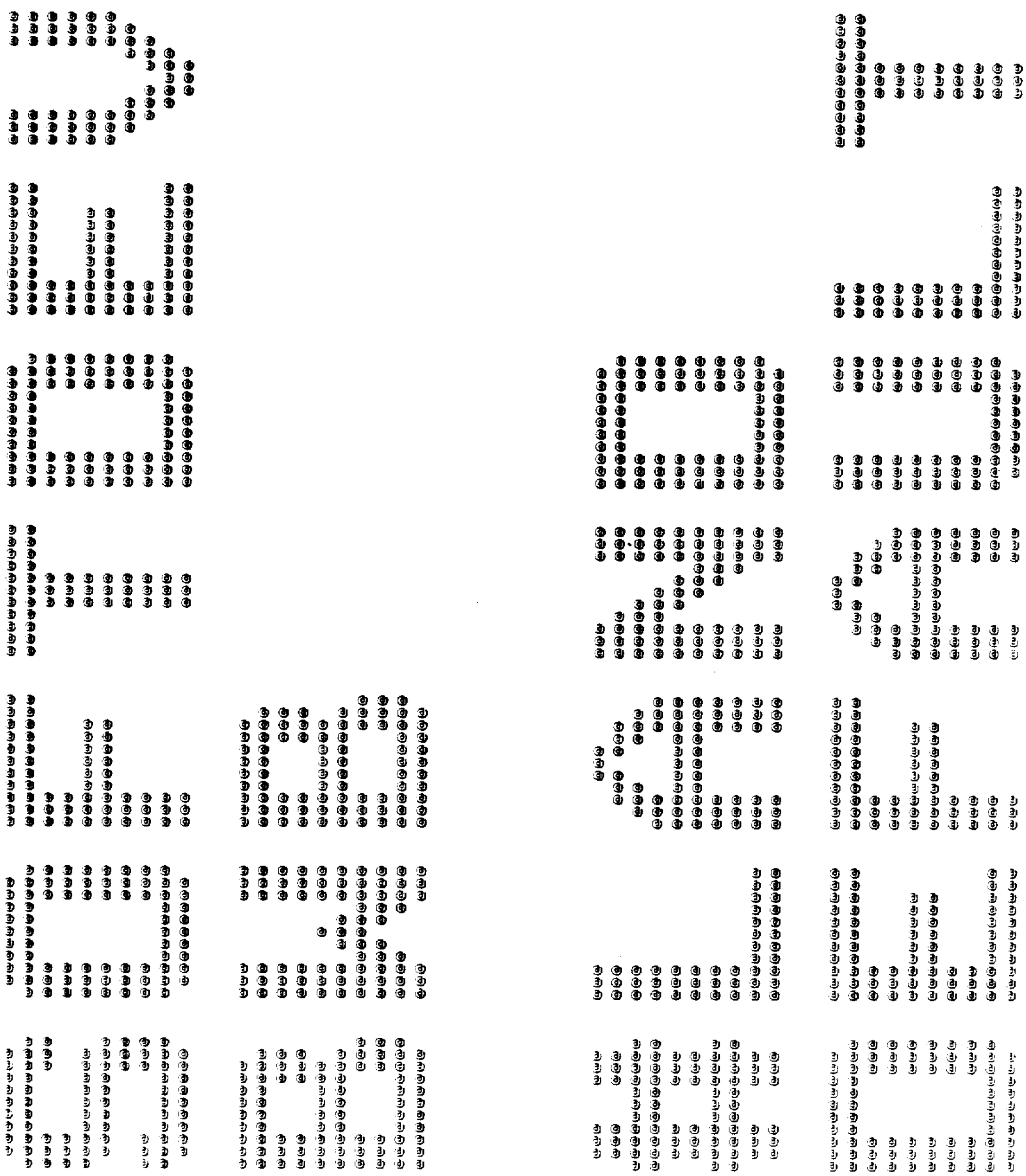

```
PAGE 1    $OVER.T9618C00.CUTIL1 [1]

TAL - T9250B40 - (15SEP86)                           Source language: TAL - Target machine: Tandem NonStop II System
Date - Time :  12FEB87 - 12:33:16               Default options: On (LIST,CODE,MAP,WARN,LMAP) - Off (ICODE,INNERLIST)

                       ?ERRORFILE eutil1,NOFIXUP,NOCODE, SYMBOLS, MAP, NOGMAP, LMAP(ALPHA,LOC)
     2.   000000 0  0  NAME Guardian^Util1^Procs;
     3.   000000 0  0  ?SOURCE copytal
Source file:  [1]  $VIOLET.TOOLSC00.COPYTAL  23DEC86 - 12:00:25
     1.   000000 0  0  ! +-------------------------------------------------------------------+
     2.   000000 0  0  ! |                                                                   |
     3.   000000 0  0  ! |   Copyright (C) 1987 by TANDEM COMPUTERS INCORPORATED             |
     4.   000000 0  0  ! |                                                                   |
     5.   000000 0  0  ! |   Protected as an unpublished work.                               |
     6.   000000 0  0  ! |                                                                   |
     7.   000000 0  0  ! |   The computer program listings and specifications herein are    |
     8.   000000 0  0  ! |   the property of TANDEM COMPUTERS INCORPORATED and shall not be |
     9.   000000 0  0  ! |   reproduced, copied, or used, in whole or in part, for any      |
    10.   000000 0  0  ! |   reason without the written permission of TANDEM COMPUTERS      |
    11.   000000 0  0  ! |   INCORPORATED.                                                   |
    12.   000000 0  0  ! |                                                                   |
    13.   000000 0  0  ! |   The following are trademarks or service marks of TANDEM        |
    14.   000000 0  0  ! |   COMPUTERS INCORPORATED:                                         |
    15.   000000 0  0  ! |                                                                   |
    16.   000000 0  0  ! |   BINDER      ENVOY         MULTILAN      PS TEXT EDIT   THL      |
    17.   000000 0  0  ! |   CROSSREF    EXCHANGE      NonStop       PS TEXT FORMAT TIL      |
    18.   000000 0  0  ! |   DATABOLT    EXPAND        NonStop 1+    RDF            TMF      |
    19.   000000 0  0  ! |   DDL         FASTSORT      NonStop EXT   SAFE           TRANSFER |
    20.   000000 0  0  ! |   DYNABUS     FAXLINK       NonStop II    SAFE-T-NET     WORDLINK |
    21.   000000 0  0  ! |   DYNAMITE    FOX           NonStop TXP   SAFEGUARD      XL8      |
    22.   000000 0  0  ! |   ENABLE      GUARDIAN      NonStop VLX   T-TEXT         XRAY     |
    23.   000000 0  0  ! |   ENCOMPASS   GUARDIAN 90   PATHMAKER     TACL           6AX      |
    24.   000000 0  0  ! |   ENCORE      GUARDIAN 90XF PCFORMAT      TAL                     |
    25.   000000 0  0  ! |   ENFORM      INFOSAT*      PERUSE        Tandem                  |
    26.   000000 0  0  ! |   ENSCRIBE    INSPECT       PS MAIL       TGAL                    |
    27.   000000 0  0  ! +-------------------------------------------------------------------+
    28.   000000 0  0  ! | * INFOSAT is a trademark in which both Tandem and American       |
    29.   000000 0  0  ! |   Satellite have rights.                                          |
    30.   000000 0  0  ! +-------------------------------------------------------------------+
    31.   000000 0  0  ! |   TANDEM COMPUTERS INCORPORATED -- PROPRIETARY AND CONFIDENTIAL   |
    32.   000000 0  0  ! +-------------------------------------------------------------------+
     4.   000000 0  0  ?NOLIST, source dsgaddr
     6.   000000 0  0  ?NOLIST, source dutil
     8.   000000 0  0  ?NOLIST, source derror
    10.   000000 0  0  ?NOLIST, source dmalloc
    12.   000000 0  0  ?NOLIST, source dcpuctl
    14.   000000 0  0  ?NOLIST, source dobjfmt( declaration )
    16.   000000 0  0  ?NOLIST, source dpctl
    18.   000000 0  0  ?NOLIST, source ddebug
    20.   000000 0  0
    21.   000000 0  0  ?SOURCE dsvgn( envlayout )
Source file:  [1]  $OVER.T9618C00.DSVGN  10OCT86 - 14:42:23
     1.   000000 0  0  ?SECTION ENVLAYOUT
     2.   000000 0  0  block environment^register;
     3.   000000 0  0  ! ENV register bit fields.
```

```
000000 0  0   ! Why not put in one place instead of scattering about? (guard2 take note!!)
000000 0  0   ! The env register has differing fields defined depending on whether
000000 0  0   ! the env referred to is the actual hardware register (e.g., rde instruction)
000000 0  0   ! or the env which is saved in a stack marker (e.g., pcal & xcal instructions).
000000 0  0   ! The former are flagged as 'r' below, the latter are flagged 's'
000000 0  0   DEFINE      ENVRP        = <13:15>#;!r  !  !reg pointer (points to ra)
000000 0  0   DEFINE      ENVCC        = <11:12>#;!r  !  !condition code
000000 0  0   DEFINE      ENVSPACEID   = <11:15>#;!  s!  !space id (index on base seg #)
000000 0  0   DEFINE      ENVV         = <10>   #;!r s!  !overflow bit
000000 0  0   DEFINE      ENVK         = <9>    #;!r s!  !carry bit
000000 0  0   DEFINE      ENVT         = <8>    #;!r s!  !arithmetic trap enabled bit
000000 0  0   DEFINE      ENVCS        = <7>    #;!r s!  !code space bit
000000 0  0   DEFINE      ENVDS        = <6>    #;!r s!  !data space bit
000000 0  0   DEFINE      ENVPRV       = <5>    #;!r s!  !privileged mode bit
000000 0  0   DEFINE      ENVLS        = <4>    #;!r s!  !library space bit
000000 0  0   DEFINE      ENVRESUMEBP  = <1>    #;!  s!  !resume from bpt instr on exit
000000 0  0   DEFINE      ENVTAKEBP    = <0>    #;!  s!  !take as if bpt instr on exit
000000 0  0
000000 0  0   ! procedure label (e.g., as found in the xep) bit fields:
000000 0  0   DEFINE      LABELPEP      = <7:15>#; !pep number
000000 0  0   DEFINE      LABELSPACEID  = <2:6> #; !space id (index on base seg #)
000000 0  0   DEFINE      LABELCMAP     = <0:1> #; !code map indicator
000000 0  0   DEFINE      LABELCS       = <0>   #; !code space bit
000000 0  0   DEFINE      LABELLS       = <1>   #; !library space bit
000000 0  0
000000 0  0   end block;
000000 0  0
000000 0  0   BLOCK CoverRoutine^defs;
000000 0  0   ?SOURCE dcover
Source file:  [1]  $OVER.T9618C00.DCOVER  11FEB87 - 17:09:55
000000 0  0   ?SECTION MICROCODE
000000 0  0   ! The basic measurement algorithm is to replace instructions within the
000000 0  0   ! measured code with a BPT instruction which will cause instruction breakpoint
000000 0  0   ! interrupts when executed.  For measured processes, the INSTRUCTIONBREAKPOINT
000000 0  0   ! interrupt handler will replace the BPT opcode with the original instruction,
000000 0  0   ! set a bit ON in a bitmap corresponding to each possible instruction location,
000000 0  0   ! and resume the operation.  At the end of a measurement period, we can
000000 0  0   ! determine which instruction locations were executed by examining the
000000 0  0   ! corresponding bit map.
000000 0  0
000000 0  0   literal     Icode^BPT = %451;      !Op code for BPT instruction
000000 0  0
000000 0  0   ?SECTION CONTROL
000000 0  0   ! We use a resident segment (CRCB) which is allocated by CVRMON when
000000 0  0   ! COVER is installed (by ENABLE).  The CRCB contains a control block
000000 0  0   ! which is used for regulating the COVER measurements.  If fully
000000 0  0   ! allocated (in CPUs with 256 PINs), the CRCB with the CoverPinData
000000 0  0   ! structures will require about 20 pages of physical memory.  The CRCB
000000 0  0   ! is addressed by the instruction breakpoint interrupt handler via an
000000 0  0   ! absolute extended pointer maintained in the bpt table header.
000000 0  0   ! CVRMON and COVERCOM can address this segment by calling USESEGMENT.
000000 0  0   ! Update access to the CRCB is controlled via a semaphore defined in
000000 0  0   ! the BPT table header.  COVERCOM can share the segments, so long as
000000 0  0   ! it holds the semaphore.
000000 0  0
```

```
000000 0  0   ! COVER will allocate space for the following structure in a Resident Segment,
000000 0  0   ! one copy for each PIN in the CPU.  This space will be allocated contiguously
000000 0  0   ! after the CRCB in the same segment for simplicity.
000000 0  0   ! This structure will, in turn, point to copies of the code/library files in
000000 0  0   ! memory (by absoute segment number) and to a similarly allocated code/library
000000 0  0   ! bitmap of measurement data.
000000 0  0
000000 0  0   struct      CoverPinDataCodespaceTemplate(*);
000000 0  0               begin
000000 0  1               int         Seg;              !Abs base segments
000000 0  1               int         CopySeg;
000000 0  1               int         Name[0:11];       !Program filename
000000 0  1               int         Timestamp[0:2];   !When it was bound
000000 0  1               int         SpaceCount;       !Number of code spaces
000000 0  1               int         SpaceSize[0:15];!Size (in words) of each code space
000000 0  1               string .EXT BitmapPtr;        !Pointer to measurement data
000000 0  1               end;
000000 0  0
000000 0  0   struct      CoverPinDataTemplate(*);
000000 0  0               begin
000000 0  1               int         State;      !Control of process (see below)
000000 0  1               int         EverSaved; !Flag.  Set when SAVE command completes
000000 0  1               int         SaveVol[0:7];   !Subvol to save bitmap on
000000 0  1               struct      UC( CoverPinDataCodespaceTemplate );
000000 0  1               struct      UL( CoverPinDataCodespaceTemplate );
000000 0  1               end;
000000 0  0
000000 0  0   ! State definitions:
000000 0  0   literal     CoverMeasureReset    = 0;   !Not in use; no control structures
000000 0  0   literal     CoverMeasureStarting = 1;   !Code file being read to set BPTs
000000 0  0   literal     CoverMeasureRunning  = 2;   !Measurement is in progress
000000 0  0   literal     CoverMeasureStopping = 3;   !Measurement has stopped, but bitmap
000000 0  0                                           !is not de-allocated.
000000 0  0
000000 0  0   ! Control of all COVER measurements within a cpu is achieved through the use of
000000 0  0   ! this structure (referred to as a CRCB) which remains in a resident segment as
000000 0  0   ! long as COVER is installed in a cpu.
000000 0  0
000000 0  0   struct      CoverRoutineControlBlock(*);
000000 0  0               begin
000000 0  1               int(32)     Verifier;             ! Contains eyecatcher "CovR"
000000 0  1               int         Version;              ! For format identification
000000 0  1               int         XCVRn^PIN;            ! PIN of $XCVRn server
000000 0  1               int         PrivEnabled;          ! TRUE if ENABLE PRIV
000000 0  1               int         MemoryRatio;          ! Don't create too much pressure
000000 0  1               int         CurrentTraceBuf;      ! Current pointer in trace buf
000000 0  1     struct       TraceBuf[0:127];               ! Trace buffer (for debugging)
000000 0  1                  begin                          ! for tracing all BPT interrupts
000000 0  2                  int      PIN;
000000 0  2                  int      SpaceId;
000000 0  2                  int      P;
000000 0  2                  end;
000000 0  1               int         NumFiles;             ! # of entries in FilesToMeasure.
000000 0  1     struct       FilesToMeasure[0:127];         ! Table of filenames to measure.
000000 0  1                  begin                          ! Always compressed to minimize
000000 0  2                  int      FileName[0:11];       ! search time.
```

```
000000 0  2               int      UserID;               ! Who said "Measure OBJECT"
000000 0  2               int           SaveVol[0:7];    !Subvol to save bitmap on
000000 0  2               end;
000000 0  1    struct     ControlByPIN( CoverPinDataTemplate )
000000 0  1               [0:-1];                        ! Actually [0:<max pcbs>-1]
000000 0  1            end;
000000 0  0
000000 0  0 ! An eyecatcher is stashed in the CRCB just for sanity checking purposes.
000000 0  0 define      CoverVerifier = ($dbl( "Co","vR" ))#; !eyecatcher
000000 0  0
000000 0  0 ! We will want to make sure that appropriate versions of COVER are looking at
000000 0  0 ! these control structures, so:
000000 0  0 literal     CoverControlLatestVersion = 13;
000000 0  0
000000 0  0
000000 0  0 ! The following SEGIDs are reserved for use by COVER.  They will
000000 0  0 ! define the resident segments needed to control measurements.  All
000000 0  0 ! the resident segments are allocated/deallocated by CVRMON and are
000000 0  0 ! owned the the $XCVRn process in each ENABLEd cpu.  A range of 256
000000 0  0 ! SEGIDs are reserved, one for each possible PIN, for each PIN's
000000 0  0 ! bitmap data, code copy, and library copy.  Only those segments which
000000 0  0 ! are actually in use will be allocated, and only the amount required
000000 0  0 ! for use will be locked down.
000000 0  0
000000 0  0 literal     CoverCrcbSegid       = 2302; !CRCB will belong to CVRMON
000000 0  0 literal     CoverBitmapSegids    = 2303; !2303 to 2558 for PINs 0 to 255 Bitmaps
000000 0  0 literal     CoverCodeCopySegids  = 2559; !2559 to 2814 for PINs 0 to 255 Code
000000 0  0 literal     CoverLibCopySegids   = 2815; !2815 to 3071 for PINs 0 to 255 Lib
000000 0  0 ! The bitmaps are allocated as an entire resident segment each, but only the
000000 0  0 ! pages actually needed are locked down.  This is enough for 16 spaces worth of
000000 0  0 ! bitmaps since a bitmap for each space is 64K bits, or 4KW.  Each space's
000000 0  0 ! bitmap starts on a 4KW boundary, so addressing is easy.
000000 0  0 ! We would LIKE to be able to define a struct to define this, but TAL limits
000000 0  0 ! structs to 32K words, and we need 64K words.  If we could, it would look like
000000 0  0 ! this:
000000 0  0 --struct      CoverSpaceBitmapTemplate(*);
000000 0  0 --            begin
000000 0  0 --   struct      Space[0:15];
000000 0  0 --               begin
000000 0  0 --               int         Bitmap[0:4095];
000000 0  0 --               end;
000000 0  0 --            end;
000000 0  0 ! But we'll have to do the 1st level of indexing ourselves, so we'll use an
000000 0  0 ! an array pointer which we'll initialize to the base + space index * size;
000000 0  0 ! The array will then look something like this:
000000 0  0 -- int .ext Bitmap[0:4095];
000000 0  0
000000 0  0 ! Note that programs may now have as many as 32 code spaces, but if
000000 0  0 ! they do, there can be no library.  COVER identifies these by making
000000 0  0 ! the UC and UL program names the same.  It then uses the UL bitmaps,
000000 0  0 ! etc. for the additional (>16) code spaces' data.
000000 0  0
000000 0  0 literal     SizeOfCoverSpaceBitmap = 8192d;  !In bytes
000000 0  0 literal     SizeOfCoverBitmapSegment = 16d * SizeOfCoverSpaceBitmap;
000000 0  0 ?SECTION DISC
```

```
000000 0 0   ! The disc output format for COVER measurement data is identical to the
000000 0 0   ! extended data structure which holds all measurement data for a particular
000000 0 0   ! PIN.  This includes the Verifier and Version fields corresponding to the
000000 0 0   ! CRCB, followed by a copy of CoverPinData.
000000 0 0   ! For the sake of ease of efficient writing, enough filler is included to
000000 0 0   ! force the bitmaps to start on a 4K boundary.  This is followed by two fully
000000 0 0   ! allocated (i.e., no empty space between bitmaps, even if much of the 16
000000 0 0   ! address spaces went unreferenced) copies of BitmapData.  The EOF will be the
000000 0 0   ! last bitmap address referenced (rounded up to an even page).  These can be
000000 0 0   ! referenced using the following:
000000 0 0
000000 0 0   struct      CoverDiscImageTemplate(*);
000000 0 0               begin
000000 0 1               int(32)     Verifier;            ! Contains eyecatcher "CovR"
000000 0 1               int         Version;             ! For format identification
000000 0 1               int         UCEverBooleaned;     ! TRUE if ever AND/OR/XOR'd
000000 0 1               int         ULEverBooleaned;     ! TRUE if ever AND/OR/XOR'd
000000 0 1               struct      UC( CoverPinDataCodespaceTemplate );
000000 0 1               struct      UL( CoverPinDataCodespaceTemplate );
000000 0 1               int         garbage[0:-1];        ! To provide $offset of filler
000000 0 1               filler      ( 4096 - $offset(CoverDiscImageTemplate.garbage) );
000000 0 1   -- struct      UCbitmapData( CoverSpaceBitmapTemplate );
000000 0 1   -- struct      ULbitmapData( CoverSpaceBitmapTemplate );
000000 0 1   ! We have to manage those last two substructs ourselves because TAL doesn't
000000 0 1   ! support structs that big!
000000 0 1               int         HandleOurselves[0:-1];     !For addressing above
000000 0 1               end;
000000 0 0
000000 0 0   literal     CoverDiscSegsize = ($len( CoverDiscImageTemplate ) '*' 1)
000000 0 0                              + (SizeOfCoverBitmapSegment * 2d);
000000 0 0
000000 0 0   literal     CoverDiscExtentPages = 16;  !constant until TPR S860204-1131-3351
000000 0 0   !              (((CoverDiscSegsize + 4095d)/4096) '*' 2 + 15d) '/' 16;
000000 0 0
000000 0 0   literal     CoverBitmapFilecode = 846;  !File code for bitmap files.
000000 0 0
000000 0 0   ?SECTION MESSAGES
000000 0 0   ! These messages are passed to the COVER server processes, $XCVR and
000000 0 0   ! $XCVRn.
000000 0 0   struct CVR^Server^Disable^Template(*);
000000 0 0               begin
000000 0 1   int         MessageType;
000000 0 1               end;
000000 0 0
000000 0 0   struct CVR^Server^Enable^Template(*);
000000 0 0               begin
000000 0 1   int         MessageType;
000000 0 1               end;
000000 0 0
000000 0 0   struct CVR^Server^Measure^Template(*);
000000 0 0               begin
000000 0 1   int         MessageType;
000000 0 1   int         FromMonitor;                 !TRUE iff from Xnewprocess
000000 0 1   int         PIN;                         !PIN to measure
000000 0 1   int         Crtpid[0:2];                 !CRTPID of PIN to measure
000000 0 1   int         CodeSeg;                     !ABS segment of 1st program segment
```

```
000000 0  1   int        LibSeg;                  !ABS segment of 1st library segment
000000 0  1   int        CodeFilename[0:11];
000000 0  1   int        LibFilename[0:11];
000000 0  1   int        SaveVol[0:7];            !Subvol to save bitmap on
000000 0  1              end;
000000 0  0
000000 0  0   struct CVR^Server^Save^Template(*);
000000 0  0              begin
000000 0  1   int        MessageType;
000000 0  1   int        FromMonitor;             !TRUE => send error messages to $0
000000 0  1   int        PIN;                     !PIN to save
000000 0  1   int        Owner;                   !Owner for bitmap file
000000 0  1   int        Security;                !Security vector for bitmap file
000000 0  1   int        Filename[0:11];          !Filename of bitmap file
000000 0  1              end;
000000 0  0
000000 0  0   struct CVR^Server^Reset^Template(*);
000000 0  0              begin
000000 0  1   int        MessageType;
000000 0  1   int        PIN;                     !PIN to reset
000000 0  1              end;
000000 0  0
000000 0  0   ! The messages are identified by these MessageTypes:
000000 0  0   literal    CVR^Server^Disable  = 1;
000000 0  0   literal    CVR^Server^Enable   = 2;
000000 0  0   literal    CVR^Server^Measure  = 3;
000000 0  0   literal    CVR^Server^Save     = 4;
000000 0  0   literal    CVR^Server^Reset    = 5;
000000 0  0
000000 0  0   ! Special error returns from CVRMON must be negative (so as not to
000000 0  0   ! duplicate FE numbers) and must be different from RO^ routines' error
000000 0  0   ! codes.
000000 0  0   literal    CoverErrFirst          = -10; !First in the list *****
000000 0  0   literal    CoverErrAlready        = -10; !Already ENABLEd
000000 0  0   literal    CoverErrInsMem         = -11; !Insufficient memory
000000 0  0   literal    CoverErrNotRunning     = -12; !No (or wrong) process in PIN
000000 0  0   literal    CoverErrSpaceMismatch  = -13; !Code and object don't match
000000 0  0   literal    CoverErrInUse          = -14; !Some measurement running
000000 0  0   literal    CoverErrPriv           = -15; !PRIV process, but no ENABLE PRIV
000000 0  0   literal    CoverErrLast           = -15; !Last in the list ******
000000 0  0   END BLOCK;
000000 0  0
000000 0  0   ?SOURCE pcvrstub( CoverHook1 )      !For TestCoverHooks ONLY
Source file: [1] $IMT.T9050C00.PCVRSTUB  31OCT86 - 17:00:40
000000 0  0   ?SECTION COVERHOOK1
000000 0  0   PROC  COVERHOOK1 PRIV, RESIDENT;
000000 1  0   EXTERNAL;
000000 0  0
000000 0  0   ?NOLIST, source pdebug( dbg^checkaddr, clearbpt )
000000 0  0   ?NOLIST, source pmalloc( getsegment, lockmemory, putsegment, unlockmemory )
000000 0  0   ?NOLIST, source extdecs ( close,
000000 0  0   ?SETTOG 15                          !For FORWARDs
000000 0  0   ?NOLIST, source putill, resettog 15
```

```
000000 0  0   ?SOURCE sversion( version^util1 )
Source file:  [1]  $OVER.T9618C00.SVERSION   12FEB87 - 12:20:47
000000 0  0   ?SECTION VERSION^UTIL1
000000 0  0   PROC T9618C00^15JUL87^UTIL1^11F7;
000000 1  0   BEGIN END;
000000 0  0
000000 0  0   ?SOURCE sutil1
Source file:  [1]  $OVER.T9618C00.SUTIL1  05NOV86 - 14:11:34
000000 0  0   ! Allocate the memory segment(s) to duplicate the object file.  This will be
000000 0  0   ! allocated as a resident segment, locked down, then the code wil be copied.
000000 0  0   ! The use count of the copied code segments will be incremented by 1, so it
000000 0  0   ! won't disappear out from under us should the measured process stop.
000000 0  0   !
000000 0  0   ! Returns 0 if successful.
000000 0  0   !
000000 0  0   ! This code duplicates a lot of what happens during NEWPROCESS.  It has
000000 0  0   ! been "stolen" from XNEWPROCESS in SMONTOR, then tailored to work here.
000000 0  0   ! Applicable code was from the mainline code checks in XNEWPROCESS and the
000000 0  0   ! subproc CHECKSPACES.  Also included is code from the subproc OPENFILES in
000000 0  0   ! SYSTEMMONITOR.
000000 0  0   int !prv! proc CopyObject( PinSpace ) priv;
000000 1  0   string .ext PinSpace( CoverPinDataCodespaceTemplate );
000000 1  0   begin
000000 1  1   LITERAL  MAXSPACESIZE = 64D * 2048D;     !max size of single space in bytes
000000 1  1   LITERAL  MAXSPACES = 16;            !max. number of spaces in object file
000000 1  1   int     .ext codesizes;             !abs address of table of codesizes
000000 1  1
000000 1  1   int     .ext SptA( spt^template );
000000 1  1   int     .ext SptB( spt^template );
000000 1  1   INT          SPACE;
000000 1  1   int          error;
000000 1  1   int          k;
000000 1  1   int          CopyBaseSeg;           !base segment for our copy
000000 1  1
000000 1  1   ! Array of size (in pages) of each code space.
000000 1  1   INT      SPACESIZES[0:MAXSPACES-1];
000000 1  1
000000 1  1
000000 1  1   if PinSpace.SpaceCount = 0 then return 0;    !Nothing to do (lib)
000012 1  1
000012 1  1   FOR  SPACE := 0  TO  PinSpace.SpaceCount - 1 do
000014 1  1      BEGIN
000014 1  2      SPACESIZES[ space ] := PinSpace.SpaceSize[ space ].<0:5> +
000014 1  2                        (IF PinSpace.SpaceSize[ space ].<6:15> THEN 1 ELSE 0);
000043 1  2      END;
000056 1  1
000056 1  1   @CODESIZES := $axadr(spacesizes);
000063 1  1
000063 1  1   ! Get enough contiguous segments to copy the code space
000063 1  1   CopyBaseSeg := GETSEGMENT( $UDBL( PinSpace.SpaceCount ) * MAXSPACESIZE,
000063 1  1                               SPTCODESEG, CODESIZES );
000103 1  1   IF CopyBaseSeg < 0 THEN             !allocation failure
000106 1  1      return CopyBaseSeg;
000110 1  1
000110 1  1   ! Duplicate SPT headers so they look like original code's.  (We especially
000110 1  1   ! need the filenumbers so that PROGRAMFILENAME will work.)
```

```
000110 1  1   for K := 0 to PinSpace.SpaceCount - 1 do
000112 1  1      begin
000112 1  2      stack^aspt(AXBYTE(Pinspace.Seg + K, 0));
000125 1  2      store @SptA;
000126 1  2      stack^aspt(AXBYTE(CopyBaseSeg + K, 0));
000140 1  2      store @SptB;
000141 1  2      SptB.initfnum := SptA.initfnum;
000145 1  2      SptB.offset := SptA.offset;
000157 1  2      end;
000172 1  1
000172 1  1   ! Lock down all of code copy space.  This will cause it to be paged in from
000172 1  1   ! the object file.  It will be FIXUP'd and will have no BPTs set.
000172 1  1   if (error := LockCode( CopyBaseSeg, PinSpace.SpaceCount )) then
000204 1  1      begin                           !Free segments
000204 1  2      for K := 0 to PinSpace.SpaceCount - 1 do
000206 1  2         call TossSegment( CopyBaseSeg + K );
000226 1  2      return error;
000230 1  2      end;
000230 1  1
000230 1  1   PinSpace.CopySeg := CopyBaseSeg;    !Return the copied segment
000236 1  1   return 0;                           !Indicate all's well
000240 1  1
000240 1  1   end; ! proc CopyObject

CODESIZES                         Variable      INT          EXT Pointer    L+001
COPYBASESEG                       Variable      INT          Direct         L+012
ERROR                             Variable      INT          Direct         L+010
K                                 Variable      INT          Direct         L+011
MAXSPACES                         Literal       INT          %000020
MAXSPACESIZE                      Literal       INT (32)     %000002 000000
PINSPACE                          Variable,110  STRUCT-S     EXT Pointer    L-004
SPACE                             Variable      INT          Direct         L+007
SPACESIZES                        Variable      INT          Direct         L+013
SPTA                              Variable,36   STRUCT-I     EXT Pointer    L+003
SPTB                              Variable,36   STRUCT-I     EXT Pointer    L+005

000000 0  0   ! Returns address of the crcb and locks semaphore if it exists, else 0.
000000 0  0   int(32) !prv! proc CRCB^Exists priv;
000000 1  0   begin
000000 1  1   int     .sg bpth( bpttablehead ) := bpbase '-' wlen( bpth );
000000 1  1   string .ext crcb( CoverRoutineControlBlock );
000000 1  1
000000 1  1   psem( bpth.CoverCrcbSem, -1d );     !Lock it
000016 1  1
000016 1  1   @crcb := @bpth.CoverCrcbPtr;
000021 1  1
000021 1  1   if @crcb = 0d then                  !It must have gone away.  Pretty lousy
000025 1  1      begin                            !operator control!
000025 1  2      vsem( bpth.CoverCrcbSem );
000034 1  2      return 0d;
000036 1  2      end;
000036 1  1
000036 1  1   if crcb.verifier <> CoverVerifier OR          !Sanity check.
000036 1  1      crcb.version <> CoverControlLatestVersion THEN
000052 1  1         PROCESSOR^HALT( DBG^Cover^Internal );  !The CRCB got wiped out!
000057 1  1
000057 1  1   return @crcb;                       !All's well
```

```
000061 1  1
000061 1  1   end; ! proc CRCB^Exists

BPTH                       Variable,114    STRUCT-I     SG Pointer    L+001
CRCB                       Variable,14020  STRUCT-S     EXT Pointer   L+002
000000 0  0   proc !prv! FreeSegs( FirstSeg, NumSegs ) priv;
000000 1  0   int        FirstSeg;            !1st ablsolute code segment to free
000000 1  0   int        NumSegs;             !Number of code segments to free
000000 1  0   begin
000000 1  1   int        space;
000000 1  1   int        Num^Segs := NumSegs-1; !Handy value
000000 1  1   int     .sg bpt( bpt^template) := bpbase '-' wlen( bpt );
000000 1  1
000000 1  1   if NumSegs then
000012 1  1      begin
000012 1  2      ! Remove any breakpoints
000012 1  2      while (@bpt := @bpt[1]) '<' bplimit do
000021 1  2         if bpt.bpaseg - FirstSeg '<=' Num^Segs then
000030 1  2           call clearbpt( bpt );
000034 1  2      for space := 0 to Num^Segs do   !all code spaces
000036 1  2         begin
000036 1  3         call TossSegment( FirstSeg );
000041 1  3         FirstSeg := FirstSeg '+' 1;
000044 1  3         end;
000052 1  2      end;
000052 1  1
000052 1  1   end; !proc FreeSegs

BPT                        Variable,22     STRUCT-I     SG Pointer    L+003
FIRSTSEG                   Variable        INT          Direct        L-004
NUMSEGS                    Variable        INT          Direct        L-003
NUM^SEGS                   Variable        INT          Direct        L+002
SPACE                      Variable        INT          Direct        L+001
000000 0  0   ! Get the operating system's version date which is kept by convention
000000 0  0   ! in a 'P' array which immediately precedes the first code word at the
000000 0  0   ! entry point to "TOSVERSION".
000000 0  0   proc !prv! GetOsVERDATE( VersionDate ) CALLABLE;
000000 1  0   string     .VersionDate;
000000 1  0   begin
000000 1  1   string .ext codebyte;
000000 1  1   @codebyte := labeltoaxadr( @tosversion );
000006 1  1   if codebyte[ -10 ] = "(" then
000012 1  1      VersionDate ':=' codebyte[ -10 ] for 9 & 0
000012 1  1   else
000036 1  1      VersionDate := 0;
000040 1  1   end; ! proc GetOsVERDATE

CODEBYTE                   Variable        STRING       EXT Pointer   L+001
VERSIONDATE                Variable        STRING       Indirect      L-003
000000 0  0   ! Converts a procedure label (e.g. passed as "@numout") to an abs.
000000 0  0   ! extended address which points to the proc entry address (per the pep entry)
000000 0  0   int ( 32 ) proc !prv! labeltoaxadr ( proclabel ) priv;
000000 1  0   int      proclabel;
000000 1  0   begin
000000 1  1   int       segnum;
000000 1  1   int      .ext codeptr;
```

```
000000 1  1
000000 1  1   @codeptr := axbyte ( ( segnum := ( case proclabel.labelcmap of
000001 1  1                                       begin
000001 1  1                                       !0 uc! cpcb.pcbcodeseg;
000001 1  1                                       !1 ul! cpcb.pcblibseg;
000001 1  1                                       !2 sc! systemcodeseg;
000001 1  1                                       !3 sl! firstslseg;
000001 1  1                                       end ) + proclabel.labelspaceid ), 0 );
000035 1  1   return axword ( segnum, codeptr | proclabel.labelpep | );
000045 1  1
000045 1  1   end; ! proc labeltoaxadr

CODEPTR                  Variable      INT          EXT Pointer     L+002
PROCLABEL                Variable      INT          Direct          L-003
SEGNUM                   Variable      INT          Direct          L+001

000000 0  0   ! Will lock the program code spaces in memory.
000000 0  0   ! Returns 0 if all the code was locked OK, otherwise returns the
000000 0  0   ! LOCKMEMORY error (-1, -2) or 1 if the segment doesn't exist.
000000 0  0   int !prv! proc LockCode ( FirstSeg, spaces ) priv;
000000 1  0   int          FirstSeg;     !abs seg #
000000 1  0   int          spaces;       !# of code spaces
000000 1  0   begin
000000 1  1   int    .ext spt( spt^template);
000000 1  1   string .ext FirstLoc;      !First location to lock
000000 1  1   int(32)      CodeLength;   !Length of code to lock
000000 1  1   int          error;        !LOCKMEMORY error code
000000 1  1   literal      WaitForMemory = 10d;    !100 ms.  Don't bother if we'll cause a lot
000000 1  1                                        !of pageouts.
000000 1  1   int          space;
000000 1  1   int          ThisSeg;
000000 1  1   int          TotalPages;
000000 1  1
000000 1  1   ! Before we exit, undo any locks we've been successful with so far.
000000 1  1   subproc undo;
000000 2  1   begin
000000 2  2   while (space := space - 1) >= 0 do
000005 2  2      begin
000005 2  3      FirstSeg := FirstSeg '-' 1;
000010 2  3      stack^aspt( (@FirstLoc := axword( FirstSeg, 0 )) );
000022 2  3      store @spt;
000023 2  3      CodeLength := segsize( FirstSeg ) '*' 2048;
000036 2  3      call unlockmemory( FirstLoc, CodeLength );
000042 2  3      end;
000043 2  2   end;
000044 1  1
000044 1  1
000044 1  1
000044 1  1   if spaces = 0 then return 0;          !Nothing to do
000052 1  1
000052 1  1   ! Count total number of pages we're going to lock
000052 1  1   TotalPages := 0;
000054 1  1   ThisSeg := FirstSeg;
000056 1  1   for space := 0 to spaces - 1 do !all code spaces
000060 1  1      begin
000060 1  2      TotalPages := TotalPages '+' segsize( ThisSeg );
000073 1  2      ThisSeg := ThisSeg '+' 1;
```

```
000076 1  2        end;
000105 1  1
000105 1  1     ! Don't even bother if not enough memory.  (Note: this is expecially important
000105 1  1     ! since if we're locking real program code (not a resident segment), then the
000105 1  1     ! LOCKMEMORY TOV parameter will be ignored.
000105 1  1     if kccb.curlocks '+' TotalPages '>=' kccb.maxlocks then return -1;
000117 1  1
000117 1  1     ! Now start locking.
000117 1  1     for space := 0 to spaces - 1 do !all code spaces
000121 1  1        begin
000121 1  2        stack^aspt( (@FirstLoc := axword( FirstSeg, 0 )) );
000133 1  2        store @spt;
000134 1  2        if $carry then                   !Segment doesn't exist
000135 1  2           begin call undo; return 1; end;
000140 1  2        CodeLength := segsize( FirstSeg ) '*' 2048;
000153 1  2        if (error := lockmemory( FirstLoc, CodeLength, WaitForMemory )) < 0 then
000167 1  2           begin call undo; return error; end;
000172 1  2        FirstSeg := FirstSeg '+' 1;
000175 1  2        end;
000204 1  1     return 0;                           !No problems
000206 1  1
000206 1  1     end; ! proc LockCode

CODELENGTH                 Variable       INT (32)       Direct          L+005
ERROR                      Variable       INT            Direct          L+007
FIRSTLOC                   Variable       STRING         EXT Pointer     L+003
FIRSTSEG                   Variable       INT            Direct          L-004
SPACE                      Variable       INT            Direct          L+010
SPACES                     Variable       INT            Direct          L-003
SPT                        Variable,36    STRUCT-I       EXT Pointer     L+001
THISSEG                    Variable       INT            Direct          L+011
TOTALPAGES                 Variable       INT            Direct          L+012
UNDO                       Subproc                       %000000
WAITFORMEMORY              Literal        INT (32)       %000000 000012

000000 0  0     ! Swap abs seg numbers in BPT entries for this pin and replace BPT
000000 0  0     ! instructions with original.
000000 0  0     !
000000 0  0     ! **********  This is called under MUTEX.  **********
000000 0  0     !
000000 0  0     proc !prv! ReplaceBPTs( pcb, PinSpace ) resident, priv;
000000 1  0     int         pcb;                    !Address of PCB being swapped
000000 1  0     string .ext PinSpace( CoverPinDataCodespaceTemplate );
000000 1  0     begin
000000 1  1     int      .sg MyBpt( bpt^template );
000000 1  1     int      .sg OtherBpt( bpt^template );
000000 1  1     int     .ext InstrAddr;
000000 1  1     int          CodeSeg;
000000 1  1     int          CodeCopySeg;
000000 1  1     label        Skip;
000000 1  1
000000 1  1     @MyBpt := bpbase '-' wlen( MyBpt );     !Initialize scan
000005 1  1     while (@MyBpt := @MyBpt[1]) '<' bplimit do
000014 1  1        if MyBpt.bppcb = pcb AND
000014 1  1           MyBpt.bpaseg - PinSpace.$eg '<' PinSpace.SpaceCount then !I have a BPT
000036 1  1           begin
000036 1  2           ! Swap abs segment to point to copy code.
```

```
 240.   000036 1  2       CodeSeg := MyBpt.bpaseg;      !Save original for future use
 241.   000041 1  2       CodeCopySeg := CodeSeg + (PinSpace.CopySeg - PinSpace.Seg);
 242.   000054 1  2       MyBpt.bpaseg := CodeCopySeg;
 243.   000057 1  2       ! Set a BPT in copy code
 244.   000057 1  2       @InstrAddr := axword( CodeCopySeg, MyBpt.bpwadrs );
 245.   000067 1  2       InstrAddr := Icode^BPT;
 246.   000073 1  2       ! See whether original code's BPT needs to be cleared.
 247.   000073 1  2       @InstrAddr := axword( CodeSeg, MyBpt.bpwadrs );
 248.   000102 1  2       if DBG^CheckAddr( @InstrAddr ) <> 1 then !If it's NOT here, then MM will.
 249.   000107 1  2          begin                     !The instruction is present
 250.   000107 1  3          ! See if there's another BPT set there.
 251.   000107 1  3          @OtherBpt := bpbase '-' wlen( OtherBpt );
 252.   000113 1  3          while (@OtherBpt := @OtherBpt[1]) '<' bplimit do
 253.   000122 1  3             if OtherBpt.bpaseg = CodeSeg AND
 254.   000122 1  3                OtherBpt.bpwadrs = MyBpt.bpwadrs then
 255.   000136 1  3                   goto Skip;        !There IS another
 256.   000140 1  3          InstrAddr := MyBpt.bpinstr;    !There is no other, so restore original
 257.   000145 1  3   Skip:
 258.   000145 1  3          end;
 259.   000145 1  2       end;
 260.   000146 1  1
 261.   000146 1  1   end; !proc ReplaceBPTs

CODECOPYSEG                  Variable       INT          Direct        L+006
CODESEG                      Variable       INT          Direct        L+005
INSTRADDR                    Variable       INT          EXT Pointer   L+003
MYBPT                        Variable,22    STRUCT-I     SG Pointer    L+001
OTHERBPT                     Variable,22    STRUCT-I     SG Pointer    L+002
PCB                          Variable       INT          Direct        L-005
PINSPACE                     Variable,110   STRUCT-S     EXT Pointer   L-004
SKIP                         Label                       %000145
 263.   000000 0  0   ! Tests to see whether Cover is enabled in this processor.
 264.   000000 0  0   ! Returns:
 265.   000000 0  0   !    0 if not enabled
 266.   000000 0  0   !    1 if enabled
 267.   000000 0  0   !    2 if enabled for PRIV program measurements
 268.   000000 0  0   int !prv! proc TestCoverEnabled callable;
 269.   000000 1  0   begin
 270.   000000 1  1   int          mask;                  !For MUTEX
 271.   000000 1  1   int     .sg bpth( bpttablehead ) := bpbase '-' wlen( bpth );
 272.   000000 1  1   string .ext crcb( CoverRoutineControlBlock );
 273.   000000 1  1
 274.   000000 1  1   MUTEXON( %30 );
 275.   000010 1  1   @crcb := @bpth.CoverCrcbPtr;
 276.   000013 1  1   if @crcb = 0d then
 277.   000017 1  1      begin
 278.   000017 1  2      MUTEXOFF;
 279.   000020 1  2      return 0                        !Not ENABLEd
 280.   000020 1  2      end
 281.   000022 1  1   else
 282.   000023 1  1      begin
 283.   000023 1  2      if crcb.PrivEnabled then
 284.   000026 1  2         begin
 285.   000026 1  3         MUTEXOFF;
 286.   000027 1  3         return 2;                    !ENABLEd for PRIV
 287.   000031 1  3         end
```

```
 288.  000031 1  2      else
 289.  000032 1  2         begin
 290.  000032 1  3         MUTEXOFF;
 291.  000033 1  3         return 1;                        !ENABLEd, but not for PRIV
 292.  000035 1  3         end;
 293.  000035 1  2      end;
 294.  000035 1  1
 295.  000035 1  1   end; ! proc TestCoverEnabled

BPTH                        Variable,114   STRUCT-I        SG Pointer     L+002
CRCB                        Variable,14020 STRUCT-S        EXT Pointer    L+003
MASK                        Variable       INT             Direct         L+001
 297.  000000 0  0   ! Tests to see whether an eyecatcher is before the given entry point location
 298.  000000 0  0   ! Returns:
 299.  000000 0  0   !    TRUE if CoverHook1 is installed.
 300.  000000 0  0   !    FALSE otherwise.
 301.  000000 0  0   int !prv! proc TestCoverHooks callable;
 302.  000000 1  0   begin
 303.  000000 1  1   int     .ext EntryAddress;
 304.  000000 1  1   literal      Icode^CMPI = %1000;
 305.  000000 1  1
 306.  000000 1  1   @EntryAddress := labeltoaxadr( @CoverHook1 );!Get abs address of entry point
 307.  000006 1  1
 308.  000006 1  1   if @EntryAddress = 0d then return 0;     !Dummy is not even there!
 309.  000015 1  1
 310.  000015 1  1   ! NOTE: The following constants are obtained by looking at the code
 311.  000015 1  1   ! listing for CoverHook1.
 312.  000015 1  1   return ( EntryAddress = [%002015,%103123,%043600,%003732,%024700] AND
 313.  000015 1  1            EntryAddress[%56-%26] = Icode^CMPI '+' CoverControlLatestVersion );
 314.  000042 1  1   end; !proc TestCoverHooks

ENTRYADDRESS                Variable       INT             EXT Pointer    L+001
ICODE^CMPI                  Literal        INT             %001000
 316.  000000 0  0   ! Clean PHYSEG and CACHE.  Note: this is pretty low-level stuff and may be
 317.  000000 0  0   ! release dependent.  Look at DEALLOCATESEGMENT in SMALLOC.
 318.  000000 0  0   proc !prv! TossSegment( AbsSegNo ) priv;
 319.  000000 1  0   int          AbsSegNo;
 320.  000000 1  0   begin                                  .
 321.  000000 1  1   int          error;
 322.  000000 1  1      stack 0,                           !Don't write out
 323.  000002 1  1            0,                           !One segment only (param is n-1)
 324.  000002 1  1            AbsSegNo;                    !Segment
 325.  000003 1  1      cpcb.pcbmemxa := axbyte( 0, memreleasemap );
 326.  000007 1  1      dispatch;                          !Make MM request
 327.  000010 1  1      code( strp 0 );
 328.  000011 1  1      store error;                       !If we get I/O error, something's wrong
 329.  000012 1  1      if error then
 330.  000014 1  1         PROCESSOR^HALT( DBG^Cover^Internal );
 331.  000021 1  1      call putsegment( AbsSegNo );
 332.  000024 1  1
 333.  000024 1  1   end; !proc TossSegment

ABSSEGNO                    Variable       INT             Direct         L-003
ERROR                       Variable       INT             Direct         L+001
```

```
000000 0  0   proc !prv! UnLockCode( FirstSeg, NumSegs ) priv;
000000 1  0   int          FirstSeg;             !1st ablsolute code segment to unlock
000000 1  0   int          NumSegs;              !Number of code segments to unlock
000000 1  0   begin
000000 1  1   string .ext FirstLoc;              !First location to unlock
000000 1  1   int(32)      CodeLength;           !Length of code to unlock
000000 1  1   int          space;
000000 1  1   int     .ext spt( spt^template);
000000 1  1
000000 1  1   if NumSegs = 0 then return;        !Nothing to do
000005 1  1
000005 1  1   for space := 0 to NumSegs - 1 do   !All code spaces
000007 1  1     begin
000007 1  2     stack^aspt( (@FirstLoc := axword( FirstSeg, 0 )) );
000021 1  2     store @spt;
000022 1  2     if $carry then                   !Segment doesn't exist
000023 1  2       PROCESSOR^HALT( DBG^Cover^Internal );
000030 1  2     CodeLength := segsize( FirstSeg ) '*' 2048;
000043 1  2     call unlockmemory( FirstLoc, CodeLength );
000047 1  2     FirstSeg := FirstSeg + 1;
000051 1  2     end;
000060 1  1
000060 1  1   end; !proc UnLockCode

CODELENGTH                     Variable       INT (32)      Direct        L+003
FIRSTLOC                       Variable       STRING        EXT Pointer   L+001
FIRSTSEG                       Variable       INT           Direct        L-004
NUMSEGS                        Variable       INT           Direct        L-003
SPACE                          Variable       INT           Direct        L+005
SPT                            Variable,36    STRUCT-I      EXT Pointer   L+006
```

ENTRY POINT MAP BY NAME

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 007 | 000166 | 000425 | 000166 | P | COPYOBJECT | 12FEB87 | 12:33 | TAL | $OVER.T9618C00.SUTIL1 |
| 00 | 010 | 000426 | 000506 | 000426 | P | CRCB^EXISTS | 12FEB87 | 12:33 | TAL | $OVER.T9618C00.SUTIL1 |
| 00 | 011 | 000507 | 000561 | 000507 | P | FREESEGS | 12FEB87 | 12:33 | TAL | $OVER.T9618C00.SUTIL1 |
| 00 | 003 | 000562 | 000623 | 000562 | PC | GETOSVERDATE | 12FEB87 | 12:33 | TAL | $OVER.T9618C00.SUTIL1 |
| 00 | 012 | 000624 | 000670 | 000624 | P | LABELTOAXADR | 12FEB87 | 12:33 | TAL | $OVER.T9618C00.SUTIL1 |
| 00 | 013 | 000671 | 001076 | 000735 | P | LOCKCODE | 12FEB87 | 12:33 | TAL | $OVER.T9618C00.SUTIL1 |
| 00 | 006 | 000016 | 000164 | 000016 | PR | REPLACEBPTS | 12FEB87 | 12:33 | TAL | $OVER.T9618C00.SUTIL1 |
| 00 | 002 | 000165 | 000165 | 000165 | | T9618C00^15JUL87^UTIL1^11F7 | 12FEB87 | 12:33 | TAL | $OVER.T9618C00.SVERSION |
| 00 | 004 | 001077 | 001133 | 001077 | PC | TESTCOVERENABLED | 12FEB87 | 12:33 | TAL | $OVER.T9618C00.SUTIL1 |
| 00 | 005 | 001134 | 001202 | 001134 | PC | TESTCOVERHOOKS | 12FEB87 | 12:33 | TAL | $OVER.T9618C00.SUTIL1 |
| 00 | 014 | 001203 | 001227 | 001203 | P | TOSSSEGMENT | 12FEB87 | 12:33 | TAL | $OVER.T9618C00.SUTIL1 |
| 00 | 015 | 001230 | 001310 | 001230 | P | UNLOCKCODE | 12FEB87 | 12:33 | TAL | $OVER.T9618C00.SUTIL1 |

DATA BLOCK MAP BY NAME

| BASE | LIMIT | TYPE | MODE | NAME | DATE | TIME | LANGUAGE | SOURCE FILE |
|---|---|---|---|---|---|---|---|---|
| 000000 | | COMMON | WORD | #GLOBAL | 12FEB87 | 12:33 | TAL | $OVER.T9618C00.DSVGN |
| 000000 | | COMMON | WORD | COVERROUTINE^DEFS | 12FEB87 | 12:33 | TAL | $IMT.T9050C00.PCVRSTUB |
| 000000 | | COMMON | WORD | ENVIRONMENT^REGISTER | 12FEB87 | 12:33 | TAL | $OVER.T9618C00.CUTIL1 |

ENTRY POINT MAP BY LOCATION
CODE SEGMENT 00

| SP | PEP | BASE | LIMIT | ENTRY | ATTRS | NAME | DATE | TIME | LANGUAGE | SOURCE FILE |
|---|---|---|---|---|---|---|---|---|---|---|
| 00 | 006 | 000016 | 000164 | 000016 | PR | REPLACEBPTS | 12FEB87 | 12:33 | TAL | $OVER.T9618C00.SUTIL1 |
| 00 | 002 | 000165 | 000165 | 000165 | | T9618C00^15JUL87^UTIL1^11F7 | 12FEB87 | 12:33 | TAL | $OVER.T9618C00.SVERSION |
| 00 | 007 | 000166 | 000425 | 000166 | P | COPYOBJECT | 12FEB87 | 12:33 | TAL | $OVER.T9618C00.SUTIL1 |
| 00 | 010 | 000426 | 000506 | 000426 | P | CRCB^EXISTS | 12FEB87 | 12:33 | TAL | $OVER.T9618C00.SUTIL1 |
| 00 | 011 | 000507 | 000561 | 000507 | P | FREESEGS | 12FEB87 | 12:33 | TAL | $OVER.T9618C00.SUTIL1 |
| 00 | 003 | 000562 | 000623 | 000562 | PC | GETOSVERDATE | 12FEB87 | 12:33 | TAL | $OVER.T9618C00.SUTIL1 |
| 00 | 012 | 000624 | 000670 | 000624 | P | LABELTOAXADR | 12FEB87 | 12:33 | TAL | $OVER.T9618C00.SUTIL1 |
| 00 | 013 | 000671 | 001076 | 000735 | P | LOCKCODE | 12FEB87 | 12:33 | TAL | $OVER.T9618C00.SUTIL1 |
| 00 | 004 | 001077 | 001133 | 001077 | PC | TESTCOVERENABLED | 12FEB87 | 12:33 | TAL | $OVER.T9618C00.SUTIL1 |
| 00 | 005 | 001134 | 001202 | 001134 | PC | TESTCOVERHOOKS | 12FEB87 | 12:33 | TAL | $OVER.T9618C00.SUTIL1 |
| 00 | 014 | 001203 | 001227 | 001203 | P | TOSSSEGMENT | 12FEB87 | 12:33 | TAL | $OVER.T9618C00.SUTIL1 |
| 00 | 015 | 001230 | 001310 | 001230 | P | UNLOCKCODE | 12FEB87 | 12:33 | TAL | $OVER.T9618C00.SUTIL1 |

```
Code size = 713 words
  PEP = 14 words
  Procedures = 699 words
  Gap at 32K = 0 words
  XEP = 8 words
Code area size = 1 pages
Resident code size = 1 pages
```

DATA BLOCK MAP BY LOCATION

| BASE | LIMIT | TYPE | MODE | NAME | DATE | TIME | LANGUAGE | SOURCE FILE |
|---|---|---|---|---|---|---|---|---|
| 000000 | | COMMON | WORD | #GLOBAL | 12FEB87 | 12:33 | TAL | $OVER.T9618C00.DSVGN |
| 000000 | | COMMON | WORD | ENVIRONMENT^REGISTER | 12FEB87 | 12:33 | TAL | $OVER.T9618C00.CUTIL1 |
| 000000 | | COMMON | WORD | COVERROUTINE^DEFS | 12FEB87 | 12:33 | TAL | $IMT.T9050C00.PCVRSTUB |

```
BINDER - OBJECT FILE BINDER - T9621C00 - (09SEP86)    SYSTEM \PRUNE
Object file name is $OVER.T9618C00.outil1
Object file timestamp is 12FEB87 12:33:16
Number of Binder errors = 0
Number of Binder warnings = 0
Code area size = 1 pages
Resident code size = 1 pages
Data area size = 1 pages
Extended data area size = 0 pages
Top of stack = 0 words
Number of code segments  = 1 segment


The object file will only run on a TNS/II
Errorfile file name is $OVER.T9618C00.EUTIL1
Number of compiler errors =  0
Number of compiler warnings =  0
Maximum symbol table space used was = 145126 bytes
Number of source lines = 9973
Compile cpu time = 00:00:16
Total Elapsed time = 00:02:53
```

What is claimed is:

1. In a computer system having a memory for storing a computer program and a processor for executing the stored computer program, said computer system having at least one an interrupt-causing instruction and the computer program comprising a first set of executable instructions stored in said memory, a method for determining which ones of a subset of said first set of executable instructions are not executed when the program is executed, comprising the steps of:

making a program copy from said stored computer program, said program copy comprising a second set of executable instructions identical to said first set of executable instructions;

storing said program copy in said memory;

modifying the stored program copy by replacing each one of a subset of said second set of executable instructions in said program copy with an interrupt-causing instruction;

initiating the execution of the modified program copy;

in response to the execution of each one of the interrupt-causing instructions in the program copy, performing the steps of:

locating in said first set of executable instructions an instruction identical to the instruction replaced by the executed one of the interrupt-causing instructions;

restoring the replaced instruction by writing said located instruction in place of the executed interrupt-causing instruction in said program copy; and executing the restored instruction.

2. The method of claim 1 wherein the interrupt-causing instruction is a breakpoint instruction.

3. The method of claim 1 wherein the interrupt-causing instruction is an invalid instruction.

4. The method of claim 1 further comprising the step of reporting which ones of said selected subset of instructions have been restored and executed.

5. The method of claim 1 further comprising the step of reporting which ones of the selected subset of instructions have not been restored and executed.

6. The method of claim 1 further comprising the step of, in response to the execution of a interrupt-causing instruction, indicating that the instruction replaced by the interrupt-causing instruction will be executed.

7. The method of claim 6 wherein said indicating step comprises storing in said computer system an indication that the interrupt-causing instruction has executed.

8. The method of claim 7 further comprising the step of reporting that each restored instruction has been executed.

9. In a computer system having a memory for storing a computer program and a processor for executing the stored computer program, said computer system having at least one an interrupt-causing instruction and the computer program comprising a set of executable instructions, a method for determining which ones of a selected subset of the set of executable instructions are executed, comprising the steps of:

storing a first copy of the computer program in the memory;

storing a second copy of the computer program in the memory;

selecting a subset of the set of instructions from the second copy of the computer program;

modifying the second copy of the program by replacing each of the instructions in the selected subset with an interrupt-causing instruction;

executing the modified second copy of the program;

in response to the execution of each one of the interrupt-causing instructions, performing the steps of:

identifying the instruction replaced by the executed interrupt-causing instruction;

indicating that the identified instruction will be executed;

restoring the replaced instruction by copying the identified instruction from said first copy of the program over the interrupt-causing instruction; and executing the restored instruction.

10. The method of claim 9 wherein said identifying step comprises the step of ascertaining the location in the program of the executed interrupt-causing instruction.

11. The method of claim 10 wherein said indicating step comprises the step of storing a predetermined value in a storage location corresponding to the ascertained location in the program.

12. The method of claim 9 wherein the interrupt-causing instruction is a breakpoint instruction.

13. The method of claim 9 wherein the interrupt-causing instruction is an invalid instruction.

14. In a computer system having a memory for storing a computer program and a processor for executing the stored computer program, said computer system having at least one an interrupt-causing instruction and the computer program comprising a first set of instructions, a method for determining which ones of a selected subset of said first set of instructions are executed, comprising the steps of:

making and storing a second copy of the computer program, said second copy comprising a second set of instructions identical to said first set of instructions;

selecting a subset of the second set of instructions;

modifying the second copy of the computer program by replacing each of the selected instructions in the second copy of the computer program with an interrupt-causing instruction;

initializing a map, said map comprising a set of storage locations, each of said storage locations corresponding to one of the interrupt-causing instructions;

initiating the execution of the modified second copy of said computer program;

in response to each interrupt during execution of the modified second copy of the computer program, performing the steps of:

ascertaining the location in the program of the interrupt-causing instruction;

storing a predetermined value in the map storage location corresponding to the interrupt-causing instruction to indicate that the instruction replaced by the interrupt-causing instruction will be executed;

restoring the replaced instruction by copying the instruction from the ascertained location in the first copy of the program to the ascertained location in the second copy of the program; and executing the restored instruction.

15. A computer system having at least one an interrupt-causing instruction for executing a stored program and analyzing program coverage comprising:

memory means for storing programs and data;

a first copy of the program stored in said memory means, the first copy comprising a first set of executable instructions;

a second copy of the program stored in said memory means, the second copy comprising a second set of executable instructions identical to said first set of executable instructions;

processing means coupled to said memory means for replacing each one of a subset of the second set of executable instructions with an interrupt-causing instruction and then executing the second copy of the program and, in response to the execution of an interrupt-causing instruction, restoring the instruction replaced by said interrupt-causing instruction by copying the replaced instruction from the first program to the location of the executed interrupt-causing instruction and executing the restored instruction; and reporting means for reporting which ones of the subset of instructions have been restored and executed.

16. The system of claim 15 wherein the interrupt-causing instruction is a breakpoint instruction.

17. The system of claim 15 wherein the interrupt-causing instruction is an invalid instruction.

* * * * *